US005734916A

United States Patent [19]

Greenfield et al.

[11] Patent Number: 5,734,916

[45] Date of Patent: Mar. 31, 1998

[54] METHOD AND APPARATUS FOR IDENTIFYING, PREDICTING, AND REPORTING OBJECT RELATIONSHIPS

[75] Inventors: Stephen Greenfield, Burbank; Chris Huntley, Altadena; Melanie Phillips, Burbank, all of Calif.

[73] Assignee: Screenplay Systems, Inc., Burbank, Calif.

[21] Appl. No.: 252,562

[22] Filed: Jun. 1, 1994

[51] Int. Cl.$^{6}$ .......................... G06F 17/30; G06F 17/21; G06F 17/50

[52] U.S. Cl. .......................... 395/792; 395/793; 395/751; 395/761; 395/616; 395/602; 395/606; 395/615; 395/621; 434/118; 434/322

[58] Field of Search .......................... 364/419.01, 419.08, 364/419.19, 419.2; 434/118, 236, 322, 433, 159, 156; 395/144, 162, 166, 400, 425, 600, 927, 792, 793, 751, 761, 602, 606, 615, 616, 621

[56] References Cited

U.S. PATENT DOCUMENTS

| | | | |
|---|---|---|---|
| 5,021,976 | 6/1991 | Wexelblat et al. | 395/356 |
| 5,119,474 | 6/1992 | Beitel et al. | 395/807 |
| 5,153,830 | 10/1992 | Fisher et al. | 395/793 |
| 5,282,265 | 1/1994 | Rohra Suda et al. | 395/12 |
| 5,544,305 | 8/1996 | Ohmaye et al. | 395/326 |

OTHER PUBLICATIONS

Okada, et al.: "Story Generation Based on Dynamics of the Mind", *Computational Intelligence*, vol. 8, No. 1, 1992, pp. 123–160.

*Primary Examiner*—Gail O. Hayes
*Assistant Examiner*—Joseph Thomas
*Attorney, Agent, or Firm*—Hecker & Harriman

[57] ABSTRACT

A method and apparatus for identifying, predicting and reporting relationships. The present invention uses a quad structure to describe relationships between dramatic units. Story elements, characters and appreciations are mapped onto the quad structure to reveal and constrain relationships. A storyform whose structure is described by the quad structure configuration and choices is identified and provided to a user.

183 Claims, 16 Drawing Sheets

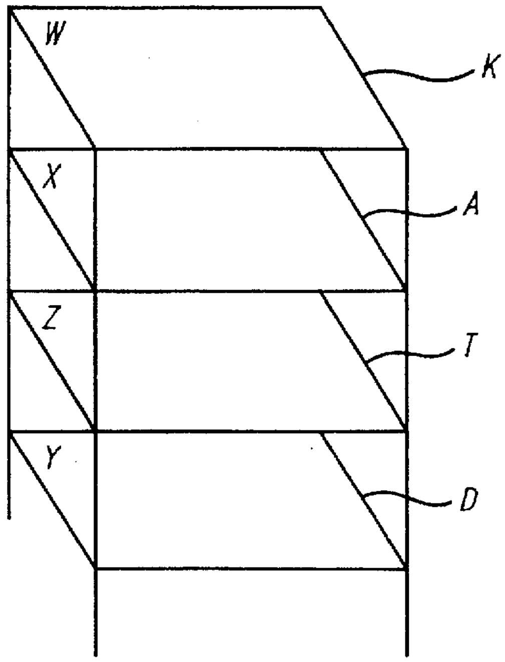
FIG. 3
FIG. 4
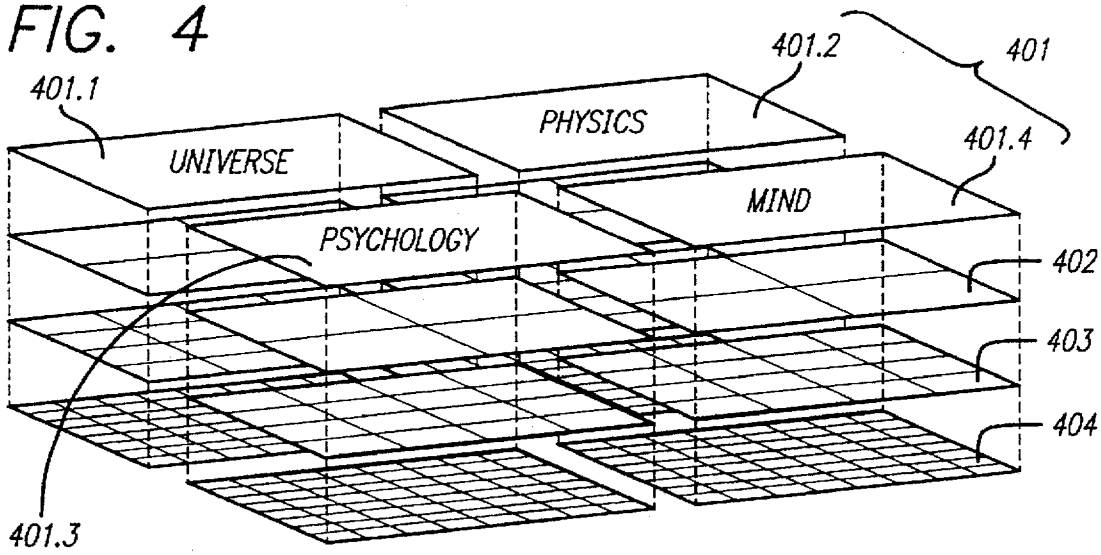
FIG. 5
| CLASS | TYPE | VARIATION | ELEMENT | RANGE |
|---|---|---|---|---|
| 1–4 | 0–4 | 0–4 | 0–4 | 0–4 |

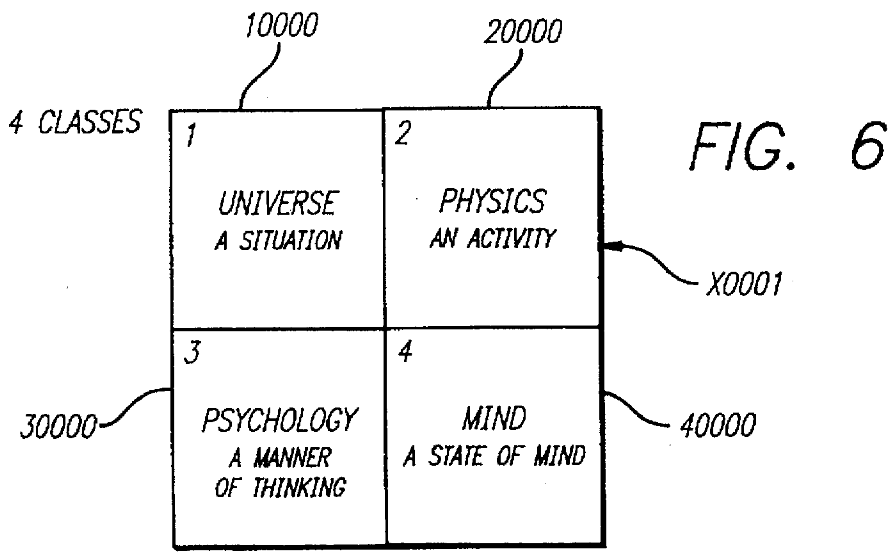
FIG. 6
FIG. 7
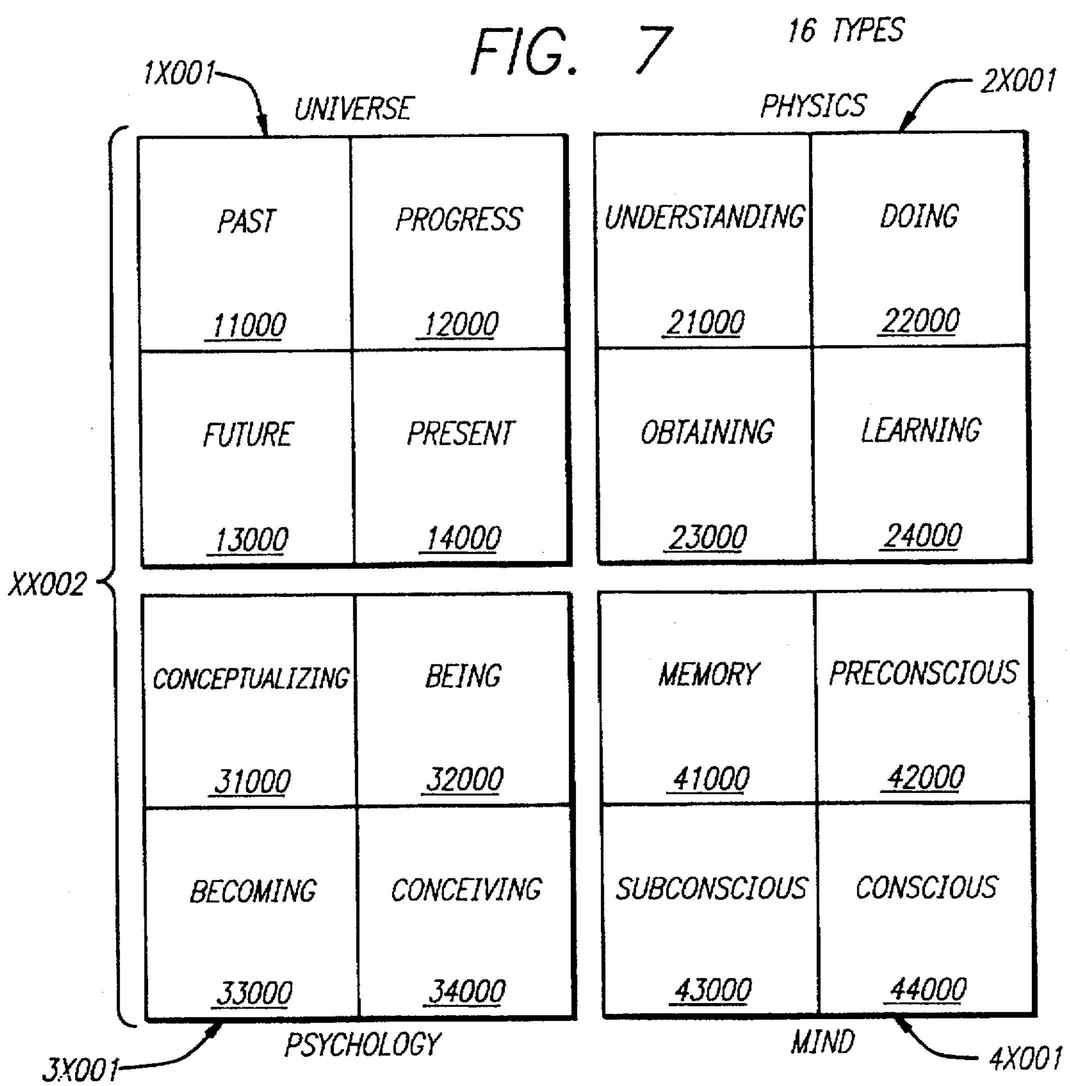

1426
HAVE ALL POSSIBLE STRUCTURAL CHOICES TABLES FOR THIS STORYFORM BEEN EVALUATED ?
NO
GO TO NEXT TABLE
1427
YES
1428
NO
IS THIS TABLE BEING USED ?
YES
IS THIS TABLE AN AUTOMATIC MATCH ?
YES
1429
NO
1432
MATCH FOUND
YES
1431
IS THIS A MULTI-SEARCH TABLE ?
NO
DOES THE ADJUSTED "SEMANTIC VALUE" OF THIS MENU MATCH THE VALUE FROM THE TABLE ?
1430
YES
FROM FIG. 14B
1433
NO
NO MATCH FOUND
FROM FIG. 14E
TO FIG. 14E

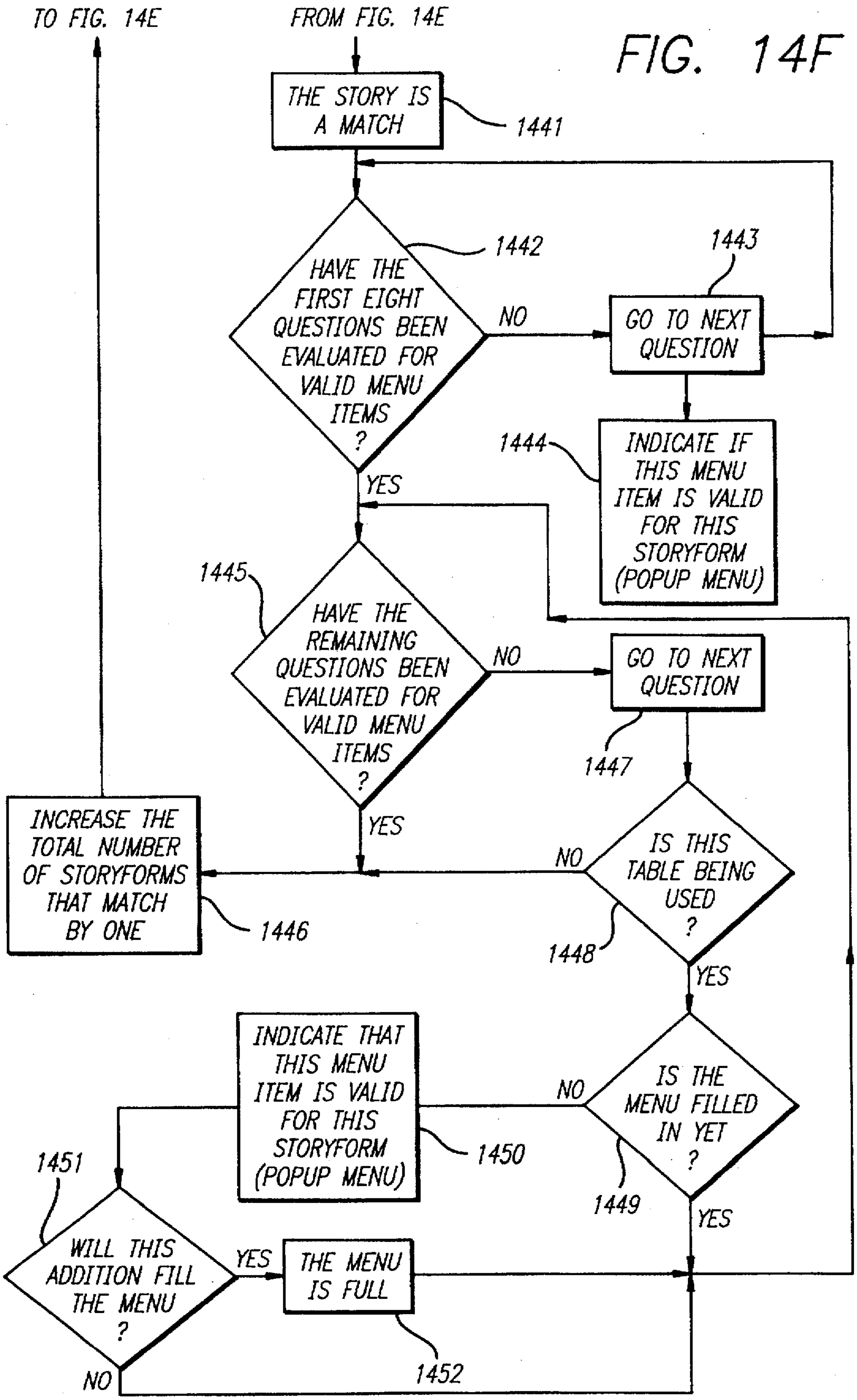
TO FIG. 14E
FROM FIG. 14E
FIG. 14F
THE STORY IS A MATCH
1441
HAVE THE FIRST EIGHT QUESTIONS BEEN EVALUATED FOR VALID MENU ITEMS ?
1442
NO
GO TO NEXT QUESTION
1443
INDICATE IF THIS MENU ITEM IS VALID FOR THIS STORYFORM (POPUP MENU)
1444
YES
HAVE THE REMAINING QUESTIONS BEEN EVALUATED FOR VALID MENU ITEMS ?
1445
NO
GO TO NEXT QUESTION
1447
YES
INCREASE THE TOTAL NUMBER OF STORYFORMS THAT MATCH BY ONE
1446
NO
IS THIS TABLE BEING USED ?
1448
YES
INDICATE THAT THIS MENU ITEM IS VALID FOR THIS STORYFORM (POPUP MENU)
1450
NO
IS THE MENU FILLED IN YET ?
1449
YES
1451
WILL THIS ADDITION FILL THE MENU ?
YES
THE MENU IS FULL
1452
NO

METHOD AND APPARATUS FOR IDENTIFYING, PREDICTING, AND REPORTING OBJECT RELATIONSHIPS

BACKGROUND OF THE INVENTION

1. Field of the Invention

This invention relates to a method of identifying, predictng and reporting relationships.

2. Background Art

Mathematical models are used to represent complex systems that involve relationships of multiple elements. Examples of such mathematical models include models for economic systems, weather systems, stock market analysis, traffic patterns, artificial intelligence, expert systems, population growth, etc. These systems generally involve the processing of data associated with elements of the model using algorithms believed to represent behaviour of the elements with respect to the model. Such systems have not proven useful when attempts have been made to apply them to systems that do not lend themselves to quantifiable elements.

An example of such a system is the structure of stories. Ever since stories were first told, theorists have searched for patterns that would explain dramatic function and assist authors in creating sound structures. A number of prior art theories of structural analysis exist. These theories include deconstruction, semiotics, reception theory, etc. These prior art theories have the disadvantage of focussing on linear causal relationships in attempting to analyze stories.

These prior art systems ignore the fact that once a story has been told, it is no longer appreciated simply as a progression. Rather, a story is constructed and built up by its separate parts. By the time the story is complete, a construction has been created that is greater than the sum of its parts. The progression of a story, though linear in nature, ultimately constructs a greater meaning that is appreciated as a whole.

To perceive the essence of the "big picture", one must separate Storyform from Storytelling. Storyform is the unique arrangement of structure and dynamics that creates the dramatics of each story. Storytelling is the way that arrangement is illustrated. As an example, we might imagine an author wishing to communicate the abandonment of morality in favor of self-interest. To illustrate this concept the author might describe someone taking candy from a baby or drinking the last water in a lost desert patrol. The essential concept of morality vs. self-interest is part of the storyform. Either of these scenarios specifically used to make the point would be the storytelling.

Previous attempts to discover the inner workings of story have often incorporated storytelling as part of the theory. Storytelling is an expression of an arragangemt of story sturcture and dynamics that creates the dynamics of the story. When storytelling is combined with the structure of the story, the nature of the problem becomes too nonspecific and the number of possible solutions becomes infinite. These combinations create the enormous variety seen in stories, but also make the task of discovering the underlying patterns very difficult.

SUMMARY OF THE INVENTION

The present invention provides a model of story that is based on a "storyform". A storyform is the unique arrangement of structure and dynamics that creates the dramatics of a story. Storytelling is the way that arrangement (the storyform) is illustrated. As an example, consider the storyform consisting of the notion of the abandonment of morality in favor of self-interest. Storytelling applied to this storyform may result in a story descrbing (1) taking candy from a baby or (2) drinking the last water in a lost desert patrol. The storyform is morality vs. self-interest.

The storyform can be represented symbolically as a cubic construct referred to as a "quad structure". The model's components are finite in number and movable according to dynamic parameters. The structure consists of Dramatic Units that represent the processes of the story as objects. This has the effect of quantifying the interactions of a story into functions. Each dramatic unit is a function. To produce a complete storyform, each of these functions must act upon the audience in the proper place and time. It is the relationship between these Dramatic Units that varies from story to story, while the Dramatic Units still maintain their identity as a cube. Changing the position of the Dramatic Units shuffles their position in the fourth dimensional time/space of the model so that the order of events is intimately connected to the nature of the message being sent by the author. For example, Doing something so one can Obtain something creates different dramatic potentials than Obtaining something so one can Do something.

There are four vertical levels in the structural model representing four dimensions that group "families" of similar Dramatic Units. The levels tend to differentiate Character, Theme, Plot, and Perspective (sometimes referred tos as Genre). This does not mean, for example, that Character is confined to a specific level but rather that the audience's appreciation of dramatic functions perceived as character traits and relationships tends to focus at a particular level.

Each level is constructed of Quads, which are square frameworks containing four Dramatic Units. The quad form is a physical representation of the an underlying mathematical relationship of the model of the invention. The math of this equation has been translated into a quad pattern or matrix. Each position in the matrix represents a variable in the equation. In a sense, the Dramatic Units can be seen as dramatic functions that are treated as objects rather than processes so that they may be easily manipulated by an author. Similarly, the quad form represents an equation seen as a matrix.

Dramatic Functions are concepts that impart understanding to an audience. The relationship of the dramatic functions in the quad structure represent one of a number of possible storyforms.

In a storyform's neutral position, all dramatic functions are balanced by their position in the matrix. As a result, like functions are grouped together so that quads describe families of Dramatic Units. Each of the families is such that, although each Dramatic Unit in a family is unique, there are certain traits that describe the family as a whole.

The dynamics are represented in another matrix of choices containing a number of mutually exclusive dramatic intents. An example is whether a character should ultimately decide they have been wrong in their story-long approach and must change or should hold on to their resolve and remain steadfast. Additional dynamic choices determine whether the decision to change or remain steadfast leads to the character's ultimate success or failure in their endeavor, whether that is truly good or bad in the context of the story.

There are 256 Dramatic Units in the storyform in the preferred embodiment. Each is a different function having a unique meaning to and effect upon an audience. Once every Dramatic Unit is placed in one of the four positions in each of the quads that represent variables in the storyform's equation, values have been assigned to the entire fractal nature of the model creating a unique storyform. When an author makes dynamic choices for her or his story it rearranges the position of the Dramatic Units within affected quads. Quads are also rearranged within each fractal dimension. We call this process storyforming.

The meaning of a story derives not just from the dramatic potentials that exist, but the unique way in which they interact. As an audience interprets the progression of a story over time, each Dramatic Unit comes into conjunction with many others, creating dramatic tension that rises and falls over the course of the story. Sometimes dramatic potentials combine to create a greater overall potential. Other times they might cancel out, eliminating potential entirely.

The present invention provides a unique addressing scheme for representing units in locations of the quad structure. The addressing scheme is then utilized to generate relevent partners of a unit of interest, pursuant to desired relationships. As elements are selected in the quad structure and associated with story and character elements, other relationships become constrained by existing relationships. These constraints arise out of the nature of the quad structure. A benefit of these constraints is a predictive nature of the present invention. Given elements and relationships, other elements and other relationships fall into place automatically.

The possible relationships that comprise a storyform are maintained in a storyform table, or can be generated during operation. As elements and relationships are determined, the number of possible storyforms that satisfy the conditions is reduced, eventually leading to a single storyform that represents the choices made.

The present invention uses a quad structure for mapping relationships such that each quad on the structure has a consistent internal relationship, and each quad, or set of sixteen, or set of sixty-four, as well as each level, has the same relationship with neighbor quads, sets of sixteen, sets of sixty-four, and neighbor levels. A unique addressing scheme provides a method of indentifying multiple resolutions of objects, from unit level to chess sets of sixty-four units, with the same form of address. An algorithm for identifying partners of interest operates by changing only a single place of the address.

The present invention defines relationships between and among entries in the quad structure. When data is mapped to certain locations, the nature of the data and the destination address result in the identification of certain of those predefined relationships. In addition, other relationships are predicted based on constraints that arise from existing relationships. In the preferred embodiment, all possible relationships of the quad structure can be determined with as little as twelve pieces of information.

In the preferred embodiment of the invention, the mapping of data to the quad structure and the resulting relationships define storyforms that represent an outline of a story and the relationships between characters, thematics, plot, and dynamics. The invention permits a user to identify a storyform by mapping data to the quad structure.

BRIEF DESCRIPTION OF THE DRAWINGS

FIG. 3 illustrates the vertical relationship of the planes of the quad structure of the present invention.

FIG. 4 is a perspective view of the quad structure of the present invention.

FIG. 5 illustrates the values at each digit location in the addressing scheme of the present invention.

FIG. 6 illustrates the class level of the quad structure of the present invention.

FIG. 7 illustrates the type level of the quad structure of the present invention.

FIGS. 14A–14F are flow diagrams describing the operation of selecting a storyform in the preferred embodiment of the present invention.

DETAILED DESCRIPTION OF THE INVENTION

Figure 1:
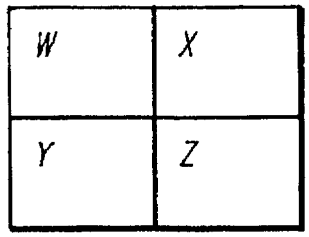
FIG. 1 illustrates a quad pattern.

In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

The present invention provides a method of identifying, predicting and reporting relationships. In the preferred embodiment, and in the example described, the present invention provides a method for identifying, predicting, and reporting the relationships in a story to create a storyform.

A "storyform" is the dramatic structure or blueprint that contains the essence of the entire argument to be made. A storyform is a specific combination of elements and their dynamic influences on each other. Each storyform contains the entire set of story elements needed to create a complete story. In the preferred embodiment of the present invention, a storyform is represented as a plurality of appreciations.

In the present invention, there are certain commonly shared dramatic concepts that are present in a story. When a person attempts to deal with troubles, certain considerations and perspectives are commonly adopted such as "goals," "requirements," and "consequences." Stories, which represent analogies to this problem solving process, also incorporate these aspects. In the present invention, these shared considerations are referred to as "appreciations."

The way the model is explored is by measuring quads using each of three kinds of pairs known as dynamic pairs, companion pairs and dependent pairs. The process of measuring a quad three ways "triangulates" on the suspected meaning of how that quad is arranged internally, and a fourth appreciation provides the context of the quad as a whole in the overall storyform. There are several ways to create an order of events by scanning the storyform by pairs. Some of these make the outline of the big picture visible at the very beginning, then spend the rest of the progression filling in details until all is known. Other approaches start with the detail, then build outward to the big picture. In any case, only when the story is over does the audience have all the pieces necessary to know what it means on a grand scale.

Dramatic choices made by an author determine how dramatic units are to be moved, but we have not yet described how it is determined which dramatic units are going to be affected. To link both structure and dynamics, the author selects the nature of the problem by "zeroing in" on it through a number of choices. One way to appreciate this concept is to start with a quad at the top level (class) and work down through the other three levels to the bottom of the structure.

The quad of classes consists of Universe, Physics, Mind, and Psychology. Each class describes an area in which the problem of the story seems to center. A problem in the Universe class involves a situation, which is a state in the environment. A problem in the Physics class concerns an activity, which is a process in the environment. Mind Class describes problems concerning a fixed attitude, or state of mind. The Psychology class contains problems with a manner of thinking, which is a process of the mind.

Once an author has decided upon a specific element as the center of the story's problem, it becomes the "lynch pin" for all of the story's dynamics. This Critical Element is the nodal point of the storyform: the single unit around which all of the story's dissonance is built. All of the dynamics can now be applied to the structure in reference to that point. If one were to keep all dynamic choices the same but merely select a different critical element, the resulting storyform could have an entirely different meaning. However, since the structure is fractal in nature, sometimes a shift in position of the choice of critical element can result in differences in meaning, yet other times, differences in critical element position might have little effect other than nuance.

In a sense, experiencing the progression of the story is a subjective view, whereas observing the big picture after all the information is available is an objective view. In fact, the concept of a story having two vantage points clarifies many of the relationships between audience and story. One way to appreciate the difference between Subjective and Objective perspectives is to imagine each story as a battle. The Subjective view of the battle, the one that speaks to our emotions, puts us down in the trenches in the middle of the action. This is the realm of the Main Character and works to develop our empathy for her or him. The battle is also observed by a General on the hill, who, although concerned with the outcome, is not actually involved. This more dispassionate perspective is the Objective View. It is the dissonance between the Main Character's perspective and the Objective Reality provided by the author that carries the message of the story.

This dissonance is created in the following manner. Either the Subjective or Objective perspective will serve as the "measuring stick" for the audience, becoming the carrier wave or reference signal. A Subjective measuring stick sides with the Main Character and indicates they must hold on to their resolve. An Objective measuring stick sides with the universe at large, indicating the character should learn they are in error and change. All that is explored in the story will be judged against this constant.

QUAD STRUCTURE AND ADDRESSING

Figure 15:
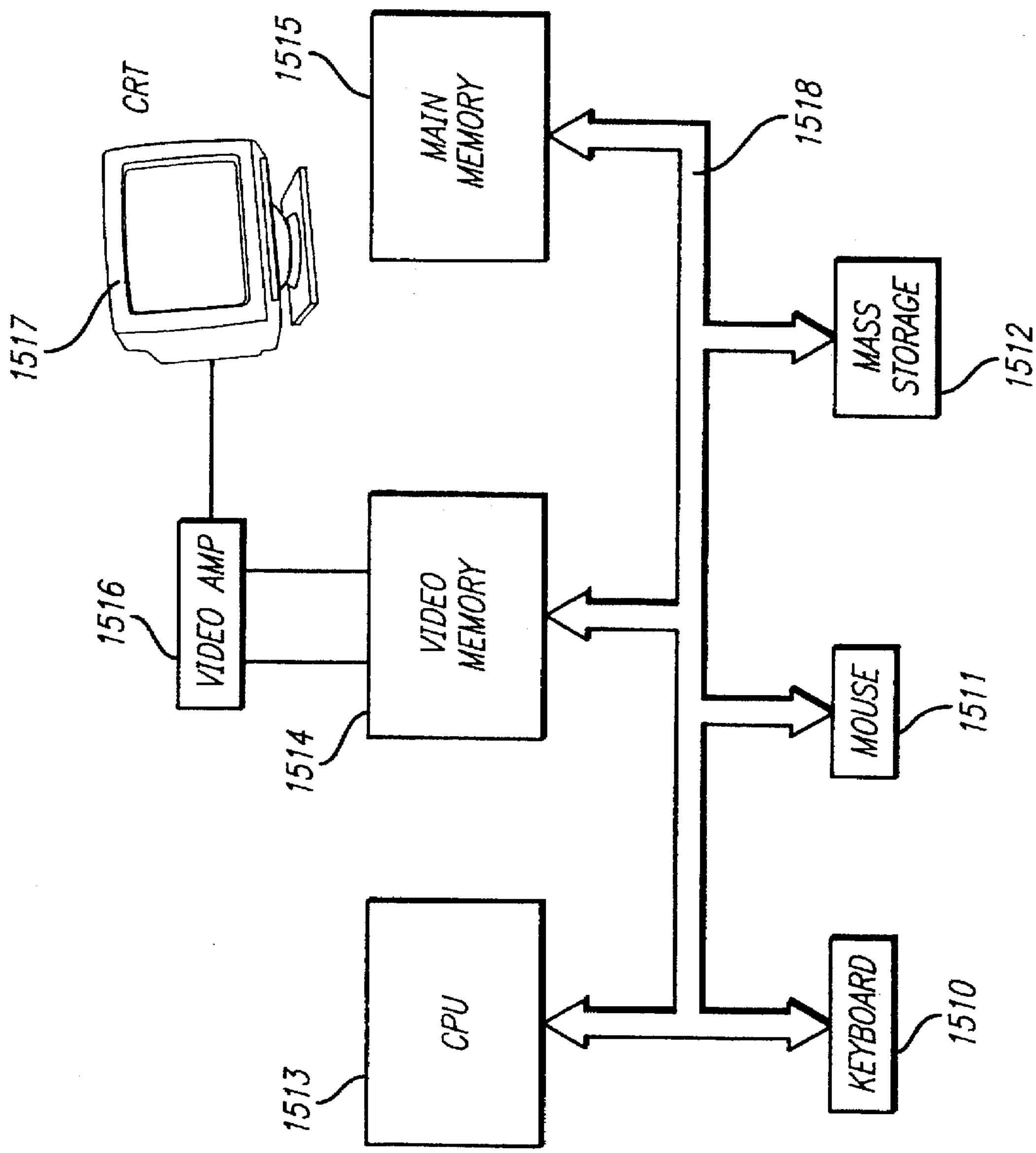
FIG. 15 illustrates an example of a computer system for implementing the present invention.

The quad structure of the preferred embodiment of the present invention may be implemented on the computer set forth in FIG. 15. The quad structure of the preferred embodiment of the present invention is described with respect to FIGS. 1–13.

FIG. 1 illustrates a quad pattern in the present invention. A number of relationships are defined with respect to, and illustrated by, the quad pattern of FIG. 1. For purposes of example, the quad pattern consists of a 2×2 grid. The upper left hand location of the grid is referred to as location "W". The upper right hand location is referred as to location "X". The lower left hand location is referred to as location "Y". The lower right hand location is referred to as location "Z". The locations of the quad are defined to have the relationship expressed by W/Z=X*Y. That is, whatever is in location W is divided by the units in location Z and this expression is equivalent to the product of the units in location X and the unit in location Y.

In addition, a number of other relationships exist with respect to the quad of FIG. 1. A pair of units along the diagonal from location W to location Z is referred to as the "dynamic pair". The units on the diagonal from location X to location Y are referred to as the co-dynamic pair. The units from location W to location X are referred to as the "companion pair". The units along the line from location Y to location Z are defined as the "co-companion pair". The units in the line from location W to location Y referred to as the "dependent pair". The pair of units along the line from location X to location Z are referred to as the "co-dependent pair".

For purposes of example, the present invention uses parameters in the quads that can be thought of as representing the following:

Knowledge (K)

Thought (T)

Ability (A) and

Desire (D)

Figure 2A:
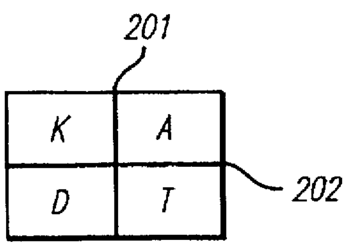
FIGS. 2A–2H illustrate a TKAD quad pattern in eight orientations.

The preferred embodiment of the present invention is a "Knowledge based system" so that K is in the upper left hand system of the quad pattern as shown in FIG. 2A. In a preferred embodiment, K is in a dynamic pair relationship with Thought and so T is in the lower right hand location of the quad pattern. K is in a companion relationship with Ability so that A is in the upper right hand location of the quad pattern. K is in a dependent relationship with Desire so that D is in the lower left hand position of the quad pattern. As defined above, the relationship of the placement of K, T, A, and D of FIG. 2A can be expressed by the equation:

$$K/T=A*D \qquad \text{(Equation 1)}$$

The quad pattern of FIG. 2A is altered by rotating the quad pattern about the axis 201 formed by the vertical line between the left and right side of the quad pattern pairs. This results in the pattern of FIG. 2B where A is in the upper left corner, K is in the upper right corner, T is in the lower left corner, and D is in the lower right corner. The relationship of the pattern of FIG. 2B is described by:

$$A/D=K*T \qquad \text{(Equation 2)}$$

Figure 2B:
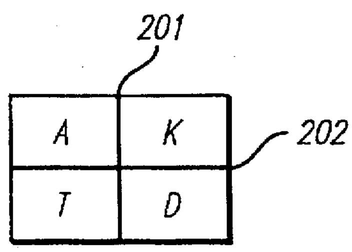

In the pattern of FIG. 2B, A and D are the dynamic pair, K and T are the co-dynamic pair, A and K are the companion pair, T and D are the co-companion pair, A and T are the dependent pair and K and D are the co-dependent pair.

The pattern is again changed by rotating the quad of FIG. 2B about the horizontal axis 202. This results in the pattern of FIG. 2C with T in the upper left hand corner, D in the upper right hand corner, A in the lower left hand corner, and K in the lower right hand corner. The relationship of the units of this pattern is expressed by:

$$T/K=D*A \qquad \text{(Equation 3)}$$

The dynamic pair is TK, the co-dynamic pair is DA, the companion pair is TD, the co-companion pair is AK, the dependent pair is TA, and the co-dependent pair is DK.

Figure 2C:
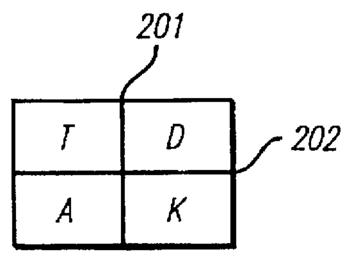
Figure 2D:
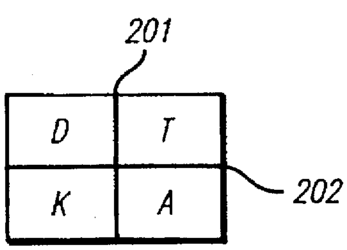

Rotating the pattern of FIG. 2C about axis 201 results in the pattern of FIG. 2D. In FIG. 2D, D is in the upper left corner, T in the upper right, K in the lower left and A in the lower right. DA is the dynamic pair, TK is the co-dynamic pair, DT is the companion pair, KA is the co-companion pair, DK is the dependent pair, and TA is the co-dependent pair. The relationships of the units of the pattern of FIG. 2D is expressed by:

$$D/A=T*K \qquad \text{(Equation 4)}$$

Figure 2E:
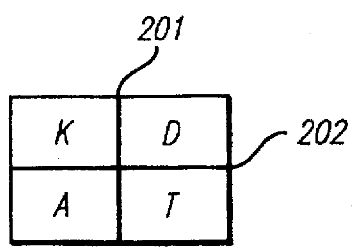

The quad can also be rotated on the diagonal to create new relationships. Referring to FIG. 2E, we see the pattern of this form by rotating the quad pattern of FIG. 2A about the diagonal from the upper left to the lower right. This results in the pattern with K in the upper left, D in the upper right, T in the lower right and A in the lower left. This relationship is described by:

$$K/T=D*A \qquad \text{(Equation 5)}$$

The dynamic and co-dynamic pairs are KT and DA respectively, the companion and co-companion pairs are KD and AT respectively, and the dependent and co-dependent pairs are KA and DT respectively.

Figure 2F:
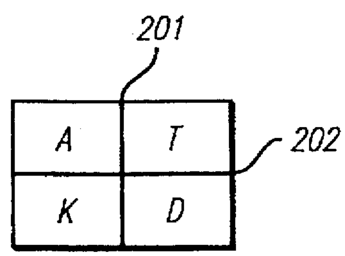

FIG. 2F illustrates the pattern of FIG. 2B rotated about the axis from the upper left to lower right. A is in the upper left, T is in the upper right, K is in the lower left, and D is in the lower right. This pattern is expressed by the equation:

$$A/D=T*K \qquad \text{(Equation 6)}$$

The dynamic and co-dynamic pairs are AD and TK respectively, the companion and co-companion pairs are AT and KD respectively, and the dependent and co-dependent pairs are AK and TD respectively.

Figure 2G:
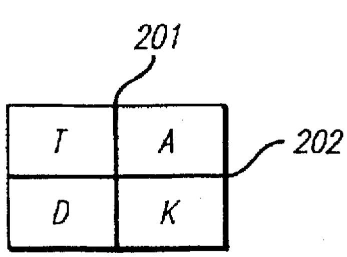

Rotating the pattern of FIG. 2C about the axis from the diagonal from upper left to lower right, results in the pattern of FIG. 2G. T is in the upper left, A is in the upper right, D is in the lower left, and K is in the lower right. This pattern is expressed by the equation:

$$T/K=A*D \qquad \text{(Equation 7)}$$

The dynamic and co-dynamic pairs are TK and AD respectively, the companion and co-companion pairs are TA and DK respectively, and the dependent and co-dependent pairs are TD and AK respectively.

Figure 2H:
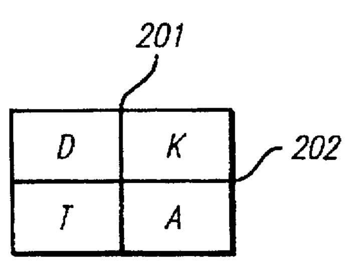

Rotating the pattern of FIG. 2D about the diagonal from the upper left to lower right results in the pattern of FIG. 2H where the dynamic and co-dynamic pairs are DA and KT respectively, the companion and co-companion pairs are DK and TA respectively, and the dependent and co-dependent pairs are DT and KA respectively. This pattern is expressed by the equation:

$$D/A=K*T \qquad \text{(Equation 8)}$$

The expression on the right hand side of the equivalent sign is not a bidirectional or commutatable operation. That is, K*T is not the same as T*K.

The relationship described in FIGS. 1 and 2A–2H describes the relationship developments in the horizontal plane. The same relationship holds true in the vertical plane. Referring now to FIG. 3, four planes, W, X, Y and Z are illustrated with W being the highest plane followed by the X plane, the Z plane and the Y plane. The formula relationship among the locations of FIG. 1 holds true for the planes of FIG. 3, namely W/Z=X*Y. In the preferred embodiment of the invention, planes W, X, Z and Y are associated with the values K, A, T and D respectively. The relationship of these four values is governed by their location in the planes. The units in the W and Z planes always have a ratio relationship while the units in the X and Y planes always have a product relationship.

In the preferred embodiment, the present invention uses a "quadstructure" of units in physical locations that describe their effect upon one another. This "quadstructure" is implemented on a computer in the preferred embodiment of the present invention. An overview of this quadstructure is illustrated in FIG. 4. In the quadstructure of the present invention, each unit at one level is associated with four units on the next level down. Referring to FIG. 4, the top level of the quadstructure is level 401 with levels 402, 403, and 404 below that level. In the present invention the top level is referred to as the "class" level and consists of the universe unit in the upper left corner, unit 401.1, a physics unit in the upper right corner, unit 401.2, a psychology unit 401.3 in the lower left corner and a mind unit 401.4 in the lower right corner. Below each unit of the class level 401 are four units at level 402. Level 402 is referred to as the "type" level. The type level 402 consists of four quadstructures, each consisting of a 2×2 array of units. As noted previously, since each unit of one level is associated with four units at the next lower level, and the level 401 consists of four units, level 402 consists of 16 units.

Each unit of level 402 is associated with four units on level 403. Thus, with sixteen units in level 402, there are 64 units in level 403. As can be seen, by extending the boundaries of each unit of level 402 to level 403, the boundaries sound four smaller proportioned units. Each 2×2 quadstructure of level 402 has an associated 4×4 structure at level 403.

Finally, each unit of level 403 has associated with it four units at level 404. Thus, level 404 consists of four 8×8 structures or 256 units. The relationship of four units and any 2×2 quadstructure at any level, is the same as the relationship described with respect to FIG. 1. That is, the units at locations W, X, Y and Z will have the relationship W/Z=X*Y. In addition, the relationship among the various levels is that as described with respect to FIG. 3. Namely, the first and third levels are in a dynamic relationship, and the second and fourth levels are in a co-dynamic relationship. The first and fourth level are in a dependent relationship and the second and third level are in a co-dependant relationship. The first and second level are in a companion relationship and the third and fourth level are in a co-companion relationship.

The preferred embodiment of the present invention relates to the creation of story forms in the identification of relationships and appreciations based on user input. In one embodiment of the present invention, the user input is obtained using a computer.

Quadstructure Units and Addressing Scheme

The present invention uses a five place addressing scheme to identify units in the quadstructure. The addressing scheme is illustrated in FIG. 5. In the scheme of FIG. 5, the most significant position of the addressing scheme at the left and the least significant position is at the right. The first position, the most significant position represents and identifies the class, the next position identifies the type, the next the variation and fourth the unit. The fifth place represents a range that allows the selection with a single address of a quad of units etc. up to an entire level of units. The class position can vary from a value of one to four to identify one of the four class level units. The numbering system relies on the following convention. The upper left hand corner of a quad is identified as location one, the upper right as location two, lower left as location three and lower right as location four. The type variation unit and range can all vary from zero to four. The values of one to four for type variation and element identify a quad position. A zero value in a type variation or element means that no unit is selected at that level. Typically, this means that the next higher level with a non-zero value is the level of interest. The range value is described further below with respect to particular examples.

FIG. 6 illustrates the class level of FIG. 4 in a two dimensional presentation. Location one in the top left is the universe unit, location two on the top right is the physics units, location three in the lower left is the psychology unit, and location four in the lower right is the mind unit. The top left, the universe unit is identified with the address 10000. The one in the most significant position indicates that the unit and the one location of the quad is the unit of interest. The zero in the type variation and unit locations indicates that there are no selections made at those levels. The zero and the range position indicates that it is only the unit indicated by the prior four places that is of interest. The address of the physics unit is 20000, the address of the psychology unit 30000, and the address of the mind unit is 40000. An entire quad can be selected with a single address in the present invention. Selecting the entire quad at the class level has a value of X0001 where X=don't care. The one in the range value means selecting the four members of the quad of which the units selected by the previous four address places indicates. Selecting any of the four class level units and then selecting a one in the range position selects all four of the units in the class level quad.

FIG. 7 illustrates the type level for each of the class units of FIG. 6. The type units of the universe class unit are illustrated in the upper left hand corner of FIG. 7. They include the past unit 11000, progress unit 12000, future unit 13000, and present unit 14000. The first position of the address is a 1 to indicate that these units are associated with the universe class unit. The second position selects one of the four units in the type level. The next two positions are zero indicate that there is no unit of interest below the type level. Finally, the range position of the address is a zeroed indicate that it is the unit selected by the second position which is of interest. To select the entire type quad, and address 1X001 is used.

The type quad of the physics unit of the class level includes understanding unit 21000, doing unit 22000, obtaining unit 23000, and learning unit 24000, the entire type quad is selected by the address 2X001.

The type quad associated with the psychology unit of the class level is illustrated in the lower left hand corner of FIG. 7. This includes the conceptualizing unit 31000, being unit 32000, becoming unit 33000, and conceiving unit 34000. This quad is selected by an address 3X001.

Memory unit 41000, preconscious unit 42000, subconscious unit 43000, and conscious unit 44000, make up the type quad associated with the mind unit of the class level. This quad is selected by an address 4X001. The entire type quad is selected by an address of the form XX002. At least one unit at the class and type level is selected. The variation and unit address positions are at zero and the range position has a value of two to indicate that a quad of quads is selected. That is that the 16 units associated with a selected type class unit are selected.

Figure 8:
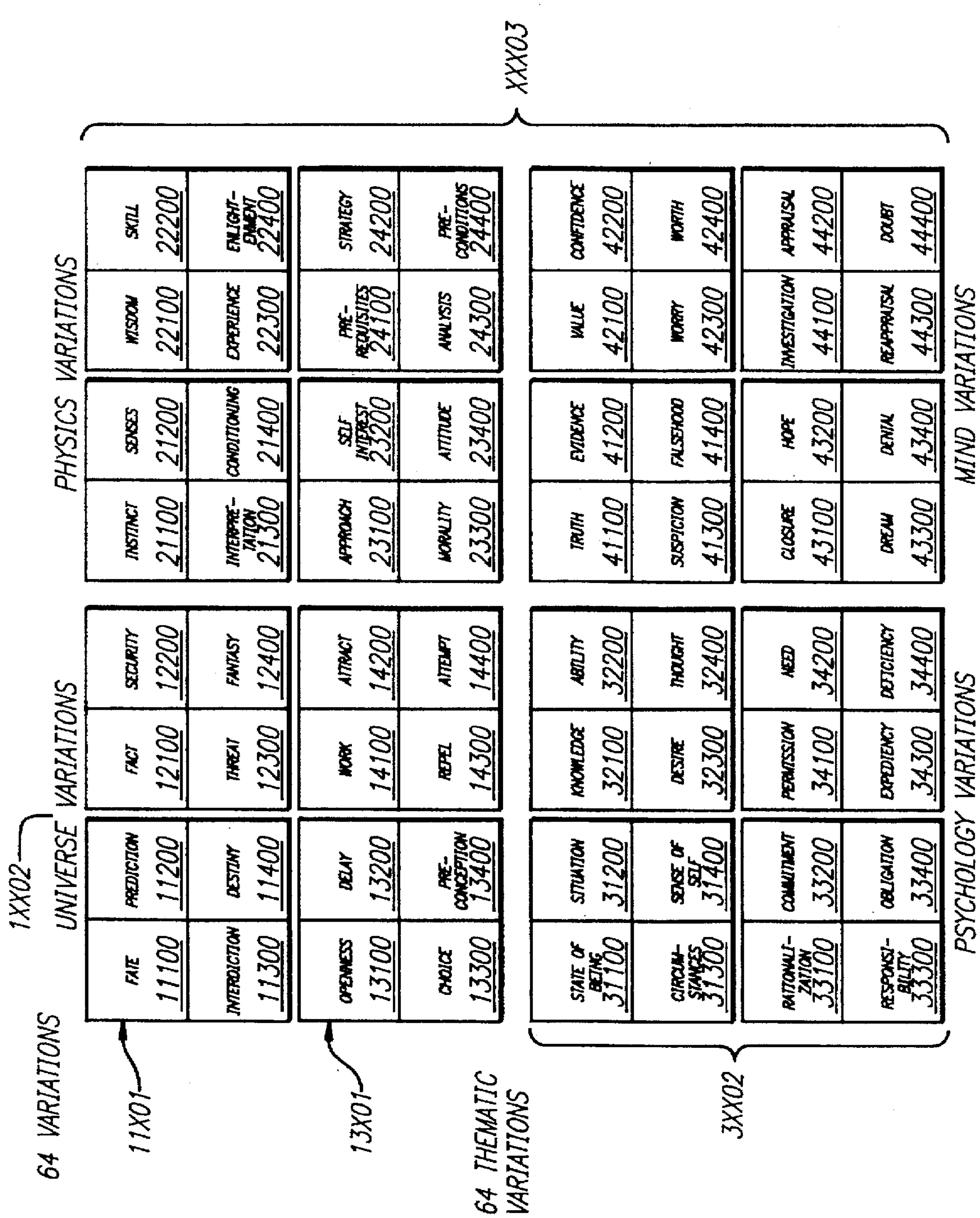
FIG. 8 illustrates the variations level of the quad structure of the present invention.

FIG. 8 illustrates the variations level for each unit of the class level. The universe variations consists of a quad of quads in the upper left hand corner of FIG. 8. Each quad is associated with one unit of the universe type level of FIG. 7. The units of each variation can be seen by reference to FIG. 8. For example, the variations associated with the past unit of the universe type level are fate 11000, prediction 11200, interdiction 11300, and destiny 11400. There is a quad of quads associated with each unit of the class level. And each quad of quads includes a quad associated with one unit of its associated type unit. The address of a quad of quads at the variations level is illustrated by reference to the quad of quads in the lower left hand corner of FIG. 8. This quad of quads is identified 3XX02. The three in the initial position refers to the psychology unit of the class level. The X in the second position means that any of the type units of FIG. 7 associated with the psychology unit may be selected. The X in the third position indicates that any of the units of the lower left hand corner of the variations level of FIG. 8 may be selected. The zero means that no lower levels are selected and the two in the last position means that a quad of quads is selected. A "quad of quad of quads" (referred to in the present invention as "chess set" of 64 units) may also be identified by a single address as illustrated in FIG. 8. Address XXX03 is used to indicate such a chess set of variation level units. X in the first three positions indicates that any of the class level type level and variation level items may be selected. The zero in fourth position indicates that nothing at the element level is selected and the three indicates that a chess set of items is to be selected. The chess set being those 64 units associated with the items chosen by the first three positions.

The lowest level in the preferred embodiment of the present invention is the element level. In the preferred embodiment, there are 64 units and they are the same in each class (universe, physics, psychology, and mind). However, the arrangement and location of the units in each class is different. The addresses and arrangements of the items at the element level can be determined by reference to FIGS. 9 through 12 which are the element levels for the universe, physics, psychology and mind class respectively. It should be noted that the addressing scheme of the present invention provides some method of referring to all of the items of the entire element level (a quad of chess sets) by any address of the form XXXX4. Four refers to a quad of chess sets.

The order of the items in each level illustrated in FIGS. 6 through 12 are referred to in the preferred embodiment of the present invention as a reference quad structure or "neutral" quad structure. The arrangement may be changed without departing from the scope of the present invention. The universe units all have an address beginning with 1, and the physics units, psychology units and mind units have addresses beginning with 2, 3 and 4 respectively.

Figure 13:
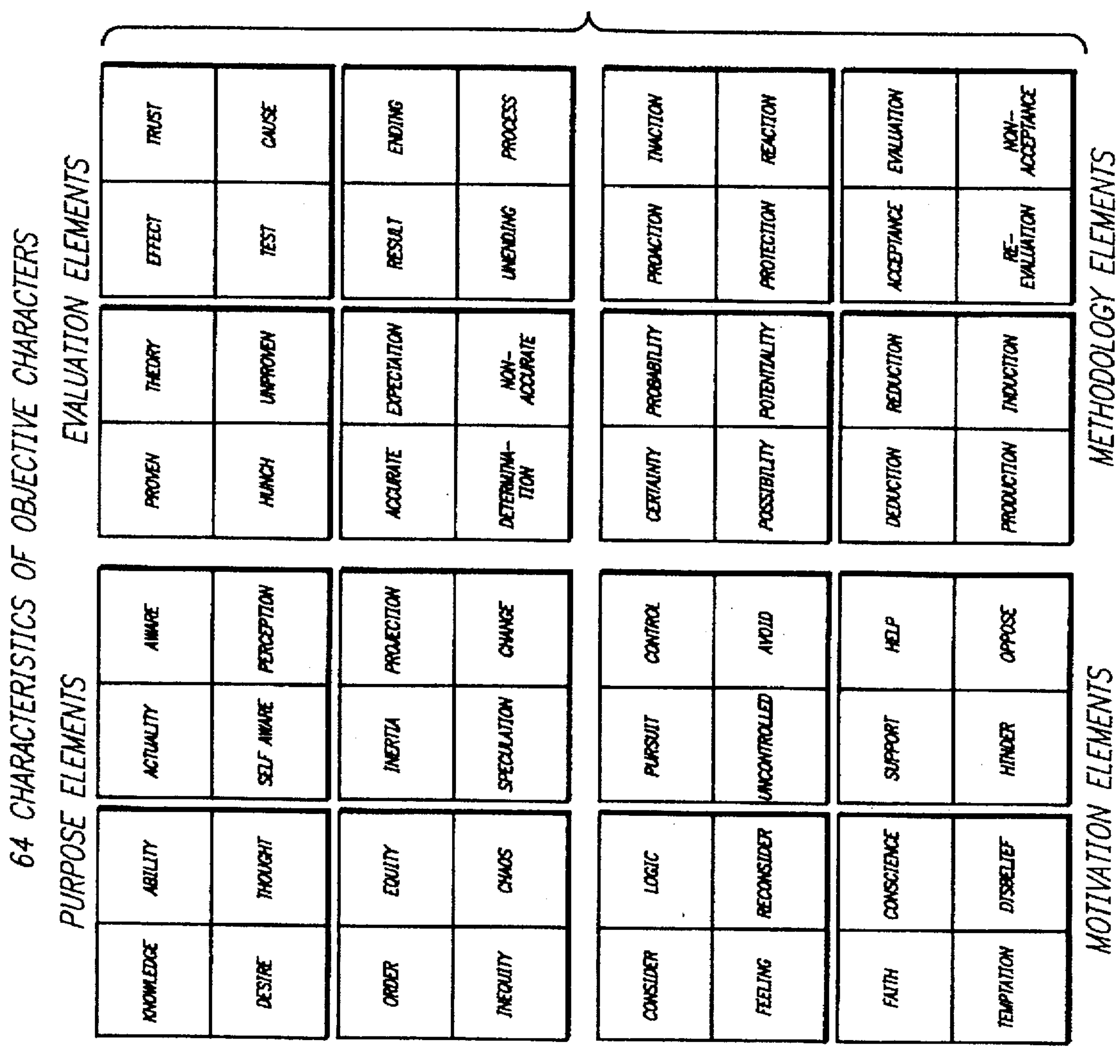
FIG. 13 illustrates the characteristics of objective characters of the present invention.

FIG. 13 illustrates characteristics of objective characters in the preferred embodiment of the present invention. The upper left quarter of the items of FIG. 13 represent purpose units of an objective character. The items of FIG. 13 are the 64 units level items. The upper right hand quarter of FIG. 13 contains evaluation units of an objective character. The lower left hand corner contains motivation units and lower right hand corner contains methodology units.

The units of the quad tables are defined in a files referred to as "SEMTABLE.H" and "SEMTABLE.CC" illustrated in Appendix A below. The units and their definitions are described in Appendix B below.

APPRECIATIONS

As noted above, there are certain commonly shared dramatic concepts that are present in a story. In the present invention, these shared considerations are referred to as "appreciations." These appreciations are used to determine the mapping of characters, thematics, and plot on the quad structure, leading to the creation or selection of a storyform. Appreciations are best understood by describing the appreciations used in the present invention.

In the preferred embodiment of the present invention, appreciations can be categorized as character dynamics appreciations, plot dynamics appreciations, objective story appreciations, additional objective story appreciations, subjective story appreciations, main character appreciations, and obstacle character appreciations. In the preferred embodiment, these appreciations are implemented on a computer.

A number of appreciations in these categories are described below:

CHARACTER DYNAMICS

Resolve; Change or Steadfast?

Topic: At the moment of truth, every Main Character must determine whether to hold on to their resolve or to change in the hope of succeeding.

Main Character

Background: There are two ways in which an author can illustrate the best way to solve the problem explored in a story: One is to show the proper way of going about solving the problem, the other is to show the wrong way to solve the problem. To illustrate the proper way, the Main Character must hold on to their resolve and remain steadfast if they are to succeed, because they truly are on the right path. To illustrate the improper way of dealing with a problem, the Main Character must change to succeed, for they are going about it the wrong way. Of course, success is not the only outcome that can befall a Main Character. A way to illustrate that a way of dealing with a problem is improper would be to have the Main Character change their way of going about it and fail. Similarly, the improper way can be illustrated by a Main Character that remains steadfast and fails. So, choosing Change or Steadfast really has nothing directly to do with being correct or incorrect; it just describes whether the Main Character's ultimate resolve is to stay the course or try a different tack.

Storytelling Usage: Just because a Main Character should remain steadfast does not mean they don't consider changing. In fact, that is the temptation with which they are constantly faced: to give up or alter their approach in the face of ever-increasing opposition. Action oriented Steadfast stories throw physical hurdles at a Steadfast Main Character (e.g. James Bond as portrayed in most of the Bond films), whereas Decision oriented Steadfast stories throw mental or emotional hurdles at a Steadfast Main Character (e.g. Job in the Old Testament of the Bible). If, in spite of the difficulties or suffering, the Steadfast Main Character remains steadfast, the audience still may not want them to ultimately succeed. This occurs because simply being steadfast does not mean one is correct. If the audience is shown that a character is misguided yet remains steadfast, the audience will hope for their ultimate failure. Similarly, a Change Main Character does not mean they are changing all the time. In fact, in most cases, the Change Main Character will resist change, all the way to the moment of truth where they must choose once and for all to continue down the wrong path, or to jump to the right path by accepting change in themselves or their outlook.

Action oriented Change stories offer aids and benefits to assist the Main Character in continuing down the wrong path. Decision oriented Change stories provide mental or emotional gratification to the Main Character, again tempting them not to change. Regardless of the benefits to be had by remaining steadfast, the audience will want the Change Main Character ultimately to succeed if they are on the wrong path and change. However, if they do not change, the audience will want them to lose all the benefits they thought they had gained.

Impact: The selection of Change or Steadfast has wide ranging effects on the dynamics of the story. Such things as the relationship between the Objective and Subjective story lines and the order of exploration of the thematic points is adjusted in the model to create and support the ultimate decision of the Main Character to either change or remain steadfast.

Direction; Stop or Start?

Topic: Sometimes a problem is made worse by having too much of something, other times by having too little. In the "too much" scenario, the source of the trouble needs to Stop. In the "too little" scenario the remedy to existing trouble must Start. A Change Main Character must either grow into a new way of being (Start) or grow out of an old way of being (Stop). A Steadfast Main Character must grow to hold out until something good can Start or hold on until something bad Stops.

Background: Whether or not a Main Character eventually changes their nature or remains steadfast, they will still grow over the course of the story, as they develop new skills and understanding. This growth has a direction. Either they will grow into something (Start) or grow out of something (Stop). A Change Main Character grows either by adding a characteristic they lack (Start) or by dropping a characteristic they already have (Stop). Either way, their make up is changed in nature. As an example we can look to Scrooge. Does Scrooge need to change because he is mean or because he lacks kindness? Scrooge's problems stem not from his active meanness, but his passive lack of kindness. It is not that he is on the attack, but that he does not proactively seek to help others. So Scrooge needs to Start, rather than stop. This difference is important during storytelling to place the focus of conflict so as to support the argument of the story. With Steadfast Main Characters they will not add nor delete a characteristic, but will grow either by more strongly holding on against something bad, waiting for it to Stop, or by more strongly holding out until something good can Start.

For a Steadfast Character, growth is not a matter of change, but a matter of degree. The change appears not in themselves but in their environment. Change Characters actually alter their being, under the influence of environmental considerations. This illustrates both why it is often falsely thought that a Main Character MUST change, and also why steadfast characters are thought not to grow. To see growth in a Main Character one must look at both whether they are Change or Steadfast and also at the direction of the growth.

Storytelling Usage: A good way to get a feel for this dynamic in Change Characters is to picture the Stop character as having a chip on their shoulder and the Start character as having a hole in their heart. If the actions or decisions taken by the character are what make the problem worse, then they need to stop. If the problem worsens because the character fails to take certain "obvious" actions or decisions, then they need to start. Of course, to the character, neither of these problems is "obvious," as they must grow and learn to see it. Yet, the audience can empathize with the character's failure to see themselves as the source of the problem because the audience is afforded by the author another view the character does not get: the objective view. It is here that start and stop register with the audience as being obvious. Essentially, if you want to tell a story about someone who learns they have actually been making the problem worse, choose Stop. If you want to tell a story about someone who has allowed a problem to become worse, choose Start. For a Steadfast Main Character it will seem that their resolve needs to grow regardless of Start of Stop. But if they are a Start Character, they will be tempted by indications that the desired outcome is not going to happen or is unattainable. If they are a Stop Character, they will find themselves pressured to "give in." Remember that direction of growth in a Steadfast Character is largely seen in their environment. Their personal growth is seen as a matter of degree.

A Change story has a problem and its related solution. A Steadfast story has a Focus and Direction. By choosing Start or Stop, you tell the invention to shift the focus of the story to one over the other. This is accomplished by controlling the nature of the Character's concerns in relationship to the concerns of the Story and also by setting the relationship between theme and plot.

Approach: Do-er or Be-er?

Topic: In the attempt to solve problems, there are two places a Main Character might try to make progress: internally or externally. Some Main Characters prefer to take action first, and only try to adapt to the problem if action fails. We call this kind of Main Character a "Do-er." The other kind of Main Character prefers to work things out internally if they can, and only take action if deliberation fails. We call this kind of Main Character a "Be-er."

Background: By temperament, Main Characters (like each of us) have a preferential method of approaching problems. Some would rather adapt their environment to themselves, others would rather adapt themselves to their environment. There is nothing intrinsically right or wrong with either approach, yet it does affect how one will respond to problems. Choosing "Do-er" or "Be-er" does not prevent a Main Character from using either approach, but merely defines the way they are likely to first approach a problem, using the other method only if the first one fails.

Storytelling Usage: Do-er and Be-er should not be confused with active and passive. If a Do-er is seen as active physically, a Be-er should be seen as active mentally. While the Do-er jumps in an tackles the problem by physical maneuverings, the Be-er jumps in and tackles the problem with mental deliberations. The point is not which one is more motivated to hold their ground but how they try to hold it. A do-er would build a business by the sweat of their brow, a be-er would build a business by attention to the needs of their clients. Obviously both approaches are important, but Main Characters, just like the real people they represent, will have a preference. Having a preference does not mean being less able in the other area. A martial artist might choose to avoid conflict first as a be-er character, yet be quite capable of beating the tar out of an opponent if avoiding conflict proved impossible. Similarly, a school teacher might stress exercises and homework as a do-er character, yet open her heart to a student who needs moral support. When creating the Main Character, you may want someone who acts first and asks questions later, or you may prefer someone who avoids conflict if possible, then lays waste the opponent if they won't compromise. A do-er deals in competition, a be-er in collaboration.

Impact: The Main Character's affect on the story is both one of rearranging the dramatic potentials of the story, and also one of reordering the sequence of dramatic events. By choosing Do-er or Be-er you instruct the invention to establish one method as the Main Characters intent and the other as the result of her efforts.

Mental Sex: Male or Female?

Topic: Every Main Character has a Mental Sex. Even if the Main Character is physically sexless, such as a tree or a rock, It will possess a female or male mind. All minds evaluate their environments in terms of both space and time. A primary difference between male and female minds is which is evaluated first. This does not prevent either mind from looking at any issue from both perspectives, but does affect the order in which they are considered.

Background: Much of what we are as individuals is learned behavior. Yet the basic operating system of the mind is cast biologically before birth. Talents, intellectual capacity, instincts—all of these are not learned, but inherited. Among these traits are those specific to females and others specific to males. To be sure, we can go a long way toward balancing out those traits, yet that does not eliminate them nor diminish their impact. In dealing with the psychology of a Main Character, it is essential to understand upon which foundation their experience rests.

Storytelling Usage: A choice of male or female determines the manner in which the Main Character evaluates the problem, not the conclusions they come to. Typically, the choice is as simple as deciding if you want to tell a story about a man or a woman. But there is another consideration that is being employed with growing frequency in modern stories: putting the psyche of one sex into the skin of another. This does not refer only to the "sex change" comedies, but to action stories with female Main Characters (Ripley in "Alien") and decision stories with male Main Characters (Tom Wingo in "Prince of Tides").

Female or male does not in and of itself determine do-er or be-er nor action or decision. Rather, female or male describes an intrinsic perception of the meaning of life, a perception underlying the actual traits of the character. When an author writes a part for a man, they would intuitively create a male psyche for that character. Yet, by simply changing the name of the character from Joe to Mary and shifting the appropriate gender terms, the character would ostensibly become a woman. But that woman would not seem like a woman Even if all the specific masculine dialog were changed, even if all the culturally dictated manifestations were altered, the underlying psyche of the character would have a male bias, rather than a female bias.

Sometimes stereotypes are propagated by what an audience expects to see, which filters the message and dilutes the truth. By placing a female psyche in a male character or a male psyche in a female character, preconceptions no longer prevent the message from being heard. The word of warning is that this technique can make a Main Character seem "odd" in some hard to define way to the audience. So although the message may fare better, empathy between the audience and the Main Character may not.

Impact: All minds evaluate in terms of arrangement and in terms of sequence. By selecting female or male, you instruct the invention to order the arrangement and sequence of the Main Character's evaluations in an appropriate relationship.

PLOT DYNAMICS

Work: Action or Decision?

Topic: A story might lean toward action or focus on deliberation (decision). This is independent of the nature of the Main Character. For example, in an action story, the Main Character may be more of a deliberator than a person of action. Therefore, it is important for an author to separate the nature of the Main Character from that of the story as a whole.

Background: Action or Decision describes how the story is driven forward. The question is: Do Actions precipitate Decisions or vice versa? At the end of a story there will be an essential need for an action to be taken and a decision to be made. However, one of them will be the roadblock that must be removed first in order to enable the other. This causal relationship is felt throughout the story where either actions would never happen on their own, except that decisions keep forcing them, or decisions would never be made except that actions leave no other choice than to decide.

Storytelling Usage: Stories contain both action and decision. Choosing one does not exclude the other. Rather it merely gives preference to one over the other. This preference can be enhanced or nearly balanced out by other dynamic questions you answer about the story. It's really a matter of the background against which you want the Main Character to operate. The choice of background does not have to reflect the nature of the Main Character. In fact, some very interesting dramatic potentials can be created when they do not match. For example, a Main Character of action (called a Do-er) forced by circumstance to handle a deliberation-type problem would find themselves at a loss for the experience and tools they need to do the job. Similarly, a deliberating Main Character (called a Be-er) would find themselves whipped into a turmoil if forced to resolve a problem requiring action. These mixed stories appear everywhere from tragedy to comedy and can add an extra dimension to an otherwise one sided argument.

Impact: Do Actions precipitate Decisions, or do Decisions precipitate Actions. Since a story has both, it is really a question of which came first: chicken or egg? By selecting one over the other, you instruct the invention to establish a causal order between dynamic movements in the Action line and the Decision line.

Limit: Timelock or Optionlock?

Topic: Every story would go on forever unless the Main Character reached a point where they are forced by circumstance to make a decision to change or remain steadfast in a "leap of faith." To reach this point, the Main Character must "run out of something." In a Timelock, the Main Character runs out of time. In an Optionlock, the Main Character runs out of options.

Background: No one can be sure of the future, including Main Characters. One of the functions of a story is to give the audience the value of experiences they have not had themselves by living through the Main Character. As such, the audience would have to take the story's message on faith to make use of it. To help with this, the Main Character must also make their decision based on faith. They decide and hope for the best, and we learn from their accomplishments or disappointments. Yet, even a Main Character would not jump into the void and commit to a course of action or decision unless forced into it. To force the Main Character to decide, the story provides all the necessary information to make an educated guess while progressively closing in on the Main Character until they have no alternative but to choose. This closing in can be accomplished in either of two ways. Either they run out of places to look for the solution or they run out of time to work one out. Running out of options is accomplished by an Optionlock. A deadline is accomplished by a Timelock. Both of these means of limiting the story and forcing the Main Character to decide are felt from early on in the story and get stronger until the moment of truth. Optionlocks need not be claustrophobic so much as they only provide limited pieces with which to solve the problem. Timelocks need not be hurried so much as limiting the interval during which something can happen.

Storytelling Usage: Choosing a Timelock or an Optionlock has a tremendous impact on the nature of the tension the audience will feel as the story progresses toward its climax. A timelock tends to take a single point of view and slowly fragment it until many things are going on at once. An optionlock tends to take many pieces of the puzzle and bring them all together at the end. So a timelock raises tension by dividing attention, and an optionlock raises tension by focusing it. Timelocks increase tension by bringing a single thing closer to being an immediate problem, optionlocks increase tension by building a single thing that becomes a functioning problem.

One cannot look just to the climax to determine if a Timelock or Optionlock is working. Indeed, both Time and Option locks work from the beginning of the story. A better way to gauge which is at work is to look at the nature of the obstacles thrown in the path of the Protagonist or Main Character. If the obstacles are primarily delays, a timelock is in effect if the obstacles are caused by missing essential parts, an optionlock is in effect. An author may feel more comfortable building tension by delays or building tension by missing pieces. Choose the kind of lock most meaningful for you.

Impact: A dramatic structure has both spatial and temporal frameworks adjusting themselves in arrangement or sequence appropriate to the author's message during the course of the story. Consistently throughout the story either a change in arrangement will force a change in sequence or a change in sequence will force a change in arrangement of dramatic potentials. Which one causes the other is controlled by the choice of Timelock or Optionlock.

Outcome: Success or Failure?

Topic: Success or Failure is determined by whether or not the Objective Characters achieve their original purpose in regard to the story problem.

Background: Although it can be tempered by degree, Success or Failure is easily determined by seeing if the Objective Characters have achieved what they set out to achieve at the beginning of the story. Certainly, they may learn that they really don't want what they thought they did and in the end not go for it. Even though they have grown, this is considered a failure—they did not achieve what they originally intended. Similarly, the Objective Characters may actually achieve what they wanted, and even though they find it unfulfilling or unsatisfying, it must be said they succeeded. The point here is not to pass a value judgment on the worth of their success or failure, but simply to determine if they actually did succeed or fail to achieve what they set out to achieve at the beginning of the story.

Storytelling Usage: For certain stories, it may be desired to have a very positive feel to the outcome by having success matched with a positive judgment of that success. Other times, it may be desired to have a very negative feel to the outcome by matching failure with a negative judgment of that failure. In the first case, we create a "feel good" story, as they say in the ads. In the second, we create a tragedy. But all stories do not fall at one pole or the other. Frequently, authors choose to have "bad" characters succeed, and show the regrettable result of that success, or to have "good" characters fail, but show how that failure was really positive for them or others. When deciding if you want Character to succeed, think not only of the stories where the winner takes all, but of those stories where a valiant effort fails, yet the Characters learn an important lesson about life. When deciding if you want the Characters to fail, think not only of someone getting their just deserts, but of those stories where a misguided success leads to a result opposite what the Characters had hoped to achieve by the success.

In short, either success or failure can be seen as an "upper" or a "downer" by the audience, and the approach you take to the message should consider that.

Impact: Achieving something requires accomplishing the right steps in the right order to get from where the Characters start to where they want to be. When you choose success or failure, the invention alters the kind of steps the Character will need to take, and determines the appropriate order to bring them to the desired outcome.

Judgment: Good or Bad?

Topic: Even though the effort to achieve the story's goal may result in success, this is not necessarily a good thing for the Main Character. In fact, success might be obtained in the objective story even though the Main Character fails to resolve their personal problems. Similarly, the effort to achieve the story goal might end in failure, yet the Main Character ends up overcoming their personal problems. Just as Success and Failure evaluate the positive or negative nature of the objective story's outcome, Good and Bad indicate whether or not the Main Character resolves their personal problems.

Background: The notion that the good guys win and the bad guys lose is not always true. In stories, as in life, we often see very bad people doing very well for themselves (if not for others). And even more often, we see very good people striking out. If we only judged things by success and failure, it wouldn't matter if the outcome was good or bad, as long as it was accomplished. The choice of Good or Bad, places the author's moralistic judgment on the value of the Main Character's success or failure in resolving their personal problems. It is an opportunity not only to address good guys that win and bad guys that fail, as well as good guys that fail and the bad guys that win, but to comment on the success or failure of their growth as human beings.

Storytelling Usage: The rational argument of a story deals with practicality: does the kind of approach taken lead to success or failure in the endeavor. In contrast, the passionate argument of a story deals with fulfillment: does the Main Character find peace at the end of their journey? If you want an "upper" story, you will want success in the objective story and a judgment of "good" in the objective story. If you want a tragedy, you will want the objective effort to fail, and the subjective journey to end badly as well. However, life is often made of trade-offs, compromises, sacrifices, and re-evaluations, and so should be stories. Choosing Success/Bad stories or Failure/Good stories opens the door to all these alternatives. If we choose a Failure/Good story, we can imagine a Main Character who realizes they had been fooled into trying to achieve a goal, or a Main Character who discovers something more important to them personally in the course of trying to achieve the goal. A Success/Bad story might end with a Main Character achieving their dreams only to find they are meaningless, or Main Character who makes a sacrifice for the success of others but ends up bitter and vindictive.

Impact: Because success & failure are measurements of how well specific requirements have been met, they are by nature Objective. In contrast, Good and Bad are Subjective value judgments based on an appreciation of the Main Character's peace and fulfillment. When you select Good or Bad, the invention adjusts the "phasing" between the Objective and Subjective storylines to create an interference pattern that support the appropriate value judgment.

THE OBJECTIVE STORY

Objective Story Domains: Which Class?

Topic: Every story is built around the difficulties created by something that is out of balance. There are four broad areas that define the "classes" of inequities that can occur. These are described by the four Domains.

Background: An author cannot successfully make an argument promoting a solution until she has identified the problem. In stories, problems can be identified as falling into four broad categories: Situations, Activities, States of Mind, and Manners of Thinking. These categories are named by the four Domains, Universe (a situation), Physics (an activity), Mind (a state of mind) and Psychology (a manner of thinking). Universe represents an External State, Physics an External Process. Mind is an Internal State and Psychology an Internal Process. Since they are related, all four of these Domains will figure in every story as the problem works its influence into all areas of consideration. However, only one Domain will ultimately prove to be both the source of the problem's roots and therefore the place it must ultimately be solved.

Storytelling Usage: By choosing the Domain, the author sets the background against which the story will be told. Therefore, its influence is gently felt throughout the story. A Universe story deals with an unacceptable situation—one in which the external environment is seen as problematic. This could be a job situation with poor working conditions, being trapped in a sunken ship, waking up as someone else, living next to an orphanage that keeps you awake at night with its screaming waifs or any other intolerable state of affairs. A Physics story employs an activity that needs to arrive at a solution. This might be the effort to steal the crown Jewels, win the love of the heart's desire, make the Olympic team, or raise the money to buy the orphanage and evict all the screaming waifs. Note that if the existence of the orphanage is the focus of the story, it is a Universe (situation) Domain. However, if the effort to buy it is the focus, it is a Physics (activity) Domain. In a like manner, Mind Domain reflects a state of mind and Psychology Domain describes a mental activity (or manner of thinking). Mind Domain stories might be about prejudice, a lack of self-worth (if it is a fixed view), or a refusal to see the value of someone's desires. Psychology Domain supports stories where one takes too many risks, is egocentric, or makes light of serious situations.

As a final note, it is important to keep in mind that stories are often not about a problem that exists but a desire to be fulfilled. Stories of this nature can create a much more positive feel as exemplified in a Universe story in which an heiress must spend a million dollars in 24 hours to inherit 30 million more, a Physics story where a mountaineer hopes to be the first to scale a mountain on Mars, a Mind story of unconditional love, or a Psychology story about overcoming a dependence on sedatives.

Impact: The choice of Domain narrows the playing field of a story. Without actually putting up walls, choosing a Domain shifts the focus of audience attention by establishing the center around which broad scale dynamics will revolve. The invention engine is calibrated to this center.

Objective Story Concerns: Which Type?

Topic: The story's concern describes the area in which the effects of the problem are principally felt. By defining the nature of what must be "fixed," the concern represents the goal or purpose sought in the story.

Background: Problems can manifest themselves in several ways. Therefore, simply defining the nature of a problem does not necessarily predict its effect. For example, if the problem is not enough money to pay the rent, it might motivate one person to take to drink but another to take a second job. The effects of a problem are not necessarily bad things, but simply things that would not have happened quite that way without the existence of the problem. So it is with Concerns. The choice of Concern determines the principal area affected by the story's problem and serves as a broad indicator of what the story is about.

Storytelling Usage: The Concern of a story tends to revolve around a definable area of activity or exploration.

This central hub may be internal such as Memory or Conceiving (coming up with an idea). Or, it may be external such as Obtaining or Progress. When choosing a Concern it is often useful to ask, "Which of these items is what I want the characters in my story to examine?" Keep in mind that the Concern only describes WHAT is being looked at. HOW to look at it is determined by choosing the Range. Impact: The choice of Concern sets limits on how much dramatic ground the Theme can potentially encompass and therefore includes some kinds of considerations and excludes others.

Objective Story Ranges: Which Variation?

Topic: An author must not only choose the nature of the problem in her story, but also in what light she wishes to present it. The choice of Range determines the yardstick by which the audience will be urged to measure the problem.

Background: In stories, it is not only important what you wish the audience to look at but also in what light you want them to see it. The point of view from which the audience evaluates the meaning of the story is crucial to supporting the conclusion to a given argument. Range helps select a filter through which the author can control the shading of the events that unfold. In a sense, Range provides the audience with a yardstick and tells them, "measure what you see to this scale."

Storytelling Usage: For any given issue there can be many points of view. To make a successful argument an author must address them all, yet select one as the standard perspective. If an author wishes to explore a concept rather than argue it, she must still touch all perspectives and select one as the view from which all the others are measured. If this yardstick is not provided, the audience is free to judge anything from any point of view and will simply adopt the one they are familiar with out of habit. As a result, they will gain no new understanding and the story will have no purpose other than to reiterate what the audience already knew. Conversely, if an author wishes to make a point or deliver a message or even document the similarities and differences between dramatic incidents, then the events of the story must be measured against something. Choosing the Range tells an audience by what standard the author intends them to evaluate what they experience in the story.

Impact: By placing the story's problem in context, the choice of Range determines the thematic progression that supports that desired point of view on the events in the story.

Objective Story Problem: Which Element?

Topic: At the heart of every story is an item that is out of balance with its surroundings. Choosing the story's Problem defines the nature of that imbalance.

Background: When everything in a potential story is in harmony, there is no conflict, no message, no progression. It is like a deck of cards sitting solidly on a table. However, if we use that deck to build a house of cards, we have created potential. No matter how well we construct it, gravity is always waiting to pull it down beginning at the first weak point that occurs. The invention Engine is like the deck of cards. When we answer the first eight Essential Questions, we build a card house of dramatics. Still, it is balanced, although potential exists. The choice of Domain, Concern and Range establish weaknesses in the structure. The choice of Problem picks the card that starts to buckle threatening to bring the whole house down.

Storytelling Usage: Problems are at the heart of a story's troubles. Sometimes a problem is shown as the central cause of a number of troubles. Other times problems are shown as the imbalance that triggers a domino effect. If a number of seemingly unrelated items all go sour, the common connection will turn out to be the problem. If a chain of events results in disaster, the problem can be seen as the force that started it all. When telling a story, an author has a choice of focusing on the problem or its effects. In the first case, where the problem is at the center of troubles, the storytelling might begin with the problem and then show how its ripples impact everything they touch as they grow around it. Conversely, the storytelling might first explore the seemingly unrelated troubles, slowly spiraling in on the source, which is only discovered at the end. In a more linear story, an author might begin with the problem and follow its impact step by step to its ultimate effect. Or, working backwards, the author might begin at the effect, and trace its roots back until the original problem is identified.

Impact: Once the story's problem is chosen, the invention Engine arranges all the other dramatic choices the author has made around the problem so the story's dynamics are both dependent upon it, and derivative of it.

Objective Story Goal: Which Type?

Topic: Traditionally, Goal has been seen as the specific item the characters in a story are hoping to achieve. The invention is more interested in the kind of goal than the goal itself. Choosing the Objective Story Goal determines the Purpose to which the characters aspire, rather than the particular achievement they hope will meet that Purpose.

Background: Some stories have a single item everyone in the story is trying to achieve, such as obtaining a priceless diamond. Other stories have the characters all seeking different goals, but of the same type, such as becoming content in their various intimate relationships. In the first example, the invention Goal would be Obtaining. In the second example, the invention Goal would be Becoming. In both cases, everyone is concerned with the same Purpose to which they aspire, even though they are all after the same diamond but are involved in different relationships. This allows an author to explore the different approaches that can be taken in the effort to arrive at the same purpose and argue the point that some are appropriate and others are not.

Storytelling Usage: Some stories have a single item everyone in the story is trying to achieve, such as obtaining a priceless diamond. Other stories have the characters all seeking different goals, but of the same type, such as becoming content in their various intimate relationships. In the first example, the invention Goal would be Obtaining. In the second example, the invention Goal would be Becoming. In both cases, everyone is concerned with the same Purpose to which they aspire, even though they are all after the same diamond but are involved in different relationships. This allows an author to explore the different approaches that can be taken in the effort to arrive at the same purpose and argue the point that some are appropriate and others are not.

Impact: The Choice of Goal picks a focal point in the plot around which the order and nature of events must revolve. The invention engine applies the story's dynamics to this focal point in order to determine an appropriate Consequence should the Goal fail to be achieved, appropriate Requirements necessary to achieve the Goal and a number of other related dramatic Appreciations.

Objective Story Dividend: Which Type?

Topic: On the path toward achieving the goal, unexpected items or perks are collected that make the effort itself worthwhile, independent of the Goal.

Background: Each obstacle that is overcome on the way toward the Goal illustrates another aspect of the problem and the "proper" or "improper" means of solving it. However, the Costs incurred in the endeavor would quickly deplete the characters' resolve to the point that the Goal was no longer worth the effort. To motivate the characters toward the goal, the Costs must be balanced by Dividends that either undo the negative effects of the Costs or have benefits elsewhere that make the price acceptable.

Storytelling Usage: Renegades trying to escape to the Badlands may come across a farmer's daughter to rape. Joan of Arc, on her way to be burned at the stake may see the clouds part and rays of sunshine beckon to her. Depending upon the characters and their Goal, certain items, events or experiences will occur that make the journey more worthwhile. If it were not for these Dividends the arduous endeavor would become too Costly to warrant continuing. Characters do not simply add up the Costs, but they average them with the Dividends to determine the overall propriety in continuing on their quest. Dividends do not need to be tangible, but may be personally fulfilling such as visiting a foreign city, helping a child to read or the opportunity to get the personal dossiers of co-employees one is romantically interested in. If we look at the effort to achieve the goal as going to work to get a paycheck, then the Costs of having to live by the rules under someone else's authority might be balanced out by the personal friendships one has established. Then it comes back to a choice between staying on and achieving the Goal of a paycheck or quitting and facing the Consequence of a foreclosure. That is the purpose of Dividends: to balance out the Costs so that it all comes back to a decision regarding the Goal vs. the Consequence.

Impact: Choosing the Dividend determines the category of benefit that the characters will accrue on the way toward the Goal. Dividend helps to select comparable Costs and limits the choices of appropriate Goal and Consequence.

Objective Story Cost: Which Type?

Topic: During the attempt to achieve the story's Goal there is a price that must be paid. Cost determines the nature of the negatives attached to the effort.

Background: There's no such thing as a free lunch. There's also no such thing as achieving a Goal without paying a price. Every Goal is separated from instant achievement by a number of obstacles. If it were not so, a story would end as soon as it began. For each obstacle that must be overcome, effort must be expended. This results in a net loss to the character, who hopes to more than justify the expense by achieving the Goal. The kind of Cost incurred in a given story depends upon the nature of the Goal and the Requirements for its achievement.

Storytelling Usage: Cost describes the area in which negative impact is felt as a result of the effort to overcome obstacles on the way to the Goal. This is not unlike a Role Playing game where the Warrior loses "life points" or expends "magic" as she does battle with the evil elves. Fighting demons takes its toll, and so does trying to get an "A" in math. Whatever the Goal, there are certain steps that must be taken or obstacles that must be surmounted. Each effort made will deplete the reserves of the character or negatively impact the character in obscure ways that make them question the worth of continuing on the journey. This is as true of the effort to save a marriage as it is of the struggle to blow up the Orange Claw's munitions dump. The toll adds up, the cost begins to come close to outweighing the benefits of achieving the Goal. In fact, it may even appear prudent to cut one's losses and accept the Consequences, rather than continue to throw good effort after bad. This is how the tension builds that makes a Main Character's leap of faith so powerful. At the moment of climax, the Cost balances out the Goal and there is no clear right or wrong of it. It's just a throw of the dice for the character as to whether it's better to hold on to the end or toss in the towel. Some stories slowly build the Cost so that it reaches that balance gradually. This makes the character feel as if the weight dragging them back is slowing increasing until they are dead in the water. Other stories keep the costs low and balance it out right before the climax with one huge cost that must be paid all at once. Again, this is a matter of intensity and completely open to manipulation. However, the kind of Cost incurred is dependent upon Goal, Consequence, and Requirements, so that it might fully illustrate the debits against the Story Mind as it grapples with a particular nature of problem.

Impact: There is an attrition that will occur in all interactions in a story, even if they are minor events. A choice of Cost determines the nature of this drain, and therefore impacts both Plot and Theme as well.

Objective Story Consequence: Which Type?

Topic: The Consequence describes the negative aspects of a failure to achieve the Goal.

Background: Every Silver Lining has a cloud around it. The Silver Lining is the Goal, the cloud is the Consequence. There is no reason to strive for a Goal unless failure to achieve it has negative Consequences. Sometimes the Consequences are relatively minor, such as having to do extra chores or just the disappointment of not getting the ice cream. But, of course, Consequences can range all the way up to unthinkable horrors. The Intensity of the Consequence modulates the importance of the goal, but is completely arbitrary as long as the Consequence is appropriate to the Goal. Since they are both parts of the same Silver Lined Cloud, Goal and Consequence are intimately related to each other by story dynamics (even if the Silver Lining is on the outside and the Cloud is hiding in the middle).

Storytelling Usage: Often the Consequence is seen as something bad that will happen if the Goal is not achieved. However, it is just as functional to have a negative situation already existing that the characters hope to stop by achieving the Goal. In fact, if a villain is the Main Character, the Goal may be the negative item and the Consequence positive, as in "How The Grinch Stole Christmas." Goal, therefore does not have to be good and the Consequence does not have to be bad. Rather, Consequence is the alternative to what will happen if the Goal is not achieved. Goal, therefore is a state of things that does not yet exist. It is Purpose of the plot. It is what all the effort is trying to achieve. But WHY? Because of what will happen if it is not achieved: the Consequence. The wider the gap between the alternatives, the greater the dramatic tension. Still, intense dramatic tension is not always to be desired. In a story intended to be a playful romp, the discrepancy between Goal and Consequence might be intentionally kept to a minimum. This way, although there is not much to gain, there is also not much to lose and everyone is still friends at the end. In the opposite extreme, simply selecting death as a Consequence fails to describe how that relates to whatever the Goal is. What does that death mean? Is it a failure to Learn that resulted in death? A failure to truly Become something? In respect to Goal, the invention is concerned with the Purpose of the plot. In respect to Consequence, the invention is concerned with how the plot should be Evaluated. What does it mean to achieve the Goal? What does it mean to fail. This context is provided by the selection of Consequence.

Impact: The choice of Consequence helps select the appropriate category of Goal, Requirement, and Forewarning in the context of a story's dynamics.

THE MAIN CHARACTER

Identifying the Main Character

Topic: The Main Character is not necessarily the Protagonist of a story. While the Protagonist may be the prime mover of the Objective Story, the Main Character is the focus of the Subjective Story. Choosing the Main Character determines through whom the audience will experience the feel of the story.

Background: Every story provides the audience with an Objective view OF the struggle to resolve the story's problems and a Subjective view FROM INSIDE the struggle itself. The Objective view forms a dispassionate argument, where the audience observes and analyzes the effects of the characters' different approaches and motivations. It is this Objective view that speaks to the intellect. In contrast, the Subjective view speaks to the heart. It provides an audience with the experience of feeling the story as if it were happening to them. This view is provided through the eyes of the Main Character. Sometimes an author will assign the role of Main Character to a Protagonist, which creates the commonly understood "hero." However, it is just as appropriate to assign this most personal viewpoint to any other character is a story instead. In this manner, the intellect and the heart can take different view of the story's problem and even arrive at different conclusions. Bitter-sweet stories, child's-eye views, and stories of self-sacrifice are easily told when the Main Character stands near the side of the effort to achieve the goal, rather than right in the heart of the fray.

Storytelling Usage: A Protagonist is an objective archetype. This means that they play a role in the Objective (dispassionate) argument of the story and also that they represent a very specific arrangement of characteristics. Because they contain all the elements needed to build a fully functional character, archetypal Protagonists are an efficient way to illustrate the effect of the characteristics they represent. In fact, there are eight archetypes that represent a total of 64 different elements. However, archetypes are but one way to illustrate those qualities. The individual elements can be swapped between archetypes or spread among several. Archetypes can be broken up and reassembled. Characters can even be built from the ground up assembling the elements in many different arrangements.

All this goes on independently of who the Main Character is. The Main Character does not represent a function, but rather a point of view. It is through the Main Character's eyes that the audience experiences what it would be like if the story's problems happened to them. In real life we may be at the heart of the effort to resolve various problems, near the edge, or only peripherally involved in the effort, even though we are aware of and affected by it. It is the same with stories. By selecting any one of the objective characters (archetype or not) as the Main Character, you can select the angle from which the audience will experience the story at a personal level. And, if you really want, you can even make the Main Character the Protagonist!

Impact: Choosing a Main Character is perhaps the most important decision in storyforming. When you determine the angle from which the audience will experience the story, the invention winds up all the dramatic potentials around that axis. The Choice of Main Character affects all levels and natures of what will follow. Still, all we ask here is for their name. But before you answer, think about how the decision will effect the direction from which the audience will experience the story.

Main Character Domains: Which Class?

Topic: This choice determines the nature of what drives the Main Character. For example, they might be driven by an attitude they need to change or by a conviction they need to maintain. Either way, their drive has a source. There are four areas in which drive can be created. These are represented by the four Domains.

Background: Without drive, there is no force to propel the Main Character through the story. Just putting the character in a tough or unpleasant situation is not enough unless they have the motivation to do something about it. This internal drive is one of the focal points of a story's dynamics, and is therefore an important consideration. Choosing the Main Character Domain selects the overall nature of what is driving the Main Character. In the invention, there are four Domains in the Storyform: Universe, Mind, Physics and Psychology. A Universe Domain Main Character is one with a steady body state. We see this kind of character in "The Elephant Man," "My Left Foot," "Ghost" or "Dumbo." In the Mind Domain, the Main Character has a fixed attitude such as a prejudice or a refusal to accept something as in "Unforgiven," "Aladdin" and "A Christmas Carol." A Physics Domain Main Character is physically active, such as in "Rambo: First Blood," "Flashdance" or "Robin Hood." The Psychology Main Character struggles with a manner of thinking, as seen in "The Prince of Tides," "The World According to Garp" and "Howard's End."

Storytelling Usage: Because the Main Character stands at the root of both the Objective and Subjective problems, choosing the Main Character's Domain has a huge impact on the relationship between the two problems, and therefore on the feel of the story as a whole. Of the four Domains, Universe and Physics describe External problems whereas Mind and Psychology illustrate Internal problems. As a result, the Objective Story Domain and the Main Character Domain might be in the same general area or on opposite sides of the tracks. When both Domains are either Internal or External we say they are a Companion Pair. Stories with External Companion Domains tend to focus on action since the dissonance (conflict) created in the story is between an external state (Universe) and an external process (Physics). Similarly, stories with Internal Companion Domains tend to focus on deliberation since the dissonance is between an internal state (Mind) and an internal process (Psychology). In contrast, stories where one Domain is External and the other Internal strike more of a balance between action and deliberation. As a result of this division, the progress of the story depends on the shifting balance between Internal and External forces. This is why Internal/External pairings of Objective Story Domain and Main Character Domain are called Dependent Pairs. In Companion Pair stories, the Main Character is dealing with the issues on their own turf. In Dependent Pair stories, the Main Character is something of a fish out of water, trying to deal with difficulties they are not really equipped to handle, such as "Romancing the Stone" and "Three Men and a Baby." When choosing the Main Character Domain, keep in mind the choice for Objective Story Domain in order to create the feel you want in the story's dissonance.

Impact: The choice of Main Character Domain not only determines something about the Main Character's personal drive but in conjunction with the choice of Objective Story Domain and other Essential Questions creates patterns for the dissonance and conflict that will occur as the story progresses.

Main Character Ranges: Which Variation?

Topic: Judgmental appreciations made by the Main Character in the course of a story are described by their Range or Thematic Focus.

Background: Main Characters are not only concerned with problem solving or dealing with difficulties, but also have a point of view toward the world around them. This point of view is described by their Thematic Focus. Unlike the Objective Story Thematic Focus, the Main Character is not judging from the perspective of Universal Truth but as a discovery of Personal Truth.

Storytelling Usage: In order to make an Objective Thematic statement, the case for an inequity must be made consistently. However, this tends to create a heavy-handed message that is likely to appear one-sided and obvious. Fortunately, an opportunity exists to temper this message through the Main Character's Thematic Focus. In the midst of a battlefield our Main Character notices a single flower growing up through the rubble. At the frenetic High School dance, a girl sits all alone, unnoticed. How can she be unnoticed if we noticed her? Because "objectively" no one sees her—they are "all" concerned with dancing. But the Main Character looks across the room and observes the discrepancy. In both these cases, the Objective Theme is the initial condition which is then "shaded" in light of the Main Character's Theme. Conversely, the Main Character might be walking down the street, self-consciously trying to hide a zit on the tip of their nose, when they turn a corner just in time to see the "Burn Victim Support Group" marching in a parade. In this case, the Main Character's Theme is the initial condition, which is modulated by the Objective Theme. Because these kinds of contrasts and/or reinforcements offer such fertile material for storytelling, authors often employ these techniques in a random fashion, hoping to move the audience. Unfortunately, without a pattern to these counterpoints, after a while they begin to bog down a story since they do not truly advance it. By choosing the Main Character's Thematic Focus, one is able to select a central topic that serves to unify these Personal Truths into a bonded statement.

Impact: The choice of Main Character's Thematic Focus selects the central hub around which the Subjective Thematic progression will revolve. Other dynamics determine the direction and meaning of this progression, creating a map of Thematic Sequences that allow an author to make personal commentaries that support the overall message of a story.

Main Character Problem: Which Element?

Topic: This choice determines the nature of what is behind the Main Character's drive. For example, the Main Character might be driven to do or be something, but why? The Main Character's problem is not necessarily a bad thing. In fact, it is the source of their motivation and therefore represents the part of themselves that is dissatisfied with their lot.

Background: Without motivation—without a problem—there is no inequity that spurs the Main Character to better their lot. Sometimes it may seem that problems exist in our environment. Other times, we may perceive a problem with ourselves: the way we act or feel. In truth, problems really exist between ourselves and our environment as an inequity between the two. As example, we may hang on to our desires, even though it causes trouble around us. Conversely, a whole situation might be faltering because of one stubborn individual. These are really two ways of looking at the same inequity. One casts the problem in the environment, the other places it in the person. So when we look at the Main Character's Problem, we are really looking at the inequity of the story at large as it is reflected in the Main Character.

Storytelling Usage: The term Main Character's "problem" is something of a misnomer. Even though the problem is what is "wrong" with the Main Character according to the outside world, if the Main Character is actually correct in their motives and the world at large is mistaken, then this "problem" is what drives the Main Character to set things right. Of course, they might fail in the attempt, but their heart is in the right place. On the other hand, the Main Character might be mistaken, and their problem is just that: the source of all the story's difficulties. So, there are really two ways to look at the Main Character's problem. Which is right for the story? That is determined by the answers to two of the 12 Essential Questions: Success/Failure and Good/Bad. For the Success/Good and Failure/Bad combinations, the Main Character was on the right track, according to the author. In the first case, it paid off and that was good. In the second it didn't pay off and that was bad. The value judgment of Good/Bad tempers Success or Failure and in these two cases tells us that the Main Character's Problem was really best seen as the source of their drive to set things right. However, in the Success/Bad and Failure/Good stories, the author's message is that the Main Character was actually the cause of everyone's problems and therefore, what drove them was really the source of the inequity. In this case, the Main Character Problem really IS a problem, and needed to be solved. Whether it was or not is determined by Success/Failure. These examples illustrate how the meaning of Main Character Problem changes under different dynamic conditions. Therefore, when answering this question, it helps to know in what dynamic context you want the Main Character to be operating.

Impact: The choice of Main Character Problem selects the single point around which the web of the entire Subjective Story is woven.

Main Character Solution: Which Element?

Topic: This choice determines what is truly needed to satisfy the Main Character.

Background: For every Motivation there is a complementary element of Satisfaction that restores a sense of equity and contentment. The Main Character's Solution is this element. If the Main Character were to possess this Solution, their Motivation would wane and their drive disperse. In fact, this is what a Main Character hopes to achieve by the end of the story: a satisfaction that complements their original Motivation, solving their problem and allowing them to hang up their guns and go home.

Storytelling Usage: A Main Character's Problem may be the real source of a story's difficulties or may actually be just the source of the Main Character's drive to set things right. As a result, its complementary Solution might be just what the doctor ordered or an Achilles' heel that would satisfy the Main Character into letting the real problem lie. Do you see the Main Character as having the problem or solving the problem? If they have the problem, then arriving at the Main Character's solution is what the story is all about. But if they are solving the problem, the Main Character's Solution is the one thing they must avoid at all costs.

Impact: The choice of Main Character's Solution establishes a second "pole" in the dynamics that drive the Main Character, creating dramatic flow between the need that drives them and the quality that will quell that need.

Main Character Focus: Which Element?

Topic: A Main Character only deals directly with the story's problem at the climax. Until that point, they are wholly occupied dealing with the effects of the problem. The Main Character's Focus determines the nature of these effects.

Background: Problems are the source of a story's difficulties, but the difficulties themselves are where the attention is focused. In stories where the Main Character is really the culprit because of some character flaw, it takes them the whole story to stop battling all the effects of their destructiveness and realize all their troubles have a common thread. In stories where the Main Character is on the right track, their attention is distracted by all the immediate obstacles created by the problem. Only at the end climax have they cleared their way through the mine field enough to address the central issue. In both of these examples, the story's difficulties are where the Main Character's attention is drawn, which is described as the Main Character's Focus.

Storytelling Usage: Every disease has its symptoms. Story problems operate the same way. Depending upon the nature of the disease and what particular strain is in question, the symptoms may vary widely. In fact, symptoms may vary between individuals. When we choose Main Character Domain, we are saying something about the individual. When we choose Main Character Focus, we are directly selecting the symptoms. The kinds of things the Main Character talks about will center on their Focus. This topic will be at the forefront of their thoughts and actions. If left to their own devices, their conversation will always drift back toward this Focus, as it is their area of greatest attention. Quite simply, it is where the Main Character believes the problem to be. Now, in a Main Character who is actually the real problem themselves, they will not see it, though most everyone else may. How can they be so blind? Because they are focusing all of their attention elsewhere. They have a completely developed alternate explanation of what is behind the story's difficulties and feel that entertaining an alternative is a temptation to veer from the correct path. They aren't stupid, just preoccupied. In the case of a Main Character who is NOT the problem, but is trying to solve the problem, then the focus really IS where they ought to be looking, and veering from that course WOULD be a temptation that could lead to disaster. The key to having an audience accept a misguided Main Character's apparent refusal to see themselves as the cause of the troubles or a Main Character on the right track who never questions their own motivations, is to give them something else to Focus on.

Impact: Selecting Main Character's Focus determines the way in which the difficulties in a story will affect them.

Main Character Direction: Which Element?

Topic: Before a Main Character can address a story's problem directly, they must first get through the difficulties created by that problem. Main Character's Direction determines how the Main Character tries to approach the problem.

Background: Getting to the heart of the story's problem is much like negotiating a maze. The problem generates a myriad of difficulties that obscure its true nature and hinder any attempt to deal with it directly. The Main Character's Direction is something of a battle plan. It describes the tack by which the Main Character hopes to thwart the difficulties and arrive at the seat of the problem itself.

Storytelling Usage: When a Main Character is on the right track, they are headed in the right Direction. But when a Main Character is really the cause of a story's troubles, they are headed in the wrong Direction. The things that they do and the things that they consider are responses that all grow out of where they believe the real problem to be. They look at their troubles, then determine what they think is behind them. This becomes their Focus. Accepting this Focus as a given, the best Direction of their efforts becomes clear. So, when they are correct in identifying the problem, they hack away until it appear before them. But when they are incorrect, they may beat all round the issue and miss it entirely. As Focus suggests what a Main Character is likely to fixate on, so Direction determines how they are likely to respond.

Impact: Choosing the Main Character's Direction, sets the course for the kind of effort they will make in their quest for a solution to their troubles.

Main Character Unique Ability: Which Variation?

Topic: The attribute attached to the Main Character that makes them uniquely qualified to solve both the Objective and Subjective Problems is described by their Unique Ability.

Background: Every Main Character has a special strength, even if they are not aware of it themselves. Without such a strength, there would be no compelling reason why the story revolved around this particular character as Main instead of any other. With a Unique Ability, the Main Character becomes an essential participant in the story, as well as holding the ultimate key to resolving the story's difficulties.

Storytelling Usage: In order to make an Objective Thematic statement, the case for an inequity must be made consistently. However, this tends to create a heavy-handed message that is likely to appear one-sided and obvious. Fortunately, an opportunity exists to temper this message through the Main Character's Thematic Focus. In the midst of a battlefield our Main Character notices a single flower growing up through the rubble. At the frenetic High School dance, a girl sits all alone, unnoticed. How can she be unnoticed if we noticed her? Because "objectively" no one sees her—they are "all" concerned with dancing. But the Main Character looks across the room and observes the discrepancy. In both these cases, the Objective Theme is the initial condition which is then "shaded" in light of the Main Character's Theme. Conversely, the Main Character might be walking down the street, self-consciously trying to hide a zit on the tip of their nose, when they turn a corner just in time to see the "Burn Victim Support Group" marching in a parade. In this case, the Main Character's Theme is the initial condition, which is modulated by the Objective Theme. Because these kinds of contrasts and/or reinforcements offer such fertile material for storytelling, authors often employ these techniques in a random fashion, hoping to move the audience. Unfortunately, without a pattern to these counterpoints, after a while they begin to bog down a story since they do not truly advance it. By choosing the Main Character's Thematic Focus, one is able to select a central topic that serves to unify these Personal Truths into a bonded statement.

Impact: Main Character Unique Ability is related to both the story's Problem and the Thematic Focus. Once selected, it establishes a Range in which certain story dynamics may operate.

Main Character Critical Flaw: Which Variation?

Topic: A Main Character could employ their Unique Ability to resolve the story as soon as it began if it were not for a Critical Flaw that hamstrings its use.

Background: Like each of us, Main Characters have attributes that are assets and those that are detractors in our efforts to achieve our purposes. Part of resolving our difficulties is to learn to hold our negative attributes in check when they would be harmful. For Main Characters, a story concentrates on one essential Unique Ability that has the potential to resolve the story's difficulties and the Critical Flaw that prevents its effective employment.

Storytelling Usage: A Main Character's Critical Flaw might prevent them from using their Unique Ability or might come into play afterward, undercutting the effectiveness they had just achieved. This has a relationship to the Essential Question that describes the Main Character as needing to grow either by Starting something they haven't been doing or Stopping something they have. If the Critical Flaw prevents the employment of their Unique Ability, they must learn to Start employing their Unique Ability. If the Critical Flaw undoes the work of their Unique Ability, then they must Stop doing that! Either way, the Main Character must learn to overcome their Critical Flaw if they are to ultimately achieve their purpose. We are all familiar with stories where we find ourselves saying, "If you'd just take that step everything would be okay." This is a Start, story in conjunction with a Critical Flaw. The Main Character is inhibited from making the efforts we feel they should. And yet, as frustrating as this is, we accept it because the Critical Flaw has been established as a roadblock they cannot pass and must first grow enough to remove it. When a Main Character lacks a Critical Flaw there is no reason provided as to why they cannot act or decide and therefore they appear ignorant or stupid, leading us to proclaim, "Why didn't they just . . . ? It's so obvious!" In a Stop story, the Main Character's Critical Flaw scuttles their own efforts. In these stories we find ourselves thinking, "Okay, everything is going to work out . . . just don't mess it up . . . " That is where the Main Character gets the urge to sneeze and blows the window display over or stops to tie their shoe and trips someone into the wedding cake. Without a consistent Critical Flaw, all these mishaps would appear coincidental, rather than a direct result of the Main Character's need for growth. Each act, a Main Character is faced with an opportunity to resolve a story's difficulties in a single master stroke. It is the Critical Flaw caused by their own need for growth that inhibits or undercuts that effort until they grow enough to address the source of their drive in the Moment of Truth at the climax.

Impact: Choosing a Critical Flaw establishes detractors from the Main Character's efforts that are used to illustrate their personal growth.

Main Character

The Obstacle Character

Topic: When an audience looks through the eyes of the Main Character, they see the Obstacle Character standing squarely in their path. The Obstacle Character provides constant resistance to the direction the Main Character tries to take in the effort to resolve their personal problems.

Background: For every notion there is a Pro and a Con. For every plan there are those for it and against it. In the Objective Story these roles are filled by a Protagonist and Antagonist. In the Subjective Story they are filled by the Main and Obstacle Characters. In the Objective Story we watch a Protagonist do battle with an Antagonist as if we were bystanders observing a fight or an argument. But in the Subjective Story, we look through the eyes of the Main Character and see the Obstacle Character in our face. It is as if we had actually become one of the conflicting parties and were sizing up the opposition. Often, and author will elect to make a Protagonist also the Main Character. However, this does not have to be the case. The Main Character can be any of the objective characters, even if they are not central to the conflict of the story. This can provide an audience with all the different relationships to a various problems that we experience in real life. It also goes a long way to determining who would appear to be the biggest obstacle to our personal agenda, as the Main Character. Just as the Objective Story involves disagreements about the best way to achieve the goal, the Subjective Story involves disagreements about the best way to resolve the Main Character's personal problems. Sometimes, the Main Character is right in their approach and must simply develop the resolve to stick it out against the Obstacle Character's opposing opinions until the end. Other times, the Main Character is misguided and will only find personal fulfillment if the Obstacle Character can convince them of the error of their ways. In either case, the Obstacle Character might be a friend or a foe, as they themselves may or may not be misguided. The only sure thing is that whatever approach the Main Character takes, the Obstacle Character will be blocking it.

Storytelling Usage: Perhaps the most simple way to populate a story is to create the eight perfectly balanced archetypal characters. Two of these characters are the Protagonist and the Antagonist. The archetypal Protagonist is for the goal, the archetypal Antagonist is against it. Next, just assign the role of Main Character to the Protagonist and the role of Obstacle Character to the Antagonist. You have now created a story in which the audience sees through the eyes of the character who is the prime mover in the attempt to achieve the goal and the prime obstacle in the path to both achieving the goal and resolving their personal problems is the Obstacle Character/ Antagonist. Now that we've gotten THAT out of our systems, lets see how creative we can be. How about a story where the ANTAGONIST is the Main Character and the PROTAGONIST is the Obstacle? Suddenly we look through the eyes of the character opposed to the goal and we are trying to stop them from succeeding. In addition, this rather forward person is messing up our effort to arrive at personal fulfillment as well. Get more creative. How about a love triangle, where the Main Character is the Protagonist, the Obstacle Character is their spouse, and the Antagonist is their boss. Suddenly we see an Objective Story and s Subjective Story. In the Objective Story the Protagonist must work late or risk losing their job. In the Objective Story their spouse threatens to leave if they don't get more attention. One plays to the intellect, the other to the heart. One blocks the path to satisfaction, the other to fulfillment. Any objective character can be chosen to carry an additional banner as the Obstacle Character. By making the selection as to who that should be, you set up a lot of the dramatic framework that will determine the kinds of pressure and decisions the Main Character will face.

Impact: Selecting the Obstacle Character establishes a relationship between the Objective Story and the Subjective Story that will effect the side of the storyform that will be most exposed to the audience through the storytelling.

The following Table summarizes the appreciations used in the preferred embodiment of the invention.

| CHARACTER DYNAMICS APPRECIATIONS: | | |
|---|---|---|
| Change or Steadfast | | Which best describes what the Main Character decides? |
| Do-er or Be-er | | Which best describes the Main Character's approach? |
| Stop or Start | | Which best describes how the Main Character needs to grow? |
| Mental Sex | | What is the Main Character's Mental Sex? |
| PLOT DYNAMICS APPRECIATIONS: | | |
| Action or Decision | | Which best describes the feel of the story? |
| Timelock or Optionlock | | What is the type of limit that brings the story to a resolution ? |
| Success or Failure | | Which best describes how the efforts in the story resolve? |
| Good or Bad | | What is the story's outcome shown to be? |
| OBJECTIVE STORY APPRECIATIONS | | |
| Obj. Story Domain | C | Locate the domain in which the objective story takes place |
| Obj. Story Concern | T | Locate the area of concern in the objective story |
| Obj. Story Range | V | Locate the objective story's thematic focus |
| Obj. Story Problem | E | Locate the source of the objective story's problems |
| Obj. Story | E | Locate the solution to the objective story's problems |

-continued

| | | |
|---|---|---|
| Solution | | |
| Obj. Story Focus | E | Locate where attention is focused in the objective story |
| Obj. Story Direction | E | Locate the direction of efforts in the objective story |
| Obj. Story Catalyst | V | Locate the item that acts as the catalyst to move the objective story forward |
| Obj. Story Inhibitor | V | Locate the item that impedes the objective story's progress |
| Obj. Story Stipulation | T | Locate the Standard by which progress is measured in the Objective Story |
| ADDITION OBJECTIVE STORY APPRECIATIONS | | |
| Story Goal | T | Locate the common goal of the objective characters |
| Story Consequence | T | Locate the area that best describes the result of failing to achieve the goal |
| Story Costs | T | Locate the area that best describes the costs incurred while trying to achieve the goal |
| Story Dividends | T | Locate the area that best describes the dividends accrued while trying to achieve the goal |
| Story Requirements | T | Locate the area that best describes the requirements that must be met prior to achieving the goal |
| Story Prerequisites | T | Locate the area that best describes what is needed to meet the story requirements |
| Story Preconditions | T | Locate the area that best describes the conditions imposed on meeting the story's requirements |
| Story Forewarnings | T | Locate the area that best describes the imminent approach of the story consequences |
| SUBJECTIVE STORY APPRECIATIONS | | |
| Subj. Story Deomain | C | Locate the domain in which the subjective story takes place |
| Subj. Story Concern | T | Locate the area of concern between the Main Character and the Obstacle Character |
| Subj. Story Range | V | Locate the subjective story's thematic focus |
| Subj. Story Problem | E | Locate the source of the problems between the Main Character and the Obstacle Character |
| Subj. Story Solution | E | Locate the solution to the problems between the Main Character and the Obstacle Character |
| Subj. Story Focus | E | Locate where attention is focused in the subjective story |
| Subj. Story Direction | E | Locate the direction of efforts in the subjective story |
| Subj. Story Catalyst | V | Locate the item that acts as the catalyst to move the subjective story forward |
| Subj. Story Inhibitor | V | Locate the item that impedes the subjective story's progress |
| Subj. Story Stipulation | T | Locate the standard by which growth is measured in the Subjective Story |
| MAIN CHARACTER APPRECIATIONS | | |
| MC Domain | C | Locate the domain in which the Main Character operates |
| MC Concern | T | Locate the area of the Main Character's concern |
| MC Range | V | Locate the Main Character's thematic focus |
| MC Problem | E | Locate the source of the Main Character's problems |
| MC Solution | E | Locate the solution to the Main Character's problems |
| MC Focus | E | Locate where the Main Character's attention is focused |
| MC Direction | E | Locate the direction of the Main Character's efforts |
| MC Unique Ability | V | Locate the item that makes the Main Character uniquely able to achieve the goal |
| MC Critical Flaw | V | Locate the item that undermines the Main Character's efforts |
| MC Stipulation | T | Locate the standard by which the Main Character judges the degree of their concern |
| OBSTACLE CHARACTER APPRECIATIONS | | |
| OC Domain | C | Locate the domain in which the Obstacel Character operates |
| OC Concern | T | Locate the area of the Obstacle Character's concern |
| OC Range | V | Locate the Obstacle Character's thematic focus |
| OC Problem | E | Locate the source of the Obstacle Character's problems |
| OC Solution | E | Locate the solution to the Obstacle Character's problems |
| OC Focus | E | Locate where the Obstacle Character's attention is focused |
| OC Direction | E | Locate the direction of the Obstacle Character's efforts |

-continued

| | | |
|---|---|---|
| OC Unique Ability | V | Locate the item that makes the Obstacle Character uniquely able to thwart the Main Character |
| OC Critical Flaw | V | Locate the item that undermines the Obstacle Character's efforts |
| OC Stipulation | T | Locate the standard against which the Obstacle Character's concern is measured |

PARTNER RELATIONSHIPS

Each addressed object, whether it be a unit, quad, quad of quads, chess-set, or superset, has a number of associated "partners". As described above, certain relationships result in pairs, such as dynamic pairs, companion pairs, and dependent pairs. For each object in a pair, the other object that completes the pair is referred to as the partner. These partner relationships can be used to define the appreciations that comprise a storyform. In the preferred embodiment of the present invention, these partner relationships are implemented on a computer.

In a broad sense, an object can have three types of partners, a dynamic partner, a companion partner, and a dependent partner. In the preferred embodiment of the invention, each partner can be an independent partner, inverse partner, or correspondent partner.

UNIT PARTNERS

Dynamic Partners

1. Independent Dynamic Partner

The independent dynamic partner of a unit is the unit that is diagonal to the unit in the same quad. This is illustrated by reference to FIG. 9, which illustrates the element level of the Universe class. Referring first to unit 11110, the variation identified as "knowledge", the dynamic partner of this unit is diagonal to that unit in the same quad, namely "thought" at address 11140. The dynamic partner of "chaos" at address 11130 is "order" at address 11120. (For thought and chaos, the independent dynamic partners are knowledge and order, respectively).

2. Inverse Dynamic Partner

Figure 9:
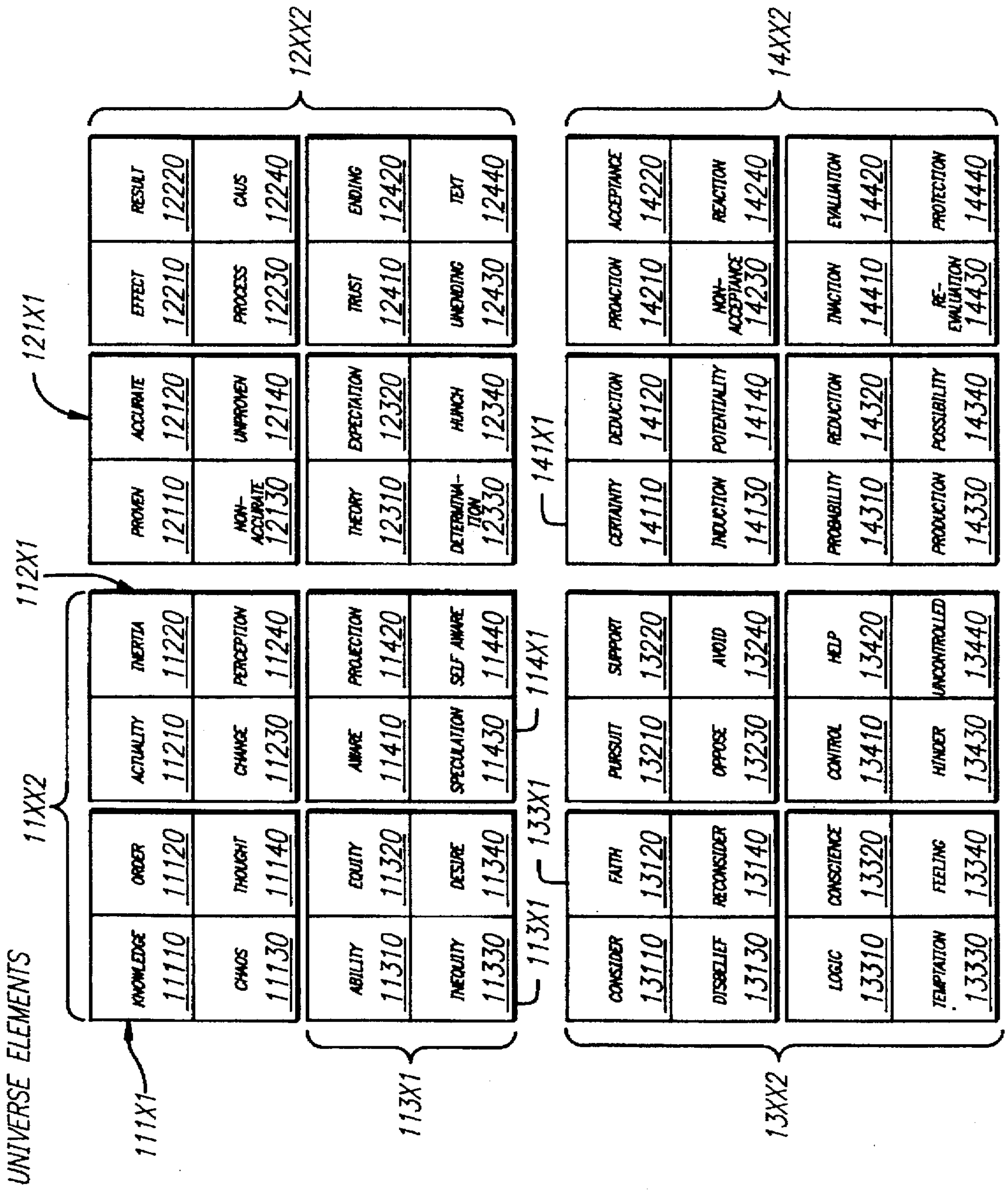
FIG. 9 illustrates the universe class element level of the quad structure of the present invention.

The inverse dynamic partner of a unit of interest is the unit that has the same position in a quad in the dynamic relationship to the quad that contains the unit of interest. Referring to FIG. 9, consider the unit knowledge at address 11110. The inverse dynamic partner of this unit is in the quad that is in a dynamic relationship to the quad containing knowledge. The quad containing the unit knowledge is the quad at address 111X1. The quad that is in dynamic relationship to this quad is the quad at address 114X1 (containing aware 11410, projection 11420, speculation 11430, and self aware 11440). The unit in the same position as knowledge 11110 is aware at address 11410.

Using this definition, the inverse dynamic partner of feeling at address 13340 is avoid at address 13240.

3. Correspondent Dynamic Partner

The correspondent dynamic partner of a unit of interest is the unit in the same position in the "set" that is in the dynamic relationship to the unit of interest. For example, consider the unit knowledge 11110. It is contained in the set identified by the address 11XX2. The set that has a dynamic relationship to that set is the set identified by address 14XX2. The unit in the same position in that set is "certainty" at address 14110 and thus is the correspondent dynamic partner of knowledge 11110.

Companion Partners

1. Independent Companion Partner

The independent companion partner of a unit is the unit that is horizontal to the unit in the same quad. Referring to unit 11110 of FIG. 9, the variation identified as "knowledge", the companion partner of this unit is horizontal to that unit in the same quad, namely "order" at address 11120. The companion partner of "chaos" at address 11130 is "thought" at address 11140.

2. Inverse Companion Partner

The inverse companion partner of a unit of interest is the unit that has the same position in a quad in the companion (horizontal) relationship to the quad that contains the unit of interest. Referring to FIG. 9, consider the unit knowledge at address 11110. The inverse companion partner of this unit is in the quad that is in a companion relationship to the quad containing knowledge. The quad containing the unit knowledge is the quad at address 111X1. The quad that is in companion relationship to this quad is the quad at address 112X1 (containing actuality 11210, inertia 11220, change 11230, and perception 11240). The unit in the same position as knowledge 11110 is "actuality" at address 11210.

Using this definition, the inverse companion partner of feeling at address 13340 is uncontrolled at address 13440.

3. Correspondent Companion Partner

The correspondent companion partner of a unit of interest is the unit in the same position in the "set" that is in the companion relationship to the unit of interest. For example, consider the unit knowledge 11110. It is contained in the set identified by the address 11XX2. The set that has a companion relationship to that set is the set identified by address 12XX2. The unit in the same position in that set is "proven" at address 12110 and thus is the correspondent companion partner of knowledge 11110.

Dependent Partner

1. Independent Dependent Partner

The independent dependent partner of a unit is the unit that is vertical to the unit in the same quad. Referring to unit 11110 of FIG. 9, the variation identified as "knowledge", the dependent partner of this unit is vertical to that unit in the same quad, namely "chaos" at address 11130. The dependent partner of "order" at address 11120 is "thought" at address 11140.

2. Inverse Dependent Partner

The inverse dependent partner of a unit of interest is the unit that has the same position in a quad in the dependent (vertical) relationship to the quad that contains the unit of interest. Referring to FIG. 9, consider the unit knowledge at address 11110. The inverse dependent partner of this unit is in the quad that is in a dependent relationship to the quad containing knowledge. The quad containing the unit knowledge is the quad at address 111X1. The quad that is in dependent relationship to this quad is the quad at address 113X1 (containing ability 11310, equity 11320, inequity 11330, and desire 11340). The unit in the same position as knowledge 11110 is "ability" at address 11310.

Using this definition, the inverse dependent partner of feeling at address 13340 is reconsider at address 13140.

3. Correspondent Dependent Partner

The correspondent dependent partner of a unit of interest is the unit in the same position in the "set" that is in the dependent relationship to the unit of interest. For example, consider the unit knowledge 11110. It is contained in the set identified by the address 11XX2. The set that has a dependent relationship to that set is the set identified by address 13XX2. The unit in the same position in that set is "consider" at address 13110 and thus is the correspondent dependent partner of knowledge 11110.

Complementary Partners

In the preferred embodiment, the present invention provides for a method of finding a partner of a unit at the element level in another class. This partner is referred to as the "complementary partner" of the unit at the element level. The complementary partner of a unit of interest occupies the same position as the unit of interest but in a class in the desired relationship (dynamic, companion, dependent) to the class containing the unit of interest.

QUAD PARTNERS

As noted previously, an address can refer to an object larger than a unit. Consider the quad identified by address 111X1, the quad in the upper left hand corner that includes units knowledge 11110, order 11120, chaos 11130, and thought 11140. The independent dynamic partner for this quad is diagonal in the same quad. In this case the quad is comprised of quads, so that the independent dynamic partner of quad 11X01 is the quad identified by address 114X1, consisting of aware 11410, projection 11420, speculation 11430, and self aware 11440.

The independent companion partner of quad 111X1 is quad 112X1. The independent dependent partner is quad 113X1.

The inverse dynamic partner of quad 111X1 is quad 141X1. The inverse companion partner is quad 121X1 and the inverse dependent partner is quad 133X1.

Figure 10:
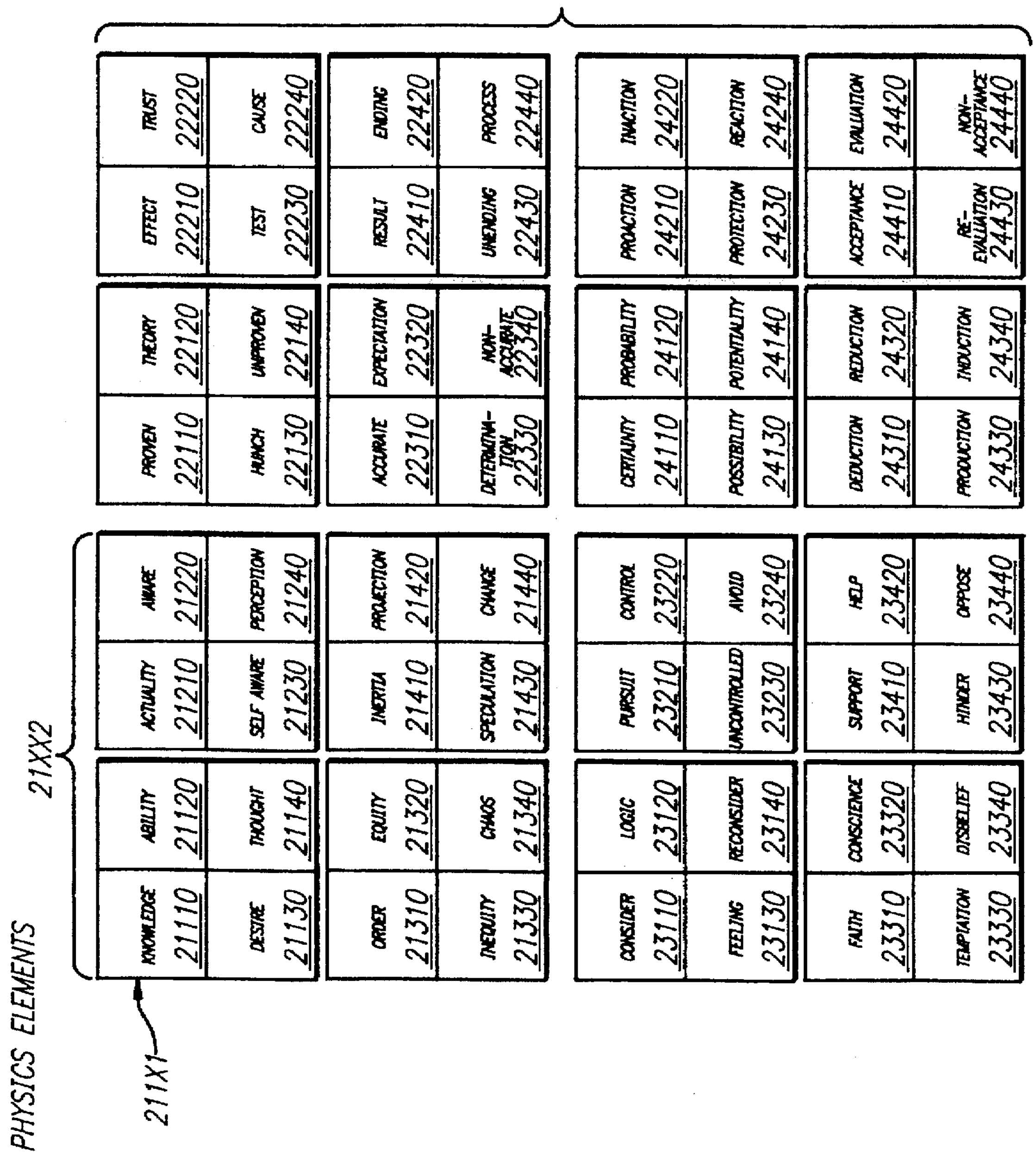
FIG. 10 illustrates the physics class element level of the quad structure of the present invention.
Figure 11:
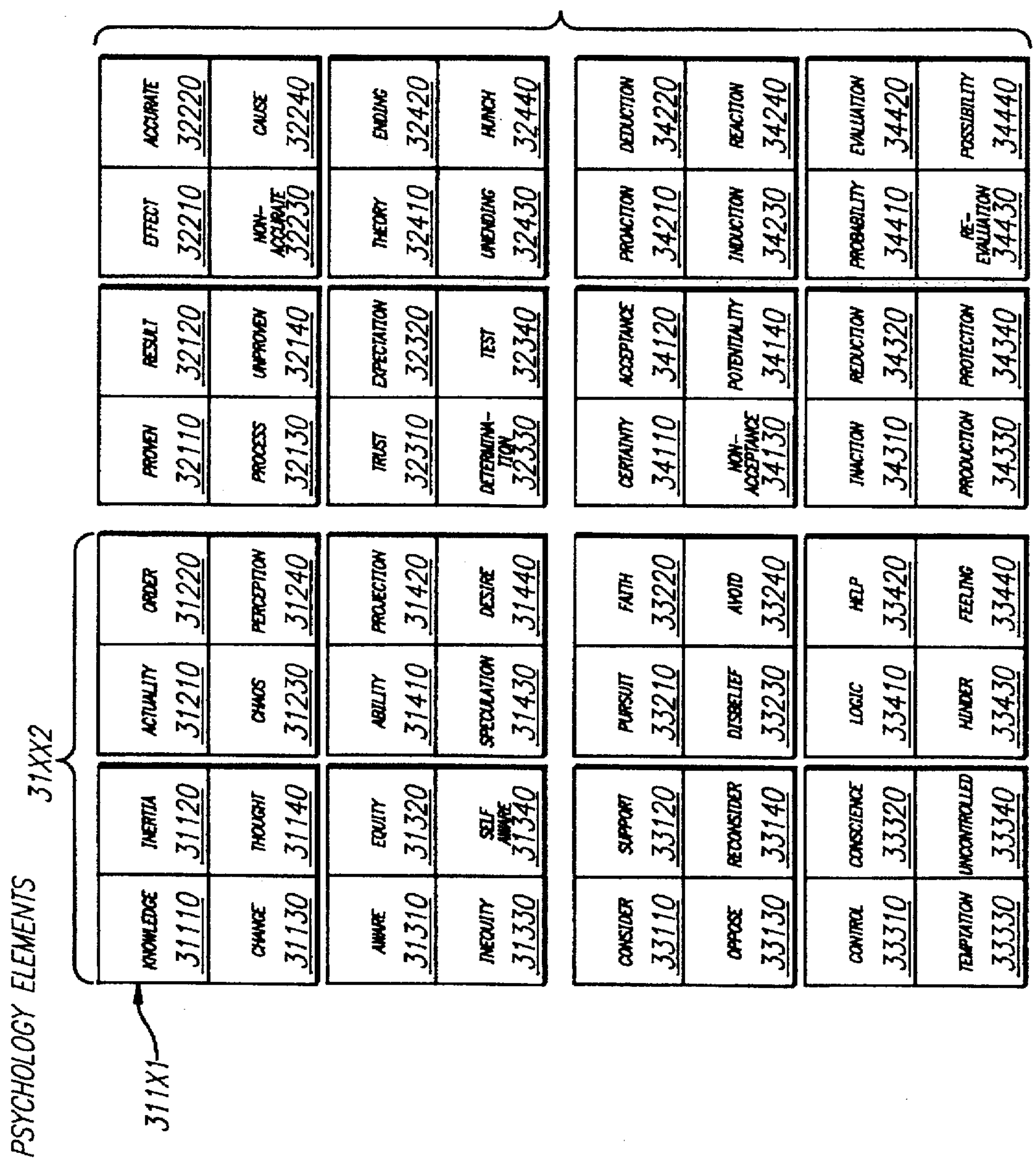
FIG. 11 illustrates the psychology class element level of the quad structure of the present invention.
Figure 12:
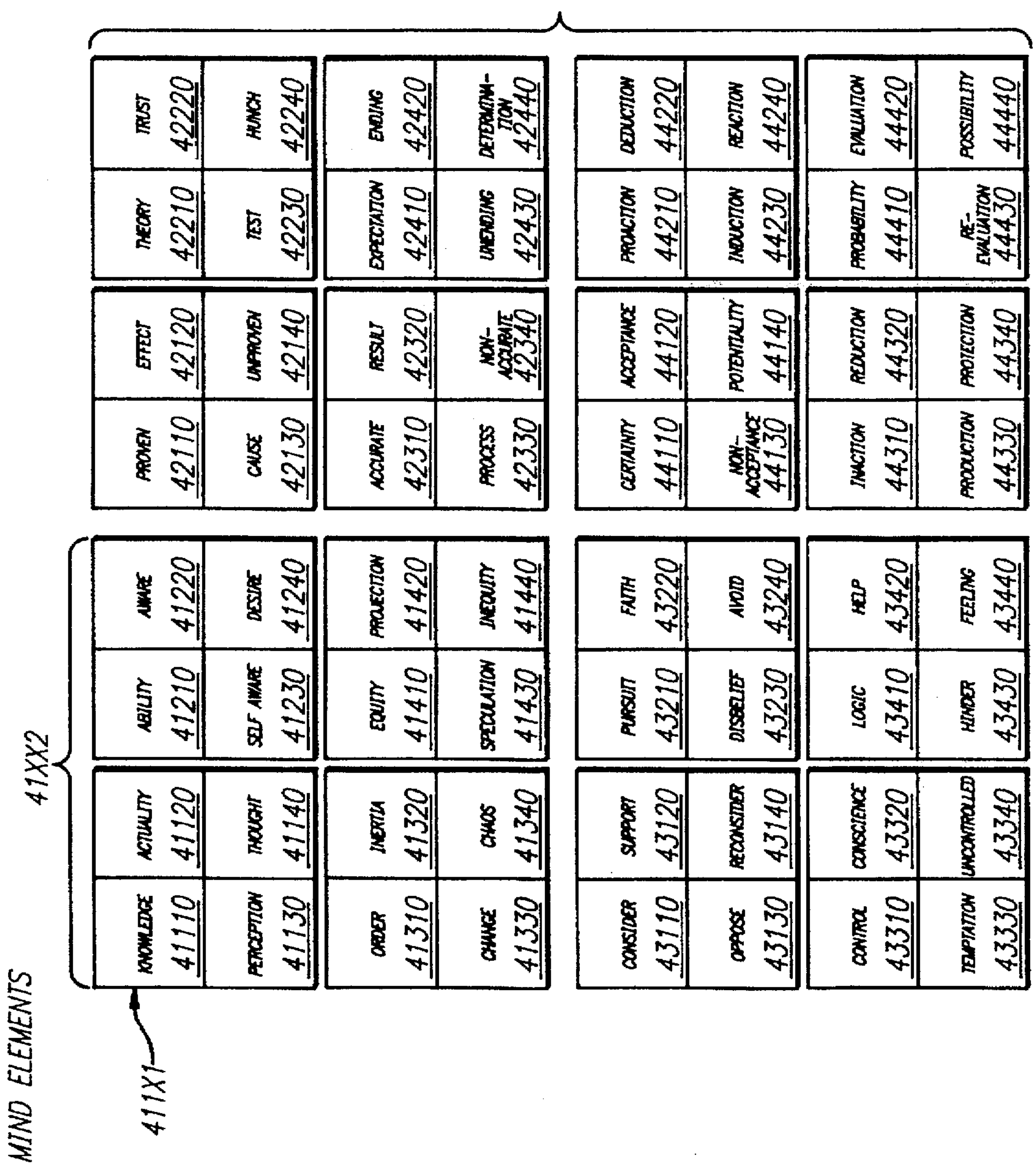
FIG. 12 illustrates the mind class element level of the quad structure of the present invention.

The correspondent dynamic partner of quad 111X1 is the corresponding quad in the set that is in the dynamic relationship to that quad of interest. Thus, the correspondent dynamic partner of quad 111X1 is quad 411X1 from the element level of the "mind" class (FIG. 12). The correspondent companion partner is quad 211X1 from the element level of the "physics class (FIG. 10). The correspondent dependent partner of quad 111X1 is quad 311X1 from the element level of the "psychology class" (FIG. 11).

SET PARTNERS

A set consists of sixteen units, i.e. a quad of quads. Consider the set at address 11XX2 of FIG. 9. The independent dynamic partner is set 14XX2. The independent companion partner is set 12XX2, and the independent dependent partner is set 13XX2.

The inverse and correspondent partners are the same for a set. Here, the inverse and correspondent dynamic partner of set 11XX2 is set 41XX2 of FIG. 12. The inverse and correspondent companion partner is set 21XX2 of FIG. 10, and the inverse and correspondent dependent partner is set 31XX2 of FIG. 11.

CHESS SET PARTNERS

The independent, inverse and correspondent partners for the chess set 1XXX3 (universe class elements, FIG. 9) are the same. The dynamic partner is the chess set 4XXX3 of FIG. 12, the companion partner is the chess set 2XXX3 of FIG. 10, and the dependent partner is the chess set 3XXX3 of FIG. 11.

SEMANTIC PARTNER

There is an additional relationship in the preferred embodiment that is unique to the element level. As noted, in each class the units are the same, but are rearranged in each class. The semantic partner of a unit at the element level is the unit that has the same semantic value and is in a class in the appropriate relationship. For example, the dynamic semantic partner of order 11120 of the universe class is order 41310 in the mind class. The companion semantic partner of order 11120 is order 21310 of the physics class. The dependent semantic partner of order 11120 is order 31220 in the psychology class.

The following is a table that describes the general partner relationships.

TABLE 1

| PARTNER RELATIONSHIPS: | |
|---|---|
| Dynamic Pair/Partner | Diagonal in same quad. |
| Companion Pair/ Partner | Horizontal in same quad. |
| Dependent Pair/ Partner | Vertical in same quad. |
| Inverse [Dynamic/ Companion/ Dependent] Partner | In a set, given a relationship and an address: the Inverse Partner will be in the item in the same position in the quad that has that relationship. |
| correspondent [Dynamic/ Companion/ Dependent] Partner | In a ChessSet, given a relationship and an address: the Correspondent Partner will be the unit in the same position in the set that has that relationship. [variations & elements only] |
| Semantic [Dynamic/ Companion/ Dependent] Partner | At the element level, the address of the unit that has the same semantic value at in the class with that relationship. |
| Complement [Dynamic/ Companion/ Dependent] Partner | At the element level, the address of the unit that has the same correspondent address in the class with that relationship. |

Calculating Partner Address

The present invention takes advantage of the addressing scheme to provide a method for calculating partner addresses for any give address. In the preferred embodiment, the following table is used:

TABLE 2

| | 1 | 2 | 3 | 4 |
|---|---|---|---|---|
| Dynamic | 4 | 3 | 2 | 1 |
| Companion | 2 | 1 | 4 | 3 |
| Dependent | 3 | 4 | 1 | 2 |

The table is used in conjunction with an algorithm for determining a partner object. The argument for the algorithm is an address, a dynamic resolution, and a relationship. The return is an address of the desired partner. The address is as described above. The dynamic resolution is one of independent, inverse, and correspondent. The relationship is dynamic, companion, and dependent.

The desired address, due to the addressing scheme of the present invention, will be the same as the source address except for one digit. The digit to be changed is identified by:

Addr2Change=level−dynamic res−ItemSize

Level is the level of the four level class structure of the preferred embodiment at which the address of interest resides. This can be determined by subtracting the number of zero digits in the first four positions from four. For example, in address 11102, the number of zero digits in the first four positions is 1. Subtracting this from 4 leaves 3. We would expect this address to be at the third (variation) level. Referring to FIG. 8, it is seen that address 11102 is the set of variations of the universe level and resides at level 3.

Alternatively, the level is determined by the number of non-zero digits in the first four positions. For example, given address 30001, the number of non-zero leading digits is one (the first digit is non-zero, followed by a zero in the second, third, and fourth positions). Thus, address 30001 is at the first level. Referring to FIG. 6, it can be seen that address 30001 is the quad at the class level. The class level is level 1. For address 12000, the number of non-zero leading digits is two. Referring to FIG. 7, address 12000 is unit "progress" at the type level, level 2.

The dynamic resolution is determined by which resolution of partner is to be found and is provided with the source address. In the preferred embodiment, the resolutions have the values independent (1), inverse (2), and correspondent (3).

The size is determined by the value in the last position of the source address and has a value of 0–3 in the preferred embodiment.

EXAMPLE 1 (Unit)

Find the inverse dynamic partner of address 11110. The level is 4 (element level, knowledge unit), the dynamic resolution is 2 (inverse), and the item size is 0. Thus, the digit to be changed is 4−2−0=2. The third digit is to be changed (note that the first digit is in the zero place, the second is in the first place, etc). To determine what the digit is to be changed to, refer to Table 2. Find the column that corresponds to the value of the source address digit at the location to be changed. In this case, the third digit has a value of 1. Look at the column of value 1 and go to the row that has the same dynamic relationship of interest, namely the row marked "dynamic". The value there is a "4". So the third digit in the source address is changed to a 4, leaving the new address as 11410. Referring to the example given above with respect to inverse dynamic partners of units, we already know that the inverse dynamic partner of knowledge at 11110 is "aware" at address 11410 (see FIG. 9).

Note that when implemented in C-code, tables are zero indexed, so that it may be necessary to subtract 1 from the value of the digit to be changed to find the correct index into the table.

EXAMPLE 2 (Quad)

Find the correspondent companion partner for the quad at address 12211. The level is 4 (4 minus no zero digits in the first four places). Referring to FIG. 9, the quad is the quad that contains effect 12210, result 12220, process 12230 and cause 12240. We expect the correspondent companion partner to be at 22211. The dynamic resolution is 3 and the item size is 1. The digit to be changed is thus 4−3−1=0. The zero-th digit is the first digit in the address (1 in the example). Referring to Table 2, the column for 1 is located and the value at the companion row is seen to be 2. Thus, the first digit is changed from a 1 to a 2, giving a partner address for this quad of 22211.

An example of a C-code implementation of the above algorithm is described below in Appendix A that includes files "RELATION.H" and "RELATION.CC".

RULES FOR IDENTIFYING AND PREDICTING APPRECIATIONS

The present invention provides algorithmic rules for indentifying and predicting appreciations. As the rules are applied, certain relationships become constrained, leading to the predictive capabilities of the invention.

A list of abreviations of appreciations is described below in Table 3:

TABLE 3

| | | | |
|---|---|---|---|
| C1 | Class for Act 1 | SCB | Steadfast Character Blind Side |
| C2 | Class for Act 2 | SCF | Steadfast Character Focus |
| C3 | Class for Act 3 | SE | Solution Element |
| C4 | Class for Act 4 | OSC | Objective Story Class |
| CF | Critical Flaw | OST | Objective Story Type (was OSGT) |
| SSC | Subjective Story Class | OSV | Objective Story Variation |
| SST1 | Subjective Story Type for Act 1 | OSVQ | Objective Story Variation Quad |
| SST2 | Subjective Story Type for Act 2 | OCC | Obstacle Character Class |
| SST3 | Subjective Story Type for Act 3 | UA | Unique Ability |
| SST4 | Subjective Story Type for Act 4 | CDP | CoDynamic Pair |
| SSVQ1 | Subjective Story Variation for Act 1 | CP | Companion Pair |
| SSVQ2 | Subjective Story Variation for Act 2 | DP | Dynamic Pair |
| SSVQ3 | Subjective Story Variation for Act 3 | DEP | Dependent Pair |
| SSVQ4 | Subjective Story Variation for Act 4 | EXAM | Character Evaluation Set |
| MCC | Main Character Class | MC | Main Character |
| DE | Direction Element | MET | Character Methodology Set |
| FE | Focus Element | MOT | Character Motivation Set |
| OBJ | Objective Characters | NEG | Negative Story |
| ORT | Objective Requirement Type | OC | Obstacle Character |
| OSF | Objective Story Focus | CC | Change Character |
| CCB | Change Character Blind Side | POS | Positive Story |
| CCF | Change Character focus | PUR | Character Purpose Set |
| PEQ | Problem Element Quad | SC | Steadfast Character |
| PE | Problem Element | | |

The following is a list of symbols representing functions that can be applied to units selected in the invention:

| | |
|---|---|
| + | Positively Charged Pair |
| – | Negatively Charged Pair |
| ↕ | Inverse |
| # | Address Value |
| ✤ | Dynamic Pair Orientation (or Charge) |
| ✖ | Co-Dynamic Pair |
| ✌ | Dynamic Partner |
| ☛ | Companion Partner |

-continued

| | |
|---|---|
| → | Correspondent |
| ☮ | Orientation (or Charge) of a pair within a quad |
| ★ | Relative Position (TKAD atomic value) within a quad |
| ▼ | Element Link (Class Dependent) |

The following expressions define the apreciations resulting from particular relationships.

| | | | |
|---|---|---|---|
| Given: In a neutral model (Z pattern) | C1 | ⇆ | ✌C4 |
| Given: In a neutral model (Z Pattern) | C2 | ⇆ | ✌C3 |
| Given: In a neutral model (Z Pattern) | SST1 | ⇆ | ✌SST4 |
| Given: In a neutral model (Z pattern) | SST2 | ⇆ | ✌SST3 |
| Definition | SSVQ Class # | ⇆ | SSC # (several implied by) |
| Given: In a neutral model (Z pattern) | SSVQ1 | ⇆ | ✌SSVQ4 |
| Given: In a neutral model (Z pattern) | SSVQ2 | ⇆ | ✌SSVQ3 |
| MCC is MC Class. When MCC is companion to SSC, it must be dependent to OSC (Objective Problem Class. Relationship of MCC to OSC is determined by the Combination of Do-er/Be-er and Start/Stop | MCC☛SSC | ⇆ | ☮✖MCC = ☮✤CCUA |
| This is the other possibility that can exist between the MC Class and the OSC. | MCC☛OSC | ⇆ | SSVQ3☛SSVQ4 |
| Another state that exists when the MC Class is companion to the OSC. | MCC☛OSC | ⇆ | ✤MCC = ✤CC UA |
| If Male Mental Sex: Definition | FE | ⇆ | ✌DE |
| If Male Mental Sex: | FE☛PE | ⇆ | MC Class☛OSC |
| If Male Mental Sex: Positive means "Stop" in the bias questions. | FE☛PE | ⇆ | POS |

-continued

| | | | |
|---|---|---|---|
| If Male Mental Sex: If Stop has been determined, then as above, FE must be companion to PE, which requires this other relationship to also exist. | FE☛PE | ⇆ | ➘PE = ➘OSC |
| Definition | MC Class | ⇆ | ✌OC Class |
| Negative means "Start" in the bias questions. If Start, then the MC Class will be the fourth act class. | NEG | ⇆ | C4 = MC Class |
| Start/Stop and Do-er Be-er determine position of MC to OSC and therefore SSC. This is just a restating of the Start part of that relationship, | NEG | ⇆ | MC Class☛SSC |
| Called by bias answer of "Start". | NEG | ⇆ | ☮ ✖MC UA = ☮ ➘MC |
| Called by bias answer of "Start" | NEG | ⇆ | ☮ ➘PE = ☮ ✖OSVQ |
| Given (that the objective characters are created in the elements of the OSC). | OBJ | ⇆ | OSC (Elements) |
| Given (relationship of the labelling or "meaning" of the Objective element sets to the Problem Class, MC Class and their partners). | ★OBJ EXAM | ⇆ | ★OCC |
| Same as above. | ★OBJ MET | ⇆ | ★SSC |
| Same as above. | ★OBJ MOT | ⇆ | ★MCC |
| Same as above. | ★OBJ PUR | ⇆ | ★OSC |
| Definition of the relationship of the Focus Dynamic pair to the PE dynamic pair. | OSF DP | ⇆ | ✖PE DP |
| Given | CC Class | ⇆ | ✌SC Class |
| Called by "Change" | CC = MC | ⇆ | ☮PE CP = ↕☮OSVQ CP |
| Same as above | CC = MC | ⇆ | SST2☛SST4 |
| Same as above | CC = MC | ⇆ | MC CF ✌MC UA |
| Same as above | CC = MC | ⇆ | OC CF ✌OC UA |
| Same as above | CC = MC | ⇆ | CC ORT = → SC ORT |
| Definition of the relationship of the CC blind side DP to the CC focus DP. | CCB DP | ⇆ | ✖CCF DP |
| Definition of Identity | PE Class # | ⇆ | OSC # |
| Definition of identity | PE Class # | ⇆ | ✌SSC # |
| Called by "Stop" | POS | ⇆ | C1 = MC Class |
| Called by "Stop" | POS | ⇆ | MC Class☛OSC |
| Called by "Stop" | POS | ⇆ | ➘MC UA = ➘MC Class |
| Called by "Stop" | POS | ⇆ | ➘PE = ➘OSVQ |
| Called by "Steadfast" | SC = MC | ⇆ | ☮PE CP = ☮OSVQ CP |
| Called by "Steadfast" | SC = MC | ⇆ | C2☛C1 |
| Called by "Steadfast" | SC = MC | ⇆ | OST3☛OST4 |
| Called by "Steadfast" | SC = MC | ⇆ | MC CF☛MC UA |
| Called by "Steadfast" | SC = MC | ⇆ | OC CF☛OC UA |
| Called by "Steadfast" | SC = MC | ⇆ | CC ORT = SC ORT |
| Given | SC ORT | ⇆ | ✌OST |
| Definition of relationship of SC focus DP to SC blind side DP. | SCF DP | ⇆ | ✖SCB DP |
| Given | SE | ⇆ | ✌PE |
| Semantic link between Problem class focus element and Sc focus element. | OSC ▼ OSF | ⇆ | OCC ▼ SCF |
| Semantic link between Problem Class problem element and CC problem element. | OSC ▼ PE | ⇆ | MCC ▼ CCB |
| Defined positional relationship. | OST | ⇆ | → SST4 |
| Definition of identity. | OST Class # | ⇆ | OSC # |
| Definition of identity. | OST Class # | ⇆ | ✌SST Class # |
| Defined positional relationship. | OSVQ | ⇆ | →SSVQ4 |
| Definition of identity | OSVQ Class # | ⇆ | OSC # |
| Definition of identity | OSVQ Class # | ⇆ | ✌SSVQ Class # |
| | OCC☛SSC | ⇆ | ☮ ✖OCC = ☮ ➘SC UA |
| | OCC☛SSC | ⇆ | SSVQ2☛SSVQ4 |

-continued

| | | |
|---|---|---|
| OCC☛OSC | ⇆ | ✤OCC = ✤SC UA |
| ✇CC Class # | ⇆ | ↕✇CC UA CP |
| ✇SC Class # | ⇆ | ✇SC UA CP |

The above rules determine which partner relationship is to be returned when a unit address is selected. By building appreciations based on the above, a storyform can be generated.

Constraints that arise as appreciations are established and dynamic relationships are selected determine other relationships. Choosing Do-er or Be-er determines which companion pair of classes in which the main character will be found. As a do-er, the main character will be in either Universe or Physics. As a be-er, the main character will be in either Mind or Psychology.

Choosing Stop or Start determines the relationship of the main character's class to that of the objective story class. In a stop story, the two classes will have a companion relationship. In a start story, the two classes will have a dependent relationship For example, consider a "do-er" and "stop" story. Do-er specifies that the main character class must be either Universe or Physics. Stop specifies that the objective story class must have a companion relationship to the main character class meaning that it must also be Universe or Physics. So, if Universe is selected as the objective story class then Physics would be the main character class, whereas if Physics is selected as the objective story class, Universe would be the main character class.

Now change the example to a "do-er" and "start" story. Start specifies that the objective story class must have a dependent relationship to the main character class meaning that it must be either Psychology or Mind. If Psychology is selected to be the objective story class, then the main character class would be Universe. If Mind is selected to be the objective story class, then the main character class would be Physics.

ESSENTIAL QUESTIONS

One direct path for creating or selecting a storyform is by answer twelve essential questions. These questions are referred to as "essential" in the sense that answering them leads to identification of one of the available storyforms. However, there are other paths to the storyform. Taking these other paths eventually results in generating the relationships that result from answering the tweleve essential questions.

The questions relate to character dynamics, plot dynamics, and thematic elements. The character dynamics relate to questions of the main character resolve (change or steadfast), direction (stop or start), approach (do-er or be-er), and mental sex (male or female). The plot dynamics relate to questions of plot work (action or decision), plot limit (timelock or optionlock), plot outcome (success or failure), and plot judgement (good or bad). The thematic elements relate to questions of thematic class (in which class does the story take place), thematic concern (what is concern of story, choose at type level in appropriate class), thematic range (what is central thematic focus, choose at variation level), and thematic problem (what is source of problems, choose at element level).

By making choices for the above questions, appreciations are generated, relationships are established and constraints are created so that all other relationships can be determined and a storyform selected. In the present invention, the user is guided through the questions through a menu driven system. As each selection is made, menu choices are constrained based on prior selections. For example, when the universe class is chosen as the thematic class, the available thematic concerns are limited to the four units at the type level of the universe class.

STORYFORM SELECTION

There are 32,768 storyforms in the preferred embodiment of the invention, and these story forms are stored in a storyform table. Each storyform in the table is described in the preferred embodiment by 40 appreciations. In other embodiments, a greater or fewer number of appreciations may be used without departing from the scope of the present invention. As a user provides or selects appreciations, the storyform table is checked to see which storyforms satisfy the appreciations selected. The choices that a user can make may be constrained by prior selections. Subsequent constrained choices of appreciations further narrows the number of suitable (valid) storyforms. Ideally, the process continues until a single storyform is selected.

Figure 14A:
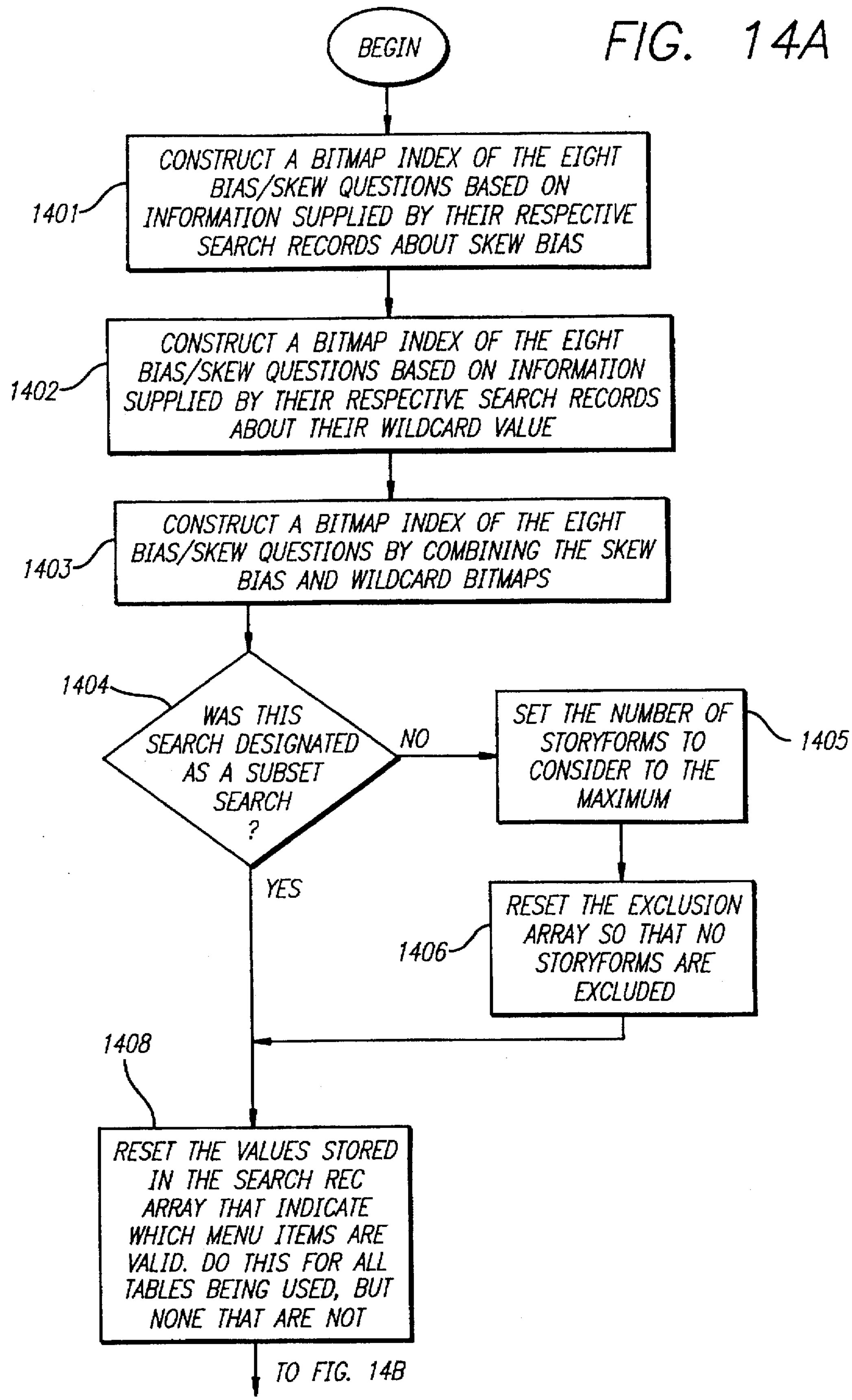

A method for searching the storyform table and selecting valid storyforms is illustrated in FIGS. 14A–14F. Referring first to FIG. 14A, at step 1401 a bitmap index of eight bias/skew questions is constructed. This bitmap is based on information supplied by their respective search records about skew bias. At step 1402 construct a bitmap index of the eight bias/skew questions based on information by their respective search records about their wildcard value. At step 1403, construct a bitmap index by combining the skew/bias bitmap of step 1401 and the wildcard bitmap of step 1402.

At decision block 1404, answer the argument "was this search designated as a subset search?". If the argument is true, proceed to step 1408. If the argument at decision block 1404 is false, set the number of stories to consider to the maximum at step 1405. At step 1406 reset the exclusion array so that no stories are excluded and proceed to step 1408. At step 1408 reset values stored in the search record array that indicate which menu items are valid. This is done for all tables that are used, but for none that are not used. This step constrains selections available to a user, with the constraints based on selections previously made.

Figure 14B:
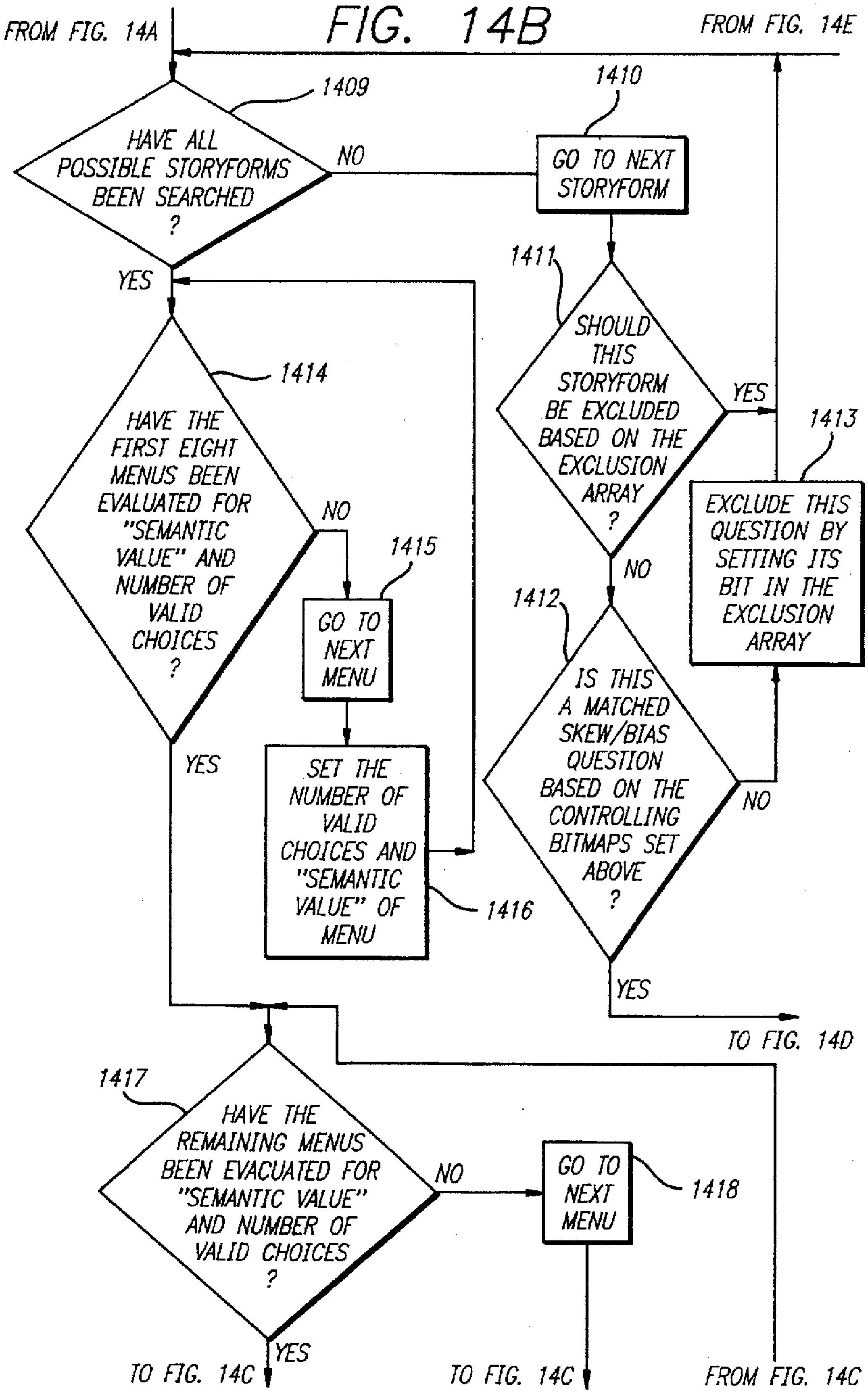

At decision block 1409 of FIG. 14B the argument "have all possible storyforms been searched" is made. If the argument is false, proceed to step 1410 and go to the next storyform. At decision block 1411 the argument "should this story be excluded based on the exclusion array?" is made. If the argument is true, return to decision block 1409. If the argument at decision block 1411 is false, proceed to decision block 1412. If the argument "is this a matched skew/bias question based on the controlling bitmaps set above?" is false, proceed to step 1413. At step 1413 exclude this question by setting its bit in the exclusion array, then return to decision block 1409.

Figure 14C:
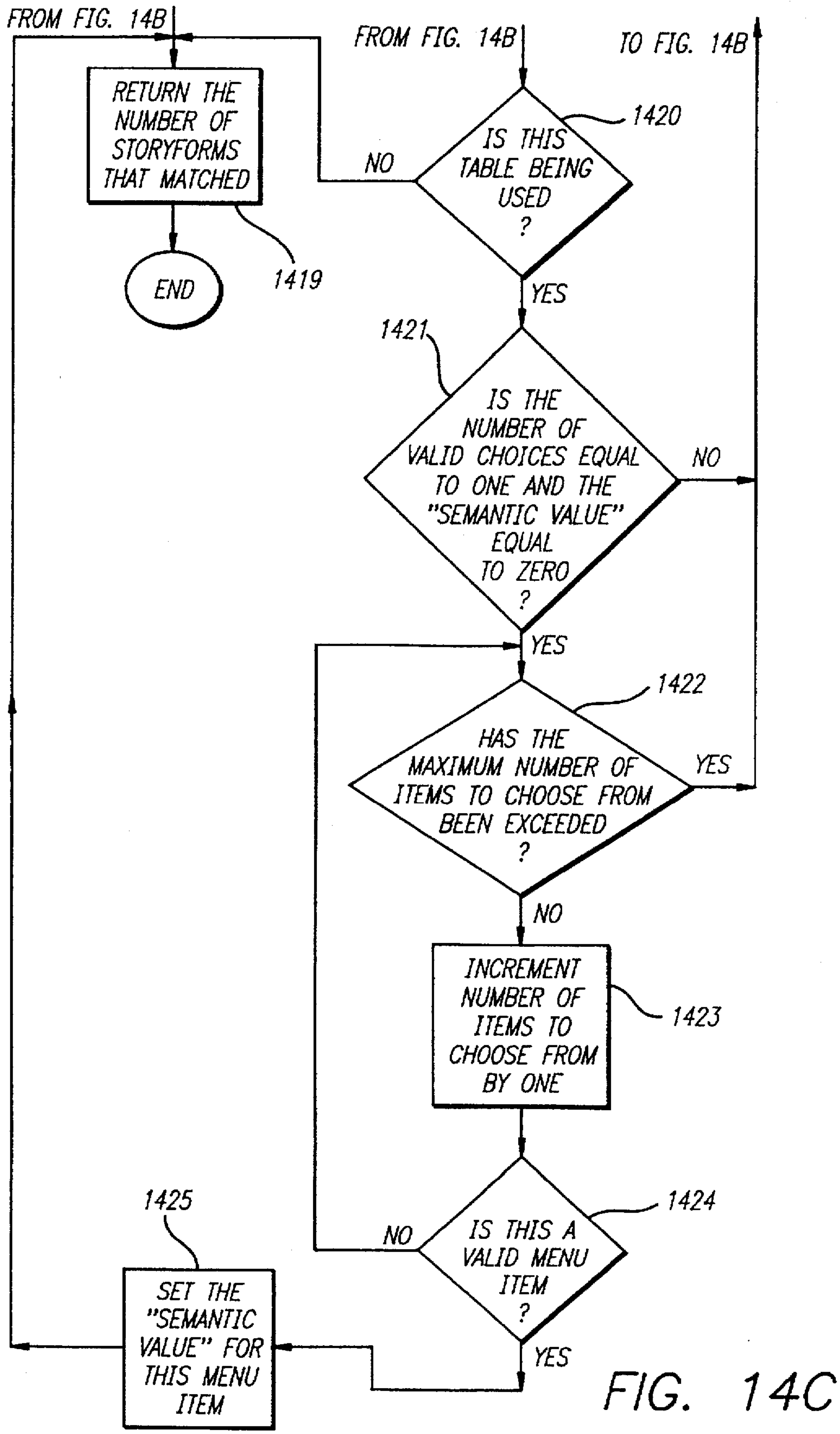
Figure 14D:
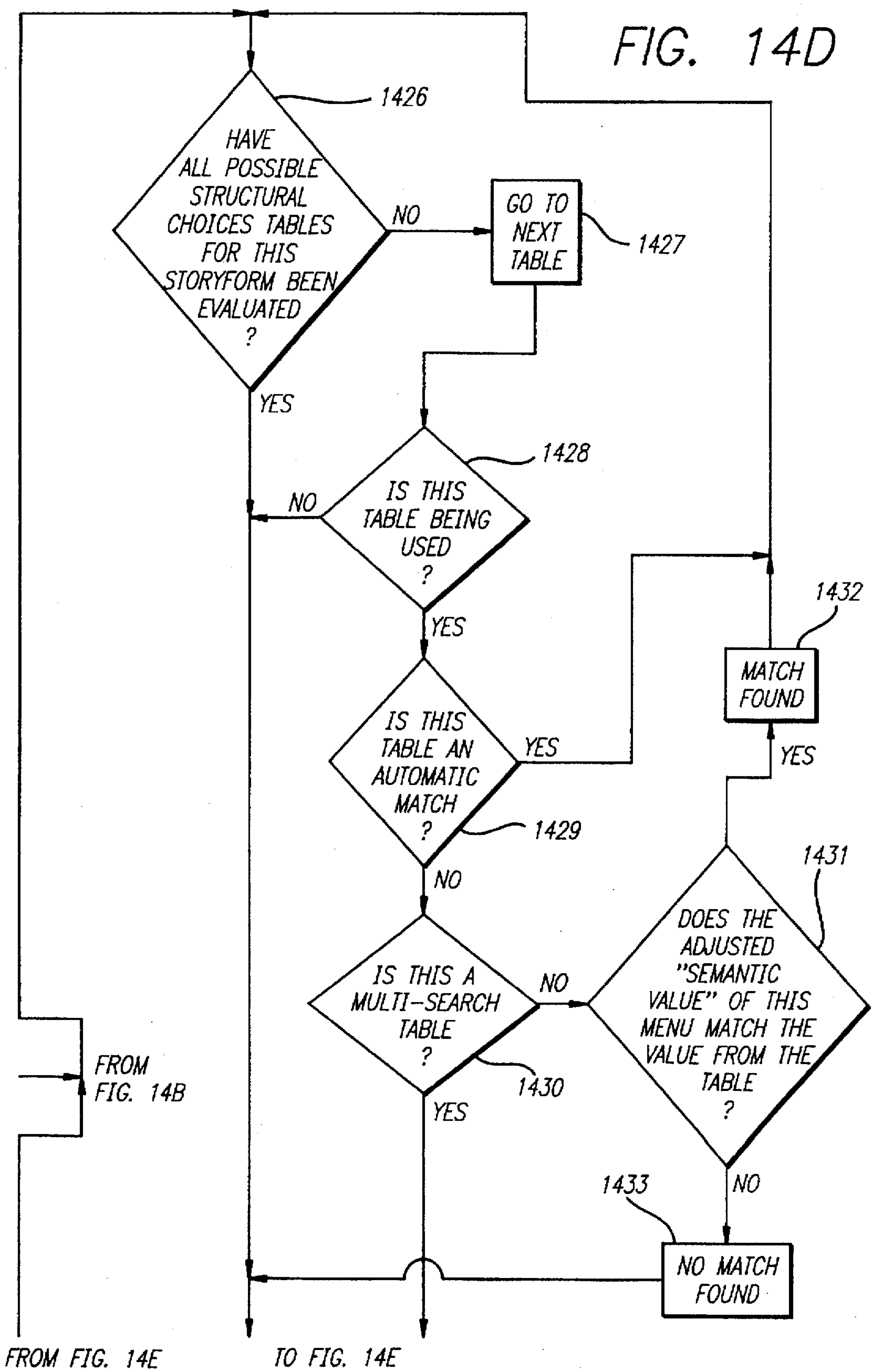

If the argument at decision block 1412 of FIG. 14B is true, proceed to decision block 1426 in FIG. 14D. If the argument "have all possible structural choices tables for this story been evaluated?" at decision block 1426 is false, go to next table at step 1427. At decision block 1428 if the argument "is this table being used?" is true, proceed to decision block 1429. If the argument "is this table an automatic match?" is true, return to decision block 1426. If the argument at decision block 1429 is false, proceed to decision block 1430.

At decision block 1430 if the argument "is this a multi-search table?" is false, proceed to decision block 1431 and the argument "does the adjusted semantic value of this menu match the value from the table?". If this argument is true, there is a match found at step 1432 and return to decision block 1426. If false, no match found at step 1433.

Figure 14E:
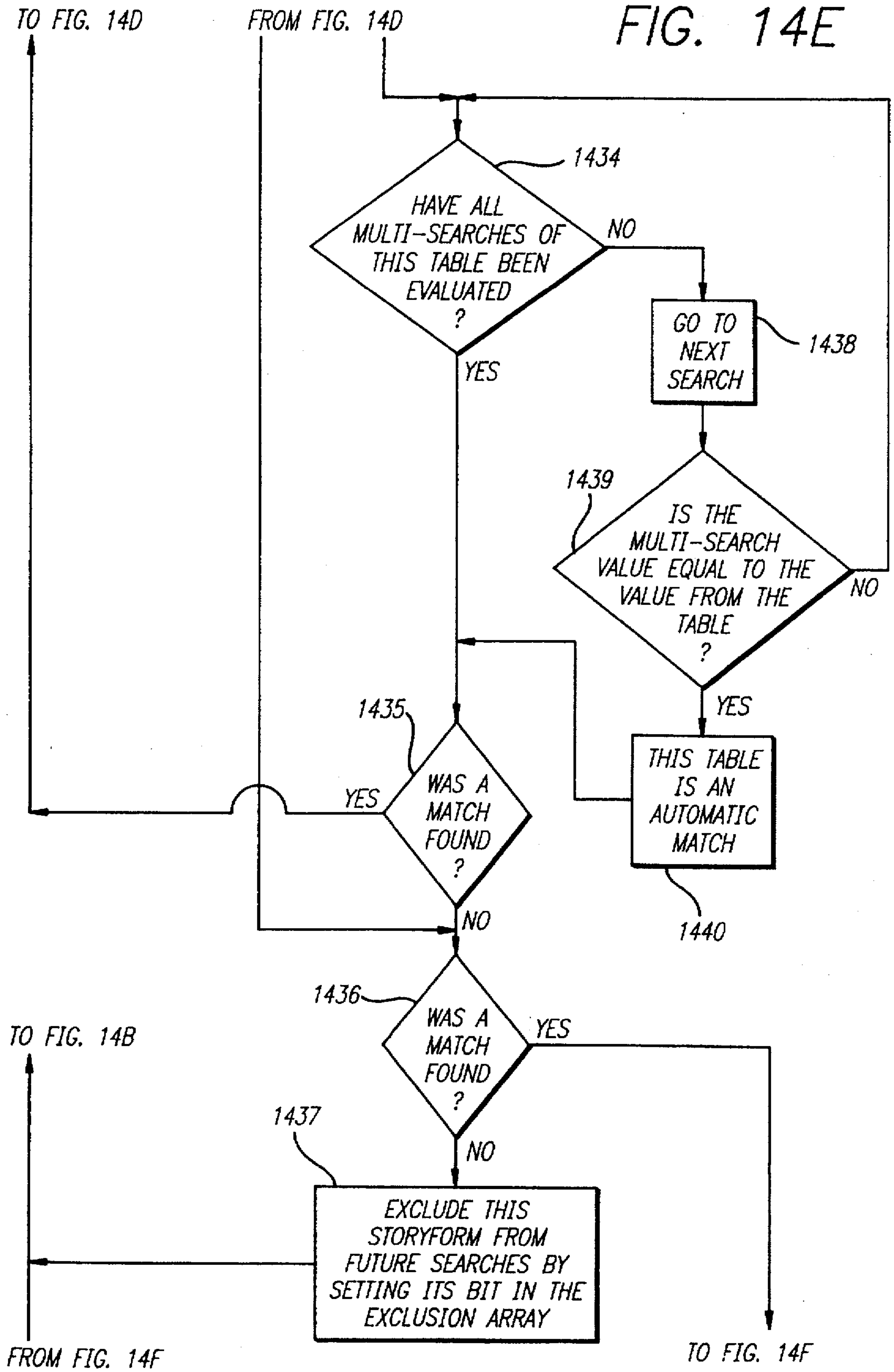

If the argument at decision block 1426 is true, or the argument at decision block 1428 is false, or there is not match found at step 1433, proceed to decision block 1436 of FIG. 14E. At this decision block, the argument "was a match found?" is made. If the argument is false, exclude this storyform from future searches by setting its bit in the exclusion array at step 1437 and return to decision block 1409.

If the argument at decision block 1430 is true, proceed to decision block 1434 and the argument "have all multi-searches of this table been evaluated?". If the argument is true, proceed to decision block 1435 and the argument "was a match found?". If the argument at decision block 1435 is false, proceed to decision block 1436. If the argument at decision block 1435 is true, return to decision block 1426.

If the argument at decision block 1434 is false, go to next search at step 1438. If the argument "is the multi-search value equal to the value from the table?" at decision block 1439 is false, return to 1434. If true, this table is an automatic match at step 1440 and proceed to decision block 1435.

If the argument at decision block 1436 is true, proceed to step 1441 of FIG. 14F and define the storyform as a match. At decision block 1442 the argument "have the first eight questions been evaluated for valid menu items? is made. If the argument is false, go to next question at step 1443, indicate if this menu item is valid for this storyform at step 1444 and return to decision block 1442. If the argument at decision block 1442 is true, proceed to decision block 1445.

At decision block 1445 the argument "have the remaining questions been evaluated for valid menu items?" is made. If the argument is true, increase the total number of storyforms that match by one at step 1446 and return to decision block 1409. If false, go to next question at step 1447. At decision block 1448 if the argument "is this table being used? is false, proceed to step 1446. If the argument is true, go to decision block 1449. At decision block 1449, if the argument "is the menu filled in yet?" is true, return to decision block 1445. If false, indicate that this menu item is valid for this storyform at step 1450 and proceed to decision block 1451. At decision block 1451 the argument "will this addition fill the menu?" is made. If true, the menu is full at step 1452 and return to decision block 1445. If false, return to decision block 1445.

If the argument at decision block 1409 of FIG. 14B is true, proceed to decision block 1414 and the argument "have the first eight menus been evaluated for semantic value and number of valid choices?". If the argument is false, go to next menu at step 1415, set the number of valid choices and semantic values of the menu at step 1416 and return to decision block 1414. If the argument at decision block 1414 is true, proceed to decision block 1417.

At decision block 1417, the argument "have the remaining menus been evaluated for semantic value and number of valid choices?" is made. If the argument is true, proceed to step 1419 in FIG. 14C. If the argument is false, proceed to the next menu at step 1418 and then to decision block 1420 in FIG. 14C.

Referring to FIG. 14C, at step 1419 return the number of storyforms that match and end. At decision block 1420 if the argument "is this table being used?" is false, proceed to step 1419. If true, proceed to decision block 1421 and test argument "is the number of valid choices equal to one and the semantic value equal to zero?". If the argument is false, return to decision block 1417. If the argument is true, proceed to decision block 1422.

At decision block 1422, if the argument "has the maximum number of items to choose from been exceeded?" is true, return to decision block 1417. If false, increment the number of items to choose from by one at step 1423. At decision block 1424, if the argument "is this a valid menu item?" is false, return to decision block 1422. If true, proceed to step 1425 and set the semantic value for this menu item. Then proceed to step 1419.

An example of code that can be used to implement the functionality described in FIGS. 14A–14F is shown below in Appendix A in files entitled storytble.h and storytble.cc.

Appendix A inlcudes examples of code for implementing the invention.

Computer System

The present invention can be implemented on a general purpose computer such as illustrated in FIG. 15. A keyboard 1510 and mouse 1511 are coupled to a bi-directional system bus 1518. The keyboard and mouse are for introducing user input to the computer system and communicating that user input to CPU 1513. The computer system of FIG. 15 also includes a video memory 1514, main memory 1515 and mass storage 1512, all coupled to bi-directional system bus 1518 along with keyboard 1510, mouse 1511 and CPU 1513. The mass storage 1512 may include both fixed and removable media, such as magnetic, optical or magnetic optical storage systems or any other available mass storage technology. Bus 1518 may contain, for example, 32 address lines for addressing video memory 1514 or main memory 1515. The system bus 1518 also includes, for example, a 32-bit DATA bus for transferring DATA between and among the components, such as CPU 1513, main memory 1515, video memory 1514 and mass storage 1512. Alternatively, multiplex DATA/address lines may be used instead of separate DATA and address lines.

In the preferred embodiment of this invention, the CPU 1513 is a 32-bit microprocessor manufactured by Motorola, such as the 680X0 processor or a microprocessor manufactured by Intel, such as the 80X86, or Pentium processor. However, any other suitable microprocessor or microcomputer may be utilized. Main memory 1515 is comprised of dynamic random access memory (DRAM). Video memory 1514 is a dual-ported video random access memory. One port of the video memory 1514 is coupled to video amplifier 1516. The video amplifier 1516 is used to drive the cathode ray tube (CRT) raster monitor 1517. Video amplifier 1516 is well known in the art and may be implemented by any suitable means. This circuitry converts pixel DATA stored in video memory 1514 to a raster signal suitable for use by monitor 1517. Monitor 1517 is a type of monitor suitable for displaying graphic images.

The computer system described above is for purposes of example only. The present invention may be implemented in any type of computer system or programming or processing environment.

Thus, a method and apparatus for identifying, predicting, and reporting relationships has been described.

APPENDIX A

```
/*****************************************************************
        ABOUTBOX.CC
        About Box & Splash Screen
        (c) 1993 Screenplay Systems
        Authors:        S. Greenfield & C. Huntley
        Created:        Feb 3, 1994
        Revised:        $Id$
*****************************************************************

*/

#include "tappl.h"
#include "appcntls.h"

#include "drrez.h"
#include "dramatic.h"
#include "ptext.h"
#include "textwrap.h"
#include "aboutbox.h"

#pragma segment aboutbox


/* ------------------------------------------------------------------------
        SplashScreen::SplashScreen - CONSTRUCTOR
------------------------------------------------------------------------ */
SplashScreen::SplashScreen(TAppl *pTAppl, const GLRect *bounds, wn_type windowType)
                : TWindow(pTAppl, NULL, windowType, TWindow::kNoGrow, bounds, NULL, NULL),
                  fCopyrightTW (NULL)
{
}


/* ------------------------------------------------------------------------
        SplashScreen::~SplashScreen - DESTRUCTOR
------------------------------------------------------------------------ */
SplashScreen::~SplashScreen(void)
{
        delete fDQuadBM;
        delete fCopyrightTW;
        delete fCreditsTW;
        delete fEngCreditsTW;
        delete fLongVersTW;
} /* SplashScreen::~SplashScreen */


/* ------------------------------------------------------------------------
        SplashScreen::SetupWindow -
------------------------------------------------------------------------ */
void SplashScreen::SetupWindow(void)
{
        fTextLeftEdge = 280;

        fDQuadBM            = new Bitmap(kDQuadPict);
        fDTitleBM           = new Bitmap(kDTitlePict);
        GLRect portBounds;
        GetPortRect(&portBounds);
        fDQuadRect                      = portBounds;
        fDQuadRect.bottom           = fDQuadRect.top + fDQuadBM->GetHeight();
        fDQuadRect.right  = fDQuadRect.left + fDQuadBM->GetWidth();

        fDTitleRect.right           = portBounds.right;
        fDTitleRect.left  = fDTitleRect.right - fDTitleBM->GetWidth();
        fDTitleRect.bottom          = portBounds.bottom - 16;
        fDTitleRect.top             = fDTitleRect.bottom - fDTitleBM->GetHeight();

        Dramatica* theApp = (Dramatica*)GetParentApp();

        pt_err theErr;
        PText* infoPT       = new PText(theApp->GetPFMFile(), _OSType("INFO"), 0, &theErr);
        assert(theErr != kNoSuchPFMSeg);

        char tempStr[300];
        GLRect textRect;
        theErr = infoPT->GetParam("Copyright", 'c', tempStr);
        assert(theErr != kParamNotFound);
        GLSetRect(&textRect, 15, fTextLeftEdge, 80, 490);
        fGraphEnv.Use();
        fCopyrightTW        = new TextWrap(&fGraphEnv, &textRect, tempStr, 21, 10);

        theErr = infoPT->GetParam("CreditA", 'c', tempStr);
        assert(theErr != kParamNotFound);
        GLSetRect(&textRect, 15+fCopyrightTW->GetTextHeight()+10, fTextLeftEdge, 300, 490);
        fCreditsTW          = new TextWrap(&fGraphEnv, &textRect, tempStr, 21, 10);

        theErr = infoPT->GetParam("CreditB", 'c', tempStr);
        assert(theErr != kParamNotFound);
        GLSetRect(&textRect, 20+fCreditsTW->GetTextHeight()+20, fTextLeftEdge, 300, 490);
        fEngCreditsTW       = new TextWrap(&fGraphEnv, &textRect, tempStr, 21, 9);

        theErr = infoPT->GetParam("LongVers", 'c', tempStr);
        assert(theErr != kParamNotFound);
        GLSetRect(&textRect, fDTitleRect.top-25, fTextLeftEdge, 300, 490);
        fLongVersTW         = new TextWrap(&fGraphEnv, &textRect, tempStr, 21, 9);

        fGraphEnv.Unuse();

        delete infoPT;

} /* SplashScreen::SetupWindow */

/* ------------------------------------------------------------------------
        SplashScreen::draw_window - Draws the aboutbox window.
------------------------------------------------------------------------ */
void SplashScreen::draw_window(GL_ENV_REF env)
{
        TWindow::draw_window(env);
```

```
        fDQuadBM->CopyToScreen(fWindowRef, &fDQuadRect);
        fDTitleBM->CopyToScreen(fWindowRef, &fDTitleRect);

        fCopyrightTW->Draw(&fGraphEnv, NULL, kNeverPrint, 15, fTextLeftEdge);
        fCreditsTW->Draw(&fGraphEnv, NULL, kNeverPrint, 15+fCopyrightTW->GetTextHeight()+10, fTextLeftEdge);
        fLongVersTW->Draw(&fGraphEnv, NULL, kNeverPrint, fDTitleRect.top-27, fTextLeftEdge);

} /* SplashScreen::draw_window */


/* -------------------------------------------------------------------------
                                                            About Box Window CLASS
---------------------------------------------------------------------------- */


/* -------------------------------------------------------------------------
        AboutBoxWindow::SetupWindow -
---------------------------------------------------------------------------- */
void AboutBoxWindow::SetupWindow(void)
{
        SplashScreen::SetupWindow();

        TWindow::NewItemList(rAboutItm);

} /* AboutBoxWindow::SetupWindow */


/* -------------------------------------------------------------------------
        AboutBoxWindow::draw_window - Draws the aboutbox window.
---------------------------------------------------------------------------- */
void AboutBoxWindow::draw_window(GL_ENV_REF env)
{
        SplashScreen::draw_window(env);

        fEngCreditsTW->Draw(&fGraphEnv, NULL, kNeverPrint, 72+fCreditsTW->GetTextHeight(), fTextLeftEdge);

} /* AboutBoxWindow::draw_window */


/* -------------------------------------------------------------------------
        AboutBoxWindow::DoItemHit - handles popups and button presses within the
        About Box.
---------------------------------------------------------------------------- */
void AboutBoxWindow::DoItemHit(ls_index itemHit)
{
        fParentApp->CloseWindow(this);
} /* AboutBoxWindow::DoItemHit */

/* -------------------------------------------------------------------------
                                                            About Box Command CLASS
---------------------------------------------------------------------------- */


/* -------------------------------------------------------------------------
        AboutCmd::IsValid -
---------------------------------------------------------------------------- */
bool_t AboutCmd::IsValid(TAppl *pApp)
{
        return (true);
} /* AboutCmd::IsValid */


/* -------------------------------------------------------------------------
        AboutCmd::do_cmd -
---------------------------------------------------------------------------- */
err_t AboutCmd::do_cmd(void)
{
        GLRect screenRect;
        fParentApp->GetMainScreenRect(&screenRect);
        gl_coord_t aboutHeight     = 278;
        gl_coord_t aboutWidth      = 500;
        GLRect myBounds;
        myBounds.top      = ((screenRect.bottom - screenRect.top) / 2) - (aboutHeight / 2);
        myBounds.bottom   = myBounds.top + aboutHeight;
        myBounds.left     = ((screenRect.right - screenRect.left) / 2) - (aboutWidth / 2);
        myBounds.right    = myBounds.left + aboutWidth;


        AboutBoxWindow* pTWindow = new AboutBoxWindow(fParentApp, &myBounds, WN_SIZE_WINDOW);

        if (pTWindow) {
//                theDoc->GetWindowList()->Append(pTWindow);
                pTWindow->SetupWindow();
                pTWindow->ShowWindow();
                fParentApp->SetActiveWindows();

                fParentApp->ClearStoragePtr();
        }

        return NOERR;

} /* AboutCmd::do_cmd */


#pragma segment main
```

```
/* -----------------------------------------------------------------------
        ABOUTBOX.H
        About Box & Splash Screen
        Copyright (C) 1994 Screenplay Systems Inc.
        Revised:        $Id$
------------------------------------------------------------------------ */
#pragma once

#ifndef __ABOUTBOX__
#define __ABOUTBOX__

#include "consts.h"
#include "tcommand.h"

class EXPORT_CLASS PushBtn;
class EXPORT_CLASS TextWrap;

#pragma segment aboutbox

static const short          kDQuadPict       = 16014;
static const short          kDTitlePict      = 16015;

/* -----------------------------------------------------------------------
                                                    Splash Screen Window CLASS
------------------------------------------------------------------------ */
class EXPORT_CLASS SplashScreen : public TWindow {
public:
        // CONSTRUCTION/DESTRUCTION
        SplashScreen(TAppl *pTAppl, const GLRect *bounds, wn_type windowType);
        virtual ~SplashScreen(void);

        // PUBLIC UTILITIES
        virtual char*     ClassName(void) const      { return "AboutWindow"; }
        virtual class_t   ClassType(void) const      { return kAboutWindow; }
        virtual bool_t    IsOfType(const void *pType) const { return *(class_t*) pType == kCLWindow ||
TWindow::IsOfType(pType); }
        bool_t                     IsDirty(void);

        // CUSTOMIZED BEHAVIOR
        void                       SetupWindow(void);


protected:
        // DATA MEMBERS

        Bitmap*           fDQuadBM;               // Bitmap for Dramatica Quad
        Bitmap*           fDTitleBM;              // BItmap for Title

        GLRect            fDQuadRect;             // Location of Dramatica Quad in the window
        GLRect            fDTitleRect;      // Location of title pict

        TextWrap*         fCopyrightTW;     // Copyright info textwrap
        TextWrap*         fCreditsTW;             // Basic Credits info
        TextWrap*         fEngCreditsTW;    // Engineering credits
        TextWrap*         fLongVersTW;      // Long Versions Identification

        gl_coord_t        fTextLeftEdge;    // Left side where text is aligned

        // LOCAL UTILITIES
        virtual void      draw_window(GL_ENV_REF env);

}; /* SplashScreen */

/* -----------------------------------------------------------------------
                                                    About Box Window CLASS
------------------------------------------------------------------------ */
class EXPORT_CLASS AboutBoxWindow : public SplashScreen {
public:
        AboutBoxWindow(TAppl *pTAppl, const GLRect *bounds, wn_type windowType)
              : SplashScreen(pTAppl, bounds, windowType) { }
        virtual ~AboutBoxWindow(void) { }

        virtual void      DoItemHit(ls_index itemHit);
        void                       SetupWindow(void);

protected:
        PushBtn*                   fOKBtn;

        // LOCAL UTILITIES
        virtual void      draw_window(GL_ENV_REF env);

}; /* AboutBoxWindow */

/* -----------------------------------------------------------------------
                                              About Box Command Class
------------------------------------------------------------------------ */
class EXPORT_CLASS AboutCmd : public TCommand {
public:
        AboutCmd(TAppl* pTAppl) : TCommand(pTAppl) {}

        virtual char*     ClassName(void)    const      { return "AboutCmd"; }
        virtual class_t   ClassType(void) const         { return kAboutCmd; }
        virtual bool_t    IsOfType(const void *pType) const { return *(class_t*) pType == kAboutCmd ||
TCommand::IsOfType(pType); }
        virtual TObject* Duplicate(void) const          { return new AboutCmd(*this); }

        static bool_t     IsValid(TAppl *pTAppl);

protected:
        virtual err_t     do_cmd(void);

}; /* AboutCmd */

#endif /* __ABOUTBOX__ */

#pragma segment main
```

```
/**********************************************************************
        ADDRESS.CC
        Dramatica Model Address Translation Functions
        (c) 1993 Screenplay Systems
        Authors:            S. Greenfield & C. Huntley
        Created:            January 23, 1993
        Revised:            $Id$
**********************************************************************

*/


#include <stdio.h>
#include <stdlib.h>
#include <string.h>
extern "C" {
        #include "ssi.h"
}
#include "genutls.h"
#include "structs.h"
#include "semTable.h"
#include "address.h"


static int checkAddress(AddrPtr addr);


/* ------------------------------------------------------------------------
        A Dramatica address is a five-digit number.  The first four digits of
        the address are indexes which tell us, in a drill-down fashion, which
        Class, Type, Variation and Element we are looking at.  Each digit always
        contains a number from 0-4, which indicates a unit position in a Quad.

        The fifth digit indicates which ITEM we are looking at.  Since each level
        is made up of items of many sizes, the ITEM is the determining factor that
        decides what data is desired.  The values may be 0-4.  For example, at
        the Element Level, you have a Unit (size 0, 1 item), which is part of a
        Quad (size 1, 4 items), which is part of a Set (size 2, 16 items), which
        is part of a ChessSet (size 3, 64 items), which is part of a SuperSet
        (size 4, 256 items).

        The entire address may be thought of as: "Locate the item of size 4 to the
        nth power (where n=the 5th digit) that CONTAINS the Unit indexed by the first
        4 digits.

        For example:
                "10000" = Class UNIVERSE unit.
                "11201" = Variations Quad #1 (contains "Senses").
                "42400" = Variation Mind:Thought unit.
                "31000" = Type Psychology:Memory Unit.

                "14220" = Element Universe:Inaction.
                "14221" = Element Quad Universe:Proaction, Inaction, Protection, Reaction
                "14222" = Element Set Universe: Certainty, Probability, Proaction, etc..
                "14223" = Element ChessSet for Universe.
                "14224" = Element SuperSet for this SuperClass.
------------------------------------------------------------------------ */


/* ------------------------------------------------------------------------
        FUNCTION:           Addr2Ptrs
        Purpose:            Given a textual address, a SuperClass, and an AddrPtrStruct,
                                    validates the address and returns a structure of pointers
                                    related to this address.  There are 12 pointers related to
                                    a SuperClass and an address, and the returned structure also
                                    saves both a ptr to the SuperClass and the textual address in
                                    case the user needs it in the future.
        Returns:            Pointer to the AddrPtrStruct.
        Note:               User is responsible for allocating the structure.
------------------------------------------------------------------------ */
AddrPtrStruct* Addr2Ptrs(SuperClass *theSC, AddrPtr addr, AddrPtrStruct *aPtrs)
{
        int Class = ADDR_CLASS(addr)-1;
        int Type = ADDR_TYPE(addr)-1;
        int Variation = ADDR_VARIATION(addr)-1;
        int Element = ADDR_ELEMENT(addr)-1;
        int ItemSize = ADDR_ITEMSIZE(addr);
        int level = checkAddress(addr);
        #define aP          aPtrs->itemPtrs                                          /* defined
for readability */

        memset(aPtrs,0,sizeof(AddrPtrStruct));
        strcpy(aPtrs->theAddress,addr);                                              /* Copy of textual
addr for these ptrs */
        aPtrs->theSuperClass = theSC;                                                /* Ptr to SuperClass
for these ptrs */
        aPtrs->level=level;                                                          /*
save target level of address */

        aP[CLASS][QUAD_SZ] = &theSC->Classes;                            /* the class levels/quad */
        aP[CLASS][UNIT_SZ] = &theSC->Classes.Units[Class];          /* The class level/unit */

        aP[TYPE][SET_SZ] = &theSC->Types;                                            /*
the type level/set */
        aP[TYPE][QUAD_SZ] = &theSC->Types.Quads[Class];                              /* The type
level/quad */
        if (Type >= 0)
                aP[TYPE][UNIT_SZ] = &theSC->Types.Quads[Class].Units[Type];      /* The type unit */

        aP[VAR][CHESS_SZ] = &theSC->Variations;                                      /*
The variation level/ChessSet */
        aP[VAR][SET_SZ] = &theSC->Variations.Sets[Class];                            /* The variation
level/set */
        if (Type >=0) {
                aP[VAR][QUAD_SZ] = &theSC->Variations.Sets[Class].Quads[Type];   /* The variation quad */
                if (Variation >= 0)
                        aP[VAR][UNIT_SZ] = &theSC->Variations.Sets[Class].Quads[Type].Units[Variation];  /* The
variation unit */
        }

        aP[ELEM][SUPER_SZ] = &theSC->Elements;
        /* The element level/SuperSet */
```

```
        aP[ELEM][CHESS_SZ] = &theSC->Elements.ChessSets[Class];                                         /* The
element level/chessSet */
        if (Type >=0) {
                aP[ELEM][SET_SZ] = &theSC->Elements.ChessSets[Class].Sets[Type];        /* The element set */
                if (Variation >= 0) {
                        aP[ELEM][QUAD_SZ] = &theSC->Elements.ChessSets[Class].Sets[Type].Quads[Variation];        /*
The element quad */
                        if (Element >= 0)
                                aP[ELEM][UNIT_SZ] = &theSC-
>Elements.ChessSets[Class].Sets[Type].Quads[Variation].Units[Element];  /* The element unit */
                }
        }

        return (aPtrs);
}


/* -------------------------------------------------------------------------
        FUNCTION:       Addr2Ptr
        Purpose:        Given a textual address and a SuperClass, validates the
                                address and returns a SINGLE pointer to the desired structure.
        Note:           User is responsible for knowing what type of structure pointer
                                is pointed to by the return value of the void*.
------------------------------------------------------------------------- */
pStruct Addr2Ptr(SuperClass *theSC, AddrPtr addr)
{
        int Class = ADDR_CLASS(addr)-1;
        int Type = ADDR_TYPE(addr)-1;
        int Variation = ADDR_VARIATION(addr)-1;
        int Element = ADDR_ELEMENT(addr)-1;
        int ItemSize = ADDR_ITEMSIZE(addr);

        int level = checkAddress(addr);

        switch(level) {
        case 1:
                switch(ItemSize) {
                  case 1: return(&theSC->Classes);                              /* The class level/quad */
                  case 0: return(&theSC->Classes.Units[Class]);         /* The class level/unit */
                }

        case 2:
                switch(ItemSize) {
                  case 2: return(&theSC->Types);                                                /* The type
level/set */
                  case 1: return(&theSC->Types.Quads[Class]);                           /* The type level/quad
*/
                  case 0: return(&theSC->Types.Quads[Class].Units[Type]);       /* The type unit */
                }

        case 3:
                switch(ItemSize) {
                  case 3: return(&theSC->Variations);                                                           /*
The variation level/ChessSet */
                  case 2: return(&theSC->Variations.Sets[Class]);                               /* The variation
level/set */
                  case 1: return(&theSC->Variations.Sets[Class].Quads[Type]);  /* The variation quad */
                  case 0: return(&theSC->Variations.Sets[Class].Quads[Type].Units[Variation]);    /* The variation unit
*/
                }

        case 4:
                switch(ItemSize) {
                  case 4: return(&theSC->Elements);
                /* The element level/SuperSet */
                  case 3: return(&theSC->Elements.ChessSets[Class]);                    /* The element
level/chessSet */
                  case 2: return(&theSC->Elements.ChessSets[Class].Sets[Type]);         /* The element set */
                  case 1: return(&theSC->Elements.ChessSets[Class].Sets[Type].Quads[Variation]);
        /* The element quad */
                  case 0: return(&theSC->Elements.ChessSets[Class].Sets[Type].Quads[Variation].Units[Element]);     /*
The element unit */
                }
        }
        asserts(false,"\n\n*** Addr2Ptr FELL THRU for address '%s' ***\n");
}


/* -------------------------------------------------------------------------
        FUNCTION:       Addr2Item
        Purpose:        Given a SuperClass and an address, return a Ptr to the Item
                                field, or Unit targeted by the address.
        Usage:          All Dramatica structural data objects (SuperSet, ChessSet,
                                Set, Quad and Unit) are considered "items". Each item is of
                                type Unit.  This function lets us get at that info without
                                knowing what kind of structure it's a part of.
        Returns:        A Unit*.
------------------------------------------------------------------------- */
Unit* Addr2Item(SuperClass *theSC, AddrPtr addr)
{
        void *theStructPtr = Addr2Ptr(theSC, addr);

        return ((Unit*)theStructPtr);
}


/* -------------------------------------------------------------------------
        FUNCTION:       FindSemanticItem
        Purpose:        Find the item in searchSC that has the desired semantic value.
        Accepts:        searchSC: the superclass to look in.
                                semVal:   the semantic value to look for.
                                theAddr:  AddrPtr where to store the textual address; NULL if
                                                not desired.
        Returns:        a Unit * to the unit with the matching semVal.
------------------------------------------------------------------------- */
Unit* FindSemanticItem(SuperClass *searchSC, short semVal, AddrPtr theAddr, short *usersTable)
{
        int             n;
        Unit    *searchUnit;
        short   *lookupSemTbl;
```

```
        assert(semVal >= 1 && semVal <=TOTAL_SEMANTIC_ITEMS);

        if (usersTable == NULL)
                lookupSemTbl = InitSemanticFindTable(searchSC);
        else
                lookupSemTbl = usersTable;                                                              /*
user has supplied us with the table, so use it */

        n = lookupSemTbl[semVal];
        assert(n);
        searchUnit = Addr2Item(searchSC,(AddrPtr)SemTbl[n].addr);

        if (usersTable == NULL)                                                                         /*
now get rid of table */
                DisposeSemanticFindTable(lookupSemTbl);

        if (theAddr)
                strcpy(theAddr, (AddrPtr)SemTbl[n].addr);

        return (searchUnit);
}


/* ------------------------------------------------------------------------
        FUNCTION:       InitSemanticFindTable
        Purpose:        Preloads lookupSemTbl for iterative searching
        Accepts:        theSC: the superclass to look in.
        Returns:        a short * to the table created and inited.
----------------------------------------------------------------------------- */
short* InitSemanticFindTable(SuperClass *theSC)
{
        Unit    *searchUnit;
        short   *lookupSemTbl;
        int             n;

        lookupSemTbl = (short *)calloc(1,sizeof(short) * (TOTAL_SEMANTIC_ITEMS+1));

        for (n=1; n<=TOTAL_SEMANTIC_ITEMS; ++n) {
                searchUnit = Addr2Item(theSC,(AddrPtr)SemTbl[n].addr);
                lookupSemTbl[searchUnit->semVal] = n;
        }

        return(lookupSemTbl);
}


/* ------------------------------------------------------------------------
        FUNCTION:       DisposeSemanticFindTable
        Purpose:        Dispose the lookupSemTbl
        Accepts:        The short * to the table.
----------------------------------------------------------------------------- */
void DisposeSemanticFindTable(short *lookupSemTbl)
{
        free(lookupSemTbl);
        lookupSemTbl = NULL;
}


/* ------------------------------------------------------------------------
        FUNCTION:       ForEveryAddr
        Purpose:        Iterate through a range of addresses.
        Accepts:        classLimit: 0 = all classes, otherwise the class of the loop.
                                level: 0-3 (CLASS to ELEM)
        Stop Loop:      the ForAddr_Proc passes back one of three values:
                                        FOR_CONTINUE (-32001): continue with next iteration.
                                        FOR_RETURN (-32002):   Stop loop, return 'n' (the iteration).
                                        Other values: Stop loop, return this value.
        Returns:        Either user's #, n, or a negative n, indicating loop went thru
                                all iterations without an intervening return.
----------------------------------------------------------------------------- */
int ForEveryAddr(ForAddr_Proc pForProc, short classLimit, short level, short ItemSize, void *pInfo1, void *pinfo2)
{
        int n;
        int returnVal;

        for (n=1; n<=TOTAL_SEMANTIC_ITEMS; ++n) {

                if (((classLimit == ALL_CLASSES) || (classLimit == SEMTBL_CLASS(n))) &&
                            SEMTBL_ITEMSIZE(n) == ItemSize &&
                            Addr2Level((AddrPtr)&SemTbl[n].addr[0])-1 == level) {
                                returnVal = pForProc((AddrPtr)&SemTbl[n].addr[0], pInfo1, pinfo2);
                                if (returnVal == FOR_CONTINUE)
                                        continue;
                                if (returnVal == FOR_RETURN)
                                        return (n);
                                else return (returnVal);
                        }
        }
        return (-n);
}


/* ------------------------------------------------------------------------
        FUNCTION:       ForEveryLevel
        Purpose:        Walk thru every level of theClass, of a specific ItemSize.
        Accepts:        theForProc: function which is called for each item.
                                theClass: which class (1-4).  Class of ALL_CLASSES walks thru
                                entire SuperClass.
                                ItemSize: the desired ItemSize, or ALL_ITEMSIZES to generate
                                addresses of all sizes.
        Returns:        Nothing.
----------------------------------------------------------------------------- */
void ForEveryLevel(ForAddr_Proc theForProc, SuperClass *theSC, int theClass, int ItemSize)
{
        int level;
        int size, startSize=UNIT_SZ, endSize=SUPER_SZ;

         if (ItemSize != ALL_ITEMSIZES)
                startSize = endSize = ItemSize;

        for (level = CLASS; level<=ELEM; ++level) {
```

```
            if (ItemSize == ALL_ITEMSIZES)
                    endSize = level;
            for (size = startSize;  size<=endSize;  ++size)
                    ForEveryAddr(theForProc, theClass, level, size, theSC, NULL);
        }
}


/* --------------------------------------------------------------------------
        FUNCTION:       Addr2PathString
        Purpose:        Creates a string with a textual address path.
        Accepts:        An aadr, and a char* where to store the string.  theLevel
                                is normally set to the define ALL_LEVELS (-1) which means
                                to return a path string for all levels.
        Returns:        Ptr to the path string, which was stored in theString.
                                The levels are separated by:       CLASS@TYPE:VAR.ELEM
------------------------------------------------------------------------------ */
char* Addr2PathString(SuperClass *theSC, AddrPtr addr, char *theString, short theLevel)
{
        AddrPtrStruct aPtrs;
        Unit    *classUnit, *typeUnit, *varUnit, *elemUnit;

        Addr2Ptrs(theSC, addr, &aPtrs);

        classUnit = (Unit *) aPtrs.itemPtrs[CLASS][UNIT_SZ];
        typeUnit = (Unit *) aPtrs.itemPtrs[TYPE][UNIT_SZ];
        varUnit = (Unit *) aPtrs.itemPtrs[VAR][UNIT_SZ];
        elemUnit = (Unit *) aPtrs.itemPtrs[ELEM][UNIT_SZ];

        theString[0] = 0;

        switch (theLevel) {
                case ALL_LEVELS:
                case CLASS:     if (classUnit)
                                                strcat(theString,SEMTBL_NAME(classUnit->semVal));
                                        if (theLevel != ALL_LEVELS)
                                                break;

                case TYPE:      if (typeUnit) {
                                                strcat(theString, ";");
                                                strcat(theString, SEMTBL_NAME(typeUnit->semVal));
                                        }
                                        if (theLevel != ALL_LEVELS)
                                                break;

                case VAR:       if (varUnit) {
                                                strcat(theString, ":");
                                                strcat(theString, SEMTBL_NAME(varUnit->semVal));
                                        }
                                        if (theLevel != ALL_LEVELS)
                                                break;

                case ELEM:      if (elemUnit) {
                                                strcat(theString, ".");
                                                strcat(theString, SEMTBL_NAME(elemUnit->semVal));
                                        }
                                        break;
                default:        assert(FALSE);
        }
        return (theString);
}


/* --------------------------------------------------------------------------
        FUNCTION:       Addr2Level
        Purpose:        Return target level of address.
        Returns:        1-4, target level. (e.g. '12000' = 2)
        Note:           NO ADDRESS VALIDATION IS DONE -- assumes a valid address.
------------------------------------------------------------------------------ */
int Addr2Level(AddrPtr addr)
{
        int i = ADDREND;                        /* indexes last digit in address (excl. ItemSize) */

        while (addr[i]=='0' && i>0)             /* essentially subtracts # of zeros */
                --i;
        assert(i>=0  && i<=LEVELS);
        return (++i);
}

/* --------------------------------------------------------------------------
        FUNCTION:       Addr2TargetIndex
        Purpose:        Given an address, return zero-adjusted target index of the
                                proper level, adjusted for ItemSize.
        Returns:        0-3, index into an AddrText string.  0 means Class address
                                is desired, 1 = Types, 2 = Variations, 3 = Elements.
        Note:           This calculation is used all over the place.
------------------------------------------------------------------------------ */
int Addr2TargetIndex(AddrPtr addr)
{
        int ItemSize = ADDR_ITEMSIZE(addr);
        int targetIndex = Addr2Level(addr)-1-ItemSize;

        asserts(!(targetIndex<0 || targetIndex>3),"\n\n*** ItemSize of ItemSize illegal as target of operation in addr!
***\n");

        return (targetIndex);
}


/* --------------------------------------------------------------------------
        FUNCTION:       Addr2QuadPos
        Purpose:        Given an address, return Quad position of the unit in addr
        Returns:        1-4, position of unit in Quad.
        Note:           NO ADDRESS VALIDATION IS DONE -- assumes a valid address.
------------------------------------------------------------------------------ */
int Addr2QuadPos(AddrPtr addr)
{
        int quadPos = addr[Addr2TargetIndex(addr)]-'0';
        assert(quadPos>=1  && quadPos<=4);
        return (quadPos);
```

```
}

/* -------------------------------------------------------------------------
        FUNCTION:       AddrDiff
        Purpose:        Given two addresses, return level at which these addresses
                                become different.
        Returns:        0 = no difference.  Otherwise, 1-4 level where addresses
                                diverge.
---------------------------------------------------------------------------- */
int AddrDiff(AddrPtr addr1, AddrPtr addr2)
{
        int i;

        for (i=0; i<=3; ++i)
                if (addr1[i] != addr2[i])
                        return (++i);

        return (0);                                             /* addresses are the same! */
}


/* ========================== S T A T I C S ========================== */

/* -------------------------------------------------------------------------
        FUNCTION:       checkAddress
        Purpose:        Get Level & validate address (excl. ItemSize) for these
                                illegal sitautions:
                                        1) Leading Zero                 "0111"
                                        2) Imbedded Zero        "1011"
                                        3) Null byte doesn't terminate!
                                        4) Address pointer is null!
        Returns:        checkAddress returns the target level (1-4) of the address.
---------------------------------------------------------------------------- */
static int checkAddress(AddrPtr addr)
{
        int numDigits = 0;
        int i = ADDREND;

        asserts(addr, "\n\n*** NULL address pointer passed to checkAddress! ***\n");
        asserts(!(addr[ADDRSZ-1]),"\n\n*** NULL byte doesn't terminate address! ***\n");
        asserts(!(addr[0]=='0'),"\n\n*** Leading Zero in address not allowed! ***\n");

        do {
                char theDigit=addr[i];

                asserts(!((theDigit<'0') || (theDigit>'4')), "\n\n*** Illegal character in address not allowed!
***\n");

                if (addr[i]=='0') {
                        ASSERTS(!numDigits,"\n\n*** Illegal Address ***\n");
                }
                else ++numDigits;
        } while(i--);

        /* now make sure the ItemSize is available for the "level" (numDigits) */

        asserts(!(addr[ITEMSZ]<'0' || addr[ITEMSZ]>'0'+(numDigits)),"\n\n*** ItemSize out of range in address ***\n");

        return (numDigits);
}

/* $Log:          address.cc,v $
Revision 1.5  93/09/24  15:28:55  stephen
Cleaned up warnings.

Revision 1.4  93/05/27  16:32:15  stephen
Get SuperClass* from Document class...

Revision 1.3  93/05/24  21:33:22  stephen
Converted longjmp() into assets().

Revision 1.2  93/04/06  19:33:34  stephen
First General Revisions

Revision 1.1  93/03/31  22:33:44  stephen
Initial revision

 */
```

```
/* -----------------------------------------------------------------------
        ADDRESS.H
        Dramatica Model Address Translation Functions
        Copyright (C) 1993 Screenplay Systems Inc.
        Revised:        $Id: address.h,v 1.1 93/03/31 22:34:32 stephen Exp Locker: stephen $
----------------------------------------------------------------------- */

#ifndef __ADDRESS__
#define __ADDRESS__

#define  LEVELS          4               /* # of vertical levels, used to allocate/index ItemPtrs array */
#define SIZES            5               /* # of different item sizes (Unit, Quad, Set, ChessSet, SuperSet */
#define ADDRSZ           6               /* # of bytes in an address */

#define  ITEMSZ          4               /* index into address size digit */
#define ADDREND          3               /* index into end of address (minus ItemSize) */

#define  EMPTY_ADDR      "00000"  /* used to initialize an AddrText item we are building */

#define ALL_CLASSES                0               /* classLimit parameter for ForEveryAddr() */
#define  FOR_CONTINUE    -32001          /* Tells ForEveryAddr() to continue w/next iteration */
#define  FOR_RETURN                -32002          /* Tells ForEveryAddr() to return 'n' (the iteration #) */
#define  ALL_ITEMSIZES       -1          /* tells ForEveryLevel to generate addresses of every ItemSize */

#define ADDR_CLASS(p)             (p[0]-'0')
#define ADDR_TYPE(p)              (p[1]-'0')
#define ADDR_VARIATION(p)  (p[2]-'0')
#define ADDR_ELEMENT(p)           (p[3]-'0')
#define ADDR_ITEMSIZE(p)   (p[4]-'0')

#define  SAME_SIZE(a,b)           (a[4] == b[4])          /* compare two addresses ItemSIzes */

typedef  int      (*ForAddr_Proc)(AddrPtr pAddr, void *pInfo1, void *pInfo2);

/* -----------------------------------------------------------------------
        This structure is built by Addr2Ptr, and is a convenient way to get
        access to a lot of drill-down info based on a single address.

        Many operations, such as Flip & Swap, require this structure.

        Except for theAddress & theSuperClass, which are stored for convenience,
        each one of these guys will have its own Item.
----------------------------------------------------------------------- */


typedef struct {
        AddrText                theAddress;                     /* Copy of textual address for these pointers */
        SuperClass              *theSuperClass;         /* Ptr to SuperClass for these pointers */
        short                   level;                          /* Target level of address */
        void                    *itemPtrs[LEVELS][SIZES];  /* 4 x 5 array of ptrs to different sized items */
} AddrPtrStruct;


AddrPtrStruct *Addr2Ptrs(SuperClass *theSC, AddrPtr addr, AddrPtrStruct *aPtrs);
pStruct Addr2Ptr(SuperClass *theSC, AddrPtr addr);
Unit *Addr2Item(SuperClass *theSC, AddrPtr addr);
Unit *FindSemanticItem(SuperClass *searchSC, short semVal, AddrPtr theAddr, short *usersTable);
short *InitSemanticFindTable(SuperClass *theSC);
void DisposeSemanticFindTable(short *lookupArray);
int ForEveryAddr(ForAddr_Proc pForProc, short classLimit, short level, short ItemSize, void *pInfo1, void *pinfo2);
void ForEveryLevel(ForAddr_Proc theForProc, SuperClass *theSC, int theClass, int ItemSize);
char *Addr2PathString(SuperClass *theSC, AddrPtr addr, char *theString, short theLevel);
int Addr2Level(AddrPtr addr);
int Addr2TargetIndex(AddrPtr addr);
int Addr2QuadPos(AddrPtr addr);
int AddrDiff(AddrPtr addr1, AddrPtr addr2);


#endif /* __ADDRESS__ */


/* $Log:          address.h,v $
 * Revision 1.1  93/03/31  22:34:32  stephen
 * Initial revision
 *
 */
```

```
/* ----------------------------------------------------------------------
        APPRDEFS.H
        Defined Constants for new APPR segments & IDs
        Copyright (C) 1993 Screenplay Systems Inc.
        Revised:        $Id$
---------------------------------------------------------------------- */

#ifndef __APPRDEFS__
#define __APPRDEFS__

/************************************************************************
 *                                          NEW STYLE APPR SEGMENTS     (DYNAMICS)
 *
 ************************************************************************/

#define rApprResolve                1000
        #define rApprChange                     1001
        #define rApprSteadfast      1002

#define rApprDirection              1010
        #define rApprStop                       1011
        #define rApprStart                      1012

#define rApprApproach               1020
        #define rApprDoer                       1021
        #define rApprBeer                       1022

#define rApprSex                                1030
        #define rApprMale                       1031
        #define rApprFemale                     1032

#define rApprWork                               1040
        #define rApprAction                     1041
        #define rApprDecision       1042

#define rApprLimit                              1050
        #define rApprTimelock       1051
        #define rApprOptionlock     1052

#define rApprOutcome                1060
        #define rApprSuccess        1061
        #define rApprFailure        1062

#define rApprJudgment               1070
        #define rApprGood                       1071
        #define rApprBad                        1072

/************************************************************************
 *                                          NEW STYLE APPR SEGMENTS     (HIGH-LEVEL)
 *
 ************************************************************************/

#define rApprNature                                             1100
        #define rApprActualDilemma                      1101
        #define rApprApparentDilemma            1102
        #define rApprActualWork                         1103
        #define rApprApparentWork                       1104

#define rApprEssence                                    1110
        #define rApprPositive                           1111
        #define rApprNegative                           1112

#define rApprTendency                                   1120
        #define rApprWilling                            1121
        #define rApprUnwilling                          1122

#define rApprReach                                              1130
        #define rApprBoth                                       1131
        #define rApprMaleEmpathy                1132
        #define rApprFemaleEmpathy                      1133
        #define rApprNeither                            1134

/************************************************************************
 *                                          NEW STYLE APPR SEGMENTS     (APPRECIATIONS)
 *
 ************************************************************************/

#define rApprSTDom                  12000
#define rApprSTCon                  12100
#define rApprSTRng                  12200
#define rApprSTPbm                  12300
#define rApprSTStp                  12400
#define rApprSTSol                  12500
#define rApprSTFoc                  12600
#define rApprSTDir                  12700
#define rApprSTUnRng        12800
#define rApprSTCrFl                 12900
#define rApprSTOrd                  13000
#define rApprSTType1        13100
#define rApprSTType2        13200
#define rApprSTType3        13300
#define rApprSTType4        13400
#define rApprSTGoal                 13500
#define rApprSTReq                  13600
#define rApprSTHmCl                 13700
#define rApprSTRng2                 13800

#define rApprMCDom                  15000
#define rApprMCCon                  15100
#define rApprMCRng                  15200
#define rApprMCPbm                  15300
#define rApprMCStp                  15400
#define rApprMCSol                  15500
#define rApprMCFoc                  15600
#define rApprMCDir                  15700
#define rApprMCUnRng        15800
#define rApprMCCrFl                 15900
#define rApprMCOrd                  16000
#define rApprMCType1        16100
#define rApprMCType2        16200
#define rApprMCType3        16300
#define rApprMCType4        16400
```

```
#define  rApprMCGoal                     16500
#define  rApprMCReq                      16600
#define  rApprMCHmCl                     16700
#define  rApprMCRng2                     16800

#define  rApprOCDom                      18000
#define  rApprOCCon                      18100
#define  rApprOCRng                      18200
#define  rApprOCPbm                      18300
#define  rApprOCStp                      18400
#define  rApprOCSol                      18500
#define  rApprOCFoc                      18600
#define  rApprOCDir                      18700
#define  rApprOCUnRng            18800
#define  rApprOCCrFl                     18900
#define  rApprOCOrd                      19000
#define  rApprOCType1            19100
#define  rApprOCType2            19200
#define  rApprOCType3            19300
#define  rApprOCType4            19400
#define  rApprOCGoal                     19500
#define  rApprOCReq                      19600
#define  rApprOCHmCl                     19700
#define  rApprOCRng2                     19800

#define  rApprPLDom                      21000
#define  rApprPLCon                      21100
#define  rApprPLRng                      21200
#define  rApprPLPbm                      21300
#define  rApprPLStp                      21400
#define  rApprPLSol                      21500
#define  rApprPLFoc                      21600
#define  rApprPLDir                      21700
#define  rApprPLUnRng            21800
#define  rApprPLCrFl                     21900
#define  rApprPLOrd                      22000
#define  rApprPLType1            22100
#define  rApprPLType2            22200
#define  rApprPLType3            22300
#define  rApprPLType4            22400
#define  rApprPLGoal                     22500
#define  rApprPLReq                      22600
#define  rApprPLHmCl                     22700
#define  rApprPLRng2                     22800

#define  rLastApprVal            22800

/**************************************************************************
 *                                 DEFINES FOR SPECIFIC STRUCTURAL SEMVALS
        *
 *************************************************************************/

#define  rSvUniverse                                      1
#define  rSvPhysics                                       2
#define  rSvPsychology                          3
#define  rSvMind                                          4

#define  rSvPast                                          5
#define rSvProgress                                       6
#define rSvFuture                                         7
#define rSvPresent                                        8
#define rSvUnderstanding                9
#define rSvDoing                                10
#define rSvObtaining                            11
#define rSvLearning                                       12
#define rSvConceptualizing                      13
#define rSvBeing                                14
#define rSvBecoming                                       15
#define rSvConceiving                           16
#define rSvMemory                                         17
#define rSvPreconscious                         18
#define rSvSubconscious                         19
#define rSvConscious                            20

#define rSvFate                                           21
#define rSvPrediction                           22
#define rSvInterdiction                         23
#define rSvDestiny                                        24
#define rSvFact                                           25
#define rSvSecurity                                       26
#define rSvThreat                                         27
#define rSvFantasy                                        28
#define rSvOpenness                                       29
#define rSvDelay                                30
#define rSvChoice                                         31
#define rSvPreconception                32
#define rSvWork                                           33
#define rSvAttraction                           34
#define rSvRepulsion                            35
#define rSvAttempt                                        36
#define rSvInstinct                                       37
#define rSvSenses                                         38
#define rSvInterpretation               39
#define rSvConditioning                         40
#define rSvWisdom                                         41
#define rSvSkill                                42
#define rSvExperience                           43
#define rSvEnlightenment                44
#define rSvApproach                                       45
#define rSvSelfInterest                         46
#define rSvMorality                                       47
#define rSvAttitude                                       48
#define rSvPrerequisites                49
#define rSvStrategy                                       50
#define rSvAnalysis                                       51
#define rSvPreconditions                52
#define rSvStateOfBeing                         53
#define rSvSituation                            54
#define rSvCircumstances                55
#define rSvSenseOfSelf                          56
#define rSvKnowledgeVar                         57
#define rSvAbilityVar                           58
```

```
#define rSvDesireVar                      59
#define rSvThoughtVar                     60
#define rSvRationalization                61
#define rSvCommitment                     62
#define rSvResponsibility         63
#define rSvObligation                     64
#define rSvPermission                     65
#define rSvNeed                                   66
#define rSvExpediency                     67
#define rSvDeficiency                     68
#define rSvTruth                          69
#define rSvEvidence                               70
#define rSvSuspicion                      71
#define rSvFalsehood                      72
#define rSvValue                          73
#define rSvConfidence                     74
#define rSvWorry                          75
#define rSvWorth                          76
#define rSvClosure                                77
#define rSvHope                                   78
#define rSvDream                          79
#define rSvDenial                                 80
#define rSvInvestigation          81
#define rSvAppraisal                      82
#define rSvReappraisal                    83
#define rSvDoubt                          84

#define rSvAbilityElem                    85
#define rSvAcceptance                     86
#define rSvAccurate                               87
#define rSvActuality                      88
#define rSvAvoidance                      89
#define rSvAware                          90
#define rSvCause                          91
#define rSvCertainty                      92
#define rSvChange                                 93
#define rSvChaos                          94
#define rSvConscience                     95
#define rSvConsider                               96
#define rSvControlled                     97
#define rSvDeduction                      98
#define rSvDesireElem                     99
#define rSvDetermination          100
#define rSvDisbelief                      101
#define rSvEffect                                 102
#define rSvEnding                                 103
#define rSvEquity                                 104
#define rSvEvaluation                     105
#define rSvExpectation                    106
#define rSvFaith                          107
#define rSvFeeling                                108
#define rSvHelp                                   109
#define rSvHinder                                 110
#define rSvHunch                          111
#define rSvInaction                               112
#define rSvInduction                      113
#define rSvInequity                               114
#define rSvInertia                                115
#define rSvKnowledgeElem          116
#define rSvLogic                          117
#define rSvNonAcceptance          118
#define rSvNonAccurate                    119
#define rSvOppose                                 120
#define rSvOrder                          121
#define rSvPerception                     122
#define rSvPossibility                    123
#define rSvPotentiality                   124
#define rSvProaction                      125
#define rSvProbability                    126
#define rSvProcess                                127
#define rSvProduction                     128
#define rSvProjection                     129
#define rSvProtection                     130
#define rSvProven                                 131
#define rSvPursuit                                132
#define rSvReevaluation                   133
#define rSvReaction                               134
#define rSvReconsider                     135
#define rSvReduction                      136
#define rSvResult                                 137
#define rSvSelfAware                      138
#define rSvSpeculation                    139
#define rSvSupport                                140
#define rSvTemptation                     141
#define rSvTest                                   142
#define rSvTheory                                 143
#define rSvThoughtElem                    144
#define rSvTrust                          145
#define rSvUnEnding                               146
#define rSvUncontrolled                   147
#define rSvUnproven                               148

#endif /* __APPRDEFS__ */
```

```
/***********************************************************************
        APPREC.C
        Define and pre-initialize the Story Appreciations
        (c) 1993 Screenplay Systems
        Authors:        S. Greenfield & C. Huntley
        Created:        March 8, 1993
        Revised:        $Id$
************************************************************************

*/

#include <stdio.h>
#include <string.h>

#include "genutls.h"

#include "dramatic.h"
#include "document.h"
#include "structs.h"
#include "address.h"
#include "semtable.h"
#include "query.h"
#include "relation.h"
#include "opquad.h"
#include "apprec.h"
#include "apprdefs.h"
#include "justify.h"

#pragma segment apprec

static void SetOtherConcernsApprec(DRDoc* theDoc);
static void SetStipulations(DRDoc* theDoc);
static void SetOtherClassApprec(DRDoc* theDoc);
static void SetOtherRangeApprec(DRDoc* theDoc);
static void setObjConcern(DRDoc* theDoc, AddrText partnerAddr, enum APPRECS whichApprec);
static void setClassDomain(DRDoc* theDoc, AddrText partnerAddr, enum APPRECS whichApprec);

static void setObjRange(DRDoc* theDoc, AddrText partnerAddr,  enum APPRECS whichApprec);
static void setObjSolution(DRDoc* theDoc, AddrText partnerAddr,  enum APPRECS whichApprec);
static void setObjFocus(DRDoc* theDoc, AddrText partnerAddr, enum APPRECS whichApprec);
static void setObjDirection(DRDoc* theDoc, AddrText partnerAddr, enum APPRECS whichApprec);
static void SetDomTypeActOrders(DRDoc* theDoc);
static void setObjTypeActOrder(DRDoc* theDoc, SuperClass *theSC, enum APPRECS whichApprec, int whichClass);

static void DoTheMCElemApprec(DRDoc* theDoc);
static void DoTheOCElemApprec(DRDoc* theDoc);
static void DoThePlotElemApprec(DRDoc* theDoc);
static void SetUniqueRanges(DRDoc* theDoc);
static void SetObjCF(DRDoc* theDoc, AddrText theAddr, enum APPRECS whichApprec, short relationship);
static void SetCFApprec(DRDoc* theDoc);


/* ------------------------------------------------------------------------
        FUNCTION:       SetAllAppreciations
        Purpose:        Sets all of the determinable appreciations
------------------------------------------------------------------------ */
void SetAllAppreciations(DRDoc* theDoc)        /* makes all of the analyses to determine the appreciations and stores
results */
{
        SetOtherConcernsApprec(theDoc);       /* Set the OBSTACLE and PLOT objective concern appreciations */
        SetOtherClassApprec(theDoc);          /* Set the OBSTACLE and PLOT homeClass and objective domain appreciations */
        SetStipulations(theDoc);              /* Set the STORY, MAIN, OBSTACLE and PLOT objective stipulation
appreciations (requirement, pre-requisites, pre-conditions, & forewarnings */
        SetOtherRangeApprec(theDoc);          /* Set the OBSTACLE and PLOT range objective appreciations */
        SetUniqueRanges(theDoc);              /* Set the unique range information for all appreciations (like unique
ability) */
        DoTheMCElemApprec(theDoc);                    /* set the Main Character focus, solution, and direction elements
*/
        DoTheOCElemApprec(theDoc);                    /* set the Obstacle Character focus, solution, and direction
elements */
        DoThePlotElemApprec(theDoc);          // set the Plot focus, solution, problem and direction elements
        SetCFApprec(theDoc);                          /* set the critical flaw for MAIN and OBSTACLE characters */
        SetDomTypeActOrders(theDoc);
} /* SetAllAppreciations */


/* ------------------------------------------------------------------------
        FUNCTION:       SetObjStoryApprec
        Purpose:        Set the domain, concerns, range, and problem element appreciations
                                for the objective STORY or MAIN character
        Accepts:        AddrText of the problem element:
                                        if OP_OBJECTIVE:  passed curAddr after it has been built
                                        if OP_SUBJECTIVE:         passed the address entered by the user.
------------------------------------------------------------------------ */

void SetObjSimpleApprec(DRDoc* theDoc, SuperClass *theSC, AddrText theAddr, enum APPRECS whichApprec)
{
        AddrText tmpAddr;
        Unit *theUnit;

        strcpy(tmpAddr, theAddr);
//      strcpy(Appreciation[whichApprec].XXXfirstAddr,theAddr);                 /* store this for latter use */

        theUnit = Addr2Item(theSC, tmpAddr);                                            /* get the pointer to
the unit in the element position in the SuperClass */

        theDoc->SetApprValByIndex(MakeApprIndex(whichApprec, kProblem), theUnit->semVal);          /* stuff the index
into the semantic value table into the appreciations structure */
        tmpAddr[ELEM] = '0';                                                                                /*
zero out the element position so that we are ready to look at the variations */

        setObjRange(theDoc, tmpAddr,whichApprec);
        tmpAddr[VAR] = '0';
        /* zero out the variation position so that we are ready to look at the types */

        setObjConcern(theDoc, tmpAddr,whichApprec);
        tmpAddr[TYPE] = '0';                                                                                /*
zero out the type position so that we are ready to look at the class */

        setClassDomain(theDoc, tmpAddr, whichApprec);                                  /* set the homeClass and Domain
appreciations for the second Justification */

        semval_t problemSemVal = theDoc->GetApprValByIndex(MakeApprIndex(whichApprec, kProblem));
```

```
        GetFocusOrProblemAddr(theDoc, SEMTBL_ADDRESS(problemSemVal), tmpAddr);                          /* find the focus
element for the first justification appreciation */
        setObjFocus(theDoc, tmpAddr,whichApprec);
                /* set the focus in the appreciation table */

        problemSemVal = theDoc->GetApprValByIndex(MakeApprIndex(whichApprec, kProblem));
        GetPartner(INDEPENDENT, DYNAMIC, SEMTBL_ADDRESS(problemSemVal), tmpAddr);
        setObjSolution(theDoc, tmpAddr,whichApprec);
                                                /* set the solution element */

        semval_t focusSemVal = theDoc->GetApprValByIndex(MakeApprIndex(whichApprec, kFocus));
        GetPartner(INDEPENDENT, DYNAMIC, SEMTBL_ADDRESS(focusSemVal), tmpAddr);
        setObjDirection(theDoc, tmpAddr,whichApprec);
                                                /* set the direction element */
} /* SetObjSimpleApprec */


/* ----------------------------------------------------------------------
        FUNCTION:       SetStipulations
        Purpose:        Set the STORY, MAIN, OBSTACLE and PLOT stipulation appreciations
                                (requirement, pre-requisites, pre-conditions, & forewarnings)
        NOTE:           Must have run SetObjSimpleApprec first (twice)

                if FEMALE:

                                        SUCCESS
           FAILURE
                ------------------------------------------------------------------
                            | STEADFAST |  CHANGE  |               | CHANGE   | STEADFAST
                ------------+-----------+----------+---------------+----------+----------
                DECISION    |    +_     |    -_                    | DECISION            |    +_     |     -_
                ------------+-----------+--------------------------+----------+----------
                ACTION      |    -_     |    +_    | ACTION        |    -_    |    +_
                ------------------------------------------------------------------

                This table limits the possible choice to two.  Only one will be available
                because Female cannot be in the same DEPENDENT pair as the "concern" (goal)

                **********************************************************************

                if MALE:

                                        GOOD
           BAD
                ------------------------------------------------------------------
                            | STEADFAST |  CHANGE  |               | CHANGE   | STEADFAST
                ------------+-----------+----------+---------------+----------+----------
                ACTION      |    +|     |    -|                    | ACTION              |    +|     |     -|
                ------------+-----------+--------------------------+----------+----------
                DECISION    |    -|     |    +|    | DECISION      |    -|    |    +|
                ------------------------------------------------------------------

                This table limits the possible choice to two.  Only one will be available
                because Male cannot be in the same COMPANION pair as the "concern" (goal)
---------------------------------------------------------------------- */

static void SetStipulations(DRDoc* theDoc)
{
        Unit *theUnit;
        AddrText storyAddr, mainAddr, tmpAddr, tmpAddr2;
        short whichType,cType;

        assert(theDoc->GetApprValByIndex(kApprSTHmCl));                 /* test to make sure the needed information has
been set */

        strcpy(tmpAddr2,SEMTBL_ADDRESS(theDoc->GetApprValByIndex(kApprSTCon)));
        cType=tmpAddr2[TYPE]-'0';                                                       /* assign the type "concern"
quad position to cType */

        if (MALE) {                                                                                             /*
positive companion pair */
                if (GOOD) {
                        if (STEADFAST) {
                                if (ACTION) {
                                        if (cType == 1 || cType == 2)
                                                whichType = '3';
                                        else
                                                whichType = '1';
                                }
                                else {  /* DECISION */
                                        if (cType == 1 || cType == 2)
                                                whichType = '4';
                                        else
                                                whichType = '2';
                                }
                        }
                        else {  /* CHANGE */
                                if (ACTION) {
                                        if (cType == 1 || cType == 2)
                                                whichType = '4';
                                        else
                                                whichType = '2';
                                }
                                else {  /* DECISION */
                                        if (cType == 1 || cType == 2)
                                                whichType = '3';
                                        else
                                                whichType = '1';
                                }
                        }
                }
                else {  /* BAD */
                        if (CHANGE) {
                                if (ACTION) {
                                        if (cType == 1 || cType == 2)
                                                whichType = '3';
                                        else
                                                whichType = '1';
                                }
                                else {  /* DECISION */
                                        if (cType == 1 || cType == 2)
```

```
                                        whichType = '4';
                                else
                                        whichType = '2';
                        }
                }
                else {  /* STEADFAST */
                        if (ACTION) {
                                if (cType == 1 || cType == 2)
                                        whichType = '4';
                                else
                                        whichType = '2';
                        }
                        else {  /* DECISION */
                                if (cType == 1 || cType == 2)
                                        whichType = '3';
                                else
                                        whichType = '1';
                        }
                }
        }
}
else {  /* ******************************** FEMALE ********************************/
        if (SUCCESS) {
                if (STEADFAST) {
                        if (DECISION) {
                                if (cType == 1 || cType == 3)
                                        whichType = '2';
                                else
                                        whichType = '1';
                        }
                        else {  /* ACTION */
                                if (cType == 1 || cType == 3)
                                        whichType = '4';
                                else
                                        whichType = '3';
                        }
                }
                else {  /* CHANGE */
                        if (ACTION) {
                                if (cType == 1 || cType == 3)
                                        whichType = '2';
                                else
                                        whichType = '1';
                        }
                        else {  /* DECISION */
                                if (cType == 1 || cType == 3)
                                        whichType = '4';
                                else
                                        whichType = '3';
                        }
                }
        }
        else { /* FAILURE */
                if (CHANGE) {
                        if (DECISION) {
                                if (cType == 1 || cType == 3)
                                        whichType = '2';
                                else
                                        whichType = '1';
                        }
                        else {  /* ACTION */
                                if (cType == 1 || cType == 3)
                                        whichType = '4';
                                else
                                        whichType = '3';
                        }
                }
                else {  /* STEADFAST */
                        if (ACTION) {
                                if (cType == 1 || cType == 3)
                                        whichType = '2';
                                else
                                        whichType = '1';
                        }
                        else {  /* DECISION */
                                if (cType == 1 || cType == 3)
                                        whichType = '4';
                                else
                                        whichType = '3';
                        }
                }
        }
}
        strcpy(storyAddr,SEMTBL_ADDRESS(theDoc->GetApprValByIndex(kApprSTCon)));/* copy the address of the story concern
into the storyAddr */
        storyAddr[TYPE] = whichType;
                /* stuff the position of the stipulation into the type portion of the storyAddr */
        theUnit = Addr2Item(RefSC, storyAddr);
        /* get the pointer to the unit in the variation position in the SuperClass */
        theDoc->SetApprValByIndex(kApprSTStp, theUnit->semVal);                                    /*
stipulation: stuff the index into the semantic value table into the appreciations structure */
        theDoc->SetApprValByIndex(kApprSTReq, theUnit->semVal);                                    /*
requirement: stuff the index into the semantic value table into the appreciations structure */

        GetPartner(INVERSE, DYNAMIC, storyAddr, tmpAddr);                                          /* AP_PLOT
Stipulation is the Dynamic INVERSE position to the AP_STORY class */
        theUnit = Addr2Item(RefSC, tmpAddr);
        /* get the pointer to the unit in the variation position in the SuperClass */
        theDoc->SetApprValByIndex(kApprPLStp, theUnit->semVal);                                    /*
stipulation: stuff the index into the semantic value table into the appreciations structure */
        theDoc->SetApprValByIndex(kApprPLReq, theUnit->semVal);                                    /*
requirement: stuff the index into the semantic value table into the appreciations structure */

        strcpy(mainAddr, storyAddr);
        mainAddr[CLASS] = (char)theDoc->GetApprValByIndex(kApprMCHmCl);                         /* begin building main
character's stipulation (pre-conditions) by changing mainAddr to MC home class */
        theUnit = Addr2Item(RefSC, mainAddr);
        /* get the pointer to the unit in the variation position in the SuperClass */
        theDoc->SetApprValByIndex(kApprMCStp, theUnit->semVal);                                    /*
stipulation: stuff the index into the semantic value table into the appreciations structure */
        theDoc->SetApprValByIndex(kApprMCReq, theUnit->semVal);                                    /*
requirement: stuff the index into the semantic value table into the appreciations structure */
```

```
        GetPartner(INVERSE, DYNAMIC, mainAddr, tmpAddr);                                        /*
AP_OBSTACLE Stipulation is the Dynamic INVERSE position to the AP_STORY class */
        theUnit = Addr2Item(RefSC, tmpAddr);
        /* get the pointer to the unit in the variation position in the SuperClass */
        theDoc->SetApprValByIndex(kApprOCStp, theUnit->semVal);                                 /*
stipulation: stuff the index into the semantic value table into the appreciations structure */
        theDoc->SetApprValByIndex(kApprOCReq, theUnit->semVal);                                 /*
requirement: stuff the index into the semantic value table into the appreciations structure */
} /* SetStipulations */


/* ---------------------------------------------------------------------
        FUNCTION:       SetUniqueRanges
        Purpose:        Set the STORY, MAIN, OBSTACLE and PLOT unique range appreciations
                                (unique ability, ???) in the variation level.
        NOTE:           Must have run SetObjSimpleApprec first (twice)

                if MALE:

                                        GOOD
        BAD
                -----------------------------------------------------------------
                                |  STOP   |  START  |            |  START  |  STOP
                ------------+----------+----------+------------+----------+----------
                DOER            |  +_     |    -_   |  DOER                 |  +_    |    -_
                ------------+----------+----------+------------+----------+----------
                BEER            |  -_     |  +_     |  BEER       |  -_     |  +_
                -----------------------------------------------------------------

                This table limits the possible choice to two.  Only one will be available
                because Male cannot be in the same DEPENDENT pair as the "range" (var)

                *****************************************************************

                if FEMALE:

                                        SUCCESS
        FAILURE
                -----------------------------------------------------------------
                                |  STOP   |  START  |            |  START  |  STOP
                ------------+----------+----------+------------+----------+----------
                DOER            |   +|    |    -|   |  DOER                 |  +|    |    -|
                ------------+----------+----------+------------+----------+----------
                BEER            |   -|    |   +|    |  BEER       |  -|     |  +|
                -----------------------------------------------------------------

                This table limits the possible choice to two.  Only one will be available
                because Female cannot be in the same COMPANION pair as the "range" (var)

--------------------------------------------------------------------------- */

void SetUniqueRanges(DRDoc* theDoc)
{
        Unit *theUnit;
        AddrText storyAddr, mainAddr, tmpAddr, tmpAddr2;
        short whichVar, vType;

        assert(theDoc->GetApprValByIndex(kApprSTHmCl));                 /* test to make sure the needed information has
been set */

        strcpy(tmpAddr2,SEMTBL_ADDRESS(theDoc->GetApprValByIndex(kApprSTRng)));
        vType=tmpAddr2[VAR]-'0';                                                /* assign the type "range" quad
position to vType */

        if (FEMALE) {                                                                           /*
positive companion pair */
                if (SUCCESS) {
                        if (STOP) {
                                if (DOER) {
                                        if (vType == 1 || vType == 2)
                                                whichVar = '3';
                                        else
                                                whichVar = '1';
                                }
                                else {  /* BEER */
                                        if (vType == 1 || vType == 2)
                                                whichVar = '4';
                                        else
                                                whichVar = '2';
                                }
                        }
                        else {  /* START */
                                if (DOER) {
                                        if (vType == 1 || vType == 2)
                                                whichVar = '4';
                                        else
                                                whichVar = '2';
                                }
                                else {  /* BEER */
                                        if (vType == 1 || vType == 2)
                                                whichVar = '3';
                                        else
                                                whichVar = '1';
                                }
                        }
                }
                else {  /* FAILURE */
                        if (START) {
                                if (DOER) {
                                        if (vType == 1 || vType == 2)
                                                whichVar = '3';
                                        else
                                                whichVar = '1';
                                }
                                else {  /* BEER */
                                        if (vType == 1 || vType == 2)
                                                whichVar = '4';
```

```
                        else
                                whichVar = '2';
                }
        }
        else {  /* STOP */
                if (DOER) {
                        if (vType == 1 || vType == 2)
                                whichVar = '4';
                        else
                                whichVar = '2';
                }
                else {  /* BEER */
                        if (vType == 1 || vType == 2)
                                whichVar = '3';
                        else
                                whichVar = '1';
                }
        }
    }
}
else {  /* ******************************** MALE ********************************/
    if (GOOD) {
        if (STOP) {
                if (DOER) {
                        if (vType == 1 || vType == 3)
                                whichVar = '2';
                        else
                                whichVar = '1';
                }
                else {  /* BEER */
                        if (vType == 1 || vType == 3)
                                whichVar = '4';
                        else
                                whichVar = '3';
                }
        }
        else {  /* START */
                if (BEER) {
                        if (vType == 1 || vType == 3)
                                whichVar = '2';
                        else
                                whichVar = '1';
                }
                else {  /* DOER */
                        if (vType == 1 || vType == 3)
                                whichVar = '4';
                        else
                                whichVar = '3';
                }
        }
    }
    else { /* BAD */
        if (START) {
                if (DOER) {
                        if (vType == 1 || vType == 3)
                                whichVar = '2';
                        else
                                whichVar = '1';
                }
                else {  /* BEER */
                        if (vType == 1 || vType == 3)
                                whichVar = '4';
                        else
                                whichVar = '3';
                }
        }
        else {  /* STOP */
                if (BEER) {
                        if (vType == 1 || vType == 3)
                                whichVar = '2';
                        else
                                whichVar = '1';
                }
                else {  /* DOER */
                        if (vType == 1 || vType == 3)
                                whichVar = '4';
                        else
                                whichVar = '3';
                }
        }
    }
}

        strcpy(storyAddr,SEMTBL_ADDRESS(theDoc->GetApprValByIndex(kApprSTRng)));/* copy the address of the story concern
into the storyAddr */
        storyAddr[VAR] = whichVar;
                        /* stuff the position of the stipulation into the type portion of the storyAddr */
        theUnit = Addr2Item(RefSC, storyAddr);
        /* get the pointer to the unit in the variation position in the SuperClass */
        theDoc->SetApprValByIndex(kApprSTUnRng, theUnit->semVal);                    /* (uniqueRange is the
STORY unique Ability) stuff the index into the semantic value table into the appreciations structure */

        GetPartner(CORRESPONDENT, DYNAMIC, storyAddr, tmpAddr);                          /* AP_PLOT
Unique Range is the Dynamic CORRESPONDENT position to the AP_STORY class */
        theUnit = Addr2Item(RefSC, tmpAddr);
        /* get the pointer to the unit in the variation position in the SuperClass */
        theDoc->SetApprValByIndex(kApprPLUnRng, theUnit->semVal);                    /* stuff the index
into the semantic value table into the appreciations structure */

        strcpy(mainAddr, storyAddr);
        mainAddr[CLASS] = (char)theDoc->GetApprValByIndex(kApprMCHmCl);;          /* begin building main
character's stipulation (pre-conditions) by changing mainAddr to MC home class */
        theUnit = Addr2Item(RefSC, mainAddr);
        /* get the pointer to the unit in the variation position in the SuperClass */
        theDoc->SetApprValByIndex(kApprMCUnRng, theUnit->semVal);                    /* (uniqueRange is the
MAIN CHARACTER'S unique Ability) stuff the index into the semantic value table into the appreciations structure */

        GetPartner(CORRESPONDENT, DYNAMIC, mainAddr, tmpAddr);                           /*
AP_OBSTACLE Unique Range is the Dynamic CORRESPONDENT position to the AP_STORY class */
        theUnit = Addr2Item(RefSC, tmpAddr);
        /* get the pointer to the unit in the variation position in the SuperClass */
        theDoc->SetApprValByIndex(kApprOCUnRng, theUnit->semVal);                    /* stuff the index
into the semantic value table into the appreciations structure */
```

```
} /* SetUniqueRanges */

/* -----------------------------------------------------------------------
	FUNCTION:		SetDomTypeActOrders
	Purpose:		Set the Domain Act order appreciations
----------------------------------------------------------------------- */
static void SetDomTypeActOrders(DRDoc* theDoc)
{
	AddrText classAddr, typeAddr;
	Unit *theUnit;
	short c, i;

	SuperClass* mySC		= theDoc->GetSuperClass(kMySC);
	SuperClass* just1SC = theDoc->GetSuperClass(kJust1SC);
	SuperClass* just2SC = theDoc->GetSuperClass(kJust2SC);

	strcpy(classAddr, "10000");
	strcpy(typeAddr, "10000");

	if (MALE)
		*mySC = *just2SC;
	else
		*mySC = *just1SC;

	for (c=1; c<=4; ++c) {
		classAddr[CLASS] = c+'0';
		theUnit = Addr2Item(mySC, classAddr);						/* get the
pointer to the unit in the variation position in the SuperClass */
		for (i = 0; i <= 3; ++i) {
			if (theDoc->GetApprValByIndex(MakeApprIndex(i, kDomain)) == theUnit->semVal)
				theDoc->SetApprValByIndex(MakeApprIndex(i, kOrder), i+1);
		}
	}

	typeAddr[TYPE] = '1';								// we are looking for the
reference types in the justified superclass
	for (c=1; c<=4; ++c) {
		typeAddr[CLASS] = c+'0';
		theUnit = Addr2Item(mySC, typeAddr);						/* get the
pointer to the unit in the variation position in the SuperClass */
		for (i = 0; i <= 3; ++i) {
			if (SEMTBL_ADDRESS(theDoc->GetApprValByIndex(MakeApprIndex(i, kDomain)))[CLASS] ==
					SEMTBL_ADDRESS(theUnit->semVal)[CLASS]) {
					setObjTypeActOrder(theDoc, mySC, (enum APPRECS)i, c);
			}
		}
	}

	theDoc->SaveSuperClass(kMySC, kSaveSC);
	theDoc->SaveSuperClass(kJust1SC, kNoSaveSC);
	theDoc->SaveSuperClass(kJust2SC, kNoSaveSC);
} /* SetDomTypeActOrders */

/* -----------------------------------------------------------------------
	FUNCTION:		setObjTypeActOrder
	Purpose:		Set Objective Type Act order appreciations
----------------------------------------------------------------------- */
static void setObjTypeActOrder(DRDoc* theDoc, SuperClass *theSC, enum APPRECS whichApprec, int whichClass)
{
	AddrText typeAddr;
	Unit *theUnit;
	short t;

	strcpy(typeAddr, "10000");

	typeAddr[CLASS]= whichClass+'0';

	for (t=1; t<=4; ++t) {
		typeAddr[TYPE] = t+'0';
		theUnit = Addr2Item(theSC, typeAddr);
					/* get the pointer to the unit in the variation position in the
SuperClass */
		theDoc->SetApprValByIndex(MakeApprIndex(whichApprec, (kType1-1)+t),theUnit->semVal);	/* stuff the
index into the semantic value table into the appreciations structure */
	}
} /* setObjTypeActOrder */


/* -----------------------------------------------------------------------
	FUNCTION:		SetCFApprec
	Purpose:		Set the Critical Flaw appreciations
----------------------------------------------------------------------- */
void SetCFApprec(DRDoc* theDoc)
{
	short relationship;

	if (CHANGE)
		relationship = DYNAMIC;
	else
		relationship = COMPANION;

	SetObjCF(theDoc, SEMTBL_ADDRESS(theDoc->GetApprValByIndex(kApprMCUnRng)), AP_MAIN, relationship);
	SetObjCF(theDoc, SEMTBL_ADDRESS(theDoc->GetApprValByIndex(kApprOCUnRng)), AP_OBSTACLE, relationship);
	SetObjCF(theDoc, SEMTBL_ADDRESS(theDoc->GetApprValByIndex(kApprSTUnRng)), AP_STORY, relationship);
	SetObjCF(theDoc, SEMTBL_ADDRESS(theDoc->GetApprValByIndex(kApprPLUnRng)), AP_PLOT, relationship);
} /* SetCFApprec */


/* -----------------------------------------------------------------------
	FUNCTION:		SetObjCF
	Purpose:		Set the Critical Flaw for the given appreciation
----------------------------------------------------------------------- */
void SetObjCF(DRDoc* theDoc, AddrText theAddr, enum APPRECS whichApprec, short relationship)
{
	AddrText tmpAddr2, tmpAddr3;
	Unit *theUnit;

	assert(theDoc->GetApprValByIndex(kApprSTHmCl));				/* test to make sure the needed information has
been set */
```

```
        GetPartner(INDEPENDENT, relationship, theAddr, tmpAddr2);
        GetPartner(CORRESPONDENT, relationship, tmpAddr2, tmpAddr3);

        theUnit = Addr2Item(RefSC, tmpAddr3);                                                    /*
get the pointer to the unit in the variation position in the SuperClass */
        theDoc->SetApprValByIndex(MakeApprIndex(whichApprec, kCriticalFlaw), theUnit->semVal);
} /* SetObjCF */


/* -----------------------------------------------------------------------
        FUNCTION:       SetOtherClassApprec
        Purpose:        Set the OBSTACLE and PLOT homeClass and domain appreciations
----------------------------------------------------------------------- */
static void SetOtherClassApprec(DRDoc* theDoc)
{
        AddrText partnerAddr;

        assert(theDoc->GetApprValByIndex(kApprSTHmCl));                /* test to make sure the needed information has
been set */

        GetPartner(INDEPENDENT, DYNAMIC, SEMTBL_ADDRESS(theDoc->GetApprValByIndex(kApprSTDom)), partnerAddr);      /*
AP_PLOT Domain is the Dynamic INDEPENDENT position to the AP_STORY class */
        setClassDomain(theDoc, partnerAddr, AP_PLOT);
                                                                /* set the homeClass and Domain appreciations for
the Plot */
        GetPartner(INDEPENDENT, DYNAMIC, SEMTBL_ADDRESS(theDoc->GetApprValByIndex(kApprMCDom)), partnerAddr);      /*
AP_OBSTACLE Domain is the Dynamic INDEPENDENT position to the AP_MAIN class */
        setClassDomain(theDoc, partnerAddr, AP_OBSTACLE);
                                                        /* set the homeClass and Domain appreciations for the Plot
*/
} /* SetOtherClassApprec */


/* -----------------------------------------------------------------------
        FUNCTION:       SetOtherConcernsApprec
        Purpose:        Set the OBSTACLE and PLOT concern appreciations
----------------------------------------------------------------------- */
static void SetOtherConcernsApprec(DRDoc* theDoc)
{
        AddrText partnerAddr;

        assert(theDoc->GetApprValByIndex(kApprSTHmCl));                /* test to make sure the needed information has
been set */

        GetPartner(INVERSE, DYNAMIC, SEMTBL_ADDRESS(theDoc->GetApprValByIndex(kApprSTCon)), partnerAddr);  /*
toAppreciation Concern is the Dynamic INVERSE position to the fromAppreciation class */
        setObjConcern(theDoc, partnerAddr,AP_PLOT);
        GetPartner(INVERSE, DYNAMIC, SEMTBL_ADDRESS(theDoc->GetApprValByIndex(kApprMCCon)), partnerAddr);  /*
toAppreciation Concern is the Dynamic INVERSE position to the fromAppreciation class */
        setObjConcern(theDoc, partnerAddr, AP_OBSTACLE);
} /* SetOtherConcernsApprec */


/* -----------------------------------------------------------------------
        FUNCTION:       SetOtherRangeApprec
        Purpose:        Set the OBSTACLE and PLOT range appreciations
----------------------------------------------------------------------- */
static void SetOtherRangeApprec(DRDoc* theDoc)
{
        AddrText partnerAddr;

        assert(theDoc->GetApprValByIndex(kApprSTHmCl));                /* test to make sure the needed information has
been set */

        GetPartner(CORRESPONDENT, DYNAMIC, SEMTBL_ADDRESS(theDoc->GetApprValByIndex(kApprSTRng)), partnerAddr);     /*
toAppreciation Range is the Dynamic CORRESPONDENT position to the fromAppreciation class */
        setObjRange(theDoc, partnerAddr,AP_PLOT);
        GetPartner(CORRESPONDENT, DYNAMIC, SEMTBL_ADDRESS(theDoc->GetApprValByIndex(kApprMCRng)), partnerAddr);     /*
toAppreciation Range is the Dynamic CORRESPONDENT position to the fromAppreciation class */
        setObjRange(theDoc, partnerAddr,AP_OBSTACLE);
} /* SetOtherRangeApprec */


/* -----------------------------------------------------------------------
        FUNCTION:       setClassDomain
        Purpose:        Set Objective homeClass & Domain appreciations
        Accepts:        the address of the Domain
                                the appreciation that is being set (AP_OBSTACLE, AP_PLOT, etc.)
----------------------------------------------------------------------- */
static void setClassDomain(DRDoc* theDoc, AddrText partnerAddr, enum APPRECS whichApprec)
{
        Unit *theUnit;

        theDoc->SetApprValByIndex(MakeApprIndex(whichApprec, kHomeClass), (semval_t)partnerAddr[CLASS]);        /*
set the homeClass */

        theUnit = Addr2Item(RefSC, partnerAddr);
                        /* get the pointer to the unit in the class position in the SuperClass */
        theDoc->SetApprValByIndex(MakeApprIndex(whichApprec, kDomain), theUnit->semVal);       /* set the homeClass
*/
} /* setClassDomain */


/* -----------------------------------------------------------------------
        FUNCTION:       setObjConcern
        Purpose:        Set Objective concern appreciations
        Accepts:        the address of the concern
                                the appreciation that is being set (AP_OBSTACLE, AP_PLOT, etc.)
----------------------------------------------------------------------- */
static void setObjConcern(DRDoc* theDoc, AddrText partnerAddr, enum APPRECS whichApprec)
{
        Unit *theUnit;

        theUnit = Addr2Item(RefSC, partnerAddr);
                        /* get the pointer to the unit in the type position in the SuperClass */
        theDoc->SetApprValByIndex(MakeApprIndex(whichApprec, kConcern), theUnit->semVal);      /* concern: stuff the
index into the semantic value table into the appreciations structure */
        theDoc->SetApprValByIndex(MakeApprIndex(whichApprec, kGoal), theUnit->semVal);         /* goal: stuff the
index into the semantic value table into the appreciations structure */
} /* setObjConcern */
```

```
/* ----------------------------------------------------------------------
        FUNCTION:       setObjRange
        Purpose:        Set Objective range appreciations
        Accepts:        the address of the range
                                the appreciation that is being set (AP_OBSTACLE, AP_PLOT, etc.)
                                Also sets the Range2 (thematic counterpoint) appreciation
---------------------------------------------------------------------------- */
static void setObjRange(DRDoc* theDoc, AddrText partnerAddr, enum APPRECS whichApprec)
{
        Unit *theUnit;

        theUnit = Addr2Item(RefSC, partnerAddr);
                /* get the pointer to the unit in the variation position in the SuperClass */
        theDoc->SetApprValByIndex(MakeApprIndex(whichApprec, kRange), theUnit->semVal);  /* stuff the index into the
semantic value table into the appreciations structure */

        AddrText rng2Addr;
                                        // this is to set the Range2 (thematic counterpoint) appreciation
        GetPartner(INDEPENDENT, DYNAMIC, partnerAddr, rng2Addr);                                // get the
dynamic pair of the range variation
        theUnit = Addr2Item(RefSC, rng2Addr);
                /* get the pointer to the unit in the variation position in the SuperClass */
        theDoc->SetApprValByIndex(MakeApprIndex(whichApprec, kRange2), theUnit->semVal);        /* stuff the index
into the semantic value table into the appreciations structure */

} /* setObjRange */


/* ----------------------------------------------------------------------
        FUNCTION:       setObjProblem
        Purpose:        Set Objective problem appreciation
        Accepts:        the address of the problem
                                the appreciation that is being set (AP_OBSTACLE, AP_PLOT, etc.)
---------------------------------------------------------------------------- */
static void setObjProblem(DRDoc* theDoc, AddrText partnerAddr, enum APPRECS whichApprec)
{
        Unit *theUnit;

        theUnit = Addr2Item(RefSC, partnerAddr);
                        /* get the pointer to the unit in the variation position in the SuperClass */
        theDoc->SetApprValByIndex(MakeApprIndex(whichApprec, kProblem), theUnit->semVal);       /* stuff the index
into the semantic value table into the appreciations structure */
} /* setObjProblem */


/* ----------------------------------------------------------------------
        FUNCTION:       setObjSolution
        Purpose:        Set Objective solution appreciation
        Accepts:        the address of the solution
                                the appreciation that is being set (AP_OBSTACLE, AP_PLOT, etc.)
---------------------------------------------------------------------------- */
static void setObjSolution(DRDoc* theDoc, AddrText partnerAddr, enum APPRECS whichApprec)
{
        Unit *theUnit;

        theUnit = Addr2Item(RefSC, partnerAddr);
                        /* get the pointer to the unit in the variation position in the SuperClass */
        theDoc->SetApprValByIndex(MakeApprIndex(whichApprec, kSolution), theUnit->semVal);      /* stuff the index
into the semantic value table into the appreciations structure */
} /* setObjSolution */


/* ----------------------------------------------------------------------
        FUNCTION:       setObjFocus
        Purpose:        Set Objective focus appreciation
        Accepts:        the address of the focus
                                the appreciation that is being set (AP_OBSTACLE, AP_PLOT, etc.)
---------------------------------------------------------------------------- */
static void setObjFocus(DRDoc* theDoc, AddrText partnerAddr, enum APPRECS whichApprec)
{
        Unit *theUnit;

        theUnit = Addr2Item(RefSC, partnerAddr);
                /* get the pointer to the unit in the variation position in the SuperClass */
        theDoc->SetApprValByIndex(MakeApprIndex(whichApprec, kFocus), theUnit->semVal);  /* stuff the index into the
semantic value table into the appreciations structure */
} /* setObjFocus */


/* ----------------------------------------------------------------------
        FUNCTION:       setObjDirection
        Purpose:        Set Objective direction appreciations
        Accepts:        the address of the direction
                                the appreciation that is being set (AP_OBSTACLE, AP_PLOT, etc.)
---------------------------------------------------------------------------- */
static void setObjDirection(DRDoc* theDoc, AddrText partnerAddr, enum APPRECS whichApprec)
{
        Unit *theUnit;

        theUnit = Addr2Item(RefSC, partnerAddr);
                        /* get the pointer to the unit in the variation position in the SuperClass */
        theDoc->SetApprValByIndex(MakeApprIndex(whichApprec, kDirection), theUnit->semVal);     /* stuff the index
into the semantic value table into the appreciations structure */
} /* setObjDirection */


/* ----------------------------------------------------------------------
        FUNCTION:       GetFocusOrProblemAddr
        Purpose:        Given a either a problem element or focus element address,
                                builds the other element's address.
---------------------------------------------------------------------------- */
void GetFocusOrProblemAddr(DRDoc* theDoc, AddrPtr firstAddr, AddrPtr secondAddr)
{
        int theElement;
        int otherQuadPos;

        strcpy(secondAddr, firstAddr);                                                                  /*
copy the first address to the second -- the only difference between the two will be the element position */
```

```
        theElement = ADDR_ELEMENT(firstAddr);                                               /* find which
quad position the first element is in */

        if (START)
                        /* START_SKEW */
                otherQuadPos = Relations[DEPENDENT][theElement-1];                   /* the other element will be in
a dependent pair relationship if this is a START story */
        else
                        /* else STOP_SKEW */
                otherQuadPos = Relations[COMPANION][theElement-1];                   /* the other element will be in
a companion pair relationship if this is a STOP story */

        secondAddr[ELEM] = otherQuadPos+'0';                                                /* change the
ELEM value of the secondAddr */
} /* GetFocusOrProblemAddr */


/* ------------------------------------------------------------------------
        FUNCTION:       DoTheMCElemApprec
        Purpose:        Get the solution, focus and direction elements for the
                                Main Character.
--------------------------------------------------------------------------- */
static void DoTheMCElemApprec(DRDoc* theDoc)
{
        AddrText tmpAddr, tmpAddr2;
        AddrText mcFocusAddr, mcProblemAddr;
        int relationship;

        strcpy(tmpAddr, EMPTY_ADDR);
        strcpy(tmpAddr2, EMPTY_ADDR);

        tmpAddr[CLASS]    = (char)theDoc->GetApprValByIndex(kApprSTHmCl);
        tmpAddr2[CLASS] = (char)theDoc->GetApprValByIndex(kApprMCHmCl);
        relationship = GetRelationship(tmpAddr, tmpAddr2);
        if (CHANGE) {                                                                                          /*
we will have the same problem semantic as the story */
                SemanticPartner(RefSC, relationship, SEMTBL_ADDRESS(theDoc->GetApprValByIndex(kApprSTPbm)),
mcProblemAddr);    /* finds the semantic partner of the problem in the Objective class (refSC) in the Subjective class
(refSC) and stuffs it into the tempSubAddr */
                GetFocusOrProblemAddr(theDoc, mcProblemAddr, mcFocusAddr);
                setObjProblem(theDoc, mcProblemAddr, AP_MAIN);
        }
        else {
                GetFocusOrProblemAddr(theDoc, SEMTBL_ADDRESS(theDoc->GetApprValByIndex(kApprMCPbm)), mcFocusAddr);
                strcpy(mcProblemAddr, SEMTBL_ADDRESS(theDoc->GetApprValByIndex(kApprMCPbm)));
        }
        setObjFocus(theDoc, mcFocusAddr, AP_MAIN);
        GetPartner(INDEPENDENT, DYNAMIC, mcProblemAddr, tmpAddr);
        setObjSolution(theDoc, tmpAddr, AP_MAIN);
        GetPartner(INDEPENDENT, DYNAMIC, mcFocusAddr, tmpAddr);
        setObjDirection(theDoc, tmpAddr, AP_MAIN);
} /*  DoTheMCElemApprec */


/* ------------------------------------------------------------------------
        FUNCTION:       DoTheOCElemApprec
        Purpose:        Get the solution, focus and direction elements for the
                                Obstacle Character.
--------------------------------------------------------------------------- */
static void DoTheOCElemApprec(DRDoc* theDoc)
{
        AddrText tmpAddr, tmpAddr2, solutionAddr, directionAddr;
        AddrText ocFocusAddr, ocProblemAddr;
        int relationship;

        strcpy(tmpAddr, EMPTY_ADDR);
        strcpy(tmpAddr2, EMPTY_ADDR);
        strcpy(solutionAddr, EMPTY_ADDR);
        strcpy(directionAddr, EMPTY_ADDR);
        strcpy(ocFocusAddr, EMPTY_ADDR);
        strcpy(ocProblemAddr, EMPTY_ADDR);

        tmpAddr[CLASS]    = (char)theDoc->GetApprValByIndex(kApprSTHmCl);
        tmpAddr2[CLASS] = (char)theDoc->GetApprValByIndex(kApprOCHmCl);
        relationship = GetRelationship(tmpAddr, tmpAddr2);
        if (CHANGE) {
                                                                                                        /* we will
have the same problem semantic as the story */
                SemanticPartner(RefSC, relationship, SEMTBL_ADDRESS(theDoc->GetApprValByIndex(kApprSTFoc)),
ocFocusAddr);      /* finds the semantic partner of the problem in the Objective class (refSC) in the Subjective class
(refSC) and stuffs it into the tempSubAddr */
        setObjFocus(theDoc, ocFocusAddr, AP_OBSTACLE);
                GetFocusOrProblemAddr(theDoc, ocFocusAddr, ocProblemAddr);
        setObjProblem(theDoc, ocProblemAddr, AP_OBSTACLE);
        }
        else {
                SemanticPartner(RefSC, relationship, SEMTBL_ADDRESS(theDoc->GetApprValByIndex(kApprSTPbm)),
ocProblemAddr);/* finds the semantic partner of the problem in the Objective class (refSC) in the Subjective class
(refSC) and stuffs it into the tempSubAddr */
        setObjProblem(theDoc, ocProblemAddr, AP_OBSTACLE);
                GetFocusOrProblemAddr(theDoc, ocProblemAddr, ocFocusAddr);
        setObjFocus(theDoc, ocFocusAddr, AP_OBSTACLE);
        }
        GetPartner(INDEPENDENT, DYNAMIC, ocProblemAddr, solutionAddr);
        setObjSolution(theDoc, solutionAddr, AP_OBSTACLE);
        GetPartner(INDEPENDENT, DYNAMIC, ocFocusAddr, directionAddr);
        setObjDirection(theDoc, directionAddr, AP_OBSTACLE);
} /* DoTheOCElemApprec */


/* ------------------------------------------------------------------------
        FUNCTION:       DoThePlotElemApprec
        Purpose:        Get the solution, focus and direction elements for the
                                Plot.
--------------------------------------------------------------------------- */
static void DoThePlotElemApprec(DRDoc* theDoc)
{
        AddrText tmpAddr;
        AddrText plFocusAddr, plProblemAddr;
```

```
        if (FAILURE) {                                                                           /*
we will have the same problem semantic as the story */
                SemanticPartner(RefSC, DYNAMIC, SEMTBL_ADDRESS(theDoc->GetApprValByIndex(kApprSTPbm)), plProblemAddr);
        /* finds the semantic partner of the problem in the Objective class (refSC) in the Plot class (refSC) and stuffs
it into the tempSubAddr */
                GetFocusOrProblemAddr(theDoc, plProblemAddr, plFocusAddr);
        }
        else {
                SemanticPartner(RefSC, DYNAMIC, SEMTBL_ADDRESS(theDoc->GetApprValByIndex(kApprSTFoc)), plFocusAddr);
        /* finds the semantic partner of the problem in the Objective class (refSC) in the Plot class (refSC) and stuffs
it into the tempSubAddr */
                GetFocusOrProblemAddr(theDoc, plFocusAddr, plProblemAddr);
        }
        setObjProblem(theDoc, plProblemAddr, AP_PLOT);
        setObjFocus(theDoc, plFocusAddr, AP_PLOT);
        GetPartner(INDEPENDENT, DYNAMIC, plProblemAddr, tmpAddr);
        setObjSolution(theDoc, tmpAddr, AP_PLOT);
        GetPartner(INDEPENDENT, DYNAMIC, plFocusAddr, tmpAddr);
        setObjDirection(theDoc, tmpAddr, AP_PLOT);
} /* DoThePlotElemApprec */


/* ------------------------------------------------------------------------
        FUNCTION:       getNatureApprec
        Purpose:        Get the Story "Nature" appreciations
        Returns:        1-4 (kActualDilemma, kApparentDilemma, kActualWork, kApparentWork)
------------------------------------------------------------------------- */
short getNatureApprec(DRDoc* theDoc)
{
        if (CHANGE) {
                if (SUCCESS)
                        return(kActualDilemma);
                else
                        return(kApparentDilemma);               /* Failure */
        }
        else { /* STEADFAST */
                if (SUCCESS)
                        return(kActualWork);
                else
                        return(kApparentWork);                  /* Failure */
        }
} /* getNatureApprec */


/* ------------------------------------------------------------------------
        FUNCTION:       getEssenceApprec
        Purpose:        Get the Story "Essence" appreciations
        Returns:        1-2 (kPositiveFeel, kNegativeFeel )
------------------------------------------------------------------------- */
short getEssenceApprec(DRDoc* theDoc)
{
        if (START) {
                if (GOOD)
                        return(kPositiveFeel);
                else
                        return(kNegativeFeel);                  /* BAD */
        }
        else { /* STOP */
                if (GOOD)
                        return(kNegativeFeel);
                else
                        return(kPositiveFeel);                  /* BAD */
        }
} /* getEssenceApprec */


/* ------------------------------------------------------------------------
        FUNCTION:       getTendencyApprec
        Purpose:        Get the Story "Tendency" appreciations
        Returns:        1-2 (kWillingMC, kUnwillingMC)
------------------------------------------------------------------------- */
short getTendencyApprec(DRDoc* theDoc)
{
        if (DOER) {
                if (ACTION)
                        return(kWillingMC);
                else
                        return(kUnwillingMC);                   /* DECISION */
        }
        else { /* BEER */
                if (ACTION)
                        return(kUnwillingMC);
                else
                        return(kWillingMC);                             /* DECISION */
        }
} /* getTendencyApprec */


/* ------------------------------------------------------------------------
        FUNCTION:       getReachApprec
        Purpose:        Get the Story "Reach" appreciations
        Returns:        1-4 (kBothEmp, kMaleEmp, kFemaleEmp, kNeitherEmp)
------------------------------------------------------------------------- */
short getReachApprec(DRDoc* theDoc)
{
        if (MALE) {
                if (TIMELOCK)
                        return(kMaleEmp);
                else
                        return(kBothEmp);                               /* SPACELOCK */
        }
        else { /* FEMALE */
                if (TIMELOCK)
                        return(kNeitherEmp);
                else
                        return(kFemaleEmp);                             /* SPACELOCK */
        }
} /* getReachApprec */


/* ------------------------------------------------------------------------
```

```
        FUNCTION:       GetObjAttribSet
        Purpose:        Given the semval of the objective problem and a
                                value of 0-3 (kMotivation-kPurpose) return the
                                address of the first element in the approptiate set.
------------------------------------------------------------------------------ */
void GetObjAttribSet(short problemSemVal, short whichAttribute, AddrPtr theAddr)
{
        strcpy(theAddr, "11112");
        theAddr[CLASS] = SEMTBL_ADDRESS(problemSemVal)[CLASS];

        if (whichAttribute == kMotivation) {
                theAddr[TYPE] = '3';
        } else if (whichAttribute == kMethodology) {
                theAddr[TYPE] = '4';
        } else if (whichAttribute == kEvaluation) {
                theAddr[TYPE] = '2';
        } else {                                        // looking for Purpose
                theAddr[TYPE] = '1';
        }

#if 0
        //      NOTE: IF THE CODE BELOW IS EVER UNCOMMENTED, ANY REFERENCES TO "Appreciaiton" WILL HAVE TO BE CONVERTED
TO THE NEW METHOD!!!
        if (whichAttribute == kMotivation) {
                if (CHANGE)
                        theAddr[TYPE] = SEMTBL_ADDRESS(Appreciation[AP_MAIN].ap[kDomain])[CLASS];
                else
                        theAddr[TYPE] = SEMTBL_ADDRESS(Appreciation[AP_OBSTACLE].ap[kDomain])[CLASS];
        } else if (whichAttribute == kMethodology) {
                theAddr[TYPE] = SEMTBL_ADDRESS(Appreciation[AP_PLOT].ap[kDomain])[CLASS];
        } else if (whichAttribute == kEvaluation) {
                if (CHANGE)
                        theAddr[TYPE] = SEMTBL_ADDRESS(Appreciation[AP_OBSTACLE].ap[kDomain])[CLASS];
                else
                        theAddr[TYPE] = SEMTBL_ADDRESS(Appreciation[AP_MAIN].ap[kDomain])[CLASS];
        } else {                                        // looking for Purpose
                theAddr[TYPE] = SEMTBL_ADDRESS(Appreciation[AP_STORY].ap[kDomain])[CLASS];
        }
#endif
}


#if 0
/* -------------------------------------------------------------------------
        FUNCTION:       PrintAppreciations
        Purpose:        Print the appreciations
------------------------------------------------------------------------------ */
void PrintAppreciations(void)
{
        char storyText[10], mcText[20], classText[20], tFocus[20];
        char ocText[20], plotText[10], uRange[20], cfText[20], uaText[20];

        strcpy(storyText,"Story");
        strcpy(mcText,"Main Character");
        strcpy(classText,"Class (Domain)");
        strcpy(tFocus,"Thematic Focus");
        strcpy(ocText,"Obstacle Character");
        strcpy(plotText,"Plot");
        strcpy(uRange,"Unique Range");
        strcpy(cfText,"Critical Flaw");
        strcpy(uaText,"Unique Ability");

        newLine(2);
        printf("The %s %s is %s.\n", storyText, classText, SEMTBL_NAME(Appreciation[AP_STORY].ap[kDomain]));
        printf("The %s Thematic Focus is %s.\n", storyText, SEMTBL_NAME(Appreciation[AP_STORY].ap[kRange]));
        printf("The %s Problem is %s.\n\n", storyText, SEMTBL_NAME(Appreciation[AP_STORY].ap[kProblem]));

        printf("The %s %s is %s.\n", mcText, classText, SEMTBL_NAME(Appreciation[AP_MAIN].ap[kDomain]));
        printf("The %s %s is %s.\n", ocText, classText, SEMTBL_NAME(Appreciation[AP_OBSTACLE].ap[kDomain]));
        printf("The %s %s is %s.\n\n", plotText, classText, SEMTBL_NAME(Appreciation[AP_PLOT].ap[kDomain]));

        printf("The %s Goal is %s.\n", storyText, SEMTBL_NAME(Appreciation[AP_STORY].ap[kConcern]));
        printf("The %s Consequence is %s.\n", storyText, SEMTBL_NAME(Appreciation[AP_PLOT].ap[kConcern]));
        printf("The %s Cost is %s.\n", storyText, SEMTBL_NAME(Appreciation[AP_OBSTACLE].ap[kConcern]));
        printf("The %s DIvidend is %s.\n\n", storyText, SEMTBL_NAME(Appreciation[AP_MAIN].ap[kConcern]));

        printf("The %s Requirements are %s.\n", storyText, SEMTBL_NAME(Appreciation[AP_STORY].ap[kStipulation]));
        printf("The %s Forewarnings are %s.\n", storyText, SEMTBL_NAME(Appreciation[AP_PLOT].ap[kStipulation]));
        printf("The %s Pre-requisites are %s.\n", storyText, SEMTBL_NAME(Appreciation[AP_OBSTACLE].ap[kStipulation]));
        printf("The %s Pre-conditions are %s.\n\n", storyText, SEMTBL_NAME(Appreciation[AP_MAIN].ap[kStipulation]));

        printf("The %s %s is %s.\n", storyText, tFocus, SEMTBL_NAME(Appreciation[AP_STORY].ap[kRange]));
        printf("The %s %s is %s.\n", plotText, tFocus, SEMTBL_NAME(Appreciation[AP_PLOT].ap[kRange]));
        printf("The %s %s is %s.\n", ocText, tFocus, SEMTBL_NAME(Appreciation[AP_OBSTACLE].ap[kRange]));
        printf("The %s %s is %s.\n\n", mcText, tFocus, SEMTBL_NAME(Appreciation[AP_MAIN].ap[kRange]));

        printf("The %s %s is %s.\n", storyText, uRange, SEMTBL_NAME(Appreciation[AP_STORY].ap[kUniqueRange]));
        printf("The %s %s is %s.\n\n", plotText, uRange, SEMTBL_NAME(Appreciation[AP_PLOT].ap[kUniqueRange]));

        printf("The %s %s is %s.\n", ocText, uaText, SEMTBL_NAME(Appreciation[AP_OBSTACLE].ap[kUniqueRange]));
        printf("The %s %s is %s.\n", mcText, uaText, SEMTBL_NAME(Appreciation[AP_MAIN].ap[kUniqueRange]));
        printf("The %s %s is %s.\n", ocText, cfText, SEMTBL_NAME(Appreciation[AP_OBSTACLE].ap[kCriticalFlaw]));
        printf("The %s %s is %s.\n\n", mcText, cfText, SEMTBL_NAME(Appreciation[AP_MAIN].ap[kCriticalFlaw]));

        printf("The %s problem is %s.\n", storyText, SEMTBL_NAME(Appreciation[AP_STORY].ap[kProblem]));
        printf("The %s solution is %s.\n", storyText, SEMTBL_NAME(Appreciation[AP_STORY].ap[kSolution]));
        printf("The %s focus is %s.\n", storyText, SEMTBL_NAME(Appreciation[AP_STORY].ap[kFocus]));
        printf("The %s direction is %s.\n\n", storyText, SEMTBL_NAME(Appreciation[AP_STORY].ap[kDirection]));

        printf("The %s problem is %s.\n", mcText, SEMTBL_NAME(Appreciation[AP_MAIN].ap[kProblem]));
        printf("The %s solution is %s.\n", mcText, SEMTBL_NAME(Appreciation[AP_MAIN].ap[kSolution]));
        printf("The %s focus is %s.\n", mcText, SEMTBL_NAME(Appreciation[AP_MAIN].ap[kFocus]));
        printf("The %s direction is %s.\n\n", mcText, SEMTBL_NAME(Appreciation[AP_MAIN].ap[kDirection]));

        printf("The %s problem is %s.\n", ocText, SEMTBL_NAME(Appreciation[AP_OBSTACLE].ap[kProblem]));
        printf("The %s solution is %s.\n", ocText, SEMTBL_NAME(Appreciation[AP_OBSTACLE].ap[kSolution]));
        printf("The %s focus is %s.\n", ocText, SEMTBL_NAME(Appreciation[AP_OBSTACLE].ap[kFocus]));
        printf("The %s direction is %s.\n\n", ocText, SEMTBL_NAME(Appreciation[AP_OBSTACLE].ap[kDirection]));

/*      printf("The %s Thematic Focus is %s.\n", mcText, SEMTBL_NAME(Appreciation[AP_MAIN].ap[kRange])); */
/*      printf("The %s Problem is %s.\n\n", mcText, SEMTBL_NAME(Appreciation[AP_MAIN].ap[kProblem])); */
```

```
}
#endif

#if 0
/* --------------------------------------------------------------------------
	FUNCTION:		printDepthFirstOrder
	Purpose:		To go through and print the depth first order for the
					justified SC.  Class:Type:Variation:Element
	Accepts:		An address to test from the SuperClass.
	Returns:		Nothing.
-------------------------------------------------------------------------- */
void printDepthFirstOrder(SuperClass *theSC)
{
	char pathString[60];
	int c, t, v, e;
	AddrText theAddr;
	Unit *theUnit;

	strcpy(theAddr, EMPTY_ADDR);

	for (c=1; c<=4; ++c) {
		theAddr[CLASS] = c+'0';
		newLine(2);
		for (t=1; t<=4; ++t) {
			theAddr[TYPE] = t+'0';
			newLine(1);
			for (v=1; v<=4; ++v) {
				theAddr[VAR] = v+'0';
				theAddr[ELEM] = 1+'0';
				printf("%d%d%:  %s",c,t,Addr2PathString(theSC, theAddr, pathString, ALL_LEVELS));
				for (e=2; e<=4; ++e) {
					theAddr[ELEM] = e+'0';
					theUnit = Addr2Item(theSC, theAddr);
	/* get the pointer to the unit in the variation position in the SuperClass */
					printf("/%s",SEMTBL_NAME(theUnit->semVal));
				}
				newLine(1);
			}
		}
	}
}
#endif

#if 0

/* --------------------------------------------------------------------------
	FUNCTION:		printDepthFirstOrder
	Purpose:		To go through and print the depth first order for the
					justified SC.  Class:Type:Variation:Element
	Accepts:		An address to test from the SuperClass.
	Returns:		Nothing.
-------------------------------------------------------------------------- */
void printDepthFirstOrder(SuperClass *theSC)
{
	char pathString[60];
	int c, t, v, e;
	AddrText theAddr;

	strcpy(theAddr, EMPTY_ADDR);

	for (c=1; c<=4; ++c) {
		theAddr[CLASS] = c+'0';
		newLine(2);
		for (t=1; t<=4; ++t) {
			theAddr[TYPE] = t+'0';
			newLine(1);
			for (v=1; v<=4; ++v) {
				theAddr[VAR] = v+'0';
				for (e=1; e<=4; ++e) {
					theAddr[ELEM] = e+'0';
					printf("%d%d%d%d:  %s.\n",c,t,v,e,Addr2PathString(theSC, theAddr,
pathString, ALL_LEVELS));
				}
			}
		}
	}
}

#endif


/* $Log:		apprec.cc,v $
Revision 1.17  93/09/24  15:29:11  stephen
Cleaned up warnings.

Revision 1.16  93/06/21  10:39:14  chris
Added temporary workaround for Critical Flaw in Objective and Subjective throughlines.

Revision 1.15  93/06/10  18:31:31  chris
Hardwired the motivation, methodology, etc. sets.

Revision 1.14  93/06/03  23:19:23  chris
Changed act order Types to correspond to RefSC contents.

Revision 1.13  93/05/28  23:11:43  chris
Added getCharacter [D [D [D [D [D [D [D [D [D [D [C character attribution set function.

Revision 1.12  93/05/27  16:32:41  stephen
Get SuperClass* from Document class...

Revision 1.11  93/05/21  17:18:22  chris
Removed Thumbnail().

Revision 1.10  93/05/20  17:39:08  chris
Added beginnings of outline thumbnail sketch.

Revision 1.9  93/05/18  18:13:29  chris
Finished adding type act order stuff.

Revision 1.8  93/05/18  14:58:54  chris
```

```
Slight modifications to the act order appreciations.

Revision 1.7  93/05/07  10:15:27  chris
Added high level dynamics to the story points window.

Revision 1.6  93/05/03  16:34:03  stephen
Rewrote the handling of Dynamic Question Macros.

Revision 1.5  93/04/24  14:08:29  chris
Changed appreciations structure to array of 10 shorts.

Revision 1.4  93/04/24  12:56:37  chris
Added "nature, essence, etc." appreciations.

Revision 1.3  93/04/24  09:54:23  stephen
Enhancements to storytable generation.

Revision 1.2  93/04/06  19:39:19  stephen
First General Revisions

Revision 1.1  93/03/31  22:34:46  stephen
Initial revision

 */
```

```
/* -----------------------------------------------------------------------
        APPREC.H
        Appreciations Table
        Copyright (C) 1993 Screenplay Systems Inc.
        Revised:        $Id$
-------------------------------------------------------------------------- */

#pragma once

#ifndef __APPREC__
#define __APPREC__

#include "apprdefs.h"

class DRDoc;

#define TOTAL_APPRECIATIONS                    4              /* total # of points of view that we can
appreciate things from, e.g. story, main character, obstacle character, and plot */
#define TOTAL_DYNAMIC_QUESTIONS          8              /* for allocations relating to the 8 dynamic questions */

enum APPRECS { AP_STORY, AP_MAIN, AP_OBSTACLE, AP_PLOT };

enum { ACTUAL_DILEMMA=1, APPARENT_DILEMMA, ACTUAL_WORK, APPARENT_WORK };
enum { POSITIVE_FEEL=1, NEGATIVE_FEEL };
enum { WILLING_MC=1, UNWILLING_MC };
enum { BOTH_EMP=1, MALE_EMP, FEMALE_EMP, NEITHER_EMP };

#define  MAX_APPRECS_PER_POV        17            /* maximum number of appreciation per perspective (i.e.Story, MC,
OC, or Plot) */

const short kMotivation                 = 0;
const short kMethodology          = 1;
const short kEvaluation                 = 2;
const short kPurpose                    = 3;

const short kActualDilemma              = 1101;
const short kApparentDilemma      = 1102;
const short kActualWork                 = 1103;
const short kApparentWork         = 1104;

const short kPositiveFeel         = 1111;
const short kNegativeFeel         = 1112;

const short kWillingMC                  = 1121;
const short kUnwillingMC          = 1122;

const short kBothEmp                    = 1131;
const short kMaleEmp                    = 1132;
const short kFemaleEmp                  = 1133;
const short kNeitherEmp                 = 1134;

typedef short apprecs_array;

const apprecs_array           kDomain                 = 0;        /* [0] CLASS of this appreciation -- an
index into semantic values table */
const apprecs_array           kConcern                = 1;        /* [1] the "goal" TYPE of this
appreciation -- an index into semantic values table */
const apprecs_array           kRange                  = 2;        /* [2] the "thematic" VAR of this
appreciation -- an index into semantic values table */
const apprecs_array           kProblem                = 3;        /* [3] the "problem" ELEM of this
appreciation -- an index into semantic values table */
const apprecs_array           kStipulation      = 4;        /* [4] the "requirement" TYPE of this
appreciation -- an index into semantic values table */
const apprecs_array           kSolution               = 5;        /* [5] an index into the semantic values
table for the solution */
const apprecs_array           kFocus                  = 6;        /* [6] the "focus" ELEM of this
appreciation -- an index into semantic values table */
const apprecs_array           kDirection              = 7;        /* [7] the "direction" ELEM of this
appreciation -- an index into semantic values table */
const apprecs_array           kUniqueRange      = 8;        /* [8] an index into the semantic values table
for the unique appreciations (like unique ability) */
const apprecs_array           kCriticalFlaw     = 9;        /* [9] the criticalFlaw VAR -- stored as a semVal
*/
const apprecs_array           kOrder                  = 10;       /* [10] the position of this domain in a
"domain act order" */
const apprecs_array           kType1                  = 11;       /* [11] Act 1 Type */
const apprecs_array           kType2                  = 12;       /* [12] Act 2 Type */
const apprecs_array           kType3                  = 13;       /* [13] Act 3 Type */
const apprecs_array           kType4                  = 14;       /* [14] Act 4 Type */
const apprecs_array           kGoal                   = 15;       /* [15] Goal Type */
const apprecs_array           kRequirement      = 16;       /* [16] Requirement Type */
const apprecs_array           kHomeClass              = 17;       /* [17] Home Class */
const apprecs_array           kRange2                 = 18;       /* [18] Thematic Counterpoint */

typedef short dynamics_array;

const dynamics_array      kDynResolve          = 0;     // [0] Resolve:    Change / Steadfast
const dynamics_array      kDynDirection   = 1;    // [1] Direction:          Stop / Start
const dynamics_array      kDynApproach    = 2;    // [2] Approach:  Doer / Beer
const dynamics_array      kDynSex              = 3;     // [3] Sex:                    Male / Female
const dynamics_array      kDynWork             = 4;     // [4] Work:                   Action / Decision
const dynamics_array      kDynLimit            = 5;     // [5] Limit:                  Timelock / Spacelock
const dynamics_array      kDynOutcome          = 6;     // [6] Outcome:    Success / Failure
const dynamics_array      kDynJudgment    = 7;    // [7] Judgment:           Good / Bad

/*      NEW-STYLE MACROS -- THESE REQUIRE "theDoc" TO BE DEFINED */

#define  CHANGE                  (theDoc->GetApprValByIndex(kApprResolve) == rApprChange)
#define  STEADFAST               (theDoc->GetApprValByIndex(kApprResolve) == rApprSteadfast)

#define STOP                     (theDoc->GetApprValByIndex(kApprDirection) == rApprStop)
#define START                    (theDoc->GetApprValByIndex(kApprDirection) == rApprStart)

#define DOER                     (theDoc->GetApprValByIndex(kApprApproach) == rApprDoer)
#define BEER                     (theDoc->GetApprValByIndex(kApprApproach) == rApprBeer)

#define  MALE                    (theDoc->GetApprValByIndex(kApprSex) == rApprMale)
#define  FEMALE                  (theDoc->GetApprValByIndex(kApprSex) == rApprFemale)

#define ACTION                   (theDoc->GetApprValByIndex(kApprWork) == rApprAction)
#define DECISION           (theDoc->GetApprValByIndex(kApprWork) == rApprDecision)
```

```
#define TIMELOCK          (theDoc->GetApprValByIndex(kApprLimit) == rApprTimelock)
#define SPACELOCK                   (theDoc->GetApprValByIndex(kApprLimit) == rApprOptionlock)

#define  SUCCESS                    (theDoc->GetApprValByIndex(kApprOutcome) == rApprSuccess)
#define  FAILURE                    (theDoc->GetApprValByIndex(kApprOutcome) == rApprFailure)

#define  GOOD                       (theDoc->GetApprValByIndex(kApprJudgment) == rApprGood)
#define  BAD                                  (theDoc->GetApprValByIndex(kApprJudgment) == rApprBad)


#define ACTUAL_DILEMMA              (CHANGE && SUCCESS)
#define APPARENT_DILEMMA  (CHANGE && FAILURE)
#define ACTUAL_WORK                           (STEADFAST && SUCCESS)
#define APPARENT_WORK               (STEADFAST && FAILURE)

#define POSITIVE                    ((START && GOOD) || (STOP && BAD))
#define NEGATIVE                    ((START && BAD) || (STOP && GOOD))

#define WILLING                               ((DOER && ACTION) || (BEER && DECISION))
#define UNWILLING                             ((DOER && DECISION) || (BEER && ACTION))

#define BOTH_EMPATHIZE              (MALE && SPACELOCK)
#define MALE_EMPATHIZE              (MALE && TIMELOCK)
#define FEMALE_EMPATHIZE  (FEMALE && SPACELOCK)
#define NEITHER_EMPATHIZE (FEMALE && TIMELOCK)


        void      SetAllAppreciations(DRDoc* theDoc);
        /*  makes all of the analyses to determine the appreciations and stores results */
        void      SetObjSimpleApprec(DRDoc* theDoc, SuperClass *theSC, AddrText theAddr, enum APPRECS appreciation);
        void      GetFocusOrProblemAddr(DRDoc* theDoc, AddrPtr firstAddr, AddrPtr secondAddr);
        short     getNatureApprec(DRDoc* theDoc);
        short     getEssenceApprec(DRDoc* theDoc);
        short     getTendencyApprec(DRDoc* theDoc);
        short     getReachApprec(DRDoc* theDoc);
        void      GetObjAttribSet(short problemSemVal, short whichAttribute, AddrPtr theAddr);


/*************************************************************************
 *                                          INDICIES INTO APPRECIATIONS TABLES
 *
 *************************************************************************/

const short       kApprResolve                  = 0;
        const short       kApprChange                     = 1;
        const short       kApprSteadfast        = 2;

const short       kApprDirection                = 3;
        const short       kApprStop                       = 4;
        const short       kApprStart                      = 5;

const short       kApprApproach                 = 6;
        const short       kApprDoer                       = 7;
        const short       kApprBeer                       = 8;

const short       kApprSex                                = 9;
        const short       kApprMale                       = 10;
        const short       kApprFemale                     = 11;

const short       kApprWork                               = 12;
        const short       kApprAction                     = 13;
        const short       kApprDecision         = 14;

const short       kApprLimit                              = 15;
        const short       kApprTimelock         = 16;
        const short       kApprOptionlock       = 17;

const short       kApprOutcome                  = 18;
        const short       kApprSuccess          = 19;
        const short       kApprFailure          = 20;

const short       kApprJudgment                 = 21;
        const short       kApprGood                       = 22;
        const short       kApprBad                        = 23;

/*************************************************************************
 *                                          INDEXES FOR NEW STYLE APPR SEGMENTS          (HIGH-LEVEL)          *
 *************************************************************************/

const short       kApprNature                                               = 24;
        const short       kApprActualDilemma                      = 25;
        const short       kApprApparentDilemma          = 26;
        const short       kApprActualWork                         = 27;
        const short       kApprApparentWork                       = 28;

const short       kApprEssence                                    = 29;
        const short       kApprPositive                           = 30;
        const short       kApprNegative                           = 31;

const short       kApprTendency                                   = 32;
        const short       kApprWilling                            = 33;
        const short       kApprUnwilling                          = 34;

const short       kApprReach                                                = 35;
        const short       kApprBoth                                         = 36;
        const short       kApprMaleEmpathy              = 37;
        const short       kApprFemaleEmpathy                      = 38;
        const short       kApprNeither                            = 39;

/*************************************************************************
 *                                          NEW STYLE APPR SEGMENTS     (APPRECIATIONS)
 *
 *************************************************************************/

#define STStart           39

const short       kApprSTDom                    = STStart + 1;
const short       kApprSTCon                    = STStart + 2;
const short       kApprSTRng                    = STStart + 3;
const short       kApprSTPbm                    = STStart + 4;
const short       kApprSTStp                    = STStart + 5;
const short       kApprSTSol                    = STStart + 6;
```

```
const short         kApprSTFoc              = STStart + 7;
const short         kApprSTDir              = STStart + 8;
const short         kApprSTUnRng       = STStart + 9;
const short         kApprSTCrFl             = STStart + 10;
const short         kApprSTOrd              = STStart + 11;
const short         kApprSTType1       = STStart + 12;
const short         kApprSTType2       = STStart + 13;
const short         kApprSTType3       = STStart + 14;
const short         kApprSTType4       = STStart + 15;
const short         kApprSTGoal             = STStart + 16;
const short         kApprSTReq              = STStart + 17;
const short         kApprSTHmCl             = STStart + 18;
const short         kApprSTRng2             = STStart + 19;

#define MCStart                        (STStart + 19)

const short         kApprMCDom              = MCStart + 1;
const short         kApprMCCon              = MCStart + 2;
const short         kApprMCRng              = MCStart + 3;
const short         kApprMCPbm              = MCStart + 4;
const short         kApprMCStp              = MCStart + 5;
const short         kApprMCSol              = MCStart + 6;
const short         kApprMCFoc              = MCStart + 7;
const short         kApprMCDir              = MCStart + 8;
const short         kApprMCUnRng       = MCStart + 9;
const short         kApprMCCrFl             = MCStart + 10;
const short         kApprMCOrd              = MCStart + 11;
const short         kApprMCType1       = MCStart + 12;
const short         kApprMCType2       = MCStart + 13;
const short         kApprMCType3       = MCStart + 14;
const short         kApprMCType4       = MCStart + 15;
const short         kApprMCGoal             = MCStart + 16;
const short         kApprMCReq              = MCStart + 17;
const short         kApprMCHmCl             = MCStart + 18;
const short         kApprMCRng2             = MCStart + 19;

#define OCStart                        (MCStart + 19)

const short         kApprOCDom              = OCStart + 1;
const short         kApprOCCon              = OCStart + 2;
const short         kApprOCRng              = OCStart + 3;
const short         kApprOCPbm              = OCStart + 4;
const short         kApprOCStp              = OCStart + 5;
const short         kApprOCSol              = OCStart + 6;
const short         kApprOCFoc              = OCStart + 7;
const short         kApprOCDir              = OCStart + 8;
const short         kApprOCUnRng       = OCStart + 9;
const short         kApprOCCrFl             = OCStart + 10;
const short         kApprOCOrd              = OCStart + 11;
const short         kApprOCType1       = OCStart + 12;
const short         kApprOCType2       = OCStart + 13;
const short         kApprOCType3       = OCStart + 14;
const short         kApprOCType4       = OCStart + 15;
const short         kApprOCGoal             = OCStart + 16;
const short         kApprOCReq              = OCStart + 17;
const short         kApprOCHmCl             = OCStart + 18;
const short         kApprOCRng2             = OCStart + 19;

#define PLStart                        (OCStart + 19)

const short         kApprPLDom              = PLStart + 1;
const short         kApprPLCon              = PLStart + 2;
const short         kApprPLRng              = PLStart + 3;
const short         kApprPLPbm              = PLStart + 4;
const short         kApprPLStp              = PLStart + 5;
const short         kApprPLSol              = PLStart + 6;
const short         kApprPLFoc              = PLStart + 7;
const short         kApprPLDir              = PLStart + 8;
const short         kApprPLUnRng       = PLStart + 9;
const short         kApprPLCrFl             = PLStart + 10;
const short         kApprPLOrd              = PLStart + 11;
const short         kApprPLType1       = PLStart + 12;
const short         kApprPLType2       = PLStart + 13;
const short         kApprPLType3       = PLStart + 14;
const short         kApprPLType4       = PLStart + 15;
const short         kApprPLGoal             = PLStart + 16;
const short         kApprPLReq              = PLStart + 17;
const short         kApprPLHmCl             = PLStart + 18;
const short         kApprPLRng2             = PLStart + 19;

const short         kLastApprVal       = PLStart + 19;

#endif /* __APPREC__ */


/* $Log:       apprec.h,v $
 * Revision 1.12  93/05/28  23:12:17  chris
 * Added getCharacter character attribution set function.
 *
 * Revision 1.11  93/05/21  17:19:38  chris
 * Removed Thumbnail().
 *
 * Revision 1.10  93/05/20  17:39:30  chris
 * Added beginnings of outline thumbnail sketch.
 *
 * Revision 1.9  93/05/18  14:59:23  chris
 * Slight modifications to the act order appreciations.
 *
 * Revision 1.8  93/05/07  10:16:13  chris
 * Added high level dynamics to the story points window.
 *
 * Revision 1.7  93/05/04  21:30:51  stephen
 * New semVal handing of the eight dynamic questions.
 *
 * Revision 1.6  93/05/03  16:34:36  stephen
 * Rewrote the handling of Dynamic Question Macros.
 *
 * Revision 1.5  93/04/24  14:09:02  chris
 * Changed appreciations structure to array of 10 shorts.
 *
 * Revision 1.4  93/04/24  12:57:03  chris
```

```
 * Added "nature, essence, etc." appreciations.
 *
 * Revision 1.3  93/04/24  09:54:59  stephen
 * Enhancements to storytable generation.
 *
 * Revision 1.2  93/04/06  19:39:33  stephen
 * First General Revisions
 *
 * Revision 1.1  93/03/31  22:35:18  stephen
 * Initial revision
 *
 */
```

```
/*******************************************************************
        BULDCHR.CC
        Build Character Command & Window classes
        (c) 1993 Screenplay Systems
        Authors:        S. Greenfield & C. Huntley
        Created:        May 23, 1993
        Revised:        $Id$
********************************************************************

*/

#include "tappl.h"
#include "appdlogs.h"
#include "graphics.h"
#include "twindow.h"
#include "tview.h"

#include "miscutil.h"
#include "dramatic.h"
#include "document.h"

#include "structs.h"
#include "semtable.h"
#include "apprec.h"
#include "relation.h"
#include "quadview.h"
#include "castlist.h"
#include "buildchr.h"

#pragma segment buildchr

        GLColor         kYellowClr      = { 0xFFFF, 0xFFFF, 0x0000 };
const GLColor     kMyBtnOnClr     = { 0x0000, 0x0000, 45300 };

#if 0
/* ------------------------------------------------Stephen---03/19/93---
        BCView::Constructor
---------------------------------------------------------------------- */
BCView::BCView(ItemList* pParent, vw_flags vflags, const GLRect *extent, it_flags iflags, const GLColor *color)
           : TView(pParent, vflags, extent, iflags, color),
                 fWhichSet (0)                                                                            //
initialize to Motivation
{
        fApp            = (Dramatica*)AP_Data()->fApp;
        fAppPFMFile = ((Dramatica*)fApp)->GetPFMFile();
        fDoc            = (DRDoc*)fApp->ActiveWindow()->GetDoc();
        assert(fDoc);
        fResponses      = fDoc->GetRESP();
        fWindow         = (BCWindow*)pParent->GetParent();

        fBCExtent       = *extent;

        fSetFlag[0]     =       -1;                     // Icon status -- 1 = Up, -1 = Down
        fSetFlag[1]     =       1;                      // Icon status -- 1 = Up, -1 = Down
        fSetFlag[2]     =       1;                      // Icon status -- 1 = Up, -1 = Down
        fSetFlag[3]     =       1;                      // Icon status -- 1 = Up, -1 = Down

        GLSetRect(&fSetIconRect[0], 40, 366, 80, 434);          // icon in ruler for column 1
        GLSetRect(&fSetIconRect[1], 40, 436, 80, 504);          // icon in ruler for column 2
        GLSetRect(&fSetIconRect[2], 82, 366, 122, 434);         // icon in ruler for column 3
        GLSetRect(&fSetIconRect[3], 82, 436, 122, 504);         // icon in ruler for column 4

        fSetText[0] = " Motivation";
        fSetText[1] = "Methodology";
        fSetText[2] = " Evaluation";
        fSetText[3] = "   Purpose";

} /* BCView::BCView */


/* ------------------------------------------------Stephen---03/19/93---
        BCView::Destructor
---------------------------------------------------------------------- */
BCView::~BCView(void)
{
}


/* ------------------------------------------------Stephen---05/27/93---
        BCView::draw_view - Does the bulk of drawing the BCView.
---------------------------------------------------------------------- */
void BCView::draw_view (const VwPaneUpdateInfo& updateInfo)
{
        LgPoint         VwOrigin = *updateInfo.InqOffset();     // local coordinates for the view's origin

        gl_coord_t      X                       = (gl_coord_t)(VwOrigin.x);
        gl_coord_t      Y                       = (gl_coord_t)(VwOrigin.y);

        draw_window_items();
        draw_attrib_buttons();

} /* BCView::draw_view */


/* ---------------------------------------------------Chris---05/31/93---
        BCView::draw_window_items - draw misc. static stuff in the view.
---------------------------------------------------------------------- */
void BCView::draw_window_items(void)
{
        fpGraphEnv->Use();

        GLColor savedForeColor;
        GLColor savedBackColor;

        fpGraphEnv->GetForeColor(&savedForeColor);
        fpGraphEnv->GetBackColor(&savedBackColor);

        GLRect cntrlRect;
        GLSetRect(&cntrlRect, 38, 365, fBCExtent.bottom, fBCExtent.right);
        fpGraphEnv->SetForeColor(kGL25GrayClr);
        fpGraphEnv->PaintRect(cntrlRect);
```

```
        fpGraphEnv->MoveTo(365, 36);
        fpGraphEnv->SetForeColor(kGLBlackClr);
        fpGraphEnv->LineTo(fBCExtent.right, 36);

        fpGraphEnv->SetForeColor(savedForeColor);
        fpGraphEnv->SetBackColor(savedBackColor);

        fpGraphEnv->Unuse();

} /* BCView::draw_window_items */


/* ----------------------------------------------------Chris---06/01/93---
        BCView::draw_attrib_buttons - draw Motivation, etc. buttons.
------------------------------------------------------------------------ */
void BCView::draw_attrib_buttons(void)
{
        fpGraphEnv->Use();
        short i;

        GLColor                 savedBackColor;
        GLColor                 savedForeColor;
        GLColor   areaBGClr     = kGL25GrayClr;                                    // was {
0xFFFF, 0xFFFF, 0xC000 }

        fpGraphEnv->GetBackColor(&savedBackColor);                      // get and store the current
background color
        fpGraphEnv->GetForeColor(&savedForeColor);                      // get and store the current
background color
        fpGraphEnv->SetBackColor(areaBGClr);                                    // set the bg color
        fpGraphEnv->SetForeColor(areaBGClr);                                    // set the foreground
color
        fpGraphEnv->SetTextAttr(GL_GENEVA, 9, GL_NORMAL);

        fpGraphEnv->SetForeColor(kGLBlackClr);                                  // set the foreground
color
        short bottomOffset;
        for (i=0; i<BC_SETS; ++i) {
                bottomOffset = 16;
                if (fSetFlag[i] == 1)
                        CoolFrameRect(fpGraphEnv, &fSetIconRect[i], &kGLGroovePat, 1, &kGLWhiteClr, &kGL75GrayClr);
                else {
                        --bottomOffset;
                        CoolFrameRect(fpGraphEnv, &fSetIconRect[i], &kGLBevelDownPat, 2, &kGLWhiteClr, &kGL75GrayClr);
                }
                fpGraphEnv->MoveTo(fSetIconRect[i].left+8, fSetIconRect[i].bottom-bottomOffset);
                fpGraphEnv->DrawStr(fSetText[i]);
        }
        fpGraphEnv->SetForeColor(savedForeColor);                       // reset the bg to its original
color
        fpGraphEnv->SetBackColor(savedBackColor);                       // reset the bg to its original
color

        fpGraphEnv->Unuse();
} /* BCView::draw_attrib_buttons */


/* ----------------------------------------------------Stephen---04/19/93---
        BCView::DoItemHit - handles mouse-down events in the BCView.
------------------------------------------------------------------------ */
bool_t BCView::DoItemHit(EVENT_REC *pEvt, GLPoint mousePt)
{
        bool_t          isDblClick = AP_DblClick(pEvt);

        if (!TView::DoItemHit(pEvt, mousePt)) {
                if (find_icon(mousePt)) {
                        semval_t problemSemVal = fDoc->GetApprValByIndex(kApprSTDom);
                        AddrText attribAddr;
                        GetObjAttribSet(problemSemVal, fWhichSet, attribAddr);
                        fWindow->GetQuadView()->init_QuadView_data(attribAddr, fWhichSet, 16, 4, 4);
                        fWindow->GetQuadView()->Inval();
                } else
                        beep();
                return(true);
        }
        return (true);
} /* BCView::DoItemHit */


/* ----------------------------------------------------Chris---05/22/93---
        BCView::find_icon - given a point in document coordinates, find
        the icon buttpn where the user clicked change status.  Return TRUE if
        found, FALSE otherwise.
------------------------------------------------------------------------ */
bool_t BCView::find_icon(GLPoint mousePt)
{
        short i, x;

        for (i=0; i<BC_SETS; ++i) {
                if (GLPtInRect(mousePt, &fSetIconRect[i])) {
                        if (fSetFlag[i] == 1) {                         // the button clicked on is not
currently depressed (selected)
                                for (x=0; x<BC_SETS; ++x)
                                        if (fSetFlag[x] == -1)
                                                fSetFlag[x] = 1;                // find the previously
depressed button and turn it off
                                fSetFlag[i] = -1;                                       // depress the button
that was hit
                                fWhichSet = i;
                                draw_attrib_buttons();                  // redraw entire ruler
                        }
                        else
                                return(false);                                  // don't do anything
if this button is already depressed
                        return (true);
                }
        }
        return (false);                                 // click point not in any of the rows!
}


/* ------------------------------------------------------------------------
```

```
        BCView::Print - prints the contents of BCView -- though this may be
        unnecessary.
------------------------------------------------------------------------ */
err_t BCView::PrintView(Printing *pPrintMgr)
{
        LgPoint offset;
        offset.x = 0;                                        // print in an unscrolled position.
        offset.y = 0;
        Rgn updateRgn;
        VwPaneUpdateInfo updateInfo(pPrintMgr->GetPrinterEnv()->InqEnvRef(), offset, updateRgn);
        draw_view(updateInfo);

        return NOERR;

} /* BCView::PrintView */

#endif



/* ========================================================================
                                                        Build Character WINDOW CLASS
   ======================================================================= */

/* ------------------------------------------------------------------------
        BCWindow::BCWindow - CONSTRUCTOR
------------------------------------------------------------------------ */
BCWindow::BCWindow(TAppl *pTAppl, TDoc *pTDoc, const GLRect *bounds, wn_type windowType, const char *title, ptr_t
storage)
                : TWindow(pTAppl, pTDoc, windowType, TWindow::kNoFlags, bounds, title, storage),
                  fQuadView (NULL),
                  fEraseTextRgn (NULL),
                  fEraseTitleRgn (NULL),
                  fGrayBGRgn (NULL)
{
        fRelationsTW[0] = NULL;
        fRelationsTW[1] = NULL;
        fRelationsTW[2] = NULL;

        fApp            = (Dramatica*)GetParentApp();
        fDoc            = (DRDoc*)fApp->ActiveWindow()->GetDoc();
        assert(fDoc);

        GetPortRect(&fContextRect);

        fRightAreaEdge = 508;

        fContextRect.top = 0;
        fContextRect.left = 110;
        fContextRect.bottom = 36;
        fContextRect.right = fRightAreaEdge;

        //      Get Preferences for Build Characters

        pt_err  theErr;
        fBCPrefsPT = new PText(fApp->GetPrefsFile(), _OSType("BLCH"), 0, &theErr);          // Grab Preferences
for BUild Characters Window
        assert((theErr == noerr) || (theErr == kNoSuchPFMSeg));

        //      Restore user's preferred window size & position

        fApp->RestoreWindowPosition(fBCPrefsPT, (TWindow*) this, "BC");


        fDoc->SetBuildCharWindow(this);

} /* BCWindow::BCWindow */


/* ------------------------------------------------------------------------
        BCWindow::~BCWindow - DESTRUCTOR
------------------------------------------------------------------------ */
BCWindow::~BCWindow(void)
{
        for (short r=0; r<=2; ++r)
                delete fRelationsTW[r];

        delete fEraseTextRgn;
        delete fEraseTitleRgn;
//      delete fGrayBGRgn;

        fDoc->SetBCCastListView(NULL);
        fDoc->SetBuildCharWindow(NULL);

        //      Save off any preferences

        fApp->SaveWindowPosition(fBCPrefsPT, (TWindow*)this, "BC");

        fBCPrefsPT->SaveSeg();
        delete fBCPrefsPT;

} /* BCWindow::~BCWindow */


/* ------------------------------------------------------------------------
        BCWindow::InitWindow -
------------------------------------------------------------------------ */
void BCWindow::InitWindow(void)
{
        assert(fItems == NULL);

        fItems = new ItemList(this);
        assert(fItems);

        // STUFF IN OUR VIEW


        GLRect myBounds;
        GLSetRect(&myBounds, 36, 100, 300, 364);
        TItem* newQVItem = new QuadView(fItems, TView::kNoFlags, &myBounds, TItem::kResizable);
        assert(newQVItem);
        fQuadView = (QuadView*)newQVItem;
```

```
fItems->Append(newQVItem);

GLSetRect(&myBounds, 36, 0, 300, 100);
TItem* newCLItem = new CastListView(20, 20, 20, 0, false, fItems, (TView::kVScroll), &myBounds); /*
TItem::kResizable); */
assert(newCLItem);
fCLView = (CastListView*)newCLItem;
fItems->Append(newCLItem);
fDoc->SetBCCastListView(fCLView);

GLRect popRect;
GLSetRect(&popRect, 210, 380, 228, 490);
TItem* popItm      = popItm = new Popup(fItems, &popRect, kNoFlags, kNoFlags, kCtNoFlags, &kGLBlackClr, NULL,
NULL, GL_SYS_FONT, 12, GL_NORMAL, GL_JUST_LEFT);
fPopupIdx                   = fItems->Append(popItm);
fCharTypePopup      = (Popup*)popItm;
fCharTypePopup->AppendItem("Unassigned");
fCharTypePopup->AppendItem("-");
fCharTypePopup->AppendItem("Complex");
fCharTypePopup->AppendItem("-");
fCharTypePopup->AppendItem("Protagonist");
fCharTypePopup->AppendItem("Antagonist");
fCharTypePopup->AppendItem("Sidekick");
fCharTypePopup->AppendItem("Skeptic");
fCharTypePopup->AppendItem("Emotion");
fCharTypePopup->AppendItem("Reason");
fCharTypePopup->AppendItem("Guardian");
fCharTypePopup->AppendItem("Contagonist");

//        ADD GRAPHIC QUAD BUTTONS

GLRect selectBtnRect;
GLSetRect(&selectBtnRect, 40, 366, 108, 434);
TItem* newSelectSetBtn = new GraphBtn(fItems, &selectBtnRect, &kMyBtnOnClr, &kGLBlackClr, kRadioAction, false);
assert(newSelectSetBtn);
fSelectSetBtns = (GraphBtn*)newSelectSetBtn;
fSelectSetBtnIdx = fItems->Append(newSelectSetBtn);

//        ADD QUADICONS & RELATIONSHIPS AREA

GLRect portBounds;
GetPortRect(&portBounds);
gl_coord_t         relTextHeight = 98;
GLRect theRect     = portBounds;
theRect.left       = 513;
theRect.right      = portBounds.right-4;

theRect.top                 += 3;
theRect.bottom     = theRect.top + relTextHeight;
fRelationsRects[DYNAMIC] = theRect;

theRect.top                 = theRect.bottom + 3;
theRect.bottom     = theRect.top + relTextHeight;
fRelationsRects[COMPANION] = theRect;

theRect.top                 = theRect.bottom + 3;
theRect.bottom     = theRect.top + relTextHeight;
fRelationsRects[DEPENDENT] = theRect;


myBounds = fRelationsRects[DYNAMIC];
myBounds.right = myBounds.left + 33;
myBounds.bottom = myBounds.top + 33;
TItem* newQuadIconItem = new QuadIcon(fItems, &myBounds, &kYellowClr);
assert(newQuadIconItem);
fDynamicIcon = (QuadIcon*)newQuadIconItem;
fItems->Append(newQuadIconItem);

myBounds = fRelationsRects[COMPANION];
myBounds.right = myBounds.left + 33;
myBounds.bottom = myBounds.top + 33;
newQuadIconItem = new QuadIcon(fItems, &myBounds, &kYellowClr);
assert(newQuadIconItem);
fCompanionIcon = (QuadIcon*)newQuadIconItem;
fItems->Append(newQuadIconItem);

myBounds = fRelationsRects[DEPENDENT];
myBounds.right = myBounds.left + 33;
myBounds.bottom = myBounds.top + 33;
newQuadIconItem = new QuadIcon(fItems, &myBounds, &kYellowClr);
assert(newQuadIconItem);
fDependentIcon = (QuadIcon*)newQuadIconItem;
fItems->Append(newQuadIconItem);

//        POST-ITEMLIST INITIALIZATION

fItems->SetBackClr(&kGL25GrayClr);
init_itemlist();

//        More Set selection button initialization

fSelectSetBtns->AddButton(1, &selectBtnRect, "Motivation", 21, 9, kCoolBevelDown, kCoolBevelUp);
GLSetRect(&selectBtnRect, 40, 436, 108, 504);
fSelectSetBtns->AddButton(1, &selectBtnRect, "Methodology", 21, 9, kCoolBevelDown, kCoolBevelUp);
GLSetRect(&selectBtnRect, 110, 366, 178, 434);
fSelectSetBtns->AddButton(1, &selectBtnRect, "Evaluation", 21, 9, kCoolBevelDown, kCoolBevelUp);
GLSetRect(&selectBtnRect, 110, 436, 178, 504);
fSelectSetBtns->AddButton(1, &selectBtnRect, "Purpose", 21, 9, kCoolBevelDown, kCoolBevelUp);
fSelectSetBtns->SetButtonState((ls_index)0, kBtnDown);

fCLView->InitView();
fDynamicIcon->SetState(1, 1, DYNAMIC);
fCompanionIcon->SetState(1, 1, COMPANION);
fDependentIcon->SetState(1, 1, DEPENDENT);

//        INITIALIZE QUADVIEW DATA

AddrText attribAddr;
GetObjAttribSet(fDoc->GetApprValByIndex(kApprSTDom), 0, attribAddr);
fQuadView->init_QuadView_data(attribAddr, 0, 16, 4, 4);
```

```
        calc_items_sizes();
} /* BCWindow::InitWindow */

/* ---------------------------------------------------------------------------
        BCWindow::DoItemHit - handles popups and button presses within the
        report window (but not presses on the frontend tiles)!
--------------------------------------------------------------------------- */
void BCWindow::DoItemHit(ls_index itemHit)
{

        if ((itemHit == fSelectSetBtnIdx)) {
                semval_t problemSemVal = fDoc->GetApprValByIndex(kApprSTDom);
                short whichSet = (short) fSelectSetBtns->GetWhichBtnDown();
                AddrText attribAddr;
                GetObjAttribSet(problemSemVal, whichSet, attribAddr);
                fQuadView->SaveView();
                fQuadView->init_QuadView_data(attribAddr, whichSet, 16, 4, 4);
                fQuadView->Inval();
        }
        else if (itemHit == fPopupIdx) {
                if (fCLView->SelectionExists()) {
                        short whichChar = fCLView->GetWhichCharSelected();

                        ct_value menuPos = (short)fCharTypePopup->GetCntlVal();
                        if (menuPos >= kArchProtagonist) {
                                fQuadView->SaveView();
                                fDoc->SetCharacterType(whichChar, menuPos);

                                // RE-INIT OUR DATA

                                semval_t problemSemVal = fDoc->GetApprValByIndex(kApprSTDom);
                                short whichSet = (short) fSelectSetBtns->GetWhichBtnDown();
                                AddrText attribAddr;
                                GetObjAttribSet(problemSemVal, whichSet, attribAddr);
                                fQuadView->init_QuadView_data(attribAddr, whichSet, 16, 4, 4);
                                fQuadView->Inval();                     // MIGHT BE OVERKILL!
                        }

                }
        }

} /* BCWindow::DoItemHit */


/* -----------------------------------------------------Chris---05/31/93---
        BCWindow::draw_window_items - draw misc. static stuff in the view.
--------------------------------------------------------------------------- */
void BCWindow::draw_window_items()
{
        GLColor savedForeColor;
        GLColor savedBackColor;

        GLRect winBounds;
        GetPortRect(&winBounds);
        fGraphEnv.GetForeColor(&savedForeColor);
        fGraphEnv.GetBackColor(&savedBackColor);

        GLRect playerTitleRect;
        GLSetRect(&playerTitleRect, 0, 0, 36, 100);
        fGraphEnv.SetForeColor(kGL25GrayClr);
        fGraphEnv.SetBackColor(kGL25GrayClr);
        fGraphEnv.PaintRect(playerTitleRect);
        CoolFrameRect(&fGraphEnv, &playerTitleRect, &kGLBevelUpPat, 2, &kGLWhiteClr, &kGL75GrayClr);

//      fGraphEnv.PaintRgn(*fGrayBGRgn);

        //      ADD RELATIONSHIP TEXT


        fGraphEnv.SetForeColor(kGLBlackClr);

        for (short i=0; i<=2; ++i) {
                fGraphEnv.FrameRect(fRelationsRects[i]);
        }

        fGraphEnv.SetTextAttr(GL_SYS_FONT, 12, GL_NORMAL);


        fGraphEnv.SetForeColor(kGLWhiteClr);
        fGraphEnv.PaintRgn(*fEraseTitleRgn);
        fGraphEnv.PaintRgn(*fEraseTextRgn);
        fGraphEnv.SetForeColor(kGLBlackClr);

        fGraphEnv.MoveTo(fRelationsRects[DYNAMIC].left+40, fRelationsRects[DYNAMIC].top+15);
        fGraphEnv.DrawStr("Dynamic");

        fGraphEnv.MoveTo(fRelationsRects[COMPANION].left+40, fRelationsRects[COMPANION].top+15);
        fGraphEnv.DrawStr("Companion");

        fGraphEnv.MoveTo(fRelationsRects[DEPENDENT].left+40, fRelationsRects[DEPENDENT].top+15);
        fGraphEnv.DrawStr("Dependent");

        DrawRelationshipText(DYNAMIC);
        DrawRelationshipText(COMPANION);
        DrawRelationshipText(DEPENDENT);

        fGraphEnv.MoveTo(16, 15);
        fGraphEnv.DrawStr("Objective");
        fGraphEnv.MoveTo(12, 31);
        fGraphEnv.DrawStr("Characters");
        fGraphEnv.SetTextAttr(GL_GENEVA, 9, GL_NORMAL);

        fGraphEnv.SetForeColor(kGLWhiteClr);
        fGraphEnv.PaintRect(fContextRect);
        fGraphEnv.SetForeColor(kGLBlackClr);

        GLRect helpRect = fContextRect;
        helpRect.left = 101;
        ++helpRect.right;
```

```
        fGraphEnv.FrameRect(helpRect);                               // box for context information to be
drawn in

        fGraphEnv.SetForeColor(savedForeColor);
        fGraphEnv.SetBackColor(savedBackColor);

} /* BCWindow::draw_window_items */


/* ------------------------------------------------------------------------
        BCWindow::SetRelationshipText - sets text in relationship areas.
-------------------------------------------------------------------------- */
void BCWindow::SetRelationshipText(char* theText, int relationship)
{
        TextWrap*           theTextWrap = fRelationsTW[relationship];
        GLRect              textRect          = fRelationsRects[relationship];

        if (theTextWrap) {
                delete theTextWrap;
                theTextWrap = NULL;
        }

        theTextWrap = new TextWrap(fDoc, &fGraphEnv, &textRect, theText, GL_GENEVA, 9);
        theTextWrap->Draw(&fGraphEnv, NULL, kNeverPrint, textRect.top, textRect.left);
        fRelationsTW[relationship] = theTextWrap;

} /* BCWindow::SetRelationshipText */


/* ------------------------------------------------------------------------
        BCWindow::DrawRelationshipText - Draws the relationship text
-------------------------------------------------------------------------- */
void BCWindow::DrawRelationshipText(int relationship)
{
        TextWrap*           theTextWrap = fRelationsTW[relationship];
        GLRect              textRect          = fRelationsRects[relationship];
        if (theTextWrap)
                theTextWrap->Draw(&fGraphEnv, NULL, kNeverPrint, textRect.top, textRect.left);

} /* BCWindow::DrawRelationshipText */


/* ------------------------------------------------------------------------
        BCWindow::Resize
-------------------------------------------------------------------------- */
void BCWindow::Resize(void *pNewSize, TObject *pSender)
{
        TWindow::Resize(pNewSize, pSender);
        fItems->Resize();
        calc_items_sizes();
}


/* ------------------------------------------------------------------------
        BCWindow::calc_items_sizes
-------------------------------------------------------------------------- */
void BCWindow::calc_items_sizes(void)
{
        GLRect portBounds;
        GetPortRect(&portBounds);
        for (short i=0; i<=2; ++i)
                fRelationsRects[i].right = portBounds.right-4;

        if (fEraseTextRgn)
                delete fEraseTextRgn;

        if (fEraseTitleRgn)
                delete fEraseTitleRgn;

        fEraseTextRgn       = new Rgn();
        fEraseTitleRgn      = new Rgn();

        GLRect tempRect = fRelationsRects[DYNAMIC];
        GLInsetRect(&tempRect, 1, 1);
        fEraseTextRgn->SetTo(tempRect);
        GLRect dynamicClipRect                  = fDynamicIcon->GetBounds();
        GLRect dynamicTitleClip;
        dynamicTitleClip.top                    = dynamicClipRect.top;
        dynamicTitleClip.left                   = dynamicClipRect.right;
        dynamicTitleClip.bottom                 = dynamicClipRect.top + 18;
        dynamicTitleClip.right                  = tempRect.right;
        fEraseTextRgn->SetToDifference(dynamicClipRect);
        fEraseTextRgn->SetToDifference(dynamicTitleClip);
        fEraseTitleRgn->SetTo(dynamicTitleClip);

        tempRect = fRelationsRects[COMPANION];
        GLInsetRect(&tempRect, 1, 1);
        fEraseTextRgn->SetToUnion(tempRect);
        GLRect companionClipRect    = fCompanionIcon->GetBounds();
        GLRect companionTitleClip;
        companionTitleClip.top                  = companionClipRect.top;
        companionTitleClip.left                 = companionClipRect.right;
        companionTitleClip.bottom   = companionClipRect.top + 18;
        companionTitleClip.right    = tempRect.right;
        fEraseTextRgn->SetToDifference(companionClipRect);
        fEraseTextRgn->SetToDifference(companionTitleClip);
        fEraseTitleRgn->SetToUnion(companionTitleClip);

        tempRect = fRelationsRects[DEPENDENT];
        GLInsetRect(&tempRect, 1, 1);
        fEraseTextRgn->SetToUnion(tempRect);
        GLRect dependentClipRect    = fDependentIcon->GetBounds();
        GLRect dependentTitleClip;
        dependentTitleClip.top                  = dependentClipRect.top;
        dependentTitleClip.left                 = dependentClipRect.right;
        dependentTitleClip.bottom   = dependentClipRect.top + 18;
        dependentTitleClip.right    = tempRect.right;
        fEraseTextRgn->SetToDifference(dependentClipRect);
        fEraseTextRgn->SetToDifference(dependentTitleClip);
        fEraseTitleRgn->SetToUnion(dependentTitleClip);

        //      Construct gray area region
```

```
#if 0
        if (fGrayBGRgn)
                delete fGrayBGRgn;

        fGrayBGRgn = new Rgn();

        GLRect grayRect = portBounds;
        grayRect.left = fRightAreaEdge;

        fGrayBGRgn->SetTo(grayRect);
        for (i=0; i<=2; ++i)
                fGrayBGRgn->SetToDifference(fRelationsRects[i]);
#endif

} /* BCWindow::calc_items_sizes */


/* -------------------------------------------------------------------------
        BCWindow::DoGrow - This virtual function gets called when the user
        clicks on the grow box and changes the window size.
------------------------------------------------------------------------- */
bool_t  BCWindow::DoGrow(EVENT_REC *pEvt)
{
        TWindow::DoGrow(pEvt);
        calc_items_sizes();

        return true;                            // Required, but why?
} /* BCWindow::DoGrow */


/* -------------------------------------------------------------------------
        BCWindow::DoZoom - This virtual function gets called when the user
        clicks in the zoom box.
------------------------------------------------------------------------- */
void BCWindow::DoZoom(short partCode)
{
        TWindow::DoZoom(partCode);
        calc_items_sizes();

} /* BCWindow::DoZoom */



/* -----------------------------------------------------Ken---12/15/91---
        BCWindow::draw_window - draw the contents of the window.
------------------------------------------------------------------------- */
void BCWindow::draw_window(GL_ENV_REF env)
{
        TWindow::draw_window(env);
        draw_window_items();                                    // draw non-quadview and non-castlist
stuff

} /* BCWindow::draw_window */


/* -------------------------------------------------------------------------
        BCWindow::DoIdle - do any idle time processing.  This function just
                forwards the request onto the window's EditView.  This function
                could be inlined, but we choose not to to reduce header file
                dependencies.
------------------------------------------------------------------------- */
void BCWindow::DoIdle(void)
{
        fQuadView->DoIdle();

} /* BCWindow::DoIdle */

/* -------------------------------------------------------------------------
        BCWindow::CalcIdle - calculates how much idle time we need.
------------------------------------------------------------------------- */
ulong BCWindow::CalcIdle(void)
{
#if 0
        if (fOLView->CaretVisible())
                return GetCaretTime();
        else
#endif
                return kApMaxSleepTime;

} /* BCWindow::CalcIdle */


/* -------------------------------------------------------------------------
        BCWindow::min_window_size - return the minimum allowable width and
                height for this window.
------------------------------------------------------------------------- */
GLPoint BCWindow::min_window_size()
{
        GLPoint  size;
        size.x = 512;
        size.y = 321;
        return size;

} /* BCWindow::min_window_size */


/* -------------------------------------------------------------------------
        BCWindow::IsDirty - Determines if the current window needs saving.
------------------------------------------------------------------------- */
bool_t  BCWindow::IsDirty(void)
{
        DRDoc*   theDoc = (DRDoc*)GetDoc();
        assert(theDoc);
        return (theDoc->Is(&TDoc::kDirty));
}


/* -------------------------------------------------------------------------
                                                Build Character COMMAND CLASS
```

```
----------------------------------------------------------------------------- */

/* ---------------------------------------------------------------------------
        BuildChrCmd::IsValid -
----------------------------------------------------------------------------- */
bool_t BuildChrCmd::IsValid(TAppl *pApp)
{
        ls_index        activeDoc       = pApp->ActiveDoc();
        if (activeDoc != kLsNoElem) {
                DRDoc*   theDoc = ((DRDoc*)pApp->GetDoc(activeDoc));
                if (theDoc->IsStoryJustified())
                        return true;
        }
        return (false);

} /* BuildChrCmd::IsValid */


/* ---------------------------------------------------------------------------
        BuildChrCmd::do_cmd -
----------------------------------------------------------------------------- */
err_t BuildChrCmd::do_cmd(void)
{
        GLRect myBounds;
        DRDoc*   theDoc = ((DRDoc*)fParentApp->ActiveWindow()->GetDoc());
        assert(theDoc);
        theDoc->GetOptWindowRect(&myBounds, NULL);

        BCWindow* pTWindow = new BCWindow(fParentApp, theDoc, &myBounds, WN_SIZE_WINDOW, "Build Characters");

        if (pTWindow) {
                theDoc->GetWindowList()->Append(pTWindow);
                pTWindow->InitWindow();
                pTWindow->ShowWindow();
                fParentApp->SetActiveWindows();

                fParentApp->ClearStoragePtr();
        }

        return NOERR;
} /* BuildChrCmd::do_cmd */

#pragma segment main

/* xxxxxxxxxxxxxxxxxxxxxxxxxxxxxxxxxxxxxxxxxxxxxxxxxxxxxxxxxxxxxxxxxxxxxxxxxxxxx
 * $Log:          buildchr.cc,v $
Revision 1.13  93/09/24  15:29:19  stephen
Cleaned up warnings.

Revision 1.12  93/06/04  23:08:59  stephen
final connections for QuadView, CastListView.

Revision 1.11  93/06/04  19:54:26  stephen
Worked on automatic updating of view;
Plus, added some functions so pressing buttons works.

Revision 1.10  93/06/04  15:54:53  chris
Cleaned up BCView -- buttons etc.

Revision 1.9  93/06/04  13:40:41  stephen
Added BCView so Chris could add the pushbuttons.

Revision 1.8  93/06/02  16:06:04  chris
Added printing of character definition when clicking on quad items.

Revision 1.7  93/06/01  13:49:56  chris
Cleaned up characteristic set buttons.

Revision 1.6  93/06/01  09:15:47  stephen
Chose the correct default element Set...

Revision 1.5  93/05/31  18:14:09  chris
Added aesthetic impropvements.

Revision 1.4  93/05/29  22:02:04  stephen
Minor revs.

Revision 1.3  93/05/29  18:54:06  stephen
More fundamental work...

Revision 1.2  93/05/28  10:14:50  stephen
more work to build character window.

Revision 1.1  93/05/24  21:33:42  stephen
Initial revision

 */
```

```
/* -----------------------------------------------------------------------
        BUILDCHR.H
        Build Character class
        Copyright (C) 1993 Screenplay Systems Inc.
        Revised:        $Id$
----------------------------------------------------------------------- */

#pragma once

#ifndef __BUILDCHR__
#define __BUILDCHR__

#include "genutls.h"
#include "ItemList.h"

#include "tcommand.h"
#include "tview.h"

#include "consts.h"
#include "castlist.h"
#include "graphbtn.h"
#include "quadview.h"
#include "quadicon.h"

#pragma segment buildchr

#define         BC_SETS         4               // Number of sets in a chess set

class BCWindow;
class TextWrap;

#if 0
/* -----------------------------------------------------------------------
        BCView - A view just for Build Characters.
----------------------------------------------------------------------- */
class BCView : public TView {
public:
        // CONSTRUCTION/DESTRUCTION
        BCView(ItemList* pParent, vw_flags vflags = kNoFlags, const GLRect *extent = NULL, it_flags iflags =
List::kNoFlags, const GLColor *color = &kGLBlackClr);
        ~BCView(void);

        // PUBLIC UTILITIES
        virtual char*     ClassName(void) const       { return "BCView"; }
        virtual class_t   ClassType(void) const       { return kBCView; }
        virtual bool_t    IsOfType(const void *pType) const { return *(class_t*) pType == kBCView ||
TView::IsOfType(pType); }
        virtual TObject* Duplicate(void) const        { return new BCView(*this); }

        // ACTION PROCS

        // PUBLIC BEHAVIOR

        virtual void      Frame(void *env, TObject *pSender = NULL) {}        // TItem:: function.  Overriden here to
prevent framing of view
        virtual void      draw_view(const VwPaneUpdateInfo& updateInfo);
        virtual err_t     PrintView(Printing *pPrintMgr);
//      virtual void      Resize(void *pNewSize, TObject *pSender);

        GLRect                  GetBCBounds(void)         { return fBCExtent; }


protected:
        Dramatica*              fApp;
        DRDoc*                  fDoc;
        BCWindow*               fWindow;
        pfm_fd_t                fAppPFMFile;
        PText*                  fResponses;

        GLRect                  fBCExtent;                          // Rect of desired BCView
        short                   fSetFlag[BC_SETS];              // element set flags
        GLRect                  fSetIconRect[BC_SETS];    // rect of the element set icons/buttons
        GLColor                 fSetColor[BC_SETS];             // Color of the element set
        char*                   fSetText[BC_SETS];              // set text for "icons" -- the custom pushbuttons
        short                   fWhichSet;                          // which of the four possible sets is
this

        // LOCAL UTILITIES
        bool_t                  DoItemHit(EVENT_REC *pEvt, GLPoint mousePt);
        bool_t                  find_icon(GLPoint mousePt);
        void                    draw_window_items(void);
        void                    draw_attrib_buttons(void);

}; /* BCView */

#endif



/* -----------------------------------------------------------------------
                                                        Build Characters WINDOW CLASS
----------------------------------------------------------------------- */
class BCWindow : public TWindow {
public:
        // CONSTRUCTION/DESTRUCTION
        BCWindow(TAppl *pTAppl, TDoc *pTDoc, const GLRect *bounds, wn_type windowType, const char *title, ptr_t storage
= NULL);
        ~BCWindow(void);

        // PUBLIC UTILITIES
        virtual char*     ClassName(void) const       { return "BCWindow"; }
        virtual class_t   ClassType(void) const       { return kBCWindow; }
        virtual bool_t    IsOfType(const void *pType) const { return *(class_t*) pType == kBCWindow ||
TWindow::IsOfType(pType); }
        bool_t                  IsDirty(void);

        // CUSTOMIZED BEHAVIOR
        virtual void      InitWindow(void);
        virtual void      DoItemHit(ls_index itemHit);
        virtual void      DoIdle(void);
```

```
        virtual ulong       CalcIdle(void);
        QuadView*                    GetQuadView(void)                  { return fQuadView; }
        QuadIcon*                    GetDynamicIcon(void)          { return fDynamicIcon; }
        QuadIcon*                    GetCompanionIcon(void)        { return fCompanionIcon; }
        QuadIcon*                    GetDependentIcon(void)        { return fDependentIcon; }

        void                         SetRelationshipText(char* theText, int relationship);
        void                         DrawRelationshipText(int relationship);
        inline   void       EraseRelationshipText(void);

        gl_coord_t                   GetRightAreaEdge(void)        { return fRightAreaEdge; }
        GLRect                       GetContextRect(void)          { return fContextRect; }

        void                         UseGraphEnv(void)                  {         fGraphEnv.Use(); }
        void                         UnuseGraphEnv(void)                {         fGraphEnv.Unuse(); }

protected:
        // DATA MEMBERS
        Dramatica*                   fApp;
        DRDoc*                       fDoc;
        PText*                       fBCPrefsPT;                        // Preference Segment

        QuadView*                    fQuadView;                         // Pointer to our quad view
        CastListView*       fCLView;                           // Pointer to our cast list view
        GraphBtn*                    fSelectSetBtns;               // Graphic buttons for Motivation, Methodology,
Evaluation, and Purpose
        ls_index                     fSelectSetBtnIdx;             // Index for the graphic push buttons

        GLRect                       fContextRect;                 // the area where we draw "Luke is motivated... "
        QuadIcon*                    fDynamicIcon;                 // Dynamic relationship quad icon
        QuadIcon*                    fCompanionIcon;               // Companion relationship quad icon
        QuadIcon*                    fDependentIcon;               // Dependent relationship quad icon

        TextWrap*                    fRelationsTW[3];  // Text for Dynamic, Companion & Dependent relationship
        GLRect                       fRelationsRects[3];           // Rectangles for the relations stuff
        Rgn*                         fEraseTextRgn;                // Region used for erasing Relation text
        Rgn*                         fEraseTitleRgn;               // Region used for erasing Relationship Title area
        Rgn*                         fGrayBGRgn;                        // Region used for painting gray area

        Popup*                       fCharTypePopup;               // Popup for setting character type
        ls_index                     fPopupIdx;                         // ID of our popup menu

        gl_coord_t                   fRightAreaEdge;               // Pixel position of the right edge of the Build
Characters work area

        // LOCAL UTILITIES
        virtual void        draw_window(GL_ENV_REF env);
        void                         calc_items_sizes(void);
        virtual bool_t      DoGrow(EVENT_REC *pEvt);
        virtual  void       DoZoom(short partCode);
        virtual void        Resize(void *pNewSize, TObject *pSender = NULL);
        void                         draw_window_items();
        virtual GLPoint     min_window_size(void);

}; /* BCWindow */


/* ------------------------------------------------------------------------
        BCWindow::EraseRelationshipText
   ------------------------------------------------------------------------ */
void BCWindow::EraseRelationshipText(void)
{
        fGraphEnv.SetForeColor(kGLWhiteClr);
        fGraphEnv.PaintRgn(*fEraseTextRgn);
        fGraphEnv.SetForeColor(kGLBlackClr);

} /* BCWindow::EraseRelationshipText */



/* ------------------------------------------------------------------------
        BuildChrCmd - Build characters command
   ------------------------------------------------------------------------ */
class BuildChrCmd : public TCommand {
public:
        BuildChrCmd(TAppl* pTAppl) : TCommand(pTAppl) {}

        virtual char*       ClassName(void)    const      { return "BuildChrCmd"; }
        virtual class_t     ClassType(void) const         { return kBuildChrCmd; }
        virtual bool_t      IsOfType(const void *pType) const { return *(class_t*) pType == kBuildChrCmd ||
TCommand::IsOfType(pType); }
        virtual TObject* Duplicate(void) const            { return new BuildChrCmd(*this); }

        static bool_t       IsValid(TAppl *pTAppl);

protected:
        virtual err_t       do_cmd(void);

}; /* BuildChrCmd */

#pragma segment main


/* xxxxxxxxxxxxxxxxxxxxxxxxxxxxxxxxxxxxxxxxxxxxxxxxxxxxxxxxxxxxxxxxxxxxxxxx
 *  $Log:       buildchr.h,v $
 * Revision 1.9  93/06/04  19:55:00  stephen
 * Worked on automatic updating of view;
 * Plus, added some functions so pressing buttons works.
 *
 * Revision 1.8  93/06/04  15:55:44  chris
 * Cleaned up BCView -- buttons etc.
 *
 * Revision 1.7  93/06/04  13:40:54  stephen
 * Added BCView so Chris could add the pushbuttons.
 *
 * Revision 1.6  93/06/01  13:50:33  chris
 * Cleaned up characteristic set buttons.
 *
 * Revision 1.5  93/05/31  18:14:34  chris
 * Added aesthetic improvements.
 *
 * Revision 1.4  93/05/30  22:04:22  stephen
```

```
 * Tying QuadVIew & CastListView together...
 *
 * Revision 1.3  93/05/28  10:15:03  stephen
 * more work to build character window.
 *
 * Revision 1.2  93/05/27  16:32:47  stephen
 * Windows-specific headerfile inclusion.
 *
 * Revision 1.1  93/05/24  21:33:54  stephen
 * Initial revision
 *
 */

#endif /* __BUILDCHR__ */
```

```
/************************************************************************
	CASTING.CC
	Casting Window
	(c) 1993 Screenplay Systems
	Authors:		S. Greenfield & C. Huntley
	Created:		May 8, 1994
	Revised:		$Id$
*************************************************************************

*/

#include "tappl.h"
#include "apputls.h"
#include "graphics.h"
#include "tview.h"

#include "ptext.h"
#include "dramatic.h"
#include "document.h"
#include "miscutil.h"

#include "castlist.h"
#include "newchar.h"
#include "casting.h"


#pragma segment casting

class CLWindow;


typedef struct {
	char*			titleStr;		// Title of casting list
	seg_id_t		minPictID;		// Min ID for this list
	seg_id_t		maxPictID;		// Max ID for this list
} castingListInitType;

castingListInitType castingListInit[kNmOfCastingViews] =
{
	{ " Male ",			1000,	1999 },
	{ " Female ",			8001,	8999 },
	{ " Children ",			3001,	3999 },
	{ " Miscellaneous ",	4001,	4999 },
	{ " Non-Humans ",		5001,	5999 },
	{ " Custom Pictures ",32767,	65535 },
};


/* ========================================================================
							CASTING VIEW CLASS
		Scrolling lists of available character icons.
   ======================================================================== */


/* ----------------------------------------------------------------------
	CastingView::CastingView - constructor.
------------------------------------------------------------------------- */
CastingView::CastingView(char* title, seg_id_t minPictID, seg_id_t maxPictID, gl_coord_t hSpacing, gl_coord_t vSpacing,
gl_coord_t topMar, gl_coord_t rulerMar, bool_t sizeToWindow, ItemList* pParent, vw_flags vflags, const GLRect *extent,
it_flags iflags, const GLColor *color)
		: CastListView(hSpacing, vSpacing, topMar, rulerMar, sizeToWindow, pParent, vflags, extent, iflags,
color),
		fTitleStr (title),
		fMinPictID (minPictID),
		fMaxPictID (maxPictID)
{


}


/* ----------------------------------------------------------------------
	CastingView::~CastingView - destructor.
------------------------------------------------------------------------- */
CastingView::~CastingView(void)
{

}

/* ------------------------------------------------Stephen---04/18/93---
	CastingView::init_castlist_data - Sets up our data.
------------------------------------------------------------------------- */
void CastingView::init_castlist_data(void)
{
	short hPixelsAvail			= fExtent.right - fExtent.left - 16;
	short hPixelsPerItem		= fItemRectSize.right + fHorzItemSpacing;
	fNumItemsPerLine			= 32767;

	//	Count up the applicable number of pictures in the range we're interested in

	short	totalNmCharPicts = fDoc->GetNmCharPicts();
	SList*	charPictList	= fDoc->GetCharPictList();
	short	nmOfPictsInView	= 0;

	for (ls_index pictIndex=0; pictIndex<totalNmCharPicts; ++pictIndex) {
		ushort pictID = charPictList->Elem(pictIndex);
		if (pictID >= fMinPictID) {
			if (pictID <= fMaxPictID)
				++nmOfPictsInView;
#if 0
			else
				break;
#endif
		}
	}

	size_t allocSize = sizeof(CLDataType) * nmOfPictsInView;
	fCLDataHdl = MM_ALLOC_INIT(allocSize, mm_no_flags, 0, "Casting icon table", NULL);
	assert(fCLDataHdl);
	fCLData = (CLDataType*)MM_USE(fCLDataHdl);
```

```
        int             r               = 1;                            // Row for this character
        int             c               = 1;                            // Column for this character
        gl_coord_t      hPos    = fHorzItemSpacing / 2;
        gl_coord_t      vPos    = fTopMargin;
        fColumns                        = 0;

        ls_index whichPict = 0;
        for (pictIndex=0; pictIndex<totalNmCharPicts; ++pictIndex) {
                ushort pictID = charPictList->Elem(pictIndex);
                if (pictID >= fMinPictID) {
                        if (pictID <= fMaxPictID) {
                                CLDataType* pCLData        = &fCLData[whichPict];
                                pCLData->charID            = pictID;
                                pCLData->charPictID        = pictID;

                                pCLData->row = r;
                                pCLData->col = c;
                                GLSetRect(&pCLData->charRect, vPos, hPos, vPos+fItemRectSize.bottom,
hPos+fItemRectSize.right);
                                GLSetRect(&pCLData->pictRect, vPos+2, hPos+16, vPos+34, hPos+48);
                                hPos += fItemRectSize.right + fHorzItemSpacing;
                                if (++c > fNumItemsPerLine) {
                                        fColumns = fNumItemsPerLine;
        // fColumns is the most # of columns we've seen
                                        c = 1;
                                // back to first column
                                        ++r;
                                // down one row
                                        hPos = fHorzItemSpacing / 2;
                                        vPos += fItemRectSize.bottom + fVertItemSpacing;
                                }

                                ++whichPict;
                        }
#if 0
                        else
                                break;
                                // Passed highest pictID, we're done
#endif
                }
        }

        assert(nmOfPictsInView == whichPict);

        fNmOfCharacters = nmOfPictsInView;
        fRows = r;
        fColumns = MAX(fColumns, c);
        fDataInited = true;
        DocumentResize();

} /* CastingView::init_castlist_data */


/* -------------------------------------------------Stephen---04/18/93---
        CastingView::destruct_castlist_data - disposes of our data.
------------------------------------------------------------------------ */
void CastingView::destruct_castlist_data(void)
{
        assert(fDataInited);

        MM_UNUSE(fCLDataHdl);
        MMFree(fCLDataHdl);

} /* CastingView::destruct_castlist_data */


/* ------------------------------------------------------------------------
        CastingView::DoSingleClick
------------------------------------------------------------------------ */
void CastingView::DoSingleClick(short charID, LgRect* cellRect, GLPoint mousePt)
{
        CastingWindow*    pCastingWindow = (CastingWindow*)fWindow;
        CastingCastListVw* theCastListView = (CastingCastListVw*)pCastingWindow->GetCastListView();
        pCastingWindow->DeselectAll(this);

        if (theCastListView->SelectionExists()) {
                seg_id_t newPictID = (seg_id_t)charID;
                short whichChar = theCastListView->GetWhichCharSelected();
                ushort  prevPictID = theCastListView->AssignCharPict((seg_id_t)whichChar, newPictID);
                fDoc->SetFileSaveFlag();
        }

} /* CastingView::DoSingleClick */


/* ------------------------------------------------------------------------
        CastingView::Resize -
------------------------------------------------------------------------ */
void CastingView::Resize(void *pNewSize, TObject *pSender)
{
        if (fSizeToWindow || !fFirstTimeResized) {
                GLRect myBounds = GetBounds();
                GLRect portRect;
                GetParentWindow()->GetPortRect(&portRect);
                myBounds.right = portRect.right - 15;
                SetBounds(&myBounds);
                resize_items();
        }
        else fFirstTimeResized = true;

        if (fDataInited)
                destruct_castlist_data();
        init_castlist_data();
        rescan_for_highlighted_char();
        Inval();
} /* CastingView::Resize */


/* ========================================================================
                                        SPECIAL RESIZE FOR CASTLIST
   ======================================================================== */
```

```
/* -----------------------------------------------------------------------
        CastingCastListVw::Resize -
----------------------------------------------------------------------- */
void CastingCastListVw::Resize(void *pNewSize, TObject *pSender)
{
        if (fSizeToWindow || !fFirstTimeResized) {
                GLRect myBounds = GetBounds();
                GLRect portRect;
                GetParentWindow()->GetPortRect(&portRect);
                myBounds.bottom = portRect.bottom;
                SetBounds(&myBounds);
                resize_items();
        }
        else fFirstTimeResized = true;

        if (fDataInited)
                destruct_castlist_data();
        init_castlist_data();
        rescan_for_highlighted_char();
        Inval();
} /* CastingCastListVw::Resize */


/* =======================================================================
                                                    CASTING WINDOW CLASS
   ======================================================================= */


/* -----------------------------------------------------------------------
        CastingWindow::CastingWindow - CONSTRUCTOR
----------------------------------------------------------------------- */
CastingWindow::CastingWindow(TAppl *pTAppl, TDoc *pTDoc, const GLRect *bounds, wn_type windowType, const char *title,
ptr_t storage)
                : TWindow(pTAppl, pTDoc, windowType, TWindow::kNoFlags, bounds, title, storage),
                  fCLView (NULL)
{
        fApp            = (Dramatica*)GetParentApp();
        fDoc            = (DRDoc*)fApp->ActiveWindow()->GetDoc();
        assert(fDoc);
        fDoc->SetCastingWindow(this);

        pt_err   theErr;
        fCastingPrefsPT = new PText(fApp->GetPrefsFile(), _OSType("CTNG"), 0, &theErr);          // Grab Preferences
for Report Window
        assert((theErr == noerr) || (theErr == kNoSuchPFMSeg));

        //      Restore user's preferred window size & position

        fApp->RestoreWindowPosition(fCastingPrefsPT, (TWindow*) this, "CTNG");

} /* CastingWindow::CastingWindow */


/* -----------------------------------------------------------------------
        CastingWindow::~CastingWindow - DESTRUCTOR
----------------------------------------------------------------------- */
CastingWindow::~CastingWindow(void)
{
        fDoc->SetCastingCastListView(NULL);
        fDoc->SetCastingWindow(NULL);

        //      Save off any preferences

        fApp->SaveWindowPosition(fCastingPrefsPT, (TWindow*)this, "CTNG");

        fCastingPrefsPT->SaveSeg();
        delete fCastingPrefsPT;

} /* CastingWindow::~CastingWindow */

#define TITLE_AREA_OFFSET  12

/* -----------------------------------------------------------------------
        InitWindow::SetupWindow -
----------------------------------------------------------------------- */
void CastingWindow::InitWindow(void)
{
        assert(fItems == NULL);

        fItems = new ItemList(this);

        GLRect portBounds;
        GetPortRect(&portBounds);
        fCastListRect = portBounds;
        fCastListRect.top = 36;
        fCastListRect.right = fCastListRect.left + 100;
        TItem* newCLItem = new CastingCastListVw(20, 20, 20, 0, false, fItems, (TView::kVScroll), &fCastListRect); /*
TItem::kResizable); */
        assert(newCLItem);
        fCLView = (CastingCastListVw*)newCLItem;
        fItems->Append(newCLItem);
        fDoc->SetCastingCastListView((CastListView*)fCLView);

        GLRect castingViewRect = portBounds;
        castingViewRect.top = TITLE_AREA_OFFSET;
        castingViewRect.left = fCastListRect.right;
        castingViewRect.right -= 15;
                // Account for right scroll bar
        for (short whichView=0; whichView <kNmOfCastingViews; ++whichView) {
                castingViewRect.bottom = castingViewRect.top + CL_HIGH;
                castingListInitType* pCVInit = &castingListInit[whichView];
                TItem* newCVItem = new CastingView(pCVInit->titleStr, pCVInit->minPictID, pCVInit->maxPictID, 8, 40, 5,
0, false, fItems, (TView::kHScroll + TView::kNoBorder), &castingViewRect);
                assert(newCVItem);
                fCastingViews[whichView] = (CastingView*)newCVItem;
                fItems->Append(newCVItem);

                castingViewRect.top = castingViewRect.bottom + TITLE_AREA_OFFSET;       // Calculate position of next
view
        }
```

```
        init_itemlist();

        fCLView->InitView();
        for (whichView=0; whichView <kNmOfCastingViews; ++whichView)
                fCastingViews[whichView]->InitView();

} /* CastingWindow::InitWindow */


/* -------------------------------------------------------------------------
        CastingWindow::DoGrow - This virtual function gets called when the user
        clicks on the grow box and changes the window size.
---------------------------------------------------------------------------- */
bool_t  CastingWindow::DoGrow(EVENT_REC *pEvt)
{
        TWindow::DoGrow(pEvt);
        resize_window_items();
        Inval();
        return true;                                        // This is required, but what does it mean?

} /* CastingWindow::DoGrow */


/* -------------------------------------------------------------------------
        CastingWindow::DoZoom - This virtual function gets called when the user
        clicks in the zoom box.
---------------------------------------------------------------------------- */
void CastingWindow::DoZoom(short partCode)
{
        TWindow::DoZoom(partCode);
        Inval();
        resize_window_items();

} /* CastingWindow::DoZoom */



/* -------------------------------------------------------------------------
        CastingWindow::resize_window_items - does the bulk of window item
        resizing.
---------------------------------------------------------------------------- */
void CastingWindow::resize_window_items(void)
{
        fGraphEnv.Use();
        GLRect savedClipRect;
        GLRect emptyRect;
        GLSetRect(&emptyRect, 0, 0, 0, 0);
        fGraphEnv.GetClipRect(&savedClipRect);
        fGraphEnv.SetClipRect(emptyRect);

        fCLView->Resize(NULL, NULL);
        for (short whichView=0; whichView <kNmOfCastingViews; ++whichView)
                fCastingViews[whichView]->Resize(NULL, NULL);

        fGraphEnv.SetClipRect(savedClipRect);
        fGraphEnv.Unuse();

} /* CastingWindow::resize_window_items */

/* -------------------------------------------------------------------------
        CastingWindow::draw_window_items - draw misc. static stuff in the view.
---------------------------------------------------------------------------- */
void CastingWindow::draw_window_items()
{
        GLColor savedForeColor;
        GLColor savedBackColor;

        fGraphEnv.GetForeColor(&savedForeColor);
        fGraphEnv.GetBackColor(&savedBackColor);

        GLRect playerTitleRect = fCastListRect;
        playerTitleRect.top = 0;
        playerTitleRect.bottom = fCastListRect.top;
        --playerTitleRect.right;
        fGraphEnv.SetForeColor(kGL25GrayClr);
        fGraphEnv.SetBackColor(kGL25GrayClr);
        fGraphEnv.PaintRect(playerTitleRect);
        CoolFrameRect(&fGraphEnv, &playerTitleRect, &kGLBevelUpPat, 2, &kGLWhiteClr, &kGL75GrayClr);

        fGraphEnv.SetTextAttr(GL_SYS_FONT, 12);
        fGraphEnv.MoveTo(16, 15);
        fGraphEnv.SetForeColor(kGLBlackClr);
        fGraphEnv.DrawStr("Objective");
        fGraphEnv.MoveTo(12, 31);
        fGraphEnv.DrawStr("Characters");

        fGraphEnv.SetForeColor(savedForeColor);
        fGraphEnv.SetBackColor(savedBackColor);


        //      DRAW CUSTOM STUFF FOR EACH CASTLISTVIEW

        for (short whichView=0; whichView <kNmOfCastingViews; ++whichView) {

                //      Draw title line

                GLRect viewExtent = fCastingViews[whichView]->GetBounds();

                fGraphEnv.SetPenSize(2, 2);
                fGraphEnv.MoveTo(viewExtent.left, viewExtent.top - 4);
                fGraphEnv.LineTo(viewExtent.right-1, viewExtent.top - 4);
                fGraphEnv.SetPenSize(1, 1);


                //      Now add appropriate titles

                char* titleStr = fCastingViews[whichView]->GetTitleStr();
                gl_coord_t          titleWidth = fGraphEnv.GetStrWidth(titleStr);
                gl_coord_t leftSide = viewExtent.left + ((viewExtent.right - viewExtent.left) / 2) - (titleWidth/2);
                GLRect titleRect;
                GLSetRect(&titleRect, viewExtent.top-12, leftSide, viewExtent.top, leftSide + titleWidth);
                fGraphEnv.EraseRect(titleRect);
                fGraphEnv.StrRect(titleStr, titleRect, GL_JUST_CENTER, false);
```

```
	}

} /* CastingWindow::draw_window_items */

/* ------------------------------------------------------------------------
	CastingWindow::draw_window - draw the contents of the window.
------------------------------------------------------------------------ */
void CastingWindow::draw_window(GL_ENV_REF env)
{
	TWindow::draw_window(env);
	draw_window_items();						// draw non-castlist stuff

} /* CastingWindow::draw_window */


/* ------------------------------------------------------------------------
	CastingWindow::DeselectAll - Deselects whatever other view has a
	selection in it, so there can only be one view.
------------------------------------------------------------------------ */
void CastingWindow::DeselectAll(CastingView* excludeThisView)
{
	for (short whichView=0; whichView <kNmOfCastingViews; ++whichView) {
		CastingView* theView = fCastingViews[whichView];
		if (theView->SelectionExists() && (theView != excludeThisView))
			theView->DeselectAll();
	}

} /* CastingWindow::DeselectAll */

/* ------------------------------------------------------------------------
							CASTING COMMAND CLASS
------------------------------------------------------------------------ */


/* ------------------------------------------------------------------------
	CastingCmd::IsValid -
------------------------------------------------------------------------ */
bool_t CastingCmd::IsValid(TAppl *pApp)
{
	ls_index		activeDoc		= pApp->ActiveDoc();
	if (activeDoc != kLsNoElem) {
		DRDoc*	theDoc = ((DRDoc*)pApp->GetDoc(activeDoc));
		return (theDoc != NULL);
	}
	return (false);

} /* CastingCmd::IsValid */

/* ------------------------------------------------------------------------
	CastingCmd::do_cmd -
------------------------------------------------------------------------ */
err_t CastingCmd::do_cmd(void)
{
	GLRect myBounds;
	DRDoc*	theDoc = ((DRDoc*)fParentApp->ActiveWindow()->GetDoc());
	assert(theDoc);
	theDoc->GetOptWindowRect(&myBounds, NULL);

	CastingWindow* pTWindow = new CastingWindow(fParentApp, theDoc, &myBounds, WN_SIZE_WINDOW, "Casting");

	if (pTWindow) {
		theDoc->GetWindowList()->Append(pTWindow);
		pTWindow->InitWindow();
		pTWindow->ShowWindow();
		fParentApp->SetActiveWindows();

		fParentApp->ClearStoragePtr();
	}

	return NOERR;
} /* CastingCmd::do_cmd */


#pragma segment main
```

```
/* -----------------------------------------------------------------------
        CASTING.H
        Casting window
        Copyright (C) 1993 Screenplay Systems Inc.
        Revised:        $Id$
------------------------------------------------------------------------ */

#pragma once

#ifndef __CASTING__
#define __CASTING__

#include "pfm.h"

#include "consts.h"
#include "ptext.h"
#include "castlist.h"


#pragma segment casting


/* -----------------------------------------------------------------------
                                                        CASTING VIEW CLASS
        Provides a scrolling list of icons for all the characters the user
        can select.
------------------------------------------------------------------------ */
class CastingView : public CastListView {
public:
        // CONSTRUCTION/DESTRUCTION
        CastingView(char* title, seg_id_t minPictID, seg_id_t maxPictID, gl_coord_t hSpacing, gl_coord_t vSpacing,
gl_coord_t topMar, gl_coord_t rulerMar, bool_t sizeToWindow, ItemList* pParent, vw_flags vflags = kNoFlags, const GLRect
*extent = NULL, it_flags iflags = List::kNoFlags, const GLColor *color = &kGLBlackClr);
        virtual ~CastingView(void);

        virtual void      Resize(void *pNewSize, TObject *pSender);
        virtual void      DoSingleClick(short charID, LgRect* cellRect, GLPoint mousePt);
        virtual void      DoDblClick(short charID) { beep(); }

        //      PUBLIC MEMBERS

        char*                   GetTitleStr(void)          { return fTitleStr; }

protected:
        char*           fTitleStr;                  // Title to place above view
        seg_id_t        fMinPictID;                 // Minimum picture ID for this CastingView
        seg_id_t        fMaxPictID;                 // Maximum picture ID for this CastingView


        // LOCAL UTILITIES

        virtual  void     init_castlist_data(void);
        virtual  void     destruct_castlist_data(void);


}; /* CastingView */


/* -----------------------------------------------------------------------
        CastingCastListVw - Cast List view for the casting window.  This is
        descended here expressly so we can override the Resize.
------------------------------------------------------------------------ */
class CastingCastListVw : public CastListView {
public:
        // CONSTRUCTION/DESTRUCTION
        CastingCastListVw(gl_coord_t hSpacing, gl_coord_t vSpacing, gl_coord_t topMar, gl_coord_t rulerMar, bool_t
sizeToWindow, ItemList* pParent, vw_flags vflags = kNoFlags, const GLRect *extent = NULL, it_flags iflags =
List::kNoFlags, const GLColor *color = &kGLBlackClr)
                : CastListView(hSpacing, vSpacing, topMar, rulerMar, sizeToWindow, pParent, vflags, extent, iflags,
color) { }
        virtual ~CastingCastListVw(void) {}

        virtual void      Resize(void *pNewSize, TObject *pSender);

}; /* CastingCastListVw */



const short             kNmOfCastingViews        = 6;

/* -----------------------------------------------------------------------
                                                        CASTING WINDOW CLASS
------------------------------------------------------------------------ */
class CastingWindow : public TWindow {
public:
        // CONSTRUCTION/DESTRUCTION
        CastingWindow(TAppl *pTAppl, TDoc *pTDoc, const GLRect *bounds, wn_type windowType, const char *title, ptr_t
storage = NULL);
        ~CastingWindow(void);

        // PUBLIC UTILITIES
        virtual char*     ClassName(void) const      { return "CastingWindow"; }
        virtual class_t   ClassType(void) const      { return kCastingWindow; }
        virtual bool_t    IsOfType(const void *pType) const { return *(class_t*) pType == kCastingWindow ||
TWindow::IsOfType(pType); }
        bool_t                  IsDirty(void);
//      virtual bool_t    DoItemHit(EVENT_REC *pEvt, GLPoint mPt);

        CastListView*     GetCastListView(void)      { return fCLView; }
        void                    DeselectAll(CastingView* excludeThisView);

        // CUSTOMIZED BEHAVIOR
        virtual void      InitWindow(void);

protected:
        // DATA MEMBERS
        Dramatica*                      fApp;
        DRDoc*                          fDoc;
        PText*                          fCastingPrefsPT;  // Casting prefverences segment

        CastingCastListVw*      fCLView;                        // Pointer to our cast list view
        GLRect                          fCastListRect;
```

```
        CastingView*            fCastingViews[kNmOfCastingViews];   // Ptr to all our CastingViews

        // LOCAL UTILITIES
        virtual void        draw_window(GL_ENV_REF env);
//      virtual void        Resize(void *pNewSize, TObject *pSender = NULL);
        virtual bool_t      DoGrow(EVENT_REC *pEvt);
        virtual  void       DoZoom(short partCode);
        void                        resize_window_items(void);
        void                        draw_window_items();

}; /* CastingWindow */


/* ---------------------------------------------------------------------------
        CastingCmd - Casting Command
------------------------------------------------------------------------------ */
class CastingCmd : public TCommand {
public:
        CastingCmd(TAppl* pTAppl) : TCommand(pTAppl) {}

        virtual char*       ClassName(void)    const     { return "CastingCmd"; }
        virtual class_t     ClassType(void) const        { return kCastingCmd; }
        virtual bool_t      IsOfType(const void *pType) const { return *(class_t*) pType == kCastingCmd ||
TCommand::IsOfType(pType); }
        virtual TObject* Duplicate(void) const        { return new CastingCmd(*this); }

        static bool_t       IsValid(TAppl *pTAppl);

protected:
        virtual err_t       do_cmd(void);

}; /* CastingCmd */


#pragma segment main

#endif /* __CASTING__ */
```

```
/*******************************************************************
        CASTLIST.CC
        Cast List View
        (c) 1993 Screenplay Systems
        Authors:        S. Greenfield & C. Huntley
        Created:        May 18, 1993
        Revised:        $Id$
********************************************************************
*/

#include "tappl.h"
#include "appdlogs.h"
#include "apputls.h"
#include "graphics.h"
#include "tview.h"
#include "bitmap.h"
#include "ssiscrap.h"
#include "graphutl.h"

#include "ptext.h"
#include "miscutil.h"
#include "dramatic.h"
#include "document.h"

#include "structs.h"
#include "semtable.h"
#include "relation.h"
#include "textwrap.h"
#include "newchar.h"
#include "quadview.h"
#include "buildchr.h"
#include "storypnt.h"
#include "castlist.h"

#pragma segment castlist

static void myDragProc(GLPoint mousePt, GLRect* bmRect);
static QuadView* sQuadView;
static GLRect sQVBounds;

/* ------------------------------------------------Stephen---03/19/93---
        CastListView::Constructor
------------------------------------------------------------------------ */
CastListView::CastListView(gl_coord_t hSpacing, gl_coord_t vSpacing, gl_coord_t topMar, gl_coord_t rulerMar, bool_t
sizeToWindow, ItemList* pParent, vw_flags vflags, const GLRect *extent, it_flags iflags, const GLColor *color)
            : TView(pParent, vflags, extent, iflags, color),
                fCLDataHdl (NULL),
                fCLData (NULL),
                fHorzItemSpacing (hSpacing),
                fVertItemSpacing (vSpacing),
                fTopMargin (topMar),
                fTopMarPosition (rulerMar),
                fSelectionExists (false),
                fWhichSelected (-1),
                fUniqueIDSelected (-1),
                fSizeToWindow (sizeToWindow),
                fFirstTimeResized (false),
                fDataInited (false),
                fInstructTW (NULL),
                fNmOfCharacters (0),
                fFont (21),
                fFontSize (9),
                fFace (GL_NORMAL)
{
        init_scrollers();

        fWindow             = pParent->GetParent();
        fApp                = (Dramatica*)GetParentApp();
        fAppPFMFile = fApp->GetPFMFile();
        fDoc                = (DRDoc*)GetDoc();
        assert(fDoc);
        fResponses          = fDoc->GetRESP();
        fWindowRef          = GetParentWindowRef();

//      if (!fSizeToWindow)
//              init_castlist_data();

//      RegisterDragFunc(myDragProc);                    // For semVal tracking...
}

/* ---------------------------------------------------------------------
        CastListView::InitView - Initializes the view.
------------------------------------------------------------------------ */
void CastListView::InitView(void)
{
        if (fWindow->ClassType() == kBCWindow) {
                fQuadView       = ((BCWindow*)fWindow)->GetQuadView();
                sQuadView       = fQuadView;
                fQVBounds       = fQuadView->GetQVBounds();
                sQVBounds       = fQVBounds;
        }
        else {
                fQuadView       = NULL;
                sQuadView       = NULL;
        }

        GLSetRect(&fItemRectSize, 0, 0, CL_HIGH, CL_WIDE);
        GLSetRect(&fPictRect, 2, 16, 2+16, 16+16);

        SetVLineSize(fItemRectSize.bottom + fVertItemSpacing);
        SetHLineSize(fItemRectSize.right + fHorzItemSpacing);
        SetTopMargin(fTopMarPosition);                          // Number of pixel for ruler area
        resize_items();

        init_castlist_data();

} /* CastListView::InitView */
```

```
/* ------------------------------------------------Stephen---04/18/93---
	CastListView::Destructor
--------------------------------------------------------------------- */
CastListView::~CastListView(void)
[
	destruct_castlist_data();
	delete fInstructTW;
}


/* ---------------------------------------------------------------------
	CastListView::resize_items - resets various rects and window-size
	dependent variables.
--------------------------------------------------------------------- */
void CastListView::resize_items(void)
{
	if (fTopMarPosition) {
		GLRect viewExtent = GetBounds();
		GLSetRect(&fRulerRect, 0, viewExtent.left, fTopMarPosition, viewExtent.right);
		GLSetRect(&fTextWrapRect, 10, viewExtent.left, fTopMarPosition-8, viewExtent.right-40);
		char *textStr =  "Double-click on character icons for the Character Information Window";
		if (fInstructTW)
			delete fInstructTW;
		fpGraphEnv->Use();
		fInstructTW = new TextWrap(fDoc, fpGraphEnv, &fTextWrapRect, textStr, GL_GENEVA, 9);
		fpGraphEnv->Unuse();
	}
} /* CastListView::resize_items */


/* ------------------------------------------------Stephen---04/18/93---
	CastListView::init_castlist_data - Sets up our data.
--------------------------------------------------------------------- */
void CastListView::init_castlist_data(void)
{
	fFont			= 21;						// 21 is GL_HELVETICA
	fFontSize		= 9;
	fFace			= GL_NORMAL;
	char tempStr[kMaxCNameLength+10];

	fpGraphEnv->Use();
	fpGraphEnv->SetTextAttr(fFont, fFontSize, fFace);
	GL_FMETRIC		fontMetrics;
	fpGraphEnv->GetFontMetrics(&fontMetrics);
	fFontAscent = gl_get_ascent(&fontMetrics);

	fNmOfCharacters = fDoc->GetNmCharacters();

	short hPixelsAvail			= fExtent.right - fExtent.left - 16;
	short hPixelsPerItem		= fItemRectSize.right + fHorzItemSpacing;
	fNumItemsPerLine		= hPixelsAvail / hPixelsPerItem;
	if (fNumItemsPerLine < 1)
		fNumItemsPerLine = 1;
	assert(fNumItemsPerLine);

	size_t allocSize = sizeof(CLDataType) * fNmOfCharacters;
	fCLDataHdl = MM_ALLOC_INIT(allocSize, mm_no_flags, 0, "Cast List character table", NULL);
	assert(fCLDataHdl);
	fCLData = (CLDataType*)MM_USE(fCLDataHdl);

	int			r		= 1;			// Row for this character
	int			c		= 1;			// Column for this character
	gl_coord_t		hPos	= fHorzItemSpacing / 2;
	gl_coord_t		vPos	= fTopMargin;
	fColumns				= 0;
	for (ls_index charID=0; charID<fNmOfCharacters; ++charID) {
		CLDataType* pCLData = &fCLData[charID];
		pCLData->charID = charID;
		pCLData->charPT = fDoc->GetCharPT(charID);
		assert(pCLData->charPT);
		CharInfoRec charInfo;
		fDoc->GetCharInfoRec(charID, &charInfo);
		pCLData->charPictID = charInfo.charPixID;
		pCLData->uniqueID = charInfo.whichSegment;
		strncpy(tempStr, charInfo.name, kMaxCNameLength);
		tempStr[kMaxCNameLength] = 0;
		if (charInfo.subjective == kCHMain)
			strcat(tempStr, " •");
		else if (charInfo.subjective == kCHObstacle)
			strcat(tempStr, "  ");

		GLRect textRect;
		GLSetRect(&textRect, 0, 0, 22, CL_WIDE-2);						// pull in
two characters from max width
		pCLData->fCharNameTW = new TextWrap(fDoc, fpGraphEnv, &textRect, tempStr, fFont, fFontSize);

		pCLData->row = r;
		pCLData->col = c;
		GLSetRect(&pCLData->charRect, vPos, hPos, vPos+fItemRectSize.bottom, hPos+fItemRectSize.right);
		GLSetRect(&pCLData->pictRect, vPos+2, hPos+16, vPos+34, hPos+48);
		hPos += fItemRectSize.right + fHorzItemSpacing;
		if (++c > fNumItemsPerLine) {
			fColumns = fNumItemsPerLine;						// fColumns
is the most # of columns we've seen
			c = 1;
		// back to first column
			++r;
		// down one row
			hPos = fHorzItemSpacing / 2;
			vPos += fItemRectSize.bottom + fVertItemSpacing;
		}
	}
	fRows = r;
	fColumns = MAX(fColumns, c);
	fDataInited = true;
	DocumentResize();
	fpGraphEnv->Unuse();
} /* CastListView::init_castlist_data */
```

```
/* ---------------------------------------------------Stephen---04/18/93---
        CastListView::destruct_castlist_data - disposes of our data.
------------------------------------------------------------------------ */
void CastListView::destruct_castlist_data(void)
{
        assert(fDataInited);

        int i;
        for (i=0; i<fNmOfCharacters; ++i) {
                delete fCLData[i].fCharNameTW;;
        }

        MM_UNUSE(fCLDataHdl);
        MMFree(fCLDataHdl);
}


/* ---------------------------------------------------Stephen---04/18/93---
        CastListView::draw_view - Does the bulk of drawing our Cast List
        view.
------------------------------------------------------------------------ */
void CastListView::draw_view (const VwPaneUpdateInfo& updateInfo)
{
        assert(fDataInited);
//      fCLData = (CLDataType*)MM_USE(fCLDataHdl);

        GL_ENV_REF env = updateInfo.InqEnv();
        LgPoint         VwOrigin = *updateInfo.InqOffset();         // local coordinates for the view's origin

        gl_coord_t      X                       = (gl_coord_t)(VwOrigin.x);
        gl_coord_t      Y                       = (gl_coord_t)(VwOrigin.y);


        //      Draw Ruler area

        if (fTopMarPosition) {
                GLColor savedForeColor;
                GLColor savedBackColor;

                fpGraphEnv->GetForeColor(&savedForeColor);
                fpGraphEnv->GetBackColor(&savedBackColor);

                fpGraphEnv->SetForeColor(kGL25GrayClr);
                fpGraphEnv->SetBackColor(kGL25GrayClr);
                fpGraphEnv->PaintRect(fRulerRect);
                CoolFrameRect(fpGraphEnv, &fRulerRect, &kGLBevelUpPat, 2, &kGLWhiteClr, &kGL75GrayClr);

                GLRect viewExtent = GetBounds();
                if (viewExtent.right > 200) {                                   // protection against very
narrow display
                        fpGraphEnv->SetForeColor(kGLBlackClr);
                        fInstructTW->Draw(fpGraphEnv, &updateInfo, kNeverPrint, 10, viewExtent.left, fTopMarPosition,
viewExtent.right, GL_JUST_CENTER);
                }

                fpGraphEnv->SetForeColor(savedForeColor);
                fpGraphEnv->SetBackColor(savedBackColor);
        }


        // DRAW REST OF VIEW

        fpGraphEnv->SetTextAttr(fFont, fFontSize);

        gl_coord_t      rowY                    = 0-Y;
        gl_coord_t      totalHeight             = 0;
        gl_coord_t      updateTop;
        gl_coord_t      updateBot;

        //      Clip out top margin area from update region, so we don't try to draw rows there

        GLPoint         marginLineLoc;
        LgPoint         marginLineDoc;
        marginLineLoc.y = fTopMarPosition + 1;                          // Local top margin of 0 is the top of
the view
        marginLineLoc.x = 0;
        loc_to_doc(marginLineLoc, &marginLineDoc);

        //      THIS STUFF GOES INTO DOCUMENT CLASS

        gl_coord_t              stdCharPictHeight       = fDoc->GetStdCharPictHeight();
        gl_coord_t              stdCharPictWidth  = fDoc->GetStdCharPictWidth();

        GLRect myUpdateRect;
        updateInfo.InqLocRgn()->GetRect(&myUpdateRect);

        clip_out_drawing();
        for (int i=0; i<fNmOfCharacters; ++i) {

                GLRect drawRect = fCLData[i].charRect;
                GLOffsetRect(&drawRect, -X, -Y);

                GLRect destRect = drawRect;                                                     //
picture rect for bitmap
                destRect.left += (CL_WIDE-stdCharPictWidth)/2;                  // center bitmap horizontally
                destRect.right = destRect.left + stdCharPictWidth;
                destRect.top += 2;
                destRect.bottom = destRect.top + stdCharPictHeight;

                GLRect   notUsedRect;
                if (GLSectRect(&destRect, &myUpdateRect, &notUsedRect))         {
                        Bitmap* charPict = fDoc->UseCharPICT(fCLData[i].charPictID);
                        GLRect srcRect;
                        GLSetRect(&srcRect, 0, 0, charPict->GetHeight(), charPict->GetWidth());
                        charPict->CopyToScreen(fWindowRef, &destRect, &srcRect);
                        fDoc->UnuseCharPICT(charPict);
                }

                if (fCLData[i].fCharNameTW)
                        fCLData[i].fCharNameTW->Draw(fpGraphEnv, &updateInfo, kNeverPrint, destRect.bottom+4,
drawRect.left, drawRect.bottom, drawRect.right, GL_JUST_CENTER);

                if (fSelectionExists)
```

```
                        draw_highlighting(fCLData[i].row, fCLData[i].col, true);
        }
        restore_clipping(&fExtent);

} /* CastListView::draw_view */


/* --------------------------------------------------Stephen---04/19/93---
        CastListView::draw_highlighting - Highlights or unhightlights a
        particular cell.
------------------------------------------------------------------------ */
void CastListView::draw_highlighting(short row, short col, bool_t hilightOn)
{
        GLColor kRedClr             = { 0xFFFF, 0x0000, 0x0000 };

        if (fRowSelected == row && fColSelected == col) {
                LgRect cellRect;
                GLRect localRect;
                get_cell_rect(&cellRect, row, col);
                doc_to_loc_rect(&cellRect, &localRect);
                GLInsetRect(&localRect, -3, -3);

                fpGraphEnv->Use();
                clip_out_drawing();

                fpGraphEnv->SetPenSize(3, 3);
                GLColor savedForeColor;
                fpGraphEnv->GetForeColor(&savedForeColor);
                GLColor* highlightColor;

                if (hilightOn)
                        highlightColor = (AP_UseColor()) ? &kRedClr : (GLColor*)&kGLBlackClr;            // Red or
black for hi-light
                else
                        highlightColor =  (GLColor*)&kGLWhiteClr;
                        // White for erase


                fpGraphEnv->SetForeColor(*highlightColor);
                fpGraphEnv->FrameRect(localRect);
                fpGraphEnv->SetForeColor(savedForeColor);
                fpGraphEnv->SetPenSize(1, 1);

                restore_clipping();
                fpGraphEnv->Unuse();
        }
} /* CastListView::draw_highlighting */


/* -----------------------------------------------------------------------
        CastListView::rescan_for_highlighted_char - if there is a current
        selection, this function rescans the character's uniqueID fields to
        determine which character is the currently selected one.  This is
        necessary because when the window is resized, or items are renamed, the
        order of the items will become resorted.
------------------------------------------------------------------------ */
void CastListView::rescan_for_highlighted_char(void)
{
        if (fSelectionExists) {
                for (ls_index charID=0; charID<fNmOfCharacters; ++charID) {
                        CLDataType* pCLData = &fCLData[charID];
                        if (fUniqueIDSelected == pCLData->uniqueID) {
                                fRowSelected = pCLData->row;
                                fColSelected = pCLData->col;
                                return;
                        }
                }
                fSelectionExists  = false;                  // UH UH -- the character disappeared! (maybe deleted)
                fWhichSelected          = -1;                        // So I guess we can safely say there's no more
selection
                fUniqueIDSelected         = -1;
        }
        else fUniqueIDSelected = -1;

} /* CastListView::rescan_for_highlighted_char */


/* -----------------------------------------------------------------------
        CastListView::clip_out_drawing - temporarily turn off clipping.  Used
        to prevent ICONS from drawing into the window when they are set or
        modified.
------------------------------------------------------------------------ */
void CastListView::clip_out_drawing()
{
        fpGraphEnv->Use();
        fpGraphEnv->GetClipRect(&fSavedClipRect);
        GLRect charArea = fExtent;
        charArea.top += fTopMarPosition + 1;
        if (HasHScroll())
                charArea.right -= 16;
        if (HasVScroll())
                charArea.bottom -= 16;
        fpGraphEnv->SetClipRect(charArea);
        fpGraphEnv->Unuse();
} /* CastListView::clip_out_drawing */


/* -----------------------------------------------------------------------
        CastListView::restore_clipping - restore clipping.
------------------------------------------------------------------------ */
void CastListView::restore_clipping(GLRect* restoreRect)
{
        fpGraphEnv->Use();
        fpGraphEnv->SetClipRect((restoreRect) ? *restoreRect : fSavedClipRect);
        fpGraphEnv->Unuse();
} /* CastListView::restore_clipping */

/* --------------------------------------------------Stephen---04/19/93---
        CastListView::doc_to_loc_rect - Converts document LgRect to GLRect
```

```
---------------------------------------------------------------------------- */
GLRect*  CastListView::doc_to_loc_rect(LgRect* docRect, GLRect* localRect)
{
	LgPoint  docTopLeft;
	LgPoint  docBotRight;
	GLPoint  locTopLeft;
	GLPoint  locBotRight;

	docTopLeft.y	= docRect->top;
	docTopLeft.x	= docRect->left;
	docBotRight.y	= docRect->bottom;
	docBotRight.x	= docRect->right;

	doc_to_loc(&docTopLeft, &locTopLeft);
	doc_to_loc(&docBotRight, &locBotRight);

	localRect->top		= locTopLeft.y;
	localRect->left		= locTopLeft.x;
	localRect->bottom	= locBotRight.y;
	localRect->right  = locBotRight.x;

#if 0
   LgPoint docOrigin = { 0, 0 };
   GLPoint locOrigin;
   doc_to_loc(&docOrigin, &locOrigin);
   OffsetLgRect(theRect, locOrigin.x, locOrigin.y);
#endif
   return (localRect);
}

static GLPoint prevMousePt;

/* -------------------------------------------------Stephen---05/30/93---
	   myDragProc - called by bitmap dragging, used to determine which
	   quad we're over.
---------------------------------------------------------------------------- */
static void myDragProc(GLPoint mousePt, GLRect* bmRect)
{
	if (sQuadView == NULL)
		return;

	if (GLEqualPt(mousePt, prevMousePt)) {
		sQuadView->CastToQuadDragEvent(mousePt, kQVDragEvent);
	}
	else prevMousePt = mousePt;
}

/* -------------------------------------------------Stephen---04/19/93---
	CastListView::DoItemHit - handles mouse-down events in the cast list
	view.
---------------------------------------------------------------------------- */
bool_t CastListView::DoItemHit(EVENT_REC *pEvt, GLPoint mousePt)
{
	LgPoint		docMousePt;						// The mouse point in
document coordinates
	bool_t		isDblClick = AP_DblClick(pEvt);
	assert(fDataInited);


	if (!TView::DoItemHit(pEvt, mousePt)) {
		short	row;
		short	col;
		LgRect	cellRect;
		short	charID;

		if (mousePt.y < fExtent.top + fMargins.y) {
			beep();
			return (true);
		}

		loc_to_doc(mousePt, &docMousePt);
		if (find_cell(docMousePt, &cellRect, &row, &col, &charID)) {
			seg_id_t uniqueID = fCLData[charID].uniqueID;
			fpGraphEnv->Use();
			if (fSelectionExists)
				draw_highlighting(fRowSelected, fColSelected, false);

			//	SET UP SELECTION

			fSelectionExists = true;
			fRowSelected = row;
			fColSelected = col;

			if (isDblClick && uniqueID == fUniqueIDSelected) {
				DoDblClick(charID);
			}
			else {
				DoSingleClick(charID, &cellRect, mousePt);
			}

			// DO THE SELECTION

			if (fSelectionExists)						// May have
become deselected in dbl-click function
				draw_highlighting(fRowSelected, fColSelected, true);
			fWhichSelected		= charID;
			fUniqueIDSelected		= uniqueID;

			fpGraphEnv->Unuse();
		}
		else {
			if (fSelectionExists)
				DeselectAll();
			else
				beep();
		}

	}
	return (true);
} /* CastListView::DoItemHit */
```

```
/* -----------------------------------------------------------------------
	CastListView::DoSingleClick - a virtual function that handles whatever
	function is desired for a single-click.
----------------------------------------------------------------------- */
void CastListView::DoSingleClick(short charID, LgRect* cellRect, GLPoint mousePt)
{
	LgPoint		docMousePt;						// The mouse point in
document coordinates
	loc_to_doc(mousePt, &docMousePt);

	if (fQuadView) {
		fQuadView->SetQVDragCharacter(fCLData[charID].charID);

//		GLRect localRect;
//		doc_to_loc_rect(cellRect, &localRect);

//		GLRect destRect = localRect;
		Bitmap* charPict = fDoc->UseCharPICT(fCLData[charID].charPictID);

//		destRect.right = destRect.left + charPict->GetWidth();
//		destRect.bottom = destRect.top + charPict->GetHeight();

		GLPoint offset;
		offset.y = (short)(cellRect->top-docMousePt.y);
		offset.x = (short)(cellRect->left-docMousePt.x);

		GLRect winBounds;
		fpGraphEnv->Use();
		fWindow->GetPortRect(&winBounds);

		gl_coord_t		stdCharPictHeight	= fDoc->GetStdCharPictHeight();
		gl_coord_t		stdCharPictWidth  = fDoc->GetStdCharPictWidth();

		GLRect ScaleRect,DestRect;
		DestRect.left = 0;
		DestRect.top = 0;
		DestRect.right = stdCharPictWidth;
		DestRect.bottom = stdCharPictHeight;
		ScaleRect.left = 0;
		ScaleRect.top = 0;
		ScaleRect.right = charPict->GetWidth();
		ScaleRect.bottom = charPict->GetHeight();

		GL_do_best_fit( &ScaleRect, &DestRect );
		GLPoint dropPt = AP_DragColorRgn(GetParentWindowRef(), charPict, mousePt, &winBounds, &winBounds,
&offset, myDragProc, &ScaleRect);

		fDoc->UnuseCharPICT(charPict);
		fpGraphEnv->Unuse();

		fQuadView->CastToQuadDragEvent(dropPt, kQVDropEvent);
	}
} /* CastListView::DoSingleClick */


/* -----------------------------------------------------------------------
	CastListView::DoDblClick - a virtual function that handles whatever
	action is desired for a double-click.
----------------------------------------------------------------------- */
void CastListView::DoDblClick(short charID)
{
	(new NewCharDlog(fDoc, charID))->ModalLoop();

} /* CastListView::DoDblClick */


/* --------------------------------------------------Stephen---04/19/93---
	CastListView::find_cell - given a point in document coordinates, find
	the cell where the user clicked and return the Rect, row, and column.
	Return TRUE if found, FALSE otherwise.
----------------------------------------------------------------------- */
bool_t CastListView::find_cell(LgPoint docMousePt, LgRect* cellRect, short* row, short* col, short* whichSelected)
{
	assert(fCLData);
	assert(fDataInited);

	int i;
	for (i=0; i<fNmOfCharacters; ++i) {
		GLRect thisCharsRect = fCLData[i].pictRect;
		if (docMousePt.y >= thisCharsRect.top && docMousePt.y <= thisCharsRect.bottom &&
			docMousePt.x >= thisCharsRect.left && docMousePt.x <= thisCharsRect.right) {
			*row = fCLData[i].row;
			*col = fCLData[i].col;
			Rect2LgRect (&fCLData[i].pictRect, cellRect);
			*whichSelected = fCLData[i].charID;
			return (true);
		}
	}
	return (false);
}


/* --------------------------------------------------Stephen---04/19/93---
	CastListView::get_cell_rect - given a row & a column, returns a rect
	of a given cell.
----------------------------------------------------------------------- */
void CastListView::get_cell_rect(LgRect* cellRect, short row, short col)
{
	assert(col > 0 && col <= fColumns);
	assert(row >0 && row <= fRows);
	assert(fDataInited);

	int i;
	for (i=0; i<fNmOfCharacters; ++i) {
		if (fCLData[i].col == col && fCLData[i].row == row) {
			Rect2LgRect (&fCLData[i].pictRect, cellRect);
			return;
		}
	}
	assert(false);
}
```

```
/* ----------------------------------------------------------------------
	CastListView::DeselectAll - Deselect the currently selected character.
------------------------------------------------------------------------- */
void CastListView::DeselectAll(void)
{
	if (fSelectionExists) {
		fpGraphEnv->Use();
		draw_highlighting(fRowSelected, fColSelected, false);
		fSelectionExists  = false;
		fUniqueIDSelected         = -1;
		fWhichSelected            = -1;
		fpGraphEnv->Unuse();
	}
} /* CastListView::DeselectAll */


/* ----------------------------------------------------Stophen---03/19/93---
	CastListView::Resize -
------------------------------------------------------------------------- */
void CastListView::Resize(void *pNewSize, TObject *pSender)
{
	if (fSizeToWindow || !fFirstTimeResized) {
		GLRect myBounds;
		GetParentWindow()->GetPortRect(&myBounds);
		myBounds.bottom   +=1;
		myBounds.top      -=1;
		myBounds.left     -=1;
		myBounds.right    +=1;
		SetBounds(&myBounds);
	}
	else fFirstTimeResized = true;

	resize_items();
	if (fDataInited)
		destruct_castlist_data();
	init_castlist_data();
	rescan_for_highlighted_char();
	Inval();
} /* CastListView::Resize */


/* ----------------------------------------------------------------------
	CastListView::UpdateThisView - Forces the view to rebuild and redraw
	itself.  This function is typically called when modifications to the
	cast list are made.
------------------------------------------------------------------------- */
void CastListView::UpdateThisView(void)
{
	if (fDataInited)
		destruct_castlist_data();
	init_castlist_data();
	rescan_for_highlighted_char();
	Inval();
} /* CastListView::UpdateThisView */


/* ----------------------------------------------------------------------
	CastListView::PasteCharPict - take the PICT from the scrap and paste
	it into the character's picture.
------------------------------------------------------------------------- */
void CastListView::PasteCharPict(void)
{
	Scrap* scrapPtr = fApp->GetScrapPtr();

	if (SelectionExists() && scrapPtr->HasScrap() && scrapPtr->HasRezType(_OSType("PICT"))) {
		Bitmap* bitmapPtr = new Bitmap();
		assert(bitmapPtr);

		scrapPtr->GetScrapBitmap(bitmapPtr);

		seg_id_t newPictID = fDoc->AddCharPICT(bitmapPtr);

		short whichChar = GetWhichCharSelected();
		AssignCharPict(whichChar, newPictID);
	}
} /* CastListView::PasteCharPict */


/* ----------------------------------------------------------------------
	CastListView::AssignCharPict - assigns an ID to a character.  The
	current ID is returned.
------------------------------------------------------------------------- */
seg_id_t CastListView::AssignCharPict(short whichChar, seg_id_t newPictID)
{
	CharInfoRec charInfo;
	fDoc->GetCharInfoRec(whichChar, &charInfo);
	seg_id_t origPictID = charInfo.charPixID;
	charInfo.charPixID = newPictID;
	fDoc->SetCharInfoRec(whichChar, &charInfo);
	charInfo.charPT->SetParam("Pix", 's', newPictID);
	fDoc->UpdateCastViews();
	return (origPictID);

} /* CastListView::AssignCharPict */


/* ----------------------------------------------------------------------
	CastListView::Print - prints the contents of the Cast List View.
------------------------------------------------------------------------- */
err_t CastListView::PrintView(Printing *pPrintMgr)
{
	LgPoint offset;
	offset.x = 0;                                    // print in an unscrolled position.
	offset.y = 0;
	Rgn updateRgn;
	VwPaneUpdateInfo updateInfo(pPrintMgr->GetPrinterEnv()->InqEnvRef(), offset, updateRgn);
	draw_view(updateInfo);

	return NOERR;
```

```
} /* CastListView::PrintView */

#pragma segment main

/* xxxxxxxxxxxxxxxxxxxxxxxxxxxxxxxxxxxxxxxxxxxxxxxxxxxxxxxxxxxxxxxxxxxxxxxxx
 * $Log:          castlist.cc,v $
Revision 1.15  93/09/24  15:29:23  stephen
Cleaned up warnings.

Revision 1.14  93/08/20  13:49:47  stephen
Minor changes.

Revision 1.13  93/06/23  16:26:07  stephen
Changed DragProc.

Revision 1.12  93/06/04  19:55:06  stephen
Worked on auto-update of view.

Revision 1.11  93/06/01  15:32:37  chris
Added ruler area with message about double-clicking.

Revision 1.10  93/06/01  09:16:10  stephen
Better dragging cosmetics.

Revision 1.9  93/05/31  18:20:16  stephen
More dragging stuff...

Revision 1.8  93/05/30  22:04:49  stephen
Fixed terrible CRASH when destructing the view.

Also, did work on selection dragging.

Revision 1.7  93/05/29  22:51:31  chris
Cleaned up character selection and dragging.

Revision 1.6  93/05/29  22:00:21  chris
Added textwrap to the character name & cleaned up display.

Revision 1.5  93/05/29  18:54:18  stephen
More fundamental work...

Revision 1.4  93/05/28  10:15:05  stephen
Improved scrolling.

Revision 1.3  93/05/24  21:34:08  stephen
Fixed various stuff.

Revision 1.2  93/05/20  17:19:42  stephen
Added selection & double click!

Revision 1.1  93/05/18  20:44:55  stephen
Initial revision

 */
```

```
/* ---------------------------------------------------------------------------
	CASTLIST.H
	Cast list view class
	Copyright (C) 1993 Screenplay Systems Inc.
	Revised:	$Id: castlist.h,v 1.10 93/06/04 19:55:23 stephen Exp Locker: stephen $
---------------------------------------------------------------------------- */

#pragma once

#ifndef __CASTLIST__
#define __CASTLIST__

#include "ItemList.h"
#include "tview.h"
#include "consts.h"
#include "quadview.h"

#pragma segment castlist

#define		CL_WIDE		64			// width in pixels of the charater item
#define		CL_HIGH		64			// width in pixels of the charater item

//	Cast List Data

typedef struct {
	short		charID;			// ID of this character
	seg_id_t	uniqueID;		// Segment (unique ID) of character
	PText*		charPT;			// Ptext of this character
	TextWrap*	fCharNameTW;	// Ptr to our pre-wrapped character name text
	GLRect		charRect;		// Rectangle of this character
	short		row;			// Row of this character
	short		col;			// Column of this character
	GLRect		pictRect;		// the rect for the pict in local coordinates within
charRect
	short		charPictID;		// Which picture associated with character
} CLDataType;

/* ---------------------------------------------------------------------------
	CastListView - Dramatica's Cast List view.
---------------------------------------------------------------------------- */
class CastListView : public TView {
public:
	// CONSTRUCTION/DESTRUCTION
	CastListView(gl_coord_t hSpacing, gl_coord_t vSpacing, gl_coord_t topMar, gl_coord_t rulerMar, bool_t
sizeToWindow, ItemList* pParent, vw_flags vflags = kNoFlags, const GLRect *extent = NULL, it_flags iflags =
List::kNoFlags, const GLColor *color = &kGLBlackClr);
	virtual ~CastListView(void);

	// PUBLIC UTILITIES
	virtual char*		ClassName(void) const	{ return "CastListView"; }
	virtual class_t		ClassType(void) const	{ return kCastListView; }
	virtual bool_t		IsOfType(const void *pType) const { return *(class_t*) pType == kCastListView ||
TView::IsOfType(pType); }
	virtual TObject* Duplicate(void) const		{ return new CastListView(*this); }
	virtual byte_cnt		GetObjSize(void)	{ return sizeof(CastListView); }
	virtual byte_cnt		GetAllocSize(void)		{ return MMGetSize(fCLDataHdl);}

	// PUBLIC BEHAVIOR
	virtual void		draw_view(const VwPaneUpdateInfo& updateInfo);
	virtual err_t		PrintView(Printing *pPrintMgr);
	virtual void		Resize(void *pNewSize, TObject *pSender);
	virtual void		Frame(void *env, TObject *pSender = NULL) {}		// TItem:: function.  Overriden here to
prevent framing of view
	virtual void		InitView(void);

	virtual	long		GetNumVLines(void)		{ return (long)(fRows-1); }
	virtual	long		GetNumHLines(void)			{ return (long)(fColumns-1); }

	void			UpdateThisView(void);
	bool_t			SelectionExists(void)		{ return fSelectionExists; }
	short			GetWhichCharSelected(void)	{ return fWhichSelected; }
	void			DeselectAll(void);
	void			PasteCharPict(void);
	seg_id_t		AssignCharPict(short whichChar, seg_id_t newPictID);

	virtual void		DoSingleClick(short charID, LgRect* cellRect, GLPoint mousePt);
	virtual void		DoDblClick(short charID);

protected:
	Dramatica*		fApp;
	DRDoc*			fDoc;
	TWindow*		fWindow;
	pfm_fd_t		fAppPFMFile;
	PText*			fResponses;
	WINDOW_REF		fWindowRef;

	QuadView*		fQuadView;			// Points to our BuildChar's QuadView (if connected)
	GLRect			fQVBounds;			// Area of our QuadView
	GLRect			fSavedClipRect;		// Used when turning clipping off

	hdl_t			fCLDataHdl;			// Handle to memory allocated for our cast list datas
	CLDataType*		fCLData;			// Point to the array
	bool_t			fDataInited;		// TRUE if we've initialized data at least once

	bool_t			fSizeToWindow;		// TRUE if we want the view to match the window's dimensions
	bool_t			fFirstTimeResized;	// Becomes TRUE the first time we go through resize loop

	short			fNmOfCharacters;	// Total number of characters to display
	GLRect			fItemRectSize;		// Rect of each char item
	GLRect			fRulerRect;			// Rect of upper ruller area
	gl_coord_t		fTopMargin;			// Min space from top of view to top of first icon
	gl_coord_t		fTopMarPosition;	// first pixel of top margin (if any)
	gl_coord_t		fHorzItemSpacing;	// # of pixels between characters horizontally
	gl_coord_t		fVertItemSpacing;	// # of pixels between characters vertically
	short			fNumItemsPerLine;	// # of characters that can fit on a line
	short			fRows;				// Total # of rows
	short			fColumns;			// Total # of columns
```

```
        GLRect          fPictRect;                      // the master rect for the pict to be used in local
coordinates within charRect
        bool_t          fSelectionExists;       // TRUE if the user has a selection
        short           fRowSelected;           // contains # of row selected
        short           fColSelected;           // contains # of column selected
        short           fWhichSelected;         //  index of character selected
        seg_id_t        fUniqueIDSelected;      // unique ID (segment) of character selected

        TextWrap*       fInstructTW;            // TextWrap for Instruction note at top
        GLRect          fTextWrapRect;          // Rect of the text where to put the note

        gl_font_t       fFont;                          // Font for this window
        short           fFontSize;                      // Size of font
        gl_face_t       fFace;                          // Face
        gl_coord_t      fFontAscent;            // Used to calculate offset of character name from bottom of rect

        // LOCAL UTILITIES

                        void    resize_items(void);
        virtual void    init_castlist_data(void);
        virtual void    destruct_castlist_data(void);

        void            draw_highlighting(short row, short col, bool_t hilightOn);
        void            rescan_for_highlighted_char(void);
        void            clip_out_drawing();
        void            restore_clipping(GLRect* restoreRect = NULL);
        GLRect*         doc_to_loc_rect(LgRect* docRect, GLRect* localRect);
        bool_t          DoItemHit(EVENT_REC *pEvt, GLPoint mousePt);
        bool_t          find_cell(LgPoint marginLineDoc, LgRect* cellRect, short* row, short* col, short*
whichSelected);
        void            get_cell_rect(LgRect* cellRect, short row, short col);

}; /* CastListView */

#pragma segment main

/* xxxxxxxxxxxxxxxxxxxxxxxxxxxxxxxxxxxxxxxxxxxxxxxxxxxxxxxxxxxxxxxxxxxxxxxxxxxxxxxxxx
 *  $Log:       castlist.h,v $
 * Revision 1.10  93/06/04  19:55:23  stephen
 * Worked on auto-update of view.
 *
 * Revision 1.9  93/05/31  18:20:41  stephen
 * More dragging stuff...
 *
 * Revision 1.8  93/05/30  22:05:20  stephen
 * Fixed terrible CRASH when destructing the view.
 *
 * Also, did work on selection dragging.
 *
 * Revision 1.7  93/05/29  22:51:57  chris
 * Cleaned up character selection and dragging.
 *
 * Revision 1.6  93/05/29  22:00:54  chris
 * Added textwrap to the character name & cleaned up display.
 *
 * Revision 1.5  93/05/29  18:54:28  stephen
 * More fundamental work...
 *
 * Revision 1.4  93/05/28  10:15:17  stephen
 * Improved scrolling.
 *
 * Revision 1.3  93/05/24  21:34:27  stephen
 * Fixed various stuff.
 *
 * Revision 1.2  93/05/20  17:20:03  stephen
 * Added selection & double click!
 *
 * Revision 1.1  93/05/18  20:45:08  stephen
 * Initial revision
 *
 */

#endif /* __CASTLIST__ */
```

```
/*********************************************************************
        CHARWIND.CC
        Character Functions Window
        (c) 1993 Screenplay Systems
        Authors:        S. Greenfield & C. Huntley
        Created:        Feb 1, 1994
        Revised:        $Id$
*********************************************************************

*/

#include "tappl.h"
#include "apputls.h"
#include "graphics.h"
#include "tview.h"

#include "ptext.h"
#include "dramatic.h"
#include "document.h"

#include "frontend.h"
#include "castlist.h"
#include "newchar.h"
#include "mainobst.h"
#include "charwind.h"

#pragma segment charwind

class CLWindow;

static initFEDataItems charWinInitData[] =
{
        { 16020, kBtnDisabled,      NULL,                               NULL },
        { 16021, kBtnEnabled,       "Create Character",        "Creates a new character for this story." },
        { 16022, kBtnEnabled,       "Build Characters",        "Assign characteristics to your objective characters." },
        { 16023, kBtnEnabled,       "Delete Character",        "Fires your cast member." },
        { 16024, kBtnEnabled,       "Character Info",          "Calls up information about the selected character." },
        { 16025, kBtnEnabled,       "Main/Obstacle",   "Story Engine-style controls for your subjective characters." },
        { 16026, kBtnEnabled,       "Casting",                         "Access to Dramatica's library of character
images." },
        { 16020, kBtnDisabled,      NULL,                               NULL },
        { 16020, kBtnDisabled,      NULL,                               NULL },
        { 16020, kBtnDisabled,      NULL,                               NULL },
        { 16020, kBtnDisabled,      NULL,                               NULL },
        { 16020, kBtnDisabled,      NULL,                               NULL },
        { 16020, kBtnDisabled,      NULL,                               NULL },
        { 0,       kBtnDisabled,    NULL,                               NULL },
};

/* ----------------------------------------------------------------------
        CharFrontEnd::CharFrontEnd - Constructor.
---------------------------------------------------------------------- */
CharFrontEnd::CharFrontEnd(initFEDataItems* initDataPtr, ItemList* pParent, vw_flags vflags, const GLRect *extent,
it_flags iflags, const GLColor *color)
                : FrontEndView(initDataPtr, pParent, vflags, extent, iflags, color)
{
} /* CharFrontEnd::CharFrontEnd */

/* ----------------------------------------------------------------------
        CharFrontEnd::~CharFrontEnd - Destructor.
---------------------------------------------------------------------- */
CharFrontEnd::~CharFrontEnd(void)
{
} /* CharFrontEnd::CharFrontEnd */


/* ----------------------------------------------------------------------
        CharFrontEnd::DoCommand - execute the button the user pressed.
---------------------------------------------------------------------- */
void CharFrontEnd::DoCommand(short whichCmd)
{
        CharCastListVw* CLView;

        switch (whichCmd+1) {

        case kCWNewChar:            fApp->DoCommand(kCreateCharCmd);
                                                break;

        case kCWBuildChar:                  fApp->DoCommand(kBuildChrCmd);
                                                break;

        case kCWDeleteChar:                 fApp->DoCommand(kDelCharCmd);
                                                break;

        case kCWCharInfo:                   CLView = ((CLWindow*)GetParentWindow())->GetCLView();
                                                if (CLView->SelectionExists()) {
                                                        DRDoc*    theDoc = (DRDoc*)GetDoc();
                                                        assert(theDoc);
                                                        (new NewCharDlog(theDoc, CLView-
>GetWhichCharSelected()))->ModalLoop();
                                                }
                                                else beep();
                                                break;

        case kCWMainObst:                   fApp->DoCommand(kMainObstCmd);
                                                break;

        case kCWCasting:            fApp->DoCommand(kCastingCmd);
                                                break;

        default:                                    assert(false);
                                                beep();
                                                break;

        }
} /* CharFrontEnd::DoCommand */

/* ----------------------------------------------------------------------
```

```
        CharFrontEnd::Resize -
-------------------------------------------------------------------------- */
void CharFrontEnd::Resize(void *pNewSize, TObject *pSender)
{
        GLRect portBounds;
        GetParentWindow()->GetPortRect(&portBounds);
        GLRect frontEndRect = portBounds;
        frontEndRect.right = CHARTILEWIDTH+16;
        SetBounds(&frontEndRect);
        DocumentResize();
} /* CharFrontEnd::Resize */


/* -------------------------------------------------------------------------
        CharCastListVw::Resize -
-------------------------------------------------------------------------- */
void CharCastListVw::Resize(void *pNewSize, TObject *pSender)
{
        if (fSizeToWindow || !fFirstTimeResized) {
                GLRect myBounds;
                GetParentWindow()->GetPortRect(&myBounds);
                myBounds.left += CHARTILEWIDTH+16-1;
                SetBounds(&myBounds);
                resize_items();
        }
        else fFirstTimeResized = true;

        if (fDataInited)
                destruct_castlist_data();
        init_castlist_data();
        rescan_for_highlighted_char();
        Inval();
} /* CharCastListVw::Resize */


/* =========================================================================
                                                          Cast List Window CLASS
   ======================================================================= */

/* -------------------------------------------------------------------------
        CLWindow::CLWindow - CONSTRUCTOR
-------------------------------------------------------------------------- */
CLWindow::CLWindow(TAppl *pTAppl, TDoc *pTDoc, const GLRect *bounds, wn_type windowType, const char *title, ptr_t
storage)
                : TWindow(pTAppl, pTDoc, windowType, TWindow::kNoFlags, bounds, title, storage),
                  fCLView (NULL)
{
        fApp = (Dramatica*)AP_Data()->fApp;
        assert(((DRDoc*)pTDoc)->GetCastListWindow()==NULL);
        ((DRDoc*)pTDoc)->SetCastListWindow(this);
}


CLWindow::~CLWindow(void)
{
        DRDoc* theDoc = (DRDoc*)GetDoc();
        assert(theDoc);
        theDoc->SetCastListView(NULL);
        theDoc->SetCastListWindow(NULL);
} /* CLWindow::~CLWindow */


/* -------------------------------------------------------------------------
        CLWindow::InitWindow -
-------------------------------------------------------------------------- */
void CLWindow::InitWindow(void)
{
        assert(fItems == NULL);
        fItems = new ItemList(this);
        assert(fItems);

        GLRect portBounds;
        GetPortRect(&portBounds);
        GLRect castListRect = portBounds;
        castListRect.left += CHARTILEWIDTH+16-1;
        TItem* newCLItem = new CharCastListVw(20, 40, 20, 40, false, fItems, (TView::kVScroll + TView::kHScroll),
&castListRect);
        assert(newCLItem);
        fCLView = (CharCastListVw*)newCLItem;
        fItems->Append(newCLItem);
        DRDoc* theDoc = (DRDoc*)GetDoc();
        assert(theDoc);
        theDoc->SetCastListView(fCLView);

        GLRect frontEndRect = portBounds;
        frontEndRect.right = CHARTILEWIDTH+16;
        TItem* newViewItem = new CharFrontEnd(charWinInitData, fItems, (TView::kVScroll), &frontEndRect);
        assert(newViewItem);
        fCharFrontEnd = (CharFrontEnd*)newViewItem;
        fCharFrontEnd->SetBtnInset(2);

        fItems->Append(newViewItem);
        init_itemlist();

        fCLView->InitView();
        fCharFrontEnd->InitCmdPixs(&frontEndRect);

} /* CLWindow::InitWindow */


/* -------------------------------------------------------------------------
        CLWindow::min_window_size - return the minimum allowable width and
                height for this window.
-------------------------------------------------------------------------- */
GLPoint CLWindow::min_window_size()
{
        GLPoint  size;

        size.x = 420;
        size.y = 302;

        return size;
```

```
} /* CLWindow::min_window_size */

void CLWindow::Resize(void *pNewSize, TObject *pSender)
{
        TWindow::Resize(pNewSize, pSender);
        fItems->Resize();
}

/* -----------------------------------------------------------------------
        CLWindow::DoGrow - This virtual function gets called when the user
        clicks on the grow box and changes the window size.
----------------------------------------------------------------------- */
bool_t  CLWindow::DoGrow(EVENT_REC *pEvt)
{
        TWindow::DoGrow(pEvt);

        fCLView->Resize(NULL, NULL);
        fCharFrontEnd->Resize(NULL, NULL);

        return true;                                    // This is required, but what does it mean?

} /* CLWindow::DoGrow */


/* -----------------------------------------------------------------------
        CLWindow::DoZoom - This virtual function gets called when the user
        clicks in the zoom box.
----------------------------------------------------------------------- */
void CLWindow::DoZoom(short partCode)
{
        TWindow::DoZoom(partCode);

        fCLView->Resize(NULL, NULL);
        fCharFrontEnd->Resize(NULL, NULL);

} /* CLWindow::DoZoom */


/* -----------------------------------------------------------------------
        CLWindow::DoIdle - do any idle time processing.  This function just
                forwards the request onto the window's EditView.  This function
                could be inlined, but we choose not to to reduce header file
                dependencies.
----------------------------------------------------------------------- */
void CLWindow::DoIdle(void)
{
        fCLView->DoIdle();

} /* CLWindow::DoIdle */

/* -----------------------------------------------------------------------
        CLWindow::CalcIdle - calculates how much idle time we need.
----------------------------------------------------------------------- */
ulong CLWindow::CalcIdle(void)
{
#if 0
        if (fCLView->CaretVisible())
                return GetCaretTime();
        else
#endif
                return kApMaxSleepTime;

} /* CLWindow::CalcIdle */


/* -----------------------------------------------------------------------
        CLWindow::IsDirty - Determines if the current window needs saving.
----------------------------------------------------------------------- */
bool_t  CLWindow::IsDirty(void)
{
        DRDoc*   theDoc = (DRDoc*)GetDoc();
        assert(theDoc);
        return (theDoc->Is(&TDoc::kDirty));
}


/* -----------------------------------------------------------------------
                                                        Cast List COMMAND CLASS
----------------------------------------------------------------------- */


/* -----------------------------------------------------------------------
        CastListCmd::IsValid -
----------------------------------------------------------------------- */
bool_t CastListCmd::IsValid(TAppl *pApp)
{
//      TAppl*          fApp            = AP_Data()->fApp;
        ls_index        activeDoc       = pApp->ActiveDoc();
        if (activeDoc != kLsNoElem) {
                DRDoc*  theDoc = ((DRDoc*)pApp->GetDoc(activeDoc));
                return (theDoc == NULL) ? false : true;
        }
        return (false);

//      return pApp->ActiveWindow() && ! pApp->ActiveWindow()->IsModalDlog();

} /* CastListCmd::IsValid */


/* -----------------------------------------------------------------------
        CastListCmd::do_cmd -
----------------------------------------------------------------------- */
err_t CastListCmd::do_cmd(void)
{
        GLRect myBounds;
        DRDoc*   theDoc = ((DRDoc*)fParentApp->ActiveWindow()->GetDoc());
        assert(theDoc);

        TAppl* theApp = AP_Data()->fApp;
        GLRect screenRect;
```

```
        theApp->GetMainScreenRect(&screenRect);

        myBounds                  = screenRect;
        myBounds.left      = 1;
        if (screenRect.bottom > 400)
                myBounds.bottom = 403;
        else
                myBounds.bottom = 341;
        myBounds.right     = 511;

        CLWindow* pTWindow = new CLWindow(fParentApp, theDoc, &myBounds, WN_SIZE_WINDOW, "Cast List");

        if (pTWindow) {
                theDoc->GetWindowList()->Append(pTWindow);
                pTWindow->InitWindow();
                pTWindow->ShowWindow();
                fParentApp->SetActiveWindows();

                fParentApp->ClearStoragePtr();
        }

        return NOERR;
} /* CastListCmd::do_cmd */

#pragma segment main
```

```
/* ----------------------------------------------------------------------
        CHARWIND.H
        Character functions window
        Copyright (C) 1993 Screenplay Systems Inc.
        Revised:        $Id$
---------------------------------------------------------------------- */

#pragma once

#ifndef __CHARWIND__
#define __CHARWIND__

#include "consts.h"
#include "frontend.h"
#include "castlist.h"


#pragma segment charwind

#define CHARTILEWIDTH    . 204
#define CHARTILEHEIGHT     58

static const ushort       kCWNewChar              = 1;
static const ushort       kCWBuildChar      = 2;
static const ushort       kCWDeleteChar     = 3;
static const ushort       kCWCharInfo             = 4;
static const ushort       kCWMainObst             = 5;
static const ushort       kCWCasting              = 6;

/* ----------------------------------------------------------------------
        CharFrontEnd - Front end for character command.
---------------------------------------------------------------------- */
class CharFrontEnd : public FrontEndView {
public:
        // CONSTRUCTION/DESTRUCTION
        CharFrontEnd(initFEDataItems* initDataPtr, ItemList* pParent, vw_flags vflags = kNoFlags, const GLRect *extent =
NULL, it_flags iflags = List::kNoFlags, const GLColor *color = &kGLBlackClr);
        virtual ~CharFrontEnd(void);

        virtual  void      DoCommand(short whichCmd);
        virtual void       Resize(void *pNewSize, TObject *pSender);

}; /* CharFrontEnd */


/* ----------------------------------------------------------------------
        CharCastListVw - Dramatica's Cast List view.
---------------------------------------------------------------------- */
class CharCastListVw : public CastListView {
public:
        // CONSTRUCTION/DESTRUCTION
        CharCastListVw(gl_coord_t hSpacing, gl_coord_t vSpacing, gl_coord_t topMar, gl_coord_t rulerMar, bool_t
sizeToWindow, ItemList* pParent, vw_flags vflags = kNoFlags, const GLRect *extent = NULL, it_flags iflags =
List::kNoFlags, const GLColor *color = &kGLBlackClr)
                : CastListView(hSpacing, vSpacing, topMar, rulerMar, sizeToWindow, pParent, vflags, extent, iflags,
color) { }
        virtual ~CharCastListVw(void) {}

        virtual void       Resize(void *pNewSize, TObject *pSender);

}; /* CharCastListVw */


/* ----------------------------------------------------------------------
                                                        Cast List Window CLASS
---------------------------------------------------------------------- */
class CLWindow : public TWindow {
public:
        // CONSTRUCTION/DESTRUCTION
        CLWindow(TAppl *pTAppl, TDoc *pTDoc, const GLRect *bounds, wn_type windowType, const char *title, ptr_t storage
= NULL);
        ~CLWindow(void);

        // PUBLIC UTILITIES
        virtual char*      ClassName(void) const      { return "CLWindow"; }
        virtual class_t    ClassType(void) const      { return kCLWindow; }
        virtual bool_t     IsOfType(const void *pType) const { return *(class_t*) pType == kCLWindow ||
TWindow::IsOfType(pType); }
        bool_t                  IsDirty(void);

        // CUSTOMIZED BEHAVIOR
        virtual void       InitWindow(void);
        virtual void       DoIdle(void);
        virtual ulong      CalcIdle(void);
        void                    SetupWindow(void);

        CharCastListVw*    GetCLView(void)                   { return fCLView; }

protected:
        // DATA MEMBERS

        Dramatica*                  fApp;
        CharCastListVw*    fCLView;                // Pointer to our view
        CharFrontEnd*      fCharFrontEnd;

        // LOCAL UTILITIES
//      virtual void       draw_window(GL_ENV_REF env);
        virtual void       Resize(void *pNewSize, TObject *pSender = NULL);
        virtual bool_t     DoGrow(EVENT_REC *pEvt);
        virtual  void      DoZoom(short partCode);
        virtual GLPoint    min_window_size(void);

}; /* CLWindow */


/* ----------------------------------------------------------------------
        CastListCmd - Cast list view command
---------------------------------------------------------------------- */
class CastListCmd : public TCommand {
public:
        CastListCmd(TAppl* pTAppl) : TCommand(pTAppl) {}

        virtual char*      ClassName(void)    const     { return "CastListCmd"; }
```

```
        virtual class_t   ClassType(void) const       { return kCastListCmd; }
        virtual bool_t    IsOfType(const void *pType) const { return *(class_t*) pType == kCastListCmd ||
TCommand::IsOfType(pType); }
        virtual TObject* Duplicate(void) const        { return new CastListCmd(*this); }

        static bool_t     IsValid(TAppl *pTAppl);

protected:
        virtual err_t     do_cmd(void);

}; /* CastListCmd */

#pragma segment main

#endif /* __CHARWIND__ */
```

```
/*********************************************************************
        COMMANDS.CC
        implementation of Dramatica's command classes
        (c) 1993 Screenplay Systems
        Authors:            S. Greenfield & C. Huntley
        Created:            January 23, 1993
        Revised:            $Id$
*********************************************************************

*/

#include "appdlogs.h"
#include "tccontrol.h"
#include "dramatic.h"
#include "drrez.h"
#include "commands.h"
#include "document.h"

#include "structs.h"
#include "query.h"
#include "apprec.h"

#pragma segment commands

/* ---------------------------------------------------------------------
        DramaCmd1::IsValid -
--------------------------------------------------------------------- */
bool_t DramaCmd1::IsValid(TAppl *pApp)
{
        ls_index            activeDoc           = pApp->ActiveDoc();
        if (activeDoc != kLsNoElem) {
                DRDoc*   theDoc = ((DRDoc*)pApp->GetDoc(activeDoc));
                return (theDoc == NULL) ? false : true;
        }
        return (false);

//      return pApp->ActiveWindow() && ! pApp->ActiveWindow()->IsModalDlog();

} /* DramaCmd1::IsValid */


/* ---------------------------------------------------------------------
        DramaCmd1::do_cmd - display the font picker dialog and change the
                font of the front window's edit view if the user clicks OK.
--------------------------------------------------------------------- */
err_t DramaCmd1::do_cmd(void)
{
        TAppl*              fApp                = AP_Data()->fApp;
        ls_index            activeDoc           = fApp->ActiveDoc();
        DRDoc*              theDoc              = ((DRDoc*)fApp->GetDoc(activeDoc));
        assert(theDoc);
        AllResponseCombos(theDoc, NULL, NULL);
        return NOERR;

} /* DramaCmd1::do_cmd */



/* ---------------------------------------------------------------------
        OptionsFont::IsValid -
--------------------------------------------------------------------- */
bool_t OptionsFont::IsValid(TAppl *pApp)
{
        return pApp->ActiveWindow() && ! pApp->ActiveWindow()->IsModalDlog();

} /* OptionsFont::IsValid */

/* ---------------------------------------------------------------------
        OptionsFont::do_cmd - display the font picker dialog and change the
                font of the front window's edit view if the user clicks OK.
--------------------------------------------------------------------- */
err_t OptionsFont::do_cmd(void)
{
#if 0
        DRWindow*           pEDWin = (DRWindow*) fParentApp->ActiveWindow();
        GL_FSPEC            font;

        assert(pEDWin && pEDWin->IsOfType(&kDRWindow));

        pEDWin->GetEDView()->GetTextAttr(&font);

        if (AP_PickFont(&font) == kOkBtn) {
                pEDWin->GetEDView()->SetTextAttr(&font);
                pEDWin->GetEDView()->Inval();
        }
#endif
        return NOERR;

} /* OptionsFont::do_cmd */

/* ---------------------------------------------------------------------
        EDFilePageSetup::do_cmd - Display the page setup dialog. With an
                extended dialog item.
--------------------------------------------------------------------- */
err_t EDFilePageSetup::do_cmd(void)
{
        assert(IsValid(fParentApp));

        TDoc*               pDoc        = fParentApp->ActiveWindow()->GetDoc();
        assert(pDoc);
        Printing*           pPrintMgr = fParentApp->GetPrintInfo();

        assert(pDoc && pPrintMgr);

//      EDDlogXtend         dlogXtend(rEDPrintExtension, pPrintMgr);

        pPrintMgr->ShowPageSetupDlog(pDoc);

        return NOERR;

} /* EDFilePageSetup::do_cmd */
```

```
/* xxxxxxxxxxxxxxxxxxxxxxxxxxxxxxxxxxxxxxxxxxxxxxxxxxxxxxxxxxxxxxxxxxxxxxxxxxx
 * $Log:        commands.cc,v $
Revision 1.7  93/09/24  15:29:28  stephen
Cleaned up warnings.

Revision 1.6  93/08/20  13:50:30  stephen
New DQS command added.

Revision 1.5  93/05/24  21:34:30  stephen
Fixed IsValid checking to respect current document.

Revision 1.4  93/04/19  18:48:02  stephen
Removed OptionsFont menu (old from SSIEDIT)

Revision 1.3  93/04/12  12:25:47  stephen
Changed EDWindow to DRWindow.

Revision 1.2  93/04/06  19:39:36  stephen
First General Revisions

Revision 1.1  93/03/31  22:35:25  stephen
Initial revision

 */
```

```
/* ------------------------------------------------------------------------
        COMMANDS.H
        Declaration of Dramatica's command classes
        Copyright (C) 1993 Screenplay Systems Inc.
        Revised:        $Id: commands.h,v 1.1 93/03/31 22:35:52 stephen Exp Locker: stephen $
------------------------------------------------------------------------ */

#pragma once

#ifndef __EDCMDS__
#define __EDCMDS__

#include "tappl.h"
#include "appcmds.h"

#pragma segment commands
/* ------------------------------------------------------------------------
        DramaCmd1 - the command class associated with the "Cmd1" menu item
                in the "Dramatica" menu.
------------------------------------------------------------------------ */
class DramaCmd1 : public TCommand {
public:
        DramaCmd1(TAppl* pTAppl) : TCommand(pTAppl) {}

        virtual char*     ClassName(void)   const    { return "DramaCmd1"; }
        virtual class_t   ClassType(void) const      { return kDramaCmd1; }
        virtual bool_t    IsOfType(const void *pType) const { return *(class_t*) pType == kDramaCmd1 ||
TCommand::IsOfType(pType); }
        virtual TObject* Duplicate(void) const       { return new DramaCmd1(*this); }

        static bool_t     IsValid(TAppl *pTAppl);

protected:
        virtual err_t     do_cmd(void);

}; /* DramaCmd1 */

/* ------------------------------------------------------------------------
        OptionsFont - the command class associated with the "Font" menu item
                in the "Options" menu.
------------------------------------------------------------------------ */
class OptionsFont : public TCommand {
public:
        OptionsFont(TAppl* pTAppl) : TCommand(pTAppl) {}

        virtual char*     ClassName(void)   const    { return "OptionsFont"; }
        virtual class_t   ClassType(void) const      { return kOptionsFont; }
        virtual bool_t    IsOfType(const void *pType) const { return *(class_t*) pType == kOptionsFont ||
TCommand::IsOfType(pType); }
        virtual TObject* Duplicate(void) const       { return new OptionsFont(*this); }

        static bool_t     IsValid(TAppl *pTAppl);

protected:
        virtual err_t     do_cmd(void);

}; /* OptionsFont */

/* ------------------------------------------------------------------------
        EDFilePageSetup - allow the user to change the printing parameters.
------------------------------------------------------------------------ */
class EXPORT_CLASS EDFilePageSetup : public FilePageSetup {
public:
        EDFilePageSetup(TAppl *pTAppl) : FilePageSetup(pTAppl) {}
        EDFilePageSetup(const EDFilePageSetup &cmd) : FilePageSetup(cmd){}

        // PUBLIC UTILITIES
        virtual char*     ClassName(void) const      { return "EDFilePageSetup"; }
        virtual class_t   ClassType(void) const      { return kEDFilePageSetup; }
        virtual bool_t    IsOfType(const void *pType) const { return *(class_t*) pType == kEDFilePageSetup ||
FilePageSetup::IsOfType(pType); }
        virtual TObject* Duplicate(void) const       { return new EDFilePageSetup(*this); }

protected:
        virtual err_t     do_cmd(void);

}; /* EDFilePageSetup */

/* xxxxxxxxxxxxxxxxxxxxxxxxxxxxxxxxxxxxxxxxxxxxxxxxxxxxxxxxxxxxxxxxxxxxxxxx
 * $Log:          commands.h,v $
 * Revision 1.1  93/03/31  22:35:52  stephen
 * Initial revision
 *
 */

#endif /* __HTCMDS__ */
```

```
/***********************************************************************
	COMPILE.CC
	Compile story files
	(c) 1994 Screenplay Systems
	Authors:		S. Greenfield & C. Huntley
	Created:		April 9, 1994
************************************************************************

*/

#include "listsx.h"
#include "fileref.h"
#include "filesch.h"

#include "tappl.h"
#include "tcommand.h"
#include "tdoc.h"
#include "appdlogs.h"

#include "dramatic.h"
#include "document.h"
#include "ptext.h"
#include "compile.h"

#pragma segment compile


/* -----------------------------------------------------------------------
	CompileCmd::IsValid -
------------------------------------------------------------------------- */
bool_t CompileCmd::IsValid(TAppl *pApp)
{
	ls_index		activeDoc		= pApp->ActiveDoc();
	if (activeDoc != kLsNoElem) {
		DRDoc*	theDoc = ((DRDoc*)pApp->GetDoc(activeDoc));
		return (theDoc == NULL) ? false : true;
	}
	return (false);

} /* CompileCmd::IsValid */


/* -----------------------------------------------------------------------
	CompileCmd::do_cmd -
------------------------------------------------------------------------- */
err_t CompileCmd::do_cmd(void)
{
	pt_err theErr;
	GLRect myBounds;
	Dramatica*		theApp	= (Dramatica*)fParentApp;
	DRDoc*	theDoc = ((DRDoc*)theApp->ActiveWindow()->GetDoc());
	assert(theDoc);

	//	ALLOCATE SOME TEMP MEMORY FOR COPYING

	hdl_t tempStrHdl = MM_ALLOC_INIT(4000, mm_no_flags, 0, "Temp String", NULL);
	assert(tempStrHdl);
	char* tempBuildStr = (char*)MM_USE(tempStrHdl);

	//	Set up the "Story Help" file

	pfm_fd_t currentFile			= PFMGetCurrentFile();

	if (theApp->GetStoryHelpFile()) {						// If we're going to
overwrite this, close it first!
		theErr = PFMCloseFile(theApp->GetStoryHelpFile());
		assert(theErr == NOERR);
	}

	#ifdef TOOLBOX
		char* filename = "Story Help";
	#else
		char* filename = "story.hlp";
	#endif

	GN_FileRef FRef;
	GN_InitFileRef(&FRef, filename, PFM_OVERWRITE, DEFAULT_VOL);
	pfm_fd_t storyHelpFile = PFMOpenFile(&FRef);
	assert(storyHelpFile != PFM_NO_FILE);

	//	SET UP INITIAL SEARCH PARAMS

	FileSearch* theSearch = new FileSearch();
	assert(theSearch);
	theSearch->SetFileTypeSearch(_OSType("DRST"));

	char thePath[2000];
	C_GetLaunchPath(thePath);
	strcat(thePath, ":stories");
//		theSearch->SetFileName(fileText);				// Not needed
	theSearch->SetFSName(thePath);
	theSearch->SetSearchSetup(kFullPath);

	/* Perform the search. */

	AP_WaitCursor();
		theSearch->DoSearch();							// The passed
parameter is unused
	AP_GoCursor();

	FileRef* theSpec;

	// Extract the file names from the search list FileSpec records, one filename at a time.

	VolRef aRef;
	DirRef anID;
	char fullString[2000], fnString[2000];

	AP_StartSpinCursor(129, 4, 5);
	ProgressDlog* progDlog = new ProgressDlog();

	int max = theSearch->GetFileObjs()->Size();
```

```
        theSearch->GetFileObjs()->Use();
        for (int count = 0; count < max; count++) {
                theSpec = (FileRef*)theSearch->GetFileObjs()->Elem(count);

                String* tempString = new String();
                theSpec->GetFilename(tempString);
                tempString->Use();
                strcpy(fnString,(char*)tempString->StrPtr());
                theSpec->GetVolRef(&aRef);
                theSpec->GetDirRef(&anID);
                theSearch->GetFullPath(fnString, fullString, anID, aRef);
                fullString[1999] = '\0';

                //      NOW THAT WE HAVE A FILENAME, OPEN THE FILE...

                GN_FileRef fileToSearchRef;
                GN_InitFileRef(&fileToSearchRef, fullString, PFM_READ_ONLY, DEFAULT_VOL);
                pfm_fd_t fileToScan;
                if (GN_Exists(&fileToSearchRef)) {
                        fileToScan = PFMOpenFile(&fileToSearchRef);
                        asserts(fileToScan != PFM_NO_FILE, "Couldn't open a File To Scan!");
                }
                else {
        // Eventually put up alert if not there
                        asserts(false, "COMPILE: Scan File Doesn't Exist!");
                }

                //      SCAN ALL OF ITS SEGMENTS: "RESP" contains responses; "STEL" has storytelling;  "SDOC" has
title.

                bool_t origHierarchy = PFMSearchHierarchy(false);
                PText* scanFilePT = new PText(fileToScan, _OSType("RESP"), 0, &theErr, kRdOnly);
                assert(theErr == noerr);

                PText* scanSTELPT = new PText(fileToScan, _OSType("STEL"), 0, &theErr, kRdOnly);
                assert((theErr == kNoSuchPFMSeg) || (theErr == noerr));
                if (theErr == kNoSuchPFMSeg) {
                // Eliminate PText object now if it doesn't exist
                        delete scanSTELPT;
                        scanSTELPT = NULL;
                }

                PText* storyDocPT = new PText(fileToScan, _OSType("SDOC"), 0, &theErr, kRdOnly);
                assert(theErr == noerr);
                PFMSearchHierarchy(origHierarchy);

                char storyTitle [100];
                storyDocPT->GetParam("Title", 'c', storyTitle);

                for (appr_index_t apprIndex=0; apprIndex<TOTAL_OTHERSEM_ITEMS; ++apprIndex) {
                        ApprRec* apprRecPtr        = GetApprRec(apprIndex);

                        if (apprRecPtr->storyDBSeg) {
                //      Look for segments that are supposed to be databased
                                semval_t semVal = 0;
                                scanFilePT->GetParam(apprRecPtr->varName, 's', &semVal);
                                if (semVal > 0) {

                                        //      Compress element semVals from the 4 classes into 1:

                                        if (apprRecPtr->apprType == kApprElem)
                                                semVal = SEMELEM_LIMIT_TO_148(semVal);

                                        PFMSetCurrentFile(storyHelpFile);
                                        hdl_t helpSegHdl = (hdl_t) PFMCheckoutSeg(_OSType(apprRecPtr->storyDBSeg),
semVal);
                                        if (helpSegHdl == PFM_NO_SEG) {
                                                helpSegHdl = MM_ALLOC_INIT((byte_cnt)5, mm_no_flags, 0, "story help
segment", NULL);
                                                assert(helpSegHdl);
                                                theErr = PFMAddSegWithId(_OSType(apprRecPtr->storyDBSeg), semVal,
helpSegHdl, PFM_MIN_PRIO, false);
                                                assert(theErr == NOERR);
                                        }
                                        assert(helpSegHdl);

                                        //      FILE IS ELIGIBLE -- BUILD THE DESIRED STRING!

                                        int len = sprintf(tempBuildStr, "«M(12,36,0)»«B+»%s«B-»", storyTitle);

                                        if (scanSTELPT && scanSTELPT->ParamExists(apprRecPtr->varName)) {
                                                strcat(tempBuildStr, ":  ");
                                                scanSTELPT->GetParam(apprRecPtr->varName, 'c',
&tempBuildStr[strlen(tempBuildStr)]);
                                                strcat(tempBuildStr, "\n");
                                        }
                                        else
                                                strcat(tempBuildStr, ". \n");

                                        len = strlen(tempBuildStr);

                                        mm_size_t currentSize = MMGetSize(helpSegHdl);
                                        MMRealloc(helpSegHdl, currentSize + len + 1);
                                        char* helpSegPtr = (char *)MM_USE(helpSegHdl);
                                        strcat(helpSegPtr, tempBuildStr);
                                        MM_UNUSE(helpSegHdl);
                                        PFMSetSegModified(helpSegHdl, true);
                                        theErr = PFMCheckinSeg(helpSegHdl);
                                        assert(theErr == NOERR);
                                        AP_SpinCursor();
                                }

                        }

                }

                //      FINISH UP WITH THIS FILENAME

                delete scanFilePT;
                delete scanSTELPT;
                delete storyDocPT;

                theErr = PFMCloseFile(fileToScan);
```

```
                assert(theErr == NOERR);

                tempString->Unuse();
                delete tempString;

                progDlog->UpdateProgress((int)((count*100)/max), kPrNoSections, kPrNoString, kPrNoString);
        }
        theSearch->GetFileObjs()->Unuse();

        delete theSearch;

        //      SAVE THE NEWLY-CREATED STORY HELP FILE...

        PFMSetFastSave (false, storyHelpFile);
        theErr = PFMSaveFile(NULL);
        assert(theErr == NOERR);
        theApp->SetStoryHelpFile(storyHelpFile);

        PFMSetCurrentFile(currentFile);

        MM_UNUSE(tempStrHdl);
        MMFree(tempStrHdl);

        delete progDlog;
        AP_StopSpinCursor();

        return NOERR;
} /* CompileCmd::do_cmd */

#pragma segment main
```

```
/* ----------------------------------------------------------------------------
        COMPILE.H
        Compile story files
        Copyright (C) 1994 Screenplay Systems Inc.
        Revised:        $Id$
---------------------------------------------------------------------------- */

#pragma once

#ifndef __COMPILE__
#define __COMPILE__

#include "consts.h"
#include "tcommand.h"


#pragma segment compile


/* ----------------------------------------------------------------------------
                                                    COMPILE EXAMPLES COMMAND CLASS
---------------------------------------------------------------------------- */
class CompileCmd : public TCommand {
public:
        CompileCmd(TAppl* pTAppl) : TCommand(pTAppl) {}

        virtual char*       ClassName(void)   const     { return "CompileCmd"; }
        virtual class_t     ClassType(void) const       { return kCompileCmd; }
        virtual bool_t      IsOfType(const void *pType) const { return *(class_t*) pType == kCompileCmd ||
TCommand::IsOfType(pType); }
        virtual TObject* Duplicate(void) const         { return new CompileCmd(*this); }

        static bool_t       IsValid(TAppl *pTAppl);

        void                        CompileExamples(void)       { CompileCmd::do_cmd(); }

protected:
        virtual err_t       do_cmd(void);

}; /* CompileCmd */


#pragma segment main

#endif /* __COMPILE__ */
```

```
/* ----------------------------------------------------------------------
        CONSTS.H
        This file contains general typedefs and constants that are needed in
        Dramatica's C++ source files, but not in any Rez files.
        Copyright (C) 1993 Screenplay Systems Inc.
        Revised:        $Id: consts.h,v 1.22 93/08/20 13:50:53 stephen Exp Locker: stephen $
---------------------------------------------------------------------- */

#pragma once

#ifndef __CONSTANT__
#define __CONSTANT__

#include "apptypes.h"
/* ----------------------------------------------------------------------
        TYPEDEFS
---------------------------------------------------------------------- */

/* ----------------------------------------------------------------------
        CONSTANTS
---------------------------------------------------------------------- */
const class_t   kDramatica              = kLastAppClass + 1;    /* duplicated in edrez.h */
const class_t   kDRDoc                  = kLastAppClass + 2;
const class_t   kDRWindow               = kLastAppClass + 3;
const class_t   kEDDlogXtend    = kLastAppClass + 4;
const class_t   kSMGDlog                = kLastAppClass + 5;    // MY Dialog!
const class_t   kCPanelDlog             = kLastAppClass + 6;    // CPanel Dialog
const class_t   kSPWindow               = kLastAppClass + 7;    // StoryPoints Window Class
const class_t   kTextWrap               = kLastAppClass + 8;    // Text wrapping class
const class_t   kOLWindow               = kLastAppClass + 9;    // Outline Window Class
const class_t   kSubText                = kLastAppClass + 10;   // Text Substitution Class
const class_t   kCharDlog               = kLastAppClass + 11;   // Create Char Dialog
const class_t   kCLWindow               = kLastAppClass + 12;   // Cast List Window
const class_t   kBCWindow               = kLastAppClass + 13;   // Build Characters Window
const class_t   kSTellDlog              = kLastAppClass + 14;   // Storytelling Text Dialog
const class_t   kSInfoDlog              = kLastAppClass + 15;   // Story Info Dialog
const class_t   kHelpPalette    = kLastAppClass + 16;   // Help Palette "window"
const class_t   kSVWindow               = kLastAppClass + 17;   // StoryView "window"
const class_t   kSVObj                  = kLastAppClass + 18;   // StoryView Object
const class_t   kSummary                = kLastAppClass + 19;   // summary window
const class_t   kDQSWindow              = kLastAppClass + 20;   // DQS 2 Window
const class_t   kFEWindow               = kLastAppClass + 21;   // Front End Window
const class_t   kAboutWindow    = kLastAppClass + 22;   // About Box / splash screen
const class_t   kRepWindow              = kLastAppClass + 23;   // Report Window / Frontend
const class_t   kCastingWindow  = kLastAppClass + 24;   // Casting Window

//      MENU CONSTANTS

const class_t   kStoryFormingMenu       = kLastAppMenu + 1;     /* the StoryForming menu */
const class_t   kCharsMenu                      = kLastAppMenu + 2;     /* the Characters menu */
const class_t   kStoryTellingMenu       = kLastAppMenu + 3;     /* the StoryTelling menu */
const class_t   kReferenceMenu          = kLastAppMenu + 4;     /* the Reference menu */
const class_t   kWritersBlockMenu       = kLastAppMenu + 5;     /* the WritersBlock menu */

const class_t   kAboutDramatica = kLastAppDialog + 1;

//      VIEW & ITEM CONSTANTS

const it_type   kSPView                 = kLastAppItem + 1;     // StoryPoints view
const it_type   kOLView                 = kLastAppItem + 2;     // Outline view
const it_type   kCastListView   = kLastAppItem + 3;     // Cast List view
const it_type   kQuadView               = kLastAppItem + 4;     // Quad view
const it_type   kHelpPalView    = kLastAppItem + 5;     // Help Palette view class (usually descended
from)
const it_type   kDefinePalView  = kLastAppItem + 6;     // Definitions view palette
const it_type   kBCView                 = kLastAppItem + 7;     // Build Characters controls view
const it_type   kSView                  = kLastAppItem + 8;     // StoryView view
const it_type   kFrontEndView   = kLastAppItem + 9;     // FrontEnd view
const it_type   kTopicListView  = kLastAppItem + 10;    // Topic List view
const it_type   kGraphBtn               = kLastAppItem + 11;    // Graphic Button Item
const it_type   kQuadIcon               = kLastAppItem + 12;    // QuadIcon Item

//      **************** COMMAND CONSTANTS *****************

const cm_type   kOptionsFont    = (kLastAppCmd + 1);
const cm_type   kEDFilePageSetup = (kLastAppCmd + 2);

//      APPLE MENU / ABOUT APPLICATION

const cm_type   kAboutCmd               = (kLastAppCmd + 3);    /* About Dramatica */

//      STORYFORMING COMMANDS

const cm_type   kQuickStoryCmd  = (kLastAppCmd + 4);    /* Quick Story Query System */
const cm_type   kDQSCmd                 = (kLastAppCmd + 5);    /* Query System */
const cm_type   kCPanelCmd              = (kLastAppCmd + 6);    /* Story Engine */
const cm_type   kCompileCmd             = (kLastAppCmd + 7);    /* Compile Examples command */
const cm_type   kDramaCmd1              = (kLastAppCmd + 8);    /* Create Story Table */

//      CHARACTER COMMANDS

const cm_type   kCastListCmd    = (kLastAppCmd + 9);    /* Cast List */
const cm_type   kCreateCharCmd  = (kLastAppCmd + 10);   /* Create Character */
const cm_type   kDelCharCmd             = (kLastAppCmd + 11);   /* Delete Character */
const cm_type   kCharInfoCmd    = (kLastAppCmd + 12);   /* Character Info */
const cm_type   kBuildChrCmd    = (kLastAppCmd + 13);   /* Build Characters*/
const cm_type   kMainObstCmd    = (kLastAppCmd + 14);   /* Setup Main/Obstacle */
const cm_type   kCastingCmd             = (kLastAppCmd + 15);   /* Casting */

//      STORYTELLING COMMANDS

const cm_type   kSInfoCmd               = (kLastAppCmd + 16);   /* Story Info Command */
const cm_type   kOutlineCmd             = (kLastAppCmd + 17);   /* Reports Window */
const cm_type   kSPCmd                  = (kLastAppCmd + 18);   /* Story Points */
const cm_type   kSViewCmd               = (kLastAppCmd + 19);   /* StoryView Command */

//      TOOLS COMMANDS

//      FILE COMMANDS
```

```
const cm_type     kExportCmd          = (kLastAppCmd + 20);     /* Export command */

//      EDIT COMMANDS

const cm_type     kPrefsCmd           = (kLastAppCmd + 21);     /* Preferences command */
const cm_type     kSearchCmd          = (kLastAppCmd + 22);     /* Search command */
const cm_type     kReplaceCmd         = (kLastAppCmd + 23);     /* Replace command */
const cm_type     kSetFontCmd         = (kLastAppCmd + 24);     /* Set Font command */

//      WINDOW COMMANDS

const cm_type     kDesktopCmd         = (kLastAppCmd + 25);     /* Dramatica Desktop command */

//      OTHER COMMANDS

const cm_type     kNotYetImplemented  = (kLastAppCmd + 26);   /* for commands not yet implemented */


#define DRAM            _OSType('Dram')                   /* application's signature      */

#ifdef TOOLBOX
        #define DDOC    _OSType('DRST')                   /* Dramatica Story File         */
#else
        #define DDOC    _OSType('.sty')
#endif

/* xxxxxxxxxxxxxxxxxxxxxxxxxxxxxxxxxxxxxxxxxxxxxxxxxxxxxxxxxxxxxxxxxxxxxxxxxxxxxxxx
 * $Log:        consts.h,v $
 * Revision 1.22  93/08/20  13:50:53  stephen
 * New DQS command added.
 *
 * Revision 1.21  93/06/23  16:26:27  stephen
 * New class constants for StroyView.
 *
 * Revision 1.20  93/06/04  13:41:50  stephen
 * Added BCView.
 *
 * Revision 1.19  93/06/03  23:13:47  stephen
 * Added Help palettes.
 *
 * Revision 1.18  93/06/01  16:16:48  stephen
 * Massive menu rearranging!
 *
 * Revision 1.17  93/05/31  18:20:46  stephen
 * New Story Info cmd.
 *
 * Revision 1.16  93/05/26  19:45:18  stephen
 * New storytelling commands & windows fixes.
 *
 * Revision 1.15  93/05/24  21:35:06  stephen
 * Added Build Characters, QuadView.
 *
 * Revision 1.14  93/05/21  22:05:12  stephen
 * Added Delete Character command.
 *
 * Revision 1.13  93/05/18  20:45:18  stephen
 * New Cast List command
 *
 * Revision 1.12  93/05/18  11:21:03  stephen
 * New Characters menu & commands.
 *
 * Revision 1.11  93/05/06  11:00:02  stephen
 * Added SubText class
 *
 * Revision 1.10  93/05/04  21:31:23  stephen
 * New outline window command.
 *
 * Revision 1.9  93/05/03  16:34:39  stephen
 * New Storypoints command.
 *
 * Revision 1.8  93/04/24  14:28:56  stephen
 * New consts for StoryPoints cmd.
 *
 * Revision 1.7  93/04/24  09:55:02  stephen
 * Various new constants.
 *
 * Revision 1.6  93/04/19  18:50:15  stephen
 * Control Panel Command
 *
 * Revision 1.5  93/04/12  20:15:50  chris
 * Added CPanel Window and Items.
 *
 * Revision 1.4  93/04/12  12:26:05  stephen
 * Changed EDWindow to DRWindow.
 *
 * Revision 1.3  93/04/08  14:56:04  stephen
 * More revision.
 *
 * Revision 1.2  93/04/06  19:39:43  stephen
 * First General Revisions
 *
 * Revision 1.1  93/03/31  22:35:57  stephen
 * Initial revision
 *
 */

#endif /* __CONSTANT__ */
```

```
/* -----------------------------------------------------------------------
        CONTEXT.R
        Dramatica's Contextual Definitions
        Copyright (C) 1993 Screenplay Systems Inc.
        $Id$
----------------------------------------------------------------------- */

#ifdef macintosh
        #include "systypes.r"
        #include "types.r"
#else
        #include <systypes.r>
        #include <types.r>
#endif

#include "apprdefs.h"

/* -----------------------------------------------------------------------
        'CNTX' - Contextual Definitions
----------------------------------------------------------------------- */
type 'CNTX' {
        cstring;                        /* the definition text */
};

/*************/
/*      DOMAINS  */
/*************/

resource 'CNTX' (rApprSTDom + rSvUniverse, PFM_MIN_PRIO) {                     /* Universe */
        "All of the objective characters are concerned with maintaining or demolishing a situation.  For example, a country under the thumb of an authoritarian dictator; the condition of a dysfunctional family; a utopian society; a submarine trapped under the ice; progress in one-sided relationships; a murder that occurred 30 years ago; the future of gay rights; the forces that bring on an ice age."
};

resource 'CNTX' (rApprPLDom + rSvUniverse, PFM_MIN_PRIO) {                     /* Universe */
        "The Main and Obstacle Characters' battleground is a physical situation.  The emphasis may be on describing a situation, or on examining a situation.  For example, their workplace, their living environment, their social environment, etc.  Exploring how they conflict in these situations will illustrate Universe Subjective Story Domains."
};

resource 'CNTX' (rApprMCDom + rSvUniverse, PFM_MIN_PRIO) {                     /* Universe */
        "What it is like to have the Main Character's physicality?  For example, their sex, skin color, attractiveness, unattractiveness, size, condition or disease (though not debilitating), any sort of distinguishing physical attribute.  Exploring the essence of having the Main Character's physicality will illustrate Universe Main Character Domains."
};

resource 'CNTX' (rApprOCDom + rSvUniverse, PFM_MIN_PRIO) {                     /* Universe */
        "The Obstacle Character's physicality.  For example, their sex, skin color, attractiveness, unattractiveness, size, condition or disease (though not debilitating), any sort of distinguishing physical attribute.  Exploring the nature of the Obstacle Character's physicality will illustrate Universe Obstacle Character Domains."
};


resource 'CNTX' (rApprSTDom + rSvPhysics, PFM_MIN_PRIO) {                      /* Physics */
        "All of the objective characters are concerned with an activity or endeavor.  For example, searching for lost treasure; engaging in a sport; exercising as a way of life; self-flagellation; taking part in a cattle drive; learning about DNA; obtaining secret plans; understanding messages from space, etc."
};

resource 'CNTX' (rApprPLDom + rSvPhysics, PFM_MIN_PRIO) {                      /* Physics */
        "The Main and Obstacle Characters' battleground is an activity or endeavor.  For example, a competition between siblings, a political campaign between bitter enemies, parents locked in a custody battle,  the Smiths trying to \"keep up with the Jonses\", a Sheriff chasing a serial killer, a scientist pursuing the last living poodle,  business partners "
        "wrestling for control of a company, a fight for supremacy between rival warlords, a reporter and a detective both trying to solve a crime, etc."
};

resource 'CNTX' (rApprMCDom + rSvPhysics, PFM_MIN_PRIO) {                      /* Physics */
        "What it is like to be engaged in the Main Character's activities?  For example, studying to be a shaman, training for a big fight, struggling with the disease of the week, traveling the world, murdering your parents, perfecting your skills at cheating at cards, finding the meaning of death, thrill seeking, etc."
};

resource 'CNTX' (rApprOCDom + rSvPhysics, PFM_MIN_PRIO) {                      /* Physics */
        "The Obstacle Character's activities.  For example, manipulating the stock market for financial loss, leading a grass roots campaigning to oust an incumbent, arranging the assassination of an abortion clinic doctor, helping an addict to overcome rehabilitation, skimming funds from the charity profits, "
        "promoting social equality, striving to understand ones children's behavior to bring the family together, etc."
};


resource 'CNTX' (rApprSTDom + rSvPsychology, PFM_MIN_PRIO) {                   /* Psychology */
        "All of the objective characters are concerned with a mental process or manner of thinking.  For example, curing a mental illness; determining why someone's relationships always fail; figuring out how to build a better software program for writers; becoming a new person; being more responsible to the environment; working through childhood trauma; mass manipulation through propaganda; "
        "a group of young people coming of age; a team's creative effort to work out an idea; people pretending to be things they are not, etc."
};

resource 'CNTX' (rApprPLDom + rSvPsychology, PFM_MIN_PRIO) {                   /* Psychology */
        "The Main and Obstacle Characters' battleground is a mental process or manner of thinking.  For example, a childless widow's attempts to make an unwilling house guest into the daughter she never had through psychological browbeating, two writers competing to conceive of the ultimate pun, a philosopher and a street sweeper vie to design a "
        "Utopian society, a husband efforts to manipulate his impressionable wife into being more socially acceptable, etc."
};

resource 'CNTX' (rApprMCDom + rSvPsychology, PFM_MIN_PRIO) {                   /* Psychology */
        "What it is like to think like the Main Character?  For example, selling oneself short, struggling to put the final piece in a new theory, trying to come to terms with one's lack of sexuality, putting one's past behind oneself, quashing compassion for one's deteriorating parent, "
        "reawakening ones love in a stagnating relationship, giving up, suppressing one's morals for advancement, etc."
};

resource 'CNTX' (rApprOCDom + rSvPsychology, PFM_MIN_PRIO) {                   /* Psychology */
```

```
        "The way the Obstacle Character's thinks.  For example, plotting the mental breakdown of a partner, fabricating
a personal history to cover up past indiscretions, feeding on fear for survival, conforming to the expectations of
whomever one is with, being a \"Yes\" person, manipulating others by instilling guilt, \"passive aggressives\", etc."
};


resource 'CNTX' (rApprSTDom + rSvMind, PFM_MIN_PRIO) {                              /* Mind */
        "All of the objective characters are concerned with a fixed aspect of the mind.  For example, a community's firm
belief in the occult; a family's commitment to the memory of its ancestors (ancestor worship); TV addiction; a culture's
fixation on celebrities; a Martian's prejudice against humans; unthinking responses to the conditions of war; essential
desires and drives, etc."
};

resource 'CNTX' (rApprPLDom + rSvMind, PFM_MIN_PRIO) {                              /* Mind */
        "The Main and Obstacle Characters' battleground is concerned with fixed mindsets or attitudes.  For example, a
mother and daughter's conflicting attitudes about premarital sex, a retired marine sergeant's clash of wills with his gay
son over the death penalty, two ministers' differing attitudes regarding the existence of the \"soul\" in "
        "genetically engineered fetuses, a rocket scientist's absolute belief in the existence of a single God in
contrast to a rock star's firm belief in his own status as a living God, etc. "
};

resource 'CNTX' (rApprMCDom + rSvMind, PFM_MIN_PRIO) {                              /* Mind */
        "What it is like to possess the Main Character's attitude or mindset? For example, hating racists, being pro-
Choice, being lost in unconditional love, being fond of modern art, having a fear of unwashed cutlery, possessing a sense
of family honor or code of ethics, having an obsession for younger men, being committed to celibacy, etc."
};

resource 'CNTX' (rApprOCDom + rSvMind, PFM_MIN_PRIO) {                              /* Mind */
        "The Obstacle Character's mindset/attitude.  For example, considering oneself above the law, acknowledging one's
racial supremacy, possessing a sense of intellectual inferiority, maintaining a stalwart adherence to religious edicts,
having the conviction that nothing good ever will come out of Philadelphia, being open to diversity of self expression,
etc."
};


/******************************************************************************/
/*                              TYPES                                          */
/******************************************************************************/


resource 'CNTX' (rApprSTCon + rSvPast, PFM_MIN_PRIO) {          /* Past */
        "All the objective characters are concerned with the past.  For example, an unsolved murder for which new
evidence comes to light, a great-grandmother whose diary has just been discovered, a \"skeleton in the closet\" of a
famous family, the story behind a buried treasure, etc.  Exploring what has already happened will illustrate Past as an
Objective Story Concern."
};

resource 'CNTX' (rApprPLCon + rSvPast, PFM_MIN_PRIO) {          /* Past */
        "The Main and Obstacle Characters must deal with the past.  For example, the events behind their own failed
relationship, the cover-up of the murder of one character's parent by the other character,  an adopted character's search
for a biological parent, etc..  Engaging in exploration of what has already happened will illustrate Past as a Subjective
Story Concern."
};

resource 'CNTX' (rApprMCCon + rSvPast, PFM_MIN_PRIO) {          /* Past */
        "What does it feel like as the Main Character to confront the past?  For example, unearthing a new species of
dinosaur, having an ancestors' ghost haunt your house, being presented with new evidence that indicates a friend's death
was not a suicide, etc.  Confronting something which has happened previously will illustrate Past as a Main Character
Concern."
};

resource 'CNTX' (rApprOCCon + rSvPast, PFM_MIN_PRIO) {          /* Past */
        "What are the ramifications of the Obstacle Character's process of dealing with the past?  For example, the
arrest of a retired Mafia hitman on his innocent family, an archeologist's discovery of pre-Ice Age UFO visitations on an
Air Force PR officer, the threat of an unfiled marriage license used by an estranged husband against his divorce-
resistant wife, etc.  "
        "Examining the external effects of dealing with things that happened previously will illustrate Past as an
Obstacle Character Concern."
};

resource 'CNTX' (rApprSTGoal + rSvPast, PFM_MIN_PRIO) {         /* Past */
        "The exploration of events or occurrences in the past made necessary by someones assistance in order to fulfill
or meet the needs of the requirement. For example, a heritage crazy lawyer forcing relatives to trace their family
history back to the Mayflower in order to obtain their inheritance, a police man pulling over a speeding car and
demanding that the driver "
        "recount their family's history of speeding tickets before they are allowed to continue on their way, an animal
rescue society traveling to your home to explore its environment and see family photo's of past pets before allowing you
to adopt one from them, a teacher demanding to see the high school grades of the parents of a dysfunctional child to see
if there "
        "is a relationship between these occurrences, etc. "
};

resource 'CNTX' (rApprPLGoal + rSvPast, PFM_MIN_PRIO) {         /* Past */
        "Events of the past that the objective characters will be forced to explore or lose access to if the goal is not
achieved.   For example, being forced to reveal membership in the KKK while attending college years ago; having no option
but to tell a group of orphans they were conceived from synthetic DNA and have no human parents; going over the remains
of the "
        "space shuttle Discovery; exploring the details of a loved one's assassination, etc. "
};

resource 'CNTX' (rApprMCGoal + rSvPast, PFM_MIN_PRIO) {         /* Past */
        "Events of the past of a positive nature that the objective characters accrue during the effort to achieve a
goal. For example, while attending a marriage encounter weekend with their wives to save their marriages, archeologist
discover  lost ruins; while exploring the details of successful lung transplants for Cystic fibrosis patients, a medical
journalist comes to terms with "
        "the fact that the death of his father to lung transplant experiments was for a very good cause; while traveling
to see the towns across the country that formed as a result of the pony express, a United States mail historian discovers
the mystery of the disappearance of the last mail courier to follow the trail; while an art historian is invited to
observe the restoration of "
        "the Sistine Chapel, she discovers an unknown masterpiece that had been painted over; etc."
};

resource 'CNTX' (rApprOCGoal + rSvPast, PFM_MIN_PRIO) {         /* Past */
        "Elements of the past of a negative nature that the objective characters must endure during the effort to
achieve a goal. For example, evidence of grisly murders; orphans forced by circumstance to explore the reasons they were
abandoned; a group of patriots forced to examine their country's past atrocities in exchange for their release as
hostages; exploring "
        "the destruction of the interior of a wrecked car whose dents are directly related to the physical impact of a
victim without a seat belt, etc."
};
```

```
resource 'CNTX' (rApprSTReq + rSvPast, PFM_MIN_PRIO) {          /* Past */
        "The exploration of events or occurrences in the past needed to pave the way, open the door, or meet the needs
essential and preliminary to achieving a goal. For example, an archaeologist must research the history of sandstorms in
the Sahara desert before choosing the date of an excavation, finding out a sexual assault suspects history of previous
relationships "
        "to see if there is anyone they can use for the defense, exploring the amount of time that the Grunion have
historically run up on shore in order to determine how much video tape will be required for its coverage as a
documentary, exploring the  historic survival rate of pig heart valve transplants in humans before choosing whether to go
through with the operation, etc."
};

resource 'CNTX' (rApprPLReq + rSvPast, PFM_MIN_PRIO) {          /* Past */
        "Events or occurrences that happened in the past which the objective characters need to explore in order to
fulfill or meet the requirements. For example, a detective must explore the history and whereabouts of the worlds most
accredited jewel thieves, in order to establish a list of possible suspects, and solve the disappearance of the Queen's
jewels; a ship designer "
        "must explore the blue prints of the Titanic, in order to find the fault in its design, and thus determine why
with one hole it sunk so fast; a spiritual analyst must explore the history of ancient burial spells, in order to
discover the mystery behind the deaths at the time of the discovery of King Tut's tomb, and thus determine if there is a
spell that can remove and "
        "prevent this from happening again; a biographer must explore the last commands made by Hitler, in order to
determine the events of his last few days of command, and thus hope to solve the mystery of his disappearance; etc."
};

resource 'CNTX' (rApprMCReq + rSvPast, PFM_MIN_PRIO) {          /* Past */
        "The events or occurrences in the past that indicate the imminent approach of the consequence.  For example,
discovering that the inhabitants of a stone age village that is being excavated dies of a mysterious virus; finding love
letters written by your spouse before you were married that are addressed to one of your friends with whom your spouse is
currently "
        "working on a business project; seeing pictures of yourself in a hidden family album that lists you by a
different name; learning that, historically, all the women in a family have died of breast cancer, etc."
};

resource 'CNTX' (rApprOCReq + rSvPast, PFM_MIN_PRIO) {          /* Past */
        "The exploration of events or occurrences in the past made necessary by someones assistance in order to fulfill
or meet the needs of the requirement. For example, a heritage crazy lawyer forcing relatives to trace their family
history back to the Mayflower in order to obtain their inheritance, a police man pulling over a speeding car and
demanding that the driver recount "
        "their family's history of speeding tickets before they are allowed to continue on their way, an animal rescue
society traveling to your home to explore its environment and see family photo's of past pets before allowing you to
adopt one from them, a teacher demanding to see the high school grades of the parents of a dysfunctional child to see if
"
        "there is a relationship between these occurrences, etc."
};

resource 'CNTX' (rApprSTStp + rSvPast, PFM_MIN_PRIO) {          /* Past REWRITE */
        "Events or occurrences in the past that are explored on the way to the goal that indicate progress in the
objective story. For example, reading a will; tracing a family tree; exploring a winning team's strategy that won the
Super Bowl; exploring the development for equal rights for females; exploring the differences and similarities of the
assisinations of United States presidents; "
        "exploring a previous earthquake to determine if another shift may be the result; exploring the extinction of
the dinosaur, etc."
};

resource 'CNTX' (rApprPLStp + rSvPast, PFM_MIN_PRIO) {          /* Past */
        "The exploration of events or occurrences in the past that indicate growth in the relationship between the main
and obstacle character. For example, a remarried couple exploring the reasons for their past divorce so as to prevent
this from happening in their current relationship; a recovered alcoholic sharing her history with her daughter so as to
prevent this form happening to her; "
        "a father sharing with his son the history of the college he will attend so that he will know what to expect; a
Catholic Nun sharing parables of the past with her students so that they will know what happens to sinners that don't
repent, etc. "
};

resource 'CNTX' (rApprMCStp + rSvPast, PFM_MIN_PRIO) {          /* Past */
        ""
};

resource 'CNTX' (rApprOCStp + rSvPast, PFM_MIN_PRIO) {          /* Past */
        ""
};


resource 'CNTX' (rApprSTCon + rSvProgress, PFM_MIN_PRIO) {      /* Progress */
        "All of the objective characters are concerned with determining how things are going. For example, whether or
not the number of people purchasing new cars per year is increasing; if medical conditions for unwed teenage mothers are
improving; if DUI related accidents are becoming less often fatal; passing milestones in a race, etc. Exploring how
things are going will illustrate progress as an objective story concern."
};

resource 'CNTX' (rApprPLCon + rSvProgress, PFM_MIN_PRIO) {      /* Progress */
        "The main and obstacle characters are grappling over the progress of something.  For example, a father and son
argue over the progress of their family business;  a congresswoman and the president arguing over the progress of medical
treatment for women; a birth parent and a social worker struggle over legal hurdles on the path to the placement of the
parent's neglected children into foster care;  "
        "a professional \"deconditioner\" grapples with a brainwashed cult member over progress away from dogma, etc.
Engaging in the process of determining how things are going will illustrate progress  as a subjective story concern."
};

resource 'CNTX' (rApprMCCon + rSvProgress, PFM_MIN_PRIO) {      /* Progress */
        "What does it feel like as the main character be concerned with how things are going?  For example, a teacher
concerned with the development of an AIDS awareness class; a paralyzed football player investigating the progress of new
neural therapy techniques; a seismologist concerned with the increasing level of activity along a major fault in an urban
area; a spin doctor measuring a political candidate's rise in popularity, etc. "
        "Exploring how things are going will illustrate progress as a main character concern."
};

resource 'CNTX' (rApprOCCon + rSvProgress, PFM_MIN_PRIO) {      /* Progress */
        "What are the ramifications of the obstacle character's concern with the progress of something. For example the
effect of a wife calculating the amount of money her retired husband makes; a charismatic evangelist concerned with how
many followers would die for him; a young heir to the throne trying to jockey higher in the line of succession; a general
concerned with the decreasing size of the peacetime army, etc. "
        "Examining the effects of determining how things are going will illustrate progress as an obstacle character
concern."
};

resource 'CNTX' (rApprSTGoal + rSvProgress, PFM_MIN_PRIO) {     /* Progress */
        "The objective characters wish to achieve or prevent progress. For example, limiting the number of new
businesses that can be started by African Americans in their own community; expanding the 'guns in exchange for goods'
program throughout the country;  reducing the number of cases of breast cancer per year on Long Island, where it is most
prominent; reducing the number of welfare recipients compared to the number of those returning to the work force; etc."
```

```
};

resource 'CNTX' (rApprPLGoal + rSvProgress, PFM_MIN_PRIO) {     /* Progress */
        "The specific progress that the objective characters are currently engaging in or will be forced to engage in or endure if the goal is not achieved.  For example, an increasing number of priests handing out condoms if a cure for AIDS is not found ; the continuing decline of the United States educational system in relation to the advancements of the Japanese schools if government continues to withhold funding; spreading hunger "
        "throughout the third world if a famine cannot be halted ; vastly rising numbers of HIV positive kids in high schools unless AIDS education is made mandatory; etc."
};

resource 'CNTX' (rApprMCGoal + rSvProgress, PFM_MIN_PRIO) {     /* Progress */
        "The progress that the characters enjoy during the effort or on the path to achieving a goal that has specific positive benefits.  For example, moving closer to the overall title as driver of the year while trying to test a new engine; co-workers who grow more intimate while laboring under a deadline on a project; stays of execution that occur while seeking the real criminal; a dead garden blooms while using gardening as physical therapy for accident victims, etc."
};

resource 'CNTX' (rApprOCGoal + rSvProgress, PFM_MIN_PRIO) {     /* Progress */
        "The  progress that the characters must endure during the effort or on the path to achieving a goal that have specific negative side effects. For example, a promising new treatment for cancer initially makes patients weaker, allowing the disease to spread more quickly; due to a washed out bridge, participants in a race must backtrack; fraternity pledges trying to win a bet as to who can be first to get a member of a sorority into bed find themselves "
        "drawn ever closer to marriage; a coffee clutch group finds that meeting obligations to former lovers is causing their current partners to grow cold, etc."
};

resource 'CNTX' (rApprSTReq + rSvProgress, PFM_MIN_PRIO) {     /* Progress */
        "The progress the objective characters must engage in that is necessary to achieve the goal. For example, a development company must make sure a new house goes up every week to obtain an extension of their contract; students must improve their grades every quarter to have a special education project made permanent; an unpopular vice-president must rise in the polls every week in order to obtain his party's re-nomination; terminal patients must "
        "show continued improvement in their condition in order to obtain additional doses of an experimental drug, etc.
"
};

resource 'CNTX' (rApprPLReq + rSvProgress, PFM_MIN_PRIO) {     /* Progress */
        "The specific progress that must take place in order to clear the way toward the goal. For example, in order to test a new strain of wheat that could end famine forever, the temperature must rise for three straight days; in order to begin a race that offers a large cash prize, a rainstorm must continue to subside; in order to justify a business loan that could allow an entrepreneur to retire, sales must increase for three consecutive quarters; "
        "in order to go off an experimental drug that has the side effect of damaging kidneys, the fevers of patients must steadily decline; in order for beavers to build a dam  so they can hibernate, water levels in the river must continue to fall, etc."
};

resource 'CNTX' (rApprMCReq + rSvProgress, PFM_MIN_PRIO) {     /* Progress */
        "The progress that indicates the imminent approach of the consequence. For example, the increasing number of people moving out of Southern California in relation to a real-estate crash; finding a rising number of eraser marks all over the book keeping of a companies monthly figures; a steady and rapid decline in the stock price of a small company; the decreasing rate of house painting by a man tired of his marriage, etc."
};

resource 'CNTX' (rApprOCReq + rSvProgress, PFM_MIN_PRIO) {     /* Progress */
        "The specific progress made necessary by someone's insistence that the character must engage in order to clear the way toward the goal. For example, a sales manager insisting her employees increase their sales by ten percent each year to be considered for promotion; a neuro surgeon insisting his surgical assistants continually learn new techniques in order to obtain an internship; an academic advisor forcing his students to do more "
        "homework each week in order to remain in the running for a scholarship; a fire chief insisting on progressively faster response times in exchange for new recreational equipment, etc."
};

resource 'CNTX' (rApprSTStp + rSvProgress, PFM_MIN_PRIO) {     /* Progress */
        "The methods of progress that the characters must perform or engage in on the way to the goal that indicate progress in the objective story. For example, the number of readers for an underground newspaper; the number of students attending diversity meetings; the monthly figures of a new retail company compared to their competitor; a Project Earth group exploring the increasing variety of recyclables being returned; a political candidate measuring his rising popularity throughout a political election, etc."
};

resource 'CNTX' (rApprPLStp + rSvProgress, PFM_MIN_PRIO) {     /* Progress */
        "The methods of progress that the characters must perform or engage in that indicate growth in the relationship between the main and obstacle character. For example,  a political candidate reworking his bias towards Gays to gain a Gay Rights leader's support; a department head taking into consideration the suggestions of employees despite their past drill sergeant approach; a restaurant chain owner giving financial support to their defeated competitor after buying off their customers; "
        "a woman becoming more civil to her former best friend form college who stole her boyfriend, etc."
};

resource 'CNTX' (rApprMCStp + rSvProgress, PFM_MIN_PRIO) {     /* Progress */
        ""
};

resource 'CNTX' (rApprOCStp + rSvProgress, PFM_MIN_PRIO) {     /* Progress */
        ""
};

resource 'CNTX' (rApprSTCon + rSvFuture, PFM_MIN_PRIO) {     /* Future */
        "All the objective characters are concerned with the future.  For example, a country that is about to dismantle its system of apartheid; a football team preparing for its first season without their star quarterback; "
        "a company that has just sunk all of its money into a risky investment; a police squad that has just had their hands tied by new laws protecting the rights of the accused; an employee's pool deciding what to do if they "
        "win the lottery; bridesmaids are concerned with their own potential for companionship in their later years, etc.  Exploring the process of dealing with will happen or what will be will illustrate the Future as an Objective Story Concern."
};

resource 'CNTX' (rApprPLCon + rSvFuture, PFM_MIN_PRIO) {     /* Future */
        "The Main and Obstacle Characters must deal with the future.  For example, a black scientist from New York city struggles to discover the future effects of a new kind of "safe" cigarette that will be marketed in his old neighborhood by a profiteering inventor;  "
        "two ambassadors from antagonistic countries are locked in negotiations over the terms of an open border policy that will be imposed on them by the United Nations; a young girl tries to convince her father not to go through with the new building he is considering "
        "putting up over the last stretch of forest near their town,  a woman lawyer tries to convince her reluctant client how he will be able to take advantage of a new civil rights law to be implemented soon; etc.  Engaging in the anticipation and exploration of what will "
        "happen or what will be will illustrate the Future as a Subjective Character Concern."
};
```

```
resource 'CNTX' (rApprMCCon + rSvFuture, PFM_MIN_PRIO) {        /* Future */
	"What does it feel like as the Main Character to confront the future?  For example, a powerful oil man deciding how he will introduce a new energy source to the market when his development people finish with it; a terminally ill mother trying to decide who will raise her children after she dies;  "
	"a union leader trying to determine the changing role of her organization in the coming information age; an American soldier who will be shipped off soon on a secret mission tries to find out  where he will be going and what it will be like; etc.  "
	"Confronting what will happen or what will be will illustrate the Future as a Main Character Concern."
};

resource 'CNTX' (rApprOCCon + rSvFuture, PFM_MIN_PRIO) {        /* Future */
	"What are the ramifications of the Obstacle character's process of dealing with the future?  For example, a wealthy tobacco mogul who will stop at nothing to make sure a new law allowing minors to buy cigarettes will be passed; an inventor's effort to suppress his "
	"discovery of a new kind of easily distributed virtual reality on a movie producer; a clairvoyant psychic who is pleased to use her abilities to inform the Main Character of all kinds of things he'd rather not know in advance, such as his imminent death; a rich man, "
	"scared of nuclear war, who stock piles so many supplies for his fall out shelter that the near by town is not left with enough to live off if crops fail;  a wealthy and power mad woman who has a pace-maker in her heart connected to a nuclear bomb that will go off "
	"when her heart stops; an abusive father, determined that his son will move back in with him after finishing college; an evil wizard who puts a curse on a young princess that says if she reaches 20 years old without getting married she will become a frog; "
	"a terminally ill stepfather who attacks his family in attempt to take them with him; a cult leader whose creation of a dangerous army of followers in preparation for apocalypse could threaten to actually bring about the apocalypse, etc.  "
	"Examining the external effects of dealing with what will happen or what will be will illustrate the Future as an Obstacle Character Concern."
};

resource 'CNTX' (rApprSTGoal + rSvFuture, PFM_MIN_PRIO) {        /* Future */
	"The specific future way things will be which the objective characters want to either foresee or actually bring about .  For example, a group of scientists who want to make sure safe breeding grounds will exist for an endangered species migrating toward them in mating season; a group of "
	"young women who want to join the Navy when they turn 17; a group of knights sent to find out from a clairvoyant wizard what will happen to the king in their next war; a group of women who had an unforgettable time in school bury a bottle of cognac together to inspire themselves to reunite in 20 years;  etc. "
};

resource 'CNTX' (rApprPLGoal + rSvFuture, PFM_MIN_PRIO) {        /* Future */
	"The specific future way things will be that one or more of the objective characters will be forced to confront if the Goal is not achieved.  For example, a high school student will have to plan to attend a less prestigious college than she wants if she does not get good grades her freshman year; "
	"an actress who gave an embarrassing performance in a movie will have to face the bad reviews when it premiers if she doesn't convince the director to cut her part out while he's editing it; a journalist will be forced to wait in a foreign country for the next rare appearance of that country's "
	"reclusive leader if she cannot arrange an interview during his present trip out of his palace; an aging baseball star will have to live the rest of his life never having been in the World Series if his team doesn't win the pennant this year; etc."
};

resource 'CNTX' (rApprMCGoal + rSvFuture, PFM_MIN_PRIO) {        /* Future */
	"Specific positive ways things will be in the future which characters collect/enjoy during the effort toward the goal.  For example, a barbarian warrior learns that he will some day be a king from a magic mirror found during a hunt for religious artifacts in a lost cave; a police woman finds "
	"that criminal she has captured on her weekend hiking trip is wanted in ten states and that she will get a promotion when she gets him back to the city; a man finds out the woman he's become engaged to during a long ocean cruise is secretly wealthy and that when they marry he will be too; "
	"soldiers in a war in France discover there is a huge stock of delicacies inside a building they are taking which they will be able to enjoy when the fighting stops; etc."
};

resource 'CNTX' (rApprOCGoal + rSvFuture, PFM_MIN_PRIO) {        /* Future */
	"Specific negative ways things will be in the future which the objective characters are forced to face during the effort toward the Goal.  For example, a prison guard will eventually have to face the wrath of his superiors for helping a wrongly jailed prisoner escape; "
	"a gangster who mails an incriminating video tape of his boss to a TV station will be on the run for his life when the station broadcasts the tape and causes the boss' arrest; a woman in school who helps a detective find her missing friend during finals week will "
	"not be prepared for her finals; an Olympic athlete will miss the competitions when she becomes involved in protests against the host country's human rights policies; etc. "
};

resource 'CNTX' (rApprSTReq + rSvFuture, PFM_MIN_PRIO) {        /* Future */
	"Specific ways things will be in the future which need to be brought about or discovered to pave the way or meet needs essential to achieving the goal.  For example, a boy has to be signed up to go to camp for the summer before he will be accepted into a club his peers "
	"have created at school; a movie producer has to acquire a commitment from a distributor to distribute her film before investors will fund her challenging movie; a sorcerer's apprentice has to search his abilities and foretell the outcome of a battle presently being "
	"fought before her teacher will deem her a full sorcerer; an astronaut needs to receive an assignment sending him into space before he will pay attention to his private life and marry his lover; etc."
};

resource 'CNTX' (rApprPLReq + rSvFuture, PFM_MIN_PRIO) {        /* Future */
	"Specific ways things will be in the future which need to be discovered or actually brought about in order to fulfill or meet the Requirements.  for example, a city official needs to get the Olympics to come to her city in the next 20 years in order to please her "
	"constituents and be re-elected; a thief must make a promise to his syndicate boss to pull off two burglaries to-be-named-later in return for information necessary to help him pull off his present bank heist; a farmer must discover for sure what the government will "
	"do with the property they're buying around his farm in order to convince his neighbors that it should concern them and start a movement to stop the intrusion, etc. "
};

resource 'CNTX' (rApprMCReq + rSvFuture, PFM_MIN_PRIO) {        /* Future */
	"Specific ways things will be in the future which when discovered or brought about indicate the imminent approach of the Consequence.  For example, a young couple may have to break up when the girl's father announces he's arranged for her to marry another man "
	"in six weeks; a man running for president finds out a book which will ruin his public image will be released at the time of the next primary; a woman who wants to become a reporter at her favorite newspaper discovers its owner will close the paper down at the "
	"end of the year; a king fighting a war is told by his wizard that he has seen a vision of the end of the war and that the king will lose; etc. "
};

resource 'CNTX' (rApprOCReq + rSvFuture, PFM_MIN_PRIO) {        /* Future */
	"Specific ways things will be in the future which must be discovered or actually brought about due to someone's insistance in order to clear the way toward fulfillment of the Requirement.  For example, a manager of a baseball team insists that  the owners to commit "
```

```
        "to better money for his team next year in order to get him to stay on as manager;  two young brothers who want
to buy a horse that they've fallen in love must promise to bring it back to the owner for a visit every year after they
buy it in order to get the owner "
        "to sell it to them; a woman writer has to agree to keep her informant's name out of her upcoming book in order
to get information that will make the book extraordinary; a corporate head has to set the release date for his new
product at two months after his competitor's "
        "release their version in order to be let in on their secrets by a spy who has loyalty to the competitor; etc. "
);

resource 'CNTX' (rApprSTStp + rSvFuture, PFM_MIN_PRIO) {       /* Future */
        "The specific ways things will be in the future that are discovered or brought about on the way to the goal
which indicate progress in the Objective Story.  For example, a man trying to organize a tournament of the best checkers
players in the world gets commitments from "
        "the players to keep a particular date open; students trying to become scientists successfully predict how
several successive experiments will turn out as they come closer to their degrees; spies looking for information about a
secret treaty between enemy heads of state "
        "discover piece by piece where the meeting will be and when each leader will arrive; detectives working with
psychics to solve a case get closer to their goal with every prediction made by the psychics which comes true; etc. "
);

resource 'CNTX' (rApprPLStp + rSvFuture, PFM_MIN_PRIO) {       /* Future */
        "The specific ways things will be in the future that are discovered or brought about which indicate growth in
the relationship between the Main and Obstacle Characters in the Subjective Story.  For example, two cadets at an academy
anticipate every meeting when they will be "
        "on competing teams over the year in the intramural events; a woman singer in a band, whose leader has different
dreams for the band than she does, sets dates without his cooperation for future gigs and recording sessions which will
guide the band's career; "
        "a reporter who has a very hard-nosed editor cannot get an answer as to when she will get her own by-line, etc.
"
);

resource 'CNTX' (rApprMCStp + rSvFuture, PFM_MIN_PRIO) {       /* Future */
        "The specific ways things will be in the future that indicate the degree of the Main Character's central
concern.  For example, a hit-man who is trying to retire receives a package deal for three more wet-work jobs; a woman
trying to win a national tennis title discovers "
        "that she will have to play the top seeded player in the quarter finals; a man trying to locate his long lost
family picks up on a rumor they will be leaving the country in a few days to live in Africa; a gay priest who wants to
quit the faith finds out the Pope will be "
        "visiting his small city on a surprise tour in two weeks; etc. "
);

resource 'CNTX' (rApprOCStp + rSvFuture, PFM_MIN_PRIO) {       /* Future */
        ""
);



resource 'CNTX' (rApprSTCon + rSvPresent, PFM_MIN_PRIO) {      /* Present */
        "All the objective characters are concerned with the Present; with the way things stand as of now.  For example,
a kingdom is ruled by a boy king with no experience; a group of "
        "people locked inside an elevator; army generals fighting a war with heavy casualties take honest account of how
their troops are outnumbered; a team of reporters caught in a foreign "
        "country that has just turned hostile to the U.S., etc.  Exploring the characters' present status will
illustrate it as an Objective Story Concern."
);

resource 'CNTX' (rApprPLCon + rSvPresent, PFM_MIN_PRIO) {      /* Present */
        "The main and obstacle characters must deal with their different perspectives of the present.  for example,
partners in business dealing with the profitability of their company; "
        "the problem of commitment as seen by two lovers; a union strike as seen by two workers who are part of it; the
problem of ruling a kingdom as seen by a ruthless king and his more liberal prince, etc.  "
        "Illustrating the situation towards which the characters have different attitudes will demonstrate the present
as a Subjective Story Concern."
);

resource 'CNTX' (rApprMCCon + rSvPresent, PFM_MIN_PRIO) {      /* Present */
        "What does it feel like as the main character to confront the present?  For example, a man waking up after
sleeping for 40 years; a cancer patient who has only 3 months to live; a boy discovers his "
        "parents are criminals; a movie star is cornered by a crazed fan in a parking lot, etc.  Being forced to face
the way things are illustrates the present as a Main Character Concern."
);

resource 'CNTX' (rApprOCCon + rSvPresent, PFM_MIN_PRIO) {      /* Present */
        "What are the ramifications of the obstacle character's attitudes to the present?  For example, an abusive
father's attitude to his son leaving the house when he sees his son has grown up; "
        "a prosecutor who doesn't have enough evidence; a jealous veteran quarterback who is not as good as the rookie;
a gambler who finds himself $200,000 into debt, etc.  Examining the external effects of "
        "dealing with what is just now happening will illustrate the present as an Obstacle Character Concern."
);

resource 'CNTX' (rApprSTGoal + rSvPresent, PFM_MIN_PRIO) {     /* Present */
        "The specific processes of gathering information that the characters wish to engage in, in order to acquire
knowledge. For example, researching a topic at the library, spending some time on the floor of "
        "the New York stock exchange, exchanging dating experiences with friends, interning at a company in your field
of interest, living with a family abroad, learning about hospital procedure by volunteering as a candy striper, etc. "
);

resource 'CNTX' (rApprPLGoal + rSvPresent, PFM_MIN_PRIO) {     /* Present */
        "The situation which already exists or which threatens to come about if a goal is not met.  For example, an evil
empire that rules the galaxy by torture that will not be overthrown; a community trying to prevent a crotchety "
        "old man from dying bitter and alone;   a monster that will continue to ravage the countryside;  a desegregated
community that will be racially divided if a racist leader is elected, etc."
);

resource 'CNTX' (rApprMCGoal + rSvPresent, PFM_MIN_PRIO) {     /* Present */
        "Positive elements in the state of things that are accrued as the effort toward the goal proceeds.  For example,
a nation experiences a lull in racial tensions  because the Oriental king wants to marry a black woman; "
        "the rain forests bloom as a thief attempts to escape to South America with a top secret fertilizer; a city is
safe again as a battle between super-foes is taken into the ninth dimension ; a group of imprisoned Jews survive because
a WWII profiteer needs laborers,  etc."
);

resource 'CNTX' (rApprOCGoal + rSvPresent, PFM_MIN_PRIO) {     /* Present */
        "A current situation that must be endured so that the greater, overall picture of  things can move toward the
Goal.  For example, a man who remains behind to endure torture so the rest of his team can escape;  a country that is "
        "at war to preserve its own liberties from totalitarian invaders; a woman who lives in a decrepit house to save
money  for a better one;  a boy who endures punishment to avoid telling on his friends and losing his integrity, etc."
);

resource 'CNTX' (rApprSTReq + rSvPresent, PFM_MIN_PRIO) {      /* Present */
        "The current situation or circumstances needed to prepare the way or set the stage for the goal to be reached.
For example, having the whole family together so an estate can be legally divided; holding the correct job to influence "
```

```
	"a city government decision; having a thunderstorm so a scientific experiment can be completed; being in the same city as the serial killer in order to catch him, etc."
};

resource 'CNTX' (rApprPLReq + rSvPresent, PFM_MIN_PRIO) {	/* Present */
	"The current situation or circumstances which have to be in place in order to move on to the requirements.  For example, the correct weather for a sail boat race to occur, being left alone with the free time during which practice takes "
	"place for an event; being in supernatural communion with God so that a religious journal can be found that locates a lost city; being locked inside a uranium mine where an unknown molecular change occurs that gives a woman the superhuman strength, etc."
};

resource 'CNTX' (rApprMCReq + rSvPresent, PFM_MIN_PRIO) {	/* Present */
	"The current situation or circumstances which mean that the Consequence is imminent and the Goal may not be reached.  For example, a huge labor lay-off portends the closing of a company; the coronation of an evil king who hates the good knight trying to "
	"champion the poor peasants; a declaration of martial law that dictates how a group of good rebels can congregate or assemble; a marriage by a human rights leader to a racist spouse, etc."
};

resource 'CNTX' (rApprOCReq + rSvPresent, PFM_MIN_PRIO) {	/* Present */
	""
};

resource 'CNTX' (rApprSTStp + rSvPresent, PFM_MIN_PRIO) {	/* Present */
	"Current situations or circumstances that exist on the way to the Goal that indicate progress in the Objective Story.  For example, a woman scientist who wishes she could have Gertrude Stein finds herself transported back to the 1930's by her experimental time-machine; a man and woman who are interested in each other, "
	"but too shy to introduce themselves are suddenly stuck in an elevator together; a group of teenage girls driving down the coast to find a cause to serve rear end a Rear Admiral; etc. "
};

resource 'CNTX' (rApprPLStp + rSvPresent, PFM_MIN_PRIO) {	/* Present */
	"Current situations or circumstances that indicate growth in the relationship between the Main and Obstacle Characters;  the coincidental and unrecognized meeting of an FBI agent and his quarry in a restaurant; a father-son picnic that brings a too often absent father together with his son for a whole afternoon; "
	"a manipulative hall monitor and a rebellious student spend an afternoon in detention together; a man having an affair with his wife's mother is stuck on a six hour car ride with the both of them; etc. "
};

resource 'CNTX' (rApprMCStp + rSvPresent, PFM_MIN_PRIO) {	/* Present */
	"Current situations or circumstances that indicate the degree of the Main Character's concern.  For example, a girl is grounded for disobeying her parents who told her to break up with her boyfriend; a man is arrested for breaking a court order telling him to stay away from his kids whom he loves; "
	"a boy ends up hanging from a window ledge from trying to meet his favorite movie star; a woman is in jail because she refuses to give any information about her mother who is wanted by the police; etc. "
};

resource 'CNTX' (rApprOCStp + rSvPresent, PFM_MIN_PRIO) {	/* Present */
	"Current situations or circumstances associated with the Obstacle Character that indicate the extent of their central concern.  For example, a policeman is surrounded by 50 armed henchmen ordered to kill him by the woman he is trying to arrest; a plague unleashed by an evil wizard chokes an entire kingdom "
	"in his mad attempt to kill a single child; a ban is placed on the sale of a Rock group's records by a politician who thinks the lyrics are satanic; the girls in a finishing school are made responsible for cleaning a huge stable of horses by their benefactor who thinks they have become too prim and proper; etc.  "
};



resource 'CNTX' (rApprSTCon + rSvUnderstanding, PFM_MIN_PRIO) {	/* Understanding */
	"All the objective characters are concerned with understanding something.  For example, the meaning of life, the social behavior of a wild species, the evolution of a disease, an ancient hieroglyphic language.  Exploring the process of finding meaning of something will illustrate Understanding as an Objective Story Concern."
};

resource 'CNTX' (rApprPLCon + rSvUnderstanding, PFM_MIN_PRIO) {	/* Understanding */
	"The Main and Obstacle Characters strive to reconcile their understanding of something.  For example, friendship, marriage, social status, dependency, personal freedom, the value of an intimate relationship between siblings, and other conceptual issues.  "
	"Engaging in the process of finding meaning will illustrate Understanding as a Subjective Story Concern."
};

resource 'CNTX' (rApprMCCon + rSvUnderstanding, PFM_MIN_PRIO) {	/* Understanding */
	"What does it feel like as the Main Character to seek understanding of something?  For example, how a disease is transmitted, one's place in society, one's value to one's family, the motivations for someones attraction to you, etc.  "
	"Exploring the process of seeking meaning will illustrate Understanding as a Main Character Concern."
};

resource 'CNTX' (rApprOCCon + rSvUnderstanding, PFM_MIN_PRIO) {	/* Understanding */
	"What are the ramifications of the Obstacle Character's efforts to understanding something?  For example, the impact of a messianic minister's re-interpretation of the Bible on the believers in a particular religion, of a mother's understanding of unconditional love on the members of a dysfunctional family, "
	"of a political spin-doctor's attempts to define \"honesty\" on the volunteers of a political campaign, etc.  Examining the external effects of the search for meaning will illustrate Understanding as an Obstacle Character Concern."
};

resource 'CNTX' (rApprSTGoal + rSvUnderstanding, PFM_MIN_PRIO) {	/* Understanding */
	"The specific methods of appreciating the meaning of something that the characters aspire to engage in. For example, an adopted child aspires to understand why her mother gave her up to foster care; a Persian American child hopes to understand the religion and cultural politics of his ancestors that are still "
	"practiced by his parents; an inter-racial couple strives to understand their commitment to each other; a child of a wealthy family struggle to understand the self worth that can be gained by trying to survive by their own means; etc."
};

resource 'CNTX' (rApprPLGoal + rSvUnderstanding, PFM_MIN_PRIO) {	/* Understanding */
	"The specific methods of appreciating the meaning of something that the character's will be forced to engage in if the goal is not achieved. For example, a young child comes to understand responsibility after forgetting to feed their pet hamster for a week; a political candidate coming to "
	"understand the importance of a good social profile after loosing the race because of a scandalous affair with another candidates wife; a family comes to understand that common child vaccines don't always prevent disease but in fact transmit it after their child contracted the AIDS virus "
	"from a polio vaccination; a business man comes to understand the necessity to be politically correct after a law suit was file d against him for referring to an African American as a Black; etc."
};

resource 'CNTX' (rApprMCGoal + rSvUnderstanding, PFM_MIN_PRIO) {	/* Understanding */
	"The specific methods of appreciating something of a positive nature the objective characters acquire during the effort or on the path to achieving a goal. For example, coming to understand the power of religious faith while volunteering at a local soup kitchen run by the Catholic church; a college student "
```

```
        "coming to appreciate the meaning of friendship as she seeks to overcome a debilitating accident; a city slicker
coming to appreciate the meaning of the small pleasures of rural life, as they vacation on the range; etc."
};

resource 'CNTX' (rApprOCGoal + rSvUnderstanding, PFM_MIN_PRIO) {          /* Understanding */
        "The negative aspects of appreciating the meaning of something that the character's accrue/ endure during the
effort or on the path to achieving a goal that have specific negative side effects. For example, a divorced mother is
forced to come to new understandings about her own flaws in explaining her "
        "divorce to her children; a young child going to school for the first time comes to understand that they are not
a member of the predominating white society; a child of the Muslim religion  understanding that his family must make
sacrifices to  show God respect and gain mercy; a young girl comes to "
        "understand that the successful swimwear modeling career of her best friend is a result of a bulimic disorder;
etc."
};

resource 'CNTX' (rApprSTReq + rSvUnderstanding, PFM_MIN_PRIO) {          /* Understanding */
        "Specific understanding of something needed to pave the way, open the door or meet needs essential and
preliminary to achieving the Goal.  For example, understanding how an atom bomb works in order to defuse it; a white man
moving into an all Latino neighborhood needs to understand the customs of his "
        "neighbors in order to fit in; a woman trying to end the spread of a new disease must understand how it is
transmitted; a soldier sweeping mines to lead his troops into enemy territory must understand the strategy behind how the
mines were laid in order to find them all; etc.   "
};

resource 'CNTX' (rApprPLReq + rSvUnderstanding, PFM_MIN_PRIO) {          /* Understanding */
        "Specific understanding of something needed to fulfill or meet the Requirements.  For example, a young trumpet
player trying to join a revolutionary new jazz group needs to understand their new arrangements in order to improvise at
their level and make it into the band; a woman trying to save a "
        "frightened hermit who has hidden under a bridge the woman has contracted to demolish has to understand how he
was driven out of society in order to get him to come out; a man trying to stop a landlord from demolishing low-income
housing must understand the laws preventing this in order to get the "
        "case to court; a Latino woman trying to get elected to city government has to understand the corruption
involved in the election process in order to survive the primaries; etc. "
};

resource 'CNTX' (rApprMCReq + rSvUnderstanding, PFM_MIN_PRIO) {          /* Understanding */
        "Specific understanding of something that indicates the imminent approach of the Consequences.  For example, a
man on an alien space-craft comes to understand that the aliens are treating him so well because they intend to eat him;
a girl comes to understand that her mother took her horse to town "
        "in order to sell it and not to show it as she had said; a couple trying to reconcile their differences comes to
understand that they see things from fundamentally opposite points of view and it might not be worth working out; a young
gay man comes to understand that his one friend in high-school "
        "was pretending to like him in order to talk about him and not to help him deal with feeling different; etc. "
};

resource 'CNTX' (rApprOCReq + rSvUnderstanding, PFM_MIN_PRIO) {          /* Understanding */
        "Specific understanding of something that must be gained at someone's insistence in order to clear the way
toward fulfillment of the Requirement.  For example, a boy trying to become a knight must understand the riddles of his
master before his master will teach him the sword-work and horsemanship"
        "necessary to be a knight; a pilot helping to develop a space ship must understand the dangers involved in
space-flight before his superiors will tell him how to work the prototype so he can show what it can do; etc. "
};

resource 'CNTX' (rApprSTStp + rSvUnderstanding, PFM_MIN_PRIO) {          /* Understanding */
        "Things understood on the way to the goal that indicate progress in the Objective Story.  For example, the
whereabouts of the wine cellar; the legal ramifications of robbing a bank; the identity of the murderer; the value of the
painting."
};

resource 'CNTX' (rApprPLStp + rSvUnderstanding, PFM_MIN_PRIO) {          /* Understanding */
        "Things understood on the way to the goal that indicate growth in the relationship between the Main and Obstacle
characters in the Subjective Story.  For example, a married couple realize they are no longer in love;  a gunfighter and
a U.S. Marshall understand they have mutual respect for each other; "
        "a father finally understands his son has hidden the fact that he's homosexual; a slumlord realizes - thanks to
the efforts of a passionate tenant - that he has placed financial profit ahead of human decency. "
};

resource 'CNTX' (rApprMCStp + rSvUnderstanding, PFM_MIN_PRIO) {          /* Understanding */
        "Things understood on the way to the goal that indicate the degree of the Main Character's central concern.  For
example, a speed skater who comes to understand that her father cares more about personal satisfaction than he does about
her winning; a law student whose first year in school has made her "
        "understand the capriciousness of the justice system; a child whose understands the meaning of devotion when her
dog returns after being lost on vacation; a married woman who's extramarital affair leads her to understand she's been
trapped in a loveless marriage."
};

resource 'CNTX' (rApprOCStp + rSvUnderstanding, PFM_MIN_PRIO) {          /* Understanding */
        ""
};


resource 'CNTX' (rApprSTCon + rSvDoing, PFM_MIN_PRIO) {          /* Doing */
        "All the objective characters are concerned with doing something.  For example, climbing the Alps, running an
election campaign, exploring uncharted territory, "
        "fighting wild animals, breaking world records, maintaining a household, searching for a job, eating, etc.
Exploring an activity will illustrate Doing as an Objective Story Concern."
};

resource 'CNTX' (rApprPLCon + rSvDoing, PFM_MIN_PRIO) {          /* Doing */
        "The Main and Obstacle Characters are grappling over the course of an activity.  For example, partners building
a business, parents caring for a new baby, a paraplegic's struggle to communicate to a physical therapist, etc.  "
        "Engaging in the process of finding meaning will illustrate Understanding as a Subjective Story Concern."
};

resource 'CNTX' (rApprMCCon + rSvDoing, PFM_MIN_PRIO) {          /* Doing */
        "What does it feel like as the Main Character to do something?  For example, trimming one's nose hairs, learning
to scuba dive in Arctic waters, training for the Ironman triathlon, to tend a greenhouse in space, to overindulge in sex,
etc.  "
        "Exploring a personal activity will illustrate Doing as a Main Character Concern."
};

resource 'CNTX' (rApprOCCon + rSvDoing, PFM_MIN_PRIO) {          /* Doing */
        "What are the ramifications of the Obstacle Character's activities?  For example, the impact of a site manager
who plays practical jokes on the construction crew of a skyscraper, of a celebrity who publishes slanderous material
about a tabloid newspaper, "
        "of a candidate running a smear-campaign on the idealistic  supporters in his headquarters, etc.  Examining the
effects of an activity will illustrate Doing as an Obstacle Character Concern."
};

resource 'CNTX' (rApprSTGoal + rSvDoing, PFM_MIN_PRIO) {          /* Doing */
```

```
        "What are the ramifications of the Obstacle Characters' having decided how to implement an idea?  For example,
the current fiancee who plans how to thwart romantic overtures toward her beloved; the husband whose wife is dieting gets
his fill of "
        "fatty food by brining home take-out burgers; the coach who works out how to keep his quarterback free of
romantic entanglements; the criminal who plans how to will die before being captured, etc."
};

resource 'CNTX' (rApprPLGoal + rSvDoing, PFM_MIN_PRIO) {        /* Doing */
        "The specific activities the objective characters are currently engaging in, or will be forced to engage in or
endure, if the goal is not achieved. For example, grandparents forced to give lengthy, distasteful depositions in order
to gain custody of a "
        "child unless the child's unwed mother can be declared insane; students who will be forced to go to school at
night so they can work during the day to pay their tuition if they don't obtain scholarships; going to marriage
counseling sessions if a minister "
        "cannot be convinced that several couples in the congregation are happily married; refraining from eating greasy
foods or caffeine unless an ulcer can be controlled by limiting stress, etc."
};

resource 'CNTX' (rApprMCGoal + rSvDoing, PFM_MIN_PRIO) {        /* Doing */
        "The actions which the objective characters must perform or engage in during the effort or on the path to
achieving a goal that have specific positive benefits. For example, traveling around the country while working in sales
for a large corporation; "
        "engaging in one night stands while stopping over in towns during a road show; sampling a number of professions
as the \"on the street\" color commentator for a local morning show; gathering research for a paper while volunteering
community service hours at the library, etc."
};

resource 'CNTX' (rApprOCGoal + rSvDoing, PFM_MIN_PRIO) {        /* Doing */
        "The actions which the objective characters must perform or engage in during the effort or while on the path to
achieving a goal that have specific negative side effects. For example, a young artist is forced to paint sale "
        "signs on store windows in order to pay the rent; archaeologists must ride on camelback each day while crossing
the desert to the dig; a checkout clerk at a grocery store must engage in a painful, repeated arm motion in order "
        "to keep her job; a group of concert musicians must climb bare-handed down a snowy peak to survive a plane
crash, etc."
};

resource 'CNTX' (rApprSTReq + rSvDoing, PFM_MIN_PRIO) {        /* Doing */
        "The specific actions the objective characters must engage in that are necessary to achieve a goal.  For
example, living in a country to establish residency before applying for citizenship; practicing long distance running in
order to enter a marathon, "
        "evangelistic missionaries going door to door in order to in order to recruit enough members to advance in their
faith; teaching in a center city school in order to gain the experience necessary for a position on the board of
education, etc. "
};

resource 'CNTX' (rApprPLReq + rSvDoing, PFM_MIN_PRIO) {        /* Doing */
        "The specific actions that must take place in order to clear the way toward the goal. For example, students must
register for classes every semester in order to be enrolled so they will obtain enough credits to qualify for a degree;
doctors must work as interns "
        "in a hospital in order to gain residency so they will be eligible to open a private practice; members of
frequent flier programs must fly a minimum of twenty thousand miles in order to  win a free ticket so they can visit
their relatives overseas; collegiate members "
        "of the military must engage in three years of the reserve program in order to obtain the funds to pay for
college so they can get a degree, etc. "
};

resource 'CNTX' (rApprMCReq + rSvDoing, PFM_MIN_PRIO) {        /* Doing */
        "The actions that indicate the imminent approach of the consequence. For example, the flickering of lights
before a storm causes a blackout; constantly changing the television station before you realize there is nothing on T.V.
that "
        "interests you; the oil light going on and off in your car warning that the engine will soon stall; the
telephone constantly ringing after making racial slurs in an interview; a dog growling, etc."
};

resource 'CNTX' (rApprOCReq + rSvDoing, PFM_MIN_PRIO) {        /* Doing */
        "The specific actions made necessary by someone's insistence, that the objective characters must engage in, in
order to clear the way toward the goal. For example, a poetry teacher insisting his students do cartwheels to enter and
exit the class room on the day they are asked to recite; a reverend insisting that one climb to the top of a mountain in
order to become a member of his parish; "
        "the president of a law firm insisting that a new member play golf with the rest of the firm every Friday as a
term of their employment; a mother insisting that her child brush their teeth, say their prayers, and sing the National
Anthem before they may go to bed, etc. "
};

resource 'CNTX' (rApprSTStp + rSvDoing, PFM_MIN_PRIO) {        /* Doing */
        "The specific act the objective characters engage in on the way to the goal that indicate progress in the
Objective Story. For example, crossing the Sahara desert; building a colony of humans on another planet; crossing the
border frontier of an enemy territory; making a movie for under twelve thousand dollars; tracing the steps of a serial
killer, etc."
};

resource 'CNTX' (rApprPLStp + rSvDoing, PFM_MIN_PRIO) {        /* Doing */
        "The specific acts engaged in that indicate growth in the relationship between the Main and Obstacle Characters
in the subjective story. For example, a down hill skier racing against a high school team mate who as children had always
beat him by several seconds; a disinherited child traveling with their parents they haven't seen in years to make amends;
a woman carrying a baby for "
        "her infertile best friend; a gay male having his conservative family to dinner to meet his S.O., etc."
};

resource 'CNTX' (rApprMCStp + rSvDoing, PFM_MIN_PRIO) {        /* Doing */
        "The specific acts engaged in that indicate the degree of the main character's central concern. For example,
having general physical contact with an AIDS victim for the first time; a autopsy trainee getting used to penetrating a
body with a knife; continually traveling a new way home from work so one can learn their way around a new city; drafting
and redrafting love letters to an "
        "old flame one wishes they hadn't lost; a runner training every day so as to be in shape for a marathon; a
serial killer ordering knives from the home shopping network every day, etc."
};

resource 'CNTX' (rApprOCStp + rSvDoing, PFM_MIN_PRIO) {        /* Doing */
        "The specific acts associated with the obstacle character that indicates the extent of their central concern.
For example, a man taking a road trip every time he and his girlfriend get into a fight; a woman hopelessly in love;
purchasing a new outfit for each date in the hopes of to impressing him; a frustrated man beating his dog every time he
finds himself forgetful; "
        "a lonely man dragging himself to a bar every night until he meets the right girl; etc. "
};


resource 'CNTX' (rApprSTCon + rSvObtaining, PFM_MIN_PRIO) {    /* Obtaining */
        "All the objective characters are concerned with taking possession of some item(s).  For example, a source of
power, a treasure, a company, a title or office, etc.  Exploring the state of possession will illustrate Obtaining as an
Objective Story Concern."
```

```
};

resource 'CNTX' (rApprPLCon + rSvObtaining, PFM_MIN_PRIO) {     /* Obtaining */
        "The Main and Obstacle Characters vie to achieve something.  For example, the love of another person, status,
notoriety, respect, power, and other conceptual rewards.  Engaging in the process of obtaining will illustrate Obtaining
as a Subjective Story Concern."
};

resource 'CNTX' (rApprMCCon + rSvObtaining, PFM_MIN_PRIO) {     /* Obtaining */
        "What does it feel like (as the Main Character) to be driven to possess or have control over something?  For
example, to win love or general admiration, to control the purse strings, to win a race or achieve a personal best, etc.
Exploring the internal drives to possess or control will illustrate Obtaining as a Main Character Concern."
};

resource 'CNTX' (rApprOCCon + rSvObtaining, PFM_MIN_PRIO) {     /* Obtaining */
        "What are the ramifications of the Obstacle Character's drive to possess or have control over something?  For
example, the impact on employees in a company, the effects of new laws on society, the impact of one family member on the
others in the family, etc.  Examining the external effects of the drive to possess or control will illustrate Obtaining
as an Obstacle Character Concern."
};

resource 'CNTX' (rApprSTGoal + rSvObtaining, PFM_MIN_PRIO) {    /* Obtaining */
        "The specific item or object the objective characters aspire to possess or control.  For example, a title or
position such as the presidency, a specific amount of money,  any object of value, essential information (like who-done-
it or the cure for a disease), etc."
};

resource 'CNTX' (rApprPLGoal + rSvObtaining, PFM_MIN_PRIO) {    /* Obtaining */
        "The specific item or object that one or more of the objective characters will be forced to possess or control
(or be controlled by) if the Goal is not achieved.  For example, indebtedness or wealth, death or life, companionship or
solitude, lost opportunity or an open-ended obligation, etc."
};

resource 'CNTX' (rApprMCGoal + rSvObtaining, PFM_MIN_PRIO) {    /* Obtaining */
        "Items or conditions the characters accrue/endure during the effort or on the path toward achieving the goal
that have specific negative side effects.  For example, wounds, emotional trauma, depletion of reserves, physical and
emotional discomfort, etc."
};

resource 'CNTX' (rApprOCGoal + rSvObtaining, PFM_MIN_PRIO) {    /* Obtaining */
        "Items or conditions the character collect/enjoy  during the effort or on the path toward achieving the goal
that have specific positive benefits.  For example, personal gratification, increase of reserves, thrills and other
positive experiences, future opportunities, etc."
};

resource 'CNTX' (rApprSTReq + rSvObtaining, PFM_MIN_PRIO) {     /* Obtaining */
        "The specific items needed to pave the way, open the door, or meet needs essential and preliminary to achieving
the goal.  For example, the combination to a safe, the ingredients to a formula or recipe, maps or items on a treasure
hunt type of list, permission, proficiencies, title or degree, answers to riddles, parts of a puzzle, clues, etc."
};

resource 'CNTX' (rApprPLReq + rSvObtaining, PFM_MIN_PRIO) {     /* Obtaining */
        "The specific possessions or items to be controlled essential to fulfill or meet the Requirements.  For example,
the whereabouts of the combination to a safe, achieving the appearance of worthiness in order to obtain permission,
getting the necessary equipment needed for practice to obtain a level of proficiency required, obtaining cooperation of
experts to discover clues, etc."
};

resource 'CNTX' (rApprMCReq + rSvObtaining, PFM_MIN_PRIO) {     /* Obtaining */
        "The specific items or achievements that must be met in order to clear the way toward fulfillment of the
Requirement.  For example, getting excellent  grades to get permission to go on a school trip, getting a political
endorsement in order to obtain funding, getting the apology of a rival in order to gain someone's cooperation, or
anything that must be obtained in exchange for assistance."
};

resource 'CNTX' (rApprOCReq + rSvObtaining, PFM_MIN_PRIO) {     /* Obtaining */
        "The specific items or conditions that indicate the imminent approach of the Consequence.  For example, symptoms
of a disease, readings of radon levels or seismic activity before a big earthquake, getting notices of eviction, death
threats, pole results before an election, positive reviews of a play (that was supposed to flop), winning an award for
Salesman of the Year when you want out of your contract, etc."
};

resource 'CNTX' (rApprSTStp + rSvObtaining, PFM_MIN_PRIO) {     /* Obtaining */
        "The possessions and conceptual items obtained on the way to the goal that indicate progress in the Objective
Story.  For example, items collected from a list in a scavenger hunt; symptoms of a disease; admonitions and accolades of
students' efforts to graduate from school; game pieces for an advertising contest; clues in a mystery; etc."
};

resource 'CNTX' (rApprPLStp + rSvObtaining, PFM_MIN_PRIO) {     /* Obtaining */
        "The possessions and conceptual items accrued that indicate growth in the relationship between the Main and
Obstacle Characters in the Subjective Story.  For example, the gifts exchanged between lovers (The Gift of the Magi); the
threats, clues, and victims parts a criminal sends to a pursuing detective; unused tickets to ball games that a son
collects that indicate his father's increasing absences; reviews of a play that features two competitive actresses, etc."
};

resource 'CNTX' (rApprMCStp + rSvObtaining, PFM_MIN_PRIO) {     /* Obtaining */
        "The possessions and conceptual items collected that indicate the degree of the Main Character's central
concern.  For example, pictures of a stalker's potential victim, a growing (or diminishing) pile of unpaid bills, pink
slips that indicate days suspended from school, report cards, compliments from friends on one's appearance, invitations
to parties, family anecdotes, etc."
};

resource 'CNTX' (rApprOCStp + rSvObtaining, PFM_MIN_PRIO) {     /* Obtaining */
        "The possessions and conceptual items associated with the Obstacle Character that indicates the extent of their
central concern.  For example, the number of keys on a manager's key chain, stuffed animals in the rear window of a car,
shoes in a woman's closet, skulls in a headhunter's hut, the amount of food in a pantry, certificates and degrees in an
attorney's office, status symbols, etc."
};


resource 'CNTX' (rApprSTCon + rSvLearning, PFM_MIN_PRIO) {      /* Learning */
        "All the objective characters are concerned with learning about something.  For example, a software program, the
details of a newsworthy story,   sign language, the customs of another culture, a sport, a musical instrument, a
technique in martial arts, etc.  Exploring the process of gathering or imparting information will illustrate Learning as
an Objective Story Concern."
};

resource 'CNTX' (rApprPLCon + rSvLearning, PFM_MIN_PRIO) {      /* Learning */
        "The Main and Obstacle Characters seek to learn about something.  For example, how two people with opposite
personalities can live together compatibly, how two lovers relate to each other after an accident has caused a physical
```

```
loss of mobility, how to raise wild animals in captivity, how a \"know-it-all\" upstart can learn the tricks of the trade
from a seasoned magician, etc. "
        "Engaging in the process of gathering information will illustrate Learning as a Subjective Story Concern."
};

resource 'CNTX' (rApprMCCon + rSvLearning, PFM_MIN_PRIO) {     /* Learning */
        "What does it feel like as the Main Character to learn about something?  For example, a foreign language, a
religious or cultural heritage,  a physical skill or athletic sport, lovemaking techniques, maintaining one's weight,
taking drugs, etc.  Exploring the gathering or imparting of information will illustrate Learning as a Main Character
Concern."
};

resource 'CNTX' (rApprOCCon + rSvLearning, PFM_MIN_PRIO) {     /* Learning */
        "What are the ramifications of the Obstacle Character's process of learning about something?  For example, the
impact of a summer school class of misfits learning chemistry on a high school coach, of a strong-willed teacher learning
about gang culture, of a governess learning to teach a deaf-mute to communicate with her parents, etc.  "
        "Examining the external effects of gathering or imparting information will illustrate Learning as an Obstacle
Character Concern."
};

resource 'CNTX' (rApprSTGoal + rSvLearning, PFM_MIN_PRIO) {     /* Learning */
        "The specific processes of gathering information that the characters wish to engage in, in order to acquire
knowledge. For example, researching a topic at the library, spending some time on the floor of the New York stock
exchange, exchanging dating experiences with friends, interning at a company in your field of interest, living with a
family abroad, learning about hospital procedure by volunteering as a candy striper, etc. "
};

resource 'CNTX' (rApprPLGoal + rSvLearning, PFM_MIN_PRIO) {     /* Learning */
        "The specific process of gathering information that the characters will be forced to engage in if the goal is
not achieved. For example, learning about traffic law at traffic school for ticket violations, learning of your mates
feelings of inadequacy, being forced to learn of substance abuse at AA meetings, learning about child rearing despite
your use of contraceptives, etc."
};

resource 'CNTX' (rApprMCGoal + rSvLearning, PFM_MIN_PRIO) {     /* Learning */
        "The processes of gathering information that the characters get to enjoy or take part in during the effort or on
the path toward achieving a goal that have specific positive benefits. For example, listening to stories from your
grandparents about your parents when they were little when trying to find missing relatives, learning of your  deceased
spouse's joys and aspirations as you search their affects to locate information "
        "about the child you didn't know you had, learning to perfect a second language due to a company's transfer
order to another country, learning about child care by baby-sitting a newborn cousin for the weekend, learning of
employment you are qualified for while checking the newspaper for the whereabouts of your lost dog, etc."
};

resource 'CNTX' (rApprOCGoal + rSvLearning, PFM_MIN_PRIO) {     /* Learning */
        "The processes of gathering information that the characters must accrue / endure during the effort or on the
path to achieving a goal that have specific negative side effects. For example, a victim of child abuse learning about
the abuse of other siblings, couples learning how to confess an infidelity that they regret to their mate, learning to
come to terms with a loved ones death, learning the details of the abduction of a child."
};

resource 'CNTX' (rApprSTReq + rSvLearning, PFM_MIN_PRIO) {     /* Learning */
        "The specific actions that must take place in order to clear the way toward the goal. For example, students must
register for classes every semester in order to be enrolled so they will obtain enough credits to qualify for a degree;
doctors must work as interns in a hospital in order to gain residency so they will be eligible to open a private
practice; members of frequent flier programs must fly a minimum of twenty thousand miles "
        "in order to  win a free ticket so they can visit their relatives overseas; collegiate members of the military
must engage in three years of the reserve program in order to obtain the funds to pay for college so they can get a
degree, etc. "
};

resource 'CNTX' (rApprPLReq + rSvLearning, PFM_MIN_PRIO) {     /* Learning */
        "The specific processes of gathering information that must take place in order to clear the way toward the
fulfillment of a requirement. For example, acquiring information about how to register for a testing date for the GRE's;
learning from a degree check if you qualify for graduation; learning from your travel agent about the possibilities for a
vacation within range of your budget; learning the value of a used car by having it "
        "examined by a mechanic; learning how to qualify for health insurance over the age of sixty- five, etc."
};

resource 'CNTX' (rApprMCReq + rSvLearning, PFM_MIN_PRIO) {     /* Learning */
        "The processes of gathering information that indicate the imminent approach of the consequence. For example, a
young doctor frantically flipping through a medical encyclopedia throughout his patient's examination; a football coach
in desperate need of a new players helping new recruits cheat on their exams; a motorcycle cop forced to take traffic
school; a group of political prisoners gather information about the habits and routines "
        "of an abusive guard; patients of a greedy doctor making money by vaccinating a group of travelers for diseases
that have been eradicated in the country they are visiting begin watching a PBS series on the World Health Organization;
etc. "
};

resource 'CNTX' (rApprOCReq + rSvLearning, PFM_MIN_PRIO) {     /* Learning */
        "The specific processes of gathering information made necessary by someone's insistence in order to fulfill or
meet the need of the requirement. For example, an obsessive employer insisting that the head of employment consul a
potential employee's spouse for their eating and sleeping habits before hiring them; a country club requiring that their
candidates for membership research their family histories for subversion before considering "
        "them for membership; a military physician demanding a D.I. learn how many raw eggs potential trainees can eat
as part of their physical necessary for enlistment; an elementary school requiring teachers spend their summer vacations
taking elective classes in order to attain tenure; etc."
};

resource 'CNTX' (rApprSTStp + rSvLearning, PFM_MIN_PRIO) {     /* Learning */
        "The specific processes of gathering information that take place on the way to the goal that indicate progress
in the objective story. For example, gathering clues to a murder; an adopted child seeking to find the whereabouts of her
real mother; a family learning how to communicate with each other; a group of zoologists exploring the reasons for a
species probable extinction; a group of nomads learning to survive in various weather conditions; etc."
};

resource 'CNTX' (rApprPLStp + rSvLearning, PFM_MIN_PRIO) {     /* Learning */
        "The specific processes of gathering information taking place that indicate growth in the relationship between
that Main and Obstacle Characters in the Subjective story. For example, a child learning the native language of their
family from a grandparent; a mother explaining to her child what things were like for her when she was growing up so that
they can understand how fortunate they are now; "
        "a woman learning from her lover the reasons why he disappeared for two years, etc."
};

resource 'CNTX' (rApprMCStp + rSvLearning, PFM_MIN_PRIO) {     /* Learning */
        "The specific processes of gathering information taking place that indicate the degree of the main character's
central concern. For example, a woman whose husband is dying of cancer exploring the case histories of past chemotherapy
recipients to determine if her husband should undergo the treatment; a young girl learning fifty new French vocabulary
words a day so her parents will take her interest in a semester abroad seriously; "
        "learning yoga to cope with separation anxiety of a lost companion; a young boy learning the theory of Karate so
that he will be able to protect himself in school; etc."
};
```

```
resource 'CNTX' (rApprOCStp + rSvLearning, PFM_MIN_PRIO) (      /* Learning */
        "The specific processes of gathering information associated with the Obstacle character that indicate the extent
of their central concern. For example, the number of law books an attorney consults before opting to take a case; an
International Relations major studying six different languages at once; a woman learning the responsibility and
commitment of having a child by volunteering at a children's shelter before opting to have a family; "
        "a hopeful millionaire learning the numerical possibilities behind the game before beginning his plan to win
big; a child learning to control outbursts in the classroom by holding their breath every time they are tempted to yell;
etc."
};

resource 'CNTX' (rApprSTCon + rSvConceptualizing, PFM_MIN_PRIO) (       /* Conceptualizing */
        "All the objective characters are concerned with determining how to execute an idea.  For example, post-
menopausal women who want babies via in vitro fertilization work out the details of hormone balance, exercise and
nutritive supplements; fortune hunters hoping to find treasure by "
        "using metal detectors determine signal strength, frequency, power source under water, etc.; paralysis victims
striving to see the world through the use of virtual reality propose sensors that monitor eye movement instead of body
movement, suggest a non-profit organization of international filmmakers and newspeople to prepare interactive
travelogues;  "
        "employees of an ad agency intending to publicize a new automobile with a million dollar sweepstakes campaign
work out print and broadcast announcements of the announcement;  a radical group determining to make one of their own
president of the United States by first becoming senator, "
        "then proposing inspired legislation stolen from a current senator, whom they intend to assassinate so their
member (his wife) can assume his half-completed term in office, etc."
};

resource 'CNTX' (rApprPLCon + rSvConceptualizing, PFM_MIN_PRIO) (       /* Conceptualizing */
        "The Main and Obstacle Characters are concerned with determining how to implement an idea.  For example,
teenagers determined to lose their virginity behind their parents' back mull over where and when to have sex and what
kind of condom to use; a convict and his cellmate who can't swim argue over how to build a raft for their prison escape;
"

        "political leaders who want to sell a new health plan disagree with their spin doctors on whether to sell their
idea via television, radio, print ads, public forums or newsletter; a guitar player and his band, who have decided they
want to be famous, fight over whether they should play rock, metal, cover tunes, country, punk or folk."
};

resource 'CNTX' (rApprMCCon + rSvConceptualizing, PFM_MIN_PRIO) {       /* Conceptualizing */
        "What does it feel like as the Main Character to decide how an idea will be implemented?  For example, a young
man ponders the best way to propose to his long-time lover; a woman entertains methods of becoming \"Queen of the Class
of '85 Ten Year Reunion\"; a man examines ways of losing 50 pounds; a girl "
        "thinks up schemes that will net her a date with the star quarterback; a cop plots out a plan to catch an
informer on the force, etc."
};

resource 'CNTX' (rApprOCCon + rSvConceptualizing, PFM_MIN_PRIO) {       /* Conceptualizing */
        "What are the ramifications of the Obstacle Characters' having decided how to implement an idea?  For example,
the current fiancee who plans how to thwart romantic overtures toward her beloved; the husband whose wife is dieting gets
his fill of fatty food by brining home take-out burgers; the coach who "
        "works out how to keep his quarterback free of romantic entanglements; the criminal who plans how to will die
before being captured, etc."
};

resource 'CNTX' (rApprSTGoal + rSvConceptualizing, PFM_MIN_PRIO) {      /* Conceptualizing */
        "The search for a way to implement an idea.  For example, the means of conquering another country; how to stop
the illegal drug trade; a method for getting back custody of an adopted baby from the birth parents who took her back;
how to convince a grandfather to retire; the path to becoming the number one comedy in the ratings, etc."
};

resource 'CNTX' (rApprPLGoal + rSvConceptualizing, PFM_MIN_PRIO) {      /* Conceptualizing */
        "A current situation that must be endured so that the greater, overall picture of  things can move toward the
Goal.  For example, a man who remains behind to endure torture so the rest of his team can escape;  a country that is at
war to preserve its own liberties from totalitarian invaders; a woman who lives in a decrepit house to save money "
        "for a better one;  a boy who endures punishment to avoid telling on his friends and losing his integrity, etc."
};

resource 'CNTX' (rApprMCGoal + rSvConceptualizing, PFM_MIN_PRIO) {      /* Conceptualizing */
        ""
};

resource 'CNTX' (rApprOCGoal + rSvConceptualizing, PFM_MIN_PRIO) (      /* Conceptualizing */
        "The negative aspects of coming up with the way in which an idea can be implemented that are incurred during the
effort or on the path toward achieving the goal.  For example, a homosexual young man trying to pursue an acting career
in Los Angeles must conceptualize how he might seduce the female casting director in order to get the part he won't get
otherwise;  "
        "family members trapped in a blizzard must conceptualize methods of carving up the frozen body of their father
so they will not starve if help does not come;  a 42-year-old, obese man who has eaten nothing but hamburgers and French
fries since he was six learns his heart is about to fail, and must conceptualize a completely non-fat diet; a woman who
is deathly "
        "afraid of police and lawyers wants to leave her husband, but must conceptualize how to contact the police, file
charges and hire an attorney."
};

resource 'CNTX' (rApprSTReq + rSvConceptualizing, PFM_MIN_PRIO) {       /* Conceptualizing */
        "The current situation or circumstances which mean that the Consequence is imminent and the Goal may not be
reached.  For example, a huge labor lay-off portends the closing of a company; the coronation of an evil king who hates
the good knight trying to champion the poor peasants; a declaration of martial law that dictates how a group of good
rebels can congregate or assemble; "
        "a marriage by a human rights leader to a racist spouse, etc."
};

resource 'CNTX' (rApprPLReq + rSvConceptualizing, PFM_MIN_PRIO) [       /* Conceptualizing */
        "Determining the needs by which an idea can be implemented is necessary before the requirement to the goal can
be undertaken.  For example, the young man must determine how to learn to speak the same language as his beloved co-
worker in seven days if he intends to propose during next week's business trip, so he can take her with when he leaves
the country for home;  "
        "the young guitarist must determine how to practice five hours day and hold a full-time job if he intends to
become famous through practicing;   the bankrupt woman must determine exactly how a particular bank is laid out if she
intends to rob it in order to pay off her debtors; a mother must determine how to navigate the social welfare and social
services systems if "
        "she decides she wants the baby back after giving him up for adoption, in order to win back her ex-husband."
};

resource 'CNTX' (rApprMCReq + rSvConceptualizing, PFM_MIN_PRIO) (       /* Conceptualizing */
        "Determining how an idea is to be implemented indicates imminent approach of the Consequence.  For example, a
seemingly ambitious young guitar player tries to determine how he might make a living through something other than music
if his audition goes badly;  soldiers in a prisoners of war camp begin working out a way to choose a scapegoat from their
ranks if an escape "
        "plan is uncovered by their captors;  a young woman about to celebrate her third wedding anniversary determines
how she might support herself on her own salary;  network TV executives work out what shows might fit in an 8:30 p.m.
Wednesday time slot twenty minutes after pledging to put a show called \"Beach Bimbos\" in that same time slot."
};
```

```
resource 'CNTX' (rApprOCReq + rSvConceptualizing, PFM_MIN_PRIO) {      /* Conceptualizing */
	"Determining how an idea might be implemented is made a condition for someones assistance in making progress toward  the goal.  For instance, an inventor insists that a musician work out how to publicize a new instrument before he'll let the musician use his invention at an audition;  a young man must figure out how to repair his future father-in-law's hurricane-damaged "
	"yacht before the father-in-law to be will agree to give his daughter's hand in marriage;  an attorney insists that a birth mother work out how to win back her estranged husband, the birth father, if the attorney is to help her get back the baby she gave up for adoption;  a politician must determine how he'll pay off a drug czar's $600 thousand gambling debt so that the "
	"drug czar will agree to help him stop the drug trade."
};

resource 'CNTX' (rApprSTStp + rSvConceptualizing, PFM_MIN_PRIO) {      /* Conceptualizing */
	"Ideas implemented on the way to the goal that indicate progress in the Objective Story.  For example, students who come up with a plan that will change the way their school is run; foster children at an orphanage devise a plan that will get them all adopted; aging actors dream up the one screenplay that will revive their careers; "
	"a comic strip artist who creates a new work that will redefine the cutting edge of panel art."
};

resource 'CNTX' (rApprPLStp + rSvConceptualizing, PFM_MIN_PRIO) {      /* Conceptualizing */
	"Ideas implemented on the way to the goal that indicate growth in the relationship between the Main and Obstacle characters in the Subjective Story.  For example, newlyweds off to a rocky start who devise a new routine they hope will keep them together; rival car makers who design eerily similar new automobiles; "
	"a workaholic father who comes up with the idea to coach his son's little league team in order to bring them closer together; a con man whose long-time victim thinks of a brilliant way to turn the tables on him."
};

resource 'CNTX' (rApprMCStp + rSvConceptualizing, PFM_MIN_PRIO) {      /* Conceptualizing */
	"Ideas implemented on the way to the goal that indicate the degree of the Main Character's central concern.  For example, a rookie FBI agent who has devises a scheme that will get him an overseas bureau job by next summer; a prostitute who sees a fancy car drive by and works out a plan to fall in front of it in order to hook the driver; "
	"a washed-up actor working out the details of a screenplay that will  revitalize her career; a law student who loves to party hammers together a plan that will keep his grades above passing."
};

resource 'CNTX' (rApprOCStp + rSvConceptualizing, PFM_MIN_PRIO) {      /* Conceptualizing */
	"Ideas implemented by the Obstacle Character that indicate the extent of his or her central concern. For example, an international spy who fashions a new way to tap phones; a jealous boyfriend who devises a plan whereby he can spy on his beloved 24 hours a day; a science fiction monster who thinks up new ways to eat his prey; an assassin who is designing a new handgun."
};



resource 'CNTX' (rApprSTCon + rSvBeing, PFM_MIN_PRIO) {      /* Being */
	"All the objective characters are concerned with living in a certain manner.  For example, modern Eskimos living as their ancestors did; captured Africans living as slaves in the United States, reformed big-business people living as self-sufficient farmers, teenagers living as space explorers, etc.  Exploring the effects of living in a particular way will illustrate Being as an objective story concern."
};

resource 'CNTX' (rApprPLCon + rSvBeing, PFM_MIN_PRIO) {      /* Being */
	"The Main and Obstacle Characters must deal with living in a certain manner.  For example, two philosophically opposed leaders of a band of Irish gypsies argue over the issue of assimilation into the modern world,  a girl and her alcoholic mother have opposing thoughts about being rich from the new energy source that the girl discovered under their house; an Haitian immigrant and her children disagree on "
	"the benefits of  being migrant workers for an orange juice company, a veterinarian argues with a nurse that he cannot be a doctor to a group of school children shipwrecked on an island, etc.  Engaging with the process of dealing with living in a certain manner will illustrate Being as a Subjective Story Concern."
};

resource 'CNTX' (rApprMCCon + rSvBeing, PFM_MIN_PRIO) {      /* Being */
	""
};

resource 'CNTX' (rApprOCCon + rSvBeing, PFM_MIN_PRIO) {      /* Being */
	"What are the ramifications of the Obstacle Character's process of dealing with living in a certain manner?  For example, a wounded British Indian hunter who must pretend to be French in order to survive in  an Indian tribe until he recovers enough to leave; an interplanetary pirate hiding from the space police by living as a citizen of  a peace loving world of defenseless farmers; an alcoholic father "
	"who pretends to quit drinking so he can regain custody of his kids and collect more welfare; an enemy soldier who switches uniforms and passes for a member of the good guys platoon, etc.  Examining the external effects of living in a certain way will illustrate Being as an Obstacle Character Concern."
};

resource 'CNTX' (rApprSTGoal + rSvBeing, PFM_MIN_PRIO) {      /* Being */
	"The specific manner of living which the objective characters wish to appear to achieve or maintain.  For example, wealthy characters trying to appear to be poor so the tax-collectors will leave them alone; workers at a toxic-waste producing plant trying to appear to work in harmony with nature so environmentalists will leave them alone; homeless people who want to appear "
	"wealthy so they will be treated with respect; a notoriously rowdy fraternity that wishes to seem full of hard working students so the dean will decide not to shut their house down, etc. "
};

resource 'CNTX' (rApprPLGoal + rSvBeing, PFM_MIN_PRIO) {      /* Being */
	"The specific way of living that one or more of the objective characters will have to deal with if the goal is not reached.  For example, a journalist who will have to live as a homeless person for a month as part of a story if they don't cover a current story the way the editor wants; a rich man accused of espionage will have to live as an exiled enemy of the state if he doesn't prove his innocence; "
	"a wrongly convicted doctor who escapes jail and starts living as a laundry man will have to keep living this way indefinitely if he does not find the real murderer; a policeman posing undercover as a drug lord will have to keep up this way of life to protect himself if he is not able to convince his superiors he was not really involved in trafficking, a movie star who will have to live as a housewife if she cannot convince the man she loves to accept her career, etc."
};

resource 'CNTX' (rApprMCGoal + rSvBeing, PFM_MIN_PRIO) {      /* Being */
	"Specific ways of living that have positive effects on the characters which they enjoy on the path toward achieving their goal.  For example, a man trying to shut down a gang pretends to be a powerful gangster whom everyone respects, a boy helping a prince get away from the pressures of office passes himself off as the wealthy, pampered potentate, a woman reporter trying to get a scoop on a star quarterback pretends to be a sports doctor who is put near men who excite her; "
	"a neglected woman faking credentials to get a job is able to have the last word in arguments by virtue of her false title, etc."
};

resource 'CNTX' (rApprOCGoal + rSvBeing, PFM_MIN_PRIO) {      /* Being */
	"Specific ways of living that characters have to endure during the effort or on the path to their goal.  For example, a police woman living as and being treated like a prostitute to be near the suspect she's investigating, a wealthy and creative artist who lives as a butler to be near his father who never knew him, a French immigrant woman posing as an Army soldier who is shipped to the trenches of WW I to get to see her family in France; "
```

```
        "a very traditional priest who is pretending to be a drug dealer to help a police sting operation, etc."
};

resource 'CNTX' (rApprSTReq + rSvBeing, PFM_MIN_PRIO) {          /* Being */
        "Specific ways of living which it is necessary for the characters to experience in order for them to reach the
Goal.  For example, an African-American man pretending to be married to a white German woman in order for her to become a
U.S. citizen; a gay man pretending to be straight in order to become a Navy pilot; a policewoman living undercover as a
prostitute in order to catch a gangster; a Russian spy posing as a great poet to get a private audience with a famous
American intellectual and help him defect; etc."
};

resource 'CNTX' (rApprPLReq + rSvBeing, PFM_MIN_PRIO) {          /* Being */
        "Specific ways of living which it is essential to experience in order to meet the requirements.  For example, a
spoiled young man pretending to care for an ailing uncle in order to get his permission to borrow his fancy car to take
on an important date; a private investigator who poses as a rich oil man to be included on the guest list of an exclusive
party where he will catch the villain; a woman who pretends to be a doctor at a hospital so she can get past the front
desk to see her dying mother and "
        "fulfill a promise to her to commit euthanasia ; an out of shape man posing as a fitness nut in order to meet
good looking candidates for marriage, etc. "
};

resource 'CNTX' (rApprMCReq + rSvBeing, PFM_MIN_PRIO) {          /* Being */
        "The specific manner of living which indicates the imminent approach of the Consequence.  For example,  a girl
is in danger of losing the boy she loves when she  pretends to be rich in her attempt to impress him; when a presidential
candidate starts pretending to care more for her financial backers than the down to earth issues which she started her
campaign on, she becomes in danger of losing the faith of her friends and family ; a large and hairy man escaping from
prison is in danger of being caught "
        "when he makes an ill-fated attempt to pass as a member of an all girls dance ensemble preparing to perform at a
policeman's ball; a trapeze act in a talent show may be about to lose the contest when their star performer shows up
pretending to have lost his mind; etc.  "
};

resource 'CNTX' (rApprOCReq + rSvBeing, PFM_MIN_PRIO) {          /* Being */
        "Specific ways of living which it becomes necessary to experience before moving on to the Prerequisite of the
Requirement.  For example,  a man who has to live as a monk for a time to get the other monks' trust so they will give
him an important clue as to the whereabouts of his long lost father; a mischievous girl who has to be very obedient so
her teacher will give her a passing grade for conduct which her parents insist that she receive before they allow her to
go to camp; an escaping American "
        "prisoner during WW II has to live as the servant of a German farmer before the farmer will give him a
motorcycle to assist his escape;  etc."
};

resource 'CNTX' (rApprSTStp + rSvBeing, PFM_MIN_PRIO) {          /* Being */
        "Specific ways of living which the objective characters engage in on the way to the Goal that indicate progress
in the Objective Story.  For example, characters trying to pull off a con pretend their sham business is becoming more
and more successful; a group of young filmmakers trying to impress a famous actress pose as important foreign producers;
aliens pretend to be human in order to take over Burbank; a Latino reporter pretending to be white in order to write a
story about the experience; etc. "
};

resource 'CNTX' (rApprPLStp + rSvBeing, PFM_MIN_PRIO) {          /* Being */
        "Specific ways of living that indicate the growth in the relationship between the Main and Obstacle Characters
in the Subjective Story.  For example, a boy pretends to be a lost son of a gullible, but rich man; a woman trying to
convince a newspaper reporter to do a story about her struggling business pretends to be involved in other news stories
the reporter is covering; an alien hunting down a special forces soldier for sport pretends to be human to get through
security; etc."
};

resource 'CNTX' (rApprMCStp + rSvBeing, PFM_MIN_PRIO) {          /* Being */
        "The specific ways of living that indicate the degree of the Main Character's central concern.  For example, a
master of disguises escaping from a prison shifts his appearance according to how far from the prison he gets; a woman
obsessed with a talk-show host pretends to be progressively closer related to him as her obsession grows; a gay man who
refuses to face his sexual orientation pretends to be straight and moves in with a woman; an out of work factory hand
running from collection "
        "agents pretends to be several other people in attempts to escape his debts; etc. "
};

resource 'CNTX' (rApprOCStp + rSvBeing, PFM_MIN_PRIO) {          /* Being */
        "The specific ways of living associated with the Obstacle Character that indicates the extent of their central
concern.  For example; a Nazi war-criminal at large trying to regain the fortune he lost while running from prosecution
pretends to be a nazi-hunter to get at the clues he needs to find it; a man who hates the president wants to kill him so
badly that he pretends to be his biggest supporter in order to get near enough to him to shoot him; a woman who has
robbed a bank and escaped with the "
        "money pretends to be royalty from another country in order to elude the police and spend the millions of
dollars she suddenly has; the leader of a small country who is trying to start an international drug ring goes to New
York and pretends to be a crime boss in order to claim his own turf; etc.  "
};


resource 'CNTX' (rApprSTCon + rSvBecoming, PFM_MIN_PRIO) {       /* Becoming */
        "All the objective characters are interested in transforming their nature.  For example, samurai's trying to
become farmers; lazy college students turning into disciplined soldiers; greedy business-people turning into
philanthropic activists, "
        "devoted monks turning into maniacal killers, etc.  Exploring changes in the basic essence of the objective
characters will illustrate Becoming as an Objective Story Concern."
};

resource 'CNTX' (rApprPLCon + rSvBecoming, PFM_MIN_PRIO) {       /* Becoming */
        "The Main and Obstacle characters seek to change their inherent nature.  For example, an incompatible couple
trying to change their interests so they can stay together, leaders of a strict and traditional church trying to
modernize and revise "
        "their outdated attitudes so they are more in tune with their parishioners; superficial and arrogant movie stars
trying to become honest and down to earth; lonely and alienated spies trying to anchor themselves and find stability in
the world "
        "they have spent their lives turning upside-down, etc. Engaging in the process of changing an essential nature
will illustrate Becoming as a Subjective Story Concern."
};

resource 'CNTX' (rApprMCCon + rSvBecoming, PFM_MIN_PRIO) {       /* Becoming */
        "What does it feel like as the main character to seek to change one's nature?  For example, a long time street
tough trying to become a Zen monk; a defensive and domineering mother trying to open herself up to the family she barely
knows. "
        "a shy and quiet painter who has to become loud and outgoing in order to get an agents attention and sell her
work; a peaceful old man who has to become a killer to save himself and his grand children, etc.  Exploring the internal
conflicts "
        "involved in essential changes will illustrate Becoming as a Main Character Concern."
};

resource 'CNTX' (rApprOCCon + rSvBecoming, PFM_MIN_PRIO) {       /* Becoming */
```

```
        "What are the ramifications of the Obstacle Character's attempts to change his nature? For example, a reforming
drug addict's effects on his family; the impact of a former cattle man turning vegetarian on the ranch he works for; a
fanatical "
        "born again Muslim who tries to get his girl friend involved in his newly begun terrorist activity; a killer at
large trying to put his past behind him and fit into society without admitting his crimes, etc.  Examining the external
effects of "
        "the struggle to change one's nature will illustrate Becoming as an Obstacle Character Concern. "
};

resource 'CNTX' (rApprSTGoal + rSvBecoming, PFM_MIN_PRIO) {     /* Becoming */
        "The specific changes of basic nature which the objective characters wish to make.  For example, a warrior tribe
wishing to become peaceful; a morbid, depressed group of mental patients wishing to become more light hearted and joyous;
a cowardly "
        "puppet king wishing for the nerve to stand up for his people against the evil empire; a superficial journalist
trying to find the gumption to stick with an unpopular, but powerful expose, etc. "
};

resource 'CNTX' (rApprPLGoal + rSvBecoming, PFM_MIN_PRIO) {     /* Becoming */
        "The specific change of basic nature which one or more of the objective characters will be forced to go through
if the Goal is not reached.  For example, being changed into a snake if the antidote is not found in time; a peaceful man
who will "
        "become a soldier to protect his home if no way is found to stop the war; a good natured woman will become
bitter and cold if no cure is found for her dying baby; an honest cop may remain with the drug dealers he has joined
while working undercover "
        "if his superiors in the department don't become more serious about helping him complete his original mission,
etc."
};

resource 'CNTX' (rApprMCGoal + rSvBecoming, PFM_MIN_PRIO) {     /* Becoming */
        "Positive changes in their basic nature which characters enjoy during the effort or on the path toward achieving
their Goal.  For example, while helping children after an earthquake; a man with an angry disposition becomes happy and
generous; "
        "a washed up old women's basketball coach finds new confidence while whipping a talented group of rookies into
shape; a confirmed city man grows to love nature during his struggle home after a plane crash in the forest; an anorexic
model becomes "
        "a fat and happy woman during a long, unexpected engagement as head chef at a restaurant, etc. "
};

resource 'CNTX' (rApprOCGoal + rSvBecoming, PFM_MIN_PRIO) {     /* Becoming */
        "Negative changes in their natures which the objective characters endure during their effort or on the path
toward achieving the goal.  For example, a boy becomes more and more cold and ruthless as he leads an escape from a
concentration camp "
        "through enemy territory; a woman becomes an animal-hater after suffering injuries while saving animals from a
fire in her pet store; a man changes from being outgoing to shy when his job as an F.B.I. agent leads him to arrest some
old friends who "
        "have become criminals; a girl becomes emotionally hardened by the criticism she receives while trying to enroll
in an all-boys military college; etc."
};

resource 'CNTX' (rApprSTReq + rSvBecoming, PFM_MIN_PRIO) {     /* Becoming */
        "The changes in nature which characters need to go through to open the door or clear the way to achieving the
goal.  For example, a knight must become a peaceful man in order to reach the end of a mystical quest; a boy who must
change from meek "
        "to aggressive to lead his football team to win the big game; a leader of a bike gang who has to change his view
of women and let a woman into the gang as an equal to defeat a rival gang;  a gangster who has to become a shoe clerk to
be near the woman he loves, etc."
};

resource 'CNTX' (rApprPLReq + rSvBecoming, PFM_MIN_PRIO) {      /* Becoming */
        ""
};

resource 'CNTX' (rApprMCReq + rSvBecoming, PFM_MIN_PRIO) {      /* Becoming */
        ""
};

resource 'CNTX' (rApprOCReq + rSvBecoming, PFM_MIN_PRIO) {      /* Becoming */
        ""
};

resource 'CNTX' (rApprSTStp + rSvBecoming, PFM_MIN_PRIO) {     /* Becoming */
        "Specific changes in the natures of the Objective Characters that occur on the way to the Goal that indicate
progress in the Objective Story.  For example, men and women in a program to allow average citizens into the space-
program progressively become "
        "less average as they become qualified astronauts; people trying to make an inner-city neighborhood safe again
become vicious in the process; a group of people taking a class to deal with their phobia about heights become less
afraid as the class continues; "
        "women soldiers preparing to be among the first sent into battle-field combat become more cool and self reliant
as their time approaches; Two specialists brought together to pull off a complicated robbery become more trusting of each
other and more of a team "
        "as they negotiate obstacles together on way to getting the money; etc."
};

resource 'CNTX' (rApprPLStp + rSvBecoming, PFM_MIN_PRIO) {     /* Becoming */
        "Specific changes in nature that indicate growth in the relationship between the Main and Obstacle Characters in
the Subjective Story.  For example, A lackadaisical student becomes mentally nimble as her obstinate  professor makes her
studies more pertinent to her everyday life; "
        "a detective and the criminal he is chasing become more like each other as they match wits; a little boy's
criminal guardian becomes more socially conscious when the boy he has trained steals the belt to an old man's iron lung;
a gunfighter becomes a nuisance "
        "to the rich railroad baron trying to rip-off the town where the gunfighter is staying when he becomes the
town's guardian; etc. "
};

resource 'CNTX' (rApprMCStp + rSvBecoming, PFM_MIN_PRIO) {     /* Becoming */
        "Specific changes in nature that indicate the degree of the Main Character's central concern.  For example, a
policeman trying to catch a particularly vicious and elusive criminal has to become more and more vicious himself in
order to think like his nemesis; "
        "a boy trying to reconcile his parents' notions of prejudice becomes a spokesman for racial equality ; a woman
caught suddenly in a war drops aspects of her polite and proper nature and becomes more fierce and athletic as she finds
herself protecting orphans who come under her charge; "
        "a priest in doubt of his faith becomes more and more certain of his religious convictions as he finds he is
able to help the community which has persecuted him; etc. "
};

resource 'CNTX' (rApprOCStp + rSvBecoming, PFM_MIN_PRIO) {     /* Becoming */
        "Specific changes in nature associated with the Obstacle Character that indicate the extent of their central
concern.  For example, a crime-lord running a drug ring in a big city becomes progressively more obsessed with getting
one particular cop; a greedy manager of a "
        "talented band changes from being supportive to being bitchy that the band isn't ready for the big time when he
sees that they will no longer need her once they make it; a child actor's change from being sweet to being temperamental
when he loses a part to a friend; a woman who "
```

```
	"changes from being friendly to being murderous when she thinks her son is being molested by the neighbor kids; etc. "
};

resource 'CNTX' (rApprSTCon + rSvConceiving, PFM_MIN_PRIO) {	/* Conceiving */
	"All the objective characters are concerned with coming up with an idea.  For example, a group of Rhodes Scholars trying to determine how they might change the world; recovering agoraphobics trying to determine what will make life feel more adventurous; a mother and son who've lived "
	"in the same town all their lives imagining what lies beyond the hills; radical inventors trying to determine what will catch the public's fancy; several couples trying to determine what might fill a void in their lives.  Exploring the effort made to come up with an idea will illustrate "
	"Conceiving as an Objective Story Concern."
};

resource 'CNTX' (rApprPLCon + rSvConceiving, PFM_MIN_PRIO) {	/* Conceiving */
	"The main and obstacle characters vie to come up with an idea.   For example, teenage sweethearts try to determine what will form an unbreakable bond despite their parents' disapproval;  a convict and a warden grapple over the nature of what is needed to reform prisoners; while watching "
	"the rebels approach en mass, threatened political leaders try to determine what to do about it; competing inventors vie to conceive of the most complicated device they can think of that has no purpose.  "
	"Engaging in the process of vying to come up with an idea will illustrate Conceiving as an Subjective Story Concern."
};

resource 'CNTX' (rApprMCCon + rSvConceiving, PFM_MIN_PRIO) {	/* Conceiving */
	"What does it feel like as the main character to come up with an idea?  For example, a 38-year-old man trying to figure out why he is alone; a high school janitor seeks to conceive of a way out of her poverty; a singer tries to determine what can be done about his degrading body image; "
	"a teenager tries to determine what career she should strive for; a skinny runt seeks an arena in which he can feel more powerful. Exploring the process of coming up with an idea will illustrate Conceiving as an Main Character Concern."
};

resource 'CNTX' (rApprOCCon + rSvConceiving, PFM_MIN_PRIO) {	/* Conceiving */
	"What are the ramifications of the Obstacle Characters' process of coming up with an idea?  For example, a fiancé who is insanely jealous of her husband-to-be's secretary trying to figure out what to do about the situation; a man who loves to eat who dates a woman on a strict diet "
	"tries to figure out a way of dealing with the conflict;  a coach who preaches sexual abstinence during football season must figure out what to do about a star quarterback who's falling in love; a serial killer who detests prison faces a judge who's against the death penalty, "
	"and must determine what approach he should take to avoid incarceration.  Examining the external effects of coming up with an idea will illustrate Conceiving as an Obstacle Character Concern."
};

resource 'CNTX' (rApprSTGoal + rSvConceiving, PFM_MIN_PRIO) {	/* Conceiving */
	"The process of coming up with an idea the objective character hope to engage in.  For example, a zookeeper hopes to get the go ahead to create a task force focused on determining what would boost sagging attendance; the cabinet ministers of a Third World strives to get the United States "
	"government to conceive of alternatives to the cocaine crop; a group leader for teenagers at a halfway home for pregnant girls hopes to get them to start thinking about what they will do with their babies once the babies are born; family members at a reunion hope to get the clan to start "
	"thinking about what they will do with their grandfather, whose eccentric habits are driving them all crazy."
};

resource 'CNTX' (rApprPLGoal + rSvConceiving, PFM_MIN_PRIO) {	/* Conceiving */
	"The process of coming up with an idea that the objective characters are trying to avoid by attaining the goal. For example, An impotent man having to try and figure out what besides intercourse will sexually excite a woman if he can't get it up; having to figure out how to salvage the "
	"economy of a country if the cash crop fails; children who must find a way to try and please a humorless father if their mother doesn't come out of the coma;  a dedicated teacher forced trying to conceive of how to reach a child who has a severe learning disability if electroshock therapy doesn't work."
};

resource 'CNTX' (rApprMCGoal + rSvConceiving, PFM_MIN_PRIO) {	/* Conceiving */
	"The process of coming up with ideas that has positive effects during the effort toward achieving the goal.  For example, a man envisions potential new romances if he moves to Los Angeles; a woman tries to determine romantic possibilities as she struggles to lose 180 pounds; "
	"a meek woman tries to work out what her life might be like if she divorced her abusive children; a writer envisions the potential effects of wealth if he signs a contract with a major studio."
};

resource 'CNTX' (rApprOCGoal + rSvConceiving, PFM_MIN_PRIO) {	/* Conceiving */
	"Ideas that characters are forced to try an come up with which has negative effects during the effort toward achieving the goal.  For example, a women must determine the reasons behind overeating as she diets; a writer must imagine the implications of life as a studio hack as "
	"he struggles to complete the screenplay that will put him under contract with a major studio; a man is forced to seek out the reason he fears loneliness if he divorces; a metalhead musician must face the reasons she writes about death when she tries writing love songs."
};

resource 'CNTX' (rApprSTReq + rSvConceiving, PFM_MIN_PRIO) {	/* Conceiving */
	"The process of coming up with an idea needed to pave the way, open the door or meet the needs essential to achieving the goal.  For example, the bankrupt woman must think of potential ways to become worthy of credit; a fat man works to invent new methods of losing weight ; "
	"the guitar player determines several paths to fame; a young virgin considers how she might lose her virginity."
};

resource 'CNTX' (rApprPLReq + rSvConceiving, PFM_MIN_PRIO) {	/* Conceiving */
	"Specific ideas that must be developed in order to fulfill or meet the requirements.  For example, a violinist must think of ways to impress a famous teacher if he is to get the education he needs to qualify for the symphony orchestra; a young man must conceive of unique "
	"ways to propose so he is to win the hand of a jaded heiress if he is to move into high society; a politician must work out potential explanations for spurious contributions from pharmaceutical companies if he is to declare war on drugs so that he can get re-elected; a mother "
	"must think of ways to show that she misses her baby if she wants to convince a judge of her suitability in order to get custody of her movie star son."
};

resource 'CNTX' (rApprMCReq + rSvConceiving, PFM_MIN_PRIO) {	/* Conceiving */
	"A process of coming up with an idea  indicates the imminent approach of the consequence.  For example, a guitar player's efforts to determine a way to overcome his anonymity begin to increase; a young man working to conceive of the drives behind his recurring dreams of wind "
	"surfing a hot dog through the rings of Saturn; a crooked politician finds himself trying to conceive of ways to clean up congress; a daughter angry over her aging father's incompetence at work begins to conceive of ways to get him fired."
};

resource 'CNTX' (rApprOCReq + rSvConceiving, PFM_MIN_PRIO) {	/* Conceiving */
```

```
        "The process of coming up with an idea that must be engaged in due to someone's insistence in order to advance
toward the goal.  For example, a bankrupt woman must figure out how to escape her own poverty or a banker will not give
her a loan; an obese man must try and come up "
        "with a way to lose 300 pounds or his girlfriend will not become engaged to him; a piano player must try and
determine a path out of anonymity if he is to gain the support of a talented songwriter; a young virgin must consider how
she might lead a sexless life if she is to "
        "satisfy the Mother Superior that she is cut out to be a nun."
};

resource 'CNTX' (rApprSTStp + rSvConceiving, PFM_MIN_PRIO) {   /* Conceiving */
        "Ideas arrived at on the way to the goal that indicate progress in the Objective Story.  For example, a group of
young executives who constantly think of more old business habits that need to change at the major toy company they work
for; orphans on the lam who manage to elude the police "
        "thanks to their cleverness; aging bank robbers who dream up one magnificent heist after another;  a rags to
riches clothing designer who is always one step ahead of the other designers."
};

resource 'CNTX' (rApprPLStp + rSvConceiving, PFM_MIN_PRIO) {   /* Conceiving */
        "Ideas arrived at on the way to the goal that indicate growth in the relationship between the Main and Obstacle
characters in the Subjective Story.  For example, a couple who try to come up with ways to make their marriage work even
after she has been caught cheating; rival inventors who "
        "somehow keep hitting on  the exact same inventions; a distant mother who frantically searches for a way to
change her relationship with her son; an abused wife who looks for ways to turn the tables on her husband."
};

resource 'CNTX' (rApprMCStp + rSvConceiving, PFM_MIN_PRIO) {   /* Conceiving */
        "Ideas arrived at on the way to the goal that indicate the degree of the Main Character's central concern.  For
example, a rookie police officer who tries to come up with a plan that will make her a sergeant within five years; a
prostitute who sees a fancy car drive by and realizes she "
        "should think of a way to hook the driver; a washed-up rock singer who decides she must come up with a new sound
to revitalize her career; a medical student who hates to study but realizes he must think of a way to study that will
keep his grades up."
};

resource 'CNTX' (rApprOCStp + rSvConceiving, PFM_MIN_PRIO) {   /* Conceiving */
        "Ideas arrived at by the Obstacle Character that indicate the extent of his or her central concern. For example,
a tobacco company CEO who strives to come up with a way to seduce  children - the future smokers of America - in order to
save his failing industry; an army general who comes "
        "up with the idea that his  platoon of 600 men must charge an enemy platoon of 1,500 men; a lawyer who ponders
what to do about the global corporation that dumped toxic waste in the small-town landfill; a tough professor who strives
to come up with an assignment that will test the mettle of her students."
};



resource 'CNTX' (rApprSTCon + rSvMemory, PFM_MIN_PRIO) {       /* Memory */
        "All the objective characters are concerned with recollections.  For example, incest survivors remember
childhood; townspeople remembering special moments attached to the buildings of their town, which is about to be
submerged by a new dam; a football team remembers college years; guests at a dinner party recall doing drugs; "
        "couples at a marriage rejuvenation retreat reminisce about their a wedding days; witnesses to a crime that
occurred 20 years ago struggle to recall what they saw; survivors of a mass suicide strive to forget the horrific scenes
that haunt them; bank robbers try to restore the memory of their amnesiac colleague, who hid the loot; etc."
};

resource 'CNTX' (rApprPLCon + rSvMemory, PFM_MIN_PRIO) {       /* Memory */
        "The Main and Obstacle Characters must deal with recollections.  For example, a divorced couple, stuck in an
elevator, recalling what broke up their relationship; a minister's shared memories with the favored choirboy who became a
murderer and is holding the minister hostage; an old couple, about to be separated by the nursing home, "
        "looking back on why they fell in love; a revolutionary leader's struggle to repress memories of her failed
marriage to the president she ousted, who is striving to rekindle those recollections before she executes him, etc."
};

resource 'CNTX' (rApprMCCon + rSvMemory, PFM_MIN_PRIO) {       /* Memory */
        "What does it feel like as the main character to have a subjective recollection?  For example, a paraplegic army
colonel's memory of wartime; a middle-aged widower remembering the day he proposed; an overweight woman remembering last
night's dinner; a gay man's memory of losing his virginity; an ex-hippie grandmother "
        "remembering the good old days; a new elementary school teacher recalling his first day of kindergarten, etc."
};

resource 'CNTX' (rApprOCCon + rSvMemory, PFM_MIN_PRIO) {       /* Memory */
        "What are the ramifications of the Obstacle Character's process of recollection?  For example, the wife who
won't let her husband touch her because she remembers being abused; the hit man who hates guns because his father was
shot in the back; the general whose wartime memories send him to the "
        "fallout shelter to sleep at night; the senator who won't support a Japanese trade bill because he remembers
Pearl Harbor; the man who bullies others because he remembers being picked on as a child; etc."
};

resource 'CNTX' (rApprSTGoal + rSvMemory, PFM_MIN_PRIO) {       /* Memory */
        "The specific recollections the Objective Characters aspire to experience or suppress.  For example, troubled
adults trying to remember their childhood abuse; old men remembering their rival days fighting over a summer camp
sweetheart; crime victims trying to suppress crucial details about their attacker; "
        "a student struggling to remember answers on a test.  Exploring the process of remembering will illustrate
Memory as an Objective Story concern."
};

resource 'CNTX' (rApprPLGoal + rSvMemory, PFM_MIN_PRIO) {       /* Memory */
        "The consequences objective characters will be forced to recall or lose if the goal is not met.  For example,
the reformed criminal who must suffer painful recollections of his crime unless he gains his victim's forgiveness; a
middle-aged widower is haunted by memories of his dead wife, and "
        "unless he can focus on the new woman in his life they will continue to plague him; an amnesiac will never know
of the friends and family who might be missing her unless experimental new computer therapy to regain her memory is
successful; a woman unable to forget the abuse she suffered at the hands of her parents "
        "will continue to feel like striking her own children unless she can let go of her yearning for vengeance."
};

resource 'CNTX' (rApprMCGoal + rSvMemory, PFM_MIN_PRIO) {       /* Memory */
        "Recollections of a positive nature that characters acquire during the effort or on the path toward achieving
the goal.  For example, at a high school class reunion, former geeks remember the one popular girl who was always kind to
them;  a family on its last car trip together remembers all the songs they used to sing when the kids were little; "
        "a film crew interviewing the director's Italian grandmother for a documentary are delighted when she remembers
the secret ingredients in her mother's famous spaghetti sauce; women trying to understand their sexuality remember, what
were obviously childhood crushes on their best girlfriends."
};

resource 'CNTX' (rApprOCGoal + rSvMemory, PFM_MIN_PRIO) {       /* Memory */
        "Recollections of a negative nature that characters must endure during the effort or on the path toward
achieving the goal.  For example, orphans having to remember unhappy childhoods in order to find their birth parents;
former members of a failed commune working in the same company recall failed relationships as they strive to keep their
jobs; "
        "a group of plane crash survivors who, because of their jobs, must fly again, are forced to relive their ordeals
in group therapy; a once-obese woman who decides to counsel obese people who are trying to lose weight must relive her
own weight trauma."
```

```
);

resource 'CNTX' (rApprSTReq + rSvMemory, PFM_MIN_PRIO) {        /* Memory */
        "The specific recollections needed to pave the way, open the door, or meet needs essential and preliminary to achieving the goal.  For example, a rape victim trying to catch her attacker must remember the exact time of the violent event; a man haunted by his fear of purple must remember the colors from his childhood, such as house and bedroom colors, "
        "clothes his parents wore and the colors at his school; a cop trying to nail a rape suspect grills a bartender to remember how much alcohol the suspect ingested on the night of the attack; an amnesiac trying to remember her past searches for the words to a particular song she keeps humming that might stir her memory."
};

resource 'CNTX' (rApprPLReq + rSvMemory, PFM_MIN_PRIO) {        /* Memory */
        "The specific recollections that must be acquired that are essential to fulfilling or meeting the Requirements. For example,  a suspect remembering the whereabouts of the broken watch that will pinpoint the exact time of the attack so he will be proven innocent; a wealthy young woman dying of a rare disease who must recall the name of the painter who created the mural on her childhood bedroom wall, so she can make sure he gets part of her estate; "
        "a drunk trying to remember the whereabouts of the liquor store night manager who moved out of state, so that the lawyer can prove a suspect bought the same brand of alcohol as was found at the crime scene; an elderly authority on America folk tunes that must recall the name of a song hummed by an dying spy, so that the words might provide clues to their undercover network."
};

resource 'CNTX' (rApprMCReq + rSvMemory, PFM_MIN_PRIO) {        /* Memory */
        "The specific recollections that indicate the imminent approach of the Consequence.  For example, a rape victim has been remembering more details about her attack every day as the trial approaches; an octogenarian realizes he can't remember the names of his own children; an amnesiac who has found that piano stirs her memory suddenly remembers her love of Mozart and makes plans to attend a Mozart concert later that evening; a woman trying "
        "to repress the urge to abuse her children can't drive images of her own childhood abuse from her mind."
};

resource 'CNTX' (rApprOCReq + rSvMemory, PFM_MIN_PRIO) {        /* Memory */
        "The specific recollections that must be acquired in order to clear the way toward fulfillment of the Requirement.  For example, a person who found a broken watch that pinpoints the exact time of an attack demands that the lawyer who needs it recollect a painful memory in exchange for the watch; a magical painter who created a childhood bedroom mural asks that, in exchange for revealing the identity of someone in the mural, a family forget their life together; "
        "a bartender who knows what kind of alcohol a suspected rapist drank on the night of an attack refuses to share his information unless the cops agree to remember that he helped them next time they bust him for having minors in the bar;  a musicologist who can locate a tape which contains the music that drives people to murder, requires that a CIA agent remember all the people she had personally killed herself."
};

resource 'CNTX' (rApprSTStp + rSvMemory, PFM_MIN_PRIO) {        /* Memory */
        "Recollections on the way to the goal that indicate progress in the Objective Story.  For example, siblings who remembers details of their father's identity; scared first-graders who can't forget the simple life they had in kindergarten; townspeople who begin to remember life before the nasty feud that divided them; a group of women who remember their past in order to write a collective autobiography."
};

resource 'CNTX' (rApprPLStp + rSvMemory, PFM_MIN_PRIO) {        /* Memory */
        "Recollections on the way to the goal that indicate growth in the relationship between the Main and Obstacle characters in the Subjective Story.  For example, a man who remembers being beaten as a child and confronts his mother; a dog who remembers the way to his old home, thus infuriating the abusive man who just bought him; a man who remembers his old skills with a bow and arrow just as the villain is about to shoot him; a judge who is about to hand down a stiff "
        "sentence to a first time offender and then remembers how, 45 years ago, another judge let him off easy for a similar crime."
};

resource 'CNTX' (rApprMCStp + rSvMemory, PFM_MIN_PRIO) {        /* Memory */
        "Recollections on the way to the goal that indicate the degree of the Main Character's central concern.  For example, a man with amnesia who progressively remembers details about the cartel that is trying to kill him; a priest who resists temptation by reciting the reasons he entered the priesthood to begin with; a formerly obese man who remembers so clearly how miserable he was at 560 pounds that he won't eat even one cookie at a party; "
        "an incest survivor who's memory blacks out whenever she approaches the witness stand."
};

resource 'CNTX' (rApprOCStp + rSvMemory, PFM_MIN_PRIO) {        /* Memory */
        "Recollections by the Obstacle Character that indicate the extent of his or her central concern. For example, a vengeful man whose memory of what happened to him keeps him intent on retribution; a single woman who accepts no dates because she remembers how her husband cheated on her; a rich, mean old man who's asked to donate money to an arts council and only does so after remembering how the arts helped him as a young man; "
        "a materialistic social climber who hoards all her wealth because she remembers being poor as a child."
};


resource 'CNTX' (rApprSTCon + rSvPreconscious, PFM_MIN_PRIO) {          /* Preconscious */
        "All the objective characters are concerned with unthinking reactions and responses .  For example, the effects of florescent colors in the workplace, the effect of smog on altercations growing from traffic accidents, the suicidal responses of manic/depressives during the full moon, how sex sells products, the effects of music in a dentist's office, an exploration of anything that creates an unthinking physical or emotional response."
};

resource 'CNTX' (rApprPLCon + rSvPreconscious, PFM_MIN_PRIO) {          /* Preconscious */
        "The Main and Obstacle Characters vie to elicit unthinking reactions and responses .  For example, politicians vying for popularity by kissing babies, etc.; a wife wearing sexy lingerie to rekindle her husband's interest in their marriage; making someone wait in imposing environments to cow them; associating your competitor with negative imagery -- guilt by association; putting up scarecrows and other deterrents to keep one particular animal out of your garden; etc."
};

resource 'CNTX' (rApprMCCon + rSvPreconscious, PFM_MIN_PRIO) {          /* Preconscious */
        "What does it feel like as the Main Character to be driven by unthinking reactions and responses ?  For example, noises that keep one awake at night like dripping faucets; working in confined spaces, trying to compose with children playing outside; negotiating a labor contract in hot humid weather; living next to a stockyard or open septic tank; wine tasting for a magazine article; "
        "living next door to the already-married mate of your dreams; living with beautiful, naked women (or men) constantly around you; etc."
};

resource 'CNTX' (rApprOCCon + rSvPreconscious, PFM_MIN_PRIO) {          /* Preconscious */
        "What are the ramifications of the Obstacle Character's unthinking reactions and responses ?  For example, the effects of a waitress that breaks out with a rash every time she smells ginger ale; the trouble caused by a dog that bites people wearing red; the problems caused by post-hypnotic suggestions made to a smoker to throw up at the sight of a cigarette; the confusion created by a teacher "
        "that unintentionally gives better grades to students with blue eyes; the impact of a blacksmith that faints whenever he gets a pat on the back; the fallout from an employer's maternalistic attitude toward her employees; etc."
};

resource 'CNTX' (rApprSTGoal + rSvPreconscious, PFM_MIN_PRIO) {         /* Preconscious */
        "The specific unthinking reactions and responses to which the objective characters wish to be conditioned.  For example, eating liver without gagging, being aroused by women's fingers in a society that has forbidden public exposure
```

```
of the rest of female figure; track competitors becoming conditioned to spring from the starting block at the sound of a
gun; conditioning an army platoon to duck in "
        "response to a particular sound or movement; overcoming bedwetting; being \"color\" blind so that race is not
even an issue; etc."
);

resource 'CNTX' (rApprPLGoal + rSvPreconscious, PFM_MIN_PRIO) {          /* Preconscious */
        "The specific unthinking reactions and responses to which the objective characters will be (or will continue to
be) conditioned if the Goal is not achieved.  For example, developing an indifference to overcrowding, maintaining an
accent; responding to electronic arcade games as if they are the old, analog games; "
        "using politically incorrect language; anything that illustrates the characters' inabilities to adapt to their
changing environment; etc."
);

resource 'CNTX' (rApprMCGoal + rSvPreconscious, PFM_MIN_PRIO) {          /* Preconscious */
        "Unthinking reactions and responses of a negative nature the objective characters acquire during the effort or
on the path toward achieving the goal.  For example, bad habits like chewing pencils developed while working with your
hands full, any physical conditioning to environmental stimuli like someones inability to urinate in public facilities; a
nervous tick at the mention of someones name; "
        "putting ketchup on all meat (which was originally done to hide the flavor of bad cooking); failing to hear a
child's cry as the result of years of working in a pediatric unit; etc."
);

resource 'CNTX' (rApprOCGoal + rSvPreconscious, PFM_MIN_PRIO) {          /* Preconscious */
        "Unthinking reactions and responses of a positive nature the objective characters acquire during the effort or
on the path toward achieving the goal.  For example, good habits like fastening on your seat belt developed while
starring in a film as a crash dummy; touch typing or sight reading music developed while assisting a parent coping with
blindness; a tolerance to noisy children developed while "
        "working in the monkey cage at the zoo; remaining calm in times of crisis developed while watching games shows
on television; catlike reflexes developed while catching coins thrown by tourists; etc."
);

resource 'CNTX' (rApprSTReq + rSvPreconscious, PFM_MIN_PRIO) {          /* Preconscious */
        "Unthinking reactions and responses needed to pave the way, open the door, or meet needs essential and
preliminary to achieving the goal.  For example, conditioning potential doctors not to faint at the sight of blood in
order to become surgeons; conditioning oneself to ignore distractions in order to be a palace guard; being conditioned to
ignore pain in order to become a top secret messenger; "
        "conditioning a women's group to associate chocolate with dog vomit in order to lose weight; conditioning a
community to shoot first and ask questions later to protect against roving gangs of bandits; etc."
);

resource 'CNTX' (rApprPLReq + rSvPreconscious, PFM_MIN_PRIO) {          /* Preconscious */
        "Unthinking reactions and responses needed to be developed in order to fulfill or meet the Requirements.  For
example, a woman overcoming the gag reflex in order to perform oral sex for the money needed to pay her mother's rent; a
rookie developing a conditioned response to the eye movements of members of the opposing team that allows him to sack the
quarterback and win a "
        "permanent position on the team; potty-training a child in order for it to be admitted into preschool so that
the mother can return to her job; etc."
);

resource 'CNTX' (rApprMCReq + rSvPreconscious, PFM_MIN_PRIO) {          /* Preconscious */
        "Unthinking reactions and responses that must be met in order to clear the way toward fulfillment of the
Requirement.  For example, being able to walk across hot coals without flinching in order to be allowed in the
competition for a princess' hand in marriage that is necessary for preventing war between two countries; in order to
leave home with his religious mother's "
        "blessing so that he can deal drugs in the big city on his way to becoming a millionaire, a young man develops
stigmata so he will appear to be a saint; etc."
);

resource 'CNTX' (rApprOCReq + rSvPreconscious, PFM_MIN_PRIO) {          /* Preconscious */
        "Unthinking reactions and responses that indicate the imminent approach of the Consequence.  For example, a
musician that is increasingly startled by loud noises which threatens his acceptance into a band; a fighter that
increasingly jumps up and swings at the nearest person whenever she hears a bell that is trying to change her career from
wrestler to bellhop; "
        "a community's ever decreasing reactions (habitation) to the pre-shocks of a major earthquake; a couch potato's
growing loss of awareness of environmental stimuli that forewarns of complete catatonia; etc."
);

resource 'CNTX' (rApprSTStp + rSvPreconscious, PFM_MIN_PRIO) {          /* Preconscious */
        "The unthinking reactions and responses to which the objective characters are conditioned on the way to the goal
that indicate progress in the Objective Story.  For example, the effects of heat, thirst, hunger, pain, etc. on the way
to finding a treasure buried in the desert; the degree of dizziness suffered while training to be a highwire artist; the
cast of a long "
        "running stage play that is completely thrown by new blocking and has to adjust to it before a presidential
performance; a class of charm school students as they are trained in graceful moves and mannerisms; etc."
);

resource 'CNTX' (rApprPLStp + rSvPreconscious, PFM_MIN_PRIO) {          /* Preconscious */
        "The unthinking reactions and responses conditioned that indicate growth in the relationship between the Main
and Obstacle Characters in the Subjective Story.  For example, a newlywed couple as they become conditioned to (or
increasingly sensitive to) each other's bad habits; ceasing to be aware of foul language between a nun and a junkie; a
research scientist and a \"wolf\" boy acclimating to each others hygiene; etc."
);

resource 'CNTX' (rApprMCStp + rSvPreconscious, PFM_MIN_PRIO) {          /* Preconscious */
        "The unthinking reactions and responses to which the Main Character is conditioned that indicate the degree of
the Main Character's central concern.  For example, a novice serial killer's overcoming nausea at the sight of blood; a
female locker room reporter conditioning herself not to blush; a country bumpkin becoming more sensitized to sounds that
indicate danger in the big city; "
        "a spry octogenarian working to overcome the habit of \"chewing her cud\" in order to win the position as an on-
camera commentator for retired persons issues; etc."
);

resource 'CNTX' (rApprOCStp + rSvPreconscious, PFM_MIN_PRIO) {          /* Preconscious */
        "The unthinking reactions and responses associated with the Obstacle Character that indicates the extent of
their central concern.  For example, an child actress' stutter; a secretary that wets her pants every time her boss yells
at her; a plastic surgeon that develops a nervous twitch during surgery; a politician that starts breaking wind whenever
he is confronted by the press with his past indiscretions; etc."
);


resource 'CNTX' (rApprSTCon + rSvSubconscious, PFM_MIN_PRIO) {          /* Subconscious */
        "All the objective characters are concerned with basic drives and desires.  For example, physically impaired
teenagers grapple with the desire for love; victims of clandestine radiological experiments try to come to terms with
their anger; a support group for corporate executives focuses on dealing with loneliness at the top; battered wives
examine their inability to leave their husbands. "
);

resource 'CNTX' (rApprPLCon + rSvSubconscious, PFM_MIN_PRIO) {          /* Subconscious */
        "The Main and Obstacle Characters diverge over  basic drives and desires.  For example, a corporate president
and a star salesman come into conflict over the issue of company loyalty; every time a man wants to sit down and talk to
```

```
his wife about her outrageous spending habits she seduces him; a man eager to date a reluctant young woman keeps pointing
out how lonely she seems; "
        "two ambitious men opposing each other for local office accuse each other of lacking true desire to act for the
public good.  Engaging in the process of conflicting over basic drives and desires will illustrate Subconscious  a
Subjective Story concern."
};

resource 'CNTX' (rApprMCCon + rSvSubconscious, PFM_MIN_PRIO) {          /* Subconscious */
        "What does it feel like as the main character to have a basic drive or desire?  For example, a married woman who
begins to desire an intimate relationship with another woman; a lost dog who is driven to find his way home to be with
his young owner; an accountant who is haunted by yearnings to chuck it all and escape to Tahiti; a woman who is driven to
win a state election for senator."
};

resource 'CNTX' (rApprOCCon + rSvSubconscious, PFM_MIN_PRIO) {          /* Subconscious */
        "What are the ramifications of the Obstacle Character's need to fulfill basic drives and desires?  For example,
the impact on a congregation when its favorite minister lusts after one of the married parishioners;  the impact on a
group of schoolchildren when a disturbed child feels unpopular; the impact on a country when the leader of a neighboring
country calls their supreme commander "
        "a coward; the impact on a family when, because of her impulse to eat,  their mother's weight zooms from 210
pounds to 430."
};

resource 'CNTX' (rApprSTGoal + rSvSubconscious, PFM_MIN_PRIO) {         /* Subconscious */
        "Basic drives and desires the Objective Characters aspire to possess or control.  For example, a support group
of anorexics hope to once again crave food;  a troubled, hyperactive child who wills himself to think about pleasing
others so he can get along with his classmates at school;  a long-reformed ring of criminals are tapped for a new heist
and must rekindle the desire to steal; "
        "rape victims on a weekend retreat talk about how they can awaken their damaged sex drives."
};

resource 'CNTX' (rApprPLGoal + rSvSubconscious, PFM_MIN_PRIO) {         /* Subconscious */
        "Negative basic drives and desires that one or more of the objective characters will be forced to possess or
control (or be controlled by) if the Goal is not achieved.  For example, a man who was tortured by his mother as a child
will develop homicidal impulses unless he can blot his childhood memories from his mind; a financially unsuccessful
writer who was taught to value wealth "
        "above all else may develop the desire to steal if she can't overcome her need for money; a man who learns to
equate sex with power will begin to see women as nothing but conquests if he can't feel powerful elsewhere; a suddenly
divorced woman who's always eaten to combat loneliness may develop the desire to eat all day long now that she's on her
own."
};

resource 'CNTX' (rApprMCGoal + rSvSubconscious, PFM_MIN_PRIO) {         /* Subconscious */
        "Positive basic drives and desires that one or more of the objective characters will encounter during the effort
or on the path toward the goal.  For example, a con man, determined to go straight, educates himself in prison and
realizes he is drawn to classical music;  a woman trying to get her gynecological degree realizes she craves a baby
herself; a man racing to finish a "
        "company project with a female co-worker thinks of nothing but sleeping with her; a child who plays chess only
to be near her chess-loving father realizes she has an inherent desire to win."
};

resource 'CNTX' (rApprOCGoal + rSvSubconscious, PFM_MIN_PRIO) {         /* Subconscious */
        "Negative basic drives and desires that one or more of the objective characters will encounter during the effort
or on the path toward the goal.  For example, exhausted cops who've just caught a particularly horrible serial killer
fight the urge to beat him to a pulp; a woman who wants desperately to be married sleeps with every man she meets; a
female detective who battled "
        "obesity in her childhood must go undercover as a worker at a fast-food restaurant; a man who wants lifelong
companionship resorts to kidnapping the woman of his dreams."
};

resource 'CNTX' (rApprSTReq + rSvSubconscious, PFM_MIN_PRIO) {          /* Subconscious */
        "The specific drives and desires a character must deal with in order to pave the way, open the door or meet
needs essential and preliminary to achieving the goal.  For example, students hoping to learn under a renowned medical
professor  must first demonstrate that their desire to heal is more powerful than their desire to make a lot of money; a
model hoping to make the cover of "
        "a Sports magazine's swimsuit issue must first thwart her desire for rich deserts; a reformed lothario who wants
to enter the priesthood must first fight the desire for intimate male companionship; a high school senior who will lose
his college football scholarship unless he passes a drug test must overcome his deeply rooted urge to get drunk every
night.  "
};

resource 'CNTX' (rApprPLReq + rSvSubconscious, PFM_MIN_PRIO) {          /* Subconscious */
        "The specific drives and desires a character encounters in order to fulfill or meet the Requirements.  For
example, a writer who needs experience with prostitutes in order to sell a screenplay about prostitution must prove to a
pimp that she actually desires to sell her body; a teenager who wants to attract the romantic attentions of the head
basketball cheerleader "
        "in order to become popular himself must develop a desire for basketball; a compulsive flasher who fears getting
caught must lose the desire to expose himself in order to work in convent so he can become a priest; medical students
must show a desire to heal in order to be accepted into an intern program so they can become doctors."
};

resource 'CNTX' (rApprMCReq + rSvSubconscious, PFM_MIN_PRIO) {          /* Subconscious */
        "The specific drives and desires that indicate the imminent approach of the Consequence.  For example, a
homicidal man who was tortured by his mother as a child develops a desire to purchase duct tape, rope, hunting knives and
pornographic magazines; a writer develops a sudden interest in the financial workings and bookkeeping methods of the
company she works for "
        "when it appears her screenplay won't sell; a child genius who is about to begin attending a special advanced
school but will have to leave his friends behind loses his interest in math; a woman who fears her husband is seeing
another man develops a desire for ice cream, French fries and cookies."
};

resource 'CNTX' (rApprOCReq + rSvSubconscious, PFM_MIN_PRIO) {          /* Subconscious */
        "Specific drives and desires that must be met in order to clear the way toward fulfilling the requirements.  For
example, a vegetarian reporter who wants to write an expose of fast food abuses must develop a taste for burger before
the restaurant manager will grant an interview; a shy bookworm who asks a pretty customer to sleep with him so he'll feel
more virile finds "
        "she will agree if he can kindle in her an interest in the classics; an English Literature teacher at a
Connecticut prep school must manipulate the pompous dean of studies to desire leading a march on Washington, so he can
take the students on a trip to the capitol."
};

resource 'CNTX' (rApprSTStp + rSvSubconscious, PFM_MIN_PRIO) {          /* Subconscious ??? */
        ""
};

resource 'CNTX' (rApprPLStp + rSvSubconscious, PFM_MIN_PRIO) {          /* Subconscious */
        "Basic drives and desires experienced on the way to the goal that indicate growth in the relationship between
the Main and Obstacle characters in the Subjective Story.  For example, the love that grows between a young Protestant
man and his Catholic  girlfriend in Northern Ireland; a compulsive flasher and his voyeuristic wife losing interest in
ordering "
        "from the \"Trench coat of the Month Club\"; an overeater begins to prefer Brussels sprouts to the rich deserts
created by her boyfriend, the chef;  a hypochondriac and her passive-aggressive therapist become fascinated with a CD ROM
listing thousands of previously uncatalogued diseases."
```

```
);

resource 'CNTX' (rApprMCStp + rSvSubconscious, PFM_MIN_PRIO) {          /* Subconscious */
	"Basic drives and desires experienced on the way to the goal that indicate the degree of the Main Character's central concern.  For example, a man who loves his wife but can't help sleeping with more and more other women; a pot smoker who gets high more and more of the time; a child who feels abandoned when his parents leave the house without him, first on long trips, "
	"then progressively shorter times away; a man afraid of being robbed who puts seven locks on his front door, adds an electric fence, installs surveillance cameras and eventually breeds and trains his own guard dogs."
};

resource 'CNTX' (rApprOCStp + rSvSubconscious, PFM_MIN_PRIO) {          /* Subconscious */
	"Basic drives and desires experienced by the Obstacle Character that indicate the extent of his or her central concern. For example, a power-hungry politician who sets the groundwork necessary to impeach the president; a compulsive gambler who begins to borrow money from friends; a social-climbing bride-to-be who invites socialites to her wedding instead of friends; "
	"a nymphomaniac who places condoms in every place she ever goes, from under bus seats to the emergency phone box in elevators."
};

resource 'CNTX' (rApprSTCon + rSvConscious, PFM_MIN_PRIO) {     /* Conscious */
	"All the Objective Characters are concerned with present considerations.  For example, getting the public to think about the effects of nuclear power;  getting fans and voters to stop thinking about a famous actress's "
	"nude scenes when she announces her campaign for president;  coaches of a football team try to keep the players from contemplating the national championship even before the season officially begins;  deacons in "
	"religious cult hope to make their members not consider their miserable living conditions in a jungle compound."
};

resource 'CNTX' (rApprPLCon + rSvConscious, PFM_MIN_PRIO) {     /* Conscious */
	"The Main and Obstacle Characters grapple over current considerations.  For example, a couple arguing over whether they should contemplate having unprotected sex;  a cop and his partner debating whether they should "
	"entertain the thought of busting coke dealers without calling for backup; a student hopes to get his male professor, whom he wants to sleep with, to consider the possibility that the professor might be a homosexual; "
	"an employer argues with an out-of-work ex-con over whether employers should even consider hiring felony criminals; an attorney and a judge are at odds over whether a jury should be allowed to consider specific evidence."
};

resource 'CNTX' (rApprMCCon + rSvConscious, PFM_MIN_PRIO) {     /* Conscious */
	"What does it feel like as the Main Character to toy  with considering something?  For example, a successful Native American comedienne deciding whether she should consider a change in careers; an imprisoned "
	"criminal wondering whether he should start planning an escape; a singer struggling over whether he should consider replacing his childhood friend in the band with a new guitarist; an actor trying not to consider "
	"taking a meaty supporting film role with the potential for an Oscar that would be her first non-starring appearance in years, etc."
};

resource 'CNTX' (rApprOCCon + rSvConscious, PFM_MIN_PRIO) {     /* Conscious */
	"What are the ramifications of the Obstacle Character's efforts to wrestle with considering something?  For example, the director who  won't consider an aging but proven actor for the role;  the criminal who dismisses "
	"the cop trailing him because the cop is in a wheelchair;  the children who won't speak to their father now that he's running for political office; the guitarist who won't consider dropping her tone-deaf sister from the band."
};

resource 'CNTX' (rApprSTGoal + rSvConscious, PFM_MIN_PRIO) {     /* Conscious */
	"The specific considerations the Objective Characters aspire to be pondered or remain unpondered.  For example, the policeman tries not to consider becoming a  detective so he will still be in a position to try and hunt down "
	"the rapist who killed his wife; during a robbery, a bank manager prays for the crooks to consider his family; a talented violinist tries not to ponder the dates she's asked on so that she can practice and then be accepted to "
	"the music school she's applied; an adopted woman considers searching for her birth mother so she can discover her true identity."
};

resource 'CNTX' (rApprPLGoal + rSvConscious, PFM_MIN_PRIO) {     /* Conscious */
	"Negative considerations that one or more of the objective characters will be forced to ponder if the Goal is not achieved.  For example, a carjacking victim must consider moving to another state if his attackers are not captured; "
	"an abused woman will continue to consider abusing her own children if she doesn't obtain proper counseling; a football team will never be able to consider a playoff berth if they don't learn their playbook forwards and backwards."
};

resource 'CNTX' (rApprMCGoal + rSvConscious, PFM_MIN_PRIO) {     /* Conscious */
	"Positive considerations that one or more of the objective characters will enjoy during the effort or on the path toward the goal.  For example, because a man tries to understand why he beats his wife, he considers his ideas of a "
	"perfect marriage; a physical therapist struggling to rehabilitate a famous athlete considers his offer of marriage;  a losing football team supporting the recovery of their alcoholic coach no longer must consider their team record; "
	"a woman forced to confront her friend's bisexuality considers new possibilities for her own life."
};

resource 'CNTX' (rApprOCGoal + rSvConscious, PFM_MIN_PRIO) {     /* Conscious */
	"Negative considerations that one or more of the objective characters will be forced to ponder during the effort or on the path toward the goal.  For example, a man must continually mull over why he beats his wife as he tries to "
	"save his marriage; a psychologist must constantly ponder his own fear of heights to help his slowly recovering acrophobia patients; a losing football team ; a sexually confused woman trying to come to "
	"define herself is forced to consider her own sexuality on a daily basis."
};

resource 'CNTX' (rApprSTReq + rSvConscious, PFM_MIN_PRIO) {     /* Conscious */
	"The specific considerations a character must struggle with in order to pave the way, open the door or meet needs essential and preliminary to achieving the goal.  For example, an incest survivor must consider facing her "
	"own childhood abuse when struggling over whether to accept a marriage proposal; a formerly number one football team on a losing streak must consider the pros and cons that might come with starting over from scratch; "
	"a construction worker in heavy debt must consider putting in a bid on a big job with a shady contractor; a health care student who wants to help terminal patients personally must consider whether not accepting a summer "
	"internship at an AIDS research facility."
};

resource 'CNTX' (rApprPLReq + rSvConscious, PFM_MIN_PRIO) {     /* Conscious */
	"The specific considerations a character must struggle with in order to fulfill or meet the requirements.  For example, a kleptomaniac who favors diamonds must consider switching to rubies when the major diamond importer assigns a detective to her case; "
	"a tennis player on a losing streak must consider risking her reputation by adopting a new style; a flat broke construction worker must consider the costs of various types of lumber versus safe building codes before he decides what bid to put in on a building job; "
	"a health care student interested in helping the terminally ill must consider taking a job at a hospice or entering medical school."
};

resource 'CNTX' (rApprMCReq + rSvConscious, PFM_MIN_PRIO) {     /* Conscious */
```

```
        "The specific considerations that indicate the imminent approach of the Consequence.  For example, an actor
struggling with whether to stay in Los Angeles considers buying books about the best places to live in the United States;
"
        "when an accused killer is set free his recent victim considers buying a gun; an abused woman who's had no
counseling considers abusing her young son; a college freshman considers sleeping with a man she knows has slept with
both women and men."
};

resource 'CNTX' (rApprOCReq + rSvConscious, PFM_MIN_PRIO) {     /* Conscious */
        "The specific considerations a character must grapple with in order to clear the way toward fulfilling the
requirements.  For example, an incest survivor's fiancé says she has to discuss her childhood abuse with him if he wants
her to accept his proposal of marriage; "
        "the salty football coach tells a losing team they must consider why they want to pay football if they hope to
have him take over the team; a flat broke construction worker must consider giving kickbacks to a shady contractor if he
is to be the successful bidder for a job."
};

resource 'CNTX' (rApprSTStp + rSvConscious, PFM_MIN_PRIO) {     /* Conscious */
        "Musings and considerations that, on the way to the goal, indicate progress in the Objective Story.  For
example, race car drivers who know the dangers that come with racing at more than 160 mph consider pushing the track
limit to 180; "
        "a company that dumps toxic waste into the river considers the environmental consequences; a country that knows
a presidential candidate has lied, cheated and stolen considers voting him into office anyway."
};

resource 'CNTX' (rApprPLStp + rSvConscious, PFM_MIN_PRIO) {     /* Conscious */
        "Musings and considerations that, on the way to the goal, indicate growth in the relationship between the Main
and Obstacle characters in the Subjective Story.  For example, a wife who tries to convince her policeman husband not to
consider rushing "
        "into every dangerous situation in New York City; a camp counselor who tries to impress upon a homesick camper
not to consider running away from camp; an army general who is urged by a sergeant to consider pulling his exhausted
troops off the front lines."
};

resource 'CNTX' (rApprMCStp + rSvConscious, PFM_MIN_PRIO) {     /* Conscious */
        "Musings and considerations that, on the way to the goal, indicate the degree of the Main Character's central
concern.  For example, a long-confirmed bachelor who, after watching wistfully as one friend after another gets married,
begins to consider it himself; "
        "an addicted gambler who goes from office football pools to race track bets to shady deals with illegal bookies
tries not to consider any new ways of losing his money; a workaholic mom who, after realizing her kid is acting up at
school, considers spending more "
        "time with him; a convenience store owner who watches as every convenience store within a 10-mile radius is
robbed at gun point considers closing her business."
};

resource 'CNTX' (rApprOCStp + rSvConscious, PFM_MIN_PRIO) {     /* Conscious */
        "Musings and considerations known by the Obstacle Character that indicate the extent of his or her central
concern. For example, an embezzler who watches his Swiss bank account get fatter and fatter considers making his next
crime his last; a cheating wife who "
        "knows her husband is suspicious but continues to arrange liaisons with her lover considers the ramifications; a
high school teacher who knows her students are cheating and sets up a fake test considers the impact on their trust in
her; "
        "a mother who understands her son is gay and organizes a local chapter of Americans Against Homosexuals wonders
if she is over reacting."
};




/*****************************************************************************************************************
*/
/*                                          VARIATIONS
                                                            */
/*****************************************************************************************************************
*/


resource 'CNTX' (rApprSTRng + rSvFate, PFM_MIN_PRIO) {          /* Fate - OS Range */
        "The thematic focus of the Objective Story explores the nature of fate.  For example, fortune tellers and
psychics try and predict fate; apathy due to a feeling of doom from ill fate; self-destruction due to a confusion of fate
and destiny; a hubris which prevents one from recognizing fate; "
        "the fates are personified and loose omnipotence; winning the lottery; total frustration leads to surrender
which in turn may lead to a twist of fate; two people meeting when they both did everything possible to avoid meeting;
developing a chronic condition; efforts to destroy a business only make it prosper; "
        "loosing a spouse or parent in an accident or to and illness; being in the right place at the right time and
having a camera to record a newsworthy event; or two people who are looking for another cross paths unknowingly."
};

    /* . . . . . . . . . . . . . . . . . . . . . . . */


resource 'CNTX' (rApprSTRng + rSvPrediction, PFM_MIN_PRIO) {    /* Prediction - OS Range */
        "The thematic focus of the objective story explores the nature of prediction. For example: believing that one is
destined to win the lottery next Tuesday; a young girl sensing that she will probably have to endure several years of ups
and downs with boyfriends before she finds the right match; "
        "a pregnant woman is sure that the child she is carrying is a girl based on the fact that her great grandmother,
grand mother , and mother all had girls as a first child; an employee predicting a transfer in location due to changes
within their company."
};

    /* . . . . . . . . . . . . . . . . . . . . . . . */


resource 'CNTX' (rApprSTRng + rSvInterdiction, PFM_MIN_PRIO) {          /* Interdiction - OS Range */
        "The thematic focus of the Objective Story explores interdiction.  For example, a social worker who hopes to
keep repeated offenders  from charging headlong toward the electric chair; children of scientists who abandons graduate
school to  become punk musicians; the daughter of a poor family "
        "spurns her true love for the chance to date rich men; balding men invest thousands of dollars for hair
transplants; a gay teenager tries to date women."
};
```

```
/* * * * * * * * * * * * * * * * * * * * * * * */

resource 'CNTX' (rApprSTRng + rSvDestiny, PFM_MIN_PRIO) {        /* Destiny - OS Range */
	"The thematic focus of the Objective Story explores destiny. For example, the math-hating child of math professors winds up accountant; a woman spurns her poverty-stricken true love but winds up marrying him anyway; a hair transplant patient goes bald; a repressed homosexual winds up sharing his life with his male best friend."
};

/* * * * * * * * * * * * * * * * * * * * * * * */

resource 'CNTX' (rApprSTRng + rSvFact, PFM_MIN_PRIO) {        /* Fact - OS Range */
	"The thematic focus of the Objective Story explores the nature of fact.  For example, the assassination of John F. Kennedy; the Holocaust; a lawyer's certainty in her client's innocence; a scientist trying to prove a theory he knows to be true; investigating the existence of the supernatural."
};

/* * * * * * * * * * * * * * * * * * * * * * * */

resource 'CNTX' (rApprSTRng + rSvSecurity, PFM_MIN_PRIO) {        /* Security - OS Range */
	"The thematic focus of the objective story explores the nature of security. For example, financial planning for retirement; gathering together necessities for earthquake survival; purchasing insurance; buying unexpected presents for a mate; installing a flawless home security system. "
};

/* * * * * * * * * * * * * * * * * * * * * * * */

resource 'CNTX' (rApprSTRng + rSvThreat, PFM_MIN_PRIO) {        /* Threat - OS Range */
	"The thematic focus of the Objective Story explores the nature of Threat.  For example, the nuclear stockpile; DNA experiments; the AIDS epidemic; foreign import quotas;  the risk of heart disease; children who abuse their parents, etc."
};

/* * * * * * * * * * * * * * * * * * * * * * * */

resource 'CNTX' (rApprSTRng + rSvFantasy, PFM_MIN_PRIO) {        /* Fantasy - OS Range */
	"The thematic focus of the Objective Story explores the nature of fantasy.  For example, an imaginary friend, monsters underneath the bed; the fountain of youth; aliens being responsible for missing persons; the old house on the hill is haunted; the old woman next door is a witch; delusions of grandeur."
};

/* * * * * * * * * * * * * * * * * * * * * * * */

resource 'CNTX' (rApprSTRng + rSvOpenness, PFM_MIN_PRIO) {        /* Openness - OS Range */
	"The thematic focus of the Objective Story explores openness. For example, politically polarized factions who are willing to come to the table; a religious organizations response to the use of condoms to stop the spread of AIDS; "
	"a corporate CEO who asks for suggestions from the mail room; friends coming to terms with a classmate's announced transsexuality."
};

/* * * * * * * * * * * * * * * * * * * * * * * */

resource 'CNTX' (rApprSTRng + rSvDelay, PFM_MIN_PRIO) {        /* Delay - OS Range */
	"The thematic focus of the Objective Story explores the nature of Delay.  For example, a relaxed schedule for meeting environmental guidelines; 18 missing minutes of audio tape; hoping symptoms will go away without a doctor's visit; sabotaging a rival company's start up program, staying in a bad marriage \"because of the kids\", etc."
};

/* * * * * * * * * * * * * * * * * * * * * * * */

resource 'CNTX' (rApprSTRng + rSvChoice, PFM_MIN_PRIO) {        /* Choice - OS Range */
	"The thematic focus of the Objective Story explores choice. For example, signing the first contract instead of waiting for more offers that might come in; moving in with someone after dating for only two weeks; buying a puppy from a pet store just "
	"because he looked so cute in the window; going to a job interview in a remote Alaskan city and accepting the job on the spot."
};

/* * * * * * * * * * * * * * * * * * * * * * * */

resource 'CNTX' (rApprSTRng + rSvPreconception, PFM_MIN_PRIO) {        /* Preconception - OS Range */
	"The thematic focus of the Objective Story explores preconceptions. For example, a writer who's always used a pen and paper hates computers, though they have never tried one; a child from boarding school who will not even contemplate a public school; a homophobic woman who won't agree "
	"to even meet her son's lover; a boss who won't listen to his worker's ideas about how to change the office because they aren't management."
};

/* * * * * * * * * * * * * * * * * * * * * * * */
```

```
resource 'CNTX' (rApprSTRng + rSvWork, PFM_MIN_PRIO) (          /* Work - OS Range */
        "The thematic focus of the Objective Story explores the nature of Work.  For example, pioneers building farms in
the wilderness; painting the Sistine Chapel ceiling; years of effort leading to a position on the Olympic team; coping
with differences "
        "to forge a strong relationship; melding individual inspirations into a cohesive theory, etc."
);

    /* * * * * * * * * * * * * * * * * * * * * * */

resource 'CNTX' (rApprSTRng + rSvAttraction, PFM_MIN_PRIO) (    /* Attraction - OS Range */
        "The thematic focus of the Objective Story explores the nature of attraction.  For example, the love of food;
lusting after a woman for her physical appearance; the allure of a government office; an obsession for alcohol;
aspiration for an Oscar; the temptation of an extramarital affair."
);

    /* * * * * * * * * * * * * * * * * * * * * * */

resource 'CNTX' (rApprSTRng + rSvRepulsion, PFM_MIN_PRIO) (     /* Repulsion - OS Range */
        "The thematic focus of the Objective Story explores the nature of Repulsion.  For example, a man who finds out
his wife used to be a man; trying to adapt to the foods of another culture; being locked in a cell with thousands of
bugs; living next to the stock yards, etc."
);

    /* * * * * * * * * * * * * * * * * * * * * * */

resource 'CNTX' (rApprSTRng + rSvAttempt, PFM_MIN_PRIO) (       /* Attempt - OS Range */
        "The thematic focus of the Objective Story explores attempt. For example, a world leader who visits a war-torn
country in hopes of establishing a peace treaty; a first-time skier who vows to go down the most difficult hill by the
end of the day; "
        "athletes who seek to keep bettering their personal best; an obese girl who tries to win the heart of a world-
famous male model."
);

    /* * * * * * * * * * * * * * * * * * * * * * */

resource 'CNTX' (rApprSTRng + rSvInstinct, PFM_MIN_PRIO) (      /* Instinct - OS Range */
        "The thematic focus of the objective story explores the nature of instinct. For example, overcoming natural
revulsion to act as ambassador to a world of giant slugs; young mothers engage in \"nesting\"; plane crash survivors come
to grips with "
        "cannibalism; curling up in a fetal position when one is cold; the instinct to join with another human being and
reproduce. "
);

    /* * * * * * * * * * * * * * * * * * * * * * */

resource 'CNTX' (rApprSTRng + rSvSenses, PFM_MIN_PRIO) (        /* Senses - OS Range */
        "The thematic focus of the Objective Story explores the nature of the senses.  For example, seeing but not
hearing or vice versa; thinking you heard or saw something but not really knowing for sure; enhancing senses gradually or
through transformative experience; sensory deprivation; "
        "sensualist behavior; alteration of senses through drugs or spiritual transformation/perception; impairment or
handicaps of particular senses; the compensation of one sense for another deficient sense; 3D or smell-o-rama which point
out the audience sensual participation; solitary confinement; "
        "a baby deprived of mothers presence; visualizations; mirages; hallucinations."
);

    /* * * * * * * * * * * * * * * * * * * * * * */

resource 'CNTX' (rApprSTRng + rSvInterpretation, PFM_MIN_PRIO) (        /* Interpretation - OS Range */
        "The thematic focus of the Objective Story explores the nature of Interpretation.  For example, fortunetellers
interpreting omens; code specialists deciphering signals from space; body language between the sexes; the motives behind
civil unrest; a splinter group's interpretation of the bible, etc."
);

    /* * * * * * * * * * * * * * * * * * * * * * */

resource 'CNTX' (rApprSTRng + rSvConditioning, PFM_MIN_PRIO) (          /* Conditioning - OS Range */
        "The thematic focus of the Objective Story explores conditioning.  For example, drivers who are conditioned to
pull over when they hear a siren; children who automatically hide when they hear their parents raise their voices; Good
Samaritans who feel the urge to stop their car whenever "
        "they see roadside accidents; fast food patrons who order fries with their burgers simply because they've been
inundated by TV advertising."
);

    /* * * * * * * * * * * * * * * * * * * * * * */

resource 'CNTX' (rApprSTRng + rSvWisdom, PFM_MIN_PRIO) (        /* Wisdom - OS Range */
```

```
        "The thematic focus of the Objective Story explores wisdom. For example,  seasoned beat cops who know when to
look the other way; parents who are able to perceive their children's learning disabilities; an experienced, older
basketball coach "
        "who is able to see and encourage the potential in a team made up of unruly drop-outs; doctors who treat the
soul along with the body."
};

    /* * * * * * * * * * * * * * * * * * * * * * * * */

resource 'CNTX' (rApprSTRng + rSvSkill, PFM_MIN_PRIO) {        /* Skill - OS Range */
        "The thematic focus of the Objective Story explores the nature of Skill.  For example, journeyman mechanics
building a backyard spacecraft; musicians struggling to be selected for the philharmonic; interns learning to perform
brain surgery; carney barkers trying to save money for surgery for their adopted mom; "
        "sharpshooters in a SWAT team; secretaries taking over a business; commercial pilots forced to fly combat
missions, etc."
};

    /* * * * * * * * * * * * * * * * * * * * * * * * */

resource 'CNTX' (rApprSTRng + rSvExperience, PFM_MIN_PRIO) {   /* Experience - OS Range */
        "The thematic focus of the objective story explores the nature of experience. For example, executives vie for
foreign contracts; living as if one were handicapped to familiarize oneself with the different issues particular to their
disability that they face every day; women familiarizing them selves with their maternal "
        "instincts by volunteering in a children's shelter; interning at a company in one's field of interest; an
international relations major performing government duties as a page so as to familiarize themselves with the political
world; a seasoned veteran trying to keep his company alive."
};

    /* * * * * * * * * * * * * * * * * * * * * * * * */

resource 'CNTX' (rApprSTRng + rSvEnlightenment, PFM_MIN_PRIO) {        /* Enlightenment - OS Range */
        "The thematic focus of the Objective Story explores the nature of enlightenment.  For example; learning the
value of life after a near-death experience; acquiring a sense of achievement through hard labor; attaining spiritual
peace through a pilgrimage; encountering the divine; discovering love is not all it's cracked up to be."
};

    /* * * * * * * * * * * * * * * * * * * * * * * * */

resource 'CNTX' (rApprSTRng + rSvApproach, PFM_MIN_PRIO) {      /* Approach - OS Range */
        "The thematic focus of the Objective Story explores approach. For example, disciplined versus free-form methods
of approaching art; taking risks with patients in order to advance medical research; waiting for opportunity to knock;
breaking free from fixed mindsets by changing locations."
};

    /* * * * * * * * * * * * * * * * * * * * * * * * */

resource 'CNTX' (rApprSTRng + rSvSelfInterest, PFM_MIN_PRIO) {          /* Self-Interest */
        "The thematic focus of the Objective Story explores the nature of self interest.  For example, pork barrel
politics, elitist organizations, industries that knowingly sell unsafe products, building below code to save money,
miserliness, allowing misconceptions to exist in order to increase one's status or situation, withholding negative
information for one's own advantage, insider trading, etc."
};

resource 'CNTX' (rApprPLRng + rSvSelfInterest, PFM_MIN_PRIO) {          /* Self-Interest */
        "The thematic focus of the Subjective Story explores the meaning of self interest.  For example, while special
interest groups make gains for their constituents -- the general populace pays the bill; while miserliness can lead to
economic security -- it precludes providing financial assistance to others; while allowing misconceptions to exist can
increase one's situation -- it can also harbor false expectations, etc."
};

resource 'CNTX' (rApprMCRng + rSvSelfInterest, PFM_MIN_PRIO) {          /* Self-Interest */
        "The function of the Main Character's thematic focus is to place a value judgment on self interest.  The
following two examples both illustrate the relationship of special interest groups to society:  A) The benefits for the
handicapped of assigned parking far outweighs the inconvenience to society as a whole, or B) The tax exempt status for
religious institutions causes an undue burden on the American worker."
};

resource 'CNTX' (rApprOCRng + rSvSelfInterest, PFM_MIN_PRIO) {          /* Self-Interest */
        "The function of the Obstacle Character's thematic focus is to show the mechanism through which self interest
has an impact.  For example, allowing misconceptions to exist can increase one's situation by getting someone a job for
which they are not initially qualified to have; holding onto one's money leads to financial security; forming a special
interest group leads to special privileges; "
        "withholding negative information about oneself leads to extended opportunities, etc."
};

resource 'CNTX' (rApprSTUnRng + rSvSelfInterest, PFM_MIN_PRIO) {        /* Self-Interest */
        "Self interest describes the type of catalyst that forces the plot forward.  For example, while trapped in a
mine someone spots a large diamond and steals it which causes the wall to collapse revealing a way out; as a result of
altering his grades, a student discovers that his parents have invited the teacher to dinner; a parole officer who
records all of her phone conversations "
        "to protect herself from false accusations inadvertently tapes some evidence that proves someone else's
innocence, etc."
};

resource 'CNTX' (rApprPLUnRng + rSvSelfInterest, PFM_MIN_PRIO) {        /* Self-Interest */
        "Self interest describes the type of catalyst that creates dramatic potential between the Main and Obstacle
Characters.  For example, between two young lovers: the size of an engagement ring; between a married couple: hiding old
letters from a former lover; between a father and son: failing to show up at a family reunion in order to see a ball
game; between two heads of state: "
        "promoting trade tariffs to strengthen the vote at home, etc."
};

resource 'CNTX' (rApprMCUnRng + rSvSelfInterest, PFM_MIN_PRIO) {        /* Self-Interest */
        "Self interest is the quality that makes the Main Character uniquely able to counter the effects caused by the
story problem.  For example, hoarding water while lost in the desert which allows some to survive instead of all being
lost; a captive divulging secrets in order to be released; turning state's evidence for a reduced sentence; "
        "seducing an enemy agent that leads to their defection, etc."
```

```
};
resource 'CNTX' (rApprOCUnRng + rSvSelfInterest, PFM_MIN_PRIO) {          /* Self-Interest */
        "Self interest is the type of effect that makes the Obstacle Character uniquely able to alter the Main
Character's course.  For example, a parent that forces their children to work excessively around the house which
motivates them to run away; someone who puts their career before their family leads to their spouse having an affair; a
glory-grabbing research scientist "
        "claims sole discovery of a new virus which forces the true discoverer to go to the news media, etc."
};

resource 'CNTX' (rApprSTCrFl + rSvSelfInterest, PFM_MIN_PRIO) {          /* Self-Interest */
        "Self Interest is the type of resistance that inhibits the quest for the goal.  For example, forcing a car to
stop at a convenience store for cigarettes while being chased by the police; insistence on taking excessive personal
luggage while on a trip to the wilderness; hammering \"just a few more nails\" in the backyard while the dinner gets
cold; delaying a "
        "return to port in order to follow a personal vendetta, etc."
};

resource 'CNTX' (rApprPLCrFl + rSvSelfInterest, PFM_MIN_PRIO) {          /* Self-Interest */
        "Self interest is the type of interaction that causes conflict between the Main and Obstacle Characters.  For
example, vying for the same position, bidding for some object or job, competition for the love of a third party, sport
competitions, \"keeping up with the Joneses\", spending the vacation money for a new boat, taking the bigger piece of
cake, etc."
};

resource 'CNTX' (rApprMCCrFl + rSvSelfInterest, PFM_MIN_PRIO) {          /* Self-Interest */
        "Self interest is the quality that inhibits the Main Character's use of their Unique Ability.  For example, the
Main Character's plans to bring their family together are thwarted by their taking control of the TV set, plans for a
marriage are threatened by insistence that it is extravagant enough to impress their friends, a peace conference falls
apart "
        "because of an insistence on specific seating arrangements, the run of a play is cut short due to a prima dona's
upstaging of the principal actors, etc. "
};

resource 'CNTX' (rApprOCCrFl + rSvSelfInterest, PFM_MIN_PRIO) {          /* Self-Interest */
        "Self interest is an attribute of the Obstacle Character that undermines their impact on the Main Character.
For example, a father that touts the importance of good grades who also refuses to help his own children with their
homework whenever there is a football game on TV, a minister preaches the importance of \"giving 'til it hurts\" to his "
        "congregation yet drives a Mercedes, an animal rights activist who promotes the adoption of pets from the pound
continues to breed purebred hairless Chihuahuas for profit, etc."
};

    /* . . . . . . . . . . . . . . . . . . . . . . */

resource 'CNTX' (rApprSTRng + rSvMorality, PFM_MIN_PRIO) {      /* Morality - OS Range */
        "The thematic focus of the Objective Story explores the nature of Morality.  For example, sacrifice during a
train derailment; giving up a kidney for a stranger; abdicating in favor of a more qualified leader; working two jobs to
put children through college, etc."
};

    /* . . . . . . . . . . . . . . . . . . . . . . */

resource 'CNTX' (rApprSTRng + rSvAttitude, PFM_MIN_PRIO) {      /* Attitude - OS Range */
        "The thematic focus of the Objective Story explores the nature of attitude. For example, a change causes a
recluse to become dynamic; If you face the world with a smile the world supposedly smiles back; attitude problems that
cover up a basic insecurities; thinking the world owes you something; purposeful environmental destruction or
preservation; an exclusive organization or institution; "
        "religious tenants of an afterlife or the here and now; a state of mind that is not in keeping with ones
actions; acting inappropriate in social situations; a boss who sexually harasses his employees; always maximizing
pleasure and never working; using other people to do your work for you; doing other people's work instead of your own;
superiority complex; bleeding heart liberals."
};

    /* . . . . . . . . . . . . . . . . . . . . . . */

resource 'CNTX' (rApprSTRng + rSvPrerequisites, PFM_MIN_PRIO) {          /* Prerequisites - OS Range */
        "The thematic focus of the Objective Story explores prerequisites. For example, carrying a certain GPA in order
to play on a team to get a sports scholarship;  blood tests that must be taken to get a marriage license; dress codes;
building an army exclusively of heterosexuals."
};

    /* . . . . . . . . . . . . . . . . . . . . . . */

resource 'CNTX' (rApprSTRng + rSvStrategy, PFM_MIN_PRIO) {      /* Strategy - OS Range */
        "The thematic focus of the Objective Story explores the nature of strategy.  For example, the plans to rob a
bank; attacking the flank to weaken a military position; a spy disguising himself to get into a restricted area;
diverting a guard's attention while companions sneak by; devising a tactic to win against an opponent in chess; planning
how to trap a mate into marriage; working out the details of an emotional persuasion."
};

    /* . . . . . . . . . . . . . . . . . . . . . . */

resource 'CNTX' (rApprSTRng + rSvAnalysis, PFM_MIN_PRIO) {      /* Analysis - OS Range */
        "The thematic focus of the Objective Story explores the nature of analysis.  For example, fathoming how a
particular disease spreads; a psychologist delving into a patient's psyche; finding patterns in stock fluctuations;
figuring out the logic behind a computer program; examining satellite spy photos describing enemy military positions."
};

    /* . . . . . . . . . . . . . . . . . . . . . . */
```

```
resource 'CNTX' (rApprSTRng + rSvPreconditions, PFM_MIN_PRIO) {          /* Analysis - OS Range */
        "The thematic focus of the Objective Story explores preconditions. For example, kids who can only get their
allowances from their mother if they kiss and hug her first; women who'll only date men who pay for everything; parents
who insist their children do chores for an allowance; the casting couch."
};

/* . . . . . . . . . . . . . . . . . . . . . . */

resource 'CNTX' (rApprSTRng + rSvStateOfBeing, PFM_MIN_PRIO) {           /* State Of Being - OS Range */
        "The thematic focus of the Objective Story explores state-of-being. For example, a mousy, quiet, plain-looking
librarian who is actually a glamorous, crime-fighting superhero; an aging hippie who wants nothing more than to live a
peaceful, marijuana-laden existence; a kid who grow up an orphan on the streets and winds up in "
        "prison only to discover his talent as a lawyer and civil rights activist; a politician who is actually a self-
absorbed power-monger."
};

/* . . . . . . . . . . . . . . . . . . . . . . */

resource 'CNTX' (rApprSTRng + rSvSituation, PFM_MIN_PRIO) {     /* Situation - OS Range */
        "The thematic focus of the Objective Story explores the nature of situation.  For example, unrequited love;
unplanned pregnancy; a rich person feels guilty or a poor person is envious; "
        "two people switch identities; a man tries to pretend he's a woman or vice versa; an sick old person is put in a
convalescent home or is taken care of by her children; a person finds they hate their profession and "
        "must decide whether or not to start a new one; a high school dropout assesses the job market."
};

/* . . . . . . . . . . . . . . . . . . . . . . */

resource 'CNTX' (rApprSTRng + rSvCircumstances, PFM_MIN_PRIO) {          /* Circumstances - OS Range */
        "The thematic focus of the Objective Story explores circumstance.  For example, a child left alone by his
parents for the first time; a man who loves cars touring an automobile show; an alcoholic in a bar late at night; an
ambitious musician working the door at the Grammy Awards celebration."
};

/* . . . . . . . . . . . . . . . . . . . . . . */

resource 'CNTX' (rApprSTRng + rSvSenseOfSelf, PFM_MIN_PRIO) {  /* SenseOfSelf - OS Range */
        "The thematic focus of the Objective Story explores the nature of sense-of-self.  For example, a boy dealing
with his homosexuality; a woman thinking she is too fat; a rich man finding others think him selfish; a bully discovers
his popularity is a sham; a show-off discovers his bravura is less than he had believed."
};

/* . . . . . . . . . . . . . . . . . . . . . . */

resource 'CNTX' (rApprSTRng + rSvKnowledgeVar, PFM_MIN_PRIO) {           /* Knowledge Variation - OS Range */
        "The thematic focus of the Objective Story explores the nature of knowledge.  For example, information of a
sneak attack at midnight, an insider tip on stocks; discovering one's husband has a mistress; mistaking a performance for
the real thing; recognizing the man in the corner is a spy; a superhero's secret identity; someone in the group is a
traitor."
};

/* . . . . . . . . . . . . . . . . . . . . . . */

resource 'CNTX' (rApprSTRng + rSvAbilityVar, PFM_MIN_PRIO) {   /* Ability Variation - OS Range */
        "The thematic focus of the objective story explores the nature of ability. For example, a race car drivers
competence after a serious accident; a contest in which high school students get points for bedding their girlfriends;
tryouts for a symphony orchestra; the issue of women in the combat. "
};

/* . . . . . . . . . . . . . . . . . . . . . . */

resource 'CNTX' (rApprSTRng + rSvDesireVar, PFM_MIN_PRIO) {    /* Desire Variation - OS Range */
        "The thematic focus of the Objective Story explores the nature of Desire.  For example, junior partners in a law
firm vying for one senior partnership slot; international terrorists blowing up a prominent building to bring attention
to their people's case; high school seniors cramming for an entrance exam to an Ivy League college, etc."
};

/* . . . . . . . . . . . . . . . . . . . . . . */

resource 'CNTX' (rApprSTRng + rSvThoughtVar, PFM_MIN_PRIO) {   /* Thought Variation - OS Range */
        "The thematic focus of the Objective Story explores the nature of thought.  For example, pondering the risks and
benefits of whether to ask a girl out; working out the answer to an exam question; deliberating a suspect's guilt;
contemplating the pros and cons of suicide; choosing what to eat off a menu."
};

/* . . . . . . . . . . . . . . . . . . . . . . */
```

```
resource 'CNTX' (rApprSTRng + rSvRationalization, PFM_MIN_PRIO) {        /* Rationalization - OS Range */
        "The thematic focus of the Objective Story explores the nature of rationalization.  For example, feigning
sickness to play hocky; showing off money to impress a girl; posing as friends of the performer to get backstage; acting
tired to escape a dull party; pretending ignorance to waylay blame."
};

    /* . . . . . . . . . . . . . . . . . . . . . . */

resource 'CNTX' (rApprSTRng + rSvCommitment, PFM_MIN_PRIO) {    /* Commitment - OS Range */
        "The thematic focus of the objective story explores the nature of commitment. For example, marriage; team
sports; club, sorority/ fraternity membership; religious commitments; racial groups; contractual agreements; family
ties."
};

    /* . . . . . . . . . . . . . . . . . . . . . . */

resource 'CNTX' (rApprSTRng + rSvResponsibility, PFM_MIN_PRIO) {        /* Responsibility - OS Range */
        "The thematic focus of the Objective Story explores responsibility.  For example, a man who works three jobs so
he can save enough money to put his son through college; a fireman who goes into a burning building to save a baby even
though the building is completely engulfed in flames; an eldest child who takes primary care of her three younger
siblings; "
        "a woman who sacrifices everything to send her daughter to medical school even though her daughter doesn't want
to go."
};

    /* . . . . . . . . . . . . . . . . . . . . . . */

resource 'CNTX' (rApprSTRng + rSvObligation, PFM_MIN_PRIO) {    /* Obligation - OS Range */
        "The thematic focus of the Objective Story explores obligation.  For example, a student who sleeps with her
professor in hopes of getting better grades; an oil refinery company which contributes to a politician's campaign so the
politician will enact lenient environmental laws;  a sibling who covers for his sister's lie so she'll do his chores for
a week; "
        "a man who accepts a generous offer to work at his father-in-law's company, which he hates."
};

    /* . . . . . . . . . . . . . . . . . . . . . . */

resource 'CNTX' (rApprSTRng + rSvPermission, PFM_MIN_PRIO) {    /* Permission - OS Range */
        "The thematic focus of the Objective Story explores the nature of permission.  For example, children who refuse
to ask their parents' permission to do what they want; husbands who will not make any decisions without their wives'
permission; permission is needed to shoot a movie at a particular location; an employee requires permission to skip work;
"
        "a bureaucratic hierarchy make it difficult to gain access to the source; EST requires its subject to ask to
pee; a righteous person acts without asking; inconsistent or fluctuating requirements make permission irrelevant; teenage
rebellion; military etiquette; or repeated physical contact."
};

    /* . . . . . . . . . . . . . . . . . . . . . . */

resource 'CNTX' (rApprSTRng + rSvNeed, PFM_MIN_PRIO) {          /* Need - OS Range */
        "The thematic focus of the Objective Story explores the nature of Need.  For example, families searching for
shelter after an earthquake demolishes their apartment buildings; Third World children stealing food during a famine in
their area; astronauts seeking warmth to keep from freezing to death after crashing their ship on a distant planet, etc.
"
};

    /* . . . . . . . . . . . . . . . . . . . . . . */

resource 'CNTX' (rApprSTRng + rSvExpediency, PFM_MIN_PRIO) {    /* Expediency - OS Range */
        "The thematic focus of the Objective Story explores expediency.  For example, an insecure high school senior
sleeps with her boyfriend because its easier than telling him she doesn't love him; a religious woman who says her
prayers every night because she's terrified of going to Hell; a child who tells a lie to her parents because she's afraid
she'll be punished if they know the truth;  a struggling novelist who takes a job as an ad copy writer."
};

    /* . . . . . . . . . . . . . . . . . . . . . . */

resource 'CNTX' (rApprSTRng + rSvDeficiency, PFM_MIN_PRIO) {    /* Deficiency - OS Range */
        "The thematic focus of the Objective Story explores deficiency.  For example, lack of exercise; going hungry; a
doctor who couldn't save his parents in a car accident; a couple with a loveless marriage."
};

    /* . . . . . . . . . . . . . . . . . . . . . . */

resource 'CNTX' (rApprSTRng + rSvTruth, PFM_MIN_PRIO) {         /* Truth - OS Range */
        "The thematic focus of the objective story explores the nature of truth. For example, a man in a separated
marriage seeking to find if the child his wife is carrying is his; a teacher venturing to find if their C student cheated
to get an A on the last test or if they "
```

```
        "just applied themselves for the first time; the public seeking to find whether a competitive skater would go so
far as to conspire to injure her own teammate to win a gold metal; a young pre med. student exploring the possibility
that his father may have bought his way into medical school. "
);

    /* * * * * * * * * * * * * * * * * * * * * * */

resource 'CNTX' (rApprSTRng + rSvEvidence, PFM_MIN_PRIO) {      /* Evidence - OS Range */
        "The thematic focus of the Objective Story explores the nature of Evidence.  For example, giant pictographs on
the plains of the Andes; clues to a crime committed twenty years ago; the whereabouts of an abducted child; clues to the
substandard construction of a rapid transit rail system, etc."
);

    /* * * * * * * * * * * * * * * * * * * * * * */

resource 'CNTX' (rApprSTRng + rSvSuspicion, PFM_MIN_PRIO) {      /* Suspicion - OS Range */
        "The thematic focus of the Objective Story explores the nature of suspicion.  For example, a wife pays a
detective to spy on her husband; children are suspicious that their \"role models\" are not worthy; cynics are doubtful
of the media; "
        "a detective suspects blackmail; a man with a trench coat looks like a flasher; people who act nice are thought
to want something from you; a child accuses a parent of abuse/incest; an employee suspects her boss of garnering her
wages; a \"charitable\" organization is paying its president double digits; "
        "a husband finds that his wife is repeatedly not where she said she was; a menacing character appears on the
scene just before a crime is committed; someone is trying to brainwash you; uncertainty of ones own goodness/sincerity."
);

    /* * * * * * * * * * * * * * * * * * * * * * */

resource 'CNTX' (rApprSTRng + rSvFalsehood, PFM_MIN_PRIO) {      /* Falsehood - OS Range */
        "The thematic focus of the Objective Story explores the nature of Falsehood.  For example, rewriting history;
the notion that the Holocaust never happened; spies lies about their profession to their family; an auto company that
denies responsibility for accidents caused by faulty transmissions, etc."
);

    /* * * * * * * * * * * * * * * * * * * * * * */

resource 'CNTX' (rApprSTRng + rSvValue, PFM_MIN_PRIO) {          /* Value - OS Range */
        "The thematic focus of the objective story explores the nature of value. For example, monetary value; a reliable
car; employability after a stint in the armed forces;  a farmer determining the value of land based on the quality of the
soil; value of having someone believe in you; value of a company's stock; value of exchanging a meaningful gift; value of
having someone to depend on. "
);

    /* * * * * * * * * * * * * * * * * * * * * * */

resource 'CNTX' (rApprSTRng + rSvConfidence, PFM_MIN_PRIO) {    /* Confidence - OS Range */
        "The thematic focus of the objective story explores the nature of confidence.  For example, a runner who doesn't
fold in the clinch; a doctor performing a delicate operation on his mother; a blues singer letting failed auditions roll
off her back; a Saint walking into the fire; polar explorers; cancer patients; unrenowned writers with a new theory of
story."
);

    /* * * * * * * * * * * * * * * * * * * * * * */

resource 'CNTX' (rApprSTRng + rSvWorry, PFM_MIN_PRIO) {          /* Worry - OS Range */
        "The thematic focus of the Objective Story explores the nature of worry.  For example, waiting to get the
results from an aids test; a loved one is attempting to set a world record for skydiving;  a layoff is imminent in the
company and there's no way of knowing who will be fired; an earthquake happens in your home town while your on vacation;
"
        "a parent has become obese and inactive and has high blood pressure; an offspring is dyslexic and the other
children taunt her mercilessly; an adolescent is threatening to runaway and live on the streets; an older person starts
to forget things that just happened; the bar is approaching and your not sure you'll pass; there isn't enough money in
the bank to pay the rent."
);

    /* * * * * * * * * * * * * * * * * * * * * * */

resource 'CNTX' (rApprSTRng + rSvWorth, PFM_MIN_PRIO) {          /* Worth - OS Range */
        "The thematic focus of the objective story explores the nature of worth. For example, public transportation to a
person without a car; a reliable source of food and water to an Ethiopian; winning a gold bracelet to a woman who has
little jewelry; a college education to a child whose parents had only a high school degree; a new doll to a child who
only gets hand-me-downs."
);

    /* * * * * * * * * * * * * * * * * * * * * * */

resource 'CNTX' (rApprSTRng + rSvClosure, PFM_MIN_PRIO) {        /* Closure - OS Range */
        "The thematic focus of the objective story explores the nature of closure.  For example, packing to leave the
house you grew up in for the last time; letting go of the death of a loved one; the need for an end in a reoccurring
abusive relationship; meeting with a particular person in the effort to bring resolution to a past situation; "
```

```
	"graduating form school and beginning a full time job for the first time; adapting from the single lifestyle
with a marriage commitment."
);

	/* . . . . . . . . . . . . . . . . . . . . . . */

resource 'CNTX' (rApprSTRng + rSvHope, PFM_MIN_PRIO) {		/* Hope - OS Range */
	"The thematic focus of the Objective Story explores the nature of hope.  For example, a positive turn in a
troubled marriage; surviving the first cut at a dance audition; closing in on victory in a football game; hearing a
survivor buried in an earthquake; seeing the light at the end of a tunnel."
};

	/* . . . . . . . . . . . . . . . . . . . . . . */

resource 'CNTX' (rApprSTRng + rSvDream, PFM_MIN_PRIO) {		/* Dream - OS Range */
	"The thematic focus of the Objective Story explores the nature of dream.  For example, life is a dream;
daydreams and sleepwalking; REM and light sleep; waking up to find the dream is still happening; prophetic dreams; shared
dreams; dreaming that one is dying and really dying; dreaming that one can fly or has superhuman powers; "
	"Rip Van Winkel and the length of dreams; \"dreams as the kings road to the unconscious\"; analyzing dreams to
promote self-awareness; the representational or symbolic elements of dreams; a desire to make the world a better place;
to influence those who you have an affect upon in a desired manner; live out ones worst nightmares so as to not have to
do it in real life; "
	"see oneself as one would like to be; achieving world peace for eternity; to live in a world where there where
no frustrations or discomforts; a world where immediate and eternal gratification existed; a state of absolute control."
};

	/* . . . . . . . . . . . . . . . . . . . . . . */

resource 'CNTX' (rApprSTRng + rSvDenial, PFM_MIN_PRIO) {		/* Denial - OS Range */
	"The thematic focus of the Objective Story explores the nature of denial.  For example, a person who denies
needs; a habitual liar; denying ones knowledge or involvement to protect oneself or another; acting like your teachers
need you when it is really the other way around;  not wanting to be reminded of something which is unpleasant; "
	"refusing to believe that one is dying even in fact you are; refusing to see how ones actions affect others or
the situation; history written from a biased perspective; a scientist who can not see herself as subjective; a man who
cannot admit that his divorced wife is not coming back to him; a living person who refuses to feel discomfort or pain of
any kind."
};

	/* . . . . . . . . . . . . . . . . . . . . . . */

resource 'CNTX' (rApprSTRng + rSvInvestigation, PFM_MIN_PRIO) {		/* Investigation - OS Range */
	"The thematic focus of the Objective Story explores the nature of Investigation.  For example, checking into the
social life of a suspected spy; examining the wreckage of a plane crash for clues; teenagers checking into the ins and
outs of making love; examining the remains of a lost city on Mars, etc."
};

	/* . . . . . . . . . . . . . . . . . . . . . . */

resource 'CNTX' (rApprSTRng + rSvAppraisal, PFM_MIN_PRIO) {	/* Appraisal - OS Range */
	"The thematic focus of the Objective Story explores the nature of appraisal.  For example, detectives surveying
a murder scene; a psychiatrist interviewing dysfunctional families for the first time; race car mechanics checking under
the hood of their team's wheels; a woman at a party sizing up the men who ask her to dance."
};

	/* . . . . . . . . . . . . . . . . . . . . . . */

resource 'CNTX' (rApprSTRng + rSvReappraisal, PFM_MIN_PRIO) {	/* Reappraisal - OS Range */
	"The thematic focus of the Objective Story explores the nature of reappraisal.  For example, a drug addict who's
been clean for eight months and then contemplates an offer of cocaine at a party; someone in a long-term relationship who
argues with her lover and then decides to leave the relationship after the lover gives in;  "
	"a man who has lived in California all of his life who decides to move to Idaho after an earthquake; a first-
time criminal who, deep into a bank robbery scam, realizes he might get caught and go to prison for the rest of his
life."
};

	/* . . . . . . . . . . . . . . . . . . . . . . */

resource 'CNTX' (rApprSTRng + rSvDoubt, PFM_MIN_PRIO) {		/* Doubt - OS Range */
	"The thematic focus of the Objective Story explores the nature of doubt.  For example, skepticism carried to a
ridiculous degree; the lack of certainty that anything can be true or good; a jealous lover who refuses to believe that
their betrothed is faithful even though all evidence supports this fact; "
	"a way of not having to reflect upon something meaningful and keeping things blurred and uncertain; a witch
conjures the spirit of her disappeared child to keep a mother wondering if he is perhaps still alive; believing muck
raking conspiracy theories just because one dislikes the government; doubting any conclusion due to a belief that
limitations are inherently bad; "
	"lack of doubt in one's conclusion that if something about oneself that it must be true always and for all
people in all situations; acting without the certainty that one can change, learn, and grow; police continuing to track a
murder suspect despite an alibi that checks out; perhaps HIV is not the sole cause of AIDS; women unsure of their
husband's love for them, etc."
};

	/* . . . . . . . . . . . . . . . . . . . . . . */
```

```
/*****************************************************************************************************
*************************************/
/*                                              ELEMENTS

              */
/*****************************************************************************************************
*************************************/


resource 'CNTX' (rApprSTPbm + rSvAbilityElem, PFM_MIN_PRIO) {  /* Ability Element */
        "Either the existence or lack of Ability is the source of the Objective Characters' problems.  For example, a
gunfighter's legendary ability draws claimants to his title to the small town in which he lives; a telepath's ability
compromises a "
        "secret government operation; a sports star's lack of acting ability harms a company's PR more than hiring her
helped it."
};

resource 'CNTX' (rApprMCPbm + rSvAbilityElem, PFM_MIN_PRIO) {  /* Ability Element */
        "Either the existence or lack of ability is the central problem that causes the Main character's difficulties.
For example, inability to play football results in becoming a social outcast; ability in intelligence "
        "leads to everyone wanting to copy one's homework; inability to dance causes embarrassment in front of the
object of one's affections; ability to pick up men causes jealousy among one's friends."
};

resource 'CNTX' (rApprMCFoc + rSvAbilityElem, PFM_MIN_PRIO) {  /* Ability Element */
        "As a result of their actual motivation , the Main Character focuses on an apparent motivation to engage in or
endure Ability.  For example, because a man feels like he will become overwhelmed by his own frustration, he concentrates
on his ability to \"play around\" as much as possible;  as  the result of the need to rebel against an overbearing
parent, "
        "a young girl is determined to prove that her abilities are superior to her parents; because of a man's belief
that competition his only means of motivating himself, he focuses on always trying to prove that his abilities are better
than the next guys,;since a teacher is unable to maintain discipline in her class, she is led to focus on her ability to
punish or expel the \"bad\" students."
};


     /* * * * * * * * * * * * * * * * * * * * * * * * */


resource 'CNTX' (rApprSTPbm + rSvAcceptance, PFM_MIN_PRIO) {   /* Acceptance */
        "Either the quality or lack of Acceptance is the source of the Objective Characters' problems.  For example, a
mother's acceptance of her daughter's ex-husband as a house guest; a town who (though not antagonistic) offers no
acceptance to a Native American family; a wife who accepts the poor habits of her husband for fear of losing the marriage
allows her children to live in unsanitary conditions."
};

resource 'CNTX' (rApprMCPbm + rSvAcceptance, PFM_MIN_PRIO) {   /* Acceptance */
        "Either the existence or lack of acceptance is the central problem that causes the Main character's
difficulties.  For example, acceptance of a gang  membership results in familial discord; lack of acceptance of a "
        "lover causes deep mental anguish; acceptance of one's homosexuality complicates life in the military; lack of
acceptance of a college's discriminatory policy compels one to lose out on a professorship."
};

resource 'CNTX' (rApprMCFoc + rSvAcceptance, PFM_MIN_PRIO) {   /* Acceptance */
        "As a result of their actual motivation, The Main Character focuses on an apparent motivation to engage in or
endure Acceptance.  For example, as the result of her fear of never having been loved as a child, a girl seeks acceptance
from her peers and succumbs to peer pressures;  because of having been persecuted for being Jewish, a man accepts non-
Jewish ways so he can assimilate; "
        "because of a woman's inhibitions about expressing herself independently, she thinks that gaining acceptance
from her boss is the most important thing; because a college student is insecure about who they are and feels alienated,
he seeks acceptance to an established fraternity."
};


     /* * * * * * * * * * * * * * * * * * * * * * * * */


resource 'CNTX' (rApprSTPbm + rSvAccurate, PFM_MIN_PRIO) {      /* Accurate */
        "Either the quality or lack of being Accurate is the source of the Objective Characters' problems.  For example,
a less than accurate knife thrower loses more partners that way; the accurate rendering of a treasure map in a man's
tattoo leads to a chase to possess his skin; accurate renderings of an immortal's face in the recently discovered
paintings of "
        "a sixteenth century Dutch artist lead the immortal to steal the paintings from the various patrons who bought
them."
};

resource 'CNTX' (rApprMCPbm + rSvAccurate, PFM_MIN_PRIO) {      /* Accurate */
        "The source of the main character's drive is accuracy.  For example, a field goal kicker, driven to kick more
accurately to win the big game suffers in his school work; a field goal kicker driven to kick less accurately to receive
a payoff is kicked off the team; a gunslinger driven to shoot more accurately to save his life "
        "attracts more challengers; a gunslinger driven to shoot less accurately so he will no longer have challengers
puts his life in danger; a computer designer lacks the drive to improve the accuracy of his computer that is to be used.
for war so his company kidnaps his wife to force him to get within tolerance; a computer designer's "
        "lack of drive to give accurate testimony to his friend's case of corporate espionage gets the designer in
judicial trouble; a news reporter having a lack of drive to print a story accurately that would put a witness in danger
gets in trouble with her editor; a news reporter having a lack of drive to write a story accurately due to "
        "fear of mob retaliation gets in trouble with her editor."
};

resource 'CNTX' (rApprMCFoc + rSvAccurate, PFM_MIN_PRIO) {      /* Accurate */
        "As a result of their actual motivation, the Main Character focuses on an apparent motivation to engage in or
endure Accuracy.  For example as a result of being abused by the nuns at her boarding school, a girl engages in
attempting to be completely accurate in everything she does, i.e. answering exam questions correctly, following the
schools rules exactly, etc.; "
        "because of his underlying insecurity a boy needs to prove that he is a genius to his peers and continually
engages in correcting his friend's diction and logic for accuracy; as the result of a teachers lack of actual experience,
she is concerned only with the accuracy of the student's answers and cannot teach anything but what is in the book;
because of a "
        "homely girl's need to gain the acceptance of someone she admires, she impresses her math teacher by studying
continually and achieving complete accuracy."
};

     /* * * * * * * * * * * * * * * * * * * * * * * * */

resource 'CNTX' (rApprSTPbm + rSvActuality, PFM_MIN_PRIO) {     /* Actuality */
        "Either the existence or lack of Actuality is the source of the Objective Characters' problems.  For example,
this time, there really IS a wolf!; a woman has both breasts removed only to find she really didn't have cancer after all
- April fool!; an acquitted murderer really did it."
```

```
};
resource 'CNTX' (rApprMCPbm + rSvActuality, PFM_MIN_PRIO) {     /* Actuality */
        "The source of the main character's drive is actuality.  For example, an alcoholic driven to deny the actuality
of his problem loses his family; a terminally ill patient is driven to seek the actuality of God only to find none; a
daughter with a lack of drive to uncover the actuality of her father's adultery suffers in betraying her mother; "
        "a priest lacking drive to make actual his homosexual interests struggles with  psychological anguish."
};

resource 'CNTX' (rApprMCFoc + rSvActuality, PFM_MIN_PRIO) {     /* Actuality */
        "As a result of their actual motivation, the a Main Character focuses on an apparent motivation to engage in or
endure Actuality.  For example, because a young woman wants the approval of her analyst, she develops an actual phobia;
as the result of being labeled a slut by her mother as a result of the number of men she has seen, a woman becomes a
prostitute; "
        "because a woman doubts her own potentials, she declines all opportunities; because a girl feels unloved she
rejects everyone."
};


    /* . . . . . . . . . . . . . . . . . . . . . . . */


resource 'CNTX' (rApprSTPbm + rSvAvoidance, PFM_MIN_PRIO) {     /* Avoidance */
        "Either the drive or lack of drive to Avoid is the source of the Objective Characters' problems.  For example, a
band of guerrillas trying to avoid capture takes a whole town hostage; a group of environmental commandos seeking to
prevent a nuclear plant from going on line bring about a melt down."
};

resource 'CNTX' (rApprMCPbm + rSvAvoidance, PFM_MIN_PRIO) {     /* Avoidance */
        "Either the existence or lack of avoidance is the central problem that causes the Main Character's difficulties.
For example, avoidance of hard "
        "work leads one to being fired; not avoiding alcohol causes a drunk driving accident; avoidance of fighting
leads to being labeled a coward; not avoiding the school bully results in being beat up."
};

resource 'CNTX' (rApprMCFoc + rSvAvoidance, PFM_MIN_PRIO) {     /* Avoidance */
        "As a result of their actual motivation, the Main Character focuses on an apparent motivation to engage in or
endure Avoidance.  For example, because a man is afraid of having intimacy finds himself avoiding a woman he likes when
she shows interest in him, or because he wants intimacy more than anything, he finds himself enduring the avoidance of
women who "
        "feel smothered by his apparent neediness;  as a result of her ability to draw parallels between her own
unfinished story and that of a fictional character she is creating, a woman does anything to avoid work on the book; due
to the fact that a boy was molested by his uncle at an early age, he avoids older men who could otherwise serve as role
models for him."
};


    /* . . . . . . . . . . . . . . . . . . . . . . . */


resource 'CNTX' (rApprSTPbm + rSvAware, PFM_MIN_PRIO) {         /* Aware */
        "Either the quality or lack of being Aware is the source of the Objective Characters' problems.  For example,
not being aware that they are being stalked, teenagers on vacation fall easy prey; being aware of a constant dripping
sound, the tenants of a whole apartment building are unable to sleep; "
        "being aware of the spirit world leads a clairvoyant into conflict with the living."
};

resource 'CNTX' (rApprMCPbm + rSvAware, PFM_MIN_PRIO) {         /* Aware */
        "The source of the main character's drive is awareness.  For example, a hypochondriac driven to become aware of
all his ailments suffers a heart attack from the stress; a wife driven to become aware of her husband's criminal
activities becomes embroiled in them; an Native American has "
        "lacking of drive to become aware of her ethnic background is looked down upon by her community; a businessman
who lacks the drive to be aware of the homeless he is throwing off his newly acquired property garners unpopularity with
family and friends."
};

resource 'CNTX' (rApprMCFoc + rSvAware, PFM_MIN_PRIO) {         /* Aware */
        "As a result of their actual motivation, the Main Character focuses on an apparent motivation to engage in or
endure Awareness.  For example, because of her violent childhood in which a she was beaten into unconsciousness on
several occasion, a woman is obsessed with becoming aware of the level of violence that exists in society; "
        "as a result of his memory of being discriminated against, a Black executive who learns that his company will
not employ a policy of affirmative action becomes increasingly aware that they are racist; because a man is ashamed of
his uneducated \"white trash\" background, he becomes involved in a new age cult which preaches the need "
        "for total awareness; as a result of having had a sibling who became catatonic,  a boy endures the fear that his
awareness will disappear forever if he goes to sleep."
};


    /* . . . . . . . . . . . . . . . . . . . . . . . */


resource 'CNTX' (rApprSTPbm + rSvCause, PFM_MIN_PRIO) {         /* Cause */
        "Either the existence or lack of Cause is the source of the Objective Characters' problems.  For example,
cellular phones cause brain cancer; no cause can be found for a recent rash of spontaneous combustions; the pressure of a
deadline that inspires one to quickly and efficiently write these context illustrations also makes one sleepy."
};

resource 'CNTX' (rApprMCPbm + rSvCause, PFM_MIN_PRIO) {         /* Cause */
        "The source of the main character's drive is cause.  For example, a general driven to personally cause the
enemy's defeat calls for undue sacrifices in his men; a parole officer driven to cause a convict to become rehabilitated
gets in trouble with the convict's loan shark; "
        "a CEO lacking the drive to take over a smaller family business brings financial instability his company; an
assassin lacking the drive to cause an important man's death becomes the target of a termination order herself."
};

resource 'CNTX' (rApprMCFoc + rSvCause, PFM_MIN_PRIO) {         /* Cause */
        "As a result of their actual motivation, the Main Character focuses on an apparent motivation to engage in or
endure a cause.  For example, as a result of her own inability to face her needs, a woman seeks to support causes that
make her feel like other people are the ones who need her; because of the anguish and despair she felt "
        "when her own son was killed by a drunk driver, a woman starts an organization called Mothers Against Drunk
Driving (MADD); because of his inability to accept himself as he is, a man spends all his time trying to find the cause
for his differences from others."
};


    /* . . . . . . . . . . . . . . . . . . . . . . . */


resource 'CNTX' (rApprSTPbm + rSvCertainty, PFM_MIN_PRIO) {     /* Certainty */
        "Either the existence or lack of Certainty is the source of the Objective Characters' problems.  For example, a
town's certainty in the guilt of an accused child molester brings an innocent man to trial; a jury's lack of certainty in
the guilt of a child molester allows the culprit to go free."
};
```

```
resource 'CNTX' (rApprMCPbm + rSvCertainty, PFM_MIN_PRIO) {     /* Certainty */
        "Either the existence or lack of certainty is the central problem that causes the Main Character's difficulties. For example, certainty that keeps one from admitting one is wrong; "
        "lack of certainty of an answer causes one to lose on a game show; certainty by a juror that someone is guilty without sufficient evidence results in a miscarriage of justice; lack of "
        "certainty by a doctor in treating a patient causes the patient's death."
};

resource 'CNTX' (rApprMCFoc + rSvCertainty, PFM_MIN_PRIO) {     /* Certainty */
        "As a result of their actual motivation, the Main Character focuses on an apparent motivation to engage in or endure certainty. For example, as a result of a tribe's feelings of helplessness as their sacred grounds are overrun by developers, the tribal priest uses amulets to inspire certainty of their divinity; because of her high anxiety "
        "about not being in ultimate control of her life, a woman chooses to delude herself with the certainty that everything will and must work out in the end; because of her step-father's increasingly absence from home in his traveling job, a girl endures the certainty that she is unloved; as a result of being overindulged as a child, a man is "
        "arrogant and believes that he will certainly get whatever he wants."
};

    /* * * * * * * * * * * * * * * * * * * * * * */

resource 'CNTX' (rApprSTPbm + rSvChange, PFM_MIN_PRIO) {        /* Change */
        "Either the existence or lack of Change is the source of the Objective Characters' problems. For example, a variation in the flu virus makes existing vaccines ineffective; by lowering the standard for mental retardation from an IQ of 70 to 65, the government saved millions of dollars on the thousands of borderline mainstreamers who "
        "were miraculously cured by passage of a bill; lack of true tax reform brings ever-widening unfairness to the working classes."
};

resource 'CNTX' (rApprMCPbm + rSvChange, PFM_MIN_PRIO) {        /* Change */
        "The source of the main character's drive is change. For example, a rebel driven to change rule by the aristocracy becomes a hunted outlaw; an insurance salesperson driven to change the health care system is made to suffer by his colleagues who make more money off the status quo; "
        "a male chauvinist rock star who has a lack of drive to change his attitude toward women finds that all women in the world suddenly stop talking to him; a school teacher lacking drive to change his feelings about racial segregation causes racial turmoil in the community."
};

resource 'CNTX' (rApprMCFoc + rSvChange, PFM_MIN_PRIO) {        /* Change */
        "As a result of their actual motivation, the Main Character focuses on an apparent motivation to engage in or endure Change. For example, because a man is afraid of commitment, he changes mates every few months; as the result of an overprotective and insulated childhood, a woman refuses to allow necessary structural changes to the home she inherited; "
        "as the result of an awareness of some of her self-destructive patterns of wrecking close relationships, a woman changes jobs every year; because a man is obsessed by a woman, he engages in trying to change himself to become more like the man he thinks she wants. "
};

    /* * * * * * * * * * * * * * * * * * * * * * */

resource 'CNTX' (rApprSTPbm + rSvChaos, PFM_MIN_PRIO) {         /* Chaos */
        "Either the existence or lack of Chaos is the source of the Objective Characters' problems. For example, preventing natural burns from lightning strikes, the forest service is choking the very resources the are sworn to protect; a freak storm ruins a poor county's only cash crop."
};

resource 'CNTX' (rApprMCPbm + rSvChaos, PFM_MIN_PRIO) {         /* Chaos */
        "The source of the main character's drive is chaos. For example, a new mayor driven to rid government bureaucratic chaos encounters threats from that bureaucracy; a chef driven to overcome the chaos of too many customers in his popular restaurant finds his disdain drives too many away; a teenager, "
        "thinking the more the merrier, is driven to create chaos among his many girlfriends which leads to all of them leaving him; a tyrant driven to create chaos caused in a power struggle among his followers precipitates the deaths of his loved ones."
};

resource 'CNTX' (rApprMCFoc + rSvChaos, PFM_MIN_PRIO) {         /* Chaos */
        "As a result of their actual motivation, the Main Character focuses on an apparent motivation to engage in or endure Chaos. For example, as a result of her desire to reach a profound spiritual harmony, a woman endures a chaotic life which may in actuality not resemble Joseph Campbell's chaos theory; because a man does not want any limits or rules on "
        "his children, he is forced to endure chaos in his home; as a result of having fought in the Vietnam War, a man is unable to focus on the situation at hand and his mind is in a constant state of chaos; because of her inability to deal with responsibility, a woman see the world as chaotic and all happenings as random."
};

    /* * * * * * * * * * * * * * * * * * * * * * */

resource 'CNTX' (rApprSTPbm + rSvConscience, PFM_MIN_PRIO) {    /* Conscience */
        "Either the existence or lack of Conscience is the source of the Objective Characters' problems. For example, a purse snatcher's conscience causes he and his den of puppies to starve when he can't bring himself to practice his craft; an airline pilot's lack of conscience leads her to sabotage "
        "the flight just to get her ex-husband who is aboard; feeling no pangs, a fat evangelist begs for even more."
};

resource 'CNTX' (rApprMCPbm + rSvConscience, PFM_MIN_PRIO) {    /* Conscience */
        "The source of the main character's drive is conscience. For example, an archbishop driven to honor his conscience refuses to negate his king's marriage; a writer driven to maintain his conscience refuses to give into the studio changes in his script; a talk show host lacking a drive to be conscientious exploits her guests but begins dropping in the ratings; "
        "a cop lacking a drive to be conscientious in his duties takes payoffs to look the other way but gets caught."
};

    /* * * * * * * * * * * * * * * * * * * * * * */

resource 'CNTX' (rApprSTPbm + rSvConsider, PFM_MIN_PRIO) {      /* Consider */
        "Either the existence or lack of Consideration is the source of the Objective Characters' problems. For example, a father's lack of consideration of his family's feelings causes familial strife when he sells the house and announces they are all moving to Burbank; the supreme court's refusal to consider a landmark abortion case results in clinic workers being shot; "
        "a university's consideration of an application for fetal experimentation results in bombings of classrooms and injuries to students."
};

resource 'CNTX' (rApprMCPbm + rSvConsider, PFM_MIN_PRIO) {      /* Consider */
```

```
    "The source of the main character's drive is consideration.  For example, a college graduate driven to consider
his possible career paths finds them all undesirable; a model driven to consider whether to be photographed nude is
dropped by the agency because of her hesitancy; "
    "a mob boss lacking the drive to consider the consequences of his brutal actions receives vengeful retaliation
from a rival; a desperate gambler lacking the drive to consider his accumulating debts receives death threats."
};

resource 'CNTX' (rApprMCFoc + rSvConsider, PFM_MIN_PRIO) {      /* Consider */
    "As a result of their actual motivation, the Main Character focuses on an apparent motivation to engage in or
endure Consideration.  For example, as a result of his inability and fear of making wrong decisions, a man finds himself
in a perpetual state of consideration; because a woman doubts her own goodness, she constantly ponders the sins of
others; "
    "since a man is completely insecure, he endlessly consideration his fiancés fidelity; because a woman is trying
to marry a man for his money, she focuses on his consideration of her sincerity."
};

    /* . . . . . . . . . . . . . . . . . . . . . . . */


resource 'CNTX' (rApprSTPbm + rSvControlled, PFM_MIN_PRIO) {    /* Controlled */
    "Either the quality or lack of being Controlled is the source of the Objective Characters' problems.  For
example, placing a drug on the controlled substance list actually increases addition; the more a galactic empire tightens
its grip, the more star systems slip through its fingers; a petty cash drawer without sufficient controls in always
empty."
};

resource 'CNTX' (rApprMCPbm + rSvControlled, PFM_MIN_PRIO) {    /* Controlled */
    "Either the existence or lack of calm is the central problem that causes the Main Character's difficulties.  For
example, calm in the face of tragedy that is mistaken for antipathy; absence of calm causes one to get a low grade on a
test; a calm disposition results in failing a job interview where more enthusiasm is sought; "
    "lack of calm leads to dropping a fly ball when the baseball game is on the line."
};

resource 'CNTX' (rApprMCFoc + rSvControlled, PFM_MIN_PRIO) {    /* Controlled */
    "As a result of their actual motivation, the Main Character focuses on an apparent motivation to engage in or
endure Calm.  For example, because of an inability to deal with life's demands , a man takes heroin to mellow out; as a
result of her fear of a stroke from hypertension, a frenetic woman endures a calm vacation; "
    "because of his wish to infiltrate a cult and expose the leader as a brainwashing capitalist, a spy endures a
meditative indoctrination; because of a mid-life crisis in which a woman regrets the sacrifices she has made to gain
power in the Industry, she pipes soothing, limp music throughout her place of business."
};


    /* . . . . . . . . . . . . . . . . . . . . . . . */


resource 'CNTX' (rApprSTPbm + rSvDeduction, PFM_MIN_PRIO) {     /* Deduction */
    "Either the existence or lack of Deduction is the source of the Objective Characters' problems.  For example,
failure to deduce the truth behind a key executive's abrupt resignation allows him to go free with his embezzled gains; a
child's deduction that his parent's don't love him causes him to run away; "
    "a shepherd's failure to deduce that a mountain lion is tracking him loses most of the herd to the ravenous
beast."
};

resource 'CNTX' (rApprMCPbm + rSvDeduction, PFM_MIN_PRIO) {     /* Deduction */
    "The source of the main character's drive is deduction.  For example, an inspector driven to deduce the culprit
behind a theft causes the guilty party to seek the inspector's demise; a general driven to deduce the enemy's next move
falls into a trap set by the enemy; a clergyman lacking the drive to deduce the existence of "
    "God in the workings of a catastrophe begins losing his faith; an engineer lacking the drive to deduce that his
employers are illegally polluting the environment causes his unborn child to suffer birth defects."
};

resource 'CNTX' (rApprMCFoc + rSvDeduction, PFM_MIN_PRIO) {     /* Deduction */
    "As a result of their actual motivation, the Main Character focuses on an apparent motivation to engage in or
endure Deduction.  For example, because a girl can not find meaning in her mother's death , she uses deduction to
pinpoint the physical cause; because a man is guilty of a crime but does not want to be caught, "
    "he aids a detective in deducing the culprit (who he has framed); because a man was beaten as a child and feels
responsible, he grows up trying to deduce his shortcomings; as a result of having lived in a lunatic asylum, a man
deduces great plots at work to put him back in."
};

    /* . . . . . . . . . . . . . . . . . . . . . . . */


resource 'CNTX' (rApprSTPbm + rSvDesireElem, PFM_MIN_PRIO) {    /* Desire Element */
    "Either the existence or lack of Desire is the source of the Objective Characters' problems.  For example, a
street gang's desire for revenge causes a gang war; a housewife's desire for self-improvement alienates her friends; a
soldier's lack of desire to fight jeopardizes his comrades."
};

resource 'CNTX' (rApprMCPbm + rSvDesireElem, PFM_MIN_PRIO) {    /* Desire Element */
    "The source of the main character's drive is desire.  For example, a man driven to desire a beautiful woman's
love loses his job; a vigilante driven to desire vengeance against the murderers of his family makes himself an outlaw
pursued by the police; a juvenile delinquent lacking the drive to desire reconciliation with his "
    "parents finds himself on the streets; a wife lacking the drive to desire having a child causes a rift with her
husband."
};

resource 'CNTX' (rApprMCFoc + rSvDesireElem, PFM_MIN_PRIO) {    /* Desire Element */
    "As a result of their actual motivation, the Main Character focuses on an apparent motivation to engage in or
endure Desire.  For example, as a result of a low self-image, a woman desires the presence of a good looking man at her
school reunion; because a woman is afraid of being alone, she seeks escape and companionship in sexual desire; "
    "as a result of having been abandoned as a child and feeling unlovable, a woman desires sex without intimacy; as
a result of wanting to find the murderer, Oedipus endures his own desire to sleep with his mother and kill his father."
};

    /* . . . . . . . . . . . . . . . . . . . . . . . */


resource 'CNTX' (rApprSTPbm + rSvDetermination, PFM_MIN_PRIO) {         /* Determination */
    "Either the existence or lack of Determination is the source of the Objective Characters' problems.  For
example, a court's determination that a mother is unfit, awards sole custody to their father who then molests them; a
woman's determination that her dog was responsible for the broken vase lands the poor beast "
    "in the pound (when the cats really did it!); a coroner's failure to determine a cause of death lets a murderer
go free."
};

resource 'CNTX' (rApprMCPbm + rSvDetermination, PFM_MIN_PRIO) {         /* Determination */
    "The source of the main character's drive is determination.  For example, a daughter driven to determine who
killed her father also gets targeted by the murderer; a student driven to determine who in her town were Nazi
sympathizers becomes ostracized by the towns people; a boy driven to determine if a girl likes him asks around "
```

```
        "and creates gossip which repulses the girl; a traveler, lacking a drive to determine which is the right way to
go by inquiring at a gas station, drives on and becomes even more lost."
};

resource 'CNTX' (rApprMCFoc + rSvDetermination, PFM_MIN_PRIO) {          /* Determination */
        "As a result of their actual motivation, the Main Character focuses on an apparent motivation to engage in or
endure Determination.  For example as a result of his need to impress his father, a boy determines that he must excel in
school;  because her mother's marriage ended unhappily, a woman determines that men cannot be trusted;  "
        "because a woman does not want to make more money than her husband, she endures the determination of her
associates that she has no potential; as a result of wanting to prove that she is not inferior, a woman determines to
become president of the company; as a result of wanting to stay out of boarding school, a girl determines not to get
caught lying to her parents."
};

     /* * * * * * * * * * * * * * * * * * * * * * */

resource 'CNTX' (rApprSTPbm + rSvDisbelief, PFM_MIN_PRIO) {     /* Disbelief */
        "Either the existence or lack of Determination is the source of the Objective Characters' problems.  For
example, a court's determination that a mother is unfit, awards sole custody to their father who then molests them; a
woman's determination that her dog was responsible for the broken vase lands the poor beast in the "
        "pound (when the cats really did it!); a coroner's failure to determine a cause of death lets a murderer go
free."
};

resource 'CNTX' (rApprMCPbm + rSvDisbelief, PFM_MIN_PRIO) {     /* Disbelief */
        "The source of the main character's drive is disbelief.  For example, an attorney driven to disbelieve her
father was a Nazi war criminal undermines her own effectiveness when she tries to defend him in court; a husband driven
to disbelieve his wife is having an affair furthers the destruction of their marriage; a mother "
        "lacking the drive to disbelieve her constantly lying son is faced with him failing school because he misled her
into thinking how well he was doing; a newly-arrived immigrant to the U.S. lacks the drive to disbelieve the American
Dream and becomes shackled to a sweatshop."
};

resource 'CNTX' (rApprMCFoc + rSvDisbelief, PFM_MIN_PRIO) {     /* Disbelief */
        "As a result of their actual motivation, the Main Character focuses on an apparent motivation to engage in or
endure Disbelief.  For example, as a result of being egocentric, a man refuses to believe in his own mortality, because a
boy thinks he should be able to do whatever he wants, he refuses to believe in his accountability for his actions; "
        "because a young woman still thinks that her father is perfect, she refuses to believe that he has killed
himself; as a result of his need to get a ship, Christopher Columbus does not believe the earth is flat but round."
};

     /* * * * * * * * * * * * * * * * * * * * * * */

resource 'CNTX' (rApprSTPbm + rSvEffect, PFM_MIN_PRIO) {          /* Effect */
        "Either the existence or lack of Effect is the source of the Objective Characters' problems.  For example, a
parent's constant threats are just hot air; a perfect attendance record requires sacrifices by members of a club; a lower
smog level requires less efficient factories."
};

resource 'CNTX' (rApprMCPbm + rSvEffect, PFM_MIN_PRIO) {          /* Effect */
        "The source of the main character's drive is effect.  For example, a television film critic driven to effect a
policy to keep old movies from being colorized is canned by the owner of the station, who hold an interest in a
colorizing company; a deposed king driven to effect freedom for his former subjects must run from "
        "assassination attempt on his life at the hands of the current tyrant; a chemical company executive lack the
drive to effect an expensive waste-disposal system which leads to government sanctions; an insurance salesman lacking the
drive to effect a con loses his job."
};

resource 'CNTX' (rApprMCFoc + rSvEffect, PFM_MIN_PRIO) {          /* Effect */
        "As a result of their actual motivation, the Main Character focuses on an apparent motivation to engage in or
endure Effect.  For example, because a woman is afraid that she is a wallflower, she seeks to have a visible effect on
everyone she sees; as a result of a need to evade deep emotions, a young man concerns himself with the effects "
        "he has on young girls; because a millionaire lacks meaning in his life, he becomes involved with the impressive
effects of his money; because a man believe that his the present is horrible and unbearable, he looks to the effects of
his actions as a justification for persevering."
};

     /* * * * * * * * * * * * * * * * * * * * * * */

resource 'CNTX' (rApprSTPbm + rSvEnding, PFM_MIN_PRIO) {          /* Ending */
        "Either the existence or lack of an Ending is the source of the Objective Characters' problems.  For example,
just before years of research are about to pay off, a university closes down a test facility; six P.O.W.s escape during a
war but are always haunted with the unanswered question of what happened to those they left behind."
};

resource 'CNTX' (rApprMCPbm + rSvEnding, PFM_MIN_PRIO) {          /* Ending */
        "The source of the main character's drive is ending.  For example, a diplomat driven to end a war becomes mired
in negotiations with both sides who decline all compromises; a husband driven to end an adulterous relationship with a
mistress  who reacts by trying to destroy his life; an African-American woman having a lack of "
        "drive to end her relationship with a Caucasian man suffers disdain from her community; a butler lacking the
drive to end his career and retire can no longer manage his duties."
};

resource 'CNTX' (rApprMCFoc + rSvEnding, PFM_MIN_PRIO) {          /* Ending */
        "As a result of their actual motivation, the Main Character focuses on an apparent motivation to engage in or
endure Ending.  For example, because a woman is frustrated by her work, she decides that she is not really cut out to
work and quits her job; as a result of not feeling lovable, a man realizes that he has never loved "
        "anyone and ends his life ; because a woman is afraid of commitment, she continuously ends relationships."
};

     /* * * * * * * * * * * * * * * * * * * * * * */

resource 'CNTX' (rApprSTPbm + rSvEquity, PFM_MIN_PRIO) {          /* Equity */
        "Either the existence or lack of Equity is the source of the Objective Characters' problems.  For example, a
society's desire for intellectual equity causes those who show superior intelligence to be injected with brain damaging
drugs;  lack of equity in the pay of civil servants in neighboring cities, causes a mass migration in "
        "top-notch personnel; a mother's attempts at equity by giving equally sized pieces of cake to all her variously
sized children results in waste at one end of the scale and deficiencies at the other."
};

resource 'CNTX' (rApprMCPbm + rSvEquity, PFM_MIN_PRIO) {          /* Equity */
        "The source of the main character's drive is equity.  For example, a city councilwoman driven to achieve equity
between blacks and whites gets threats to her family from the Klu Klux Klan; a secretary driven to achieve equity in
salary without regard to gender is fired by his boss for interference in company decision-making; "
        "a community leader has lacking the drive to achieve equity between a big company and a labor union precipitates
rioting; a mobster lacking the of drive to achieve equity among the various underworld syndicates becomes a target in a
gang war."
};
```

```
resource 'CNTX' (rApprMCFoc + rSvEquity, PFM_MIN_PRIO) {        /* Equity */
        "As a result of their actual motivation, the Main Character focuses on an apparent motivation to engage in or
endure Equity.  For example, because a man refuses to acknowledge differences between people and their experiences, he
tries to create equity regardless of individual needs; as a result of having a chip on his shoulder, "
        "a man focuses on attempts to force him to endure equity;  as a result of being tortured as a political
prisoner, a man wishes to become a policeman; as a result of being the black sheep of her family, a young mother is
concerned with guaranteeing equity to her own children. "
};

     /* * * * * * * * * * * * * * * * * * * * * * */

resource 'CNTX' (rApprSTPbm + rSvEvaluation, PFM_MIN_PRIO) {   /* Evaluation */
        "Either the existence or lack of Evaluation is the source of the Objective Characters' problems.  For example, a
housewife's evaluation of whether to take a job against her husband's wishes causes tension among all family members;
lack of evaluation of an important contract puts a business at risk for major losses; "
        "a teacher's evaluation of her student, the son of her best friend, causes a rift between their families; a
doctor's lack of evaluation of a patient's symptoms results in his hospital being sued."
};

resource 'CNTX' (rApprMCPbm + rSvEvaluation, PFM_MIN_PRIO) {   /* Evaluation */
        "The source of the main character's drive is evaluation.  For example, a rock musician driven to evaluate his
hedonistic lifestyle discovers great dissatisfaction with it; a heterosexual driven to evaluate the military's policy on
gays has to face the prejudice of his peers; "
        "a young Japanese woman lacking the drive to evaluate getting married has a hard time dealing with her parents
trying to arrange a marriage for her; an orphaned pickpocket lacking the drive to evaluate the ethics of his actions
precipitates his own capture and punishment."
};

resource 'CNTX' (rApprMCFoc + rSvEvaluation, PFM_MIN_PRIO) {   /* Evaluation */
        ""
};

     /* * * * * * * * * * * * * * * * * * * * * * */

resource 'CNTX' (rApprSTPbm + rSvExpectation, PFM_MIN_PRIO) {  /* Expectation */
        "Either the existence or lack of Expectation is the source or the Objective Characters' problems.  For example,
a police officer whose drug dealer brother expects him to look the other way is caught between his brother's expectation
and his police friends' worry over his doing his duty; a husband, not expecting a surprise "
        "birthday party, walks into it with his mistress, embarrassing friends and family; elderly parents expecting
their grown children to welcome their visit find them too busy to spend time with them; a king, not expecting the
neighboring kingdom to be a threat, suddenly finds he and his kingdom ill prepared for war."
};

resource 'CNTX' (rApprMCPbm + rSvExpectation, PFM_MIN_PRIO) {  /* Expectation */
        "The source of the main character's drive is expectation.  For example, a harsh basketball coach driven to
expect victories  puts pressure on the team which keeps them from performing well; a bicyclist driven to expect fair play
from everyone becomes an easy victim; "
        "a college student lacking the drive to expect good job opportunities upon graduating fails to do well in
school; an assembly line worker lacking the drive to expect a fortuitous future turns to a dangerous life of crime."
};

resource 'CNTX' (rApprMCFoc + rSvExpectation, PFM_MIN_PRIO) {  /* Expectation */
        ""
};

     /* * * * * * * * * * * * * * * * * * * * * * */

resource 'CNTX' (rApprSTPbm + rSvFaith, PFM_MIN_PRIO) {        /* Faith */
        "Either the existence or lack of Faith is the source of the Objective Characters' problems.  For example, a
philosophy major having faith he can get a job after graduation is unable to find work making his family support him; a
gay man lacking faith in his parents accepting his "
        "homosexuality pretends to have a girlfriend but finds his parents pressuring him to marry her; a girl having
faith in the existence of a unicorn in the woods behind her house spends all her time looking for it worrying her
parents; a crazed serial killer lacking faith in all humanity presents a daunting task for the authorities."
};

resource 'CNTX' (rApprMCPbm + rSvFaith, PFM_MIN_PRIO) {        /* Faith */
        "The source of the main character's drive is faith.  For example, a knight driven to have faith in his king
performs evil deeds under the king's command; a Hindu woman driven to have faith in her religious doctrines splits with
her Muslim lover; a woman lacking the drive to have faith that her husband will return "
        "from war remarries and is caught in a bind when her first husband does return; a cleric lacking the drive to
have faith in his religion's deity find that his deity has laid a curse upon him to teach him a lesson."
};

resource 'CNTX' (rApprMCFoc + rSvFaith, PFM_MIN_PRIO) {        /* Faith */
        ""
};

     /* * * * * * * * * * * * * * * * * * * * * * */

resource 'CNTX' (rApprSTPbm + rSvFeeling, PFM_MIN_PRIO) {      /* Feeling */
        "Either the existence or lack of Feeling is the source of the Objective Characters' problems.  For example,
feelings between three people causes a problematic love triangle; the lack of feelings between a husband and wife breaks
up their family; an undercover cop having feelings for the members of the criminal gang he has infiltrated "
        "makes it difficult to betray them; the lack of feelings between two detectives makes it difficult for them to
work together and crack the case."
};

resource 'CNTX' (rApprMCPbm + rSvFeeling, PFM_MIN_PRIO) {      /* Feeling */
        "The source of the main character's drive is feeling.  For example, a woman driven to feel fear of men suffers
extreme paranoia when she moves into an apartment building filled with male tenants; a man driven to feel lust for his
brother's wife precipitates a scandal; a teenager lacking the drive to feel compassion for a girl "
        "he dates on a dare, hurts her feelings; a father lacking the drive to feel care for a son his wife wanted to
adopt causes tension in the family."
};

resource 'CNTX' (rApprMCFoc + rSvFeeling, PFM_MIN_PRIO) {      /* Feeling */
        ""
};

     /* * * * * * * * * * * * * * * * * * * * * * */

resource 'CNTX' (rApprSTPbm + rSvHelp, PFM_MIN_PRIO) {         /* Help */
        "Either the existence or lack of Help is the source of the Objective Characters' problems.  For example, a
bumbling producer trying to help makes it difficult for a director and crew to finish their film; a movie star's
unwillingness to help a sick boy by visiting him causes the boy's family anguish; "
```

```
        "a young child trying to help his police officer father apprehend criminals puts himself and his father into
more danger; a bank robber refusing to help unless he gets a bigger share puts his ring in a predicament."
};

resource 'CNTX' (rApprMCPbm + rSvHelp, PFM_MIN_PRIO) {         /* Help */
        "The source of the main character's drive is help.  For example, a philanthropist driven to help a motorist
whose car has broken down on the freeway discovers him to be a criminal on the run who then steals her car; a principal
driven to help at an inner city school earns the enmity of the gang that runs the school; "
        "an ex-sheriff lacking the drive to help a village beset by outlaws suffers guilt for not honoring his duty; a
group of crooks lacking the drive to help each other after a bank heist because each wants all the money allow the police
being able to capture them more easily."
};

resource 'CNTX' (rApprMCFoc + rSvHelp, PFM_MIN_PRIO) {         /* Help */
        ""
};

    /* . . . . . . . . . . . . . . . . . . . . . . */

resource 'CNTX' (rApprSTPbm + rSvHinder, PFM_MIN_PRIO) {       /* Hinder */
        "Either the existence or lack of Hinder is the source of the Objective Characters' problems.  For example, a
knight is hindered by a dragon in trying to obtain a magic potion which will cure the plague in the kingdom;an map maker
afraid to hinder a despot's rule by showing rebels the location of an "
        "underground tunnel to assassinate him keeps the land under tyranny; a composer is hindered by his young son in
trying to get a composition finished on time for a festival; a major unable to hinder the enemy's advance results in he
and his men being captured."
};

resource 'CNTX' (rApprMCPbm + rSvHinder, PFM_MIN_PRIO) {       /* Hinder */
        "The source of the main character's drive is hindrance.  For example, a gold miner driven to hinder rivals from
finding his rich plot of land kills his associates but becomes wanted for murder; a mother driven to hinder her daughter
from entering a marriage she disapproves of loses her daughter's love; "
        "a martial arts master having retired to a life of contemplation lacks the drive to hinder another evil martial
arts fighter but regrets it when the evil one murders a close friend; a coward lacking a drive to hinder others bullying
him is shamed in front of all his friends."
};

resource 'CNTX' (rApprMCFoc + rSvHinder, PFM_MIN_PRIO) {       /* Hinder */
        ""
};

    /* . . . . . . . . . . . . . . . . . . . . . . */

resource 'CNTX' (rApprSTPbm + rSvHunch, PFM_MIN_PRIO) {        /* Hunch */
        "Either the use of lack of a Hunch is the source of the Objective Characters' problems.  For example, acting on
a hunch, a banker puts the days receipts on Sea Biscuit to place, and wrecks financial havoc in the community; failing to
heed a hunch a group of tourists find themselves "
        "going down with the ship; on a hunch, a herd of elephants leave a confining thicket, only to be set upon by
lions."
};

resource 'CNTX' (rApprMCPbm + rSvHunch, PFM_MIN_PRIO) {        /* Hunch */
        "The source of the main character's drive is a hunch.  For example, a detective is driven by a hunch to accuse a
suspect alerts the real criminal allowing him to escape; a gambler is driven by hunch that this is his lucky day plays
his entire grubsteak on the slot machines but he is wrong and loses everything; "
        "a secret service agent unwilling to act on a hunch that a man is the sought-after assassin is unable to keep
the president from being wounded; the starship captain, unwilling to act on a hunch that the killer alien is still in the
room enters and gets attacked."
};

resource 'CNTX' (rApprMCFoc + rSvHunch, PFM_MIN_PRIO) {        /* Hunch */
        ""
};
    /* . . . . . . . . . . . . . . . . . . . . . . */

resource 'CNTX' (rApprSTPbm + rSvInaction, PFM_MIN_PRIO) {     /* Inaction */
        "Either the existence or lack of Inaction is the source of the Objective Characters' problems.  For example, a
police sergeants inaction in an unsolved murder of a prostitute causes public relation problems for the whole department;
a group of hikers unable to stand still are attacked and "
        "severely mauled by a bear; a governor's inaction during a natural disaster leaves thousands homeless and
hungry."
};

resource 'CNTX' (rApprMCPbm + rSvInaction, PFM_MIN_PRIO) {     /* Inaction */
        "The source of the main character's drive is inaction.  For example, a writer's inaction on finishing his latest
book leads him to lose his publisher; a drug addict's inaction in a rehabilitation program leads to his sister starting
to take drugs; a drunkard lacking the drive to just sit still at a party does a striptease at "
        "and is very embarrassed the following day; a radical thinker lacking the drive to be inactive spouts his
political philosophies and is apprehended by the totalitarian authorities."
};

resource 'CNTX' (rApprMCFoc + rSvInaction, PFM_MIN_PRIO) {     /* Inaction */
        ""
};

    /* . . . . . . . . . . . . . . . . . . . . . . */

resource 'CNTX' (rApprSTPbm + rSvInduction, PFM_MIN_PRIO) {    /* Induction */
        "Either the existence or lack of Induction is the source of the Objective Characters' problems.  For example,
scientists failing to induce the characteristics of a new virus are unprepared when it eats through their protective
shielding and infects a small college town; "
        "a support group of phobics spends so much time imagining what might happen they don't get around to supporting
one another."
};

resource 'CNTX' (rApprMCPbm + rSvInduction, PFM_MIN_PRIO) {    /* Induction */
        "The source of the main character's drive is induction.  For example, some mischievous children driven to induce
that since their tired mother did not get onto them for making a mess, they might be able to make more messes but get in
trouble;a nerd driven to induce that his finding a girlfriend might make him more popular in school "
        "becomes even more unpopular because he has cornered the best babe; a rancher lacking a drive to induce that not
all Indians might not be his enemies drives off those camped nearby and faces retaliation by the entire tribe; an ice
skater lacking a drive to induce that all judges might not like her "
        "coach who stresses technique over style loses the competition despite landing all her jumps."
};
```

```
resource 'CNTX' (rApprMCFoc + rSvInduction, PFM_MIN_PRIO) {      /* Induction */
        ""
};

    /* * * * * * * * * * * * * * * * * * * * * * */

resource 'CNTX' (rApprSTPbm + rSvInequity, PFM_MIN_PRIO) {      /* Inequity */
        "The existence or lack of Inequity is the source of the Objective Characters' problems.  For example, the rift between pay scales for men and women leads to wives unionizing and demanding payment for household duties; unfair advantages given to a teacher's pet stir up animosity in a class of emotionally disturbed children; "
        "a drive to avoid inequity of opportunity makes the same opportunities available to all, when in truth, different factions have different needs."
};

resource 'CNTX' (rApprMCPbm + rSvInequity, PFM_MIN_PRIO) {      /* Inequity */
        "The source of the main character's drive is inequity.  For example, a lumber company executive driven to take from the environment and put nothing back inequity in nature gets overrun by giant termites; a president driven to create inequity in the arms race starts a war when the opposing country cannot keep up and attempts a preemptive strike; "
        "a millionaire lottery winner lacking a drive of inequity begins giving his money away but soon finds himself hounded by too many requests to handle; a king lacking the drive to be inequitable devises a riddle for suitors seeking his daughter's hand and cannot help but accept the vile winner of the contest."
};

resource 'CNTX' (rApprMCFoc + rSvInequity, PFM_MIN_PRIO) {      /* Inequity */
        ""
};

    /* * * * * * * * * * * * * * * * * * * * * * */

resource 'CNTX' (rApprSTPbm + rSvInertia, PFM_MIN_PRIO) {      /* Inertia */
        "The existence or lack of Inertia is the source of the Objective Characters' problems.  For example, the unresponsive nature of a bureaucracy mires needed relief efforts in red tape; traditions of a once great religious order no longer speak to the times; a key actor in a "
        "long-running Broadway play can't seem to give the same performance twice, which throws everyone else's timing off."
};

resource 'CNTX' (rApprMCPbm + rSvInertia, PFM_MIN_PRIO) {      /* Inertia */
        "The source of the main character's drive is inertia.  For example, a boy driven by the inertia of his love spends all his savings on gifts for his girlfriend who wants to break up; a gambler driven by inertia of her confidence bets again and loses all her money; a boxer lacking a drive to maintain inertia in his training loses his title; "
        "an assemblyline worker lacking a drive of inertia to keep laboring for menial pay gets fired."
};

resource 'CNTX' (rApprMCFoc + rSvInertia, PFM_MIN_PRIO) {      /* Inertia */
        ""
};

    /* * * * * * * * * * * * * * * * * * * * * * */

resource 'CNTX' (rApprSTPbm + rSvKnowledgeElem, PFM_MIN_PRIO) {      /* Knowledge Element */
        "The existence or lack of Knowledge is the source of the Objective Characters' problems.  For example, not knowing of his past as a molester, regents hire a man as athletic director of an all girl's school;  knowing English, a crashed America Pilot is captured in wartime Germany when his knowledge of English is discovered; "
        "not knowing that she carries the disease, a woman with AIDS infects the men she cares for most."
};
resource 'CNTX' (rApprMCPbm + rSvKnowledgeElem, PFM_MIN_PRIO) {      /* Knowledge Element */
        "Either the existence or lack of knowledge is the central problem that causes the Main character's difficulties. For example, not knowing one has AIDS leads to killing one's friends; not knowing a person is a pen pal allows for negative treatment of this person; "
        "knowing secret spy microfilm is contained in a figurine results in being charged with treason; not knowing someone is a murderer puts one in imminent danger."
};

    /* * * * * * * * * * * * * * * * * * * * * * */

resource 'CNTX' (rApprSTPbm + rSvLogic, PFM_MIN_PRIO) {      /* Logic */
        "The existence or lack of Logic is the source of the Objective Characters' problems.  For example, a ruling council relying on a rebel force to act logically loses town after town to the revolution; a team of four scientists convinced that an alien must see the logic in establishing communication is eaten - breakfast, "
        "lunch, dinner and midnight snack; lacking a logical approach, a wagon train fails to chart the best course to California."
};
resource 'CNTX' (rApprMCPbm + rSvLogic, PFM_MIN_PRIO) {      /* Logic */
        "Either the existence or lack of logic is the central problem that causes the Main character's difficulties. for example, logic in overabundance causes annoyance from more emotional friends; "
        "lack of logic impedes solving a computer programming problem; logic that keeps one from understanding an argument of religious faith; lack of logic results in overlooking a clue in a mystery."
};

    /* * * * * * * * * * * * * * * * * * * * * * */

resource 'CNTX' (rApprSTPbm + rSvNonAcceptance, PFM_MIN_PRIO) {      /* NonAcceptance */
        "The quality of lack of Non-acceptance is the source of the Objective Characters' problems.  For example, a minority groups refusal to accept white members leads to allegations of prejudice;  a union's non-acceptance of new technology saves jobs, but drives up prices for consumers and loses market "
        "share to more adaptable foreign interests; lacking a degree of non-acceptance, the army becomes populated with low-lives."
};
resource 'CNTX' (rApprMCPbm + rSvNonAcceptance, PFM_MIN_PRIO) {      /* NonAcceptance */
        "The source of the main character's drive is non-acceptance.  For example, a commander driven to not accept sending his men on a suicide mission faces a quandary of how else to succeed; a parent driven to not accept his son's low grades distances his son from him by driving him too hard; "
        "a young girl lacking a drive to not accept being friends with the newly arrived black family in a very conservative town is ostracized by her prejudiced friends; a very kind-hearted publisher lacking a drive to not accept mediocre articles loses his job."
};

    /* * * * * * * * * * * * * * * * * * * * * * */
```

```
resource 'CNTX' (rApprSTPbm + rSvNonAccurate, PFM_MIN_PRIO) {  /* NonAccurate */
        "The quality or lack of being Non-accurate is the source of the Objective Characters' problems.  For example, a sub-contractor working with outdated non-accurate machinery provides faulty parts to commercial aircraft; a surgeon failing to be non-accurate causes many deaths when "
        "they are forced to work in a triage system; a tribe of hunters unconcerned with being accurate becomes a tribe of gatherers."
};
resource 'CNTX' (rApprMCPbm + rSvNonAccurate, PFM_MIN_PRIO) {  /* NonAccurate */
        "The source of the main character's drive is non-accuracy.  For example, a brainy girl driven to not be accurate gets her in trouble with her parents when they see her poor test grade; a pacifist drafted into combat driven to be nonaccurate in his shooting to avoid hitting anyone but gets "
        "in trouble with his sergeant; a boy driven to bowl non-accurately so as to allow his girlfriend to win makes her angry at his patronizing of her; a casting agent lacking a drive to be non-accurate in casting a lead actor sticks with strict criterion which no one can satisfy."
};

     /* . . . . . . . . . . . . . . . . . . . . . . */

resource 'CNTX' (rApprSTPbm + rSvOppose, PFM_MIN_PRIO) {        /* Oppose */
        "The existence or lack of Opposition is the source of the Objective Characters' problems.  For example, lack of verbal opposition to an upstart military leader causes the subjugation of a whole country; opposition to a water resources bill by industry defeats the measure allowing dangerous chemicals to "
        "continue to spew into the mouths of babes; opposition to the inclusion of gays in a holiday parade re-opens rifts in society that had just begun to heal."
};
resource 'CNTX' (rApprMCPbm + rSvOppose, PFM_MIN_PRIO) {        /* Oppose */
        "The source of the main character's drive is opposition.  For example, a jealous man, driven to oppose his rival for the hand of a beautiful woman, extorts the rival but the woman discovers his scheme and loses respect for him; a President driven to oppose a genocidal dictator in a "
        "neighboring country finds himself committing military forces in an unpopular war; a union leader lacking a drive to oppose the corporate boss is thrown out by his union; a woman lacking a drive to oppose her boyfriend's constantly making decisions for her suffers from feeling belittled."
};

     /* . . . . . . . . . . . . . . . . . . . . . . */

resource 'CNTX' (rApprSTPbm + rSvOrder, PFM_MIN_PRIO) {        /* Order */
        "The existence or lack of Order is the source of the Objective Characters' problems.  For example, British troops are decimated by revolutionary American minutemen because the English are only trained to fight in ranks; a company loses control of its best selling product because important documents cannot be found on the presidents cluttered desk in time; "
        "a curriculum designed with every topic in its place fails to provide an opportunity for synthesis, leaving students knowledgeable but without ability."
};
resource 'CNTX' (rApprMCPbm + rSvOrder, PFM_MIN_PRIO) {        /* Order */
        "The source of the main character's drive is order.  For example, a collector driven to set tax payments in order faces difficulties from cunning evaders; a sheriff driven to establish order in his town faces opposition from extorting bandits; a slob lacking a drive to order his paperwork cannot locate a winning lottery ticket; a navy commander lacking a drive to "
        "establish order for his men during shore-leave encounters chaos during an enemy attack."
};

     /* . . . . . . . . . . . . . . . . . . . . . . */

resource 'CNTX' (rApprSTPbm + rSvPerception, PFM_MIN_PRIO) {  /* Perception */
        "The existence or lack of Perception is the source of the Objective Characters' problems.  For example, a postal worker's perception that the system is conspiring against him leads to petty acts of vengeance escalating into an all out semi-automatic attack; a school of dolphins failing to perceive a tuna net as a danger, become entangled and fight for their lives; "
        "a group of campers perceiving a woman living in a cabin in the woods to be a sweet old lady end up quartered, stewed and canned."
};
resource 'CNTX' (rApprMCPbm + rSvPerception, PFM_MIN_PRIO) {  /* Perception */
        "The source of the main character's drive is perception.  For example, a woman driven to perceive her husband's friendship with another woman as adultery makes her husband angry when he discovers her distrust; a voyeur driven to perceive the sexual role-playing activities in the apartment across his window as murder reports it to the police and is embarrassed by the mistake; "
        "a woman driven to perceive her feminine male friend as gay sets him up with another man without telling him and gets him angry at her; a husband lacking a drive to perceive his wife as philandering wakes up alone one morning."
};

     /* . . . . . . . . . . . . . . . . . . . . . . */

resource 'CNTX' (rApprSTPbm + rSvPossibility, PFM_MIN_PRIO) {  /* Possibility */
        "The existence or lack of Possibility is the source of the Objective Characters' problems.  For example, the possibility that ground water might be contaminated leads a community to stop bathing; the lack of possibility for parole causes a rash of suicides at a correctional facility;  the possibility that life exists on Mars spawns mass hysteria throughout the country."
};
resource 'CNTX' (rApprMCPbm + rSvPossibility, PFM_MIN_PRIO) {  /* Possibility */
        "The source of the main character's drive is possibility.  For example, a scientist driven by the possibility of a cure for his terminal illness subjects himself to dangerous chemicals turning him into a rampaging mutant monster; an imaginative child driven by the possibility of discovering an alien from space in the woods behind his house spends all his time obsessing over "
        "it causing his family to worry; a woman lacking a drive to entertain the possibility that her lover is still alive ponders suicide; an emergency rescuer lacking a drive to entertain the possibility that there are any survivors left after an earthquake leaves some behind."
};

     /* . . . . . . . . . . . . . . . . . . . . . . */

resource 'CNTX' (rApprSTPbm + rSvPotentiality, PFM_MIN_PRIO) {        /* Potentiality */
        "The existence or lack of Potentiality is the source of the Objective Characters' problems.  For example, an investment firm acting on the potential of a promising new technology goes belly up when nothing pans out; a scrap dealer seeing the potential in an old, run-down building buys it for next to nothing and makes a fortune on the copper wires and pipes; "
        "the educational system failing to see the potential in inner city children lets their talents lie fallow, thereby preventing a cure for cancer, a masterful treatise on human rights, and an inexhaustible energy supply."
};
resource 'CNTX' (rApprMCPbm + rSvPotentiality, PFM_MIN_PRIO) {        /* Potentiality */
```

```
        "The source of the main character's drive is potentiality.  For example, a rich man driven by the potential that
the woman of his dreams may like him spends lots of money on her only to discover she is using him only for his money; a
gambler driven by the potential of winning continues to gamble despite always losing; a police officer driven by the
potential of getting "
        "a promotion takes extreme risks in apprehending his suspects but gets critically wounded in the process; a
painter lacking a drive to see the potential of living up to his latest and greatest masterpiece retires but then feels
his career to be incomplete."
};


     /* . . . . . . . . . . . . . . . . . . . . . . . . */


resource 'CNTX' (rApprSTPbm + rSvProaction, PFM_MIN_PRIO) {     /* Proaction */
        "The existence or lack of Proaction is the source of the Objective Characters' problems.  For example, an off-
duty fireman's failure to take action against a fire-hazard leads to several deaths in an early morning conflagration; a
senator's efforts to prevent the Communist party from blossoming in "
        "the U.S. of A ruins lives and careers; a mad man's first strike against a peaceful neighboring country plunges
the world into war."
};
resource 'CNTX' (rApprMCPbm + rSvProaction, PFM_MIN_PRIO) {     /* Proaction */
        "The source of the main character's drive is proaction.  For example, a composer driven by proaction to get her
son to learn music is met with heavy resistance from the son; a young boy driven by proaction to buy the expensive first
issue of his favorite comic book is unable to earn the money; a property owner lacking a drive of proaction to perform an
exorcism on his land. "
        "a former graveyard, results in its becoming haunted; a teacher lacking a drive of proaction to spend extra time
after class with a failing student feels guilt when the student commits suicide."
};


     /* . . . . . . . . . . . . . . . . . . . . . . . . */


resource 'CNTX' (rApprSTPbm + rSvProbability, PFM_MIN_PRIO) {  /* Probability */
        "The existence or lack of Probability is the source of the Objective Characters' problems.  For example, without
judging the probability of success, a daredevil foolishly boasts he will balance the national budget;  relying on a high
probability of immunity, a doctor contracts a rare disease while treating its victims; assuming a low probability of
winning, "
        "a schoolteacher on vacation in Atlantic City places a bet, then walks off and can't be found when it pays off
at a million dollars."
};
resource 'CNTX' (rApprMCPbm + rSvProbability, PFM_MIN_PRIO) {  /* Probability */
        "The source of the main character's drive is probability.  For example, a mother driven by the probability that
the terrorists who have taken her daughter hostage will kill her whether or not their demands are met agrees to a
dangerous raid on the terrorists which will risk her daughter's life;a thief, driven by the probability of getting caught
by the police by keeping the "
        "loot with him and his gang, hide it but begins to distrust his associates who may return to steal it
themselves; a millionaire driven by the probability his illness will be the death of him commissions a will which starts
a war of vying for his favor among his relatives; a sheriff lacking the drive to see the probability he will die in a
gunfight stands his ground and is mortally wounded."
};


     /* . . . . . . . . . . . . . . . . . . . . . . . . */


resource 'CNTX' (rApprSTPbm + rSvProcess, PFM_MIN_PRIO) {       /* Process */
        "The existence or lack of Process is the source of the Objective Characters' problems.  For example, a chain
letter carrying death threats drives several people into a frenzy; a company with no process in place to handle internal
suggestions loses its market share to a more savvy competitor; a flashy initiation process misleads novices who
ultimately find themselves stuck in a lack-luster organization."
};
resource 'CNTX' (rApprMCPbm + rSvProcess, PFM_MIN_PRIO) {       /* Process */
        "The source of the main character's drive is process.  For example, an unemployed woman driven by the futile
process of the job search in a bad economy loses self-esteem and goes into a depression; a wife driven to engage in the
process of a nasty custody battle steals her children away but is pursued by the authorities; a man lacking a drive to
put up with the bureaucratic process of the judicial system "
        "takes the law into his own hands; the daughter of Indian immigrants lacking a drive to undertake the process of
an Indian marriage finds her parents denouncing her as their daughter."
};


     /* . . . . . . . . . . . . . . . . . . . . . . . . */


resource 'CNTX' (rApprSTPbm + rSvProduction, PFM_MIN_PRIO) {   /* Production */
        "The existence or lack of Production is the source of the Objective Characters' problems.  For example, an
inspired comedian's over-production of clever ideas stalls the schedule of a movie with constant improvements; an
atrophying men's club's lack of production of new services for the community robs them of purpose; "
        "the French bobsled team's lack of production of new techniques results in their disgraceful thromping by the
Jamaicans."
};
resource 'CNTX' (rApprMCPbm + rSvProduction, PFM_MIN_PRIO) {   /* Production */
        "The source of the main character's drive is production.  For example, a manufacturer driven to produce more
goods than he can hope to with his job on the line has a nervous breakdown; a basketball coach driven to produce a
winning team gives payoffs to recruits but gets caught; a wife lacking a drive to produce children has a quarrel with her
husband who wants kids; "
        "a director lacking a drive to produce a studio-dictated film at the cost of his integrity is fired."
};


     /* . . . . . . . . . . . . . . . . . . . . . . . . */


resource 'CNTX' (rApprSTPbm + rSvProjection, PFM_MIN_PRIO) {   /* Projection */
        "The existence or lack of Projection is the source of the Objective Characters' problems.  For example, a
political party's projection that their candidate will win by a landslide slacks off in advertising and is voted out of
office; a third world country's failure to project the birth rate allows its people to reproduce themselves into a
famine; "
        "the media's projection that nuclear war is inevitable leads families to hock all they own so they can build
fallout shelters."
};
resource 'CNTX' (rApprMCPbm + rSvProjection, PFM_MIN_PRIO) {   /* Projection */
        "The source of the main character's drive is projection.  For example, a man driven to project the depth of his
own love onto his girlfriend is deeply hurt to find she does not care about him as much; a woman driven to project her
own critical nature on others is always insecure; a wealthy tycoon lacking a drive to project his cunning on others is
surprised when "
        "one of his rival instigates a corporate takeover of his business; a detective lacking a drive to project his
own ingenuity on the criminal is cheated when the suspect steals the evidence being used as bait and escapes the trap."
};
```

```
/* . . . . . . . . . . . . . . . . . . . . . . . */

resource 'CNTX' (rApprSTPbm + rSvProtection, PFM_MIN_PRIO) {    /* Protection */
	"The existence or lack of Protection is the source of the Objective Characters' problems.  For example, a
motorcycle club whose members refuse to wear helmets gets in a multi-vehicle pile up on Interstate 5 with half their
number dead and the others brain damaged; an over-protective mother ruins the lives of her five children; "
	"buying on margins without stops destroys the fortunes of many prominent families in the 1929 stock market
crash."
};
resource 'CNTX' (rApprMCPbm + rSvProtection, PFM_MIN_PRIO) {    /* Protection */
	""
};

/* . . . . . . . . . . . . . . . . . . . . . . . */

resource 'CNTX' (rApprSTPbm + rSvProven, PFM_MIN_PRIO) {        /* Proven */
	"The quality or lack of being Proven is the source of the Objective Characters' problems.  For example, a car
company's decision to market a new air bag before its effectiveness has been proven causes many deaths; in assuming it to
be proven that the world is round, several ships fall off the edge to their doom; "
	"a firm of attorney's confident their open and shut case is already proven, lose big when a surprise witness
surfaces."
};
resource 'CNTX' (rApprMCPbm + rSvProven, PFM_MIN_PRIO) {        /* Proven */
	"The source of the main character's drive is proven.  For example, a man framed for a robbery, driven to prove
his innocence, goes after the actual thief who then wants to kill him; a prince driven to prove his love for the princess
undertakes a perilous quest which puts his life in danger; a job applicant lacking a drive to "
	"prove his intelligence is passed over for the position; a knight lacking a drive to prove his skills is
banished for cowardice by the king."
};

/* . . . . . . . . . . . . . . . . . . . . . . . */

resource 'CNTX' (rApprSTPbm + rSvPursuit, PFM_MIN_PRIO) {       /* Pursuit */
	"Either the existence or lack of Pursuit is the central problem that causes the story's difficulties.  For
example, pursuit of fame brings emptiness, or not pursuing fame brings emptiness; pursuing a lover causes undo hardship
on one's family, or not pursuing a lover causes undo hardship on one's family; pursuing a treasure causes death and
destruction, "
	"or not pursuing a treasure causes death and destruction, etc."
};

resource 'CNTX' (rApprPLPbm + rSvPursuit, PFM_MIN_PRIO) {       /* Pursuit */
	"The existence or lack of Pursuit is the central problem that causes the difficulties between the Main and
Obstacle Characters.  For example, a husband's lack of pursuing job opportunities creates friction with his wife, or a
wife pursuing her own career opportunities causes friction with her husband; two clergymen from rival denominations
pursue each "
	"others parishioners to prevent their respective churches from being closed due to low attendance, or two
clergymen from rival denominations refuse to pursue new membership in their respective churches hoping that their own
church's poor attendance will allow them to close their doors and move out of the small town; etc."
};

resource 'CNTX' (rApprMCPbm + rSvPursuit, PFM_MIN_PRIO) {       /* Pursuit */
	"The source of the Main Character's drive is Pursuit.  For example, an adventurer is driven to pursue greater
challenges or an adventurer is driven to pursue retirement; a wallflower is driven to pursue companionship or a
wallflower is driven to pursue solitude; a cardinal has a lack of drive to pursue the office of the pope or a cardinal
has a "
	"lack of drive to pursue his duties; a grandmother has a lack of drive to pursue her lifelong dream of becoming
a belly dancer or a grandmother has a lack of drive to pursue better relations with her grandchildren; etc."
};

resource 'CNTX' (rApprOCPbm + rSvPursuit, PFM_MIN_PRIO) {       /* Pursuit */
	"The Obstacle Character's drive is Pursuit.  For example, a business man pursues a sales award, a stalker
pursues potential victims, a housewife pursues inner tranquillity, a baby dinosaur pursues its lost mother, etc."
};

resource 'CNTX' (rApprSTSol + rSvPursuit, PFM_MIN_PRIO) {       /* Pursuit */
	"Either the engaging in or abstaining from Pursuit is the specific solution to the story's difficulties.  For
example, engaging in the pursuit of fame brings fulfillment, or abstaining from the pursuit of fame brings fulfillment;
engaging in the pursuit of a lover brings many benefits to one's family, or abstaining from the pursuit of a lover brings
"
	"many benefits to one's family; engaging in the pursuit of a treasure brings fortune and glory, or abstaining
from the pursuit of treasure brings fortune and glory, etc."
};

resource 'CNTX' (rApprPLSol + rSvPursuit, PFM_MIN_PRIO) {       /* Pursuit */
	"Either the engaging in or abstaining from Pursuit is the specific solution to resolving the difficulties
between the Main and Obstacle Characters.  For example, a husband's pursuit of job opportunities stops his wife from
ragging on him, or a wife's refusal to pursue her own career opportunities creates harmony at home with her husband; "
	"two clergymen from rival denominations choose not to pursue each others parishioners by allowing dual
membership which keeps both churches from closing due to low attendance, or two clergymen from rival denominations
aggressively pursue new membership in their respective churches hoping that the rival church's low attendance will force
them to close their doors and move out of town, etc."
};

resource 'CNTX' (rApprMCSol + rSvPursuit, PFM_MIN_PRIO) {       /* Pursuit */
	"The solution to the Main Character's problem is Pursuit.  For example, pursuing greater challenges satisfies an
adventurer's need for thrills, or pursuing retirement opportunities satisfies an adventurer's need for peace; pursuing
companionship fulfills a wallflower's desire for intimacy, or pursuing solitude fulfills a wallflower's desire for
fantasy; "
	"refusing to pursue the office of the Pope satisfies a cardinal's commitment to help the poor, or refusing to
pursue his official duties fulfills a cardinal's desire for Truth; refusing to pursue her lifelong dream of becoming a
belly dancer teaches a grandmother the value of who she is, or refusing to pursue better relations with her grandchildren
leaves a grandmother free to travel the world; etc."
};

resource 'CNTX' (rApprOCSol + rSvPursuit, PFM_MIN_PRIO) {       /* Pursuit */
	"Pursuit will end the Obstacle Character's drive.  For example, pursuit of a sales award ends a business man's
avoidance of competition, pursuit of potential victims ends a stalker's avoidance of notoriety, pursuit of inner
tranquillity ends a housewife's avoidance of the wild woman archetype, pursuit of its lost mother ends a baby dinosaur's
avoidance of help, etc."
};

resource 'CNTX' (rApprSTFoc + rSvPursuit, PFM_MIN_PRIO) {       /* Pursuit */
	"As a result of the problem, attention is focused on engaging in or enduring Pursuit.  For example, as the
result of the Congress' uncontrolled spending, the President must pursue alternative sources of revenues, or as the
result of Congressional controls on spending, the President is pursued by the media to find solutions to the national
debt; "
```

```
        "because of one man's Faith in God's ability to provide, his entire family finds itself being chased through the
wilderness by a pack of hungry wolves, or because of one man's Disbelief in God's ability to provide, his entire family
finds itself chasing after a herd of animals in the dead of winter; in other words, pursuing or being pursued, chasing "
        "or being chased after, seeking or being sought after, etc."
};

resource 'CNTX' (rApprPLFoc + rSvPursuit, PFM_MIN_PRIO) {        /* Pursuit */
        "As a result of the problem between the Main and Obstacle Characters, attention is focused on the difficulties
of engaging in or enduring Pursuit.  For example, as the result of a teacher's refusal to reconsider a student's
application into the department, the student pursues alternative sponsorship within the department, or because a teacher
"
        "considers a student's application into the department, the student is pursued by other faculty members who want
her in their departments; because of a street vendor's support of a bag lady's alcoholism, the street vendor is pursued
by the bag lady wherever she goes, or because of a street vendor's opposition to a bag lady's alcoholism, the street "
        "vendor pursues the bag lady in an attempt to stop her drinking, etc."
};

resource 'CNTX' (rApprMCFoc + rSvPursuit, PFM_MIN_PRIO) {        /* Pursuit */
        "As a result of their actual motivation, the Main Character focuses on an apparent motivation to engage in or
endure Pursuit.  For example, as the result of his opposition to his parents' choice for potential girlfriends, a pretty
boy endures pursuit by older men for sexual pleasures, or because of his need to support his parents, "
        "a pretty boy pursues wealthy, older men for monetary gratification; because of his lack of faith in the
judicial system, a man feels driven to pursue and murder the members of his family, or because of a lack of disbelief in
her own commitment to her family, a woman endures the pursuit of attentions by a man other than her husband; etc."
};

resource 'CNTX' (rApprOCFoc + rSvPursuit, PFM_MIN_PRIO) {        /* Pursuit */
        "The Obstacle Character's attention is focused on Pursuit.  For example, an instructor focuses on the pursuit of
acceptance into college by her senior class of high school students, a mother focuses on her daughter's pursuit of a
military career, an evil Siamese twin focuses on it's twin's pursuit of separation, "
        "a psychiatrist focuses on a patient's pursuit of lost identity, etc."
};

resource 'CNTX' (rApprSTDir + rSvPursuit, PFM_MIN_PRIO) {        /* Pursuit */
        "To affect a solution, efforts are directed toward engaging in or enduring Pursuit.  For example, in order to
support a planned robbery, a woman must lure the police into chasing her away from the crime scene, or in order to
support a planned robbery, a woman chases away the police from the crime scene by threatening them with a tank; in order
to "
        "oppose the death penalty, an attorney pursues every legal recourse to delay a convicted felon's execution, or
in order to oppose the death penalty, an attorney entraps their opponent into pursuing legal action against her thereby
delaying the execution of her client; etc."
};

resource 'CNTX' (rApprPLDir + rSvPursuit, PFM_MIN_PRIO) {        /* Pursuit */
        "To affect a solution that resolves the difficulties between the Main and Obstacle Characters, efforts are
directed toward engaging in or enduring Pursuit.  For example, in order to gain faith in a new miracle cure, a doctor
pursue proof of a mystic healer's powers, or in order to gain a doctor's disbelief in the infallibility of western
medicine, "
        "a shaman endures the doctor's pursuit of evidence that will prove the shaman to be a charlatan; because a
conservative moralist controls the purse strings for artistic grants, an artist pursues a cleaning up of his image to
gain funding for his project, or because a conservative moralist lacks control over the funding of artistic grants, an
artist "
        "finds himself enduring the moralist's pursuit of pornographic references in his work in order to retain the
funding for his project, etc."
};

resource 'CNTX' (rApprMCDir + rSvPursuit, PFM_MIN_PRIO) {        /* Pursuit */
        "To resolve their apparent motivation of Avoidance, a Main Character's efforts are directed toward engaging in
or enduring Pursuit. For example, to avoid being drafted into the army, a young man pursues different means to cross the
border into Canada; to prevent the release of a genetically engineered virus into the environment, "
        "a scientist pursues various methods of removing the virus from the facility; to avoid offending a superior, an
employee endures the pursuit of an interoffice bowling trophy; to prevent being labeled a bigot, a redneck endures his
own pursuit of an affirmative action law; etc. "
};

resource 'CNTX' (rApprOCDir + rSvPursuit, PFM_MIN_PRIO) {        /* Pursuit */
        "Spurred by other character(s)'s avoidance, the Obstacle Character's efforts are directed toward Pursuit.  For
example, motivated by his wife's avoidance of having children, a husband directs his efforts toward the pursuit of a
surrogate mother, spurred on by a senator's effort to avoid gun control legislation, "
        "a zealot pursues the senator with a semi-automatic assault weapon, spurred by the National Endowment of the
Arts avoidance of controversy, an investigative reporter pursues an exposé on the councils secret dealings with the Moral
Majority, etc."
};

    /* * * * * * * * * * * * * * * * * * * * * * * */


resource 'CNTX' (rApprSTPbm + rSvReevaluation, PFM_MIN_PRIO) {          /* Reevaluation */
        "The existence or lack of Re-evaluation is the source of the Objective Characters' problems.  For example, an
imprisoned ethnic leader's failure to re-evaluate the state of his cause after years in jail, fractures his organization
when he no longer speaks for what his people want today; a publisher's re-evaluation of the book market causes "
        "them to not renew the contracts of several prominent authors; the police department's failure to re-evaluate
the ethnic mix of the community is at a loss to explain the increasing enmity toward its all white force."
};
resource 'CNTX' (rApprMCPbm + rSvReevaluation, PFM_MIN_PRIO) {          /* Reevaluation */
        "The source of the main character's drive is re-evaluation.  For example, a husband driven to re-evaluate his
marriage during a mid-life crisis leads to dissatisfaction and divorce; a secretary driven to re-evaluate her career
goals when she becomes dissatisfied with her current job decides to pursue her dream of "
        "becoming a writer but then finds it harder than she expected; a nymphomaniac lacking a drive to re-evaluate
having sex without contraception contracts a venereal disease; a farm boy, lacking a drive to re-evaluate moving to the
big city to find work despite his parents pleas to the contrary, finds he cannot stand it once he is there."
};


    /* * * * * * * * * * * * * * * * * * * * * * * */


resource 'CNTX' (rApprSTPbm + rSvReaction, PFM_MIN_PRIO) {      /* Reaction */
        "The existence or lack of Reaction is the source of the Objective Characters' problems.  For example, a city
council's lack of reaction to a gay-rights group leads to a national boycott of their tourist town;  a platoon leader's
reaction to taunts from the enemy throws his men into a deadly ambush; "
        "a church's failure to react to the AIDS epidemic causes a schism among the parishioners."
};
resource 'CNTX' (rApprMCPbm + rSvReaction, PFM_MIN_PRIO) {      /* Reaction */
        "The source of the main character's drive is reaction.  For example, a retired commando driven by the reaction
to his friend's murder goes out to take revenge against his murderer and finds himself caught up in a gang war; a husband
driven by the reaction to his wife's unfaithfulness murders her and gets chased by the police; "
        "a smart but busy student lacking a drive to react to her friend's request for academic help loses her
friendship; a high-ranking politician lacking a drive to react to the demands of a labor union fails in his re-election
bid from lack of support."
};
```

```
/* . . . . . . . . . . . . . . . . . . . . . . */

resource 'CNTX' (rApprSTPbm + rSvReconsider, PFM_MIN_PRIO) {   /* Reconsider */
        "The quality or lack of Reconsideration is the source of the Objective Characters' problems.  For example, an
oil company's failure to reconsider putting a new refinery on-line in the light of recently discovered structural
weaknesses leads to the most massive destruction of the environment ever to occur; an initiate's reconsideration "
        "of the holiness of a cult unearths scandals and abuses to the public; when a volunteer in a program to
genetically improve the human species reconsiders being altered, a serendipitous breakthrough in viral implanted DNA may
be lost forever."
};
resource 'CNTX' (rApprMCPbm + rSvReconsider, PFM_MIN_PRIO) {   /* Reconsider */
        "The source of the main character's drive is reconsideration.  For example, a terrific athlete driven to
reconsider his goal of quitting college and turning pro causes everyone around him to pressure him in the direction they
would like him to go; a father driven to reconsider selling off his daughter to become a concubine finds "
        "that to free her from the agreement he must come up with an insurmountable sum of money; a father lacking a
drive to reconsider moving to the big city earns him the wrath of his family who wants to stay in the country; an illegal
immigrant lacking a drive to reconsider marrying to become a citizen finds she cannot deal with her husband."
};

/* . . . . . . . . . . . . . . . . . . . . . . */

resource 'CNTX' (rApprSTPbm + rSvReduction, PFM_MIN_PRIO) {    /* Reduction */
        "The existence or lack of Reduction is the source of the Objective Characters' problems.  For example, a
research team's failure to reduce the variables in an experiment discovers their data to be useless; a stunt-man's
failure to reduce the odds of a mishap suffers a catastrophe that injures many people; a nuclear facilities efforts "
        "to reduce a meltdown save the day when an unexpected earthquake fault does not breach the reactor core due to
retrofitted reinforcements."
};

resource 'CNTX' (rApprMCPbm + rSvReduction, PFM_MIN_PRIO) {    /* Reduction */
        "The source of the main character's drive is reduction.  For example, a coach driven to reduce the roster of a
team to the best players cuts promising new recruits who later come through for another team; a cop driven to reduce the
number of suspects in a murder case fails to follow up on potentially valuable leads; a child lacking a drive "
        "to reduce the mess in his room loses important items when his mother throws away an arbitrary amount off the
top of the heap; a factory owner lacking a drive to reduce the overall waste produced by his factory is completely shut
down by the government, even though a few select reductions would have kept the plant open."
};

/* . . . . . . . . . . . . . . . . . . . . . . */

resource 'CNTX' (rApprSTPbm + rSvResult, PFM_MIN_PRIO) {       /* Result */
        "The existence of lack of Result is the source of the Objective Characters' problems.  For example, despite all
expectations, a multi-national panel is so wrapped up in protocol it generates no results and the countries slip
unimpeded into war;  the CEO of a charitable organization is so concerned with getting results in the "
        "physical condition of the homeless that he fails to address their emotional needs;  a pack of wolves, intent on
the results of the hunt, fail to see that the process of the chase is leading them into captivity."
};

resource 'CNTX' (rApprMCPbm + rSvResult, PFM_MIN_PRIO) {       /* Result */
        "The source of the main character's drive is result.  For example, a charismatic religious leader driven to get
tangible results of social change unwittingly encourages a string of bombings; an African American woman driven to create
precedent setting results in court after being discriminated against finds her mostly white community siding "
        "with the business; a teenager lacking a drive to get results, thereby sending out only a perfunctory resume
causes tension with his parents who need him to get a job and help with the rent; a comedian lacking a drive to get
results in making his audience laugh alienates his fans with bland commentaries."
};

/* . . . . . . . . . . . . . . . . . . . . . . */

resource 'CNTX' (rApprSTPbm + rSvSelfAware, PFM_MIN_PRIO) {    /* SelfAware */
        "The quality or lack of being Self-Aware is the source of the Objective Characters' problems.  For example, a
multi-national corporation with no sense of its own power damages the environment in the name of its mandate to turn a
profit; a television star's acute sense of self-awareness prevents them from functioning well "
        "in the ensemble cast and jeopardizes the chances of the series being picked up; a librarian becomes so
engrossed in the rare volumes in a hidden chamber that she fails to consider her own destructive impact on the magical
folios."
};

resource 'CNTX' (rApprMCPbm + rSvSelfAware, PFM_MIN_PRIO) {    /* SelfAware */
        "The source of the main character's drive is self-awareness.  For example, a bully driven by the self-awareness
of how mean he has been to people tries to become nicer but finds people don't trust him because of his past reputation;
a woman driven by the self-awareness of her beauty uses it to manipulate men but comes to be seen as loose; "
        "a nerdy boy lacking a driven to be self-aware of his bad taste in clothing is continually mocked by his peers;
a young girl lacking a drive to be self-aware of her anger at her mother's lack of attention takes it out on her dog and
feels terrible about it."
};

/* . . . . . . . . . . . . . . . . . . . . . . */

resource 'CNTX' (rApprSTPbm + rSvSpeculation, PFM_MIN_PRIO) {  /* Speculation */
        "The existence or lack of speculation is the source of the Objective Characters' problems.  For example, a
tabloid newspaper's speculations about  a political candidates supposed romantic trysts sets back efforts to create a
national referendum that the candidate supports; a jury's lack of speculation as to the motive "
        "of key witness allows them to be manipulated; a rabble rouser's wild speculations about layoffs leads to a riot
in a factory."
};

resource 'CNTX' (rApprMCPbm + rSvSpeculation, PFM_MIN_PRIO) {  /* Speculation */
        "The source of the main character's drive is speculation.  For example, a prying woman driven by the speculation
her next door neighbor murdered his wife sneaks into his house and is arrested as a burglar; a doctor driven by the
speculation that alien pods have taken over his hospital to use as a breeding ground kills "
        "three helpless invalids; a general lacking a drive to speculate about the strange behavior of the enemy forces
falls into their trap; a secretary lacking a drive to speculate why she was hired finds herself sexually harassed."
};

/* . . . . . . . . . . . . . . . . . . . . . . */

resource 'CNTX' (rApprSTPbm + rSvSupport, PFM_MIN_PRIO) {      /* Support */
```

```
        "The quality or lack of Support is the source of the Objective Characters' problems.  For example, an angry
young man becomes a murderer as a result of his friends' support; a politician finds herself sliding in the polls because
of the support of a racist organization; "
        "a revolutionary new theory is never made public because a clique of famous scientists fail to support it."
};

resource 'CNTX' (rApprMCPbm + rSvSupport, PFM_MIN_PRIO) {       /* Support */
        "The source of the main character's drive is support.  For example, a wife driven to support a ban against
smoking finds her husband fired by the tobacco company he works for; a college student driven to support apolitical party
by joining its school club alienates her best friend who opposes the party; "
        "a son lacking a drive to support his alma mater angers his father who teaches there; a boy lacking a drive to
support his friend suspected of stealing gains his friend's enmity once he is acquitted."
};


    /* . . . . . . . . . . . . . . . . . . . . . . . */

resource 'CNTX' (rApprSTPbm + rSvTemptation, PFM_MIN_PRIO) {  /* Temptation */
        "The existence or lack of Temptation is the source of the Objective Characters' problems.  For example, a law
allowing pornographic materials to be sold in open displays increases the incidence of "
        "rape in a small mid-west town; a Tibetan monk would have been a great game show host, if he had only seen a TV;
an astronaut discovers gold on the moon and creates a conspiracy in NASA."
};

resource 'CNTX' (rApprMCPbm + rSvTemptation, PFM_MIN_PRIO) {  /* Temptation */
        "The source of the main character's drive is temptation.  For example, an evangelist driven by the temptation of
a sensuous woman commits adultery and is held in effigy by his congregation; a dieter driven by the temptation of sweets
gains a lot of weight and loses all her self-esteem; "
        "a girl lacking a drive to be tempted by the home-town football heroes is abandoned by her friends who go to
fawn over them; a peasant lacking a drive to be tempted by the princess is ordered by her men to be beheaded."
};


    /* . . . . . . . . . . . . . . . . . . . . . . . */

resource 'CNTX' (rApprSTPbm + rSvTest, PFM_MIN_PRIO) {          /* Test */
        "The existence or lack of Test is the source of the Objective Characters' problems.  For example, the FDA keeps
testing a new drug while terminal patients are dying; the decision of a dairy not to test their milk for hormone residue
cause birth defects; an insecure man's constant testing of others' love for him alienate everyone."
};

resource 'CNTX' (rApprMCPbm + rSvTest, PFM_MIN_PRIO) {          /* Test */
        "The source of the main character's drive is test.  For example, a mountaineer driven by the test of climbing
the great mountain is stranded in a snowstorm half way up; a gentleman driven by the test of turning a commoner woman
into an upper-class lady suffers at the thought of using her to win a bet when he falls in love with her; "
        "a champion boxer lacking a drive to test his prowess against the top contender is ridiculed by the press; a man
lacking a drive to test his newly bought used car throws a fit when it breaks down on the road home."
};


    /* . . . . . . . . . . . . . . . . . . . . . . . */

resource 'CNTX' (rApprSTPbm + rSvTheory, PFM_MIN_PRIO) {        /* Theory */
        "The existence or lack of Theory is the source of the Objective Characters' problems.  For example, research
scientists attempting to support a theory fail to notice an even more spectacular breakthrough right under their noses;
an investigator with a theory that identifies a suspect as the perpetrator rejects evidence that someone else may be the
culprit; "
        "failing to develop a theory of vulcanology, the residents of Pompeii get roasted."
};

resource 'CNTX' (rApprMCPbm + rSvTheory, PFM_MIN_PRIO) {        /* Theory */
        "The source of the main character's drive is theory.  For example, a scientist driven by the theory that
dinosaurs can be cloned from ancient cells creates one that runs amuck; an attorney driven by the theory that the accused
could not have committed the crime is dropped by his firm, which is prosecuting the suspect; the starship captain lacking
the drive to "
        "subscribe to the theory that under certain conditions something can escape the pull of the black hole gives up
apparently dooming his crew; a philosopher lacking the drive to subscribe to the theory that life is only a matter of
perspective seeks complete objectivity, only to lose his humanity."
};


    /* . . . . . . . . . . . . . . . . . . . . . . . */

resource 'CNTX' (rApprSTPbm + rSvThoughtElem, PFM_MIN_PRIO) {  /* Thought Element */
        "The existence or lack of Thought is the source of the Objective Characters' problems.  For example, a team of
cerebral football players gets regularly trounced because their members are too busy contemplating the game; a group of
honor students flunks a simple test because they are convinced they are trick questions; etc."
        "a fan club has given so much thought to what they will say when their Star comes to town that when the event
occurs, they are tongue-tied."
};

resource 'CNTX' (rApprMCPbm + rSvThoughtElem, PFM_MIN_PRIO) {  /* Thought Element */
        "The source of the main character's drive is thought.  For example, a woman driven to think about the faults of
every man she knows soon finds herself very lonely; an alcoholic and abusive father driven to think that his son might
turn out like him some day leaves his home but finds his son to be suffering without him; a car owner lacking the drive
to think "
        "about the consequences of leaving his car alarm off returns to find it stolen; a doctor lacking the drive to
think about changing syringes between two patients is sued when the second patient contracts a disease from the first."
};


    /* . . . . . . . . . . . . . . . . . . . . . . . */

resource 'CNTX' (rApprSTPbm + rSvTrust, PFM_MIN_PRIO) {         /* Trust */
        "The existence or lack of Trust is the source of the Objective Characters' problems.  For example, a con man
bilks senior citizens out of their life savings; a woman who trusts her lovers to be gentle if they ever break up with
her is constantly hurt when they dump her without "
        "ceremony; an invalid who assigned power of attorney to her son finds herself institutionalized."
};

resource 'CNTX' (rApprMCPbm + rSvTrust, PFM_MIN_PRIO) {         /* Trust */
        "The source of the main character's drive is trust.  For example, a stockbroker driven by her trust of her
astrologist invests her money and loses everything; a businessman driven by the trust of his partner allows the partner
access to his computer who then uses it to frame him for embezzlement; the fiancé of a woman victimized by a vampire, "
        "lacking a drive to trust in God, is unable to ward off the vampire with his cross; a woman, lacking a drive to
trust anyone after many bad experiences with friends, suffers emotional anguish when she really needs help."
};
```

```
    /* . . . . . . . . . . . . . . . . . . . . . . . . */

resource 'CNTX' (rApprSTPbm + rSvUnEnding, PFM_MIN_PRIO) {      /* UnEnding */
        "The quality or lack of being Un-ending is the source of the Objective Characters' problems.  For example, a
single man sits at the head of the FBI with an open term; victims of an occupying army carry on a program of revenge long
after the war is over; even in the face of medical evidence, a company continues to dump toxic waste into the water
table."
};

resource 'CNTX' (rApprMCPbm + rSvUnEnding, PFM_MIN_PRIO) {      /* UnEnding */
        "The source of the main character's drive is un-ending.  For example, a boy driven to keep his relationship with
his girlfriend un-ending does everything she says but she starts taking advantage of him; a slacker driven to keep school
life un-ending to avoid having to get a job creates tension with his school counselor who wants him to take more courses;
"
        "a wife lacking the drive to see her marriage as un-ending puts less and less effort into the relationship;
parents lacking the drive to see their diseased son's life as unending deny a breakthrough treatment that could heal
him."
};


    /* . . . . . . . . . . . . . . . . . . . . . . . . */

resource 'CNTX' (rApprSTPbm + rSvUncontrolled, PFM_MIN_PRIO) {          /* Uncontrolled */
        "The quality or lack of being Uncontrolled is the source of the Objective Characters' problems.  For example,
the uncontrolled responses of a gang of vigilantes sends innocent men to their deaths; a company keeping their books in
an uncontrolled manner is riddled with embezzlement; a medical laboratory with uncontrolled practices causes healthy
patients to endure serious medical procedures."
};

resource 'CNTX' (rApprMCPbm + rSvUncontrolled, PFM_MIN_PRIO) {          /* Uncontrolled */
        "The source of the main character's drive is uncontrol.  For example, an anal computer programmer driven to be
uncontrolled loses a lucrative job because she won't keep regular hours; a boy driven to be uncontrolled with his
girlfriend loses her to his more sedate friend; a performer lacking the drive to be uncontrolled becomes type-cast; "
        "an archeologist lacking a drive to be uncontrolled in his methodology, loses valuable finds to rising flood
waters."
};


    /* . . . . . . . . . . . . . . . . . . . . . . . . */

resource 'CNTX' (rApprSTPbm + rSvUnproven, PFM_MIN_PRIO) {      /* Unproven */
        "The quality or lack of being Unproven is the source of the Objective Characters' problems.  For example, the
unproven identity of a claimant against a will sets a small New England town into turmoil; the unproven abilities of a
pampered fighter cause a convention of gamblers no end of grief; the unproven value of the cargo of a sunken galleon "
        "impedes funding for a salvage expedition; the unproven guilt of a neo-nazi sympathizer rips a Jewish family
apart."
};

resource 'CNTX' (rApprMCPbm + rSvUnproven, PFM_MIN_PRIO) [      /* Unproven */
        "The source of the main character's drive is unproven.  For example, a priest driven by the unprovability of God
suffers a fear of death; a prosecutor driven by the unprovability that the suspect committed the crime makes up evidence;
a mathematician driven by an unproven theorem spends all his time trying to explain it, interfering with his ability to
teach his classes; a child lacking "
        "the drive see the unprovability that magic is behind the trick of sawing someone in half gets in trouble for
trying to saw his kid brother in half."
];



/* $Log$
 */
```

```
/***********************************************************************
        CPANEL.CC
        Control Panel
        (c) 1993 Screenplay Systems
        Authors:        S. Greenfield & C. Huntley
        Created:        April 2, 1993
        Revised:        $Id$
***********************************************************************

*/

#include "listsx.h"
#include "grphitms.h"
#include "popup.h"
#include "twindow.h"
#include "editview.h"

#include "document.h"
#include "structs.h"
#include "justify.h"
#include "semtable.h"
#include "storytbl.h"
#include "ptext.h"
#include "subtext.h"
#include "dramatic.h"
#include "apprdefs.h"
#include "drrez.h"
#include "cpanel.h"

#pragma segment cpanel


static void myTrackFunc(short menuPos);
static STSearchRec*        sCurSearchRec;
static Dramatica*          sApp;
static CPanelDlog*         sCPanelDlog;


STPopupInit CpPopupInitTable[] =
{
        { rApprResolve,         kCPResolve,             kCPResolveLock          },      // [0] -
Change/Steadfast (Resolve)
        { rApprDirection,       kCPDirection,     kCPDirectionLock  },      // [1] - Start/Stop (Direction)
        { rApprApproach,  kCPApproach,      kCPApproachLock           },      // [2] - Doer/Beer (Approach)
        { rApprSex,                     kCPSex,                 kCPSexLock                      },      //
[3] - Male/Female (Sex)
        { rApprWork,            kCPWork,                kCPWorkLock                     },      // [4] -
Action/Decision (Work)
        { rApprLimit,           kCPLimit,               kCPLimitLock            },      // [5] -
Spacelock/Timelock (Limit)
        { rApprOutcome,         kCPOutcome,             kCPOutcomeLock          },      // [6] -
Success/Failure (Outcome)
        { rApprJudgment,  kCPJudgment,      kCPJudgmentLock   },      // [7] - Good/Bad (Judgment)

        { rApprSTDom,           kCPDomain,              kCPDomainLock           },      // [8] - ST Domain
        { rApprSTCon,           kCPConcern,             kCPConcernLock          },      // [9] - ST Concern
        { rApprSTRng,           kCPTheme,               kCPThemeLock            },      // [10] - ST Range
(Theme)
        { rApprSTPbm,           kCPProblem,             kCPProblemLock          },      // [11] - ST Problem

        { rApprSTGoal,          kCPStoryGoal,     kCPStoryGoalLock  },      // [12] - ST Goal (Story Goal)
        { rApprPLGoal,          kCPConsequence,   kCPConsequenceLock        },      // [13] - PL Concern
(Consequence)
        { rApprOCGoal,          kCPCost,                kCPCostLock                     },      // [14] - OC
Concern (Cost)
        { rApprMCGoal,          kCPDividend,      kCPDividendLock           },      // [15] - MC Concern (Dividend)

        { rApprMCPbm,           kCPMcProblem,     kCPMcProblemLock  },      // [16] - MC Problem
        { rApprMCSol,           kCPMcSolution,    kCPMcSolutionLock         },      // [17] - MC Solution
        { rApprMCFoc,           kCPMcFocus,             kCPMcFocusLock          },      // [18] - MC Focus
        { rApprMCDir,           kCPMcDirection,   kCPMcDirectionLock        },      // [19] - MC Direction

        { rApprMCDom,           kCPMcDomain,      kCPMcDomainLock           },      // [20] - MC Domain
        { rApprMCRng,           kCPMcThemFocus,   kCPMcThemFocusLock        },      // [21] - MC Range (Thematic
Focus)
        { rApprMCUnRng,         kCPMcUniqAbil,    kCPMcUniqAbilityLock},    // [22] - MC Unique Range (Unique
Ability)
        { rApprMCCrFl,          kCPMcCritFlaw,    kCPMcCritFlawLock         },      // [23] - MC Critical Flaw

        { 0,                            0,                                      0
        },      // [24] - Sentinal for table's end

};

/* ------------------------------------------------------------------------
                                                        Control Panel DIALOG CLASS
------------------------------------------------------------------------ */
CPanelDlog::CPanelDlog(short resID, DRDoc* theDoc, STPopupInit* popupInitTable, ls_index clearBtn, ls_index revertBtn,
ls_index storyCountBtn)
          : TDialog(resID),
                        fApp ((Dramatica*)AP_Data()->fApp),
                        fDoc (theDoc),
                        fTotalStories (MAXSTORIES),
                        fPopupInitTable (popupInitTable),
                        fClearBtn (clearBtn),
                        fRevertBtn (revertBtn),
                        fStoryCountItem (storyCountBtn),
                        fNmOfPopups (0)
 {
        fAppPFMFile             = fApp->GetPFMFile();
        fResponses              = fDoc->GetRESP();
        fLockApprPT             = fDoc->GetLOCK();
        sApp                    = (Dramatica*)fApp;
        sCPanelDlog     = this;
        fParentDoc              = theDoc;
 } /* CPanelDlog::CPanelDlog */

 /* ----------------------------------------------Stephen---03/19/93---
        CPanelDlog::~CPanelDlog - Destructor.
```

```
---------------------------------------------------------------------- */
CPanelDlog::~CPanelDlog (void)
{
	if (fItemHit == fDefaultBtn) {
		fDoc->SetTotalStories(fTotalStories);
		save_story_settings();
		fDoc->PerformJustification();
		save_lock_status();
	}
	else
		fDoc->SetTotalStories(fInitialStoryCount);

	if (fItemHit != fDefaultBtn)			// Restore appreciations if
user pressed CANCEL
		fDoc->RestoreAppreciations(fApprecCopyHdl);
	else
		fDoc->DisposeApprecCopy(fApprecCopyHdl);		// Otherwise, just dispose the temp memory

//	fApp->PushCursor(AP_WATCH_CURS);		// For some reason, watch goes off immediately!

	delete fStoryTbl;
//	fApp->PopCursor();

} /* CPanelDlog::~QueryDlog */

/* ----------------------------------------------------------------------
	CPanelDlog::init_dlog - initialize the Story Engine Dialog.
---------------------------------------------------------------------- */
void CPanelDlog::init_dlog(void)
{
	TDialog::init_dlog();

	while (fPopupInitTable[fNmOfPopups].apprID)
		++fNmOfPopups;

	//	Set title of dialog to include story's name

	PText* storyDocPT		= fDoc->GetSDOC();
	char dialogTitle[150];
	strcpy(dialogTitle, "Story Engine");
	char titleTxt[100];
	titleTxt[0] = 0;
	storyDocPT->GetParam("Title", 'c', titleTxt);
	if (titleTxt[0]) {
		strcat(dialogTitle, " for ");
		strcat(dialogTitle, titleTxt);
	}

	SetTitle(dialogTitle);


//	fApp->PushCursor(AP_WATCH_CURS);
	st_err	theErr;
	fStoryTbl = new StoryTbl(fDoc, &theErr);
	fApprecCopyHdl = fDoc->CopyAppreciations();
	fTotalStories = fInitialStoryCount = init_storyTable();

	buildAllMenus();
	displayStoryCount();

	//	Load my private cursor rect table!

	short i;
	short n = 0;
	for (i = kCPResolve-1; i<=kCPMcCritFlaw-1; i+=2) {
		StatText* pSText = (StatText*)GetItem(i);
		fpopHelpRects[n] = pSText->GetBounds();
		AddCursorRgn(&fpopHelpRects[n++], 143);
	}

	//	Set state of locks

	i = -1;
	ls_index lockID;
	while ((lockID = fPopupInitTable[++i].lockID)) {
		CheckBox* theCheckBox = (CheckBox*) GetItem(lockID);
		short apprID = fPopupInitTable[i].apprID;
		short lockState = AP_OFF;
		fLockApprPT->GetParam(GetApprVarName(apprID), 's', &lockState);
		theCheckBox->SetCntlVal(lockState);
	}

	set_help_text("Select your storyforming choices from the popup menus.  As you make choices, Dramatica set other
items automatically based on your choices.  Dramatica choices are displayed in italics.");
//	fApp->PopCursor();
	fCurrentCursor = AP_ARROW_CURS;

} /* CPanelDlog::init_dlog */

/* -----------------------------------------------------Ken---06/08/92---
	CPanelDlog::save_lock_status - Remembers the status of the lock
	checkboxes.
---------------------------------------------------------------------- */
void CPanelDlog::save_lock_status(void)
{
	//	Save state of locks

	short i = -1;
	ls_index lockID;
	while ((lockID = fPopupInitTable[++i].lockID)) {
		CheckBox* theCheckBox = (CheckBox*) GetItem(lockID);
		short apprID = fPopupInitTable[i].apprID;
		short lockState = theCheckBox->GetCntlVal();
		if (lockState)
			fLockApprPT->SetParam(GetApprVarName(apprID), 's', lockState);
		else
			fLockApprPT->RemoveParam(GetApprVarName(apprID));
	}
} /* CPanelDlog::save_lock_status */
```

```
/* -----------------------------------------------------------------------
	CPanelDlog::reset_menus - sets the initial state for each popup menu
----------------------------------------------------------------------- */
void CPanelDlog::reset_menus(void)
{
	save_lock_status();

	short maxSlots = fStoryTbl->GetNmOfSearchSlots();
	for (short slot=0; slot<maxSlots; ++slot) {
		STSearchRec* searchRec = fStoryTbl->GetSearchRec(slot);
		if (!searchRec->tableUsed)
			break;
			// reached end of table
		if (searchRec->popupMenuID)  {
			short lockState = AP_OFF;
			fLockApprPT->GetParam(GetApprVarName(searchRec->apprID), 's', &lockState);
			if (lockState != AP_ON) {
				searchRec->matchAny			= true;
				searchRec->semVal			= 0;
				searchRec->searchVal		= 0;
				searchRec->curMenuChoice   = 0;
				for (short j=0; j<searchRec->maxItems; ++j)		// initialize searchVal for
each menu item
					searchRec->fItemTally[j] = j+1;
			}
		}
	}

	// This zeros out ALL potential appreciations (even ones not seen in Story Engine window)!

	appr_index_t lastRecIdx = FindApprRecIndex(rApprPLReq);
	for (appr_index_t apprRecIdx = FindApprRecIndex(rApprSTDom); apprRecIdx <= lastRecIdx;  ++apprRecIdx) {
		appr_id_t apprID = GetApprRec(apprRecIdx)->apprID;

		short lockState = AP_OFF;
		fLockApprPT->GetParam(GetApprVarName(apprID), 's', &lockState);		// OPTIMIZE LATER ONCE
LOCKSTATE IS IN IN-MEMORY ARRAY!
		if (lockState == AP_OFF) {
		// Only reset unlocked items
			fDoc->SetApprValByIndex(apprRecIdx, 0);
		}
	}

	// Now rescan story universe to account for any menus that might have been locked

	fTotalStories = fStoryTbl->ScanStoryTable(false);
	buildAllMenus();
	displayStoryCount();

} /* CPanelDlog::reset_menus */


/* -----------------------------------------------------------------------
	CPanelDlog::init_storyTable - does the initial work of setting up our
	story table for the control panel dialog.
----------------------------------------------------------------------- */
ushort CPanelDlog::init_storyTable(void)
{
	short whichTables[] = (	rApprResolve, rApprDirection, rApprApproach, rApprSex,
					rApprWork, rApprLimit, rApprOutcome, rApprJudgment,
					rApprSTDom, rApprSTCon, rApprSTRng, rApprSTPbm,
					rApprSTGoal, rApprPLGoal, rApprOCGoal, rApprMCGoal,
					rApprMCPbm, rApprMCSol, rApprMCFoc, rApprMCDir,
					rApprMCDom, rApprMCRng, rApprMCUnRng, rApprMCCrFl, 0 );

	short nonVisibleTables[kMaxSearchSlots+1];
	fStoryTbl->CreateSearchTableSet(nonVisibleTables, 0, fDoc->GetTotalStories());
	fStoryTbl->MergeSearchTableSets(whichTables, nonVisibleTables, fWhichTables);
	fStoryTbl->init_menu_item_structs(fPopupInitTable, fWhichTables, fDoc->GetRESP());

	ushort nmOfStories = fStoryTbl->ScanStoryTable(false);
	return (nmOfStories);

} /* CPanelDlog::init_storyTable */


/* -----------------------------------------------------------------------
	CPanelDlog::buildAllMenus - builds all of our menus, based on the
	results of our search.
----------------------------------------------------------------------- */
void CPanelDlog::buildAllMenus(void)
{
#ifndef NDEBUG
	short popCount = 0;
#endif
//	fApp->PushCursor(AP_WATCH_CURS);
	short maxSlots = fStoryTbl->GetNmOfSearchSlots();
	for (short slot=0; slot<maxSlots; ++slot) {
		STSearchRec* searchRec = fStoryTbl->GetSearchRec(slot);
		if (!searchRec->tableUsed)
			break;
			// reached end of table
		if (searchRec->popupMenuID)  {
			assert(++popCount <= fNmOfPopups);
			if (searchRec->menuType == kChoiceMenu)
				buildChoiceMenu(searchRec);
			else
				buildAnyMenu(searchRec);
		}

	}
//	fApp->PopCursor();
	assert(fNmOfPopups == popCount);
}  /* CPanelDlog::buildAllMenus */


/* -----------------------------------------------------------------------
	CPanelDlog::buildChoiceMenu - builds a binary choice menu
----------------------------------------------------------------------- */
void CPanelDlog::buildChoiceMenu(STSearchRec* searchRec)
{
```

```
	short		i;
	short		nmOfValidChoices = 0;
	short		nmOfInvalidChoices = 0;
	short		menuPos = 1;								//
start at first dashed line

	Popup*	popMenu = (Popup*) GetItem(searchRec->popupMenuID);
	popMenu->RemoveRange(0, 4);

	for (i=0; i<2; ++i)							// Pre-count valid choices
		if (searchRec->fItemTally[i])
			++nmOfValidChoices;

	popMenu->AppendItem("Either");
	popMenu->SetItemFace(0, GL_ITALIC);
	if (searchRec->matchAny && nmOfValidChoices != 1)		// Show wildcard choice if no other
		popMenu->SetCntlVal((ct_value)0, false);
	popMenu->AppendItem("-");

	for (i=0; i<2; ++i)
		if (searchRec->fItemTally[i]) {
			popMenu->AppendItem(DYNTBL_NAME(searchRec->myTable, i+1));
			searchRec->fItemTally[i] = ++menuPos;
			if (((!searchRec->matchAny) && searchRec->semVal == i) || nmOfValidChoices == 1) {
				popMenu->SetCntlVal(menuPos, false);
				if (nmOfValidChoices == 1) {
					searchRec->semVal = i;
		// The default of what user would get if he/she pressed OK
					if (searchRec->matchAny) {
						popMenu->SetItemFace(menuPos, GL_ITALIC);	// Italicize defaulted
item
						searchRec->curMenuChoice = 0;
	// set menu choice to "any" so if user tries to reselect nothing will happen
					}
					else
						searchRec->curMenuChoice = menuPos;		//
Since there was only one choice, note the menu pos so re-selection won't rescan
				}
			}
		}

	searchRec->dashedLinePos = searchRec->maxItems+1;

	popMenu->Inval();
	searchRec->nmValidChoices = nmOfValidChoices;

} /* CPanelDlog::buildChoiceMenu */


/* ----------------------------------------------------------------------
	CPanelDlog::buildAnyMenu - builds a menu of Classes, Types, Var & Elem
---------------------------------------------------------------------- */
void CPanelDlog::buildAnyMenu(STSearchRec* searchRec)
{
	short		j;
	short		nmOfValidChoices = 0;
	short		nmOfInvalidChoices = 0;
	short		semVal;
	pu_menu_t	menuType = searchRec->menuType;
	short		menuPos = 1;								//
start at first dashed line
	char		tempText[20];

	assert(menuType != kChoiceMenu);

	Popup*	popMenu = (Popup*) GetItem(searchRec->popupMenuID);

//	popMenu->RegisterTrackFunc(myBeepFunc);				// For semVal tracking...

	popMenu->RemoveRange(0, searchRec->maxItems+2);

	for (j=0; j<searchRec->maxItems; ++j)				// Pre-count valid choices
		if (searchRec->fItemTally[j])
			++nmOfValidChoices;

	if ((searchRec->matchAny || searchRec->multiSearch) && (nmOfValidChoices != 1) && nmOfValidChoices &&
(nmOfValidChoices != searchRec->maxItems)) {
		sprintf(tempText, "Any of %hd", nmOfValidChoices);
		popMenu->AppendItem(tempText);
	}
	else
		popMenu->AppendItem("Any");

	popMenu->SetItemFace(0, GL_ITALIC);
	if ((searchRec->multiSearch || searchRec->matchAny) && nmOfValidChoices != 1)		// Show wildcard
choice if no others
		popMenu->SetCntlVal((ct_value)0, false);
	popMenu->AppendItem("-");


	for (j=0; j<searchRec->maxItems; ++j) {						// Scan to determine
which menu items are valid
		if (searchRec->fItemTally[j]) {						// Valid
choice?
			semVal = TokenToSemVal(searchRec, j);				// convert token (1-
64) to a semVal
			popMenu->AppendItem(SEMTBL_NAME(semVal));
			searchRec->fItemTally[j] = ++menuPos;
			if ((searchRec->multiSearch==0) && ((!searchRec->matchAny) && semVal == searchRec->semVal) ||
nmOfValidChoices == 1) {
					// IS NMOFVALIDCHOICE WRONG FOR MULTI?
				popMenu->SetCntlVal(menuPos, false);				//
Select menu item the user selected
				if (nmOfValidChoices == 1) {
					searchRec->semVal = semVal;
		// The default of what user would get if he/she pressed OK
					if (searchRec->matchAny) {
						popMenu->SetItemFace(menuPos, GL_ITALIC);		// Italicize
defaulted item
						searchRec->curMenuChoice = 0;
	// set menu choice to "any" so if user tries to reselect nothing will happen
					}
					else
```

```
                                        searchRec->curMenuChoice = menuPos;
        // Since there was only one choice, note the menu pos so re-selection won't rescan
                                    }
                        }
                }
        }

        searchRec->dashedLinePos = searchRec->maxItems+1;

        popMenu->Inval();
        searchRec->nmValidChoices = nmOfValidChoices;

} /* CPanelDlog::buildAnyMenu */


/* -----------------------------------------------------------------------
        CPanelDlog::draw_window -
----------------------------------------------------------------------- */
void CPanelDlog::draw_window(GL_ENV_REF env)
{
        TWindow::draw_window(env);

#ifdef TOOLBOX
        outline_ok_btn(env);
#endif

        draw_locks();

} /* CPanelDlog::draw_window */


/* -----------------------------------------------------------------------
        CPanelDlog::draw_locks -
----------------------------------------------------------------------- */
void CPanelDlog::draw_locks()
{
        GLColor savedForeColor;
        GLColor savedBackColor;

        fGraphEnv.GetForeColor(&savedForeColor);
        fGraphEnv.GetBackColor(&savedBackColor);
        fGraphEnv.SetForeColor(kGLBlackClr);

        short n, i;
        short X[3];
        short Y[6];
        X[0] = 9;  X[1] = 200; X[2] = 428;
        Y[0] = 0;  Y[1] = 20; Y[2] = 40;  Y[3] = 60;

        for (n=0; n<3; ++n) {
                for (i=0; i<4; ++i) {
                        fGraphEnv.MoveTo(172+X[n], 29+Y[i]);
                        fGraphEnv.LineTo(172+X[n], 27+Y[i]);
                        fGraphEnv.LineTo(173+X[n], 26+Y[i]);
                        fGraphEnv.LineTo(178+X[n], 26+Y[i]);
                        fGraphEnv.LineTo(179+X[n], 27+Y[i]);
                        fGraphEnv.LineTo(179+X[n], 29+Y[i]);
                }
        }

        X[0] = 60;  X[1] = 320;
        Y[0] = 112;  Y[1] = 132; Y[2] = 184;  Y[3] = 204;  Y[4] = 224;  Y[5] = 244;
        for (n=0; n<2; ++n) {
                for (i=0; i<6; ++i) {
                        fGraphEnv.MoveTo(172+X[n], 29+Y[i]);
                        fGraphEnv.LineTo(172+X[n], 27+Y[i]);
                        fGraphEnv.LineTo(173+X[n], 26+Y[i]);
                        fGraphEnv.LineTo(178+X[n], 26+Y[i]);
                        fGraphEnv.LineTo(179+X[n], 27+Y[i]);
                        fGraphEnv.LineTo(179+X[n], 29+Y[i]);
                }
        }

        fGraphEnv.SetForeColor(savedForeColor);
        fGraphEnv.SetBackColor(savedBackColor);

}


/* -----------------------------------------------------------------------
        CPanelDlog::save_story_settings - takes all of the user's choices and
        stuffs them back into the appropriate structures so they can be saved
        as PTEXT.
----------------------------------------------------------------------- */
void CPanelDlog::save_story_settings(void)
{
        STSearchRec*        MDomSearchRec = fStoryTbl->GetSearchRec(20);
        semval_t MCDomSemVal = (MDomSearchRec->nmValidChoices == 1) ? MDomSearchRec->semVal : 0;
        fDoc->SetApprValByIndex(kApprMCDom, MCDomSemVal);

        short maxSlots = fStoryTbl->GetNmOfSearchSlots();
        for (short slot=0; slot<maxSlots; ++slot) {
                STSearchRec* searchRec = fStoryTbl->GetSearchRec(slot);
                if (!searchRec->tableUsed)
                        break;
                        // reached end of table
//              if (searchRec->popupMenuID)
                        fStoryTbl->SaveStorySetting(slot, fResponses, fTotalStories);
        }

} /* CPanelDlog::save_story_settings */


/* -----------------------------------------------------------------------
        CPanelDlog::DoItemHit - react to a user action in the dialog.
----------------------------------------------------------------------- */
void CPanelDlog::DoItemHit(ls_index itemHit)
{
        if (itemHit == fClearBtn) {
                reset_menus();
        }
```

```
        else if (itemHit == fRevertBtn) {
//              fApp->PushCursor(AP_WATCH_CURS);
                fDoc->RestoreAppreciations(fApprecCopyHdl);             // Restore appreciations, 'cause user pressed
REVERT
                fApprecCopyHdl = fDoc->CopyAppreciations();             // Now grab a fresh copy, since memory was
deallocated

                fTotalStories = init_storyTable();

                buildAllMenus();
                displayStoryCount();
//              fApp->PopCursor();
        }

        STSearchRec* searchRec;
        if (itemHit != fDefaultBtn && itemHit != fCancelBtn) {
                if (itemHit >= kCPResolve-1 && itemHit <= kCPMcCritFlaw) {
                        if (popup_menu_hit(itemHit, &searchRec)) {
//                              fApp->PushCursor(AP_WATCH_CURS);
                                fTotalStories = fStoryTbl->ScanStoryTable((searchRec->validChoice) && (fTotalStories
!= MAXSTORIES));
                                buildAllMenus();
                                displayStoryCount();
//                              fApp->PopCursor();
                        } else {
                                for (ls_index i = kCPResolve-1; i<=kCPMcCritFlaw-1; i+=2)
                                        if (i == itemHit)
                                                set_help_values(itemHit+1, kNoSemValHelp);
                        }
                }
        }
} /* CPanelDlog::DoItemHit */


/* -----------------------------------------------------------------------
        CPanelDlog::popup_menu_hit - determines which popup menu was hit,
        then sets appropriate structures for subsequent search.
------------------------------------------------------------------------ */
bool_t CPanelDlog::popup_menu_hit(ls_index itemHit, STSearchRec** retSearchRec)
{
        STSearchRec*    searchRec;
        Popup*                  popMenu;
        short                   semVal;
        short                   tokenVal;

        short maxSlots = fStoryTbl->GetNmOfSearchSlots();
        for (short slot=0; slot<maxSlots; ++slot) {
                searchRec = fStoryTbl->GetSearchRec(slot);
                if (!searchRec->tableUsed)
                        return (false);                                                 // Not in
table -- obviously not a hit on a popup
                if (searchRec->popupMenuID && (searchRec->popupMenuID == itemHit))
                        break;
        }

        popMenu = (Popup*) GetItem(searchRec->popupMenuID);
        short menuPos = (short)popMenu->GetCntlVal();

        // Store away searchRec* so palette help will know how to translate menu items

//      popMenu->RegisterTrackFunc(myTrackFunc);                // Make sure we register the tracking function...
//      sCurSearchRec = searchRec;

        short PoppedItem = (short)popMenu->GetPoppedItem();
        if (PoppedItem > 1) {
                short helpTokenVal = menuPos_to_token(searchRec, PoppedItem-1);
                short helpSemVal = TokenToSemVal(searchRec, helpTokenVal);
                set_help_values(itemHit, helpSemVal);

                helpPalette*    helpPalette = fApp->GetDefinePalette();
                if (helpPalette && helpPalette->IsPaletteVisible()) {
                        DefinitView*    defView  = helpPalette->GetView();
                        if (defView) {
                                defView->SetDefinition(helpSemVal, false);
                        }
                }
        }


        if ((menuPos == searchRec->curMenuChoice) && !(menuPos==0 && searchRec->multiSearch))           // Don't do
anything if user re-selects the same menu item, except for multi-searchvals
                return (false);

        searchRec->curMenuChoice = menuPos;
        if ((menuPos > searchRec->dashedLinePos) || (menuPos==0 && (searchRec->matchAny == false)))
                searchRec->validChoice = false;
        else
                searchRec->validChoice = true;

        if (menuPos == 0) {                                                                     // Any or
Either selected?
                searchRec->matchAny = true;
        }
        else {
                searchRec->matchAny             = false;
                searchRec->multiSearch          = false;                                // MultiSearch now
invalid because user made a specific selection

                tokenVal = menuPos_to_token(searchRec, menuPos);
                semVal = TokenToSemVal(searchRec, tokenVal);

                searchRec->searchVal            = tokenVal;
                searchRec->semVal                       = semVal;

                set_help_values(itemHit, semVal);
        }

        *retSearchRec = searchRec;
        return (true);
} /* CPanelDlog::popup_menu_hit */
```

```
/* -----------------------------------------------------------------------
        CPanelDlog::menuPos_to_token - figure out the token position user
        selected.
----------------------------------------------------------------------- */
short CPanelDlog::menuPos_to_token(STSearchRec* searchRec, short menuPos)
{
        short i;

        for (i=0; i<searchRec->maxItems; ++i)
                if (searchRec->fItemTally[i] == menuPos) {                    // Found which item he hit?
                        return (i);
                }
        asserts(false, "Fell thru menuPos_to_token");
}


/* -----------------------------------------------------------------------
        CPanelDlog::displayStoryCount - set the story count number in the DLOG
----------------------------------------------------------------------- */
void CPanelDlog::displayStoryCount()
{
        if (fStoryCountItem) {
                StatText* pSText = (StatText*)GetItem(fStoryCountItem);
                char tempText[20];
                sprintf(tempText,"%hu", fTotalStories);
                pSText->SetText(tempText);
                pSText->Inval();
        }
}

#if 0
/* -----------------------------------------------------------------------
        CPanelDlog::DoIdle - change cursor
----------------------------------------------------------------------- */
void CPanelDlog::DoIdle(void)
{
        GLPoint mousePt;
        AP_GetLocalMouse(fWindowRef, &mousePt);
        short i;
        bool_t  helpCursor = false;
        for (i=0; i<fNmOfPopups; ++i) {
                if (GLPtInRect(mousePt, &fpopHelpRects[i])) {
                        helpCursor = true;
                        break;
                }
        }

        if (helpCursor) {
                if (fCurrentCursor != AP_PLUS_CURS) {
                        fApp->SetCursor(AP_PLUS_CURS);
                        fCurrentCursor = AP_PLUS_CURS;
                }
        } else {
                if (fCurrentCursor != AP_ARROW_CURS) {
                        fApp->SetCursor(AP_ARROW_CURS);
                        fCurrentCursor = AP_ARROW_CURS;
                }
        }

}
#endif

/* -----------------------------------------------------------------------
        CPanelDlog::set_help_text - sets the help text area
----------------------------------------------------------------------- */
void CPanelDlog::set_help_text(char* theText)
{
        EditView*       helpTextView = (EditView*)GetItem(kCPHelpTextArea);

        char tempBuffer[800];
        StripFormatCodes(theText, tempBuffer, strlen(theText));

        helpTextView->SetText(tempBuffer);
        helpTextView->Inval();
}


/* -----------------------------------------------------------------------
        CPanelDlog::set_help_values - passes the proper semvals to generate
        the correct text to be shoved into the help EditView.

        ItemHit -       The raw item # of the menu.  If the user clicks on one of the
                                static text names, I pass it as ItemHit+1, so this function
                                thinks it's actually looking at the popup menu.  NOTE: pass
                                kNoMenuHelp if you aren't passing an ItemHit (which you
                                MUST to properly decode the semVal).

        semVal -        The actual SemVal of the menu item selected.  Note that it
                                needs to be adjusted for the dynamic menus because it'll
                                either be 1 or 2.  NOTE: pass kNoSemValHelp if you aren't
                                passing a semVal (i.e., you only want help about the menu
                                type).
----------------------------------------------------------------------- */
void CPanelDlog::set_help_values(ls_index ItemHit, short semVal)
{
        char tempStr[1000];
        short apprID;
        short whichMenu;
        PText*          PT;
        pt_err          theErr;
        SubText* SbTxt                  = NULL;
        SubText* SbTxt2         = NULL;
        char tmpStr1[100];
        char tmpStr2[200];
        char tmpStr3[300];
        char tmpStr4[400];
        char *cp;
        char *cp2;
```

```
        assert(semVal == kNoSemValHelp || ((ItemHit !=kNoMenuHelp) && (semVal != kNoSemValHelp)));

        if ((ItemHit == fLastHelpItemHit) && (semVal == fLastHelpSemVal))                    // Don't re-update for
the same values!
                return;

        if (ItemHit != kNoMenuHelp) {
                whichMenu = (short)((ItemHit - kCPResolve) / 2);
                STSearchRec*        pStoryTblInfo = fStoryTbl->GetSearchRec(whichMenu);
                apprID = pStoryTblInfo->apprID;                          // Calculate proper storypoint value
        }

        if ((ItemHit!= kNoMenuHelp) && (semVal != kNoSemValHelp)) {
                if (fStoryTbl->GetSearchRec(whichMenu)->menuType == kChoiceMenu) {          // Dynamic choice
menu?
                        short semOffset = fStoryTbl->GetSearchRec(whichMenu)->apprID;      // SemOffset should be
a number like 1000, 1010, etc.
                        semVal += semOffset + 1;
                        // Bring the value back up over 1000, so it's a semVal
                }
        }


        tmpStr1[0] = 0;
        tmpStr2[0] = 0;
        tmpStr3[0] = 0;
        tmpStr4[0] = 0;

        PT = new PText(fAppPFMFile, _OSType("APPR"), apprID, &theErr, kRdOnly);         // Grab APPR segment from .pfm
file
        assert(theErr != kNoSuchPFMSeg);

        PT->GetParam("NM", 'c', tmpStr1);
        PT->GetParam("DF", 'c', tmpStr2);

        sprintf(tmpStr3, "%s:  %s", tmpStr1, tmpStr2);

        if (semVal > 0)                                                               // there is a choice
made
                sprintf(tmpStr4,"%s -- is \"(SNF(%hd))\": (SDF(%hd)):", tmpStr3, semVal, semVal);
        else
                strcpy(tmpStr4, tmpStr3);

        SbTxt = new SubText(fDoc, tmpStr4);
        assert (SbTxt);
        cp = SbTxt->DoSubstitution();
        SbTxt2 = new SubText(fDoc, cp);                                               // doing this twice because we
are not running the text through textwrap and there are some nested subtext items
        assert (SbTxt2);
        cp2 = SbTxt2->DoSubstitution();

        set_help_text(cp2);
        delete SbTxt;
        delete SbTxt2;

        delete PT;
        fLastHelpItemHit = ItemHit;
        fLastHelpSemVal = semVal;

}


static void myTrackFunc(short menuPos)
{

//      Dramatica*              fApp = (Dramatica*) AP_Data()->fApp;

        helpPalette*    helpPalette = sApp->GetDefinePalette();
        if (helpPalette) {
                DefinitView*    defView  = helpPalette->GetView();
                if (defView) {
                        short tokenVal = sCPanelDlog->menuPos_to_token(sCurSearchRec, menuPos);
                        short semVal = TokenToSemVal(sCurSearchRec, tokenVal);
                        defView->SetDefinition(semVal, false);
                }
        }
}


/* -----------------------------------------------------------------------
                                                            Cpanel COMMAND CLASS
------------------------------------------------------------------------- */


/* -----------------------------------------------------------------------
        CPanel::IsValid -
------------------------------------------------------------------------- */
bool_t CPanel::IsValid(TAppl *pApp)
{
        ls_index        activeDoc       = pApp->ActiveDoc();
        if (activeDoc != kLsNoElem) {
                DRDoc*  theDoc = ((DRDoc*)pApp->GetDoc(activeDoc));
                return (theDoc == NULL) ? false : true;
        }
        return (false);

//      return pApp->ActiveWindow() && ! pApp->ActiveWindow()->IsModalDlog();

} /* CPanel::IsValid */


/* -----------------------------------------------------------------------
        CPanel::do_cmd -
------------------------------------------------------------------------- */
err_t CPanel::do_cmd(void)
{
        TAppl*          pApp            = (Dramatica*)AP_Data()->fApp;
        ls_index        activeDoc       = pApp->ActiveDoc();
        assert(activeDoc != kLsNoElem);
        DRDoc*   theDoc = ((DRDoc*)pApp->GetDoc(activeDoc));
        assert(theDoc != NULL);
```

```
        (new CPanelDlog(rCPanelDlog, theDoc, CpPopupInitTable, kClearBtn, kRevertBtn, kStoryCount))->ModalLoop();

        return NOERR;

} /* CPanel::do_cmd */

#pragma segment main

/* $Log:           cpanel.cc,v $
Revision 1.21  93/09/24  15:29:31  stephen
Cleaned up warnings.

Revision 1.20  93/08/20  13:50:57  stephen
rewrote some semval calculation routines for public use.

Revision 1.19  93/06/25  10:57:37  chris
Added names and definitions in help text.

Revision 1.18  93/06/24  20:03:28  stephen
New help functions for bottom text area implemented.

Revision 1.17  93/06/10  18:32:11  chris
Added lock "icons" to the new CPanel.

Revision 1.16  93/06/10  14:46:55  stephen
Help Palette connection.

Revision 1.15  93/06/05  01:15:27  stephen
Attempted to make help palettes work...

Revision 1.14  93/06/03  23:13:59  stephen
Added Help palettes.

Revision 1.13  93/05/28  16:21:53  stephen
Experimented with putting in track loop for help palletts.

Revision 1.12  93/05/27  16:33:03  stephen
Fixed problem with reverting already-selected menus when
bringing up the control panel again.

Revision 1.11  93/05/26  19:45:34  stephen
Windows patches.

Revision 1.10  93/05/24  21:35:20  stephen
Fixed IsValid checking to respect current document.

Revision 1.9  93/05/14  13:55:33  stephen
Fixed semval for MCProb (for real!)

Revision 1.8  93/05/13  16:34:20  stephen
Fixed SaveStorySettings so that the MCProblem was
built with the correct domain.

Revision 1.7  93/05/04  21:31:34  stephen
Minor changes to account for Dynamic SemVals.

Revision 1.6  93/05/04  16:29:28  stephen
Added dynamic table for first eight questions.

Revision 1.5  93/05/03  16:34:53  stephen
Added Justification;  Adjusted semval input & output.

Revision 1.4  93/04/24  14:32:24  stephen
Fixed appreciation loading for good!

Revision 1.3  93/04/24  09:55:14  stephen
Made control panel load & save appreciations.

 * Revision 1.2  93/04/19  18:50:50  stephen
 * Control Panel Command
 *
 * Revision 1.1  93/04/12  20:16:19  chris
 * Initial revision
 *
 */
```

```
/* ----------------------------------------------------------------------
        CPANEL.H
        Control Panel
        Copyright (C) 1993 Screenplay Systems Inc.
        Revised:            $Id$
---------------------------------------------------------------------- */

#pragma once

#ifndef __CPANEL__
#define __CPANEL__

#include "tappl.h"
#include "appcmds.h"
#include "tdialog.h"

#include "document.h"
#include "ptext.h"
#include "storytbl.h"

class Dramatica;

#pragma segment cpanel

#define MAXPOPUPS           24

class StoryTbl;
/* ----------------------------------------------------------------------
        DITL Constants - CPanelDlog
---------------------------------------------------------------------- */

/* ----------------------------------------------------------------------
        DITL Constants - CPanelDlog
---------------------------------------------------------------------- */
const ls_index  kClearBtn               = 2;
const ls_index  kRevertBtn              = 3;
const ls_index  kStoryCount             = 58;

const ls_index  kCPResolve              = 10;
const ls_index  kCPDirection            = 12;
const ls_index  kCPApproach             = 14;
const ls_index  kCPSex                  = 16;
const ls_index  kCPWork                 = 18;
const ls_index  kCPLimit                = 20;
const ls_index  kCPOutcome              = 22;
const ls_index  kCPJudgment             = 24;

const ls_index  kCPDomain               = 26;
const ls_index  kCPConcern              = 28;
const ls_index  kCPTheme                = 30;
const ls_index  kCPProblem              = 32;

const ls_index  kCPStoryGoal            = 34;
const ls_index  kCPConsequence          = 36;
const ls_index  kCPCost                 = 38;
const ls_index  kCPDividend             = 40;

const ls_index  kCPMcProblem            = 42;
const ls_index  kCPMcSolution           = 44;
const ls_index  kCPMcFocus              = 46;
const ls_index  kCPMcDirection          = 48;

const ls_index  kCPMcDomain             = 50;
const ls_index  kCPMcThemFocus          = 52;
const ls_index  kCPMcUniqAbil           = 54;
const ls_index  kCPMcCritFlaw           = 56;

const ls_index  kCPHelpTextArea         = 59;

//  CHECKBOXES for LOCKS

const ls_index  kCPResolveLock          = 60;
const ls_index  kCPDirectionLock        = 61;
const ls_index  kCPApproachLock         = 62;
const ls_index  kCPSexLock              = 63;
const ls_index  kCPWorkLock             = 64;
const ls_index  kCPLimitLock            = 65;
const ls_index  kCPOutcomeLock          = 66;
const ls_index  kCPJudgmentLock         = 67;

const ls_index  kCPDomainLock           = 68;
const ls_index  kCPConcernLock          = 69;
const ls_index  kCPThemeLock            = 70;
const ls_index  kCPProblemLock          = 71;

const ls_index  kCPStoryGoalLock        = 72;
const ls_index  kCPConsequenceLock      = 73;
const ls_index  kCPCostLock             = 74;
const ls_index  kCPDividendLock         = 75;

const ls_index  kCPMcProblemLock        = 76;
const ls_index  kCPMcSolutionLock       = 77;
const ls_index  kCPMcFocusLock          = 78;
const ls_index  kCPMcDirectionLock      = 79;

const ls_index  kCPMcDomainLock         = 80;
const ls_index  kCPMcThemFocusLock      = 81;
const ls_index  kCPMcUniqAbilityLock    = 82;
const ls_index  kCPMcCritFlawLock       = 83;

typedef  short      pu_menu_t;

#if 0
const pu_menu_t  kChoiceMenu            = 1;
const pu_menu_t  kClassMenu             = 2;
const pu_menu_t  kTypeMenu              = 3;
const pu_menu_t  kVarMenu               = 4;
const pu_menu_t  kElemMenu              = 5;
#endif

//      Constants for set_help_values():

const ls_index  kNoMenuHelp             = -100;
```

```
const short                kNoSemValHelp              = -100;

/* -----------------------------------------------------------------------
        CPanelDlog - The Control Panel Dialog (Now called the Story Engine)
-------------------------------------------------------------------------- */
class EXPORT_CLASS CPanelDlog : public TDialog {
public:
        CPanelDlog(short resID, DRDoc* theDoc, STPopupInit* popupInitTable, ls_index clearBtn = 0, ls_index revertBtn =
0, ls_index storyCountBtn = 0);
        virtual ~CPanelDlog(void);

        // PUBLIC UTILITIES
        virtual char*     ClassName(void) const       { return "CPanelDlog"; }
        virtual class_t   ClassType(void) const       { return kCPanelDlog; }
        virtual bool_t    IsOfType(const void *pType) const { return *(class_t*) pType == kCPanelDlog ||
TDialog::IsOfType(pType); }

        virtual void      DoItemHit(ls_index itemHit);
//      virtual void      DoIdle(void);

        //       This is public because it's accessed via the menuProc

        short                     menuPos_to_token(STSearchRec* searchRec, short menuPos);

protected:
        // DATA MEMBERS
        Dramatica*                fApp;                                            // Kept here for convenience
sake
        DRDoc*                    fDoc;
        pfm_fd_t                  fAppPFMFile;

        StoryTbl*                 fStoryTbl;
        hdl_t                     fApprecCopyHdl;                          // Saved version of appreciations BEFORE
modification
        PText*                    fResponses;
        PText*                    fLockApprPT;                             // Segment containing lock information
        STPopupInit*      fPopupInitTable;                 // Points to popup initialization table
        short                     fNmOfPopups;                             // Count of items in the fPopupInitTable

        ushort                    fTotalStories;                           // Number of stories currently available
to us
        ushort                    fInitialStoryCount;                      // Number of stories available upon
entry (in case of cancel or revert)
        short                     fWhichTables[kMaxSearchSlots+1];// Which search tables to load (+1 because last
position is a sentinel "0")

        ls_index                  fClearBtn;                                       // ls_index of clear button
        ls_index                  fRevertBtn;                                      // ls_index of revert button
        ls_index                  fStoryCountItem;                 // ls_index of storyCount item

        ls_index                  fLastHelpItemHit;                        // Which of the popup menus was last
hit?
        short                     fLastHelpSemVal;                 // And which Semval was selected?

        GLRect                    fpopHelpRects[MAXPOPUPS];  // used to change cursor
        ls_index                  fCurrentCursor;                          // Track our current cursor to prevent
repeat setting

        // LOCAL UTILITIES
        virtual ushort    init_storyTable(void);
        void                      save_lock_status(void);
        virtual void      draw_window(GL_ENV_REF env);
        virtual void      init_dlog(void);
        void                      reset_menus(void);
        void                      buildAllMenus(void);
        void                      buildChoiceMenu(STSearchRec* searchRec);
        void                      buildAnyMenu(STSearchRec* searchRec);
        virtual void      save_story_settings(void);
        bool_t                    popup_menu_hit(ls_index itemHit, STSearchRec** retSearchRec);
        void                      displayStoryCount(void);
        void                      set_help_text(char* theText);
        virtual void      set_help_values(ls_index ItemHit, short semVal);
        virtual void      draw_locks();

}; /* CPanelDlog */



/* -----------------------------------------------------------------------
        CPanel - the command class associated with the "Cmdl" menu item
                 in the "Dramatica" menu.
-------------------------------------------------------------------------- */
class CPanel : public TCommand {
public:
        CPanel(TAppl* pTAppl) : TCommand(pTAppl) {}

        virtual char*     ClassName(void)   const      { return "CPanel"; }
        virtual class_t   ClassType(void) const        { return kCPanelCmd; }
        virtual bool_t    IsOfType(const void *pType) const { return *(class_t*) pType == kCPanelCmd ||
TCommand::IsOfType(pType); }
        virtual TObject* Duplicate(void) const        { return new CPanel(*this); }

        static bool_t     IsValid(TAppl *pTAppl);

protected:
        virtual err_t     do_cmd(void);

}; /* CPanel */

#endif /* __CPANEL__ */


/* $Log:          cpanel.h,v $
 * Revision 1.14  93/09/24  15:29:38  stephen
 * Cleaned up warnings.
 *
 * Revision 1.13  93/08/20  13:52:14  stephen
 * rewrote some semval calculation routines for public use.
 *
 * Revision 1.12  93/06/25  10:57:56  chris
```

```
* Added names and definitions in help text.
*
* Revision 1.11  93/06/24  20:03:45  stephen
* New help functions for bottom text area implemented.
*
* Revision 1.10  93/06/10  18:32:31  chris
* Added lock "icons" to the new CPanel.
*
* Revision 1.9  93/06/10  14:47:17  stephen
* Help Palette connection.
*
* Revision 1.8  93/06/05  01:13:36  stephen
* Attempted to get help palette working...
*
* Revision 1.7  93/06/03  23:14:07  stephen
* Added Help palettes.
*
* Revision 1.6  93/05/04  16:30:35  stephen
* Added table for first eight questions.
*
* Revision 1.5  93/05/03  16:35:30  stephen
* Added Justification;  Adjusted semval input & output.
*
* Revision 1.4  93/04/24  14:29:13  stephen
* Fixed problem with appreciations loading.
*
* Revision 1.3  93/04/24  09:55:41  stephen
* Made control panel load & save appreciations.
*
* Revision 1.2  93/04/19  18:50:57  stephen
* Control Panel Command
*
*/
```

```
/* -----------------------------------------------------------------------
        DEFINE.R
        Dramatica's Semantic Definitions
        Copyright (C) 1993 Screenplay Systems Inc.
        $Id: define.r,v 1.20 93/09/03 15:51:32 chris Exp Locker: stephen $
-------------------------------------------------------------------------- */

#ifdef macintosh
        #include "systypes.r"
        #include "types.r"
#else
        #include <systypes.r>
        #include <types.r>
#endif

#include "apprdefs.h"

/* -----------------------------------------------------------------------
        'SDEF' - Semantic definitions for Definition window in semval order.
-------------------------------------------------------------------------- */
type 'SDEF' {
        cstring;                        /* the definition text */
};

                        /***************************/
                        /*  DYNAMIC APPRECIATIONS  */
                        /***************************/

resource 'SDEF' (rApprChange, PFM_MIN_PRIO) {
                                                        /* Change */
        "(CNN(MC,NM)) changes (PPN(MC,P1)) essential nature in a leap of faith while attempting to solve the problem"
};

resource 'SDEF' (rApprSteadfast, PFM_MIN_PRIO) {
                                                        /* Steadfast */
        "(CNN(MC,NM)) sticks with (PPN(MC,P1)) essential nature in a leap of faith while attempting to solve the
problem"
};

resource 'SDEF' (rApprStop, PFM_MIN_PRIO) {
                                                /* Stop */
        "(CNN(MC,NM)) needs to get rid of an inappropriate character trait from (PPN(MC,P1)) personality"
};

resource 'SDEF' (rApprStart, PFM_MIN_PRIO) {
                                                        /* Start */
        "(CNN(MC,NM)) needs a character trait that (PPN(MC,NC)) lacks"
};

resource 'SDEF' (rApprDoer, PFM_MIN_PRIO) {
                                                /* Do-er */
        "(CNN(MC,NM)) prefers to adapt (PPN(MC,P1)) environment to (PPN(MC,IR))"
};

resource 'SDEF' (rApprBeer, PFM_MIN_PRIO) {
                                                /* Be-er */
        "(CNN(MC,NM)) prefers to adapt (PPN(MC,IR)) to (PPN(MC,P1)) environment"
};

resource 'SDEF' (rApprMale, PFM_MIN_PRIO) {
                                                /* Male */
        "(CNN(MC,NM)) uses male problem solving techniques"
};

resource 'SDEF' (rApprFemale, PFM_MIN_PRIO) {
                                                        /* Female */
        "(CNN(MC,NM)) uses female problem solving techniques"
};

resource 'SDEF' (rApprAction, PFM_MIN_PRIO) {
                                                        /* Action */
        "in terms of the objective plot, actions force decisions"
};

resource 'SDEF' (rApprDecision, PFM_MIN_PRIO) {
                                                        /* Decision */
        "in terms of the objective plot, decisions force actions"
};

resource 'SDEF' (rApprTimelock, PFM_MIN_PRIO) {
                                                        /* Timelock */
        "the story climax is forced by a time limit"
};

resource 'SDEF' (rApprOptionlock, PFM_MIN_PRIO) {
                                                        /* Spacelock */
        "the story climax occurs because all other options have been exhausted"
};

resource 'SDEF' (rApprSuccess, PFM_MIN_PRIO) {
                                                        /* Success */
        "the original goal is achieved"
};

resource 'SDEF' (rApprFailure, PFM_MIN_PRIO) {
                                                        /* Failure */
        "the original goal is not achieved"
};

resource 'SDEF' (rApprGood, PFM_MIN_PRIO) {
                                                /* Good */
        "(CNN(MC,NM)) ultimately succeeds in resolving (PPN(MC,P1)) personal problems"
};

resource 'SDEF' (rApprBad, PFM_MIN_PRIO) {
                                                /* Bad */
        "(CNN(MC,NM)) ultimately fails in resolving (PPN(MC,P1)) personal problems"
};

                        /************************/
                        /*  SUPERAPPRECIATIONS  */
                        /************************/
```

```
resource 'SDEF' (rApprActualDilemma, PFM_MIN_PRIO) {
                                                                /* Actual Dilemma */
        "(CNN(MC,NM))'s decision to change results in success"
};
resource 'SDEF' (rApprApparentDilemma, PFM_MIN_PRIO) {
                                                                /* Apparent Dilemma */
        "(CNN(MC,NM))'s decision to change results in failure"
};
resource 'SDEF' (rApprActualWork, PFM_MIN_PRIO) {
                                                                /* Actual Work */
        "(CNN(MC,NM))'s decision to remain steadfast results in success"
};
resource 'SDEF' (rApprApparentWork, PFM_MIN_PRIO) {
                                                                /* Apparent Work */
        "(CNN(MC,NM))'s decision to remain steadfast results in failure"
};
resource 'SDEF' (rApprPositive, PFM_MIN_PRIO) {
                                                                /* Positive Feel */
        "the objective characters in the story are closing in on the problem"
};
resource 'SDEF' (rApprNegative, PFM_MIN_PRIO) {
                                                                /* Negative Feel */
        "the problem is closing in on the objective characters"
};
resource 'SDEF' (rApprWilling, PFM_MIN_PRIO) {
                                                                /* Willing */
        "(CNN(MC,NM)) willingly participates in the effort to find a solution to the story problem"
};
resource 'SDEF' (rApprUnwilling, PFM_MIN_PRIO) {
                                                                /* Unwilling */
        "(CNN(MC,NM)) unwillingly participates in the effort to find a solution to the story problem"
};
resource 'SDEF' (rApprBoth, PFM_MIN_PRIO) {
                                                        /* Both */
        "both women and men will tend to empathize with the main character in this story"
};
resource 'SDEF' (rApprMaleEmpathy, PFM_MIN_PRIO) {
                                                                /* Male */
        "men will tend to empathize with the main character in this story; women will tend to sympathize"
};
resource 'SDEF' (rApprFemaleEmpathy, PFM_MIN_PRIO) {
                                                                /* Female */
        "women will tend to empathize with the main character in this story; men will tend to symapthize"
};
resource 'SDEF' (rApprNeither, PFM_MIN_PRIO) {
                                                                /* Neither */
        "both men and women will tend to sympathize with the main character in this story"
};

                        /****************/
                        /*      CLASSES         */
                        /****************/

resource 'SDEF' (rSvUniverse, PFM_MIN_PRIO) {
        "a situation"
                /* Universe */
};
resource 'SDEF' (rSvPhysics, PFM_MIN_PRIO) {
        "an activity"
                /* Physics */
};
resource 'SDEF' (rSvPsychology, PFM_MIN_PRIO) {
        "a manner of thinking"
        /* Psychology */
};
resource 'SDEF' (rSvMind, PFM_MIN_PRIO) {
        "a fixed attitude"
                /* Mind */
};

                        /****************/
                        /*      TYPES           */
                        /****************/

resource 'SDEF' (rSvPast, PFM_MIN_PRIO) {
        "what has already happened"
        /* The_Past */
};
resource 'SDEF' (rSvProgress, PFM_MIN_PRIO) {
        "the way things are going"
        /* Progress */
};
resource 'SDEF' (rSvFuture, PFM_MIN_PRIO) {
        "what will happen or what will be"                                              /* The_Future
*/
};
resource 'SDEF' (rSvPresent, PFM_MIN_PRIO) {
        "the current situation and circumstances"                                /* The_Present */
};
resource 'SDEF' (rSvUnderstanding, PFM_MIN_PRIO) {
        "appreciating the meaning of something"                                          /*
Understanding */
```

```
};
resource 'SDEF' (rSvDoing, PFM_MIN_PRIO) {
        "engaging in a physical activity"                                         /* Doing */
};

resource 'SDEF' (rSvObtaining, PFM_MIN_PRIO) {                              /* Obtaining */
        "achieving or possessing something"
};

resource 'SDEF' (rSvLearning, PFM_MIN_PRIO) {                               /* Learning */
        "gathering information or experience"
};

resource 'SDEF' (rSvConceptualizing, PFM_MIN_PRIO) {
        "visualizing how an idea might be implemented"                      /* Conceptualizing */
};

resource 'SDEF' (rSvBeing, PFM_MIN_PRIO) {                                  /* Being */
        "temporarily adopting a lifestyle"
};

resource 'SDEF' (rSvBecoming, PFM_MIN_PRIO) {
        "transforming one's nature"
        /* Becoming */
};

resource 'SDEF' (rSvConceiving, PFM_MIN_PRIO) {
        "coming up with an idea"                                                        /*
Conceiving */
};

resource 'SDEF' (rSvMemory, PFM_MIN_PRIO) {
        "recollections"
                /* Memory */
};

resource 'SDEF' (rSvPreconscious, PFM_MIN_PRIO) {
        "immediate responses"
        /* Preconscious */
};

resource 'SDEF' (rSvSubconscious, PFM_MIN_PRIO) {
        "basic drives and desires"
        /* Subconscious */
};

resource 'SDEF' (rSvConscious, PFM_MIN_PRIO) {                              /* Conscious */
        "considerations"
};

                        /****************/
                        /*      VARIATIONS      */
                        /****************/

resource 'SDEF' (rSvFate, PFM_MIN_PRIO) {
        "a future situation that will befall an individual"             /* Fate */
};

resource 'SDEF' (rSvPrediction, PFM_MIN_PRIO) {
        "a determination of a future state of affairs"                  /* Prediction */
};

resource 'SDEF' (rSvInterdiction, PFM_MIN_PRIO) {
        "an effort to change a pre-determined course"                   /* Interdiction */
};

resource 'SDEF' (rSvDestiny, PFM_MIN_PRIO) {
        "the future path an individual will take"                       /* Destiny */
};

resource 'SDEF' (rSvFact, PFM_MIN_PRIO) {
        "belief in something real"
        /* Fact */
};

resource 'SDEF' (rSvSecurity, PFM_MIN_PRIO) {
        "an evaluation of one's protections"                                      /* Security
*/
};

resource 'SDEF' (rSvThreat, PFM_MIN_PRIO) {                                 /* Threat */
        "an evaluation of one's vulnerabilities"
};

resource 'SDEF' (rSvFantasy, PFM_MIN_PRIO) {
        "belief in something unreal"                                                    /*
Fantasy */
};

resource 'SDEF' (rSvOpenness, PFM_MIN_PRIO) {
        "willingness to re-evaluate"
        /*Openness -- was Resolution */
};

resource 'SDEF' (rSvDelay, PFM_MIN_PRIO) {
        "putting off until later"                                                       /*
Delay */
};

resource 'SDEF' (rSvChoice, PFM_MIN_PRIO) {                                 /* Choice */
        "making a decision"
};

resource 'SDEF' (rSvPreconception, PFM_MIN_PRIO) {
        "unwillingness to re-evaluate"
                /* Preconception */
};

resource 'SDEF' (rSvWork, PFM_MIN_PRIO) {
        "applying oneself to something known to be within one's ability"        /* Work */
};
```

```
resource 'SDEF' (rSvAttraction, PFM_MIN_PRIO) {
        "drawing or being drawn to something"
        /* Attract  -- was Do */
};

resource 'SDEF' (rSvRepulsion, PFM_MIN_PRIO) {
        "pushing or being pushed away from"
                /* Repel  -- was Don't */
};

resource 'SDEF' (rSvAttempt, PFM_MIN_PRIO) {
        "applying oneself to something not known to be within one's ability"    /* Attempt  -- was Try */
};

resource 'SDEF' (rSvInstinct, PFM_MIN_PRIO) {                                    /* Instinct */
        "intrinsic unconditioned responses"
};

resource 'SDEF' (rSvSenses, PFM_MIN_PRIO) {                                      /* Senses */
        "sensory observations"
};

resource 'SDEF' (rSvInterpretation, PFM_MIN_PRIO) {                           /* Interpretation */
        "determination of possible meaning"
};

resource 'SDEF' (rSvConditioning, PFM_MIN_PRIO) {
        "responses based on experience or training"                              /* Conditioning */
};

resource 'SDEF' (rSvWisdom, PFM_MIN_PRIO) {                                      /* Wisdom */
        "understanding how to apply Knowledge"
};

resource 'SDEF' (rSvSkill, PFM_MIN_PRIO) {
        "practiced ability"
                /* Skill */
};

resource 'SDEF' (rSvExperience, PFM_MIN_PRIO) {                                  /* Experience */
        "the gaining of familiarity"
};

resource 'SDEF' (rSvEnlightenment, PFM_MIN_PRIO) {
        "an understanding that transcends knowledge"                             /* Enlightenment */
};

resource 'SDEF' (rSvApproach, PFM_MIN_PRIO) {
        "one's methodology of doing or being"                                           /* Approach
*/
};

resource 'SDEF' (rSvSelfInterest, PFM_MIN_PRIO) {
        "doing or being based on what is best for oneself"                    /* Self-Interest */
};

resource 'SDEF' (rSvMorality, PFM_MIN_PRIO) {
        "doing or being based on what is best for others"                     /* Morality */
};

resource 'SDEF' (rSvAttitude, PFM_MIN_PRIO) {
        "one's demeanor while doing or being"                                           /* Attitude
*/
};

resource 'SDEF' (rSvPrerequisites, PFM_MIN_PRIO) {                            /* Prerequisites */
        "preliminary steps that must be met"
};

resource 'SDEF' (rSvStrategy, PFM_MIN_PRIO) {
        "a plan to achieve one's purpose or a plan of response"               /* Strategy */
};

resource 'SDEF' (rSvAnalysis, PFM_MIN_PRIO) {                                    /* Analysis */
        "evaluation of the situation and/or circumstances"
};

resource 'SDEF' (rSvPreconditions, PFM_MIN_PRIO) {
        "limitations tacked on to an effort"                                            /*
Preconditions */
};

resource 'SDEF' (rSvStateOfBeing, PFM_MIN_PRIO) {                             /* State-of-Being */
        "one's true self"
};

resource 'SDEF' (rSvSituation, PFM_MIN_PRIO) {                                   /* Situation */
        "the arrangement of one's environment"
};

resource 'SDEF' (rSvCircumstances, PFM_MIN_PRIO) {                            /* Circumstances */
        "the relationship of oneself to the environment"
};

resource 'SDEF' (rSvSenseOfSelf, PFM_MIN_PRIO) {
        "one's perception of oneself"
                /* Sense-of-Self */
};

resource 'SDEF' (rSvKnowledgeVar, PFM_MIN_PRIO) {
        "that which one holds to be true"
        /* Knowledge */
};

resource 'SDEF' (rSvAbilityVar, PFM_MIN_PRIO) {
        "being suited to handle a task; the innate capacity to do or be"      /* Ability */
};

resource 'SDEF' (rSvDesireVar, PFM_MIN_PRIO) {
        "the motivation to change one's situation or circumstances"                /* Desire */
};

resource 'SDEF' (rSvThoughtVar, PFM_MIN_PRIO) {
```

```
        "the process of consideration"
                /* Thought */
};

resource 'SDEF' (rSvRationalization, PFM_MIN_PRIO) {
        "a logical alternative used to mask the real reason"                /* Rationalization */
};

resource 'SDEF' (rSvCommitment, PFM_MIN_PRIO) {
        "a decision to stick with something regardless of the consequences"        /* Commitment */
};

resource 'SDEF' (rSvResponsibility, PFM_MIN_PRIO) {
        "the belief that one is best suited to accomplish a task"                /* Responsibility */
};

resource 'SDEF' (rSvObligation, PFM_MIN_PRIO) {
        "accepting a task or situation in exchange for someone's potential favors"        /* Obligation */
};

resource 'SDEF' (rSvPermission, PFM_MIN_PRIO) {
        "one's ability based on what is allowed"                        /*
Permission */
};

resource 'SDEF' (rSvNeed, PFM_MIN_PRIO) {
        "that which is required"
                /* Need */
};

resource 'SDEF' (rSvExpediency, PFM_MIN_PRIO) {
        "most efficient course considering repercussions"                /* Expediency
*/
};

resource 'SDEF' (rSvDeficiency, PFM_MIN_PRIO) {
        "motivation based on lack"
                        /* Deficiency */
};

resource 'SDEF' (rSvTruth, PFM_MIN_PRIO) {
        "that which has been proven correct"
        /* Truth */
};

resource 'SDEF' (rSvEvidence, PFM_MIN_PRIO) {
        "information supporting a belief"
        /* Evidence */
};

resource 'SDEF' (rSvSuspicion, PFM_MIN_PRIO) {                                /*
Suspicion */
        "questioning a belief based on evidence"
};

resource 'SDEF' (rSvFalsehood, PFM_MIN_PRIO) {
        "that which has been shown to be erroneous"                        /*
Falsehood */
};

resource 'SDEF' (rSvValue, PFM_MIN_PRIO) {
        "the objective usefulness of something in general"                /* Value */
};

resource 'SDEF' (rSvConfidence, PFM_MIN_PRIO) {
        "belief in the accuracy of an expectation"                        /*
Confidence */
};

resource 'SDEF' (rSvWorry, PFM_MIN_PRIO) {                                /*
Worry */
        "concern for the future"
};

resource 'SDEF' (rSvWorth, PFM_MIN_PRIO) {                                /*
Worth */
        "a rating of usefulness or desireabiltiy to oneself"
};

resource 'SDEF' (rSvClosure, PFM_MIN_PRIO) {                                /*
Closure */
        "bringing something to an end"
};

resource 'SDEF' (rSvHope, PFM_MIN_PRIO) {                                /*
Hope */
        "a desired future if things go as expected"
};

resource 'SDEF' (rSvDream, PFM_MIN_PRIO) {                                /*
Dream */
        "a desired future that requires unexpected developments"
};

resource 'SDEF' (rSvDenial, PFM_MIN_PRIO) {
        "the refusal to let something go"
        /* Denial */
};

resource 'SDEF' (rSvInvestigation, PFM_MIN_PRIO) {
        "gathering evidence to resolve questions of validity"                /*
Investigation */
};

resource 'SDEF' (rSvAppraisal, PFM_MIN_PRIO) {
        "an initial understanding"
                        /* Appraisal */
};

resource 'SDEF' (rSvReappraisal, PFM_MIN_PRIO) {                        /*
Reappraisal */
        "a reconsideration of a conclusion"
};
```

```
resource 'SDEF' (rSvDoubt, PFM_MIN_PRIO) {
        "questioning validity without investigating to be sure"                    /* Doubt */
};

                    /*****************/
                    /*    ELEMENTS     */
                    /*****************/

resource 'SDEF' (rSvAbilityElem, PFM_MIN_PRIO) {
        "being suited to handle a task; the innate capacity to do or be"     /* Ability */
};

resource 'SDEF' (rSvAcceptance, PFM_MIN_PRIO) {
        "a decision not to oppose"
                    /* Acceptance */
};

resource 'SDEF' (rSvAccurate, PFM_MIN_PRIO) {                                         /*
Accurate */
        "being within tolerances"
};

resource 'SDEF' (rSvActuality, PFM_MIN_PRIO) {
        "an objective reality - the way things are"                                    /*
Actuality */
};

resource 'SDEF' (rSvAvoidance, PFM_MIN_PRIO) {
        "stepping around, preventing or escaping from a problem rather than solving it"  /* Avoid */
};

resource 'SDEF' (rSvAware, PFM_MIN_PRIO) {
        "being conscious of things outside oneself"                                    /*
Aware */
};

resource 'SDEF' (rSvCause, PFM_MIN_PRIO) {
        "the specific circumstances that lead to an effect"                       /* Cause */
};

resource 'SDEF' (rSvCertainty, PFM_MIN_PRIO) {
        "a conclusion that something is absolutely true"                          /* Certainty
*/
};

resource 'SDEF' (rSvChange, PFM_MIN_PRIO) {
        "an alteration of a state or process"
        /* Change */
};

resource 'SDEF' (rSvChaos, PFM_MIN_PRIO) {
        "random change or a lack of order"
        /* Chaos */
};

resource 'SDEF' (rSvConscience, PFM_MIN_PRIO) {
        "foregoing an immediate benefit because of future consequences"      /* Conscience */
};

resource 'SDEF' (rSvConsider, PFM_MIN_PRIO) {
        "weighing pros and cons"
                /* Consideration */
};

resource 'SDEF' (rSvControlled, PFM_MIN_PRIO) {
        "a method based on organization and constraint"                                /*
Controlled */
};

resource 'SDEF' (rSvDeduction, PFM_MIN_PRIO) {
        "a process of thought that determines certainty"                          /* Deduction
*/
};

resource 'SDEF' (rSvDesireElem, PFM_MIN_PRIO) {
        "the motivation to change one's situation or circumstances"          /* Desire */
};

resource 'SDEF' (rSvDetermination, PFM_MIN_PRIO) {
        "a conclusion as to the cause behind a particular effect"            /* Determination */
};

resource 'SDEF' (rSvDisbelief, PFM_MIN_PRIO) {
        "the belief that something is untrue"
        /* Disbelief */
};

resource 'SDEF' (rSvEffect, PFM_MIN_PRIO) {
        "the specific outcome forced by a cause"                                       /*
Effect */
};

resource 'SDEF' (rSvEnding, PFM_MIN_PRIO) {
        "coming to a conclusion"
                /* Ending */
};

resource 'SDEF' (rSvEquity, PFM_MIN_PRIO) {
        "a balance, fairness, or stability"
                /* Equity */
};

resource 'SDEF' (rSvEvaluation, PFM_MIN_PRIO) {
        "an appraisal of a situation and/or circumstances"                        /* Evaluation
*/
};

resource 'SDEF' (rSvExpectation, PFM_MIN_PRIO) {
        "a conclusion as to the eventual effect of a particular cause"       /* Expectation */
};
```

```
resource 'SDEF' (rSvFaith, PFM_MIN_PRIO) {
        "accepting something as certain without proof "                                   /*
Faith */
};

resource 'SDEF' (rSvFeeling, PFM_MIN_PRIO) {                                                 /*
Feeling */
        "an emotional sense of how things are going"
};

resource 'SDEF' (rSvHelp, PFM_MIN_PRIO) {
        "a direct assistance to another's effort to achieve their goal"          /* Help */
};

resource 'SDEF' (rSvHinder, PFM_MIN_PRIO) {
        "a direct detraction from another's effort to achieve their goal"     /* Hinder */
};

resource 'SDEF' (rSvHunch, PFM_MIN_PRIO) {                                                   /*
Hunch */
        "a conclusion based on intuition"
};

resource 'SDEF' (rSvInaction, PFM_MIN_PRIO) {                                                /*
Inaction */
        "taking no action as a means of response"
};

resource 'SDEF' (rSvInduction, PFM_MIN_PRIO) {                                               /*
Induction */
        "a means of determining possibility"
};

resource 'SDEF' (rSvInequity, PFM_MIN_PRIO) {
        "an unbalance, unfairness, or lack or stability"                           /* Inequity
*/
};

resource 'SDEF' (rSvInertia, PFM_MIN_PRIO) {                                                 /*
Inertia */
        "a continuation of a state or process"
};

resource 'SDEF' (rSvKnowledgeElem, PFM_MIN_PRIO) {
        "that which one holds to be true"
        /* Knowledge */
};

resource 'SDEF' (rSvLogic, PFM_MIN_PRIO) {                                                   /*
Logic */
        "a rational sense of how things are related"
};

resource 'SDEF' (rSvNonAcceptance, PFM_MIN_PRIO) {
        "a decision to oppose"
                        /* Non-acceptance */
};

resource 'SDEF' (rSvNonAccurate, PFM_MIN_PRIO) {                                        /* Non-
Accurate */
        "not within tolerances"
};

resource 'SDEF' (rSvOppose, PFM_MIN_PRIO) {
        "an indirect detraction from another's effort"                                    /*
Oppose */
};

resource 'SDEF' (rSvOrder, PFM_MIN_PRIO) {
        "an arrangement in which patterns are seen"                                       /*
Order */
};

resource 'SDEF' (rSvPerception, PFM_MIN_PRIO) {                                              /*
Perception */
        "the way things seem to be"
};

resource 'SDEF' (rSvPossibility, PFM_MIN_PRIO) {                                        /*
Possibility */
        "a determination that something might be true"
};

resource 'SDEF' (rSvPotentiality, PFM_MIN_PRIO) {                                       /*
Potentiality */
        "a determination that something has the capacity to become true"
};

resource 'SDEF' (rSvProaction, PFM_MIN_PRIO) {
        "taking initiative action to achieve one's goals"                          /* Proaction
*/
};

resource 'SDEF' (rSvProbability, PFM_MIN_PRIO) {                                        /*
Probability */
        "a determination of likelihood"
};

resource 'SDEF' (rSvProcess, PFM_MIN_PRIO) {                                                 /*
Process */
        "the mechanism through which a cause leads to an effect"
};

resource 'SDEF' (rSvProduction, PFM_MIN_PRIO) {
        "a process of thought that determines potential"                           /* Production
*/
};

resource 'SDEF' (rSvProjection, PFM_MIN_PRIO) {
        "an extension of probability into the future"                                     /*
Projection */
};
```

```
resource 'SDEF' (rSvProtection, PFM_MIN_PRIO) {
        "an effort to prevent one's concerns from being vulnerable to interference"                /*
Protection */
};

resource 'SDEF' (rSvProven, PFM_MIN_PRIO) {
        "a rating of knowledge based on corroboration"
                              /* Proven */
};

resource 'SDEF' (rSvPursuit, PFM_MIN_PRIO) {                                                          /*
Pursuit */
        "a directed effort to resolve a problem"
};

resource 'SDEF' (rSvReevaluation, PFM_MIN_PRIO) {                                                 /* Re-
evaluation */
        "a reappraisal of a situation or circumstances"
};

resource 'SDEF' (rSvReaction, PFM_MIN_PRIO) {                                                         /*
Reaction */
        "actions made in response"
};

resource 'SDEF' (rSvReconsider, PFM_MIN_PRIO) {
        "questioning a conclusion based on additional information"
                /* Reconsideration */
};

resource 'SDEF' (rSvReduction, PFM_MIN_PRIO) {
        "a process of thought that determines probability"
                          /* Reduction */
};

resource 'SDEF' (rSvResult, PFM_MIN_PRIO) {
                                      /* Result */
        "the ramifications of a specific effect"
};

resource 'SDEF' (rSvSelfAware, PFM_MIN_PRIO) {
        "being conscious of one's own existence"
                              /* Self-Aware */
};

resource 'SDEF' (rSvSpeculation, PFM_MIN_PRIO) {
        "an extension of possibility into the future"
                              /* Speculation */
};

resource 'SDEF' (rSvSupport, PFM_MIN_PRIO) {
        "an indirect assistance given to another's efforts"
                          /* Support */
};

resource 'SDEF' (rSvTemptation, PFM_MIN_PRIO) {
        "the urge to embrace immediate benefits despite possible consequences"                     /*
Temptation */
};

resource 'SDEF' (rSvTest, PFM_MIN_PRIO) {
        "a trial to determine something's validity"
                              /* Test */
};

resource 'SDEF' (rSvTheory, PFM_MIN_PRIO) {
        "an unbroken chain of relationships leading from a premise to a conclusion"                /*
Theory */
};

resource 'SDEF' (rSvThoughtElem, PFM_MIN_PRIO) {
        "the process of consideration"
                                          /* Thought */
};

resource 'SDEF' (rSvTrust, PFM_MIN_PRIO) {
        "an acceptance of knowledge as proven without first testing its validity"                 /*
Trust */
};

resource 'SDEF' (rSvUnEnding, PFM_MIN_PRIO) {
        "a continuance without cessation"
                                      /* Un-Ending */
};

resource 'SDEF' (rSvUncontrolled, PFM_MIN_PRIO) {
        "a disorganized response"
                                          /* Uncontrolled */
};

resource 'SDEF' (rSvUnproven, PFM_MIN_PRIO) {
        "a rating of knowledge that has not been tested"
                          /* Unproven */
};


/* $Log:        define.r,v $
# Revision 1.20  93/09/03  15:51:32  chris
# Definitions updated.
#
# Revision 1.19  93/08/24  14:10:49  chris
# Cleanup.
#
# Revision 1.18  93/06/24  11:34:47  chris
# Changed reduction definition.
#
# Revision 1.17  93/06/02  21:45:36  chris
# Changed positions of type, variations, and elements between classes.
#
# Revision 1.16  93/06/02  16:06:44  chris
# Clean up.
#
```

```
# Revision 1.15  93/05/30  16:25:51  chris
# Clean up.
#
# Revision 1.14  93/05/29  18:57:25  chris
# Clean up.
#
# Revision 1.13  93/05/29  17:27:59  chris
# Clean up.
#
# Revision 1.12  93/05/26  19:45:43  stephen
# Windows patches.
#
# Revision 1.11  93/05/21  17:14:14  chris
# Clean-up.
#
# Revision 1.10  93/05/20  11:22:15  chris
# Clean-up.
#
# Revision 1.9  93/05/18  18:13:56  chris
# Further definition refinements.
#
# Revision 1.8  93/05/18  14:59:27  chris
# More definition refinement.
#
# Revision 1.7  93/05/17  15:21:46  chris
# Corrected bug (accidental [ left in "REACH" text) that caused bomb.
#
# Revision 1.6  93/05/13  15:39:08  chris
# Definition cleanup.
#
# Revision 1.5  93/05/12  17:58:40  chris
# Modified definitions to include replacement text.
#
# Revision 1.4  93/05/10  10:22:59  chris
# Updated some definitions.
#
# Revision 1.3  93/05/07  10:16:17  chris
# Added high level dynamics to the story points window.
#
# Revision 1.2  93/04/29  14:19:36  chris
# Changed "Do" and "Don't" to "Attract" and "Repel".
#
# Revision 1.1  93/04/20  17:46:59  chris
# Initial revision
#
*/
```

```
/*************************************************************************
        DELCHAR.CC
        Delete a character
        (c) 1993 Screenplay Systems
        Authors:        S. Greenfield & C. Huntley
        Created:        May 21, 1993
        Revised:        $Id$
*************************************************************************

*/

#include "appdlogs.h"

#include "buildchr.h"
#include "castlist.h"
#include "castlist.h"
#include "document.h"
#include "delchar.h"

#pragma segment delchar

/* ---------------------------------------------------------------------------
                                                        DelCharCmd COMMAND CLASS
------------------------------------------------------------------------------ */

/* ---------------------------------------------------------------------------
        DelCharCmd::IsValid -
------------------------------------------------------------------------------ */
bool_t DelCharCmd::IsValid(TAppl *pApp)
{
        TWindow*          theWindow = pApp->ActiveWindow();
        if (theWindow && ((theWindow->ClassType() == kCLWindow) || (theWindow->ClassType() == kBCWindow))) {
                DRDoc*    theDoc = (DRDoc*)theWindow->GetDoc();
                assert(theDoc);
                CastListView* CLView = (theWindow->ClassType() == kCLWindow) ? theDoc->GetCastListView() : theDoc-
>GetBCCastListView();
                assert(CLView);
                if (CLView->SelectionExists())
                        return true;
        }

        return false;

} /* DelCharCmd::IsValid */

/* ---------------------------------------------------------------------------
        DelCharCmd::do_cmd -
------------------------------------------------------------------------------ */
err_t DelCharCmd::do_cmd(void)
{
        TWindow*          theWindow = fParentApp->ActiveWindow();
        if (theWindow->IsOfType(&kCLWindow) || theWindow->IsOfType(&kBCWindow)) {
                DRDoc*    theDoc = (DRDoc*)theWindow->GetDoc();
                assert(theDoc);

                CastListView* CLView = (theWindow->IsOfType(&kCLWindow)) ? theDoc->GetCastListView() : theDoc-
>GetBCCastListView();
                assert(CLView);
                if (CLView->SelectionExists()) {
                        short whichChar = CLView->GetWhichCharSelected();
                        CharInfoRec charInfo;
                        theDoc->GetCharInfoRec(whichChar, &charInfo);
                        if (charInfo.subjective == kCHNeither)
                                theDoc->DeleteChar(whichChar);
                        else {
                                AP_UserMessage("You cannot delete your Main/Obstacle Character.  Make another
character Main/Obstacle first.");
                        }
                }
                else
                        beep();
        }
        else beep();

        return NOERR;

} /* DelCharCmd::do_cmd */

#pragma segment main


/* $Log:        delchar.cc,v $
Revision 1.1  93/05/21  22:05:27  stephen
Initial revision

 */
```

```
/* -----------------------------------------------------------------------
        DELCHAR.H
        Delete a character
        Copyright (C) 1993 Screenplay Systems Inc.
        Revised:        $Id$
   ----------------------------------------------------------------------- */

#pragma once

#ifndef __DELCHAR__
#define __DELCHAR__

#include "tappl.h"
#include "appcmds.h"
#include "consts.h"

#pragma segment delchar

/* -----------------------------------------------------------------------
        DelCharCmd - Invokes the Create character dialog.
   ----------------------------------------------------------------------- */
class DelCharCmd : public TCommand {
public:
        DelCharCmd(TAppl* pTAppl) : TCommand(pTAppl) {}

        virtual char*      ClassName(void)   const    { return "DlChCmd"; }
        virtual class_t    ClassType(void) const      { return kDelCharCmd; }
        virtual bool_t     IsOfType(const void *pType) const { return *(class_t*) pType == kDelCharCmd ||
TCommand::IsOfType(pType); }
        virtual TObject* Duplicate(void) const        { return new DelCharCmd(*this); }

        static bool_t      IsValid(TAppl *pTAppl);

protected:
        virtual err_t      do_cmd(void);

}; /* DelCharCmd */

#pragma segment main

#endif /* __DELCHAR__ */

/* $Log:          delchar.h,v $
 * Revision 1.1  93/05/21  22:05:38  stephen
 * Initial revision
 *
 */
```

```
/**********************************************************************
        DOCUMENT.CC
        implementation of DRDoc, Dramatica's custom document class.
        (c) 1993 Screenplay Systems
        Authors:        S. Greenfield & C. Huntley
        Created:        April 1, 1993
        Revised:        $Id$
***********************************************************************

*/

#include <errno.h>
#include "genutls.h"
#include "listsx.h"
#include "appdlogs.h"
#include "bitmap.h"

#include "drrez.h"
#include "apprdefs.h"
#include "dramatic.h"
#include "document.h"

#include "ptext.h"
#include "outline.h"
#include "repwind.h"
#include "semtable.h"
#include "justify.h"
#include "dqs2.h"
#include "frontend.h"
#include "castlist.h"


#pragma segment docs

/* ----------------------------------------------------------------------
        DRDoc::DRDoc - constructor, creates a Dramatica document object.  If
                the document has an associated file than it is read by calling
                ReadDoc() here.\
---------------------------------------------------------------------- */
DRDoc::DRDoc(TAppl *pApp, const GN_FileRef *pFRef)
        : TDoc(pApp, pFRef),
          fApprecHdl (0),
          fDynamicsHdl (0),
          fApprecRecsHdl (0),
          fApprecRecs (0),
          fNmOfCharacters (0),
          fTotalStories (0),
          fStoryIsJustified (false),
          fDQSWindow (NULL),
          fReportWindow (NULL),
          fStoryPointsWindow (NULL),
          fCastListWindow (NULL),
          fBuildCharWindow (NULL),
          fCastingWindow (NULL),
          fCastListView (NULL),
          fBldChrCastListView (NULL),
          fCastingCastListView (NULL),
          fMaxCharSegID ((seg_id_t) -1),
          fMainCharID (fNoCharDefined),
          fObstacleCharID(fNoCharDefined),
          fCharList ((byte_cnt)sizeof(CharInfoRec)),
          fCharPictList (NULL),
          fMaxLocalPictID (32769),
          fStdCharPictHeight (32),
          fStdCharPictWidth (32),
          fMaxNmOfQuestions (kNmOfDQSQuestions),
          fBeepOn(false)
{
        err_t status = open_file(pFRef);

        // setup an empty document here.
        if (pFRef == NULL){

//                      NewDocWindow(rDRDocWindow, NULL, fFileRef.name);
//                      fSummaryWindow = (Summary*)new_window(NULL, WN_DOC_WINDOW, fFileRef.name, fParentApp->GetStoragePtr());
                        FEWindow* fFEWindow = (FEWindow*)new_window(NULL, WN_DOC_WINDOW, fFileRef.name, fParentApp-
>GetStoragePtr());

                        InitDoc();

        } else if (GN_GetFileType(pFRef) == GetDocType())
                        status = read_doc();
        else
                        assert(FALSE);

        if (status != NOERR)
                        DRDoc::Set(kFileError);
        Clear(kDirty);

} /* DRDoc::DRDoc */


/* ----------------------------------------------------------------------
        DRDoc::~DRDoc - destructor, closes the document's related file(s).
---------------------------------------------------------------------- */
DRDoc::~DRDoc(void)
{
        close_file();

} /* DRDoc::~DRDoc */

/* ----------------------------------------------------------------------
        DRDoc::PrintDoc - retrieves a pointer to the different Views in the document's
                active window, and asks the View to print the data it is displaying.
---------------------------------------------------------------------- */
err_t DRDoc::PrintDoc(Printing *pPrintMgr){

        assert(fWindowList.Size() > 0);
        assert(pPrintMgr);

//      OutlineView*     pView = ((DRWindow*) fWindowList.Elem(0))->GetEDView();

        TWindow* theWindow;
```

```
        int i;
        for (i=0; i<fWindowList.Size(); ++i) {
                theWindow = (TWindow*)fWindowList.Elem(i);
                if (theWindow->ClassType() == kRepWindow)
                        break;
        }

        if (theWindow->ClassType() == kRepWindow) {
                OutlineView* pView = ((RepWindow*)theWindow)->GetRepView();
                assert(pView);

                return pView->PrintView(pPrintMgr);
        }

} /* DRDoc::PrintDoc */


/* ---------------------------------------------------------------------
        DRDoc::new_window - create an instance of an Dramatica document window.
------------------------------------------------------------------------ */
TWindow* DRDoc::new_window(const GLRect *bounds, wn_type type, const char *title, ptr_t storage)
{
#if 0
        GLRect myBounds;
        GLSetRect(&myBounds, 25, 5, 265, 510);
        Summary*        pSummary = new Summary(fParentApp, this, &myBounds, type, title, storage);
        TWindow*        pTWindow = (TWindow*) pSummary;

        if (pTWindow) {
                fWindowList.Append(pTWindow);
                pSummary->SetupWindow();
                pTWindow->ShowWindow();
                fParentApp->SetActiveWindows();
                fParentApp->SetCursorRgns();
                fParentApp->AdjustCursor();

                fParentApp->ClearStoragePtr();
        }
#endif

        GLRect myBounds;
//      GLSetRect(&myBounds, 22, 2, 410, 632);
        fParentApp->GetMainScreenRect(&myBounds);
        GLInsetRect(&myBounds, 3, 3);

        FEWindow*       pFEWindow = new FEWindow(fParentApp, this, &myBounds, type, title, storage);
        TWindow*        pTWindow = (TWindow*) pFEWindow;

        if (pTWindow) {
                fWindowList.Append(pTWindow);
                pFEWindow->SetupWindow();
                pFEWindow->ShowWindow();
                fParentApp->SetActiveWindows();

                fParentApp->ClearStoragePtr();
        }


        return pTWindow;

} /* DRDoc::new_window */


/* ---------------------------------------------------------------------
        DRDoc::GetOptWindowRect - returns the best rectangle for a new doc window.
------------------------------------------------------------------------ */
GLRect* DRDoc::GetOptWindowRect(GLRect *bounds, void *pInfo)
{
        bounds->top = 20;
        bounds->left = 20;
        bounds->bottom = 356;
        bounds->right = 546;

        return (bounds);

} /* DRDoc::GetOptWindowRect */


/* ---------------------------------------------------------------------
        DRDoc::read_doc - check-out the PFM segments necessary to "read" the
                document from disk.
------------------------------------------------------------------------ */
err_t DRDoc::read_doc(void)
{
        err_t   status = NOERR;

        // call PFMCheckoutSeg() to check-out the segments necessary to initialize
        // the document's data structures.


//              fSummaryWindow = (Summary*)new_window(NULL, WN_DOC_WINDOW, fFileRef.name, fParentApp->GetStoragePtr());
        FEWindow* fFEWindow;
        if( (status = PFMError()) == NOERR)
                fFEWindow = (FEWindow*)new_window(NULL, WN_DOC_WINDOW, fFileRef.name, fParentApp->GetStoragePtr());
        else beep();

        InitDoc();


//      if( (status = PFMError()) == NOERR)
//              NewDocWindow(rDRDocWindow, NULL, fFileRef.name);

        return NOERR;

} /* DRDoc::read_doc */

/* ---------------------------------------------------------------------
        DRDoc::Close - Gets called if you close this document object.
------------------------------------------------------------------------ */
bool_t DRDoc::Close(TWindow *pTWindow, ObjList *pDocList, bool_t force)
{
        bool_t  result  = true;
```

```
#if 0
        FILE*    DBFRef;
        DBFRef = fopen("pfm.dmp", "w+b");
        PFMDumpReport(DBFRef);
        fclose(DBFRef);
#endif
        if ( ((FEWindow*)pTWindow)->IsDirty() && fWindowList.Size() == 1) {
                DRDoc::Set(kDirty);
                ls_index        itemHit;

                itemHit = AP_YesNoAlert(rMiscStrings, mSaveChangesTo, GetDocName(), kOkBtn, force);
                //itemHit = kOkBtn;

                if (itemHit == kOkBtn) {
                        if (HasFile() && !IsReadOnly()) {
                                Save();                                         // clears the dirty bit.
                        }
                        // No disk file exists or the disk file is read-only,
                        // so force a save-as.
                        else {
                                GN_FileRef      fRef;

                                memset(&fRef, '\0', sizeof(fRef));

                                if (AP_PutFile(fParentApp->GetDocFileTypes(), &fRef) == kOkBtn)
                                        SaveAs(&fRef);
                        }
                }
                else if (itemHit == kYnNoBtn)
                                Clear(kDirty);
                else
                        return (false);                                 // User pressed "CANCEL"!
Don't close the document!
        }

#if 0
        if (result && ((FEWindow*)pTWindow)->IsDirty() || IsNot(&kDirty) || fWindowList.Size() > 1) {
                if (pTWindow) {
                        fWindowList.RemoveFirst(pTWindow);
                        fParentApp->DeallocStoragePtr();
                }
                if (fWindowList.Size() == 0) {
                        assert(pDocList);
                        pDocList->RemoveFirst(this);    // file is closed in destructor
                }
                result = true;
        }
#endif
        if (((FEWindow*)pTWindow)->IsDirty() || IsNot(&kDirty) || fWindowList.Size() > 1) {
                if (fFile)
                        PFMPushCurrentFile(fFile);
                if (pTWindow) {
                        fWindowList.RemoveFirst(pTWindow);
                        fParentApp->DeallocStoragePtr();
                }
                if (fFile)
                        PFMPopCurrentFile();

                // Reset the current active window.
                fParentApp->SetActiveWindows();

                // NOTE:
                // - The line pDocList->RemoveFirst(this) below will cause this
                // TDoc to be destructed.  That's right! Its destructing itself.
                // Committing suicide.
                if (fWindowList.Size() == 0) {
                        assert(pDocList);
                        pDocList->RemoveFirst(this);    // file is closed in destructor
                }
                result = true;
        }

        return result;
} /* DRDoc::Close */


/* -------------------------------------------------------------------------
        FUNCTION:       DRDoc::InitDoc - Does document-specific initialization.
        USAGE:          Called by both the DRDoc constructor & read_doc()
------------------------------------------------------------------------- */
void DRDoc::InitDoc(void)
{
        pt_err theErr;

        fResponses              = new PText(fFile, _OSType("RESP"), 0, &theErr);

        fStellingPT             = new PText(fFile, _OSType("STEL"), 0, &theErr);

        fLockApprPT             = new PText(fFile, _OSType("LOCK"), 0, &theErr);

        fStoryDocPT             = new PText(fFile, _OSType("SDOC"), 0, &theErr);

        if (theErr == kNoSuchPFMSeg) {
                fStoryDocPT->SetParam("NmChars", 's', (short)2);
                fStoryDocPT->SetParam("Title", 'c', "Your Story");
        }

        fStoryDocPT->GetParam("NmStories", 's', &fTotalStories);
        fStoryDocPT->GetParam("IsJust", 's', &fStoryIsJustified);
        fStoryDocPT->GetParam("MaxPictID", 's', &fMaxLocalPictID);
        fStoryDocPT->GetParam("NmQuest", 's', &fMaxNmOfQuestions);

        //      INITIALIZE OUR CHARACTER TABLES

        SList idSList;
        PFMCreateIDList(_OSType("CHAR"), &idSList);
```

```
	if (idSList.Size()) {
		fStoryDocPT->GetParam("NmChars", 's', &fNmOfCharacters);
		assert(fNmOfCharacters == idSList.Size());
		for (short n = 0; n < idSList.Size(); n++) {
			CharInfoRec charInfo;
			memset(&charInfo, 0, sizeof(CharInfoRec));
			charInfo.whichSegment = idSList.Elem(n);
			fMaxCharSegID = (fMaxCharSegID==65535) ? charInfo.whichSegment : MAX(fMaxCharSegID,
charInfo.whichSegment);
			pt_err theErr;
			charInfo.charPT = new PText(fFile, _OSType("CHAR"), charInfo.whichSegment, &theErr);
			assert(theErr == NOERR);

			LoadCharInfo(&charInfo, charInfo.charPT);

			if (charInfo.whichSegment > 1) {                                              //
don't keep around PText segs for every character
				delete charInfo.charPT;
				charInfo.charPT = NULL;
			}
			fCharList.Merge(&charInfo, &CompCNameAsc);
		}

	}
	else {
		AddNewChar("the Main Character", kCHFemale, fCHSingle, 1, kCHMain);
		AddNewChar("the Obstacle Character", kCHMale, fCHSingle, 0, kCHObstacle);
	}

	SetMainObstacleIDs();
	init_char_picts();

	init_superclasses();

	//	ALLOCATED & INITIALIZE IN-MEMORY APPRECIATIONS TABLE

	byte_cnt allocSize = sizeof(ApprecDataRec)*TOTAL_OTHERSEM_ITEMS;
	fApprecRecsHdl = MM_ALLOC_INIT(allocSize, mm_no_flags, 0, "Appreciation Data Records", NULL);
	assert(fApprecRecsHdl);
	fApprecRecs = (ApprecDataRec*)MM_USE(fApprecRecsHdl);
	load_appreciations(fApprecRecs);

	//	RE-JUSTIFY FILE, IF POSSIBLE, SO STORY UNIVERSES ARE ACCURATE

	PerformJustification();

	LoadQuestionStatus();

	//	WRITE OUT THIS FILE'S VERSION INFO

	Dramatica* theApp = (Dramatica*)fParentApp;
	fStoryDocPT->SetParam("MajVer", 's', theApp->GetMajorVers());
	fStoryDocPT->SetParam("MinVer", 's', theApp->GetMinorVers());
	fStoryDocPT->SetParam("MaintVer", 's', theApp->GetMaintVers());
	fStoryDocPT->SetParam("FileFmt", 's', theApp->GetFileFmtVers());

} /* DRDoc::InitDoc */


/* ------------------------------------------------------------------------
	CompCNameAsc - comparison proc for sorting character names into
	ascending order.
------------------------------------------------------------------------ */
int CompCNameAsc(const void* pKey, const void* pElem)
{
	int result = (GN_StrCmpI(((CharInfoRec*)pKey)->name, ((CharInfoRec*)pElem)->name));
	if (result < 0)
		return GN_LESS;
	else if (result == 0)
		return GN_EQUAL;
	else
		return GN_GREATER;

} /* CompCNameAsc */


/* ------------------------------------------------------------------------
	DRDoc::about_to_save_doc - This is called right before the file is
	saved, and it makes sure that any in-memory data that needs to be saved
	is transferred into its proper PFM segment.
------------------------------------------------------------------------ */
err_t DRDoc::about_to_save_doc(void)
{
	if(fWindowList.Size()){

		// save all PFM segments that are currently checked-out for this
		// document with calls to PFMSetSegModified().

		//	Make sure an open DQS Window has its choices saved.

		DQSWindow* DQSWindowPtr = GetDQSWindow();
		if (DQSWindowPtr)
			DQSWindowPtr->ClickCurrentQuestion();

		pfm_fd_t currentFile = PFMSetCurrentFile(fFile);

		//	Save any appreciations that need saving

		save_appreciations(fApprecRecs);

		fResponses->SaveSeg();
		if (fResponses->WasSegModified()) {
			SetFileSaveFlag();
			fResponses->SegNowSaved();                                // Make sure we unset
this segment's saving flags
		}

		fStellingPT->SaveSeg();
		if (fStellingPT->WasSegModified()) {
			SetFileSaveFlag();
			fStellingPT->SegNowSaved();
```

```
		}
		fLockApprPT->SaveSeg();
		if (fLockApprPT->WasSegModified()) {
			SetFileSaveFlag();
			fLockApprPT->SegNowSaved();
		}

		//	SAVE ANY STORYDOC SEGMENT PARAMS AND SEGS

		fStoryDocPT->SetParam("NmStories", 's', fTotalStories);
		fStoryDocPT->SetParam("IsJust", 's', fStoryIsJustified);
		fStoryDocPT->SetParam("NmChars", 's', fNmOfCharacters);
		fStoryDocPT->SetParam("MaxPictID", 's', fMaxLocalPictID);

		SaveQuestionStatus();

		fStoryDocPT->SaveSeg();
		if (fStoryDocPT->WasSegModified()) {
			SetFileSaveFlag();
			fStoryDocPT->SegNowSaved();				// Make sure we unset
this segment's saving flags
		}

		//	SAVE ANY CHARACTER'S PTEXT SEGMENTS THAT NEED SAVING

		fCharList.Use();
		for (ls_index whichChar = 0; whichChar < fCharList.Size(); ++whichChar) {
			CharInfoRec* charInfoPtr = (CharInfoRec*)fCharList.ElemPtr(whichChar);
			PText* charPT = charInfoPtr->charPT;
			if (charPT) {
				charPT->SaveSeg();
				if (charPT->WasSegModified()) {
					SetFileSaveFlag();
					charPT->SegNowSaved();
				}

			}
		}
		fCharList.Unuse();

		PFMSetCurrentFile(currentFile);
	}
	return(PFMError());
} /* DRDoc::about_to_save_doc */


/* ------------------------------------------------------------------------
	DRDoc::close_file - close the document's associated file.
------------------------------------------------------------------------ */
err_t DRDoc::close_file(void)
{
	err_t	status = NOERR;

	if (fFile != PFM_NO_FILE) {
		pfm_fd_t currentFile = PFMSetCurrentFile(fFile);

		 // check-in all PFM segments that are currently checked-out
		 // for this document with calls to PFMCheckinSeg().
		 // PUT in DRDoc::Close()!

		fResponses->SleepSeg();
		fStellingPT->SleepSeg();
		fLockApprPT->SleepSeg();
		fStoryDocPT->SleepSeg();

		checkin_superclasses();

		CharInfoRec* charInfoPtr;
		fCharList.Use();
		for (ls_index whichChar = 0; whichChar < fCharList.Size(); ++whichChar) {
			charInfoPtr = (CharInfoRec*)fCharList.ElemPtr(whichChar);
			if (charInfoPtr->charPT) {
				charInfoPtr->charPT->SleepSeg();
				delete charInfoPtr->charPT;
			}
		}
		fCharList.Unuse();

		delete	fResponses;			// Release this document's response segment
		delete	fStellingPT;
		delete	fLockApprPT;
		delete	fStoryDocPT;

		//	RELEASE CHECKMARK ARRAY MEMORY

		MM_UNUSE(fQCheckMarkHdl);
		err_t theErr = PFMCheckinSeg(fQCheckMarkHdl);
		assert(theErr == noerr);

		PFMSetCurrentFile(currentFile);

		if (status == NOERR)
			status = TDoc::close_file();

		//	RELEASE APPRECIATIONS TABLE MEMORY

		MM_UNUSE(fApprecRecsHdl);
		MMFree(fApprecRecsHdl);
	}

	return status;

} /* DRDoc::close_file */

#if 0
/* ------------------------------------------------------------------------
	DRDoc::LoadDynamics - Get the dynamics into a table.
	NOTE:	Always allocate a pointer with the name dynamicsTbl, so that
			the uppercased macros, "CHANGE", "ACTION", etc work!
```

```
---------------------------------------------------------------------------- */
void DRDoc::LoadDynamics(void)
{
	fDynamicsHdl = MM_ALLOC_INIT(sizeof(DynamicsList)*TOTAL_DYNAMIC_QUESTIONS, mm_no_flags, 0, "Dynamics Table",
NULL);
	assert(fDynamicsHdl);
	assert(dynamicsTbl == NULL);
	dynamicsTbl = (DynamicsList*)MM_USE(fDynamicsHdl);

	int i;
	short docSemVal;
	for (i=0; i<TOTAL_DYNAMIC_QUESTIONS; ++i) {
		docSemVal = 0;
		fResponses->GetParam(dynamicQuest[i].name, 's', &docSemVal);
		dynamicsTbl[i].dynResp = (docSemVal) ? docSemVal - dynamicQuest[i].semOffset : 0;
	}
}

/* ------------------------------------------------------------------------
	DRDoc::SaveDynamics - Get the dynamics into a table.
---------------------------------------------------------------------------- */
void DRDoc::SaveDynamics(bool_t saveData)
{
	assert(fDynamicsHdl);
	assert(dynamicsTbl != NULL);

	int i;

	if (saveData) {
		for (i=0; i<TOTAL_DYNAMIC_QUESTIONS; ++i) {
			char* VN = dynamicQuest[i].name;
			short response = dynamicsTbl[i].dynResp;
			response = (response) ? response + dynamicQuest[i].semOffset : 0;
			fResponses->SetParam(VN, 's', response);
		}

		fResponses->SaveSeg();
		if (fResponses->WasSegModified()) {
			SetFileSaveFlag();
			fResponses->SegNowSaved();						// Make sure we unset
this segment's saving flags
		}
	}
	MM_UNUSE(fDynamicsHdl);
	MMFree(fDynamicsHdl);
	fDynamicsHdl = NULL;
	dynamicsTbl = NULL;
}
#endif


/* ------------------------------------------------------------------------
	FUNCTION:		DRDoc::SetSuperAppreciations
	Purpose:		Sets all of the determinable super appreciations
---------------------------------------------------------------------------- */
void DRDoc::SetSuperAppreciations(void)
{
	SetApprValByIndex(kApprNature, getNatureApprec(this));
	SetApprValByIndex(kApprEssence, getEssenceApprec(this));
	SetApprValByIndex(kApprTendency, getTendencyApprec(this));
	SetApprValByIndex(kApprReach, getReachApprec(this));
} /* DRDoc::SetSuperAppreciations */


#if 0

	#define TOTAL_APPRECNMS			19

	static char* prefix[4] = { "ST", "MC", "OC", "PL" };
	static char* apprecNms [TOTAL_APPRECNMS] = {
							"xxHmCl", "xxAdr1", "xxDom", "xxCon", "xxRng",
							"xxPbm", "xxStp", "xxSol", "xxFoc", "xxDir",
							"xxUnRng", "xxCrF1", "xxOrd", "xxType1",
"xxType2",
							"xxType3", "xxType4", "xxGoal", "xxReq" };


/* ------------------------------------------------------------------------
	GetApprecKey - Get an appreciations' PText Key.
---------------------------------------------------------------------------- */
void GetApprecKey(char* keyText, short whichGroup, short index)
{
	assert((whichGroup>=0 && whichGroup<=3) && (index>=0 && index<=16));
	apprecNms[index+2][0] = prefix[whichGroup][0];					//
+2 gets us past "xxAdr1"
	apprecNms[index+2][1] = prefix[whichGroup][1];
	strcpy(keyText, apprecNms[index+2]);
}

/* ------------------------------------------------------------------------
	DRDoc::LoadAppreciations - Get the appreciations into a table.
---------------------------------------------------------------------------- */
ApprecList* DRDoc::LoadAppreciations(void)
{
	fApprecHdl = MM_ALLOC_INIT(sizeof(ApprecList)*TOTAL_APPRECIATIONS, mm_no_flags, 0, "Appreciation Table", NULL);
	assert(fApprecHdl);
	ApprecList* ApprecPtr = (ApprecList*)MM_USE(fApprecHdl);

	int i, j, n;
	pt_err xxx;
	for (i=0; i<=3; ++i) {
		for (j=0; j<TOTAL_APPRECNMS; ++j) {
			apprecNms[j][0] = prefix[i][0];
			apprecNms[j][1] = prefix[i][1];
		}
		j = 0;
		fResponses->GetParam(apprecNms[j], 's', &ApprecPtr[i].homeClass);
++j;	// ONLY DONE TO ACCOUNT FOR NOT DEALING WITH FIRSTADDR!  -- REMOVE EVENTUALLY!
//		fResponses->GetParam(apprecNms[++j], 'c', ApprecPtr[i].firstAddr);
		for (n=0; n<MAX_APPRECS_PER_POV; ++n)
			xxx = fResponses->GetParam(apprecNms[++j], 's', &ApprecPtr[i].ap[n]);
	}
```

```
        return(ApprecPtr);
} /* DRDoc::LoadAppreciations */

/* ---------------------------------------------------------------------------
        DRDoc::UpdateAppreciations - Save all the appreciations, leaving the
        structure loaded.
--------------------------------------------------------------------------- */
void DRDoc::UpdateAppreciations(ApprecList* ApprecPtr)
{
        assert(fApprecHdl);

        int i, j, n;
        for (i=0; i<=3; ++i) {
                for (j=0; j<TOTAL_APPRECNMS; ++j) {
                        apprecNms[j][0] = prefix[i][0];
                        apprecNms[j][1] = prefix[i][1];
                }
                j = 0;
                fResponses->SetParam(apprecNms[j], 's', ApprecPtr[i].homeClass);
++j;    // ONLY DONE TO ACCOUNT FOR NOT DEALING WITH FIRSTADDR!  -- REMOVE EVENTUALLY!
//              fResponses->SetParam(apprecNms[++j], 'c', ApprecPtr[i].firstAddr);
                for (n=0; n<MAX_APPRECS_PER_POV; ++n)
                        fResponses->SetParam(apprecNms[++j], 's', ApprecPtr[i].ap[n]);
        }
        fResponses->SaveSeg();
        if (fResponses->WasSegModified()) {
                SetFileSaveFlag();
                fResponses->SegNowSaved();                              // Make sure we unset this
segment's saving flags
        }
} /* DRDoc::UpdateAppreciations */

/* ---------------------------------------------------------------------------
        DRDoc::SaveAppreciations - Save all the appreciations and free up the
        structure.
--------------------------------------------------------------------------- */
void DRDoc::SaveAppreciations(ApprecList* ApprecPtr, bool_t saveData)
{
        assert(fApprecHdl);

        if (saveData)
                UpdateAppreciations(ApprecPtr);

        MM_UNUSE(fApprecHdl);
        MMFree(fApprecHdl);
        fApprecHdl = NULL;
} /* DRDoc::SaveAppreciations */
#endif

/* ---------------------------------------------------------------------------
        DRDoc::GetApprValByID - Given an ApprID, return the current value of the
        given appreciation.
--------------------------------------------------------------------------- */
semval_t DRDoc::GetApprValByID(appr_id_t ApprID)
{
        assert((ApprID >= 1000 && ApprID <= LAST_OTHER_APPRID));

        appr_index_t apprIndex      = FindApprRecIndex(ApprID);
        semval_t            semVal            = fApprecRecs[apprIndex].semVal;

        return (semVal);

} /* DRDoc::GetApprValByID */

/* ---------------------------------------------------------------------------
        DRDoc::SetApprValByID - Given an ApprID, set the current value of the
        given appreciation.  Mark the record as modified.
--------------------------------------------------------------------------- */
void DRDoc::SetApprValByID(appr_id_t ApprID, semval_t semVal)
{
        assert((ApprID >= 1000 && ApprID <= LAST_OTHER_APPRID));

        appr_index_t apprIndex      = FindApprRecIndex(ApprID);
        if (fApprecRecs[apprIndex].semVal != semVal) {                  // Mark as modified if
this SemVal changes
                fApprecRecs[apprIndex].modified = true;
                fApprecRecs[apprIndex].semVal       = semVal;
                SetFileSaveFlag();
        }

} /* DRDoc::SetApprValByID */

/* ---------------------------------------------------------------------------
        DRDoc::SetApprValByIndex - Given an apprIndex, set the current value of
        the given appreciation.  Mark the record as modified.
--------------------------------------------------------------------------- */
void DRDoc::SetApprValByIndex(appr_index_t apprIndex, semval_t semVal)
{
        assert((apprIndex >= 0) && (apprIndex < TOTAL_OTHERSEM_ITEMS));

        if (fApprecRecs[apprIndex].semVal != semVal) {                  // Mark as modified if
this SemVal changes
                fApprecRecs[apprIndex].modified = true;
                fApprecRecs[apprIndex].semVal       = semVal;
                SetFileSaveFlag();
        }

} /* DRDoc::SetApprValByIndex */

/* ---------------------------------------------------------------------------
        DRDoc::load_appreciations - Initialize and load the apprecRecs table
        from the user's story document.
--------------------------------------------------------------------------- */
void DRDoc::load_appreciations(ApprecDataRec* apprecRecs)
{
        for (appr_index_t apprIndex=0; apprIndex<TOTAL_OTHERSEM_ITEMS; ++apprIndex) {
```

```
                ApprRec* apprRecPtr = GetApprRec(apprIndex);
                if (apprRecPtr->apprType < kApprChoice) {                                    // Skip any
kApprChoice records
                        assert(apprRecPtr->varName != NULL);
                        semval_t semVal = 0;
                        fResponses->GetParam(apprRecPtr->varName, 's', &semVal);
                        SetApprValByIndex(apprIndex, semVal);
                }
        }
        TDoc::Clear(kDirty);
                // This resets the modification flags set above
} /* DRDoc::load_appreciations */


/* ------------------------------------------------------------------------
        DRDoc::save_appreciations - Save the apprecRecs table to the user's
        story document.
------------------------------------------------------------------------ */
void DRDoc::save_appreciations(ApprecDataRec* apprecRecs)
{
        for (appr_index_t apprIndex=0; apprIndex<TOTAL_OTHERSEM_ITEMS; ++apprIndex) {
                if (fApprecRecs[apprIndex].modified) {
                        ApprRec* apprRecPtr = GetApprRec(apprIndex);
                        if (apprRecPtr->apprType < kApprChoice) {                            //
Skip any kApprChoice records
                                assert(apprRecPtr->varName != NULL);
                                semval_t semVal = GetApprValByIndex(apprIndex);
                                fResponses->SetParam(apprRecPtr->varName, 's', semVal);
                        }
                }
        }
} /* DRDoc::save_appreciations */


/* ------------------------------------------------------------------------
        DRDoc::CopyAppreciations - if apprecRecs is NULL, then memory is
        allocated for a copy of the appreciations table and a handle is returned.
        If not, then a copy is made into the memory provided.
------------------------------------------------------------------------ */
hdl_t DRDoc::CopyAppreciations(hdl_t apprecRecsHdl)
{
        hdl_t newApprecRecsHdl = MM_ALLOC_INIT(sizeof(ApprecDataRec)*TOTAL_OTHERSEM_ITEMS, mm_no_flags, 0, "Appreciation
Data Records", NULL);
        assert(newApprecRecsHdl);
        ApprecDataRec* newApprecRecs = (ApprecDataRec*)MM_USE(newApprecRecsHdl);

        memcpy(newApprecRecs, fApprecRecs, sizeof(ApprecDataRec)*TOTAL_OTHERSEM_ITEMS);

        MM_UNUSE(newApprecRecsHdl);

        return (newApprecRecsHdl);

} /* DRDoc::CopyAppreciations */


/* ------------------------------------------------------------------------
        DRDoc::RestoreAppreciations - recopy the saved appreciations to the
        document's main table.  The memory is then deallocated.
------------------------------------------------------------------------ */
void DRDoc::RestoreAppreciations(hdl_t apprecRecsHdl)
{
        ApprecDataRec* apprecRecsCopy = (ApprecDataRec*)MM_USE(apprecRecsHdl);
        memcpy(fApprecRecs, apprecRecsCopy, sizeof(ApprecDataRec)*TOTAL_OTHERSEM_ITEMS);
        MM_UNUSE(apprecRecsHdl);
        DisposeApprecCopy(apprecRecsHdl);

} /* DRDoc::RestoreAppreciations */


/* ------------------------------------------------------------------------
        DRDoc::DisposeApprecCopy - Dispose the appreciations copy without
        restoring it then dispose the memory.
------------------------------------------------------------------------ */
void DRDoc::DisposeApprecCopy(hdl_t apprecRecsHdl)
{
        MMFree(apprecRecsHdl);

} /* DRDoc::DisposeApprecCopy */


/* ------------------------------------------------------------------------
        DRDoc::ClearAppreciations - reset the appreciations table to NULL.
        This is typically done before building the storytable.
------------------------------------------------------------------------ */
void DRDoc::ClearAppreciations(void)
{
        memset(fApprecRecs, 0, sizeof(ApprecDataRec)*TOTAL_OTHERSEM_ITEMS);

} /* DRDoc::ClearAppreciations */


/* ------------------------------------------------------------------------
        DRDoc::LoadCharInfo - Load or Reload a particular character's PText
        and build the in-memory charinfo.  NOTE: This gets call during the
        first time character initialization, and any time we might directly
        modify a character's PText segment.
------------------------------------------------------------------------ */
void DRDoc::LoadCharInfo(CharInfoRec* charInfo, PText* charPT)
{
        if (charPT == NULL)
                charInfo->charPT = GetCharPT(charInfo->whichSegment);                      // user
didn't supply PText*
        else
                charInfo->charPT = charPT;
                        // Use the supplied PText*
        char tempName [100];
        charInfo->charPT->GetParam("NM", 'c', tempName);
        strncpy(charInfo->name, tempName, kMaxCNameLength);
        charInfo->charPT->GetParam("Pix", 's', &charInfo->charPixID);
        charInfo->charPT->GetParam("Form", 's', &charInfo->form);
        charInfo->charPT->GetParam("Sex", 's', &charInfo->sex);
        pt_err theErr = charInfo->charPT->GetParam("Subj", 's', &charInfo->subjective);
```

```
		if (theErr == kParamNotFound) {
			if (charInfo->whichSegment < 2)
				charInfo->subjective = charInfo->whichSegment + 1;	// this accounts for existing files
without this param
			else
				charInfo->subjective = kCHNeither;
			charInfo->charPT->SetParam("Subj", 's', charInfo->subjective);
		}
} /* DRDoc::LoadCharInfo */


/* ------------------------------------------------------------------------
	DRDoc::GetCharPT - Get a particular character's PText*
------------------------------------------------------------------------ */
PText* DRDoc::GetCharPT(short whichChar, CharInfoRec* charInfo)
{
	assert(whichChar < fNmOfCharacters);
	assert(whichChar < fCharList.Size());

	pfm_fd_t currentFile = PFMSetCurrentFile(fFile);

	fCharList.Use();
	CharInfoRec* charInfoPtr = (CharInfoRec*)fCharList.ElemPtr(whichChar);
	PText* charPT = charInfoPtr->charPT;

	if (charPT == NULL) {
		pt_err theErr;
		charPT = new PText(fFile, _OSType("CHAR"), charInfoPtr->whichSegment, &theErr);
		assert(theErr == NOERR);
		charInfoPtr->charPT = charPT;
	}

	if (charInfo)
	// Pass back a copy of the record, if desired
		memcpy(charInfo, charInfoPtr, sizeof(CharInfoRec));

	fCharList.Unuse();

	PFMSetCurrentFile(currentFile);

	return (charPT);
} /* DRDoc::GetCharPT */


/* ------------------------------------------------------------------------
	DRDoc::SetMainObstacleIDs - Scan the list of characters and set which
	ones are the main and obstacle character.  NOTE: it is possible for the
	file to exist in a state with no main or obstacle character defined,
	though this could lead to some serious troubles.
------------------------------------------------------------------------ */
void DRDoc::SetMainObstacleIDs(void)
{
	short mainCnt = 0;
	short obstCnt = 0;

	SetMainCharID(fNoCharDefined);
	SetObstacleCharID(fNoCharDefined);

	fCharList.Use();
	for (ls_index n = 0; n < fCharList.Size(); n++) {
		CharInfoRec* charInfoPtr = (CharInfoRec*)fCharList.ElemPtr(n);
		if (charInfoPtr->subjective == kCHMain) {
			SetMainCharID(n);
			++mainCnt;
		}
		else if (charInfoPtr->subjective == kCHObstacle) {
			SetObstacleCharID(n);
			++obstCnt;
		}
	}
	fCharList.Unuse();

	assert(mainCnt >= 0);
	assert(mainCnt <= 1);
	assert(obstCnt >= 0);
	assert(obstCnt <= 1);

} /* DRDoc::SetMainObstacleIDs */


/* ------------------------------------------------------------------------
	DRDoc:GetMainCharPT - returns PText segment associated with the Main
	character.
------------------------------------------------------------------------ */
PText* DRDoc::GetMainCharPT(void)
{
	assert(GetMainCharID() != fNoCharDefined);
	return GetCharPT((short)GetMainCharID());

} /* DRDoc::GetMainCharPT */


/* ------------------------------------------------------------------------
	DRDoc:GetObstacleCharPT - returns PText segment associated with the
	Main character.
------------------------------------------------------------------------ */
PText* DRDoc::GetObstacleCharPT(void)
{
	assert(GetObstacleCharID() != fNoCharDefined);
	return GetCharPT((short)GetObstacleCharID());

} /* DRDoc::GetObstacleCharPT */


/* ------------------------------------------------------------------------
	DRDoc::PTextToCharID - Scan the list of characters and find the index that
	matches a given PText*.  NOTE: if we encounter any failure to find the
	PText*, we could try to find via the character name.
------------------------------------------------------------------------ */
ls_index DRDoc::PTextToCharID(PText* charPT)
{
	fCharList.Use();
	for (ls_index n = 0; n < fCharList.Size(); n++) {
```

```
                CharInfoRec* charInfoPtr = (CharInfoRec*)fCharList.ElemPtr(n);
                if (charInfoPtr->charPT == charPT) {
                        fCharList.Unuse();
                        return (n);
                }
        }

        fCharList.Unuse();
        return (kLsNoElem);
} /* DRDoc::PTextToCharID */


/* ------------------------------------------------------------------------
        DRDoc::AddNewChar - Create a new character by adding it to the in-memory
        List and allocating a PText segment for it.
------------------------------------------------------------------------ */
PText* DRDoc::AddNewChar(char* name, short sex, short form, short charPixID, short subjective, short* whichChar)
{
        pt_err theErr;

        pfm_fd_t currentFile = PFMSetCurrentFile(fFile);

        CharInfoRec charInfo;
        charInfo.whichSegment = ++fMaxCharSegID;                        // Because of deleted Characters, this may not be
the same number as fNmOfCharacters
        charInfo.charPT = new PText(fFile, _OSType("CHAR"), charInfo.whichSegment, &theErr);
        assert((theErr == noerr) || (theErr == kNoSuchPFMSeg));

        SetMinCharInfo(&charInfo, name, sex, form, charPixID, subjective);

        PFMSetCurrentFile(currentFile);
        ls_index pos = fCharList.Merge(&charInfo, &CompCNameAsc);
        ++fNmOfCharacters;

        SetMainObstacleIDs();

        SetFileSaveFlag();

        if (whichChar)
                *whichChar = (short)pos;                                        // Tell user what index we
added

        return (charInfo.charPT);
} /* DRDoc::AddNewChar */


/* ------------------------------------------------------------------------
        DRDoc::SetMinCharInfo - Sets the minimal character info required by the
        CharInfoRec.
------------------------------------------------------------------------ */
void DRDoc::SetMinCharInfo(CharInfoRec* charInfo, char* name, short sex, short form, short charPixID, short subjective)
{
        if (name[0])
                strncpy(charInfo->name, name, kMaxCNameLength);
        else
                charInfo->name[0] = 0;
        charInfo->charPT->SetParam("NM", 'c', name);

        charInfo->sex = sex;
        charInfo->charPT->SetParam("Sex", 's', sex);

        charInfo->form = form;
        charInfo->charPT->SetParam("Form", 's', form);

        charInfo->charPixID = charPixID;
        charInfo->charPT->SetParam("Pix", 's', charPixID);

        charInfo->subjective = subjective;
        charInfo->charPT->SetParam("Subj", 's', subjective);

} /* DRDoc::SetMinCharInfo */

/* ------------------------------------------------------------------------
        DRDoc::DeleteChar - Deletes an existing character
------------------------------------------------------------------------ */
void DRDoc::DeleteChar(short whichChar)
{
        assert(whichChar < fCharList.Size());

        PText* charPT = GetCharPT(whichChar);
        charPT->DeleteSeg();
        delete charPT;

        fCharList.Remove(whichChar);
        --fNmOfCharacters;
        SetMainObstacleIDs();
        SetFileSaveFlag();

        UpdateCastViews();

} /* DRDoc::DeleteChar */


/* ------------------------------------------------------------------------
        DRDoc:: - Releases all character Ptext segments except for Main and
        Obstacle.
------------------------------------------------------------------------ */
void DRDoc::ReleaseCharPTs(void)
{
        CharInfoRec* charInfoPtr;
        fCharList.Use();
        for (ls_index whichChar = 0; whichChar < fCharList.Size(); ++whichChar) {
                charInfoPtr = (CharInfoRec*)fCharList.ElemPtr(whichChar);
                if ((charInfoPtr->charPT == NULL) && (charInfoPtr->subjective == fNoCharDefined)) {
                        charInfoPtr->charPT->SleepSeg();
                        delete charInfoPtr->charPT;
                        charInfoPtr->charPT = NULL;
                }
        }
        fCharList.Unuse();
} /* DRDoc::ReleaseCharPTs */
```

```
/* ------------------------------------------------------------------------
	DRDoc::GetCharacteristics - Gets a table of semVals of the characteristics
	for a given character.  Returns # of characteristics for this character.
------------------------------------------------------------------------ */
short DRDoc::GetCharacteristics(short whichChar, short whichSet, short* semValTbl)
{
	char*	paramName;
	char	buildStr [100];
	short	nmOfCharacteristics = 0;

	switch (whichSet) {
		case 0:	paramName = "Motv";
				break;
		case 1:	paramName = "Meth";
				break;
		case 2:	paramName = "Eval";
				break;
		case 3:	paramName = "Purp";
				break;
	}

	PText* charPT = GetCharPT(whichChar);
	assert(charPT);
	buildStr[0] = 0;
	charPT->GetParam(paramName, 'c', buildStr);

	nmOfCharacteristics = ConvertOrderString(buildStr, semValTbl);

	return (nmOfCharacteristics);
} /* DRDoc::GetCharacteristics */


/* ------------------------------------------------------------------------
	DRDoc::SetCharacteristics - given a character, a set (Motivation,
	Methodology, Evaluation, Purpose) and a table of characteristics, write
	the chosen characteristics to the appropriate segments.
------------------------------------------------------------------------ */
void DRDoc::SetCharacteristics(short whichChar, short whichSet, short* semValTbl, short nmOfShorts)
{
	char	buildStr [100];
	char*	paramName;

	CreateOrderString(buildStr, semValTbl, nmOfShorts);

	//	Write the string out to a segment.  This is done on a character-by character basis

	assert (whichSet >= 0 && whichSet <= 3);
	switch (whichSet) {
		case 0:	paramName = "Motv";
				break;
		case 1:	paramName = "Meth";
				break;
		case 2:	paramName = "Eval";
				break;
		case 3:	paramName = "Purp";
				break;
	}
	PText* charPT = GetCharPT(whichChar);
	if (buildStr[0]) {
		buildStr[strlen(buildStr)-1] = 0;				// Wipe out extra comma (MIGHT BE GOOD
FOR CreateOrderString)
		charPT->SetParam(paramName, 'c', buildStr);
	}
	else if (charPT->ParamExists(paramName))
		charPT->RemoveParam(paramName);

	charPT->SaveSeg();
	if (charPT->WasSegModified()) {
		SetFileSaveFlag();
		charPT->SegNowSaved();
	}

} /* DRDoc::SetCharacteristics */


/* ------------------------------------------------------------------------
	DRDoc::ScanForCharacteristicConflicts - given a character and a table
	of characteristics, scan the other characters to make sure they do not
	conflict with any of the characteristics.  Return true if there are
	any conflicts, false if none.

	NOTE: flags passed to this function can force a query process that will
	allow the user to confirm each substitution.
------------------------------------------------------------------------ */
bool_t DRDoc::ScanForCharacteristicConflicts(short theChar, short whichSet, short* charsSemValTbl, short nmInSearchTbl,
short* OKSemValTbl, short* nmOfOKItems)
{
	short	scanSemValTbl[16];
	*nmOfOKItems = 0;

	for (ls_index scanChar = 0; scanChar < fCharList.Size(); ++scanChar) {
		short nmOfCharacteristics = GetCharacteristics(scanChar, whichSet, scanSemValTbl);
		for (short s=0; s<nmInSearchTbl; ++s)
			for (short n=0; n<nmOfCharacteristics; ++n) {
				if (charsSemValTbl[s] == scanSemValTbl[n]) {
					CharInfoRec ScanCharInfo;
					GetCharInfoRec(scanChar, &ScanCharInfo);
					CharInfoRec theCharInfo;
					GetCharInfoRec(theChar, &theCharInfo);
					char tempStr[200];
					char* setName;

					switch (whichSet) {
						case 0:	setName = "Motivation";
								break;
						case 1:	setName	= "Methodology";
								break;
						case 2:	setName = "Evaluation";
								break;
						case 3:	setName	= "Purpose";
								break;
					}
```

```
                                        sprintf(tempStr, "The %s of '%s' is currently occupied by '%s'.\n\nDo you
still wish to give '%s' that %s?", setName, SEMTBL_NAME(scanSemValTbl[n]), ScanCharInfo.name,
SEMTBL_NAME(scanSemValTbl[n]), theCharInfo.name, setName);
                                        ls_index whichBtn = AP_YesNoAlert(0, 0, tempStr, kOkBtn, AP_FORCEABLY);
                                        if (whichBtn == kOkBtn)
                                                RemoveCharacteristic(scanChar, whichSet, scanSemValTbl[s]);
                                        else
                                                continue;
                                                                // skip adding this value to the OK
table
                                }
                                OKSemValTbl[(*nmOfOKItems)++] = charsSemValTbl[s];
                        }
        }
        return (nmInSearchTbl != *nmOfOKItems);

} /* DRDoc::ScanForCharacteristicConflicts */


/* ----------------------------------------------------------------------
        DRDoc::GetCharacterType - given a character's ID, return the character
        type based on the arrangement of their characteristics.
---------------------------------------------------------------------- */
short DRDoc::GetCharacterType(short whichChar)
{


} /* DRDoc::GetCharacterType */


typedef struct {
        short   typeID;                         // 4-11, which archetype
        short   motivations[2];         // 2 semVals that make up the archtypal motivations
        short   methodologies[2];       // 2 semVals that make up the archtypal methodologies
        short   evaluations[2];         // 2 semVals that make up the archtypal evaluations
        short   purposes[2];            // 2 semVals that make up the archtypal purposes
} ArchetypeListType;

ArchetypeListType archetypeList[8] =
{
        {       kArchProtagonist,       {rSvConsider, rSvPursuit},              {rSvCertainty, rSvProaction},
                {rSvProven, rSvEffect},                 {rSvKnowledgeElem, rSvActuality}        },
        {       kArchAntagonist,  {rSvReconsider, rSvAvoidance},      {rSvPotentiality, rSvReaction},
        {rSvUnproven, rSvCause},        {rSvThoughtElem, rSvPerception)     },
        {       kArchEmotion,           {rSvFeeling, rSvUncontrolled},     {rSvPossibility, rSvProtection},
        {rSvHunch, rSvTest},                    {rSvDesireElem, rSvSelfAware}           },
        {       kArchReason,            {rSvLogic, rSvControlled},              {rSvProbability, rSvInaction},
                {rSvTheory, rSvTrust},                  {rSvAbilityElem, rSvAware}                      },
        {       kArchSkeptic,           {rSvDisbelief, rSvOppose},              {rSvInduction,
rSvNonAcceptance},      {rSvNonAccurate, rSvProcess},       {rSvChaos, rSvChange}                   },
        {       kArchSidekick,          {rSvFaith, rSvSupport},                 {rSvDeduction, rSvAcceptance},
                {rSvAccurate, rSvResult},       {rSvOrder, rSvInertia}                          },
        {       kArchGuardian,          {rSvConscience, rSvHelp},       {rSvReduction, rSvEvaluation},
        {rSvExpectation, rSvEnding},    {rSvEquity, rSvProjection}                      },
        {       kArchContagonist,       {rSvTemptation, rSvHinder},             {rSvProduction,
rSvReevaluation),       {rSvDetermination, rSvUnEnding),{rSvInequity, rSvSpeculation) },
};


/* ----------------------------------------------------------------------
        DRDoc::SetCharacterType - given a character's ID and a character type,
        set the desired characteristics for this type.
---------------------------------------------------------------------- */
void DRDoc::SetCharacterType(short whichChar, short whichType)
{
        short OKSemValTbl[16];
        short nmOfOKItems;

        assert(whichType >= kArchProtagonist && whichType <= kArchContagonist);

        short typeIndex = whichType - kArchProtagonist;

        ScanForCharacteristicConflicts(whichChar, 0, archetypeList[typeIndex].motivations, 2, OKSemValTbl,
&nmOfOKItems);
        SetCharacteristics(whichChar, 0, OKSemValTbl, nmOfOKItems);

        ScanForCharacteristicConflicts(whichChar, 1, archetypeList[typeIndex].methodologies, 2, OKSemValTbl,
&nmOfOKItems);
        SetCharacteristics(whichChar, 1, archetypeList[typeIndex].methodologies, 2);

        ScanForCharacteristicConflicts(whichChar, 2, archetypeList[typeIndex].evaluations, 2, OKSemValTbl,
&nmOfOKItems);
        SetCharacteristics(whichChar, 2, archetypeList[typeIndex].evaluations, 2);

        ScanForCharacteristicConflicts(whichChar, 3, archetypeList[typeIndex].purposes, 2, OKSemValTbl, &nmOfOKItems);
        SetCharacteristics(whichChar, 3, archetypeList[typeIndex].purposes, 2);

} /* DRDoc::SetCharacterType */


/* ----------------------------------------------------------------------
        DRDoc::WhoHasCharacteristic - given a semval and a set, find out which
        character has the desired characteristic.

        NOTE: Doesn't check for conflicts.  If more than one character shares
        a characteristic (currently not legal) this function simply returns
        the first character that has the desired characteristic.
---------------------------------------------------------------------- */
short DRDoc::WhoHasCharacteristic(semval_t characteristic, short whichSet)
{
        short semValTbl[16];
        for (ls_index whichChar = 0; whichChar < fCharList.Size(); ++whichChar) {
                short nmOfCharacteristics = GetCharacteristics(whichChar, whichSet, semValTbl);
                for (short n=0; n<nmOfCharacteristics; ++n)
                        if (semValTbl[n] == characteristic)
                                return (whichChar);
        }

        return (-1);                            // No character matched!

} /* DRDoc::WhoHasCharacteristic */
```

```
/* -----------------------------------------------------------------------
        DRDoc::RemoveCharacteristic - given a character, a set, and a
        chraracteristic, remove the characteristic from that character's set
        of characteristics.
----------------------------------------------------------------------- */
void DRDoc::RemoveCharacteristic(short whichChar, short whichSet, semval_t deleteCharacteristic)
{
        short srcSemValTbl[16];
        short dstSemValTbl[16];
        short nmOfNewCharacteristics = 0;
        short nmOfCharacteristics = GetCharacteristics(whichChar, whichSet, srcSemValTbl);

        for (short n=0; n<nmOfCharacteristics; ++n)
                if (srcSemValTbl[n] != deleteCharacteristic) {
                        dstSemValTbl[nmOfNewCharacteristics++] = srcSemValTbl[n];
                        SetCharacteristics(whichChar, whichSet, dstSemValTbl, nmOfNewCharacteristics);
                        break;
                }

} /* DRDoc::RemoveCharacteristic */

/* -----------------------------------------------------------------------
        CreateOrderString (char*) - given a char array and a char*, create a
        string containing <nmOfShorts> comma separated numbers.
----------------------------------------------------------------------- */
void CreateOrderString(char* theString, char* charTable, short nmOfShorts)
{
        char    tempStr [20];
        theString[0] = 0;
        for (short n=0; n<nmOfShorts; ++n) {
                sprintf(tempStr, "%hd,",(short)charTable[n]);
                strcat(theString, tempStr);
        }
} /* CreateOrderString */

/* -----------------------------------------------------------------------
        CreateOrderString (short*) - given a short array and a char*, create a
        string containing <nmOfShorts> comma separated numbers.
----------------------------------------------------------------------- */
void CreateOrderString(char* theString, short* shortTable, short nmOfShorts)
{
        char    tempStr [20];
        theString[0] = 0;
        for (short n=0; n<nmOfShorts; ++n) {
                sprintf(tempStr, "%hd,",shortTable[n]);
                strcat(theString, tempStr);
        }
} /* CreateOrderString */

/* -----------------------------------------------------------------------
        CreateOrderString (SList*) - given a short List and a char*, create a
        string containing comma separated numbers.
----------------------------------------------------------------------- */
void CreateOrderString(char* theString, SList* sLst)
{
        char    tempStr [20];
        theString[0] = 0;
        for (short n=0; n<sLst->Size(); ++n) {
                sprintf(tempStr, "%hd,",sLst->Elem(n));
                strcat(theString, tempStr);
        }
} /* CreateOrderString */

/* -----------------------------------------------------------------------
        ConvertOrderString (char*) - takes a string of short comma separated
        numbers and returns a char array (containing -128 to 128 shorts).
----------------------------------------------------------------------- */
short ConvertOrderString(char* theString, char* charTable)
{
        if (theString[0] == 0)
                return (0);

        short   nmOfShorts = 0;
        char*   destStr = theString;
        char*   tokenStr;

        tokenStr = strtok (destStr, ",");
        while (tokenStr) {
                charTable[nmOfShorts++] = (char)atoi(tokenStr);
                tokenStr = strtok (NULL, ",");
        }

        return (nmOfShorts);
} /* ConvertOrderString */

/* -----------------------------------------------------------------------
        ConvertOrderString (short*) - takes a string of short comma separated
        numbers and returns a short array.
----------------------------------------------------------------------- */
short ConvertOrderString(char* theString, short* shortTable)
{
        if (theString[0] == 0)
                return (0);

        short   nmOfShorts = 0;
        char*   destStr = theString;
        char*   tokenStr;

        tokenStr = strtok (destStr, ",");
        while (tokenStr) {
                shortTable[nmOfShorts++] = atoi(tokenStr);
                tokenStr = strtok (NULL, ",");
        }

        return (nmOfShorts);
```

```
} /* ConvertOrderString */

/* ----------------------------------------------------------------------
	ConvertOrderString (SList*) - takes a string of short comma separated
	numbers and returns a SList containing them.  Assures the list is
	empty to begin with.
---------------------------------------------------------------------- */
short ConvertOrderString(char* theString, SList* sLst)
{
	sLst->Empty();
	if (theString[0] == 0)
		return (0);

	char*	destStr = theString;
	char*	tokenStr;

	tokenStr = strtok (destStr, ",");
	while (tokenStr) {
		sLst->Append(atoi(tokenStr));
		tokenStr = strtok (NULL, ",");
	}

	return (sLst->Size());
} /* ConvertOrderString */



/* ----------------------------------------------------------------------
	DRDoc::init_superclasses - Reads the superclass structures into document
---------------------------------------------------------------------- */
void DRDoc::init_superclasses(void)
{
	pfm_fd_t currentFile = PFMSetCurrentFile(fFile);

	for (short whichSC=0; whichSC<kNmOfSCs; ++whichSC) {
		fSCHdls[whichSC] = MM_ALLOC_INIT(sizeof(SuperClass), mm_no_flags, 0, "SuperClass", NULL);
		assert(fSCHdls[whichSC]);
		SuperClass* SCPtr = (SuperClass*)MM_USE(fSCHdls[whichSC]);
		InitRefSC(SCPtr);
		MM_UNUSE(fSCHdls[whichSC]);
		assert(fSCHdls[whichSC]);
	}

	PFMSetCurrentFile(currentFile);
}


/* ----------------------------------------------------------------------
	DRDoc::checkin_superclasses - checks in all superclass
---------------------------------------------------------------------- */
void DRDoc::checkin_superclasses()
{
	for (short whichSC=0; whichSC<kNmOfSCs; ++whichSC)
		MMFree(fSCHdls[whichSC]);

} /* DRDoc::checkin_superclasses *.


/* ----------------------------------------------------------------------
	DRDoc::GetSuperClass - Returns a pointer to a superclass structures
	which has been put into use.
---------------------------------------------------------------------- */
SuperClass* DRDoc::GetSuperClass(short whichSC)
{
	assert((whichSC > 0) && (whichSC <= kNmOfSCs));

	SuperClass* theSC = (SuperClass*)MM_USE(fSCHdls[whichSC-1]);
	assert(theSC);
	return (theSC);
} /* DRDoc::GetSuperClass */


/* ----------------------------------------------------------------------
	DRDoc::SaveSuperClass - Checks a SuperClass segment back in.
---------------------------------------------------------------------- */
void DRDoc::SaveSuperClass(short whichSC, bool_t save)
{
	assert((whichSC > 0) && (whichSC <= kNmOfSCs));
	MM_UNUSE(fSCHdls[whichSC-1]);
} /* DRDoc::SaveSuperClass */


/* ----------------------------------------------------------------------
	DRDoc::PerformJustification - Attempts to justify the story.  NOTE:
	This can only be done if there is ONE story.
---------------------------------------------------------------------- */
void DRDoc::PerformJustification()
{
	if (GetTotalStories() == 1) {
		SuperClass* mySC	= GetSuperClass(kMySC);
		SuperClass* just1SC = GetSuperClass(kJust1SC);
		SuperClass* just2SC = GetSuperClass(kJust2SC);
		SuperClass* myRefSC = GetSuperClass(kMyRefSC);

		*just1SC = *RefSC;						/*
guarantee that the SC we pass starts off as a RefSC */
		if (JustifyStory(this, just1SC, just2SC)) {
			*mySC = *just2SC;
			CopySC(myRefSC, just2SC, SC_TKAD+SC_PRCO+SC_1234);		/* copy the TKAD, PRCO, and
1234 settings to the myRefSC SuperClass */
			SetStoryJustification(true);
		} else {
			SetStoryJustification(false);
//			beep();		// Put up alert: "You have more than one possible story"
//			beep();
		}
		SaveSuperClass(kMySC, kSaveSC);
		SaveSuperClass(kJust1SC, kSaveSC);
		SaveSuperClass(kJust2SC, kSaveSC);
		SaveSuperClass(kMyRefSC, kSaveSC);
```

```
	}
	else
		SetStoryJustification(false);
} /* DRDoc::PerformJustification */

/* ----------------------------------------------------------------------
	DRDoc::init_char_picts - load characters picts.  This tallies the CPIX
	segment types in both the character image database and the user's
	document file.
---------------------------------------------------------------------- */
void DRDoc::init_char_picts()
{
	pfm_fd_t currentFile = PFMSetCurrentFile(((Dramatica*)fParentApp)->GetCharPixFile());
	PFMCreateIDList(CHARPIXTYPE, &fCharPictList);

	//	Now get a list of the local pictures in the user's document file & append to main list

	PFMSetCurrentFile(fFile);
	PFMCreateIDList(CHARPIXTYPE, &fCharPictList);

	PFMSetCurrentFile(currentFile);
} /* DRDoc::init_char_picts */


/* ----------------------------------------------------------------------
	DRDoc::AddCharPICT - Adds a character Pict to the user's story document.
	Returns the character's picture ID.
---------------------------------------------------------------------- */
seg_id_t DRDoc::AddCharPICT(Bitmap* theBitmap)
{
	pfm_fd_t currentFile = PFMSetCurrentFile(fFile);

	seg_id_t pictureID = fMaxLocalPictID++;
	theBitmap->SaveACopy(pictureID, CHARPIXTYPE);
	SetFileSaveFlag();

	PFMSetCurrentFile(currentFile);
	init_char_picts();

	return (pictureID);

} /* DRDoc::AddCharPICT */


/* ----------------------------------------------------------------------
	DRDoc::UseCharPICT - Gets (checks out) the picture for an ID.
---------------------------------------------------------------------- */
Bitmap* DRDoc::UseCharPICT(seg_id_t charPictID)
{
	// TEST TO SEE IF BITM IS IN LIST
//	assert((charPictID >= 0) && (charPictID < fNmOfCharPicts));

	pfm_fd_t	whichPFMFile = (charPictID >= 32768) ? fFile : ((Dramatica*)fParentApp)->GetCharPixFile();
	pfm_fd_t currentFile = PFMSetCurrentFile(whichPFMFile);
	Bitmap*  charBitmap = new Bitmap(charPictID, CHARPIXTYPE);
	assert(charBitmap->GetWidth());
	PFMSetCurrentFile(currentFile);

	return (charBitmap);
} /* DRDoc::UseCharPICT */


/* ----------------------------------------------------------------------
	DRDoc::UnuseCharPICT - Checks in an ID for a picture
---------------------------------------------------------------------- */
void DRDoc::UnuseCharPICT(Bitmap* charBitmap)
{
	delete charBitmap;
} /* DRDoc::UnuseCharPICT */


/* ----------------------------------------------------------------------
	DRDoc::UpdateCastViews - Updates any open Castlist views.
---------------------------------------------------------------------- */
void DRDoc::UpdateCastViews(void)
{
	CastListView* theCastListView = GetCastListView();
	if (theCastListView)
		theCastListView->UpdateThisView();

	CastListView* theBCCastListView = GetBCCastListView();
	if (theBCCastListView)
		theBCCastListView->UpdateThisView();

	CastListView* theCastingCastListView = GetCastingCastListView();
	if (theCastingCastListView)
		theCastingCastListView->UpdateThisView();

} /* DRDoc::UpdateCastViews */


/* ----------------------------------------------------------------------
	DRDoc::InitQuestionStatus -
---------------------------------------------------------------------- */
void DRDoc::InitQuestionStatus(void)
{

}


/* ----------------------------------------------------------------------
	DRDoc::LoadQuestionStatus - Load the question status segment into
	memory.  Allocate memory if segment doesn't exist.  Size the segment
	to the maximum size of our number of questions.
---------------------------------------------------------------------- */
void DRDoc::LoadQuestionStatus(void)
{
	pfm_fd_t currentFile = PFMSetCurrentFile(fFile);
	fMaxNmOfQuestions = MAX(fMaxNmOfQuestions, kNmOfDQSQuestions);
```

```
        fQCheckMarkHdl = (hdl_t) PFMCheckoutSeg(_OSType("QSTS"), 0);
        if (fQCheckMarkHdl == PFM_NO_SEG) {
                fQCheckMarkHdl = MM_ALLOC_INIT(byte_cnt(fMaxNmOfQuestions+2), mm_no_flags, 0, "Question Status", NULL);
                assert(fQCheckMarkHdl);
                err_t theErr = PFMAddSegWithId(_OSType("QSTS"), 0, fQCheckMarkHdl, PFM_MIN_PRIO, false);
                assert(theErr == NOERR);
        }
        else {
                fQCheckMarkHdl = MMReallocInit(fQCheckMarkHdl, byte_cnt(fMaxNmOfQuestions+2), 0);

        }

        fQuestCheckMarks = (char*)MM_USE(fQCheckMarkHdl);
        PFMSetCurrentFile(currentFile);

} /* DRDoc::LoadQuestionStatus */


/* ----------------------------------------------------------------------
        DRDoc::SaveQuestionStatus -
---------------------------------------------------------------------- */
void DRDoc::SaveQuestionStatus(void)
{
        pfm_fd_t currentFile = PFMSetCurrentFile(fFile);
        pt_err theErr;
        fStoryDocPT->SetParam("NmQuest", 's', (short)(fMaxNmOfQuestions));

        PFMSetSegModified(fQCheckMarkHdl, true);

        PFMSetCurrentFile(currentFile);
} /* DRDoc::SaveQuestionStatus */


/* ----------------------------------------------------------------------
        DRDoc::GetFontPref - Gets the desired font selection in the
        preferences file.  prefPT defines which preference file segment
        will contain the font specification.  The option prefix is used to
        differentiate between multiple font specs in the same segment.
---------------------------------------------------------------------- */
void DRDoc::GetFontPref(PText* prefPT, char* optionPrefix, gl_font_t *pFont, short *pSize, gl_face_t *pFace)
{
        char keyName [30];

        strcpy(keyName, optionPrefix);
        strcat(keyName, "Fon");
        prefPT->GetParam(keyName, 's', (short*)pFont);

        strcpy(keyName, optionPrefix);
        strcat(keyName, "FSz");
        prefPT->GetParam(keyName, 's', (short*)pSize);

        short theFace = (short)*pFace;                                  // This is needed because a gl_face_t is
a 4-byte int under MPW
        strcpy(keyName, optionPrefix);
        strcat(keyName, "Fac");
        prefPT->GetParam(keyName, 's', &theFace);

} /* DRDoc::GetFontPref */


/* ----------------------------------------------------------------------
        DRDoc::SetFontPref - Sets the desired font selection in the
        preferences file.  prefPT defines which preference file segment
        will contain the font specification.  The option prefix is used to
        differentiate between multiple font specs in the same segment.
---------------------------------------------------------------------- */
void DRDoc::SetFontPref(PText* prefPT, char* optionPrefix, gl_font_t font, short size, gl_face_t face)
{
        char keyName [30];

        strcpy(keyName, optionPrefix);
        strcat(keyName, "Fon");
        prefPT->SetParam(keyName, 's', (short)font);

        strcpy(keyName, optionPrefix);
        strcat(keyName, "FSz");
        prefPT->SetParam(keyName, 's', (short)size);

        short theFace = (short)face;
        strcpy(keyName, optionPrefix);
        strcat(keyName, "Fac");
        prefPT->SetParam(keyName, 's', (short)theFace);

} /* DRDoc::SetFontPref */


/* ----------------------------------------------------------------------
        DRDoc::SelectFont - puts up a dialog to let user choose a font
        specification.  Returns true if the user pressed the OK button.
---------------------------------------------------------------------- */
bool_t DRDoc::SelectFont(gl_font_t *pFont, short *pSize, gl_face_t *pFace)
{
        GL_FSPEC font;
        GLFillFontSpec(&font, *pFont, *pSize, *pFace);
        if (AP_PickFont(&font) == kOkBtn) {
                GLMapFontSpec(&font, pFont, pSize, pFace);
                return (true);
        }
        else
                return (false);

} /* DRDoc::SelectFont */


#pragma segment main


/* xxxxxxxxxxxxxxxxxxxxxxxxxxxxxxxxxxxxxxxxxxxxxxxxxxxxxxxxxxxxxxxxxxxxxx
 * $Log:          document.cc,v $
Revision 1.32  93/09/24  15:29:52  stephen
Cleaned up warnings.
```

```
Revision 1.31  93/08/20  13:52:41  stephen
Fixes to SaveAppreciations that might have caused crashing.

Revision 1.30  93/06/23  16:26:43  stephen
New function decodes comma delimited numbers, though this
approach may become obsolete with the automatic reading/writing
of SLists.

Revision 1.29  93/06/04  23:09:16  stephen
Added functions to GetCharacteristics.

Revision 1.28  93/06/04  19:55:25  stephen
Changed PFMPushes to PFMSets.

Revision 1.27  93/06/03  23:14:10  stephen
Added Help palettes.

Revision 1.26  93/06/01  13:45:21  stephen
Made allocation of character's Bitmap table dynamic.

Revision 1.25  93/05/31  18:20:58  stephen
New Story Info cmd.

Revision 1.24  93/05/29  18:54:31  stephen
Put in functions to read character Picts.

Revision 1.23  93/05/27  16:33:37  stephen
Document class supports SuperClass*

Revision 1.22  93/05/26  19:45:50  stephen
Added support for STEL segment.

Revision 1.21  93/05/24  21:35:43  stephen
Fixed IsValid checking to respect current document.

Revision 1.20  93/05/21  22:06:33  stephen
fixed bug with overwriting apprecNms[] with +1 index.

Revision 1.19  93/05/20  17:20:06  stephen
Changed gender representation from char to short 'M' = 0.

Revision 1.18  93/05/20  11:22:28  chris
Slight act order modifications.

Revision 1.17  93/05/18  20:45:29  stephen
AddNewChar() member function added.

Revision 1.16  93/05/18  18:14:13  chris
Finished adding type act order stuff.

Revision 1.15  93/05/18  14:59:46  chris
Added reading and writing of act order appreciaions to existing loops.

Revision 1.14  93/05/18  11:21:21  stephen
New Characters menu & commands.

Revision 1.13  93/05/12  21:03:54  stephen
Initial work to get printing to happen for outline view.

Revision 1.12  93/05/10  16:52:27  stephen
New Character-related functions.

Revision 1.11  93/05/07  10:16:26  chris
Added high level dynamics to the story points window.

Revision 1.10  93/05/04  21:31:55  stephen
Minor changes to account for Dynamic SemVals.

Revision 1.9  93/05/03  16:35:35  stephen
Minor changes to definitions.

Revision 1.8  93/04/24  14:32:41  stephen
Fixed appreciation loading for good!

Revision 1.7  93/04/24  09:55:43  stephen
Made control panel load & save appreciations.

Revision 1.6  93/04/19  18:51:49  stephen
Fixed Quitting if no changes made but no save (this time for real).

Revision 1.5  93/04/13  13:03:10  stephen
More File Saving fixes...

Revision 1.4  93/04/12  21:25:55  stephen
Worked on Saving mechanism

Revision 1.3  93/04/08  14:56:43  stephen
Enahnced reading/Writing of PFM/PText Segments.

Revision 1.2  93/04/06  19:39:51  stephen
First General Revisions

Revision 1.1  93/03/31  22:36:37  stephen
Initial revision

 */
```

```
/* ----------------------------------------------------------------------
        DOCUMENT.H
        Declaration of the Dramatica document class
        Copyright (C) 1993 Screenplay Systems Inc.
        Revised:            $Id$
------------------------------------------------------------------------ */

#pragma once

#ifndef __DRDOC__
#define __DRDOC__

#include "listsx.h"
#include "tdoc.h"
#include "bitmap.h"

#include "consts.h"
#include "ptext.h"
#include "structs.h"
#include "semtable.h"
#include "apprec.h"
#include "dqs-defs.h"

class Summary;
class DQSWindow;
class CastListView;
class CLWindow;
class RepWindow;
class SPWindow;
class BCWindow;
class CastingWindow;

#pragma segment docs


const   short   kMySC           = 1;
const   short   kJust1SC        = 2;
const   short   kJust2SC        = 3;
const   short   kMyRefSC        = 4;

const   short   kNmOfSCs        = 4;

const   bool_t  kSaveSC         = true;
const   bool_t  kNoSaveSC       = false;

//      CHARACTER ARCHETYPE CONSTANTS

const short kArchProtagonist    = 4;
const short kArchAntagonist             = 5;
const short kArchEmotion        = 6;
const short kArchReason                 = 7;
const short kArchSkeptic        = 8;
const short kArchSidekick       = 9;
const short kArchGuardian       = 10;
const short kArchContagonist    = 11;


void    CreateOrderString(char* theString, char* charTable, short nmOfShorts);
void    CreateOrderString(char* theString, short* shortTable, short nmOfShorts);
void    CreateOrderString(char* theString, SList* sLst);

short   ConvertOrderString(char* theString, char* charTable);
short   ConvertOrderString(char* theString, short* shortTable);
short   ConvertOrderString(char* theString, SList* sLst);

//void  GetApprecKey(char* keyText, short whichGroup, short index);

int             CompCNameAsc(const void* pKey, const void* pElem);

//      Subjective type consts

const   short   kCHNeither      = 0;
const   short   kCHMain         = 1;
const   short   kCHObstacle     = 2;

//      Sex type consts

const   short   kCHMale         = 0;
const   short   kCHFemale       = 1;
const   short   kCHNeutral      = 2;

//      Form type consts

const   short   fCHSingle       = 1;
const   short   fCHPlural       = 2;

//      Misc consts

const   ls_index fNoCharDefined         = -1;

        // CHARACTER INFO RECORD

const   size_t kMaxCNameLength  = 24;   // Max number of chars to use for sorting name in List

typedef struct {
        seg_id_t        whichSegment;                   // The CHAR pfm seg id in the user's story document
        PText*          charPT;                                 // PText* for this character (NULL if not in
memory)
        char            name[kMaxCNameLength];  // Character's name
        short           sex;                                    // Male, Female, or neutral
        short           form;                                   // Plurality of this character
        seg_id_t        charPixID;                              // This character's Picture ID (BITM seg_id_t)
        short           subjective;                             // 1 = Main Character, 2 = Obstacle (0 = neither)
} CharInfoRec;

#define CHARPIXTYPE             _OSType("CPIX")

/* ----------------------------------------------------------------------
        APPRECATIONS DATA - this structure is ultimately stored in an array
        that is local to each document.
------------------------------------------------------------------------ */
        //      APPRECATIONS DATA
```

```
typedef struct {
        semval_t        semVal;                         // Actual semantic Value
        SList*          multiSemValList;  // Table if more than 1 semval exists
        char            chosenByUser;           // TRUE if this is a user choice; False if Dramatic chose it.
        char            locked;                         // TRUE if the appreciation is "locked"
        char            modified;                       // TRUE if we modified this appreciation
} ApprecDataRec;


/* -----------------------------------------------------------------------
        DRDoc - Dramatica's document class.
------------------------------------------------------------------------- */
class DRDoc : public TDoc {
public:
        DRDoc(TAppl *pAppl, const GN_FileRef *pFileRef = NULL);
        ~DRDoc(void);

        // PUBLIC UTILITIES
        virtual char*     ClassName(void) const      { return "DRDoc"; }
        virtual class_t   ClassType(void) const      { return kDRDoc; }
        virtual bool_t    IsOfType(const void *pType) const { return *(class_t*) pType == kDRDoc ||
TDoc::IsOfType(pType); }
        virtual bool_t    Close(TWindow *pTWindow, ObjList *pDocList, bool_t force);

        virtual OSType    GetDocType(void)          { return DDOC; }

        // PUBLIC BEHAVIOR
        void                    InitDoc(void);
        inline void             SetFileSaveFlag(void);                                          // Signals
the file has been modified


        // FUNCTIONS TO DEAL WITH A DOCUMENT'S APPRECIATIONS

        semval_t                GetApprValByID(appr_id_t apprID);
        void                    SetApprValByID(appr_id_t apprID, semval_t semVal);

        inline semval_t   GetApprValByIndex(appr_index_t apprIndex);
        void                    SetApprValByIndex(appr_index_t apprIndex, semval_t semVal);

        hdl_t                   CopyAppreciations(hdl_t apprecRecsHdl = NULL);
        void                    RestoreAppreciations(hdl_t apprecRecsHdl);
        void                    DisposeApprecCopy(hdl_t apprecRecsHdl);
        void                    ClearAppreciations(void);

                //      OLD-STYLE FUNCTIONS

#if 0
        ApprecList*             LoadAppreciations(void);
        void                    UpdateAppreciations(ApprecList* ApprecPtr);
        void                    SaveAppreciations(ApprecList* pApprecTbl, bool_t saveData = true);
        void                    LoadDynamics(void);
        void                    SaveDynamics(bool_t saveData);
#endif

        void                    SetSuperAppreciations(void);


        // DATA SEGMENTS FOR A SPECIFIC CHARACTER: CREATION & DELETION

        short                   GetNmCharacters(void)          { return fNmOfCharacters; }
        void                    SetNmCharacters(short n)    { fNmOfCharacters = n; }

        void                    LoadCharInfo(CharInfoRec* charInfo, PText* charPT = NULL);
        PText*                  GetCharPT(short whichChar, CharInfoRec* charInfo = NULL);
        inline void             GetCharInfoRec(ls_index whichChar, CharInfoRec* charInfo);
        inline void             SetCharInfoRec(ls_index whichChar, CharInfoRec* charInfo);
        void                    ReleaseCharPTs(void);

        void                    SetMainObstacleIDs(void);
        ls_index                GetMainCharID(void)                                             {
return fMainCharID; }
        void                    SetMainCharID(ls_index mainCharID)              { fMainCharID = mainCharID; }
        PText*                  GetMainCharPT(void);
        ls_index                GetObstacleCharID(void)                                 { return
fObstacleCharID; }
        void                    SetObstacleCharID(ls_index obstacleCharID)   { fObstacleCharID = obstacleCharID; }
        PText*                  GetObstacleCharPT(void);
        ls_index                PTextToCharID(PText* charPT);

        PText*                  AddNewChar(char* name = NULL, short sex = 0, short form = 1, short charPixID = 0,
short subjective = kCHNeither, short* whichChar = NULL);
        void                    SetMinCharInfo(CharInfoRec* charInfo, char* name, short sex, short form, short
charPixID, short subjective);
        void                    DeleteChar(short whichChar);
        void                    SortCharList(void)                                      {
fCharList.Sort(CompCNameAsc); }

        short                   GetCharacteristics(short whichChar, short whichSet, short* semValTbl);
        void                    SetCharacteristics(short whichChar, short whichSet, short* semValTbl, short
nmOfShorts);
        bool_t                  ScanForCharacteristicConflicts(short theChar, short whichSet, short* charsSemValTbl,
short nmInSearchTbl, short* OKSemValTbl, short* nmOfOKItems);
        short                   GetCharacterType(short whichChar);
        void                    SetCharacterType(short whichChar, short whichType);
        short                   WhoHasCharacteristic(semval_t characteristic, short whichSet);
        void                    RemoveCharacteristic(short whichChar, short whichSet, semval_t characteristic);


        // GET A PTR TO THE BITMAP OF A CHARACTER'S PICTURE, BASED ON AN ID

        seg_id_t                AddCharPICT(Bitmap* theBitmap);
        Bitmap*                 UseCharPICT(seg_id_t charPictID);
        void                    UnuseCharPICT(Bitmap* charBitmap);
        short                   GetNmCharPicts(void)                    { return fCharPictList.Size();
}
        SList*                  GetCharPictList(void)                   { return &fCharPictList; }

        gl_coord_t              GetStdCharPictHeight(void)                      { return
fStdCharPictHeight; }
        void                    SetStdCharPictHeight(gl_coord_t height)    { fStdCharPictHeight = height; }
```

```
        gl_coord_t              GetStdCharPictWidth(void)                       { return fStdCharPictWidth; }
        void                    SetStdCharPictWidth(gl_coord_t width)       { fStdCharPictWidth = width; }

        // CHECKS OUT / IN A SPECIFIC SUPERCLASS THAT IS STORED IN THE USER'S STORY DOCUMENT

        SuperClass*             GetSuperClass(short whichSC);
        void                    SaveSuperClass(short whichSC, bool_t save);
        void                    PerformJustification();

        // THESE FUNCTIONS RETURN A PTEXT* TO IMPORTANT DOCUMENT-SPECIFIC PTEXT SEGMENTS

        PText*                  GetRESP(void)                               { return fResponses; }          //
Structural & dynamic choices user or Dramatica has made
        PText*                  GetSTEL(void)                               { return fStellingPT; }         //
Storytelling text that corresponds to the StoryPoints window
        PText*                  GetLOCK(void)                               { return fLockApprPT; }         //
Various locks for appreciaitions
        PText*                  GetSDOC(void)                               { return fStoryDocPT; }         //
General options & settings for this Story.

        //      MEMBER FUNCTIONS TO KNOW IF WE'RE LOOKING AT A JUSTIFIED STORY

        ushort                  GetTotalStories(void)                           { return fTotalStories; }
        void                    SetTotalStories(ushort nmOfStories)         { fTotalStories = nmOfStories; }

        bool_t                  IsStoryJustified(void)                          { return (fStoryIsJustified &&
(fTotalStories == 1)); }
        void                    SetStoryJustification(bool_t jFlag)         { fStoryIsJustified = jFlag; }

        //      SETTING & GETTING VARIOUS WINDOW POINTERS

        DQSWindow*              GetDQSWindow(void)                                                          {
return fDQSWindow; }
        void                    SetDQSWindow(DQSWindow* DQSWindowPtr)           { fDQSWindow = DQSWindowPtr; }

        RepWindow*              GetReportWindow(void)                                           { return
fReportWindow; }
        void                    SetReportWindow(RepWindow* reportWindowPtr)  { fReportWindow = reportWindowPtr; }

        SPWindow*               GetStoryPointsWindow(void)                                      { return
fStoryPointsWindow; }
        void                    SetStoryPointsWindow(SPWindow* SPWindowPtr)  { fStoryPointsWindow = SPWindowPtr; }

        CLWindow*               GetCastListWindow(void)                                         { return
fCastListWindow; }
        void                    SetCastListWindow(CLWindow* theWindow)          { fCastListWindow = theWindow;
}

        BCWindow*               GetBuildCharWindow(void)                                { return
fBuildCharWindow; }
        void                    SetBuildCharWindow(BCWindow* theWindow)         { fBuildCharWindow = theWindow;
}

        CastingWindow*  GetCastingWindow(void)                                          { return
fCastingWindow; }
        void                    SetCastingWindow(CastingWindow* theWindow)  { fCastingWindow = theWindow; }

        //      SETTING & GETTING VARIOUS VIEW POINTERS

        CastListView*   GetCastListView(void)                                           { return
fCastListView; }
        void                    SetCastListView(CastListView* theView)          { fCastListView = theView; }

        CastListView*   GetBCCastListView(void)                                         { return
fBldChrCastListView; }
        void                    SetBCCastListView(CastListView* theView)    { fBldChrCastListView = theView; }

        CastListView*   GetCastingCastListView(void)                                    { return
fCastingCastListView; }
        void                    SetCastingCastListView(CastListView* theView)       { fCastingCastListView =
theView; }

        void                    UpdateCastViews(void);

        //      CHECKMARK QUESTION FUNCTIONS

        short                   GetQuestionStatus(short whichQuestion)                                      {
return (short)(fQuestCheckMarks[whichQuestion]); }
        void                    SetQuestionStatus(short whichQuestion, short status)  {
fQuestCheckMarks[whichQuestion] = (char)status; }

        void                    ClearQuestionStatus(void)
        { memset(fQuestCheckMarks, 0, kNmOfDQSQuestions); }
        void                    InitQuestionStatus(void);
        void                    LoadQuestionStatus(void);
        void                    SaveQuestionStatus(void);

        //      FONT PREFERENCE FUNCTIONS

        void                    GetFontPref(PText* prefPT, char* optionPrefix, gl_font_t *pFont, short *pSize,
gl_face_t *pFace);
        void                    SetFontPref(PText* prefPT, char* optionPrefix, gl_font_t pFont, short pSize,
gl_face_t pFace);
        bool_t                  SelectFont(gl_font_t *pFont, short *pSize, gl_face_t *pFace);

        //      MISCELLANEOUS

        virtual GLRect* GetOptWindowRect(GLRect *bounds, void *pInfo);
        virtual err_t   PrintDoc(Printing *pPrintMgr);
        bool_t                  GetBeep(void)                               { return fBeepOn; }
        void                    SetBeep(bool_t val)                         { fBeepOn = val; }

protected:

        // DATA MEMBERS
```

```
        Summary*                    fSummaryWindow;                 // The main summary window
        DQSWindow*                  fDQSWindow;                             // Dramatica Query Window
        CLWindow*                   fCastListWindow;        // Cast list window
        RepWindow*                  fReportWindow;                  // Reports window
        SPWindow*                   fStoryPointsWindow;             // Storypoints window
        BCWindow*                   fBuildCharWindow;               // Build Characters
        CastingWindow*      fCastingWindow;                 // Casting window

        CastListView*       fCastListView;                  // Cast List view in characters window
        CastListView*       fBldChrCastListView;    // Cast List view in build characters
        CastListView*       fCastingCastListView;   // Cast List view in Casting window

        PText*                      fResponses;                     // Pointer to the RESP PText segment (contains
user's answers)
        PText*                      fStoryDocPT;            // Many document-specific options and parameters are
stored here
        PText*                      fStellingPT;            // Storytelling ptext.
        PText*                      fLockApprPT;            // Locks for various appreciations.

        ushort                      fTotalStories;          // Total stories currently available (1 means story is
justifyable)
        short                       fStoryIsJustified;      // True if this story has gone thru the justification
process

        hdl_t                       fQCheckMarkHdl;         // Memory allocated to question checkmarks array
        char*                       fQuestCheckMarks;       // One char for each possible DQS question; indicates
status of question 0 = unanswered, 1 = answered
        short                       fMaxNmOfQuestions;      // Size (in bytes) of the fQuestCheckMarks array + 2

        // CHARACTER DATA

        List                        fCharList;                      // Data pertaining to characters
        short                       fNmOfCharacters;  // Total # of characters in this story
        seg_id_t                    fMaxCharSegID;          // Highest number we've allocated so far
        ls_index                    fMainCharID;            // Which character is currently "main" (fNoCharDefined (-
1) if none)
        ls_index                    fObstacleCharID;  // Which character is currently "obstacle" (fNoCharDefined (-1) if
none)

        SList                       fCharPictList;          // List of character pict ID available
        ushort                      fMaxLocalPictID;  // A seg_id_t from 32K to 64K of the next highest id to use for
pasted character picts
        gl_coord_t                  fStdCharPictHeight;     // Height of the standard character picture
        gl_coord_t                  fStdCharPictWidth;      // Width of the standard character picture

        hdl_t                       fSCHdls[kNmOfSCs];      // Total # of non-reference SuperClasses

        hdl_t                       fApprecRecsHdl;         // Handle to in-memory appreciations
        ApprecDataRec*      fApprecRecs;            // Pointer to in-memory appreciations
        hdl_t                       fApprecHdl;                     // Handle to the appreciation table in-use
        hdl_t                       fDynamicsHdl;           // Handle to the dynamics table in-use

        bool_t                      fBeepOn;                        // a flag for beeping when printing

        // LOCAL UTILITIES
        virtual TWindow* new_window(const GLRect *bounds, wn_type windowType, const char *docTitle, ptr_t storage =
NULL);
        virtual err_t       read_doc(void);
        virtual err_t       close_file(void);
        virtual err_t       about_to_save_doc(void);

        void                        init_superclasses(void);
        void                        checkin_superclasses(void);
        void                        init_char_picts();
        void                        load_appreciations(ApprecDataRec* apprecRecs);
        void                        save_appreciations(ApprecDataRec* apprecRecs);

}; /* DRDoc */


/* -------------------------------------------------------------------------
        DRDoc::GetApprValByIndex - Given an apprIndex, return the current value
        of the given appreciation.
------------------------------------------------------------------------- */
semval_t DRDoc::GetApprValByIndex(appr_index_t apprIndex)
{
        assert((apprIndex >= 0) && (apprIndex < TOTAL_OTHERSEM_ITEMS));

        return (fApprecRecs[apprIndex].semVal);

} /* DRDoc::GetApprValByID */


/* -------------------------------------------------------------------------
        DRDoc::GetCharInfoRec - given an index, get the associated character
        record.
------------------------------------------------------------------------- */
void DRDoc::GetCharInfoRec(ls_index whichChar, CharInfoRec* charInfo)
{
        fCharList.GetElem(charInfo, whichChar);

} /* DRDoc::GetCharInfoRec */


/* -------------------------------------------------------------------------
        DRDoc::SetCharInfoRec - given an index, set the associated character
        record.
------------------------------------------------------------------------- */
void DRDoc::SetCharInfoRec(ls_index whichChar, CharInfoRec* charInfo)
{
        fCharList.SetElem(charInfo, whichChar);

} /* DRDoc::SetCharInfoRec */


/* -------------------------------------------------------------------------
        DRDoc::SetFileSaveFlag
------------------------------------------------------------------------- */
inline void DRDoc::SetFileSaveFlag(void)
{
        TDoc::Set(kDirty);
} /* DRDoc::SetFileSaveFlag */
```

```
#pragma segment main

/* xxxxxxxxxxxxxxxxxxxxxxxxxxxxxxxxxxxxxxxxxxxxxxxxxxxxxxxxxxxxxxxxxxxxxx
 * $Log:          document.h,v $
 * Revision 1.21  93/09/24  15:30:01  stephen
 * Cleaned up warnings.
 *
 * Revision 1.20  93/06/23  16:27:30  stephen
 * New function decodes comma delimited numbers, though this
 * approach may become obsolete with the automatic reading/writing
 * of SLists.
 *
 * Revision 1.19  93/06/04  23:09:33  stephen
 * Added functions to GetCharacteristics.
 *
 * Revision 1.18  93/06/01  13:45:42  stephen
 * Made allocation of character's Bitmap table dynamic.
 *
 * Revision 1.17  93/05/31  19:25:23  stephen
 * Added a GetSDOC() Ptext function...
 *
 * Revision 1.16  93/05/30  21:58:48  chris
 * Added get number of pix inline function.
 *
 * Revision 1.15  93/05/29  18:54:47  stephen
 * Put in functions to read character Picts.
 *
 * Revision 1.14  93/05/27  16:34:00  stephen
 * Document class supports SuperClass*
 *
 * Revision 1.13  93/05/26  19:46:06  stephen
 * Added support for STEL segment.
 *
 * Revision 1.12  93/05/25  15:10:04  stephen
 * commented out document scrolling that defaulted to 100!
 *
 * Revision 1.11  93/05/24  21:36:00  stephen
 * Fixed IsValid checking to respect current document.
 *
 * Revision 1.10  93/05/18  20:46:01  stephen
 * AddNewChar() member function added.
 *
 * Revision 1.9  93/05/10  16:52:49  stephen
 * New Character-related functions.
 *
 * Revision 1.8  93/05/07  10:16:29  chris
 * Added high level dynamics to the story points window.
 *
 * Revision 1.7  93/05/03  16:35:52  stephen
 * Added Load/SaveDynamics() and fixed Load/SaveAppreciations.
 *
 * Revision 1.6  93/04/24  14:30:25  stephen
 * Fixed problem with appreciations loading.
 *
 * Revision 1.5  93/04/24  09:55:48  stephen
 * Made control panel load & save appreciations.
 *
 * Revision 1.4  93/04/13  13:03:23  stephen
 * More File Saving fixes...
 *
 * Revision 1.3  93/04/12  21:26:17  stephen
 * Worked on Saving mechanism
 *
 * Revision 1.2  93/04/08  14:57:04  stephen
 * Enahnced reading/Writing of PFM/PText Segments.
 *
 * Revision 1.1  93/03/31  22:36:55  stephen
 * Initial revision
 *
 */

#endif /* __DRDOC__ */
```

```
/* -----------------------------------------------------------------------
	DQBG.R
	Dramatica's Query Question Background
	Copyright (C) 1993 Screenplay Systems Inc.
	$Id: dqs-bg.r,v 1.1 93/08/20 13:53:24 stephen Exp Locker: stephen $
------------------------------------------------------------------------- */

#ifdef macintosh
	#include "systypes.r"
	#include "types.r"
#else
	#include <systypes.r>
	#include <types.r>
#endif

#include "dqs-defs.h"


/* -----------------------------------------------------------------------
	'DQBG' - Parameterized Dramatica Query System Text.
------------------------------------------------------------------------- */

type 'DQBG' {
	cstring;			/* the stream of parameterized text */
};


resource 'DQBG' (kDQSResolve, PFM_MIN_PRIO) {
	"There are two major ways in which an author can illustrate the best way to solve the problem explored in a story:  One is to show the proper way of going about solving the problem, the other is to show the wrong way to solve the problem.  To illustrate the proper way, your Main Character must hold on to their resolve and remain steadfast if they are to succeed, because they truly are on the right path.  To illustrate the improper way of dealing with a problem, your Main Character MUST change to succeed, for they are going about it the wrong way.  Of course, success is not the only outcome that can befall a Main Character.  Another way to illustrate that a way of dealing with a problem is proper would be to have the Main Character change their way of going about it and fail.  "
	"Similarly, the improper way can be illustrated by a Main Character that remains steadfast and fails.  So, choosing Change or steadfast really has nothing directly to do with being correct or incorract; it just describes whether the Main Character's ultimate resolve is to stay the course or try a different tack."
	"\n\n"
	"Just because a Main Character should remain steadfast does not mean they don't consider changing.  In fact, that is the temptation with which they are constantly faced: to give up or alter their approach in the face of ever-increasing opposition.  Action oriented Steadfast stories throw physical hurdles at a Steadfast Main Character (e.g. James Bond as portrayed in most of the Bond films), whereas Decision oriented Steadfast stories throw mental or emotional hurdles at a Steadfast Main Character (e.g. Job in the Old Testament of the Bible).  If, in spite of the difficulties or suffering, the Steadfast Main Character remains steadfast, the audience still may not want them to ultimately succeed.  This occurs because simply being steadfast does not mean one is correct.  If the audience is shown that a character is misguided yet remains steadfast, the audience will hope for their ultimate failure.  "
	"Similarly, a Change Main Character does not mean they are changing all the time.  In fact, in most cases, the Change Main Character will resist change, all the way to the moment of truth where they must choose once and for all to continue down the wrong path, or to jump to the right path by accepting change in themselves or their outlook.  Action oriented Change stories offer aids and benefits to assist the Main Character in continuing down the wrong path.  Decision oriented Change stories provide mental or emotional gratification to the Main Character, again tempting them not to change.  Regardless of the benefits to be had by remaining steadfast, the audience will want the Change Main Character ultimately to succeed if they are on the wrong path and change.  However, if they do not change, the audience will want them to lose all the benefits they thought they had gained."
	"\n\n"
	"Your selection of Change or Steadfast has wide ranging effects on the dynamics of your story.  Such things as the relationship between the Objective and Subjective story lines and the order of exploration of your thematic points is adjusted in the Dramatica model to create and support the ultimate decision of your Main Character to either change or remain steadfast."
};

resource 'DQBG' (kDQSOutcome, PFM_MIN_PRIO) {
	"Although it can be tempered by degree, Success or Failure is easily determined by seeing if the Main Character has achieved what they set out to achieve at the beginning of the story.  Certainly, a Main Character may learn that they really don't want what they thought they did and in the end not go for it.  Even though they have grown, this is considered a failure -- they did not achieve what they originally intended.  Similarly, a Main Character may actually achieve what they wanted, and even though they find it unfulfilling or unsatisfying, it must be said they succeeded.  "
	"The point here is not to pass a value judgment on the worth of their success or failure, but simply to determine if they actually did succeed or fail to achieve what they set out to achieve at the beginning of the story."
	"\n\n"
	"For certain stories, it may be desired to have a very positive feel to the outcome by having success matched with a positive judgment of that success.  Other times, it may be desired to have a very negative feel to the outcome by matching failure with a negative judgment of that failure.  In the first case, we create a \"feel good\" story, as they say in the ads.  In the second, we create a tragedy.  But all stories do not fall at one pole or the other.  Frequently, authors choose to have a \"bad\" character succeed, and show the regrettable result of that success, or to have a \"good\" character fail, but show how that failure was really positive for them or others."
	"\n\nWhen deciding if you want your Main Character to succeed, think not only of the stories where the winner takes all, but of those stories where a valiant effort fails, yet the Main Character learns an important lesson about life.  When deciding if you want your Main Character to fail, think not only of someone getting their just deserts, but of those stories where a misguided success leads to a result opposite what the Main Character had hoped to achieve by the success."
	"\n\nIn short, either success or failure can be seen as an \"upper\" or a \"downer\" by the audience, and the approach you take to your message should consider that."
	"\n\n"
	"Achieving something requires accomplishing the right steps in the right order to get from where the Main Character starts to where she wants to be.  When you choose success or failure, Dramatica alters the kind of steps your Main Character will need to take, and determines the appropriate order to bring them to the desired outcome."
};

resource 'DQBG' (kDQSJudgment, PFM_MIN_PRIO) {
	"The notion that the good guys win and the bad guys lose is not always true.  In stories, as in life, we often see very bad people doing very well for themselves (if not for others).  And even more often, we see very good people striking out.  If we only judged things by success and failure, it wouldn't matter if the outcome was good or bad, as long as it was accomplished.  The choice of Good or Bad, places the author's moralistic judgment on the value of the Main Character's success or failure in resolving their personal problems.  It is an opportunity not only to address good guys that win and bad guys that fail, as well as good guys that fail and the bad guys that win, but to comment on the success or failure of their growth as human beings."
	"\n\n"
	"The rational argument of a story deals with practicality: does the kind of approach taken lead to success or failure in the endeavor.  In contrast, the passionate argument of a story deals with fulfillment: does the Main Character find peace at the end of their journey?  If you want an \"upper\" story, you will want success in the objective story and a judgment of \"good\" in the objective story.  If you want a tragedy, you will want the objective effort to fail, and the subjective journey to end badly as well.  However, life is often made of trade-offs, compromises, sacrifices, and re-evaluations, and so should be stories.  Choosing Success/Bad stories or Failure/Good stories opens the door to all these alternatives.  If we choose a Failure/Good story, we can imagine a Main Character who realizes "
	"they had been fooled into trying to achieve a goal, or a Main Character who discovers something more important to them personally in the course of trying to achieve the goal.  A Success/Bad story might end with a Main Character achieving their dreams only to find they are meaningless, or Main Character who makes a sacrifice for the success of others but ends up bitter and vindictive."
	"\n\n"
	"Because success & failure are measurements of how well specific requirements have been met, they are by nature Objective.  In contrast, Good and Bad are Subjective value judgments based on an appreciation of the Main Character's
```

```
peace and fulfillment.  When you select Good or Bad, Dramatica adjusts the \"phasing\" between the Objective and
Subjective storylines to create an interference pattern that support the appropriate value judgment."
);

resource 'DQBG' (kDQSDirection, PFM_MIN_PRIO) {
        "Whether or not a Main Character eventually changes their nature or remains steadfast, they will still grow over
the course of the story, as they develop new skills and understanding .  This growth has a direction.  Either they will
grow into something (Start) or grow out of something (Stop).  A Change Main Character grows either by adding a
characteristic they lack (Start) or by dropping a characteristic they already have (Stop).  Either way, their make up is
changed in nature.  As an example we can look to Scrooge.  Does Scrooge need to change because he is mean or because he
lacks kindness?  Clearly Scrooge's problems stem not from his active meanness, but his passivle lack of kindness.  It is
not that he is on the attack, but that he does not proactively seek to help others.  "
        "So, Scrooge needs to Start, rather than stop.  This difference is important during storytelling to place the
focus of conflict so as to support the argument of the story.  With Steadfast Main Characters they will not add nor
delete a characteristic, but will grow either by more strongly holding on against something bad, waiting for it to Stop,
or  by more strongly holding out until something good can Start.  For a Steadfast Character, growth is not a matter of
change, but a matter of degree.  The change appears not in themselves but in their environment.  Change Characters
actually alter their being, under the influence of environmental considerations.  This illustrates both why it is often
falsely thought that a Main Character MUST change, and also why steadfast characters are of thought not to grow.  "
        "To see growth in a Main Character one must look at both whether they are Change or Steadfast and also at the
direction of the growth."
        "\n\n"
        "A good way to get a feel for this dynamic in Change Characters is to picture the Stop character as having a
chip on their shoulder and the Start character as having a hole in their heart.  If the actions or decisions taken by the
character are what make the problem worse, then they need to stop.  If the problem worsens because the character fails to
take certain \"obvious\" actions or decisions, then they need to start.  Of course, to the character, neither of these
problems is \"obvious\", as they must grow and learn to see it.  Yet, the audience can empathize with the character's
failure to see themselves as the source of the problem because the audience is afforded by the author another view the
character does not get: the objective view.  It is here that start and stop register with the audience as being obvious.
"
        "Essentially, if you want to tell a story about someone who learns they have actually been making the problem
worse, choose Stop.  If you want to tell a story about someone who has allowed a problem to become worse, choose Start.
For a Steadfast Main Character it will seem that their resolve needs to grow regardless of Start of Stop.  But if they
are a Start Character, they will be tempted by indications that the desired outcome is not going to happen or is
unattainable.  If they are a Stop Character, they will find themselves pressured to \"give in\".  Remember that direction
of growth in a Steadfast Character is largely seen in their enviroment.  Their personal growth is seen as a matter of
degree."
        "\n\n"
        "A Change story has a problem and its related solution.  A Steadfast Story has a Focus and Direction.  By
choosing Start or Stop, you tell Dramatica to shift the focus of the story to one over the other.  This is accomplished
by controlling the nature of the Character's concerns in relationship to the concerns of the Story and also by setting
the relationship between theme and plot."
};

resource 'DQBG' (kDQSDirectionA, PFM_MIN_PRIO) {
        "Whether or not a Main Character eventually changes their nature or remains steadfast, they will still grow over
the course of the story, as they develop new skills and understanding .  This growth has a direction.  Either they will
grow into something (Start) or grow out of something (Stop).  A Change Main Character grows either by adding a
characteristic they lack (Start) or by dropping a characteristic they already have (Stop).  Either way, their make up is
changed in nature.  As an example we can look to Scrooge.  Does Scrooge need to change because he is mean or because he
lacks kindness?  Clearly Scrooge's problems stem not from his active meanness, but his passivle lack of kindness.  It is
not that he is on the attack, but that he does not proactively seek to help others.  "
        "So, Scrooge needs to Start, rather than stop.  This difference is important during storytelling to place the
focus of conflict so as to support the argument of the story.  With Steadfast Main Characters they will not add nor
delete a characteristic, but will grow either by more strongly holding on against something bad, waiting for it to Stop,
or  by more strongly holding out until something good can Start.  For a Steadfast Character, growth is not a matter of
change, but a matter of degree.  The change appears not in themselves but in their environment.  Change Characters
actually alter their being, under the influence of environmental considerations.  This illustrates both why it is often
falsely thought that a Main Character MUST change, and also why steadfast characters are of thought not to grow.  "
        "To see growth in a Main Character one must look at both whether they are Change or Steadfast and also at the
direction of the growth."
        "\n\n"
        "A good way to get a feel for this dynamic in Change Characters is to picture the Stop character as having a
chip on their shoulder and the Start character as having a hole in their heart.  If the actions or decisions taken by the
character are what make the problem worse, then they need to stop.  If the problem worsens because the character fails to
take certain \"obvious\" actions or decisions, then they need to start.  Of course, to the character, neither of these
problems is \"obvious\", as they must grow and learn to see it.  Yet, the audience can empathize with the character's
failure to see themselves as the source of the problem because the audience is afforded by the author another view the
character does not get: the objective view.  It is here that start and stop register with the audience as being obvious.
"
        "Essentially, if you want to tell a story about someone who learns they have actually been making the problem
worse, choose Stop.  If you want to tell a story about someone who has allowed a problem to become worse, choose Start.
For a Steadfast Main Character it will seem that their resolve needs to grow regardless of Start of Stop.  But if they
are a Start Character, they will be tempted by indications that the desired outcome is not going to happen or is
unattainable.  If they are a Stop Character, they will find themselves pressured to \"give in\".  Remember that direction
of growth in a Steadfast Character is largely seen in their enviroment.  Their personal growth is seen as a matter of
degree."
        "\n\n"
        "A Change story has a problem and its related solution.  A Steadfast Story has a Focus and Direction.  By
choosing Start or Stop, you tell Dramatica to shift the focus of the story to one over the other.  This is accomplished
by controlling the nature of the Character's concerns in relationship to the concerns of the Story and also by setting
the relationship between theme and plot."
};

resource 'DQBG' (kDQSDirectionB, PFM_MIN_PRIO) {
        "Whether or not a Main Character eventually changes their nature or remains steadfast, they will still grow over
the course of the story, as they develop new skills and understanding .  This growth has a direction.  Either they will
grow into something (Start) or grow out of something (Stop).  A Change Main Character grows either by adding a
characteristic they lack (Start) or by dropping a characteristic they already have (Stop).  Either way, their make up is
changed in nature.  As an example we can look to Scrooge.  Does Scrooge need to change because he is mean or because he
lacks kindness?  Clearly Scrooge's problems stem not from his active meanness, but his passivle lack of kindness.  It is
not that he is on the attack, but that he does not proactively seek to help others.  "
        "So, Scrooge needs to Start, rather than stop.  This difference is important during storytelling to place the
focus of conflict so as to support the argument of the story.  With Steadfast Main Characters they will not add nor
delete a characteristic, but will grow either by more strongly holding on against something bad, waiting for it to Stop,
or  by more strongly holding out until something good can Start.  For a Steadfast Character, growth is not a matter of
change, but a matter of degree.  The change appears not in themselves but in their environment.  Change Characters
actually alter their being, under the influence of environmental considerations.  This illustrates both why it is often
falsely thought that a Main Character MUST change, and also why steadfast characters are of thought not to grow.  "
        "To see growth in a Main Character one must look at both whether they are Change or Steadfast and also at the
direction of the growth."
        "\n\n"
        "A good way to get a feel for this dynamic in Change Characters is to picture the Stop character as having a
chip on their shoulder and the Start character as having a hole in their heart.  If the actions or decisions taken by the
character are what make the problem worse, then they need to stop.  If the problem worsens because the character fails to
take certain \"obvious\" actions or decisions, then they need to start.  Of course, to the character, neither of these
problems is \"obvious\", as they must grow and learn to see it.  Yet, the audience can empathize with the character's
failure to see themselves as the source of the problem because the audience is afforded by the author another view the
character does not get: the objective view.  It is here that start and stop register with the audience as being obvious.
"
        "Essentially, if you want to tell a story about someone who learns they have actually been making the problem
worse, choose Stop.  If you want to tell a story about someone who has allowed a problem to become worse, choose Start.
For a Steadfast Main Character it will seem that their resolve needs to grow regardless of Start of Stop.  But if they
```

```
are a Start Character, they will be tempted by indications that the desired outcome is not going to happen or is
unattainable.  If they are a Stop Character, they will find themselves pressured to \"give in\".  Remember that direction
of growth in a Steadfast Character is largely seen in their enviroment.  Their personal growth is seen as a matter of
degree."
        "\n\n"
        "A Change story has a problem and its related solution.  A Steadfast Story has a Focus and Direction.  By
choosing Start or Stop, you tell Dramatica to shift the focus of the story to one over the other.  This is accomplished
by controlling the nature of the Character's concerns in relationship to the concerns of the Story and also by setting
the relationship between theme and plot."
};

resource 'DQBG' (kDQSWork, PFM_MIN_PRIO) {
        "Action or Decision describes how the story is driven forward.  The question is: Do Actions precipitate
Decisions or vice versa?  At the end of a story there will be an essential need for an action to be taken and a decision
to be made.  However, one of them will be the roadblock that must be removed first in order to enable the other.  This
causal relationship is felt throughout the story where either actions would never happen on their own, except that
decisions keep forcing them, or decisions would never be made except that actions leave no other choice than to decide."
        "\n\n"
        "Stories contain both action and decision.  Choosing one does not exclude the other.  Rather it merely gives
preference to one over the other.  This preference can be enhanced or nearly balanced out by other dynamic questions you
answer about your story.  It's really a matter of the background against which you want your Main Character to operate.
The choice of background does not have to reflect the nature of the Main Character.  In fact, some very interesting
dramatic potentials can be created when they do not match.  For example, a Main Character of action (called a Do-er)
forced by circumstance to handle a deliberation-type problem would find themselves at a loss for the experience and tools
they need to do the job.  "
        "Similarly, a deliberating Main Character (called a Be-er) would find themselves whipped into a turmoil if
forced to resolve a problem requiring action.  These mixed stories appear everywhere from tragedy to comedy and can add
an extra dimension to an otherwise one sided argument."
        "\n\n"
        "Do Actions precipitate Decisions, or do Decisions precipitate Actions.  Since a story has both, it is really a
question of which came first: chicken or egg?  By selecting one over the other, you instruct Dramatica to establish a
causal order between dynamic movements in the Action line and the Decision line."
};

resource 'DQBG' (kDQSLimit, PFM_MIN_PRIO) {
        "No one can be sure of the future, including Main Characters.  One of the functions of a story is to give the
audience the value of experiences they have not had themselves by living through the Main Character.  As such, the
audience would have to take the story's message on faith to make use of it.  To help with this, the Main Character must
also make their decision based on faith.  They decide and hope for the best, and we learn from their accomplishments or
disappointments.  Yet, even a Main Character would not jump into the void and commit to a course of action or decision
unless forced into it.  To force the Main Character to decide, the story provides all the necessary information to make
an educated guess while progressively closing in on the Main Character until they have no alternative but to choose."
        "\n\nThis closing in can be accomplished in either of two ways.  Either they run out of places to look for the
solution or they run out of time to work one out.  Running out of options is accomplished by an Optionlock; a deadline is
accomplished by a timelock.  Both of these means of limiting the story and forcing the Main Character to decide are felt
from early on in the story and get stronger until the moment of truth.  Optionlocks need not be claustrophobic so much as
they only provide limited pieces with which to solve the problem.  Timelocks need not be hurried so much as limiting the
interval during which something can happen."
        "\n\n"
        "Choosing a timelock or an optionlock has a tremendous impact on the nature of the tension the audience will
feel as the story progresses toward its climax.  A timelock tends to take a single point of view and slowly fragment it
until many things are going on at once.  An optionlock tends to take many pieces of the puzzle and bring them all
together at the end.  So a timelock raises tension by dividing attention, and an optionlock raises tension by focusing
it.  Timelocks increase tension by bringing a single thing closer to being an immediate problem, optionlocks increase
tension by building a single thing that becomes a functioning problem."
        "\n\nOne cannot look just to the climax to determine if a Timelock or Optionlock is working.  Indeed, both Time
and Option locks work from the beginning of the story.  A better way to gauge which is at work is to look at the nature
of the obstacles thrown in the path of the Protagonist or Main Character.  If the obstacles are primarily delays, a
timelock is in effect; if the obstacles are caused by missing essential parts, an optionlock is in effect."
        "\n\nAn author may feel more comfortable building tension by delays or building tension by missing pieces.
Choose the kind of lock most meaningful for you."
        "\n\n"
        "A dramatic structure has both spatial and temporal frameworks adjusting themselves in arrangement or sequence
appropriate to the author's message during the course of the story.. Consistently throughout the story either a change in
arrangement will force a change in sequence or a change in sequence will force a change in arrangement of dramatic
potentials.  Which one causes the other is controlled by your choice of Timelock or Optionlock."
};

resource 'DQBG' (kDQSApproach, PFM_MIN_PRIO) {
        "By temperament, Main Characters (like each of us) have a preferential method of approaching problems.  Some
would rather adapt their environment to themselves, others would rather adapt themselves to their environment.  There is
nothing intrinsically right or wrong with either approach, yet it does affect how one will respond to problems.  Choosing
\"Do-er\" or \"Be-er\" does not prevent a Main Character from using either approach, but merely defines the way they are
likely to first approach a problem, using the other method only if the first one fails."
        "\n\n"
        "Do-er and Be-er should not be confused with active and passive.  If a Do-er is seen as active physically, a Be-
er should be seen as active mentally.  While the Do-er jumps in an tackles the problem by physical maneuverings, the Be-
er jumps in and tackles the problem with mental deliberations.  The point is not which one is more motivated to hold
their ground but how they try to hold it.   A do-er would build a business by the sweat of their brow, a be-er would
build a business by attention to the needs of their clients.  Obviously both approaches are important, but Main
Characters, just like the real people they represent, will have a preference.  Having a preference does not mean being
less able in the other area.  "
        "A martial artist might choose to avoid conflict first as a be-er character, yet be quite capable of beating the
tar out of an opponent if avoiding conflict proved impossible.  Similarly, a school teacher might stress exercises and
homework as a do-er character, yet open her heart to a student who needs moral support."
        "\n\nWhen creating your Main Character, you may want someone who acts first and asks questions later, or you may
prefer someone who avoids conflict if possible, then lays waste the opponent if they won't compromise.  A do-er deals in
competition, a be-er in collaboration."
        "\n\n"
        "The Main Character's affect on the story is both one of rearranging the dramatic potentials of the story, and
also one of reordering the sequence of dramatic events.  By choosing Do-er or Be-er you instruct Dramatica to establish
one method as the Main Characters intent and the other as the result of her efforts."
};

resource 'DQBG' (kDQSSex, PFM_MIN_PRIO) {
        "Much of what we are as individuals is learned behavior.  Yet, the basic operating system of the mind is cast
biologically before birth.  Talents, intellectual capacity, instincts - all of these are not learned, but inherited.
Among these traits are those specific to females and others specific to males.  To be sure, we can go a long way toward
balancing out those traits, yet that does not eliminate them nor diminish their impact.  In dealing with the psychology
of a Main Character, it is essential to understand upon which foundation their experience rests."
        "\n\n"
        "A choice of male or female determines the manner in which the Main Character evaluates the problem, not the
conclusions they come to.  Typically, the choice is as simple as deciding if you want to tell a story about a man or a
woman.  But there is another consideration that is being employed with growing frequency in modern stories: putting the
psyche of one sex into the skin of another.  This does not refer only to the \"sex change\" comedies, but tq many action
stories with female Main Characters (e.g. Aliens) and many decision stories with male Main Characters (Prince of Tides)."
        "\n\nFemale or male does not in and of itself determine do-er or be-er nor action or decision.  Rather, female
or male describes an intrinsic perception of the meaning of life, a perception underlying the actual traits of the
character.  When an author writes a part for a man, they would intuitively create a male psyche for that character.  Yet,
by simply changing the name of the character from Joe to Mary and shifting the appropriate gender terms, the character
would ostensibly become a woman.  But that woman would not seem like a woman  Even if all the specific masculine dialog
were changed, even if all the culturally dictated manifestations were altered,  the underlying psyche of the character
would have a male bias, rather than a female bias."
```

```
        "\n\nSometimes stereotypes are propagated by what an audience expects to see, which filters the message and
dilutes the truth.  By placing a female psyche in a male character or a male psyche in a female character, preconceptions
no longer prevent the message from being heard.  The word of warning is that this technique can make a Main Character
seem \"odd\" in some hard to define way to your audience.  So although the message may fare better, empathy between your
audience and your Main Character may not."
        "\n\n"
        "All minds evaluate in terms of arrangement and in terms of sequence.  By selecting female or male, you instruct
Dramatica to order the arrangement and sequence of your Main Character's evaluations in an appropriate relationship."
};

resource 'DQBG' (kDQSSTDomains, PFM_MIN_PRIO) {
        "An author cannot successfully make an argument promoting a solution until she has identified the problem.  In
stories, problems can be identified as falling into four broad categories: Situations, Activities, States of Mind, and
Manners of Thinking.   These categories are named by the four Domains, Universe (a situation), Physics (an activity),
Mind (a state of mind), and Psychology (a manner of thinking).  «B+»Universe«B-» represents an External State,
«B+»Physics«B-» an External Process.  «B+»Mind«B-» is an Internal State and «B+»Psychology«B-» an Internal Process.
Since they are related, all four of these Domains will figure in every story as the problem works its influence into all
areas of consideration.  "
        "However, only one Domain will ultimately prove to be both the source of the problem's roots and therefore the
place it must ultimately be solved."
        "\n\n"
        "By choosing the Domain, the author sets the background against which the story will be told.  Therefore, its
influence is gently felt throughout the story.  A Universe story deals with an unacceptable situation -  one in which the
external environment is seen as problematic.  This could be a job situation with poor working conditions, being trapped
in a sunken ship, waking up as someone else,  living next to an orphanage that keeps you awake at night with its
screaming waifs or any other intolerable state of affairs.  A Physics story employs an activity that needs to arrive at a
solution.   This might be the effort to steal the crown Jewels, win the love of your heart's desire, make the Olympic
team, "
        "or raise the money to buy the orphanage and evict all the screaming waifs.  Note that if the existence of the
orphanage is the focus of the story, it is a Universe (situation) Domain.  However, if the effort to buy it is the focus,
it is a Physics (activity) Domain.  In a like manner, the Mind Domain reflects a state of mind and the Psychology Domain
describes a mental activity (or manner of thinking).  Mind Domain stories might be about prejudice, a lack of self-worth
(if it is a fixed view), or a refusal to see the value of someone's desires.  "
        "Psychology Domain supports stories where one takes too many risks, is egocentric, or makes light of serious
situations.\n\nAs a final note, it is important to keep in mind that stories are often not about a problem that exists
but a desire to be fulfilled.  Stories of this nature can create a much more positive feel as exemplified in a Universe
story in which an heiress must spend a million dollars in 24 hours to inherit 30 million more, a Physics story where a
mountaineer hopes to be the first to scale a mountain on Mars, "
        "a Mind story of unconditional love, or a Psychology story about overcoming a dependence on sedatives."
        "\n\n"
        "The choice of Domain narrows the playing field of a story.  Without actually putting up walls, choosing a
Domain shifts the focus of audience attention by establishing the center around which broad scale dynamics will revolve.
The Dramatica engine is calibrated to this center."
};

resource 'DQBG' (kDQSSTConcerns, PFM_MIN_PRIO) {
        "Problems can manifest themselves in several ways.  Therefore, simply defining the nature of a problem does not
necessarily predict its effect.  For example, if the problem is not enough money to pay the rent, it might motivate one
person to take to drink but another to take a second job.  The effects of a problem are not necessarily bad things, but
simply things that would not have happened quite that way without the existence of the problem.  So it is with Concerns.
The choice of Concern determines the principal area affected by the story's problem and  serves as a broad indicator of
what the story is about."
        "\n\n"
        "The Concern of a story tends to revolve around a definable area of activity or exploration.  This central hub
may be internal such as Memory or Conceiving (coming up with an idea).  Or, it may be external such as Obtaining or
Progress.    When choosing a Concern it is often useful to ask, \"Which of these items is what I want the characters in
my story to examine?\"  Keep in mind that the Concern only describes WHAT is being looked at.  HOW to look at it is
determined by choosing the Range."
        "\n\n"
        "The choice of Concern sets limits on how much dramatic ground the Theme can potentially encompass and therefore
includes some kinds of considerations and excludes others."
};

resource 'DQBG' (kDQSSTRanges, PFM_MIN_PRIO) {
        "In stories, it is not only important what you wish the audience to look at but also in what light you want them
to see it.  The point of view from which the audience evaluates the meaning of the story is crucial to supporting the
conclusion to a given argument.  Range helps select a filter through which the author can control the shading of the
events that unfold.  In a sense, Range provides the audience with a yardstick and tells them, \"measure what you see to
this scale.\""
        "\n\n"
        "For any given issue there can be many points of view.  To make a successful argument an author must address
them all, yet select one as the standard perspective.  If an author wishes to explore a concept rather than argue it, she
must still touch all perspectives and select one as the view from which all the others are measured.  If this yardstick
is not provided, the audience is free to judge anything from any point of view and will simply adopt the one they are
familiar with out of habit.  "
        "As a result, they will gain no new understanding and the story will have no purpose other than to reiterate
what the audience already knew.  Conversely, if an author wishes to make a point or deliver a message or even document
the similarities and differences between dramatic incidents, then the events of the story must be measured against
something.  Choosing the Range tells an audience by what standard the author intends them to evaluate what they
experience in the story."
        "\n\n"
        "By placing the story's problem in context, the choice of Range determines the thematic progression that
supports that desired point of view on the events in the story."
};

resource 'DQBG' (kDQSSTProblem, PFM_MIN_PRIO) {
        "When everything in a potential story is in harmony, there is no conflict, no message, no progression.  It is
like a deck of cards sitting solidly on a table.  However, if we use that deck to build a house of cards, we have created
potential.  No matter how well we construct it, gravity is always waiting to pull it down beginning at the first weak
point that occurs.  The Dramatica Engine is like the deck of cards.  When we answer the first eight Essential Questions,
we build a card house of dramatics.  Still, it is balanced, although potential exists.  The choice of Domain, Concern and
Range establish weaknesses in the structure.  "
        "The choice of Problem picks the card that starts to buckle threatening to bring the whole house down."
        "\n\n"
        "Problems are at the heart of a story's troubles.  Sometimes a problem is shown as the central cause of a number
of troubles.  Other times problems are shown as the imbalance that triggers a domino effect.  If a number of seemingly
unrelated items all go sour, the common connection will turn out to be the problem.  If a chain of events results in
disaster, the problem can be seen as the force that started it all.  When telling a story, an author has a choice of
focusing on "
        "the problem or its effects.  In the first case, where the problem is at the center of troubles, the
storytelling might begin with the problem and then show how its ripples impact everything they touch as they grow around
it.  Conversely, the storytelling might first explore the seemingly unrelated troubles, slowly spiraling in on the
source, which is only discovered at the end.  In a more linear story, an author might begin with the problem and follow
its impact step by step "
        "to its ultimate effect.  Or, working backwards, the author might begin at the effect, and trace its roots back
until the original problem is identified."
        "\n\n"
        "Once the story's problem is chosen, the Dramatica Engine arranges all the other dramatic choices the author has
made around the problem so the story's dynamics are both dependent upon it, and derivative of it."
};


resource 'DQBG' (kDQSSTStipulation, PFM_MIN_PRIO) {
```

```
        ""
};
resource 'DQBG' (kDQSSTSolution, PFM_MIN_PRIO) {
        ""
};
resource 'DQBG' (kDQSSTFocus, PFM_MIN_PRIO) {
        ""
};
resource 'DQBG' (kDQSSTDirection, PFM_MIN_PRIO) {
        ""
};
resource 'DQBG' (kDQSSTUnRng, PFM_MIN_PRIO) {
        ""
};
resource 'DQBG' (kDQSSTCrFl, PFM_MIN_PRIO) {
        ""
};
resource 'DQBG' (kDQSSTGoal, PFM_MIN_PRIO) {
        "«B+»«U+»General«U-»:  «B-»"
        "Some stories have a single item everyone in the story is trying to achieve, such as obtaining a priceless diamond.  Other stories have the characters all seeking different goals, but of the same type, such as becoming content in their various intimate relationships.  In the first example, the Dramatica Goal would be Obtaining.  In the second example, the Dramatica Goal would be Becoming.  In both cases, everyone is concerned with the same Purpose to which they aspire, "
        "even though they are all after the same diamond but are involved in different relationships.  This allows an author to explore the different approaches that can be taken in the effort to arrive at the same purpose and argue the point that some are appropriate and others are not."
        "\n\n"
        "«B+»«U+»Storytelling«U-»:  «B-»"
        "The Choice of Goal picks a focal point in the plot around which the order and nature of events must revolve.  The Dramatica engine applies the story's dynamics to this focal point in order to determine an appropriate Consequence should the Goal fail to be achieved, "
        "appropriate Requirements necessary to achieve the Goal and a number of other related dramatic Appreciations."
};
resource 'DQBG' (kDQSSTRequirement, PFM_MIN_PRIO) {
        ""
};


resource 'DQBG' (kDQSMCDomains, PFM_MIN_PRIO) {
        "«B+»«U+»General«U-»:  «B-»"
        "Without drive, there is no force to propel the Main Character through the story.  Just putting the character in a tough or unpleasant situation is not enough unless they have the motivation to do something about it.  This internal drive is one of the focal points of a story's dynamics, and is therefore an important consideration.  Choosing the Main Character Domain selects the overall nature of what is driving the Main Character.  In Dramatica, there are four Domains in the Storyform: Universe, MInd, Physics and Psychology.  A Universe Domain Main Character is one with a steady body state.  We see this kind of character "
        "in the Elephant Man, My Left Foot, Ghost, or Dumbo.  In the Mind Domain, the Main Character has a fixed attitude such as a prejudice or a refusal to accept something as in Unforgiven, Aladdin, and A Christmas Carol.  A Physics Domain Main Character is physically active, such as in Rambo (First Blood),  Flashdance, or Robin Hood.  The Psychology Main Character struggles with a manner of thinking, as seen in Prince of Tides, The World According to Garp, and Howard's End."
        "\n\n"
        "«B+»«U+»Storytelling«U-»:  «B-»"
        "Because the Main Character stands at the root of both the Objective and Subjective problems, choosing the Main Character's Domain has a huge impact on the relationship between the two problems, and therefore on the feel of the story as a whole.  Of the four Domains, Universe and Physics describe External problems whereas Mind and Psychology illustrate Internal problems.  As a result, the Objective Story Domain and the Main Character Domain might be in the same general area, or on opposite sides of the tracks.  When both Domains are either Internal or External we say they are a \"Companion Pair\".  Stories with External Companion Domains tend to focus on action since the "
        "dissonance (conflict) created in the story is between an external state (Universe) and an external process (Physics).  Similarly, stories with Internal Companion Domains tend to focus on deliberation since the dissonance is between an Internal state (Mind) and an Internal Process (Psychology).  In contrast, stories where one Domain is External and the other Internal strike more of a balance between action and deliberation.  As a result of this division, the progress of the story depends on the shifting balance between Internal and External forces.  This is why Internal/External pairings of Objective Story Domain and Main Character Domain are called \"Dependent Pairs\".  "
        "In Companion Pair stories, the Main Character is dealing with the issues on their own turf.  In Dependent Pair stories, the Main Character is something of a fish out of water, trying to deal with difficulties they are not really equipped to handle, such as Romancing the Stone and Three Men and a Baby.  When choosing the Main Character Domain, keep in mind your choice for Objective Story Domain in order to create the feel you want in your story's dissonance."
        "\n\n"
        "«B+»«U+»Impact«U-»:  «B-»"
        "The choice of Main Character Domain not only determines something about the Main Character's personal drive but in conjunction with the choice of Objective Story Domain and other Essential Questions creates patterns for the dissonance and conflict that will occur as the story progresses."
};
resource 'DQBG' (kDQSMCConcerns, PFM_MIN_PRIO) {
        ""
};
resource 'DQBG' (kDQSMCRanges, PFM_MIN_PRIO) {
        "«B+»«U+»General«U-»:  «B-»"
        "Main Characters are not only concerned with problem solving or dealing with difficulties, but also have a point of view toward the world around them.  This point of view is described by their Thematic Focus.  Unlike the Objective Story Thematic Focus, the Main Character is not judging from the perspective of Universal Truth, but as a discovery of Personal Truth."
        "\n\n"
        "«B+»«U+»Storytelling«U-»:  «B-»"
        "In order to make an Objective Thematic statement, the case for an inequity must be made consistently.  However, this tends to create a heavy-handed message that is likely to appear one-sided and obvious.  Fortunately, an opportunity exists to temper this message through the Main Character's Thematic Focus.  In the midst of a battlefield our Main Character notices a single flower growing up through the rubble.  At the frenetic High School dance, a girl sits all alone, unnoticed.  How can she be unnoticed if we noticed her?  Because \"objectively\" no one sees her - they are \"all\" concerned with dancing.  But the Main Character looks across the room and observes the discrepancy.  "
        "In both these cases, the Objective Theme is the initial condition which is then \"shaded\" in light of the Main Character's Theme.  Conversely, the Main Character might be walking down the street, self-consciously trying to hide a zit on the tip of their nose, when they turn a corner just in time to see the \"Burn Victim Support Group\" marching in a parade.  In this case, the Main Character's Theme is the initial condition, which is modulated by the Objective Theme.  Because these kinds of contrasts and/or reinforcements offer such fertile material for storytelling, authors often employ these techniques in a random fashion, hoping to move the audience.  "
        "Unfortunately, without a pattern to these counterpoints, after a while they begin to bog down a story since they do not truly advance it.  By choosing the Main Character's Thematic Focus, one is able to select a central topic that serves to unify these Personal Truths into a bonded statement."
        "\n\n"
        "«B+»«U+»Impact«U-»:  «B-»"
        "The choice of Main Character's Thematic Focus selects the central hub around which the Subjective Thematic progression will revolve.  Other dynamics determine the direction and meaning of this progression, creating a map of Thematic Sequences that allow an author to make personal commentaries that support the overall message of a story."
};
resource 'DQBG' (kDQSMCProblem, PFM_MIN_PRIO) {
        "«B+»«U+»General«U-»:  «B-»"
        "Without motivation - without a problem - there is no inequity that spurs the Main Character to better their lot.  Sometimes it may seem that problems exist in our environment.  Other times, we may perceive a problem with ourselves: the way we act or feel.  In truth, problems really exist between ourselves and our environment as an inequity
```

```
between the two.  As example, we may hang on to our desires, even though it causes trouble around us.  Conversely, a
whole situation might be faltering because of one stubborn individual.  These are really two ways of looking at the same
inequity.  "
        "One casts the problem in the environment, the other places it in the person.  So when we look at the Main
Character's Problem, we are really looking at the inequity of the story at large as it is reflected in the Main
Character."
        "\n\n"
        "«B+»«U+»Storytelling«U-»:  «B-»"
        "The term  Main Character's \"problem\" is something of a misnomer.  Even though the problem is what is
\"wrong\" with the Main Character according to the outside world, if the Main Character is actually correct in their
motives and the world at large is mistaken, then this \"problem\" is what drives the Main Character to set things right.
Of course, they might fail in the attempt, but their heart is in the right place.  On the other hand, the Main Character
might be mistaken, and their problem is just that: the source of all the story's difficulties.  So, there are really two
ways to look at the Main Character's problem.  Which is right for your story?  "
        "That is determined by your answers to two of the 12 Essential Questions: Success/Failure and Good/Bad.  For the
Success/Good and Failure/Bad combinations, the Main Character was on the right track, according to the author.  In the
first case, it paid off and that was good.  In the second it didn't pay off and that was bad.  The value judgment of Good
/Bad tempers Success or Failure and in these two cases tells us that the Main Character's Problem was really best seen as
the source of their drive to set things right.  However, in the Success/Bad and Failure/Good stories, the author's
message is that the Main Character was "
        "actually the cause of everyone's problems and therefore, what drove them was really the source of the inequity.
In this case, the Main Character Problem really IS a problem, and needed to be solved.  Whether it was or not is
determined by Success/Failure.  These examples illustrate how the meaning of Main Character Problem changes under
different dynamic conditions.  Therefore, when answering this question, it helps to know in what dynamic context you want
your Main Character to be operating."
        "\n\n"
        "«B+»«U+»Impact«U-»:  «B-»"
        "The choice of Main Character Problem selects the single point around which the web of the entire Subjective
Story is woven."
};
resource 'DQBG' (kDQSMCStipulation, PFM_MIN_PRIO) {
        ""
};
resource 'DQBG' (kDQSMCSolution, PFM_MIN_PRIO) {
        "«B+»«U+»General«U-»:  «B-»"
        "For every Motivation there is a complementary element of Satisfaction that restores a sense of equity and
contentment.  The Main Character's Solution is this element.  If the Main Character were to possess this Solution, their
Motivation would wane and their drive disperse.  In fact, this is what a Main Character hopes to achieve by the end of
the story: a satisfaction that complements their original Motivation, solving their problem and allowing them to hang up
their guns and go home."
        "\n\n"
        "«B+»«U+»Storytelling«U-»:  «B-»"
        "A Main Character's Problem may be the real source of a story's difficulties or may actually be just the source
of the Main Character's drive to set things right.   As a result, its complementary Solution might be just what the
doctor ordered or an Achilles' heel that would satisfy the Main Character into letting the real problem lie.  Do you see
your Main Character as having the problem or solving the problem?  If they have the problem, then arriving at the Main
Character's solution is what the story is all about.  But if they are solving the problem, the Main Character's solution
is the one thing they must avoid at all costs."
        "\n\n"
        "«B+»«U+»Impact«U-»:  «B-»"
        "The choice of Main Character's Solution establishes a second \"pole\" in the dynamics that drive the Main
Character, creating dramatic flow between the need that drives them and the quality that will quell that need."
};
resource 'DQBG' (kDQSMCFocus, PFM_MIN_PRIO) {
        "«B+»«U+»General«U-»:  «B-»"
        "Problems are the source of a story's difficulties, but the difficulties themselves are where the attention is
focused.  In stories where the Main Character is really the culprit because of some character flaw, it takes them the
whole story to stop battling all the effects of their destructiveness and realize all their troubles have a common
thread.  In stories where the Main Character is on the right track, their attention is distracted by all the immediate
obstacles created by the problem.  Only at the end climax have they cleared their way through the mine field enough to
address the central issue.  "
        "In both of these examples, the story's difficulties are where the Main Character's attention is drawn, which is
described as the Main Character's Focus."
        "\n\n"
        "«B+»«U+»Storytelling«U-»:  «B-»"
        "Every disease has its symptoms.  Story problems operate the same way.  Depending upon the nature of the disease
and what particular strain is in question, the symptoms may vary widely.  In fact, symptoms may vary between individuals.
When we choose Main Character Domain, we are saying something about the individual.  When we choose Main Character Focus,
we are directly selecting the symptoms.  The kinds of things the Main Character talks about will center on their Focus.
This topic will be at the forefront of their thoughts and actions.  If left to their own devices, their conversation will
always drift back toward this Focus, as it is their area of greatest attention.  "
        "Quite simply, it is where the Main Character believes the problem to be.  Now, in a Main Character who is
actually the real problem themselves, they will not see it, though most everyone else may.  How can they be so blind?
Because they are focusing all of their attention elsewhere.  They have a completely developed alternate explanation of
what is behind the story's difficulties and feel that entertaining an alternative is a temptation to veer from the
correct path.  They aren't stupid, just pre-occupied.  In the case of a Main Character who is NOT the problem, but is
trying to solve the problem, then the focus really IS where they ought to be "
        "looking, and veering from that course WOULD be a temptation that could lead to disaster.  The key to having an
audience accept a misguided Main Character's apparent refusal to see themselves as the cause of the troubles or a Main
Character on the right track who never questions their own motivations, is to give them something else to Focus on."
        "\n\n"
        "«B+»«U+»Impact«U-»:  «B-»"
        "Selecting Main Character's Focus determines the way in which the difficulties in a story will affect them."
};
resource 'DQBG' (kDQSMCDirection, PFM_MIN_PRIO) {
        "«B+»«U+»General«U-»:  «B-»"
        "Getting to the heart of the story's problem is much like negotiating a maze.  The problem generates a myriad of
difficulties that obscure its true nature and hinder any attempt to deal with it directly.  The Main Character's
Direction is something of a battle plan.  It describes the tack by which the Main Character hopes to thwart the
difficulties and arrive at the seat of the problem itself."
        "\n\n"
        "«B+»«U+»Storytelling«U-»:  «B-»"
        "When a Main Character is on the right track, they are headed in the right Direction.  But when a Main Character
is really the cause of a story's troubles, they are headed in the wrong Direction.  The things that they do and the
things that they consider are responses that all grow out of where they believe the real problem to be.  They look at
their troubles, then determine what they think is behind them.  This becomes their Focus.  Accepting this Focus as a
given, the best Direction of their efforts becomes clear.  So, when they are correct in identifying the problem, they
hack away until it appears before them.  But when they are incorrect, "
        "they may beat all round the issue and miss it entirely.  As Focus suggests what a Main Character is likely to
fixate on, so Direction determines how they are likely to respond."
        "\n\n"
        "«B+»«U+»Impact«U-»:  «B-»"
        "Choosing the Main Character's Direction sets the course for the kind of effort they will make in their quest
for a solution to their troubles."
};
resource 'DQBG' (kDQSMCUnRng, PFM_MIN_PRIO) {
        "«B+»«U+»General«U-»:  «B-»"
        "Every Main Character has a special strength, even if they are not aware of it themselves.  Without such a
strength, there would be no compelling reason why the story revolved around this particular character as Main instead of
any other.  With a Unique Ability, the Main Character becomes an essential participant in the story, as well as holding
the ultimate key to resolving the story's difficulties."
        "\n\n"
        "«B+»«U+»Storytelling«U-»:  «B-»"
```

```
        "In order to make an Objective Thematic statement, the case for an inequity must be made consistently.  However, this tends to create a heavy-handed message that is likely to appear one-sided and obvious.  Fortunately, an opportunity exists to temper this message through the Main Character's Thematic Focus.  In the midst of a battlefield our Main Character notices a single flower growing up through the rubble.  At the frenetic High School dance, a girl sits all alone, unnoticed.  How can she be unnoticed if we noticed her?  Because \"objectively\" no one sees her - they are \"all\" concerned with dancing.  But the Main Character looks across the room and observes the discrepancy.  "
        "In both these cases, the Objective Theme is the initial condition which is then \"shaded\" in light of the Main Character's Theme.  Conversely, the Main Character might be walking down the street, self-consciously trying to hide a zit on the tip of their nose, when they turn a corner just in time to see the \"Burn Victim Support Group\" marching in a parade.  In this case, the Main Character's Theme is the initial condition, which is modulated by the Objective Theme.  Because these kinds of contrasts and/or reinforcements offer such fertile material for storytelling, authors often employ these techniques in a random fashion, hoping to move the audience.  "
        "Unfortunately, without a pattern to these counterpoints, after a while they begin to bog down a story since they do not truly advance it.  By choosing the Main Character's Thematic Focus, one is able to select a central topic that serves to unify these Personal Truths into a bonded statement. "
        "\n\n"
        "«B+»«U+»Impact«U-»:  «B-»"
        "Main Character Unique Ability is related to both the story's Problem and the Thematic Focus.  Once selected, it establishes a Range in which certain story dynamics may operate."
};
resource 'DQBG' (kDQSMCCrFl, PFM_MIN_PRIO) {
        "«B+»«U+»General«U-»:  «B-»"
        "Like each of us, Main Characters have attributes that are assets and those that are detractors in our efforts to achieve our purposes.  Part of resolving our difficulties is to learn to hold our negative attributes in check when they would be harmful.  For Main Characters, a story concentrates on one essential Unique Ability that has the potential to resolve the story's difficulties and the Critical Flaw that prevents its effective employment."
        "\n\n"
        "«B+»«U+»Storytelling«U-»:  «B-»"
        "A Main Character's Critical Flaw might prevent them from using their Unique Ability or might come into play afterward, undercutting the effectiveness they had just achieved.    This has a relationship to the Essential Question that describes the Main Character as needing to grow either by Starting something they haven't been doing or Stopping something they have.  If the Critical Flaw prevents the employment of their Unique Ability, they must learn to Start employing their Unique Ability.  If the Critical Flaw undoes the work of their Unique Ability, then they must Stop doing that!  Either way, the Main Character must learn to overcome their Critical Flaw "
        "if they are to ultimately achieve their purpose.  We are all familiar with stories where we find ourselves saying, \"If you'd just take that step everything would be okay.\"  This is a Start story in conjunction with a Critical Flaw.  The Main Character is inhibited from making the efforts we feel they should.  And yet, as frustrating as this is, we accept it because the Critical Flaw has been established as a roadblock they cannot pass and must first grow enough to remove it.  When a Main Character lacks a Critical Flaw there is no reason provided as to why they cannot act or decide and therefore they appear ignorant or stupid, leading us to proclaim, "
        "\"Why didn't they just.......?  Its so obvious!\"  In a Stop story, the Main Character's Critical Flaw scuttles their own efforts.  In these stories we find ourselves thinking, \"Okay, everything is going to work out..... just don't mess it up....\"   That is where the Main Character gets the urge to sneeze and blows the window display over or stops to tie their shoe and trips someone into the wedding cake.  Without a consistent Critical Flaw, all these mishaps would appear coincidental, rather than a direct result of the Main Character's need for growth.  Each act, a Main Character is faced with an opportunity to resolve a story's difficulties in a single master stroke.  "
        "It is the Critical Flaw caused by their own need for growth that inhibits or undercuts that effort until they grow enough to address the source of their drive in the Moment of Truth at the climax."
        "\n\n"
        "«B+»«U+»Impact«U-»:  «B-»"
        "Choosing a Critical Flaw establishes detractors from the Main Character's efforts that are used to illustrate their personal growth."
};
resource 'DQBG' (kDQSMCGoal, PFM_MIN_PRIO) {
        "«B+»«U+»General«U-»:  «B-»"
        "Each obstacle that is overcome on the way toward the Goal illustrates another aspect of the problem and the \"proper\" or \"improper\" means of solving it.  However, the Costs incurred in the endeavor would quickly deplete the characters' resolve to the point that the Goal was no longer worth the effort.  To motivate the characters toward the goal, the Costs must be balanced by Dividends that either undo the negative effects of the Costs or have benefits elsewhere that make the price acceptable."
        "\n\n"
        "«B+»«U+»Storytelling«U-»:  «B-»"
        "Renegades trying to escape to the Badlands may come across a farmer's daughter to rape.  Joan of Arc, on her way to be burned at the stake may see the clouds part and rays of sunshine beacon to her.  Depending upon the characters and their Goal, certain items, events or experiences will occur that make the journey more worthwhile.  If it were not for these Dividends the arduous endeavor would become too Costly to warrant continuing.  Characters do not simply add up the Costs, but they average them with the Dividends to determine the overall propriety in continuing on their quest.  Dividends do not need to be tangible, "
        "but may be personal fulfillments such as visiting a foreign city, helping a child to read or the opportunity to get the personal dossiers of co-employees one is romantically interested in.  If we look at the effort to achieve the goal as going to work to get a paycheck, then the Costs of having to live by the rules under someone else's authority might be balanced out by the personal friendships one has established.  Then it comes back to a choice between staying on and achieving the Goal of a paycheck or quitting and facing the Consequence of a foreclosure.  That is the purpose of Dividends: "
        "to balance out the Costs so that it all comes back to a decision regarding the Goal vs. the Consequence."
        "\n\n"
        "«B+»«U+»Impact«U-»:  «B-»"
        "Choosing the Dividend determines the category of benefit that the characters will accrue on the way toward the Goal.  Dividend helps to select comparable Costs and limits the choices of appropriate Goal and Consequence."
};
resource 'DQBG' (kDQSMCRequirement, PFM_MIN_PRIO) {
        ""
};


resource 'DQBG' (kDQSOCDomains, PFM_MIN_PRIO) {
        ""
};
resource 'DQBG' (kDQSOCConcerns, PFM_MIN_PRIO) {
        ""
};
resource 'DQBG' (kDQSOCRanges, PFM_MIN_PRIO) {
        ""
};
resource 'DQBG' (kDQSOCProblem, PFM_MIN_PRIO) {
        ""
};
resource 'DQBG' (kDQSOCStipulation, PFM_MIN_PRIO) {
        ""
};
resource 'DQBG' (kDQSOCSolution, PFM_MIN_PRIO) {
        ""
};
resource 'DQBG' (kDQSOCFocus, PFM_MIN_PRIO) {
        ""
};
resource 'DQBG' (kDQSOCDirection, PFM_MIN_PRIO) {
        ""
};
resource 'DQBG' (kDQSOCUnRng, PFM_MIN_PRIO) {
        ""
};
resource 'DQBG' (kDQSOCCrFl, PFM_MIN_PRIO) {
```

```
        ""
);
resource 'DQBG' (kDQSOCGoal, PFM_MIN_PRIO) (
        "«B+»«U+»General«U-»:  «B-»"
        "There's no such thing as a free lunch.  There's also no such thing as achieving a Goal without paying a price.
Every Goal is separated from instant achievement by a number of obstacles.  If it were not so, a story would end as soon
as it began.  For each obstacle that must be overcome, effort must be expended.  This results in a net loss to the
character, who hopes to more than justify the expense by achieving the Goal.  The kind of Cost incurred in a given story
depends upon the nature of the Goal and the Requirements for its achievement."
        "\n\n"
        "«B+»«U+»Storytelling«U-»:  «B-»"
        "Cost describes the area in which negative impact is felt as a result of the effort to overcome obstacles on the
way to the Goal.  This is not unlike a Role Playing game where the Warrior loses \"life points\" or expends \"magic\" as
she does battle with the evil elves.  Fighting demons takes its toll, and so does trying to get an \"A\" in math.
Whatever the Goal, there are certain steps that must be taken or obstacles that must be surmounted.  Each effort made
will deplete the reserves of the character or negatively impact the character "
        "in obscure ways that make them question the worth of continuing on the journey.  This is as true of the effort
to save a marriage as it is of the struggle to blow up the Orange Claw's munitions dump.  The toll adds up, the cost
begins to come close to outweighing the benefits of achieving the Goal.  In fact, it may even appear prudent to cut one's
losses and accept the Consequences, rather than continue to throw good effort after bad.  This is how the tension builds
that makes a Main Character's leap of faith so powerful.  At the moment of climax, "
        "the Cost balances out the Goal and there is no clear right or wrong of it.  Its just a throw of the dice for
the character as to whether its better to hold on to the end or toss in the towel.  Some stories slowly build the Cost so
that it reaches that balance gradually.  This makes the character feel as if the weight dragging them back is slowing
increasing until they are dead in the water.  Other stories keep the costs low and balance it out right before the climax
with one huge cost that must be paid all at once.  "
        "Again, this is a matter of intensity and completely open to manipulation.  However, the kind of Cost incurred
is dependent upon Goal, Consequence, and Requirements, so that it might fully illustrate the debits against the Story
Mind as it grapples with a particular nature of problem."
        "\n\n"
        "«B+»«U+»Impact«U-»:  «B-»"
        "There is an attrition that will occur in all interactions in a story, even if they are minor events.  A choice
of Cost determines the nature of this drain, and therefore impacts both Plot and Theme as well."
);
resource 'DQBG' (kDQSOCRequirement, PFM_MIN_PRIO) {
        ""
);


resource 'DQBG' (kDQSPLDomains, PFM_MIN_PRIO) {
        ""
);
resource 'DQBG' (kDQSPLConcerns, PFM_MIN_PRIO) {
        ""
);
resource 'DQBG' (kDQSPLRanges, PFM_MIN_PRIO) {
        ""
);
resource 'DQBG' (kDQSPLProblem, PFM_MIN_PRIO) {
        ""
);
resource 'DQBG' (kDQSPLStipulation, PFM_MIN_PRIO) {
        ""
);
resource 'DQBG' (kDQSPLSolution, PFM_MIN_PRIO) {
        ""
);
resource 'DQBG' (kDQSPLFocus, PFM_MIN_PRIO) {
        ""
);
resource 'DQBG' (kDQSPLDirection, PFM_MIN_PRIO) {
        ""
);
resource 'DQBG' (kDQSPLUnRng, PFM_MIN_PRIO) (
        ""
);
resource 'DQBG' (kDQSPLCrFl, PFM_MIN_PRIO) {
        ""
);
resource 'DQBG' (kDQSPLGoal, PFM_MIN_PRIO) {
        "«B+»«U+»General«U-»:  «B-»"
        "Every Silver Lining has a cloud around it.  The Silver Lining is the Goal, the cloud is the Consequence.  There
is no reason to strive for a Goal unless failure to achieve it has negative Consequences.  Sometimes the Consequences are
relatively minor, such as having to do extra chores or just the disappointment of not getting the ice cream.  But, of
course, Consequences can range all the way up to unthinkable horrors.  The Intensity of the Consequence modulates the
importance of the goal, but is completely arbitrary as long as the Consequence is appropriate to the Goal.  Since they
are both parts of the same Silver Lined Cloud, Goal and Consequence are intimately related to each other by story
dynamics (even if the Silver Lining is on the outside and the Cloud is hiding in the middle)."
        "\n\n"
        "«B+»«U+»Storytelling«U-»:  «B-»"
        "Often the Consequence is seen as something bad that will happen if the Goal is not achieved.  However, it is
just as functional to have a negative situation already existing that the characters hope to stop by achieving the Goal.
In fact, if a villain is the Main Character, the Goal may be the negative item and the Consequence positive, as in \"How
The Grinch Stole Christmas\".  Goal, therefore does not have to be good and the Consequence does not have to be bad.
Rather, Consequence is the alternative to what will happen if the Goal is not achieved.  "
        "Goal, therefore is a state of things that does not yet exist.  It is Purpose of the plot.  It is what all the
effort is trying to achieve.  But WHY?  Because of what will happen if it is not achieved: the Consequence.  The wider
the gap between the alternatives, the greater the dramatic tension.  Still, intense dramatic tension is not always to be
desired.  In a story intended to be a playful romp, the discrepancy between Goal and Consequence might be intentionally
kept to a minimum.  This way, although there is not much to gain, "
        "there is also not much to lose and everyone is still friends at the end.  In the opposite extreme, simply
selecting death as a Consequence fails to describe how that relates to whatever the Goal is.  What does that death mean?
Is it a failure to Learn that resulted in death?  A failure to truly Become something?  In respect to Goal, Dramatica is
concerned with the Purpose of the plot.  In respect to Consequence, Dramatica is concerned with how the plot should be
Evaluated.  What does it mean to achieve the Goal?  What does it mean to fail.  "
        "This context is provided by the selection of Consequence."
        "\n\n"
        "«B+»«U+»Impact«U-»:  «B-»"
        "The choice of Consequence helps select the appropriate category of Goal, Requirement, and Forewarning in the
context of a story's dynamics."
);
resource 'DQBG' (kDQSPLRequirement, PFM_MIN_PRIO) {
        ""
);


/***************  STORYTELLING QUESTIONS ***************/

resource 'DQBG' (kDQSResolveST, PFM_MIN_PRIO) {
        "This is for testing the Resolve Background text."
```

```
		"\n\n"
		"This is for testing the Resolve Storytelling text."
		"\n\n"
		"This is for testing the Resolve Dramatica Usage text."
};

resource 'DQBG' (kDQSMCName, PFM_MIN_PRIO) {
		"«B+»«U+»General«U-»:  «B-»"
		"Every story provides the audience with an Objective view OF the struggle to resolve the story's problems and a
Subjective view FROM INSIDE the struggle itself.  The Objective view forms a dispassionate argument, where the audience
observes and analyzes the effects of the characters' different approaches and motivations.  It is this Objective view
that speaks to the intellect.  In contrast, the Subjective view speaks to the heart.  It provides an audience with the
experience of feeling the story as if it were happening to them.  This view is provided through the eyes of the Main
Character.  Sometimes an author will assign the role of Main Character to a Protagonist, which creates the commonly
understood \"hero\".  "
		"However, it is just as appropriate to assign this most personal viewpoint to any other character is a story
instead.  In this manner, the intellect and the heart can take different view of the story's problem and even arrive at
different conclusions.  Bitter-sweet stories, child's-eye views, and stories of self-sacrifice are easily told when the
Main Character stands near the side of the effort to achieve the goal, rather than right in the heart of the fray."
		"\n\n"
		"«B+»«U+»Storytelling«U-»:  «B-»"
		"A Protagonist is an objective archetype.  This means that they play a role in the Objective (dispassionate)
argument of the story and also that they represent a very specific arrangement of characteristics.  Because they contain
all the elements needed to build a fully functional character, archetypal Protagonists are an efficient way to illustrate
the effect of the characteristics they represent.  In fact, there are eight archetypes that represent a total of 64
different elements.  However, archetypes are but one way to illustrate those qualities.  "
		"The individual elements can be swapped between archetypes or spread among several.  Archetypes can be broken up
and reassembled.  Characters can even be built from the ground up assembling the elements in many different
arrangements.\n\nAll this goes on independently of who the Main Character is.  The Main Character does not represent a
function, but rather a point of view.  It is through the Main Character's eyes that the audience experiences what it
would be like if the story's problems happened to them.  In real life we may be at the heart of the effort "
		"to resolve various problems, near the edge, or only peripherally involved in the effort, even though we are
aware of and affected by it.  It is the same with stories.  By selecting any one of the objective characters (archetype
or not) as the Main Character, you can select the angle from which the audience will experience the story at a personal
level.  And, if you really want, you can even make the Main Character the Protagonist!"
		"\n\n"
		"«B+»«U+»Impact«U-»:  «B-»"
		"Choosing a Main Character is perhaps the most important decision in storyforming.  When you determine the angle
from which the audience will experience your story, Dramatica winds up all the dramatic potentials around that axis.  "
		"The Choice of Main Character affects all levels and natures of what will follow.  Still, all we ask here is for
their name.  But before you answer, think about how your decision will effect the direction from which your audience will
experience your story."
};

resource 'DQBG' (kDQSOCName, PFM_MIN_PRIO) {
		"«B+»«U+»General«U-»:  «B-»"
		"For every notion there is a Pro and a Con.  For every plan there are those for it and against it.  In the
Objective Story these roles are filled by a Protagonist and Antagonist.  In the Subjective Story they are filled by the
Main and Obstacle Characters.  In the Objective Story we watch a Protagonist do battle with an Antagonist as if we were
bystanders observing a fight or an argument.  But in the Subjective Story, we look through the eyes of the Main Character
and see the Obstacle Character in our face.  It is as if we had actually become one of the conflicting parties and were
sizing up the opposition.  Often, an author will elect to make a Protagonist also the Main Character.  "
		"However, this does not have to be the case.  The Main Character can be any of the objective characters, even if
they are not central to the conflict of the story.  This can provide an audience with all the different relationships to
a various problems that we experience in real life.  It also goes a long way to determining who would appear to be the
biggest obstacle to our personal agenda, as the Main Character.  Just as the Objective Story involves disagreements about
the best way to achieve the goal, the Subjective Story involves disagreements about the best way to resolve the Main
Character's personal problems.  Sometimes, the Main Character is right in their approach and must "
		"simply develop the resolve to stick it out against the Obstacle Character's opposing opinions until the end.
Other times, the Main Character is misguided and will only find personal fulfillment if the Obstacle Character can
convince them of the error of their ways.  In either case, the Obstacle Character might be a friend or a foe, as they
themselves may or may not be misguided.  The only sure thing is that whatever approach the Main Character takes, the
Obstacle Character will be blocking it."
		"\n\n"
		"«B+»«U+»Storytelling«U-»:  «B-»"
		"Perhaps the most simple way to populate a story is to create the eight perfectly balanced archetypal
characters.  Two of these characters are the Protagonist and the Antagonist.  The archetypal Protagonist is for the goal,
the archetypal Antagonist is against it.  Next, just assign the role of Main Character to the Protagonist and the role of
Obstacle Character to the Antagonist.  You have now created a story in which the audience sees through the eyes of the
character who is the prime mover in the attempt "
		"to achieve the goal and the prime obstacle in the path to both achieving the goal and resolving their personal
problems is the Obstacle Character/Antagonist.  Now that we've gotten THAT out of our systems, lets see how creative we
can be.  How about a story where the ANTAGONIST is the Main Character and the PROTAGONIST is the Obstacle?  Suddenly we
look through the eyes of the character opposed to the goal and we are trying to stop them from succeeding.  In addition,
this rather forward person is "
		"messing up our effort to arrive at personal fulfillment as well.  Get more creative.  How about a love
triangle, where the Main Character is the Protagonist, the Obstacle Character is their spouse, and the Antagonist is
their boss.  Suddenly we see an Objective Story and s Subjective Story.  In the Objective Story the Protagonist must work
late or risk losing their job.  In the Objective Story their spouse threatens to leave if they don't get more attention.
One plays to the intellect, the other to the heart.  "
		"One blocks the path to satisfaction, the other to fulfillment.  Any objective character can be chosen to carry
an additional banner as the Obstacle Character.  By making your selection as to who that should be, you set up a lot of
the dramatic framework that will determine the kinds of pressure and decisions your Main Character will face."
		"\n\n"
		"«B+»«U+»Impact«U-»:  «B-»"
		"Selecting your Obstacle Character establishes a relationship between the Objective Story and the Subjective
Story that will effect the side of your storyform that will be most exposed to the audience through your storytelling."
};


resource 'DQBG' (kDQSG1Analytical, PFM_MIN_PRIO) {
		"«B+»«U+»General«U-»:  «B-»"
		"An author cannot successfully make an argument promoting a solution until she has identified the problem.  In
stories, problems can be identified as falling into four broad categories: Situations, Activities, States of Mind, and
Manners of Thinking.  "
		"These categories are named by the four Topics, called \"Domains\", Universe (a situation), Physics (an
activity), Mind (a state of mind), and Psychology (a manner of thinking).  "
		"Universe represents an External State, Physics an External Process.  Mind is an Internal State and Psychology
an Internal Process.  "
		"Since they are related, all four of these Domains will figure in every story as the problem works its influence
into all areas of consideration.  "
		"However, only one Domain will ultimately prove to be both the source of the problem's roots and therefore the
place it must ultimately be solved."
		"\n\n"
		"«B+»«U+»Storytelling«U-»:  «B-»"
		"By choosing the Domain, the author sets the background against which the story will be told.  Therefore, its
influence is gently felt throughout the story.  "
		"A Universe story deals with an unacceptable situation -  one in which the external environment is seen as
problematic.  This could be a job situation with poor working conditions, being trapped in a sunken ship, waking up as
someone else, living next to an orphanage that keeps you awake at night with its screaming waifs or any other intolerable
state of affairs.  "
		"A Physics story employs an activity that needs to arrive at a solution.   This might be the effort to steal the
crown Jewels, win the love of your heart's desire, make the Olympic team, "
```

```
        "or raise the money to buy the orphanage and evict all the screaming waifs.  Note that if the existence of the
orphanage is the focus of the story, it is a Universe (situation) Domain.  However, if the effort to buy it is the focus,
it is a Physics (activity) Domain.  In a like manner, the Mind Domain reflects a state of mind and the Psychology Domain
describes a mental activity (or manner of thinking).  "
        "Mind Domain stories might be about prejudice, a lack of self-worth (if it is a fixed view), or a refusal to see
the value of someone's desires.  "
        "Psychology Domain supports stories where one takes too many risks, is egocentric, or makes light of serious
situations.\n\nAs a final note, it is important to keep in mind that stories are often not about a problem that exists
but a desire to be fulfilled.  Stories of this nature can create a much more positive feel as exemplified in a Universe
story in which an heiress must spend a million dollars in 24 hours to inherit 30 million more, a Physics story where a
mountaineer hopes to be the first to scale a mountain on Mars, "
        "a Mind story of unconditional love, or a Psychology story about overcoming a dependence on sedatives."
        "\n\n"
        "«B+»«U+»Impact«U-»:  «B-»"
        "The choice of Domain narrows the playing field of a story.  Without actually putting up walls, choosing a
Domain shifts the focus of audience attention by establishing the center around which broad scale dynamics will revolve.
The Dramatica engine is calibrated to this center."
};


resource 'DQBG' (kDQSG1Passionate, PFM_MIN_PRIO) {
        "«B+»«U+»General«U-»:  «B-»"
        "An author cannot successfully make an argument promoting a solution until she has identified the problem.  In
stories, problems can be identified as falling into four broad categories: Situations, Activities, States of Mind, and
Manners of Thinking.  "
        "These categories are named by the four Topics, called \"Domains\", Universe (a situation), Physics (an
activity), Mind (a state of mind), and Psychology (a manner of thinking).  "
        "Universe represents an External State, Physics an External Process.  Mind is an Internal State and Psychology
an Internal Process.  "
        "Since they are related, all four of these Domains will figure in every story as the problem works its influence
into all areas of consideration.  "
        "However, only one Domain will ultimately prove to be both the source of the problem's roots and therefore the
place it must ultimately be solved."
        "\n\n"
        "«B+»«U+»Storytelling«U-»:  «B-»"
        "By choosing the Domain, the author sets the background against which the story will be told.  Therefore, its
influence is gently felt throughout the story.  "
        "A Universe story deals with an unacceptable situation -  one in which the external environment is seen as
problematic.  This could be a job situation with poor working conditions, being trapped in a sunken ship, waking up as
someone else, living next to an orphanage that keeps you awake at night with its screaming waifs or any other intolerable
state of affairs.  "
        "A Physics story employs an activity that needs to arrive at a solution.   This might be the effort to steal the
crown Jewels, win the love of your heart's desire, make the Olympic team, "
        "or raise the money to buy the orphanage and evict all the screaming waifs.  Note that if the existence of the
orphanage is the focus of the story, it is a Universe (situation) Domain.  However, if the effort to buy it is the focus,
it is a Physics (activity) Domain.  In a like manner, the Mind Domain reflects a state of mind and the Psychology Domain
describes a mental activity (or manner of thinking).  "
        "Mind Domain stories might be about prejudice, a lack of self-worth (if it is a fixed view), or a refusal to see
the value of someone's desires.  "
        "Psychology Domain supports stories where one takes too many risks, is egocentric, or makes light of serious
situations.\n\nAs a final note, it is important to keep in mind that stories are often not about a problem that exists
but a desire to be fulfilled.  Stories of this nature can create a much more positive feel as exemplified in a Universe
story in which an heiress must spend a million dollars in 24 hours to inherit 30 million more, a Physics story where a
mountaineer hopes to be the first to scale a mountain on Mars, "
        "a Mind story of unconditional love, or a Psychology story about overcoming a dependence on sedatives."
        "\n\n"
        "«B+»«U+»Impact«U-»:  «B-»"
        "The choice of Domain narrows the playing field of a story.  Without actually putting up walls, choosing a
Domain shifts the focus of audience attention by establishing the center around which broad scale dynamics will revolve.
The Dramatica engine is calibrated to this center."
};


#if 0
resource 'DQBG' (kDQSDirectionST, PFM_MIN_PRIO) {
        ""
};
resource 'DQBG' (kDQSApproachST, PFM_MIN_PRIO) {
        ""
};
resource 'DQBG' (kDQSSexST, PFM_MIN_PRIO) {
        ""
};
resource 'DQBG' (kDQSWorkST, PFM_MIN_PRIO) {
        ""
};
resource 'DQBG' (kDQSLimitST, PFM_MIN_PRIO) {
        ""
};
resource 'DQBG' (kDQSOutcomeST, PFM_MIN_PRIO) {
        ""
};
resource 'DQBG' (kDQSJudgmentST, PFM_MIN_PRIO) {
        ""
};


resource 'DQBG' (kDQSSTDomainsST, PFM_MIN_PRIO) {
        ""
};
resource 'DQBG' (kDQSSTConcernsST, PFM_MIN_PRIO) {
        ""
};
resource 'DQBG' (kDQSSTRangesST, PFM_MIN_PRIO) {
        ""
};
resource 'DQBG' (kDQSSTProblemST, PFM_MIN_PRIO) {
        ""
};
resource 'DQBG' (kDQSSTStipulationST, PFM_MIN_PRIO) {
        ""
};
resource 'DQBG' (kDQSSTSolutionST, PFM_MIN_PRIO) {
        ""
};
resource 'DQBG' (kDQSSTFocusST, PFM_MIN_PRIO) {
        ""
};
resource 'DQBG' (kDQSSTDirectionST, PFM_MIN_PRIO) {
        ""
};
resource 'DQBG' (kDQSSTUnRngST, PFM_MIN_PRIO) {
        ""
```

```
};
resource 'DQBG' (kDQSSTCrFlST, PFM_MIN_PRIO) {
""
};
resource 'DQBG' (kDQSSTGoalST, PFM_MIN_PRIO) {
""
};
resource 'DQBG' (kDQSSTRequirementST, PFM_MIN_PRIO) {
""
};

resource 'DQBG' (kDQSMCDomainsST, PFM_MIN_PRIO) {
""
};
resource 'DQBG' (kDQSMCConcernsST, PFM_MIN_PRIO) {
""
};
resource 'DQBG' (kDQSMCRangesST, PFM_MIN_PRIO) {
""
};
resource 'DQBG' (kDQSMCProblemST, PFM_MIN_PRIO) {
""
};
resource 'DQBG' (kDQSMCStipulationST, PFM_MIN_PRIO) {
""
};
resource 'DQBG' (kDQSMCSolutionST, PFM_MIN_PRIO) {
""
};
resource 'DQBG' (kDQSMCFocusST, PFM_MIN_PRIO) {
""
};
resource 'DQBG' (kDQSMCDirectionST, PFM_MIN_PRIO) {
""
};
resource 'DQBG' (kDQSMCUnRngST, PFM_MIN_PRIO) {
""
};
resource 'DQBG' (kDQSMCCrFlST, PFM_MIN_PRIO) {
""
};
resource 'DQBG' (kDQSMCGoalST, PFM_MIN_PRIO) {
""
};
resource 'DQBG' (kDQSMCRequirementST, PFM_MIN_PRIO) {
""
};

resource 'DQBG' (kDQSOCDomainsST, PFM_MIN_PRIO) {
""
};
resource 'DQBG' (kDQSOCConcernsST, PFM_MIN_PRIO) {
""
};
resource 'DQBG' (kDQSOCRangesST, PFM_MIN_PRIO) {
""
};
resource 'DQBG' (kDQSOCProblemST, PFM_MIN_PRIO) {
""
};
resource 'DQBG' (kDQSOCStipulationST, PFM_MIN_PRIO) {
""
};
resource 'DQBG' (kDQSOCSolutionST, PFM_MIN_PRIO) {
""
};
resource 'DQBG' (kDQSOCFocusST, PFM_MIN_PRIO) {
""
};
resource 'DQBG' (kDQSOCDirectionST, PFM_MIN_PRIO) {
""
};
resource 'DQBG' (kDQSOCUnRngST, PFM_MIN_PRIO) {
""
};
resource 'DQBG' (kDQSOCCrFlST, PFM_MIN_PRIO) {
""
};
resource 'DQBG' (kDQSOCGoalST, PFM_MIN_PRIO) {
""
};
resource 'DQBG' (kDQSOCRequirementST, PFM_MIN_PRIO) {
""
};

resource 'DQBG' (kDQSPLDomainsST, PFM_MIN_PRIO) {
""
};
resource 'DQBG' (kDQSPLConcernsST, PFM_MIN_PRIO) {
""
};
resource 'DQBG' (kDQSPLRangesST, PFM_MIN_PRIO) {
""
};
resource 'DQBG' (kDQSPLProblemST, PFM_MIN_PRIO) {
""
};
resource 'DQBG' (kDQSPLStipulationST, PFM_MIN_PRIO) {
""
};
resource 'DQBG' (kDQSPLSolutionST, PFM_MIN_PRIO) {
""
};
resource 'DQBG' (kDQSPLFocusST, PFM_MIN_PRIO) {
""
};
resource 'DQBG' (kDQSPLDirectionST, PFM_MIN_PRIO) {
""
};
```

```
resource 'DQBG' (kDQSPLUnRngST, PFM_MIN_PRIO) {
	""
};
resource 'DQBG' (kDQSPLCrFlST, PFM_MIN_PRIO) {
	""
};
resource 'DQBG' (kDQSPLGoalST, PFM_MIN_PRIO) {
	""
};
resource 'DQBG' (kDQSPLRequirementST, PFM_MIN_PRIO) {
	""
};
#endif
resource 'DQBG' (kDQSMCGenderST, PFM_MIN_PRIO) {
	""
};
resource 'DQBG' (kDQSMCPluralityST, PFM_MIN_PRIO) {
	""
};
resource 'DQBG' (kDQSMCVoiceST, PFM_MIN_PRIO) {
	""
};
resource 'DQBG' (kDQSOCGenderST, PFM_MIN_PRIO) {
	""
};
resource 'DQBG' (kDQSOCPluralityST, PFM_MIN_PRIO) {
	""
};
resource 'DQBG' (kDQSOCVoiceST, PFM_MIN_PRIO) {
	""
};


resource 'DQBG' (kDQSIntro, PFM_MIN_PRIO) {
	""
};
resource 'DQBG' (kDQSTitle, PFM_MIN_PRIO) {
	""
};
resource 'DQBG' (kDQSAuthor, PFM_MIN_PRIO) {
	""
};
resource 'DQBG' (kDQSSetting, PFM_MIN_PRIO) {
	""
};
resource 'DQBG' (kDQSPeriod, PFM_MIN_PRIO) {
	""
};
resource 'DQBG' (kDQSBackground, PFM_MIN_PRIO) {
	""
};
resource 'DQBG' (kDQSGenre, PFM_MIN_PRIO) {
	""
};
resource 'DQBG' (kDQSTone, PFM_MIN_PRIO) {
	""
};
resource 'DQBG' (kDQSAnalysis, PFM_MIN_PRIO) {
	""
};
resource 'DQBG' (kDQSCreate, PFM_MIN_PRIO) {
	""
};
resource 'DQBG' (kDQSDraft, PFM_MIN_PRIO) {
	""
};
resource 'DQBG' (kDQSPlace, PFM_MIN_PRIO) {
	""
};
resource 'DQBG' (kDQSSynopsis, PFM_MIN_PRIO) {
	""
};
resource 'DQBG' (kDQSSource, PFM_MIN_PRIO) {
	""
};
resource 'DQBG' (kDQSFormat, PFM_MIN_PRIO) {
	""
};
resource 'DQBG' (kDQSForum, PFM_MIN_PRIO) {
	""
};
```

```
/* -------------------------------------------------------------------------
        DQS-DEFS.H
        Defined Constants for all DQS .r files
        Copyright (C) 1993 Screenplay Systems Inc.
        Revised:            $Id: dqs-defs.h,v 1.2 93/09/24 15:30:03 stephen Exp Locker: stephen $
--------------------------------------------------------------------------- */

#ifndef __DQSDEFS__
#define __DQSDEFS__

/********************************/
/*      SEGMENTS FOR DQS VARIABLES          */
/********************************/

#define  kResponsesPT                   0
#define kStoryDocPT                             1
#define kStellingPT                             2
#define  kMainCharPT                            3
#define  kObstCharPT                            4

/*******************************/
/*      QUERY TYPES (param "TY")    */
/*******************************/

#define kQTYPureText                    0
#define kQTYDynamicRadioBtn             1
#define kQTYTextualEntry           2
#define kQTYGeneralRadioBtn             3
#define kQTYTextWrapDisplay         75
#define kQTYStructuralList         100
#define kQTYHomeWindow             999

/*************************************/
/*      TOPIC OF QUESTION (param "TQ")     */
/*************************************/

#define         xTQCharacter            0
#define         xTQPlot                         1
#define         xTQStructure            2
#define         xTQStorytelling         3
#define         xTQTutorial                     8
#define         xTQOther                        9

/*************************************/
/*      DQS Help Segment IDs (param "HP")       */
/*************************************/

#define         rDQSHPRadioButtons              1
#define         rDQSHPFillBlank                 2
#define         rDQSHPStructualFinders  3

/********************************/
/*              QUESTION LISTS                  */
/********************************/

#define kNmOfQuestionLists           25

#define  kQLSTHome                              0
#define  kQLSTGenre1                            1
#define  kQLSTCharacter1                2
#define  kQLSTTheme1                            3
#define  kQLSTPlot1                             4

#define kQLSEPLINE1                             5

#define  kQLSTGenre2                            6
#define  kQLSTCharacter2                7
#define  kQLSTTheme2                            8
#define  kQLSTPlot2                             9

#define kQLSEPLINE2                             10

#define  kQLSTQuickStart                11

#define kQLSEPLINE3                             12

#define  kQLSTCharDyn                   13
#define  kQLSTPlotDyn                   14
#define  kQLSTObjStory                  15
#define  kQLSTSubStory                  16
#define  kQLSTMainChar                  17
#define  kQLSTObsChar                   18

#define kQLSEPLINE4                             19

#define  kQLSTAllForming                20
#define  kQLSTAllTelling                21
#define  kQLSTAllTopics                 22

#define kQLSEPLINE5                             23

#define  kQLSTStoryPoints            24

/********************/
/*      BASIC DEFINES     */
/********************/

#define  kDynQuest                              16+1            /* Dynamic Questions begin here */
#define  kSTellQuest                    kDynQuest+61+1          /* Storytelling Questions begin here  -- the extra "1" is
because the first item is not indexed +1 */
#define  kTopicIntro                    kSTellQuest+61+1  /* Topic Introductions begin here */
#define  kGeneralQuest          kTopicIntro+58+1  /* General Questions that lead into Genre, Plot, etc. begin here */
#define  kGenreQuest                    kGeneralQuest+1+1          /* Genre Questions begin here */
#define  kPlotQuest                     kGenreQuest+11+1  /* Plot Questions begin here */
#define  kThemeQuest                    kPlotQuest+34+1            /* Theme Questions begin here */
#define  kCharQuest                     kThemeQuest+4+1            /* Character Questions begin here */
#define  kOtherQuest                    kCharQuest+4+1             /* Other Questions begin here */

/*      GENERAL QUESTIONS               */

#define  kDQSHome                               0                       /* Home window */
#define  kDQSIntro                              1                       /* Introduction */
```

```
#define kDQSTitle                         2                  /* Story Title */
#define kDQSAuthor                        3                  /* Author Name */
#define kDQSSetting                       4                  /* Setting */
#define kDQSPeriod                        5                  /* Period */
#define kDQSBackground           6                 /* Background */
#define kDQSGenre                         7                  /* Genre */
#define kDQSTone                          8                  /* Tone/Timbre */
#define kDQSAnalysis             9                 /* Analysis by */
#define kDQSCreate                        10                 /* Creation/Analysis */
#define kDQSDraft                         11                 /* Draft */
#define kDQSPlace                         12                 /* Place */
#define kDQSSynopsis             13                /* Brief Synopsis */
#define kDQSSource                        14                 /* Source Material */
#define kDQSFormat                        15                 /* Format */
#define kDQSForum                         16                 /* Forum */

/*      DYNAMIC QUESTIONS        */

#define kDQSResolve              kDynQuest           /* Resolve */
#define kDQSDirection       kDynQuest+1        /* Direction Question if Change or Steadfast is unknown */
#define kDQSApproach        kDynQuest+2        /* Approach */
#define kDQSSex                  kDynQuest+3         /* Sex */

#define kDQSWork                 kDynQuest+4         /* Work */
#define kDQSLimit                kDynQuest+5         /* Limit */
#define kDQSOutcome              kDynQuest+6         /* Outcome */
#define kDQSJudgment        kDynQuest+7        /* Judgment */

#define kDQSMCName               kDynQuest+8         /* MC Name */
#define kDQSMCDesc               kDynQuest+9         /* MC Description */
#define kDQSOCName               kDynQuest+10       /* OC Name */
#define kDQSOCDesc               kDynQuest+11       /* OC Description */

#define kDQSSTDomains       kDynQuest+12      /* ST Domain */
#define kDQSSTConcerns      kDynQuest+13      /* ST Concern */
#define kDQSSTRanges        kDynQuest+14      /* ST Range */
#define kDQSSTProblem       kDynQuest+15      /* ST (Story) Problem */
#define kDQSSTStipulation   kDynQuest+16      /* ST Stipulation */
#define kDQSSTSolution      kDynQuest+17      /* ST Solution */
#define kDQSSTFocus              kDynQuest+18      /* ST Focus */
#define kDQSSTDirection     kDynQuest+19      /* ST Direction */
#define kDQSSTUnRng              kDynQuest+20      /* ST Catalyst (Unique Range) */
#define kDQSSTCrFl               kDynQuest+21      /* ST Inhibitor */
#define kDQSSTGoal               kDynQuest+22      /* ST Goal */
#define kDQSSTRequirement   kDynQuest+23      /* ST Requirement */

#define kDQSMCDomains       kDynQuest+24      /* MC Domain */
#define kDQSMCConcerns      kDynQuest+25      /* MC Concern */
#define kDQSMCRanges        kDynQuest+26      /* MC Range */
#define kDQSMCProblem       kDynQuest+27      /* MC Problem */
#define kDQSMCStipulation   kDynQuest+28      /* MC Stipulation */
#define kDQSMCSolution      kDynQuest+29      /* MC Solution */
#define kDQSMCFocus              kDynQuest+30      /* MC Focus */
#define kDQSMCDirection     kDynQuest+31      /* MC Direction */
#define kDQSMCUnRng              kDynQuest+32      /* MC Unique Ability (Unique Range) */
#define kDQSMCCrFl               kDynQuest+33      /* MC Critical Flaw */
#define kDQSMCGoal               kDynQuest+34      /* MC Dividend */
#define kDQSMCRequirement   kDynQuest+35      /* MC Forewarnings */

#define kDQSOCDomains       kDynQuest+36      /* OC Domain */
#define kDQSOCConcerns      kDynQuest+37      /* OC Concern */
#define kDQSOCRanges        kDynQuest+38      /* OC Range */
#define kDQSOCProblem       kDynQuest+39      /* OC Problem */
#define kDQSOCStipulation   kDynQuest+40      /* OC Stipulation */
#define kDQSOCSolution      kDynQuest+41      /* OC Solution */
#define kDQSOCFocus              kDynQuest+42      /* OC Focus */
#define kDQSOCDirection     kDynQuest+43      /* OC Direction */
#define kDQSOCUnRng              kDynQuest+44      /* OC Unique Ability (Unique Range) */
#define kDQSOCCrFl               kDynQuest+45      /* OC Critical Flaw */
#define kDQSOCGoal               kDynQuest+46      /* OC Cost */
#define kDQSOCRequirement   kDynQuest+47      /* OC Preconditions */

#define kDQSPLDomains       kDynQuest+48      /* PL Domain */
#define kDQSPLConcerns      kDynQuest+49      /* PL Concern */
#define kDQSPLRanges        kDynQuest+50      /* PL Range */
#define kDQSPLProblem       kDynQuest+51      /* PL Problem */
#define kDQSPLStipulation   kDynQuest+52      /* PL Stipulation */
#define kDQSPLSolution      kDynQuest+53      /* PL Solution */
#define kDQSPLFocus              kDynQuest+54      /* PL Focus */
#define kDQSPLDirection     kDynQuest+55      /* PL Direction */
#define kDQSPLUnRng              kDynQuest+56      /* PL Catalyst (Unique Range) */
#define kDQSPLCrFl               kDynQuest+57      /* PL Inhibitor */
#define kDQSPLGoal               kDynQuest+58      /* PL Consequence */
#define kDQSPLRequirement   kDynQuest+59      /* PL Prerequisites */
#define kDQSDirectionA      kDynQuest+60      /* Direction Question if Change */
#define kDQSDirectionB      kDynQuest+61      /* Direction Questions if Steadfast */


/*      STORYTELLING QUESTIONS */

#define kDQSResolveST       kSTellQuest              /* Resolve Storytelling*/
#define kDQSDirectionST     kSTellQuest+1     /* Direction Storytelling*/
#define kDQSApproachST      kSTellQuest+2     /* Approach Storytelling*/
#define kDQSSexST                kSTellQuest+3     /* Sex Storytelling*/

#define kDQSWorkST               kSTellQuest+4     /* Work Storytelling*/
#define kDQSLimitST              kSTellQuest+5     /* Limit Storytelling*/
#define kDQSOutcomeST       kSTellQuest+6     /* Outcome Storytelling*/
#define kDQSJudgmentST      kSTellQuest+7     /* Judgment Storytelling*/

#define kDQSSTDomainsST     kSTellQuest+8     /* ST Domain Storytelling */
#define kDQSSTConcernsST  kSTellQuest+9     /* ST Concern Storytelling */
#define kDQSSTRangesST      kSTellQuest+10    /* ST Range Storytelling */
#define kDQSSTProblemST     kSTellQuest+11    /* ST Problem Storytelling */
#define kDQSSTStipulationST kSTellQuest+12    /* ST Stipulation Storytelling */
#define kDQSSTSolutionST  kSTellQuest+13    /* ST Solution Storytelling */
#define kDQSSTFocusST       kSTellQuest+14    /* ST Focus Storytelling */
#define kDQSSTDirectionST   kSTellQuest+15    /* ST Direction Storytelling */
#define kDQSSTUnRngST       kSTellQuest+16    /* ST Catalyst (Unique Range) Storytelling */
#define kDQSSTCrFlST        kSTellQuest+17    /* ST Inhibitor Storytelling */
#define kDQSSTGoalST        kSTellQuest+18    /* ST Goal Storytelling */
#define kDQSSTRequirementST kSTellQuest+19    /* ST Requirement Storytelling */
```

```
#define kDQSMCDomainsST           kSTellQuest+20    /* MC Domain Storytelling */
#define kDQSMCConcernsST  kSTellQuest+21    /* MC Concern Storytelling */
#define kDQSMCRangesST            kSTellQuest+22    /* MC Range Storytelling */
#define kDQSMCProblemST           kSTellQuest+23    /* MC Problem Storytelling */
#define kDQSMCStipulationST       kSTellQuest+24    /* MC Stipulation Storytelling */
#define kDQSMCSolutionST  kSTellQuest+25    /* MC Solution Storytelling */
#define kDQSMCFocusST             kSTellQuest+26    /* MC Focus Storytelling */
#define kDQSMCDirectionST         kSTellQuest+27    /* MC Direction Storytelling */
#define kDQSMCUnRngST             kSTellQuest+28    /* MC Unique Ability (Unique Range) Storytelling */
#define kDQSMCCrFlST              kSTellQuest+29    /* MC Critical Flaw Storytelling */
#define kDQSMCGoalST              kSTellQuest+30    /* MC Dividend Storytelling */
#define kDQSMCRequirementST       kSTellQuest+31    /* MC Forewarnings Storytelling */

#define kDQSOCDomainsST           kSTellQuest+32    /* OC Domain Storytelling */
#define kDQSOCConcernsST  kSTellQuest+33    /* OC Concern Storytelling */
#define kDQSOCRangesST            kSTellQuest+34    /* OC Range Storytelling */
#define kDQSOCProblemST           kSTellQuest+35    /* OC Problem Storytelling */
#define kDQSOCStipulationST       kSTellQuest+36    /* OC Stipulation Storytelling */
#define kDQSOCSolutionST  kSTellQuest+37    /* OC Solution Storytelling */
#define kDQSOCFocusST             kSTellQuest+38    /* OC Focus Storytelling */
#define kDQSOCDirectionST         kSTellQuest+39    /* OC Direction */
#define kDQSOCUnRngST             kSTellQuest+40    /* OC Unique Ability (Unique Range) Storytelling */
#define kDQSOCCrFlST              kSTellQuest+41    /* OC Critical Flaw Storytelling */
#define kDQSOCGoalST              kSTellQuest+42    /* OC Cost Storytelling */
#define kDQSOCRequirementST       kSTellQuest+43    /* OC Preconditions Storytelling */

#define kDQSPLDomainsST           kSTellQuest+44    /* PL Domain Storytelling */
#define kDQSPLConcernsST  kSTellQuest+45    /* PL Concern Storytelling */
#define kDQSPLRangesST            kSTellQuest+46    /* PL Range Storytelling */
#define kDQSPLProblemST           kSTellQuest+47    /* PL Problem Storytelling */
#define kDQSPLStipulationST       kSTellQuest+48    /* PL Stipulation Storytelling */
#define kDQSPLSolutionST  kSTellQuest+49    /* PL Solution Storytelling */
#define kDQSPLFocusST             kSTellQuest+50    /* PL Focus Storytelling */
#define kDQSPLDirectionST         kSTellQuest+51    /* PL Direction Storytelling */
#define kDQSPLUnRngST             kSTellQuest+52    /* PL Catalyst (Unique Range) Storytelling */
#define kDQSPLCrFlST              kSTellQuest+53    /* PL Inhibitor Storytelling */
#define kDQSPLGoalST              kSTellQuest+54    /* PL Consequence Storytelling */
#define kDQSPLRequirementST       kSTellQuest+55    /* PL Prerequisites Storytelling */

#define kDQSMCGenderST            kSTellQuest+56    /* MC Gender Storytelling */
#define kDQSMCPluralityST         kSTellQuest+57    /* MC Plurality Storytelling */
#define kDQSMCVoiceST             kSTellQuest+58    /* MC Voice Storytelling */

#define kDQSOCGenderST            kSTellQuest+59    /* OC Gender Storytelling */
#define kDQSOCPluralityST         kSTellQuest+60    /* OC Plurality Storytelling */
#define kDQSOCVoiceST             kSTellQuest+61    /* OC Voice Storytelling */


/*      TOPIC INTRODUCTIONS -- These are generally text only title cards*/

#define kDQSQSIntroTI             kTopicIntro                /* Quick Story Topic Intro */
#define kDQSQSCharDynTI           kTopicIntro+1     /* Quick Story Character Dynamics Topic Intro */
#define kDQSQSPlotDynTI           kTopicIntro+2     /* Quick Story Plot Dynamics Topic Intro */
#define kDQSQSThemeElemTI         kTopicIntro+3     /* Quick Story Thematic Elements Topic Intro */
#define kDQSQSRecapTI             kTopicIntro+4     /* Quick Story Recap */
#define kDQSQSStellingTI  kTopicIntro+5    /* Quick Story Storytelling Topic Intro */
#define kDQSQSCharDynSTTI         kTopicIntro+6     /* Quick Story Character Dynamics StorytellingTopic Intro */
#define kDQSQSPlotDynSTTI         kTopicIntro+7     /* Quick Story Plot Dynamics Storytelling Topic Intro */
#define kDQSQSThemeElemSTTI       kTopicIntro+8     /* Quick Story Thematic Elements StorytellingTopic Intro */
#define kDQSQSNextTI              kTopicIntro+9     /* Quick Story What's Next Topic Intro */

#define kDQSOSIntroTI             kTopicIntro+10    /* Objective Story Topic Intro */
#define kDQSOSPlotDynTI           kTopicIntro+11    /* Objective Story Plot Dynamics Topic Intro */
#define kDQSOSPerspecTI           kTopicIntro+12    /* Objective Story Perspectives Topic Intro */
#define kDQSOSAddApprecsTI        kTopicIntro+13    /* Objective Story Additional Appreciations Topic Intro */
#define kDQSOSRecapTI             kTopicIntro+14    /* Objective Story Recap Topic Intro */
#define kDQSOSNextTI              kTopicIntro+15    /* Objective Story What's Next Topic Intro */

#define kDQSSSIntroTI             kTopicIntro+16    /* Subjective Story Topic Intro */
#define kDQSSSRecapTI             kTopicIntro+17    /* Subjective Story Recap Topic Intro */
#define kDQSSSNextTI              kTopicIntro+18    /* Subjective Story What's Next Topic Intro */

#define kDQSMCIntroTI             kTopicIntro+19    /* Main Character Topic Intro */
#define kDQSMCCharDynTI           kTopicIntro+20    /* Main Character Dynamics Topic Intro */
#define kDQSMCPerspecTI           kTopicIntro+21    /* Main Character Perspectives Topic Intro */
#define kDQSMCRecapTI             kTopicIntro+22    /* Main Character Recap Topic Intro */
#define kDQSMCNextTI              kTopicIntro+23    /* Main Character What's Next Topic Intro */

#define kDQSOCIntroTI             kTopicIntro+24    /* Obstacle Character Topic Intro */
#define kDQSOCPerspecTI           kTopicIntro+25    /* Obstacle Character Perspectives Topic Intro */
#define kDQSOCRecapTI             kTopicIntro+26    /* Obstacle Character Recap Topic Intro */
#define kDQSOCNextTI              kTopicIntro+27    /* Obstacle Character What's Next Topic Intro */

#define kDQSSFIntroTI                      kTopicIntro+28    /* All Storyforming Topic Intro */
#define kDQSSFCharDynTI                    kTopicIntro+29    /* Storyforming Character Dynamics Topic Intro */
#define kDQSSFPlotDynTI                    kTopicIntro+30    /* Storyforming Plot Dynamics Topic Intro */
#define kDQSSFOSPerspecTI                  kTopicIntro+31    /* Storyforming OS Perspectives Topic Intro */
#define kDQSSFOSAddApprecsTI      kTopicIntro+32    /* Storyforming OS Additional Appreciations Topic Intro */
#define kDQSSFSSPerspecTI                  kTopicIntro+33    /* Storyforming SS Perspectives Topic Intro */
#define kDQSSFMCPerspecTI                  kTopicIntro+34    /* Storyforming MC Perspectives Topic Intro */
#define kDQSSFOCPerspecTI                  kTopicIntro+35    /* Storyforming OC Perspectives Topic Intro */
#define kDQSSFRecapTI                      kTopicIntro+36    /* Storyforming Recap Topic Intro */
#define kDQSSFNextTI                       kTopicIntro+37    /* Storyforming What's Next Topic Intro */

#define kDQSSTIntroTI                      kTopicIntro+38    /* All Storytelling Topic Intro */
#define kDQSSTCharDynTI                    kTopicIntro+39    /* Storytelling Character Dynamics Topic Intro */
#define kDQSSTPlotDynTI                    kTopicIntro+40    /* Storytelling Plot Dynamics Topic Intro */
#define kDQSSTOSPerspecTI                  kTopicIntro+41    /* Storytelling OS Perspectives Topic Intro */
#define kDQSSTSSPerspecTI                  kTopicIntro+42    /* Storytelling SS Perspectives Topic Intro */
#define kDQSSTMCPerspecTI                  kTopicIntro+43    /* Storytelling MC Perspectives Topic Intro */
#define kDQSSTOCPerspecTI                  kTopicIntro+44    /* Storytelling OC Perspectives Topic Intro */
#define kDQSSTOSAddApprecsTI      kTopicIntro+45    /* Storytelling OS Additional Appreciations Topic Intro */
#define kDQSSTNextTI                       kTopicIntro+46    /* Storytelling What's Next Topic Intro */

#define kDQSSTRecapTI                      kTopicIntro+47    /* PROBABLY DELETE THIS -- All Storytelling Recap Topic
Intro */

#define kDQSAllIntroTI                     kTopicIntro+48    /* All Topics Topic Intro */
#define kDQSAllCharDynTI          kTopicIntro+49    /* All Topics Character Dynamics Topic Intro */
#define kDQSAllPlotDynTI          kTopicIntro+50    /* All Topics Plot Dynamics Topic Intro */
#define kDQSAllOSPerspecTI                 kTopicIntro+51    /* All Topics OS Perspectives Topic Intro */
```

```
#define kDQSAllOSAddApprecsTI     kTopicIntro+52    /* All Topics OS Additional Appreciations Topic Intro */
#define kDQSAllSSPerspecTI              kTopicIntro+53    /* All Topics SS Perspectives Topic Intro */
#define kDQSAllMCPerspecTI              kTopicIntro+54    /* All Topics MC Perspectives Topic Intro */
#define kDQSAllOCIntroTI          kTopicIntro+55    /* All Topics OC Intro Topic Intro */
#define kDQSAllOCPerspecTI              kTopicIntro+56    /* All Topics OC Perspectives Topic Intro */
#define kDQSAllRecapTI                  kTopicIntro+57    /* All Topics Recap Topic Intro */
#define kDQSAllNextTI                   kTopicIntro+58    /* All Topics What's Next Topic Intro */


/*      General Questions that lead to Genre, Plot, Theme, and Character */

#define kDQSGenApproach           kGeneralQuest           /* General approach to story -- Genre, Plot, Theme,
Character */
#define kDQSGenPhases             kGeneralQuest+1         /* Intro to four phases of story creation */


/*****************         Genre Storyforming Specific Questions *****************/

#define kDQSG1Intro                     kGenreQuest                       /* Genre Phase 1 (storyforming)
Intro */
#define kDQSGDomain                     kGenreQuest+1                /* Genre Domain -- OS, SS, MC, OC */
#define kDQSGClass                      kGenreQuest+2                /* Genre Class --  U, Ph, Ps, M */
#define kDQSG1Analytical    kGenreQuest+3                 /* Analytical Topic */
#define kDQSG1Passionate    kGenreQuest+4                 /* Passionate Topic */
#define kDQSG1MoreTI              kGenreQuest+5                 /* Genre Phase 1 Additional Info Intro */
#define kDQSG1AdvTI                     kGenreQuest+6                /* Genre Phase 1 Advanced Intro */
#define kDQSG1Next                      kGenreQuest+7                /* What Next? */

/*  Genre Storytelling Specific Questions (Phase 2) */

#define kDQSG2Intro                     kGenreQuest+8                /* Genre Phase 2 (storytelling) Intro */
#define kDQSG2AnalyticalST        kGenreQuest+9                 /* Analytical Topic storytelling */
#define kDQSG2PassionateST        kGenreQuest+10                /* Passionate Topic storytelling */
#define kDQSG2Next                      kGenreQuest+11               /* What Next? */


/****************         Plot Storyforming Specific Questions (Phase 1)   *****************/

#define kDQSP1Intro               kPlotQuest                       /* Plot Phase 1 (storyforming) Intro */
#define kDQSP1OSAct1        kPlotQuest+1              /* Objective Story Act 1 Type */
#define kDQSP1OSAct2        kPlotQuest+2              /* Objective Story Act 2 Type */
#define kDQSP1OSAct3        kPlotQuest+3              /* Objective Story Act 3 Type */
#define kDQSP1OSAct4        kPlotQuest+4              /* Objective Story Act 4 Type */
#define kDQSP1SSAct1        kPlotQuest+5              /* Subjective Story Act 1 Type */
#define kDQSP1SSAct2        kPlotQuest+6              /* Subjective Story Act 2 Type */
#define kDQSP1SSAct3        kPlotQuest+7              /* Subjective Story Act 3 Type */
#define kDQSP1SSAct4        kPlotQuest+8              /* Subjective Story Act 4 Type */
#define kDQSP1AdvTI               kPlotQuest+9                /* Plot Phase 1 Advanced Intro */
#define kDQSP1Next                kPlotQuest+10               /* What Next? */

/*  Plot Storytelling Specific Questions (Phase 2) */

#define kDQSP2Intro               kPlotQuest+11               /* Plot Phase 2 (storytelling) Intro */
#define kDQSP2OSAct1        kPlotQuest+12             /* Illustrating Objective Story Act 1 Type */
#define kDQSP2OSAct2        kPlotQuest+13             /* Illustrating Objective Story Act 2 Type */
#define kDQSP2OSAct3        kPlotQuest+14             /* Illustrating Objective Story Act 3 Type */
#define kDQSP2OSAct4        kPlotQuest+15             /* Illustrating Objective Story Act 4 Type */
#define kDQSP2SSAct1        kPlotQuest+16             /* Illustrating Subjective Story Act 1 Type */
#define kDQSP2SSAct2        kPlotQuest+17             /* Illustrating Subjective Story Act 2 Type */
#define kDQSP2SSAct3        kPlotQuest+18             /* Illustrating Subjective Story Act 3 Type */
#define kDQSP2SSAct4        kPlotQuest+19             /* Illustrating Subjective Story Act 4 Type */
#define kDQSP2MCAct1        kPlotQuest+20             /* Illustrating Main Character Act 1 Type */
#define kDQSP2MCAct2        kPlotQuest+21             /* Illustrating Main Character Act 2 Type */
#define kDQSP2MCAct3        kPlotQuest+22             /* Illustrating Main Character Act 3 Type */
#define kDQSP2MCAct4        kPlotQuest+23             /* Illustrating Main Character Act 4 Type */
#define kDQSP2OCAct1        kPlotQuest+24             /* Illustrating Obstacle Character Act 1 Type */
#define kDQSP2OCAct2        kPlotQuest+25             /* Illustrating Obstacle Character Act 2 Type */
#define kDQSP2OCAct3        kPlotQuest+26             /* Illustrating Obstacle Character Act 3 Type */
#define kDQSP2OCAct4        kPlotQuest+27             /* Illustrating Obstacle Character Act 4 Type */

#define kDQSP2Intro2        kPlotQuest+28             /* Plot Phase 2 Second Part Intro */
#define kDQSP2STCon               kPlotQuest+29               /* Illustrating the objective story concern
(redundant) */
#define kDQSP2MCCon               kPlotQuest+30               /* Illustrating the MC concern (redundant) */
#define kDQSP2OCCon               kPlotQuest+31               /* Illustrating the OC concern (redundant) */
#define kDQSP2PLCon               kPlotQuest+32               /* Illustrating the subjective story concern
(redundant) */
#define kDQSP2Blend               kPlotQuest+33               /* Blending the four concerns (isn't this
weaving?) */
#define kDQSP2Next                kPlotQuest+34               /* What Next? */


/*****************        Theme Storyforming Specific Questions *****************/

#define kDQST1Intro               kThemeQuest                      /* Theme Phase 1 (storyforming) Intro */
#define kDQST1Intro2        kThemeQuest+1             /* Theme Additional items Intro */
#define kDQST1Next                kThemeQuest+2               /* What Next? */

/*  Theme Storytelling Specific Questions (Phase 2) */

#define kDQST2Intro               kThemeQuest+3               /* Theme Phase 2 (storytelling) Intro */
#define kDQST2Next                kThemeQuest+4               /* What Next? */


/*****************        Character Storyforming Specific Questions *****************/

#define kDQSC1Intro               kCharQuest                       /* Character Phase 1 (storyforming)
Intro */
#define kDQSC1AdvTI               kCharQuest+1                /* Character Advanced topic intro */
#define kDQSC1Next                kCharQuest+2                /* What Next? */

/*  Character Storytelling Specific Questions (Phase 2) */

#define kDQSC2Intro               kCharQuest+3                /* Character Phase 2 (storytelling) Intro */
#define kDQSC2Next                kCharQuest+4                /* What Next? */


/*****************        Other Questions *****************/

#define kDQSNatureST        kOtherQuest                      /* Storytelling for Nature */
```

```
#define  kDQSEssenceST      kOtherQuest+1                              /* Storytelling for Essence */
#define  kDQSTendencyST     kOtherQuest+2                              /* Storytelling for Tendency */
#define  kDQSReachST                  kOtherQuest+3                          /* Storytelling for Reach */


#define kNmOfDQSQuestions             kOtherQuest+3+1          /* TOTAL # OF QUESTIONS */

#endif /* __DQSDEFS__ */

/* xxxxxxxxxxxxxxxxxxxxxxxxxxxxxxxxxxxxxxxxxxxxxxxxxxxxxxxxxxxxxxxxxxxxxxxxx
 * $Log:          dqs-defs.h,v $
 * Revision 1.2  93/09/24  15:30:03  stephen
 * On-going DQS2 development.
 *
 * Revision 1.1  93/08/20  13:53:43  stephen
 * Initial revision
 *
 */
```

```
/* ------------------------------------------------------------------------
	DQDU.R
	Dramatica's Query Questions Dramatica Usuage
	Copyright (C) 1993 Screenplay Systems Inc.
	$Id: dqs-du.r,v 1.1 93/08/20 13:53:52 stephen Exp Locker: stephen $
------------------------------------------------------------------------ */

#ifdef macintosh
	#include "systypes.r"
	#include "types.r"
#else
	#include <systypes.r>
	#include <types.r>
#endif

#include "dqs-defs.h"

/* ------------------------------------------------------------------------
	'DQDU' - Parameterized Dramatica Query System Text.
------------------------------------------------------------------------ */
type 'DQDU' {
	cstring;			/* the stream of parameterized text */
};

resource 'DQDU' (kDQSResolve, PFM_MIN_PRIO) {
	"Your selection of Change or Steadfast has wide ranging effects on the dynamics of your story.  Such things as
the relationship between the Objective and Subjective story lines and the order of exploration of your thematic points is
adjusted in the Dramatica model to create and support the ultimate decision of your Main Character to either change or
remain steadfast."
};

resource 'DQDU' (kDQSOutcome, PFM_MIN_PRIO) {
	"Achieving something requires accomplishing the right steps in the right order to get from where the Main
Character starts to where she wants to be.  When you choose success or failure, Dramatica alters the kind of steps your
Main Character will need to take, and determines the appropriate order to bring them to the desired outcome."
};

resource 'DQDU' (kDQSJudgment, PFM_MIN_PRIO) {
	"Because success & failure are measurements of how well specific requirements have been met, they are by nature
Objective.  In contrast, Good and Bad are Subjective value judgments based on an appreciation of the Main Character's
peace and fulfillment.  When you select Good or Bad, Dramatica adjusts the \"phasing\" between the Objective and
Subjective storylines to create an interference pattern that support the appropriate value judgment."
};

resource 'DQDU' (kDQSDirection, PFM_MIN_PRIO) {
	"A Change story has a problem and its related solution.  A Steadfast Story has a Focus and Direction.  By
choosing Start or Stop, you tell Dramatica to shift the focus of the story to one over the other.  This is accomplished
by controlling the nature of the Character's concerns in relationship to the concerns of the Story and also by setting
the relationship between theme and plot."
};

resource 'DQDU' (kDQSDirectionA, PFM_MIN_PRIO) {
	"A Change story has a problem and its related solution.  A Steadfast Story has a Focus and Direction.  By
choosing Start or Stop, you tell Dramatica to shift the focus of the story to one over the other.  This is accomplished
by controlling the nature of the Character's concerns in relationship to the concerns of the Story and also by setting
the relationship between theme and plot."
};

resource 'DQDU' (kDQSDirectionB, PFM_MIN_PRIO) {
	"A Change story has a problem and its related solution.  A Steadfast Story has a Focus and Direction.  By
choosing Start or Stop, you tell Dramatica to shift the focus of the story to one over the other.  This is accomplished
by controlling the nature of the Character's concerns in relationship to the concerns of the Story and also by setting
the relationship between theme and plot."
};

resource 'DQDU' (kDQSWork, PFM_MIN_PRIO) {
	"Do Actions precipitate Decisions, or do Decisions precipitate Actions.  Since a story has both, it is really a
question of which came first: chicken or egg?  By selecting one over the other, you instruct Dramatica to establish a
causal order between dynamic movements in the Action line and the Decision line."
};

resource 'DQDU' (kDQSLimit, PFM_MIN_PRIO) {
	"A dramatic structure has both spatial and temporal frameworks adjusting themselves in arrangement or sequence
appropriate to the author's message during the course of the story.  Consistently throughout the story either a change in
arrangement will force a change in sequence or a change in sequence will force a change in arrangement of dramatic
potentials.  Which one causes the other is controlled by your choice of Timelock or Optionlock."
};

resource 'DQDU' (kDQSApproach, PFM_MIN_PRIO) {
	"The Main Character's affect on the story is both one of rearranging the dramatic potentials of the story, and
also one of reordering the sequence of dramatic events.  By choosing Do-er or Be-er you instruct Dramatica to establish
one method as the Main Characters intent and the other as the result of her efforts."
};

resource 'DQDU' (kDQSSex, PFM_MIN_PRIO) {
	"All minds evaluate in terms of arrangement and in terms of sequence.  By selecting female or male, you instruct
Dramatica to order the arrangement and sequence of your Main Character's evaluations in an appropriate relationship."
};

resource 'DQDU' (kDQSSTDomains, PFM_MIN_PRIO) {
	"The choice of Domain narrows the playing field of a story.  Without actually putting up walls, choosing a
Domain shifts the focus of audience attention by establishing the center around which broad scale dynamics will revolve.
The Dramatica engine is calibrate to this center."
};

resource 'DQDU' (kDQSSTConcerns, PFM_MIN_PRIO) {
	"The choice of Concern sets limits on how much dramatic ground the Theme can potentially encompass and therefore
includes some kinds of considerations and excludes others."
};

resource 'DQDU' (kDQSSTRanges, PFM_MIN_PRIO) {
	"by placing the story's problem in context, the choice of Range determines the thematic progression that
supports that desired point of view on the events in the story."
};

resource 'DQDU' (kDQSSTProblem, PFM_MIN_PRIO) {
	"Once the story's problem is chosen, the Dramatica Engine arranges all the other dramatic choices the author has
made around the problem so the story's dynamics are both dependent upon it, and derivative of it."
};
```

```
resource 'DQDU' (kDQSSTStipulation, PFM_MIN_PRIO) {
	""
};
resource 'DQDU' (kDQSSTSolution, PFM_MIN_PRIO) {
	""
};
resource 'DQDU' (kDQSSTFocus, PFM_MIN_PRIO) {
	""
};
resource 'DQDU' (kDQSSTDirection, PFM_MIN_PRIO) {
	""
};
resource 'DQDU' (kDQSSTUnRng, PFM_MIN_PRIO) {
	""
};
resource 'DQDU' (kDQSSTCrFl, PFM_MIN_PRIO) {
	""
};
resource 'DQDU' (kDQSSTGoal, PFM_MIN_PRIO) {
	"The Choice of Goal picks a focal point in the plot around which the order and nature of events must revolve.
The Dramatica engine applies the story's dynamics to this focal point in order to determine an appropriate Consequence
should the Goal fail to be achieved, "
	"appropriate Requirements necessary to achieve the Goal and a number of other related dramatic Appreciations."
};
resource 'DQDU' (kDQSSTRequirement, PFM_MIN_PRIO) {
	""
};

resource 'DQDU' (kDQSMCDomains, PFM_MIN_PRIO) {
	"The choice of Main Character Domain not only determines something about the Main Character's personal drive but
in conjunction with the choice of Objective Story Domain and other Essential Questions creates patterns for the
dissonance and conflict that will occur as the story progresses."
};
resource 'DQDU' (kDQSMCConcerns, PFM_MIN_PRIO) {
	""
};
resource 'DQDU' (kDQSMCRanges, PFM_MIN_PRIO) {
	"The choice of Main Character's Thematic Focus selects the central hub around which the Subjective Thematic
progression will revolve.  Other dynamics determine the direction and meaning of this progression, creating a map of
Thematic Sequences that allow an author to make personal commentaries that support the overall message of a story."
};
resource 'DQDU' (kDQSMCProblem, PFM_MIN_PRIO) {
	"The choice of Main Character Problem selects the single point around which the web of the entire Subjective
Story is woven."
};
resource 'DQDU' (kDQSMCStipulation, PFM_MIN_PRIO) {
	""
};
resource 'DQDU' (kDQSMCSolution, PFM_MIN_PRIO) {
	"The choice of Main Character's Solution establishes a second \"pole\" in the dynamics that drive the Main
Character, creating dramatic flow between the need that drives them and the quality that will quell that need."
};
resource 'DQDU' (kDQSMCFocus, PFM_MIN_PRIO) {
	"Selecting Main Character's Focus determines the way in which the difficulties in a story will affect them."
};
resource 'DQDU' (kDQSMCDirection, PFM_MIN_PRIO) {
	"Choosing the Main Character's Direction, sets the course for the kind of effort they will make in their quest
for a solution to their troubles."
};
resource 'DQDU' (kDQSMCUnRng, PFM_MIN_PRIO) {
	"Main Character Unique Ability is related to both the story's Problem and the Thematic Focus.  Once selected, it
establishes a Range in which certain story dynamics may operate."
};
resource 'DQDU' (kDQSMCCrFl, PFM_MIN_PRIO) {
	"Choosing a Critical Flaw establishes detractors from the Main Character's efforts that are used to illustrate
their personal growth."
};
resource 'DQDU' (kDQSMCGoal, PFM_MIN_PRIO) {
	"Choosing the Dividend determines the category of benefit that the characters will accrue on the way toward the
Goal.  Dividend helps to select comparable Costs and limits the choices of appropriate Goal and Consequence."
};
resource 'DQDU' (kDQSMCRequirement, PFM_MIN_PRIO) {
	""
};

resource 'DQDU' (kDQSOCDomains, PFM_MIN_PRIO) {
	""
};
resource 'DQDU' (kDQSOCConcerns, PFM_MIN_PRIO) {
	""
};
resource 'DQDU' (kDQSOCRanges, PFM_MIN_PRIO) {
	""
};
resource 'DQDU' (kDQSOCProblem, PFM_MIN_PRIO) {
	""
};
resource 'DQDU' (kDQSOCStipulation, PFM_MIN_PRIO) {
	""
};
resource 'DQDU' (kDQSOCSolution, PFM_MIN_PRIO) {
	""
};
resource 'DQDU' (kDQSOCFocus, PFM_MIN_PRIO) {
	""
};
resource 'DQDU' (kDQSOCDirection, PFM_MIN_PRIO) {
	""
};
resource 'DQDU' (kDQSOCUnRng, PFM_MIN_PRIO) {
	""
};
resource 'DQDU' (kDQSOCCrFl, PFM_MIN_PRIO) {
	""
};
resource 'DQDU' (kDQSOCGoal, PFM_MIN_PRIO) {
	"There is an attrition that will occur in all interactions in a story, even if they are minor events.  A choice
of Cost determines the nature of this drain, and therefore impacts both Plot and Theme as well."
};
resource 'DQDU' (kDQSOCRequirement, PFM_MIN_PRIO) {
```

```
        ""
};

resource 'DQDU' (kDQSPLDomains, PFM_MIN_PRIO) {
        ""
};
resource 'DQDU' (kDQSPLConcerns, PFM_MIN_PRIO) {
        ""
};
resource 'DQDU' (kDQSPLRanges, PFM_MIN_PRIO) {
        ""
};
resource 'DQDU' (kDQSPLProblem, PFM_MIN_PRIO) {
        ""
};
resource 'DQDU' (kDQSPLStipulation, PFM_MIN_PRIO) {
        ""
};
resource 'DQDU' (kDQSPLSolution, PFM_MIN_PRIO) {
        ""
};
resource 'DQDU' (kDQSPLFocus, PFM_MIN_PRIO) {
        ""
};
resource 'DQDU' (kDQSPLDirection, PFM_MIN_PRIO) {
        ""
};
resource 'DQDU' (kDQSPLUnRng, PFM_MIN_PRIO) {
        ""
};
resource 'DQDU' (kDQSPLCrFl, PFM_MIN_PRIO) {
        ""
};
resource 'DQDU' (kDQSPLGoal, PFM_MIN_PRIO) {
        "The choice of Consequence helps select the appropriate category of Goal, Requirement, and Forewarning in the
context of a story's dynamics."
};
resource 'DQDU' (kDQSPLRequirement, PFM_MIN_PRIO) {
        ""
};


/*************** STORYTELLING QUESTIONS ***************/

resource 'DQDU' (kDQSResolveST, PFM_MIN_PRIO) {
        "This is for testing the Resolve Dramatica Usage text."
};

resource 'DQDU' (kDQSMCName, PFM_MIN_PRIO) {
        "Choosing a Main Character is perhaps the most important decision in storyforming. When you determine the angle
from which the audience will experience your story, Dramatica winds up all the dramatic potentials around that axis. "
        "The Choice of Main Character affects all levels and natures of what will follow. Still, all we ask here is for
their name. But before you answer, think about how your decision will effect the direction from which your audience will
experience your story."
};

resource 'DQDU' (kDQSOCName, PFM_MIN_PRIO) {
        "Selecting your Obstacle Character establishes a relationship between the Objective Story and the Subjective
Story that will effect the side of your storyform that will be most exposed to the audience through your storytelling."
};

#if 0
resource 'DQDU' (kDQSDirectionST, PFM_MIN_PRIO) {
        ""
};
resource 'DQDU' (kDQSApproachST, PFM_MIN_PRIO) {
        ""
};
resource 'DQDU' (kDQSSexST, PFM_MIN_PRIO) {
        ""
};
resource 'DQDU' (kDQSWorkST, PFM_MIN_PRIO) {
        ""
};
resource 'DQDU' (kDQSLimitST, PFM_MIN_PRIO) {
        ""
};
resource 'DQDU' (kDQSOutcomeST, PFM_MIN_PRIO) {
        ""
};
resource 'DQDU' (kDQSJudgmentST, PFM_MIN_PRIO) {
        ""
};

resource 'DQDU' (kDQSSTDomainsST, PFM_MIN_PRIO) {
        ""
};
resource 'DQDU' (kDQSSTConcernsST, PFM_MIN_PRIO) {
        ""
};
resource 'DQDU' (kDQSSTRangesST, PFM_MIN_PRIO) {
        ""
};
resource 'DQDU' (kDQSSTProblemST, PFM_MIN_PRIO) {
        ""
};
resource 'DQDU' (kDQSSTStipulationST, PFM_MIN_PRIO) {
        ""
};
resource 'DQDU' (kDQSSTSolutionST, PFM_MIN_PRIO) {
        ""
};
resource 'DQDU' (kDQSSTFocusST, PFM_MIN_PRIO) {
        ""
};
resource 'DQDU' (kDQSSTDirectionST, PFM_MIN_PRIO) {
        ""
};
```

```
resource 'DQDU' (kDQSSTUnRngST, PFM_MIN_PRIO) {
    ""
};
resource 'DQDU' (kDQSSTCrFlST, PFM_MIN_PRIO) {
    ""
};
resource 'DQDU' (kDQSSTGoalST, PFM_MIN_PRIO) {
    ""
};
resource 'DQDU' (kDQSSTRequirementST, PFM_MIN_PRIO) {
    ""
};

resource 'DQDU' (kDQSMCDomainsST, PFM_MIN_PRIO) {
    ""
};
resource 'DQDU' (kDQSMCConcernsST, PFM_MIN_PRIO) {
    ""
};
resource 'DQDU' (kDQSMCRangesST, PFM_MIN_PRIO) {
    ""
};
resource 'DQDU' (kDQSMCProblemST, PFM_MIN_PRIO) {
    ""
};
resource 'DQDU' (kDQSMCStipulationST, PFM_MIN_PRIO) {
    ""
};
resource 'DQDU' (kDQSMCSolutionST, PFM_MIN_PRIO) {
    ""
};
resource 'DQDU' (kDQSMCFocusST, PFM_MIN_PRIO) {
    ""
};
resource 'DQDU' (kDQSMCDirectionST, PFM_MIN_PRIO) {
    ""
};
resource 'DQDU' (kDQSMCUnRngST, PFM_MIN_PRIO) {
    ""
};
resource 'DQDU' (kDQSMCCrFlST, PFM_MIN_PRIO) {
    ""
};
resource 'DQDU' (kDQSMCGoalST, PFM_MIN_PRIO) {
    ""
};
resource 'DQDU' (kDQSMCRequirementST, PFM_MIN_PRIO) {
    ""
};

resource 'DQDU' (kDQSOCDomainsST, PFM_MIN_PRIO) {
    ""
};
resource 'DQDU' (kDQSOCConcernsST, PFM_MIN_PRIO) {
    ""
};
resource 'DQDU' (kDQSOCRangesST, PFM_MIN_PRIO) {
    ""
};
resource 'DQDU' (kDQSOCProblemST, PFM_MIN_PRIO) {
    ""
};
resource 'DQDU' (kDQSOCStipulationST, PFM_MIN_PRIO) {
    ""
};
resource 'DQDU' (kDQSOCSolutionST, PFM_MIN_PRIO) {
    ""
};
resource 'DQDU' (kDQSOCFocusST, PFM_MIN_PRIO) {
    ""
};
resource 'DQDU' (kDQSOCDirectionST, PFM_MIN_PRIO) {
    ""
};
resource 'DQDU' (kDQSOCUnRngST, PFM_MIN_PRIO) {
    ""
};
resource 'DQDU' (kDQSOCCrFlST, PFM_MIN_PRIO) {
    ""
};
resource 'DQDU' (kDQSOCGoalST, PFM_MIN_PRIO) {
    ""
};
resource 'DQDU' (kDQSOCRequirementST, PFM_MIN_PRIO) {
    ""
};

resource 'DQDU' (kDQSPLDomainsST, PFM_MIN_PRIO) {
    ""
};
resource 'DQDU' (kDQSPLConcernsST, PFM_MIN_PRIO) {
    ""
};
resource 'DQDU' (kDQSPLRangesST, PFM_MIN_PRIO) {
    ""
};
resource 'DQDU' (kDQSPLProblemST, PFM_MIN_PRIO) {
    ""
};
resource 'DQDU' (kDQSPLStipulationST, PFM_MIN_PRIO) {
    ""
};
resource 'DQDU' (kDQSPLSolutionST, PFM_MIN_PRIO) {
    ""
};
resource 'DQDU' (kDQSPLFocusST, PFM_MIN_PRIO) {
    ""
};
resource 'DQDU' (kDQSPLDirectionST, PFM_MIN_PRIO) {
```

```
        ""
};
resource 'DQDU' (kDQSPLUnRngST, PFM_MIN_PRIO) {
        ""
};
resource 'DQDU' (kDQSPLCrFlST, PFM_MIN_PRIO) {
        ""
};
resource 'DQDU' (kDQSPLGoalST, PFM_MIN_PRIO) {
        ""
};
resource 'DQDU' (kDQSPLRequirementST, PFM_MIN_PRIO) {
        ""
};
#endif

resource 'DQDU' (kDQSMCGenderST, PFM_MIN_PRIO) {
        ""
};
resource 'DQDU' (kDQSMCPluralityST, PFM_MIN_PRIO) {
        ""
};
resource 'DQDU' (kDQSMCVoiceST, PFM_MIN_PRIO) {
        ""
};
resource 'DQDU' (kDQSOCGenderST, PFM_MIN_PRIO) {
        ""
};
resource 'DQDU' (kDQSOCPluralityST, PFM_MIN_PRIO) {
        ""
};
resource 'DQDU' (kDQSOCVoiceST, PFM_MIN_PRIO) {
        ""
};

resource 'DQDU' (kDQSIntro, PFM_MIN_PRIO) {
        ""
};
resource 'DQDU' (kDQSTitle, PFM_MIN_PRIO) {
        ""
};
resource 'DQDU' (kDQSAuthor, PFM_MIN_PRIO) {
        ""
};
resource 'DQDU' (kDQSSetting, PFM_MIN_PRIO) {
        ""
};
resource 'DQDU' (kDQSPeriod, PFM_MIN_PRIO) {
        ""
};
resource 'DQDU' (kDQSBackground, PFM_MIN_PRIO) {
        ""
};
resource 'DQDU' (kDQSGenre, PFM_MIN_PRIO) {
        ""
};
resource 'DQDU' (kDQSTone, PFM_MIN_PRIO) {
        ""
};
resource 'DQDU' (kDQSAnalysis, PFM_MIN_PRIO) {
        ""
};
resource 'DQDU' (kDQSCreate, PFM_MIN_PRIO) {
        ""
};
resource 'DQDU' (kDQSDraft, PFM_MIN_PRIO) {
        ""
};
resource 'DQDU' (kDQSPlace, PFM_MIN_PRIO) {
        ""
};
resource 'DQDU' (kDQSSynopsis, PFM_MIN_PRIO) {
        ""
};
resource 'DQDU' (kDQSSource, PFM_MIN_PRIO) {
        ""
};
resource 'DQDU' (kDQSFormat, PFM_MIN_PRIO) {
        ""
};
resource 'DQDU' (kDQSForum, PFM_MIN_PRIO) {
        ""
};
```

```
/* ------------------------------------------------------------------------
	DQQE.R
	Dramatica's Query Questions (Topic button in DQS)
	Copyright (C) 1993 Screenplay Systems Inc.
	$Id$
------------------------------------------------------------------------ */

#ifdef macintosh
	#include "systypes.r"
	#include "types.r"
#else
	#include <systypes.r>
	#include <types.r>
#endif

#include "dqs-defs.h"

/* ------------------------------------------------------------------------
	'DQQE' - Parameterized Dramatica Query System Text.
------------------------------------------------------------------------ */
type 'DQQE' {
	cstring;			/* the stream of parameterized text */
};

resource 'DQQE' (kDQSResolve, PFM_MIN_PRIO) {
	"At the moment of truth, every Main Character must determine whether to hold on to their resolve or to change in the hope of succeeding."
};

resource 'DQQE' (kDQSOutcome, PFM_MIN_PRIO) {
	"Success or Failure is determined by whether or not the Main Character achieves their original purpose in regard to the story problem."
};

resource 'DQQE' (kDQSJudgment, PFM_MIN_PRIO) {
	"Even though the effort to achieve the story's goal may result in success, this is not necessarily a good thing for the Main Character. In fact, success might be obtained in the objective story even though the Main Character fails to resolve their personal problems. Similarly, the effort to achieve the story goal might end in failure, yet the Main Character ends up overcoming their personal problems. "
	"Just as Success and Failure evaluate the positive or negative nature of the objective story's outcome, Good and Bad indicate whether or not the Main Character resolves their personal problems."
};

resource 'DQQE' (kDQSDirection, PFM_MIN_PRIO) {
	"Sometimes a problem is made worse by having too much of something, other times by having too little. In the \"too much\" scenario, the source of the trouble needs to Stop. In the \"too little\" scenario the remedy to existing trouble must Start. A Change Main Character must either grow into a new way of being (Start) or grow out of an old way of being (Stop). "
	"A Steadfast Main Character must grow to hold out until something good can Start or hold on until something bad Stops."
};

resource 'DQQE' (kDQSDirectionA, PFM_MIN_PRIO) {
	"Sometimes a problem is made worse by having too much of something, other times by having too little. In the \"too much\" scenario, the source of the trouble needs to Stop. In the \"too little\" scenario the remedy to existing trouble must Start. A Change Main Character must either grow into a new way of being (Start) or grow out of an old way of being (Stop). "
	"A Steadfast Main Character must grow to hold out until something good can Start or hold on until something bad Stops."
};

resource 'DQQE' (kDQSDirectionB, PFM_MIN_PRIO) {
	"Sometimes a problem is made worse by having too much of something, other times by having too little. In the \"too much\" scenario, the source of the trouble needs to Stop. In the \"too little\" scenario the remedy to existing trouble must Start. A Change Main Character must either grow into a new way of being (Start) or grow out of an old way of being (Stop). "
	"A Steadfast Main Character must grow to hold out until something good can Start or hold on until something bad Stops."
};

resource 'DQQE' (kDQSWork, PFM_MIN_PRIO) {
	"A story might lean toward action, or focus on deliberation (decision). This is independent of the nature of the Main Character. For example, in an action story, the Main Character may be more of a deliberator than a person of action. Therefore, it is important for an author to separate the nature of the Main Character from that of the story as a whole."
};

resource 'DQQE' (kDQSLimit, PFM_MIN_PRIO) {
	"Every story would go on forever unless the Main Character reached a point where they are forced by circumstance to make a decision to change or remain steadfast in a \"leap of faith\". To reach this point, the Main Character must \"run out of something\". In a Time-lock, the Main Character runs out of time. In an Option-lock, the Main Character runs out of options."
};

resource 'DQQE' (kDQSApproach, PFM_MIN_PRIO) {
	"In the attempt to solve problems, there are two places a Main Character might try to make progress: internally or externally. Some Main Characters prefer to take action first, and only try to adapt to the problem if action fails. We call this kind of Main Character a \"Do-er\". The other kind of Main Character prefers to work things out internally if they can, and only take action if deliberation fails. We call this kind of Main Character a \"Be-er\"."
};

resource 'DQQE' (kDQSSex, PFM_MIN_PRIO) {
	"Every Main Character has a Mental Sex. Even if your Main Character is physically sexless, such as a tree or a rock, It will possess a female or male mind. All minds evaluate their environments in terms of both space and time. A primary difference between male and female minds is which is evaluated first. This does not prevent either mind from looking at any issue from both perspectives, but does affect the order in which they are considered."
};

resource 'DQQE' (kDQSSTDomains, PFM_MIN_PRIO) {
	"Every story is built around the difficulties created by something that is out of balance. There are four broad areas that define the \"Classes\" of inequities that can occur. These are described by the four Domains."
};

resource 'DQQE' (kDQSSTConcerns, PFM_MIN_PRIO) {
	"The story's concern describes the area in which the effects of the problem are principally felt. By defining the nature of what must be \"fixed\", the concern represents the goal or purpose sought in the story."
};

resource 'DQQE' (kDQSSTRanges, PFM_MIN_PRIO) {
	"An author must not only choose the nature of the problem in her story, but also in what light she wishes to present it. The choice of Range determines the yardstick by which the audience will be urged to measure the problem."
};
```

```
resource 'DQQE' (kDQSSTProblem, PFM_MIN_PRIO) {
	"At the heart of every story is an item that is out of balance with its surroundings.  Choosing the story's
Problem defines the nature of that imbalance."
};

resource 'DQQE' (kDQSSTStipulation, PFM_MIN_PRIO) {
	"The choice of Stipulation determines the standard by which the audience can gauge progress toward the goal."
};

resource 'DQQE' (kDQSSTSolution, PFM_MIN_PRIO) {
	"To counter the imbalance at the heart of every story is an item which can balance or resolve the story's
problem.  "
	"Choosing the story's solution defines the nature of that restoring element."
};

resource 'DQQE' (kDQSSTFocus, PFM_MIN_PRIO) {
	"The Objective Characters do not address the actual problem of the story until the climax.  Rather, they deal
with the effects of the problem, or what they believe the problem to be.  "
	"Selecting the Objective Story focus describes what the characters are focusing on until they are faced with the
problem directly."
};

resource 'DQQE' (kDQSSTDirection, PFM_MIN_PRIO) {
	"The Objective Characters do not address the actual problem of the story until the climax and are instead
dealing with the effects of the problem or what they think the problem is (called the \"Focus\").  "
	"The approach they take toward solving their focus is their Direction.  In other words, Direction describes how
the Objective Characters try to approach the problem."
};

resource 'DQQE' (kDQSSTUnRng, PFM_MIN_PRIO) {
	"The Catalyst describes what will move the story more quickly forward at points when it has slowed down."
};

resource 'DQQE' (kDQSSTCrFl, PFM_MIN_PRIO) {
	"During the attempt to achieve the story's goal, there will be times when the story's progress must be impeded
or slowed.  "
	"Choosing the Inhibitor determines the nature of this hindrance."
};

resource 'DQQE' (kDQSSTGoal, PFM_MIN_PRIO) {
	"Traditionally, Goal has been seen as the specific item the characters in a story are hoping to achieve.
Dramatica is more interested in the kind of goal than the goal itself.  Choosing the Objective Story Goal determines the
Purpose to which the characters aspire, "
	"rather than the particular achievement they hope will meet that Purpose."
};

resource 'DQQE' (kDQSSTRequirement, PFM_MIN_PRIO) {
	"Achieving the goal normally entails several steps.  Choosing the Requirement defines the nature of these
necessary pre-cursors which must be dealt with before the goal can be achieved."
};


resource 'DQQE' (kDQSMCDomains, PFM_MIN_PRIO) {
	"This choice determines the nature of what drives the Main Character.  For example, they might be driven by an
attitude they need to change or by a conviction they need to maintain.  Either way, their drive has a source.  There are
four areas in which drive can be created.  These are represented by the four Domains."
};
resource 'DQQE' (kDQSMCConcerns, PFM_MIN_PRIO) {
	"The Main Character Concern is the chief area in which they feel the effects of their problem.  It can also
represent the Main Character's goal or purpose in the story."
};
resource 'DQQE' (kDQSMCRanges, PFM_MIN_PRIO) {
	"Judgmental appreciations made by the Main Character in the course of a story are described by their Range or
Thematic Focus."
};
resource 'DQQE' (kDQSMCProblem, PFM_MIN_PRIO) {
	"This choice determines the nature of what is behind the Main Character's drive.  For example, the Main
Character might be driven to do or be something, but why?  The Main Character's problem is not necessarily a bad thing.
In fact, it is the source of their "
	"motivation and therefore represents the part of themselves that is dissatisfied with their lot."
};
resource 'DQQE' (kDQSMCStipulation, PFM_MIN_PRIO) {
	"Choosing the Main Character Stipulation determines the standard by which the audience can gauge the depth or
degree of the Main Character's Concern."
};
resource 'DQQE' (kDQSMCSolution, PFM_MIN_PRIO) {
	"This choice determines what is truly needed to satisfy the Main Character."
};
resource 'DQQE' (kDQSMCFocus, PFM_MIN_PRIO) {
	"A Main Character only deals directly with the story's problem at the climax.  "
	"Until that point, they are wholly occupied dealing with the effects of the problem.  The Main Character's Focus
determines the nature of these effects."
};
resource 'DQQE' (kDQSMCDirection, PFM_MIN_PRIO) {
	"Before a Main Character can address a story's problem directly, they must first get through the difficulties
created by that problem.  "
	"Main Character's Direction determines how the Main Character tries to approach the problem."
};
resource 'DQQE' (kDQSMCUnRng, PFM_MIN_PRIO) {
	"The attribute attached to the Main Character that makes them uniquely qualified to solve both the Objective and
Subjective Problems is described by their Unique Ability."
};
resource 'DQQE' (kDQSMCCrFl, PFM_MIN_PRIO) {
	"A Main Character could employ their Unique Ability to resolve the story as soon as it began if it were not for
a Critical Flaw that hamstrings its use."
};
resource 'DQQE' (kDQSMCGoal, PFM_MIN_PRIO) {
	"On the path toward achieving the goal, unexpected items or perks are collected that make the effort itself
worthwhile, independent of the Goal."
};
resource 'DQQE' (kDQSMCRequirement, PFM_MIN_PRIO) {
	"Choosing the nature of Forewarnings determines how an audience will know the consequence is growing more
imminent."
};


resource 'DQQE' (kDQSOCDomains, PFM_MIN_PRIO) {
	"This choice describes in general how the Obstacle Character operates.  There are four areas in which this
character's drive might operate.  Choose the one that best describes your Obstacle Character's nature.  "
};
resource 'DQQE' (kDQSOCConcerns, PFM_MIN_PRIO) {
```

```
        "The Obstacle Character Concern is the chief area they wish to impact with their efforts.  It can also represent
the nature of Obstacle Character's goal or purpose in the story."
};
resource 'DQQE' (kDQSOCRanges, PFM_MIN_PRIO) {
        "The impact of the judgments made by the Obstacle Character in the course of a story are described by their
Range or Thematic Focus.  Choosing a Range will determine the meaning of the Obstacle Character's influence."
};
resource 'DQQE' (kDQSOCProblem, PFM_MIN_PRIO) {
        "The choice of Obstacle Character Problem determines the nature of what is behind the Obstacle Character's
drive. The Obstacle Character's problem is not necessarily a bad thing.  "
        "Rather, it is the force that comes to bear on the Main Character, influencing them toward change."
};
resource 'DQQE' (kDQSOCStipulation, PFM_MIN_PRIO) {
        "Choosing the Obstacle Character Stipulation determines the standard by which the audience can measure the
extent of the Obstacle Character's concern with their problems."
};
resource 'DQQE' (kDQSOCSolution, PFM_MIN_PRIO) {
        "Choosing the Obstacle Character Solution determines what is truly needed to satisfy the Obstacle Character.
This may resolve their problem or satiate their drive."
};
resource 'DQQE' (kDQSOCFocus, PFM_MIN_PRIO) {
        "The choice of Obstacle Character focus determines the center of the Obstacle Character's attention in response
to their problem.  This is the area the Obstacle Character believes the problem can be resolved."
};
resource 'DQQE' (kDQSOCDirection, PFM_MIN_PRIO) {
        "In order for the Obstacle Character to address their problem directly, they must first get through the
difficulties created by that problem.  "
        "Obstacle Character Direction determines how the Obstacle Character tries to approach those difficulties."
};
resource 'DQQE' (kDQSOCUnRng, PFM_MIN_PRIO) {
        "The attribute attached to the Obstacle Character that makes them uniquely qualified to force the Main Character
to address their personal problem is described by their Unique Ability."
};
resource 'DQQE' (kDQSOCCrFl, PFM_MIN_PRIO) {
        ""
};
resource 'DQQE' (kDQSOCGoal, PFM_MIN_PRIO) {
        "During the attempt to achieve the story's Goal there is a price that must be paid.  Cost determines the nature
of the negatives attached to the effort."
};
resource 'DQQE' (kDQSOCRequirement, PFM_MIN_PRIO) {
        "On the path to achieving the goal, unessential restrictions may be imposed by others or oneself on the
requirements of the goal.  "
        "Preconditions are these tacked-on contingencies, extra baggage if you will."
};


resource 'DQQE' (kDQSPLDomains, PFM_MIN_PRIO) {
        "The Subjective Story Domain examines the story's problem from the character's points-of-view.  "
        "It is the broad realm in which the conflict between the Main and Obstacle Characters takes place.  "
        "Your choice defines the realm of the «I+»passionate«I-» argument of the story."
};
resource 'DQQE' (kDQSPLConcerns, PFM_MIN_PRIO) {
        "The Subjective Story Concern is the area principally affected by the conflict between the Main and Obstacle
Characters.  "
        "The two characters hold this area to be of primary personal importance to them."
};
resource 'DQQE' (kDQSPLRanges, PFM_MIN_PRIO) {
        "An author must not only choose the nature of the problem between the Main and Obstacle Character, but also the
light in which the problem is presented.  "
        "Selecting the Subjective Story Range, determines the thematic focus between the Main and Obstacle Character."
};
resource 'DQQE' (kDQSPLProblem, PFM_MIN_PRIO) {
        "At the heart of the conflict between the Main and Obstacle Characters is the Subjective Story Problem.  "
        "It is the imbalance or source or friction that is the underlying cause of the difficulties between them."
};
resource 'DQQE' (kDQSPLStipulation, PFM_MIN_PRIO) {
        "Choosing the Subjective Story Stipulation determines the standard by which the growth of the relationship
between the Main and Obstacle Character is measured."
};
resource 'DQQE' (kDQSPLSolution, PFM_MIN_PRIO) {
        "There is a specific element which can balance or resolve the conflict between the Main and Obstacle Character
which is the Subjective Story Solution.  "
        "It is what is needed in order for them to reconcile the differences in their relationship."
};
resource 'DQQE' (kDQSPLFocus, PFM_MIN_PRIO) {
        "Choosing the Subjective Story Focus determines the principal symptom of the difficulties between the Main and
Obstacle Character.  "
        "This is the area they believe the problem between them to be."
};
resource 'DQQE' (kDQSPLDirection, PFM_MIN_PRIO) {
        "Before the Main and Obstacle Character can tackle the problem between them, they must first deal with the
difficulties created by that problem.  "
        "The Direction is the apparent remedy for these difficulties, and the Main and Obstacle Character direct their
efforts here in the hope that it is the solution.  "
        "This may also become the key arena of their conflict."
};
resource 'DQQE' (kDQSPLUnRng, PFM_MIN_PRIO) {
        "Choosing the Subjective Story Catalyst defines the force that moves the relationship between the Main and
Obstacle Character forward more quickly."
};
resource 'DQQE' (kDQSPLCrFl, PFM_MIN_PRIO) {
        "The Inhibitor impedes the progress between the Main and Obstacle Character."
};
resource 'DQQE' (kDQSPLGoal, PFM_MIN_PRIO) {
        "The Consequence describes the negative aspects of a failure to achieve the Goal."
};
resource 'DQQE' (kDQSPLRequirement, PFM_MIN_PRIO) {
        "As reaching the goal has requirements, achieving requirements has prerequisites.  They are the essential terms
that must be realized in order for something to occur."
};


/*************** STORYTELLING QUESTIONS ***************/


resource 'DQQE' (kDQSResolveST, PFM_MIN_PRIO) {
        "This is for testing the Resolve Topic Question text."
};

resource 'DQQE' (kDQSMCName, PFM_MIN_PRIO) {
```

```
        "The Main Character is not necessarily the Protagonist of a story.  While the Protagonist may be the prime mover
of the Objective Story , "
        "the Main Character is the focus of the Subjective Story.  Choosing your Main Character determines through whom
the audience will experience the feel of your story."
};

resource 'DQQE' (kDQSOCName, PFM_MIN_PRIO) {
        "When an audience looks through the eyes of the Main Character, they see the Obstacle Character standing
squarely in their path.   "
        "The Obstacle Character provides constant resistance to the direction the Main Character tries to take in the
effort to resolve their personal problems."
};

#if 0
resource 'DQQE' (kDQSDirectionST, PFM_MIN_PRIO) {
        ""
};
resource 'DQQE' (kDQSApproachST, PFM_MIN_PRIO) {
        ""
};
resource 'DQQE' (kDQSSexST, PFM_MIN_PRIO) {
        ""
};
resource 'DQQE' (kDQSWorkST, PFM_MIN_PRIO) {
        ""
};
resource 'DQQE' (kDQSLimitST, PFM_MIN_PRIO) {
        ""
};
resource 'DQQE' (kDQSOutcomeST, PFM_MIN_PRIO) {
        ""
};
resource 'DQQE' (kDQSJudgmentST, PFM_MIN_PRIO) {
        ""
};

resource 'DQQE' (kDQSSTDomainsST, PFM_MIN_PRIO) {
        ""
};
resource 'DQQE' (kDQSSTConcernsST, PFM_MIN_PRIO) {
        ""
};
resource 'DQQE' (kDQSSTRangesST, PFM_MIN_PRIO) {
        ""
};
resource 'DQQE' (kDQSSTProblemST, PFM_MIN_PRIO) {
        ""
};
resource 'DQQE' (kDQSSTStipulationST, PFM_MIN_PRIO) {
        ""
};
resource 'DQQE' (kDQSSTSolutionST, PFM_MIN_PRIO) {
        ""
};
resource 'DQQE' (kDQSSTFocusST, PFM_MIN_PRIO) {
        ""
};
resource 'DQQE' (kDQSSTDirectionST, PFM_MIN_PRIO) {
        ""
};
resource 'DQQE' (kDQSSTUnRngST, PFM_MIN_PRIO) {
        ""
};
resource 'DQQE' (kDQSSTCrFlST, PFM_MIN_PRIO) {
        ""
};
resource 'DQQE' (kDQSSTGoalST, PFM_MIN_PRIO) {
        ""
};
resource 'DQQE' (kDQSSTRequirementST, PFM_MIN_PRIO) {
        ""
};


resource 'DQQE' (kDQSMCDomainsST, PFM_MIN_PRIO) {
        ""
};
resource 'DQQE' (kDQSMCConcernsST, PFM_MIN_PRIO) {
        ""
};
resource 'DQQE' (kDQSMCRangesST, PFM_MIN_PRIO) {
        ""
};
resource 'DQQE' (kDQSMCProblemST, PFM_MIN_PRIO) {
        ""
};
resource 'DQQE' (kDQSMCStipulationST, PFM_MIN_PRIO) {
        ""
};
resource 'DQQE' (kDQSMCSolutionST, PFM_MIN_PRIO) {
        ""
};
resource 'DQQE' (kDQSMCFocusST, PFM_MIN_PRIO) {
        ""
};
resource 'DQQE' (kDQSMCDirectionST, PFM_MIN_PRIO) {
        ""
};
resource 'DQQE' (kDQSMCUnRngST, PFM_MIN_PRIO) {
        ""
};
resource 'DQQE' (kDQSMCCrFlST, PFM_MIN_PRIO) {
        ""
};
resource 'DQQE' (kDQSMCGoalST, PFM_MIN_PRIO) {
        ""
};
resource 'DQQE' (kDQSMCRequirementST, PFM_MIN_PRIO) {
        ""
};
```

```
resource 'DQQE' (kDQSOCDomainsST, PFM_MIN_PRIO) {
	""
};
resource 'DQQE' (kDQSOCConcernsST, PFM_MIN_PRIO) {
	""
};
resource 'DQQE' (kDQSOCRangesST, PFM_MIN_PRIO) {
	""
};
resource 'DQQE' (kDQSOCProblemST, PFM_MIN_PRIO) {
	""
};
resource 'DQQE' (kDQSOCStipulationST, PFM_MIN_PRIO) {
	""
};
resource 'DQQE' (kDQSOCSolutionST, PFM_MIN_PRIO) {
	""
};
resource 'DQQE' (kDQSOCFocusST, PFM_MIN_PRIO) {
	""
};
resource 'DQQE' (kDQSOCDirectionST, PFM_MIN_PRIO) {
	""
};
resource 'DQQE' (kDQSOCUnRngST, PFM_MIN_PRIO) {
	""
};
resource 'DQQE' (kDQSOCCrFlST, PFM_MIN_PRIO) {
	""
};
resource 'DQQE' (kDQSOCGoalST, PFM_MIN_PRIO) {
	""
};
resource 'DQQE' (kDQSOCRequirementST, PFM_MIN_PRIO) {
	""
};

resource 'DQQE' (kDQSPLDomainsST, PFM_MIN_PRIO) {
	""
};
resource 'DQQE' (kDQSPLConcernsST, PFM_MIN_PRIO) {
	""
};
resource 'DQQE' (kDQSPLRangesST, PFM_MIN_PRIO) {
	""
};
resource 'DQQE' (kDQSPLProblemST, PFM_MIN_PRIO) {
	""
};
resource 'DQQE' (kDQSPLStipulationST, PFM_MIN_PRIO) {
	""
};
resource 'DQQE' (kDQSPLSolutionST, PFM_MIN_PRIO) {
	""
};
resource 'DQQE' (kDQSPLFocusST, PFM_MIN_PRIO) {
	""
};
resource 'DQQE' (kDQSPLDirectionST, PFM_MIN_PRIO) {
	""
};
resource 'DQQE' (kDQSPLUnRngST, PFM_MIN_PRIO) {
	""
};
resource 'DQQE' (kDQSPLCrFlST, PFM_MIN_PRIO) {
	""
};
resource 'DQQE' (kDQSPLGoalST, PFM_MIN_PRIO) {
	""
};
resource 'DQQE' (kDQSPLRequirementST, PFM_MIN_PRIO) {
	""
};

#endif

resource 'DQQE' (kDQSMCGenderST, PFM_MIN_PRIO) {
	"The gender of the Main Character is a storytelling choice that will influence some of the preconceptions
brought to bear on the Main Character by your audience.  "
	"Anticipating them, you can reinforce or undermine current attitudes toward gender through the writing this
character.  This choice need not agree with your selection of Mental Sex."
};
resource 'DQQE' (kDQSMCDesc, PFM_MIN_PRIO) {
	"The Main Character carries a tremendous amount of meaning in a story, their attributes may effect both
storyform and storytelling.  "
	"What kind of person they are at heart, what kinds of things they would and would not do will effect the story
form.  How they look and seem to behave will help determine story telling.  "
	"The more clearly you can picture this person you are writing about, the more easily you will be able to answer
questions about the Main Character."
};
resource 'DQQE' (kDQSMCPluralityST, PFM_MIN_PRIO) {
	""
};
resource 'DQQE' (kDQSMCVoiceST, PFM_MIN_PRIO) {
	""
};
resource 'DQQE' (kDQSOCGenderST, PFM_MIN_PRIO) {
	"The gender of the Obstacle Character is a storytelling choice that will influence some of the preconceptions
brought to bear by your audience on what effects the Obstacle Character will be capable of.  "
	"Anticipating them, you can reinforce or undermine current attitudes toward gender through the writing of this
character."
};
resource 'DQQE' (kDQSOCPluralityST, PFM_MIN_PRIO) {
	""
};
resource 'DQQE' (kDQSOCVoiceST, PFM_MIN_PRIO) {
	""
};
```

```
resource 'DQQE' (kDQSIntro, PFM_MIN_PRIO) {
        "The title of the story is a part of storytelling which can have great significance to the audience.  "
    .   "By emphasizing a certain theme, event or character in the title, the author can lead the audience to approach
the story with preconceptions that the author can choose to live up to or undermine."
};
resource 'DQQE' (kDQSTitle, PFM_MIN_PRIO) {
        ""
};
resource 'DQQE' (kDQSAuthor, PFM_MIN_PRIO) {
        ""
};
resource 'DQQE' (kDQSSetting, PFM_MIN_PRIO) {
        ""
};
resource 'DQQE' (kDQSPeriod, PFM_MIN_PRIO) {
        ""
};
resource 'DQQE' (kDQSBackground, PFM_MIN_PRIO) {
        ""
};
resource 'DQQE' (kDQSGenre, PFM_MIN_PRIO) {
        "Common Genre Labels:  Action-Adventure, Animation, Biographical, Black Comedy/Satire, "
        "Broad Comedy, Buddy Picture, Business, Children/Juvenille, Classroom Drama, Comedy Fantasy, Comedy Thriller, "
        "Coming of Age, Courtroom Drama, Crime Drama, Detective, Disaster, Docudrama, Documentary, Drama, Ensemble, "
        "Erotica/Sexual Obsession, Family Appeal, Female Buddy Picture, Holocaust, Horror, Love Story, Musical, Period
Piece, "
        "Police, Prison, Road Picture, Romantic Comedy, Science Fantasy, Science Fiction, Situation Comedy, "
        "Sports, Spy/Espionage, Suspense/Thriller, War or Military, Western, Whodunit, Youth Comedy, Youth Drama -- This
genre "
        "list is from \"Reading for a Living\" by T. L. Katahn"
};
resource 'DQQE' (kDQSG1Analytical, PFM_MIN_PRIO) {
        "Stories examine the difference between an all-seeing (objective) overview and a limited inside (subjective)
view of a problem.  "
        "The «I+»Analytical«I-» approach describes the story's argument based on the overview of the \"big picture\"."
};
resource 'DQQE' (kDQSG1Passionate, PFM_MIN_PRIO) {
        "Stories examine the difference between an all-seeing (objective) overview and a limited inside (subjective)
view of a problem.  "
        "The «I+»Passionate«I-» approach describes the argument based on the limited perspective of the characters."
};

resource 'DQQE' (kDQSTone, PFM_MIN_PRIO) {
        ""
};
resource 'DQQE' (kDQSAnalysis, PFM_MIN_PRIO) {
        ""
};
resource 'DQQE' (kDQSCreate, PFM_MIN_PRIO) {
        ""
};
resource 'DQQE' (kDQSDraft, PFM_MIN_PRIO) {
        ""
};
resource 'DQQE' (kDQSPlace, PFM_MIN_PRIO) {
        ""
};
resource 'DQQE' (kDQSSynopsis, PFM_MIN_PRIO) {
        ""
};
resource 'DQQE' (kDQSSource, PFM_MIN_PRIO) {
        ""
};
resource 'DQQE' (kDQSFormat, PFM_MIN_PRIO) {
        ""
};
resource 'DQQE' (kDQSForum, PFM_MIN_PRIO) {
        ""
};

resource 'DQQE' (kDQSP2Blend, PFM_MIN_PRIO) {
        "•  Your illustration of how most everyone is concerned with {SNF(STCon)}:  \"{STF(STCon)}\".\n\n"
        "•  Your illustration of {CNN(MC,NM)} is personally concerned with {SNF(MCCon)}:  \"{STF(MCCon)}\".\n\n"
        "•  Your illustration of {CNN(OC,NM)} is personally concerned with {SNF(OCCon)}:  \"{STF(OCCon)}\".\n\n"
        "•  Your illustration of how {CNN(MC,NM)} and {CNN(OC,NM)} come into conflict over {SNF(PLCon)}:
\"{STF(PLCon)}\"."
};

resource 'DQQE' (kDQSGDomain, PFM_MIN_PRIO) {
        "It is important to decide the general subject you will explore within your story.  "
        "The subject matter you choose will influence the focus of your particular story  within your chosen genre."
};

resource 'DQQE' (kDQSGClass, PFM_MIN_PRIO) {
        "Your emphasis within the story will describe the part of human nature you wish to deal with most in your story.
 "
        "Choose which of these aspects you want to examine most closely."
};
```

```
/* ---------------------------------------------------------------------------
	DQST.R
	Dramatica's Query Questions Storytelling
	Copyright (C) 1993 Screenplay Systems Inc.
	$Id: dqs-st.r,v 1.1 93/08/20 13:55:01 stephen Exp Locker: stephen $
--------------------------------------------------------------------------- */

#ifdef macintosh
	#include "systypes.r"
	#include "types.r"
#else
	#include <systypes.r>
	#include <types.r>
#endif

#include "dqs-defs.h"

/* ---------------------------------------------------------------------------
	'DQST' - Parameterized Dramatica Query System Text.
--------------------------------------------------------------------------- */
type 'DQST' {
	cstring;			/* the stream of parameterized text */
};

resource 'DQST' (kDQSResolve, PFM_MIN_PRIO) {
	"Just because a Main Character should remain steadfast does not mean they don't consider changing.  In fact,
that is the temptation with which they are constantly faced: to give up or alter their approach in the face of ever-
increasing opposition.  Action oriented Steadfast stories throw physical hurdles at a Steadfast Main Character (e.g.
James Bond as portrayed in most of the Bond films), whereas Decision oriented Steadfast stories throw mental or emotional
hurdles at a Steadfast Main Character (e.g. Job in the Old Testament of the Bible).  If, in spite of the difficulties or
suffering, the Steadfast Main Character remains steadfast, the audience still may not want them to ultimately succeed.
This occurs because simply being steadfast does not mean one is correct.  If the audience is shown that a character is
misguided yet remains steadfast, the audience will hope for their ultimate failure.  "
	"Similarly, a Change Main Character does not mean they are changing all the time.  In fact, in most cases, the
Change Main Character will resist change, all the way to the moment of truth where they must choose once and for all to
continue down the wrong path, or to jump to the right path by accepting change in themselves or their outlook.  Action
oriented Change stories offer aids and benefits to assist the Main Character in continuing down the wrong path.  Decision
oriented Change stories provide mental or emotional gratification to the Main Character, again tempting them not to
change.  Regardless of the benefits to be had by remaining steadfast, the audience will want the Change Main Character
ultimately to succeed if they are on the wrong path and change.  However, if they do not change, the audience will want
them to lose all the benefits they thought they had gained."
};

resource 'DQST' (kDQSOutcome, PFM_MIN_PRIO) {
	"For certain stories, it may be desired to have a very positive feel to the outcome by having success matched
with a positive judgment of that success.  Other times, it may be desired to have a very negative feel to the outcome by
matching failure with a negative judgment of that failure.  In the first case, we create a \"feel good\" story, as they
say in the ads.  In the second, we create a tragedy.  But all stories do not fall at one pole or the other.  Frequently,
authors choose to have a \"bad\" character succeed, and show the regrettable result of that success, or to have a
\"good\" character fail, but show how that failure was really positive for them or others."
	"\n\nWhen deciding if you want your Main Character to succeed, think not only of the stories where the winner
takes all, but of those stories where a valiant effort fails, yet the Main Character learns an important lesson about
life.  When deciding if you want your Main Character to fail, think not only of someone getting their just deserts, but
of those stories where a misguided success leads to a result opposite what the Main Character had hoped to achieve by the
success."
	"\n\nIn short, either success or failure can be seen as an \"upper\" or a \"downer\" by the audience, and the
approach you take to your message should consider that."
};

resource 'DQST' (kDQSJudgment, PFM_MIN_PRIO) {
	"The rational argument of a story deals with practicality: does the kind of approach taken lead to success or
failure in the endeavor.  In contrast, the passionate argument of a story deals with fulfillment: does the Main Character
find peace at the end of their journey?  If you want an \"upper\" story, you will want success in the objective story and
a judgment of \"good\" in the objective story.  If you want a tragedy, you will want the objective effort to fail, and
the subjective journey to end badly as well.  However, life is often made of trade-offs, compromises, sacrifices, and re-
evaluations, and so should be stories.  Choosing Success/Bad stories or Failure/Good stories opens the door to all these
alternatives.  If we choose a Failure/Good story, we can imagine a Main Character who realizes "
	"they had been fooled into trying to achieve a goal, or a Main Character who discovers something more important
to them personally in the course of trying to achieve the goal.  A Success/Bad story might end with a Main Character
achieving their dreams only to find they are meaningless, or Main Character who makes a sacrifice for the success of
others but ends up bitter and vindictive."
};

resource 'DQST' (kDQSDirection, PFM_MIN_PRIO) {
	"A good way to get a feel for this dynamic in Change Characters is to picture the Stop character as having a
chip on their shoulder and the Start character as having a hole in their heart.  If the actions or decisions taken by the
character are what make the problem worse, then they need to stop.  If the problem worsens because the character fails to
take certain \"obvious\" actions or decisions, then they need to start.  Of course, to the character, neither of these
problems is \"obvious\", as they must grow and learn to see it.  Yet, the audience can empathize with the character's
failure to see themselves as the source of the problem because the audience is afforded by the author another view the
character does not get: the objective view.  It is here that start and stop register with the audience as being obvious.
"

	"Essentially, if you want to tell a story about someone who learns they have actually been making the problem
worse, choose Stop.  If you want to tell a story about someone who has allowed a problem to become worse, choose Start.
For a Steadfast Main Character it will seem that their resolve needs to grow regardless of Start of Stop.  But if they
are a Start Character, they will be tempted by indications that the desired outcome is not going to happen or is
unattainable.  If they are a Stop Character, they will find themselves pressured to \"give in\".  Remember that direction
of growth in a Steadfast Character is largely seen in their enviroment.  Their personal growth is seen as a matter of
degree."
};

resource 'DQST' (kDQSDirectionA, PFM_MIN_PRIO) {
	"A good way to get a feel for this dynamic in Change Characters is to picture the Stop character as having a
chip on their shoulder and the Start character as having a hole in their heart.  If the actions or decisions taken by the
character are what make the problem worse, then they need to stop.  If the problem worsens because the character fails to
take certain \"obvious\" actions or decisions, then they need to start.  Of course, to the character, neither of these
problems is \"obvious\", as they must grow and learn to see it.  Yet, the audience can empathize with the character's
failure to see themselves as the source of the problem because the audience is afforded by the author another view the
character does not get: the objective view.  It is here that start and stop register with the audience as being obvious.
"

	"Essentially, if you want to tell a story about someone who learns they have actually been making the problem
worse, choose Stop.  If you want to tell a story about someone who has allowed a problem to become worse, choose Start.
For a Steadfast Main Character it will seem that their resolve needs to grow regardless of Start of Stop.  But if they
are a Start Character, they will be tempted by indications that the desired outcome is not going to happen or is
unattainable.  If they are a Stop Character, they will find themselves pressured to \"give in\".  Remember that direction
of growth in a Steadfast Character is largely seen in their enviroment.  Their personal growth is seen as a matter of
degree."
};

resource 'DQST' (kDQSDirectionB, PFM_MIN_PRIO) {
	"A good way to get a feel for this dynamic in Change Characters is to picture the Stop character as having a
chip on their shoulder and the Start character as having a hole in their heart.  If the actions or decisions taken by the
```

```
character are what make the problem worse, then they need to stop.  If the problem worsens because the character fails to
take certain \"obvious\" actions or decisions, then they need to start.  Of course, to the character, neither of these
problems is \"obvious\", as they must grow and learn to see it.  Yet, the audience can empathize with the character's
failure to see themselves as the source of the problem because the audience is afforded by the author another view the
character does not get: the objective view.  It is here that start and stop register with the audience as being obvious.
"
        "Essentially, if you want to tell a story about someone who learns they have actually been making the problem
worse, choose Stop.  If you want to tell a story about someone who has allowed a problem to become worse, choose Start.
For a Steadfast Main Character it will seem that their resolve needs to grow regardless of Start of Stop.  But if they
are a Start Character, they will be tempted by indications that the desired outcome is not going to happen or is
unattainable.  If they are a Stop Character, they will find themselves pressured to \"give in\".  Remember that direction
of growth in a Steadfast Character is largely seen in their enviroment.  Their personal growth is seen as a matter of
degree."
};

resource 'DQST' (kDQSWork, PFM_MIN_PRIO) {
        "Stories contain both action and decision.  Choosing one does not exclude the other.  Rather it merely gives
preference to one over the other.  This preference can be enhanced or nearly balanced out by other dynamic questions you
answer about your story.  It's really a matter of the background against which you want your Main Character to operate.
The choice of background does not have to reflect the nature of the Main Character.  In fact, some very interesting
dramatic potentials can be created when they do not match.  For example, a Main Character of action (called a Do-er)
forced by circumstance to handle a deliberation-type problem would find themselves at a loss for the experience and tools
they need to do the job.  "
        "Similarly, a deliberating Main Character (called a Be-er) would find themselves whipped into a turmoil if
forced to resolve a problem requiring action.  These mixed stories appear everywhere from tragedy to comedy and can add
an extra dimension to an otherwise one sided argument."
};

resource 'DQST' (kDQSLimit, PFM_MIN_PRIO) {
        "Choosing a timelock or an optionlock has a tremendous impact on the nature of the tension the audience will
feel as the story progresses toward its climax.  A timelock tends to take a single point of view and slowly fragment it
until many things are going on at once.  An optionlock tends to take many pieces of the puzzle and bring them all
together at the end.  So a timelock raises tension by dividing attention, and an optionlock raises tension by focusing
it.  Timelocks increase tension by bringing a single thing closer to being an immediate problem, optionlocks increase
tension by building a single thing that becomes a functioning problem."
        "\n\nOne cannot look just to the climax to determine if a Timelock or Optionlock is working.  Indeed, both Time
and Option locks work from the beginning of the story.  A better way to gauge which is at work is to look at the nature
of the obstacles thrown in the path of the Protagonist or Main Character.  If the obstacles are primarily delays, a
timelock is in effect; if the obstacles are caused by missing essential parts, an optionlock is in effect."
        "\n\nAn author may feel more comfortable building tension by delays or building tension by missing pieces.
Choose the kind of lock most meaningful for you."
};

resource 'DQST' (kDQSApproach, PFM_MIN_PRIO) {
        "Do-er and Be-er should not be confused with active and passive.  If a Do-er is seen as active physically, a Be-
er should be seen as active mentally.  While the Do-er jumps in an tackles the problem by physical maneuverings, the Be-
er jumps in and tackles the problem with mental deliberations.  The point is not which one is more motivated to hold
their ground but how they try to hold it.   A do-er would build a business by the sweat of their brow, a be-er would
build a business by attention to the needs of their clients.  Obviously both approaches are important, but Main
Characters, just like the real people they represent, will have a preference.  Having a preference does not mean being
less able in the other area.  "
        "A martial artist might choose to avoid conflict first as a be-er character, yet be quite capable of beating the
tar out of an opponent if avoiding conflict proved impossible.  Similarly, a school teacher might stress exercises and
homework as a do-er character, yet open her heart to a student who needs moral support."
        "\n\nWhen creating your Main Character, you may want someone who acts first and asks questions later, or you may
prefer someone who avoids conflict if possible, then lays waste the opponent if they won't compromise.  A do-er deals in
competition, a be-er in collaboration."
};

resource 'DQST' (kDQSSex, PFM_MIN_PRIO) {
        "A choice of male or female determines the manner in which the Main Character evaluates the problem, not the
conclusions they come to.  Typically, the choice is as simple as deciding if you want to tell a story about a man or a
woman.  But there is another consideration that is being employed with growing frequency in modern stories: putting the
psyche of one sex into the skin of another.  This does not refer only to the \"sex change\" comedies, but to many action
stories with female Main Characters (e.g. Aliens) and many decision stories with male Main Characters (Prince of Tides)."
        "\n\nFemale or male does not in and of itself determine do-er or be-er nor action or decision.  Rather, female
or male describes an intrinsic perception of the meaning of life, a perception underlying the actual traits of the
character.  When an author writes a part for a man, they would intuitively create a male psyche for that character.  Yet,
by simply changing the name of the character from Joe to Mary and shifting the appropriate gender terms, the character
would ostensibly become a woman.  But that woman would not seem like a woman  Even if all the specific masculine dialog
were changed, even if all the culturally dictated manifestations were altered,  the underlying psyche of the character
would have a male bias, rather than a female bias."
        "\n\nSometimes stereotypes are propagated by what an audience expects to see, which filters the message and
dilutes the truth.  By placing a female psyche in a male character or a male psyche in a female character, preconceptions
no longer prevent the message from being heard.  The word of warning is that this technique can make a Main Character
seem \"odd\" in some hard to define way to your audience.  So although the message may fare better, empathy between your
audience and your Main Character may not."
};

resource 'DQST' (kDQSSTDomains, PFM_MIN_PRIO) {
        "By choosing the Domain, the author sets the background against which the story will be told.  Therefore, its
influence is gently felt throughout the story.  A Universe story deals with an unacceptable situation -  one in which the
external environment is seen as problematic.  This could be a job situation with poor working conditions, being trapped
in a sunken ship, waking up as someone else,  living next to an orphanage that keeps you awake at night with its
screaming waifs or any other intolerable state of affairs.  A Physics story employs an activity that needs to arrive at a
solution.   This might be the effort to steal the crown Jewels, win the love of your heart's desire, make the Olympic
team, "
        "or raise the money to buy the orphanage and evict all the screaming waifs.  Note that if the existence of the
orphanage is the focus of the story, it is a Universe (situation) Domain.  However, if the effort to buy it is the focus,
it is a Physics (activity) Domain.  In a like manner, Mind Domain reflects a state of mind and Psychology Domain
describes a mental activity (or manner of thinking).  Mind Domain stories might be about prejudice, a lack of self-worth
(if it is a fixed view), or a refusal to see the value of someone's desires.  "
        "Psychology Domain supports stories where one takes too many risks, is egocentric, or makes light of serious
situations.\n\nAs a final note, it is important to keep in mind that stories are often not about a problem that exists
but a desire to be fulfilled.  Stories of this nature can create a much more positive feel as exemplified in a Universe
story in which an heiress must spend a million dollars in 24 hours to inherit 30 million more, a Physics story where a
mountaineer hopes to be the first to scale a mountain on Mars, "
        "a Mind story of unconditional love, or a Psychology story about overcoming a dependence on sedatives."
};

resource 'DQST' (kDQSSTConcerns, PFM_MIN_PRIO) {
        "The Concern of a story tends to revolve around a definable area of activity or exploration.  This central hub
may be internal such as Memory or Conceiving (coming up with an idea).  Or, it may be external such as Obtaining or
Progress.    When choosing a Concern it is often useful to ask, \"Which of these items is what I want the characters in
my story to examine?\"  Keep in mind that the Concern only describes WHAT is being looked at.  HOW to look at it is
determined by choosing the Range."
};

resource 'DQST' (kDQSSTRanges, PFM_MIN_PRIO) {
        "For any given issue there can be many points of view.  To make a successful argument an author must address
them all, yet select one as the standard perspective.  If an author wishes to explore a concept rather than argue it, she
must still touch all perspectives and select one as the view from which all the others are measured.  If this yardstick
```

```
is not provided, the audience is free to judge anything from any point of view and will simply adopt the one they are
familiar with out of habit. "
        "As a result, they will gain no new understanding and the story will have no purpose other than to reiterate
what the audience already knew. Conversely, if an author wishes to make a point or deliver a message or even document
the similarities and differences between dramatic incidents, then the events of the story must be measured against
something. Choosing the Range tells an audience by what standard the author intends them to evaluate what they
experience in the story."
};

resource 'DQST' (kDQSSTProblem, PFM_MIN_PRIO) {
        "Problems are at the heart of a story's troubles. Sometimes a problem is shown as the central cause of a number
of troubles. Other times problems are shown as the imbalance that triggers a domino effect. If a number of seemingly
unrelated items all go sour, the common connection will turn out to be the problem. If a chain of events results in
disaster, the problem can be seen as the force that started it all. When telling a story, an author has a choice of
focusing on "
        "the problem or its effects. In the first case, where the problem is at the center of troubles, the
storytelling might begin with the problem and then show how its ripples impact everything they touch as they grow around
it. Conversely, the storytelling might first explore the seemingly unrelated troubles, slowly spiraling in on the
source, which is only discovered at the end. In a more linear story, an author might begin with the problem and follow
its impact step by step "
        "to its ultimate effect. Or, working backwards, the author might begin at the effect, and trace its roots back
until the original problem is identified."
};


resource 'DQST' (kDQSSTStipulation, PFM_MIN_PRIO) {
        ""
};
resource 'DQST' (kDQSSTSolution, PFM_MIN_PRIO) {
        ""
};
resource 'DQST' (kDQSSTFocus, PFM_MIN_PRIO) {
        ""
};
resource 'DQST' (kDQSSTDirection, PFM_MIN_PRIO) {
        ""
};
resource 'DQST' (kDQSSTUnRng, PFM_MIN_PRIO) {
        ""
};
resource 'DQST' (kDQSSTCrFl, PFM_MIN_PRIO) {
        ""
};
resource 'DQST' (kDQSSTGoal, PFM_MIN_PRIO) {
        "Some stories have a single item everyone in the story is trying to achieve, such as obtaining a priceless
diamond. Other stories have the characters all seeking different goals, but of the same type, such as becoming content
in their various intimate relationships. In the first example, the Dramatica Goal would be Obtaining. In the second
example, the Dramatica Goal would be Becoming. In both cases, everyone is concerned with the same Purpose to which they
aspire, "
        "even though they are all after the same diamond but are involved in different relationships. This allows an
author to explore the different approaches that can be taken in the effort to arrive at the same purpose and argue the
point that some are appropriate and others are not."
};
resource 'DQST' (kDQSSTRequirement, PFM_MIN_PRIO) {
        ""
};


resource 'DQST' (kDQSMCDomains, PFM_MIN_PRIO) {
        "Because the Main Character stands at the root of both the Objective and Subjective problems, choosing the Main
Character's Domain has a huge impact on the relationship between the two problems, and therefore on the feel of the story
as a whole. Of the four Domains, Universe and Physics describe External problems whereas Mind and Psychology illustrate
Internal problems. As a result, the Objective Story Domain and the Main Character Domain might be in the same general
area, or on opposite sides of the tracks. When both Domains are either Internal or External we say they are a
\"Companion Pair\". Stories with External Companion Domains tend to focus on action since the "
        "dissonance (conflict) created in the story is between an external state (Universe) and an external process
(Physics). Similarly, stories with Internal Companion Domains tend to focus on deliberation since the dissonance is
between an Internal state (Mind) and an Internal Process (Psychology). In contrast, stories where one Domain is External
and the other Internal strike more of a balance between action and deliberation. As a result of this division, the
progress of the story depends on the shifting balance between Internal and External forces. This is why
Internal/External pairings of Objective Story Domain and Main Character Domain are called \"Dependent Pairs\". "
        "In Companion Pair stories, the Main Character is dealing with the issues on their own turf. In Dependent Pair
stories, the Main Character is something of a fish out of water, trying to deal with difficulties they are not really
equipped to handle, such as Romancing the Stone and Three Men and a Baby. When choosing the Main Character Domain, keep
in mind your choice for Objective Story Domain in order to create the feel you want in your story's dissonance."
};
resource 'DQST' (kDQSMCConcerns, PFM_MIN_PRIO) {
        ""
};
resource 'DQST' (kDQSMCRanges, PFM_MIN_PRIO) {
        "In order to make an Objective Thematic statement, the case for an inequity must be made consistently. However,
this tends to create a heavy-handed message that is likely to appear one-sided and obvious. Fortunately, an opportunity
exists to temper this message through the Main Character's Thematic Focus. In the midst of a battlefield our Main
Character notices a single flower growing up through the rubble. At the frenetic High School dance, a girl sits all
alone, unnoticed. How can she be unnoticed if we noticed her? Because \"objectively\" no one sees her - they are
\"all\" concerned with dancing. But the Main Character looks across the room and observes the discrepancy. "
        "In both these cases, the Objective Theme is the initial condition which is then \"shaded\" in light of the Main
Character's Theme. Conversely, the Main Character might be walking down the street, self-consciously trying to hide a
zit on the tip of their nose, when they turn a corner just in time to see the \"Burn Victim Support Group\" marching in a
parade. In this case, the Main Character's Theme is the initial condition, which is modulated by the Objective Theme.
Because these kinds of contrasts and/or reinforcements offer such fertile material for storytelling, authors often employ
these techniques in a random fashion, hoping to move the audience. "
        "Unfortunately, without a pattern to these counterpoints, after a while they begin to bog down a story since
they do not truly advance it. By choosing the Main Character's Thematic Focus, one is able to select a central topic
that serves to unify these Personal Truths into a bonded statement."
};
resource 'DQST' (kDQSMCProblem, PFM_MIN_PRIO) {
        "The term  Main Character's \"problem\" is something of a misnomer. Even though the problem is what is
\"wrong\" with the Main Character according to the outside world, if the Main Character is actually correct in their
motives and the world at large is mistaken, then this \"problem\" is what drives the Main Character to set things right.
Of course, they might fail in the attempt, but their heart is in the right place. On the other hand, the Main Character
might be mistaken, and their problem is just that: the source of all the story's difficulties. So, there are really two
ways to look at the Main Character's problem. Which is right for your story? "
        "That is determined by your answers to two of the 12 Essential Questions: Success/Failure and Good/Bad. For the
Success/Good and Failure/Bad combinations, the Main Character was on the right track, according to the author. In the
first case, it paid off and that was good. In the second it didn't pay off and that was bad. The value judgment of Good
/Bad tempers Success or Failure and in these two cases tells us that the Main Character's Problem was really best seen as
the source of their drive to set things right. However, in the Success/Bad and Failure/Good stories, the author's
message is that the Main Character was "
        "actually the cause of everyone's problems and therefore, what drove them was really the source of the inequity.
In this case, the Main Character Problem really IS a problem, and needed to be solved. Whether it was or not is
```

```
determined by Success/Failure.  These examples illustrate how the meaning of Main Character Problem changes under
different dynamic conditions.  Therefore, when answering this question, it helps to know in what dynamic context you want
your Main Character to be operating."
};
resource 'DQST' (kDQSMCStipulation, PFM_MIN_PRIO) {
        ""
};
resource 'DQST' (kDQSMCSolution, PFM_MIN_PRIO) {
        "A Main Character's Problem may be the real source of a story's difficulties or may actually be just the source
of the Main Character's drive to set things right.   As a result, its complementary Solution might be just what the
doctor ordered or an Achilles' heel that would satisfy the Main Character into letting the real problem lie.  Do you see
your Main Character as having the problem or solving the problem?  If they have the problem, then arriving at the Main
Character's solution is what the story is all about.  But if they are solving the problem, the Main Character's solution
is the one thing they must avoid at all costs."
};
resource 'DQST' (kDQSMCFocus, PFM_MIN_PRIO) {
        "Every disease has its symptoms.  Story problems operate the same way.  Depending upon the nature of the disease
and what particular strain is in question, the symptoms may vary widely.  In fact, symptoms may vary between individuals.
When we choose Main Character Domain, we are saying something about the individual.  When we choose Main Character Focus,
we are directly selecting the symptoms.  The kinds of things the Main Character talks about will center on their Focus.
This topic will be at the forefront of their thoughts and actions.  If left to their own devices, their conversation will
always drift back toward this Focus, as it is their area of greatest attention.  "
        "Quite simply, it is where the Main Character believes the problem to be.  Now, in a Main Character who is
actually the real problem themselves, they will not see it, though most everyone else may.  How can they be so blind?
Because they are focusing all of their attention elsewhere.  They have a completely developed alternate explanation of
what is behind the story's difficulties and feel that entertaining an alternative is a temptation to veer from the
correct path.  They aren't stupid, just pre-occupied.  In the case of a Main Character who is NOT the problem, but is
trying to solve the problem, then the focus really IS where they ought to be "
        "looking, and veering from that course WOULD be a temptation that could lead to disaster.  The key to having an
audience accept a misguided Main Character's apparent refusal to see themselves as the cause of the troubles or a Main
Character on the right track who never questions their own motivations, is to give them something else to Focus on."
};
resource 'DQST' (kDQSMCDirection, PFM_MIN_PRIO) {
        "When a Main Character is on the right track, they are headed in the right Direction.  But when a Main Character
is really the cause of a story's troubles, they are headed in the wrong Direction.  The things that they do and the
things that they consider are responses that all grow out of where they believe the real problem to be.  They look at
their troubles, then determine what they think is behind them.  This becomes their Focus.  Accepting this Focus as a
given, the best Direction of their efforts becomes clear.  So, when they are correct in identifying the problem, they
hack away until it appear before them.  But when they are incorrect, "
        "they may beat all round the issue and miss it entirely.  As Focus suggests what a Main Character is likely to
fixate on, so Direction determines how they are likely to respond."
};
resource 'DQST' (kDQSMCUnRng, PFM_MIN_PRIO) {
        "In order to make an Objective Thematic statement, the case for an inequity must be made consistently.  However,
this tends to create a heavy-handed message that is likely to appear one-sided and obvious.  Fortunately, an opportunity
exists to temper this message through the Main Character's Thematic Focus.  In the midst of a battlefield our Main
Character notices a single flower growing up through the rubble.  At the frenetic High School dance, a girl sits all
alone, unnoticed.  How can she be unnoticed if we noticed her?  Because \"objectively\" no one sees her - they are
\"all\" concerned with dancing.  But the Main Character looks across the room and observes the discrepancy.  "
        "In both these cases, the Objective Theme is the initial condition which is then \"shaded\" in light of the Main
Character's Theme.  Conversely, the Main Character might be walking down the street, self-consciously trying to hide a
zit on the tip of their nose, when they turn a corner just in time to see the \"Burn Victim Support Group\" marching in a
parade.  In this case, the Main Character's Theme is the initial condition, which is modulated by the Objective Theme.
Because these kinds of contrasts and/or reinforcements offer such fertile material for storytelling, authors often employ
these techniques in a random fashion, hoping to move the audience.  "
        "Unfortunately, without a pattern to these counterpoints, after a while they begin to bog down a story since
they do not truly advance it.  By choosing the Main Character's Thematic Focus, one is able to select a central topic
that serves to unify these Personal Truths into a bonded statement. "
};
resource 'DQST' (kDQSMCCrFl, PFM_MIN_PRIO) {
        "A Main Character's Critical Flaw might prevent them from using their Unique Ability or might come into play
afterward, undercutting the effectiveness they had just achieved.    This has a relationship to the Essential Question
that describes the Main Character as needing to grow either by Starting something they haven't been doing or Stopping
something they have.  If the Critical Flaw prevents the employment of their Unique Ability, they must learn to Start
employing their Unique Ability.  If the Critical Flaw undoes the work of their Unique Ability, then they must Stop doing
that!  Either way, the Main Character must learn to overcome their Critical Flaw "
        "if they are to ultimately achieve their purpose.  We are all familiar with stories where we find ourselves
saying, \"If you'd just take that step everything would be okay.\"  This is a Start, story in conjunction with a Critical
Flaw.  The Main Character is inhibited from making the efforts we feel they should.  And yet, as frustrating as this is,
we accept it because the Critical Flaw has been established as a roadblock they cannot pass and must first grow enough to
remove it.  When a Main Character lacks a Critical Flaw there is no reason provided as to why they cannot act or decide
and therefore they appear ignorant or stupid, leading us to proclaim, "
        "\"Why didn't they just........?  Its so obvious!\"  In a Stop story, the Main Character's Critical Flaw
scuttles their own efforts.  In these stories we find ourselves thinking, \"Okay, everything is going to work out.....
just don't mess it up....\"   That is where the Main Character gets the urge to sneeze and blows the window display over
or stops to tie their shoe and trips someone into the wedding cake.  Without a consistent Critical Flaw, all these
mishaps would appear coincidental, rather than a direct result of the Main Character's need for growth.  Each act, a Main
Character is faced with an opportunity to resolve a story's difficulties in a single master stroke.  "
        "It is the Critical Flaw caused by their own need for growth that inhibits or undercuts that effort until they
grow enough to address the source of their drive in the Moment of Truth at the climax."
};
resource 'DQST' (kDQSMCGoal, PFM_MIN_PRIO) {
        "Renegades trying to escape to the Badlands may come across a farmer's daughter to rape.  Joan of Arc, on her
way to be burned at the stake may see the clouds part and rays of sunshine beacon to her.  Depending upon the characters
and their Goal, certain items, events or experiences will occur that make the journey more worthwhile.  If it were not
for these Dividends the arduous endeavor would become too Costly to warrant continuing.  Characters do not simply add up
the Costs, but they average them with the Dividends to determine the overall propriety in continuing on their quest.
Dividends do not need to be tangible, "
        "but may be personal fulfillments such as visiting a foreign city, helping a child to read or the opportunity to
get the personal dossiers of co-employees one is romantically interested in.  If we look at the effort to achieve the
goal as going to work to get a paycheck, then the Costs of having to live by the rules under someone else's authority
might be balanced out by the personal friendships one has established.  Then it comes back to a choice between staying on
and achieving the Goal of a paycheck or quitting and facing the Consequence of a foreclosure.  That is the purpose of
Dividends: "
        "to balance out the Costs so that it all comes back to a decision regarding the Goal vs. the Consequence."
};
resource 'DQST' (kDQSMCRequirement, PFM_MIN_PRIO) {
        ""
};


resource 'DQST' (kDQSOCDomains, PFM_MIN_PRIO) {
        ""
};
resource 'DQST' (kDQSOCConcerns, PFM_MIN_PRIO) {
        ""
};
resource 'DQST' (kDQSOCRanges, PFM_MIN_PRIO) {
        ""
};
resource 'DQST' (kDQSOCProblem, PFM_MIN_PRIO) {
        ""
};
```

```
resource 'DQST' (kDQSOCStipulation, PFM_MIN_PRIO) {
	""
};
resource 'DQST' (kDQSOCSolution, PFM_MIN_PRIO) {
	""
};
resource 'DQST' (kDQSOCFocus, PFM_MIN_PRIO) {
	""
};
resource 'DQST' (kDQSOCDirection, PFM_MIN_PRIO) {
	""
};
resource 'DQST' (kDQSOCUnRng, PFM_MIN_PRIO) {
	""
};
resource 'DQST' (kDQSOCCrFl, PFM_MIN_PRIO) {
	""
};
resource 'DQST' (kDQSOCGoal, PFM_MIN_PRIO) {
	"Cost describes the area in which negative impact is felt as a result of the effort to overcome obstacles on the way to the Goal.  This is not unlike a Role Playing game where the Warrior loses \"life points\" or expends \"magic\" as she does battle with the evil elves.  Fighting demons takes its toll, and so does trying to get an \"A\" in math.  Whatever the Goal, there are certain steps that must be taken or obstacles that must be surmounted.  Each effort made will deplete the reserves of the character or negatively impact the character "
	"in obscure ways that make them question the worth of continuing on the journey.  This is as true of the effort to save a marriage as it is of the struggle to blow up the Orange Claw's munitions dump.  The toll adds up, the cost begins to come close to outweighing the benefits of achieving the Goal.  In fact, it may even appear prudent to cut one's losses and accept the Consequences, rather than continue to throw good effort after bad.  This is how the tension builds that makes a Main Character's leap of faith so powerful.  At the moment of climax, "
	"the Cost balances out the Goal and there is no clear right or wrong of it.  Its just a throw of the dice for the character as to whether its better to hold on to the end or toss in the towel.  Some stories slowly build the Cost so that it reaches that balance gradually.  This makes the character feel as if the weight dragging them back is slowing increasing until they are dead in the water.  Other stories keep the costs low and balance it out right before the climax with one huge cost that must be paid all at once.  "
	"Again, this is a matter of intensity and completely open to manipulation.  However, the kind of Cost incurred is dependent upon Goal, Consequence, and Requirements, so that it might fully illustrate the debits against the Story Mind as it grapples with a particular nature of problem."
};
resource 'DQST' (kDQSOCRequirement, PFM_MIN_PRIO) {
	""
};


resource 'DQST' (kDQSPLDomains, PFM_MIN_PRIO) {
	""
};
resource 'DQST' (kDQSPLConcerns, PFM_MIN_PRIO) {
	""
};
resource 'DQST' (kDQSPLRanges, PFM_MIN_PRIO) {
	""
};
resource 'DQST' (kDQSPLProblem, PFM_MIN_PRIO) {
	""
};
resource 'DQST' (kDQSPLStipulation, PFM_MIN_PRIO) {
	""
};
resource 'DQST' (kDQSPLSolution, PFM_MIN_PRIO) {
	""
};
resource 'DQST' (kDQSPLFocus, PFM_MIN_PRIO) {
	""
};
resource 'DQST' (kDQSPLDirection, PFM_MIN_PRIO) {
	""
};
resource 'DQST' (kDQSPLUnRng, PFM_MIN_PRIO) {
	""
};
resource 'DQST' (kDQSPLCrFl, PFM_MIN_PRIO) {
	""
};
resource 'DQST' (kDQSPLGoal, PFM_MIN_PRIO) {
	"Often the Consequence is seen as something bad that will happen if the Goal is not achieved.  However, it is just as functional to have a negative situation already existing that the characters hope to stop by achieving the Goal.  In fact, if a villain is the Main Character, the Goal may be the negative item and the Consequence positive, as in \"How The Grinch Stole Christmas\".  Goal, therefore does not have to be good and the Consequence does not have to be bad.  Rather, Consequence is the alternative to what will happen if the Goal is not achieved.  "
	"Goal, therefore is a state of things that does not yet exist.  It is Purpose of the plot.  It is what all the effort is trying to achieve.  But WHY?  Because of what will happen if it is not achieved: the Consequence.  The wider the gap between the alternatives, the greater the dramatic tension.  Still, intense dramatic tension is not always to be desired.  In a story intended to be a playful romp, the discrepancy between Goal and Consequence might be intentionally kept to a minimum.  This way, although there is not much to gain, "
	"there is also not much to lose and everyone is still friends at the end.  In the opposite extreme, simply selecting death as a Consequence fails to describe how that relates to whatever the Goal is.  What does that death mean?  Is it a failure to Learn that resulted in death?  A failure to truly Become something?  In respect to Goal, Dramatica is concerned with the Purpose of the plot.  In respect to Consequence, Dramatica is concerned with how the plot should be Evaluated.  What does it mean to achieve the Goal?  What does it mean to fail.  "
	"This context is provided by the selection of Consequence."
};
resource 'DQST' (kDQSPLRequirement, PFM_MIN_PRIO) {
	""
};


/***************  STORYTELLING QUESTIONS ***************/


resource 'DQST' (kDQSResolveST, PFM_MIN_PRIO) {
	"This is for testing the Resolve Storytelling text."
};

resource 'DQST' (kDQSMCName, PFM_MIN_PRIO) {
	"A Protagonist is an objective archetype.  This means that they play a role in the Objective (dispassionate) argument of the story and also that they represent a very specific arrangement of characteristics.  Because they contain all the elements needed to build a fully functional character, archetypal Protagonists are an efficient way to illustrate the effect of the characteristics they represent.  In fact, there are eight archetypes that represent a total of 64 different elements.  However, archetypes are but one way to illustrate those qualities.  "
	"The individual elements can be swapped between archetypes or spread among several.  Archetypes can be broken up and reassembled.  Characters can even be built from the ground up assembling the elements in many different
```

```
arrangements.\n\nAll this goes on independently of who the Main Character is.  The Main Character does not represent a
function, but rather a point of view.  It is through the Main Character's eyes that the audience experiences what it
would be like if the story's problems happened to them.  In real life we may be at the heart of the effort "
        "to resolve various problems, near the edge, or only peripherally involved in the effort, even though we are
aware of and affected by it.  It is the same with stories.  By selecting any one of the objective characters (archetype
or not) as the Main Character, you can select the angle from which the audience will experience the story at a personal
level.  And, if you really want, you can even make the Main Character the Protagonist!"
};

resource 'DQST' (kDQSOCName, PFM_MIN_PRIO) {
        "Perhaps the most simple way to populate a story is to create the eight perfectly balanced archetypal
characters.  Two of these characters are the Protagonist and the Antagonist.  The archetypal Protagonist is for the goal,
the archetypal Antagonist is against it.  Next, just assign the role of Main Character to the Protagonist and the role of
Obstacle Character to the Antagonist.  You have now created a story in which the audience sees through the eyes of the
character who is the prime mover in the attempt "
        "to achieve the goal and the prime obstacle in the path to both achieving the goal and resolving their personal
problems is the Obstacle Character/Antagonist.  Now that we've gotten THAT out of our systems, lets see how creative we
can be.  How about a story where the ANTAGONIST is the Main Character and the PROTAGONIST is the Obstacle?  Suddenly we
look through the eyes of the character opposed to the goal and we are trying to stop them from succeeding.  In addition,
this rather forward person is "
        "messing up our effort to arrive at personal fulfillment as well.  Get more creative.  How about a love
triangle, where the Main Character is the Protagonist, the Obstacle Character is their spouse, and the Antagonist is
their boss.  Suddenly we see an Objective Story and s Subjective Story.  In the Objective Story the Protagonist must work
late or risk losing their job.  In the Objective Story their spouse threatens to leave if they don't get more attention.
One plays to the intellect, the other to the heart.  "
        "One blocks the path to satisfaction, the other to fulfillment.  Any objective character can be chosen to carry
an additional banner as the Obstacle Character.  By making your selection as to who that should be, you set up a lot of
the dramatic framework that will determine the kinds of pressure and decisions your Main Character will face."
};

#if 0
resource 'DQST' (kDQSDirectionST, PFM_MIN_PRIO) {
        ""
};
resource 'DQST' (kDQSApproachST, PFM_MIN_PRIO) {
        ""
};
resource 'DQST' (kDQSSexST, PFM_MIN_PRIO) {
        ""
};
resource 'DQST' (kDQSWorkST, PFM_MIN_PRIO) {
        ""
};
resource 'DQST' (kDQSLimitST, PFM_MIN_PRIO) {
        ""
};
resource 'DQST' (kDQSOutcomeST, PFM_MIN_PRIO) {
        ""
};
resource 'DQST' (kDQSJudgmentST, PFM_MIN_PRIO) {
        ""
};

resource 'DQST' (kDQSSTDomainsST, PFM_MIN_PRIO) {
        ""
};
resource 'DQST' (kDQSSTConcernsST, PFM_MIN_PRIO) {
        ""
};
resource 'DQST' (kDQSSTRangesST, PFM_MIN_PRIO) {
        ""
};
resource 'DQST' (kDQSSTProblemST, PFM_MIN_PRIO) {
        ""
};
resource 'DQST' (kDQSSTStipulationST, PFM_MIN_PRIO) {
        ""
};
resource 'DQST' (kDQSSTSolutionST, PFM_MIN_PRIO) {
        ""
};
resource 'DQST' (kDQSSTFocusST, PFM_MIN_PRIO) {
        ""
};
resource 'DQST' (kDQSSTDirectionST, PFM_MIN_PRIO) {
        ""
};
resource 'DQST' (kDQSSTUnRngST, PFM_MIN_PRIO) {
        ""
};
resource 'DQST' (kDQSSTCrFlST, PFM_MIN_PRIO) {
        ""
};
resource 'DQST' (kDQSSTGoalST, PFM_MIN_PRIO) {
        ""
};
resource 'DQST' (kDQSSTRequirementST, PFM_MIN_PRIO) {
        ""
};


resource 'DQST' (kDQSMCDomainsST, PFM_MIN_PRIO) {
        ""
};
resource 'DQST' (kDQSMCConcernsST, PFM_MIN_PRIO) {
        ""
};
resource 'DQST' (kDQSMCRangesST, PFM_MIN_PRIO) {
        ""
};
resource 'DQST' (kDQSMCProblemST, PFM_MIN_PRIO) {
        ""
};
resource 'DQST' (kDQSMCStipulationST, PFM_MIN_PRIO) {
        ""
};
resource 'DQST' (kDQSMCSolutionST, PFM_MIN_PRIO) {
        ""
};
resource 'DQST' (kDQSMCFocusST, PFM_MIN_PRIO) {
        ""
```

```
};
resource 'DQST' (kDQSMCDirectionST, PFM_MIN_PRIO) {
    ""
};
resource 'DQST' (kDQSMCUnRngST, PFM_MIN_PRIO) {
    ""
};
resource 'DQST' (kDQSMCCrFlST, PFM_MIN_PRIO) {
    ""
};
resource 'DQST' (kDQSMCGoalST, PFM_MIN_PRIO) {
    ""
};
resource 'DQST' (kDQSMCRequirementST, PFM_MIN_PRIO) {
    ""
};

resource 'DQST' (kDQSOCDomainsST, PFM_MIN_PRIO) {
    ""
};
resource 'DQST' (kDQSOCConcernsST, PFM_MIN_PRIO) {
    ""
};
resource 'DQST' (kDQSOCRangesST, PFM_MIN_PRIO) {
    ""
};
resource 'DQST' (kDQSOCProblemST, PFM_MIN_PRIO) {
    ""
};
resource 'DQST' (kDQSOCStipulationST, PFM_MIN_PRIO) {
    ""
};
resource 'DQST' (kDQSOCSolutionST, PFM_MIN_PRIO) {
    ""
};
resource 'DQST' (kDQSOCFocusST, PFM_MIN_PRIO) {
    ""
};
resource 'DQST' (kDQSOCDirectionST, PFM_MIN_PRIO) {
    ""
};
resource 'DQST' (kDQSOCUnRngST, PFM_MIN_PRIO) {
    ""
};
resource 'DQST' (kDQSOCCrFlST, PFM_MIN_PRIO) {
    ""
};
resource 'DQST' (kDQSOCGoalST, PFM_MIN_PRIO) {
    ""
};
resource 'DQST' (kDQSOCRequirementST, PFM_MIN_PRIO) {
    ""
};

resource 'DQST' (kDQSPLDomainsST, PFM_MIN_PRIO) {
    ""
};
resource 'DQST' (kDQSPLConcernsST, PFM_MIN_PRIO) {
    ""
};
resource 'DQST' (kDQSPLRangesST, PFM_MIN_PRIO) {
    ""
};
resource 'DQST' (kDQSPLProblemST, PFM_MIN_PRIO) {
    ""
};
resource 'DQST' (kDQSPLStipulationST, PFM_MIN_PRIO) {
    ""
};
resource 'DQST' (kDQSPLSolutionST, PFM_MIN_PRIO) {
    ""
};
resource 'DQST' (kDQSPLFocusST, PFM_MIN_PRIO) {
    ""
};
resource 'DQST' (kDQSPLDirectionST, PFM_MIN_PRIO) {
    ""
};
resource 'DQST' (kDQSPLUnRngST, PFM_MIN_PRIO) {
    ""
};
resource 'DQST' (kDQSPLCrFlST, PFM_MIN_PRIO) {
    ""
};
resource 'DQST' (kDQSPLGoalST, PFM_MIN_PRIO) {
    ""
};
resource 'DQST' (kDQSPLRequirementST, PFM_MIN_PRIO) {
    ""
};
#endif

resource 'DQST' (kDQSMCGenderST, PFM_MIN_PRIO) {
    ""
};
resource 'DQST' (kDQSMCPluralityST, PFM_MIN_PRIO) {
    ""
};
resource 'DQST' (kDQSMCVoiceST, PFM_MIN_PRIO) {
    ""
};
resource 'DQST' (kDQSOCGenderST, PFM_MIN_PRIO) {
    ""
};
resource 'DQST' (kDQSOCPluralityST, PFM_MIN_PRIO) {
    ""
};
resource 'DQST' (kDQSOCVoiceST, PFM_MIN_PRIO) {
    ""
};
```

```
resource 'DQST' (kDQSIntro, PFM_MIN_PRIO) {
        ""
};
resource 'DQST' (kDQSTitle, PFM_MIN_PRIO) {
        ""
};
resource 'DQST' (kDQSAuthor, PFM_MIN_PRIO) {
        ""
};
resource 'DQST' (kDQSSetting, PFM_MIN_PRIO) {
        ""
};
resource 'DQST' (kDQSPeriod, PFM_MIN_PRIO) {
        ""
};
resource 'DQST' (kDQSBackground, PFM_MIN_PRIO) {
        ""
};
resource 'DQST' (kDQSGenre, PFM_MIN_PRIO) {
        ""
};
resource 'DQST' (kDQSTone, PFM_MIN_PRIO) {
        ""
};
resource 'DQST' (kDQSAnalysis, PFM_MIN_PRIO) {
        ""
};
resource 'DQST' (kDQSCreate, PFM_MIN_PRIO) {
        ""
};
resource 'DQST' (kDQSDraft, PFM_MIN_PRIO) {
        ""
};
resource 'DQST' (kDQSPlace, PFM_MIN_PRIO) {
        ""
};
resource 'DQST' (kDQSSynopsis, PFM_MIN_PRIO) {
        ""
};
resource 'DQST' (kDQSSource, PFM_MIN_PRIO) {
        ""
};
resource 'DQST' (kDQSFormat, PFM_MIN_PRIO) {
        ""
};
resource 'DQST' (kDQSForum, PFM_MIN_PRIO) {
        ""
};
```

```
/***********************************************************************
        DQS2.CC
        Dramatica Query System (2nd version)
        (c) 1993 Screenplay Systems
        Authors:          S. Greenfield & C. Huntley
        Created:          July 19, 1993
        Revised:          $Id$
************************************************************************

*/

#include "tappl.h"
#include "appdlogs.h"
#include "graphics.h"
#include "grphitms.h"
#include "twindow.h"
#include "tview.h"
#include "appcntls.h"
#include "apputls.h"
#include "listview.h"
#include "editview.h"

#include "structs.h"
#include "address.h"
#include "miscutil.h"
#include "dramatic.h"
#include "document.h"

#include "topicvw.h"
#include "helppal.h"
#include "cpanel.h"
#include "storytbl.h"
#include "subtext.h"
#include "apprdefs.h"
#include "semtable.h"
#include "dqs2.h"

#include "dqs-defs.h"

const GLColor     kMyBtnOnClr       = { 0x0000, 0x0000, 45300 };


#pragma segment dqs2


/* ==========================================================================
                                        TABLE OF ATTRIBUTES FOR ALL QUESTIONS
   ========================================================================== */

typedef struct {
        char*                           title;          // Title of question
        short                           type;           // Type of question
        appr_index_t      apprIndex;          // index into appr table for semVal to determine if question is answered
#ifndef NDEBUG
        short                           debug_ID;       // What the actual index whould be -- used only for debugging
#endif
} DQSQuestList;

#ifndef NDEBUG
        #define DBID(x)             , x
#else
        #define DBID(x)
#endif

DQSQuestList allDQSQuestions[kNmOfDQSQuestions] =
{
        { "Home Window",                xTQTutorial,            0
        DBID(kDQSHome)                           },
        { "Introduction",                        xTQTutorial,            0
        DBID(kDQSIntro)                          },
        { "Story Title",                xTQOther,                        0
        DBID(kDQSTitle)                          },
        { "Story Author",                        xTQOther,                        0
        DBID(kDQSAuthor)                },
        { "Story Setting",                       xTQOther,                        0
        DBID(kDQSSetting)                        },
        { "Story Period",                        xTQOther,                        0
        DBID(kDQSPeriod)                },
        { "Story Background",           xTQOther,                        0
        DBID(kDQSBackground)            },
        { "Story Genre",                xTQOther,                        0
        DBID(kDQSGenre)                          },
        { "Story Tone",                          xTQOther,                        0
        DBID(kDQSTone)                           },
        { "Story Analyst",                       xTQOther,                        0
        DBID(kDQSAnalysis)                       },
        { "Creation or Analysis",  xTQOther,            0
        DBID(kDQSCreate)                },
        { "Story Draft",                xTQOther,                        0
        DBID(kDQSDraft)                          },
        { "Story Placement",            xTQOther,                        0
        DBID(kDQSPlace)                          },
        { "Story Synopsis",                      xTQOther,                        0
        DBID(kDQSSynopsis)                       },
        { "Story Sources",                       xTQOther,                        0
        DBID(kDQSSource)                },
        { "Story Format",                        xTQOther,                        0
        DBID(kDQSFormat)                },
        { "Story Forum",                xTQOther,                        0
        DBID(kDQSForum)                          },

        { "MC Resolve",                          xTQStructure,           kApprResolve      DBID(kDQSResolve)
                        },
        { "MC Direction",                        xTQStructure,           kApprDirection    DBID(kDQSDirection)
                        },
        { "MC Approach",                xTQStructure,           kApprApproach     DBID(kDQSApproach)
                },
        { "MC Mental Sex",                       xTQStructure,           kApprSex
        DBID(kDQSSex)                            },
        { "Story Work",                          xTQStructure,           kApprWork
        DBID(kDQSWork)                           },
        { "Story Limit",                xTQStructure,           kApprLimit        DBID(kDQSLimit)
                        },
```

```
{ "Story Outcome",                    xTQStructure,          kApprOutcome      DBID(kDQSOutcome)
        },
{ "Story Judgment",                   xTQStructure,          kApprJudgment     DBID(kDQSJudgment)
        },

{ "Main Character Name",   xTQOther,                  0
DBID(kDQSMCName)                  },
{ "MC Description",                   xTQStorytelling,  0
DBID(kDQSMCDesc)                  },
{ "Obstacle Character Name",xTQOther,                 0
DBID(kDQSOCName)                  },
{ "OC Description",                   xTQStorytelling,  0
DBID(kDQSOCDesc)                  },

{ "OS Domain",                        xTQStructure,          kApprSTDom
DBID(kDQSSTDomains)                   },
{ "OS Concern",                       xTQStructure,          kApprSTCon
DBID(kDQSSTConcerns)              },
{ "OS Range",                         xTQStructure,          kApprSTRng
DBID(kDQSSTRanges)                    },
{ "OS Problem",                       xTQStructure,          kApprSTPbm
DBID(kDQSSTProblem)                   },
{ "OS Stipulation",                   xTQStructure,          kApprSTStp
DBID(kDQSSTStipulation)           },
{ "OS Solution",                  xTQStructure,          kApprSTSol               DBID(kDQSSTSolution)
        },
{ "OS Focus",                         xTQStructure,          kApprSTFoc
DBID(kDQSSTFocus)                     },
{ "OS Direction",                     xTQStructure,          kApprSTDir
DBID(kDQSSTDirection)             },
{ "OS Catalyst",                  xTQStructure,          kApprSTUnRng      DBID(kDQSSTUnRng)
        },
{ "OS Inhibitor",                     xTQStructure,          kApprSTCrFl
DBID(kDQSSTCrFl)                  },
{ "Story Goal",                       xTQStructure,          kApprSTGoal
DBID(kDQSSTGoal)                  },
{ "Story Requirement",            xTQStructure,          kApprSTReq
DBID(kDQSSTRequirement)           },

{ "MC Domain",                        xTQStructure,          kApprMCDom
DBID(kDQSMCDomains)                   },
{ "MC Concern",                       xTQStructure,          kApprMCCon
DBID(kDQSMCConcerns)              },
{ "MC Range",                         xTQStructure,          kApprMCRng
DBID(kDQSMCRanges)                    },
{ "MC Problem",                       xTQStructure,          kApprMCPbm
DBID(kDQSMCProblem)                   },
{ "MC Stipulation",                   xTQStructure,          kApprMCStp
DBID(kDQSMCStipulation)           },
{ "MC Solution",                  xTQStructure,          kApprMCSol               DBID(kDQSMCSolution)
        },
{ "MC Focus",                         xTQStructure,          kApprMCFoc
DBID(kDQSMCFocus)                     },
{ "MC Direction",                     xTQStructure,          kApprMCDir
DBID(kDQSMCDirection)             },
{ "MC Unique Ability",            xTQStructure,          kApprMCUnRng      DBID(kDQSMCUnRng)
        },
{ "MC Critical Flaw",             xTQStructure,          kApprMCCrFl              DBID(kDQSMCCrFl)
        },
{ "Story Dividend",                   xTQStructure,          kApprMCGoal
DBID(kDQSMCGoal)                  },
{ "Story Forewarnings",           xTQStructure,          kApprMCReq
DBID(kDQSMCRequirement)           },

{ "OC Domain",                        xTQStructure,          kApprOCDom
DBID(kDQSOCDomains)                   },
{ "OC Concern",                       xTQStructure,          kApprOCCon
DBID(kDQSOCConcerns)              },
{ "OC Range",                         xTQStructure,          kApprOCRng
DBID(kDQSOCRanges)                    },
{ "OC Problem",                       xTQStructure,          kApprOCPbm
DBID(kDQSOCProblem)                   },
{ "OC Stipulation",                   xTQStructure,          kApprOCStp
DBID(kDQSOCStipulation)           },
{ "OC Solution",                  xTQStructure,          kApprOCSol               DBID(kDQSOCSolution)
        },
{ "OC Focus",                         xTQStructure,          kApprOCFoc
DBID(kDQSOCFocus)                     },
{ "OC Direction",                     xTQStructure,          kApprOCDir
DBID(kDQSOCDirection)             },
{ "OC Unique Ability",            xTQStructure,          kApprOCUnRng      DBID(kDQSOCUnRng)
        },
{ "OC Critical Flaw",             xTQStructure,          kApprOCCrFl              DBID(kDQSOCCrFl)
        },
{ "Story Costs",                  xTQStructure,          kApprOCGoal              DBID(kDQSOCGoal)
        },
{ "Story Preconditions",   xTQStructure,        kApprOCReq             DBID(kDQSOCRequirement)
},

{ "SS Domain",                        xTQStructure,          kApprPLDom
DBID(kDQSPLDomains)                   },          // 64 -
{ "SS Concern",                       xTQStructure,          kApprPLCon
DBID(kDQSPLConcerns)              },          // 65 -
{ "SS Range",                         xTQStructure,          kApprPLRng
DBID(kDQSPLRanges)                    },          // 66 -
{ "SS Problem",                       xTQStructure,          kApprPLPbm
DBID(kDQSPLProblem)                   },          // 67 -
{ "SS Stipulation",                   xTQStructure,          kApprPLStp
DBID(kDQSPLStipulation)           },          // 68 -
{ "SS Solution",                  xTQStructure,          kApprPLSol               DBID(kDQSPLSolution)
        },                 // 69 -
{ "SS Focus",                         xTQStructure,          kApprPLFoc
DBID(kDQSPLFocus)                     },          // 70 -
{ "SS Direction",                     xTQStructure,          kApprPLDir
DBID(kDQSPLDirection)             },          // 71 -
{ "SS Catalyst",                  xTQStructure,          kApprPLUnRng      DBID(kDQSPLUnRng)
        },                 // 72 -
{ "SS Inhibitor",                     xTQStructure,          kApprPLCrFl
DBID(kDQSPLCrFl)                  },          // 73 -
{ "Story Consequence",            xTQStructure,          kApprPLGoal              DBID(kDQSPLGoal)
        },                 // 74 -
{ "Story Prerequisites",   xTQStructure,        kApprPLReq             DBID(kDQSPLRequirement)
},              // 75 -
```

```
{ "Change Direction",        xTQStructure,      kApprDirection   DBID(kDQSDirectionA)   },   // 76 -
{ "Steadfast Direction",     xTQStructure,      kApprDirection   DBID(kDQSDirectionB)   },   // 77 -

{ "MC Resolve",              xTQStorytelling,   0   DBID(kDQSResolveST)   },   // 78 -
{ "MC Direction",            xTQStorytelling,   0   DBID(kDQSDirectionST)   },   // 79 -
{ "MC Approach",             xTQStorytelling,   0   DBID(kDQSApproachST)   },   // 80 -
{ "MC Mental Sex",           xTQStorytelling,   0   DBID(kDQSSexST)   },   // 81 -

{ "OS Work",                 xTQStorytelling,   0   DBID(kDQSWorkST)   },   // 82 -
{ "OS Limit",                xTQStorytelling,   0   DBID(kDQSLimitST)   },   // 83 -
{ "OS Outcome",              xTQStorytelling,   0   DBID(kDQSOutcomeST)   },   // 84 -
{ "SS Judgment",             xTQStorytelling,   0   DBID(kDQSJudgmentST)   },   // 85 -

{ "OS Domain",               xTQStorytelling,   0   DBID(kDQSSTDomainsST)   },   // 86 -
{ "OS Concern",              xTQStorytelling,   0   DBID(kDQSSTConcernsST)   },   // 87 -
{ "OS Range",                xTQStorytelling,   0   DBID(kDQSSTRangesST)   },   // 88 -
{ "OS Problem",              xTQStorytelling,   0   DBID(kDQSSTProblemST)   },   // 89 -
{ "OS Stipulation",          xTQStorytelling,   0   DBID(kDQSSTStipulationST)   },   // 90 -
{ "OS Solution",             xTQStorytelling,   0   DBID(kDQSSTSolutionST)   },   // 91 -
{ "OS Focus",                xTQStorytelling,   0   DBID(kDQSSTFocusST)   },   // 92 -
{ "OS Direction",            xTQStorytelling,   0   DBID(kDQSSTDirectionST)   },   // 93 -
{ "OS Catalyst",             xTQStorytelling,   0   DBID(kDQSSTUnRngST)   },   // 94 -
{ "OS Inhibitor",            xTQStorytelling,   0   DBID(kDQSSTCrFlST)   },   // 95 -
{ "Story Goal",              xTQStorytelling,   0   DBID(kDQSSTGoalST)   },   // 96 -
{ "Story Requirement",       xTQStorytelling,   0   DBID(kDQSSTRequirementST)   },   // 97 -

{ "MC Domain",               xTQStorytelling,   0   DBID(kDQSMCDomainsST)   },   // 98 -
{ "MC Concern",              xTQStorytelling,   0   DBID(kDQSMCConcernsST)   },   // 99 -
{ "MC Range",                xTQStorytelling,   0   DBID(kDQSMCRangesST)   },   // 100 -
{ "MC Problem",              xTQStorytelling,   0   DBID(kDQSMCProblemST)   },   // 101 -
{ "MC Stipulation",          xTQStorytelling,   0   DBID(kDQSMCStipulationST)   },   // 102 -
{ "MC Solution",             xTQStorytelling,   0   DBID(kDQSMCSolutionST)   },   // 103 -
{ "MC Focus",                xTQStorytelling,   0   DBID(kDQSMCFocusST)   },   // 104 -
{ "MC Direction",            xTQStorytelling,   0   DBID(kDQSMCDirectionST)   },   // 105 -
{ "MC Unique Ability",       xTQStorytelling,   0   DBID(kDQSMCUnRngST)   },   // 106 -
{ "MC Critical Flaw",        xTQStorytelling,   0   DBID(kDQSMCCrFlST)   },   // 107 -
{ "Story Dividend",          xTQStorytelling,   0   DBID(kDQSMCGoalST)   },   // 108 -
{ "Story Forewarnings",      xTQStorytelling,   0   DBID(kDQSMCRequirementST)   },   // 109 -

{ "OC Domain",               xTQStorytelling,   0   DBID(kDQSOCDomainsST)   },   // 110 -
{ "OC Concern",              xTQStorytelling,   0   DBID(kDQSOCConcernsST)   },   // 111 -
{ "OC Range",                xTQStorytelling,   0   DBID(kDQSOCRangesST)   },   // 112 -
{ "OC Problem",              xTQStorytelling,   0   DBID(kDQSOCProblemST)   },   // 113 -
{ "OC Stipulation",          xTQStorytelling,   0   DBID(kDQSOCStipulationST)   },   // 114 -
{ "OC Solution",             xTQStorytelling,   0   DBID(kDQSOCSolutionST)   },   // 115 -
{ "OC Focus",                xTQStorytelling,   0   DBID(kDQSOCFocusST)   },   // 116 -
{ "OC Direction",            xTQStorytelling,   0   DBID(kDQSOCDirectionST)   },   // 117 -
{ "OC Unique Ability",       xTQStorytelling,   0   DBID(kDQSOCUnRngST)   },   // 118 -
{ "OC Critical Flaw",        xTQStorytelling,   0   DBID(kDQSOCCrFlST)   },   // 119 -
{ "Story Costs",             xTQStorytelling,   0   DBID(kDQSOCGoalST)   },   // 120 -
{ "Story Preconditions",     xTQStorytelling,   0   DBID(kDQSOCRequirementST)   },   // 121 -

{ "SS Domain",               xTQStorytelling,   0   DBID(kDQSPLDomainsST)   },   // 122 -
{ "SS Concern",              xTQStorytelling,   0   DBID(kDQSPLConcernsST)   },   // 123 -
{ "SS Range",                xTQStorytelling,   0   DBID(kDQSPLRangesST)   },   // 124 -
{ "SS Problem",              xTQStorytelling,   0   DBID(kDQSPLProblemST)   },   // 125 -
{ "SS Stipulation",          xTQStorytelling,   0   DBID(kDQSPLStipulationST)   },   // 126 -
{ "SS Solution",             xTQStorytelling,   0   DBID(kDQSPLSolutionST)   },   // 127 -
```

```
{ "SS Focus",                          xTQStorytelling,                 0
DBID(kDQSPLFocusST)                    },              // 128 -
{ "SS Direction",                      xTQStorytelling,                 0
DBID(kDQSPLDirectionST)          },           // 129 -
{ "SS Catalyst",                 xTQStorytelling,          0              DBID(kDQSPLUnRngST)
            },                   // 130 -
{ "SS Inhibitor",                      xTQStorytelling,                 0
DBID(kDQSPLCrFlST)                     },              // 131 -
{ "Story Consequence",           xTQStorytelling,          0              DBID(kDQSPLGoalST)
            },                   // 132 -
{ "Story Prerequisites",   xTQStorytelling,            0            DBID(kDQSPLRequirementST)  },
      // 133 -

{ "MC Gender",                         xTQStorytelling,                 0
DBID(kDQSMCGenderST)             },           // 134 -
{ "MC \"Plurality\"",            xTQStorytelling,          0
DBID(kDQSMCPluralityST)          },           // 135 -
{ "MC \"Voice\"",                      xTQStorytelling,                 0
DBID(kDQSMCVoiceST)                    },              // 136 -

{ "OC Gender",                         xTQStorytelling,                 0
DBID(kDQSOCGenderST)             },           // 137 -
{ "OC \"Plurality\"",            xTQStorytelling,          0
DBID(kDQSOCPluralityST)          },           // 138 -
{ "OC \"Voice\"",                      xTQStorytelling,                 0
DBID(kDQSOCVoiceST)                    },              // 139 -

{ "Quick Story Introduction",               xTQTutorial,     0              DBID(kDQSQSIntroTI)
            },                   // 140 -
{ "Character Dynamics Intro",               xTQTutorial,     0              DBID(kDQSQSCharDynTI)
      },              // 141 -
{ "Plot Dynamics Intro",                    xTQTutorial,     0              DBID(kDQSQSPlotDynTI)
      },              // 142 -
{ "Thematic Elements Intro",                xTQTutorial,     0
DBID(kDQSQSThemeElemTI)          },         // 143 -
{ "Quick Story Recap",                            xTQTutorial,     0
DBID(kDQSQSRecapTI)                    },         // 144 -
{ "Storytelling Introduction",              xTQTutorial,     0
DBID(kDQSQSStellingTI)           },         // 145 -
{ "Illustrating Character Dynamics",   xTQTutorial,     0            DBID(kDQSQSCharDynSTTI)
},              // 146 -
{ "Illustrating Plot Dynamics",             xTQTutorial,     0
DBID(kDQSQSPlotDynSTTI)          },         // 147 -
{ "Illustrating Thematic Elements",         xTQTutorial,     0
DBID(kDQSQSThemeElemSTTI)  },          // 148 -
{ "What's Next",                                  xTQTutorial,     0
DBID(kDQSQSNextTI)                     },         // 149 -

{ "Objective Story Introduction",      xTQTutorial,     0            DBID(kDQSOSIntroTI)
      },              // 150 -
{ "OS Plot Dynamics Intro",                       xTQTutorial,     0
DBID(kDQSOSPlotDynTI)            },         // 151 -
{ "OS Appreciations Intro",                       xTQTutorial,     0
DBID(kDQSOSPerspecTI)            },         // 152 -
{ "More Story Appreciations",               xTQTutorial,     0
DBID(kDQSOSAddApprecsTI)   },          // 153 -
{ "Objective Story Recap",                        xTQTutorial,     0
DBID(kDQSOSRecapTI)                    },         // 154 -
{ "What's Next?",                                       xTQTutorial,     0
DBID(kDQSOSNextTI)                     },         // 155 -

{ "Subjective Story Introduction",     xTQTutorial,     0            DBID(kDQSSSIntroTI)
      },              // 156 -
{ "Subjective Story Recap",                       xTQTutorial,     0
DBID(kDQSSSRecapTI)                    },         // 157 -
{ "What's Next?",                                       xTQTutorial,     0
DBID(kDQSSSNextTI)                     },         // 158 -

{ "Main Character Introduction",       xTQTutorial,     0            DBID(kDQSMCIntroTI)
      },              // 159 -
{ "MC Dynamics Intro",                            xTQTutorial,     0
DBID(kDQSMCCharDynTI)            },         // 160 -
{ "MC Appreciations Intro",                       xTQTutorial,     0
DBID(kDQSMCPerspecTI)            },         // 161 -
{ "Main Character Recap",                   xTQTutorial,     0              DBID(kDQSMCRecapTI)
            },                   // 162 -
{ "What's Next?",                                       xTQTutorial,     0
DBID(kDQSMCNextTI)                     },         // 163 -

{ "Obstacle Character Introduction",   xTQTutorial,     0            DBID(kDQSOCIntroTI)
      },              // 164 -
{ "OC Appreciations Intro",                       xTQTutorial,     0
DBID(kDQSOCPerspecTI)            },         // 165 -
{ "Obstacle Character Recap",               xTQTutorial,     0              DBID(kDQSOCRecapTI)
            },                   // 166 -
{ "What's Next?",                                       xTQTutorial,     0
DBID(kDQSOCNextTI)                     },         // 167 -

{ "Storyforming Introduction",              xTQTutorial,     0              DBID(kDQSSFIntroTI)
            },                   // 168 -
{ "Character Dynamics",                           xTQTutorial,     0
DBID(kDQSSFCharDynTI)            },         // 169 -
{ "Plot Dynamics",                                      xTQTutorial,     0
DBID(kDQSSFPlotDynTI)            },         // 170 -
{ "OS Appreciations Intro",                       xTQTutorial,     0
DBID(kDQSSFOSPerspecTI)          },         // 171 -
{ "More OS Appreciations",                        xTQTutorial,     0
DBID(kDQSSFOSAddApprecsTI)       },         // 172 -
{ "SS Appreciations Intro",                       xTQTutorial,     0
DBID(kDQSSFSSPerspecTI)          },         // 173 -
{ "MC Appreciations Intro",                       xTQTutorial,     0
DBID(kDQSSFMCPerspecTI)          },         // 174 -
{ "OC Appreciations Intro",                       xTQTutorial,     0
DBID(kDQSSFOCPerspecTI)          },         // 175 -
{ "Storyforming Recap",                           xTQTutorial,     0
DBID(kDQSSFRecapTI)                    },         // 176 -
{ "What's Next",                                  xTQTutorial,     0
DBID(kDQSSFNextTI)                     },         // 177 -

{ "Storytelling Introduction",              xTQTutorial,     0              DBID(kDQSSTIntroTI)
            },                   // 178 -
{ "Character Dynamics",                           xTQTutorial,     0
DBID(kDQSSTCharDynTI)            },         // 179 -
```

```
{ "Plot Dymanics",                                             xTQTutorial,     0
DBID(kDQSSTPlotDynTI)              },              //  180 -
{ "OS Appreciations Intro",                            xTQTutorial,     0
DBID(kDQSSTOSPerspecTI)            },              //  181 -
{ "SS Appreciations Intro",                            xTQTutorial,     0
DBID(kDQSSTSSPerspecTI)            },              //  182 -
{ "MC Appreciations Intro",                            xTQTutorial,     0
DBID(kDQSSTMCPerspecTI)            },              //  183 -
{ "OC Appreciations Intro",                            xTQTutorial,     0
DBID(kDQSSTOCPerspecTI)            },              //  184 -
{ "More OS Appreciations",                             xTQTutorial,     0
DBID(kDQSSTOSAddApprecsTI)         },              //  185 -
{ "What's Next",                                       xTQTutorial,     0
DBID(kDQSSTNextTI)                         },          //  186 -

{ "Storytelling Recap",                                xTQTutorial,     0
DBID(kDQSSTRecapTI)                        },          //  187 -

{ "All Topics Introduction",                  xTQTutorial,     0             DBID(kDQSAllIntroTI)
        },           //  188 -
{ "Character Dynamics",                                xTQTutorial,     0
DBID(kDQSAllCharDynTI)             },              //  189 -
{ "Plot Dymanics",                                             xTQTutorial,     0
DBID(kDQSAllPlotDynTI)             },              //  190 -
{ "Objective Story",                                   xTQTutorial,     0
DBID(kDQSAllOSPerspecTI)    },             //  191 -
{ "More Appreciations",                                xTQTutorial,     0
DBID(kDQSAllOSAddApprecsTI)        },              //  192 -
{ "Subjective Story",                                  xTQTutorial,     0
DBID(kDQSAllSSPerspecTI)    },             //  193 -
{ "Main Character",                                            xTQTutorial,     0
DBID(kDQSAllMCPerspecTI)    },             //  194 -
{ "Obstacle Character",                                xTQTutorial,     0
DBID(kDQSAllOCIntroTI)             },              //  195 -
{ "OC Appreciations",                                  xTQTutorial,     0
DBID(kDQSAllOCPerspecTI)    },             //  196 -
{ "All Topics Recap",                                  xTQTutorial,     0
DBID(kDQSAllRecapTI)               },              //  197 -
{ "What's Next",                                       xTQTutorial,     0
DBID(kDQSAllNextTI)                        },          //  198 -


{ "General Approach",              xTQOther,                                     0
DBID(kDQSGenApproach)              },              //  199 -
{ "Four Phases",                   xTQOther,                                     0
DBID(kDQSGenPhases)                        },          //  200 -

{ "Genre Stage 1",                         xTQTutorial,                          0
DBID(kDQSG1Intro)                          },          //  201 -
{ "Subject Matter",                        xTQOther,                                     0
DBID(kDQSGDomain)                          },          //  202 -
{ "Emphasis",                              xTQOther,                                     0
DBID(kDQSGClass)                   },              //  203 -
{ "Analytical Topic",              xTQStructure,           kApprSTDom
DBID(kDQSG1Analytical)             },              //  204 -
{ "Passionate Topic",              xTQStructure,           kApprPLDom
DBID(kDQSG1Passionate)             },              //  204 -
{ "More Genre",                            xTQTutorial,                          0
DBID(kDQSG1MoreTI)                         },          //  204 -
{ "Additional Genre",              xTQTutorial,                     0
DBID(kDQSG1AdvTI)                          },          //  205 -
{ "What Next?",                            xTQTutorial,                          0
DBID(kDQSG1Next)                   },              //  206 -

{ "Genre Stage 2",                         xTQTutorial,                          0
DBID(kDQSG2Intro)                          },          //  207 -
{ "Analytical Topic",              xTQStorytelling,              0
DBID(kDQSG2AnalyticalST)    },             //  207 -
{ "Passionate Topic",              xTQStorytelling,              0
DBID(kDQSG2PassionateST)    },             //  207 -
{ "What Next?",                            xTQTutorial,                          0
DBID(kDQSG2Next)                   },              //  208 -

{ "Plot Stage 1",                          xTQTutorial,                          0
DBID(kDQSP1Intro)                          },          //  209 -
{ "OS Act 1",                              xTQOther,                                     0
DBID(kDQSP1OSAct1)                         },          //  210 -
{ "OS Act 2",                              xTQOther,                                     0
DBID(kDQSP1OSAct2)                         },          //  211 -
{ "OS Act 3",                              xTQOther,                                     0
DBID(kDQSP1OSAct3)                         },          //  212 -
{ "OS Act 4",                              xTQOther,                                     0
DBID(kDQSP1OSAct4)                         },          //  213 -
{ "SS Act 1",                              xTQOther,                                     0
DBID(kDQSP1SSAct1)                         },          //  214 -
{ "SS Act 2",                              xTQOther,                                     0
DBID(kDQSP1SSAct2)                         },          //  215 -
{ "SS Act 3",                              xTQOther,                                     0
DBID(kDQSP1SSAct3)                         },          //  216 -
{ "SS Act 4",                              xTQOther,                                     0
DBID(kDQSP1SSAct4)                         },          //  217 -
{ "Advanced Plot",                         xTQTutorial,                          0
DBID(kDQSP1AdvTI)                          },          //  218 -
{ "What Next?",                            xTQTutorial,                          0
DBID(kDQSP1Next)                   },              //  219 -

{ "Plot Stage 2",                          xTQOther,                                     0
DBID(kDQSP2Intro)                          },          //  220 -
{ "OS Act 1",                   xTQStorytelling,                        0
DBID(kDQSP2OSAct1)                         },          //  221 -
{ "OS Act 2",                   xTQStorytelling,                        0
DBID(kDQSP2OSAct2)                         },          //  222 -
{ "OS Act 3",                   xTQStorytelling,                        0
DBID(kDQSP2OSAct3)                         },          //  223 -
{ "OS Act 4",                   xTQStorytelling,                        0
DBID(kDQSP2OSAct4)                         },          //  224 -
{ "SS Act 1",                   xTQStorytelling,                        0
DBID(kDQSP2SSAct1)                         },          //  225 -
{ "SS Act 2",                   xTQStorytelling,                        0
DBID(kDQSP2SSAct2)                         },          //  226 -
{ "SS Act 3",                   xTQStorytelling,                        0
DBID(kDQSP2SSAct3)                         },          //  227 -
```

```
{ "SS Act 4",           xTQStorytelling,                                0
DBID(kDQSP2SSAct4)                     },               // 228 -

{ "MC Act 1",           xTQStorytelling,                                0
DBID(kDQSP2MCAct1)                     },               // 229 -
{ "MC Act 2",           xTQStorytelling,                                0
DBID(kDQSP2MCAct2)                     },               // 230 -
{ "MC Act 3",           xTQStorytelling,                                0
DBID(kDQSP2MCAct3)                     },               // 231 -
{ "MC Act 4",           xTQStorytelling,                                0
DBID(kDQSP2MCAct4)                     },               // 232 -
{ "OC Act 1",           xTQStorytelling,                                0
DBID(kDQSP2OCAct1)                     },               // 233 -
{ "OC Act 2",           xTQStorytelling,                                0
DBID(kDQSP2OCAct2)                     },               // 234 -
{ "OC Act 3",           xTQStorytelling,                                0
DBID(kDQSP2OCAct3)                     },               // 235 -
{ "OC Act 4",           xTQStorytelling,                                0
DBID(kDQSP2OCAct4)                     },               // 236 -

{ "More Plot",              xTQTutorial,                                        0
DBID(kDQSP2Intro2)                     },               // 237 -
{ "Story Goal",         xTQStorytelling,                                0
DBID(kDQSP2STCon)                      },               // 238 -
{ "MC Goal",            xTQStorytelling,                                0
DBID(kDQSP2MCCon)                      },               // 239 -
{ "OC Goal",            xTQStorytelling,                                0
DBID(kDQSP2OCCon)                      },               // 240 -
{ "SS Goal",            xTQStorytelling,                                0
DBID(kDQSP2PLCon)                      },               // 241 -
{ "All 4 Goals",  xTQStorytelling,                      0               DBID(kDQSP2Blend)
          },                   // 242 -
{ "What Next?",             xTQTutorial,                                        0
DBID(kDQSP2Next)            },                 // 243 -


{ "Theme Stage 1",                   xTQTutorial,                               0
DBID(kDQST1Intro)                    },                 // 244 -
{ "Advanced Theme",                  xTQTutorial,                               0
DBID(kDQST1Intro2)                   },                 // 245 -
{ "What Next?",                      xTQTutorial,                               0
DBID(kDQST1Next)            },                 // 246 -

{ "Theme Stage 2",                   xTQTutorial,                               0
DBID(kDQST2Intro)                    },                 // 247 -
{ "What Next?",                      xTQTutorial,                               0
DBID(kDQST2Next)            },                 // 248 -


{ "Character Stage 1",      xTQTutorial,                                0
DBID(kDQSC1Intro)                    },                 // 249 -
{ "Advanced Character",     xTQTutorial,                                0
DBID(kDQSC1AdvTI)                    },                 // 250 -
{ "What Next?",                      xTQTutorial,                               0
DBID(kDQSC1Next)            },                 // 251 -

{ "Character Stage 2",      xTQTutorial,                                0
DBID(kDQSC2Intro)                    },                 // 252 -
{ "What Next?",                      xTQTutorial,                               0
DBID(kDQSC2Next)            },                 // 253 -


{ "Story Nature",           xTQStorytelling,                            0
DBID(kDQSNatureST)                   },                 // 254 -
{ "Story Essence",          xTQStorytelling,                            0
DBID(kDQSEssenceST)                  },                 // 255 -
{ "Story Tendency",         xTQStorytelling,                            0
DBID(kDQSTendencyST)        },                 // 256 -
{ "Story Reach",        xTQStorytelling,                      0                 DBID(kDQSReachST)
          },                 // 257 -
};


/* =======================================================================
                                        Dramatica Query System (2) WINDOW CLASS
   ======================================================================= */

/* -----------------------------------------------------------------------
        DQSWindow::DQSWindow - CONSTRUCTOR
   ----------------------------------------------------------------------- */
DQSWindow::DQSWindow(seg_id_t whichList, TAppl *pTAppl, TDoc *pTDoc, const GLRect *bounds, wn_type windowType, const char
*title, ptr_t storage)
//      : TDialog(WN_SIZE_WINDOW, TWindow::kNoFlags),
                : TWindow(pTAppl, pTDoc, windowType, TWindow::kNoFlags, bounds, title, storage),
                  fCurrentTopicList (whichList),
                  fStoryTbl (NULL),
                  fTopicListView (NULL),
                  fMinItemNumber (0),
                  fItemToGetFocus (kLsNoElem),
                  fNmOfTopics (0),
              fCurrentTopicRow (0),
              fCurrentTopicID (0),
                  fQuestionAgeTime(0),
                  fDoneButton (NULL),
                  fHomeButton (NULL),
                  fFormingBar (NULL),
                  fTellingBar (NULL),
                  fTopicPopup (NULL),
                  fHelpView (NULL),
                  fhelpBtns (NULL),
                  fUpBtn (NULL),
                  fDnBtn (NULL),
                  fNmOfTextItems (0),
                  fNmOfRadioBtns (0),
                  fNmOfEditViews (0),
                  fTextWrapProcID (0),
                  fTextWrapDisplay (NULL),
              fDQSPT (NULL),
                  fQTopMargin (12),
```

```
		fQLeftMargin (12),
		fQRightMargin (12),
		fQTextSpacer (12),
		fRadioBtnIndent (30),
		fRadioBtnSpacer (4),
		fEditViewIndent (15),
		fHorizDivLineSpace (15),
		fGrowDownPosition (0),
		fStructuralFinder (false),
		fHelpDefSemVal (0),
		fApprID (0),
		fCorrespQuestID (0)
{
	fApp		= (Dramatica*)GetParentApp();
	fAppPFMFile = fApp->GetPFMFile();
	fDoc		= (DRDoc*)pTDoc;
	assert(fDoc);
	fResponses	= fDoc->GetRESP();
	fStoryDocPT	= fDoc->GetSDOC();
	fStellingPT	= fDoc->GetSTEL();
	fMainCharPT	= fDoc->GetMainCharPT();
	fObstCharPT	= fDoc->GetObstacleCharPT();

	assert(fDoc->GetDQSWindow()==NULL);
	fDoc->SetDQSWindow(this);

	pt_err	theErr;
	fPrefsPT = new PText(fApp->GetPrefsFile(), _OSType("DQS "), 0, &theErr);			// Grab Preferences
for DQS
	assert((theErr == noerr) || (theErr == kNoSuchPFMSeg));

	//	VERIFY THE IDS IN THE ALLQUESTIONS TABLE

	#ifndef NDEBUG
		for (short index=0; index<kNmOfDQSQuestions; ++index)
			if (allDQSQuestions[index].debug_ID != index) {
				DQSQuestList* badRecord = &allDQSQuestions[index];
				asserts(allDQSQuestions[index].debug_ID == index, "Index in AllDQSQuestions table
doesn't match expected value!");
			}
	#endif

	fTempStrHdl = MM_ALLOC_INIT(TEMP_STR_SIZE, mm_no_flags, 0, "Temp Strings", NULL);
	assert(fTempStrHdl);
	fTempStr		= (char*)MM_USE(fTempStrHdl);

	//	Initialize DQS from preference settings

	fFont		= GL_SYS_FONT;
	fFontSize	= 12;
	fFace		= GL_NORMAL;

#ifdef TOOLBOX
	fHelpFont		= 21;			// Helvetica
#else
	fHelpFont		= GL_GENEVA;		// For Windows
#endif
	fHelpFontSize	= 9;
	fHelpFace		= GL_NORMAL;
	fDoc->GetFontPref(fPrefsPT, "H", &fHelpFont, &fHelpFontSize, &fHelpFace);

	//	Restore user's preferred window size & position

	fApp->RestoreWindowPosition(fPrefsPT, (TWindow*) this, "DQS");

	GLSetRect(&fEmptyRect, 0, 0, 0, 0);

	memset(&fBtnStateTable, 0, sizeof(fBtnStateTable));

	theErr = fPrefsPT->GetParam("HlpBtns", 'c', fTempStr);
	if (theErr != kParamNotFound)
		ConvertOrderString(fTempStr, fBtnStateTable);
	else
		fBtnStateTable[kHBtnTopic] = 1;

	fUpArrowBITM	= new Bitmap(8001);
	fDownArrowBITM	= new Bitmap(8002);
	fHandBITM		= new Bitmap(8003);

	calc_item_sizes();

	GL_FMETRIC	fontMetrics;
	fGraphEnv.Use();
	fEditFont		= 21;
	// HELVETICA
	fEditFontSize	= 12;
	fEditFontFace	= GL_NORMAL;
	fGraphEnv.SetTextAttr(fEditFont, fEditFontSize, fEditFontFace);
	fGraphEnv.GetFontMetrics(&fontMetrics);
	fEditFontHeight = gl_get_ascent(&fontMetrics) + gl_get_descent(&fontMetrics) + gl_get_leading(&fontMetrics);
	fGraphEnv.Unuse();

} /* DQSWindow::DQSWindow */


/* ------------------------------------------------------------------------
	DQSWindow::~DQSWindow - DESTRUCTOR (user pressed "Done" button)
------------------------------------------------------------------------ */
DQSWindow::~DQSWindow(void)
{
	save_and_clear_question(true);

	//	****************************
	//	JUSTIFY IF THERE'S ONE STORY
	//	****************************

	fStoryTbl->CreateSearchTableSet(fWhichTables, fApprID, fDoc->GetTotalStories());
	fStoryTbl->init_menu_item_structs(NULL, fWhichTables, fResponses);
	scan_storytable_now();

//	fDoc->SaveAppreciations(true);
```

```
        delete fStoryTbl;

        //      Save off any preferences

        fApp->SaveWindowPosition(fPrefsPT, (TWindow*)this, "DQS");

        CreateOrderString(fTempStr, fBtnStateTable, kNmOfHelpBtns);
        fPrefsPT->SetParam("HlpBtns", 'c', fTempStr);

        if (fCurrentTopicList != kQLSTQuickStart)                              // Don't allow us to
"remember" the quickStart
                fResponses->SetParam("DQSPath", 's', fCurrentTopicList);

        MM_UNUSE(fTempStrHdl);
        MMFree(fTempStrHdl);

        fPrefsPT->SaveSeg();
        delete fPrefsPT;

        fDoc->SetDQSWindow(NULL);

        //      DELETE MISC. BITMAPS

        delete fUpArrowBITM;
        delete fDownArrowBITM;
        delete fHandBITM;

} /* DQSWindow::~DQSWindow */


#if 0
/* --------------------------------------------------------------------------
        DQSWindow::init_dlog - initialize the Story Engine Dialog.
-------------------------------------------------------------------------- */
void DQSWindow::init_dlog(void)
{
        InitWindow();
        fDefaultBtn = 3;

} /* DQSWindow::init_dlog */
#endif

/* --------------------------------------------------------------------------
        DQSWindow::InitWindow -
-------------------------------------------------------------------------- */
void DQSWindow::InitWindow(void)
{
        assert(fItems == NULL);

        fItems = new ItemList(this);
        assert(fItems);

        //      BUILD LIST VIEW OF TOPICS

        topic_action_proc actionProc = (topic_action_proc)&(DQSWindow::SelectNewQuestion);
        TItem* newTopicListItem = new TopicListView(fDoc, kNmOfDQSQuestions, actionProc, fItems, (TView::kVScroll),
&fTopicListBounds); /* TItem::kResizable); */
        assert(newTopicListItem);
        fTopicListView = (TopicListView*)newTopicListItem;
        fItems->Append(newTopicListItem);
        fTopicListView->SetDQSWindow(this);
        fTopicListView->SetCheckMarkEnable(true);

        //      ADD TOPIC POPUP MENU

        TItem* popItm;
        ls_index popID = fItems->Append(popItm = new Popup(fItems, &fPopRect, kNoFlags, kNoFlags, kCtNoFlags,
&kGLBlackClr, NULL, NULL, GL_GENEVA, 9, GL_NORMAL, GL_JUST_LEFT));
//      popItm->Awaken(&popID);
        fTopicPopup = (Popup*)popItm;
        for (seg_id_t whichList = 0; whichList < kNmOfQuestionLists; ++whichList) {
                get_question_list_title(whichList, fTempStr);
                fTopicPopup->AppendItem(fTempStr);
        }
        ++fMinItemNumber;

        //      ADD PUSH BUTTONS

        TItem* newUpBtn = new GraphBtn(fItems, &fPrevArrowRect, &kMyBtnOnClr, &kGLBlackClr);
        assert(newUpBtn);
        fUpBtn = (GraphBtn*)newUpBtn;
        fItems->Append(newUpBtn);

        TItem* newDnBtn = new GraphBtn(fItems, &fNextArrowRect, &kMyBtnOnClr, &kGLBlackClr);
        assert(newDnBtn);
        fDnBtn = (GraphBtn*)newDnBtn;
        fItems->Append(newDnBtn);

        TItem* pBtn;
        ls_index pbID;

        //      ATTACH HOME BUTTON

        pbID = fItems->Append(pBtn = new PushBtn(fItems, "Home", kCtNoFlags, &fHomeBtnRect));
        fHomeButton = (PushBtn*)pBtn;
        fHomeButton->Awaken(&pbID);

        pbID = fItems->Append(pBtn = new PushBtn(fItems, "Done", kCtNoFlags, &fDoneBtnRect));
        fDoneButton = (PushBtn*)pBtn;
        fDoneButton->Awaken(&pbID);
        fMinItemNumber += 4;

        //      ATTACH HELP VIEW

        TItem* newHelpItem = new DQSHelpView(fDoc, fItems, (TView::kVScroll), &fHelpViewRect, TItem::kResizable);
        assert(newHelpItem);
        fHelpView = (DQSHelpView*)newHelpItem;
        fHelpView->SetTextFontSpec(&fHelpFont, &fHelpFontSize, &fHelpFace);
        fItems->Append(newHelpItem);
        ++fMinItemNumber;

        //      ADD HELP BUTTONS
```

```
        TItem* newTopicBtn = new GraphBtn(fItems, &fHelpBtnRect, &kMyBtnOnClr, &kGLBlackClr);
        assert(newTopicBtn);
        fhelpBtns = (GraphBtn*)newTopicBtn;
        fItems->Append(newTopicBtn);
        ++fMinItemNumber;

        //      Set up Bar Items

        TItem* newBarGraph = new BarGraph(fItems, &fFormingBarRect, &kGLBlackClr, &kGLWhiteClr, kGLBlackPat,
kGLWhitePat, kGLBlackPat, kNoFlags);
        assert(newBarGraph);
        fItems->Append(newBarGraph);
        fFormingBar = (BarGraph*)newBarGraph;
        ++fMinItemNumber;

        newBarGraph = new BarGraph(fItems, &fTellingBarRect, &kGLBlackClr, &kGLWhiteClr, kGLBlackPat, kGLWhitePat,
kGLBlackPat, kNoFlags);
        assert(newBarGraph);
        fItems->Append(newBarGraph);
        fTellingBar = (BarGraph*)newBarGraph;
        ++fMinItemNumber;

        //      FINISH UP AND INITIALIZE WINDOW'S ITEMLIST

        fItems->SetBackClr(&kGL25GrayClr);
        init_itemlist();

        //      INIT ANY VIEWS OR ITEMS NOW THAT WE HAVE A GRAPHENV

        fTopicListView->InitView();

        fUpBtn->AddButton(kSpringAction, &fPrevArrowRect, fUpArrowBITM, NULL, kCoolBevelDown, kCoolBevelUp);

        fDnBtn->AddButton(kSpringAction, &fNextArrowRect, fDownArrowBITM, NULL, kCoolBevelDown, kCoolBevelUp);

        fhelpBtns->AddButton(kNormalAction, &fHelpBtnRect, "Topic", 21, 9, kCoolBevelDown, kCoolBevelUp);

        fHelpBtnRect.left          = fHelpBtnRect.right + 3;
        fHelpBtnRect.right         = fHelpBtnRect.left + 54;
        fhelpBtns->AddButton(kNormalAction, &fHelpBtnRect, "Background", 21, 9, kCoolBevelDown, kCoolBevelUp);

        fHelpBtnRect.left          = fHelpBtnRect.right + 3;
        fHelpBtnRect.right         = fHelpBtnRect.left + 53;
        fhelpBtns->AddButton(kNormalAction, &fHelpBtnRect, "Storytelling", 21, 9, kCoolBevelDown, kCoolBevelUp);

        fHelpBtnRect.left          = fHelpBtnRect.right + 3;
        fHelpBtnRect.right         = fHelpBtnRect.left + 35;
        fhelpBtns->AddButton(kNormalAction, &fHelpBtnRect, "Help", 21, 9, kCoolBevelDown, kCoolBevelUp);

        fHelpBtnRect.left          = fHelpBtnRect.right + 3;
        fHelpBtnRect.right         = fHelpBtnRect.left + 45;
        fhelpBtns->AddButton(kNormalAction, &fHelpBtnRect, "Definition", 21, 9, kCoolBevelDown, kCoolBevelUp);

        fHelpBtnRect.left          = fHelpBtnRect.right + 3;
        fHelpBtnRect.right         = fHelpBtnRect.left + 40;
        fhelpBtns->AddButton(kNormalAction, &fHelpBtnRect, "Context", 21, 9, kCoolBevelDown, kCoolBevelUp);

        fHelpBtnRect.left          = fHelpBtnRect.right + 3;
        fHelpBtnRect.right         = fHelpBtnRect.left + 40;
        fhelpBtns->AddButton(kNormalAction, &fHelpBtnRect, "Stories", 21, 9, kCoolBevelDown, kCoolBevelUp);

        for (short whichBtn=0; whichBtn<kNmOfHelpBtns; ++whichBtn)
                fhelpBtns->SetButtonState((ls_index)whichBtn, fBtnStateTable[whichBtn]);

#if 0
                set_window_content_color();

                if (ASSERT(fItems)) {
                        for (ls_index i = 0; i < fItems->Size(); i++) {
                                TItem*   pTItem = fItems->Elem(i);

                                if (pTItem->Is(&TItem::kResizable))
                                        pTItem->Resize();

                                pTItem->Awaken(&i);
                        }
                        if (fKeyItem == kItNoItem)
                                SetKeyItem(fItems->FirstObjThat((test_pp) &pDoesKeyDowns));

                        if (fKeyItem != kItNoItem) {
                                fGraphEnv.Use();
                                        GetItem(fKeyItem)->FocusIn();
                                fGraphEnv.Unuse();
                        }
                }
#endif

        make_help_invisible();

        //      ALLOCATE STORYTBL CLASSES AND SCAN STORY UNIVERSE

        st_err   stblErr;
        fStoryTbl = new StoryTbl(fDoc, &stblErr);
        fStoryTbl->CreateSearchTableSet(fWhichTables, fApprID, fDoc->GetTotalStories());
        fStoryTbl->init_menu_item_structs(NULL, fWhichTables, fResponses);
        scan_storytable_now();

        //      SET QUESTION LIST TO WHERE USER WAS LAST

        seg_id_t whichPath = fCurrentTopicList;
        if (fCurrentTopicList != kQLSTQuickStart) {
                whichPath = kQLSTHome;
                fResponses->GetParam("DQSPath", 's', &whichPath);
        }
        set_question_list(whichPath, false);

} /* DQSWindow::InitWindow */

/* ---------------------------------------------------------------------------
        DQSWindow::get_question_list_title - returns available question list
```

```
        titles for a particular list ID.
----------------------------------------------------------------------------- */
void DQSWindow::get_question_list_title(seg_id_t whichList, char* listTitle)
{
        assert(whichList < kNmOfQuestionLists);
        pt_err theErr;
        PText* QList = new PText(fAppPFMFile, _OSType("QLST"), whichList, &theErr);
        if (theErr == noErr) {
                theErr = QList->GetParam("NA", 'c', listTitle);
                assert(theErr != kParamNotFound);
        }
        else
                strcpy(listTitle,"-");                              // List not found -- drop in a dividing
line

        delete QList;

} /* DQSWindow::get_question_list_title */


/* ---------------------------------------------------------------------------
        DQSWindow::set_question_list - sets our topic list to the a given list
        order.
----------------------------------------------------------------------------- */
void DQSWindow::set_question_list(seg_id_t whichList, bool_t saveCurrentQuestion)
{
//      save_and_clear_question(saveCurrentQuestion);

        AP_StartSpinCursor(129, 4, 5);

        ct_value menuPos = (short)fTopicPopup->GetCntlVal();

        if (menuPos != whichList)
                fTopicPopup->SetCntlVal((ct_value)whichList);

        pt_err theErr;
        PText* fQList = new PText(fAppPFMFile, _OSType("QLST"), whichList, &theErr);
        assert(theErr == noErr);
        AP_SpinCursor();

        theErr = fQList->GetParam("OR", 'c', fTempStr);
        assert(theErr != kParamNotFound);
        ConvertOrderString(fTempStr, &ftopicListOrder);

        fTopicListView->Empty();
        AP_SpinCursor();

        for (short row=0; row<ftopicListOrder.Size(); ++row) {
                short whichQuestion = ftopicListOrder.Elem(row);

                short theRow = fTopicListView->Append(whichQuestion, allDQSQuestions[whichQuestion].title);
                DQSQuestList* questionRec = &allDQSQuestions[whichQuestion];

                short topicType = questionRec->type;
                if (topicType == kTQStorytelling)
                        fTopicListView->SetFace(row, GL_ITALIC, false);

                //      Set checkmark status for this Question...

                short checkStatus = fDoc->GetQuestionStatus(whichQuestion);
                if (topicType == kTQStructure) {
                        semval_t semVal = fDoc->GetApprValByIndex(questionRec->apprIndex);
                        if (semVal > 0)
                                checkStatus = kTLCheckOn;
                        else if (semVal == -1)
                                checkStatus     = kTLApprox;
                }
                else if (topicType == kTQTutorial)
                        checkStatus = kTLDash;

                if (checkStatus == kTLDot)                          // TEMP -- eliminate old dot system!
                        checkStatus = kTLNoCheck;

                fTopicListView->SetCheckMark(theRow, (char)checkStatus);
                fDoc->SetQuestionStatus(whichQuestion, checkStatus);

                AP_SpinCursor();
        }

        delete fQList;
        fTopicListView->SetDataInited(true);
        fTopicListView->DocumentResize();
        fCurrentTopicList = whichList;
        fCurrentTopicRow = 0;
        AP_SpinCursor();

        fTopicListView->Inval();                                    // THIS MAY BE
UNNECESSARY ONCE BRYAN REWRITES SCROLLING VIEWS
        fTopicListView->SetSelection(fCurrentTopicRow, true);
        AP_StopSpinCursor();

} /* DQSWindow::set_question_list */


/* ---------------------------------------------------------------------------
        DQSWindow::DoGrow - This virtual function gets called when the user
        clicks on the grow box and changes the window size.
----------------------------------------------------------------------------- */
bool_t  DQSWindow::DoGrow(EVENT_REC *pEvt)
{
        TWindow::DoGrow(pEvt);

        calc_item_sizes();
        ClickCurrentQuestion();
        Inval();

        return true;                            // Required, but why?

} /* DQSWindow::DoGrow */


/* ---------------------------------------------------------------------------
```

```
        DQSWindow::DoZoom - This virtual function gets called when the user
        clicks in the zoom box.
---------------------------------------------------------------------------- */
void DQSWindow::DoZoom(short partCode)
{
        TWindow::DoZoom(partCode);
        calc_item_sizes();
        ClickCurrentQuestion();

} /* DQSWindow::DoZoom */


/* ---------------------------------------------------------------------------
        DQSWindow::calc_item_sizes - determines rectangles for on-screen
        locations of DQS areas.  Typically called by DoGrow() and DoZoom().
---------------------------------------------------------------------------- */
void DQSWindow::calc_item_sizes(void)
{
        GLRect portBounds;
        GetPortRect(&portBounds);
        clip_out_drawing();

        fLeftEdge                       = 6;
        fRightEdge                      = 6;
        fBottomEdge                     = 6;

        gl_coord_t leftAreaMin      = 133;
        gl_coord_t leftAreaMax      = 160;
        gl_coord_t extraWidth       = (portBounds.right - portBounds.left) - 511;
        fLeftAreaWidth                  = leftAreaMin + MIN(extraWidth, leftAreaMax-leftAreaMin);       // Default
width of the topic list, popup and button box

        fVertDividingLine           = fLeftEdge + fLeftAreaWidth + fLeftEdge;
        fTopLine                        = 25;

        GLSetRect(&fStatusRect, (portBounds.bottom-fBottomEdge)-50, fLeftEdge, portBounds.bottom-fBottomEdge,
fLeftEdge+fLeftAreaWidth);
        GLSetRect(&fFormingBarRect, fStatusRect.top+20, fStatusRect.right-50, fFormingBarRect.top+10, fStatusRect.right-
10);
        GLSetRect(&fTellingBarRect, fStatusRect.top+35, fStatusRect.right-50, fTellingBarRect.top+10, fStatusRect.right-
10);
        GLSetRect(&fStoryCountRect, fStatusRect.top+5, fStatusRect.left, fStoryCountRect.top+10, fStatusRect.right);

        GLSetRect(&fButtonRect, fStatusRect.top-62, fLeftEdge, fStatusRect.top, fLeftEdge+fLeftAreaWidth);
        GLSetRect(&fTopicListBounds, fTopLine, fLeftEdge, fButtonRect.top-4, fLeftEdge+fLeftAreaWidth);
        GLSetRect(&fQARect, fTopLine, fVertDividingLine+fLeftEdge+6, portBounds.bottom-fBottomEdge, portBounds.right-
fBottomEdge);
        GLSetRect(&fHelpViewRect, 175, fQARect.left + fQLeftMargin, fQARect.bottom - 10, fQARect.right - fQRightMargin);
        GLSetRect(&fTopicTitleRect, fTopLine-14, fQARect.left+2, fTopLine-2, fQARect.right-50);
        GLSetRect(&fHelpBtnRect, fHelpViewRect.top - 20, fHelpViewRect.left, fHelpViewRect.top - 4, fHelpViewRect.left +
30);

        fGrayBGRgn.SetTo(fQARect);

        //      CALCULATE VARIOUS PUSH BUTTON RECTS

        GLSetRect(&fPopRect, fTopLine-20, fLeftEdge+2, fTopLine-4, fTopicListBounds.right-2);            // Height of
this popup should be 16

        gl_coord_t centerVLine = ((fButtonRect.right - fButtonRect.left) / 2) + fLeftEdge;
        gl_coord_t centerHLine      = ((fButtonRect.bottom - fButtonRect.top) / 2) + fButtonRect.top;
        gl_coord_t arrowHeight      = fUpArrowBITM->GetHeight() + 4;
        gl_coord_t arrowWidth       = fUpArrowBITM->GetWidth() + 4;

        fPrevArrowRect.bottom       = centerHLine - 1;
        fPrevArrowRect.top                  = fPrevArrowRect.bottom - arrowHeight;
        fPrevArrowRect.left                 = centerVLine + 30;
        fPrevArrowRect.right        = fPrevArrowRect.left + arrowWidth;

        fNextArrowRect                      = fPrevArrowRect;
        fNextArrowRect.top                  = centerHLine + 1;
        fNextArrowRect.bottom       = fNextArrowRect.top + arrowHeight;

        gl_coord_t botOfBtn                 = centerHLine - 3;
        gl_coord_t topOfBtn                 = botOfBtn - 20;
        gl_coord_t leftOfBtn        = centerVLine - 43;
        GLSetRect(&fHomeBtnRect, topOfBtn, leftOfBtn, botOfBtn, leftOfBtn+53);

        topOfBtn            = centerHLine + 3;
        leftOfBtn           = centerVLine - 50;
        GLSetRect(&fDoneBtnRect, topOfBtn, leftOfBtn, topOfBtn+20, leftOfBtn+66);

        if (fDoneButton) {
                fDoneButton->SetBounds(&fDoneBtnRect);
        }

        if (fHomeButton)
                fHomeButton->SetBounds(&fHomeBtnRect);

        if (fTopicListView)
                fTopicListView->SetBounds(&fTopicListBounds);

        if (fHelpView)
                fHelpView->SetBounds(&fHelpViewRect);

        if (fTopicPopup)
                fTopicPopup->SetBounds(&fPopRect);


        if (fhelpBtns) {
                GLRect curBtnRect = fhelpBtns->GetBounds();
                fhelpBtns->OffsetBtns(fHelpBtnRect.left - curBtnRect.left, 0);                  // Move our help
buttons
        }

        if (fUpBtn) {
                GLRect curBtnRect = fUpBtn->GetBounds();
                fUpBtn->OffsetBtns(fPrevArrowRect.left - curBtnRect.left, fPrevArrowRect.top - curBtnRect.top);
        // Move our up arrow button

                curBtnRect = fDnBtn->GetBounds();
                fDnBtn->OffsetBtns(fNextArrowRect.left - curBtnRect.left, fNextArrowRect.top - curBtnRect.top);
        // Move our down arrow button
```

```
        }
        if (fFormingBar) {
                fFormingBar->SetBounds(&fFormingBarRect);
                fTellingBar->SetBounds(&fTellingBarRect);
        }
        restore_clipping();
} /* DQSWindow::calc_item_sizes */

/* -----------------------------------------------------SMG---07/31/93---
        DQSWindow::draw_window - draw the contents of the window.

        NOTE: Optimize this later by not drawing anything not in the update
        region.
---------------------------------------------------------------------- */
void DQSWindow::draw_window(GL_ENV_REF env)
{
        //      DRAW ALL OUR ITEMS

        TWindow::draw_window(env);

        GLRect portRect;
        GetPortRect(&portRect);

        Rgn updateRgn;
        GetUpdateRgn(&updateRgn);

#if 0
        Rgn updateRgn;
        GetUpdateRgn(&updateRgn);

        //      DRAW GRAY BG

        fGraphEnv.SetForeColor(kGL25GrayClr);
        fGraphEnv.PaintRgn(updateRgn.InqRef());
        fGraphEnv.SetForeColor(kGLBlackClr);
#endif

        //      DRAW BOLDED DIVIDING LINES

        fGraphEnv.SetPenSize(3, 3);
        fGraphEnv.MoveTo(fVertDividingLine, 0);
        fGraphEnv.LineTo(fVertDividingLine, portRect.bottom-1);
        fGraphEnv.SetForeColor(kGLWhiteClr);
        fGraphEnv.MoveTo(fVertDividingLine+3, 0);
        fGraphEnv.LineTo(fVertDividingLine+3, portRect.bottom-1);
        fGraphEnv.SetPenSize(1, 1);

        fGraphEnv.SetForeColor(kGLBlackClr);

        //      DRAW BUTTON GROUP BOX

        CoolFrameRect(&fGraphEnv, &fButtonRect, &kGLBevelDownPat, 2, &kGLWhiteClr, &kGL75GrayClr);

        //      DRAW COOL GROVE FOR QACONTENTRECT (within which all queries occur)

        CoolFrameRect(&fGraphEnv, &fQARect, &kGLGroovePat, 1, &kGLWhiteClr, &kGL75GrayClr);

        //      DRAW THE QUESTION AREA

        for (short i=0; i<fNmOfTextItems; ++i)
                fTextWraps[i]->Draw(&fGraphEnv, NULL, kNeverPrint, fTextRects[i].top, fTextRects[i].left);

        //      DRAW TOPIC TITLE

        fGraphEnv.MoveTo(fQARect.left+2, fTopLine-5);
        fGraphEnv.SetTextAttr(fFont, fFontSize, fFace);
        fGraphEnv.DrawStr(fTopicTitle);

        //      DRAW ITEMS IN THE STATUS RECT: # OF STORIES, JUSTIFICATION

        if (updateRgn.IsIn(fStatusRect)) {                              // Skip drawing if not in
update region
                fGraphEnv.SetTextAttr(21, 9);
                char temp [40];
                sprintf(temp, "Storyforms:  %hu", fDoc->GetTotalStories());
                if (fDoc->IsStoryJustified())
                        strcat(temp, "*");
                fGraphEnv.StrRect(temp, fStoryCountRect, GL_JUST_CENTER, false);

                GLRect tempRect = fStoryCountRect;
                tempRect.left     = fStatusRect.right - 120;
                tempRect.top      = fFormingBarRect.top;
                tempRect.bottom = fFormingBarRect.bottom;
                fGraphEnv.StrRect("Storyforming:", tempRect, GL_JUST_LEFT, false);

                tempRect.top      = fTellingBarRect.top;
                tempRect.bottom = fTellingBarRect.bottom;
                fGraphEnv.StrRect("Storytelling:", tempRect, GL_JUST_LEFT, false);
        }

        //      DRAW HORIZONTAL DIVIDING LINE

        if (fHelpViewVisible) {
                fGraphEnv.MoveTo(fHelpViewRect.left, fGrowDownPosition);
                fGraphEnv.LineTo(fHelpViewRect.right, fGrowDownPosition);
                fGraphEnv.SetForeColor(kGLWhiteClr);
                fGraphEnv.MoveTo(fHelpViewRect.left, fGrowDownPosition+1);
                fGraphEnv.LineTo(fHelpViewRect.right, fGrowDownPosition+1);
                fGraphEnv.SetForeColor(kGLBlackClr);
        }
} /* DQSWindow::draw_window */
```

```
/* -----------------------------------------------Stephen---07/26/93---
	DQSWindow::set_question - sets up the data for a specific question.
	Returns FALSE if question couldn't be found.
--------------------------------------------------------------------------- */
bool_t DQSWindow::set_question(short whichQuestion)
{
    fNmOfTextItems			= 0;
	fNmOfRadioBtns			= 0;
	fTextWrapProcID			= 0;
	fTextWrapDisplay  = NULL;
	fNmOfEditViews			= 0;
	fStructuralFinder		= false;
	fHelpDefSemVal			= 0;
	fDQSTopicType			= 0;
	fApprID					= 0;
	fCorrespQuestID			= 0;
	fItemToGetFocus			= kLsNoElem;
	fHelpViewDesired  = true;
	fHelpTypeForWindow		= 0;
	fGrowDownPosition		= fQARect.top + fQTopMargin;		// Set this as the minimal top position

	clip_out_drawing();

	//	Special case for choosing one of three different versions of the Direction Question

	if (whichQuestion == kDQSDirection) {
		semval_t semVal = fDoc->GetApprValByIndex(kApprResolve);
		if (semVal == rApprChange)
			whichQuestion = kDQSDirectionA;
		else if (semVal == rApprSteadfast)
			whichQuestion = kDQSDirectionB;
	}

	//	Load the query segment

	pt_err theErr;
	fDQSPT = new PText(fAppPFMFile, _OSType("DQS2"), whichQuestion, &theErr);
	if (theErr != noerr) {
		delete fDQSPT;
		fDQSPT = NULL;
		fHelpView->SetHelpPaletteText("");
		restore_clipping();
		return (false);
	}

	fCurrentTopicID   = whichQuestion;

	pt_err noType = fDQSPT->GetParam("TY", 's', &fDQSType);
	assert(noType != kParamNotFound);

	pt_err TopicType = fDQSPT->GetParam("TQ", 's', &fDQSTopicType);
	assert(TopicType != kParamNotFound);

	pt_err Topictitle = fDQSPT->GetParam("QT", 'c', fTopicTitle);
	assert(Topictitle != kParamNotFound);

	fDQSPT->GetParam("AP", 's', &fApprID);					// All
appreciations should have an ApprVal

	fDQSPT->GetParam("CQ", 's', &fCorrespQuestID);				// Storytelling &
storyforming will have a "corresponding question" ID

	fDQSPT->GetParam("HL", 's', &fHelpViewDesired);				// Explicit toggle for
help (defaults to true)
	fMaxItemBottom = (fHelpViewDesired) ? fHelpBtnRect.top - 10 : fQARect.bottom - 10;

	fDQSPT->GetParam("HP", 's', &fHelpTypeForWindow);			// ID of help segment
describing this window


	fGraphEnv.Use();
	fGraphEnv.SetTextAttr(fFont, fFontSize, fFace);

	fTextPIDs[0] = fDQSPT->GetParam("T1", 'c', fTempStr);			// Direct Question Text
	assert((fTextPIDs[0] != kParamNotFound) || ((fTextPIDs[0] == kParamNotFound) && (fDQSTopicType ==
kTQStorytelling)));
	++fNmOfTextItems;

	if (fDQSTopicType == kTQStorytelling)
		load_storytelling();

	GLSetRect(&fTextRects[0], fQARect.top + fQTopMargin, fQARect.left + fQLeftMargin, 0, fQARect.right -
fQRightMargin);   // TEMP!!!
	fTextWraps[0] = new TextWrap(fDoc, &fGraphEnv,  &fTextRects[0], fTempStr, fFont, fFontSize, fFace);
	if (fTempStr[0])
		fGrowDownPosition = fTextRects[0].bottom;

	if (fDQSType == kQTYTextWrapDisplay)
		load_TextWrapDisplay();

	//	******************************
	//	ADD APPROPRIATE RADIO BUTTONS
	//	******************************

	fDQSPT->GetParam("RN", 's', &fNmOfRadioBtns);				// Try to get a count of the
radio buttons
	if (fNmOfRadioBtns) {

		pl_id respPID = fDQSPT->GetParam("RV", 'c', fRbRESPKey);		// Variable Name for RESP
segment (for Radio Buttons)
		if (respPID == kParamNotFound)
			fRbRESPKey[0] = 0;

		if (fDQSPT->ParamExists("RS1")) {
			short whichSeg;
			fDQSPT->GetParam("RS1", 's', &whichSeg);
			fRBSegmentPT = get_PText(whichSeg);
		}
		else
			fRBSegmentPT = fResponses;


		short whichRB = 0;
```

```
		if ((fDQSType == kQTYDynamicRadioBtn)) {
			whichRB = fDoc->GetApprValByID(fApprID);
			whichRB = (whichRB) ? (whichRB - 1 - fApprID) : -1;		// Convert a number like 1001
to "0"
		}
		else {
			fRBSegmentPT->GetParam(fRbRESPKey, 's', &whichRB);		// Not a dynamic appreciation,
so just get value
		}

		GLRect btnRect;
		GLSetRect(&btnRect, fTextRects[0].bottom + fQTextSpacer, (fQARect.left + fQLeftMargin +
fRadioBtnIndent), btnRect.top + 16, fQARect.right - fQRightMargin);
		char* RadioBtnKey = "Rx";
		for (short rb = 0; rb < fNmOfRadioBtns; ++rb) {
			RadioBtnKey[1] = rb + '1';
			fDQSPT->GetParam(RadioBtnKey, 'c', fTempStr);
			fRadioIDs[rb] = fItems->Append(fRadioBtns[rb] = new RadioBtn(fItems, fTempStr, kCtNoFlags,
&btnRect));

			fRadioBtns[rb]->SetCntlVal(((rb == whichRB) ? AP_ON : AP_OFF), false);
			fRadioBtns[rb]->Awaken(&fRadioIDs[rb]);
			fGrowDownPosition = btnRect.bottom;
			btnRect.top		= btnRect.bottom + fRadioBtnSpacer;
			btnRect.bottom	= btnRect.top + 16;
		}
		if (fDQSType == kQTYDynamicRadioBtn) {					// the 8 dynamic
questions get special initialization
			load_dynamic_buttons();
			fHelpDefSemVal = (whichRB >= 0) ? (whichRB + 1 + VarToApprID(fRbRESPKey)) : 0;
		}
	}

	//	*******************
	//	ADD EDIT TEXT FIELDS
	//	*******************

	fDQSPT->GetParam("EN", 's', &fNmOfEditViews);			// Try to get a count of the Edit Views
	if (fNmOfEditViews) {
		GLRect editViewRect;
		GLSetRect(&editViewRect, fTextRects[0].bottom + fQTextSpacer, (fQARect.left + fQLeftMargin +
fEditViewIndent), editViewRect.top + 16, fQARect.right - fEditViewIndent - fQRightMargin);
		char* EditViewKey		= "ETx";
		char* EditDefaultKey	= "EDx";
		char* EditVariableKey	= "EVx";
		char* PTextSegKey		= "ESx";
		char* EditViewSize		= "EMx";
		for (short editVwItm = 0; editVwItm < fNmOfEditViews; ++editVwItm) {
			EditViewKey[2] = EditDefaultKey[2] = EditVariableKey[2]	= PTextSegKey[2] =
EditViewSize[2] = editVwItm + '1';
//			fDQSPT->GetParam(EditViewKey, 'c', fTempStr);		// For title string

			fEditViewKeys[editVwItm] = fDQSPT->GetParam(EditVariableKey, 'c');	// For Variable to
Get/Store
			fDQSPT->GetParam(PTextSegKey, 's', &fEditSegTypes[editVwItm]);

			PText* whichPT = get_PText(fEditSegTypes[editVwItm]);				//
Get appropriate Segment
			fTempStr[0] = 0;
			fDQSPT->UseDataPool();
			whichPT->GetParam(fDQSPT->PID2Ptr(fEditViewKeys[editVwItm]), 'c', fTempStr);
			fDQSPT->UnuseDataPool();
			if (fTempStr[0] == 0)
				fDQSPT->GetParam(EditDefaultKey, 'c', fTempStr);			//
No current param, get default string

			short nmOfEditViewLines = 0;
			fDQSPT->GetParam(EditViewSize, 's', &nmOfEditViewLines);
			if (nmOfEditViewLines) {
				if (fTextWraps[0]->GetLines() >= 5)
					nmOfEditViewLines -= (fTextWraps[0]->GetLines() - 4);
				editViewRect.bottom		+= ((nmOfEditViewLines-1) * fEditFontHeight) + 3;
			// Expand bottom to account for multi-line
			}

			ls_index theIndex = fItems->Append(fEditViews[editVwItm] = new EditView(fItems, &editViewRect,
fEditFont, fEditFontSize, fEditFontFace, GL_JUST_LEFT, (nmOfEditViewLines) ? (EditView::kWordWrap+EditView::kMultiLine) :
EditView::kNoFlags, (nmOfEditViewLines) ? (TView::kVScroll) : TView::kNoFlags, TItem::kNoFlags, &kGLBlackClr,
fTempStr));

			assert(theIndex != kLsNoElem);
			if (fItemToGetFocus == kLsNoElem)
				fItemToGetFocus = theIndex;
			fEditViews[editVwItm]->Awaken(&theIndex);
			fGrowDownPosition		= editViewRect.bottom;
			editViewRect.top		= editViewRect.bottom + fRadioBtnSpacer;
			editViewRect.bottom		= editViewRect.top + 16;
		}
	}

	//	***************************
	//	BUILD STRUCTURAL FINDER LISTS
	//	***************************

	fStructuralFinder = (fDQSType == kQTYStructuralList);
	if (fStructuralFinder) {
		assert(fApprID != 0);
		fItems->Sleep();

		gl_coord_t listWidth		= 115;
		gl_coord_t listHeight		= 100;
		gl_coord_t listTop			= fGrowDownPosition + fQTextSpacer;
		gl_coord_t listToBtnSpace	= 13;

		GLRect addBtnRect;
		gl_coord_t topOfBtn			= listTop + 20;
		gl_coord_t leftOfBtn		= fQARect.left + ((fQARect.right - fQARect.left) / 2) - 33;
		GLSetRect(&addBtnRect, topOfBtn, leftOfBtn, topOfBtn+20, leftOfBtn+66);

		GLRect removeBtnRect		= addBtnRect;
		removeBtnRect.top			+= 30;
		removeBtnRect.bottom		+= 30;

		GLRect leftRect, rightRect;
		leftRect.top				= listTop;
```

```
                leftRect.bottom           = listTop + listHeight;
                leftRect.right            = addBtnRect.left - listToBtnSpace;
                leftRect.left             = leftRect.right - listWidth;

                rightRect                         = leftRect;
                rightRect.left            = addBtnRect.right + listToBtnSpace;
                rightRect.right           = rightRect.left + listWidth;

                topic_action_proc leftActionProc = (topic_action_proc)&(DQSWindow::LeftStructuralListClick);
                TItem* newTopicListItem = new TopicListView(fDoc, 64, leftActionProc, fItems, (TView::kVScroll),
&leftRect);
                assert(newTopicListItem);
                fLeftListView = (TopicListView*)newTopicListItem;
                fItems->Append(newTopicListItem);
                fLeftListView->SetDQSWindow(this);

                topic_action_proc rightActionProc = (topic_action_proc)&(DQSWindow::RightStructuralListClick);
                newTopicListItem = new TopicListView(fDoc, 64, rightActionProc, fItems, (TView::kVScroll), &rightRect);
                assert(newTopicListItem);
                fRightListView = (TopicListView*)newTopicListItem;
                fItems->Append(newTopicListItem);
                fRightListView->SetDQSWindow(this);

                fItems->Awaken();
                fLeftListView->InitView();
                fRightListView->InitView();
                fGrowDownPosition = leftRect.bottom;

                load_structural_finder_list();

                bool_t offState = AP_OFF;
                ls_index btnID = fItems->Append(fAddBtn = new PushBtn(fItems, "Add >>", kCtNoFlags, &addBtnRect));
                fAddBtn->Awaken(&btnID);
                fAddBtn->Enable(&offState);

                btnID = fItems->Append(fRemoveBtn = new PushBtn(fItems, "Remove", kCtNoFlags, &removeBtnRect));
                fRemoveBtn->Awaken(&btnID);
                fRemoveBtn->Enable(&offState);
        }

        else if (fDQSType == kQTYHomeWindow) {
                load_home_window();
        }

        //      ******************************
        //      SET HELP BUTTON & WINDOW HEIGHT
        //      ******************************

        if (fGrowDownPosition)
                fGrowDownPosition += fHorizDivLineSpace;

        GLRect curBtnRect = fhelpBtns->GetBounds();
        fhelpBtns->OffsetBtns(0, fGrowDownPosition + 2 - curBtnRect.top);               // Move our help buttons

        GLRect viewExtent         = fHelpView->GetBounds();
        viewExtent.top            = fGrowDownPosition + 20;
        fHelpView->SetBounds(&viewExtent);

        set_help_text();

#if 0
        if (set_help_text() || fBtnStateTable[kHBtnDefinition] || fBtnStateTable[kHBtnContext]) {
//              fhelpBtns->Show();
                make_help_visible();
        }
        else {
//              fhelpBtns->Hide();
                make_help_invisible();
        }
#endif

        //      *********
        //      FINISH UP
        //      *********

        if (fItemToGetFocus != kLsNoElem)
                SwitchFocus(&fItemToGetFocus, NULL);

        if (fNmOfRadioBtns & 0) {                                       // THIS IS QUESTIONABLE
                ls_index focusIndex = fMinItemNumber+1;
                SwitchFocus(&focusIndex, NULL);
        }

        restore_clipping();
        fGraphEnv.Unuse();

        fQuestionAgeTime = AP_TickCount();

        return (true);

} /* DQSWindow::set_question */


/* ----------------------------------------------------Stephen---04/18/93---
        DQSWindow::set_help_text - Determines which help is appropriate, then
        sets each help topic's text into the helpView.

        Help is controlled by the setting of two variables: fCurrentTopicID
        and (fApprID + fHelpDefSemVal).  fCurrentTopicID is a unique number
        which is the index which identifies each and every DSQ question.  It
        is used to control four help buttons: Topic, Background, Storytelling
        and Impact.

        fApprID indicates which appreciation we are looking at and fHelpDefSemVal
        indicates which structural or dynamic item the user has clicked on.
        fHelpDefSemVal is used to get a definition and the combination of these
        two are used together for contextual definitions.
------------------------------------------------------------------------ */
bool_t DQSWindow::set_help_text(void)
{
        hdl_t DefSegHdl;
        pt_err theErr;
```

```
        fhelpBtns->GetAllButtonStates((short*)&fBtnStateTable);                    // Get button
states so we know what help to display

        pfm_fd_t currentFile = PFMSetCurrentFile(fAppPFMFile);
        fTempStr[0] = 0;

        AP_WaitCursor();

        seg_id_t helpTopicID  = fCurrentTopicID;

        //      TOPIC BUTTON

        if (fBtnStateTable[kHBtnTopic]) {

                if (fDQSTopicType == kTQStorytelling)
                        // "kludge" allows storytelling questions to use storyforming help
                        if (!PFMIsSeg(_OSType("DQQE"), fCurrentTopicID) && fCorrespQuestID)
                                helpTopicID = fCorrespQuestID;

                DefSegHdl = (hdl_t) PFMCheckoutSeg(_OSType("DQQE"), helpTopicID);
                if (DefSegHdl) {
                        char* DefSegPtr = (char *)MM_USE(DefSegHdl);
                        strcpy(fTempStr, "TOPIC:  ");
                        strcat(fTempStr, DefSegPtr);
                        strcat(fTempStr, "\n\n");
                        MM_UNUSE(DefSegHdl);
                        theErr = PFMCheckinSeg(DefSegHdl);
                        assert(theErr == noerr);
                }
        }

        //      BACKGROUND BUTTON: Background, Storytelling tips, impact

        if (fBtnStateTable[kHBtnBackground]) {

                if (fDQSTopicType == kTQStorytelling)
                        // "kludge" allows storytelling questions to use storyforming help
                        if (!PFMIsSeg(_OSType("DQBG"), fCurrentTopicID) && fCorrespQuestID)
                                helpTopicID = fCorrespQuestID;

                DefSegHdl = (hdl_t) PFMCheckoutSeg(_OSType("DQBG"), helpTopicID);
                if (DefSegHdl) {
                        char* DefSegPtr = (char *)MM_USE(DefSegHdl);
                        assert(strlen(fTempStr) + strlen(DefSegPtr) < TEMP_STR_SIZE-100);
                        strcat(fTempStr, "BACKGROUND:  ");
                        strcat(fTempStr, DefSegPtr);
                        strcat(fTempStr, "\n\n");
                        MM_UNUSE(DefSegHdl);
                        theErr = PFMCheckinSeg(DefSegHdl);
                        assert(theErr == noerr);
                }
        }

        //      STORYTELLING BUTTON

        if (fBtnStateTable[kHBtnStorytelling] && (fDQSTopicType != kTQStorytelling) && fCorrespQuestID) {
                strcat(fTempStr, "STORYTELLING FOR THIS STORYFORMING QUESTION:\n");
                fStellingPT->GetParam(GetApprVarName(fApprID),  'c', &fTempStr[strlen(fTempStr)]);
                assert(strlen(fTempStr) < TEMP_STR_SIZE-100);
        }

        //      HELP BUTTON

        if (fBtnStateTable[kHBtnHelp] && fHelpTypeForWindow) {
                DefSegHdl = (hdl_t) PFMCheckoutSeg(_OSType("DQSH"), fHelpTypeForWindow);
                if (DefSegHdl) {
                        char* DefSegPtr = (char *)MM_USE(DefSegHdl);
                        assert(strlen(fTempStr) + strlen(DefSegPtr) < TEMP_STR_SIZE-100);
                        strcat(fTempStr, DefSegPtr);
                        strcat(fTempStr, "\n\n");
                        MM_UNUSE(DefSegHdl);
                        theErr = PFMCheckinSeg(DefSegHdl);
                        assert(theErr == noerr);
                }
        }

        //      DEFINITIONS BUTTON: Short def, Synonyms, and Long def

        if (fBtnStateTable[kHBtnDefinition]) {
                if (fHelpDefSemVal) {
                        short semVal = fHelpDefSemVal;
                        char tempStr[128];
                        char tempStr2 [30];
                        byte_cnt theLen = (ushort)sprintf(tempStr,"DEFINITION:  (SNF(%hd)):  (SDF(%hd)).\n", semVal,
semVal);

                        if (!(semVal >= rApprResolve && semVal <= rApprBad)) {
                                theLen += sprintf(tempStr2, "SYNONYMS:  (SYN(%hd)).\n", semVal);
                                strcat(tempStr, tempStr2);
                        }

                        theLen += sprintf(tempStr2, "LONG DEFINITION:  (SLD(%hd))\n\n", semVal);
                        strcat(tempStr, tempStr2);

                        if (fHelpDefSemVal < 1000)
                                strcat(fTempStr, tempStr);
                        else {
                                SubText* SbTxt = new SubText(fDoc, tempStr);
                // pre-substitute to avoid recursive substitution
                                assert (SbTxt);
                                char* newText = SbTxt->DoSubstitution(&theLen);
                                if (theLen > 0)
                                        strcat(fTempStr, newText);
                                delete SbTxt;
                        }
                        assert (strlen(fTempStr) < TEMP_STR_SIZE-100);
                }
        }
```

```
//      CONTEXT BUTTON

        if (fBtnStateTable[kHBtnContext]) {
                if (fHelpDefSemVal) {
                        seg_id_t whichContextDef = fApprID + fHelpDefSemVal;

                        DefSegHdl = (hdl_t) PFMCheckoutSeg(_OSType("CNTX"), whichContextDef);
                        if (DefSegHdl) {
                                char* DefSegPtr = (char *)MM_USE(DefSegHdl);
                                assert(strlen(fTempStr) + strlen(DefSegPtr) < TEMP_STR_SIZE-100);
                                strcat(fTempStr, "CONTEXTUAL EXAMPLE:  ");
                                strcat(fTempStr, DefSegPtr);
                                strcat(fTempStr, "\n\n");
                                MM_UNUSE(DefSegHdl);
                                theErr = PFMCheckinSeg(DefSegHdl);
                                assert(theErr == noerr);
                        }
                }
        }

//      STORIES HELP BUTTON

        if (fBtnStateTable[kHBtnStories] && fApp->GetStoryHelpFile()) {
                if (fHelpDefSemVal) {
                        appr_index_t apprIndex = FindApprRecIndex(fApprID);
                        ApprRec* apprRecPtr        = GetApprRec(apprIndex);

                        seg_id_t whichContextDef = fApprID + fHelpDefSemVal;

                        pfm_fd_t currentFile = PFMSetCurrentFile(fApp->GetStoryHelpFile());
                        DefSegHdl = (hdl_t) PFMCheckoutSeg(_OSType(apprRecPtr->storyDBSeg), fHelpDefSemVal);
                        if (DefSegHdl) {
                                char* DefSegPtr = (char *)MM_USE(DefSegHdl);
                                assert(strlen(fTempStr) + strlen(DefSegPtr) < TEMP_STR_SIZE-100);
                                char* prefix = "";
                                char localTmpStr [120];
                                char c1 = apprRecPtr->varName[0];
                                char c2 = apprRecPtr->varName[1];
                                if (c1 == 'S' && c2 == 'T')
                                        prefix = "Objective Story ";
                                else if (c1 == 'M' && c2 == 'C')
                                        prefix = "Main Character ";
                                else if (c1 == 'O' && c2 == 'C')
                                        prefix = "Obstacle Character ";
                                else if (c1 == 'P' && c2 == 'L')
                                        prefix = "Subjective Story ";

                                char semValText[60];
                                if (fHelpDefSemVal < 1000)
                                        strcpy(semValText, SEMTBL_NAME(fHelpDefSemVal));
                                else
                                        strcpy(semValText, ApprName(fHelpDefSemVal));

                                sprintf(localTmpStr,"STORIES that have a «B+»%s%s«B-» of «B+»%s«B-»:\n", prefix,
apprRecPtr->name, semValText);
                                strcat(fTempStr, localTmpStr);
                                strcat(fTempStr, DefSegPtr);
                                strcat(fTempStr, "\n\n");
                                MM_UNUSE(DefSegHdl);
                                theErr = PFMCheckinSeg(DefSegHdl);
                                assert(theErr == noerr);
                        }
                        PFMSetCurrentFile(currentFile);
                }
        }

        if (!fHelpViewVisible && fHelpViewDesired)
                make_help_visible();
        else if (fHelpViewVisible && !fHelpViewDesired)
                make_help_invisible();

        fHelpView->SetHelpPaletteText(fTempStr);
        fHelpView->Inval();
        GLPoint goTo;
        goTo.x = 0;
        goTo.y = 0;
        fHelpView->AutoScrollTo(&goTo, NULL);

        PFMSetCurrentFile(currentFile);
        AF_GoCursor();

        return (fHelpViewVisible);

} /* DQSWindow::set_help_text */

/* -----------------------------------------------------------------------
        DQSWindow::make_help_visible - shows the helpview.
----------------------------------------------------------------------- */
void DQSWindow::make_help_visible(void)
{
        fHelpView->Show();
        fhelpBtns->Show();
        fHelpViewVisible = true;
} /* DQSWindow::make_help_visible */

/* -----------------------------------------------------------------------
        DQSWindow::make_help_invisible - hides the helpview.
----------------------------------------------------------------------- */
void DQSWindow::make_help_invisible(void)
{
        fHelpView->Hide();
        fhelpBtns->Hide();
        fHelpViewVisible = false;
} /* DQSWindow::make_help_invisible */

/* -------------------------------------------------Stephen---04/18/93---
        DQSWindow::save_and_clear_question - Saves answer, then disposes of
        our question area data.
```

```
------------------------------------------------------------------------- */
void DQSWindow::save_and_clear_question(bool_t saveAnswer)
{
	if (fDQSPT) {
		//	Switch Focus off current item (must be done first, to avoid asserts)

		ls_index focusIndex = 0;
		SwitchFocus(&focusIndex, NULL);

		//	****************************
		//	SAVE CONTENTS OF THE QUERY...
		//	****************************

			if (saveAnswer) {
				if (fNmOfRadioBtns)
					save_radio_buttons();

				if (fNmOfEditViews) {
					fDQSPT->UseDataPool();
					for (short editVwItm = 0; editVwItm < fNmOfEditViews; ++editVwItm) {
						byte_cnt textSize = TEMP_STR_SIZE;
						PText* whichPT = get_PText(fEditSegTypes[editVwItm]);
						fEditViews[editVwItm]->GetText(fTempStr, &textSize);
						whichPT->SetParam(fDQSPT->PID2Ptr(fEditViewKeys[editVwItm]), 'c',
fTempStr);

						//	Set this question's checkmark, if the user has any text in
this field

						char checkStatus = (fTempStr[0]) ? kTLCheckOn : kTLNoCheck;
						fTopicListView->SetCheckMark(fCurrentTopicRow, checkStatus, true);
						short whichTopic = fTopicListView->GetTopicID(fCurrentTopicRow);
						fDoc->SetQuestionStatus(whichTopic, checkStatus);

						//	If the PText segment is owned by a character,  read in the
info & write it out

						ls_index whichChar = fDoc->PTextToCharID(whichPT);
						if (whichChar != kLsNoElem) {
							CharInfoRec charInfo;
							fDoc->LoadCharInfo(&charInfo, whichPT);
							fDoc->SetCharInfoRec(whichChar, &charInfo);
						}
					}
					fDQSPT->UnuseDataPool();
				}

				if (fStructuralFinder)
					save_structural_finder();
				else if (fDQSType == kQTYHomeWindow)
					save_home_window();

				fDoc->SetFileSaveFlag();					// This should
probably be removed to prevent agressive saving
				set_checkmarks();
			}

		//	*********************
		//	DESTRUCT THIS QUERY...
		//	*********************

		delete fDQSPT;
		fDQSPT = NULL;

		for (short i=0; i<fNmOfTextItems; ++i)
			delete fTextWraps[i];
		fNmOfTextItems = 0;

		if (fNmOfRadioBtns) {
			for (short rb = 0; rb < fNmOfRadioBtns; ++rb) {
				fRadioBtns[rb]->Hide();
				fRadioBtns[rb]->Sleep();
			}
			fNmOfRadioBtns = 0;
			if (fDQSType==kQTYDynamicRadioBtn)
				fDQSType = 0;
		}

		if (fTextWrapProcID) {
			fTextWrapDisplay->Hide();
			fTextWrapDisplay->Sleep();
			fTextWrapProcID = 0;
			make_help_visible();
		}

		if (fNmOfEditViews) {
			for (short editVwItm = 0; editVwItm < fNmOfEditViews; ++editVwItm) {
				fEditViews[editVwItm]->Hide();
				fEditViews[editVwItm]->Sleep();
			}
			fNmOfEditViews = 0;
		}

		if (fStructuralFinder) {
			fLeftListView->Hide();
			fLeftListView->Sleep();

			fRightListView->Hide();
			fRightListView->Sleep();

			fAddBtn->Hide();
			fRemoveBtn->Hide();
			fAddBtn->Sleep();
			fRemoveBtn->Sleep();
			fStructuralFinder = false;
		}
		else if (fDQSType == kQTYHomeWindow)	{
			fApproachBtns->Hide();
			fApproachBtns->Sleep();
			fStageBtns->Hide();
			fStageBtns->Sleep();
```

```
                        for (short i=0; i<=1; ++i) {
                                fStageText[i]->Hide();
                                fStageText[i]->Sleep();

                                fClusters[i]->Hide();
                                fClusters[i]->Sleep();
                        }
                        fProceedBtn->Hide();
                        fProceedBtn->Sleep();
                }

                fGrowDownPosition = 0;

        //      Delete all objects/items on tail of ItemList (and leave all non-changing items, like topicList)

                if (ASSERT(fItems)) {
                        for (ls_index i = fItems->Size()-1; i > fMinItemNumber; --i) {
                                fItems->Remove(i);
//                              TItem*  pTItem = fItems->Elem(i);
//                              delete (RadioBtn*)pTItem;
                        }
                }

#if 0
                //      SET QUESTION'S CHECKMARK STATUS (if user visited question for long enough)

                if ((AP_TickCount() - fQuestionAgeTime) > kMinVisitationTime)
                fTopicListView->SetCheckMark(fCurrentTopicRow, kTLDot, true);
#endif

        }
} /* DQSWindow::save_and_clear_question */


/* -----------------------------------------------------------------------
        DQSWindow::save_radio_buttons
   ----------------------------------------------------------------------- */
void DQSWindow::save_radio_buttons(void)
{
        bool_t  thisRB = false;

        for (short rb = 0; rb < fNmOfRadioBtns; ++rb) {
                thisRB =  (fRadioBtns[rb]->GetCntlVal() == AP_ON);
                if (thisRB)
                        break;
        }

        short whichRB;
        if ((fDQSType == kQTYDynamicRadioBtn)) {
                if (thisRB && (rb==2))                          // user chose "choose later"
                        whichRB = 0;
                else
                        whichRB = (thisRB) ? (rb + 1 + fApprID) : 0;
                fDoc->SetApprValByID(fApprID, whichRB);
        }
        else {
                whichRB = rb;                                   // Non-dynamic radio button: first RB ==
0.
                fRBSegmentPT->SetParam(fRbRESPKey, 's', whichRB);
        }

        if ((fRBSegmentPT == fMainCharPT) || (fRBSegmentPT == fObstCharPT)) {           // THIS TEST EVENTUALLY
UNNECESSARY!
                CharInfoRec charInfo;
                fDoc->LoadCharInfo(&charInfo, fRBSegmentPT);
                ls_index whichChar = fDoc->PTextToCharID(fRBSegmentPT);
                assert(whichChar != kLsNoElem);
                fDoc->SetCharInfoRec(whichChar, &charInfo);
        }

        //      Special temporary code to set checkmark status on

        if (fCurrentTopicID == kDQSMCGenderST || fCurrentTopicID == kDQSOCGenderST) {
                char checkStatus = kTLCheckOn;
                fTopicListView->SetCheckMark(fCurrentTopicRow, checkStatus, true);
                fDoc->SetQuestionStatus(fCurrentTopicID, checkStatus);
        }

} /* DQSWindow::save_radio_buttons */


/* ---------------------------------------------------Stephen---04/18/93---
        DQSWindow::save_structural_finder
   ----------------------------------------------------------------------- */
void DQSWindow::save_structural_finder(void)
{
        assert(fApprID != 0);
        appr_index_t apprIndex      = FindApprRecIndex(fApprID);
        short           searchTable       = fStoryTbl->FindSearchTableFor(fApprID);
        short           nmOfChoices = fRightListView->GetRows();
        short           semVal = 0;
        short           semValTbl[64];
        char            buildStr[300];

        for (short n=0; n<nmOfChoices; ++n) {
                // Loop thru all choices user has made and record them
                semVal = fRightListView->GetTopicID(n);
                // get semVal from first item in list
                assert(semVal);
                if (semVal && fStoryTbl->GetSearchRec(searchTable)->menuType == kElemMenu) {

                        appr_index_t thisGroupDomain = GetFirstIndexForGroup(fApprID);
                        semval_t elemClass = fDoc->GetApprValByIndex(thisGroupDomain);
                        assert(elemClass || (!elemClass && fTotalStories != 1));
                        if (elemClass > 0)
                                semVal = SEMELEM_RECLASSIFY(elemClass, semVal-(START_OF_ELEMENTS-1));   // RECLASSIFY
element using the domain as class
                        assert(semVal == 0 || (semVal>=85 && semVal<= 340));
                }
                semValTbl[n] = semVal;
        }
```

```
        //      Save the current semVal both in the response PText segment and in the appreciation table...

        char    keyText[20];
        strcpy(keyText, GetApprRec(apprIndex)->varName);
        if (nmOfChoices > 1)
                semVal = -1;
                                // -1 here means "match any", since multiple appreciations aren't really allowed
        fDoc->SetApprValByIndex(apprIndex, semVal);                                                                    //
This is set via index 'cause we already had one available

        //      Here's how we convert the right-side list into an order string (comma-seperated numbers) for storage

        strcat(keyText,"m");
                        // Multiple lists have the same key, but end with an "m"
        if (nmOfChoices > 1) {
                CreateOrderString(buildStr, (short*)&semValTbl, nmOfChoices);
                fResponses->SetParam(keyText, 'c', buildStr);
        }
        else
                if (fResponses->ParamExists(keyText)) {
        // Remove excessive multiple lists
                        pt_err theErr = fResponses->RemoveParam(keyText);
                        assert(theErr == noerr || theErr == -10);
                }

} /* DQSWindow::save_structural_finder */


/* ---------------------------------------------------Stephen---04/18/93---
        DQSWindow::SelectNewQuestion - Handles switching between the current
        question and another question.
-------------------------------------------------------------------------- */
void DQSWindow::SelectNewQuestion(short clickedRow, short clickedID, bool_t dblClick, bool_t saveAnswer)
{
        //      Destruct existing question (if present)

        if (fDQSPT) {
                save_and_clear_question(saveAnswer);
        }

        //      Construct next question

        if (clickedID >= 0) {
                if (!set_question(clickedID))
                        beep();
                fCurrentTopicRow  = clickedRow;

                /* outmoded Zoom effect */
#if 0
                GLRect startRect;
                GLRect endRect    = fQARect;
                GLPoint     origin = { 0, 0 };
                GLLocalToGlobal(fWindowRef, &origin);
                GLOffsetRect(&endRect, origin.x, origin.y);
                fTopicListView->GetRowLocalRect(1, &startRect);
                AP_ZoomEffect(fWindowRef, &startRect, &endRect);
#endif
        }

        GLRect eraseRect = fQARect;
        GLInsetRect(&eraseRect, 2, 2);
        AP_InvalGLRect(fWindowRef, &eraseRect);
        AP_InvalGLRect(fWindowRef, &fTopicTitleRect);

} /* DQSWindow::SelectNewQuestion */


/* ---------------------------------------------------Stephen---04/18/93---
        DQSWindow::prev_topic - saves & moves to previous question.
-------------------------------------------------------------------------- */
void DQSWindow::prev_topic(void)
{
        if (fCurrentTopicRow > 0)
                fTopicListView->SetSelection(fCurrentTopicRow-1, true);
        else {
                seg_id_t skipGreyLine = (fCurrentTopicList == kQLSTGenre2) ? 1 : 0;
                seg_id_t prevTopicListID = (fCurrentTopicList - 1) - skipGreyLine;
                if (PFMIsSeg(_OSType("QLST"), prevTopicListID))
                        set_question_list(prevTopicListID, true);
                else
                        beep();
        }
} /* DQSWindow::prev_topic */


/* ---------------------------------------------------Stephen---04/18/93---
        DQSWindow::next_topic - saves & moves to the next question.
-------------------------------------------------------------------------- */
void DQSWindow::next_topic(bool_t saveAnswer)
{
        if (fCurrentTopicRow < fTopicListView->GetRows()-1)
                fTopicListView->SetSelection(fCurrentTopicRow+1, saveAnswer);
        else {
                seg_id_t skipGreyLine       = (fCurrentTopicList == kQLSTPlot1) ? 1 : 0;
                seg_id_t nextTopicListID = fCurrentTopicList + 1 + skipGreyLine;
                if (PFMIsSeg(_OSType("QLST"), nextTopicListID))
                        set_question_list(nextTopicListID, true);
                else
                        beep();
        }

} /* DQSWindow::next_topic */


/* ------------------------------------------------------------------------
        DQSWindow::DoKeyDown - direct key events to the item with keyboard focus.
        Return true if we handled the event, otherwise return false.

        NOTE: It is expected this WILL NOT WORK UNDER WINDOWS!
-------------------------------------------------------------------------- */
bool_t DQSWindow::DoKeyDown(EVENT_REC* pEvt)
```

```
{
        bool_t   response         = false;
        bool_t   commandKey       = AP_CommandKey(pEvt);
        bool_t   shiftKey         = AP_ShiftKey(pEvt);

        char             c = AP_GetKeyChar(pEvt);
        if (!shiftKey && ((c == kReturnKey) || (c == kEnterKey))) {
                DoItemHit(3);                                  // Forces a hit on item 3 -- the next arrow!
                return (true);
        }
        else if (commandKey) {
                if ((c == kUpArrow) || (c == kLeftArrow))
                        DoItemHit(2);                                  // Forces a hit on item 2 -- the
previous arrow!
                else if ((c == kDownArrow) || (c == kRightArrow))
                        DoItemHit(3);                                  // Forces a hit on item 3 -- the next
arrow!
        }

        response = TWindow::DoKeyDown(pEvt);

        return response;

} /* DQSWindow::DoKeyDown */


/* -----------------------------------------------------------------------
        DQSWindow::DoItemHit - Handles hits/button presses within window.
                    ITEM #                     ITEM
                        0                          Topic Popup menu
                        1                          TopicView
                        2                          Prev
                        3                          Next
                        4                          Home Button
                        5                          Done Button
                        6                          HelpView
                        7                          HelpButtons
                        8                          Forming Bar
                        9                          Telling Bar

                        x+1                        RadioBtn 1
                        x+2                        RadioBtn 2
                        x+3                        RadioBtn 3

                        x+1                        Left Structural List
                        x+2                        Right Structural List
                        x+3                        Add Button
                        x+4                        Remove Button
------------------------------------------------------------------------ */
void DQSWindow::DoItemHit(ls_index itemHit)
{
        bool_t   commandClickNext = AP_CommandKey();                   // If command key held down, and user
selected a topic, go to next question
        bool_t   optionKey                = AP_OptionKey();

        if (itemHit >= 1) {

                //      GENERAL ITEMS (EVER-PRESENT)

                if (itemHit <= kLastHelpItem) {
                        switch (itemHit) {
                                case 1:         ct_value menuPos = (short)fTopicPopup->GetCntlVal();
                                                        if (menuPos != fCurrentTopicList) {
                                                                set_question_list(menuPos, true);
                                                        }
                                                        break;
                                case 2:         prev_topic();
                                                        break;
                                case 3:         next_topic(true);
                                                        break;
//                              case 4:         SelectNewQuestion(fCurrentTopicRow, fCurrentTopicID, false,
false);                 // REVERT!  (Re-select this Topic, but don't save)
//                                                      break;
                                case 4:         go_home();                                              //
HOME BUTTON
                                                        break;
                                case 5:         fApp->CloseWindow(this);        // Close window!
                                                        // fItemHit = fDefaultBtn;                      //
Close window!
                                                        break;
                                case 6:         if (optionKey)
                                                                DQSSelectFont();
                                                        break;                                          //
Help View
                                case 7:         set_help_text();                // Help buttons were pressed
                                                        break;
                                default:        break;                                          // Any items
between 7 and fLastHelpItem.
                        }
                }

                //      HOME WINDOW

                else if (fDQSType == kQTYHomeWindow) {
                        home_window_itemhit(itemHit);
                }

                //      DYNAMIC RADIO BUTTON QUESTION

                else if (fDQSType == kQTYDynamicRadioBtn) {
                        switch (itemHit) {
                                case kLastHelpItem+1:   fHelpDefSemVal = 1 + VarToApprID(fRbRESPKey);          //
Radio Btn #1
                                                                        break;
                                case kLastHelpItem+2:   fHelpDefSemVal = 2 + VarToApprID(fRbRESPKey);          //
Radio Btn #2
                                                                        break;
                                case kLastHelpItem+3:   fHelpDefSemVal = 0;
                                // Radio Btn #3
                                                                        break;
                        }
                        if (commandClickNext) {
```

```
                              reinit_dynamic_searchTable();           // These two lines are duplicated below
so that scanning happens AFTER help is displayed
                              scan_storytable_now();
                              next_topic(true);
                              return;
                        }
                        if (fBtnStateTable[kHBtnDefinition] || fBtnStateTable[kHBtnContext] ||
fBtnStateTable[kHBtnStories])
                              set_help_text();

                        reinit_dynamic_searchTable();
                        scan_storytable_now();
                  }

                  //      STRUCTURAL FINDER QUESTION

                  else if (fStructuralFinder) {
                        switch (itemHit) {
                              case kLastHelpItem+1:   break;                          // Left list
                              case kLastHelpItem+2:   break;                          // Right list
                              case kLastHelpItem+3:   move_left_to_right();   // ADD >> Button
                                                                              if (commandClickNext)
                                                                                    next_topic(true);
                                                                              break;
                              case kLastHelpItem+4:   move_right_to_left();   // REMOVE button
                                                                              if (commandClickNext)
                                                                                    next_topic(true);
                                                                              break;
                        }
                  }
            }
} /* DQSWindow::DoItemHit */


/* -----------------------------------------------------------------------
      DQSWindow::load_home_window - initializes the home window question.
------------------------------------------------------------------------ */
void DQSWindow::load_home_window(void)
{
      fItems->Sleep();

      GLRect approachBtnRect;
      approachBtnRect.top               = fGrowDownPosition + 38;
      approachBtnRect.left        = fQARect.left + ((fQARect.right - fQARect.left) / 2) - 129;
      approachBtnRect.bottom      = approachBtnRect.top + 22;
      approachBtnRect.right       = approachBtnRect.left + 50;

      TItem* newApproachBtns = new GraphBtn(fItems, &approachBtnRect, &kMyBtnOnClr, &kGLBlackClr, kRadioAction,
false);
      assert(newApproachBtns);
      ls_index itemID = fItems->Append(newApproachBtns);
      fApproachBtns = (GraphBtn*)newApproachBtns;
      fApproachBtns->Awaken(&itemID);

      fApproachBtns->AddButton(kNormalAction, &approachBtnRect, "Genre", GL_SYS_FONT, 12, kCoolBevelDown,
kCoolBevelUp);

      approachBtnRect.left        = approachBtnRect.right + 10;
      approachBtnRect.right       = approachBtnRect.left + 80;
      fApproachBtns->AddButton(kNormalAction, &approachBtnRect, "Character", GL_SYS_FONT, 12, kCoolBevelDown,
kCoolBevelUp);

      approachBtnRect.left        = approachBtnRect.right + 10;
      approachBtnRect.right       = approachBtnRect.left + 53;
      fApproachBtns->AddButton(kNormalAction, &approachBtnRect, "Theme", GL_SYS_FONT, 12, kCoolBevelDown,
kCoolBevelUp);

      approachBtnRect.left        = approachBtnRect.right + 10;
      approachBtnRect.right       = approachBtnRect.left + 45;
      fApproachBtns->AddButton(kNormalAction, &approachBtnRect, "Plot", GL_SYS_FONT, 12, kCoolBevelDown,
kCoolBevelUp);

      fGrowDownPosition = approachBtnRect.bottom;

      //      Add Stage buttons

      GLRect stageBtnRect;
      stageBtnRect.top  = fGrowDownPosition + 65;
      stageBtnRect.left             = fQARect.left + ((fQARect.right - fQARect.left) / 2) - 103;
      stageBtnRect.bottom           = stageBtnRect.top + 22;
      stageBtnRect.right            = stageBtnRect.left + 100;

      TItem* newStageBtns = new GraphBtn(fItems, &stageBtnRect, &kMyBtnOnClr, &kGLBlackClr, kRadioAction, false);
      assert(newStageBtns);
      itemID = fItems->Append(newStageBtns);
      fStageBtns = (GraphBtn*)newStageBtns;
      fStageBtns->Awaken(&itemID);

      fStageBtns->AddButton(kNormalAction, &stageBtnRect, "Storyforming", GL_SYS_FONT, 12, kCoolBevelDown,
kCoolBevelUp);

      char* stageText = "Stage x";
      GLRect stageTextBounds = stageBtnRect;
      stageTextBounds.bottom       = stageTextBounds.top - 5;
      stageTextBounds.top                = stageTextBounds.bottom - 12;
      stageText[6] = '1';
      TItem* newStatText = new StatText(fItems, &stageTextBounds, stageText, kNoFlags, &kGLBlackClr, GL_SYS_FONT, 12,
GL_NORMAL, GL_JUST_CENTER);
      assert(newStatText);
      fItems->Append(newStatText);
      fStageText[0] = (StatText*)newStatText;

      stageBtnRect.left             = stageBtnRect.right + 10;
      stageBtnRect.right            = stageBtnRect.left + 95;
      fStageBtns->AddButton(kNormalAction, &stageBtnRect, "Storytelling", GL_SYS_FONT, 12, kCoolBevelDown,
kCoolBevelUp);
      stageTextBounds = stageBtnRect;
      stageTextBounds.bottom       = stageTextBounds.top - 5;
      stageTextBounds.top                = stageTextBounds.bottom - 12;
      stageText[6] = '2';
      newStatText = new StatText(fItems, &stageTextBounds, stageText, kNoFlags, &kGLBlackClr, GL_SYS_FONT, 12,
GL_NORMAL, GL_JUST_CENTER);
      assert(newStatText);
```

```
        fItems->Append(newStatText);
        fStageText[1] = (StatText*)newStatText;

        //      Set buttons to be correct for the desired path

        short approach      = 0;
        short stage              = 0;
//      fResponses->GetParam("DQSApproach", 's', &approach);
//      fResponses->GetParam("DQSStage", 's', &stage);
        if (path_to_home_buttons(fCurrentTopicList, &approach, &stage)) {
                assert(approach >=0 && approach <=3);
                fApproachBtns->SetButtonState(approach, kBtnDown);

                assert(stage >=0 && stage <=1);
                fStageBtns->SetButtonState(stage, kBtnDown);
        }

        fGrowDownPosition = stageBtnRect.bottom;

        //      Add Cluster boxes


        GLRect approachClusterRect = fApproachBtns->GetBounds();
        approachClusterRect.top             -= 23;
        approachClusterRect.left    -= 25;
        approachClusterRect.bottom          += 20;
        approachClusterRect.right  += 25;

        TItem* newCluster;
        newCluster = new Cluster(fItems, &approachClusterRect, kNoFlags, &kGLBlackClr, "Story Approaches", GL_SYS_FONT,
12, GL_NORMAL, GL_JUST_LEFT, 15, kGLGroovePat);
        assert(newCluster);
        fItems->Append(newCluster);
        fClusters[0] = (Cluster*)newCluster;

        GLRect stageClusterRect = fStageBtns->GetBounds();
        stageClusterRect.top                -= 35;
        stageClusterRect.bottom             += 20;
        stageClusterRect.left               = approachClusterRect.left;
        stageClusterRect.right              = approachClusterRect.right;

        newCluster = new Cluster(fItems, &stageClusterRect, kNoFlags, &kGLBlackClr. "Development Stages", GL_SYS_FONT,
12, GL_NORMAL, GL_JUST_LEFT, 15, kGLGroovePat);
        assert(newCluster);
        fItems->Append(newCluster);
        fClusters[1] = (Cluster*)newCluster;

        //      Disable static text and cluster items

        bool_t offState = AP_OFF;
        for (short i=0; i<=1; ++i) {
                fStageText[i]->Enable(&offState);
                fClusters[i]->Enable(&offState);
        }

        //      Add additional buttons

        GLRect proceedBtnRect;
        proceedBtnRect.top                  = fGrowDownPosition + 30;
        proceedBtnRect.left                 = fQARect.left + ((fQARect.right - fQARect.left) / 2) - 35;
        proceedBtnRect.bottom       = proceedBtnRect.top + 20;
        proceedBtnRect.right        = proceedBtnRect.left + 70;
        fGrowDownPosition                   = proceedBtnRect.bottom;

        TItem*          pBtn;

        fProceedBtnID = fItems->Append(pBtn = new PushBtn(fItems, "Proceed", kCtNoFlags, &proceedBtnRect));
        fProceedBtn = (PushBtn*)pBtn;
        fProceedBtn->Awaken(&fProceedBtnID);

        //      AWAKEN THE ITEMS

        fItems->Awaken();

} /* DQSWindow::load_home_window */


/* ------------------------------------------------------------------------
        DQSWindow::save_home_window - Saves the home window question settings.
------------------------------------------------------------------------ */
void DQSWindow::save_home_window(void)
{
#if 0
        short approach = (short)fApproachBtns->GetWhichBtnDown();
        fResponses->SetParam("DQSApproach", 's', approach);

        short stage = (short)fStageBtns->GetWhichBtnDown();
        fResponses->SetParam("DQSStage", 's', stage);
#endif
} /* DQSWindow::save_home_window */


/* ------------------------------------------------------------------------
        DQSWindow::home_window_itemhit - changes the topic list when the user
        clicks on the home window button.
------------------------------------------------------------------------ */
void DQSWindow::home_window_itemhit(ls_index itemHit)
{
        if (itemHit >= kLastHelpItem+1 && itemHit <= kLastHelpItem+2) {
                short approach = (short)fApproachBtns->GetWhichBtnDown();
                short stage = (short)fStageBtns->GetWhichBtnDown();

                switch ((approach * 4) + stage) {

                        //      GENRE

                        case 0:         set_question_list(kQLSTGenre1, true);   //      Forming
                                                break;
                        case 1:         set_question_list(kQLSTGenre2, true);   //      Illustrating
                                                break;
```

```
                case 2:            ;
        //      Weaving
                                        break;
                case 3:            ;
        //      Reception
                                        break;

                //      CHARACTER

                case 4:            set_question_list(kQLSTCharacter1, true);//  Forming
                                        break;
                case 5:            set_question_list(kQLSTCharacter2, true);//  Illustrating
                                        break;
                case 6:            ;
        //      Weaving
                                        break;
                case 7:            ;
        //      Reception
                                        break;

                //      THEME

                case 8:            set_question_list(kQLSTTheme1, true);        //      Forming
                                        break;
                case 9:            set_question_list(kQLSTTheme2, true);        //      Illustrating
                                        break;
                case 10:           ;
        //      Weaving
                                        break;
                case 11:           ;
        //      Reception
                                        break;

                //      PLOT

                case 12:           set_question_list(kQLSTPlot1, true);         //      Forming
                                        break;
                case 13:           set_question_list(kQLSTPlot2, true);         //      Illustrating
                                        break;
                case 14:           ;
        //      Weaving
                                        break;
                case 15:           ;
        //      Reception
                                        break;

        }

        }
        else if (itemHit == fProceedBtnID)
                next_topic(true);
        else
                beep();
} /* DQSWindow::home_window_itemhit */

/* ------------------------------------------------------------------------
        DQSWindow::path_to_home_buttons - converts a path ID to story approach
        and development stage buttons.  Returns true if any buttons should
        be down, false if all are up.
------------------------------------------------------------------------ */
bool_t DQSWindow::path_to_home_buttons(short whichPath, short* theApproach, short* theStage)
{
        short stage             = -1;
        short approach          = -1;

        if (whichPath >= kQLSTGenre1 && whichPath <= kQLSTPlot2) {
                stage           = (whichPath <= 4) ? 0 : 1;
                approach        = whichPath - (stage * 4) - 1;
                if (stage)
                        --approach;                             // Account for grey separator line in menu
        }

        *theApproach = approach;
        *theStage          = stage;

        return (approach != -1);

} /* DQSWindow::path_to_home_buttons */

/* ------------------------------------------------------------------------
        DQSWindow::go_home - what to do when the user presses the home button.
------------------------------------------------------------------------ */
void DQSWindow::go_home(void)
{
        if (fTopicListView->GetTopicID(0) == kDQSHome)          // If the first question is a home window, move
there
                fTopicListView->SetSelection(0);
        else
                set_question_list(kQLSTHome, true);

} /* DQSWindow::go_home */

/* ------------------------------------------------------------------------
        DQSWindow::load_storytelling() -
------------------------------------------------------------------------ */
void DQSWindow::load_storytelling(void)
{
        assert(fApprID != 0);

        short semVal = fDoc->GetApprValByID(fApprID);
        fHelpDefSemVal = 0;

        if (semVal > 0)
                fHelpDefSemVal = semVal;

        else {
                pt_err theErr = fDQSPT->GetParam("ALT1", 'c', fTempStr);          // Alternate Direct Question
Text -- Storytelling Only
```

```
                if (theErr == kParamNotFound) {
                        char* apprName = ApprName(fApprID);
                        sprintf(fTempStr, "You cannot illustrate the storytelling for %s because you have not made a
choice for %s.", apprName, apprName);
                }
#if 0
                char* apprName = ApprName(fApprID);
                if (semVal == 0)
                        sprintf(fTempStr, "You cannot illustrate the storytelling for %s because you have not made a
choice for %s.", apprName, apprName);
                else if (semVal == -1)
                        sprintf(fTempStr, "You cannot illustrate the storytelling for %s because you have more than
once choice for %s.", apprName, apprName);
#endif
        }

        return;

#if 0
        char            tmpStr1 [250];
        char            name [100];
        pt_err          theErr;
        short           theValue;
        SubText*        SbTxt = NULL;

//      theErr = fDQSPT->GetParam("EV1", 'c', tmpStr1);
//      assert(theErr != kParamNotFound);
//      fApprID = VarToApprID(tmpStr1);

        PText* apprPT = new PText(fAppPFMFile, _OSType("APPR"), fApprID, &theErr, kRdOnly);
        assert(theErr != kNoSuchPFMSeg);

        strcpy(fTempStr, "Illustrate how ");

        tmpStr1[0] = 0;
        apprPT->GetParam("DF", 'c', tmpStr1);
        strcat(fTempStr, tmpStr1);

        apprPT->GetParam("NM", 'c', name);
        sprintf(&fTempStr[strlen(fTempStr)]," (%s) concerns ", name);

        tmpStr1[0] = 0;
        apprPT->GetParam("VN", 'c', tmpStr1);
        theValue = 0;
        fResponses->GetParam(tmpStr1, 's', &theValue);

        if (theValue > 0) {
                tmpStr1[0] = 0;
                sprintf(tmpStr1,"{SDF(%hd)} ((SNF(%hd))):", theValue, theValue);
                SbTxt = new SubText(fDoc, tmpStr1);
                assert (SbTxt);
                char* cp = SbTxt->DoSubstitution();
                strcat(fTempStr, cp);

                if (theValue >=85 && theValue <1000)
                        theValue = SEMELEM_LIMIT_TO_148(theValue);
                fHelpDefSemVal = theValue;
        }
        else {
                sprintf(fTempStr, "You cannot illustrate the storytelling for %s because you have not chosen a %s.",
name, name);
                fHelpDefSemVal = 0;
        }

        delete apprPT;
        if (SbTxt)
                delete SbTxt;
#endif
} /* DQSWindow::load_storytelling */


/* ---------------------------------------------------------------------------
        DQSWindow::load_dynamic_buttons() - sets up a story table and scans
        thru the story universe to determine which radio buttons are available.
--------------------------------------------------------------------------- */
void DQSWindow::load_dynamic_buttons(void)
{
        //      *****************************
        //      SET UP OUR STORY TABLE & SCAN
        //      *****************************

//      fApp->PushCursor(AP_WATCH_CURS);

        fStoryTbl->CreateSearchTableSet(fWhichTables, 0, fDoc->GetTotalStories());
        fStoryTbl->init_menu_item_structs(NULL, fWhichTables, fResponses);

        short dynSemVal;
        pt_err theErr = fDQSPT->GetParam("DQ", 's', &dynSemVal);               // which dynamic question 0-7?
        assert(theErr >= noerr);

        STSearchRec*        searchRec           = fStoryTbl->GetSearchRec(dynSemVal);
        pu_menu_t                       menuType            = searchRec->menuType;
        searchRec->matchAny                                 = true;
                // effectively "backs out" of any current choice user has made, so that all possibilities will be
listed

        ushort tempNmOfStories = fDoc->GetTotalStories();
        scan_storytable_now();
        fTotalStories = tempNmOfStories;
        fDoc->SetTotalStories(fTotalStories);
        set_storyforming_bar();

//      fApp->PopCursor();

        short   nmOfValidChoices = 0;
        short   listPos                     = 0;                                            //
track where in list item is located
        short   semVal;

        for (short rb=0; rb<searchRec->maxItems; ++rb) {                    // Scan to determine which menu items
are valid
                bool_t state = AP_OFF;
```

```
                if (searchRec->fItemTally[rb])                                          // Valid
choice?
                        ++nmOfValidChoices;
                else
                        fRadioBtns[rb]->Enable(&state);
        }

        fHelpDefSemVal = dynSemVal;                                                      //
the dynSemVal will either be 0 or the semVal of a dynamic

} /* DQSWindow::load_dynamic_buttons */


/* -----------------------------------------------------------------------
        DQSWindow::load_structural_finder_list() - Scans thru the available
        structural units at various levels of the model and determines which
        terms are appropriate by using the StoryTbl class.
----------------------------------------------------------------------- */
void DQSWindow::load_structural_finder_list(void)
{
        //      ****************************
        //      SET UP OUR STORY TABLE & SCAN
        //      ****************************

 //     fApp->PushCursor(AP_WATCH_CURS);

        assert(fApprID != 0);
        assert(fApprID >= rApprSTDom && fApprID <= rLastApprVal);
        fStoryTbl->CreateSearchTableSet(fWhichTables, fApprID, fDoc->GetTotalStories());
        fStoryTbl->init_menu_item_structs(NULL, fWhichTables, fResponses);

        short                   searchTable     = fStoryTbl->FindSearchTableFor(fApprID);
        STSearchRec*    searchRec       = fStoryTbl->GetSearchRec(searchTable);       // searchTable indicates which
searchRec is to be selected

        pu_menu_t               menuType        = searchRec->menuType;
        searchRec->matchAny                     = true;
                // effectively "backs out" of any current choice user has made, so that all possibilities will be
listed

        ushort tempNmOfStories = fDoc->GetTotalStories();
        scan_storytable_now();
        fTotalStories = tempNmOfStories;
        fDoc->SetTotalStories(fTotalStories);
        set_storyforming_bar();

//      fApp->PopCursor();

        //      ********************************************************
        //      NOW THAT WE'VE GOT A VALID STORY UNIVERSE, BUILD OUR LISTS
        //      ********************************************************

        short           nmOfValidChoices = 0;
        short           listPos         = 0;                                             // track
where in list item is located
        short           semVal;
        short           j;

        for (j=0; j<searchRec->maxItems; ++j)                                    // Pre-count valid
choices
                if (searchRec->fItemTally[j])
                        ++nmOfValidChoices;

        for (j=0; j<searchRec->maxItems; ++j) {                          // Scan to determine which menu
items are valid
                if (searchRec->fItemTally[j]) {                                          // Valid choice?
                        switch (menuType) {
                          case kClassMenu:              semVal = TOKEN_TO_SEMCLASS(j);
                                                                break;
                          case kTypeMenu:               semVal = TOKEN_TO_SEMTYPE(j);
                                                                break;
                          case kVarMenu:                semVal = TOKEN_TO_SEMVAR(j);
                                                                break;
                          case kElemMenu:               semVal = TOKEN_TO_SEMELEM(j);
                                                                break;
                        }
                        fLeftListView->Append(semVal, SEMTBL_NAME(semVal));

                        searchRec->fItemTally[j] = ++listPos;
                        if (((!searchRec->matchAny) && semVal == searchRec->semVal) || nmOfValidChoices == 1) {
//                              fRightListView->Append(semVal, SEMTBL_NAME(semVal));
                                if (nmOfValidChoices == 1) {
                                        searchRec->semVal = semVal;
                // The default of what user would get if he/she pressed OK
                                        if (searchRec->matchAny) {
//                                              popMenu->SetItemFace(menuPos, GL_ITALIC);               // Italicize
defaulted item
                                                searchRec->curMenuChoice = 0;
        // set menu choice to "any" so if user tries to reselect nothing will happen
                                        }
                                        else
                                                searchRec->curMenuChoice = listPos;
        // Since there was only one choice, note the menu pos so re-selection won't rescan
                                }
                        }
                }
        }
        fLeftListView->SetDataInited(true);
        fLeftListView->DocumentResize();

        //      ******************************************************************************
        //      ADD THE USER'S CURRENT CHOICES TO THE RIGHT SIDE (need to also grey left-side copy)
        //      ******************************************************************************

        semVal = fDoc->GetApprValByID(searchRec->apprID);
        if (semVal > 0 && searchRec->menuType == kElemMenu)                                       // Make
 elements an 85-149, so they are "class-less"
                semVal = SEMELEM_LIMIT_TO_148(semVal);

        if (semVal > 0) {
                fRightListView->Append(semVal, SEMTBL_NAME(semVal));

                // Gray the appended item in the left side list so it cannot be added twice
```

```
                short   rowToGray;
                bool_t  foundSemVal = fLeftListView->FindRow(semVal, &rowToGray);
                assert(foundSemVal);
                        // theoretically IMPOSSIBLE!!!
                fLeftListView->SetGray(rowToGray, true);
                fHelpDefSemVal = semVal;
                // This enables context-sensitive semVal help for the user's single choice
        }

        //      *********************************************
        //      DEAL WITH MULTIPLE SEMVAL LISTS (semVal == -1)
        //      *********************************************

        else if (semVal == -1) {
                short   semValTbl[64];
                char    buildStr[300];
                char    keyText[20];
                strcpy(keyText, GetApprRec(searchRec->ApprRecIdx)->varName);
                strcat(keyText,"m");
                        // Multiple lists have the same key, but end with an "m"

                buildStr[0] = 0;
                fResponses->GetParam(keyText, 'c', buildStr);
                short nmOfChoices = ConvertOrderString(buildStr, semValTbl);

                for (short n=0; n<nmOfChoices; ++n) {
                        semVal = semValTbl[n];
                        assert(semVal);
                        if (searchRec->menuType == kElemMenu)                                   //
Make elements an 85-149, so they are "class-less"
                                semVal = SEMELEM_LIMIT_TO_148(semVal);
                        fRightListView->Append(semVal, SEMTBL_NAME(semVal));

                        // Gray the appended items in the left side list so they cannot be added twice

                        short   rowToGray;
                        bool_t  foundSemVal = fLeftListView->FindRow(semVal, &rowToGray);
                        if (!foundSemVal)
                                fRightListView->SetGray(fRightListView->GetRows()-1, true);
                        else
                                fLeftListView->SetGray(rowToGray, true);
                }
                searchRec->matchAny             = false;
                searchRec->multiSearch      = nmOfChoices;
        }

        fRightListView->SetDataInited(true);
        fRightListView->DocumentResize();

} /* DQSWindow::load_structural_finder_list */


/* -----------------------------------------------------------------------
        DQSWindow::LeftStructuralListClick - Handles a click and double-click
        in the left structural list.
-------------------------------------------------------------------------- */
void DQSWindow::LeftStructuralListClick(short clickedRow, short clickedID, bool_t dblClick, bool_t saveAnswer)
{
        if (dblClick) {
                move_left_to_right();
                if (AP_CommandKey())
                        next_topic(true);
                return;
        }

        if (clickedID) {
                bool_t offState   = AP_OFF;
                bool_t onState    = AP_ON;
                if (fLeftListView->GetGray(clickedRow)) {
                        fAddBtn->Enable(&offState);
                }
                else {
                        fRightListView->DeselectAll();
                        fAddBtn->Enable(&onState);
                        fRemoveBtn->Enable(&offState);
                }
                fHelpDefSemVal = clickedID;
                if (fBtnStateTable[kHBtnDefinition] || fBtnStateTable[kHBtnContext] || fBtnStateTable[kHBtnStories])
                        set_help_text();
        }
} /* DQSWindow::LeftStructuralListClick */


/* ----------------------------------------------------Stephen---04/18/93---
        DQSWindow::RightStructuralListClick - Handles a click and double-click
        in the right structural list.
-------------------------------------------------------------------------- */
void DQSWindow::RightStructuralListClick(short clickedRow, short clickedID, bool_t dblClick, bool_t saveAnswer)
{
        if (dblClick) {
                move_right_to_left();
                if (AP_CommandKey())
                        next_topic(true);
                return;
        }

        if (clickedID) {
                fLeftListView->DeselectAll();
                bool_t offState = AP_OFF;
                bool_t onState = AP_ON;
                fAddBtn->Enable(&offState);
                fRemoveBtn->Enable(&onState);

                fHelpDefSemVal = clickedID;
                if (fBtnStateTable[kHBtnDefinition] || fBtnStateTable[kHBtnContext] || fBtnStateTable[kHBtnStories])
                        set_help_text();
        }
} /* DQSWindow::RightStructuralListClick */
```

```
/* ------------------------------------------------------------------------
	DQSWindow::move_left_to_right() - Moves a list item from the left side
	of the list to the right side.
------------------------------------------------------------------------ */
void DQSWindow::move_left_to_right()
{
	short whichTopic  = fLeftListView->GetRowSelected();
	short semVal		= fLeftListView->GetTopicID(whichTopic);

	if (fLeftListView->GetGray(whichTopic)) {
		beep();
		return;
	}

	fRightListView->DeselectAll();
	fRightListView->Append(semVal, SEMTBL_NAME(semVal));
	fRightListView->DocumentResize();
	fRightListView->RedrawScrollers();

	fLeftListView->DeselectAll();
	fLeftListView->SetGray(whichTopic, true);
	fLeftListView->InvalRow(whichTopic);

	bool_t offState   = AP_OFF;
	fAddBtn->Enable(&offState);

	//	Now make sure our story table is re-scanned properly

	reinit_structural_searchTable();
	scan_storytable_now();

} /* DQSWindow::move_left_to_right */


/* ------------------------------------------------------------------------
	DQSWindow::move_right_to_left() - Removes a list item from the right
	list and restores highlighting on the left side.
------------------------------------------------------------------------ */
void DQSWindow::move_right_to_left()
{
	short whichRow	= fRightListView->GetRowSelected();
	short semVal	= fRightListView->GetTopicID(whichRow);

	fRightListView->DeselectAll();
	fRightListView->Delete(whichRow);
	fRightListView->DocumentResize();
	fRightListView->RedrawScrollers();

	bool_t offState = AP_OFF;
	fRemoveBtn->Enable(&offState);

	//	Restore a greyed-out item on the left side of the list

	short rowToUngrey;
	bool_t foundSemVal = fLeftListView->FindRow(semVal, &rowToUngrey);
	if (foundSemVal)
		fLeftListView->SetGray(rowToUngrey, false, true);

	//	Now make sure our story table is re-scanned properly

	reinit_structural_searchTable();
	scan_storytable_now();

} /* DQSWindow::move_right_to_left */


/* ------------------------------------------------------------------------
	DQSWindow::reinit_dynamic_searchTable() - force the searchTable for this
	dynamic question to be reinitialized.  This is done when the
	user clicks on a different radio button.
------------------------------------------------------------------------ */
void DQSWindow::reinit_dynamic_searchTable(void)
{
	assert(fDQSType==kQTYDynamicRadioBtn);

	short			searchTable = fStoryTbl->FindSearchTableFor(fApprID);
	STSearchRec* searchRec		= fStoryTbl->GetSearchRec(searchTable);
	assert(searchRec->menuType == kChoiceMenu);

	bool_t	thisRB = false;

	for (short rb = 0; rb < fNmOfRadioBtns; ++rb) {
		thisRB =  (fRadioBtns[rb]->GetCntlVal() == AP_ON);
		if (thisRB)
			break;
	}

	short semVal;
	if (thisRB && (rb==2))					// user chose "choose later"
		semVal = 0;
	else
		semVal = (thisRB) ? (rb + 1 + VarToApprID(fRbRESPKey)) : 0;

	if (semVal > 0) {												// 0 means
not assigned; -1 means multiple choices exist
		semVal -= searchRec->apprID;
		searchRec->searchVal = semVal-1;				// SearchVal is either 0 or 1 (undefined
for matchAny == true)
		searchRec->fItemTally[semVal-1] = semVal;
		searchRec->matchAny = false;
	}
	else
		searchRec->matchAny = true;

} /* reinit_dynamic_searchTable */

/* ------------------------------------------------------------------------
	DQSWindow::reinit_structural_searchTable() - force the searchTable for this
	structural question to be reinitialized.  This is done when the
	user adds or subtracts structural choices.
```

```
---------------------------------------------------------------------------- */
void DQSWindow::reinit_structural_searchTable(void)
{
	short			searchTable = fStoryTbl->FindSearchTableFor(fApprID);
	STSearchRec* searchRec		= fStoryTbl->GetSearchRec(searchTable);
	short			nmOfChoices = fRightListView->GetRows();
	ushort			token;
	short			semVal;
	memset(&searchRec->fItemTally[0], 0, searchRec->maxItems+1);

	if (nmOfChoices == 1) {
		semVal	= fRightListView->GetTopicID(0);				// get semVal from first item in list
		token	= fStoryTbl->SemToSearchVal(searchRec, semVal);
		searchRec->searchVal				= token;				// token is 1-64
		searchRec->fItemTally[token-1]		= token;			// This actually makes the menu
item added to the menu
		searchRec->matchAny						= false;
		searchRec->multiSearch				= 0;
	}
	else if (nmOfChoices == 0) {
		searchRec->matchAny			= true;
		searchRec->multiSearch		= 0;
	}
	else {
		searchRec->matchAny			= false;
		searchRec->multiSearch		= 0;
		for (short n=0; n<nmOfChoices; ++n) {					// Loop thru all choices user
has made and record them
			semVal = fRightListView->GetTopicID(n);				// get semVal from first item
in list
			assert(semVal);
			fStoryTbl->SetMultiSemVal(searchRec, semVal);		// This StoryTbl function does all the
hard work
		}
		assert(searchRec->multiSearch == nmOfChoices);
	}
} /* DQSWindow::reinit_structural_searchTable */


/* ------------------------------------------------------------------------
	DQSWindow::scan_storytable_now() - Force a full scan of the story
	universe.
---------------------------------------------------------------------------- */
void DQSWindow::scan_storytable_now(void)
{
	fTotalStories = fStoryTbl->ScanStoryTable(false);
	assert (fTotalStories);
	fDoc->SetTotalStories(fTotalStories);
	set_storyforming_bar();

	if (fTotalStories == 1) {
		for (short m=0; m<fStoryTbl->GetNmOfSearchSlots(); ++m)
			fStoryTbl->SaveStorySetting(m, fResponses, fTotalStories);
		fDoc->PerformJustification();
	}

	set_checkmarks();
	AP_InvalGLRect(fWindowRef, &fStoryCountRect);

} /* DQSWindow::scan_storytable_now */


/* ------------------------------------------------------------------------
	DQSWindow::set_checkmarks - determines which items have been answered
	and sets the appropriate checkmarks in the topics list.
---------------------------------------------------------------------------- */
void DQSWindow::set_checkmarks(void)
{
	for (short theRow=0; theRow<fTopicListView->GetRows(); ++theRow) {			// Loop thru
all topics
		short whichTopic = fTopicListView->GetTopicID(theRow);
		DQSQuestList* questionRec = &allDQSQuestions[whichTopic];
		if (questionRec->type == xTQStructure) {
			semval_t semVal = fDoc->GetApprValByIndex(questionRec->apprIndex);
			char checkStatus = kTLNoCheck;
			if (semVal > 0)
				checkStatus = kTLCheckOn;
			else if (semVal == -1)
				checkStatus		= kTLApprox;
			fTopicListView->SetCheckMark(theRow, checkStatus, true);
			fDoc->SetQuestionStatus(whichTopic, checkStatus);
		}
	}

} /* DQSWindow::set_checkmarks */


/* ------------------------------------------------------------------------
	DQSWindow::set_storyforming_bar - sets the storyforming percentage bar.
---------------------------------------------------------------------------- */
void DQSWindow::set_storyforming_bar(void)
{
#if 0
	ushort storiesEliminated = (MAXSTORIES - fDoc->GetTotalStories()) + 1;

	short fStoryFormingPct = (short)((storiesEliminated*100)/32768);		// percentage equals the number of
stories re
	fFormingBar->SetPctDone(fStoryFormingPct, true);
#endif

} /* DQSWindow::set_storyforming_bar */


#if 0
/* ------------------------------------------------------------------------
	DQSWindow::DoIdle - do any idle time processing.  This function just
		forwards the request onto the window's EditView.  This function
		could be inlined, but we choose not to to reduce header file
		dependencies.
---------------------------------------------------------------------------- */
void DQSWindow::DoIdle(void)
{
	fQuadView->DoIdle();
```

```
} /* DQSWindow::DoIdle */

/* -----------------------------------------------------------------------
	DQSWindow::CalcIdle - calculates how much idle time we need.
------------------------------------------------------------------------ */
ulong DQSWindow::CalcIdle(void)
{
#if 0
	if (fOLView->CaretVisible())
		return GetCaretTime();
	else
#endif
		return kApMaxSleepTime;

} /* DQSWindow::CalcIdle */

#endif


/* -----------------------------------------------------------------------
	DQSWindow::IsDirty - Determines if the current window needs saving.
------------------------------------------------------------------------ */
bool_t	DQSWindow::IsDirty(void)
{
	DRDoc*	theDoc = (DRDoc*)GetDoc();
	assert(theDoc);
	return (theDoc->Is(&TDoc::kDirty));
}


/* -----------------------------------------------------------------------
	DQSWindow::get_PText - Return appropriate PText Segment.  This function
	translates the segment we get out of the 'DQS2' question segment so it
	knows which segment the PTEXT variable is located in.  IDEALY, THIS
	COULD BE MOVED INTO THE DOCUMENT CLASS.
------------------------------------------------------------------------ */
PText* DQSWindow::get_PText(short whichSegment)
{
	switch (whichSegment) {
		case kResponsesPT:		return (fResponses);
		case kStoryDocPT:		return (fStoryDocPT);
		case kStellingPT:		return (fStellingPT);
		case kMainCharPT:		return (fMainCharPT);
		case kObstCharPT:		return (fObstCharPT);
	}
}


/* -----------------------------------------------------------------------
	DQSWindow::clip_out_drawing - temporarily turn off clipping.  Used to
	prevent the controls from drawing into the window when they are set or
	modified.
------------------------------------------------------------------------ */
void DQSWindow::clip_out_drawing(void)
{
	fGraphEnv.Use();
	fGraphEnv.GetClipRect(&fSavedClipRect);
	fGraphEnv.SetClipRect(fEmptyRect);
	fGraphEnv.Unuse();
}/* DQSWindow::clip_out_drawing */


/* -----------------------------------------------------------------------
	DQSWindow::restore_clipping - restore clipping.
------------------------------------------------------------------------ */
void DQSWindow::restore_clipping(void)
{
	fGraphEnv.Use();
	fGraphEnv.SetClipRect(fSavedClipRect);
	fGraphEnv.Unuse();
} /* DQSWindow::restore_clipping */


/* -----------------------------------------------------------------------
	DQSWindow::min_window_size - return the minimum allowable width and
		height for this window.
------------------------------------------------------------------------ */
GLPoint DQSWindow::min_window_size()
{
	GLPoint	size;

	size.x = 507;
	size.y = 298;

	return size;

} /* DQSWindow::min_window_size */

#if 0
/* -----------------------------------------------------------------------
	DQSWindow::GetWindowRect - return the global coordinates of this
	window.
------------------------------------------------------------------------ */
void DQSWindow::GetWindowRect(GLRect* theRect)
{
	Region* theRgn		= *((WindowPeek) fWindowRef)->strucRgn;
	theRect->top		= theRgn->rgnBBox.top;
	theRect->left		= theRgn->rgnBBox.left;
	theRect->bottom		= theRgn->rgnBBox.bottom;
	theRect->right		= theRgn->rgnBBox.right;
} /* DQSWindow::GetWindowRect */
#endif

/* -----------------------------------------------------------------------
	DQSWindow::SelectFont - User wants to change the font of the help text
	field(s).  This function is called by the Set Font... command.
------------------------------------------------------------------------ */
void DQSWindow::DQSSelectFont(void)
{
	if (fDoc->SelectFont(&fHelpFont, &fHelpFontSize, &fHelpFace)) {			// Get the
user's choice...
```

```
                fDoc->SetFontPref(fPrefsPT, "H", fHelpFont, fHelpFontSize, fHelpFace);  // Set the user's choice in the
prefs file
                fHelpView->SetTextFontSpec(&fHelpFont, &fHelpFontSize, &fHelpFace);             // Set it on-screen
                set_help_text();
                                // Force help area to re-draw and re-wrap (if visible)
                if (!fHelpViewVisible)
                        ClickCurrentQuestion();
                                // Force other textual views to resize themselves, too
        }

} /* DQSWindow::SelectFont */

/* ******************************************************************
                                                Dramatica Query System (2) COMMAND CLASS
*********************************************************************/


/* ------------------------------------------------------------------
        DQSCmd::IsValid -
------------------------------------------------------------------- */
bool_t DQSCmd::IsValid(TAppl *pApp)
{
//      TAppl*          fApp            = AP_Data()->fApp;
        ls_index        activeDoc       = pApp->ActiveDoc();
        if (activeDoc != kLsNoElem) {
                DRDoc*  theDoc = ((DRDoc*)pApp->GetDoc(activeDoc));
                return (theDoc == NULL) ? false : true;
        }
        return (false);

} /* DQSCmd::IsValid */


/* ------------------------------------------------------------------
        DQSCmd::do_cmd -
------------------------------------------------------------------- */
err_t DQSCmd::do_cmd(void)
{
        GLRect myBounds;
        DRDoc*  theDoc = ((DRDoc*)fParentApp->ActiveWindow()->GetDoc());
        assert(theDoc);
        GLSetRect(&myBounds, 22, 1, 341, 511);

        DQSWindow* pTWindow = new DQSWindow(fWhichList, fParentApp, theDoc, &myBounds, WN_SIZE_WINDOW, "Dramatica Query
System");

//      (new DQSWindow(fWhichList, fParentApp, theDoc, &myBounds, WN_SIZE_WINDOW, "Dramatica Query System"))-
>ModalLoop();

        if (pTWindow) {
                theDoc->GetWindowList()->Append(pTWindow);
                pTWindow->InitWindow();
                pTWindow->ShowWindow();

                fParentApp->SetActiveWindows();
                fParentApp->ClearStoragePtr();
        }

        return NOERR;
} /* DQSCmd::do_cmd */


#pragma segment main

/* xxxxxxxxxxxxxxxxxxxxxxxxxxxxxxxxxxxxxxxxxxxxxxxxxxxxxxxxxxxxxxxxxxxxxxx
 * $Log:           dqs2.cc,v $
Revision 1.2  93/09/24  15:30:19  stephen
On-going DQS2 development.

Revision 1.1  93/08/20  13:56:21  stephen
Initial revision

 */
```

```
/* ----------------------------------------------------------------------
	DQS2.H
	Dramatica Query System (2nd version)
	Copyright (C) 1993 Screenplay Systems Inc.
	Revised:		$Id$
------------------------------------------------------------------------- */

#pragma once

#ifndef __DQS2__
#define __DQS2__

#include "listsx.h"
#include "tview.h"
#include "listview.h"
#include "popup.h"
#include "rgn.h"
#include "tdialog.h"
#include "grphitms.h"

#include "consts.h"
#include "cpanel.h"
#include "topicvw.h"
#include "graphbtn.h"
#include "helppal.h"

#pragma segment dqs2

class DQSWindow;
class DQSHelpView;

#define	TEMP_STR_SIZE		6000

#define MAXTEXTITMS			5		// Maximum textual items for a query
#define MAXRADIOBTNS		5		// Maximum radio buttons for a query
#define MAXEDITVIEWS		5		// Maximum edit views for a query

const long kMinVisitationTime		= 5 * 60;		// Minimum time (in ticks) required for user to "visit" a
topic and thus set visitation dot

const short	kLastHelpItem	= 9;				// Should match fMinItemNumber

//	Indexes into the help button item

const short	kHBtnTopic			= 0;
const short	kHBtnBackground		= 1;
const short	kHBtnStorytelling	= 2;
const short	kHBtnHelp			= 3;
const short	kHBtnDefinition		= 4;
const short	kHBtnContext		= 5;
const short	kHBtnStories		= 6;

const short	kNmOfHelpBtns		= 7;

const short	kTQCharacter		= 0;
const short	kTQPlot				= 1;
const short	kTQStructure		= 2;
const short	kTQStorytelling		= 3;

/* ----------------------------------------------------------------------
					Dramatica Query System (2) WINDOW CLASS
------------------------------------------------------------------------- */
class DQSWindow : public TWindow {
public:
	// CONSTRUCTION/DESTRUCTION
	DQSWindow(seg_id_t whichList, TAppl *pTAppl, TDoc *pTDoc, const GLRect *bounds, wn_type windowType, const char
*title, ptr_t storage = NULL);
	~DQSWindow(void);

	// PUBLIC UTILITIES
	virtual char*		ClassName(void) const		{ return "DQSWindow"; }
	virtual class_t		ClassType(void) const		{ return kDQSWindow; }
	virtual bool_t		IsOfType(const void *pType) const { return *(class_t*) pType == kDQSWindow ||
TWindow::IsOfType(pType); }
	bool_t				IsDirty(void);
//	virtual bool_t		DoItemHit(EVENT_REC *pEvt, GLPoint mPt);

	// CUSTOMIZED BEHAVIOR
	virtual void		InitWindow(void);
//	virtual void		DoIdle(void);
//	virtual ulong		CalcIdle(void);
	virtual void		DoItemHit(ls_index itemHit);

	//	PUBLIC BEHAVIOR

	TopicListView*	GetTopicListView(void)					{ return fTopicListView; }
	void			SelectNewQuestion(short clickedRow, short clickedID, bool_t dblClick, bool_t
saveAnswer);
	void			ClickCurrentQuestion(void)				{
SelectNewQuestion(fCurrentTopicRow, fCurrentTopicID, false, true); }
	void			LeftStructuralListClick(short clickedRow, short clickedID, bool_t dblClick, bool_t
saveAnswer);
	void			RightStructuralListClick(short clickedRow, short clickedID, bool_t dblClick, bool_t
saveAnswer);

//	void			GetWindowRect(GLRect* theRect);
	void			DQSSelectFont(void);

protected:
	// DATA MEMBERS
	Dramatica*		fApp;
	pfm_fd_t		fAppPFMFile;
	DRDoc*			fDoc;
	StoryTbl*		fStoryTbl;

	PText*			fPrefsPT;				// DQS Prefs PText
	PText*			fResponses;
	PText*			fStoryDocPT;			// Many document-specific options and parameters are
stored here
	PText*			fStellingPT;			// Storytelling ptext.
	PText*			fMainCharPT;			// Main Character PText
	PText*			fObstCharPT;			// Obstacle Character PText
```

```
        hdl_t                    fTempStrHdl;             // Handle to Temp memory used globally in DQS
        char*                    fTempStr;                         // Temp memory ptr

        //      Button pointers

        PushBtn*                 fDoneButton;             // Press Done to exit DQS.
        PushBtn*                 fHomeButton;             // Pressing this gets you to the home window

        //      Bar items

        BarGraph*                fFormingBar;             // Percentage of how much storytelling has occured
        BarGraph*                fTellingBar;             // Percentage of how much storyforming has occured

        //      Topic list data

        Popup*                   fTopicPopup;             // Popup used to choose question path
        seg_id_t                 fCurrentTopicList;       // The currently selected question path
        TopicListView*      fTopicListView;         // Pointer to our topics list view
        short                    fNmOfTopics;             // Total number of Topics available
        SList                    ftopicListOrder;  // A short list of applicable topics
        ls_index                 fMinItemNumber;          // ls_index of the last non-changing item in our list
        ls_index                 fItemToGetFocus;  // Which item in the list should get focus?

        //      Geometry.  Coordinates & rects

        gl_coord_t               fLeftEdge;                        // Pixels of left margin
        gl_coord_t               fRightEdge;                       // Pixels of right margin
        gl_coord_t               fBottomEdge;             // Pixels of bottom margin
        gl_coord_t               fLeftAreaWidth;          // Width of our topic List
        gl_coord_t               fTopLine;                         // Top of topic list & QA Rect
        gl_coord_t               fVertDividingLine;       // Bold line that separates left area from QA area
        gl_coord_t               fHorizDivLineSpace;      // pixels between fGrowDownPosition & horizontal diving
line

        Rgn                      fGrayBGRgn;                       // Region for the gray background
        GLRect                   fEmptyRect;                       // Rectangle which is initlaize to empty.
        GLRect                   fStatusRect;             // Rect for the status area in lower left of window
        GLRect                   fFormingBarRect;  // Rect for Forming percentage bar
        GLRect                   fTellingBarRect;  // Rect for Telling percentage bar
        GLRect                   fButtonRect;             // Rect which encloses the button group
        GLRect                   fQARect;                          // Area within which all queries occur
        GLRect                   fTopicListBounds;        // Rect to fit topic list into
        GLRect                   fHelpViewRect;           // Rect of our help view
        GLRect                   fTopicTitleRect;  // Text Line at top with topic name
        GLRect                   fStoryCountRect;  // Small area on top right with count of stories (TEMP)
        GLRect                   fSavedClipRect;          // Saved clipping rect (used for restoring clipping rgn)

        GLRect                   fHomeBtnRect;            // Location of the HOME button

        GLRect                   fPopRect;                         // Rect for topic popup
        GLRect                   fPrevArrowRect;          // Rect for up arrow (Previous topic)
        GLRect                   fNextArrowRect;          // Rect for dn arrow (Next topic)
        GLRect                   fRevertBtnRect;          // Rect for Revert button
        GLRect                   fDoneBtnRect;            // Rect for Done button

        GLRect                   fHelpBtnRect;            // Rect for all help buttons

        GLRect                   fTopicHelpBtnRect;       // Rect for Topic help button
        GLRect                   fBGHelpBtnRect;          // Rect for Background help button
        GLRect                   fSTHelpBtnRect;          // Rect for Storytelling help button
        GLRect                   fImpactHelpBtnRect;      // Rect for Impact help button
        GLRect                   fDefHelpBtnRect;  // Rect for Definition help button
        GLRect                   fContextHelpBtnRect;// Rect for Context help button
        GLRect                   fExampleHelpBtnRect;// Rect for Example help button

        GraphBtn*                fUpBtn;                           // Graphic up arrow
        GraphBtn*                fDnBtn;                           // Graphic down arrow
        Bitmap*                  fUpArrowBITM;            // Bitmap for up arrow
        Bitmap*                  fDownArrowBITM;          // Bitmap for down arrow
        Bitmap*                  fHandBITM;                        // Bitmap for hand bitmap

        gl_font_t                fFont;                                     // Font for direct Question
        short                    fFontSize;                                 // Size of font
        gl_face_t                fFace;                                     // Face of font

        //      DATA FOR THE QArea

        gl_coord_t               fQTopMargin;                      // # of pixels to drop down from top
        gl_coord_t               fQLeftMargin;                     // # of pixels from left edge of fExtent to draw
        gl_coord_t               fQRightMargin;                    // # of pixels from right edge of fExtent to draw
        gl_coord_t               fQTextSpacer;                     // # of pixels between Text Items & other stuff
        gl_coord_t               fRadioBtnIndent;         // # of pixels to indent radio buttons
        gl_coord_t               fRadioBtnSpacer;         // # of pixels between radio buttons
        gl_coord_t               fEditViewIndent;         // # of pixels to indent left & right side of EditView
        gl_coord_t               fHelpAreaMinHeight;               // Minimum height of the help area
        gl_coord_t               fGrowDownPosition;                // Lowest point in Question Area
        gl_coord_t               fMaxItemBottom;                   // Lowest point in Question Area for non-help
items

        short                    fCurrentTopicRow;                 // Row of the question's parameters
        seg_id_t                 fCurrentTopicID;         // PFMID for the PText segment containing this question's
parameters
        PText*                   fDQSPT;                                    // The Ptext segment for this question
        long                     fQuestionAgeTime;                 // Tickcount of when the user entered this
question
        char                     fRESPKey[40];                     // RESP Key for variable to store value
        short                    fDQSType;                                  // type ("TY") of this query (see
DQS2.r)
        short                    fDQSTopicType;                    // Topic Type ("TQ") of this query (see DQS2.r)
        char                     fTopicTitle[85];         // Question title ("QT") of this query (see DQS2.r)

        //      Data for the Home Window

        GraphBtn*                fApproachBtns;                    // Buttons in home window for "Genre", "Plot",
"Theme" and "Character"
        GraphBtn*                fStageBtns;                                // Buttons in home window for "Forming",
"Illustrating", "Weaving", and "Reception"
        StatText*                fStageText[2];                    // Text for stage labels
        Cluster*                 fClusters[2];                     // Clusters to group buttons
        PushBtn*                 fProceedBtn;                      // Proceed push button
        ls_index                 fProceedBtnID;                    // ID of this button

        //      Data for Text Questions
```

```
        short               fNmOfTextItems;                         // Number of text items (default is 1)
        pl_id               fTextPIDs[MAXTEXTITMS];             // Array of 10 pool IDs for textual items
        TextWrap*           fTextWraps[MAXTEXTITMS];    // Array of 10 textwraps for the textual items
        GLRect              fTextRects[MAXTEXTITMS];

        //      Data for Radio Buttons

        short               fNmOfRadioBtns;                         // Number of Radio Buttons (default is
0)
        RadioBtn*           fRadioBtns[MAXRADIOBTNS];   // Any Radio buttons the query has
        ls_index            fRadioIDs[MAXRADIOBTNS];    // Indicies for the radio button
        char                fRbRESPKey[40];                         // PText Key for RESP segment of where
to get & store value
        PText*              fRBSegmentPT;                           // Where to get & save this Radio
button's data

        //      Data for non-editable TextWrap Displays

        short               fTextWrapProcID;                // non-zero ProcID for a non-editable TextWrap
View
        DQSHelpView*    fTextWrapDisplay;                   // A helpView is used to display wrapped text

        //      Data for Edit Text Areas

        short               fNmOfEditViews;                         // Number of Edit Text Items
        EditView*           fEditViews[MAXEDITVIEWS];   // Array of EditText Items
        pl_id               fEditViewKeys[MAXEDITVIEWS];// Corresponding EditText Variable Names
        short               fEditSegTypes[MAXEDITVIEWS];// Which Segment to store & retrieve?
        gl_font_t           fEditFont;                                      // Font for EditViews
        short               fEditFontSize;                          // Size of font for EditViews
        gl_face_t           fEditFontFace;                          // Face for EditViews
        gl_coord_t          fEditFontHeight;                // Size in pixels of one line

        //      Data for Structural Finder, including left & right list boxes

        bool_t              fStructuralFinder;                              // TRUE if we are displaying a
structural finder
        ushort              fTotalStories;                                  // Total stories currently
valid
        short               fWhichTables[kMaxSearchSlots+1];// Which search tables to load (+1 because last
position is a sentinel "0")
        TopicListView*  fLeftListView;                              // ptr to left side structural finder
view
        TopicListView*  fRightListView;                             // ptr to right side structural finder
view
        TItem*              fAddBtn;                                                // ADD Button
        TItem*              fRemoveBtn;                                             // REMOVE button

        //      Data for help buttons

        DQSHelpView*    fHelpView;                                          // Pointer to our help view
        gl_font_t           fHelpFont;                                              // Font for direct
Question
        short               fHelpFontSize;                                  // Size of font
        gl_face_t           fHelpFace;                                              // Face of font
        short               fHelpViewDesired;                               // True if helpView is desired
(default true)
        short               fHelpTypeForWindow;                             // ID of 'DQSH' segment
describing the operation of this specific window
        bool_t              fHelpViewVisible;                               // True if help view currently
displayed
        GraphBtn*           fhelpBtns;                                              // help button array
        short               fBtnStateTable[kNmOfHelpBtns];      // Which buttons are up or down
        short               fHelpDefSemVal;                                 // If > 0, then use this for a
definition
        ushort              fApprID;                                                // An appreciation ID
(# > 999) for this topic
        ushort              fCorrespQuestID;                        // Corresponding storyforming or
storytelling question

        // LOCAL UTILITIES
//      virtual void    init_dlog(void);
//      virtual bool_t  done(void)              { return ((fItemHit == fDefaultBtn) || (fItemHit == 5)); }
//                      bool_t  filter_proc(void)       { return false; }

        void                get_question_list_title(seg_id_t whichList, char* listTitle);
        void                set_question_list(seg_id_t whichList, bool_t saveCurrentQuestion = true);
        void                set_checkmarks(void);
        void                set_storyforming_bar(void);

        virtual void    draw_window(GL_ENV_REF env);
        bool_t              set_question(short whichQuestion);
        void                save_and_clear_question(bool_t saveAnswer);
        bool_t              set_help_text(void);
        void                make_help_visible(void);
        void                make_help_invisible(void);

        void                load_home_window(void);
        void                save_home_window(void);
        void                home_window_itemhit(ls_index itemHit);
        bool_t              path_to_home_buttons(short whichPath, short* theApproach, short* theStage);
        void                go_home(void);

        void                load_storytelling(void);

        void                load_dynamic_buttons(void);
        void                save_radio_buttons(void);

        void                load_structural_finder_list(void);
        void                save_structural_finder(void);

        virtual bool_t  DoGrow(EVENT_REC *pEvt);
        virtual  void   DoZoom(short partCode);
        virtual bool_t  DoKeyDown(EVENT_REC *pEvt);
        void                calc_item_sizes(void);
        void                prev_topic(void);
        void                next_topic(bool_t saveAnswer);
        PText*              get_PText(short whichSegment);

        void                move_left_to_right(void);
        void                move_right_to_left(void);
        void                reinit_dynamic_searchTable(void);
```

```
        void                        reinit_structural_searchTable(void);
        void                        scan_storytable_now(void);

        void                        clip_out_drawing(void);
        void                        restore_clipping(void);

        virtual GLPoint   min_window_size(void);


        //        TextWrap Display functions (in DQSPROCS.CC):

        void                        load_TextWrapDisplay(void);
        void                        twd1_Basic(void);
        void                        twd_QSRecap(void);
        void                        twd_OSRecap(void);
        void                        twd_MCRecap(void);
        void                        twd_OCRecap(void);
        void                        twd_SSRecap(void);
        void                        twd_SFRecap(void);


        void                        charDyn_recap_list(void);
        void                        plotDyn_recap_list(void);
        void                        basic_4Appr_recap_list(char* dest, enum APPRECS whichClass);
        void                        addl_8Appr_recap_list(char* dest, enum APPRECS whichClass);
        void                        addlOS_Appr_recap_list(void);
        void                        interpret_dyn_semVal_name(char* dest, appr_index_t apprIndex);
        void                        interpret_semVal_name(char* dest, enum APPRECS whichClass, apprecs_array whichAppr);

}; /* DQSWindow */


/* ------------------------------------------------------------------------
        DQSHelpView - View Class for DQS Help.
------------------------------------------------------------------------ */
class DQSHelpView : public HelpPalView {
public:
        // CONSTRUCTION/DESTRUCTION
        DQSHelpView(DRDoc* theDoc, ItemList* pParent, vw_flags vflags = kNoFlags, const GLRect *extent = NULL, it_flags
iflags = List::kNoFlags, const GLColor *color = &kGLBlackClr)
                : HelpPalView(theDoc, pParent, vflags, extent, iflags, color) {}
        virtual ~DQSHelpView(void) {}

        // PUBLIC UTILITIES
        virtual char*     ClassName(void) const      { return "DQSHelpView"; }
//      virtual class_t   ClassType(void) const      { return kDefinePalView; }
//      virtual bool_t    IsOfType(const void *pType) const { return *(class_t*) pType == kDefinePalView ||
TView::IsOfType(pType); }
//      virtual TObject* Duplicate(void) const       { return new DefinitView(*this); }

        virtual void      Resize(void *pNewSize, TObject *pSender)     {}
        virtual  void     init_view(void)                                                          {}

protected:

}; /* DQSHelpView */



/* ------------------------------------------------------------------------
                                                 Dramatica Query System (2) COMMAND CLASS
------------------------------------------------------------------------ */
class DQSCmd : public TCommand {
public:
        DQSCmd(TAppl* pTAppl, seg_id_t whichList) : TCommand(pTAppl), fWhichList(whichList) {}

        virtual char*     ClassName(void)   const    { return "DQSCmd"; }
        virtual class_t   ClassType(void) const      { return kDQSCmd; }
        virtual bool_t    IsOfType(const void *pType) const { return *(class_t*) pType == kDQSCmd ||
TCommand::IsOfType(pType); }
        virtual TObject* Duplicate(void) const       { return new DQSCmd(*this); }

        static bool_t     IsValid(TAppl *pTAppl);

protected:
        virtual err_t     do_cmd(void);

        seg_id_t                    fWhichList;                      // The default question list to use starting up

}; /* DQSCmd */

#pragma segment main


/* xxxxxxxxxxxxxxxxxxxxxxxxxxxxxxxxxxxxxxxxxxxxxxxxxxxxxxxxxxxxxxxxxxxxxxxxx
 *  $Log:        dqs2.h,v $
 * Revision 1.2  93/09/24  15:30:24  stephen
 * On-going DQS2 development.
 *
 * Revision 1.1  93/08/20  13:56:32  stephen
 * Initial revision
 *
 */

#endif /* __DQS2__ */
```

```
/* ----------------------------------------------------------------------
	DQS2.R
	Dramatica's Query Questions Segments (DQS II)
	Copyright (C) 1993 Screenplay Systems Inc.
	Revised:	$Id: dqs2.r,v 1.2 93/09/24 15:30:26 stephen Exp Locker: stephen $
---------------------------------------------------------------------- */

#ifdef macintosh
	#include "systypes.r"
	#include "types.r"
#else
	#include <systypes.r>
	#include <types.r>
#endif

#include "dqs-defs.h"
#include "apprdefs.h"

/* ----------------------------------------------------------------------
	'DQS2' - Parameterized Dramatica Query System Text.
---------------------------------------------------------------------- */
type 'DQS2' {
	cstring;			/* the stream of parameterized text */
};


/* ----------------------------------------------------------------------
	Actual DQS2 segment which contain 1 segment (resource) per question.

	  key		type	value
	  ====================================
		APs:	s		ApprVal of this Structural or Dynamic Appreciation
		TY:		s		Type of Dialog / Query window to construct
		QT:		c		Question Topic (what appears above top of content rect)
		CQ:		s		Corresponding Question -- used to link storytelling and
storyforming questions
		HL:		s		If this param exists (value should be zero) then help is explicitly
turned off.  The default if not present is "TRUE"
		HP:		s		The ID of the "DQSH" segment to use for this question's help button

		FOR TEXTUAL DISPLAY:

		TN:		s		# of textual items to display (default is 1 if not specified)
	*	T1:		c		Direct Question (what is asked before user's choice)
	*	Tx:		c		Additional text item(s)

		FOR RADIO BUTTON RESPONSES:

		RN:		s		# of Radio buttons (default is 2 if param not specified)
		RV:		c		Radio button Variable Name to store response under
		RS1:	s		PText Segment: 0 = kResponsesPT, 1 = kStoryDocPT, 2 = kStellingPT, 3 =
kMainCharPT, 4 = kObstCharPT
	*	R1:		c		Radio Button Answer #1 text
	*	R2:		c		Radio Button Answer #2 text
	*	Rx:		c		Radio Button Answer #x text
		RD:		s		Radio Button Default (0 for none)
		DQ:		s		Which dynamic question (0-7) if any

		FOR TEXTUAL RESPONSES:

		EN:		s		# of Edit View fields (default is 0)
		EV1:	c		Edit View Variable Name to store (and retrieve) text from
		ES1:	s		PText Segment: 0 = kResponsesPT, 1 = kStoryDocPT, 2 = kStellingPT, 3 =
kMainCharPT, 4 = kObstCharPT
	*	ET1:	c		Edit View Title - If Text, then align this title left of field
		ED1:	c		Default text for Edit field
		EM1:	s		# of lines of the edit text field; if present, assume scroll

		FOR CHECKBOX RESPONSES:

		CN:		s		# of Checkbox fields (default is 0)
		CV1:	c		CheckBox Variable Name to store (and retrieve) value from
	*	CT1:	c		Text displayed right of Checkbox #1
		CD1:	s		Checkbox Default: Boolean value, true = on, false = off

		FOR NON-EDITABLE TEXTWRAP:

		TP:		s		ProcID which indicates how to fill this textwrap
		TX1:	c		Text used to build this question (so it doesn't have to be static)
		TXn:	c		Additional Text items <n> is a number from 1 to 99

		FOR STRUCTURAL FINDER (LISTS):

		FOR STORYTELLING TEXT WINDOWS ONLY:

		ALT1	c		Alternate text to use instead of T1 if no structural choice has been made

		FOR SCROLLING HELP WINDOW:

		QE:		c		Question Explanation
		BG:		c		Background
		ST:		c		Storytelling Tips
		DU:		c		Dramatica Usage (How Dramatica does it)

		ADDITIONAL INFORMATION / FLAGS

		TQ:		s		Topic of question -- what it concerns (e.g. Character, Plot,
Structure, Storytelling)

		Topic Question (TQ) Key:
				0	=	Character
				1	=	Plot
				2	=	Structure
				3	=	Storytelling for a SemVal Item ONLY
				4	=	Pure Storytelling (completely non-semVal related)

--------------------------------------------------------------------------

		Type of dialog (TY) Key:
				0	=	Pure Textual Display
				1	=	Dynamic Question Radio Button Choice
				2	=	Text Entry
				3	=	General Radio Button
```

```
                    75      =       Non-editable Textwrap (i.e. Recap)
                    100     =       Structural Items
                    999     =       Home Window

        * These Items have parallel keys of <key> followed by:

                dx      s               Relative x position for item
                dy   s      Relative y position for item
                fo   s          Font number (if other than default)
                fs   s      Font Size (if other than default)

    Segment text takes the form: <slash><key><type><colon><value><slash>
    <slash> must be entered as a double-backslash "\\".

----------------------------------------------------------------------------- */

resource 'DQS2' (kDQSHome, PFM_MIN_PRIO) {             // Placeholder Question for "Home Window"
        "\\TYs:999"
    "\\TQs:9"
        "\\QTc:Home Window: Select Your Path"
        "\\T1c:Select one of the four Approaches to story, then either of the two Stages of working with a story, and
press 'Proceed'."
        "\\HLs:0"                                       /* Forces helpView OFF */
        "\\"
};

resource 'DQS2' (kDQSResolve, PFM_MIN_PRIO) {
        "\\APs:" $$Format("%d,", rApprResolve)
        "\\CQs:" $$Format("%d,", kDQSResolveST)
        "\\HPs:" $$Format("%d,", rDQSHPRadioButtons)
        "\\TYs:1"
        "\\QTc:Change or Steadfast"
    "\\TQs:0"
        "\\DQs:0"

        "\\T1c:Which best describes what {CNN(MC,NM)} decides?"
        "\\RNs:3"
        "\\RVc:Resolve"
        "\\R1c:To Change"
        "\\R2c:To Remain Steadfast"
        "\\R3c:Choose Later"

        "\\"
};

resource 'DQS2' (kDQSDirection, PFM_MIN_PRIO) {
        "\\APs:" $$Format("%d,", rApprDirection)
        "\\CQs:" $$Format("%d,", kDQSDirectionST)
        "\\HPs:" $$Format("%d,", rDQSHPRadioButtons)
        "\\TYs:1"
        "\\QTc:Stop or Start"
    "\\TQs:0"
        "\\DQs:1"

        "\\T1c:Regarding {CNN(MC,NM)}, is the audience...?"
        "\\RNs:3"
        "\\RVc:Direction"
        "\\R1c:Waiting for something to stop"
        "\\R2c:Waiting for something to start"
        "\\R3c:Choose Later"

        "\\"
};

resource 'DQS2' (kDQSDirectionA, PFM_MIN_PRIO) {
        "\\APs:" $$Format("%d,", rApprDirection)
        "\\CQs:" $$Format("%d,", kDQSDirectionST)
        "\\HPs:" $$Format("%d,", rDQSHPRadioButtons)
        "\\TYs:1"
        "\\QTc:Stop or Start"
    "\\TQs:0"
        "\\DQs:1"

        "\\T1c:Does {CNN(MC,NM)} need to grow by...?"
        "\\RNs:3"
        "\\RVc:Direction"
        "\\R1c:Stopping a negative attitude or approach"
        "\\R2c:Starting a positive attitude or approach"
        "\\R3c:Choose Later"

        "\\"
};

resource 'DQS2' (kDQSDirectionB, PFM_MIN_PRIO) {
        "\\APs:" $$Format("%d,", rApprDirection)
        "\\CQs:" $$Format("%d,", kDQSDirectionST)
        "\\HPs:" $$Format("%d,", rDQSHPRadioButtons)
        "\\TYs:1"
        "\\QTc:Stop or Start"
    "\\TQs:0"
        "\\DQs:1"

        "\\T1c:Does {CNN(MC,NM)} grow in resolve while...?"
        "\\RNs:3"
        "\\RVc:Direction"
        "\\R1c:Holding out for something to Stop"
        "\\R2c:Holding out for something to Start"
        "\\R3c:Choose Later"

        "\\"
};

resource 'DQS2' (kDQSApproach, PFM_MIN_PRIO) {
        "\\APs:" $$Format("%d,", rApprApproach)
        "\\CQs:" $$Format("%d,", kDQSApproachST)
        "\\HPs:" $$Format("%d,", rDQSHPRadioButtons)
        "\\TYs:1"
        "\\QTc:Do-er or Be-er"
    "\\TQs:0"
        "\\DQs:2"

        "\\T1c:Which best describes {CNN(MC,NM)}'s approach?"
```

```
        "\\RNs:3"
        "\\RVc:Approach"
        "\\R1c:A Do-er"
        "\\R2c:A Be-er"
        "\\R3c:Choose Later"

        "\\"
};

resource 'DQS2' (kDQSSex, PFM_MIN_PRIO) {
        "\\APs:" $$Format("%d,", rApprSex)
        "\\CQs:" $$Format("%d,", kDQSSexST)
        "\\HPs:" $$Format("%d,", rDQSHPRadioButtons)
        "\\TYs:1"
        "\\QTc:Mental Sex"
    "\\TQs:0"
        "\\DQs:3"

        "\\T1c:What is (CNN(MC,NM))'s Mental Sex?"
        "\\RNs:3"
        "\\RVc:Sex"
        "\\R1c:Male"
        "\\R2c:Female"
        "\\R3c:Choose Later"

        "\\"
};

resource 'DQS2' (kDQSWork, PFM_MIN_PRIO) {
        "\\APs:" $$Format("%d,", rApprWork)
        "\\CQs:" $$Format("%d,", kDQSWorkST)
        "\\HPs:" $$Format("%d,", rDQSHPRadioButtons)
        "\\TYs:1"
        "\\QTc:Action or Decision"
    "\\TQs:0"
        "\\DQs:4"

        "\\T1c:Which best describes the feel of your story?"
        "\\RNs:3"
        "\\RVc:Work"
        "\\R1c:Action oriented"
        "\\R2c:Decision oriented"
        "\\R3c:Choose Later"

        "\\"
};

resource 'DQS2' (kDQSLimit, PFM_MIN_PRIO) {
        "\\APs:" $$Format("%d,", rApprLimit)
        "\\CQs:" $$Format("%d,", kDQSLimitST)
        "\\HPs:" $$Format("%d,", rDQSHPRadioButtons)
        "\\TYs:1"
        "\\QTc:Timelock or Optionlock"
    "\\TQs:0"
        "\\DQs:5"

        "\\T1c:What is the type of limit that brings the story to a resolution?"
        "\\RNs:3"
        "\\RVc:Limit"
        "\\R1c:A Time-lock"
        "\\R2c:An Option-lock"
        "\\R3c:Choose Later"

        "\\"
};

resource 'DQS2' (kDQSOutcome, PFM_MIN_PRIO) {
        "\\APs:" $$Format("%d,", rApprOutcome)
        "\\CQs:" $$Format("%d,", kDQSOutcomeST)
        "\\HPs:" $$Format("%d,", rDQSHPRadioButtons)
        "\\TYs:1"
        "\\QTc:Success or Failure"
    "\\TQs:0"
        "\\DQs:6"

        "\\T1c:Which best describes how the efforts in the story resolve?"
        "\\RNs:3"
        "\\RVc:Outcome"
        "\\R1c:Success"
        "\\R2c:Failure"
        "\\R3c:Choose Later"

        "\\"
};

resource 'DQS2' (kDQSJudgment, PFM_MIN_PRIO) {
        "\\APs:" $$Format("%d,", rApprJudgment)
        "\\CQs:" $$Format("%d,", kDQSJudgmentST)
        "\\HPs:" $$Format("%d,", rDQSHPRadioButtons)
        "\\TYs:1"
        "\\QTc:Good or Bad"
    "\\TQs:0"
        "\\DQs:7"

        "\\T1c:What are the results of (CNN(MC,NM))'s efforts to resolve (PPN(MC,P1)) personal problems shown to be?"
        "\\RNs:3"
        "\\RVc:Judgment"
        "\\R1c:Good"
        "\\R2c:Bad"
        "\\R3c:Choose Later"

        "\\"
};

resource 'DQS2' (kDQSMCName, PFM_MIN_PRIO) {
        "\\HPs:" $$Format("%d,", rDQSHPFillBlank)
        "\\TYs:2"
        "\\QTc:Main Character's Name"
    "\\TQs:0"

        "\\T1c:What is the Main Character's Name?"
        "\\ENs:1"
        "\\EV1c:NM"
```

```
        "\\ES1s:3"
        "\\ED1c:The Main Character"

        "\\"
);

resource 'DQS2' (kDQSMCGenderST, PFM_MIN_PRIO) {
        "\\HPs:" $$Format("%d,", rDQSHPRadioButtons)
        "\\TYs:3"
        "\\QTc:Main Character's Gender"
    "\\TQs:0"
        "\\DQs:3"

        "\\T1c:What is {CNN(MC,NM)}'s gender?"
        "\\RNs:3"
        "\\RVc:Sex"
        "\\RS1s:3"
        "\\R1c:Male"
        "\\R2c:Female"
        "\\R3c:Neutral"

        "\\"
);

resource 'DQS2' (kDQSMCDesc, PFM_MIN_PRIO) {
        "\\HPs:" $$Format("%d,", rDQSHPFillBlank)
        "\\TYs:2"
        "\\QTc:Main Character's Description"
    "\\TQs:0"

        "\\T1c:Enter a brief description of {CNN(MC,NM)}:"
        "\\ENs:1"
        "\\EV1c:Des"
        "\\ES1s:3"
        "\\ED1c:"
        "\\EM1s:8"

        "\\"
);

resource 'DQS2' (kDQSOCName, PFM_MIN_PRIO) {
        "\\HPs:" $$Format("%d,", rDQSHPFillBlank)
        "\\TYs:2"
        "\\QTc:Obstacle Character's Name"
    "\\TQs:0"

        "\\T1c:What is Your Obstacle Character's Name?"
        "\\ENs:1"
        "\\EV1c:NM"
        "\\ES1s:4"
        "\\ED1c:The Obstacle Character"

        "\\"
);

resource 'DQS2' (kDQSOCGenderST, PFM_MIN_PRIO) {
        "\\HPs:" $$Format("%d,", rDQSHPRadioButtons)
        "\\TYs:3"
        "\\QTc:Obstacle Character's Gender"
    "\\TQs:0"
        "\\DQs:3"

        "\\T1c:What is {CNN(OC,NM)}'s gender?"
        "\\RNs:3"
        "\\RVc:Sex"
        "\\RS1s:4"
        "\\R1c:Male"
        "\\R2c:Female"
        "\\R3c:Neutral"

        "\\"
);

resource 'DQS2' (kDQSOCDesc, PFM_MIN_PRIO) {
        "\\HPs:" $$Format("%d,", rDQSHPFillBlank)
        "\\TYs:2"
        "\\QTc:Obstacle Character's Description"
    "\\TQs:0"

        "\\T1c:Enter a brief description of {CNN(OC,NM)}:"
        "\\ENs:1"
        "\\EV1c:Des"
        "\\ES1s:4"
        "\\ED1c:"
        "\\EM1s:8"

        "\\"
);

resource 'DQS2' (kDQSSTDomains, PFM_MIN_PRIO) {
        "\\APs:" $$Format("%d,", rApprSTDom)
        "\\CQs:" $$Format("%d,", kDQSSTDomainsST)
        "\\HPs:" $$Format("%d,", rDQSHPStructualFinders)
        "\\TYs:100"
        "\\QTc:Choosing the Objective Story Domain"
    "\\TQs:2"

        "\\T1c:Locate the domain in which the objective story takes place from the list on the left, then press the ADD
button:"

        "\\"
);

resource 'DQS2' (kDQSSTConcerns, PFM_MIN_PRIO) {
        "\\APs:" $$Format("%d,", rApprSTCon)
        "\\CQs:" $$Format("%d,", kDQSSTConcernsST)
        "\\HPs:" $$Format("%d,", rDQSHPStructualFinders)
        "\\TYs:100"
        "\\QTc:Choosing the Objective Story Concern"
```

```
    "\\TQs:2"
         "\\Tlc:Locate the area of concern in the objective story from the list on the left, then press the ADD button:"
         "\\"
};

resource 'DQS2' (kDQSSTRanges, PFM_MIN_PRIO) {
         "\\APs:" $$Format("%d,", rApprSTRng)
         "\\CQs:" $$Format("%d,", kDQSSTRangesST)
         "\\HPs:" $$Format("%d,", rDQSHPStructualFinders)
         "\\TYs:100"
         "\\QTc:Choosing the Objective Story Range"
    "\\TQs:2"
         "\\Tlc:Locate the objective story's thematic focus from the list on the left, then press the ADD button:"
         "\\"
};

resource 'DQS2' (kDQSSTProblem, PFM_MIN_PRIO) {
         "\\APs:" $$Format("%d,", rApprSTPbm)
         "\\CQs:" $$Format("%d,", kDQSSTProblemST)
         "\\HPs:" $$Format("%d,", rDQSHPStructualFinders)
         "\\TYs:100"
         "\\QTc:Choosing the Objective Story's Problem"
    "\\TQs:2"
         "\\Tlc:Locate the source of the objective story's problems from the list on the left, then press the ADD
button:"
         "\\"
};

resource 'DQS2' (kDQSSTStipulation, PFM_MIN_PRIO) {
         "\\APs:" $$Format("%d,", rApprSTStp)
         "\\CQs:" $$Format("%d,", kDQSSTStipulationST)
         "\\HPs:" $$Format("%d,", rDQSHPStructualFinders)
         "\\TYs:100"
         "\\QTc:Objective Story Stipulation"
    "\\TQs:2"
         "\\Tlc:Locate the standard by which progress is measured in the Objective Story:"
         "\\"
};
resource 'DQS2' (kDQSSTSolution, PFM_MIN_PRIO) {
         "\\APs:" $$Format("%d,", rApprSTSol)
         "\\CQs:" $$Format("%d,", kDQSSTSolutionST)
         "\\HPs:" $$Format("%d,", rDQSHPStructualFinders)
         "\\TYs:100"
         "\\QTc:Objective Story Solution"
    "\\TQs:2"
         "\\Tlc:Locate the solution to the objective story's problems"
         "\\"
};
resource 'DQS2' (kDQSSTFocus, PFM_MIN_PRIO) {
         "\\APs:" $$Format("%d,", rApprSTFoc)
         "\\CQs:" $$Format("%d,", kDQSSTFocusST)
         "\\HPs:" $$Format("%d,", rDQSHPStructualFinders)
         "\\TYs:100"
         "\\QTc:Objective Story Focus"
    "\\TQs:2"
         "\\Tlc:Locate where attention is focused in the objective story"
         "\\"
};
resource 'DQS2' (kDQSSTDirection, PFM_MIN_PRIO) {
         "\\APs:" $$Format("%d,", rApprSTDir)
         "\\CQs:" $$Format("%d,", kDQSSTDirectionST)
         "\\HPs:" $$Format("%d,", rDQSHPStructualFinders)
         "\\TYs:100"
         "\\QTc:Objective Story Direction"
    "\\TQs:2"
         "\\Tlc:Locate the direction of efforts in the objective story"
         "\\"
};
resource 'DQS2' (kDQSSTUnRng, PFM_MIN_PRIO) {
         "\\APs:" $$Format("%d,", rApprSTUnRng)
         "\\CQs:" $$Format("%d,", kDQSSTUnRngST)
         "\\HPs:" $$Format("%d,", rDQSHPStructualFinders)
         "\\TYs:100"
         "\\QTc:Objective Story Catalyst"
    "\\TQs:2"
         "\\Tlc:Locate the item that acts as the catalyst to move the objective story forward"
         "\\"
};
resource 'DQS2' (kDQSSTCrFl, PFM_MIN_PRIO) {
         "\\APs:" $$Format("%d,", rApprSTCrFl)
         "\\CQs:" $$Format("%d,", kDQSSTCrFlST)
         "\\HPs:" $$Format("%d,", rDQSHPStructualFinders)
         "\\TYs:100"
         "\\QTc:Objective Story Inhibitor"
    "\\TQs:2"
         "\\Tlc:Locate the item that impedes the objective story's progress"
         "\\"
};

resource 'DQS2' (kDQSSTGoal, PFM_MIN_PRIO) {
```

```
        "\\APs:" $$Format("%d,", rApprSTGoal)
        "\\CQs:" $$Format("%d,", kDQSSTGoalST)
        "\\HPs:" $$Format("%d,", rDQSHPStructualFinders)
        "\\TYs:100"
        "\\QTc:Story Goal"
    "\\TQs:2"

        "\\Tlc:Locate the common goal of the objective characters:"

        "\\"
};


resource 'DQS2' (kDQSSTRequirement, PFM_MIN_PRIO) {
        "\\APs:" $$Format("%d,", rApprSTReq)
        "\\CQs:" $$Format("%d,", kDQSSTRequirementST)
        "\\HPs:" $$Format("%d,", rDQSHPStructualFinders)
        "\\TYs:100"
        "\\QTc:Story Requirements"
    "\\TQs:2"

        "\\Tlc:Locate the area that best describes the requirements that must be met prior to achieving the goal:"

        "\\"
};

resource 'DQS2' (kDQSMCDomains, PFM_MIN_PRIO) {
        "\\APs:" $$Format("%d,", rApprMCDom)
        "\\CQs:" $$Format("%d,", kDQSMCDomainsST)
        "\\HPs:" $$Format("%d,", rDQSHPStructualFinders)
        "\\TYs:100"
        "\\QTc:Main Character Domain"
    "\\TQs:2"

        "\\Tlc:Locate the domain in which {CNN(MC,NM)} operates:"

        "\\"
};


resource 'DQS2' (kDQSMCConcerns, PFM_MIN_PRIO) {
        "\\APs:" $$Format("%d,", rApprMCCon)
        "\\CQs:" $$Format("%d,", kDQSMCConcernsST)
        "\\HPs:" $$Format("%d,", rDQSHPStructualFinders)
        "\\TYs:100"
        "\\QTc:Main Character Concern"
    "\\TQs:2"

        "\\Tlc:Locate the area of {CNN(MC,NM)}'s concern:"

        "\\"
};


resource 'DQS2' (kDQSMCRanges, PFM_MIN_PRIO) {
        "\\APs:" $$Format("%d,", rApprMCRng)
        "\\CQs:" $$Format("%d,", kDQSMCRangesST)
        "\\HPs:" $$Format("%d,", rDQSHPStructualFinders)
        "\\TYs:100"
        "\\QTc:Main Character Thematic Focus"
    "\\TQs:2"

        "\\Tlc:Locate {CNN(MC,NM)}'s thematic focus:"

        "\\"
};
resource 'DQS2' (kDQSMCProblem, PFM_MIN_PRIO) {
        "\\APs:" $$Format("%d,", rApprMCPbm)
        "\\CQs:" $$Format("%d,", kDQSMCProblemST)
        "\\HPs:" $$Format("%d,", rDQSHPStructualFinders)
        "\\TYs:100"
        "\\QTc:Locate your Main Character's problem"
    "\\TQs:2"

        "\\Tlc:Locate the source of {CNN(MC,NM)}'s problems from the list on the left, then press the ADD button:"

        "\\"
};

resource 'DQS2' (kDQSMCStipulation, PFM_MIN_PRIO) {
        "\\APs:" $$Format("%d,", rApprMCStp)
        "\\CQs:" $$Format("%d,", kDQSMCStipulationST)
        "\\HPs:" $$Format("%d,", rDQSHPStructualFinders)
        "\\TYs:100"
        "\\QTc:Main Character Stipulation"
    "\\TQs:2"

        "\\Tlc:Locate the standard by which {CNN(MC,NM)} judges the degree of {PPN(MC,P1)} concern:"

        "\\"
};

resource 'DQS2' (kDQSMCSolution, PFM_MIN_PRIO) {
        "\\APs:" $$Format("%d,", rApprMCSol)
        "\\CQs:" $$Format("%d,", kDQSMCSolutionST)
        "\\HPs:" $$Format("%d,", rDQSHPStructualFinders)
        "\\TYs:100"
        "\\QTc:Main Character Solution"
    "\\TQs:2"

        "\\Tlc:Locate the solution to {CNN(MC,NM)}'s problems:"

        "\\"
};
resource 'DQS2' (kDQSMCFocus, PFM_MIN_PRIO) {
        "\\APs:" $$Format("%d,", rApprMCFoc)
        "\\CQs:" $$Format("%d,", kDQSMCFocusST)
        "\\HPs:" $$Format("%d,", rDQSHPStructualFinders)
        "\\TYs:100"
        "\\QTc:Main Character Focus"
    "\\TQs:2"
```

```
        "\\Tlc:Locate where (CNN(MC,NM))'s attention is focused:"

        "\\"
};
resource 'DQS2' (kDQSMCDirection, PFM_MIN_PRIO) {
        "\\APs:" $$Format("%d,", rApprMCDir)
        "\\CQs:" $$Format("%d,", kDQSMCDirectionST)
        "\\HPs:" $$Format("%d,", rDQSHPStructualFinders)
        "\\TYs:100"
        "\\QTc:Main Character Direction"
    "\\TQs:2"

        "\\Tlc:Locate the direction of (CNN(MC,NM))'s efforts:"

        "\\"
};
resource 'DQS2' (kDQSMCUnRng, PFM_MIN_PRIO) {
        "\\APs:" $$Format("%d,", rApprMCUnRng)
        "\\CQs:" $$Format("%d,", kDQSMCUnRngST)
        "\\HPs:" $$Format("%d,", rDQSHPStructualFinders)
        "\\TYs:100"
        "\\QTc:Main Character Unique Ability"
    "\\TQs:2"

        "\\Tlc:Locate the quality or item that makes (CNN(MC,NM)) uniquely able to achieve the goal:"

        "\\"
};
resource 'DQS2' (kDQSMCCrFl, PFM_MIN_PRIO) {
        "\\APs:" $$Format("%d,", rApprMCCrFl)
        "\\CQs:" $$Format("%d,", kDQSMCCrFlST)
        "\\HPs:" $$Format("%d,", rDQSHPStructualFinders)
        "\\TYs:100"
        "\\QTc:Main Character Critical Flaw"
    "\\TQs:2"

        "\\Tlc:Locate the quality or item that undermines (CNN(MC,NM))'s efforts:"

        "\\"
};
resource 'DQS2' (kDQSMCGoal, PFM_MIN_PRIO) {
        "\\APs:" $$Format("%d,", rApprMCGoal)
        "\\CQs:" $$Format("%d,", kDQSMCGoalST)
        "\\HPs:" $$Format("%d,", rDQSHPStructualFinders)
        "\\TYs:100"
        "\\QTc:Story Dividend"
    "\\TQs:2"

        "\\Tlc:Locate the area that best describes the dividends accrued while trying to achieve the goal:"

        "\\"
};


resource 'DQS2' (kDQSMCRequirement, PFM_MIN_PRIO) {
        "\\APs:" $$Format("%d,", rApprMCReq)
        "\\CQs:" $$Format("%d,", kDQSMCRequirementST)
        "\\HPs:" $$Format("%d,", rDQSHPStructualFinders)
        "\\TYs:100"
        "\\QTc:Story Forewarnings"
    "\\TQs:2"

        "\\Tlc:Locate the area that best describes the imminent approach of the story consequences:"

        "\\"
};


resource 'DQS2' (kDQSOCDomains, PFM_MIN_PRIO) {
        "\\APs:" $$Format("%d,", rApprOCDom)
        "\\CQs:" $$Format("%d,", kDQSOCDomainsST)
        "\\HPs:" $$Format("%d,", rDQSHPStructualFinders)
        "\\TYs:100"
        "\\QTc:Obstacle Character Domain"
    "\\TQs:2"

        "\\Tlc:Locate the domain in which (CNN(OC,NM)) operates:"

        "\\"
};
resource 'DQS2' (kDQSOCConcerns, PFM_MIN_PRIO) {
        "\\APs:" $$Format("%d,", rApprOCCon)
        "\\CQs:" $$Format("%d,", kDQSOCConcernsST)
        "\\HPs:" $$Format("%d,", rDQSHPStructualFinders)
        "\\TYs:100"
        "\\QTc:Obstacle Character Concern"
    "\\TQs:2"

        "\\Tlc:Locate the area of (CNN(OC,NM))'s concern:"

        "\\"
};
resource 'DQS2' (kDQSOCRanges, PFM_MIN_PRIO) {
        "\\APs:" $$Format("%d,", rApprOCRng)
        "\\CQs:" $$Format("%d,", kDQSOCRangesST)
        "\\HPs:" $$Format("%d,", rDQSHPStructualFinders)
        "\\TYs:100"
        "\\QTc:Obstacle Character Range"
    "\\TQs:2"

        "\\Tlc:Locate (CNN(OC,NM))'s thematic focus:"

        "\\"
};
resource 'DQS2' (kDQSOCProblem, PFM_MIN_PRIO) {
        "\\APs:" $$Format("%d,", rApprOCPbm)
        "\\CQs:" $$Format("%d,", kDQSOCProblemST)
        "\\HPs:" $$Format("%d,", rDQSHPStructualFinders)
        "\\TYs:100"
        "\\QTc:Obstacle Character Problem"
    "\\TQs:2"

        "\\Tlc:Locate the source of (CNN(OC,NM))'s drive:"
```

```
        "\\"
};
resource 'DQS2' (kDQSOCStipulation, PFM_MIN_PRIO) {
        "\\APs:" $$Format("%d,", rApprOCStp)
        "\\CQs:" $$Format("%d,", kDQSOCStipulationST)
        "\\HPs:" $$Format("%d,", rDQSHPStructualFinders)
        "\\TYs:100"
        "\\QTc:Obstacle Character Stipulation"
    "\\TQs:2"

        "\\Tlc:Locate the standard against which {CNN(OC,NM)}'s concern is measured:"

        "\\"
};
resource 'DQS2' (kDQSOCSolution, PFM_MIN_PRIO) {
        "\\APs:" $$Format("%d,", rApprOCSol)
        "\\CQs:" $$Format("%d,", kDQSOCSolutionST)
        "\\HPs:" $$Format("%d,", rDQSHPStructualFinders)
        "\\TYs:100"
        "\\QTc:Obstacle Character Solution"
    "\\TQs:2"

        "\\Tlc:Locate the item that will satisfy {CNN(OC,NM)}'s drive:"

        "\\"
};
resource 'DQS2' (kDQSOCFocus, PFM_MIN_PRIO) {
        "\\APs:" $$Format("%d,", rApprOCFoc)
        "\\CQs:" $$Format("%d,", kDQSOCFocusST)
        "\\HPs:" $$Format("%d,", rDQSHPStructualFinders)
        "\\TYs:100"
        "\\QTc:Obstacle Character Focus"
    "\\TQs:2"

        "\\Tlc:Locate the item {CNN(OC,NM)} focuses on that makes problems for {CNN(MC,NM)}:"

        "\\"
};
resource 'DQS2' (kDQSOCDirection, PFM_MIN_PRIO) {
        "\\APs:" $$Format("%d,", rApprOCDir)
        "\\CQs:" $$Format("%d,", kDQSOCDirectionST)
        "\\HPs:" $$Format("%d,", rDQSHPStructualFinders)
        "\\TYs:100"
        "\\QTc:Obstacle Character Direction"
    "\\TQs:2"

        "\\Tlc:Locate the direction of {CNN(OC,NM)}'s impact on {CNN(MC,NM)}:"

        "\\"
};
resource 'DQS2' (kDQSOCUnRng, PFM_MIN_PRIO) {
        "\\APs:" $$Format("%d,", rApprOCUnRng)
        "\\CQs:" $$Format("%d,", kDQSOCUnRngST)
        "\\HPs:" $$Format("%d,", rDQSHPStructualFinders)
        "\\TYs:100"
        "\\QTc:Obstacle Character Unique Ability"
    "\\TQs:2"

        "\\Tlc:Locate the item that makes {CNN(OC,NM)} uniquely able to thwart {CNN(MC,NM)}:"

        "\\"
};
resource 'DQS2' (kDQSOCCrFl, PFM_MIN_PRIO) {
        "\\APs:" $$Format("%d,", rApprOCCrFl)
        "\\CQs:" $$Format("%d,", kDQSOCCrFlST)
        "\\HPs:" $$Format("%d,", rDQSHPStructualFinders)
        "\\TYs:100"
        "\\QTc:Obstacle Character Critical Flaw"
    "\\TQs:2"

        "\\Tlc:Locate the item that undermines {CNN(OC,NM)}'s efforts:"

        "\\"
};

resource 'DQS2' (kDQSOCGoal, PFM_MIN_PRIO) {
        "\\APs:" $$Format("%d,", rApprOCGoal)
        "\\CQs:" $$Format("%d,", kDQSOCGoalST)
        "\\HPs:" $$Format("%d,", rDQSHPStructualFinders)
        "\\TYs:100"
        "\\QTc:Story Costs"
    "\\TQs:2"

        "\\Tlc:Locate the area that best describes the costs incurred while trying to achieve the goal:"

        "\\"
};

resource 'DQS2' (kDQSOCRequirement, PFM_MIN_PRIO) {
        "\\APs:" $$Format("%d,", rApprOCReq)
        "\\CQs:" $$Format("%d,", kDQSOCRequirementST)
        "\\HPs:" $$Format("%d,", rDQSHPStructualFinders)
        "\\TYs:100"
        "\\QTc:Story Preconditions"
    "\\TQs:2"

        "\\Tlc:Locate the area that best describes the conditions imposed on meeting the story's requirements:"

        "\\"
};

resource 'DQS2' (kDQSPLDomains, PFM_MIN_PRIO) {
        "\\APs:" $$Format("%d,", rApprPLDom)
        "\\CQs:" $$Format("%d,", kDQSPLDomainsST)
        "\\HPs:" $$Format("%d,", rDQSHPStructualFinders)
        "\\TYs:100"
        "\\QTc:Subjective Story Domain"
    "\\TQs:2"
```

```
        "\\Tlc:Locate the domain in which the subjective story takes place:"

        "\\"
};
resource 'DQS2' (kDQSPLConcerns, PFM_MIN_PRIO) {
        "\\APs:" $$Format("%d,", rApprPLCon)
        "\\CQs:" $$Format("%d,", kDQSPLConcernsST)
        "\\HPs:" $$Format("%d,", rDQSHPStructualFinders)
        "\\TYs:100"
        "\\QTc:Subjective Story Concern"
    "\\TQs:2"

        "\\Tlc:Locate the area of concern between (CNN(MC,NM)) and (CNN(OC,NM)):"

        "\\"
};
resource 'DQS2' (kDQSPLRanges, PFM_MIN_PRIO) {
        "\\APs:" $$Format("%d,", rApprPLRng)
        "\\CQs:" $$Format("%d,", kDQSPLRangesST)
        "\\HPs:" $$Format("%d,", rDQSHPStructualFinders)
        "\\TYs:100"
        "\\QTc:Subjective Story Range"
    "\\TQs:2"

        "\\Tlc:Locate the subjective story's thematic focus:"

        "\\"
};
resource 'DQS2' (kDQSPLProblem, PFM_MIN_PRIO) {
        "\\APs:" $$Format("%d,", rApprPLPbm)
        "\\CQs:" $$Format("%d,", kDQSPLProblemST)
        "\\HPs:" $$Format("%d,", rDQSHPStructualFinders)
        "\\TYs:100"
        "\\QTc:Subjective Story Problem"
    "\\TQs:2"

        "\\Tlc:Locate the source of the problems between (CNN(MC,NM)) and (CNN(OC,NM)):"

        "\\"
};
resource 'DQS2' (kDQSPLStipulation, PFM_MIN_PRIO) {
        "\\APs:" $$Format("%d,", rApprPLStp)
        "\\CQs:" $$Format("%d,", kDQSPLStipulationST)
        "\\HPs:" $$Format("%d,", rDQSHPStructualFinders)
        "\\TYs:100"
        "\\QTc:Subjective Story Stipulation"
    "\\TQs:2"

        "\\Tlc:Locate the standard by which growth is measured in the Subjective Story:"

        "\\"
};
resource 'DQS2' (kDQSPLSolution, PFM_MIN_PRIO) {
        "\\APs:" $$Format("%d,", rApprPLSol)
        "\\CQs:" $$Format("%d,", kDQSPLSolutionST)
        "\\HPs:" $$Format("%d,", rDQSHPStructualFinders)
        "\\TYs:100"
        "\\QTc:Subjective Story Solution"
    "\\TQs:2"

        "\\Tlc:Locate the source of the problems between (CNN(MC,NM)) and (CNN(OC,NM)):"

        "\\"
};
resource 'DQS2' (kDQSPLFocus, PFM_MIN_PRIO) {
        "\\APs:" $$Format("%d,", rApprPLFoc)
        "\\CQs:" $$Format("%d,", kDQSPLFocusST)
        "\\HPs:" $$Format("%d,", rDQSHPStructualFinders)
        "\\TYs:100"
        "\\QTc:Subjective Story Focus"
    "\\TQs:2"

        "\\Tlc:Locate where attention is focused in the subjective story:"

        "\\"
};
resource 'DQS2' (kDQSPLDirection, PFM_MIN_PRIO) {
        "\\APs:" $$Format("%d,", rApprPLDir)
        "\\CQs:" $$Format("%d,", kDQSPLDirectionST)
        "\\HPs:" $$Format("%d,", rDQSHPStructualFinders)
        "\\TYs:100"
        "\\QTc:Subjective Story Direction"
    "\\TQs:2"

        "\\Tlc:Locate the direction of efforts in the subjective story:"

        "\\"
};
resource 'DQS2' (kDQSPLUnRng, PFM_MIN_PRIO) {
        "\\APs:" $$Format("%d,", rApprPLUnRng)
        "\\CQs:" $$Format("%d,", kDQSPLUnRngST)
        "\\HPs:" $$Format("%d,", rDQSHPStructualFinders)
        "\\TYs:100"
        "\\QTc:Subjective Story Catalyst"
    "\\TQs:2"

        "\\Tlc:Locate the item that acts as the catalyst to move the subjective story forward:"

        "\\"
};
resource 'DQS2' (kDQSPLCrFl, PFM_MIN_PRIO) {
        "\\APs:" $$Format("%d,", rApprPLCrFl)
        "\\CQs:" $$Format("%d,", kDQSPLCrFlST)
        "\\HPs:" $$Format("%d,", rDQSHPStructualFinders)
        "\\TYs:100"
        "\\QTc:Subjective Story Inhibitor"
    "\\TQs:2"

        "\\Tlc:Locate the item that impedes the subjective story's progress:"

        "\\"
};
```

```
resource 'DQS2' (kDQSPLGoal, PFM_MIN_PRIO) {
        "\\APs:" $$Format("%d,", rApprPLGoal)
        "\\CQs:" $$Format("%d,", kDQSPLGoalST)
        "\\HPs:" $$Format("%d,", rDQSHPStructualFinders)
        "\\TYs:100"
        "\\QTc:Story Consequence"
    "\\TQs:2"

        "\\T1c:Locate the area that best describes the result of failing to achieve the goal:"

        "\\"
};

resource 'DQS2' (kDQSPLRequirement, PFM_MIN_PRIO) {
        "\\APs:" $$Format("%d,", rApprPLReq)
        "\\CQs:" $$Format("%d,", kDQSPLRequirementST)
        "\\HPs:" $$Format("%d,", rDQSHPStructualFinders)
        "\\TYs:100"
        "\\QTc:Story Prerequisites"
    "\\TQs:2"

        "\\T1c:Locate the area that best describes what is needed to meet the story requirements:"

        "\\"
};

/******************************** STORYTELLING QUESTIONS ****************************************/

/*      STORYTELLING QUESTIONS */

resource 'DQS2' (kDQSNatureST, PFM_MIN_PRIO) {
        "\\APs:" $$Format("%d,", rApprNature)
        "\\HPs:" $$Format("%d,", rDQSHPFillBlank)
        "\\TYs:2"
        "\\QTc:Illustrate Nature"
    "\\TQs:4"

        "\\T1c:Illustrate how the Nature of the story is {SNF(Nature)}:"
        "\\ALT1c:Illustrate the Nature of the story:"
        "\\ENs:1"
        "\\EV1c:Nature"
        "\\ES1s:2"
        "\\EM1s:6"

        "\\"
};

resource 'DQS2' (kDQSEssenceST, PFM_MIN_PRIO) {
        "\\APs:" $$Format("%d,", rApprEssence)
        "\\HPs:" $$Format("%d,", rDQSHPFillBlank)
        "\\TYs:2"
        "\\QTc:Illustrate Essence"
    "\\TQs:4"

        "\\T1c:Illustrate how the the story has a {SNF(Essence)} feel:"
        "\\ALT1c:Illustrate the essence or \"feel\" of the story:"
        "\\ENs:1"
        "\\EV1c:Essence"
        "\\ES1s:2"
        "\\EM1s:6"

        "\\"
};

resource 'DQS2' (kDQSTendencyST, PFM_MIN_PRIO) {
        "\\APs:" $$Format("%d,", rApprTendency)
        "\\HPs:" $$Format("%d,", rDQSHPFillBlank)
        "\\TYs:2"
        "\\QTc:Illustrate Tendency"
    "\\TQs:4"

        "\\T1c:Illustrate how {CNN(MC,NM)} is {SNF(Tendency)} in the story:"
        "\\ALT1c:Illustrate {CNN(MC,NM)}'s willingness in the story:"
        "\\ENs:1"
        "\\EV1c:Tendency"
        "\\ES1s:2"
        "\\EM1s:6"

        "\\"
};

resource 'DQS2' (kDQSReachST, PFM_MIN_PRIO) {
        "\\APs:" $$Format("%d,", rApprReach)
        "\\HPs:" $$Format("%d,", rDQSHPFillBlank)
        "\\TYs:2"
        "\\QTc:Illustrate Reach"
    "\\TQs:4"

        "\\T1c:Of men and women, illustrate how {SNF(Reach)} will empathize with {CNN(MC,NM)}:"
        "\\ALT1c:Illustrate the Reach of the story:"
        "\\ENs:1"
        "\\EV1c:Reach"
        "\\ES1s:2"
        "\\EM1s:6"

        "\\"
};

resource 'DQS2' (kDQSResolveST, PFM_MIN_PRIO) {
        "\\APs:" $$Format("%d,", rApprResolve)
        "\\CQs:" $$Format("%d,", kDQSResolve)
        "\\HPs:" $$Format("%d,", rDQSHPFillBlank)
        "\\TYs:2"
        "\\QTc:Illustrate Resolve"
    "\\TQs:3"

        "\\T1c:Illustrate {CNN(MC,NM)}'s resolve to {SNF(Resolve)}:"
```

```
        "\\ALT1c:Illustrate {CNN(MC,NM)}'s resolve:"
        "\\ENs:1"
        "\\EV1c:Resolve"
        "\\ES1s:2"
        "\\EM1s:6"

        "\\"
};

resource 'DQS2' (kDQSDirectionST, PFM_MIN_PRIO) {
        "\\APs:" $$Format("%d,", rApprDirection)
        "\\CQs:" $$Format("%d,", kDQSDirection)
        "\\HPs:" $$Format("%d,", rDQSHPFillBlank)
        "\\TYs:2"
        "\\QTc:Illustrate Direction"
    "\\TQs:3"

        "\\T1c:Illustrate how \"{SNF(Direction)}\" describes the direction of {CNN(MC,NM)}'s growth:"
        "\\ALT1c:Illustrate the direction of {CNN(MC,NM)}'s growth:"
        "\\ENs:1"
        "\\EV1c:Direction"
        "\\ES1s:2"
        "\\EM1s:6"

        "\\"
};
resource 'DQS2' (kDQSApproachST, PFM_MIN_PRIO) {
        "\\APs:" $$Format("%d,", rApprApproach)
        "\\CQs:" $$Format("%d,", kDQSApproach)
        "\\HPs:" $$Format("%d,", rDQSHPFillBlank)
        "\\TYs:2"
        "\\QTc:Illustrate Approach"
    "\\TQs:3"

        "\\T1c:Illustrate {CNN(MC,NM)}'s approach as a {SNF(Approach)}:"
        "\\ALT1c:Illustrate {CNN(MC,NM)}'s approach to solving problems:"
        "\\ENs:1"
        "\\EV1c:Approach"
        "\\ES1s:2"
        "\\EM1s:6"

        "\\"
};
resource 'DQS2' (kDQSSexST, PFM_MIN_PRIO) {
        "\\APs:" $$Format("%d,", rApprSex)
        "\\CQs:" $$Format("%d,", kDQSSex)
        "\\HPs:" $$Format("%d,", rDQSHPFillBlank)
        "\\TYs:2"
        "\\QTc:Illustrate \"Mental\" Sex"
    "\\TQs:3"

        "\\T1c:Illustrate how \"{SNF(Sex)}\" describes {CNN(MC,NM)}'s mental sex:"
        "\\ALT1c:Illustrate {CNN(MC,NM)}'s mental sex:"
        "\\ENs:1"
        "\\EV1c:Sex"
        "\\ES1s:2"
        "\\EM1s:6"

        "\\"
};
resource 'DQS2' (kDQSWorkST, PFM_MIN_PRIO) {
        "\\APs:" $$Format("%d,", rApprWork)
        "\\CQs:" $$Format("%d,", kDQSWork)
        "\\HPs:" $$Format("%d,", rDQSHPFillBlank)
        "\\TYs:2"
        "\\QTc:Illustrate Work"
    "\\TQs:3"

        "\\T1c:Illustrate how the feel of the story is best described as {SNF(Work)}:"
        "\\ALT1c:Illustrate how the feel of the story emphasizes actions or decisions:"
        "\\ENs:1"
        "\\EV1c:Work"
        "\\ES1s:2"
        "\\EM1s:6"

        "\\"
};
resource 'DQS2' (kDQSLimitST, PFM_MIN_PRIO) {
        "\\APs:" $$Format("%d,", rApprLimit)
        "\\CQs:" $$Format("%d,", kDQSLimit)
        "\\HPs:" $$Format("%d,", rDQSHPFillBlank)
        "\\TYs:2"
        "\\QTc:Illustrate Limit"
    "\\TQs:3"

        "\\T1c:Illustrate how the story is brought to a resolution by a {SNF(Limit)}:"
        "\\ALT1c:Illustrate how the story is brought to a resolution due to some form of limit:"
        "\\ENs:1"
        "\\EV1c:Limit"
        "\\ES1s:2"
        "\\EM1s:6"

        "\\"
};
resource 'DQS2' (kDQSOutcomeST, PFM_MIN_PRIO) {
        "\\APs:" $$Format("%d,", rApprOutcome)
        "\\CQs:" $$Format("%d,", kDQSOutcome)
        "\\HPs:" $$Format("%d,", rDQSHPFillBlank)
        "\\TYs:2"
        "\\QTc:Illustrate Outcome"
    "\\TQs:3"

        "\\T1c:Illustrate how the efforts in the story result in {SNF(Outcome)}:"
        "\\ALT1c:Illustrate how the efforts in the story result in success or failure:"
        "\\ENs:1"
        "\\EV1c:Outcome"
        "\\ES1s:2"
        "\\EM1s:6"

        "\\"
};
resource 'DQS2' (kDQSJudgmentST, PFM_MIN_PRIO) {
        "\\APs:" $$Format("%d,", rApprJudgment)
```

```
        "\\CQs:" $$Format("%d,", kDQSJudgment)
        "\\HPs:" $$Format("%d,", rDQSHPFillBlank)
        "\\TYs:2"
        "\\QTc:Illustrate Judgment"
    "\\TQs:3"

        "\\T1c:Illustrate how the story's outcome is shown to be (SNF(Judgment)):"
        "\\ALT1c:Illustrate how the story's outcome is shown to be good or bad:"
        "\\ENs:1"
        "\\EV1c:Judgment"
        "\\ES1s:2"
        "\\EM1s:6"

        "\\"
};


resource 'DQS2' (kDQSSTDomainsST, PFM_MIN_PRIO) {
        "\\APs:" $$Format("%d,", rApprSTDom)
        "\\CQs:" $$Format("%d,", kDQSSTDomains)
        "\\HPs:" $$Format("%d,", rDQSHPFillBlank)
        "\\TYs:2"
        "\\QTc:Illustrate the Objective Story Domain"
    "\\TQs:3"

        "\\T1c:Illustrate how the domain in which the objective story takes place is (SDF(STDom)) ((SNF(STDom))):"
        "\\ALT1c:Illustrate the domain in which the objective story takes place:"
        "\\ENs:1"
        "\\EV1c:STDom"
        "\\ES1s:2"
        "\\EM1s:6"

        "\\"
};

resource 'DQS2' (kDQSSTConcernsST, PFM_MIN_PRIO) {
        "\\APs:" $$Format("%d,", rApprSTCon)
        "\\CQs:" $$Format("%d,", kDQSSTConcerns)
        "\\HPs:" $$Format("%d,", rDQSHPFillBlank)
        "\\TYs:2"
        "\\QTc:Illustrate the Objective Story Concern"
    "\\TQs:3"

        "\\T1c:Illustrate how most everybody is concerned with \"(SNF(STCon))\" in the objective story:"
        "\\ALT1c:Illustrate what most everybody is concerned with in the objective story:"
        "\\ENs:1"
        "\\EV1c:STCon"
        "\\ES1s:2"
        "\\EM1s:6"

        "\\"
};

resource 'DQS2' (kDQSSTRangesST, PFM_MIN_PRIO) {
        "\\APs:" $$Format("%d,", rApprSTRng)
        "\\CQs:" $$Format("%d,", kDQSSTRanges)
        "\\HPs:" $$Format("%d,", rDQSHPFillBlank)
        "\\TYs:2"
        "\\QTc:Illustrate the Objective Story Range"
    "\\TQs:3"

        "\\T1c:Illustrate how (SNF(STRng)) vs. (SNF(STRng2)) is the objective story's thematic conflict:"
        "\\ALT1c:Illustrate the objective story's thematic conflict:"
        "\\ENs:1"
        "\\EV1c:STRng"
        "\\ES1s:2"
        "\\EM1s:6"

        "\\"
};

resource 'DQS2' (kDQSSTProblemST, PFM_MIN_PRIO) {
        "\\APs:" $$Format("%d,", rApprSTPbm)
        "\\CQs:" $$Format("%d,", kDQSSTProblem)
        "\\HPs:" $$Format("%d,", rDQSHPFillBlank)
        "\\TYs:2"
        "\\QTc:Illustrate the Objective Story's Problem"
    "\\TQs:3"

        "\\T1c:Illustrate how \"(SNF(STPbm))\" is the source of the objective story's problems:"
        "\\ALT1c:Illustrate the source of the objective story's problems:"
        "\\ENs:1"
        "\\EV1c:STPbm"
        "\\ES1s:2"
        "\\EM1s:6"

        "\\"
};

resource 'DQS2' (kDQSSTStipulationST, PFM_MIN_PRIO) {
        "\\APs:" $$Format("%d,", rApprSTStp)
        "\\CQs:" $$Format("%d,", kDQSSTStipulation)
        "\\HPs:" $$Format("%d,", rDQSHPFillBlank)
        "\\TYs:2"
        "\\QTc:Illustrate the Objective Story's Stipulations"
    "\\TQs:3"

        "\\T1c:Illustrate how \"(SNF(STStp))\" is the standard by which progress is measured in the Objective Story:"
        "\\ALT1c:Illustrate the standard by which progress is measured in the Objective Story:"
        "\\ENs:1"
        "\\EV1c:STStp"
        "\\ES1s:2"
        "\\EM1s:6"

        "\\"
};
resource 'DQS2' (kDQSSTSolutionST, PFM_MIN_PRIO) {
        "\\APs:" $$Format("%d,", rApprSTSol)
        "\\CQs:" $$Format("%d,", kDQSSTSolution)
        "\\HPs:" $$Format("%d,", rDQSHPFillBlank)
        "\\TYs:2"
```

```
        "\\QTc:Illustrate the Objective Story's Solution"
    "\\TQs:3"

        "\\Tlc:Illustrate how (SNF(STSol)) will solve the objective story's problems ((SNF(STPbm))):"
        "\\ALTlc:Illustrate what is needed to solve the objective story's problems:"
        "\\ENs:1"
        "\\EVlc:STSol"
        "\\ES1s:2"
        "\\EMls:6"

        "\\"
};
resource 'DQS2' (kDQSSTFocusST, PFM_MIN_PRIO) {
        "\\APs:" $$Format("%d,", rApprSTFoc)
        "\\CQs:" $$Format("%d,", kDQSSTFocus)
        "\\HPs:" $$Format("%d,", rDQSHPFillBlank)
        "\\TYs:2"
        "\\QTc:Illustrate the Objective Story's Focus"
    "\\TQs:3"

        "\\Tlc:Illustrate how attention is focused on \"(SNF(STFoc))\" in the objective story:"
        "\\ALTlc:Illustrate what is attention is focused on in the objective story:"
        "\\ENs:1"
        "\\EVlc:STFoc"
        "\\ES1s:2"
        "\\EMls:6"

        "\\"
};
resource 'DQS2' (kDQSSTDirectionST, PFM_MIN_PRIO) {
        "\\APs:" $$Format("%d,", rApprSTDir)
        "\\CQs:" $$Format("%d,", kDQSSTDirection)
        "\\HPs:" $$Format("%d,", rDQSHPFillBlank)
        "\\TYs:2"
        "\\QTc:Illustrate the Objective Story's Direction"
    "\\TQs:3"

        "\\Tlc:Illustrate how the efforts in the objective story are directed toward \"(SNF(STDir))\":"
        "\\ALTlc:Illustrate the direction of everybody's efforts in the objective story:"
        "\\ENs:1"
        "\\EVlc:STDir"
        "\\ES1s:2"
        "\\EMls:6"

        "\\"
};
resource 'DQS2' (kDQSSTUnRngST, PFM_MIN_PRIO) {
        "\\APs:" $$Format("%d,", rApprSTUnRng)
        "\\CQs:" $$Format("%d,", kDQSSTUnRng)
        "\\HPs:" $$Format("%d,", rDQSHPFillBlank)
        "\\TYs:2"
        "\\QTc:Illustrate the Objective Story's Catalyst"
    "\\TQs:3"

        "\\Tlc:Illustrate how \"(SNF(STUnRng))\" acts as the catalyst to move the objective story forward:"
        "\\ALTlc:Illustrate the catalyst that moves the objective story forward:"
        "\\ENs:1"
        "\\EVlc:STUnRng"
        "\\ES1s:2"
        "\\EMls:6"

        "\\"
};
resource 'DQS2' (kDQSSTCrFlST, PFM_MIN_PRIO) {
        "\\APs:" $$Format("%d,", rApprSTCrFl)
        "\\CQs:" $$Format("%d,", kDQSSTCrFl)
        "\\HPs:" $$Format("%d,", rDQSHPFillBlank)
        "\\TYs:2"
        "\\QTc:Illustrate the Objective Story's Inhibitor"
    "\\TQs:3"

        "\\Tlc:Illustrate how \"(SNF(STCrFl))\" impedes the objective story's progress:"
        "\\ALTlc:Illustrate what impedes the objective story's progress:"
        "\\ENs:1"
        "\\EVlc:STCrFl"
        "\\ES1s:2"
        "\\EMls:6"

        "\\"
};
resource 'DQS2' (kDQSSTGoalST, PFM_MIN_PRIO) {
        "\\APs:" $$Format("%d,", rApprSTGoal)
        "\\CQs:" $$Format("%d,", kDQSSTGoal)
        "\\HPs:" $$Format("%d,", rDQSHPFillBlank)
        "\\TYs:2"
        "\\QTc:Illustrate the Objective Story Goal"
    "\\TQs:3"

        "\\Tlc:Illustrate how \"(SNF(STGoal))\" is the goal common to all of the objective characters:"
        "\\ALTlc:Illustrate the goal common to all of the objective characters:"
        "\\ENs:1"
        "\\EVlc:STGoal"
        "\\ES1s:2"
        "\\EMls:6"

        "\\"
};
resource 'DQS2' (kDQSSTRequirementST, PFM_MIN_PRIO) {
        "\\APs:" $$Format("%d,", rApprSTReq)
        "\\CQs:" $$Format("%d,", kDQSSTRequirement)
        "\\HPs:" $$Format("%d,", rDQSHPFillBlank)
        "\\TYs:2"
        "\\QTc:Illustrate the Objective Story Requirement"
    "\\TQs:3"

        "\\Tlc:Illustrate how \"(SNF(STReq))\" describes the requirements that must be met prior to achieving the goal:"
        "\\ALTlc:Illustrate the requirements that must be met prior to achieving the goal:"
        "\\ENs:1"
        "\\EVlc:STReq"
        "\\ES1s:2"
        "\\EMls:6"

        "\\"
```

```
};

resource 'DQS2' (kDQSMCDomainsST, PFM_MIN_PRIO) {
        "\\APs:" $$Format("%d,", rApprMCDom)
        "\\CQs:" $$Format("%d,", kDQSMCDomains)
        "\\HPs:" $$Format("%d,", rDQSHPFillBlank)
        "\\TYs:2"
        "\\QTc:Illustrate the Main Character's Domain"
    "\\TQs:3"

        "\\T1c:Illustrate how the domain in which {CNN(MC,NM)} operates is \"{SNF(MCDom)}\":"
        "\\ALT1c:Illustrate the domain in which {CNN(MC,NM)} operates:"
        "\\ENs:1"
        "\\EV1c:MCDom"
        "\\ES1s:2"
        "\\EM1s:6"

        "\\"
};
resource 'DQS2' (kDQSMCConcernsST, PFM_MIN_PRIO) {
        "\\APs:" $$Format("%d,", rApprMCCon)
        "\\CQs:" $$Format("%d,", kDQSMCConcerns)
        "\\HPs:" $$Format("%d,", rDQSHPFillBlank)
        "\\TYs:2"
        "\\QTc:Illustrate the Main Character's Concern"
    "\\TQs:3"

        "\\T1c:Illustrate how {CNN(MC,NM)} is personally concerned with {SNF(MCCon)}:"
        "\\ALT1c:Illustrate what {CNN(MC,NM)} is personally concerned with:"
        "\\ENs:1"
        "\\EV1c:MCCon"
        "\\ES1s:2"
        "\\EM1s:6"

        "\\"
};
resource 'DQS2' (kDQSMCRangesST, PFM_MIN_PRIO) {
        "\\APs:" $$Format("%d,", rApprMCRng)
        "\\CQs:" $$Format("%d,", kDQSMCRanges)
        "\\HPs:" $$Format("%d,", rDQSHPFillBlank)
        "\\TYs:2"
        "\\QTc:Illustrate the Main Character's Range"
    "\\TQs:3"

        "\\T1c:Illustrate how {SNF(MCRng)} vs. {SNF(MCRng2)} is {CNN(MC,NM)}'s thematic conflict:"
        "\\ALT1c:Illustrate {CNN(MC,NM)}'s thematic conflict:"
        "\\ENs:1"
        "\\EV1c:MCRng"
        "\\ES1s:2"
        "\\EM1s:6"

        "\\"
};
resource 'DQS2' (kDQSMCProblemST, PFM_MIN_PRIO) {
        "\\APs:" $$Format("%d,", rApprMCPbm)
        "\\CQs:" $$Format("%d,", kDQSMCProblem)
        "\\HPs:" $$Format("%d,", rDQSHPFillBlank)
        "\\TYs:2"
        "\\QTc:Illustrate the Main Character's Problem"
    "\\TQs:3"

        "\\T1c:Illustrate how {SNF(MCPbm)} is the source of {CNN(MC,NM)}'s problems :"
        "\\ALT1c:Illustrate the source of {CNN(MC,NM)}'s problems:"
        "\\ENs:1"
        "\\EV1c:MCPbm"
        "\\ES1s:2"
        "\\EM1s:6"

        "\\"
};
resource 'DQS2' (kDQSMCStipulationST, PFM_MIN_PRIO) {
        "\\APs:" $$Format("%d,", rApprMCStp)
        "\\CQs:" $$Format("%d,", kDQSMCStipulation)
        "\\HPs:" $$Format("%d,", rDQSHPFillBlank)
        "\\TYs:2"
        "\\QTc:Illustrate the Main Character's Stipulations"
    "\\TQs:3"

        "\\T1c:Illustrate how \"{SNF(MCStp)}\" is the standard by which {CNN(MC,NM)} judges the degree of {PPN(MC,P1)}
concern:"
        "\\ALT1c:Illustrate the standard by which {CNN(MC,NM)} judges the degree of {PPN(MC,P1)} concern:"
        "\\ENs:1"
        "\\EV1c:MCStp"
        "\\ES1s:2"
        "\\EM1s:6"

        "\\"
};
resource 'DQS2' (kDQSMCSolutionST, PFM_MIN_PRIO) {
        "\\APs:" $$Format("%d,", rApprMCSol)
        "\\CQs:" $$Format("%d,", kDQSMCSolution)
        "\\HPs:" $$Format("%d,", rDQSHPFillBlank)
        "\\TYs:2"
        "\\QTc:Illustrate the Main Character's Solution"
    "\\TQs:3"

        "\\T1c:Illustrate how {SNF(MCSol)} will solve {CNN(MC,NM)}'s problems with \"{SNF(MCPbm)}\":"
        "\\ALT1c:Illustrate the solution to {CNN(MC,NM)}'s problems:"
        "\\ENs:1"
        "\\EV1c:MCSol"
        "\\ES1s:2"
        "\\EM1s:6"

        "\\"
};
resource 'DQS2' (kDQSMCFocusST, PFM_MIN_PRIO) {
        "\\APs:" $$Format("%d,", rApprMCFoc)
        "\\CQs:" $$Format("%d,", kDQSMCFocus)
        "\\HPs:" $$Format("%d,", rDQSHPFillBlank)
        "\\TYs:2"
        "\\QTc:Illustrate the Main Character's Focus"
```

```
    "\\TQs:3"

         "\\T1c:Illustrate how {CNN(MC,NM)}'s attention is focused on \"{SNF(MCFoc)}\":"
         "\\ALT1c:Illustrate what {CNN(MC,NM)}'s attention is focused on:"
         "\\ENs:1"
         "\\EV1c:MCFoc"
         "\\ES1s:2"
         "\\EM1s:6"

         "\\"
};
resource 'DQS2' (kDQSMCDirectionST, PFM_MIN_PRIO) {
         "\\APs:" $$Format("%d,", rApprMCDir)
         "\\CQs:" $$Format("%d,", kDQSMCDirection)
         "\\HPs:" $$Format("%d,", rDQSHPFillBlank)
         "\\TYs:2"
         "\\QTc:Illustrate the Main Character's Direction"
    "\\TQs:3"

         "\\T1c:Illustrate how {CNN(MC,NM)}'s efforts are directed toward \"{SNF(MCDir)}\":"
         "\\ALT1c:Illustrate what {{CNN(MC,NM)}'s efforts are directed toward:"
         "\\ENs:1"
         "\\EV1c:MCDir"
         "\\ES1s:2"
         "\\EM1s:6"

         "\\"
};
resource 'DQS2' (kDQSMCUnRngST, PFM_MIN_PRIO) {
         "\\APs:" $$Format("%d,", rApprMCUnRng)
         "\\CQs:" $$Format("%d,", kDQSMCUnRng)
         "\\HPs:" $$Format("%d,", rDQSHPFillBlank)
         "\\TYs:2"
         "\\QTc:Illustrate the Main Character's Unique Ability"
    "\\TQs:3"

         "\\T1c:Illustrate how \"{SNF(MCUnRng)}\" makes {CNN(MC,NM)} uniquely able to achieve the goal:"
         "\\ALT1c:Illustrate what makes {CNN(MC,NM)} uniquely able to achieve the goal:"
         "\\ENs:1"
         "\\EV1c:MCUnRng"
         "\\ES1s:2"
         "\\EM1s:6"

         "\\"
};
resource 'DQS2' (kDQSMCCrFlST, PFM_MIN_PRIO) {
         "\\APs:" $$Format("%d,", rApprMCCrFl)
         "\\CQs:" $$Format("%d,", kDQSMCCrFl)
         "\\HPs:" $$Format("%d,", rDQSHPFillBlank)
         "\\TYs:2"
         "\\QTc:Illustrate the Main Character's Critical Flaw"
    "\\TQs:3"

         "\\T1c:Illustrate how \"{SNF(MCCrFl)}\" undermines {CNN(MC,NM)}'s efforts:"
         "\\ALT1c:Illustrate what undermines {CNN(MC,NM)}'s efforts:"
         "\\ENs:1"
         "\\EV1c:MCCrFl"
         "\\ES1s:2"
         "\\EM1s:6"

         "\\"
};
resource 'DQS2' (kDQSMCGoalST, PFM_MIN_PRIO) {
         "\\APs:" $$Format("%d,", rApprMCGoal)
         "\\CQs:" $$Format("%d,", kDQSMCGoal)
         "\\HPs:" $$Format("%d,", rDQSHPFillBlank)
         "\\TYs:2"
         "\\QTc:Illustrate the Objective Story Dividends"
    "\\TQs:3"

         "\\T1c:Illustrate how \"{SNF(MCGoal)}\" describes the dividends accrued while trying to achieve the goal:"
         "\\ALT1c:Illustrate the dividends accrued while trying to achieve the goal:"
         "\\ENs:1"
         "\\EV1c:MCGoal"
         "\\ES1s:2"
         "\\EM1s:6"

         "\\"
};
resource 'DQS2' (kDQSMCRequirementST, PFM_MIN_PRIO) {
         "\\APs:" $$Format("%d,", rApprMCReq)
         "\\CQs:" $$Format("%d,", kDQSMCRequirement)
         "\\HPs:" $$Format("%d,", rDQSHPFillBlank)
         "\\TYs:2"
         "\\QTc:Illustrate the Objective Story Forewarnings"
    "\\TQs:3"

         "\\T1c:Illustrate how \"{SNF(MCReq)}\" describes the imminent approach of the story consequences:"
         "\\ALT1c:Illustrate the forewarnings of the imminent approach of the story consequences:"
         "\\ENs:1"
         "\\EV1c:MCReq"
         "\\ES1s:2"
         "\\EM1s:6"

         "\\"
};


resource 'DQS2' (kDQSOCDomainsST, PFM_MIN_PRIO) {
         "\\APs:" $$Format("%d,", rApprOCDom)
         "\\CQs:" $$Format("%d,", kDQSOCDomains)
         "\\HPs:" $$Format("%d,", rDQSHPFillBlank)
         "\\TYs:2"
         "\\QTc:Illustrate the Obstacle Character's Domain"
    "\\TQs:3"

         "\\T1c:Illustrate how the domain in which {CNN(OC,NM)} operates is {SDF(OCDom)} ({SNF(OCDom)}):"
         "\\ALT1c:Illustrate the domain in which {CNN(OC,NM)} operates:"
         "\\ENs:1"
         "\\EV1c:OCDom"
         "\\ES1s:2"
         "\\EM1s:6"
```

```
        "\\"
};
resource 'DQS2' (kDQSOCConcernsST, PFM_MIN_PRIO) {
        "\\APs:" $$Format("%d,", rApprOCCon)
        "\\CQs:" $$Format("%d,", kDQSOCConcerns)
        "\\HPs:" $$Format("%d,", rDQSHPFillBlank)
        "\\TYs:2"
        "\\QTc:Illustrate the Obstacle Character's Concern"
    "\\TQs:3"

        "\\T1c:Illustrate how {CNN(OC,NM)} is personally concerned with \"{SNF(OCCon)}\":"
        "\\ALT1c:Illustrate what {CNN(OC,NM)} is personally concerned with:"
        "\\ENs:1"
        "\\EV1c:OCCon"
        "\\ES1s:2"
        "\\EM1s:6"

        "\\"
};
resource 'DQS2' (kDQSOCRangesST, PFM_MIN_PRIO) {
        "\\APs:" $$Format("%d,", rApprOCRng)
        "\\CQs:" $$Format("%d,", kDQSOCRanges)
        "\\HPs:" $$Format("%d,", rDQSHPFillBlank)
        "\\TYs:2"
        "\\QTc:Illustrate the Obstacle Character's Range"
    "\\TQs:3"

        "\\T1c:Illustrate how {SNF(OCRng)} vs. {SNF(OCRng2)} is {CNN(OC,NM)}'s thematic conflict:"
        "\\ALT1c:Illustrate what is thematically related to {CNN(OC,NM)}:"
        "\\ENs:1"
        "\\EV1c:OCRng"
        "\\ES1s:2"
        "\\EM1s:6"

        "\\"
};
resource 'DQS2' (kDQSOCProblemST, PFM_MIN_PRIO) {
        "\\APs:" $$Format("%d,", rApprOCPbm)
        "\\CQs:" $$Format("%d,", kDQSOCProblem)
        "\\HPs:" $$Format("%d,", rDQSHPFillBlank)
        "\\TYs:2"
        "\\QTc:Illustrate the Obstacle Character's Problem"
    "\\TQs:3"

        "\\T1c:Illustrate how \"{SNF(OCPbm)}\" is the source of {CNN(OC,NM)}'s drive:"
        "\\ALT1c:Illustrate what is the source of {CNN(OC,NM)}'s drive:"
        "\\ENs:1"
        "\\EV1c:OCPbm"
        "\\ES1s:2"
        "\\EM1s:6"

        "\\"
};
resource 'DQS2' (kDQSOCStipulationST, PFM_MIN_PRIO) {
        "\\APs:" $$Format("%d,", rApprOCStp)
        "\\CQs:" $$Format("%d,", kDQSOCStipulation)
        "\\HPs:" $$Format("%d,", rDQSHPFillBlank)
        "\\TYs:2"
        "\\QTc:Illustrate the Obstacle Character's Stipulations"
    "\\TQs:3"

        "\\T1c:Illustrate how \"{SNF(OCStp)}\" is the standard against which {CNN(OC,NM)}'s concern ({SNF(OCCon)}) is
measured:"
        "\\ALT1c:Illustrate the standard against which {CNN(OC,NM)}'s concern ({SNF(OCCon)}) is measured:"
        "\\ENs:1"
        "\\EV1c:OCStp"
        "\\ES1s:2"
        "\\EM1s:6"

        "\\"
};
resource 'DQS2' (kDQSOCSolutionST, PFM_MIN_PRIO) {
        "\\APs:" $$Format("%d,", rApprOCSol)
        "\\CQs:" $$Format("%d,", kDQSOCSolution)
        "\\HPs:" $$Format("%d,", rDQSHPFillBlank)
        "\\TYs:2"
        "\\QTc:Illustrate the Obstacle Character's Solution"
    "\\TQs:3"

        "\\T1c:Illustrate how \"{SNF(OCSol)}\" will satisfy {CNN(OC,NM)}'s drive:"
        "\\ALT1c:Illustrate what will satisfy {CNN(OC,NM)}'s drive:"
        "\\ENs:1"
        "\\EV1c:OCSol"
        "\\ES1s:2"
        "\\EM1s:6"

        "\\"
};
resource 'DQS2' (kDQSOCFocusST, PFM_MIN_PRIO) {
        "\\APs:" $$Format("%d,", rApprOCFoc)
        "\\CQs:" $$Format("%d,", kDQSOCFocus)
        "\\HPs:" $$Format("%d,", rDQSHPFillBlank)
        "\\TYs:2"
        "\\QTc:Illustrate the Obstacle Character's Focus"
    "\\TQs:3"

        "\\T1c:Illustrate how {CNN(OC,NM)}'s focus on \"{SNF(OCFoc)}\" makes problems for {CNN(MC,NM)}:"
        "\\ALT1c:Illustrate what it is that {CNN(OC,NM)} focuses on that makes problems for {CNN(MC,NM)}:"
        "\\ENs:1"
        "\\EV1c:OCFoc"
        "\\ES1s:2"
        "\\EM1s:6"

        "\\"
};
resource 'DQS2' (kDQSOCDirectionST, PFM_MIN_PRIO) {
        "\\APs:" $$Format("%d,", rApprOCDir)
        "\\CQs:" $$Format("%d,", kDQSOCDirection)
        "\\HPs:" $$Format("%d,", rDQSHPFillBlank)
        "\\TYs:2"
        "\\QTc:Illustrate the Obstacle Character's Direction"
    "\\TQs:3"
```

```
        "\\T1c:Illustrate how \"{SNF(OCDir)}\" resolves {CNN(OC,NM)}'s impact on {CNN(MC,NM)}:"
        "\\ALT1c:Illustrate what resolves {CNN(OC,NM)}'s impact on {CNN(MC,NM)}:"
        "\\ENs:1"
        "\\EV1c:OCDir"
        "\\ES1s:2"
        "\\EM1s:6"

        "\\"
};
resource 'DQS2' (kDQSOCUnRngST, PFM_MIN_PRIO) {
        "\\APs:" $$Format("%d,", rApprOCUnRng)
        "\\CQs:" $$Format("%d,", kDQSOCUnRng)
        "\\HPs:" $$Format("%d,", rDQSHPFillBlank)
        "\\TYs:2"
        "\\QTc:Illustrate the Obstacle Character's Unique Ability"
    "\\TQs:3"

        "\\T1c:Illustrate how \"{SNF(OCUnRng)}\" makes {CNN(OC,NM)} uniquely able to thwart {CNN(MC,NM)}:"
        "\\ALT1c:Illustrate what makes {CNN(OC,NM)} uniquely able to thwart {CNN(MC,NM)}:"
        "\\ENs:1"
        "\\EV1c:OCUnRng"
        "\\ES1s:2"
        "\\EM1s:6"

        "\\"
};
resource 'DQS2' (kDQSOCCrFlST, PFM_MIN_PRIO) {
        "\\APs:" $$Format("%d,", rApprOCCrFl)
        "\\CQs:" $$Format("%d,", kDQSOCCrFl)
        "\\HPs:" $$Format("%d,", rDQSHPFillBlank)
        "\\TYs:2"
        "\\QTc:Illustrate the Obstacle Character's Critical Flaw"
    "\\TQs:3"

        "\\T1c:Illustrate how \"{SNF(OCCrFl)}\" undermines {CNN(OC,NM)}'s efforts:"
        "\\ALT1c:Illustrate what undermines {CNN(OC,NM)}'s efforts:"
        "\\ENs:1"
        "\\EV1c:OCCrFl"
        "\\ES1s:2"
        "\\EM1s:6"

        "\\"
};
resource 'DQS2' (kDQSOCGoalST, PFM_MIN_PRIO) {
        "\\APs:" $$Format("%d,", rApprOCGoal)
        "\\CQs:" $$Format("%d,", kDQSOCGoal)
        "\\HPs:" $$Format("%d,", rDQSHPFillBlank)
        "\\TYs:2"
        "\\QTc:Illustrate the Objective Story's Cost"
    "\\TQs:3"

        "\\T1c:Illustrate how \"{SNF(OCGoal)}\" describes the costs incurred while trying to achieve the goal:"
        "\\ALT1c:Illustrate the costs incurred while trying to achieve the goal:"
        "\\ENs:1"
        "\\EV1c:OCGoal"
        "\\ES1s:2"
        "\\EM1s:6"

        "\\"
};
resource 'DQS2' (kDQSOCRequirementST, PFM_MIN_PRIO) {
        "\\APs:" $$Format("%d,", rApprOCReq)
        "\\CQs:" $$Format("%d,", kDQSOCRequirement)
        "\\HPs:" $$Format("%d,", rDQSHPFillBlank)
        "\\TYs:2"
        "\\QTc:Illustrate the Objective Story's Preconditions"
    "\\TQs:3"

        "\\T1c:Illustrate how \"{SNF(OCReq)}\" describes the conditions imposed on meeting the story's requirements:"
        "\\ALT1c:Illustrate the conditions imposed on meeting the story's requirements:"
        "\\ENs:1"
        "\\EV1c:OCReq"
        "\\ES1s:2"
        "\\EM1s:6"

        "\\"
};



resource 'DQS2' (kDQSPLDomainsST, PFM_MIN_PRIO) {
        "\\APs:" $$Format("%d,", rApprPLDom)
        "\\CQs:" $$Format("%d,", kDQSPLDomains)
        "\\HPs:" $$Format("%d,", rDQSHPFillBlank)
        "\\TYs:2"
        "\\QTc:Illustrate the Subjective Story Domain"
    "\\TQs:3"

        "\\T1c:Illustrate how the domain in which the subjective story takes place is {SDF(PLDom)} ({SNF(PLDom)}):"
        "\\ALT1c:Illustrate the domain in which the subjective story takes place:"
        "\\ENs:1"
        "\\EV1c:PLDom"
        "\\ES1s:2"
        "\\EM1s:6"

        "\\"
};
resource 'DQS2' (kDQSPLConcernsST, PFM_MIN_PRIO) {
        "\\APs:" $$Format("%d,", rApprPLCon)
        "\\CQs:" $$Format("%d,", kDQSPLConcerns)
        "\\HPs:" $$Format("%d,", rDQSHPFillBlank)
        "\\TYs:2"
        "\\QTc:Illustrate the Subjective Story's Concern"
    "\\TQs:3"

        "\\T1c:Illustrate how {CNN(MC,NM)} and {CNN(OC,NM)} come into conflict over \"{SNF(PLCon)}\":"
        "\\ALT1c:Illustrate how {CNN(MC,NM)} and {CNN(OC,NM)} come into conflict:"
        "\\ENs:1"
        "\\EV1c:PLCon"
        "\\ES1s:2"
        "\\EM1s:6"
```

```
        "\\"
);
resource 'DQS2' (kDQSPLRangesST, PFM_MIN_PRIO) {
        "\\APs:" $$Format("%d,", rApprPLRng)
        "\\CQs:" $$Format("%d,", kDQSPLRanges)
        "\\HPs:" $$Format("%d,", rDQSHPFillBlank)
        "\\TYs:2"
        "\\QTc:Illustrate the Subjective Story's Range"
    "\\TQs:3"

        "\\T1c:Illustrate how {SNF(PLRng)} vs. {SNF(PLRng2)} is the subjective story's thematic conflict:"
        "\\ALT1c:Illustrate the subjective story's thematic conflict:"
        "\\ENs:1"
        "\\EV1c:PLRng"
        "\\ES1s:2"
        "\\EM1s:6"

        "\\"
);
resource 'DQS2' (kDQSPLProblemST, PFM_MIN_PRIO) {
        "\\APs:" $$Format("%d,", rApprPLPbm)
        "\\CQs:" $$Format("%d,", kDQSPLProblem)
        "\\HPs:" $$Format("%d,", rDQSHPFillBlank)
        "\\TYs:2"
        "\\QTc:Illustrate the Subjective Story's Problem"
    "\\TQs:3"

        "\\T1c:Illustrate how \"{SNF(PLPbm)}\" is the source of the problems between {CNN(MC,NM)} and {CNN(OC,NM)}:"
        "\\ALT1c:Illustrate the source of the problems between {CNN(MC,NM)} and {CNN(OC,NM)}:"
        "\\ENs:1"
        "\\EV1c:PLPbm"
        "\\ES1s:2"
        "\\EM1s:6"

        "\\"
);
resource 'DQS2' (kDQSPLStipulationST, PFM_MIN_PRIO) {
        "\\APs:" $$Format("%d,", rApprPLStp)
        "\\CQs:" $$Format("%d,", kDQSPLStipulation)
        "\\HPs:" $$Format("%d,", rDQSHPFillBlank)
        "\\TYs:2"
        "\\QTc:Illustrate the Subjective Story's Stipulation"
    "\\TQs:3"

        "\\T1c:Illustrate how \"{SNF(PLStp)}\" is the standard  by which growth is measured in the Subjective Story:"
        "\\ALT1c:Illustrate the standard  by which growth is measured in the Subjective Story:"
        "\\ENs:1"
        "\\EV1c:PLStp"
        "\\ES1s:2"
        "\\EM1s:6"

        "\\"
);
resource 'DQS2' (kDQSPLSolutionST, PFM_MIN_PRIO) {
        "\\APs:" $$Format("%d,", rApprPLSol)
        "\\CQs:" $$Format("%d,", kDQSPLSolution)
        "\\HPs:" $$Format("%d,", rDQSHPFillBlank)
        "\\TYs:2"
        "\\QTc:Illustrate the Subjective Story's Solution"
    "\\TQs:3"

        "\\T1c:Illustrate how \"{SNF(PLSol)}\" will solve the problems between {CNN(MC,NM)} and {CNN(OC,NM)}:"
        "\\ALT1c:Illustrate what will solve the problems between {CNN(MC,NM)} and {CNN(OC,NM)}:"
        "\\ENs:1"
        "\\EV1c:PLSol"
        "\\ES1s:2"
        "\\EM1s:6"

        "\\"
);
resource 'DQS2' (kDQSPLFocusST, PFM_MIN_PRIO) {
        "\\APs:" $$Format("%d,", rApprPLFoc)
        "\\CQs:" $$Format("%d,", kDQSPLFocus)
        "\\HPs:" $$Format("%d,", rDQSHPFillBlank)
        "\\TYs:2"
        "\\QTc:Illustrate the Subjective Story's Focus"
    "\\TQs:3"

        "\\T1c:Illustrate how attention is focused on \"{SNF(PLFoc)}\" in the subjective story:"
        "\\ALT1c:Illustrate what attention is focused on in the subjective story:"
        "\\ENs:1"
        "\\EV1c:PLFoc"
        "\\ES1s:2"
        "\\EM1s:6"

        "\\"
);
resource 'DQS2' (kDQSPLDirectionST, PFM_MIN_PRIO) {
        "\\APs:" $$Format("%d,", rApprPLDir)
        "\\CQs:" $$Format("%d,", kDQSPLDirection)
        "\\HPs:" $$Format("%d,", rDQSHPFillBlank)
        "\\TYs:2"
        "\\QTc:Illustrate the Subjective Story's Direction"
    "\\TQs:3"

        "\\T1c:Illustrate how the efforts in the subjective story are directed toward \"{SNF(PLDir)}\":"
        "\\ALT1c:Illustrate what the efforts in the subjective story are directed toward:"
        "\\ENs:1"
        "\\EV1c:PLDir"
        "\\ES1s:2"
        "\\EM1s:6"

        "\\"
);
resource 'DQS2' (kDQSPLUnRngST, PFM_MIN_PRIO) {
        "\\APs:" $$Format("%d,", rApprPLUnRng)
        "\\CQs:" $$Format("%d,", kDQSPLUnRng)
        "\\HPs:" $$Format("%d,", rDQSHPFillBlank)
        "\\TYs:2"
        "\\QTc:Illustrate the Subjective Story's Catalyst"
    "\\TQs:3"

        "\\T1c:Illustrate how \"{SNF(PLUnRng)}\" acts as the catalyst to move the subjective story forward:"
```

```
        "\\ALT1c:Illustrate the catalyst that moves the subjective story forward:"
        "\\ENs:1"
        "\\EV1c:PLUnRng"
        "\\ES1s:2"
        "\\EM1s:6"

        "\\"
};
resource 'DQS2' (kDQSPLCrFlST, PFM_MIN_PRIO) {
        "\\APs:" $$Format("%d,", rApprPLCrFl)
        "\\CQs:" $$Format("%d,", kDQSPLCrFl)
        "\\HPs:" $$Format("%d,", rDQSHPFillBlank)
        "\\TYs:2"
        "\\QTc:Illustrate the Subjective Story's Inhibitor"
    "\\TQs:3"

        "\\T1c:Illustrate how \"(SNF(PLCrFl))\" impedes the subjective story's progress:"
        "\\ALT1c:Illustrate what impedes the subjective story's progress:"
        "\\ENs:1"
        "\\EV1c:PLCrFl"
        "\\ES1s:2"
        "\\EM1s:6"

        "\\"
};
resource 'DQS2' (kDQSPLGoalST, PFM_MIN_PRIO) {
        "\\APs:" $$Format("%d,", rApprPLGoal)
        "\\CQs:" $$Format("%d,", kDQSPLGoal)
        "\\HPs:" $$Format("%d,", rDQSHPFillBlank)
        "\\TYs:2"
        "\\QTc:Illustrate the Objective Story's Consequence"
    "\\TQs:3"

        "\\T1c:Illustrate how \"(SNF(PLGoal))\" will be the result of failing to achieve the goal:"
        "\\ALT1c:Illustrate the consequences of failing to achieve the goal:"
        "\\ENs:1"
        "\\EV1c:PLGoal"
        "\\ES1s:2"
        "\\EM1s:6"

        "\\"
};
resource 'DQS2' (kDQSPLRequirementST, PFM_MIN_PRIO) {
        "\\APs:" $$Format("%d,", rApprPLReq)
        "\\CQs:" $$Format("%d,", kDQSPLRequirement)
        "\\HPs:" $$Format("%d,", rDQSHPFillBlank)
        "\\TYs:2"
        "\\QTc:Illustrate the Objective Story's Prerequisites"
    "\\TQs:3"

        "\\T1c:Illustrate how \"(SNF(PLReq))\" describes what is needed to meet the story requirements:"
        "\\ALT1c:Illustrate what is needed to meet the story requirements:"
        "\\ENs:1"
        "\\EV1c:PLReq"
        "\\ES1s:2"
        "\\EM1s:6"

        "\\"
};


#if 0
resource 'DQS2' (kDQSMCPluralityST, PFM_MIN_PRIO) {
        ""
};
resource 'DQS2' (kDQSMCVoiceST, PFM_MIN_PRIO) {
        ""
};
resource 'DQS2' (kDQSOCPluralityST, PFM_MIN_PRIO) {
        ""
};
resource 'DQS2' (kDQSOCVoiceST, PFM_MIN_PRIO) {
        ""
};
#endif


resource 'DQS2' (kDQSQSIntroTI, PFM_MIN_PRIO) {
        "\\TYs:75"                                  /* Question type: TextWrap Display */
        "\\QTc:Welcome to Quick Story"
    "\\TQs:0"
        "\\TPs:1"                                   /* textwrap procID */
        "\\HLs:0"                                   /* Forces helpView OFF */

        "\\T1c:"

        "\\TX1c:Welcome to Quick Story.  This is the most direct Dramatica path to creating your Storyform through
answering 12 Essential Questions about Character and Plot Dynamics and Thematic Appreciations.\n\n"
        "You can approach the Storyforming process from any of these perspectives and move easily between them.
Experiment with the various perspectives to discover which questions are most familiar &/or relevant to your story and
your writing style.\n\n"
        "Your answers to the 12 Essential Questions tell Dramatica about the dynamics of your story's Main Character and
Plot and as well as thematic appreciations of the entire story.  Some are either/or choices; others contain from 4 to 64
potential options.  "
        "You can also approach your story through additional appreciations of the Objective and Subjective Stories plus
the Main and Obstacle Characters.\n\nMake either/or choices by pushing the button next to your choice.  Make multiple
semantics choices by selecting "
        "relevant terms from the list on the left and adding them to the list on the right.  You can also Unchoose a
choice or adjust your range of choices at any point before your Storyform match is locked in.  This is done by choosing
the unselected either/or option in any "
        "Dynamics question or by adjusting the multiple semantics options in the right-hand lists by removing or adding
relevant terms.  \n\nTo help you make Storyforming choices, there is on-screen assistance with definitions, contextual
examples, Dramatica usage and other "
        "background info in the HelpView window through pushing the HelpView buttons.  In-depth information regarding
the Dramatica Theory is available in the on-line Exploratorial and in supplementary Dramatica materials.\n\nWhen you have
made all your Storyforming choices, "
        "push Done to lock them in so Dramatica's Story Engine can create your Storyform match.  Be sure to Save your
Storyform file regularly via the File menu."
        "\\"
};
```

```
resource 'DQS2' (kDQSQSCharDynTI, PFM_MIN_PRIO) {
        "\\TYs:75"                                  /* Question type: TextWrap Display */
        "\\QTc:Character Dynamics Intro"
    "\\TQs:0"
        "\\TPs:1"                                   /* textwrap procID */
        "\\HLs:0"                                   /* Forces helpView OFF */

        "\\Tlc:"

        "\\TXlc:The first group of Essential Questions relates to your Main Character, through whose eyes and heart the
audience observes and experiences the story.\n\n"
        "Your Character Dynamics choices will determine the Main Character's essential nature, behaviors and attitudes.
They also relate to the direction of your Main Character's growth.\n\nWhere indicated, identify the name and gender of
your Main Character as well as your Obstacle Character "
        "(who serves as an obstacle to the Main Character's goal) so Dramatica can refer to them in context.  For
detailed information on Main and Obstacle Characters, refer to the selections in the Exploratorial window.\n\nThe
Dynamics questions are either/or choices that determine the Main Character's biases and tendencies.  "
        "If you are unsure of a particular choice, select Choose Later and move on to other questions.  You can return
to skipped questions at any time.  As you move through the Storyforming process, however, Dramatica may predict the best
choice for a skipped question as it limits or narrows particular choice "
        "ranges due to other choices you have made.\n\nFor assistance in making Character Dynamics choices or expanded
perspectives on Main Characters in general, refer to the Character-oriented material in the HelpView window or
Exploratorial as well as relevant sections in the User Manual and other supplementary Dramatica materials."
        "\\"
};

resource 'DQS2' (kDQSQSPlotDynTI, PFM_MIN_PRIO) {
        "\\TYs:75"                                  /* Question type: TextWrap Display */
        "\\QTc:Plot Dynamics Intro"
    "\\TQs:0"
        "\\TPs:1"                                   /* textwrap procID */
        "\\HLs:0"                                   /* Forces helpView OFF */

        "\\Tlc:"

        "\\TXlc:The second group of Essential Questions relates to both the Objective Storyline and the Subjective
Storyline.  Taking a \"big picture\" view of both the Objective and Subjective Storylines will help you make the Plot
Dynamics choices.\n\n"
        "The Objective Storyline revolves around resolving the problem or achieving the goal of concern to all of the
story's primary characters.  The Subjective Storyline revolves around the Main Character's problem or disharmony which is
being contested by the Main and Obstacle Characters.  Traditional story approaches treat the Subjective Storyline as a
sub-plot, but it is actually no less significant than the Objective Storyline.  \n\nThe first two questions focus on
conditions which "
        "should remain consistent from the beginning of the story.  Your story's Timelock or Optionlock will be
initiated then confirmed in many ways through the course of your story.  Choose the Outcome and Judgment by thinking
about whether the Story Goal will be achieved or the Story Problem resolved, not about whether the Main Character does or
does not resolve their personal problem by the end.\n\nYour choices determine the progression of events directly
influencing the actions and decisions "
        "of each player, including your Main Character.  This helps Dramatica suggest which approach will best move your
entire story forward to solve its Objective Story problem.  Plot Dynamics also influence whether the story's outcome will
feel satisfying on both the personal and impersonal levels.  \n\nAction/Decision and Timelock/Optionlock are based on how
you want the audience to perceive the entire story -- not just the Main Character or the Objective Story problem itself.
"

        "Success/Failure and Good/Bad will directly impact the feel of the story by determining whether the Objective
&/or Subjective problems are resolved at the end.  \n\nThe Dynamics questions are either/or choices.  If you are unsure
of a particular choice, select Choose Later and move on to other questions.  You can return to skipped questions at any
time.  As you move through the Storyforming process, however, Dramatica may predict the best choice for a skipped
question as it limits or "
        "narrows particular choice ranges due to other choices you have made.\n\nFor assistance in making Plot Dynamics
choices or expanded perspectives on the Dynamics in general, refer to the Plot-oriented material in the HelpView window
or Exploratorial as well as relevant sections in the User Manual and other supplementary Dramatica materials."

        "\\"
};

resource 'DQS2' (kDQSQSThemeElemTI, PFM_MIN_PRIO) {
        "\\TYs:75"                                  /* Question type: TextWrap Display */
        "\\QTc:Thematic Elements Intro"
    "\\TQs:0"
        "\\TPs:1"                                   /* textwrap procID */
        "\\HLs:0"                                   /* Forces helpView OFF */

        "\\Tlc:"

        "\\TXlc:The final four Essential Questions help Dramatica identify thematic arenas that you wish to emphasize in
your Storyform.\n\n"
        "These questions focus on the goals, events and activities of common concern to your Objective Characters.  Let
your intuition guide the choices of Dramatica terms that seem most relevant to your story's Thematics.  \n\nThe Objective
Storyline describes the entire story as if it were a war.  "
        "As the general, your choices determine the strategies to be employed in your story's battles.  Dramatica uses
your answers to suggest the approaches to take in solving the Objective Story's Problem. \n\nApproach the Story and
Character Perspectives through whichever question feels easiest to answer first.  "
        "Your choice will automatically narrow the range of available options for other questions as well.  If you are
unable to choose a single thematic element from the range available for any Appreciations question, you can narrow your
options by selecting one or more terms from the left-list and adding them to the right-list.  "
        "Dramatica will continue to narrow your options as you move on to other perspectives, based on your choices,
until the singular choice that fits your Storyform becomes clear.  \n\nKeep in mind there are no right or wrong answers.
Choosing whichever thematic terms feel right or most relevant to your story will direct "
        "Dramatica in generating a Storyform to serve as your Storytelling guide.\n\nTo help you make Objective Story
choices, there is on-screen assistance with definitions, contextual examples, Dramatica usage and other background info
available via the HelpView window and the Exploratorial, as well as in the supplementary Dramatica material.  "
        "\n\nKeep in mind that Dramatica cannot create your Storyform until each question is narrowed to only one
choice.  Press Done when you have answered the 12 Essential Questions so Dramatica's Story Engine can create your
Storyform."
        "\\"
};

resource 'DQS2' (kDQSQSRecapTI, PFM_MIN_PRIO) {
        "\\TYs:75"                                  /* Question type: TextWrap Display */
        "\\QTc:Quick Story Recap"
    "\\TQs:0"                               /* topic of Question */
        "\\TPs:2"                                   /* textwrap procID */
        "\\HLs:0"                                   /* Forces helpView OFF */

        "\\Tlc:The Storyform choices you have made in Quick Story are:"
```

```
        "\\TX1c:If you have not yet made a single Storyform match, you should work on those 12 Essential Questions
choices that have not yet been answered.  Once they are all answered and your Storyform match is made, you can move on to
Storytelling and other Dramatica areas.\n\nIf your Storyform match is made, you can move on to the "
        "Storytelling questions where you can illustrate your Story Points to serve as your writing guidelines.\n\nBe
sure to Save your story file via the File menu at this point, and periodically while creating your story illustrations to
avoid unexpectedly losing your data."
        "\\"
};

resource 'DQS2' (kDQSQSStellingTI, PFM_MIN_PRIO) {
        "\\TYs:75"                                              /* Question type: TextWrap Display */
        "\\QTc:Storytelling Intro"
    "\\TQs:0"                                         /* topic of Question */
        "\\TPs:1"                                               /* textwrap procID */
        "\\HLs:0"                                               /* Forces helpView OFF */

        "\\T1c:"

        "\\TX1c:By illustrating your Storyform choices through the Storytelling questions that follow, you will see how
your Storyform choices work together.\n\n"
        "As you imagine possible illustrations through Dramatica's perspectives, you will experience a complete picture
of your story before you begin writing it.  Review your Storytelling illustrations on-screen or print them out in
Reports.  \n\nYour illustrations of Character, Plot and Thematic Appreciations should describe events, "
        "activities, relationships, bits of dialogue, personality traits or behaviors that show or reflect your
Storyform choices.  \n\nIf you are in the creation phase, make notes on potential illustrations.  You can change or
expand them at any time, and you will most likely come up with more as you continue to think about illustrating your
complete Storyform.\n\n"
        "If you are in the analysis/review or rewrite phase, make notes on how you see these elements reflected in the
existing dramatic work.  If you do not see evidence of a particular story element, note this or skip the question for
now.  If relevant, you can also make notes on how this might be illustrated in your rewrite.  \n\n"
        "To help you illustrate your Storyform, there is on-screen assistance with definitions, contextual examples,
Storytelling tips, Dramatica usage and other background info in the HelpView window through pushing the HelpView buttons.
In-depth information regarding the Dramatica Theory is available in the on-line Exploratorial and in supplementary
Dramatica materials.\n\n"
        "When you have illustrated your Storyform, push Done to lock your points into your storyfile.  Be sure to Save
your Storyfile regularly via the File menu.\n"
        "\\"
};

resource 'DQS2' (kDQSQSCharDynSTTI, PFM_MIN_PRIO) {
        "\\TYs:75"                                              /* Question type: TextWrap Display */
        "\\QTc:Character Storytelling Intro"
    "\\TQs:0"                                         /* topic of Question */
        "\\TPs:1"                                               /* textwrap procID */
        "\\HLs:0"                                               /* Forces helpView OFF */

        "\\T1c:"

        "\\TX1c:These Essential Questions relate to your Main Character, through whose eyes and heart the audience
observes and experiences the story.  Your illustrations of Character Dynamics choices reflect the Main Character's
essential nature, behaviors and attitudes.  They also relate to the direction of your Main Character's growth.\n\n"
        "Where indicated, identify the name and gender of your Main Character so Dramatica can refer to him or her in
context.  Dramatica will continue to use \"Main Character\" if you have not yet named your primary characters.  You can
also input notes on your Main Character's description -- physical appearance, occupation, hobbies, relationships,
behaviors, etc. -- "
        "where indicated to guide your writing.\n\nBy illustrating your Storyform choices through the questions that
follow, you will begin to see how your Storyform choices can work together to tell a \"complete\" story.  Illustrations
can describe events, activities, relationships, behaviors or bits of dialogue that show or reflect your Storyform
choices.  Review your Storytelling "
        "illustrations on-screen or print them out in Reports at any point.  \n\nApproach the Story and Character
Perspectives illustrations through whichever question feels easiest to answer first.  If you are unsure of a particular
illustration, move on to other questions.  You can return to skipped questions at any time. \n\nTo help you illustrate
your Character Dynamics, there is "
        "on-screen assistance with Storytelling tips, definitions, contextual examples, Dramatica usage and other
background info available via the HelpView window and the Exploratorial, as well as in the supplementary Dramatica
material."
        "\\"
};

resource 'DQS2' (kDQSQSPlotDynSTTI, PFM_MIN_PRIO) {
        "\\TYs:75"                                              /* Question type: TextWrap Display */
        "\\QTc:Plot Storytelling Intro"
    "\\TQs:0"                                         /* topic of Question */
        "\\TPs:1"                                               /* textwrap procID */
        "\\HLs:0"                                               /* Forces helpView OFF */

        "\\T1c:"

        "\\TX1c:These Essential Questions relate to the entire story in terms of both the Objective and Subjective
Storylines.  The first two questions focus on conditions which should remain consistent from the beginning of the story.
The other two questions focus on how things will look and feel by the end of your story.\n\n"
        "Your story's Timelock or Optionlock will be initiated then confirmed in many ways through the course of your
story.  Illustrate how this is seen by the audience and felt by the characters.  Illustrate the Outcome and Judgment by
thinking about whether the Story Goal was achieved or the Story Problem resolved, not about whether the Main Character "
        "did or did not resolve their personal problem.\n\nBy illustrating your Storyform choices through the questions
that follow, you will begin to see how your Storyform choices can work together to tell a \"complete\" story.
Illustrations can describe events, activities, relationships, behaviors or bits of dialogue that show or reflect your
Storyform choices.  "
        "Review your Storytelling illustrations on-screen or print them out in Reports at any point.  \n\nApproach the
Story and Character Perspectives illustrations through whichever question feels easiest to answer first.  If you are
unsure of a particular illustration, move on to other questions.  You can return to skipped questions at any time. \n\nTo
help you "
        "illustrate your Plot Dynamics, there is on-screen assistance with Storytelling tips, definitions, contextual
examples, Dramatica usage and other background info available via the HelpView window and the Exploratorial, as well as
in the supplementary Dramatica material."
        "\\"
};

resource 'DQS2' (kDQSQSThemeElemSTTI, PFM_MIN_PRIO) {
        "\\TYs:75"                                              /* Question type: TextWrap Display */
        "\\QTc:Appreciations Storytelling Intro"
    "\\TQs:0"                                         /* topic of Question */
        "\\TPs:1"                                               /* textwrap procID */
        "\\HLs:0"                                               /* Forces helpView OFF */

        "\\T1c:"

        "\\TX1c:The Objective Storyline describes the entire story as if it were a war.  As the general, your choices
determine the strategies to be employed in the your story's battles.  Your illustrations of Objective Story Appreciations
will focus on the goals, events and activities of common concern to your Objective Characters.\n\n"
```

```
        "Let your intuition guide the illustrations that seem most relevant to your story's Thematics.  \n\nBy illustrating your Storyform choices through the questions that follow, you will begin to see how your Storyform choices can work together to tell a \"complete\" story.  Illustrations can describe events, activities, relationships, "
        "behaviors or bits of dialogue that show or reflect your Storyform choices.  Review your Storytelling illustrations on-screen or print them out in Reports at any point.  \n\nApproach the Story and Character Perspectives illustrations through whichever question feels easiest to answer first.  If you are unsure of a particular illustration, move on to other questions.  "
        "You can return to skipped questions at any time. \n\nTo help you illustrate your Objective Story Appreciations, there is on-screen assistance with Storytelling tips, definitions, contextual examples, Dramatica usage and other background info available via the HelpView window and the Exploratorial, as well as in the supplementary Dramatica material."
        "\\"
};


resource 'DQS2' (kDQSQSNextTI, PFM_MIN_PRIO) {
        "\\TYs:75"                                              /* Question type: TextWrap Display */
        "\\QTc:Where to Go Next?"
    "\\TQs:0"                                           /* topic of Question */
        "\\TPs:1"                                               /* textwrap procID */
        "\\HLs:0"                                               /* Forces helpView OFF */

        "\\T1c:"

        "\\TX1c:Now that your Storyform is created and you have illustrated its Storytelling Points, you can explore the functions of your Characters, view your Story Points and illustrations in context via Storypoints, or print out Storyform, Storytelling and Character-related data through a variety of Reports.\n\n"
        "Be sure to Save your story file via the File menu at this point to avoid  losing your data unexpectedly. \n\nTo work with Characters next, exit Quick Story (press Done) and go to the Characters section from the main window.  \n\nTo view your Storyform and Storytelling Points in a chart "
        "relationship next, exit Quick Story and go to Story Points.  \n\nTo print out Reports next, exit Quick Story and go to Reports."
        "\\"
};


resource 'DQS2' (kDQSOSIntroTI, PFM_MIN_PRIO) {
        "\\TYs:75"                                              /* Question type: TextWrap Display */
        "\\QTc:Objective Story Intro"
    "\\TQs:0"                                           /* topic of Question */
        "\\TPs:1"                                               /* textwrap procID */
        "\\HLs:0"                                               /* Forces helpView OFF */

        "\\T1c:"

        "\\TX1c:In this path are all Storyforming and Storytelling questions that relate to the Objective Storyline. The Objective Storyline describes the entire story as if it were a war.  As the general, your choices determine the strategies that will be employed in the your story's battles.  "
        "Your Storyforming choices and illustrations of Objective Story Appreciations will focus on the goals, events and activities of common concern to your Objective Characters.\n\n"
        "They also offer familiar perspectives for writers who are new to Dramatica.  Let your intuition guide your choices and their illustrations to find the ones that seem most relevant to your story and your writing style.\n\nTo help you make Storyforming and Storytelling choices, "
        "there is on-screen assistance with definitions, contextual examples, Dramatica usage, Storytelling tips and other background info available in the HelpView window through pushing the HelpView buttons.  In-depth information regarding the Dramatica Theory can be found in the on-line Exploratorial "
        "and in supplementary Dramatica materials.\n\nStoryforming:  Either/or choices are made by pushing the button next to your choice.  Multiple semantics choices can be made by selecting relevant terms from the list on the left and adding them to the list on the right.  You can also Unchoose a choice "
        "or adjust your range of choices at any point before your Storyform match is locked in.  This is done by choosing the unselected either/or option in any Dynamics question or by adjusting the multiple semantics options in the right-hand lists by removing or adding relevant terms.\n\n"
        "When you have made all your Storyforming choices, push Done to lock them in so Dramatica's Story Engine can create your Storyform match.  Be sure to Save your Storyform file regularly via the File menu.\n\nStorytelling:  By illustrating your Storyform choices through the questions that follow, you "
        "will begin to see how your Storyform choices can work together to tell a \"complete\" story.  Illustrations can describe events, activities, relationships, behaviors or bits of dialogue that show or reflect your Storyform choices. \n\nApproach the Story and Character Perspectives illustrations "
        "through whichever question feels easiest to answer first.  If you are unsure of a particular illustration, move on to other questions.  You can return to skipped questions at any time. Your Storytelling illustrations can be reviewed on-screen and also printed out in Reports at any point."
        "\\"
};

resource 'DQS2' (kDQSOSPlotDynTI, PFM_MIN_PRIO) {
        "\\TYs:75"
        "\\QTc:Plot Dynamics Intro"
    "\\TQs:0"                                           /* topic of Question */
        "\\TPs:1"                                               /* textwrap procID */
        "\\HLs:0"                                               /* Forces helpView OFF */

        "\\T1c:"

        "\\TX1c:Plot Dynamics questions relate to both the Objective Storyline and the Subjective Storyline.  Taking a \"big picture\" view of both the Objective and Subjective Storylines will help you make these choices.\n\n"\"Your choices determine the progression of events directly influencing the actions and decisions of each player, including your Main Character.  This helps Dramatica suggest which approach will best move your story forward to solve its Objective Story problem.  Plot Dynamics also influence whether the story's "
        "outcome will feel satisfying on both the personal and impersonal levels.  \n\nThe first two questions focus on conditions which should remain consistent from the beginning of the story.  Your story's Timelock or Optionlock will be initiated then confirmed in many ways through the course of your story.  Answer and "
        "illustrate the Outcome and Judgment by thinking about whether the Story Goal was achieved or the Story Problem resolved, not about whether the Main Character did or did not resolve their personal problem.\n\nFor assistance with Plot Dynamics choices or illustrations, or for expanded perspectives on the Dynamics in general, "
        "refer to the Plot-oriented material in the HelpView window or Exploratorial as well as relevant sections in the User Manual and other supplementary Dramatica materials.\n\nStoryforming:  The Dynamics questions are either/or choices that determine the Plot's direction and feel.  "
        "If you are unsure of a particular choice, select Choose Later and move on to other questions.  You can return to skipped questions at any time.  As you move through the Storyforming process, however, Dramatica may predict the best choice for a skipped question as it limits or narrows particular choice ranges due to other "
        "choices you have made.\n\nStorytelling:  By illustrating your Storyform choices through the questions that follow, you will begin to see how your Storyform choices can work together to tell a \"complete\" story.  Illustrations can describe events, activities, relationships, behaviors or bits of dialogue that show or reflect "
        "your Storyform choices.  Review your Storytelling illustrations on-screen or print them out in Reports at any point.  \n\nApproach the Story and Character Perspectives illustrations through whichever question feels easiest to answer first.  If you are unsure of a particular illustration, move on to other questions.  "
        "You can return to skipped questions at any time. "
        "\\"
};

resource 'DQS2' (kDQSOSPerspecTI, PFM_MIN_PRIO) {
        "\\TYs:75"
        "\\QTc:Appreciations Intro"
```

```
    "\\TQs:0"                                   /* topic of Question */
        "\\TPs:1"                                       /* textwrap procID */
        "\\HLs:0"                                       /* Forces helpView OFF */

        "\\T1c:"

        "\\TX1c:Your choices of Objective Story Appreciations help Dramatica identify thematic arenas that you wish to
emphasize in your Storyform.  These questions focus on the goals, events and activities of common concern to your
Objective Characters.  They also offer familiar perspectives for writers who are new to Dramatica.  "
        "Let your intuition guide the choices of Dramatica terms that seem most relevant to your story's Thematics.
\n\n"
        "The Objective Storyline describes the entire story as if it were a war.  As the general, your choices determine
the strategies that will be employed in your story's battles.  Dramatica uses your answers to suggest the approaches to
be taken in solving the Objective Story's Problem. \n\n"
        "To help you make and illustrate your Objective Story choices, there is on-screen assistance with definitions,
contextual examples, Storytelling tips, Dramatica usage and other background info available via the HelpView window and
the Exploratorial, as well as in the supplementary Dramatica material.  \n\n"
        "Storyforming:  Approach the Story and Character Perspectives through whichever question feels easiest to answer
first.  Your choice will automatically narrow the range of available options for other questions as well.  If you are
unable to choose a single thematic element from the range available for "
        "any Appreciations question, you can narrow your options by selecting one or more terms from the left-list and
adding them to the right-list.  Dramatica will continue to narrow your options as you move on to other perspectives,
based on your choices, until the singular choice that fits your Storyform becomes clear.  \n\n"
        "Keep in mind there are no right or wrong answers.  Choosing whichever thematic terms feel right or most
relevant to your story will direct Dramatica in generating a Storyform to serve as your Storytelling
guide.\n\nStorytelling:  By illustrating your Storyform choices through the questions that follow, you will "
        "begin to see how your Storyform choices can work together to tell a \"complete\" story.  Illustrations can
describe events, activities, relationships, behaviors or bits of dialogue that show or reflect your Storyform choices.
Your Storytelling illustrations can be reviewed on-screen and also printed out in "
        "Reports at any point.  \n\nApproach the Story and Character Perspectives illustrations through whichever
question feels easiest to answer first.  If you are unsure of a particular illustration, move on to other questions.  You
can return to skipped questions at any time. "
        "\\"
};

resource 'DQS2' (kDQSOSAddApprecsTI, PFM_MIN_PRIO) {
        "\\TYs:75"
        "\\QTc:More Appreciations Intro"
    "\\TQs:0"                                   /* topic of Question */
        "\\TPs:1"                                       /* textwrap procID */
        "\\HLs:0"                                       /* Forces helpView OFF */

        "\\T1c:"

        "\\TX1c:In addition to the ten basic Objective Story Appreciations, Dramatica provides questions that focus on
the Story Goal (the common goal of the Objective Characters) and on various requirements that must be met to reach
it.\n\n"
        "Illustrating these points can help you create an overall feel for how your story is developing.  \n\nMany
writers find story elements like Goal, Consequence, Costs and Dividends familiar.  If you find choosing the other
Objective Story Appreciations difficult, "
        "approaching your story through these questions will automatically narrow the other ranges as well.  If your
story or writing style is not goal oriented, however, you may prefer to choose or illustrate other Objective Story
questions first.\n\nTo help you make and illustrate your Objective Story choices, "
        "there is on-screen assistance with definitions, contextual examples, Storytelling tips, Dramatica usage and
other background info available via the HelpView window and the Exploratorial, as well as in the supplementary Dramatica
material.  \n\nStorytelling:  Approach the Story and Character Perspectives "
        "through whichever question feels easiest to answer first.  Your choice will automatically narrow the range of
available options for other questions as well.  If you are unable to choose a single thematic element from the range
available for any Appreciations question, you can narrow your options by selecting "
        "one or more terms from the left-list and adding them to the right-list.  Dramatica will continue to narrow your
options as you move on to other perspectives, based on your choices, until the singular choice that fits your Storyform
becomes clear.  \n\nKeep in mind there are no right or wrong answers.  "
        "Whatever thematic terms feel right or most relevant to your story will direct Dramatica in generating a
Storyform to serve as your Storytelling guide.\n\nStoryforming:  By illustrating your Storyform choices through these
questions, you will begin to see how your Storyform choices can work together to tell a \"complete\" story.  "
        "Illustrations can describe events, activities, relationships, behaviors or bits of dialogue that show or
reflect your Storyform choices.  Your Storytelling illustrations can be reviewed on-screen and also printed out in
Reports at any point.  \n\nApproach the Story and Character Perspectives illustrations "
        "through whichever question feels easiest to answer first.  If you are unsure of a particular illustration, move
on to other questions.  You can return to skipped questions at any time. "
        "\\"
};

resource 'DQS2' (kDQSOSRecapTI, PFM_MIN_PRIO) {
        "\\TYs:75"
        "\\QTc:Objective Story Recap"
    "\\TQs:0"                                   /* topic of Question */
        "\\TPs:3"                                       /* textwrap procID */
        "\\HLs:0"                                       /* Forces helpView OFF */

        "\\T1c:The Storyform choices you have made are:"

        "\\TX1c:If you do not have a Storyform match at this point, you may find that working in the Main Character path
will help you focus on the Character-related dynamics and thematics needed to fill in the missing elements.  You also
have all Storyforming questions easily accessible in the Storyforming-All path, "
        "where you can move between different perspectives until your match is made.\n\nBe sure to Save your story file
via the File menu at this point to avoid  losing your data unexpectedly. "
        "\\"
};


resource 'DQS2' (kDQSOSNextTI, PFM_MIN_PRIO) {
        "\\TYs:75"
        "\\QTc:What next?"
    "\\TQs:0"                                   /* topic of Question */
        "\\TPs:1"                                       /* textwrap procID */
        "\\HLs:0"                                       /* Forces helpView OFF */

        "\\T1c:"

        "\\TX1c:Now that your Storyform has been created and you have illustrated its Storytelling Points, you can
explore the functions of your Characters, review your Story Points and illustrations in context in Storypoints, or print
out Storyform, Storytelling and Character-related data through a variety of reports.\n\n"
        "To work with Characters next, exit Quick Story (press Done) and go to the Characters section from the main
window.  \n\nTo view your Storyform and Storytelling Points in a chart relationship next, exit Quick Story and go to
Story Points.  \n\nTo print out Reports next, exit Quick Story and go to Reports."
        "\\"
};


resource 'DQS2' (kDQSSSIntroTI, PFM_MIN_PRIO) {
        "\\TYs:75"
```

```
        "\\QTc:Subjective Story Intro"
    "\\TQs:0"                                   /* topic of Question */
        "\\TPs:1"                                       /* textwrap procID */
        "\\HLs:0"                                       /* Forces helpView OFF */

        "\\Tlc:"

        "\\TXlc:In this path are all Storyforming and Storytelling questions that relate to the Subjective Story's
perspective on the goals, events and activities of concern to both your Main and Obstacle Characters.  These
Appreciations represent the emotional or passionate approach to the relationship of the Main and Obstacle Characters. "
        "They describe the dissonance between the Main Character's personal problem and the roadblocks or detours
presented through the Obstacle Character which delay or impede its successful solution. \n\n"
        "To help you make Subjective Story choices, there is on-screen assistance with definitions, contextual examples,
Storytelling tips, Dramatica usage and other background info available via the HelpView window and the Exploratorial, as
well as in the supplementary Dramatica material.\n\n"
        "After answering the Subjective Story questions that seem most relevant to your story, you can move to other DQS
Paths or press Done to lock in your Storyform choices.  Save your file regularly via the File menu.\n\nStoryforming:
Approach the Story and Character Perspectives through whichever question feels easiest to answer first.  "
        "Your choice will automatically narrow the range of available options for other questions as well.  If you are
unable to choose a single thematic element from the range available for any Appreciations question, you can narrow your
options by selecting one or more terms from the left-list and adding them to the right-list.  "
        "Dramatica will continue to narrow your options as you move on to other perspectives, based on your choices,
until the singular choice that fits your Storyform becomes clear.  \n\nKeep in mind there are no right or wrong answers.
Whatever thematic terms feel right or most relevant to your story will direct Dramatica in "
        "generating a Storyform to serve as your Storytelling guide.\n\nStorytelling:  By illustrating your Storyform
choices through the questions that follow, you will begin to see how your Storyform choices can work together to tell a
\"complete\" story.  Illustrations can describe events, activities, relationships, "
        "behaviors or bits of dialogue that show or reflect your Storyform choices.  Review your Storytelling
illustrations on-screen or print them out in Reports at any point.  \n\nApproach the Story and Character Perspectives
illustrations through whichever question feels easiest to answer first."
        "If you are unsure of a particular illustration, move on to other questions.  You can return to skipped
questions at any time. "
        "\\"
};
resource 'DQS2' (kDQSSSRecapTI, PFM_MIN_PRIO) {
        "\\TYs:75"
        "\\QTc:Subjective Story Recap"
    "\\TQs:0"                                   /* topic of Question */
        "\\TPs:4"                                       /* textwrap procID */
        "\\HLs:0"                                       /* Forces helpView OFF */

        "\\Tlc:The Storyform choices you have made are:"

        "\\TXlc:If you do not have a Storyform match at this point, you may find that working in the Objective Story
path will expand your view of the entire story and help fill in the missing elements.  You also have all Storyforming
questions easily accessible in the Storyforming-All path, where you can move between different perspectives until your
match is made."
        "\\"
};
resource 'DQS2' (kDQSSSNextTI, PFM_MIN_PRIO) {
        "\\TYs:75"
        "\\QTc:What's Next?"
    "\\TQs:0"                                   /* topic of Question */
        "\\TPs:1"                                       /* textwrap procID */
        "\\HLs:0"                                       /* Forces helpView OFF */

        "\\Tlc:"

        "\\TXlc:Now that your Storyform is created and you have illustrated its Storytelling Points, you can explore the
functions of your Characters, review your Story Points and illustrations in context in Storypoints, or print out
Storyform, Storytelling and Character-related data through a variety of reports.\n\n"
        "Be sure to Save your story file via the File menu at this point to avoid losing your data unexpectedly. \n\nTo
work with Characters next, exit Quick Story (press Done) and go to the Characters section from the main window.  \n\nTo
view your Storyform and Storytelling Points in a chart relationship next, "
        "exit Quick Story and go to Story Points.  \n\nTo print out Reports next, exit Quick Story and go to Reports."
        "\\"
};


resource 'DQS2' (kDQSMCIntroTI, PFM_MIN_PRIO) {
        "\\TYs:75"
        "\\QTc:Main Character Intro"
    "\\TQs:0"                                   /* topic of Question */
        "\\TPs:1"                                       /* textwrap procID */
        "\\HLs:0"                                       /* Forces helpView OFF */

        "\\Tlc:"

        "\\TXlc:In this path are all Storyforming and Storytelling questions that relate to the Main Character
Perspective.  It is through your Main Character's eyes and heart that the audience observes and experiences your story.
"
        "Use this path to focus on the Dynamics and Appreciations of concern to your Main Character.\n\n"
        "For assistance in making Character Dynamics choices or for expanded perspectives on Main Characters in general,
refer to the Character-oriented material in the HelpView window or Exploratorial as well as relevant selections in the
User Manual and other supplementary Dramatica materials.\n\n"
        "Approach the Story and Character Perspectives choices and illustrations through whichever question feels
easiest to answer first.  If you are unsure of a particular choice or illustration, move on to other questions.  You can
return to skipped questions at any time. \n\nTo help you choose and "
        "illustrate your Main Character Dynamics and Appreciations, there is on-screen assistance with Storytelling
tips, definitions, contextual examples, Dramatica usage and other background info available via the HelpView window and
the Exploratorial, as well as in the User Manual and other supplementary "
        "Dramatica materials.\n\nAfter answering the Main Character Perspective questions that seem most relevant to
your story, you can move to other DQS Paths or press Done to lock in your Storyform choices.  Save your file regularly
via the File menu."
        "\\"
};
resource 'DQS2' (kDQSMCCharDynTI, PFM_MIN_PRIO) {
        "\\TYs:75"
        "\\QTc:Character Dynamics Intro"
    "\\TQs:0"                                   /* topic of Question */
        "\\TPs:1"                                       /* textwrap procID */
        "\\HLs:0"                                       /* Forces helpView OFF */

        "\\Tlc:"

        "\\TXlc:Your Character Dynamics choices will determine the Main Character's essential nature, behaviors and
attitudes, which will be reflected in your illustrations.  They also relate to the direction of your Main Character's
growth.\n\n"
        "Where indicated, identify the name and gender of your Main Character so Dramatica can refer to him or her in
context.  Dramatica will continue to use \"Main Character\" if you have not yet named your primary characters.  "
```

```
        "You can also input notes on your Main Character's description -- physical appearance, occupation, hobbies,
relationships, behaviors, etc. -- where indicated to guide your writing.\n\nTo help you choose and illustrate your
Character Dynamics, there is on-screen assistance with "
        "Storytelling tips, definitions, contextual examples, Dramatica usage and other background info available via
the HelpView window and the Exploratorial, as well as in the supplementary Dramatica material.  \n\nStoryforming:  "
        "The Dynamics questions are either/or choices that determine the Main Character's biases and tendencies.  If you
are unsure of a particular choice, select Choose Later and move on to other questions.  You can return to skipped
questions at any time.  As you move through the "
        "Storyforming process, however, Dramatica may predict the best choice for a skipped question as it limits or
narrows particular choice ranges due to other choices you have made.\n\nFor assistance in making Character Dynamics
choices or "
        "expanded perspectives on Main Characters in general, refer to the Character-oriented material in the HelpView
window or Exploratorial as well as relevant sections in the User Manual and other supplementary Dramatica materials.\n\n"
        "Storytelling:  By illustrating your Storyform choices through the questions that follow, you will begin to see
how your Storyform choices can work together to tell a \"complete\" story.  Illustrations can describe events,
activities, relationships, behaviors or bits of dialogue that "
        "show or reflect your Storyform choices.  Your Storytelling illustrations can be reviewed on-screen and printed
out in Reports at any point.  \n\nApproach the Story and Character Perspectives illustrations through whichever question
feels easiest to answer first.  If you are unsure of "
        "a particular illustration, move on to other questions.  You can return to skipped questions at any time. "
        "\\"
};
resource 'DQS2' (kDQSMCPerspecTI, PFM_MIN_PRIO) {
        "\\TYs:75"
        "\\QTc:Appreciations Intro"
    "\\TQs:0"                                   /* topic of Question */
        "\\TPs:1"                                       /* textwrap procID */
        "\\HLs:0"                                       /* Forces helpView OFF */

        "\\T1c:"

        "\\TX1c:Choosing the Main Character Appreciations helps determine what the story will look and feel like through
the eyes and heart of the Main Character.  To shape your audience's emotional experience of your story, answer the
questions that feel most familiar to you first.  "
        "As you do, Dramatica will narrow your options until your Main Character's perspective has been fully formed.
Your illustrations of these Storyform choices will then convey these elements in ways your audiences can feel.\n\n"
        "To help you make and illustrate your Main Character Appreciations, there is on-screen assistance with
definitions, contextual examples, Storytelling tips Dramatica usage and other background info available via the HelpView
window and the "
        "Exploratorial, as well as in the supplementary Dramatica material.  \n\nStoryforming:  Approach the Story and
Character Perspectives through whichever question feels easiest to answer first.  Your choice will automatically narrow
the range of available options for other questions as well.  "
        "If you are unable to choose a single thematic element from the range available for any Appreciations question,
you can narrow your options by selecting one or more terms from the left-list and adding them to the right-list.
Dramatica will continue to narrow your options as you move on to "
        "other perspectives, based on your choices, until the singular choice that fits your Storyform becomes clear.
\n\nKeep in mind there are no right or wrong answers.  Whatever thematic terms feel right or most relevant to your story
will direct Dramatica in generating a Storyform to serve as your "
        "Storytelling guide.\n\nStorytelling:  By illustrating your Storyform choices through the questions that follow,
you will begin to see how your Storyform choices can work together to tell a \"complete\" story.  Illustrations can
describe events, activities, relationships, behaviors or bits of "
        "dialogue that show or reflect your Storyform choices.  Your Storytelling illustrations can be reviewed on-
screen and also printed out in Reports at any point.  \n\nApproach the Story and Character Perspectives illustrations
through whichever question feels easiest to answer first."
        "If you are unsure of a particular illustration, move on to other questions.  You can return to skipped
questions at any time. "
        "\\"
};
resource 'DQS2' (kDQSMCRecapTI, PFM_MIN_PRIO) {
        "\\TYs:75"
        "\\QTc:Main Character Recap"
    "\\TQs:0"                                   /* topic of Question */
        "\\TPs:5"                                       /* textwrap procID */
        "\\HLs:0"                                       /* Forces helpView OFF */

        "\\T1c:The Storyform choices you have made are:"

        "\\TX1c:If you do not have a Storyform match at this point, you may find that working in the Objective Story
path will expand your view of the entire story and help fill in the missing elements.  You also have all Storyforming
questions easily accessible in the Storyforming-All path, where you can move between different perspectives until your
match is made.\n\n"
        "Be sure to Save your story file via the File menu at this point to avoid  losing your data unexpectedly"
        "\\"
};

resource 'DQS2' (kDQSMCNextTI, PFM_MIN_PRIO) {
        "\\TYs:75"
        "\\QTc:What's Next"
    "\\TQs:0"                                   /* topic of Question */
        "\\TPs:1"                                       /* textwrap procID */
        "\\HLs:0"                                       /* Forces helpView OFF */

        "\\T1c:"

        "\\TX1c:Now that your Storyform has been created and you have illustrated its Storytelling Points, you can
explore the functions of your Characters, review your Story Points and illustrations in context in Storypoints, or print
out Storyform, Storytelling and Character-related data through a variety of reports.\n\n"
        "Be sure to Save your story file via the File menu at this point, and periodically while creating your story
illustrations to avoid unexpectedly losing your data. \n\nTo work with Characters next, exit Quick Story (press Done) and
go to the Characters section from the main window.  \n\n"
        "To view your Storyform and Storytelling Points in a chart relationship next, exit Quick Story and go to Story
Points.  \n\nTo print out Reports next, exit Quick Story and go to Reports."
        "\\"
};


resource 'DQS2' (kDQSOCIntroTI, PFM_MIN_PRIO) {
        "\\TYs:75"
        "\\QTc:Obstacle Character Intro"
    "\\TQs:0"                                   /* topic of Question */
        "\\TPs:1"                                       /* textwrap procID */
        "\\HLs:0"                                       /* Forces helpView OFF */

        "\\T1c:"

        "\\TX1c:In this path are all Storyforming and Storytelling questions that relate to the Obstacle Character
Perspective.  The Obstacle Character forces the Main Character to address their personal problem.  Use this path to focus
on the Dynamics and Appreciations of concern to your Obstacle Character.\n\n"
        "For assistance in making Obstacle Character choices or for expanded perspectives on Obstacle Characters in
general, refer to the Character-oriented material in the HelpView window or Exploratorial as well as relevant "
```

```
        "selections in the User Manual and other supplementary Dramatica materials.\n\nWhere indicated, identify your
Obstacle Character's name and gender so Dramatica can refer to them in context.  Dramatica will continue to use
\"Obstacle Character\" "
        "if you have not yet named your primary characters.  You can also make notes on your Obstacle Character's
description -- physical appearance, occupation, hobbies, relationships, behaviors, etc. -- where indicated to guide your
writing.\n\nApproach the Story and Character Perspectives choices and illustrations through whichever question feels
easiest to answer first.  "
        "If you are unsure of a particular choice or illustration, move on to other questions.  You can return to
skipped questions at any time. \n\nTo help you choose and illustrate your Obstacle Character Dynamics and Appreciations,
there is on-screen assistance "
        "with Storytelling tips, definitions, contextual examples, Dramatica usage and other background info available
via the HelpView window and the Exploratorial, as well as in the User Manual and other supplementary Dramatica
materials.\n\nAfter answering the Obstacle Character Perspective questions "
        "that seem most relevant to your story, you can move to other DQS Paths or press Done to lock in your Storyform
choices.  Save your file regularly via the File menu."
        "\\"
};
resource 'DQS2' (kDQSOCPerspecTI, PFM_MIN_PRIO) {
        "\\TYs:75"
        "\\QTc:Appreciations Intro"
    "\\TQs:0"                                   /* topic of Question */
        "\\TPs:1"                                       /* textwrap procID */
        "\\HLs:0"                                       /* Forces helpView OFF */

        "\\T1c:"

        "\\TX1c:Choosing the Obstacle Character Appreciations helps determine the natures of the roadblocks and detours
the Main Character will face through the Obstacle Character.  To shape your audience's perceptions of how the Obstacle
Character "
        "forces the Main Character to address their personal problem, answer the questions that feel most familiar to
you first.  As you do, Dramatica will narrow your options until your Main Character's perspective has been fully formed.
Your illustrations of these Storyform choices will then convey your interpretation of these Storyform choices in ways
that your audience will understand.\n\n"
        "To help you make and illustrate Obstacle Character choices, there is on-screen assistance with definitions,
contextual examples, Storytelling tips, Dramatica usage and other background info available via the HelpView "
        "window and the Exploratorial, as well as in the supplementary Dramatica material.  \n\nStoryforming:  Approach
the Story and Character Perspectives through whichever question feels easiest to answer first.  Your choice will
automatically narrow the range of available options for other questions as well.  "
        "If you are unable to choose a single thematic element from the range available for any Appreciations question,
you can narrow your options by selecting one or more terms from the left-list and adding them to the right-list.
Dramatica will continue to narrow your options as you move on to other perspectives, based on your choices, until the
singular choice that fits your Storyform becomes clear.  \n\n"
        "Keep in mind there are no right or wrong answers.  Whatever thematic terms feel right or most relevant to your
story will direct Dramatica in generating a Storyform to serve as your Storytelling guide.\n\nStorytelling:  By
illustrating your Storyform choices through the questions that follow, you will "
        "begin to see how your Storyform choices can work together to tell a \"complete\" story.  Illustrations can
describe events, activities, relationships, behaviors or bits of dialogue that show or reflect your Storyform choices.
Your Storytelling illustrations can be reviewed on-screen and also printed out "
        "in Reports at any point.  \n\nApproach the Story and Character Perspectives illustrations through whichever
question feels easiest to answer first.  If you are unsure of a particular illustration, move on to other questions.  You
can return to skipped questions at any time. "
        "\\"
};
resource 'DQS2' (kDQSOCRecapTI, PFM_MIN_PRIO) {
        "\\TYs:75"
        "\\QTc:Obstacle Character Recap"
    "\\TQs:0"                                   /* topic of Question */
        "\\TPs:6"                                       /* textwrap procID */
        "\\HLs:0"                                       /* Forces helpView OFF */

        "\\T1c:The Storyform choices you have made are:"

        "\\TX1c:If you do not have a Storyform match at this point, you may find that working in the  Objective Story
paths will expand your view of the entire story and help fill in the missing elements.  "
        "You also have all Storyforming questions easily accessible in the Storyforming-All path, where you can move
between different perspectives until your match is made.\n\nBe sure to Save your story file via the File menu at this
point to avoid  losing your data unexpectedly. "
        "\\"
};

resource 'DQS2' (kDQSOCNextTI, PFM_MIN_PRIO) {
        "\\TYs:75"
        "\\QTc:What's Next"
    "\\TQs:0"                                   /* topic of Question */
        "\\TPs:1"                                       /* textwrap procID */
        "\\HLs:0"                                       /* Forces helpView OFF */

        "\\T1c:"

        "\\TX1c:Now that your Storyform has been created and you have illustrated its Storytelling Points, you can
explore the functions of your Characters, review your Story Points and illustrations in context in Storypoints, or print
out Storyform, Storytelling and Character-related data through a variety of reports.\n\n"
        "To work with Characters next, exit Quick Story (press Done) and go to the Characters section from the main
window.  \n\nTo view your Storyform and Storytelling Points in a chart relationship next, exit Quick Story and go to
Story Points.  \n\nTo print out Reports next, exit Quick Story and go to Reports."
        "\\"
};


resource 'DQS2' (kDQSSFIntroTI, PFM_MIN_PRIO) {
        "\\TYs:75"
        "\\QTc:Storyforming Intro"
    "\\TQs:0"                                   /* topic of Question */
        "\\TPs:1"                                       /* textwrap procID */
        "\\HLs:0"                                       /* Forces helpView OFF */

        "\\T1c:"

        "\\TX1c:All Storyforming questions are accessible in this path.  They include Character and Plot Dynamics plus
Appreciations of the Objective Story, Subjective Story, Main Character and Obstacle Character.  You can approach the
Storyforming process from any of these perspectives and move easily between them.  "
        "Experiment with the various perspectives to discover which questions are most familiar &/or relevant to your
story and your writing style.\n\n"
        "Your answers to the 12 Essential Questions tell Dramatica about the dynamics of your story's Main Character and
Plot and as well as thematic appreciations of the entire story.  Some are either/or choices; others contain from 4 to 64
potential options.  "
        "You can also approach your story through additional appreciations of the Objective and Subjective Stories plus
the Main and Obstacle Characters.\n\nMake either/or choices by pushing the button next to your choice.  Make multiple
semantics choices by selecting relevant terms from the list on the "
```

```
        "left and adding them to the list on the right.  You can also Unchoose a choice or adjust your range of choices
at any point before your Storyform match is locked in.  This is done by choosing the unselected either/or option in any
Dynamics question or by adjusting the multiple semantics options "
        "in the right-hand lists by removing or adding relevant terms.  \n\nTo help you make Storyforming choices, there
is on-screen assistance with definitions, contextual examples, Dramatica usage and other background info in the HelpView
window through pushing the HelpView buttons.  "
        "In-depth information regarding the Dramatica Theory is available in the on-line Exploratorial and in
supplementary Dramatica materials.\n\nWhen you have made all your Storyforming choices, push Done to lock them in so
Dramatica's Story Engine can create your Storyform match.  "
        "Be sure to Save your Storyform file regularly via the File menu."
        "\\"
};
resource 'DQS2' (kDQSSFCharDynTI, PFM_MIN_PRIO) {
        "\\TYs:75"
        "\\QTc:Storyforming Character Dynamics"
    "\\TQs:0"                                       /* topic of Question */
        "\\TPs:1"                                           /* textwrap procID */
        "\\HLs:0"                                           /* Forces helpView OFF */

        "\\T1c:"

        "\\TX1c:These Essential Questions relate to your Main Character, through whose eyes and heart the audience
observes and experiences the story.  Your Character Dynamics choices will determine the Main Character's essential
nature, behaviors and attitudes.  They also relate to the direction of your Main Character's growth.\n\n"
        "The Dynamics questions are either/or choices that determine the Main Character's biases and tendencies.  If you
are unsure of a particular choice, select Choose Later and move on to other questions.  "
        "You can return to skipped questions at any time.  As you move through the Storyforming process, however,
Dramatica may predict the best choice for a skipped question as it limits or narrows particular choice ranges due to
other choices you have made."
        "\n\nFor assistance in making Character Dynamics choices or expanded perspectives on Main Characters in general,
refer to the Character-oriented material in the HelpView window or Exploratorial as well as relevant sections in the User
Manual and other supplementary Dramatica materials."
        "\\"
};
resource 'DQS2' (kDQSSFPlotDynTI, PFM_MIN_PRIO) {
        "\\TYs:75"
        "\\QTc:Storyforming Plot Dynamics"
    "\\TQs:0"                                       /* topic of Question */
        "\\TPs:1"                                           /* textwrap procID */
        "\\HLs:0"                                           /* Forces helpView OFF */

        "\\T1c:"

        "\\TX1c:The Dynamics questions are either/or choices that determine the Main Character's biases and tendencies.
If you are unsure of a particular choice, select Choose Later and move on to other questions.  You can return to skipped
questions at any time.  "
        "As you move through the Storyforming process, however, Dramatica may predict the best choice for a skipped
question as it limits or narrows particular choice ranges due to other choices you have made.\n\nFor assistance in making
Character Dynamics choices or expanded perspectives on Main Characters in general, "
        "refer to the Character-oriented material in the HelpView window or Exploratorial as well as relevant sections
in the User Manual and other supplementary Dramatica materials.\n\n"
        "Plot Dynamics directly impact the progression of events that will influence your Objective Characters' actions
and decisions.  They also determine the feel of the story's tension line.  To help make these choices, ask "
        "yourself \"How do I want things to happen in my story\" if you are in the creation phase &/or \"How are things
unfolding\" if analyzing an already-written story.\n\nThe Dynamics questions are either/or choices that determine the
Plot's direction and feel.  If you are unsure of a particular choice, select Choose Later and move on to other "
        "questions.  You can return to skipped questions at any time.  As you move through the Storyforming process,
however, Dramatica may predict the best choice for a skipped question as it limits or narrows particular choice ranges
due to other choices you have made.\n\nFor assistance in making "
        "Plot Dynamics choices or expanded perspectives on the Dynamics in general, refer to the Plot-oriented material
in the HelpView window or Exploratorial as well as relevant sections in the User Manual and other supplementary Dramatica
materials."
        "\\"
};
resource 'DQS2' (kDQSSFOSPerspecTI, PFM_MIN_PRIO) {
        "\\TYs:75"
        "\\QTc:Storyforming the Objective Story"
    "\\TQs:0"                                       /* topic of Question */
        "\\TPs:1"                                           /* textwrap procID */
        "\\HLs:0"                                           /* Forces helpView OFF */

        "\\T1c:"

        "\\TX1c:Your choices of Objective Story Appreciations help Dramatica identify thematic arenas that you wish to
emphasize in your Storyform.  These questions focus on the goals, events and activities of common concern to your
Objective Characters.  "
        "They also offer familiar perspectives for writers who are new to Dramatica.  Let your intuition guide the
choices of Dramatica terms that seem most relevant to your story's Thematics.  \n\n"
        "The Objective Storyline describes the entire story as if it were a war.  As the general, your choices determine
the strategies to be employed in your story's battles.  Dramatica uses your answers to suggest the "
        "approaches to take in solving the Objective Story's Problem. \n\nApproach the Story and Character Perspectives
through whichever question feels easiest to answer first.  Your choice will automatically narrow the range of available "
        "options for other questions as well.  If you are unable to choose a single thematic element from the range
available for any Appreciations question, you can narrow your options by selecting one or more terms from the left-list
and adding them to the right-list.  Dramatica will "
        "continue to narrow your options as you move on to other perspectives, based on your choices, until the singular
choice that fits your Storyform becomes clear.  \n\nKeep in mind there are no right or wrong answers.  Choosing whichever
"

        "thematic terms feel right or most relevant to your story will direct Dramatica in generating a Storyform to
serve as your Storytelling guide.\n\nTo help you make Objective Story choices, there is on-screen assistance with
definitions, "
        "contextual examples, Dramatica usage and other background info available via the HelpView window and the
Exploratorial, as well as in the supplementary Dramatica material.  "
        "\\"
};
resource 'DQS2' (kDQSSFOSAddApprecsTI, PFM_MIN_PRIO) {
        "\\TYs:75"
        "\\QTc:Storyforming Additional Story Appreciations"
    "\\TQs:0"                                       /* topic of Question */
        "\\TPs:1"                                           /* textwrap procID */
        "\\HLs:0"                                           /* Forces helpView OFF */

        "\\T1c:"

        "\\TX1c:In addition to the ten basic Objective Story Appreciations, Dramatica provides questions that focus on
the Story Goal (the common goal of the Objective Characters) and on various requirements that must be met to reach it.
Many writers find "
        "story elements like Goal, Consequence, Costs and Dividends familiar.  If you find choosing the other Objective
Story Appreciations difficult, approaching your story through these questions will automatically narrow the other ranges
as well.\n\n"
        "Approach the Story and Character Perspectives through whichever question feels easiest to answer first.  Your
choice will automatically narrow the range of available options for other questions as well.  If you are unable to choose
a single thematic element "
```

```
        "from the range available for any Appreciations question, you can narrow your options by selecting one or more
terms from the left-list and adding them to the right-list.  Dramatica will continue to narrow your options as you move
on to other perspectives, based on your choices, until "
        "the singular choice that fits your Storyform becomes clear.  \n\nKeep in mind there are no right or wrong
answers.  Whatever thematic terms feel right or most relevant to your story will direct Dramatica in generating a
Storyform to serve as your "
        "Storytelling guide.\n\nTo help you make Objective Story choices, there is on-screen assistance with
definitions, contextual examples, Dramatica usage and other background info available via the HelpView window and the
Exploratorial, as well as in the supplementary Dramatica material."
        "\\"
};
resource 'DQS2' (kDQSSFSSPerspecTI, PFM_MIN_PRIO) {
        "\\TYs:75"
        "\\QTc:Storyforming the Subjective Story"
    "\\TQs:0"                                       /* topic of Question */
        "\\TPs:1"                                           /* textwrap procID */
        "\\HLs:0"                                           /* Forces helpView OFF */

        "\\T1c:"

        "\\TX1c:These Storyforming questions relate to the Subjective Story's perspective on the goals, events and
activities of concern to both your Main and Obstacle Characters.  These Appreciations represent the emotional or "
        "passionate approach to the relationship of the Main and Obstacle Characters.  They describe the dissonance
between the Main Character's personal problem and the roadblocks or detours presented through the Obstacle Character
which delay or impede its successful solution.\n\n"
        "Approach the Story and Character Perspectives through whichever question feels easiest to answer first.  Your
choice will automatically narrow the range of available options for other questions as well.  If you are unable to choose
a single thematic element "
        "from the range available for any Appreciations question, you can narrow your options by selecting one or more
terms from the left-list and adding them to the right-list.  Dramatica will continue to narrow your options as you move
on to other perspectives, based on your choices, until the "
        "singular choice that fits your Storyform becomes clear.  \n\nKeep in mind there are no right or wrong answers.
Whatever thematic terms feel right or most relevant to your story will direct Dramatica in generating a Storyform to
serve as your Storytelling guide.\n\nTo help you make Subjective "
        "Story choices, there is on-screen assistance with definitions, contextual examples, Dramatica usage and other
background info available via the HelpView window and the Exploratorial, as well as in the supplementary Dramatica
material.  "
        "\\"
};
resource 'DQS2' (kDQSSFMCPerspecTI, PFM_MIN_PRIO) {
        "\\TYs:75"
        "\\QTc:Storyforming the Main Character"
    "\\TQs:0"                                       /* topic of Question */
        "\\TPs:1"                                           /* textwrap procID */
        "\\HLs:0"                                           /* Forces helpView OFF */

        "\\T1c:"

        "\\TX1c:Choosing the Main Character Appreciations helps determine what the story will look and feel like through
the eyes and heart of the Main Character.  To shape your audience's emotional experience of your story, answer the
questions that feel most familiar to you first.  "
        "As you do, Dramatica will narrow your options until your Main Character's perspective has been fully
formed.\n\n"
        "Approach the Story and Character Perspectives through whichever question feels easiest to answer first.  Your
choice will automatically narrow the range of available options for other questions as well.  "
        "If you are unable to choose a single thematic element from the range available for any Appreciations question,
you can narrow your options by selecting one or more terms from the left-list and adding them to the right-list.
Dramatica will continue to narrow your options as you "
        "move on to other perspectives, based on your choices, until the singular choice that fits your Storyform
becomes clear.  \n\nKeep in mind there are no right or wrong answers.  Whatever thematic terms feel right or most
relevant to "
        "your story will direct Dramatica in generating a Storyform to serve as your Storytelling guide.\n\nTo help you
make Main Character choices, there is on-screen assistance with definitions, contextual examples, Dramatica usage and
other background "
        "info available via the HelpView window and the Exploratorial, as well as in the supplementary Dramatica
material.  "
        "\\"
};
resource 'DQS2' (kDQSSFOCPerspecTI, PFM_MIN_PRIO) {
        "\\TYs:75"
        "\\QTc:Storyforming the Obstacle Character"
    "\\TQs:0"                                       /* topic of Question */
        "\\TPs:1"                                           /* textwrap procID */
        "\\HLs:0"                                           /* Forces helpView OFF */

        "\\T1c:"

        "\\TX1c:The Obstacle Character forces the Main Character to address their personal problem.  Choosing the
Obstacle Character Appreciations helps determine the natures of the roadblocks and detours the Main Character "
        "will face through the Obstacle Character.  To determine these factors, answer the questions that feel most
familiar to you first.  As you do, Dramatica will narrow your options until your Main Character's perspective has been
fully formed.\n\n"
        "Approach the Story and Character Perspectives through whichever question feels easiest to answer first.  Your
choice will automatically narrow the range of available options for other questions as well.  "
        "If you are unable to choose a single thematic element from the range available for any Appreciations question,
you can narrow your options by selecting one or more terms from the left-list and adding them to the right-list.  "
        "Dramatica will continue to narrow your options as you move on to other perspectives, based on your choices,
until the singular choice that fits your Storyform becomes clear.  \n\nKeep in mind there are no right or wrong answers.
"
        "Whatever thematic terms feel right or most relevant to your story will direct Dramatica in generating a
Storyform to serve as your Storytelling guide.\n\nTo help you make Obstacle Character choices, there is on-screen
assistance with definitions, contextual examples, "
        "Dramatica usage and other background info available via the HelpView window and the Exploratorial, as well as
in the supplementary Dramatica material."
        "\\"
};
resource 'DQS2' (kDQSSFRecapTI, PFM_MIN_PRIO) {
        "\\TYs:75"
        "\\QTc:Storyforming Recap"
    "\\TQs:0"                                       /* topic of Question */
        "\\TPs:7"                                           /* textwrap procID */
        "\\HLs:0"                                           /* Forces helpView OFF */

        "\\T1c:The Storyform choices you have made are:"

        "\\TX1c:"
        "\\"
};
resource 'DQS2' (kDQSSFNextTI, PFM_MIN_PRIO) {
        "\\TYs:75"
        "\\QTc:What's Next"
    "\\TQs:0"                                       /* topic of Question */
        "\\TPs:1"                                           /* textwrap procID */
```

```
        "\\HLs:0"                                    /* Forces helpView OFF */

        "\\Tlc:"

        "\\TXlc:Now that your Storyform has been created and you have illustrated its Storytelling Points, you can
explore the functions of your Characters, "
        "review your Story Points and illustrations in context via Storypoints, or print out your Storyform,
Storytelling and Character-related data through a variety of Reports.\n\n"
        "Be sure to Save your story file via the File menu at this point to avoid  losing your data unexpectedly. \n\nTo
work with Characters next, exit Quick Story (press Done) and go to "
        "the Characters section from the main window.  \n\nTo view your Storyform and Storytelling Points in a chart
relationship next, exit Quick Story and go to Story Points.  \n\nTo print out Reports next, exit Quick Story and go to
Reports."
        "\\"
};

resource 'DQS2' (kDQSSTIntroTI, PFM_MIN_PRIO) {
        "\\TYs:75"
        "\\QTc:Storytelling Intro"
    "\\TQs:0"                               /* topic of Question */
        "\\TPs:1"                                   /* textwrap procID */
        "\\HLs:0"                                   /* Forces helpView OFF */

        "\\Tlc:"

        "\\TXlc:All Storytelling questions are accessible in this path.  They include Character, Plot and Theme
Appreciations of the Objective Story, Subjective Story, Main Character and Obstacle Character.  A Storyform match must be
made, however, "
        "before you can illustrate the related story points.  As you make notes for potential or existing illustrations,
you will create a complete picture of your story to guide your writing process.  Review your Storytelling illustrations
on-screen or print them out in Reports at any point.  \n\n"
        "Make notes on character descriptions (physical and otherwise) where indicated.  Your illustrations of
Character, Plot and Thematic Appreciations should describe events, activities, "
        "relationships, bits of dialogue, personality traits or behaviors that show or reflect your Storyform choices.
\n\nIf you are in the creation phase, make notes on potential illustrations.  You can change or expand them at any time,
and you will most likely come up with more as you "
        "continue to think about illustrating your complete Storyform.\n\nIf you are in the analysis/review or rewrite
phase, make notes on how you see these elements reflected in the existing dramatic work.  If you do not see evidence of a
particular story element, note this or skip the question for now.  "
        "If relevant, you can also make notes on how to illustrate this in your rewrite.  \n\nTo help you illustrate
your Storyform, there is on-screen assistance with definitions, contextual examples, Storytelling tips, Dramatica usage
and other background info available in the HelpView window "
        "through pushing the HelpView buttons.  In-depth information regarding the Dramatica Theory is found in the on-
line Exploratorial and in supplementary Dramatica materials.\n\nWhen you have illustrated your Storyform, push Done to
lock your points into your storyfile.  Be sure to Save your Storyfile regularly via the File menu."
        "\\"
};
resource 'DQS2' (kDQSSTCharDynTI, PFM_MIN_PRIO) {
        "\\TYs:75"
        "\\QTc:Storytelling Character Dynamics"
    "\\TQs:0"                               /* topic of Question */
        "\\TPs:1"                                   /* textwrap procID */
        "\\HLs:0"                                   /* Forces helpView OFF */

        "\\Tlc:"

        "\\TXlc:These Essential Questions relate to your Main Character, through whose eyes and heart the audience
observes and experiences the story.  "
        "Your illustrations of Character Dynamics choices reflect the Main Character's essential nature, behaviors and
attitudes.  They also relate to the direction of your Main Character's growth.\n\n"
        "Where indicated, identify the name and gender of your Main Character so Dramatica can refer to him or her in
context.  Dramatica will continue to use \"Main Character\" if you have not yet named your primary characters.  You can
also input notes on your "
        "Main Character's description -- physical appearance, occupation, hobbies, relationships, behaviors, etc. --
where indicated to guide your writing.\n\nBy illustrating your Storyform choices through the questions that follow, you
will begin to see how your Storyform choices can work "
        "together to tell a \"complete\" story.  Illustrations can describe events, activities, relationships, behaviors
or bits of dialogue that show or reflect your Storyform choices.  Review your Storytelling illustrations on-screen or
print them out in Reports at any point.  \n\nApproach "
        "the Story and Character Perspectives illustrations through whichever question feels easiest to answer first.
If you are unsure of a particular illustration, move on to other questions.  You can return to skipped questions at any
time. \n\nTo help you illustrate your Character Dynamics, "
        "there is on-screen assistance with Storytelling tips, definitions, contextual examples, Dramatica usage and
other background info available via the HelpView window and the Exploratorial, as well as in the supplementary Dramatica
material.  "
        "\\"
};
resource 'DQS2' (kDQSSTPlotDynTI, PFM_MIN_PRIO) {
        "\\TYs:75"
        "\\QTc:Storytelling Plot Dynamics"
    "\\TQs:0"                               /* topic of Question */
        "\\TPs:1"                                   /* textwrap procID */
        "\\HLs:0"                                   /* Forces helpView OFF */

        "\\Tlc:"

        "\\TXlc:The second group of Essential Questions relates to the entire story in terms of the forces that drive
the plot forward and the outcome to which they lead.  Your choices help Dramatica determine the approach "
        "to take in solving the Objective Story Problem.  The first two questions focus on conditions at the beginning
of the story, the others on how things will look and feel at the end.\n\n"
        "By illustrating your Storyform choices through the questions that follow, you will begin to see how your
Storyform choices can work together to tell a \"complete\" story.  Illustrations can describe events, activities, "
        "relationships, behaviors or bits of dialogue that show or reflect your Storyform choices.  Review your
Storytelling illustrations on-screen or print them out in Reports at any point.  \n\nApproach the Story and Character
Perspectives illustrations through whichever question feels easiest to answer first.  "
        "If you are unsure of a particular illustration, move on to other questions.  You can return to skipped
questions at any time. \n\nTo help you illustrate your Plot Dynamics, there is on-screen assistance with Storytelling
tips, definitions, contextual examples, Dramatica usage and other background "
        "info available via the HelpView window and the Exploratorial, as well as in the supplementary Dramatica
material."
        "\\"
};
resource 'DQS2' (kDQSSTOSPerspecTI, PFM_MIN_PRIO) {
        "\\TYs:75"
        "\\QTc:Storytelling the Objective Story"
    "\\TQs:0"                               /* topic of Question */
        "\\TPs:1"                                   /* textwrap procID */
        "\\HLs:0"                                   /* Forces helpView OFF */

        "\\Tlc:"
```

```
        "\\TX1c:The Objective Storyline describes the entire story as if it were a war.  As the general, your choices determine the strategies employed in the your story's battles.  Your illustrations of Objective Story Appreciations will focus on the goals, events and activities of common concern to your Objective Characters.  "
        "They also offer familiar perspectives for writers who are new to Dramatica.  Let your intuition guide the illustrations that seem most relevant to your story's Thematics.\n\n"
        "By illustrating your Storyform choices through the questions that follow, you will begin to see how your Storyform choices can work together to tell a \"complete\" story.  Illustrations can describe events, activities, relationships, behaviors or bits of dialogue that show or reflect your Storyform choices.  "
        "Review your Storytelling illustrations on-screen or print them out in Reports at any point.  \n\nApproach the Story and Character Perspectives illustrations through whichever question feels easiest to answer first.  If you are unsure of a particular illustration, move on to other questions.  "
        "You can return to skipped questions at any time. \n\nTo help you illustrate your Objective Story Appreciations, there is on-screen assistance with Storytelling tips, definitions, contextual examples, Dramatica usage and other background info available via the HelpView window and the Exploratorial, as well as in the supplementary Dramatica material."
        "\\"
};
resource 'DQS2' (kDQSSTSSPerspecTI, PFM_MIN_PRIO) {
        "\\TYs:75"
        "\\QTc:Storytelling the Subjective Story"
    "\\TQs:0"                                   /* topic of Question */
        "\\TPs:1"                                       /* textwrap procID */
        "\\HLs:0"                                       /* Forces helpView OFF */

        "\\T1c:"

        "\\TX1c:The Subjective Story's perspective is the emotional or passionate approach that focuses on relationship between the Main and Obstacle Characters.  These Appreciations represent the goals, events and activities of "
        "concern to both your Main and Obstacle Characters.  Your Subjective Story illustrations will reflect the dissonance between the Main Character's personal problem and the roadblocks or detours presented through the Obstacle Character which delay or impede its successful solution.\n\n"
        "By illustrating your Storyform choices through the questions that follow, you will begin to see how your Storyform choices can work together to tell a \"complete\" story.  Illustrations can "
        "describe events, activities, relationships, behaviors or bits of dialogue that show or reflect your Storyform choices.  Review your Storytelling illustrations on-screen or print them out in Reports at any point.  \n\nApproach the Story and Character Perspectives illustrations through whichever "
        "question feels easiest to answer first.  If you are unsure of a particular illustration, move on to other questions.  You can return to skipped questions at any time. \n\nTo help you illustrate your Subjective Story Appreciations, there is "
        "on-screen assistance with Storytelling tips, definitions, contextual examples, Dramatica usage and other background info available via the HelpView window and the Exploratorial, as well as in the supplementary Dramatica material."
        "\\"
};
resource 'DQS2' (kDQSSTMCPerspecTI, PFM_MIN_PRIO) {
        "\\TYs:75"
        "\\QTc:Storytelling the Main Character"
    "\\TQs:0"                                   /* topic of Question */
        "\\TPs:1"                                       /* textwrap procID */
        "\\HLs:0"                                       /* Forces helpView OFF */

        "\\T1c:"

        "\\TX1c:By illustrating the Main Character Appreciations, you express the look and feel of the story through the eyes and heart of the Main Character.  As you convey your interpretation of the Storyform choices you have made, you will shape your audience's emotional experience of your story.\n\n"
        "Where indicated, identify your Main Character's name and gender so Dramatica can refer to them in context.  You can also make notes on your Main Character's description such as physical appearance, behavior, age, occupation, unique qualities.  \n\nBy illustrating your "
        "Storyform choices through the questions that follow, you will begin to see how your Storyform choices can work together to tell a \"complete\" story.  Illustrations can describe events, activities, relationships, behaviors or bits of dialogue that show or reflect your Storyform choices.  "
        "Review your Storytelling illustrations on-screen or print them out in Reports at any point.  \n\nApproach the Story and Character Perspectives illustrations through whichever question feels easiest to answer first.  If you are unsure of a particular illustration, move on to other questions.  "
        "You can return to skipped questions at any time. \n\nTo help you illustrate your Main Character Appreciations, there is on-screen assistance with Storytelling tips, definitions, contextual examples, Dramatica usage and other background info available via the HelpView window and the Exploratorial, "
        "as well as in the supplementary Dramatica material."
        "\\"
};
resource 'DQS2' (kDQSSTOCPerspecTI, PFM_MIN_PRIO) {
        "\\TYs:75"
        "\\QTc:Storytelling the Obstacle Character"
    "\\TQs:0"                                   /* topic of Question */
        "\\TPs:1"                                       /* textwrap procID */
        "\\HLs:0"                                       /* Forces helpView OFF */

        "\\T1c:"

        "\\TX1c:Illustrating the Obstacle Character Appreciations describes the natures of the roadblocks and detours the Main Character will face through the Obstacle Character.  As you convey your interpretation of the "
        "Storyform choices you have made, you will shape your audience's understanding of how the Obstacle Character forces the Main Character to address their personal problem.\n\n"
        "Where indicated, identify your Obstacle Character's name and gender so Dramatica can refer to them in context.  You can also make notes on your Obstacle Character's description such as physical appearance, behavior, age, occupation, unique qualities.  \n\n"
        "By illustrating your Storyform choices through the questions that follow, you will begin to see how your Storyform choices can work together to tell a \"complete\" story.  Illustrations can describe events, activities, relationships, behaviors or bits of dialogue that show or reflect your "
        "Storyform choices.  Review your Storytelling illustrations on-screen or print them out in Reports at any point.  \n\nApproach the Story and Character Perspectives illustrations through whichever question feels easiest to answer first.  If you are unsure of a particular illustration, move on to other questions.  You can return to skipped "
        "questions at any time. \n\nTo help you illustrate your Obstacle Character Appreciations, there is on-screen assistance with Storytelling tips, definitions, contextual examples, Dramatica usage and other background info available via the HelpView window and the Exploratorial, as well as in the supplementary Dramatica material."
        "\\"
};
resource 'DQS2' (kDQSSTOSAddApprecsTI, PFM_MIN_PRIO) {
        "\\TYs:75"
        "\\QTc:Storytelling Additional Story Appreciations"
    "\\TQs:0"                                   /* topic of Question */
        "\\TPs:1"                                       /* textwrap procID */
        "\\HLs:0"                                       /* Forces helpView OFF */

        "\\T1c:"

        "\\TX1c:These additional Objective Story perspectives are among the most familiar to many writers.  Illustrate them first to create an overall feel for how your story is developing.  If your story or writing style is not goal oriented, however, you may prefer to illustrate other questions.\n\n"
        "Topic: By illustrating your Storyform choices through the questions that follow, you will begin to see how your Storyform choices can work together to tell a \"complete\" story.  Illustrations can describe events, activities, relationships, "
```

```
        "behaviors or bits of dialogue that show or reflect your Storyform choices.  Review your Storytelling
illustrations on-screen or print them out in Reports at any point.  \n\nApproach the Story and Character Perspectives
illustrations through whichever question feels easiest to answer first. "
        "If you are unsure of a particular illustration, move on to other questions.  You can return to skipped
questions at any time. \n\nTo help you illustrate your Objective Story Appreciations, there is on-screen assistance with
Storytelling tips, definitions, contextual examples, "
        "Dramatica usage and other background info available via the HelpView window and the Exploratorial, as well as
in the supplementary Dramatica material."
        "\\"
);
resource 'DQS2' (kDQSSTNextTI, PFM_MIN_PRIO) {
        "\\TYs:75"
        "\\QTc:What's Next"
    "\\TQs:0"                                       /* topic of Question */
        "\\TPs:1"                                           /* textwrap procID */
        "\\HLs:0"                                           /* Forces helpView OFF */

        "\\Tlc:"

        "\\TXlc:Now that your Storyform is created and you have illustrated its Storytelling Points, you can explore the
functions of your Characters, review your Story Points and illustrations in context in Storypoints, or print out
Storyform, Storytelling and Character-related data through a variety of reports.\n\n"
        "Be sure to Save your story file via the File menu at this point to avoid  losing your data unexpectedly. \n\nTo
work with Characters next, exit Quick Story (press Done) and go to the Characters section from the main window.  \n\n"
        "To view your Storyform and Storytelling Points in a chart relationship next, exit Quick Story and go to Story
Points.  \n\nTo print out Reports next, exit Quick Story and go to Reports."
        "\\"
);


resource 'DQS2' (kDQSSTRecapTI, PFM_MIN_PRIO) {
        "\\TYs:75"
        "\\QTc:Storytelling Recap"
    "\\TQs:0"                                       /* topic of Question */
        "\\TPs:1"                                           /* textwrap procID */
        "\\HLs:0"                                           /* Forces helpView OFF */

        "\\Tlc:"

        "\\TXlc:"
        "\\"
);



resource 'DQS2' (kDQSAllIntroTI, PFM_MIN_PRIO) {
        "\\TYs:75"
        "\\QTc:All Topics Intro"
    "\\TQs:0"                                       /* topic of Question */
        "\\TPs:1"                                           /* textwrap procID */
        "\\HLs:0"                                           /* Forces helpView OFF */

        "\\Tlc:"

        "\\TXlc:In this path are all Storyforming and Storytelling questions.  You can move between the 12 Essential
Questions, Objective and Subjective Story, "
        "Main and Obstacle Character perspectives to create a complete Storyform and illustrate its points.  Let your
intuition guide your choices to find those most relevant to your story and writing style.\n\n"
        "To help you make Storyforming and Storytelling choices, there is on-screen assistance with definitions,
contextual examples, Dramatica usage, "
        "Storytelling tips and other background info available in the HelpView window through pushing the HelpView
buttons.  In-depth information regarding the Dramatica Theory can be found in the "
        "on-line Exploratorial and in supplementary Dramatica materials.\n\nStoryforming:  Either/or choices are made by
pushing the button next to your choice.  Multiple semantics choices can be made "
        "by selecting relevant terms from the list on the left and adding them to the list on the right.  You can also
Unchoose a choice or adjust your range of choices at any point before your Storyform match is locked in.  "
        "This is done by choosing the unselected either/or option in any Dynamics question or by adjusting the multiple
semantics options in the right-hand lists by removing or adding relevant terms.  \n\n"
        "When you have made all your Storyforming choices, push Done to lock them in so Dramatica's Story Engine can
create your Storyform match.  Be sure to Save your Storyform file regularly via the File menu.\n\nStorytelling:  By
illustrating your Storyform choices through "
        "the questions that follow, you will begin to see how your Storyform choices can work together to tell a
\"complete\" story.  Illustrations can describe events, activities, relationships, behaviors or bits of dialogue that
show or reflect your Storyform choices.  \n\n"
        "Approach the Story and Character Perspectives illustrations through whichever question feels easiest to answer
first.  If you are unsure of a particular illustration, move on to other questions.  You can return to skipped questions
at any time. "
        "Your Storytelling illustrations can be reviewed on-screen and also printed out in Reports at any point.  "
        "\\"
);
resource 'DQS2' (kDQSAllCharDynTI, PFM_MIN_PRIO) {
        "\\TYs:75"
        "\\QTc:Character Dynamics"
    "\\TQs:0"                                       /* topic of Question */
        "\\TPs:1"                                           /* textwrap procID */
        "\\HLs:0"                                           /* Forces helpView OFF */

        "\\Tlc:"

        "\\TXlc:Your choices for the Character Dynamics will determine the Main Character's essential nature, behaviors
and attitudes which will be reflected in your illustrations.  They also relate to the direction of your Main Character's
growth.\n\n"
        "Where indicated, identify the name and gender of your Main Character so Dramatica can refer to him or her in
context.  Dramatica will continue to use \"Main Character\" if you have not yet named your primary characters.  "
        "You can also input notes on your Main Character's description -- physical appearance, occupation, hobbies,
relationships, behaviors, etc. -- where indicated to guide your writing.\n\nTo help you choose and illustrate your
Character Dynamics, "
        "there is on-screen assistance with Storytelling tips, definitions, contextual examples, Dramatica usage and
other background info available via the HelpView window and the Exploratorial, as well as in the supplementary Dramatica
material.  \n\n"
        "Storyforming:  The Dynamics questions are either/or choices that determine the Main Character's biases and
tendencies.  If you are unsure of a particular choice, select Choose Later and move on to other questions.  You can
return to skipped questions at any time.  "
        "As you move through the Storyforming process, however, Dramatica may predict the best choice for a skipped
question as it limits or narrows particular choice ranges due to other choices you have made.\n\nFor assistance in making
Character Dynamics "
        "choices or expanded perspectives on Main Characters in general, refer to the Character-oriented material in the
HelpView window or Exploratorial as well as relevant sections in the User Manual and other supplementary Dramatica
materials.\n\nStorytelling:  By illustrating your "
```

```
        "Storyform choices through the questions that follow, you will begin to see how your Storyform choices can work
together to tell a \"complete\" story.  Illustrations can describe events, activities, relationships, behaviors or bits
of dialogue that show or "
        "reflect your Storyform choices.  Review your Storytelling illustrations on-screen or print them out in Reports
at any point.  \n\nApproach the Story and Character Perspectives illustrations through whichever question feels easiest
to answer first.  "
        "If you are unsure of a particular illustration, move on to other questions.  You can return to skipped
questions at any time."
        "\\"
};
resource 'DQS2' (kDQSAllPlotDynTI, PFM_MIN_PRIO) {
        "\\TYs:75"
        "\\QTc:Plot Dynamics"
    "\\TQs:0"                                   /* topic of Question */
        "\\TPs:1"                                       /* textwrap procID */
        "\\HLs:0"                                       /* Forces helpView OFF */

        "\\Tlc:"

        "\\TXlc:The Plot Dynamics relate to the entire story in terms of the forces that drive the plot forward and the
outcome to which they lead.  Your choices help Dramatica determine the approach to take in solving the Objective Story
Problem.  "
        "The first two questions focus on conditions at the beginning of the story, the others on how things will look
and feel at the end.\n\n"
        "Plot Dynamics directly impact the progression of events which influence your Objective Characters' actions and
decisions.  They also determine the feel of the story's tension line.  To help make these choices, ask yourself \"How do
I want things to happen in my story\" "
        "if you are in the creation phase &/or \"How are things unfolding\" if analyzing an already-written
story.\n\nFor assistance with Plot Dynamics choices or illustrations, or for expanded perspectives on the Dynamics in
general, refer to the Plot-oriented material in the HelpView window or Exploratorial "
        "as well as relevant sections in the User Manual and other supplementary Dramatica materials.\n\nStoryforming:
The Dynamics questions are either/or choices that determine the Plot's direction and feel.  If you are unsure of a
particular choice, select Choose Later and move on to other questions.  "
        "You can return to skipped questions at any time.  As you move through the Storyforming process, however,
Dramatica may predict the best choice for a skipped question as it limits or narrows particular choice ranges due to
other choices you have made.\n\nStorytelling:  By illustrating your Storyform choices "
        "through the questions that follow, you will begin to see how your Storyform choices can work together to tell a
\"complete\" story.  Illustrations can describe events, activities, relationships, behaviors or bits of dialogue that
show or reflect your Storyform choices.  Review your Storytelling illustrations "
        "on-screen or print them out in Reports at any point.  \n\nApproach the Story and Character Perspectives
illustrations through whichever question feels easiest to answer first.  If you are unsure of a particular illustration,
move on to other questions.  You can return to skipped questions at any time. "
        "\\"
};
resource 'DQS2' (kDQSAllOSPerspecTI, PFM_MIN_PRIO) {
        "\\TYs:75"
        "\\QTc:Objective Story Intro"
    "\\TQs:0"                                   /* topic of Question */
        "\\TPs:1"                                       /* textwrap procID */
        "\\HLs:0"                                       /* Forces helpView OFF */

        "\\Tlc:"

        "\\TXlc:Your choices of Objective Story Appreciations help Dramatica identify which thematic arenas you wish to
emphasize in your Storyform.  These questions focus on the goals, events and activities of common concern to your
Objective Characters.  They also offer familiar perspectives for writers who are new to Dramatica.  "
        "Let your intuition guide the choices of Dramatica terms that seem most relevant to your story's Thematics.\n\n"
        "The Objective Storyline describes the entire story as if it were a war.  As the general, your choices determine
the strategies to be employed in your story's battles.  Dramatica uses your answers to suggest the approaches to take in
solving the Objective Story's Problem. \n\n"
        "To help you make and illustrate your Objective Story choices, there is on-screen assistance with definitions,
contextual examples, Storytelling tips, Dramatica usage and other background info available via the HelpView window and
the Exploratorial, as well as in the supplementary Dramatica material.  \n\n"
        "Storyforming:  Approach the Story and Character Perspectives through whichever question feels easiest to answer
first.  Your choice will automatically narrow the range of available options for other questions as well.  If you are
unable to choose a single thematic element from the range available for any "
        "Appreciations question, you can narrow your options by selecting one or more terms from the left-list and
adding them to the right-list.  Dramatica will continue to narrow your options as you move on to other perspectives,
based on your choices, until the singular choice that fits your Storyform becomes clear.  \n\n"
        "Keep in mind there are no right or wrong answers.  Choosing whichever thematic terms feel right or most
relevant to your story will direct Dramatica in generating a Storyform to serve as your Storytelling
guide.\n\nStorytelling:  By illustrating your Storyform choices through the questions that follow, you will "
        "begin to see how your Storyform choices can work together to tell a \"complete\" story.  Illustrations can
describe events, activities, relationships, behaviors or bits of dialogue that show or reflect your Storyform choices.
Review your Storytelling illustrations on-screen or printed them out in Reports at any point.  \n\n"
        "Approach the Story and Character Perspectives illustrations through whichever question feels easiest to answer
first.  If you are unsure of a particular illustration, move on to other questions.  You can return to skipped questions
at any time. "
        "\\"
};
resource 'DQS2' (kDQSAllOSAddApprecsTI, PFM_MIN_PRIO) {
        "\\TYs:75"
        "\\QTc:Additional Story Appreciations"
    "\\TQs:0"                                   /* topic of Question */
        "\\TPs:1"                                       /* textwrap procID */
        "\\HLs:0"                                       /* Forces helpView OFF */

        "\\Tlc:"

        "\\TXlc:In addition to the ten basic Objective Story Appreciations, Dramatica provides questions that focus on
the Story Goal (the common goal of the Objective Characters) and on various requirements that must be met to reach it.
Illustrating these points can help you create an overall feel for how your story is developing.\n\n"
        "Many writers find story elements like Goal, Consequence, Costs and Dividends familiar.  If choosing the other
Objective Story Appreciations seems difficult, approaching your story through these questions will automatically narrow
the other ranges as well.  If your story or writing style is not goal oriented, "
        "however, you may prefer to choose or illustrate other Objective Story questions first.\n\nTo help you make and
illustrate your Objective Story choices, there is on-screen assistance with definitions, contextual examples,
Storytelling tips, Dramatica usage and other background info available via the HelpView window and the Exploratorial, "
        "as well as in the supplementary Dramatica material.  \n\nStorytelling:  Approach the Story and Character
Perspectives through whichever question feels easiest to answer first.  Your choice will automatically narrow the range
of available options for other questions as well.  If you are unable to choose a single thematic element from the "
        "range available for any Appreciations question, you can narrow your options by selecting one or more terms from
the left-list and adding them to the right-list.  Dramatica will continue to narrow your options as you move on to other
perspectives, based on your choices, until the singular choice that fits your Storyform becomes clear.  \n\n"
        "Keep in mind there are no right or wrong answers.  Whatever thematic terms feel right or most relevant to your
story will direct Dramatica in generating a Storyform to serve as your Storytelling guide.\n\nStoryforming:  By
illustrating your Storyform choices through these questions, you will begin to see how your Storyform choices can work "
        "together to tell a \"complete\" story.  Illustrations can describe events, activities, relationships, behaviors
or bits of dialogue that show or reflect your Storyform choices.  Review your Storytelling illustrations on-screen or
print them out in Reports at any point.  \n\nApproach the Story and Character Perspectives illustrations through "
        "whichever question feels easiest to answer first.  If you are unsure of a particular illustration, move on to
other questions.  You can return to skipped questions at any time. "
        "\\"
```

```
};
resource 'DQS2' (kDQSAllSSPerspecTI, PFM_MIN_PRIO) {
        "\\TYs:75"
        "\\QTc:Subjective Story Intro"
    "\\TQs:0"                                  /* topic of Question */
        "\\TPs:1"                                       /* textwrap procID */
        "\\HLs:0"                                       /* Forces helpView OFF */

        "\\Tlc:"

        "\\TXlc:In this path are all Storyforming and Storytelling questions relating to the goals, events and
activities of concern to both your Main and Obstacle Characters.  These Subjective Story Appreciations represent the
emotional or passionate approach to the relationship of the Main and Obstacle Characters. "
        "They describe the dissonance between the Main Character's personal problem and the roadblocks or detours
presented through the Obstacle Character which delay or impede its successful solution. \n\n"
        "To help you make Subjective Story choices, there is on-screen assistance with definitions, contextual examples,
Storytelling tips, Dramatica usage and other background info available via the HelpView window and the Exploratorial, as
well as in the supplementary Dramatica material.  \n\n"
        "Storyforming:  Approach the Story and Character Perspectives through whichever question feels easiest to answer
first.  Your choice will automatically narrow the range of available options for other questions as well.  If you are
unable to choose a single thematic element from the range available for any Appreciations question, you can "
        "narrow your options by selecting one or more terms from the left-list and adding them to the right-list.
Dramatica will continue to narrow your options as you move on to other perspectives, based on your choices, until the
singular choice that fits your Storyform becomes clear.  \n\nKeep in mind there are no right or wrong answers.  "
        "Whatever thematic terms feel right or most relevant to your story will direct Dramatica in generating a
Storyform to serve as your Storytelling guide.\n\nStorytelling:  By illustrating your Storyform choices through the
questions that follow, you will begin to see how your Storyform choices can work together to tell a \"complete\" story.
"
        "Illustrations can describe events, activities, relationships, behaviors or bits of dialogue that show or
reflect your Storyform choices.  Review your Storytelling illustrations on-screen or print them out in Reports at any
point.  \n\nApproach the Story and Character Perspectives illustrations through whichever question feels easiest to "
        "answer first.  If you are unsure of a particular illustration, move on to other questions.  You can return to
skipped questions at any time. "
        "\\"
};
resource 'DQS2' (kDQSAllMCPerspecTI, PFM_MIN_PRIO) {
        "\\TYs:75"
        "\\QTc:Main Character Intro"
    "\\TQs:0"                                  /* topic of Question */
        "\\TPs:1"                                       /* textwrap procID */
        "\\HLs:0"                                       /* Forces helpView OFF */

        "\\Tlc:"

        "\\TXlc:Choosing the Main Character Appreciations helps determine what the story will look and feel like through
the eyes and heart of the Main Character.  To shape your audience's emotional experience of your story, answer "
        "the questions that feel most familiar to you first.  As you do, Dramatica will narrow your options until your
Main Character's perspective has been fully formed.  Your illustrations of these Storyform choices will then convey these
elements in ways your audiences can feel.  \n\n"
        "To help you make and illustrate your Main Character Appreciations, there is on-screen assistance with
definitions, contextual examples, Storytelling tips Dramatica usage and other background info available via the HelpView
window and the Exploratorial, as well as in the supplementary Dramatica material.  \n\n"
        "Storyforming:  Approach the Story and Character Perspectives through whichever question feels easiest to answer
first.  Your choice will automatically narrow the range of available options for other questions as well.  If you are
unable to choose a single thematic element from the range available "
        "for any Appreciations question, you can narrow your options by selecting one or more terms from the left-list
and adding them to the right-list.  Dramatica will continue to narrow your options as you move on to other perspectives,
based on your choices, until the singular choice that fits your Storyform becomes clear.  \n\nKeep in mind "
        "there are no right or wrong answers.  Whatever thematic terms feel right or most relevant to your story will
direct Dramatica in generating a Storyform to serve as your Storytelling guide.\n\nStorytelling:  By illustrating your
Storyform choices through the questions that follow, you will begin to see how your Storyform choices can work "
        "together to tell a \"complete\" story.  Illustrations can describe events, activities, relationships, behaviors
or bits of dialogue that show or reflect your Storyform choices.  Review your Storytelling illustrations on-screen or
print them out in Reports at any point.  \n\nApproach the Story and Character Perspectives illustrations through "
        "whichever question feels easiest to answer first.  If you are unsure of a particular illustration, move on to
other questions.  You can return to skipped questions at any time. "
        "\\"
};
resource 'DQS2' (kDQSAllOCIntroTI, PFM_MIN_PRIO) {
        "\\TYs:75"
        "\\QTc:Obstacle Character Intro"
    "\\TQs:0"                                  /* topic of Question */
        "\\TPs:1"                                       /* textwrap procID */
        "\\HLs:0"                                       /* Forces helpView OFF */

        "\\Tlc:"

        "\\TXlc:In this path are all Storyforming and Storytelling questions that relate to the Obstacle Character
Perspective.  The Obstacle Character forces the Main Character to address their personal problem.  Use this path to focus
on the Dynamics and Appreciations of concern to your Obstacle Character.  \n\n"
        "For assistance in making Obstacle Character choices or for expanded perspectives on Obstacle Characters in
general, refer to the Character-oriented material in the HelpView window or Exploratorial as well as relevant selections
in the User Manual and other supplementary Dramatica materials.\n\n"
        "Where indicated, identify your Obstacle Character's name and gender so Dramatica can refer to them in context.
Dramatica will continue to use \"Obstacle Character\" if you have not yet named your primary characters.  You can also
make notes on your Obstacle Character's description -- "
        "physical appearance, occupation, hobbies, relationships, behaviors, etc. -- where indicated to guide your
writing.\n\nApproach the Story and Character Perspectives choices and illustrations through whichever question feels
easiest to answer first.  If you are unsure of a particular choice or "
        "illustration, move on to other questions.  You can return to skipped questions at any time. \n\nTo help you
choose and illustrate your Obstacle Character Dynamics and Appreciations, there is on-screen assistance with Storytelling
tips, definitions, contextual examples, Dramatica usage and other background info available via "
        "the HelpView window and the Exploratorial, as well as in the User Manual and other supplementary Dramatica
materials."
        "\\"
};
resource 'DQS2' (kDQSAllOCPerspecTI, PFM_MIN_PRIO) {
        "\\TYs:75"
        "\\QTc:Obstacle Character Appreciations"
    "\\TQs:0"                                  /* topic of Question */
        "\\TPs:1"                                       /* textwrap procID */
        "\\HLs:0"                                       /* Forces helpView OFF */

        "\\Tlc:"

        "\\TXlc:Choosing the Obstacle Character Appreciations helps determine the natures of the roadblocks and detours
the Main Character will face through the Obstacle Character.  To shape your audience's perceptions of how the Obstacle
Character forces the Main Character to address their personal problem, answer the "
        "questions that feel most familiar to you first.  As you do, Dramatica will narrow your options until your Main
Character's perspective has been fully formed.  Your illustrations of these Storyform choices will then convey your
interpretation of these Storyform choices in ways that your audience will understand.\n\n"
```

```
        "To help you make and illustrate Obstacle Character choices, there is on-screen assistance with definitions,
contextual examples, Storytelling tips, Dramatica usage and other background info available via the HelpView window and
the Exploratorial, as well as in "
        "the supplementary Dramatica material.  \n\nStoryforming:  Approach the Story and Character Perspectives through
whichever question feels easiest to answer first.  Your choice will automatically narrow the range of available options
for other questions as well.  If you are unable to choose "
        "a single thematic element from the range available for any Appreciations question, you can narrow your options
by selecting one or more terms from the left-list and adding them to the right-list.  Dramatica will continue to narrow
your options as you move on to other perspectives, based on "
        "your choices, until the singular choice that fits your Storyform becomes clear.  \n\nKeep in mind there are no
right or wrong answers.  Whatever thematic terms feel right or most relevant to your story will direct Dramatica in
generating a Storyform to serve as your Storytelling guide.\n\n"
        "Storytelling:  By illustrating your Storyform choices through the questions that follow, you will begin to see
how your Storyform choices can work together to tell a \"complete\" story.  Illustrations can describe events,
activities, relationships, behaviors or bits of dialogue that show or reflect your Storyform choices.  "
        "Review your Storytelling illustrations on-screen or print them out in Reports at any point.  \n\nApproach the
Story and Character Perspectives illustrations through whichever question feels easiest to answer first.  If you are
unsure of a particular illustration, move on to other questions.  "
        "You can return to skipped questions at any time. "
        "\\"
};
resource 'DQS2' (kDQSAllRecapTI, PFM_MIN_PRIO) {
        "\\TYs:75"
        "\\QTc:All Topics Recap"
    "\\TQs:0"                                   /* topic of Question */
        "\\TPs:7"                                       /* textwrap procID */
        "\\HLs:0"                                       /* Forces helpView OFF */

        "\\Tlc:"

        "\\TXlc:If you do not have a Storyform match at this point, review the questions you have skipped.  You may find
unchosen questions in the Character or Plot Dynamics are now easier to address.  "
        "If you answer those skipped questions, your Storyform will find its singular match.  \n\n"
        "If you prefer to work on \"the bigger pictures\" at this point, do so through your Objective or Subjective
Story perspectives.  \n\n"
        "If you prefer to concentrate on character at this point, work with questions you have skipped in the Main or
Obstacle Character perspectives.  \n\nBe sure to Save your story file via the File menu at this point to avoid losing
your data unexpectedly. "
        "\\"
};
resource 'DQS2' (kDQSAllNextTI, PFM_MIN_PRIO) {
        "\\TYs:75"
        "\\QTc:What's Next"
    "\\TQs:0"                                   /* topic of Question */
        "\\TPs:1"                                       /* textwrap procID */
        "\\HLs:0"                                       /* Forces helpView OFF */

        "\\Tlc:"

        "\\TXlc:Now that your Storyform has been created and you have illustrated its Storytelling Points, you can
explore the functions of your Characters, review your Story Points and illustrations in context in Storypoints, or print
out Storyform, Storytelling and Character-related data through a variety of reports.\n\n"
        "To work with Characters next, exit Quick Story (press Done) and go to the Characters section from the main
window.  \n\nTo view your Storyform and Storytelling Points in a chart relationship next, exit Quick Story and go to
Story Points.  \n\nTo print out Reports next, exit Quick Story and go to Reports."
        "\\"
};



#if 0
resource 'DQS2' (kDQSQSNextTI, PFM_MIN_PRIO) {
        "\\TYs:0"
        "\\QTc:Topic title"
    "\\TQs:0"

        "\\Tlc:"

        "\\"
};
#endif



resource 'DQS2' (kDQSIntro, PFM_MIN_PRIO) {
        "\\TYs:0"
        "\\QTc:Introduction"
    "\\TQs:0"

        "\\Tlc:Welcome to the Dramatica Query System.\n\nThis window will help you answer all the questions needed to
form your story.\n\n"

        "\\"
};

resource 'DQS2' (kDQSTitle, PFM_MIN_PRIO) {
        "\\HPs:" $$Format("%d,", rDQSHPFillBlank)
        "\\TYs:2"
        "\\QTc:Story Title"
    "\\TQs:0"

        "\\Tlc:What is the title of the story?"
        "\\ENs:1"
        "\\EVlc:Title"
        "\\ESls:1"
        "\\ETlc:Title:"
        "\\EDlc:Your Story"

        "\\"
};

resource 'DQS2' (kDQSAuthor, PFM_MIN_PRIO) {
        "\\HPs:" $$Format("%d,", rDQSHPFillBlank)
        "\\TYs:2"
        "\\QTc:Story Author"
    "\\TQs:0"

        "\\Tlc:Who is the author of \"(SDI(Title))\"?"
        "\\ENs:1"
        "\\EVlc:Author"
```

```
          "\\ESls:1"
          "\\ETlc:Author:"
          "\\EDlc:"

          "\\"
};

resource 'DQS2' (kDQSPeriod, PFM_MIN_PRIO) {
          "\\HPs:" $$Format("%d,", rDQSHPFillBlank)
          "\\TYs:2"
          "\\QTc:Story Period"
     "\\TQs:0"

          "\\Tlc:During what period in history is \"(SDI(Title))\" set?"
          "\\ENs:1"
          "\\EVlc:Period"
          "\\ESls:1"
          "\\ETlc:Period:"
          "\\EDlc:"

          "\\"
};

#if 0
resource 'DQS2' (kDQSBackground, PFM_MIN_PRIO) {
          ""
};
#endif

resource 'DQS2' (kDQSGenre, PFM_MIN_PRIO) {
          "\\HPs:" $$Format("%d,", rDQSHPFillBlank)
          "\\TYs:2"
          "\\QTc:Story Genre"
     "\\TQs:0"

          "\\Tlc:What is the genre of \"(SDI(Title))\"?"
          "\\ENs:1"
          "\\EVlc:Genre"
          "\\ESls:1"
          "\\ETlc:Genre:"
          "\\EDlc:"

          "\\"
};

#if 0
resource 'DQS2' (kDQSTone, PFM_MIN_PRIO) {
          ""
};
#endif

resource 'DQS2' (kDQSAnalysis, PFM_MIN_PRIO) {
          "\\HPs:" $$Format("%d,", rDQSHPFillBlank)
          "\\TYs:2"
          "\\QTc:Story Analyst"
     "\\TQs:0"

          "\\Tlc:Who is analyzing \"(SDI(Title))\"?"
          "\\ENs:1"
          "\\EVlc:Analysis"
          "\\ESls:1"
          "\\ETlc:Analysis:"
          "\\EDlc:"

          "\\"
};

resource 'DQS2' (kDQSCreate, PFM_MIN_PRIO) {
          "\\HPs:" $$Format("%d,", rDQSHPRadioButtons)
          "\\TYs:3"
          "\\QTc:Story Creation or Analysis?"
     "\\TQs:0"
          "\\DQs:3"

          "\\Tlc:Do you wish to...?"
          "\\RNs:2"
          "\\RVc:Analysis"
          "\\RSls:2"
          "\\Rlc:Create"
          "\\R2c:Analyze"

          "\\"
};


resource 'DQS2' (kDQSDraft, PFM_MIN_PRIO) {
          "\\HPs:" $$Format("%d,", rDQSHPFillBlank)
          "\\TYs:2"
          "\\QTc:Story Draft"
     "\\TQs:0"

          "\\Tlc:What is the draft of \"(SDI(Title))\"?"
          "\\ENs:1"
          "\\EVlc:Draft"
          "\\ESls:1"
          "\\ETlc:Draft:"
          "\\EDlc:"

          "\\"
};
resource 'DQS2' (kDQSSetting, PFM_MIN_PRIO) {
          "\\HPs:" $$Format("%d,", rDQSHPFillBlank)
          "\\TYs:2"
          "\\QTc:Story Setting"
     "\\TQs:0"

          "\\Tlc:Where does \"(SDI(Title))\" take place?"
          "\\ENs:1"
          "\\EVlc:Place"
          "\\ESls:1"
          "\\ETlc:Place:"
          "\\EDlc:"
```

```
        "\\"
);
resource 'DQS2' (kDQSSynopsis, PFM_MIN_PRIO) {
        "\\HPs:" $$Format("%d,", rDQSHPFillBlank)
        "\\TYs:2"
        "\\QTc:Story Synopsis"
    "\\TQs:0"

        "\\T1c:Give a one line description of \"(SDI(Title))\""
        "\\ENs:1"
        "\\EV1c:Synopsis"
        "\\ES1s:1"
        "\\ET1c:Synopsis:"
        "\\ED1c:"

        "\\"
);
resource 'DQS2' (kDQSSource, PFM_MIN_PRIO) {
        "\\HPs:" $$Format("%d,", rDQSHPFillBlank)
        "\\TYs:2"
        "\\QTc:Story Sources"
    "\\TQs:0"

        "\\T1c:What sources are pertinent to the development of \"(SDI(Title))\"?"
        "\\ENs:1"
        "\\EV1c:Source"
        "\\ES1s:1"
        "\\ET1c:Source:"
        "\\ED1c:"

        "\\"
);

#if 0
resource 'DQS2' (kDQSFormat, PFM_MIN_PRIO) {
        ""
};
resource 'DQS2' (kDQSForum, PFM_MIN_PRIO) {
        ""
};
#endif


resource 'DQS2' (kDQSGenApproach, PFM_MIN_PRIO) {
        "\\HPs:" $$Format("%d,", rDQSHPRadioButtons)
        "\\TYs:3"
        "\\QTc:Approach to \"(SDI(Title))\""
    "\\TQs:0"
        "\\DQs:3"

        "\\T1c:Do you wish to first approach the creation of \"(SDI(Title))\" through:"
        "\\RNs:4"
        "\\RVc:Approach1"
        "\\RS1s:2"
        "\\R1c:Genre"
        "\\R2c:Plot"
        "\\R3c:Theme"
        "\\R4c:Character"

        "\\"
);

resource 'DQS2' (kDQSGenPhases, PFM_MIN_PRIO) {
        "\\TYs:75"
        "\\QTc:Four Phases of Story Creation"
    "\\TQs:0"                                     /* topic of Question */
        "\\TPs:1"                                         /* textwrap procID */
        "\\HLs:0"                                         /* Forces helpView OFF */

        "\\T1c:Dramatica sees story creation as taking part in four phases."

        "\\TX1c:• Phase One is Storyforming, where an author arranges the dramatics that will occur in their story.\n\n"
        "• Phase Two is Encoding, where an author illustrates the dramatics that will occur in their story.\n\n"
        "• Phase Three is Storytelling, where an author weaves their dramatics together in a story that unfolds to the
audience.\n\n"
        "• Phase Four is Reception, where the intended impact of a story upon an audience is determined."

        "\\"
);

/******************************* Genre Specific Questions ***************************************/

resource 'DQS2' (kDQSG1Intro, PFM_MIN_PRIO) {
        "\\TYs:75"
        "\\QTc:Approaching \"(SDI(Title))\" from Genre"
    "\\TQs:0"                                     /* topic of Question */
        "\\TPs:1"                                         /* textwrap procID */
        "\\HLs:0"                                         /* Forces helpView OFF */

        "\\T1c:"

        "\\TX1c:Dramatica will now present a number of questions pertinent to Storyforming Genre.\n\nTo advance to the
next question, simply hit return or single click on any "
        "question in the scrolling list to jump out of order.  Answer as many as you can.  Then shift to another area
(Plot, Theme, Character) or progress to the Storytelling Stage of "
        "Genre as you continue to craft your story."


        "\\"
);


resource 'DQS2' (kDQSGDomain, PFM_MIN_PRIO) {
        "\\HPs:" $$Format("%d,", rDQSHPRadioButtons)
        "\\TYs:3"
        "\\QTc:Genre Subject Matter"
    "\\TQs:0"
        "\\DQs:3"

        "\\T1c:Is your (SDI(Genre)) primarily about:"
```

```
        "\\RNs:4"
        "\\RVc:GDomain"
        "\\RSls:2"
        "\\R1c:The Events that effect people"
        "\\R2c:The Relationships between people"
        "\\R3c:What it feels like to be a certain person"
        "\\R4c:An exploration of a certain kind of person"

        "\\"
};

resource 'DQS2' (kDQSGClass, PFM_MIN_PRIO) {
        "\\HPs:" $$Format("%d,", rDQSHPRadioButtons)
        "\\TYs:3"
        "\\QTc:Genre Emphasis"
    "\\TQs:0"
        "\\DQs:3"

        "\\T1c:In your {SDI(Genre)}{GDO( about \",\", )}, do you wish to emphasize:"
        "\\RNs:4"
        "\\RVc:GClass"
        "\\RSls:2"
        "\\R1c:Motivations and attitudes"
        "\\R2c:Methods and activities"
        "\\R3c:Evaluations and how people think"
        "\\R4c:Purposes and situations"

        "\\"
};

resource 'DQS2' (kDQSG1MoreTI, PFM_MIN_PRIO) {
        "\\TYs:75"
        "\\QTc:Additional Genre Topics"
    "\\TQs:0"                                   /* topic of Question */
        "\\TPs:1"                                       /* textwrap procID */
        "\\HLs:0"                                       /* Forces helpView OFF */

        "\\T1c:"

        "\\TX1c:The previous Genre questions dealt primarily with the overall feel of your story in setting and style,
and audience point of view.  This arrived at a static sense of the framework in which your story will be developed.  "
        "However, Genre also pertains to the broad-scale Dynamics that control the essential forces at work in a story.
The following questions determines the directions you want some of these forces to take."

        "\\"
};

resource 'DQS2' (kDQSG1AdvTI, PFM_MIN_PRIO) {
        "\\TYs:75"
        "\\QTc:Additional Genre Topics"
    "\\TQs:0"                                   /* topic of Question */
        "\\TPs:1"                                       /* textwrap procID */
        "\\HLs:0"                                       /* Forces helpView OFF */

        "\\T1c:"

        "\\TX1c:Normally, when we think about Genre we are lumping the setting, style of storytelling, pacing, and  a
number of other dramatic aspects together.  "
        "This is fine for renting videos or browsing the bookstore, but not much use in creating an original story.  "
        "Still, we can begin with Genre, then move from the general to the specific as we determine the dramatic forces
we wish to have at work in our storyform.\n\n"

        "One of the primary forces that molds a genre is the perspective from which the audience is brought to the
story.  "
        "The following questions pertain to the Main Character of \"{SDI(Title)}\", whose nature has significant impact
on the audience's point of view."

        "\\"
};

resource 'DQS2' (kDQSG1Next, PFM_MIN_PRIO) {
        "\\TYs:75"
        "\\QTc:What Next?"
    "\\TQs:0"                                   /* topic of Question */
        "\\TPs:1"                                       /* textwrap procID */
        "\\HLs:0"                                       /* Forces helpView OFF */

        "\\T1c:This concludes the Genre Storyforming phase of the DQS."

        "\\TX1c:You have reached the end of the Dramatica Query System questions for Genre Storyforming.  From here you
may wish to continue the storyforming process in Plot, Theme or Character, or you may wish to continue in Genre by moving
"
        "into storytelling.\n\nWe STRONGLY suggest you complete all four aspects of storyforming first.  Dramatica's
\"magic\" lies in the Story Engine that can generate many dramatic appreciations of your story once you have arrived at
one unique storyform.  "
        "Until that moment, Dramatica can only provide limited feedback.\n\nKeep in mind that once you have arrived at a
single storyform, it is only the first step.  You will want to browse through Dramatica's reports and other output to see
if that storyform "
        "feels like the story you want to tell.  Perhaps parts of it do and parts of it don't.  That is the time to go
back and rework your storyform, keeping what you are sure of and experimenting with different combinations of the
rest.\n\nBounce back and forth "
        "between storyforming and examining the output.  Eventually you'll hone in on the one storyform that wholly
expresses the emotional and rational points you wish to make.  Once at this point, THAT is the time to start
storyTELLING.\n\nStill, if you already "
        "have a lot of ideas you'd just like to get down somewhere so you have them documented, go to storytelling and
jot them down.  Once you finish the storyforming process, you can compare your illustrations with Dramatica's output and
have a much better feel "
        "for which ideas work together and which don't really belong in the same story."

        "\\"
};

resource 'DQS2' (kDQSG1Analytical, PFM_MIN_PRIO) {
        "\\APs:" $$Format("%d,", rApprSTDom)
        "\\CQs:" $$Format("%d,", kDQSG2AnalyticalST)
        "\\HPs:" $$Format("%d,", rDQSHPStructualFinders)
        "\\TYs:100"
        "\\QTc:Analytical Argument Topic"
    "\\TQs:2"

        "\\T1c:Pick the topic \"{SDI(Title)}\" approaches analytically.  Choose from the list on the left, then press
the ADD button:"
```

```
        "\\"
);

resource 'DQS2' (kDQSG1Passionate, PFM_MIN_PRIO) {
        "\\APs:" $$Format("%d,", rApprPLDom)
        "\\CQs:" $$Format("%d,", kDQSG2PassionateST)
        "\\HPs:" $$Format("%d,", rDQSHPStructualFinders)
        "\\TYs:100"
        "\\QTc:Passionate Argument Topic"
    "\\TQs:2"

        "\\T1c:Pick the topic \"[SDI(Title)]\" approaches passionately.  Choose from the list on the left, then press
the ADD button:"

        "\\"
);

resource 'DQS2' (kDQSG2AnalyticalST, PFM_MIN_PRIO) {
        "\\APs:" $$Format("%d,", rApprSTDom)
        "\\CQs:" $$Format("%d,", kDQSG1Analytical)
        "\\HPs:" $$Format("%d,", rDQSHPFillBlank)
        "\\TYs:2"
        "\\QTc:Illustrate the Analytical Argument Topic"
    "\\TQs:3"

        "\\T1c:Illustrate how the topic which your story treats analytically is [SDF(STDom)] ([SNF(STDom)]):"
        "\\ALT1c:Illustrate the topic argued analytically in your story:"
        "\\ENs:1"
        "\\EV1c:STDom"
        "\\ES1s:2"
        "\\EM1s:6"

        "\\"
);

resource 'DQS2' (kDQSG2PassionateST, PFM_MIN_PRIO) {
        "\\APs:" $$Format("%d,", rApprPLDom)
        "\\CQs:" $$Format("%d,", kDQSG1Passionate)
        "\\HPs:" $$Format("%d,", rDQSHPFillBlank)
        "\\TYs:2"
        "\\QTc:Illustrate the Passionate Argument Topic"
    "\\TQs:3"

        "\\T1c:Illustrate how the topic which your story treats passionately is [SDF(PLDom)] ([SNF(PLDom)]):"
        "\\ALT1c:Illustrate the topic argued passionately in your story:"
        "\\ENs:1"
        "\\EV1c:PLDom"
        "\\ES1s:2"
        "\\EM1s:6"

        "\\"
);



resource 'DQS2' (kDQSG2Intro, PFM_MIN_PRIO) {
        "\\TYs:75"
        "\\QTc:Genre Stage 2:  Storytelling"
    "\\TQs:0"                                   /* topic of Question */
        "\\TPs:1"                                       /* textwrap procID */
        "\\HLs:0"                                       /* Forces helpView OFF */

        "\\T1c:"

        "\\TX1c:In the questions that follow you will be able to personalize your story's raw dramatics by creating
specific scenarios and events to illustrate the essential topics and forces that work to express your Genre
choices.\n\nFor each of these questions, "
        "think about your story's overview - how can you best depict the wide-ranging perspectives described by each
aspect of your story's Genre.\n\nIf you have not yet completed a storyform, you may find yourself simply filling in
blanks. "
        "This is why we strongly suggest you first complete the Storyforming phase: so additional information will
appear in these questions that can offer guidelines and signposts to keep your story on course."

        "\\"
);

resource 'DQS2' (kDQSG2Next, PFM_MIN_PRIO) {
        "\\TYs:75"
        "\\QTc:What Next?"
    "\\TQs:0"                                   /* topic of Question */
        "\\TPs:1"                                       /* textwrap procID */
        "\\HLs:0"                                       /* Forces helpView OFF */

        "\\T1c:This concludes the Genre Illustrating phase of the DQS."

        "\\TX1c:You have reached the end of the Dramatica Query System questions for Genre Storytelling.  From here you
may wish to continue the storytelling process in Plot, Theme or Character, or you may wish to continue in Genre by moving
into storyforming.\n\n"
        "We STRONGLY suggest you complete all four aspects of storyforming before storytelling.  Dramatica's \"magic\"
lies in the Story Engine that can generate many dramatic appreciations of your story once you have arrived at one unique
storyform. "
        "Until that moment, Dramatica can only provide limited feedback.\n\nKeep in mind that once you have arrived at a
single storyform, it is only the first step.  You will want to browse through Dramatica's reports and other output to see
if that "
        "storyform feels like the story you want to tell.  Perhaps parts of it do and parts of it don't.  That is the
time to go back and rework your storyform, keeping what you are sure of and experimenting with different combinations of
the rest.\n\nBounce "
        "back and forth between storyforming and examining the output.  Eventually you'll hone in on the one storyform
that wholly expresses the emotional and rational points you wish to make.  Once at this point, THAT is the time to start
storyTELLING.\n\nStill, "
        "if you already have a lot of ideas you'd just like to get down somewhere so you have them documented, go to
storytelling and jot them down.  Once you finish the storyforming process, you can compare your illustrations with
Dramatica's output and have a much "
        "better feel for which ideas work together and which don't really belong in the same story."

        "\\"
);


/********************************  Plot Specific Questions  ****************************************/
```

```
resource 'DQS2' (kDQSP1Intro, PFM_MIN_PRIO) {
        "\\TYs:75"
        "\\QTc:Approaching your story from Plot"
    "\\TQs:0"                                    /* topic of Question */
        "\\TPs:1"                                        /* textwrap procID */
        "\\HLs:0"                                        /* Forces helpView OFF */

        "\\Tlc:"

        "\\TXlc:Dramatica will now present a number of questions pertinent to Storyforming Plot.\n\nTo advance to the next question, simply hit return or "
        "single click on any question in the scrolling list to jump out of order.  Answer as many as you can.  Then shift to another area (Genre, Theme, Character) or "
        "progress to the Storytelling Stage of Plot as you continue to craft your story."

        "\\"
};

resource 'DQS2' (kDQSP2Intro, PFM_MIN_PRIO) {
        "\\TYs:75"
        "\\QTc:Illustrating the Plot"
    "\\TQs:0"                                    /* topic of Question */
        "\\TPs:1"                                        /* textwrap procID */
        "\\HLs:0"                                        /* Forces helpView OFF */

        "\\Tlc:"

        "\\TXlc:In Storyforming, Dramatica achieves its accuracy in story construction by separating dramatic forces so they can be created with precision.  However, when telling a story, "
        "these forces must be blended together to create the fluid progression of the overall plot.\n\n"\
        "As a result of your storyform choices, most all of the characters in your story will be concerned with \"(SNF(STCon))\".  In addition, your Main Character is also personally concerned with \"(SNF(MCCon))\".  "
        "Standing in (PPN(MC,P1)) way, and forcing (PPN(MC,IR)) to grow is the Obstacle Character, who is personally concerned with \"(SNF(OCCon))\".  As a result, the Main and Obstacle characters come into conflict over a "
        "shared concern with \"(SNF(PLCon))\".  As you illustrate these points, think about how they all might come together in a unified plot."

        "\\"
};


resource 'DQS2' (kDQSP1OSAct1, PFM_MIN_PRIO) {
        "\\APs:" $$Format("%d,", rApprSTType1)
        "\\CQs:" $$Format("%d,", kDQSP1OSAct1)
        "\\HPs:" $$Format("%d,", rDQSHPStructualFinders)
        "\\TYs:100"
        "\\QTc:Objective Story Act 1"
    "\\TQs:2"

        "\\Tlc:Which best describes the type of activities in Act 1?"

        "\\"
};
resource 'DQS2' (kDQSP1OSAct2, PFM_MIN_PRIO) {
        "\\APs:" $$Format("%d,", rApprSTType2)
        "\\CQs:" $$Format("%d,", kDQSP1OSAct2)
        "\\HPs:" $$Format("%d,", rDQSHPStructualFinders)
        "\\TYs:100"
        "\\QTc:Objective Story Act 2"
    "\\TQs:2"

        "\\Tlc:Which best describes the type of activities in Act 2?"

        "\\"
};
resource 'DQS2' (kDQSP1OSAct3, PFM_MIN_PRIO) {
        "\\APs:" $$Format("%d,", rApprSTType3)
        "\\CQs:" $$Format("%d,", kDQSP1OSAct3)
        "\\HPs:" $$Format("%d,", rDQSHPStructualFinders)
        "\\TYs:100"
        "\\QTc:Objective Story Act 3"
    "\\TQs:2"

        "\\Tlc:Which best describes the type of activities in Act 3?"

        "\\"
};
resource 'DQS2' (kDQSP1OSAct4, PFM_MIN_PRIO) {
        "\\APs:" $$Format("%d,", rApprSTType4)
        "\\CQs:" $$Format("%d,", kDQSP1OSAct4)
        "\\HPs:" $$Format("%d,", rDQSHPStructualFinders)
        "\\TYs:100"
        "\\QTc:Objective Story Act 4"
    "\\TQs:2"

        "\\Tlc:Which best describes the type of activities in Act 4?"

        "\\"
};

resource 'DQS2' (kDQSP1SSAct1, PFM_MIN_PRIO) {
        "\\APs:" $$Format("%d,", rApprPLType1)
        "\\CQs:" $$Format("%d,", kDQSP1SSAct1)
        "\\HPs:" $$Format("%d,", rDQSHPStructualFinders)
        "\\TYs:100"
        "\\QTc:Subjective Story Act 1"
    "\\TQs:2"

        "\\Tlc:Which best describes the concerns between (CNN(MC,NM)) and (CNN(OC,NM)) in Act 1?"

        "\\"
};
resource 'DQS2' (kDQSP1SSAct2, PFM_MIN_PRIO) {
        "\\APs:" $$Format("%d,", rApprPLType2)
        "\\CQs:" $$Format("%d,", kDQSP1SSAct2)
        "\\HPs:" $$Format("%d,", rDQSHPStructualFinders)
        "\\TYs:100"
        "\\QTc:Subjective Story Act 2"
    "\\TQs:2"
```

```
        "\\T1c:Which best describes the concerns between {CNN(MC,NM)} and {CNN(OC,NM)} in Act 2?"

        "\\"
};
resource 'DQS2' (kDQSP1SSAct3, PFM_MIN_PRIO) {
        "\\APs:" $$Format("%d,", rApprPLType3)
        "\\CQs:" $$Format("%d,", kDQSP1SSAct3)
        "\\HPs:" $$Format("%d,", rDQSHPStructualFinders)
        "\\TYs:100"
        "\\QTc:Subjective Story Act 3"
    "\\TQs:2"

        "\\T1c:Which best describes the concerns between {CNN(MC,NM)} and {CNN(OC,NM)} in Act 3?"

        "\\"
};
resource 'DQS2' (kDQSP1SSAct4, PFM_MIN_PRIO) {
        "\\APs:" $$Format("%d,", rApprPLType4)
        "\\CQs:" $$Format("%d,", kDQSP1OSAct4)
        "\\HPs:" $$Format("%d,", rDQSHPStructualFinders)
        "\\TYs:100"
        "\\QTc:Subjective Story Act 4"
    "\\TQs:2"

        "\\T1c:Which best describes the concerns between {CNN(MC,NM)} and {CNN(OC,NM)} in Act 4?"

        "\\"
};


resource 'DQS2' (kDQSP1AdvTI, PFM_MIN_PRIO) {
        "\\TYs:75"
        "\\QTc:Advanced Plot Topics"
    "\\TQs:0"                                       /* topic of Question */
        "\\TPs:1"                                           /* textwrap procID */
        "\\HLs:0"                                           /* Forces helpView OFF */

        "\\T1c:"

        "\\TX1c:The following questions pertain to dramatic forces that serve as checks and balances to plot
progression.  Effectively, if the plot is a horse, "
        "these questions handle the reigns.  Some move things faster, some slow things down, others act as position
indicators to give the audience a sense of where they are and how fast they are going."

        "\\"
};

resource 'DQS2' (kDQSP1Next, PFM_MIN_PRIO) {
        "\\TYs:75"
        "\\QTc:What Next?"
    "\\TQs:0"                                       /* topic of Question */
        "\\TPs:1"                                           /* textwrap procID */
        "\\HLs:0"                                           /* Forces helpView OFF */

        "\\T1c:This concludes the Plot Storyforming phase of the DQS."

        "\\TX1c:You have reached the end of the Dramatica Query System questions for Plot Storyforming.  From here you
may wish to continue the storyforming process in Genre, "
        "Theme or Character, or you may wish to continue in Plot by moving into storytelling.\n\nWe STRONGLY suggest you
complete all four aspects of storyforming first.  "
        "Dramatica's \"magic\" lies in the Story Engine that can generate many dramatic appreciations of your story once
you have arrived at one unique storyform.  Until that moment, "
        "Dramatica can only provide limited feedback.\n\nKeep in mind that once you have arrived at a single storyform,
it is only the first step.  You will want to browse through Dramatica's "
        "reports and other output to see if that storyform feels like the story you want to tell.  Perhaps parts of it
do and parts of it don't.  That is the time to go back and rework your storyform, "
        "keeping what you are sure of and experimenting with different combinations of the rest.\n\nBounce back and
forth between storyforming and examining the output.  "
        "Eventually you'll hone in on the one storyform that wholly expresses the emotional and rational points you wish
to make.  Once at this point, THAT is the time to start "
        "storyTELLING.\n\nStill, if you already have a lot of ideas you'd just like to get down somewhere so you have
them documented, go to storytelling and jot them down.  "
        "Once you finish the storyforming process, you can compare your illustrations with Dramatica's output and have a
much better feel for which ideas work together and which don't really belong in the same story."

        "\\"
};

resource 'DQS2' (kDQSP2Intro, PFM_MIN_PRIO) {
        "\\TYs:75"
        "\\QTc:Plot Stage 2:  Storytelling"
    "\\TQs:0"                                       /* topic of Question */
        "\\TPs:1"                                           /* textwrap procID */
        "\\HLs:0"                                           /* Forces helpView OFF */

        "\\T1c:"

        "\\TX1c:In the questions that follow you will be able to personalize your story's raw dramatics by creating
specific scenarios and events to illustrate the essential topics and forces that work to express your "
        "Plot choices.\n\nFor each of these questions, think about the sequence of events in your story - how can you
best depict the meaning created by the manner in which your plot unfolds.\n\nIf you have not yet "
        "completed a storyform, you may find yourself simply filling in blanks.  This is why we strongly suggest you
first complete the Storyforming phase: so additional information will appear in these questions that "
        "can offer guidelines and signposts to keep your story on course."

        "\\"
};

resource 'DQS2' (kDQSP2OSAct1, PFM_MIN_PRIO) {
        "\\APs:" $$Format("%d,", rApprSTType1)
        "\\CQs:" $$Format("%d,", kDQSP1OSAct1)
        "\\HPs:" $$Format("%d,", rDQSHPFillBlank)
        "\\TYs:2"
        "\\QTc:Illustrate Act 1 in the Objective Story"
    "\\TQs:3"

        "\\T1c:Illustrate how most everyone is concerned with \"{SNF(STType1)}\" in Act 1:"
        "\\ALT1c:Illustrate what most everyone is concerned about in Act 1:"
        "\\ENs:1"
        "\\EV1c:STType1"
```

```
        "\\ESls:2"
        "\\EMls:6"

        "\\"
};
resource 'DQS2' (kDQSP2OSAct2, PFM_MIN_PRIO) {
        "\\APs:" $$Format("%d,", rApprSTType2)
        "\\CQs:" $$Format("%d,", kDQSP1OSAct2)
        "\\HPs:" $$Format("%d,", rDQSHPFillBlank)
        "\\TYs:2"
        "\\QTc:Illustrate Act 2 in the Objective Story"
    "\\TQs:3"

        "\\T1c:Illustrate how most everyone is concerned with \"(SNF(STType2))\" in Act 2:"
        "\\ALT1c:Illustrate what most everyone is concerned about in Act 2:"
        "\\ENs:1"
        "\\EV1c:STType2"
        "\\ESls:2"
        "\\EMls:6"

        "\\"
};
resource 'DQS2' (kDQSP2OSAct3, PFM_MIN_PRIO) {
        "\\APs:" $$Format("%d,", rApprSTType3)
        "\\CQs:" $$Format("%d,", kDQSP1OSAct3)
        "\\HPs:" $$Format("%d,", rDQSHPFillBlank)
        "\\TYs:2"
        "\\QTc:Illustrate Act 3 in the Objective Story"
    "\\TQs:3"

        "\\T1c:Illustrate how most everyone is concerned with \"(SNF(STType3))\" in Act 3:"
        "\\ALT1c:Illustrate what most everyone is concerned about in Act 3:"
        "\\ENs:1"
        "\\EV1c:STType3"
        "\\ESls:2"
        "\\EMls:6"

        "\\"
};
resource 'DQS2' (kDQSP2OSAct4, PFM_MIN_PRIO) {
        "\\APs:" $$Format("%d,", rApprSTType4)
        "\\CQs:" $$Format("%d,", kDQSP1OSAct4)
        "\\HPs:" $$Format("%d,", rDQSHPFillBlank)
        "\\TYs:2"
        "\\QTc:Illustrate Act 4 in the Objective Story"
    "\\TQs:3"

        "\\T1c:Illustrate how most everyone is concerned with \"(SNF(STType4))\" in Act 4:"
        "\\ALT1c:Illustrate what most everyone is concerned about in Act 4:"
        "\\ENs:1"
        "\\EV1c:STType4"
        "\\ESls:2"
        "\\EMls:6"

        "\\"
};
resource 'DQS2' (kDQSP2SSAct1, PFM_MIN_PRIO) {
        "\\APs:" $$Format("%d,", rApprPLType1)
        "\\CQs:" $$Format("%d,", kDQSP1SSAct1)
        "\\HPs:" $$Format("%d,", rDQSHPFillBlank)
        "\\TYs:2"
        "\\QTc:Illustrate Act 1 in the Subjective Story"
    "\\TQs:3"

        "\\T1c:Illustrate how (CNN(MC,NM)) and (CNN(OC,NM)) come into conflict over \"(SNF(PLType1))\" in Act 1:"
        "\\ALT1c:Illustrate how (CNN(MC,NM)) and (CNN(OC,NM)) come into conflict in Act 1:"
        "\\ENs:1"
        "\\EV1c:PLType1"
        "\\ESls:2"
        "\\EMls:6"

        "\\"
};
resource 'DQS2' (kDQSP2SSAct2, PFM_MIN_PRIO) {
        "\\APs:" $$Format("%d,", rApprPLType2)
        "\\CQs:" $$Format("%d,", kDQSP1SSAct2)
        "\\HPs:" $$Format("%d,", rDQSHPFillBlank)
        "\\TYs:2"
        "\\QTc:Illustrate Act 2 in the Subjective Story"
    "\\TQs:3"

        "\\T1c:Illustrate how (CNN(MC,NM)) and (CNN(OC,NM)) come into conflict over \"(SNF(PLType2))\" in Act 2:"
        "\\ALT1c:Illustrate how (CNN(MC,NM)) and (CNN(OC,NM)) come into conflict in Act 2:"
        "\\ENs:1"
        "\\EV1c:PLType2"
        "\\ESls:2"
        "\\EMls:6"

        "\\"
};
resource 'DQS2' (kDQSP2SSAct3, PFM_MIN_PRIO) {
        "\\APs:" $$Format("%d,", rApprPLType3)
        "\\CQs:" $$Format("%d,", kDQSP1SSAct3)
        "\\HPs:" $$Format("%d,", rDQSHPFillBlank)
        "\\TYs:2"
        "\\QTc:Illustrate Act 3 in the Subjective Story"
    "\\TQs:3"

        "\\T1c:Illustrate how (CNN(MC,NM)) and (CNN(OC,NM)) come into conflict over \"(SNF(PLType3))\" in Act 3:"
        "\\ALT1c:Illustrate how (CNN(MC,NM)) and (CNN(OC,NM)) come into conflict in Act 3:"
        "\\ENs:1"
        "\\EV1c:PLType3"
        "\\ESls:2"
        "\\EMls:6"

        "\\"
};
resource 'DQS2' (kDQSP2SSAct4, PFM_MIN_PRIO) {
        "\\APs:" $$Format("%d,", rApprPLType4)
        "\\CQs:" $$Format("%d,", kDQSP1SSAct4)
        "\\HPs:" $$Format("%d,", rDQSHPFillBlank)
        "\\TYs:2"
        "\\QTc:Illustrate Act 4 in the Subjective Story"
```

```
    "\\TQs:3"

         "\\T1c:Illustrate how {CNN(MC,NM)} and {CNN(OC,NM)} come into conflict over \"{SNF(PLType4)}\" in Act 4:"
         "\\ALT1c:Illustrate how {CNN(MC,NM)} and {CNN(OC,NM)} come into conflict in Act 4:"
         "\\ENs:1"
         "\\EV1c:PLType4"
         "\\ES1s:2"
         "\\EM1s:6"

         "\\"
};


resource 'DQS2' (kDQSP2MCAct1, PFM_MIN_PRIO) {
         "\\APs:" $$Format("%d,", rApprMCType1)
         "\\HPs:" $$Format("%d,", rDQSHPFillBlank)
         "\\TYs:2"
         "\\QTc:Illustrate {CNN(MC,NM)} in Act 1"
    "\\TQs:3"

         "\\T1c:Illustrate how {CNN(MC,NM)} is concerned with \"{SNF(MCType1)}\" in Act 1:"
         "\\ALT1c:Illustrate what {CNN(MC,NM)} is concerned about in Act 1:"
         "\\ENs:1"
         "\\EV1c:MCType1"
         "\\ES1s:2"
         "\\EM1s:6"

         "\\"
};
resource 'DQS2' (kDQSP2MCAct2, PFM_MIN_PRIO) {
         "\\APs:" $$Format("%d,", rApprMCType2)
         "\\HPs:" $$Format("%d,", rDQSHPFillBlank)
         "\\TYs:2"
         "\\QTc:Illustrate {CNN(MC,NM)} in Act 2"
    "\\TQs:3"

         "\\T1c:Illustrate how {CNN(MC,NM)} is concerned with \"{SNF(MCType2)}\" in Act 2:"
         "\\ALT1c:Illustrate what {CNN(MC,NM)} is concerned about in Act 2:"
         "\\ENs:1"
         "\\EV1c:MCType2"
         "\\ES1s:2"
         "\\EM1s:6"

         "\\"
};
resource 'DQS2' (kDQSP2MCAct3, PFM_MIN_PRIO) {
         "\\APs:" $$Format("%d,", rApprMCType3)
         "\\HPs:" $$Format("%d,", rDQSHPFillBlank)
         "\\TYs:2"
         "\\QTc:Illustrate {CNN(MC,NM)} in Act 3"
    "\\TQs:3"

         "\\T1c:Illustrate how {CNN(MC,NM)} is concerned with \"{SNF(MCType3)}\" in Act 3:"
         "\\ALT1c:Illustrate what {CNN(MC,NM)} is concerned about in Act 3:"
         "\\ENs:1"
         "\\EV1c:MCType3"
         "\\ES1s:2"
         "\\EM1s:6"

         "\\"
};
resource 'DQS2' (kDQSP2MCAct4, PFM_MIN_PRIO) {
         "\\APs:" $$Format("%d,", rApprMCType4)
         "\\HPs:" $$Format("%d,", rDQSHPFillBlank)
         "\\TYs:2"
         "\\QTc:Illustrate {CNN(MC,NM)} in Act 4"
    "\\TQs:3"

         "\\T1c:Illustrate how {CNN(MC,NM)} is concerned with \"{SNF(MCType4)}\" in Act 4:"
         "\\ALT1c:Illustrate what {CNN(MC,NM)} is concerned about in Act 4:"
         "\\ENs:1"
         "\\EV1c:MCType4"
         "\\ES1s:2"
         "\\EM1s:6"

         "\\"
};


resource 'DQS2' (kDQSP2OCAct1, PFM_MIN_PRIO) {
         "\\APs:" $$Format("%d,", rApprOCType1)
         "\\HPs:" $$Format("%d,", rDQSHPFillBlank)
         "\\TYs:2"
         "\\QTc:Illustrate {CNN(OC,NM)} in Act 1"
    "\\TQs:3"

         "\\T1c:Illustrate how {CNN(OC,NM)} is concerned with \"{SNF(OCType1)}\" in Act 1:"
         "\\ALT1c:Illustrate what {CNN(OC,NM)} is concerned about in Act 1:"
         "\\ENs:1"
         "\\EV1c:OCType1"
         "\\ES1s:2"
         "\\EM1s:6"

         "\\"
};
resource 'DQS2' (kDQSP2OCAct2, PFM_MIN_PRIO) {
         "\\APs:" $$Format("%d,", rApprOCType2)
         "\\HPs:" $$Format("%d,", rDQSHPFillBlank)
         "\\TYs:2"
         "\\QTc:Illustrate {CNN(OC,NM)} in Act 2"
    "\\TQs:3"

         "\\T1c:Illustrate how {CNN(OC,NM)} is concerned with \"{SNF(OCType2)}\" in Act 2:"
         "\\ALT1c:Illustrate what {CNN(OC,NM)} is concerned about in Act 2:"
         "\\ENs:1"
         "\\EV1c:OCType2"
         "\\ES1s:2"
         "\\EM1s:6"

         "\\"
};
resource 'DQS2' (kDQSP2OCAct3, PFM_MIN_PRIO) {
```

```
        "\\APs:" $$Format("%d,", rApprOCType3)
        "\\HPs:" $$Format("%d,", rDQSHPFillBlank)
        "\\TYs:2"
        "\\QTc:Illustrate {CNN(OC,NM)} in Act 3"
    "\\TQs:3"

        "\\Tlc:Illustrate how {CNN(OC,NM)} is concerned with \"{SNF(OCType3)}\" in Act 3:"
        "\\ALTlc:Illustrate what {CNN(OC,NM)} is concerned about in Act 3:"
        "\\ENs:1"
        "\\EVlc:OCType3"
        "\\ESls:2"
        "\\EMls:6"

        "\\"
};
resource 'DQS2' (kDQSP2OCAct4, PFM_MIN_PRIO) {
        "\\APs:" $$Format("%d,", rApprOCType4)
        "\\HPs:" $$Format("%d,", rDQSHPFillBlank)
        "\\TYs:2"
        "\\QTc:Illustrate {CNN(OC,NM)} in Act 4"
    "\\TQs:3"

        "\\Tlc:Illustrate how {CNN(OC,NM)} is concerned with \"{SNF(OCType4)}\" in Act 4:"
        "\\ALTlc:Illustrate what {CNN(OC,NM)} is concerned about in Act 4:"
        "\\ENs:1"
        "\\EVlc:OCType4"
        "\\ESls:2"
        "\\EMls:6"

        "\\"
};



resource 'DQS2' (kDQSP2Intro2, PFM_MIN_PRIO) {
        "\\TYs:75"
        "\\QTc:More Plot Storytelling Topics"
    "\\TQs:0"                                       /* topic of Question */
        "\\TPs:1"                                           /* textwrap procID */
        "\\HLs:0"                                           /* Forces helpView OFF */

        "\\Tlc:"

        "\\TXlc:The previous Plot questions dealt with the forces that work to drive your story forward.  In the
questions that follow, the focus changes to the phases "
        "events will go through as the nature of activities change over the course of your story.\n\nThe first five
questions examine the purposes to which your story's "
        "characters aspire, the next eight pertain to paths taken to arrive at that those purposes."

        "\\"
};

resource 'DQS2' (kDQSP2Blend, PFM_MIN_PRIO) {
//      "\\APs:" $$Format("%d,", rApprPLGoal)
//      "\\CQs:" $$Format("%d,", kDQSPLGoal)
        "\\HPs:" $$Format("%d,", rDQSHPFillBlank)
        "\\TYs:2"
        "\\QTc:Blending your goals"
    "\\TQs:4"

        "\\Tlc:In the space below, show how all the concerns pertain to the same overall plot:"
        "\\ENs:1"
        "\\EVlc:ALLGoal"
        "\\ESls:2"
        "\\EMls:6"

        "\\"
};

resource 'DQS2' (kDQSP2Next, PFM_MIN_PRIO) {
        "\\TYs:75"
        "\\QTc:What Next?"
    "\\TQs:0"                                       /* topic of Question */
        "\\TPs:1"                                           /* textwrap procID */
        "\\HLs:0"                                           /* Forces helpView OFF */

        "\\Tlc:This concludes the Plot Illustrating phase of the DQS."

        "\\TXlc:You have reached the end of the Dramatica Query System questions for Plot Storytelling.  From here you
may wish to continue the "
        "storytelling process in Genre, Theme or Character, or you may wish to continue in Plot by moving into
storyforming.\n\nWe STRONGLY suggest you complete all four aspects of storyforming before storytelling.  "
        "Dramatica's \"magic\" lies in the Story Engine that can generate many dramatic appreciations of your story once
you have arrived at one unique storyform.  Until that moment, Dramatica can only provide "
        "limited feedback.\n\nKeep in mind that once you have arrived at a single storyform, it is only the first step.
You will want to browse through Dramatica's reports and other output to see if that storyform "
        "feels like the story you want to tell.  Perhaps parts of it do and parts of it don't.  That is the time to go
back and rework your storyform, keeping what you are sure of and experimenting with different "
        "combinations of the rest.\n\nBounce back and forth between storyforming and examining the output.  Eventually
you'll hone in on the one storyform that wholly expresses the emotional and rational points you "
        "wish to make.  Once at this point, THAT is the time to start storyTELLING.\n\nStill, if you already have a lot
of ideas you'd just like to get down somewhere so you have them documented, go to storytelling "
        "and jot them down.  Once you finish the storyforming process, you can compare your illustrations with
Dramatica's output and have a much better feel for which ideas work together and which don't really "
        "belong in the same story."

        "\\"
};



/******************************  Theme Specific Questions  ****************************************/

resource 'DQS2' (kDQST1Intro, PFM_MIN_PRIO) {
        "\\TYs:75"
        "\\QTc:Theme Stage 1:  Storforming"
    "\\TQs:0"                                       /* topic of Question */
        "\\TPs:1"                                           /* textwrap procID */
        "\\HLs:0"                                           /* Forces helpView OFF */
```

```
        "\\T1c:"

        "\\TX1c:Dramatica will now present a number of questions pertinent to Storyforming Theme.\n\nTo advance to the
next question, simply hit return or single click on any question in the "
        "scrolling list to jump out of order.  Answer as many as you can.  Then shift to another area (Genre, Plot,
Character) or progress to the Storytelling Stage of Theme as you continue to craft your story."

        "\\"
);

resource 'DQS2' (kDQST1Intro2, PFM_MIN_PRIO) {
        "\\TYs:75"
        "\\QTc:More Theme Storforming Topics"
    "\\TQs:0"                                           /* topic of Question */
        "\\TPs:1"                                               /* textwrap procID */
        "\\HLs:0"                                               /* Forces helpView OFF */

        "\\T1c:"

        "\\TX1c:In addition to the previous question which dealt primarily with thematic conflict, "
        "the following questions examine some of the principal impacts upon theme created by aspects of Character and
Plot."

        "\\"
);

resource 'DQS2' (kDQST1Next, PFM_MIN_PRIO) {
        "\\TYs:75"
        "\\QTc:What Next?"
    "\\TQs:0"                                           /* topic of Question */
        "\\TPs:1"                                               /* textwrap procID */
        "\\HLs:0"                                               /* Forces helpView OFF */

        "\\T1c:This concludes the Theme Storyforming phase of the DQS."

        "\\TX1c:You have reached the end of the Dramatica Query System questions for Theme Storyforming.  From here you
may wish to continue the storyforming process "
        "in Genre, Plot or Character, or you may wish to continue in Theme by moving into storytelling.\n\nWe STRONGLY
suggest you complete all four aspects of storyforming first. "
        "Dramatica's \"magic\" lies in the Story Engine that can generate many dramatic appreciations of your story once
you have arrived at one unique storyform.  Until that moment, "
        "Dramatica can only provide limited feedback.\n\nKeep in mind that once you have arrived at a single storyform,
it is only the first step.  You will want to browse through "
        "Dramatica's reports and other output to see if that storyform feels like the story you want to tell.  Perhaps
parts of it do and parts of it don't.  That is the time to "
        "go back and rework your storyform, keeping what you are sure of and experimenting with different combinations
of the rest.\n\nBounce back and forth between storyforming and "
        "examining the output.  Eventually you'll hone in on the one storyform that wholly expresses the emotional and
rational points you wish to make.  Once at this point, THAT is the "
        "time to start storyTELLING.\n\nStill, if you already have a lot of ideas you'd just like to get down somewhere
so you have them documented, go to storytelling and jot them down.  "
        "Once you finish the storyforming process, you can compare your illustrations with Dramatica's output and have a
much better feel for which ideas work together and which "
        "don't really belong in the same story."

        "\\"
);

resource 'DQS2' (kDQST2Intro, PFM_MIN_PRIO) {
        "\\TYs:75"
        "\\QTc:Theme Stage 2:  Storytelling"
    "\\TQs:0"                                           /* topic of Question */
        "\\TPs:1"                                               /* textwrap procID */
        "\\HLs:0"                                               /* Forces helpView OFF */

        "\\T1c:"

        "\\TX1c:In the questions that follow you will be able to personalize your story's raw dramatics by creating
specific scenarios and events to illustrate the essential topics and forces that work to express your "
        "Thematic choices.\n\nFor each of these questions, think about your story's message - how can you best depict
the value judgments you wish to convey in your story's Theme.\n\nIf you have not yet "
        "completed a storyform, you may find yourself simply filling in blanks.  This is why we strongly suggest you
first complete the Storyforming phase: so additional information will appear in these "
        "questions that can offer guidelines and signposts to keep your story on course."

        "\\"
);

resource 'DQS2' (kDQST2Next, PFM_MIN_PRIO) {
        "\\TYs:75"
        "\\QTc:What Next?"
    "\\TQs:0"                                           /* topic of Question */
        "\\TPs:1"                                               /* textwrap procID */
        "\\HLs:0"                                               /* Forces helpView OFF */

        "\\T1c:This concludes the Theme Illustrating phase of the DQS."

        "\\TX1c:You have reached the end of the Dramatica Query System questions for Theme Storytelling.  From here you
may wish to continue the storytelling process in Genre, Plot or Character, or you "
        "may wish to continue in Theme by moving into storyforming.\n\nWe STRONGLY suggest you complete all four aspects
of storyforming before storytelling.  Dramatica's \"magic\" lies in the Story "
        "Engine that can generate many dramatic appreciations of your story once you have arrived at one unique
storyform.  Until that moment, Dramatica can only provide limited feedback.\n\nKeep in "
        "mind that once you have arrived at a single storyform, it is only the first step.  You will want to browse
through Dramatica's reports and other output to see if that storyform feels like "
        "the story you want to tell.  Perhaps parts of it do and parts of it don't.  That is the time to go back and
rework your storyform, keeping what you are sure of and experimenting with different "
        "combinations of the rest.\n\nBounce back and forth between storyforming and examining the output.  Eventually
you'll hone in on the one storyform that wholly expresses the emotional and rational "
        "points you wish to make.  Once at this point, THAT is the time to start storyTELLING.\n\nStill, if you already
have a lot of ideas you'd just like to get down somewhere so you have them documented, "
        "go to storytelling and jot them down.  Once you finish the storyforming process, you can compare your
illustrations with Dramatica's output and have a much better feel for which ideas work together "
        "and which don't really belong in the same story."

        "\\"
);


/******************************  Character Specific Questions  ****************************************/
```

```
resource 'DQS2' (kDQSC1Intro, PFM_MIN_PRIO) {
        "\\TYs:75"
        "\\QTc:Character Stage 1:  Storforming"
    "\\TQs:0"                                       /* topic of Question */
        "\\TPs:1"                                           /* textwrap procID */
        "\\HLs:0"                                           /* Forces helpView OFF */

        "\\Tlc:"

        "\\TXlc:Dramatica will now present a number of questions pertinent to Storyforming Character.\n\nTo advance to the next question, "
        "simply hit return or single click on any question in the scrolling list to jump out of order.  Answer as many as you can.  Then shift to "
        "another area (Genre, Theme, Plot) or progress to the Storytelling Stage of Character as you continue to craft your story."

        "\\"
};

resource 'DQS2' (kDQSC1AdvTI, PFM_MIN_PRIO) {
        "\\TYs:75"
        "\\QTc:Advanced Character Storforming Topics"
    "\\TQs:0"                                       /* topic of Question */
        "\\TPs:1"                                           /* textwrap procID */
        "\\HLs:0"                                           /* Forces helpView OFF */

        "\\Tlc:"

        "\\TXlc:Previous Character questions dealt with some of the essential forces that drive the Main Character.  In the questions that follow you will be able to fill out that picture by telling "
        "Dramatica more about subordinate forces that modulate your Main Character's drive and effectiveness, as well as information about the Obstacle Character who most influences the Main Character "
        "to change, and is therefore a catalyst to the Main Character's growth."

        "\\"
};

resource 'DQS2' (kDQSC1Next, PFM_MIN_PRIO) {
        "\\TYs:75"
        "\\QTc:What Next?"
    "\\TQs:0"                                       /* topic of Question */
        "\\TPs:1"                                           /* textwrap procID */
        "\\HLs:0"                                           /* Forces helpView OFF */

        "\\Tlc:This concludes the Character Storyforming phase of the DQS."

        "\\TXlc:You have reached the end of the Dramatica Query System questions for Character Storyforming.  From here you may wish to continue the storyforming process in Genre, "
        "Plot or Theme, or you may wish to continue in Character by moving into storytelling.\n\nWe STRONGLY suggest you complete all four aspects of storyforming first.  Dramatica's \"magic\" lies in the "
        "Story Engine that can generate many dramatic appreciations of your story once you have arrived at one unique storyform.  Until that moment, Dramatica can only provide limited feedback.\n\nKeep in "
        "mind that once you have arrived at a single storyform, it is only the first step.  You will want to browse through Dramatica's reports and other output to see if that storyform feels like the story you want to tell.  "
        "Perhaps parts of it do and parts of it don't.  That is the time to go back and rework your storyform, keeping what you are sure of and experimenting with different combinations of the rest.\n\nBounce back "
        "and forth between storyforming and examining the output.  Eventually you'll hone in on the one storyform that wholly expresses the emotional and rational points you wish to make.  Once at this point, "
        "THAT is the time to start storyTELLING.\n\nStill, if you already have a lot of ideas you'd just like to get down somewhere so you have them documented, go to storytelling and jot them down.  "
        "Once you finish the storyforming process, you can compare your illustrations with Dramatica's output and have a much better feel for which ideas work together and which don't really belong in the same story."

        "\\"
};

resource 'DQS2' (kDQSC2Intro, PFM_MIN_PRIO) {
        "\\TYs:75"
        "\\QTc:Character Stage 2:  Storytelling"
    "\\TQs:0"                                       /* topic of Question */
        "\\TPs:1"                                           /* textwrap procID */
        "\\HLs:0"                                           /* Forces helpView OFF */

        "\\Tlc:"

        "\\TXlc:In the questions that follow you will be able to personalize your story's raw dramatics by creating specific scenarios and events to illustrate the essential topics and forces that "
        "work to express your Character choices.\n\nFor each of these questions, think about your story's players - how can you best depict the internal and external characteristics each one represents.\n\n"
        "If you have not yet completed a storyform, you may find yourself simply filling in blanks.  This is why we strongly suggest you first complete the Storyforming phase: so additional information will "
        "appear in these questions that can offer guidelines and signposts to keep your story on course."

        "\\"
};

resource 'DQS2' (kDQSC2Next, PFM_MIN_PRIO) {
        "\\TYs:75"
        "\\QTc:What Next?"
    "\\TQs:0"                                       /* topic of Question */
        "\\TPs:1"                                           /* textwrap procID */
        "\\HLs:0"                                           /* Forces helpView OFF */

        "\\Tlc:This concludes the Character Illustrating phase of the DQS."

        "\\TXlc:You have reached the end of the Dramatica Query System questions for Character Storytelling.  From here you may wish to continue the storytelling process in Genre, Plot or Theme, or "
        "you may wish to continue in Character by moving into storyforming.\n\nWe STRONGLY suggest you complete all four aspects of storyforming before storytelling.  Dramatica's \"magic\" lies in "
        "the Story Engine that can generate many dramatic appreciations of your story once you have arrived at one unique storyform.  Until that moment, Dramatica can only provide limited feedback.\n\n"
        "Keep in mind that once you have arrived at a single storyform, it is only the first step.  You will want to browse through Dramatica's reports and other output to see if that storyform feels like "
        "the story you want to tell.  Perhaps parts of it do and parts of it don't.  That is the time to go back and rework your storyform, keeping what you are sure of and experimenting with different "
        "combinations of the rest.\n\nBounce back and forth between storyforming and examining the output.  Eventually you'll hone in on the one storyform that wholly expresses the emotional and rational "
        "points you wish to make.  Once at this point, THAT is the time to start storyTELLING.\n\nStill, if you already have a lot of ideas you'd just like to get down somewhere so you have them documented, "
        "go to storytelling and jot them down.  Once you finish the storyforming process, you can compare your illustrations with Dramatica's output and have a much better feel for which ideas work together "
        "and which don't really belong in the same story."
```

```
        "\\"
};


/* ------------------------------------------------------------------------
        'QLST' - Query List.
------------------------------------------------------------------------- */
type 'QLST' {
        cstring;                        /* the stream of parameterized text */
};


resource 'QLST' (kQLSTQuickStart, PFM_MIN_PRIO) {
        "\\NAc:Quick Story"
        "\\ORc:"
        $$Format("%d,",   kDQSQSIntroTI)
        $$Format("%d,",   kDQSTitle)

        $$Format("%d,",   kDQSMCName)
        $$Format("%d,",   kDQSMCGenderST)
        $$Format("%d,",   kDQSOCName)
        $$Format("%d,",   kDQSOCGenderST)

        $$Format("%d,",   kDQSQSCharDynTI)
        $$Format("%d,",   kDQSResolve)
        $$Format("%d,",   kDQSDirection)
        $$Format("%d,",   kDQSApproach)
        $$Format("%d,",   kDQSSex)

        $$Format("%d,",   kDQSQSPlotDynTI)
        $$Format("%d,",   kDQSWork)
        $$Format("%d,",   kDQSLimit)
        $$Format("%d,",   kDQSOutcome)
        $$Format("%d,",   kDQSJudgment)

        $$Format("%d,",   kDQSQSThemeElemTI)
        $$Format("%d,",   kDQSSTDomains)
        $$Format("%d,",   kDQSSTConcerns)
        $$Format("%d,",   kDQSSTRanges)
        $$Format("%d,",   kDQSSTProblem)
        $$Format("%d,",   kDQSMCProblem)
        $$Format("%d,",   kDQSMCFocus)
        $$Format("%d,",   kDQSQSRecapTI)

        $$Format("%d,",   kDQSQSStellingTI)
        $$Format("%d,",   kDQSQSCharDynSTTI)
        $$Format("%d,",   kDQSResolveST)
        $$Format("%d,",   kDQSDirectionST)
        $$Format("%d,",   kDQSApproachST)
        $$Format("%d,",   kDQSSexST)
        $$Format("%d,",   kDQSQSPlotDynSTTI)
        $$Format("%d,",   kDQSWorkST)
        $$Format("%d,",   kDQSLimitST)
        $$Format("%d,",   kDQSOutcomeST)
        $$Format("%d,",   kDQSJudgmentST)
        $$Format("%d,",   kDQSQSThemeElemSTTI)
        $$Format("%d,",   kDQSSTDomainsST)
        $$Format("%d,",   kDQSSTConcernsST)
        $$Format("%d,",   kDQSSTRangesST)
        $$Format("%d,",   kDQSSTProblemST)
        $$Format("%d,",   kDQSMCProblemST)
        $$Format("%d,",   kDQSMCFocusST)
        $$Format("%d,",   kDQSQSNextTI)
        "\\"
};

resource 'QLST' (kQLSTAllTelling, PFM_MIN_PRIO) {
        "\\NAc:Storytelling - Complete"
        "\\ORc:"
        $$Format("%d,",   kDQSSTIntroTI)
        $$Format("%d,",   kDQSTitle)
        $$Format("%d,",   kDQSAuthor)

        $$Format("%d,",   kDQSAnalysis)
        $$Format("%d,",   kDQSDraft)
        $$Format("%d,",   kDQSSource)
        $$Format("%d,",   kDQSPeriod)
        $$Format("%d,",   kDQSSetting)
        $$Format("%d,",   kDQSGenre)
        $$Format("%d,",   kDQSSynopsis)

        $$Format("%d,",   kDQSMCName)
        $$Format("%d,",   kDQSMCGenderST)
        $$Format("%d,",   kDQSMCDesc)
        $$Format("%d,",   kDQSSTCharDynTI)
        $$Format("%d,",   kDQSResolveST)
        $$Format("%d,",   kDQSDirectionST)
        $$Format("%d,",   kDQSApproachST)
        $$Format("%d,",   kDQSSexST)
        $$Format("%d,",   kDQSSTPlotDynTI)
        $$Format("%d,",   kDQSWorkST)
        $$Format("%d,",   kDQSLimitST)
        $$Format("%d,",   kDQSOutcomeST)
        $$Format("%d,",   kDQSJudgmentST)

        $$Format("%d,",   kDQSSTOSPerspecTI)
        $$Format("%d,",   kDQSSTDomainsST)
        $$Format("%d,",   kDQSSTConcernsST)
        $$Format("%d,",   kDQSSTRangesST)
        $$Format("%d,",   kDQSSTProblemST)
        $$Format("%d,",   kDQSSTSolutionST)
        $$Format("%d,",   kDQSSTFocusST)
        $$Format("%d,",   kDQSSTDirectionST)
        $$Format("%d,",   kDQSSTUnRngST)
        $$Format("%d,",   kDQSSTCrFlST)
        $$Format("%d,",   kDQSSTStipulationST)

        $$Format("%d,",   kDQSSTSSPerspecTI)
```

```
        $$Format("%d,",    kDQSPLDomainsST)
        $$Format("%d,",    kDQSPLConcernsST)
        $$Format("%d,",    kDQSPLRangesST)
        $$Format("%d,",    kDQSPLProblemST)
        $$Format("%d,",    kDQSPLSolutionST)
        $$Format("%d,",    kDQSPLFocusST)
        $$Format("%d,",    kDQSPLDirectionST)
        $$Format("%d,",    kDQSPLUnRngST)
        $$Format("%d,",    kDQSPLCrFlST)
        $$Format("%d,",    kDQSPLStipulationST)

        $$Format("%d,",    kDQSSTMCPerspecTI)
        $$Format("%d,",    kDQSMCDomainsST)
        $$Format("%d,",    kDQSMCConcernsST)
        $$Format("%d,",    kDQSMCRangesST)
        $$Format("%d,",    kDQSMCProblemST)
        $$Format("%d,",    kDQSMCSolutionST)
        $$Format("%d,",    kDQSMCFocusST)
        $$Format("%d,",    kDQSMCDirectionST)
        $$Format("%d,",    kDQSMCUnRngST)
        $$Format("%d,",    kDQSMCCrFlST)
        $$Format("%d,",    kDQSMCStipulationST)

        $$Format("%d,",    kDQSSTOCPerspecTI)
        $$Format("%d,",    kDQSOCName)
        $$Format("%d,",    kDQSOCGenderST)
        $$Format("%d,",    kDQSOCDesc)
        $$Format("%d,",    kDQSOCDomainsST)
        $$Format("%d,",    kDQSOCConcernsST)
        $$Format("%d,",    kDQSOCRangesST)
        $$Format("%d,",    kDQSOCProblemST)
        $$Format("%d,",    kDQSOCSolutionST)
        $$Format("%d,",    kDQSOCFocusST)
        $$Format("%d,",    kDQSOCDirectionST)
        $$Format("%d,",    kDQSOCUnRngST)
        $$Format("%d,",    kDQSOCCrFlST)
        $$Format("%d,",    kDQSOCStipulationST)

        $$Format("%d,",    kDQSSTOSAddApprecsTI)
        $$Format("%d,",    kDQSSTGoalST)
        $$Format("%d,",    kDQSPLGoalST)
        $$Format("%d,",    kDQSOCGoalST)
        $$Format("%d,",    kDQSMCGoalST)
        $$Format("%d,",    kDQSSTRequirementST)
        $$Format("%d,",    kDQSPLRequirementST)
        $$Format("%d,",    kDQSOCRequirementST)
        $$Format("%d,",    kDQSMCRequirementST)

//      $$Format("%d,",    kDQSSTRecapTI)
        $$Format("%d,",    kDQSSTNextTI)
        "\\"
};

resource 'QLST' (kQLSTObjStory, PFM_MIN_PRIO) {
        "\\NAc:Objective Story"
        "\\ORc:"
        $$Format("%d,",    kDQSOSIntroTI)
        $$Format("%d,",    kDQSOSPlotDynTI)
        $$Format("%d,",    kDQSWork)
        $$Format("%d,",    kDQSLimit)
        $$Format("%d,",    kDQSOutcome)
        $$Format("%d,",    kDQSJudgment)

        $$Format("%d,",    kDQSOSPerspecTI)
        $$Format("%d,",    kDQSSTDomains)
        $$Format("%d,",    kDQSSTConcerns)
        $$Format("%d,",    kDQSSTRanges)
        $$Format("%d,",    kDQSSTProblem)
        $$Format("%d,",    kDQSSTSolution)
        $$Format("%d,",    kDQSSTFocus)
        $$Format("%d,",    kDQSSTDirection)
        $$Format("%d,",    kDQSSTUnRng)
        $$Format("%d,",    kDQSSTCrFl)
        $$Format("%d,",    kDQSSTStipulation)

        $$Format("%d,",    kDQSOSAddApprecsTI)
        $$Format("%d,",    kDQSSTGoal)
        $$Format("%d,",    kDQSPLGoal)
        $$Format("%d,",    kDQSOCGoal)
        $$Format("%d,",    kDQSMCGoal)
        $$Format("%d,",    kDQSSTRequirement)
        $$Format("%d,",    kDQSPLRequirement)
        $$Format("%d,",    kDQSOCRequirement)
        $$Format("%d,",    kDQSMCRequirement)

        $$Format("%d,",    kDQSOSRecapTI)

        $$Format("%d,",    kDQSWorkST)
        $$Format("%d,",    kDQSLimitST)
        $$Format("%d,",    kDQSOutcomeST)
        $$Format("%d,",    kDQSJudgmentST)

        $$Format("%d,",    kDQSSTDomainsST)
        $$Format("%d,",    kDQSSTConcernsST)
        $$Format("%d,",    kDQSSTRangesST)
        $$Format("%d,",    kDQSSTProblemST)
        $$Format("%d,",    kDQSSTSolutionST)
        $$Format("%d,",    kDQSSTFocusST)
        $$Format("%d,",    kDQSSTDirectionST)
        $$Format("%d,",    kDQSSTUnRngST)
        $$Format("%d,",    kDQSSTCrFlST)
        $$Format("%d,",    kDQSSTStipulationST)

        $$Format("%d,",    kDQSSTGoalST)
        $$Format("%d,",    kDQSPLGoalST)
        $$Format("%d,",    kDQSOCGoalST)
        $$Format("%d,",    kDQSMCGoalST)
        $$Format("%d,",    kDQSSTRequirementST)
        $$Format("%d,",    kDQSPLRequirementST)
        $$Format("%d,",    kDQSOCRequirementST)
        $$Format("%d,",    kDQSMCRequirementST)

        $$Format("%d,",    kDQSOSNextTI)
```

```
        "\\"
);
resource 'QLST' (kQLSTSubStory, PFM_MIN_PRIO) {
        "\\NAc:Subjective Story"
        "\\ORc:"
        $$Format("%d,",    kDQSSSIntroTI)
        $$Format("%d,",    kDQSMCName)
        $$Format("%d,",    kDQSMCGenderST)
        $$Format("%d,",    kDQSOCName)
        $$Format("%d,",    kDQSOCGenderST)

        $$Format("%d,",    kDQSPLDomains)
        $$Format("%d,",    kDQSPLConcerns)
        $$Format("%d,",    kDQSPLRanges)
        $$Format("%d,",    kDQSPLProblem)
        $$Format("%d,",    kDQSPLSolution)
        $$Format("%d,",    kDQSPLFocus)
        $$Format("%d,",    kDQSPLDirection)
        $$Format("%d,",    kDQSPLUnRng)
        $$Format("%d,",    kDQSPLCrFl)
        $$Format("%d,",    kDQSPLStipulation)

        $$Format("%d,",    kDQSSSRecapTI)

        $$Format("%d,",    kDQSPLDomainsST)
        $$Format("%d,",    kDQSPLConcernsST)
        $$Format("%d,",    kDQSPLRangesST)
        $$Format("%d,",    kDQSPLProblemST)
        $$Format("%d,",    kDQSPLSolutionST)
        $$Format("%d,",    kDQSPLFocusST)
        $$Format("%d,",    kDQSPLDirectionST)
        $$Format("%d,",    kDQSPLUnRngST)
        $$Format("%d,",    kDQSPLCrFlST)
        $$Format("%d,",    kDQSPLStipulationST)

        $$Format("%d,",    kDQSSSNextTI)
        "\\"
);
resource 'QLST' (kQLSTMainChar, PFM_MIN_PRIO) {
        "\\NAc:Main Character"
        "\\ORc:"
        $$Format("%d,",    kDQSMCIntroTI)
        $$Format("%d,",    kDQSMCName)
        $$Format("%d,",    kDQSMCGenderST)
        $$Format("%d,",    kDQSMCDesc)
        $$Format("%d,",    kDQSMCCharDynTI)
        $$Format("%d,",    kDQSResolve)
        $$Format("%d,",    kDQSDirection)
        $$Format("%d,",    kDQSApproach)
        $$Format("%d,",    kDQSSex)

        $$Format("%d,",    kDQSMCPerspecTI)
        $$Format("%d,",    kDQSMCDomains)
        $$Format("%d,",    kDQSMCConcerns)
        $$Format("%d,",    kDQSMCRanges)
        $$Format("%d,",    kDQSMCProblem)
        $$Format("%d,",    kDQSMCSolution)
        $$Format("%d,",    kDQSMCFocus)
        $$Format("%d,",    kDQSMCDirection)
        $$Format("%d,",    kDQSMCUnRng)
        $$Format("%d,",    kDQSMCCrFl)
        $$Format("%d,",    kDQSMCStipulation)

        $$Format("%d,",    kDQSMCRecapTI)

        $$Format("%d,",    kDQSResolveST)
        $$Format("%d,",    kDQSDirectionST)
        $$Format("%d,",    kDQSApproachST)
        $$Format("%d,",    kDQSSexST)
        $$Format("%d,",    kDQSMCDomainsST)
        $$Format("%d,",    kDQSMCConcernsST)
        $$Format("%d,",    kDQSMCRangesST)
        $$Format("%d,",    kDQSMCProblemST)
        $$Format("%d,",    kDQSMCSolutionST)
        $$Format("%d,",    kDQSMCFocusST)
        $$Format("%d,",    kDQSMCDirectionST)
        $$Format("%d,",    kDQSMCUnRngST)
        $$Format("%d,",    kDQSMCCrFlST)
        $$Format("%d,",    kDQSMCStipulationST)

        $$Format("%d,",    kDQSMCNextTI)
        "\\"
);
resource 'QLST' (kQLSTObsChar, PFM_MIN_PRIO) {
        "\\NAc:Obstacle Character"
        "\\ORc:"
        $$Format("%d,",    kDQSOCIntroTI)
        $$Format("%d,",    kDQSOCName)
        $$Format("%d,",    kDQSOCGenderST)
        $$Format("%d,",    kDQSOCDesc)

        $$Format("%d,",    kDQSOCPerspecTI)
        $$Format("%d,",    kDQSOCDomains)
        $$Format("%d,",    kDQSOCConcerns)
        $$Format("%d,",    kDQSOCRanges)
        $$Format("%d,",    kDQSOCProblem)
        $$Format("%d,",    kDQSOCSolution)
        $$Format("%d,",    kDQSOCFocus)
        $$Format("%d,",    kDQSOCDirection)
        $$Format("%d,",    kDQSOCUnRng)
        $$Format("%d,",    kDQSOCCrFl)
        $$Format("%d,",    kDQSOCStipulation)

        $$Format("%d,",    kDQSOCRecapTI)

        $$Format("%d,",    kDQSOCDomainsST)
        $$Format("%d,",    kDQSOCConcernsST)
        $$Format("%d,",    kDQSOCRangesST)
        $$Format("%d,",    kDQSOCProblemST)
        $$Format("%d,",    kDQSOCSolutionST)
```

```
        $$Format("%d,",    kDQSOCFocusST)
        $$Format("%d,",    kDQSOCDirectionST)
        $$Format("%d,",    kDQSOCUnRngST)
        $$Format("%d,",    kDQSOCCrFlST)
        $$Format("%d,",    kDQSOCStipulationST)

        $$Format("%d,",    kDQSOCNextTI)
        "\\"
};

resource 'QLST' (kQLSTAllForming, PFM_MIN_PRIO) {
        "\\NAc:Storyforming • Complete"
        "\\ORc:"
        $$Format("%d,",    kDQSSFIntroTI)
        $$Format("%d,",    kDQSSFCharDynTI)
        $$Format("%d,",    kDQSResolve)
        $$Format("%d,",    kDQSDirection)
        $$Format("%d,",    kDQSApproach)
        $$Format("%d,",    kDQSSex)
        $$Format("%d,",    kDQSSFPlotDynTI)
        $$Format("%d,",    kDQSWork)
        $$Format("%d,",    kDQSLimit)
        $$Format("%d,",    kDQSOutcome)
        $$Format("%d,",    kDQSJudgment)

        $$Format("%d,",    kDQSSFOSPerspecTI)
        $$Format("%d,",    kDQSSTDomains)
        $$Format("%d,",    kDQSSTConcerns)
        $$Format("%d,",    kDQSSTRanges)
        $$Format("%d,",    kDQSSTProblem)
        $$Format("%d,",    kDQSSTSolution)
        $$Format("%d,",    kDQSSTFocus)
        $$Format("%d,",    kDQSSTDirection)
        $$Format("%d,",    kDQSSTUnRng)
        $$Format("%d,",    kDQSSTCrFl)
        $$Format("%d,",    kDQSSTStipulation)

        $$Format("%d,",    kDQSSFSSPerspecTI)
        $$Format("%d,",    kDQSPLDomains)
        $$Format("%d,",    kDQSPLConcerns)
        $$Format("%d,",    kDQSPLRanges)
        $$Format("%d,",    kDQSPLProblem)
        $$Format("%d,",    kDQSPLSolution)
        $$Format("%d,",    kDQSPLFocus)
        $$Format("%d,",    kDQSPLDirection)
        $$Format("%d,",    kDQSPLUnRng)
        $$Format("%d,",    kDQSPLCrFl)
        $$Format("%d,",    kDQSPLStipulation)

        $$Format("%d,",    kDQSSFMCPerspecTI)
        $$Format("%d,",    kDQSMCDomains)
        $$Format("%d,",    kDQSMCConcerns)
        $$Format("%d,",    kDQSMCRanges)
        $$Format("%d,",    kDQSMCProblem)
        $$Format("%d,",    kDQSMCSolution)
        $$Format("%d,",    kDQSMCFocus)
        $$Format("%d,",    kDQSMCDirection)
        $$Format("%d,",    kDQSMCUnRng)
        $$Format("%d,",    kDQSMCCrFl)
        $$Format("%d,",    kDQSMCStipulation)

        $$Format("%d,",    kDQSSFOCPerspecTI)
        $$Format("%d,",    kDQSOCDomains)
        $$Format("%d,",    kDQSOCConcerns)
        $$Format("%d,",    kDQSOCRanges)
        $$Format("%d,",    kDQSOCProblem)
        $$Format("%d,",    kDQSOCSolution)
        $$Format("%d,",    kDQSOCFocus)
        $$Format("%d,",    kDQSOCDirection)
        $$Format("%d,",    kDQSOCUnRng)
        $$Format("%d,",    kDQSOCCrFl)
        $$Format("%d,",    kDQSOCStipulation)

        $$Format("%d,",    kDQSSFOSAddApprecsTI)
        $$Format("%d,",    kDQSSTGoal)
        $$Format("%d,",    kDQSPLGoal)
        $$Format("%d,",    kDQSOCGoal)
        $$Format("%d,",    kDQSMCGoal)
        $$Format("%d,",    kDQSSTRequirement)
        $$Format("%d,",    kDQSPLRequirement)
        $$Format("%d,",    kDQSOCRequirement)
        $$Format("%d,",    kDQSMCRequirement)

        $$Format("%d,",    kDQSSFRecapTI)
        $$Format("%d,",    kDQSSFNextTI)
        "\\"
};


resource 'QLST' (kQLSTAllTopics, PFM_MIN_PRIO) {
        "\\NAc:All DQS Topics"
        "\\ORc:"
        $$Format("%d,",    kDQSAllIntroTI)
        $$Format("%d,",    kDQSTitle)
        $$Format("%d,",    kDQSAuthor)

        $$Format("%d,",    kDQSAnalysis)
        $$Format("%d,",    kDQSDraft)
        $$Format("%d,",    kDQSSource)
        $$Format("%d,",    kDQSPeriod)
        $$Format("%d,",    kDQSSetting)
        $$Format("%d,",    kDQSGenre)
        $$Format("%d,",    kDQSSynopsis)

        $$Format("%d,",    kDQSMCName)
        $$Format("%d,",    kDQSMCGenderST)
        $$Format("%d,",    kDQSMCDesc)
        $$Format("%d,",    kDQSAllCharDynTI)
        $$Format("%d,",    kDQSResolve)
        $$Format("%d,",    kDQSResolveST)
        $$Format("%d,",    kDQSDirection)
        $$Format("%d,",    kDQSDirectionST)
```

```
$$Format("%d,",    kDQSApproach)
$$Format("%d,",    kDQSApproachST)
$$Format("%d,",    kDQSSex)
$$Format("%d,",    kDQSSexST)
$$Format("%d,",    kDQSAllPlotDynTI)
$$Format("%d,",    kDQSWork)
$$Format("%d,",    kDQSWorkST)
$$Format("%d,",    kDQSLimit)
$$Format("%d,",    kDQSLimitST)
$$Format("%d,",    kDQSOutcome)
$$Format("%d,",    kDQSOutcomeST)
$$Format("%d,",    kDQSJudgment)
$$Format("%d,",    kDQSJudgmentST)

$$Format("%d,",    kDQSAllOSPerspecTI)
$$Format("%d,",    kDQSSTDomains)
$$Format("%d,",    kDQSSTDomainsST)
$$Format("%d,",    kDQSSTConcerns)
$$Format("%d,",    kDQSSTConcernsST)
$$Format("%d,",    kDQSSTRanges)
$$Format("%d,",    kDQSSTRangesST)
$$Format("%d,",    kDQSSTProblem)
$$Format("%d,",    kDQSSTProblemST)
$$Format("%d,",    kDQSSTSolution)
$$Format("%d,",    kDQSSTSolutionST)
$$Format("%d,",    kDQSSTFocus)
$$Format("%d,",    kDQSSTFocusST)
$$Format("%d,",    kDQSSTDirection)
$$Format("%d,",    kDQSSTDirectionST)
$$Format("%d,",    kDQSSTUnRng)
$$Format("%d,",    kDQSSTUnRngST)
$$Format("%d,",    kDQSSTCrFl)
$$Format("%d,",    kDQSSTCrFlST)
$$Format("%d,",    kDQSSTStipulation)
$$Format("%d,",    kDQSSTStipulationST)

$$Format("%d,",    kDQSAllSSPerspecTI)
$$Format("%d,",    kDQSPLDomains)
$$Format("%d,",    kDQSPLDomainsST)
$$Format("%d,",    kDQSPLConcerns)
$$Format("%d,",    kDQSPLConcernsST)
$$Format("%d,",    kDQSPLRanges)
$$Format("%d,",    kDQSPLRangesST)
$$Format("%d,",    kDQSPLProblem)
$$Format("%d,",    kDQSPLProblemST)
$$Format("%d,",    kDQSPLSolution)
$$Format("%d,",    kDQSPLSolutionST)
$$Format("%d,",    kDQSPLFocus)
$$Format("%d,",    kDQSPLFocusST)
$$Format("%d,",    kDQSPLDirection)
$$Format("%d,",    kDQSPLDirectionST)
$$Format("%d,",    kDQSPLUnRng)
$$Format("%d,",    kDQSPLUnRngST)
$$Format("%d,",    kDQSPLCrFl)
$$Format("%d,",    kDQSPLCrFlST)
$$Format("%d,",    kDQSPLStipulation)
$$Format("%d,",    kDQSPLStipulationST)

$$Format("%d,",    kDQSAllMCPerspecTI)
$$Format("%d,",    kDQSMCDomains)
$$Format("%d,",    kDQSMCDomainsST)
$$Format("%d,",    kDQSMCConcerns)
$$Format("%d,",    kDQSMCConcernsST)
$$Format("%d,",    kDQSMCRanges)
$$Format("%d,",    kDQSMCRangesST)
$$Format("%d,",    kDQSMCProblem)
$$Format("%d,",    kDQSMCProblemST)
$$Format("%d,",    kDQSMCSolution)
$$Format("%d,",    kDQSMCSolutionST)
$$Format("%d,",    kDQSMCFocus)
$$Format("%d,",    kDQSMCFocusST)
$$Format("%d,",    kDQSMCDirection)
$$Format("%d,",    kDQSMCDirectionST)
$$Format("%d,",    kDQSMCUnRng)
$$Format("%d,",    kDQSMCUnRngST)
$$Format("%d,",    kDQSMCCrFl)
$$Format("%d,",    kDQSMCCrFlST)
$$Format("%d,",    kDQSMCStipulation)
$$Format("%d,",    kDQSMCStipulationST)

$$Format("%d,",    kDQSAllOCIntroTI)
$$Format("%d,",    kDQSOCName)
$$Format("%d,",    kDQSOCGenderST)
$$Format("%d,",    kDQSOCDesc)

$$Format("%d,",    kDQSAllOCPerspecTI)
$$Format("%d,",    kDQSOCDomains)
$$Format("%d,",    kDQSOCDomainsST)
$$Format("%d,",    kDQSOCConcerns)
$$Format("%d,",    kDQSOCConcernsST)
$$Format("%d,",    kDQSOCRanges)
$$Format("%d,",    kDQSOCRangesST)
$$Format("%d,",    kDQSOCProblem)
$$Format("%d,",    kDQSOCProblemST)
$$Format("%d,",    kDQSOCSolution)
$$Format("%d,",    kDQSOCSolutionST)
$$Format("%d,",    kDQSOCFocus)
$$Format("%d,",    kDQSOCFocusST)
$$Format("%d,",    kDQSOCDirection)
$$Format("%d,",    kDQSOCDirectionST)
$$Format("%d,",    kDQSOCUnRng)
$$Format("%d,",    kDQSOCUnRngST)
$$Format("%d,",    kDQSOCCrFl)
$$Format("%d,",    kDQSOCCrFlST)
$$Format("%d,",    kDQSOCStipulation)
$$Format("%d,",    kDQSOCStipulationST)

$$Format("%d,",    kDQSAllOSAddApprecsTI)
$$Format("%d,",    kDQSSTGoal)
$$Format("%d,",    kDQSSTGoalST)
$$Format("%d,",    kDQSPLGoal)
$$Format("%d,",    kDQSPLGoalST)
$$Format("%d,",    kDQSOCGoal)
```

```
        $$Format("%d,",   kDQSOCGoalST)
        $$Format("%d,",   kDQSMCGoal)
        $$Format("%d,",   kDQSMCGoalST)

        $$Format("%d,",   kDQSSTRequirement)
        $$Format("%d,",   kDQSSTRequirementST)
        $$Format("%d,",   kDQSPLRequirement)
        $$Format("%d,",   kDQSPLRequirementST)
        $$Format("%d,",   kDQSOCRequirement)
        $$Format("%d,",   kDQSOCRequirementST)
        $$Format("%d,",   kDQSMCRequirement)
        $$Format("%d,",   kDQSMCRequirementST)

        $$Format("%d,",   kDQSAllRecapTI)

        $$Format("%d,",   kDQSAllNextTI)
        "\\"
};

resource 'QLST' (kQLSTGenre1, PFM_MIN_PRIO) {
        "\\NAc:Genre Storyforming"
        "\\ORc:"
        $$Format("%d,",   kDQSHome)

        $$Format("%d,",   kDQSTitle)

        $$Format("%d,",   kDQSG1Intro)
        $$Format("%d,",   kDQSGenre)
        $$Format("%d,",   kDQSG1Analytical)
        $$Format("%d,",   kDQSG1Passionate)

        $$Format("%d,",   kDQSG1MoreTI)

        $$Format("%d,",   kDQSAllPlotDynTI)
        $$Format("%d,",   kDQSWork)
        $$Format("%d,",   kDQSLimit)
        $$Format("%d,",   kDQSOutcome)
        $$Format("%d,",   kDQSJudgment)

        $$Format("%d,",   kDQSG1AdvTI)
        $$Format("%d,",   kDQSAllCharDynTI)
        $$Format("%d,",   kDQSResolve)
        $$Format("%d,",   kDQSDirection)
        $$Format("%d,",   kDQSApproach)
        $$Format("%d,",   kDQSSex)

        $$Format("%d,",   kDQSG1Next)
        "\\"
};

resource 'QLST' (kQLSTGenre2, PFM_MIN_PRIO) {
        "\\NAc:Genre Storytelling"
        "\\ORc:"
        $$Format("%d,",   kDQSHome)

        $$Format("%d,",   kDQSTitle)

        $$Format("%d,",   kDQSG2Intro)
        $$Format("%d,",   kDQSG2AnalyticalST)
        $$Format("%d,",   kDQSG2PassionateST)

        $$Format("%d,",   kDQSWorkST)
        $$Format("%d,",   kDQSLimitST)
        $$Format("%d,",   kDQSOutcomeST)
        $$Format("%d,",   kDQSJudgmentST)

        $$Format("%d,",   kDQSResolveST)
        $$Format("%d,",   kDQSDirectionST)
        $$Format("%d,",   kDQSApproachST)
        $$Format("%d,",   kDQSSexST)

        $$Format("%d,",   kDQSG2Next)

        "\\"
};

resource 'QLST' (kQLSTPlot1, PFM_MIN_PRIO) {
        "\\NAc:Plot Storyforming"
        "\\ORc:"
        $$Format("%d,",   kDQSHome)

        $$Format("%d,",   kDQSP1Intro)

        $$Format("%d,",   kDQSLimit)
        $$Format("%d,",   kDQSOutcome)
        $$Format("%d,",   kDQSWork)

        $$Format("%d,",   kDQSSTGoal)
        $$Format("%d,",   kDQSSTRequirement)
        $$Format("%d,",   kDQSOCGoal)
        $$Format("%d,",   kDQSMCGoal)
        $$Format("%d,",   kDQSPLGoal)

        $$Format("%d,",   kDQSP1AdvTI)
        $$Format("%d,",   kDQSSTConcerns)
        $$Format("%d,",   kDQSSTStipulation)
        $$Format("%d,",   kDQSSTUnRng)
        $$Format("%d,",   kDQSSTCrFl)

        $$Format("%d,",   kDQSPLConcerns)
        $$Format("%d,",   kDQSPLStipulation)
        $$Format("%d,",   kDQSPLUnRng)
        $$Format("%d,",   kDQSPLCrFl)

        $$Format("%d,",   kDQSPLRequirement)
        $$Format("%d,",   kDQSOCRequirement)
        $$Format("%d,",   kDQSMCRequirement)

        $$Format("%d,",   kDQSP1Next)
```

```
//      $$Format("%d,",   kDQSP1OSAct1)
//      $$Format("%d,",   kDQSP1OSAct2)
//      $$Format("%d,",   kDQSP1OSAct3)
//      $$Format("%d,",   kDQSP1OSAct4)
//      $$Format("%d,",   kDQSP1SSAct1)
//      $$Format("%d,",   kDQSP1SSAct2)
//      $$Format("%d,",   kDQSP1SSAct3)
//      $$Format("%d,",   kDQSP1SSAct4)

        "\\"
};

resource 'QLST' (kQLSTPlot2, PFM_MIN_PRIO) {
        "\\NAc:Plot Storytelling"
        "\\ORc:"

        $$Format("%d,",   kDQSHome)

        $$Format("%d,",   kDQSP2Intro)

        $$Format("%d,",   kDQSWorkST)
        $$Format("%d,",   kDQSLimitST)
        $$Format("%d,",   kDQSOutcomeST)

        $$Format("%d,",   kDQSSTGoalST)
        $$Format("%d,",   kDQSPLGoalST)
        $$Format("%d,",   kDQSOCGoalST)
        $$Format("%d,",   kDQSMCGoalST)
        $$Format("%d,",   kDQSSTRequirementST)
        $$Format("%d,",   kDQSPLRequirementST)
        $$Format("%d,",   kDQSOCRequirementST)
        $$Format("%d,",   kDQSMCRequirementST)
        $$Format("%d,",   kDQSSTStipulationST)
        $$Format("%d,",   kDQSPLStipulationST)
        $$Format("%d,",   kDQSSTUnRngST)
        $$Format("%d,",   kDQSPLUnRngST)
        $$Format("%d,",   kDQSSTCrFlST)
        $$Format("%d,",   kDQSPLCrFlST)

        $$Format("%d,",   kDQSP2Intro2)
        $$Format("%d,",   kDQSSTConcernsST)
        $$Format("%d,",   kDQSMCConcernsST)
        $$Format("%d,",   kDQSOCConcernsST)
        $$Format("%d,",   kDQSPLConcernsST)
        $$Format("%d,",   kDQSP2Blend)

        $$Format("%d,",   kDQSP2OSAct1)
        $$Format("%d,",   kDQSP2OSAct2)
        $$Format("%d,",   kDQSP2OSAct3)
        $$Format("%d,",   kDQSP2OSAct4)
        $$Format("%d,",   kDQSP2SSAct1)
        $$Format("%d,",   kDQSP2SSAct2)
        $$Format("%d,",   kDQSP2SSAct3)
        $$Format("%d,",   kDQSP2SSAct4)

        $$Format("%d,",   kDQSP2Next)

        "\\"
};

resource 'QLST' (kQLSTHome, PFM_MIN_PRIO) {
        "\\NAc:Home"
        "\\ORc:"
        $$Format("%d,",   kDQSHome)

        "\\"
};

resource 'QLST' (kQLSTTheme1, PFM_MIN_PRIO) {
        "\\NAc:Theme Storyforming"
        "\\ORc:"
        $$Format("%d,",   kDQSHome)

        $$Format("%d,",   kDQST1Intro)

        $$Format("%d,",   kDQSSTRanges)
        $$Format("%d,",   kDQSPLRanges)
        $$Format("%d,",   kDQSMCRanges)
        $$Format("%d,",   kDQSOCRanges)

        $$Format("%d,",   kDQST1Intro2)
        $$Format("%d,",   kDQSResolve)
        $$Format("%d,",   kDQSDirection)
        $$Format("%d,",   kDQSOutcome)
        $$Format("%d,",   kDQSJudgment)

        $$Format("%d,",   kDQST1Next)

        "\\"
};

resource 'QLST' (kQLSTTheme2, PFM_MIN_PRIO) {
        "\\NAc:Theme Storytelling"
        "\\ORc:"
        $$Format("%d,",   kDQSHome)

        $$Format("%d,",   kDQST2Intro)

        $$Format("%d,",   kDQSSTRangesST)
        $$Format("%d,",   kDQSPLRangesST)
        $$Format("%d,",   kDQSMCRangesST)
        $$Format("%d,",   kDQSOCRangesST)

        $$Format("%d,",   kDQSResolveST)
        $$Format("%d,",   kDQSDirectionST)
        $$Format("%d,",   kDQSOutcomeST)
        $$Format("%d,",   kDQSJudgmentST)

        $$Format("%d,",   kDQST2Next)

        "\\"
};
```

```
resource 'QLST' (kQLSTCharacter1, PFM_MIN_PRIO) {
        "\\NAc:Character Storyforming"
        "\\ORc:"
        $$Format("%d,",    kDQSHome)

        $$Format("%d,",    kDQSC1Intro)

//      $$Format("%d,",    kDQSTitle)

        $$Format("%d,",    kDQSMCName)
        $$Format("%d,",    kDQSMCGenderST)
        $$Format("%d,",    kDQSMCDesc)
        $$Format("%d,",    kDQSMCCharDynTI)
        $$Format("%d,",    kDQSResolve)
        $$Format("%d,",    kDQSDirection)
        $$Format("%d,",    kDQSApproach)

        $$Format("%d,",    kDQSC1AdvTI)

        $$Format("%d,",    kDQSMCProblem)
        $$Format("%d,",    kDQSMCSolution)
        $$Format("%d,",    kDQSMCFocus)
        $$Format("%d,",    kDQSMCDirection)
        $$Format("%d,",    kDQSMCUnRng)
        $$Format("%d,",    kDQSMCCrFl)
        $$Format("%d,",    kDQSSex)

        $$Format("%d,",    kDQSOCName)
        $$Format("%d,",    kDQSOCGenderST)
        $$Format("%d,",    kDQSOCDesc)

        $$Format("%d,",    kDQSC1Next)
        "\\"
};

resource 'QLST' (kQLSTCharacter2, PFM_MIN_PRIO) {
        "\\NAc:Character Storytelling"
        "\\ORc:"
        $$Format("%d,",    kDQSHome)

        $$Format("%d,",    kDQSC2Intro)

        $$Format("%d,",    kDQSResolveST)
        $$Format("%d,",    kDQSDirectionST)
        $$Format("%d,",    kDQSApproachST)

        $$Format("%d,",    kDQSMCProblemST)
        $$Format("%d,",    kDQSMCSolutionST)
        $$Format("%d,",    kDQSMCFocusST)
        $$Format("%d,",    kDQSMCDirectionST)
        $$Format("%d,",    kDQSMCUnRngST)
        $$Format("%d,",    kDQSMCCrFlST)
        $$Format("%d,",    kDQSSexST)

        $$Format("%d,",    kDQSC2Next)

        "\\"
};


resource 'QLST' (kQLSTCharDyn, PFM_MIN_PRIO) {
        "\\NAc:Character Dynamics"
        "\\ORc:"
        $$Format("%d,",    kDQSMCCharDynTI)
        $$Format("%d,",    kDQSResolve)
        $$Format("%d,",    kDQSDirection)
        $$Format("%d,",    kDQSApproach)
        $$Format("%d,",    kDQSSex)

        "\\"
};

resource 'QLST' (kQLSTPlotDyn, PFM_MIN_PRIO) {
        "\\NAc:Plot Dynamics"
        "\\ORc:"
        $$Format("%d,",    kDQSOSPlotDynTI)
        $$Format("%d,",    kDQSWork)
        $$Format("%d,",    kDQSLimit)
        $$Format("%d,",    kDQSOutcome)
        $$Format("%d,",    kDQSJudgment)

        "\\"
};


resource 'QLST' (kQLSTStoryPoints, PFM_MIN_PRIO) {
        "\\NAc:Story Points"
        "\\ORc:"
        $$Format("%d,",    kDQSNatureST)
        $$Format("%d,",    kDQSEssenceST)
        $$Format("%d,",    kDQSTendencyST)
        $$Format("%d,",    kDQSReachST)

        $$Format("%d,",    kDQSResolveST)
        $$Format("%d,",    kDQSApproachST)
        $$Format("%d,",    kDQSDirectionST)
        $$Format("%d,",    kDQSSexST)
        $$Format("%d,",    kDQSOutcomeST)
        $$Format("%d,",    kDQSJudgmentST)
        $$Format("%d,",    kDQSWorkST)
        $$Format("%d,",    kDQSLimitST)

        $$Format("%d,",    kDQSSTDomainsST)
        $$Format("%d,",    kDQSSTConcernsST)
        $$Format("%d,",    kDQSSTRangesST)
        $$Format("%d,",    kDQSSTProblemST)

        $$Format("%d,",    kDQSSTGoalST)
```

```
        $$Format("%d,",    kDQSPLGoalST)
        $$Format("%d,",    kDQSOCGoalST)
        $$Format("%d,",    kDQSMCGoalST)
        $$Format("%d,",    kDQSSTRequirementST)
        $$Format("%d,",    kDQSPLRequirementST)
        $$Format("%d,",    kDQSOCRequirementST)
        $$Format("%d,",    kDQSMCRequirementST)

        $$Format("%d,",    kDQSSTSolutionST)
        $$Format("%d,",    kDQSSTFocusST)
        $$Format("%d,",    kDQSSTDirectionST)
        $$Format("%d,",    kDQSSTStipulationST)
        $$Format("%d,",    kDQSSTUnRngST)
        $$Format("%d,",    kDQSSTCrFlST)

        $$Format("%d,",    kDQSPLDomainsST)
        $$Format("%d,",    kDQSPLConcernsST)
        $$Format("%d,",    kDQSPLRangesST)
        $$Format("%d,",    kDQSPLProblemST)
        $$Format("%d,",    kDQSPLSolutionST)
        $$Format("%d,",    kDQSPLFocusST)
        $$Format("%d,",    kDQSPLDirectionST)
        $$Format("%d,",    kDQSPLStipulationST)
        $$Format("%d,",    kDQSPLUnRngST)
        $$Format("%d,",    kDQSPLCrFlST)

//  DOMAIN ACT ORDER WOULD GO HERE IF WE HAD IT

        $$Format("%d,",    kDQSP2OSAct1)
        $$Format("%d,",    kDQSP2OSAct2)
        $$Format("%d,",    kDQSP2OSAct3)
        $$Format("%d,",    kDQSP2OSAct4)

        $$Format("%d,",    kDQSP2SSAct1)
        $$Format("%d,",    kDQSP2SSAct2)
        $$Format("%d,",    kDQSP2SSAct3)
        $$Format("%d,",    kDQSP2SSAct4)

        $$Format("%d,",    kDQSP2MCAct1)
        $$Format("%d,",    kDQSP2MCAct2)
        $$Format("%d,",    kDQSP2MCAct3)
        $$Format("%d,",    kDQSP2MCAct4)

        $$Format("%d,",    kDQSP2OCAct1)
        $$Format("%d,",    kDQSP2OCAct2)
        $$Format("%d,",    kDQSP2OCAct3)
        $$Format("%d,",    kDQSP2OCAct4)


        $$Format("%d,",    kDQSMCDomainsST)
        $$Format("%d,",    kDQSMCConcernsST)
        $$Format("%d,",    kDQSMCRangesST)
        $$Format("%d,",    kDQSMCProblemST)
        $$Format("%d,",    kDQSMCSolutionST)
        $$Format("%d,",    kDQSMCFocusST)
        $$Format("%d,",    kDQSMCDirectionST)
        $$Format("%d,",    kDQSMCStipulationST)
        $$Format("%d,",    kDQSMCUnRngST)
        $$Format("%d,",    kDQSMCCrFlST)

        $$Format("%d,",    kDQSOCDomainsST)
        $$Format("%d,",    kDQSOCConcernsST)
        $$Format("%d,",    kDQSOCRangesST)
        $$Format("%d,",    kDQSOCProblemST)
        $$Format("%d,",    kDQSOCSolutionST)
        $$Format("%d,",    kDQSOCFocusST)
        $$Format("%d,",    kDQSOCDirectionST)
        $$Format("%d,",    kDQSOCStipulationST)
        $$Format("%d,",    kDQSOCUnRngST)
        $$Format("%d,",    kDQSOCCrFlST)


        "\\"
};



/* --------------------------------------------------------------------------
        'DQSH' - Parameterized Dramatica Query System Help Text.
-------------------------------------------------------------------------- */
type 'DQSH' {
        cstring;                    /* the stream of parameterized text */
};

resource 'DQSH' (rDQSHPRadioButtons, PFM_MIN_PRIO) {                    /* help text for radio button type DQS windows */
        "«B+»«U+»RADIO BUTTON WINDOWS«U-»:«B-»"
        "\n\nMaking Radio Button choices:  For each question which is answered using Radio Buttons, there will be two
Dynamics options plus Choose Later.  \n\nTo make a choice:\nClick on the Radio Button next to your choice.  \n\n"
        "To change a choice:\nClick on the Radio Button next to the preferred choice.\n\nTo make a choice and move
automatically to the next question:\nPress the CMD key as you click on the Radio Button (i.e. CMD Click).\n\nTo move on
to the next question "
        "after making all choices:\n•  Press RETURN or \n•  Click on the down-arrow button or\n•  Click on another Topic
in the Topics List."
};

resource 'DQSH' (rDQSHPFillBlank, PFM_MIN_PRIO) {                         /* help text for Fill in the Blank type
DQS windows */
        "«B+»«U+»ILLUSTRATIONS WINDOWS«U-»:«B-»"
        "\n\nTo illustrate your Story Points\nClick in the text box and begin typing your illustration.\n\n\nTo edit an
illustration\n•  Click in the text box, then highlight all text to be removed (including any text off-screen) and begin
typing, "
        "or \n•  Press DELETE and then begin typing.  \nYour new text will replace the highlighted text.  Be sure to
Save your story file.\n\nTo move on to the next question after completing an illustration\n•  Press RETURN or \n•  Click
on the down-arrow button or\n•  "
        "Click on another Topic in the Topics List."
};

resource 'DQSH' (rDQSHPStructualFinders, PFM_MIN_PRIO) {                  /* help text for dual column structural
item type DQS windows */
        "«B+»«U+»MULTIPLE SEMANTICS WINDOWS«U-»:«B-»"
```

```
        "\n\nMaking Multiple Semantics choices\n•  For each Multiple Semantics question, there will be two scrollable
choice lists with buttons in between (Add and Remove).  \n"
        "•  The list on the left (options list) will contain available multiple semantic options; the list on the right
(selected list) will be blank before you make any choices.  \n"
        "•  Add as many semantics choices to the selected list as you wish (up to the number of available options).\n•
Use the scroll bar on either list to see semantics which extend beyond the window.\n"
        "•  Selected choices will be \"grayed-out\" in the options list as will options that are no longer available
based on other choices.\n\n\nTo make a multiple semantics choice\n•  Click on a term in the options list "
        "and press Add to display it in the selected list or\n•  Double-click on a term in the options list to display
it in the selected list.\n\n\nTo remove a multiple semantics choice\n•  Click on a term in the "
        "selected list and press Remove or\n•  Double-click on the term in the selected list to be removed. \n\n\nTo
make a multiple semantics choice and move automatically to the next question\n•  Press SHIFT as you "
        "double-click on the option or \n•  Click on the option, then press SHIFT as you click on Add or...\n\n\nTo move
on to the next question after making all choices\n•  Press RETURN or \n•  Click on the down-arrow button or\n•  "
        "Click on another topic in the Topics List."
};
```

```
/*********************************************************************
        DQSPROCS.CC
        Dramatica TextWrap Display Procs
        (c) 1993 Screenplay Systems
        Authors:          S. Greenfield & C. Huntley
        Created:          January 27, 1994
        Revised:          $Id$
*********************************************************************

*/

#include "tappl.h"
#include "graphics.h"
#include "twindow.h"
#include "tview.h"
#include "apputls.h"

#include "structs.h"
#include "address.h"
#include "dramatic.h"
#include "document.h"

#include "helppal.h"
#include "subtext.h"
#include "apprdefs.h"
#include "apprec.h"
#include "semtable.h"
#include "dqs-defs.h"
#include "dqs2.h"


#pragma segment dqs2

char *stStr = "Objective Story";
char *mcStr = "Main Character";
char *ocStr = "Obstacle Character";
char *plStr = "Subjective Story";

/* ---------------------------------------------------------------------
        DQSWindow::load_TextWrapDisplay() - This deals with creating and loading
        any of the special scrolling text displays that must be loaded with
        custom procedures.
------------------------------------------------------------------------ */
void DQSWindow::load_TextWrapDisplay()
{

        pt_err theErr = fDQSPT->GetParam("TP", 's', &fTextWrapProcID);
        assert(theErr != kParamNotFound);

        if (!fHelpViewDesired)
                make_help_invisible();

        GLRect textViewRect;
        GLSetRect(&textViewRect, fGrowDownPosition+fQTextSpacer, (fQARect.left + fQLeftMargin + fEditViewIndent),
fMaxItemBottom, fQARect.right - fEditViewIndent - fQRightMargin);

        TItem* newHelpItem = new DQSHelpView(fDoc, fItems, (TView::kVScroll), &textViewRect, TItem::kResizable);
        assert(newHelpItem);
        fTextWrapDisplay = (DQSHelpView*)newHelpItem;
        fTextWrapDisplay->SetTextFontSpec(&fHelpFont, &fHelpFontSize, &fHelpFace);
        ls_index itemId = fItems->Append(newHelpItem);
        fTextWrapDisplay->Awaken(&itemId);

        fGrowDownPosition = textViewRect.bottom;

        fTempStr[0] = 0;

        switch (fTextWrapProcID) {
                case 1:         twd1_Basic();                   // Quick Story Intro
                                        break;
                case 2:         twd_QSRecap();                  // Quick Story Recap
                                        break;
                case 3:         twd_OSRecap();                  // Objective Story Recap
                                        break;
                case 4:         twd_MCRecap();                  // Main Character Recap
                                        break;
                case 5:         twd_OCRecap();                  // Obstacle Character Recap
                                        break;
                case 6:         twd_SSRecap();                  // Subjective Story Recap
                                        break;
                case 7:         twd_SFRecap();                  // Storyforming Recap
                                        break;


                default:        assert(false);
                                        break;
        }

        fTextWrapDisplay->SetHelpPaletteText(fTempStr);

} /* DQSWindow::load_TextWrapDisplay */


/* ---------------------------------------------------------------------
        DQSWindow::twd1_Basic - Loads a textwrap display window with recap
        text.

        The key operation is is building the fTempStr.  Note that the
        size of fTempStr cannot exceed TEMP_STR_SIZE, which is currently set
        to about 6K (it can be raised).

        The fTempStr can be built in any way, and may include interpretive text.
        In the example below, the text is also loaded by reading in portions
        of text from the DQS question segment, DQSPT.

        You can append or read text directly into fTempStr by indexing the
        character at strlen(fTempstr): &fTempstr[strlen(fTempstr)].
------------------------------------------------------------------------ */
void DQSWindow::twd1_Basic(void)                        //  Quick Story Intro
{
        strcpy(fTempStr, "");
        pt_err theErr = fDQSPT->GetParam("TX1", 'c', &fTempStr[strlen(fTempStr)]);
```

```
	assert(theErr != kParamNotFound);

} /* DQSWindow::twdl_Basic */


/* -----------------------------------------------------------------------
	DQSWindow::twd_QSRecap - Loads a textwrap display window for
								Quick Story Recap.
----------------------------------------------------------------------- */
void DQSWindow::twd_QSRecap(void)
{
	strcpy(fTempStr, "QUICK STORY RECAP:\n\n");
	strcat(fTempStr, "Main Character: (CNN(MC,NM))\n");
	strcat(fTempStr, "Obstacle Character: (CNN(OC,NM))\n");
	strcat(fTempStr, "\n");
	charDyn_recap_list();
	strcat(fTempStr, "\n");
	plotDyn_recap_list();
	strcat(fTempStr, "\n");
	basic_4Appr_recap_list(fTempStr, AP_STORY);
	strcat(fTempStr, "\n");

	pt_err theErr = fDQSPT->GetParam("TX1", 'c', &fTempStr[strlen(fTempStr)]);
	assert(theErr != kParamNotFound);

} /* DQSWindow::twd_QSRecap */


/* -----------------------------------------------------------------------
	DQSWindow::twd_OSRecap - Loads a textwrap display window for
								Objective Story Recap.
----------------------------------------------------------------------- */
void DQSWindow::twd_OSRecap(void)
{
	strcpy(fTempStr, "OBJECTIVE STORY RECAP:\n\n");
	plotDyn_recap_list();								// Plot
Dynamics
	strcat(fTempStr, "\n");
	basic_4Appr_recap_list(fTempStr, AP_STORY);			// Basic four appreciations
	strcat(fTempStr, "\n");
	addl_8Appr_recap_list(fTempStr, AP_STORY);			// Additional eight appreciations
	strcat(fTempStr, "\n");
	addlOS_Appr_recap_list();								// Additional Story
Appreciations
	strcat(fTempStr, "\n");

	pt_err theErr = fDQSPT->GetParam("TX1", 'c', &fTempStr[strlen(fTempStr)]);
	assert(theErr != kParamNotFound);

} /* DQSWindow::twd_OSRecap */


/* -----------------------------------------------------------------------
	DQSWindow::twd_MCRecap - Loads a textwrap display window for
								Main Character Recap.
----------------------------------------------------------------------- */
void DQSWindow::twd_MCRecap(void)
{
	strcpy(fTempStr, "MAIN CHARACTER RECAP:\n\n");
	strcat(fTempStr, "Main Character: (CNN(MC,NM))\n\n");

	charDyn_recap_list();								// Character
Dynamics
	strcat(fTempStr, "\n");
	basic_4Appr_recap_list(fTempStr, AP_MAIN);			// Basic four appreciations
	strcat(fTempStr, "\n");
	addl_8Appr_recap_list(fTempStr, AP_MAIN);			// Additional eight appreciations
	strcat(fTempStr, "\n");

	pt_err theErr = fDQSPT->GetParam("TX1", 'c', &fTempStr[strlen(fTempStr)]);
	assert(theErr != kParamNotFound);

} /* DQSWindow::twd_MCRecap */


/* -----------------------------------------------------------------------
	DQSWindow::twd_OCRecap - Loads a textwrap display window for
								Obstacle Character Recap.
----------------------------------------------------------------------- */
void DQSWindow::twd_OCRecap(void)
{
	strcpy(fTempStr, "MAIN CHARACTER RECAP:\n\n");
	strcat(fTempStr, "Main Character: (CNN(OC,NM))\n\n");

	basic_4Appr_recap_list(fTempStr, AP_OBSTACLE);		// Basic four appreciations
	strcat(fTempStr, "\n");
	addl_8Appr_recap_list(fTempStr, AP_OBSTACLE);		// Additional eight
appreciations
	strcat(fTempStr, "\n");

	pt_err theErr = fDQSPT->GetParam("TX1", 'c', &fTempStr[strlen(fTempStr)]);
	assert(theErr != kParamNotFound);

} /* DQSWindow::twd_OCRecap */


/* -----------------------------------------------------------------------
	DQSWindow::twd_SSRecap - Loads a textwrap display window for
								Subjective Story Recap.
----------------------------------------------------------------------- */
void DQSWindow::twd_SSRecap(void)
{
	strcpy(fTempStr, "SUBJECTIVE STORY RECAP:\n\n");

	basic_4Appr_recap_list(fTempStr, AP_PLOT);			// Basic four appreciations
	strcat(fTempStr, "\n");
	addl_8Appr_recap_list(fTempStr, AP_PLOT);			// Additional eight appreciations
```

```
        strcat(fTempStr, "\n");

        pt_err theErr = fDQSPT->GetParam("TX1", 'c', &fTempStr[strlen(fTempStr)]);
        assert(theErr != kParamNotFound);

} /* DQSWindow::twd_SSRecap */


/* -----------------------------------------------------------------------
        DQSWindow::twd_SFRecap - Loads a textwrap display window for
                                                        Storyforming Recap.
----------------------------------------------------------------------- */
void DQSWindow::twd_SFRecap(void)
{
        strcpy(fTempStr, "STORYFORMING RECAP:\n\n");
        strcat(fTempStr, "DYNAMICS RECAP:\n\n");
        charDyn_recap_list();                                               // Character
Dynamics
        plotDyn_recap_list();                                               // Plot
Dynamics
        strcat(fTempStr, "\n");
        strcat(fTempStr, "OBJECTIVE STORY RECAP:\n");
        basic_4Appr_recap_list(fTempStr, AP_STORY);            // Basic four appreciations
        strcat(fTempStr, "\n");
        addl_8Appr_recap_list(fTempStr, AP_STORY);             // Additional eight appreciations
        strcat(fTempStr, "\n");

        strcat(fTempStr, "SUBJECTIVE STORY RECAP:\n");
        basic_4Appr_recap_list(fTempStr, AP_PLOT);             // Basic four appreciations
        strcat(fTempStr, "\n");
        addl_8Appr_recap_list(fTempStr, AP_PLOT);              // Additional eight appreciations
        strcat(fTempStr, "\n");

        strcat(fTempStr, "MAIN CHARACTER RECAP:\n");
        strcat(fTempStr, "Main Character: {CNN(MC,NM)}\n");
        basic_4Appr_recap_list(fTempStr, AP_MAIN);             // Basic four appreciations
        strcat(fTempStr, "\n");
        addl_8Appr_recap_list(fTempStr, AP_MAIN);              // Additional eight appreciations
        strcat(fTempStr, "\n");

        strcat(fTempStr, "OBSTACLE CHARACTER RECAP:\n");
        strcat(fTempStr, "Obstacle Character: {CNN(OC,NM)}\n");
        basic_4Appr_recap_list(fTempStr, AP_OBSTACLE);              // Basic four appreciations
        strcat(fTempStr, "\n");
        addl_8Appr_recap_list(fTempStr, AP_OBSTACLE);               // Additional eight
appreciations
        strcat(fTempStr, "\n");

        strcat(fTempStr, "ADDITIONAL STORY APPRECIATIONS RECAP:\n");
        addlOS_Appr_recap_list();                                        // Additional Story
Appreciations
        strcat(fTempStr, "\n");

        pt_err theErr = fDQSPT->GetParam("TX1", 'c', &fTempStr[strlen(fTempStr)]);
        assert(theErr != kParamNotFound);

} /* DQSWindow::twd_SFRecap */



/*******************************************/
/*******************************************/
/*******************************************/


/* -----------------------------------------------------------------------
        DQSWindow::charDyn_recap_list - builds a list of the 4 character
                                                        dynamics appreciations.
----------------------------------------------------------------------- */
void DQSWindow::charDyn_recap_list(void)
{
        strcat(fTempStr, "Resolve: ");
        interpret_dyn_semVal_name(fTempStr, kApprResolve);
        strcat(fTempStr, "\n");

        strcat(fTempStr, "Direction: ");
        interpret_dyn_semVal_name(fTempStr, kApprDirection);
        strcat(fTempStr, "\n");

        strcat(fTempStr, "Approach: ");
        interpret_dyn_semVal_name(fTempStr, kApprApproach);
        strcat(fTempStr, "\n");

        strcat(fTempStr, "Mental Sex: ");
        interpret_dyn_semVal_name(fTempStr, kApprSex);
        strcat(fTempStr, "\n");

} /* DQSWindow::charDyn_recap_list */


/* -----------------------------------------------------------------------
        DQSWindow::plotDyn_recap_list - builds a list of the 4 plot
                                                        dynamics appreciations.
----------------------------------------------------------------------- */
void DQSWindow::plotDyn_recap_list(void)
{
        strcat(fTempStr, "Work: ");
        interpret_dyn_semVal_name(fTempStr, kApprWork);
        strcat(fTempStr, "\n");

        strcat(fTempStr, "Limit: ");
        interpret_dyn_semVal_name(fTempStr, kApprLimit);
        strcat(fTempStr, "\n");

        strcat(fTempStr, "Outcome: ");
        interpret_dyn_semVal_name(fTempStr, kApprOutcome);
        strcat(fTempStr, "\n");
```

```
        strcat(fTempStr, "Judgment: ");
        interpret_dyn_semVal_name(fTempStr, kApprJudgment);
        strcat(fTempStr, "\n");

} /* DQSWindow::plotDyn_recap_list */


/* ------------------------------------------------------------------------
        DQSWindow::basic_4Appr_recap_list - builds a list of the 4 basic appreciations
                                                                for any given perspective.
------------------------------------------------------------------------- */
void DQSWindow::basic_4Appr_recap_list(char* dest, enum APPRECS whichClass)
{
        char* whichStr;

        if (whichClass == AP_STORY)
                whichStr = stStr;
        else if (whichClass == AP_PLOT)
                whichStr = plStr;
        else if (whichClass == AP_MAIN)
                whichStr = mcStr;
        else
                whichStr = ocStr;

        strcat(fTempStr, whichStr);                                             // DOMAIN
        strcat(fTempStr, " Domain: ");
        interpret_semVal_name(fTempStr, whichClass, kDomain);
        strcat(fTempStr, "\n");

        strcat(fTempStr, whichStr);                                             // CONCERN
        strcat(fTempStr, " Concern: ");
        interpret_semVal_name(fTempStr, whichClass, kConcern);
        strcat(fTempStr, "\n");

        strcat(fTempStr, whichStr);                                             // RANGE
        strcat(fTempStr, " Range: ");
        interpret_semVal_name(fTempStr, whichClass, kRange);
        strcat(fTempStr, "\n");

        strcat(fTempStr, whichStr);                                             // PROBLEM
        strcat(fTempStr, " Problem: ");
        interpret_semVal_name(fTempStr, whichClass, kProblem);
        strcat(fTempStr, "\n");

} /* DQSWindow::basic_4Appr_recap_list */


/* ------------------------------------------------------------------------
        DQSWindow::addl_8Appr_recap_list - builds a list of the 8 additional
                                                                appreciations for any given
perspective.
------------------------------------------------------------------------- */
void DQSWindow::addl_8Appr_recap_list(char* dest, enum APPRECS whichClass)
{
        char* whichStr;

        if (whichClass == AP_STORY)
                whichStr = stStr;
        else if (whichClass == AP_PLOT)
                whichStr = plStr;
        else if (whichClass == AP_MAIN)
                whichStr = mcStr;
        else
                whichStr = ocStr;

        strcat(fTempStr, whichStr);                                             // SOLUTION
        strcat(fTempStr, " Solution: ");
        interpret_semVal_name(fTempStr, whichClass, kSolution);
        strcat(fTempStr, "\n");

        strcat(fTempStr, whichStr);                                             // FOCUS
        strcat(fTempStr, " Focus: ");
        interpret_semVal_name(fTempStr, whichClass, kFocus);
        strcat(fTempStr, "\n");

        strcat(fTempStr, whichStr);                                             // DIRECTION
        strcat(fTempStr, " Direction: ");
        interpret_semVal_name(fTempStr, whichClass, kDirection);
        strcat(fTempStr, "\n");

        strcat(fTempStr, whichStr);                                             // UNIQUE
RANGE
        if (whichClass == AP_STORY || whichClass == AP_PLOT) {
                strcat(fTempStr, " Catalyst: ");
        } else {
                strcat(fTempStr, " Unique Ability: ");
        }
        interpret_semVal_name(fTempStr, whichClass, kUniqueRange);
        strcat(fTempStr, "\n");

        strcat(fTempStr, whichStr);                                             // CRITICAL
FLAW
        if (whichClass == AP_STORY || whichClass == AP_PLOT) {
                strcat(fTempStr, " Inhibitor: ");
        } else {
                strcat(fTempStr, " Critical Flaw: ");
        }
        interpret_semVal_name(fTempStr, whichClass, kCriticalFlaw);
        strcat(fTempStr, "\n");

        strcat(fTempStr, whichStr);                                             //
STIPULATION
        strcat(fTempStr, " Stipulation: ");
        interpret_semVal_name(fTempStr, whichClass, kStipulation);
        strcat(fTempStr, "\n");

} /* DQSWindow::addl_8Appr_recap_list */
```

```
/* -----------------------------------------------------------------------
	DQSWindow::addlOS_Appr_recap_list - builds a list of the additional
					Objecitve Story appreciations like Goal, Requirement,
					Cost, Forewarnings, etc.
------------------------------------------------------------------------- */
void DQSWindow::addlOS_Appr_recap_list(void)
{
	char tmpStr[20];

	strcpy(tmpStr, "Story");

	strcat(fTempStr, tmpStr);						// GOAL
	strcat(fTempStr, " Goal: ");
	interpret_semVal_name(fTempStr, AP_STORY, kGoal);
	strcat(fTempStr, "\n");

	strcat(fTempStr, tmpStr);						// CONSEQUENCE
	strcat(fTempStr, " Consequence: ");
	interpret_semVal_name(fTempStr, AP_PLOT, kGoal);
	strcat(fTempStr, "\n");

	strcat(fTempStr, tmpStr);						// COST
	strcat(fTempStr, " Cost: ");
	interpret_semVal_name(fTempStr, AP_OBSTACLE, kGoal);
	strcat(fTempStr, "\n");

	strcat(fTempStr, tmpStr);						// DIVIDEND
	strcat(fTempStr, " Dividend: ");
	interpret_semVal_name(fTempStr, AP_MAIN, kGoal);
	strcat(fTempStr, "\n");


	strcat(fTempStr, tmpStr);						// REQUIREMENT
	strcat(fTempStr, " Requirement: ");
	interpret_semVal_name(fTempStr, AP_STORY, kRequirement);
	strcat(fTempStr, "\n");

	strcat(fTempStr, tmpStr);						// PREREQUISITES
	strcat(fTempStr, " Prerequisites: ");
	interpret_semVal_name(fTempStr, AP_PLOT, kRequirement);
	strcat(fTempStr, "\n");

	strcat(fTempStr, tmpStr);						// PRECONDITIONS
	strcat(fTempStr, " Preconditions: ");
	interpret_semVal_name(fTempStr, AP_OBSTACLE, kRequirement);
	strcat(fTempStr, "\n");

	strcat(fTempStr, tmpStr);						// FOREWARNINGS
	strcat(fTempStr, " Forewarnings: ");
	interpret_semVal_name(fTempStr, AP_MAIN, kRequirement);
	strcat(fTempStr, "\n");

} /* DQSWindow::addlOS_Appr_recap_list */



/* -----------------------------------------------------------------------
	DQSWindow::interpret_dyn_semVal_name - passes back name of dynamic
				(like "Change", "Male", "Bad", etc.
------------------------------------------------------------------------- */
void DQSWindow::interpret_dyn_semVal_name(char* dest, appr_index_t apprIndex)
{
	semval_t semVal = fDoc->GetApprValByIndex(apprIndex);
	if (semVal > 0)
		strcat(dest, ApprName(semVal));
	else
		strcat(dest, "unchosen");
} /* DQSWindow::interpret_dyn_semVal_name */

/* -----------------------------------------------------------------------
	DQSWindow::interpret_semVal_name -
------------------------------------------------------------------------- */
void DQSWindow::interpret_semVal_name(char* dest, enum APPRECS whichClass, apprecs_array whichAppr)
{
	assert(whichClass >= AP_STORY && whichClass <= AP_PLOT);
	assert(whichAppr >= kDomain && whichAppr <= kRequirement);

	semval_t semVal = fDoc->GetApprValByIndex(MakeApprIndex(whichClass, whichAppr));
	if (semVal > 0)
		strcat(dest, SEMTBL_NAME(semVal));
	else if (semVal == -1)
		strcat(dest, "multiply defined");
	else
		strcat(dest, "unchosen");
} /* DQSWindow::interpret_semVal_name */

#pragma segment main
```

```
/*********************************************************************
	DRAMATIC.CC
	Dramatica Custom Application Classes
	(c) 1993 Screenplay Systems
	Authors:		S. Greenfield & C. Huntley
	Created:		April 1, 1993
	Revised:		$Id$
*********************************************************************

*/

#include <folders.h>
#include "ssiscrap.h"

#include "appdlogs.h"

#include "drrez.h"
#include "dramatic.h"
#include "document.h"
#include "menu.h"
#include "commands.h"
#include "cpanel.h"
#include "storypnt.h"
#include "outline.h"
#include "newchar.h"
#include "castlist.h"
#include "delchar.h"
#include "buildchr.h"
#include "mainobst.h"
#include "sinfo.h"
#include "sview.h"
#include "structs.h"
#include "dqs-defs.h"
#include "dqs2.h"
#include "charwind.h"
#include "repwind.h"
#include "aboutbox.h"
#include "compile.h"
#include "casting.h"
#include "apprec.h"

#pragma segment init

static void Init_Dramatica(void);

/* ------------------------------------------------------------------------
	AP_NewAppObject - create an instance of our custom application object.
------------------------------------------------------------------------ */
TAppl* AP_NewAppObject(AP_AppParams *pParams, AppStatics *pStatics)
{
	return new Dramatica(pParams, pStatics);

} /* AP_NewAppObject */

/* ------------------------------------------------------------------------
	Dramatica::Dramatica - constructor.  Wait to do any heap allocation until
		init_app() (see TAppl::TAppl() for more info).
------------------------------------------------------------------------ */
Dramatica::Dramatica(AP_AppParams *pParams, AppStatics *pStatics)
	: TAppl(pParams, pStatics, kNoCmd),		// was kFileNew
	fAppPFMFile (0),
	fStoryTableFile (NULL),
	fStoryHelpFile (NULL)
{
	// It is usually best to put all your application initialization in
	// your overridden version of TAppl::init_app().

} /* Dramatica::Dramatica */

#pragma segment Main
/* ------------------------------------------------------------------------
	Dramatica::~Dramatica - destructor.

	Don't worry about disposing of any additional cursor regions you may
	have added to fCursorRgns, its easier just to let TAppl::~TAppl()
	dispose of the entire cursor regions list.
------------------------------------------------------------------------ */
Dramatica::~Dramatica(void)
{
	// Do any custom application termination here, or if you like you can
	// override TAppl::clean_up(), either way works equally well.

	delete	fPNounPT;

	//	CLOSE CHARPIX FILE

	err_t theErr;

	if (fCharPixFile) {
		theErr = PFMCloseFile(fCharPixFile);
		assert(theErr == NOERR);
	}

	//	CLOSE STORYTBL FILE

	if (fStoryTableFile) {
		theErr = PFMCloseFile(fStoryTableFile);
		assert(theErr == NOERR);
	}

	//	CLOSE STORY HELP FILE

	if (fStoryHelpFile) {
		theErr = PFMCloseFile(fStoryHelpFile);
		assert(theErr == NOERR);
	}

	// Close Dramatica Prefs

	PFMSetCurrentFile(fPrefsFile);
	err_t status = NOERR;
	status = PFMSaveFile(NULL);
	assert(status == NOERR);
```

```
	GN_SetInfo(&fPrefFRef, GetSignature(), _OSType("PREF"));
	theErr = PFMCloseFile(fPrefsFile);
	assert(theErr == NOERR);

#ifdef 0
	OSErr anyErrors = PBCloseWD(&fPrefsWD, 0);		// Close temporary working directory
//	assert(anyErrors == 0);
#endif

	//	Destruct our Scrap class

	delete fScrapPtr;

#if 0
	FILE*	DBFRef;
	DBFRef = fopen("pfm.dmp", "w+b");
	PFMDumpReport(DBFRef);
	fclose(DBFRef);
#endif

} /* Dramatica::~Dramatica */

/* ------------------------------------------------------------------------
	Dramatica::GetDocFileTypes - return a NULL-terminated list of document
		file types for Dramatica.
------------------------------------------------------------------------ */
OSType* Dramatica::GetDocFileTypes(void)
{
	static OSType	types[4];

#ifdef TOOLBOX
	types[0] = DDOC;
#else
	types[0] = _OSType("*\0\0");
#endif
	types[1] = NULL;
	types[2] = NULL;
	types[3] = NULL;

	return types;

} /* Dramatica::GetDocFileTypes */

/* ------------------------------------------------------------------------
	Dramatica::IsValidCmd - returns true if a specified command currently has
		a vaild context and false if it doesn't.  If we don't recognize the
		command, pass it on up to TAppl::IsValidCmd().
------------------------------------------------------------------------ */
bool_t Dramatica::IsValidCmd(cm_type cmdID)
{
	ls_index activeDoc = ActiveDoc();
	TDoc* theDoc = NULL;
	if (activeDoc != kLsNoElem)
		theDoc = GetDoc(ActiveDoc());

	switch (cmdID) {
		//	FILE MENU OVERRIDEN:

		case kFilePageSetup:	return EDFilePageSetup::IsValid(this);
		case kExportCmd:	return (false);

		//	EDIT MENU COMMANDS OVVERRIDEN:

		case kEditPaste:		CastListView* theCastListView = (theDoc) ? ((DRDoc*)theDoc)-
>GetCastListView() : NULL;
							if (theDoc && theCastListView) {
								bool_t canPaste = (theCastListView-
>SelectionExists() && fScrapPtr->HasScrap() && fScrapPtr->HasRezType(_OSType("PICT")));
								return canPaste;
							}
							else
								return( EditPaste::IsValid( this ) );


		case kPrefsCmd:			return (false);
		case kSearchCmd:		return (false);
		case kReplaceCmd:		return (false);

		case kSetFontCmd:		if (theDoc)  {
								TWindow* theActiveWindow =
ActiveWindow();
								if (theActiveWindow ==
(TWindow*)(((DRDoc*)theDoc)->GetDQSWindow()) ||
									theActiveWindow ==
(TWindow*)(((DRDoc*)theDoc)->GetReportWindow()))
									return (true);
							}
							return (false);

		//	WINDOW MENU COMMANDS OVVERRIDEN:

		case kDesktopCmd:		return (false);


		// FOR EACH CUSTOM COMMAND YOU WRITE, ADD A CASE HERE.

		// STORYFORMING MENU COMMANDS:

		case kQuickStoryCmd:
		case kDQSCmd:			return DQSCmd::IsValid(this);
		case kCPanelCmd:		return CPanel::IsValid(this);
		case kDramaCmd1:		return true;
		case kCompileCmd:		return (AP_CommandKey() && AP_OptionKey());

		//	CHARACTER MENU COMMANDS:

		case kCastListCmd:		return CastListCmd::IsValid(this);
		case kCreateCharCmd:	return NewCharCmd::IsValid(this);
		case kDelCharCmd:		return DelCharCmd::IsValid(this);
		case kCharInfoCmd:		return NewCharCmd::InfoIsValid(this);
		case kBuildChrCmd:		return BuildChrCmd::IsValid(this);
		case kMainObstCmd:		return MainObstCmd::IsValid(this);
		case kCastingCmd:		return CastingCmd::IsValid(this);
```

```
                // STORYTELLING MENU COMMANDS:

                case kSInfoCmd:                 return SInfoCmd::IsValid(this);
                case kOutlineCmd:               return OutlineCmd::IsValid(this);
                case kSPCmd:                    return StoryPntsCmd::IsValid(this);
                case kSViewCmd:                 return SViewCmd::IsValid(this);

                // TOOLS MENU COMMANDS:

                case kNotYetImplemented:return false;

                default:                                  return TAppl::IsValidCmd(cmdID);
        }
} /* Dramatica::IsValidCmd */

/* ----------------------------------------------------------------------
        Dramatica::NewDoc - create a new instance of an DRDoc.
---------------------------------------------------------------------- */
TDoc* Dramatica::NewDoc(const GN_FileRef *pFileRef)
{
        return new DRDoc(this, pFileRef);

} /* Dramatica::NewDoc */

/* ----------------------------------------------------------------------
        Dramatica::new_command - creates a new command object based on the command
                ID passed in.  If the command specified is not one we recognize,
                pass it on up to TAppl::new_command().
---------------------------------------------------------------------- */
TCommand* Dramatica::new_command(cm_type cmdID)
{
        seg_id_t whichDQSList       = 0;
        ls_index activeDoc                  = ActiveDoc();
        TDoc* theDoc                        = NULL;
        if (activeDoc != kLsNoElem)
                theDoc = GetDoc(ActiveDoc());

        switch (cmdID) {
                //      FILE MENU OVERRIDEN:

                case kFilePageSetup:      return new EDFilePageSetup(this);
                case kExportCmd:          return (NULL);


                //      EDIT MENU COMMANDS OVERRIDEN:

                case kEditPaste:          CastListView* theCastListView = (theDoc) ? ((DRDoc*)theDoc)-
>GetCastListView() : NULL;
                                                          if (theDoc && theCastListView) {
                                                                  bool_t canPaste = (theCastListView-
>SelectionExists() && fScrapPtr->HasScrap() && fScrapPtr->HasRezType(_OSType("PICT")));
                                                                  if (canPaste) {
                                                                          theCastListView-
>PasteCharPict();
                                                                  }
                                                          }else
                                                                  return( new EditPaste( this ) );
                                                          break;

                case kPrefsCmd:                 return (NULL);
                case kSearchCmd:          return (NULL);
                case kReplaceCmd:               return (NULL);

                case kSetFontCmd:               assert(theDoc);
                                                          DQSWindow* DQSWindowPtr = ((DRDoc*)theDoc)-
>GetDQSWindow();
                                                          RepWindow* RepWindPtr       = ((DRDoc*)theDoc)-
>GetReportWindow();
                                                          if ((TWindow*)DQSWindowPtr == ActiveWindow()) {
                                                                  DQSWindowPtr->DQSSelectFont();
                                                          }
                                                          else if ((TWindow*)RepWindPtr == ActiveWindow())
{
                                                                  RepWindPtr->RepSelectFont();
                                                          }

                                                          return (NULL);

                //      WINDOW MENU COMMANDS OVVERRIDEN:

                case kDesktopCmd:               return (NULL);


                // STORYFORMING MENU COMMANDS:

                case kQuickStoryCmd:      whichDQSList = kQLSTQuickStart;
                case kDQSCmd:                   if (DQSCmd::IsValid(this)) {
                                                                  assert(activeDoc != kLsNoElem);
                                                                  assert(theDoc);
                                                                  DQSWindow* DQSWindowPtr =
((DRDoc*)theDoc)->GetDQSWindow();
                                                                  if (DQSWindowPtr)

        DoSelectWindow((TWindow*)DQSWindowPtr);
                                                                  else
                                                                          return new DQSCmd(this,
whichDQSList);
                                                          }
                                                          break;

                case kCPanelCmd:          if (CPanel::IsValid(this)) {
                                                                  close_DQSWindow_if_open();
                                                                  return new CPanel(this);
                                                          }
                                                          break;

                case kDramaCmd1:          if (DramaCmd1::IsValid(this)) {
                                                                  close_DQSWindow_if_open();
                                                                  return new DramaCmd1(this);
                                                          }
                                                          break;
```

```
case kCompileCmd:                    return new CompileCmd(this);
                                              break;

// CHARACTER MENU COMMANDS:

case kCastListCmd:                   if (CastListCmd::IsValid(this)) {
                                              assert(activeDoc != kLsNoElem);
                                              close_DQSWindow_if_open();
                                              CLWindow* castListWindow =
((DRDoc*)theDoc)->GetCastListWindow();
                                              if (castListWindow)
        DoSelectWindow((TWindow*)castListWindow);
                                              else
                                                      return new CastListCmd(this);
                                              }
                                              break;

case kCreateCharCmd:         if (NewCharCmd::IsValid(this))
                                              return new NewCharCmd(this);
                                              break;

case kDelCharCmd:                    if (DelCharCmd::IsValid(this))
                                              return new DelCharCmd(this);
                                              break;

case kCharInfoCmd:                   if (NewCharCmd::InfoIsValid(this)) {
                                              assert(activeDoc != kLsNoElem);
                                              assert(theDoc);
                                              CastListView* CLView = ((DRDoc*)theDoc)-
>GetCastListView();
                                              if (!CLView)
                                                      CLView = ((DRDoc*)theDoc)-
>GetBCCastListView();
                                              if (CLView && CLView->SelectionExists())
{
                                                      (new
NewCharDlog((DRDoc*)theDoc, CLView->GetWhichCharSelected()))->ModalLoop();
                                              }
                                              }
                                              break;

case kBuildChrCmd:                   if (BuildChrCmd::IsValid(this)) {
                                              close_DQSWindow_if_open();
                                              BCWindow* buildCharWindow =
((DRDoc*)theDoc)->GetBuildCharWindow();
                                              if (buildCharWindow)
        DoSelectWindow((TWindow*)buildCharWindow);
                                              else
                                                      return new BuildChrCmd(this);
                                              }
                                              break;

case kMainObstCmd:                   if (MainObstCmd::IsValid(this)) {
                                              close_DQSWindow_if_open();
                                              return new MainObstCmd(this);
                                              }
                                              break;

case kCastingCmd:                    if (CastingCmd::IsValid(this)) {
                                              CastingWindow* castingWindow =
((DRDoc*)theDoc)->GetCastingWindow();
                                              if (castingWindow)
        DoSelectWindow((TWindow*)castingWindow);
                                              else
                                                      return new CastingCmd(this);
                                              }
                                              break;

// STORYTELLING MENU COMMANDS:

case kSInfoCmd:                      if (SInfoCmd::IsValid(this))
                                              return new SInfoCmd(this);
                                              break;

case kOutlineCmd:                    if (OutlineCmd::IsValid(this)) {
                                              assert(activeDoc != kLsNoElem);
                                              close_DQSWindow_if_open();
                                              assert(theDoc);
                                              RepWindow* reportWindow =
((DRDoc*)theDoc)->GetReportWindow();
                                              if (reportWindow)
        DoSelectWindow((TWindow*)reportWindow);
                                              else
                                                      return new OutlineCmd(this);
                                              }
                                              break;

case kSPCmd:                         if (StoryPntsCmd::IsValid(this)) {
                                              assert(activeDoc != kLsNoElem);
                                              close_DQSWindow_if_open();
                                              assert(theDoc);
                                              SPWindow* storyPntsWindow =
((DRDoc*)theDoc)->GetStoryPointsWindow();
                                              if (storyPntsWindow)
        DoSelectWindow((TWindow*)storyPntsWindow);
                                              else
                                                      return new StoryPntsCmd(this);
                                              }
                                              break;

case kSViewCmd:                      if (SViewCmd::IsValid(this))
                                              return new SViewCmd(this);
                                              break;

// TOOLS MENU COMMANDS:
```

```
		case kNotYetImplemented:	AP_UserMessage("Command not yet Implemented.  Please try in next Beta
version.");

		default:					return TAppl::new_command(cmdID);
	}

	return TAppl::new_command(cmdID);

} /* Dramatica::new_command */


/* -------------------------------------------------------------------------
	Dramatica::AboutApp -
------------------------------------------------------------------------- */
void Dramatica::AboutApp(void)
{
	bool_t	commandKey		= AP_CommandKey();
	bool_t	optionKey		= AP_OptionKey();

	if (commandKey && optionKey) {
#ifdef TOOLBOX
	(new AboutAppLib())->ModalLoop();
#endif

	}
	else {
		GLRect screenRect;
		GetMainScreenRect(&screenRect);
		gl_coord_t aboutHeight		= 278;
		gl_coord_t aboutWidth		= 500;
		GLRect myBounds;
		myBounds.top		= ((screenRect.bottom - screenRect.top) / 2) - (aboutHeight / 2);
		myBounds.bottom	= myBounds.top + aboutHeight;
		myBounds.left		= ((screenRect.right - screenRect.left) / 2) - (aboutWidth / 2);
		myBounds.right	= myBounds.left + aboutWidth;


		AboutBoxWindow* pTWindow = new AboutBoxWindow(this, &myBounds, WN_SOLID_DLOG);

		if (pTWindow) {
			pTWindow->SetupWindow();
			pTWindow->ShowWindow();
			SetActiveWindows();

			ClearStoragePtr();
		}
	}
} /* Dramatica::AboutApp */



#pragma segment init

/* -------------------------------------------------------------------------
	Dramatica::init_app - registers Dramatica's new object proc with Genlib,
		then calls TAppl::init_app() to do standard application initialization,
		then does any custom initialization.
------------------------------------------------------------------------- */
void Dramatica::init_app(void)
{
//	RegisterNewObjectProc(NewEDObject);

	TAppl::init_app();

	// DO YOUR CUSTOM APPLICATION INITIALIZATION HERE.

	PFMSetCacheLimit(300000);								// Controls how much
RAM is allocated for PFM cache

	fAppPFMFile = (pfm_fd_t)fResFileRefNums.Elem(0);			// Note the PFM cookie for the main resource
file

	// PUT UP SPLASH SCREEN

	GLRect screenRect;
	GetMainScreenRect(&screenRect);
	gl_coord_t aboutHeight		= 278;
	gl_coord_t aboutWidth		= 500;
	GLRect myBounds;
	myBounds.top		= ((screenRect.bottom - screenRect.top) / 2) - (aboutHeight / 2);
	myBounds.bottom	= myBounds.top + aboutHeight;
	myBounds.left		= ((screenRect.right - screenRect.left) / 2) - (aboutWidth / 2);
	myBounds.right	= myBounds.left + aboutWidth;

	SplashScreen* pAboutWind = new SplashScreen(this, &myBounds, WN_SOLID_DLOG);
	assert(pAboutWind);
	pAboutWind->SetupWindow();
	pAboutWind->ShowWindow();
	ClearStoragePtr();
	pAboutWind->Update();			// force drawing now!
	long startTime = AP_TickCount();

	pt_err	theErr;

	fDefinePalette			= NULL;

	fPNounPT = new PText(fAppPFMFile, _OSType("PFNN"), 1, &theErr, kRdOnly);		// Grab PFN segment from .pfm
file
	assert(theErr == noerr);

	//	GET INFO ABOUT THE VERSION OF THIS APP AND THE FILE FORMATS IT CREATES

	pfm_fd_t currentFile = PFMSetCurrentFile(fAppPFMFile);
	PText* infoPT		= new PText(fAppPFMFile, _OSType("INFO"), 0, &theErr);
	assert(theErr != kNoSuchPFMSeg);
	theErr = infoPT->GetParam("MajVer", 's', &fMajorVers);
	assert(theErr != kParamNotFound);
	infoPT->GetParam("MinVer", 's', &fMinorVers);
	infoPT->GetParam("MaintVer", 's', &fMaintVers);
	infoPT->GetParam("FileFmt", 's', &fFileFmtVers);
	delete infoPT;
	PFMSetCurrentFile(currentFile);
```

```
//      OPEN THE CHARACTER PICTURES FILE

        GN_FileRef CPIXFRef;
        char* CPixFName = "charpix.pfm";
        GN_InitFileRef(&CPIXFRef, CPixFName, PFM_READ_ONLY, DEFAULT_VOL);
        if (GN_Exists(&CPIXFRef)) {
                fCharPixFile = PFMOpenFile(&CPIXFRef);
                asserts(fCharPixFile != PFM_NO_FILE, "Couldn't open CharPix file!");
        }
        else {                                                                  //
Eventually put up alert if not there
                asserts(false, "Missing CharPix file -- can't run without it!");
        }

//      INIT THE PREFERENCES FILE (create it if it doesn't exist)

        fPrefsFile = get_preferences_file(&fPrefFRef);


//      INIT THE STORYTABLE FILE!

        GN_FileRef FRef;
#ifdef TOOLBOX
                char* filename = "Story Engine";
#else
                char* filename = "engine.pfm";
#endif
        GN_InitFileRef(&FRef, filename, PFM_READ_ONLY, DEFAULT_VOL);
        if (GN_Exists(&FRef)) {
                // Create if doesn't exist!
                fStoryTableFile = PFMOpenFile(&FRef);
                TMenu* formingMenu = GetMenu(fStoryForming);
                formingMenu->RemoveItems(9, 9);
        }
//      assert(fStoryTableFile != PFM_NO_FILE);                 // DON'T ASSERT -- OTHERWISE, USER CAN'T BUILD A
NEW STORYTBL

        Init_Dramatica();


//      INIT THE STORY HELP FILE

#ifdef TOOLBOX
                filename = "Story Help";
#else
                filename = "story.hlp";
#endif

        GN_InitFileRef(&FRef, filename, PFM_READ_ONLY, DEFAULT_VOL);
        if (GN_Exists(&FRef)) {
                // Create if doesn't exist!
                if (PFMIsPFMFile(&FRef)) {
                        fStoryHelpFile = PFMOpenFile(&FRef);
                        if (fStoryHelpFile == PFM_NO_FILE)
                                fStoryHelpFile = NULL;
                }
                else {
                        GN_Remove(&FRef);                                       // Corrupted
story help -- delete!
                        fStoryHelpFile = NULL;
                }
        }


//      INIT THE SCRAP CLASS

        fScrapPtr = new Scrap();


//      DESTRUCT SPLASH SCREEN

#ifdef TOOLBOX
        EVENT_REC evt;
        while (! AP_GetEvent(mDownMask + keyDownMask, &evt, 0, GetGrayRgn()))
                if (AP_TickCount() - startTime > 240)
                        break;
        if (evt.what == mouseDown)
                AP_MouseStillDown();
#else
        assert(false);                          // REWRITE FOR MS-WINDOWS!
#endif

        delete pAboutWind;

} /* Dramatica::init_app */

/* ----------------------------------------------------------------------
        Dramatica::init_menus - add Dramatica's specific menus to the application's
                menu list.  This function must call TAppl::init_menus() before it
                adds to or modifies the standard Applib menus.
-------------------------------------------------------------------------- */
void Dramatica::init_menus(void)
{
//      TAppl::init_menus();            // No longer called, 'cause we want to rearrange the Window menu...
#ifdef TOOLBOX
        fRootMenu               = fMenuList.Append(new RootMenu(this, rAppMenu));
        fSysMenu        = fMenuList.Append(new SysMenu(this, rSysMenu, " "));
        fFileMenu       = fMenuList.Append(new FileMenu(this, rFileMenu));
        fEditMenu       = fMenuList.Append(new EditMenu(this, rEditMenu));


        fStoryForming   = fMenuList.Append(new StoryFormingMenu(this, rStoryFormingMenu));
        fCharsMenu              = fMenuList.Append(new CharMenu(this, rCharsMenu));
        fStoryTelling   = fMenuList.Append(new StoryTellingMenu(this, rStoryTellingMenu));
        fTools                  = fMenuList.Append(new ReferenceMenu(this, rToolsMenu));

        fWindowMenu     = fMenuList.Append(new WindowMenu(this, rWindowMenu));
//      fFontMenu       = fMenuList.Append(new FontMenu(this, rFontMenu, "Font"));
#else /* WINDOWS */
        fRootMenu               = fMenuList.Append(new TMenu(this, rAppMenu));
        fFileMenu       = fMenuList.Append(new TMenu(this, rFileMenu));
        fEditMenu       = fMenuList.Append(new TMenu(this, rEditMenu));
```

```
        fStoryForming      = fMenuList.Append(new TMenu(this, rStoryFormingMenu));
        fCharsMenu                 = fMenuList.Append(new TMenu(this, rCharsMenu));
        fStoryTelling      = fMenuList.Append(new TMenu(this, rStoryTellingMenu));
        fTools                     = fMenuList.Append(new TMenu(this, rToolsMenu));

        fWindowMenu = fMenuList.Append(new TMenu(this, rWindowMenu));
        fPopupMenu  = -1;
#endif

        ((TMenu*) fMenuList.Elem(fRootMenu))->AppendItems(rEDRootMenu);

} /* Dramatica::init_menus */

/* ------------------------------------------------------------------------
        Dramatica::init_FrontEnd - set up our frontend window
--------------------------------------------------------------------------- */
void Dramatica::init_FrontEnd(void)
{
#if 0
        GLRect myBounds;
        GLSetRect(&myBounds, 22, 2, 480, 640);

        fFEWindow = new FEWindow(this, NULL, &myBounds, WN_DOC_WINDOW, "Dramatica Front End");

        if (fFEWindow) {
                fFEWindow->SetupWindow();
                fFEWindow->ShowWindow();
                this->SetActiveWindows();
                this->SetCursorRgns();
                this->AdjustCursor();

                this->ClearStoragePtr();
        }

#endif
}


/* ------------------------------------------------------------------------
        TAppl::GetNewWindRect - returns the best rectangle for a new window.

        Based on the windowType passed in, this function should compute the
        best rectangle for a new window of that type.  If staggering is set
        to true, then the new window rectangle should be staggered relative
        to the previous window.
--------------------------------------------------------------------------- */
GLRect* Dramatica::GetNewWindRect(wn_type windowType, GLRect *bounds, bool_t stagger)
{
        bounds->top = 20;
        bounds->left = 20;
        bounds->bottom = 341;
        bounds->right = 512;

        return (bounds);

} /* Dramatica::GetNewWindRect */


/* ------------------------------------------------------------------------
        Init_Dramatica - initialized "C"-style story engine code.
--------------------------------------------------------------------------- */
static void Init_Dramatica()
{
        InitTempStructs();
        InitRefSC(RefSC);
} /* Init_Dramatica */


/* ------------------------------------------------------------------------
        Dramatica::close_DQSWindow_if_open - Checks to see if the DQSWindow
        is open, and if so, forces it to close.
--------------------------------------------------------------------------- */
void Dramatica::close_DQSWindow_if_open(void)
{
        DRDoc* theDoc = ((DRDoc*)GetDoc(ActiveDoc()));
        assert(theDoc);
        DQSWindow* DQSWindowPtr = theDoc->GetDQSWindow();
        if (DQSWindowPtr) {
                DQSWindowPtr->ClickCurrentQuestion();
                CloseWindow(DQSWindowPtr);
        }
} /* Dramatica::close_DQSWindow_if_open */


/* ------------------------------------------------------------------------
        get_preferences_file - Necessary code to automatically find special
        folders under System 7 (like preferences, temporary items, etc).  This
        particular function does all the hard work of locating the correct place
        to put our "Dramatica Prefs" file.  Note that this code doesn't do
        anything particularly clever for MS-WINDOWS.  (Be sure to include the
        <folders.h> header file)
--------------------------------------------------------------------------- */
pfm_fd_t Dramatica::get_preferences_file(GN_FileRef* prefFRef)
{
#if 0
#ifdef TOOLBOX
        short       prefVRefNum;
        long        prefDirID;

        FindFolder(kOnSystemDisk, _OSType("pref"), kCreateFolder, &prefVRefNum, &prefDirID);

//      WDPBRec  fPrefsWD;
        short       prefWDRefNum;
        OSErr       anyErrors;

        fPrefsWD.ioNamePtr          = 0L;
        fPrefsWD.ioVRefNum          = prefVRefNum;            /* Volume Reference Number -- usually negative */
        fPrefsWD.ioWDDirID          = prefDirID;              /* directory ID */
        fPrefsWD.ioWDProcID         = 'Dram';
```

```
        anyErrors = PBOpenWD(&fPrefsWD, 0);                    /* convert dirID to wdRefNum */
        assert(anyErrors == 0);
        prefWDRefNum = fPrefsWD.ioVRefNum;          /* return wdRefNum */

        char* prefFilename = "Dramatica Prefs";
#else
        char* prefFilename = "Dramatic.prf";
#endif
#else
        char* prefFilename = "Dramatica Prefs";
        GN_InitFileRef(prefFRef, prefFilename, PFM_READ_WRITE, DEFAULT_VOL);
#endif

//      GN_InitFileRef(prefFRef, prefFilename, PFM_READ_WRITE, prefWDRefNum);
        if (!GN_Exists(prefFRef))
                // Create if doesn't exist!
                strcpy(prefFRef->mode,PFM_OVERWRITE);
        else
                if (!PFMIsPFMFile(prefFRef)) {
                        GN_Remove(prefFRef);                                    // Corrupted
preferences file -- delete!
                        strcpy(prefFRef->mode,PFM_OVERWRITE);           // ...which in turn means we must create
a new one...
                }

        pfm_fd_t prefsFile = PFMOpenFile(prefFRef);
        if (prefsFile == PFM_NO_FILE) {
                strcpy(prefFRef->mode,PFM_OVERWRITE);
                prefsFile = PFMOpenFile(prefFRef);
                assert(prefsFile != PFM_NO_FILE);
        }
        err_t thePfmError = PFMError();

#ifdef 0
        anyErrors = PBCloseWD(&fPrefsWD, 0);                    // Close temporary working directory
        assert(anyErrors == 0);
#endif

        return (prefsFile);
} /* Dramatica::get_preferences_file */


/* --------------------------------------------------------------------------
        Dramatica::SaveWindowPosition - Get the current window position and
        size and save the desired parameters in the apporiate PText.
-------------------------------------------------------------------------- */
void Dramatica::SaveWindowPosition(PText* prefsPT, TWindow* pWindow, char* prefix)
{
        GLRect portBounds;
//      GetWindowRect(&portBounds);
        pWindow->GetWindowRect(&portBounds);
//      pWindow->OffsetRectToScreen(&portBounds);

        short len = strlen(prefix);
        char paramKey [20];
        strcpy(paramKey, prefix);
        paramKey[len+1] = 0;

        paramKey[len] = 't';                                                    //
Set Top
        prefsPT->SetParam(paramKey, 's', (short)portBounds.top);

        paramKey[len] = 'l';                                                    //
Set left
        prefsPT->SetParam(paramKey, 's', (short)portBounds.left);

        paramKey[len] = 'b';                                                    //
Set bottom
        prefsPT->SetParam(paramKey, 's', (short)portBounds.bottom);

        paramKey[len] = 'r';                                                    //
Set right
        prefsPT->SetParam(paramKey, 's', (short)portBounds.right);

} /* Dramatica::SaveWindowPosition */


/* --------------------------------------------------------------------------
        Dramatica::RestoreWindowPosition - if the user has saved a position
        in the prefs file, then restore to that position and size.
-------------------------------------------------------------------------- */
void Dramatica::RestoreWindowPosition(PText* prefsPT, TWindow* pWindow, char* prefix)
{
        GLRect portBounds;
        pWindow->GetPortRect(&portBounds);

        short len = strlen(prefix);
        char paramKey [20];
        strcpy(paramKey, prefix);
        paramKey[len+1] = 0;

        paramKey[len] = 't';                                                    //
Get Top
        prefsPT->GetParam(paramKey, 's', &portBounds.top);

        paramKey[len] = 'l';                                                    //
Get left
        prefsPT->GetParam(paramKey, 's', &portBounds.left);

        paramKey[len] = 'b';                                                    //
Get bottom
        prefsPT->GetParam(paramKey, 's', &portBounds.bottom);

        paramKey[len] = 'r';                                                    //
Get right
        pt_err theErr = prefsPT->GetParam(paramKey, 's', &portBounds.right);
        if (theErr != kParamNotFound)
                pWindow->Position((void*) &portBounds);

} /* Dramatica::RestoreWindowPosition */
```

```
#pragma segment Main

/* xxxxxxxxxxxxxxxxxxxxxxxxxxxxxxxxxxxxxxxxxxxxxxxxxxxxxxxxxxxxxxxxxxxxxxxxxx
 * $Log:          dramatic.cc,v $
Revision 1.24  93/09/24  15:30:29  stephen
On-going DQS2 development.

Revision 1.23  93/08/20  13:57:15  stephen
Temporarily turned off PFMSetCacheLimit because of NDEBUG problems.
..

Revision 1.22  93/06/23  16:27:34  stephen
I can't remember!

Revision 1.21  93/06/10  14:47:23  stephen
Made "greyed" out commands not crash.  This is a temporary fix.

Revision 1.20  93/06/04  19:55:44  stephen
Worked on auto-update of views.

Revision 1.19  93/06/03  23:14:18  stephen
Added help palettes;

Also, moved opening of StoryTbl into the application class.

Revision 1.18  93/06/01  16:17:04  stephen
Massive menu rearranging!

Revision 1.17  93/05/31  18:21:03  stephen
New Story Info cmd.

Revision 1.16  93/05/27  16:34:04  stephen
Changed initialization to move SuperClass initialization
into the Document class.

Revision 1.15  93/05/24  21:36:15  stephen
Fixes to solved unloading of segments; Also added BuildChar.

Revision 1.14  93/05/21  22:08:09  stephen
New Delete Character command.

Revision 1.13  93/05/18  20:46:05  stephen
Added Cast List View

Revision 1.12  93/05/18  11:21:31  stephen
New Characters menu & commands.

Revision 1.11  93/05/10  16:52:56  stephen
New Character-related functions.

Revision 1.10  93/05/04  21:32:07  stephen
New Outline Window.

Revision 1.9  93/05/03  16:36:35  stephen
Added StoryPnts command.

Revision 1.8  93/04/24  14:30:39  stephen
New Storypoints command...

Revision 1.7  93/04/24  09:56:31  stephen
Added new commands.

Revision 1.6  93/04/19  18:53:46  stephen
Control panel command.

Revision 1.5  93/04/13  13:03:47  stephen
More File Saving fixes...

Revision 1.4  93/04/12  20:17:20  chris
Add CPanel [D [D [D [D [D [D [Ded CPanel Window and Items.

Revision 1.3  93/04/08  14:57:45  stephen
Made next & previous buttons work, also more reliable

Revision 1.2  93/04/06  19:40:54  stephen
 [3First General Revisions

Revision 1.1  93/03/31  22:37:01  stephen
Initial revision

 */
```

```
/* ---------------------------------------------------------------------------
        DRAMATIC.H
        Dramatica Custom Application classes
        Copyright (C) 1993 Screenplay Systems Inc.
        Revised:        $Id$
--------------------------------------------------------------------------- */

#pragma once

#ifndef __DRAMATICA__
#define __DRAMATICA__

#include "tappl.h"

#include "consts.h"
#include "ptext.h"
#include "helppal.h"
#include "frontend.h"

class CastListView;
class Scrap;

#pragma segment Main

/* ---------------------------------------------------------------------------
        Dramatica - the custom application class.
--------------------------------------------------------------------------- */
class Dramatica : public TAppl {
public:
        // CONSTRUCTION/DESTRUCTION
        Dramatica(AP_AppParams *pParams, AppStatics *pStatics);
        ~Dramatica(void);

        // PUBLIC UTILITIES
        virtual char*     ClassName(void) const      { return "Dramatica"; }
        virtual class_t   ClassType(void) const      { return kDramatica; }
        virtual bool_t    IsOfType(const void *pType) const { return *(class_t*) pType == kDramatica ||
TAppl::IsOfType(pType); }

        virtual OSType*   GetDocFileTypes(void);
        virtual OSType    GetSignature(void)                 { return DRAM; }

        // PUBLIC BEHAVIOR
        virtual bool_t    IsValidCmd(cm_type cmd);
        virtual TDoc*     NewDoc(const GN_FileRef *pFileRef = NULL);
        virtual void      AboutApp(void);

        //        VARIOUS FILES / PTEXT SEGMENTS

        pfm_fd_t                GetPFMFile(void)                { return fAppPFMFile; }
        pfm_fd_t                GetCharPixFile(void)            { return fCharPixFile; }
        pfm_fd_t                GetPrefsFile(void)                      { return fPrefsFile; }
        pfm_fd_t                GetStoryTableFile(void)         { return fStoryTableFile; }

        pfm_fd_t                GetStoryHelpFile(void)          { return fStoryHelpFile; }
        void                    SetStoryHelpFile(pfm_fd_t storyHelpFile)      { fStoryHelpFile = storyHelpFile; }

        PText*                  GetPNouns(void)                 { return fPNounPT; }

        helpPalette*      GetDefinePalette(void)                                        { return
fDefinePalette; }
        void                    SetDefinePalette(helpPalette* thePalette)     { fDefinePalette = thePalette; }

        //        PREFERENCE-RELATED FUNCTIONS

        void                    SaveWindowPosition(PText* prefsPT, TWindow* pWIndow, char* prefix);
        void                    RestoreWindowPosition(PText* prefsPT, TWindow* pWIndow, char* prefix);


        //        MISCELLANEOUS POINTERS

        Scrap*                  GetScrapPtr(void)                       { return fScrapPtr; }

        //        VERSION NUMBER FUNCTIONS

        short                   GetMajorVers(void)                      { return fMajorVers; }
        short                   GetMinorVers(void)                      { return fMinorVers; }
        short                   GetMaintVers(void)                      { return fMaintVers; }
        short                   GetFileFmtVers(void)            { return fFileFmtVers; }

//      ReferenceMenu*    GetReferenceMenu(void)          { return fMenuList.Elem(fTools); }

protected:
        // DATA MEMBERS

        Scrap*                  fScrapPtr;                      // Points to our scrap class

        WDPBRec                 fPrefsWD;                       // Working directory RefNum for prefs folder
        GN_FileRef              fPrefFRef;                      // Pref file file ref

        pfm_fd_t                fAppPFMFile;            // pfm cookie to application's PFM file
        pfm_fd_t                fCharPixFile;           // pfm cookie to Character pictures database
        pfm_fd_t                fPrefsFile;                     // Dramatica Prefs / Dramatic.prf
        pfm_fd_t                fStoryTableFile;  // storytbl.pfm
        pfm_fd_t                fStoryHelpFile;         // Story Help / story.hlp

        PText*                  fPNounPT;                       // Personal Pronoun Ptext

        FEWindow*               fFEWindow;                      // Front End Window
        FrontEndView*     fFrontEndView;          // Front End View

        helpPalette*      fDefinePalette;         // Definitions help palette

        ls_index                fStoryForming;          // index to "StoryForming" menu in fMenuList
        ls_index                fCharsMenu;                     // index to "Characters" menu in fMenuList
        ls_index                fStoryTelling;          // index to "StoryTelling" menu in fMenuList
        ls_index                fTools;                         // index to "Tools" menu in fMenuList

        short                   fMajorVers;                     // Major version of this release
        short                   fMinorVers;                     // Minor version of this release
        short                   fMaintVers;                     // Maintenance version
        short                   fFileFmtVers;           // File format
```

```
        // LOCAL BEHAVIOR
        virtual GLRect*    GetNewWindRect(wn_type windowType, GLRect *bounds, bool_t stagger);
        virtual TCommand*  new_command(cm_type cmd);
        virtual void       init_app(void);
        virtual void       init_menus(void);
                           void      init_FrontEnd(void);

        void                         close_DQSWindow_if_open(void);

        pfm_fd_t                     get_preferences_file(GN_FileRef* prefFRef);

}; /* Dramatica */

/* xxxxxxxxxxxxxxxxxxxxxxxxxxxxxxxxxxxxxxxxxxxxxxxxxxxxxxxxxxxxxxxxxxxxxxxxxxxxxxx
 * $Log:          dramatic.h,v $
 * Revision 1.9  93/06/10  14:47:56  stephen
 * Made "greyed" out commands not crash.  This is a temporary fix.
 *
 * Revision 1.8  93/06/04  19:56:04  stephen
 * Worked on auto-update of views.
 *
 * Revision 1.7  93/06/03  23:14:49  stephen
 * Added help palettes;
 *
 * Also, moved opening of StoryTbl into the application class.
 *
 * Revision 1.6  93/06/01  16:17:08  stephen
 * Massive menu rearranging!
 *
 * Revision 1.5  93/05/18  11:21:40  stephen
 * New Characters menu & commands.
 *
 * Revision 1.4  93/05/10  16:53:04  stephen
 * New Character-related functions.
 *
 * Revision 1.3  93/04/24  09:56:44  stephen
 * Added new commands.
 *
 * Revision 1.2  93/04/08  14:57:49  stephen
 * More Revision.
 *
 * Revision 1.1  93/03/31  22:37:43  stephen
 * Initial revision
 *
 */

#endif /* DRAMATICA */
```

```
/* ----------------------------------------------------------------------
	DRAMATIC.R
	Dramatica's resources
	Copyright (C) 1993 Screenplay Systems Inc.
	Revised:		$Id$
------------------------------------------------------------------------- */

#ifdef macintosh
	#include "systypes.r"
	#include "types.r"
#else
	#include <systypes.r>
	#include <types.r>
#endif

#include "appreztp.r"
#include "apprez.h"
#include "drrez.h"

#ifdef macintosh
	#include "dqs2.r"
	#include "dqs-qe.r"
	#include "dqs-bg.r"
//	#include "dqs-st.r"
//	#include "dqs-du.r"
	#include "storypnt.r"
	#include "define.r"
	#include "pnouns.r"
	#include "verbs.r"
	#include "nouns.r"
	#include "ldefine.r"
	#include "context.r"
	#include "synonyms.r"
#endif

/* ----------------------------------------------------------------------
	Command ID's - duplicated in consts.h.
------------------------------------------------------------------------- */


#define rOptionsFont		(kLastAppCmd + 1)
#define rEDFilePageSetup	(kLastAppCmd + 2)

//	APPLE MENU / ABOUT APPLICATION

#define rAboutCmd			(kLastAppCmd + 3)		/* About Dramatica */

//	STORYFORMING COMMANDS

#define rQuickStoryCmd		(kLastAppCmd + 4)		/* Quick Story Command */
#define rQueryCmd			(kLastAppCmd + 5)		/* Question Command */
#define rCPanelCmd			(kLastAppCmd + 6)		/* Story Engine Command */
#define rCompileCmd			(kLastAppCmd + 7)		/* Compile Command */
#define rDramaCmd1			(kLastAppCmd + 8)		/* Create Story Table */

//	CHARACTER COMMANDS

#define rCastListCmd		(kLastAppCmd + 9)		/* Cast List Command */
#define rCreateCharCmd		(kLastAppCmd + 10)		/* Create Char Command */
#define rDelCharCmd			(kLastAppCmd + 11)		/* Delete Character Command */
#define rCharInfoCmd		(kLastAppCmd + 12)		/* Delete Character Command */
#define rBuildChrCmd		(kLastAppCmd + 13)		/* Build Characters Command */
#define rMainObstCmd		(kLastAppCmd + 14)		/* Setup Main/Obstacle Command */
#define rCastingCmd			(kLastAppCmd + 15)		/* Casting Command */

//	STORYTELLING COMMANDS

#define rSInfoCmd			(kLastAppCmd + 16)		/* Story Info Command */
#define rReportsCmd			(kLastAppCmd + 17)		/* Reports Window Command */
#define rSPCmd				(kLastAppCmd + 18)		/* Story Points Command */
#define rSViewCmd			(kLastAppCmd + 19)		/* StoryView Command */

//	TOOLS COMMANDS

//	FILE COMMANDS

#define rExportCmd			(kLastAppCmd + 20)		/* Export Command */

//	EDIT COMMANDS

#define rPrefsCmd			(kLastAppCmd + 21)		/* Preferences Command */
#define rSearchCmd			(kLastAppCmd + 22)		/* Search Command */
#define rReplaceCmd			(kLastAppCmd + 23)		/* Replace Command */
#define rSetFontCmd			(kLastAppCmd + 24)		/* Set Font Command */

//	WINDOW COMMANDS

#define rDesktopCmd			(kLastAppCmd + 25)		/* Dramatica Desktop Command */


#define rNotYetImplemented	(kLastAppCmd + 26)		/* For commands not yet implemented */


#define kCharacterIcon			128		/* character icon for query
system */
#define kPlotIcon				129		/* plot icon for query
system */
#define kStructureIcon			130		/* structure icon for query
system */
#define kStorytellingIcon		131		/* Storytelling icon for query system */
#define kQAIcon					132		/* Q & A icon for
query system */
#define kStoryDesktopIcon		133		/* Story Desktop icon for query system
*/
#define kDramaticaDesktopIcon	134		/* Dramatica Desktop icon for query
system */
#define kSpheroidDesktopIcon	135		/* Spheroid Story Desktop Icon */
#define kProseFormIcon			137		/* "Prose Form" Icon */
#define kOutlineFormIcon		138		/* "Outline Form" Icon */
#define k3x5FormIcon			139		/* 3x5 Form Icon */
#define kProseForm2Icon			140		/* "Prose Form #2" Icon */
#define kHelpIcon				141		/* Help Icon */
#define kSmallCharacterIcon		142		/* Small Character Icon */
```

```
#define kSmallPlotIcon                 143                     /* Small Plot Icon */
#define kSmallStructureIcon            144                     /* Small Structure Icon */
#define kSmallStorytellingIcon    145                    /* Small Storytelling Icon */

/* --------------------------------------------------------------------
        STR - Dramatica's english name.
---------------------------------------------------------------------- */
resource 'STR ' (rAppName, PFM_MIN_PRIO) {
        "Dramatica"
};
/* --------------------------------------------------------------------
        STR# Resources
---------------------------------------------------------------------- */
resource 'STR#' (rEDErrStrings, PFM_MIN_PRIO) {
        {
                /* 1 */  "Sorry, Dramatica doesn\'t save files.";
        }
};
resource 'STR#' (rEDMiscStrings, PFM_MIN_PRIO) {
        {
        }
};

/* --------------------------------------------------------------------
        OVERRIDING DEFAULT APPLIB MENUS
---------------------------------------------------------------------- */
resource 'MNU#' (rFileMenu, PFM_NO_KEEP) {
        "File",
        {       /* array items: 13 elements */

                        kFileNew, USE_SYS_COLOR + kMiCmdItem,
                        TextItem ( kCmdKey, "N", GL_NORMAL, "New" );
                        kFileOpen, USE_SYS_COLOR + kMiCmdItem,
                        TextItem ( kCmdKey, "O", GL_NORMAL, "Open..." );

                        NO_ID, USE_SYS_COLOR, Empty ( ); /* --------- */

                        kFileClose, USE_SYS_COLOR + kMiCmdItem,
                        TextItem ( kCmdKey, "W", GL_NORMAL, "Close" );

                        kFileSave, USE_SYS_COLOR + kMiCmdItem,
                        TextItem ( kCmdKey, "S", GL_NORMAL, "Save" );

                        kFileSaveAs, USE_SYS_COLOR + kMiCmdItem,
                        TextItem ( kNoKey, NO_CHAR, GL_NORMAL, "Save As..." );

                        kFileSaveACopy, USE_SYS_COLOR + kMiCmdItem,
                        TextItem ( kNoKey, NO_CHAR, GL_NORMAL, "Save a Copy..." );

                        rExportCmd, USE_SYS_COLOR + kMiCmdItem,
                        TextItem ( kNoKey, NO_CHAR, GL_NORMAL, "Export..." );

                        NO_ID, USE_SYS_COLOR, Empty ( ); /* --------- */

                        kFilePageSetup, USE_SYS_COLOR + kMiCmdItem,
                        TextItem ( kNoKey, NO_CHAR, GL_NORMAL, "Page Setup..." );

                        kFilePrint, USE_SYS_COLOR + kMiCmdItem,
                        TextItem ( kCmdKey, "P", GL_NORMAL, "Print..." );

                        NO_ID, USE_SYS_COLOR, Empty ( ); /* --------- */

                        kFileQuit, USE_SYS_COLOR + kMiCmdItem,
                        TextItem ( kCmdKey, "Q", GL_NORMAL, "Quit" );
        }
};

resource 'MNU#' (rEditMenu, PFM_NO_KEEP) {
        "Edit",
        {       /* array items: 6 elements */

                        kEditUndo, USE_SYS_COLOR + kMiCmdItem,
                        TextItem ( kCmdKey, "Z", GL_NORMAL, "Undo" );

                        NO_ID, USE_SYS_COLOR, Empty ( ); /* --------- */

                        kEditCut, USE_SYS_COLOR + kMiCmdItem,
                        TextItem ( kCmdKey, "X", GL_NORMAL, "Cut" );

                        kEditCopy, USE_SYS_COLOR + kMiCmdItem,
                        TextItem ( kCmdKey, "C", GL_NORMAL, "Copy" );

                        kEditPaste, USE_SYS_COLOR + kMiCmdItem,
                        TextItem ( kCmdKey, "V", GL_NORMAL, "Paste" );

                        kEditClear, USE_SYS_COLOR + kMiCmdItem,
                        TextItem ( kNoKey, NO_CHAR, GL_NORMAL, "Clear" );

                        NO_ID, USE_SYS_COLOR, Empty ( ); /* --------- */

                        kEditSelectAll, USE_SYS_COLOR + kMiCmdItem,
                        TextItem ( kCmdKey, "A", GL_NORMAL, "Select All" );

                        NO_ID, USE_SYS_COLOR, Empty ( ); /* --------- */

                        rPrefsCmd, USE_SYS_COLOR + kMiCmdItem,
                        TextItem ( kNoKey, NO_CHAR, GL_NORMAL, "Preferences..." );

                        rSearchCmd, USE_SYS_COLOR + kMiCmdItem,
                        TextItem ( kCmdKey, "G", GL_NORMAL, "Search..." );

                        rReplaceCmd, USE_SYS_COLOR + kMiCmdItem,
                        TextItem ( kCmdKey, "H", GL_NORMAL, "Replace..." );

                        NO_ID, USE_SYS_COLOR, Empty ( ); /* --------- */

                        rSetFontCmd, USE_SYS_COLOR + kMiCmdItem,
                        TextItem ( kCmdKey, "F", GL_NORMAL, "Set Font..." );
        }
};
```

```
resource 'MNU#' (rWindowMenu, PFM_NO_KEEP) {
	"Window",
	{	/* array items: 4 elements */

			kWindowTile, USE_SYS_COLOR + kMiCmdItem,
			TextItem { kNoKey, NO_CHAR, GL_NORMAL, "Tile" };

			kWindowCascade, USE_SYS_COLOR + kMiCmdItem,
			TextItem { kNoKey, NO_CHAR, GL_NORMAL, "Cascade" };
#ifdef WINDOWS

			kWindowArrIcons, USE_SYS_COLOR + kMiCmdItem,
			TextItem { kNoKey, NO_CHAR, GL_NORMAL, "Arrange Icons" };
#endif

			NO_ID, USE_SYS_COLOR, Empty { }; /* --------- */

			rDesktopCmd, USE_SYS_COLOR + kMiCmdItem,
			TextItem { kCmdKey, "1", GL_NORMAL, "Dramatica Desktop" };

	}
};


/* -------------------------------------------------------------------------
	MAIN MENUS (top of screen) Additions to Root Menu MNU# resource
------------------------------------------------------------------------- */
resource 'MNU#' (rEDRootMenu, PFM_MIN_PRIO, preload) {
	"Dramatica Root Menu",
	{	/* array items: 4 elements */
		/* [0] */
			rStoryFormingMenu, USE_SYS_COLOR + kMiMenuItem,
			TextItem { kNoKey, NO_CHAR, GL_NORMAL, "Storyforming" };
		/* [1] */
			rCharsMenu, USE_SYS_COLOR + kMiMenuItem,
			TextItem { kNoKey, NO_CHAR, GL_NORMAL, "Characters" };
		/* [2] */
			rStoryTellingMenu, USE_SYS_COLOR + kMiMenuItem,
			TextItem { kNoKey, NO_CHAR, GL_NORMAL, "Storytelling" };
		/* [3] */
			rToolsMenu, USE_SYS_COLOR + kMiMenuItem,
			TextItem { kNoKey, NO_CHAR, GL_NORMAL, "Tools" };
	}
};

/* -------------------------------------------------------------------------
	StoryForming MNU# resource
------------------------------------------------------------------------- */
resource 'MNU#' (rStoryFormingMenu, PFM_MIN_PRIO, preload) {
	"Storyforming",
	{	/* array items: 6 elements */

			rQuickStoryCmd, USE_SYS_COLOR + kMiCmdItem,
			TextItem { kNoKey, NO_CHAR, GL_NORMAL, "Quick Story..." };

			NO_ID, USE_SYS_COLOR, Empty { }; /* --------- */

			rQueryCmd, USE_SYS_COLOR + kMiCmdItem,
			TextItem { kCmdKey, "A", GL_NORMAL, "Query System..." };

			rCPanelCmd, USE_SYS_COLOR + kMiCmdItem,
			TextItem { kCmdKey, "E", GL_NORMAL, "Story Engine..." };

			NO_ID, USE_SYS_COLOR, Empty { }; /* --------- */

			rNotYetImplemented, USE_SYS_COLOR + kMiCmdItem,
			TextItem { kNoKey, NO_CHAR, GL_NORMAL, "Lock Storyform..." };

			rNotYetImplemented, USE_SYS_COLOR + kMiCmdItem,
			TextItem { kNoKey, NO_CHAR, GL_NORMAL, "Clear Storyform..." };

			NO_ID, USE_SYS_COLOR, Empty { }; /* --------- */

			rCompileCmd, USE_SYS_COLOR + kMiCmdItem,
			TextItem { kNoKey, NO_CHAR, GL_NORMAL, "Build Story Examples..." };

			rDramaCmd1, USE_SYS_COLOR + kMiCmdItem,
			TextItem { kNoKey, NO_CHAR, GL_NORMAL, "Generate Story Engine..." };

	}
};

/* -------------------------------------------------------------------------
	CHARACTER MNU# resource
------------------------------------------------------------------------- */
resource 'MNU#' (rCharsMenu, PFM_MIN_PRIO, preload) {
	"Character",
	{	/* array items: 3 element */

			rCastListCmd, USE_SYS_COLOR + kMiCmdItem,
			TextItem { kCmdKey, "L", GL_NORMAL, "Character List..." };

			NO_ID, USE_SYS_COLOR, Empty { }; /* --------- */

			rCreateCharCmd, USE_SYS_COLOR + kMiCmdItem,
			TextItem { kCmdKey, "K", GL_NORMAL, "Create..." };

			rDelCharCmd, USE_SYS_COLOR + kMiCmdItem,
			TextItem { kNoKey, NO_CHAR, GL_NORMAL, "Delete" };

			rCharInfoCmd, USE_SYS_COLOR + kMiCmdItem,
			TextItem { kNoKey, "I", GL_NORMAL, "Info..." };

			rNotYetImplemented, USE_SYS_COLOR + kMiCmdItem,
			TextItem { kNoKey, NO_CHAR, GL_NORMAL, "Picture..." };

			rNotYetImplemented, USE_SYS_COLOR + kMiCmdItem,
			TextItem { kNoKey, "T", GL_NORMAL, "Traits..." };
```

```
                NO_ID, USE_SYS_COLOR, Empty { }; /* --------- */

                rBuildChrCmd, USE_SYS_COLOR + kMiCmdItem,
                TextItem { kCmdKey, "B", GL_NORMAL, "Build Characters..." };

                rMainObstCmd, USE_SYS_COLOR + kMiCmdItem,
                TextItem { kNoKey, "M", GL_NORMAL, "Setup Main and Obstacle..." };

                rCastingCmd, USE_SYS_COLOR + kMiCmdItem,
                TextItem { kNoKey, NO_CHAR, GL_NORMAL, "Casting..." };

        }
};

/* ----------------------------------------------------------------------
        STORYTELLING MNU# resource
---------------------------------------------------------------------- */
resource 'MNU#' (rStoryTellingMenu, PFM_MIN_PRIO, preload) {
        "Storytelling",
        {
                rSInfoCmd, USE_SYS_COLOR + kMiCmdItem,
                TextItem { kNoKey, NO_CHAR, GL_NORMAL, "Story Info..." };

                NO_ID, USE_SYS_COLOR, Empty { }; /* --------- */

                rReportsCmd, USE_SYS_COLOR + kMiCmdItem,
                TextItem { kCmdKey, "R", GL_NORMAL, "Reports..." };

                rSPCmd, USE_SYS_COLOR + kMiCmdItem,
                TextItem { kNoKey, NO_CHAR, GL_NORMAL, "Story Points..." };

                rSViewCmd, USE_SYS_COLOR + kMiCmdItem,
                TextItem { kNoKey, NO_CHAR, GL_NORMAL, "StoryView..." };

                NO_ID, USE_SYS_COLOR, Empty { }; /* --------- */

                rNotYetImplemented, USE_SYS_COLOR + kMiCmdItem,
                TextItem { kNoKey, NO_CHAR, GL_NORMAL, "Clear Storytelling..." };
        }
};

/* ----------------------------------------------------------------------
        TOOLS MNU# resource
---------------------------------------------------------------------- */
resource 'MNU#' (rToolsMenu, PFM_MIN_PRIO, preload) {
        "Tools",
        {
                rNotYetImplemented, USE_SYS_COLOR + kMiCmdItem,
                TextItem { kNoKey, NO_CHAR, GL_NORMAL, "Theory Help..." };

                rNotYetImplemented, USE_SYS_COLOR + kMiCmdItem,
                TextItem { kNoKey, NO_CHAR, GL_NORMAL, "Story Examples..." };

                NO_ID, USE_SYS_COLOR, Empty { }; /* --------- */

                rNotYetImplemented, USE_SYS_COLOR + kMiCmdItem,
                TextItem { kNoKey, NO_CHAR, GL_NORMAL, "Character Generator..." };

                rNotYetImplemented, USE_SYS_COLOR + kMiCmdItem,
                TextItem { kNoKey, NO_CHAR, GL_NORMAL, "Spin-The-Model..." };

                rNotYetImplemented, USE_SYS_COLOR + kMiCmdItem,
                TextItem { kNoKey, NO_CHAR, GL_NORMAL, "It's Just Like..." };

                rNotYetImplemented, USE_SYS_COLOR + kMiCmdItem,
                TextItem { kNoKey, NO_CHAR, GL_NORMAL, "Clone..." };

        }
};

/* ----------------------------------------------------------------------
        'INFO' - Parameterized Dramatica Info type.  Contains version-specific
        parameterized data.  The version # in the 'vers' resource MUST match
        the version numbers in the INFO PText parameters.
---------------------------------------------------------------------- */
type 'INFO' {
        cstring;                /* the stream of parameterized text */
};

resource 'INFO' (0, PFM_MIN_PRIO) {
        "\\Versc:0.9ß45"
        "\\MajVers:0"
        "\\MinVers:9"
        "\\MaintVers:45"
        "\\FileFmts:1"
        "\\LongVersc:Dramatica Version 0.9ß45\nBETA VERSION -- NOT FOR RESALE"
        "\\Copyrightc:Copyright © 1993-1994\nScreenplay Systems, Inc.\nAll rights reserved."
        "\\CreditAc:Dramatica Theory developed by:\nMelanie Anne Phillips and Chris Huntley\n\nChief Software
Architect:\nStephen M. Greenfield\n"
        "\\CreditBc:Awesome C++ Class Library:\nBryan Knox, Gary W. Shaw II, Kenny Smith"
        "\\"
};

/* ----------------------------------------------------------------------
        Dramatica vers
---------------------------------------------------------------------- */
resource 'vers' (1) {
        0x00,                                               /* Major revision in
BCD     */
        0x09,                                               /* Minor revision in
BCD     */
        beta,                                               /* Release stage
                */
        0x01,                                               /* Non-final release
                */
        verUS,                                              /* Country code
                        */
        "0.9ß45",                                           /* Short version
number          */
        "0.9ß45, Copyright © 1993-1994 Screenplay Systems, Inc."
};
```

```
#ifdef macintosh /* xxxxxxxxxxxxxxxxxxxxxxxxxxxxxxxxxxxxxxxxxxxxxxxxxxxxxxxxx */

resource 'SIZE' (-1) {
	dontSaveScreen,
	acceptSuspendResumeEvents,
	enableOptionSwitch,
	canBackground,				/* we can background; we don't currently, but our sleep value */
						/* guarantees we don't hog the Mac while we are
in the background */
	multiFinderAware,			/* this says we do our own activate/deactivate; don't fake us out
*/
	backgroundAndForeground,	/* this is definitely not a background-only application! */
	dontGetFrontClicks,			/* change this is if you want "do first click" behavior like the
Finder */
	ignoreChildDiedEvents,		/* essentially, I'm not a debugger (sub-launching) */
	is32BitCompatible,
	reserved,
	reserved,
	reserved,
	reserved,
	reserved,
	reserved,
	reserved,
	3500 * 1024,				/* suggested MultiFinder partition		*/
	2700 * 1024					/* minimum allowable MultiFinder partition	*/
};

resource 'CURS' (129, PFM_MAX_PRIO) {				/* "Spinning Quad 1" */
	$"0180 0240 0420 0810 1818 2C34 566A ABD5"
	$"D5AB 6BD6 37EC 1FF8 0FF0 07E0 03C0 0180",
	$"03C0 07E0 0FF0 1FF8 3FFC 7FFE FFFF FFFF"
	$"FFFF FFFF 7FFE 3FFC 1FF8 0FF0 07E0 03C0",
	{7, 7}
};

resource 'CURS' (130, PFM_MAX_PRIO) {				/* "Spinning Quad 2" */
	$"0180 0340 06A0 0D50 1AB8 3D64 7EC2 FF81"
	$"FF81 7EC2 3D64 1AB8 0D50 06A0 0340 0180",
	$"03C0 07E0 0FF0 1FF8 3FFC 7FFE FFFF FFFF"
	$"FFFF FFFF 7FFE 3FFC 1FF8 0FF0 07E0 03C0",
	{7, 7}
};

resource 'CURS' (131, PFM_MAX_PRIO) {				/* "Spinning Quad 3" */
	$"0180 03C0 07E0 0FF0 1FF8 37EC 6BD6 D5AB"
	$"ABD5 566A 2C34 1818 0810 0420 0240 0180",
	$"03C0 07E0 0FF0 1FF8 3FFC 7FFE FFFF FFFF"
	$"FFFF FFFF 7FFE 3FFC 1FF8 0FF0 07E0 03C0",
	{7, 7}
};

resource 'CURS' (132, PFM_MAX_PRIO) {				/* "Spinning Quad 4" */
	$"0180 02C0 0560 0AB0 1D58 26BC 437E 81FF"
	$"81FF 42FE 257C 1AB8 0D50 06A0 0340 0180",
	$"03C0 07E0 0FF0 1FF8 3FFC 7FFE FFFF FFFF"
	$"FFFF FFFF 7FFE 3FFC 1FF8 0FF0 07E0 03C0",
	{7, 7}
};

resource 'CURS' (144, PFM_MAX_PRIO) {				/* "Pointing finger" */
	$"0300 0480 0480 0480 0480 0480 64F0 94AC"
	$"4CAA 240A 2402 1002 0802 0804 0404 0404",
	$"0300 0780 0780 0780 0780 0780 67F0 F7FC"
	$"7FFE 3FFE 3FFE 1FFE 0FFE 0FFC 07FC 07FC",
	{0, 6}
};

resource 'CURS' (143, PFM_MAX_PRIO) {				/* "Question Cursor" */
	$"0000 0000 0FC0 1CE0 3870 3870 00E0 01C0"
	$"0380 0380 0380 0000 0380 0380",
	$"0000 0FC0 1FE0 3FF0 7CF8 7CF8 39F0 03E0"
	$"07C0 07C0 07C0 0380 07C0 07C0 0380",
	{6, 6}
};

data 'CURS' (999, "Quote cursor") {
	$"07E0 1818 2004 4002 86C1 86C1 B481 8241"		/* .... .@.Ü¡Ü¡ÑÄÇA */
	$"4002 2004 1E38 0240 0480 0B00 1C00 3000"		/* @. ..8.@.Ä....0. */
	$"07E0 1FF8 3FFC 7FFE FFFF FFFF FFFF FFFF"		/* ....?........... */
	$"7FFE 3FFC 1FF8 03C0 0780 0F00 1C00 3000"		/* ..?....¿.Ä....0. */
	$"0007 0008"						/* .... */
};


/* ----------------------------------------------------------------------
	Application Icon (ICN# 128) resource.
	Application Color Icon (icl8 128) resource.
	Document Icon (ICN# 129) resource.
	Document Color Icon (icl8 129) resource.
---------------------------------------------------------------------- */

resource 'BNDL' (169) {
	'Dram',
	0,
	{		/* array TypeArray: 2 elements */
		/* [1] */
		'ICN#',
		{	/* array IDArray: 2 elements */
			/* [1] */
			0, 169,
			/* [2] */
			1, 170
		},
		/* [2] */
		'FREF',
		{	/* array IDArray: 2 elements */
			/* [1] */
			0, 169,
			/* [2] */
			1, 170
```

```
                        }
            }
};

data 'Dram' (0) {
            $"00"                                                    /* . */
};

resource 'FREF' (169) {
            'APPL',
            0,
            ""
};

resource 'FREF' (170) {
            'DRST',
            1,
            ""
};

resource 'icl4' (169) {
            $"0000 0000 0000 0000 0000 0000 0000 0000"
            $"0FFF FFFF FFFF 3290 08F9 FFFF FFFF FFF0"
            $"0FFF FFFF FFA2 3890 0998 88FF FFFF FFF0"
            $"0FFF FFFF 2A3A 8880 0888 8888 FFFF FFF0"
            $"0FFF FFFA AAA8 8880 0888 8899 9FFF FFF0"
            $"0FFF FF2A AA89 8880 0889 9989 88FF FFF0"
            $"0FFF FFBA AA88 8880 0899 8888 999F FFF0"
            $"0FFF B3A3 AA88 8880 0899 9988 9899 FFF0"
            $"0FFF AA3A F888 8880 0999 8998 8888 8FF0"
            $"0FF2 AAB9 F898 FFF0 0F88 8988 8888 89F0"
            $"0FFA 3ABA A89F F330 0333 8812 8E98 88F0"
            $"0F2A AA3A AAC5 5330 0333 3982 AAA8 88F0"
            $"0FAA AAAA AA99 9930 0333 39EB 2222 8890"
            $"0F2A FAA3 AD96 6660 0333 3EED 2222 2880"
            $"0AAA 3A3A DEEE EFE0 0333 EEAE 2222 2880"
            $"0233 AAAA EEFE E6E0 033A EEAA 2222 2290"
            $"0000 0000 0000 0000 0000 0000 0000 0000"
            $"0CAA EA3A EAEE 6660 0EEE EAFF 2E2E 2E20"
            $"062A A2A3 AAFF FEE0 0EEE AAFF EAA3 2220"
            $"0663 AAAA AEAA EAA0 0EEE AFFA 3332 2320"
            $"0F63 AAA3 EAAA AEA0 0AAA AFFA 2222 2A20"
            $"0F63 2A23 3EAA EAA0 0FAF FFFA 1222 2BF0"
            $"0F66 23A3 2FFA AAE0 0FFF FFA3 3222 2AF0"
            $"0FF6 6322 22EF FAA0 0AFF FAFA AA21 18F0"
            $"0FF6 6666 6666 FEA0 0FFF FE6E AAB2 AFF0"
            $"0FFF 6666 6666 E6A0 0FFE 767A AA32 AFF0"
            $"0FFF 6666 6666 6660 0666 666F FA2A FFF0"
            $"0FFF F666 6666 6660 0666 67FF FAAF FFF0"
            $"0FFF FF66 6666 6660 0666 E6FF AAFF FFF0"
            $"0FFF FFF9 6666 6660 066E 66AB AFFF FFF0"
            $"0FFF FFFF F66E E6E0 0EE6 EBAA FFFF FFF0"
};

resource 'icl4' (170) {
            $"FFFF FFFF FFFF FFFF FFFF F000 0000 0000"
            $"FDDF FFFF FFFF FFFF FFFF FFF0 0000 0000"
            $"FDDF CCFF FFFF FFFF FFFF FFFF FF00 0000"
            $"FDDF CCFC CCCC CCCC CCCC CCCC CFF0 0000"
            $"FDDF CCFC CCCC CCCC CCCC CCCC CF0F 0000"
            $"FDDF CCFC CCCC CCCC CCCC CCCC CF00 F000"
            $"FDDF CCFC CCCC CCCC CCCC CCCC CF00 0F00"
            $"FDDF CCFC CCCC CCCC CCCC CCCC CF00 00F0"
            $"FDDF CCFC CCCC CCCC FFFF FCCC CFFF FFFF"
            $"FDDF CCFC CCCC CFFF FFFF FFFC CCCC CCCF"
            $"FDDF CCFC CCCF FCCC CCCC FFFF CCCC CCCF"
            $"FDDF CCFC CCCF CCCC CCCC CCFF FCCC CCCF"
            $"FDDF CCFC CCFC CCCC CFCC CCCF FFCC CCCF"
            $"FDDF CCFC CCFC CCCC CFCC CCCC FFFC CCCF"
            $"FDDF CCFC CCFC CCCC CFCC CCCC CFFC CCCF"
            $"FDDF CCFC CCFC CCCC CFCC CCCC CCFF CCCF"
            $"FDDF CCFC CCFC CCCC FFFC CCCC CCFF CCCF"
            $"FDDF CCFC CCCF CCCC CFFC CCCC CCFF CCCF"
            $"FDDF CCFC CCCF FCCC FFCC CCCC CCCF CCCF"
            $"FDDF CCFC CCCC CFFF CFCC CCCC CCCF CCCF"
            $"FDDF CCFC CCCC CCCC CFCC CCCC CCCF CCCF"
            $"FDDF CCFC CCCC CCCC CFCC CCCC CCCF CCCF"
            $"FDDF CCFC CCCC CFFC CFCC CCCC CCFC CCCF"
            $"FDDF CCFC CCCC FFFF FFCC CCCC CCFC CCCF"
            $"FDDF CCFC CCCF CCCF FFFF FCCC FFCC CCCF"
            $"FDDF CCFC CCCC CCCC CFFF FFFF CCCC CCCF"
            $"FDDF CCFC CCCC CCCC CFCC CCCC CCCC CCCF"
            $"FDDF CCFC CCCC CCCC CFCC CCCC CCCC CCCF"
            $"FDDF CCFC CCCC CCCC CCCC CCCC CCCC CCCF"
            $"FFFF CCFC CCCC CCCC CCCC CCCC CCCC CCCF"
            $"000F FFFC CCCC CCCC CCCC CCCC CCCC CCCF"
            $"0000 00FF FFFF FFFF FFFF FFFF FFFF FFFF"
};

resource 'icl8' (169) {
            $"0000 0000 0000 0000 0000 0000 0000 0000"
            $"0000 0000 0000 0000 0000 0000 0000 0000"
            $"00FF FFFF FFFF FFFF FFFF FFFF DB1D E700"
            $"00E4 E9E6 FFFF FFFF FFFF FFFF FFFF FF00"
            $"00FF FFFF FFFF FFFF FFFF 891D DBE2 E500"
            $"00E6 E6E4 E2E2 FFFF FFFF FFFF FFFF FF00"
            $"00FF FFFF FFFF FFFF 1D65 DBDC E3E2 E300"
            $"00E2 E4E2 E2E2 E2E2 FFFF FFFF FFFF FF00"
            $"00FF FFFF FFFF FFAD 898F 8FE4 E3E2 E200"
            $"00E2 E2E2 E4E4 E5E7 E6FF FFFF FFFF FF00"
            $"00FF FFFF FFFF 1D89 AD89 E3E5 E3E2 E200"
            $"00E2 E2E6 E6E7 E4E6 E4E3 FEFF FFFF FF00"
            $"00FF FFFF FFB3 82AD ADAD E3E3 E3E3 E200"
            $"00E4 E6E6 E4E4 E4E4 E5E7 E8FF FFFF FF00"
            $"00FF FFFF 58D8 ADD8 AD89 E2E2 E2E2 E200"
            $"00E4 E6E7 E6E6 E4E4 E7E3 E6E5 FFFF FF00"
            $"00FF FFFF ADAD D889 FFE2 E4E2 E2E2 E300"
            $"00E5 E6E7 E3E6 E6E4 E4E4 E2E2 E4FF FF00"
            $"00FF FF1D 8F89 82A7 FFE2 E5E4 FFFF FF00"
            $"00FF E4E4 E4E6 E2E2 E2E2 E2E2 E4E6 FF00"
            $"00FF FFDC DB8F 82DE 83E2 E7FF FF22 D700"
            $"00D8 D8D8 E2E1 4D11 E2FC E5E2 E3E4 FF00"
```

```
        $"00FF 1DDD DCDD DAAD 89DD F786 A3D7 D800"
        $"00D9 D8D9 D9C9 A011 6589 89E2 E2E3 FF00"
        $"00FF DEDE DE89 89AD 8989 C8C8 C8C8 D800"
        $"00D9 D9DA DAC9 FB2E 1111 1111 E3E4 E600"
        $"00FF 1DDC B389 89DA DEF9 C8CE CECE CE00"
        $"00DA DADA DAA6 FBFA 1135 3B3B 3BE4 E400"
        $"00DD DCDC DADE DADD FACF CFCF CFD5 CF00"
        $"00DA DADA FBFB FDA6 113B 3B3B 3BBE E400"
        $"001D DBDA DDDE DEDD FBFB D5CF CFCE CF00"
        $"00DA DADC FCFC FD89 173B 3B3B 3B35 E500"
        $"0000 0000 0000 0000 0000 0000 0000 0000"
        $"0000 0000 0000 0000 0000 0000 0000 0000"
        $"00F8 8F8F FB8F DA8F FC8F FBFC CDCD CD00"
        $"00FC FCFC FCFD FEFE 17FB 17FC 17FC 1700"
        $"00CD 1DDC DE1D DEDA FDFD F2F2 F2FC CF00"
        $"00FC FCFC FDFD FEFE AC65 6541 173B 1700"
        $"00CD CEDA DDDE DE89 FDFB FDFD FB83 8900"
        $"00FC FCFC FDFE FEAD 4141 4111 1141 1700"
        $"00FF CEDA DCDE DCDA FCFD FDFD FD88 8300"
        $"00FD FDFD FDFE FE89 3B3B 1111 1165 1700"
        $"00FF CEDB 1DDE 1DDB DAFC FDFD 8883 8300"
        $"00FF FDFE FEFE FE83 0B11 1111 115F FF00"
        $"00FF CDCE 1DDA DEDA 1DFE F2FD FD89 FC00"
        $"00FF FEFE FEFE FD41 4111 1111 1183 FF00"
        $"00FF E0CD CDDA 1D1D 1D1D FCFE FEAD AD00"
        $"00FD FEFE FEFD B289 8965 3B05 0B7D FF00"
        $"00FF FFCE CECD CDCE CDCC C7EF F2FC FD00"
        $"00FE FEFE FECF C6FC AD89 5F11 83FF FF00"
        $"00FF FFFF CECE CECD CDCD C6C6 CFF0 FD00"
        $"00FF F2CF A2C6 B4FD FD89 4135 89FF FF00"
        $"00FF FFFF CECE CECE CDCD CDC7 C6C6 C600"
        $"00C6 C6C6 C6CD C6FE FE89 3B83 FFFF FF00"
        $"00FF FFFF FFCE CECE CECE CECD CDC7 C600"
        $"00C6 C6CD CEB4 FEFE DFAD 89FF FFFF FF00"
        $"00FF FFFF FFFF CECE CECE CECE CECD CD00"
        $"00CE CECE CFC6 FEDF 6589 FFFF FFFF FF00"
        $"00FF FFFF FFFF FFD0 CECE CECE CECE CE00"
        $"00CE CECF C6C6 895F 89FF FFFF FFFF FF00"
        $"00FF FFFF FFFF FFFF FFCE CECF CFCE CF00"
        $"00CF CFC6 FB5F 8989 FFFF FFFF FFFF FF"
};

resource 'icl8' (170) {
        $"FFFF FFFF FFFF FFFF FFFF FFFF FFFF FFFF"
        $"FFFF FFFF FF00 0000 0000 0000 0000 0000"
        $"FF7F 7FFF FFFF FFFF FFFF FFFF FFFF FFFF"
        $"FFFF FFFF FFFF FF00 0000 0000 0000 0000"
        $"FF7F 7FFF 5454 FFFF FFFF FFFF FFFF FFFF"
        $"FFFF FFFF FFFF FFFF FFFF 0000 0000 0000"
        $"FF7F 7FFF 5454 FF2A 2A2A 2A2A 2A2A 2A2A"
        $"2A2A 2A2A 2A2A 2A2A 2AFF FF00 0000 0000"
        $"FF7F 7FFF 5454 FF2A 2A2A 2A2A 2A2A 2A2A"
        $"2A2A 2A2A 2A2A 2A2A 2AFF 48FF 0000 0000"
        $"FF7F 7FFF 5454 FF2A 2A2A 2A2A 2A2A 2A2A"
        $"2A2A 2A2A 2A2A 2A2A 2AFF 4848 FF00 0000"
        $"FF7F 7FFF 5454 FF2A 2A2A 2A2A 2A2A 2A2A"
        $"2A2A 2A2A 2A2A 2A2A 2AFF 4848 48FF 0000"
        $"FF7F 7FFF 5454 FF2A 2A2A 2A2A 2A2A 2A2A"
        $"2A2A 2A2A 2A2A 2A2A 2AFF 4848 4848 FF00"
        $"FF7F 7FFF 5454 FF2A 2A2A 2A2A 2A2A 2A2A"
        $"6969 6969 692A 2A2A 2AFF FFFF FFFF FFFF"
        $"FF7F 7FFF 5454 FF2A 2A2A 2A2A 2A69 6969"
        $"6969 6969 6969 692A 2A2A 2A2A 2A2A 2AFF"
        $"FF7F 7FFF 5454 FF2A 2A2A 2A69 692A 2A2A"
        $"2A2A 2A2A 6969 6969 2A2A 2A2A 2A2A 2AFF"
        $"FF7F 7FFF 5454 FF2A 2A2A 2A69 2A2A 2A2A"
        $"2A2A 2A2A 2A2A 6969 692A 2A2A 2A2A 2AFF"
        $"FF7F 7FFF 5454 FF2A 2A2A 692A 2A2A 2A2A"
        $"2A69 2A2A 2A2A 2A69 6969 2A2A 2A2A 2AFF"
        $"FF7F 7FFF 5454 FF2A 2A2A 692A 2A2A 2A2A"
        $"2A69 2A2A 2A2A 2A2A 6969 692A 2A2A 2AFF"
        $"FF7F 7FFF 5454 FF2A 2A2A 692A 2A2A 2A2A"
        $"2A69 2A2A 2A2A 2A2A 2A69 692A 2A2A 2AFF"
        $"FF7F 7FFF 5454 FF2A 2A2A 692A 2A2A 2A2A"
        $"2A69 2A2A 2A2A 2A2A 2A2A 6969 2A2A 2AFF"
        $"FF7F 7FFF 5454 FF2A 2A2A 692A 2A2A 2A2A"
        $"6969 692A 2A2A 2A2A 2A2A 6969 2A2A 2AFF"
        $"FF7F 7FFF 5454 FF2A 2A2A 2A69 2A2A 2A2A"
        $"2A69 692A 2A2A 2A2A 2A2A 6969 2A2A 2AFF"
        $"FF7F 7FFF 5454 FF2A 2A2A 2A69 692A 2A2A"
        $"6969 2A2A 2A2A 2A2A 2A2A 2A69 2A2A 2AFF"
        $"FF7F 7FFF 5454 FF2A 2A2A 2A2A 2A69 6969"
        $"2A69 2A2A 2A2A 2A2A 2A2A 2A69 2A2A 2AFF"
        $"FF7F 7FFF 5454 FF2A 2A2A 2A2A 2A2A 2A2A"
        $"2A69 2A2A 2A2A 2A2A 2A2A 2A69 2A2A 2AFF"
        $"FF7F 7FFF 5454 FF2A 2A2A 2A2A 2A2A 2A2A"
        $"2A69 2A2A 2A2A 2A2A 2A2A 2A69 2A2A 2AFF"
        $"FF7F 7FFF 5454 FF2A 2A2A 2A2A 2A69 692A"
        $"2A69 2A2A 2A2A 2A2A 2A2A 692A 2A2A 2AFF"
        $"FF7F 7FFF 5454 FF2A 2A2A 2A2A 6969 6969"
        $"6969 2A2A 2A2A 2A2A 2A2A 692A 2A2A 2AFF"
        $"FF7F 7FFF 5454 FF2A 2A2A 2A69 2A2A 2A69"
        $"6969 6969 692A 2A2A 6969 2A2A 2A2A 2AFF"
        $"FF7F 7FFF 5454 FF2A 2A2A 2A2A 2A2A 2A2A"
        $"2A69 6969 6969 6969 2A2A 2A2A 2A2A 2AFF"
        $"FF7F 7FFF 5454 FF2A 2A2A 2A2A 2A2A 2A2A"
        $"2A69 2A2A 2A2A 2A2A 2A2A 2A2A 2A2A 2AFF"
        $"FF7F 7FFF 5454 FF2A 2A2A 2A2A 2A2A 2A2A"
        $"2A69 2A2A 2A2A 2A2A 2A2A 2A2A 2A2A 2AFF"
        $"FF7F 7FFF 5454 FF2A 2A2A 2A2A 2A2A 2A2A"
        $"2A2A 2A2A 2A2A 2A2A 2A2A 2A2A 2A2A 2AFF"
        $"FFFF FFFF 5454 FF2A 2A2A 2A2A 2A2A 2A2A"
        $"2A2A 2A2A 2A2A 2A2A 2A2A 2A2A 2A2A 2AFF"
        $"0000 00FF FFFF FF2A 2A2A 2A2A 2A2A 2A2A"
        $"2A2A 2A2A 2A2A 2A2A 2A2A 2A2A 2A2A 2AFF"
        $"0000 0000 0000 FFFF FFFF FFFF FFFF FFFF"
        $"FFFF FFFF FFFF FFFF FFFF FFFF FFFF FFFF"
};

resource 'icm#' (169) {
        {       /* array: 2 elements */
                /* [1] */
                $"810F C13F C17F E17F F1FF FDFF 0000 FF3F"
```

```
		$"FF1F FF0F FD0F F907",
		/* [2] */
		$"FFFF FFFF FFFF FFFF FFFF FFFF FFFF FFFF"
		$"FFFF FFFF FFFF FFFF"
	}
};

resource 'icm#' (170) {
	{	/* array: 2 elements */
		/* [1] */
		$"FFF8 0014 0F12 3491 445F 8821 8821 8821"
		$"7221 1C41 1181 3E01",
		/* [2] */
		$"FFF8 FFFC FFFE FFFF FFFF FFFF FFFF FFFF"
		$"FFFF FFFF FFFF FFFF"
	}
};

resource 'icm4' (169) {
	$"AAAC 5533 0333 3982 AAA9 9993 0333 39EB"
	$"3AD9 6666 0333 3EED ADEE EEFE 0333 EEAE"
	$"AEEF EE6E 033A EEAA 0000 0000 0000 0000"
	$"AEAE E666 0EEE EAFF 3AAF FFEE 0EEE AAFF"
	$"AAEA AEAA 0EEE AFFA 3EAA AAEA 0AAA AFFA"
	$"33EA AEAA 0FAF FFFA 32FF AAAE 0FFF FFA3"
};

resource 'icm4' (170) {
	$"FFFF FFFF FFFF F000 CCCC CCCC CCCF 0F00"
	$"CCCC FFFF CCCF 00F0 CCFF CFCC FCCF 000F"
	$"CFCC CFCC CFCF FFFF FCCC FCCC CCFC CCCF"
	$"FCCC FCCC CCFC CCCF FCCC FCCC CCFC CCCF"
	$"CFFF CCFC CCFC CCCF CCCF FFCC CFCC CCCF"
	$"CCCF CCCF FCCC CCCF CCFF FFFC CCCC CCCF"
};

resource 'icm8' (169) {
	$"AD89 DDF7 86A3 D7D8 00D9 D8D9 D9C9 A011"
	$"AD89 89C8 C8C8 C8D8 00D9 D9DA DAC9 FB2E"
	$"DADE F9C8 CECE CECE 00DA DADA DAA6 FBFA"
	$"DDFA CFCF CFCF D5CF 00DA DADA FBFB FDA6"
	$"DDFB FBD5 CFCF CECF 00DA DADC FCFC FD89"
	$"0000 0000 0000 0000 0000 0000 0000 0000"
	$"8FFC 8FFB FCCD CDCD 00FC FCFC FCFD FEFE"
	$"DAFD FDF2 F2F2 FCCF 00FC FCFC FDFD FEFE"
	$"89FD FBFD FDFB 8389 00FC FCFC FDFE FEAD"
	$"DAFC FDFD FDFD 8883 00FD FDFD FDFE FE89"
	$"DBDA FCFD FD88 8383 00FF FDFE FEFE FE83"
	$"DA1D FEF2 FDFD 89FC 00FF FEFE FEFE FD41"
};

resource 'icm8' (170) {
	$"ECEC ECEC ECEC ECEC ECEC ECEC EC00 0000"
	$"2A2A 2A2A 2A2A 2A2A 2A2A 2AEC 48EC 0000"
	$"2A2A 2A2A 6969 6969 2A2A 2AEC 4848 EC00"
	$"2A2A 6969 2A69 2A2A 692A 2AEC 4848 48EC"
	$"2A69 2A2A 2A69 2A2A 2A69 2AEC ECEC ECEC"
	$"692A 2A2A 692A 2A2A 2A2A 692A 2A2A 2AEC"
	$"692A 2A2A 692A 2A2A 2A2A 692A 2A2A 2AEC"
	$"692A 2A2A 692A 2A2A 2A2A 692A 2A2A 2AEC"
	$"2A69 6969 2A2A 692A 2A2A 692A 2A2A 2AEC"
	$"2A2A 2A69 6969 2A2A 2A69 2A2A 2A2A 2AEC"
	$"2A2A 2A69 2A2A 2A69 692A 2A2A 2A2A 2AEC"
	$"2A2A 6969 6969 692A 2A2A 2A2A 2A2A 2AEC"
};

resource 'ICN#' (169) {
	{	/* array: 2 elements */
		/* [1] */
		$"FFFF FFFF 807C 8001 81F0 8001 83E0 8001"
		$"87E0 8001 8FC0 8001 9FC0 8001 BFC0 8001"
		$"BFC0 8001 FFC0 8001 FFC0 87E1 FFE0 9FF9"
		$"FFE0 BFFD FFF0 BFFD FFF8 FFFF FFFE FFFF"
		$"8000 0001 BFFF 9FFF BFFF 8FFF 9FFF 87FF"
		$"DFFE 87FF CFFC 83FF C3F0 83FF E000 83FF"
		$"F000 83FF F000 83FF F800 83FF FC00 87FF"
		$"FF00 87FF FF80 8FFF FFF0 BFFF FFFF FFFF",
		/* [2] */
		$"FFFF FFFF FFFF FFFF FFFF FFFF FFFF FFFF"
		$"FFFF FFFF FFFF FFFF FFFF FFFF FFFF FFFF"
		$"FFFF FFFF FFFF FFFF FFFF FFFF FFFF FFFF"
		$"FFFF FFFF FFFF FFFF FFFF FFFF FFFF FFFF"
		$"FFFF FFFF FFFF FFFF FFFF FFFF FFFF FFFF"
		$"FFFF FFFF FFFF FFFF FFFF FFFF FFFF FFFF"
		$"FFFF FFFF FFFF FFFF FFFF FFFF FFFF FFFF"
		$"FFFF FFFF FFFF FFFF FFFF FFFF FFFF FFFF"
	}
};

resource 'ICN#' (170) {
	{	/* array: 2 elements */
		/* [1] */
		$"FFFF F800 9FFF FE00 93FF FFC0 9200 0060"
		$"9200 0050 9200 0048 9200 0044 9200 0042"
		$"9200 F87F 9207 FE01 9218 0F01 9210 0381"
		$"9220 41C1 9220 40E1 9220 4061 9220 4031"
		$"9220 E031 9210 6031 9218 C011 9207 4011"
		$"9200 4011 9200 4011 9206 4021 920F C021"
		$"9211 F8C1 9200 7F01 9200 4001 9200 4001"
		$"9200 0001 F200 0001 1E00 0001 03FF FFFF",
		/* [2] */
		$"FFFF F800 FFFF FE00 FFFF FFC0 FFFF FFE0"
		$"FFFF FFF0 FFFF FFF8 FFFF FFFC FFFF FFFE"
		$"FFFF FFFF FFFF FFFF FFFF FFFF FFFF FFFF"
		$"FFFF FFFF FFFF FFFF FFFF FFFF FFFF FFFF"
		$"FFFF FFFF FFFF FFFF FFFF FFFF FFFF FFFF"
		$"FFFF FFFF FFFF FFFF FFFF FFFF FFFF FFFF"
		$"FFFF FFFF FFFF FFFF FFFF FFFF FFFF FFFF"
		$"FFFF FFFF FFFF FFFF 1FFF FFFF 03FF FFFF"
	}
};

resource 'ics#' (169) {
```

```
	{	/* array: 2 elements */
		/* [1] */
		$"FFFF 3E01 0F81 07C1 07E1 03F1 03F9 03FD"
		$"03FD 03FF 03FF 07FF 07FF 0FFF 1FFF 7FFF",
		/* [2] */
		$"FFFF FFFF FFFF FFFF FFFF FFFF FFFF FFFF"
		$"FFFF FFFF FFFF FFFF FFFF FFFF FFFF FFFF"
	}
};

resource 'ics#' (170) {
	{	/* array: 2 elements */
		/* [1] */
		$"FFE0 FFFC C00E C00F C1EF C691 C889 D105"
		$"D105 D105 CE45 C389 C231 C7C1 4001 7FFF",
		/* [2] */
		$"FFE0 FFFC FFFE FFFF FFFF FFFF FFFF FFFF"
		$"FFFF FFFF FFFF FFFF FFFF FFFF 7FFF 7FFF"
	}
};

resource 'ics4' (169) {
	$"9F89 8FFF 0F88 8988 AA89 FF33 0333 8812"
	$"AAAC 5533 0333 3982 AAA9 9993 0333 39EB"
	$"3AD9 6666 0333 3EED ADEE EEFE 0333 EEAE"
	$"AEEF EE6E 033A EEAA 0000 0000 0000 0000"
	$"AEAE E666 0EEE EAFF 3AAF FFEE 0EEE AAFF"
	$"AAEA AEAA 0EEE AFFA 3EAA AAEA 0AAA AFFA"
	$"33EA AEAA 0FAF FFFA 32FF AAAE 0FFF FFA3"
	$"222E FFAA 0AFF FAFA 6666 6FEA 0FFF FE6E"
};

resource 'ics4' (170) {
	$"FFFF FFFF FFF0 0000 FFFF FFFF FFFF FF00"
	$"FFCC CCCC CCCC F0F0 FFCC CCCC CCCC F00F"
	$"FFCC CCCF FFFC FFFF FFCC CFFC FCCF CCCF"
	$"FFCC FCCC FCCC FCCF FFCF CCCF CCCC CFCF"
	$"FFCF CCCF CCCC CFCF FFCF CCCF CCCC CFCF"
	$"FFCC FFFC CFCC CFCF FFCC CCFF FCCC FCCF"
	$"FFCC CCFC CCFF CCCF FFCC CFFF FFCC CCCF"
	$"0FCC CCCC CCCC CCCF 0FFF FFFF FFFF FFFF"
};

resource 'ics8' (169) {
	$"A7FF E2E5 E4FF FFFF 00FF E4E4 E4E6 E2E2"
	$"DE83 E2E7 FFFF 22D7 00D8 D8D8 E2E1 4D11"
	$"AD89 DDF7 86A3 D7D8 00D9 D8D9 D9C9 A011"
	$"AD89 89C8 C8C8 C8D8 00D9 D9DA DAC9 FB2E"
	$"DADE F9C8 CECE CECE 00DA DADA DAA6 FBFA"
	$"DDFA CFCF CFCF D5CF 00DA DADA FBFB FDA6"
	$"DDFB FBD5 CFCF CECF 00DA DADC FCFC FD89"
	$"0000 0000 0000 0000 0000 0000 0000 0000"
	$"8FFC 8FFB FCCD CDCD 00FC FCFC FCFD FEFE"
	$"DAFD FDF2 F2F2 FCCF 00FC FCFC FDFD FEFE"
	$"89FD FBFD FDFB 8389 00FC FCFC FDFE FEAD"
	$"DAFC FDFD FDFD 8883 00FD FDFD FDFE FE89"
	$"DBDA FCFD FD88 8383 00FF FDFE FEFE FE83"
	$"DA1D FEF2 FDFD 89FC 00FF FEFE FEFE FD41"
	$"1D1D 1DFC FEFE ADAD 00FD FEFE FEFD B289"
	$"CECD CCC7 EFF2 FCFD 00FE FEFE FECF C6FC"
};

resource 'ics8' (170) {
	$"B0B0 B0B0 B0B0 B0B0 B0B0 B000 0000 0000"
	$"B0EC ECEC ECEC ECEC ECEC ECEC 7FEC 0000"
	$"B0EC 2A2A 2A2A 2A2A 2A2A 2A2A 7F48 EC00"
	$"B0EC 2A2A 2A2A 2A2A 2A2A 2A2A 7F48 48EC"
	$"B0EC 2A2A 2A2A 2A69 6969 692A 7F7F 7F7F"
	$"B0EC 2A2A 2A69 692A 692A 2A69 2A2A 2AEC"
	$"B0EC 2A2A 692A 2A2A 692A 2A2A 692A 2AEC"
	$"B0EC 2A69 2A2A 2A69 2A2A 2A2A 2A69 2AEC"
	$"B0EC 2A69 2A2A 2A69 2A2A 2A2A 2A69 2AEC"
	$"B0EC 2A69 2A2A 2A69 2A2A 2A2A 2A69 2AEC"
	$"B0EC 2A2A 6969 692A 2A69 2A2A 2A69 2AEC"
	$"B0EC 2A2A 2A2A 6969 692A 2A2A 692A 2AEC"
	$"B0EC 2A2A 2A2A 692A 2A2A 6969 2A2A 2AEC"
	$"B0EC 2A2A 2A69 6969 6969 2A2A 2A2A 2AEC"
	$"00EC 2A2A 2A2A 2A2A 2A2A 2A2A 2A2A 2AEC"
	$"00EC ECEC ECEC ECEC ECEC ECEC ECEC ECEC"
};

data 'iSNP' (169) {
	$"0000"								/* .. */
};

data 'iSNP' (170) {
	$"0000"								/* .. */
};


/* ------------------------------------------------------------------------
	Character Icon (ICON) resource.
------------------------------------------------------------------------ */
resource 'ICON' (128) {
	$"0000 0000 0000 0000 0000 0000 0000 0000"
	$"0000 0000 0003 E000 0007 F000 000F F800"
	$"001F FC00 001F FC00 001F FC00 003F FE00"
	$"003F FE00 003F FE00 003F FE00 003F FE00"
	$"003F FE00 001F FC00 001F FC00 001F FC00"
	$"000F F800 0007 F000 001F FC00 01FF FFC0"
	$"07FF FFF0 0FFF FFF8 0FFF FFF8 1FFF FFFC"
	$"1FFF FFFC 1FFF FFFC 1FFF FFFC"
};

/* ------------------------------------------------------------------------
	Plot Icon (ICON) resource.
------------------------------------------------------------------------ */
resource 'ICON' (129) {
	$"0000 0000 0000 0000 0780 0000 0840 0000"
	$"1320 0000 17B0 0000 17BC 0000 132C E000"
	$"0840 E700 0780 0770 0000 0070 0000 0070"
	$"0000 01E0 0000 0180 0000 0C00 0000 0C00"
```

```
        $"0000 C000 0001 C000 0009 0000 0038 0000"
        $"0030 0000 0180 0020 0198 0070 009E 0070"
        $"0006 70F8 0000 73F8 0000 03FC 0000 01FC"
        $"0000 03F0 0000 0780"
};

/* ------------------------------------------------------------------------
        Structure Icon (ICON) resource.
------------------------------------------------------------------------ */
resource 'ICON' (130) {
        $"0000 3000 0001 CE00 000E 1180 0070 0060"
        $"0380 101C 1C00 0002 6000 101E 5800 00E2"
        $"4600 1782 4100 3A62 43E1 D01E 5C9E B88A"
        $"6008 101E 5A2A 22E2 4608 1F02 4188 BB82"
        $"4079 D8E2 43BE 223E 5C88 988A 622A 223E"
        $"5888 98E2 462A 2F02 4188 BD82 407B EAE2"
        $"43DF 555E 5EAA AAAA 755D 555C 1AAA AAE0"
        $"075D 5700 01AA B800 007D C000 001E"
};

/* ------------------------------------------------------------------------
        Storytelling Icon (ICON) resource.
------------------------------------------------------------------------ */
resource 'ICON' (131) {
        $"07FF FFE0 1800 0018 6E00 0006 5600 0002"
        $"AA00 0001 D600 0001 FE98 0002 02A4 0004"
        $"04A4 0008 0908 0008 0909 9CD0 0912 A110"
        $"10EC 9FA0 1000 0020 1000 0020 14B6 A3A0"
        $"253A C540 2765 4740 2080 0040 2084 0040"
        $"4105 0080 4008 F080 47FF FFE0 9C00 0018"
        $"FE00 0006 FE00 0002 8100 0001 8144 4441"
        $"4200 0002 6611 1116 1800 0018 07FF FFE0"
};

/* ------------------------------------------------------------------------
        Q/A Icon (ICON) resource.
------------------------------------------------------------------------ */
resource 'ICON' (132) {
        $"0000 0000 0000 0000 07C0 4300 1870 4380"
        $"1030 8580 3018 8580 3018 88C0 3019 0FC0"
        $"3019 08C0 1811 1060 1C32 1060 07C2 38F0"
        $"0180 0000 00E0 0000 003C 0000 0000 0000"
        $"FFFF FFFF 0000 0000 FFFF FFFF FFFF FFFF"
        $"FFFF FFFF FFFF FFFF FFFF FFFF FFFF FFFF"
        $"FFFF FFFF FFFF FFFF FFFF FFFF FFFF FFFF"
        $"FFFF FFFF FFFF FFFF FFFF FFFF FFFF FFFF"
};

/* ------------------------------------------------------------------------
        Story Desktop Icon (ICON) resource.
------------------------------------------------------------------------ */
resource 'ICON' (133) {
        $"0000 0000 0000 0000 0000 0000 0000 0000"
        $"0000 0000 0000 0000 0000 0000 0000 0000"
        $"0000 0000 01FE FF80 0356 FF80 02AA FF80"
        $"0356 FFC0 06AA FFC0 0556 FFC0 06AA FFE0"
        $"0D56 FFE0 0FFE FFE0 0000 0000 1FFE FFF0"
        $"1FFE AAA8 1FFE D558 3FFE AAA8 3FFE D554"
        $"3FFE AAAC 7FFE D554 7FFE AAAE 7FFE D556"
        $"FFFE AAAA FFFE D555 FFFE AAAB FFFE FFFF"
};

/* ------------------------------------------------------------------------
        Dramatica Desktop Icon (ICON) resource.
------------------------------------------------------------------------ */
resource 'ICON' (134) {
        $"0000 0000 0000 0000 0000 0000 0000 1FC0"
        $"0000 1AA0 0000 1FF0 0000 1D50 0FFC 1D50"
        $"0804 1D50 100C 1D50 1FFC 1D50 100C 1D50"
        $"1FFC 1D50 100C 1D50 1FFD FD50 100F FD50"
        $"1FFD FD50 100D F7F8 1FF9 1118 147F FC54"
        $"3140 052C 3480 0242 5900 0185 CDFF FF4D"
        $"9111 1131 FFFF FFFF FFFF FFFF 5555 5556"
        $"6AAA AAAA 5555 5556 6AAA AAAA 7FFF FFFE"
};

/* ------------------------------------------------------------------------
        Spheroid Story Desktop Icon (ICON) resource.
------------------------------------------------------------------------ */
resource 'ICON' (135, "Story Desktop") {
        $"000F F000 0030 0C00 00C0 0300 0300 00C0"
        $"06BB 6A20 08EF 5550 1BBB 6A88 16EF 5548"
        $"33BB 6AA4 2EEF 5554 6BBB 6AA2 4EEF 5552"
        $"8BBB 6AA1 8EEF 5551 8BBB 6AA1 8FFF 7FF1"
        $"8000 0001 8FFF 7FF1 8AAB 5DD1 8555 7771"
        $"4AAB 5DD2 4555 7772 2AAB 5DD4 2555 7774"
        $"12AB 5DC8 1555 7768 0AAB 5DD0 0455 7720"
        $"0300 00C0 00C0 0300 0030 0C00 000F F0"
};

/* ------------------------------------------------------------------------
        "Prose Form" Icon (ICON) resource.
------------------------------------------------------------------------ */
resource 'ICON' (137) {
        $"0000 0000 0000 0000 0000 0000 07FF FF00"
        $"0600 0300 05FF FF00 0500 0500 051A C700"
        $"0500 0500 0500 0700 050E A500 0500 0700"
        $"052A A500 0500 0700 0537 A500 0500 0700"
        $"0500 0500 0515 E700 0500 0500 052B 6700"
        $"0500 0500 0538 0700 0500 0500 0500 0700"
        $"0536 8500 0500 0700 05FF FD00 07FF FF00"
        $"07FF FF"
};

/* ------------------------------------------------------------------------
        "Outline Form" Icon (ICON) resource.
------------------------------------------------------------------------ */
resource 'ICON' (138) {
        $"0000 0000 0000 0000 0000 0000 07FF FF00"
        $"0600 0300 05FF FF00 0500 0500 0500 0700"
        $"0562 A500 0565 6700 0502 A500 0505 6700"
        $"0500 0500 0500 0700 0562 A500 0565 6700"
        $"0500 0500 0500 0700 0562 A500 0565 6700"
```

```
        $"0502 A500 0505 6700 0502 A500 0505 6700"
        $"0500 0500 0500 0700 05FF FD00 07FF FF00"
        $"07FF FF"
};

/* ---------------------------------------------------------------------------
        "3x5 Form" Icon (ICON) resource.
--------------------------------------------------------------------------- */
resource 'ICON' (139) {
        $"0000 0000 0000 0000 0000 0000 0000 0000"
        $"0000 0000 1FFF FFF8 1800 0018 17FF FFE8"
        $"1400 0038 1400 0028 14CF FF38 14CF FF28"
        $"1400 0038 1400 0028 14B5 DA38 1400 0028"
        $"14DA ED38 1400 0028 14B7 4038 1400 0028"
        $"1400 0038 17FF FFE8 1FFF FFF8 1FFF FFF8"
};

/* ---------------------------------------------------------------------------
        "Prose Form #2" Icon (ICON) resource.
--------------------------------------------------------------------------- */
resource 'ICON' (140) {
        $"0000 0000 0000 0000 0000 0000 0000 0000"
        $"0000 0000 01FF FC00 0100 0400 011A C400"
        $"0100 0400 0100 0400 010E A400 0100 0400"
        $"012A A400 0100 0400 0137 A400 0100 0400"
        $"0100 0400 0115 E400 0100 0400 012B 6400"
        $"0100 0400 0138 0400 0100 0400 0100 0400"
        $"0136 8400 0100 0400 01FF FC"
};

/* ---------------------------------------------------------------------------
        Help Icon (ICON) resource.
--------------------------------------------------------------------------- */
resource 'ICON' (141) {
        $"FFFF FFFF C000 0003 BFFF FFFD A000 0007"
        $"A003 F805 A00F FC07 A018 1E05 A030 0E07"
        $"A038 0705 A03C 0707 A03C 0705 A03C 0707"
        $"A018 0F05 A000 0E07 A000 1E05 A000 3C07"
        $"A000 F805 A001 F007 A003 E005 A003 C007"
        $"A003 C005 A003 C007 A001 8005 A000 0007"
        $"A001 C005 A003 E007 A003 E005 A001 C007"
        $"A000 0005 BFFF FFFF FFFF FFFF FFFF FFFF"
};

/* ---------------------------------------------------------------------------
        Small Character Icon (ICON) resource.
--------------------------------------------------------------------------- */
resource 'ICON' (142) {
        $"0000 0000 0000 0000 0000 0000 0000 0000"
        $"0000 0000 0000 0000 0000 0000 0000 0000"
        $"0000 0000 0000 0000 0000 0000 0001 C000"
        $"0003 E000 0003 E000 0007 F000 0007 F000"
        $"0007 F000 0007 F000 0003 E000 0003 E000"
        $"001F F800 003F FE00 007F FF00 007F FF00"
        $"007F FF"
};

/* ---------------------------------------------------------------------------
        Small Plot Icon (ICON) resource.
--------------------------------------------------------------------------- */
resource 'ICON' (143) {
        $"0000 0000 0000 0000 0000 0000 0000 0000"
        $"0000 0000 0000 0000 0000 0000 0000 0000"
        $"0000 0000 0038 0000 0044 0000 0047 C000"
        $"0038 7C00 0000 0C00 0000 1800 0000 6000"
        $"0001 8000 0007 0000 001C 0400 001F 0C00"
        $"0001 FE00 0000 1E00 0000 3F"
};

/* ---------------------------------------------------------------------------
        Small Structure Icon (ICON) resource.
--------------------------------------------------------------------------- */
resource 'ICON' (144) {
        $"0000 0000 0000 0000 0000 0000 0000 0000"
        $"0000 0000 0000 0000 0000 0000 0000 0000"
        $"0000 0000 0001 F000 000F 1C00 0078 0700"
        $"00E0 0F00 00B0 7D00 00FF 8700 00E7 0F00"
        $"00BA 7900 009F 8F00 00E2 0700 00F2 3D00"
        $"009F FD00 00FF FF00 00FF FE00 003F F000"
        $"000F 80"
};

/* ---------------------------------------------------------------------------
        Small Storytelling Icon (ICON) resource.
--------------------------------------------------------------------------- */
resource 'ICON' (145) {
        $"0000 0000 0000 0000 0000 0000 0000 0000"
        $"0000 0000 0000 0000 0000 0000 007F FE00"
        $"00F0 0300 00F2 4900 00F8 0300 0018 0200"
        $"0030 0400 0027 A400 0020 0C00 0066 E800"
        $"0040 0800 0080 0800 00FF FE00 00F0 0300"
        $"009A A900 00F5 5700 007F FE"
};


#endif /* macintosh xxxxxxxxxxxxxxxxxxxxxxxxxxxxxxxxxxxxxxxxxxxxxxxxxxxxxxxxxxxx */

/* xxxxxxxxxxxxxxxxxxxxxxxxxxxxxxxxxxxxxxxxxxxxxxxxxxxxxxxxxxxxxxxxxxxxxxxxxx
 * $Log:        dramatic.r,v $
# Revision 1.36  93/09/24  15:30:37  stephen
# Cleaned up warnings.
#
# Revision 1.35  93/08/20  13:58:07  stephen
# Changes to some semantic titles in dialogs.
#
# Revision 1.34  93/06/24  20:03:47  stephen
# New help functions for bottom text area implemented.
#
# Revision 1.33  93/06/23  16:02:52  chris
# Clean up.
#
# Revision 1.32  93/06/22  10:31:21  stephen
```

```
# Added StoryView stuff...
#
# Revision 1.31  93/06/10  17:12:54  chris
# Added larger CPanel and Traits windows.
#
# Revision 1.30  93/06/10  14:47:59  stephen
# Added command key to Definitions command.
#
# Revision 1.29  93/06/05  01:16:07  chris
# Adjusted two popups in newchar dialog.
#
# Revision 1.28  93/06/04  19:34:33  chris
# Had to break lock to check in this version...
#
# Revision 1.27  93/06/03  23:14:54  stephen
# Minor revs.
#
# Revision 1.26  93/06/02  16:07:26  chris
# Misc. clean up.
#
# Revision 1.25  93/06/01  16:44:59  stephen
# Minor menu name changes...
#
# Revision 1.24  93/06/01  16:17:10  stephen
# Massive menu rearranging!
#
# Revision 1.23  93/05/31  21:27:37  chris
# Cleaned up the story info window.
#
# Revision 1.22  93/05/31  18:21:13  stephen
# New Story Info cmd.
#
# Revision 1.21  93/05/30  16:25:59  chris
# Changed character window, stelling window, and hooked in story info dlog.
#
# Revision 1.20  93/05/29  17:39:14  chris
# Corrected position of small icons.
#
# Revision 1.19  93/05/26  19:46:24  stephen
# Windows fixes.
#
# Revision 1.18  93/05/26  19:07:22  stephen
# Many changes, including eliminating extra commas that
# were problems for DOS Rez.
#
# Revision 1.17  93/05/25  09:37:22  chris
# Added Storytelling Fill-in-the-blank dialog resource.
#
# Revision 1.16  93/05/24  21:36:48  stephen
# Added BuildChar, Delete Char.
#
# Revision 1.15  93/05/21  22:08:22  stephen
# New Delete Character command.
#
# Revision 1.14  93/05/20  11:23:29  chris
# Changed to new look including textwrap questions.
#
# Revision 1.13  93/05/18  20:46:29  stephen
# Added Cast List View
#
# Revision 1.12  93/05/18  11:21:45  stephen
# New Characters menu & commands.
#
# Revision 1.11  93/05/17  14:06:09  chris
# Added resources for the character information window.
#
# Revision 1.10  93/05/10  16:53:07  stephen
# Added more .r files to be included in dramatic.pfm
#
# Revision 1.9  93/05/04  21:32:19  stephen
# New Outline Window.
#
# Revision 1.8  93/05/03  16:38:21  stephen
# Added StoryPnts command.
#
# Revision 1.7  93/04/24  18:46:20  chris
# Added icons and beveled edges to the DQS window.
#
# Revision 1.6  93/04/24  14:30:55  stephen
# New Storypoints command...
#
# Revision 1.5  93/04/19  18:54:55  stephen
# Control Panel Command
#
# Revision 1.4  93/04/12  20:17:25  chris
# Add CPanel [D [D [D [D [D [D [Ded CPanel Window and Items.
#
# Revision 1.3  93/04/08  14:58:06  stephen
# More Revision.
#
# Revision 1.2  93/04/06  19:41:35  stephen
#  [3First General Revisions
#
# Revision 1.1  93/03/31  22:37:59  stephen
# Initial revision
#
 */
```

```
/* -------------------------------------------------------------------------
	$Id: drrez.h,v 1.11 93/06/10 14:49:48 chris Exp Locker: stephen $

	Copyright (C) 1990-91 Screenplay Systems Inc.

	This file contains constant definitions for use by both Rez and C++.
	Since Rez does not support 'const' constants, we use #define here.
	Since Rez doesn't support C++ comments, we use C style comments. To
	avoid resource ID conflicts with AppLib resources, look in apprez.h
	and base your resource ID constants off of the "rAPLast..." constants.
-------------------------------------------------------------------------- */

#ifndef __DRREZ__
#define __DRREZ__

#include "apprez.h"
/* -------------------------------------------------------------------------
	STR# resource ID's.
-------------------------------------------------------------------------- */
#define rEDErrStrings		(rAPLastSTRL + 1)
#define rEDMiscStrings		(rAPLastSTRL + 2)

/* -------------------------------------------------------------------------
	STR# index constants.
-------------------------------------------------------------------------- */
#define  mCantSaveFile	0				/* rEDErrStrings indexes	*/

#define mFirstMiscID	0				/* rEDMiscStrings indexes	*/

/* -------------------------------------------------------------------------
	ITM# resource ID's.
-------------------------------------------------------------------------- */
#define rCPanelDlog			1000		/* CPanel Dialog */
#define rSMGDlog		1010		/* used for Create Story Table */
#define rCreateCharDlog		1020		/* Create character Dialog */
#define rSTellDlog			1030		/* Storytelling Dialog */
#define rSInfoDlog			1040		/* Story Information Dialog */
#define rMainObstDlog		1050		/* Setup Main/Obstacle Dialog */
#define rAboutItm			1070		/* Radio button item for About Box */


/* -------------------------------------------------------------------------
	MNU# resource ID's.
-------------------------------------------------------------------------- */
#define  rEDRootMenu			(rAPLastMNUL + 1)
#define rStoryFormingMenu	(rAPLastMNUL + 2)
#define rCharsMenu			(rAPLastMNUL + 3)
#define rStoryTellingMenu	(rAPLastMNUL + 4)
#define rToolsMenu			(rAPLastMNUL + 5)

/* -------------------------------------------------------------------------
	CURS resource ID's.
-------------------------------------------------------------------------- */

/* xxxxxxxxxxxxxxxxxxxxxxxxxxxxxxxxxxxxxxxxxxxxxxxxxxxxxxxxxxxxxxxxxxxxxxxxx
 * $Log:		drrez.h,v $
 * Revision 1.11  93/06/10  14:49:48  chris
 * Added constants for new CPanel and Character Traits window.
 *
 * Revision 1.10  93/06/01  16:17:17  stephen
 * Massive menu rearranging!
 *
 * Revision 1.9  93/05/31  18:21:21  stephen
 * New Story Info cmd.
 *
 * Revision 1.8  93/05/30  16:26:41  chris
 * Added constand for story infor window.
 *
 * Revision 1.7  93/05/26  19:46:30  stephen
 * Windows fixes.
 *
 * Revision 1.6  93/05/18  11:21:53  stephen
 * New Characters menu & commands.
 *
 * Revision 1.5  93/04/19  18:56:50  stephen
 * Minor Revs.
 *
 * Revision 1.4  93/04/12  20:17:29  chris
 * Added CPanel Window and Items.
 *
 * Revision 1.3  93/04/08  14:58:14  stephen
 * More Revision.
 *
 * Revision 1.2  93/04/06  19:41:48  stephen
 *  [3First General Revisions
 *
 * Revision 1.1  93/03/31  22:38:41  stephen
 * Initial revision
 *
 */

#endif /* __DRREZ__ */
```

```
/*********************************************************************
        FRONTEND.CC
        Dramatica front end window & view classes
        (c) 1993 Screenplay Systems
        Authors:          S. Greenfield & C. Huntley
        Created:          Nov 1, 1993
        Revised:          $Id$
*********************************************************************

*/

#include "tappl.h"
#include "graphics.h"
#include "tview.h"
#include "apptypes.h"

#include "miscutil.h"
#include "dramatic.h"
#include "document.h"
#include "bitmap.h"

#include "compile.h"
#include "frontend.h"

#pragma segment frontend


static const curs_idx kFingerCursor          = 144;

static initFEDataItems initData[] =
{
        { 16000, kBtnDisabled,     NULL,                              NULL },
        { 16001, kBtnEnabled,      "Query System",              "Multiple choice and fill-in questions that help you form
and tell your story.\nNew user?  START HERE!" },
        { 16002, kBtnEnabled,      "New Story";                 "Creates a blank file to contain information about your
story." },
        { 16003, kBtnEnabled,      "Open Story",                "Calls up a file containing information about a story you
have already formed." },
        { 16004, kBtnEnabled,      "Quick Story",               "The quickest way for EXPERIENCED users to create a new
story." },
        { 16005, kBtnEnabled,      "Characters",                "Several tools that aid in creating and developing
characters." },
        { 16006, kBtnEnabled,      "Story Engine",              "Direct master controls for creating a storyform.  For
experienced users." },
        { 16007, kBtnEnabled,      "Story Points",              "A complete list of your storyform's dramatics from which
you can develop your story." },
        { 16008, kBtnEnabled,      "Reports",                          "Various output formats for examining your
story's dramatics." },
        { 16009, kBtnDisabled,     "Preferences",               "Various options that impact Dramatica's operation." },
        { 16010, kBtnDisabled,     "Story Examples",            "Comparisons to your story: how others did the same thing;
what other works your story resembles." },
        { 16011, kBtnDisabled,     "Brainstorming",  "Short of ideas?  We're not!  Give these tools a spin to help shake
the gears loose." },
        { 16012, kBtnDisabled,     "Theory Help",               "The Exploratorial: a basic course on Dramatica, plus
hints and information." },
        { 0,      kBtnDisabled,    NULL,                              NULL },
};


/* -------------------------------------------------Stephen---03/19/93---
        FrontEndView::Constructor
----------------------------------------------------------------------- */
FrontEndView::FrontEndView(initFEDataItems* initDataPtr, ItemList* pParent, vw_flags vflags, const GLRect *extent,
it_flags iflags, const GLColor *color)
          : TView(pParent, vflags, extent, iflags, color),
          fDataInited (false),
          fInitData (initDataPtr),
          fBtnInset (8)
{
        fApp     = (Dramatica*)AP_Data()->fApp;
        fWindow = (FEWindow*)pParent->GetParent();

        fNmOfColumns      = 3;
        fNmOfRows                 = 4;
        fFont                     = 21;
        fFontSize                 = 9;

        init_scrollers();

        fNmOfFECommands = 0;
        while (fInitData[fNmOfFECommands+1].cmdPixID)
                ++fNmOfFECommands;

        fTilePixID = fInitData[0].cmdPixID;

        size_t allocSize = sizeof(FEDataType) * fNmOfFECommands+1;
        fFEDataHdl = MM_ALLOC_INIT(allocSize, mm_no_flags, 0, "FrontEndView Data", NULL);
        assert(fFEDataHdl);

} /* FrontEndView::FrontEndView */


/* -------------------------------------------------Stephen---03/19/93---
        FrontEndView::Destructor
----------------------------------------------------------------------- */
FrontEndView::~FrontEndView(void)
{
        destruct_data();
        MMFree(fFEDataHdl);
} /* FrontEndView::~FrontEndView */


/* ---------------------------------------------------------------------
        FrontEndView::InitCmdPixs - Load up our appropriate picts
----------------------------------------------------------------------- */
void FrontEndView::InitCmdPixs(const GLRect* bounds)
{
        fFEData = (FEDataType*)MM_USE(fFEDataHdl);
//      fApp->PushCursor(AP_WATCH_CURS);

        fTilePix          = new Bitmap(fTilePixID);
        fTileHeight       = fTilePix->GetHeight() + 4;
        fTileWidth        = fTilePix->GetWidth() + 4;
```

```
//      GLRect bounds = fExtent;
//      GetParentWindow()->GetPortRect(&bounds);
        fHorizTileFit      = MAX(1,((bounds->right-bounds->left) / fTileWidth));                    // Number of tiles
that fit in an on-screen column
        fVertTileFit       = MAX(1, ((bounds->bottom-bounds->top) / fTileHeight));
        fNmOfColumns       = fHorizTileFit;
        fNmOfRows                 = 0;

        // Test to see if we are closer to n tiles or n+1 tiles

        GLRect screen;
        fApp->GetMainScreenRect(&screen);
        gl_coord_t windowRight = bounds->left + (fHorizTileFit * fTileWidth);
        if ((bounds->right - windowRight) > (fTileWidth / 2) && ((windowRight + fTileWidth) < screen.right - 16))
                fNmOfColumns = ++fHorizTileFit;

        gl_coord_t windowBottom = bounds->top + (fVertTileFit * fTileHeight);
        if ((bounds->bottom - windowBottom) > (fTileHeight / 2) && ((windowBottom + fTileHeight) < screen.bottom - 18))
                ++fVertTileFit;

        short row = 1;
        short col = 1;

        ushort whichCmd;
        for (whichCmd=1; whichCmd<fNmOfFECommands+1; ++whichCmd) {
                FEDataType* FEData = &fFEData[whichCmd-1];
                FEData->cmdPixID = fInitData[whichCmd].cmdPixID;
                FEData->cmdTitle = fInitData[whichCmd].cmdTitle;
                FEData->enabled    = fInitData[whichCmd].enabled;
                FEData->blankTile = (FEData->cmdPixID == fTilePixID);                              // true means
tile is an empty placeholder tile

                FEData->row        = row;
                FEData->col        = col;

                FEData->tileFrameRect.top          = (row-1) * fTileHeight;
                FEData->tileFrameRect.left                 = (col-1) * fTileWidth;
                FEData->tileFrameRect.bottom       = FEData->tileFrameRect.top + fTileHeight;
                FEData->tileFrameRect.right                = FEData->tileFrameRect.left + fTileWidth;

                FEData->tileRect = FEData->tileFrameRect;
                InsetLgRect(&FEData->tileRect, 2, 2);

                if (!FEData->blankTile) {
                        FEData->cmdBitmap = new Bitmap(FEData->cmdPixID);

                        FEData->btnFrameRect.top    = FEData->tileRect.top + fBtnInset;
                        FEData->btnFrameRect.left  = FEData->tileRect.left + fBtnInset;
                        FEData->btnFrameRect.bottom        = FEData->btnFrameRect.top + FEData->cmdBitmap-
>GetHeight() + 4;
                        FEData->btnFrameRect.right         = FEData->btnFrameRect.left + FEData->cmdBitmap-
>GetWidth() + 4;

                        FEData->buttonRect = FEData->btnFrameRect;
                        InsetLgRect(&FEData->buttonRect, 2, 2);

                        // get rects for our command's title, description

                        FEData->descRect.top       = FEData->buttonRect.top + 15;
                        FEData->descRect.left      = FEData->btnFrameRect.right + 11;
                        FEData->descRect.bottom    = FEData->tileFrameRect.bottom - 12;
                        FEData->descRect.right     = FEData->tileFrameRect.right - 9;          // Was 10

                        FEData->cmdTitleRect               = FEData->descRect;
                        FEData->cmdTitleRect.top   = FEData->btnFrameRect.top;
                        FEData->cmdTitleRect.bottom        = FEData->btnFrameRect.top + 16;

                        // Now wrap the description text

                        GLRect descRect;
                        LgRect2Rect(&FEData->descRect, &descRect);
                        fpGraphEnv->Use();
                        FEData->descriptionTW = new TextWrap(fpGraphEnv, &descRect, fInitData[whichCmd].cmdDesc,
fFont, fFontSize);
                        fpGraphEnv->Unuse();
                }

                if (++col > fHorizTileFit) {
                        col = 1;
                        ++row;
                        ++fNmOfRows;
                }
        }

//      fApp->PopCursor();

        SetVLineSize(fTileHeight);
        SetHLineSize(fTileWidth);
        fDataInited = true;
        DocumentResize();

        // Include buttons in Cursor Region

        for (whichCmd=0; whichCmd<fNmOfFECommands; ++whichCmd) {
                if (fFEData[whichCmd].blankTile)
                        break;
                GLRect buttonRect;
                doc_to_loc_rect(&fFEData[whichCmd].buttonRect, &buttonRect);
                fWindow->AddCursorRgn(buttonRect, kFingerCursor);
        }
        MM_UNUSE(fFEDataHdl);
} /* FrontEndView::InitCmdPixs */

/* ----------------------------------------------------------------------
        FrontEndView::destruct_data - deletes our data
---------------------------------------------------------------------- */
void FrontEndView::destruct_data(void)
{
        fFEData = (FEDataType*)MM_USE(fFEDataHdl);
        assert (fDataInited);
        for (ushort whichCmd=0; whichCmd<fNmOfFECommands; ++whichCmd) {
```

```
                if (fFEData[whichCmd].blankTile)                                                    //
Blank tile -- no more commands to destruct
                        break;
                delete fFEData[whichCmd].cmdBitmap;
                delete fFEData[whichCmd].descriptionTW;
        }

        delete fTilePix;
        fDataInited = false;
        MM_UNUSE(fFEDataHdl);
} /* FrontEndView::destruct_data */


/* ----------------------------------------------------------------------
        FrontEndView::draw_BITM - draws the tile's BITM.  If offset is true
        then the rect is offset by a pixel, to make it look "pressed"
---------------------------------------------------------------------- */
void FrontEndView::draw_BITM(FEDataType* FEData, bool_t offsetBITM)
{
        GLRect   buttonRect;
        doc_to_loc_rect(&FEData->buttonRect, &buttonRect);

        if (offsetBITM)
                GLOffsetRect(&buttonRect, 1, 1);

        FEData->cmdBitmap->CopyToScreen(GetParentWindowRef(), &buttonRect);

} /* FrontEndView::draw_BITM */


/* ----------------------------------------------------------------------
        FrontEndView::draw_tile - draws a specific command tile
---------------------------------------------------------------------- */
void FrontEndView::draw_tile (const VwPaneUpdateInfo& updateInfo, short whichCmd)
{
        LgPoint           VwOrigin = *updateInfo.InqOffset();                          // local coordinates
for the view's origin
        GLRect            updateRect;
        updateInfo.InqLocRgn()->GetRect(&updateRect);                          // get LOCAL region of update
to make sure we only draw what's needed
        gl_coord_t        X                              = (gl_coord_t)(VwOrigin.x);
        gl_coord_t        Y                              = (gl_coord_t)(VwOrigin.y);

        // Determine if there's an update within the tile's bounds

        FEDataType* FEData = &fFEData[whichCmd];
        GLRect   tileRect;
        doc_to_loc_rect(&FEData->tileRect, &tileRect);
        GLRect   notUsedRect;
        if (!GLSectRect(&tileRect, &updateRect, &notUsedRect))
                return;
                // Don't bother drawing this tile

        // Got a geniune update in the tile's bounds, so draw it

        GLRect   tileFrameRect;
        doc_to_loc_rect(&FEData->tileFrameRect, &tileFrameRect);
        fTilePix->CopyToScreen(GetParentWindowRef(), &tileRect);
        CoolFrameRect(fpGraphEnv, &tileFrameRect, &kGLBevelUpPat, 3, &kGLWhiteClr, &kGL75GrayClr);

        if (FEData->blankTile)                                                                      //
Blank tile -- nothing more to draw
                return;

        GLRect   btnFrameRect;
        GLRect   cmdTitleRect;
        GLRect   descRect;

        doc_to_loc_rect(&FEData->btnFrameRect, &btnFrameRect);
        doc_to_loc_rect(&FEData->cmdTitleRect, &cmdTitleRect);
        doc_to_loc_rect(&FEData->descRect, &descRect);

        draw_BITM(FEData, false);                                                          // Draw the
tile's BITM -- no offset

        if (FEData->enabled)
                CoolFrameRect(fpGraphEnv, &btnFrameRect, &kGLBevelUpPat, 3, &kGLWhiteClr, &kGL75GrayClr);
        else
                CoolFrameRect(fpGraphEnv, &btnFrameRect, &kGLGroovePat, 1, &kGLWhiteClr, &kGL75GrayClr);

        fpGraphEnv->SetXferMode(GL_OR);
        fpGraphEnv->SetTextAttr(GL_SYS_FONT, 12);
        fpGraphEnv->StrRect(FEData->cmdTitle, cmdTitleRect, GL_JUST_CENTER, false);
        FEData->descriptionTW->Draw(fpGraphEnv, &updateInfo, kNeverPrint, descRect.top, descRect.left);
        fpGraphEnv->SetXferMode(GL_COPY);
} /* FrontEndView::draw_tile */


/* -----------------------------------------------------Stephen---03/19/93---
        FrontEndView::draw_view - Does the bulk of drawing our FrontEnd
        window.
---------------------------------------------------------------------- */
void FrontEndView::draw_view (const VwPaneUpdateInfo& updateInfo)
{
        LgPoint           VwOrigin = *updateInfo.InqOffset();                          // local coordinates
for the view's origin
        gl_coord_t        X                              = (gl_coord_t)(VwOrigin.x);
        gl_coord_t        Y                              = (gl_coord_t)(VwOrigin.y);

        fFEData = (FEDataType*)MM_USE(fFEDataHdl);

        for (ushort whichCmd=0; whichCmd<fNmOfFECommands; ++whichCmd)
                draw_tile (updateInfo, whichCmd);

        MM_UNUSE(fFEDataHdl);
} /* FrontEndView::draw_view */


/* -----------------------------------------------------Stephen---04/19/93---
        FrontEndView::find_button - locate which button was hit.   Return
        index or -1 if no button found.
---------------------------------------------------------------------- */
short FrontEndView::find_button(GLPoint mousePt)
```

```
{
        LgPoint docMousePt;
        loc_to_doc(mousePt, &docMousePt);
        for (ushort whichCmd=0; whichCmd<fNmOfFECommands; ++whichCmd) {
                if (fFEData[whichCmd].blankTile)                                                    //
Blank tile -- no more commands follow
                        break;
                if (LgPtInRect(docMousePt, &fFEData[whichCmd].tileRect))             // Used to be btnFrameRect
                        return (whichCmd);
        }
        return (-1);
}


/* --------------------------------------------------Stephen---04/19/93---
        FrontEndView::DoItemHit - handles mouse-down events in the FrontEndView.
------------------------------------------------------------------------- */
bool_t FrontEndView::DoItemHit(EVENT_REC *pEvt, GLPoint mousePt)
{
        bool_t                  isDblClick = AP_DblClick(pEvt);

        if (!TView::DoItemHit(pEvt, mousePt)) {
                fFEData = (FEDataType*)MM_USE(fFEDataHdl);
                short whichCmd;
                short currentCmd;
                whichCmd = find_button(mousePt);
                if (whichCmd >= 0 && fFEData[whichCmd].enabled) {
                        GLRect btnFrameRect;
                        doc_to_loc_rect(&fFEData[whichCmd].btnFrameRect, &btnFrameRect);
                        fpGraphEnv->Use();
                        CoolFrameRect(fpGraphEnv, &btnFrameRect, &kGLBevelDownPat, 3, &kGLWhiteClr, &kGL75GrayClr);
                        draw_BITM(&fFEData[whichCmd], true);
                        bool_t   buttonIsDown = true;

                        do {
                                GLPoint mPt;
                                AP_GetLocalMouse(GetParentWindowRef(), &mPt);
                                currentCmd = find_button(mPt);
                                if (currentCmd == whichCmd) {
                                        if (!buttonIsDown) {
                                                CoolFrameRect(fpGraphEnv, &btnFrameRect, &kGLBevelDownPat, 3,
&kGLWhiteClr, &kGL75GrayClr);
                                                draw_BITM(&fFEData[whichCmd], true);
                                                buttonIsDown = true;
                                        }
                                }
                                else {
                                        if (buttonIsDown) {
                                                CoolFrameRect(fpGraphEnv, &btnFrameRect, &kGLBevelUpPat, 3,
&kGLWhiteClr, &kGL75GrayClr);
                                                draw_BITM(&fFEData[whichCmd], false);
                                                buttonIsDown = false;
                                        }
                                }
                        } while (AP_MouseStillDown());


                        if (buttonIsDown) {
                                CoolFrameRect(fpGraphEnv, &btnFrameRect, &kGLBevelUpPat, 3, &kGLWhiteClr,
&kGL75GrayClr);
                                draw_BITM(&fFEData[whichCmd], false);
                        }
                        fpGraphEnv->Unuse();
                }

                if ((currentCmd==whichCmd) && whichCmd >= 0)
                        DoCommand(whichCmd);

                MM_UNUSE(fFEDataHdl);
        }
        return (true);
} /* FrontEndView::DoItemHit */


/* -----------------------------------------------------------------------
        FrontEndView::DoCommand -
------------------------------------------------------------------------- */
void FrontEndView::DoCommand(short whichCmd)
{
        switch (whichCmd+1) {

        case kFENewStory:                       fApp->DoCommand(kFileNew);
                                                        break;

        case kFEOpenStory:                      fApp->DoCommand(kFileOpen);
                                                        break;

        case kFEStoryEngine:            fApp->DoCommand(kCPanelCmd);
                                                        break;

        case kFEQuerySystem:            fApp->DoCommand(kDQSCmd);
                                                        break;
        case kFEQuickStory:                     fApp->DoCommand(kQuickStoryCmd);
                                                        break;

        case kFEStoryPoints:            fApp->DoCommand(kSPCmd);
                                                        break;

        case kFEPreferences:            fApp->DoCommand(kPrefsCmd);
                                                        break;

        case kFECharacters:                     fApp->DoCommand(kCastListCmd);
                                                        break;

        case kFEReports:                fApp->DoCommand(kOutlineCmd);
                                                        break;

        case kFEExamples:                       /* CompileCmd* pCmd = new CompileCmd(fApp);
                                                        pCmd->CompileExamples();
                                                        delete pCmd; */
                                                        break;

        default:                                        beep();
```

```
                                                        beep();
                                                        break;
        }
} /* FrontEndView::DoCommand */


/* -----------------------------------------------------------------------
        FrontEndView::Resize -
------------------------------------------------------------------------ */
void FrontEndView::Resize(void *pNewSize, TObject *pSender)
{
        GLRect myBounds;
        GetParentWindow()->GetPortRect(&myBounds);
        SetToBounds(&myBounds);
} /* FrontEndView::Resize */


/* -----------------------------------------------------------------------
        FrontEndView::SetToBounds - Sets
------------------------------------------------------------------------ */
void FrontEndView::SetToBounds(GLRect* newBounds)
{
        if (fDataInited)
                destruct_data();
        InitCmdPixs(newBounds);

        newBounds->bottom         = newBounds->top + (MIN(fNmOfRows, fVertTileFit) * fTileHeight) + 18;
        newBounds->right  = newBounds->left + (fHorizTileFit * fTileWidth) + 16;
        SetBounds(newBounds);

        GLPoint  newWidth;
        newWidth.x        = (newBounds->right - newBounds->left) - 1;
        newWidth.y        = (newBounds->bottom - newBounds->top) - 1;
        fWindow->SpecialResize(&newWidth);

        GLPoint goTo;
        goTo.x = 0;
        goTo.y = 0;
        AutoScrollTo(&goTo, NULL);
        fWindow->Inval();
} /* FrontEndView::SetToBounds */


/* --------------------------------------------------Stephen---04/19/93---
        FrontEndView::doc_to_loc_rect - Converts document LgRect to GLRect,
        based on the current document / scrolling coordinates.
        NOTE: THIS IS THE PROTOTYPE FOR A VERSION TO DROP INTO TVIEW.CC
------------------------------------------------------------------------ */
GLRect*  FrontEndView::doc_to_loc_rect(LgRect* docRect, GLRect* localRect)
{
        doc_coord_t vOffset       = -GetLineVPosition(GetVScrollPos()) + pane_origin_y(&fCurPane);
        doc_coord_t hOffset       = -GetLineHPosition(GetHScrollPos()) + pane_origin_x(&fCurPane);

        localRect->top            = (short) (docRect->top      + vOffset);
        localRect->left           = (short) (docRect->left   + hOffset);
        localRect->bottom         = (short) (docRect->bottom + vOffset);
        localRect->right  = (short) (docRect->right   + hOffset);

        return (localRect);
}


/* =======================================================================
                                                        FrontEnd WINDOW CLASS
   ==================================================================== */

/* -----------------------------------------------------------------------
        FEWindow::FEWindow - CONSTRUCTOR
------------------------------------------------------------------------ */
FEWindow::FEWindow(TAppl *pTAppl, TDoc *pTDoc, const GLRect *bounds, wn_type windowType, const char *title, ptr_t
storage)
                : TWindow(pTAppl, pTDoc, windowType, TWindow::kNoFlags, bounds, title, storage),
                  fFEView (NULL)
{
}


/* -----------------------------------------------------------------------
        FEWindow::SetupWindow -
------------------------------------------------------------------------ */
void FEWindow::SetupWindow(void)
{
        if (fItems)
                delete fItems;    // free any existing item list.

        if (ASSERT(fItems = new ItemList(this))) {
                it_test_proc      pDoesKeyDowns = &TItem::DoesKeyDowns;

                // STUFF IN OUR VIEW

                GLRect myBounds;
                GetPortRect(&myBounds);
//              myBounds.bottom -= 200;
                TItem* newFEItem = new FrontEndView(initData, fItems, (TView::kVScroll + TView::kHScroll), &myBounds,
TItem::kResizable);
                assert(newFEItem);
                fFEView = (FrontEndView*)newFEItem;
                fItems->Append(newFEItem);

                set_window_content_color();

                if (ASSERT(fItems)) {
                        for (ls_index i = 0; i < fItems->Size(); i++) {
                                TItem*   pTItem = fItems->Elem(i);

                                pTItem->Awaken(&i);                                          // Switched
to come BEFORE the item is resized.

                                if (pTItem->Is(&TItem::kResizable))
                                        pTItem->Resize();

                }
```

```
			if (fKeyItem == kItNoItem)
				SetKeyItem(fItems->FirstObjThat((test_pp) &pDoesKeyDowns));

			if (fKeyItem != kItNoItem) {
				fGraphEnv.Use();
					GetItem(fKeyItem)->FocusIn();
				fGraphEnv.Unuse();
			}
		}
	}
}

void FEWindow::Resize(void *pNewSize, TObject *pSender)
{
	TWindow::Resize(pNewSize, pSender);
	fItems->Resize();
}


/* ---------------------------------------------------------------------------
	FEWindow::SpecialResize - essentially a TWindow::Resize without
	calling fItems->Resize.  This function is designed to be called
	from within FrontEndView::Resize, after the view's size has been
	determined, to make the window "snap" to a correct size.  If we
	didn't separate this function, Resize would be called endlessly.
--------------------------------------------------------------------------- */
void FEWindow::SpecialResize(void *pPoint)
{
	assert(pPoint);

#ifdef TOOLBOX
	::SizeWindow(fWindowRef, ((GLPoint*) pPoint)->x, ((GLPoint*) pPoint)->y, true);
#else
	POINT		origin	= { 0, 0 };
	gl_coord_t	title	= AP_GetTitleBarHeight();
	GLPoint		border	= AP_GetBorderWidths();
	RECT		curBounds;

	::GetWindowRect(fWindowRef, &curBounds);
	::ScreenToClient(fParentApp->GetClientHwnd(), &origin);
	::OffsetRect(&curBounds, origin.x, origin.y);
	::MoveWindow(fWindowRef, curBounds.left, curBounds.top, ((GLPoint*) pPoint)->x + border.x, ((GLPoint*) pPoint)-
>y + title + border.y, true);
#endif


}

/* ---------------------------------------------------------------------------
	FEWindow::IsDirty - Determines if the current window needs saving.
--------------------------------------------------------------------------- */
bool_t	FEWindow::IsDirty(void)
{
	DRDoc*	theDoc = (DRDoc*)GetDoc();
	assert(theDoc);
	return (theDoc->Is(&TDoc::kDirty));
}

/* ---------------------------------------------------------------------------
	FEWindow::CalcIdle - calculates how much idle time we need.
--------------------------------------------------------------------------- */
ulong FEWindow::CalcIdle(void)
{
	return kApMaxSleepTime;

} /* FEWindow::CalcIdle */


#pragma segment main

/* xxxxxxxxxxxxxxxxxxxxxxxxxxxxxxxxxxxxxxxxxxxxxxxxxxxxxxxxxxxxxxxxxxxxxxxx
 * $Log$
 */
```

```
/* -----------------------------------------------------------------------
        FRONTEND.H
        Dramatica front end window & view classes
        Copyright (C) 1993 Screenplay Systems Inc.
        Revised:        $Id$
------------------------------------------------------------------------ */

#pragma once

#ifndef __FRONTEND__
#define __FRONTEND__

#include "twindow.h"
#include "tview.h"
#include "consts.h"
#include "textwrap.h"

#pragma segment frontend

const ushort kFEBasePictID              = 16000;

const ushort        kFETile                     = 0;
const ushort        kFEQuerySystem          = 1;
const ushort        kFENewStory                 = 2;
const ushort        kFEOpenStory            = 3;
const ushort        kFEQuickStory           = 4;
const ushort        kFECharacters           = 5;
const ushort        kFEStoryEngine          = 6;
const ushort        kFEStoryPoints          = 7;
const ushort        kFEReports                  = 8;
const ushort        kFEPreferences          = 9;
const ushort        kFEExamples                 = 10;
const ushort        kFEBrainstorming  = 11;
const ushort        kFEHelp                     = 12;

const ushort        kFEStarburst            = 13;

const short             kNmOfFECommands             = 12;

const bool_t        kBtnEnabled                 = true;
const bool_t        kBtnDisabled            = false;

//      Front end data used for initialization

typedef struct {
        ushort          cmdPixID;               // PFM ID of command's BITM
        bool_t          enabled;                // Default for command state
        char*           cmdTitle;               // title text
        char*           cmdDesc;                // Description of command
} initFEDataItems;

//      Front End Command Data (runtime)

typedef struct {
        bool_t          blankTile;                      // True if tile is an empty tile for scrolling
        ushort          cmdPixID;                       // PFM ID of command's BITM
        Bitmap*         cmdBitmap;                      // Bitmap for this command
        char*           cmdTitle;                       // title text
        char*           cmdDesc;                        // Description of command
        TextWrap*       descriptionTW;          // Ptr to our pre-wrapped description text
        LgRect          tileFrameRect;          // Rect of frame around tile
        LgRect          tileRect;                       // Enclosing Rect of this command's tile
        LgRect          btnFrameRect;           // Rect of frame around button
        LgRect          buttonRect;                     // Enclosing Rect of command's button
        LgRect          cmdTitleRect;           // Rect of command title
        LgRect          descRect;                       // Rect of description
        short           row;                            // Row of this command/tile
        short           col;                            // Column of this command/tile
        bool_t          enabled;                        // True if this tile is pressable
} FEDataType;

class FEWindow;

/* -----------------------------------------------------------------------
        FrontEndView - Dramatica's FrontEnd view class.
------------------------------------------------------------------------ */
class FrontEndView : public TView {
public:
        // CONSTRUCTION/DESTRUCTION
        FrontEndView(initFEDataItems* initDataPtr, ItemList* pParent, vw_flags vflags = kNoFlags, const GLRect *extent =
NULL, it_flags iflags = List::kNoFlags, const GLColor *color = &kGLBlackClr);
        virtual ~FrontEndView(void);

        // PUBLIC UTILITIES
        virtual char*       ClassName(void) const       { return "FrontEndView"; }
        virtual class_t     ClassType(void) const       { return kFrontEndView; }
        virtual bool_t      IsOfType(const void *pType) const { return *(class_t*) pType == kFrontEndView ||
TView::IsOfType(pType); }
        virtual TObject* Duplicate(void) const          { return new FrontEndView(*this); }


        // ACTION PROCS

        // PUBLIC BEHAVIOR
        virtual void        Frame(void *env, TObject *pSender = NULL) {}        // TItem:: function.  Overriden here to
prevent framing of view
        virtual void        draw_view(const VwPaneUpdateInfo& updateInfo);
        virtual  void       DoCommand(short whichCmd);
        virtual void        Resize(void *pNewSize, TObject *pSender);
                            void    InitCmdPixs(const GLRect* bounds);
                            void    SetToBounds(GLRect* newBounds);
                            void    SetBtnInset(gl_coord_t btnInset)        { fBtnInset = btnInset; }

        virtual  long       GetNumVLines(void)                      { return (long)(fNmOfRows); }
        virtual  long       GetNumHLines(void)                              { return
(long)(fNmOfColumns-1); }


protected:
        Dramatica*              fApp;
        FEWindow*               fWindow;

        initFEDataItems* fInitData;                     // Array of tile picture & title information we've inited
```

```
        short                   fNmOfFECommands;  // Size of the initData array (calculated during construction)

        bool_t                  fDataInited;      // True once data exists
        short                   fNmOfColumns;
        short                   fNmOfRows;
        short                   fHorizTileFit;    // Number of tiles that fit in each on-screen Row
        short                   fVertTileFit;     // Number of tiles that fit in each on-screen column
        gl_font_t               fFont;                    // Font for description text
        short                   fFontSize;                // Size of description text font

        ushort                  fTilePixID;               // ID of the tile background's bitmap
        Bitmap*                 fTilePix;
        gl_coord_t              fTileHeight;      // Height of tile bitmap
        gl_coord_t              fTileWidth;               // width of tile bitmap
        gl_coord_t              fBtnInset;                // # of pixels down and to the right of the button from
the tile

        hdl_t                   fFEDataHdl;               // Handle to Front end data
        FEDataType*             fFEData;                  // Frontend data

        // LOCAL UTILITIES
        bool_t                  DoItemHit(EVENT_REC *pEvt, GLPoint mousePt);
        void                    destruct_data(void);
        void                    draw_BITM(FEDataType* FEData, bool_t offsetBITM);
        void                    draw_tile (const VwPaneUpdateInfo& updateInfo, short whichCmd);
        short                   find_button(GLPoint mousePt);
        GLRect*                 doc_to_loc_rect(LgRect* docRect, GLRect* localRect);
        void                    testFileSearch(void);

}; /* FrontEndView */


/* -------------------------------------------------------------------------
                                                        FrontEnd WINDOW CLASS
------------------------------------------------------------------------- */
class FEWindow : public TWindow {
public:
        // CONSTRUCTION/DESTRUCTION
        FEWindow(TAppl *pTAppl, TDoc *pTDoc, const GLRect *bounds, wn_type windowType, const char *title, ptr_t storage
= NULL);

        // PUBLIC UTILITIES
        virtual char*       ClassName(void) const      { return "FEWindow"; }
        virtual class_t     ClassType(void) const      { return kFEWindow; }
        virtual bool_t      IsOfType(const void *pType) const { return *(class_t*) pType == kFEWindow ||
TWindow::IsOfType(pType); }

        // CUSTOMIZED BEHAVIOR
//      virtual void        DoIdle(void);
        virtual ulong       CalcIdle(void);
        void                        SetupWindow(void);
        bool_t                      IsDirty(void);
        void                        SpecialResize(void *pPoint);
        void                        DrawGrow(void)                   { draw_grow(); }

protected:
        // DATA MEMBERS
        FrontEndView*       fFEView;                   // Pointer to our view

        // LOCAL UTILITIES
//      virtual void        draw_window(GL_ENV_REF env);
        virtual void        Resize(void *pNewSize, TObject *pSender = NULL);

}; /* FEWindow */


#pragma segment main

/* xxxxxxxxxxxxxxxxxxxxxxxxxxxxxxxxxxxxxxxxxxxxxxxxxxxxxxxxxxxxxxxxxxxxxxxxx
 *  $Log$
 */

#endif /* __FRONTEND__ */
```

```
/*************************************************************************
        GRAPHBTN.CC
        Graphic Button Item class
        (c) 1993 Screenplay Systems
        Authors:        S. Greenfield & C. Huntley
        Created:        Nov 11, 1993
        Revised:        $Id$
*************************************************************************

*/

#include "miscutil.h"
#include "graphbtn.h"

#pragma segment graphbtn


/* -----------------------------------------------------------------------
        GraphBtn::GraphBtn - constructor.
----------------------------------------------------------------------- */
GraphBtn::GraphBtn(ItemList* pParent, const GLRect *extent, const GLColor* onColor, const GLColor* offColor, bool_t
doRadioAction, bool_t nonExclusive)
        :       TItem(pParent, extent, kNoFlags, &kGLBlackClr),
                fBtnData (sizeof(GraphBtnDataType)),
                fNmOfButtons (0),
                fOnColor ((GLColor*)onColor),
                fOffColor ((GLColor*)offColor),
                fDoRadioAction (doRadioAction),
                fNonExclusive (nonExclusive)
{
        fWindowRef = GetParentWindowRef();
} /* GraphBtn::GraphBtn */



/* -----------------------------------------------------------------------
        GraphBtn::~GraphBtn - destructor.
----------------------------------------------------------------------- */
GraphBtn::~GraphBtn(void)
{
        for (ls_index listPos=0; listPos < fBtnData.Size(); ++listPos) {
                        GraphBtnDataType graphBtnData;
                        fBtnData.GetElem(&graphBtnData, listPos);
                        delete graphBtnData.btnName;
        }
} /* GraphBtn::~GraphBtn */

/* -----------------------------------------------------------------------
        GraphBtn::AddButton - Adds a new TEXT button.
----------------------------------------------------------------------- */
ls_index GraphBtn::AddButton(short btnType, GLRect *btnRect, char* btnName, gl_font_t font, short fontSize, hilit_style
highlightOn, hilit_style highlightOff, short bevelHeight, const GLColor *textColor, const GLColor *bgColor)
{
        assert(fpGraphEnv);

        GraphBtnDataType graphBtnData;

        graphBtnData.btnType        = btnType;
        graphBtnData.btnName        = (btnName) ? new String(btnName) : NULL;
        graphBtnData.font                   = font;
        graphBtnData.fontSize       = fontSize;
        graphBtnData.fontFace       = GL_NORMAL;
        graphBtnData.textColor      = (GLColor*)textColor;

        graphBtnData.highlightOn    = highlightOn;
        graphBtnData.highlightOff   = highlightOff;
        graphBtnData.bevelHeight    = bevelHeight;

        graphBtnData.bgColor        = (GLColor*)bgColor;
        graphBtnData.btnRect        = *btnRect;
        graphBtnData.btnPixUp       = NULL;
        graphBtnData.btnPixDn       = NULL;
        graphBtnData.state                  = kBtnUp;
        graphBtnData.disabled       = false;

        if (btnName) {
                GL_FMETRIC          fontMetrics;
                fpGraphEnv->Use();
                fpGraphEnv->SetTextAttr(graphBtnData.font, graphBtnData.fontSize, graphBtnData.fontFace);
                fpGraphEnv->GetFontMetrics(&fontMetrics);
                fpGraphEnv->Unuse();
                gl_coord_t ascent                   = gl_get_ascent(&fontMetrics);
                gl_coord_t descent                  = gl_get_descent(&fontMetrics);
                gl_coord_t lineHeight       = ascent + descent;
                graphBtnData.fontHeight     = lineHeight;
                graphBtnData.textRect       = *btnRect;
                graphBtnData.textRect.top += (((btnRect->bottom - btnRect->top) - lineHeight) / 2);
                assert(graphBtnData.textRect.top < graphBtnData.textRect.bottom);
        }

        graphBtnData.btnID = ++fNmOfButtons - 1;
        ls_index listPos = fBtnData.Append(&graphBtnData);
        assert(listPos != kLsNoElem);
        assert(listPos == graphBtnData.btnID);

        Rgn tempRgn(graphBtnData.btnRect);
        fBtnRgn.SetToUnion(tempRgn);
        fBtnRgn.GetRect(&fBoundsRect);
        SetBounds(&fBoundsRect);

        return (listPos);
} /* GraphBtn::AddButton */

/* -----------------------------------------------------------------------
        GraphBtn::AddButton - Adds a new BITMAP button.
----------------------------------------------------------------------- */
ls_index GraphBtn::AddButton(short btnType, GLRect *btnRect, Bitmap* btnPixUp, Bitmap* btnPixDn, hilit_style highlightOn,
hilit_style highlightOff, short bevelHeight, const GLColor *bgColor)
{
        ls_index listPos = AddButton(btnType, btnRect, NULL, GL_SYS_FONT, 12, highlightOn, highlightOff, bevelHeight,
&kGLBlackClr, bgColor);
```

```
        fBtnData.Use();
        GraphBtnDataType* theBtn = (GraphBtnDataType*)fBtnData.ElemPtr(listPos);
        theBtn->btnPixUp = btnPixUp;
        theBtn->btnPixDn = btnPixDn;
        fBtnData.Unuse();

        return (listPos);

} /* GraphBtn::AddButton */


/* -----------------------------------------------------------------------
        GraphBtn::GetButtonState -
----------------------------------------------------------------------- */
bool_t GraphBtn::GetButtonState(ls_index whichBtn)
{
        fBtnData.Use();
        GraphBtnDataType* theBtn = (GraphBtnDataType*)fBtnData.ElemPtr(whichBtn);
        bool_t btnState = theBtn->state;
        fBtnData.Unuse();
        return (btnState);
} /* GraphBtn::GetButtonState */


/* -----------------------------------------------------------------------
        GraphBtn::SetButtonState -
----------------------------------------------------------------------- */
void GraphBtn::SetButtonState(ls_index whichBtn, bool_t state)
{
        fBtnData.Use();
        GraphBtnDataType* theBtn = (GraphBtnDataType*)fBtnData.ElemPtr(whichBtn);
        theBtn->state = state;
        fBtnData.Unuse();
} /* GraphBtn::GetButtonState */


/* -----------------------------------------------------------------------
        GraphBtn::GetWhichBtnDown - Returns the first button which is down.
        For button groups that are not exclusive, call GetAllButtonStates
        instead.  Returns kNoButtonDown (-1) if none are down.
----------------------------------------------------------------------- */
ls_index GraphBtn::GetWhichBtnDown(void)
{
        assert(!fNonExclusive);

        fBtnData.Use();
        for (ls_index listPos=0; listPos < fBtnData.Size(); ++listPos) {
                GraphBtnDataType* theBtn = (GraphBtnDataType*)fBtnData.ElemPtr(listPos);
                if (theBtn->state) {
                        fBtnData.Unuse();
                        return (listPos);
                }
        }
        fBtnData.Unuse();
        return (kNoButtonDown);

} /* GraphBtn::GetWhichBtnDown */


/* -----------------------------------------------------------------------
        GraphBtn::GetAllButtonStates - returns an array of button states
----------------------------------------------------------------------- */
void GraphBtn::GetAllButtonStates(short* stateTable)
{
        assert(fBtnData.Size() < kBtnMaxNum);
        fBtnData.Use();
        for (ls_index listPos=0; listPos < fBtnData.Size(); ++listPos) {
                GraphBtnDataType* theBtn = (GraphBtnDataType*)fBtnData.ElemPtr(listPos);
                stateTable[listPos] = theBtn->state;
        }
        fBtnData.Unuse();
} /* GraphBtn::GetAllButtonStates */


/* -----------------------------------------------------------------------
        GraphBtn::OffsetBtns - Offsets all button coordinates by dx and/or dy
----------------------------------------------------------------------- */
void GraphBtn::OffsetBtns(gl_coord_t dx, gl_coord_t dy)
{
        fBtnData.Use();
        for (ls_index listPos=0; listPos < fBtnData.Size(); ++listPos) {
                GraphBtnDataType* theBtn = (GraphBtnDataType*)fBtnData.ElemPtr(listPos);
                GLOffsetRect(&theBtn->btnRect, dx, dy);
                GLOffsetRect(&theBtn->textRect, dx, dy);
        }
        fBtnData.Unuse();

        fBtnRgn.Offset(dx, dy);
        fBtnRgn.GetRect(&fBoundsRect);
        SetBounds(&fBoundsRect);
} /* GraphBtn::OffsetBtns */


/* -----------------------------------------------------------------------
        GraphBtn::draw_item - draws all our buttons
----------------------------------------------------------------------- */
void GraphBtn::draw_item(GL_ENV_REF env, const Rgn& updateRgn)
{

        fBtnData.Use();
        for (ls_index listPos=0; listPos < fBtnData.Size(); ++listPos) {
                GraphBtnDataType* theBtn = (GraphBtnDataType*)fBtnData.ElemPtr(listPos);
                if (updateRgn.IsIn(theBtn->btnRect))                                    // Skip
drawing button if not in update region
                        draw_button(theBtn);
        }
        fBtnData.Unuse();
} /* draw_item */


/* -----------------------------------------------------------------------
        GraphBtn::draw_button - draws complete button
```

```
--------------------------------------------------------------------------- */
void GraphBtn::draw_button(GraphBtnDataType* theBtn)
{
	assert(fpGraphEnv->IsInUse());
	GLColor savedForeColor;
	fpGraphEnv->GetForeColor(&savedForeColor);
	fpGraphEnv->SetForeColor(*theBtn->bgColor);
	GLRect btnBackRect = theBtn->btnRect;
	fpGraphEnv->PaintRect(btnBackRect);
	fpGraphEnv->SetForeColor(savedForeColor);

	//	Draw Button's bitmap (if present)

	if (theBtn->btnPixUp) {
		GLRect destRect = theBtn->btnRect;
		destRect.right	= destRect.left + theBtn->btnPixUp->GetWidth();
		destRect.bottom	= destRect.top + theBtn->btnPixUp->GetHeight();
		if (theBtn->state == kBtnUp) {
			GLOffsetRect(&destRect, theBtn->bevelHeight, theBtn->bevelHeight);
			theBtn->btnPixUp->CopyToScreen(GetParentWindowRef(), &destRect);
		}
		else {
			if (theBtn->btnPixDn) {
				GLOffsetRect(&destRect, theBtn->bevelHeight, theBtn->bevelHeight);
				theBtn->btnPixDn->CopyToScreen(GetParentWindowRef(), &destRect);
			}
			else {
				GLOffsetRect(&destRect, theBtn->bevelHeight+1, theBtn->bevelHeight+1);
				theBtn->btnPixUp->CopyToScreen(GetParentWindowRef(), &destRect);
			}
		}
	}

	//	Draw Button's textual title (if present)

	if (theBtn->btnName) {
		theBtn->btnName->Use();
		fpGraphEnv->SetForeColor((theBtn->state) ? *fOnColor : *fOffColor);
		fpGraphEnv->SetTextAttr(theBtn->font, theBtn->fontSize, theBtn->fontFace);
		GLRect textRect = theBtn->textRect;
		if (theBtn->state == kBtnDown)
			GLOffsetRect(&textRect, 1, 1);
		fpGraphEnv->StrRect(theBtn->btnName->StrPtr(), textRect, GL_JUST_CENTER, false);
		fpGraphEnv->SetForeColor(savedForeColor);
		theBtn->btnName->Unuse();
	}

	draw_highlighting(&theBtn->btnRect, (theBtn->state) ? theBtn->highlightOn : theBtn->highlightOff, theBtn-
>bevelHeight);
} /* GraphBtn::draw_button */


/* ---------------------------------------------------------------------------
	GraphBtn::draw_highlighting - puts various highlighting frames around
	our buttons.
--------------------------------------------------------------------------- */
void GraphBtn::draw_highlighting(GLRect* theRect, hilit_style theStyle, short bevelHeight)
{
	switch (theStyle) {
		case kCoolBevelUp:		CoolFrameRect(fpGraphEnv, theRect, &kGLBevelUpPat, bevelHeight,
&kGLWhiteClr, &kGL75GrayClr);
						break;

		case kCoolBevelDown:	CoolFrameRect(fpGraphEnv, theRect, &kGLBevelDownPat, bevelHeight,
&kGLWhiteClr, &kGL75GrayClr);
						break;

		case kLevelGrove:		CoolFrameRect(fpGraphEnv, theRect, &kGLGroovePat, 1, &kGLWhiteClr,
&kGL75GrayClr);
						break;
	}
} /* GraphBtn::draw_highlighting */


/* ---------------------------------------------------------------------------
	GraphBtn::DoItemHit - Handle a button press
--------------------------------------------------------------------------- */
bool_t GraphBtn::DoItemHit(EVENT_REC *pEvt, GLPoint pt)
{
	bool_t releasedInButton = true;						// How we
know if spring-action buttons got a valid hit

	if (!fBtnRgn.IsIn(pt))
		return (false);

	short stateTable[kBtnMaxNum];
	GetAllButtonStates((short*)&stateTable);				// Get button states so we know
what to un-highlight later

	ls_index origBtnDown = kNoButtonDown;
	if (fDoRadioAction && !fNonExclusive)
		origBtnDown = GetWhichBtnDown();

	// Track and highlight pressing of button

	GraphBtnDataType* theBtn;
	fBtnData.Use();
	ls_index btnPos = find_button(pt, &theBtn);
	assert(kLsNotFound);
		// should theoretically never happen

	bool_t origState = theBtn->state;
	if (fDoRadioAction && !fNonExclusive && (origState == kBtnDown)) {	// Prevent un-pressing a down button in
non-exclusive radio mode
		fBtnData.Unuse();
		return (false);
	}

	theBtn->state = (theBtn->state) ? kBtnUp : kBtnDown;
	fpGraphEnv->Use();
	draw_button(theBtn);

	do {
```

```
			GLPoint mPt;
			AP_GetLocalMouse(GetParentWindowRef(), &mPt);
			if (GLPtInRect(mPt, &theBtn->btnRect)) {
				if (theBtn->state == origState) {
					theBtn->state = !origState;
					draw_button(theBtn);
				}
			} else {
				if (theBtn->state != origState) {
					theBtn->state = origState;
					draw_button(theBtn);
				}
			}
		} while (AP_MouseStillDown());

		//	If "Spring-Action" is requested, pop button out immediatly

		if (theBtn->btnType == kSpringAction) {
			if (theBtn->state == kBtnDown) {
				theBtn->state = kBtnUp;
				draw_button(theBtn);
			}
			else
				releasedInButton = false;			// User pressed a spring-action button,
but then released outside button
		}

		// Un-highlight other button(s), if required

		if (fDoRadioAction && ((theBtn->btnID != origBtnDown) && (theBtn->state == kBtnDown)) && (!AP_ShiftKey(pEvt) ||
!fNonExclusive))								//
Shift-key down allows multiple selection or individual deselection of buttons
			for (ls_index listPos=0; listPos < fBtnData.Size(); ++listPos) {
				if (stateTable[listPos] && theBtn->btnID != listPos) {
					theBtn = (GraphBtnDataType*)fBtnData.ElemPtr(listPos);
					theBtn->state = kBtnUp;
					draw_button(theBtn);
				}
			}

		fpGraphEnv->Unuse();
		fBtnData.Unuse();

		return (releasedInButton);
} /* GraphBtn::DoItemHit */


/* -----------------------------------------------------------------------
		GraphBtn::find_button - Locate a button base on a point on-screen
------------------------------------------------------------------------- */
ls_index GraphBtn::find_button(GLPoint pt, GraphBtnDataType** graphBtnData)
{
		for (ls_index listPos=0; listPos < fBtnData.Size(); ++listPos) {
			*graphBtnData = (GraphBtnDataType*)fBtnData.ElemPtr(listPos);
			if (GLPtInRect(pt, &((*graphBtnData)->btnRect)))
				return (listPos);
		}
		return kLsNotFound;
} /* GraphBtn::find_button */

#pragma segment main
```

```
/* -----------------------------------------------------------------------
	GRAPHBTN.H
	Graphic Button Item class
	Copyright (C) 1993 Screenplay Systems Inc.
	Revised:	$Id$
----------------------------------------------------------------------- */

#pragma once

#ifndef __GRAPHBTN__
#define __GRAPHBTN__

#include "consts.h"
#include "titem.h"
#include "bitmap.h"

#pragma segment graphbtn

static const short kBtnMaxNum		= 20;			// internal maximum number of buttons per class

//	Graphic Button Data

typedef short	hilit_style;

const hilit_style	kCoolBevelUp	= 1;
const hilit_style	kCoolBevelDown	= 2;
const hilit_style	kLevelGrove		= 3;

const bool_t		kRadioAction	= true;
const bool_t		kNoRadioAction	= false;

const bool_t		kBtnDown		= true;
const bool_t		kBtnUp			= false;

const ls_index		kNoButtonDown	= -1;

const short			kNormalAction	= 1;
const short			kSpringAction	= 2;		// Pressing button immediatly releases after min
wait time

typedef struct {
	ls_index	btnID;			// Position of this button in the list

	Bitmap*		btnPixUp;		// If Picture Btn: the button's up position image
	Bitmap*		btnPixDn;		// If Picture Btn: the button's down position image

	short		btnType;		// Type of this button (text or pict)
	String*		btnName;		// Title of this button
	GLRect		textRect;		// Where to draw text
	GLColor*	textColor;		// Color of text
	gl_font_t	font;			// button's font
	short		fontSize;		// button's font size
	gl_face_t	fontFace;		// Button's font style
	gl_coord_t	fontHeight;		// ascent + descent of font

	GLRect		btnRect;		// the rect of the button
	GLColor*	bgColor;		// Background color
	hilit_style	highlightOn;	// Style of button highlighting when "on"
	hilit_style	highlightOff;	// Style of button highlighting when "off"
	short		bevelHeight;	// # of pixels "high" to draw bevel

	bool_t		state;			// Is button on or off?
	bool_t		disabled;		// is button disabled?
} GraphBtnDataType;

/* -----------------------------------------------------------------------
	GraphBtn - item which encapsulates a graphic button.  This button can
	have either checkbox-like or radio button-like behavior.
----------------------------------------------------------------------- */
class GraphBtn : public TItem {
public:
	// CONSTRUCTION/DESTRUCTION
	GraphBtn(ItemList* pParent, const GLRect *extent = NULL, const GLColor* onColor = &kGLBlackClr, const GLColor*
offColor = &kGLBlackClr, bool_t doRadioAction = kRadioAction, bool_t nonExclusive = true);
	~GraphBtn(void);

	// PUBLIC UTILITIES
	virtual char*		ClassName(void) const	{ return "GraphBtn"; }
	virtual class_t		ClassType(void) const	{ return kGraphBtn; }
	virtual bool_t		IsOfType(const void *pType) const { return *(class_t*) pType == kGraphBtn ||
TItem::IsOfType(pType); }
	virtual TObject*	Duplicate(void) const	{ return new GraphBtn(*this); }
	virtual byte_cnt	GetObjSize(void)		{ return sizeof(GraphBtn); }

	virtual bool_t		DoItemHit(EVENT_REC *pEvt, GLPoint pt);

	virtual err_t		Read(TFile &pFile)		{}
	virtual err_t		Write(TFile &pFile)		{}

			short		GetNmOfButtons(void)	{ return fBtnData.Size(); }
			ls_index	AddButton(short type, GLRect *btnRect, char* btnName, gl_font_t font =
GL_SYS_FONT, short size = 12, hilit_style highlightOn = kCoolBevelUp, hilit_style highlightOff = kCoolBevelDown, short
bevelHeight = 2, const GLColor *textColor = &kGLBlackClr, const GLColor *bgColor = &kGL25GrayClr);
			ls_index	AddButton(short btnType, GLRect *btnRect, Bitmap* btnPixUp, Bitmap*
btnPixDn, hilit_style highlightOn = kCoolBevelUp, hilit_style highlightOff = kCoolBevelDown, short bevelHeight = 2, const
GLColor *bgColor = &kGL25GrayClr);

			void		SetFace(ls_index whichBtn, gl_face_t face)		{
((GraphBtnDataType*)fBtnData.UseElem(whichBtn))->fontFace = face; fBtnData.Unuse(); }

			bool_t		GetButtonState(ls_index whichBtn = 0);
			void		SetButtonState(ls_index whichBtn, bool_t state);
			ls_index	GetWhichBtnDown(void);
			void		GetAllButtonStates(short* stateTable);
			void		OffsetBtns(gl_coord_t dx, gl_coord_t dy);

protected:
	// DATA MEMBERS

	WINDOW_REF		fWindowRef;		// Saved for convenience
	List			fBtnData;
```

```
        Rgn                              fBtnRgn;                // Region which encloses all the buttons in this
group
        GLRect                  fBoundsRect;    // Rect which bounds region (redundant -- this is also part of
region)
        GLColor*                fOnColor;               // color of text if button is on
        GLColor*                fOffColor;              // color of text if button is off

        short                   fNmOfButtons;   // Number of buttons in this group
        short                   fRsrcID;                // the button's resource ID

        bool_t                  fDoRadioAction; // FALSE if Buttons can be pressed without radio button
"exclusivity" (non-exclusively)
        bool_t                  fNonExclusive;  // Allows depression of multiple items via SHIFT key (default true)

        // LOCAL ROUTINES

        virtual void            draw_item(GL_ENV_REF env, const Rgn& updateRgn);
                void                    draw_button(GraphBtnDataType* theBtn);
                void                    draw_highlighting(GLRect* theRect, hilit_style theStyle, short bevelHeight);
                ls_index                find_button(GLPoint pt, GraphBtnDataType** graphBtnData);

}; /* GraphBtn */

#pragma segment main

#endif /* __GRAPHBTN__ */
```

```
/******************************************************************
        HELPPAL.CC
        Help Palette View classes
        (c) 1993 Screenplay Systems
        Authors:          S. Greenfield & C. Huntley
        Created:          June 2, 1993
        Revised:          $Id$
*******************************************************************

*/

#include "tappl.h"
#include "appdlogs.h"
#include "graphics.h"
#include "tpalette.h"
#include "tview.h"
#include "printx.h"

#include "ptext.h"
#include "dramatic.h"
#include "document.h"

#include "structs.h"
#include "address.h"
#include "semtable.h"
#include "textwrap.h"
#include "helppal.h"

#pragma segment helppal

/* -------------------------------------------------Stephen---06/02/93---
        HelpPalView::Constructor
------------------------------------------------------------------------ */
HelpPalView::HelpPalView(DRDoc* theDoc, ItemList* pParent, vw_flags vflags, const GLRect *extent, it_flags iflags, const
GLColor *color)
            : TView(pParent, vflags, extent, iflags, color),
                fDoc(theDoc),
            fExtent (*extent),
                fContent (*extent),
            fPaletteTW (NULL)
{
        init_scrollers();

        fApp              = (Dramatica*)AP_Data()->fApp;
        fAppPFMFile = fApp->GetPFMFile();
        fWindow           = pParent->GetParent();
        assert(fDoc);

        fContent.right    -= 16;
        fContent.bottom   -= 16;

        fFont             = GL_GENEVA;
        fFontSize         = 9;
        fFace             = GL_NORMAL;
}

/* -------------------------------------------------Stephen---06/02/93---
        HelpPalView::Destructor
------------------------------------------------------------------------ */
HelpPalView::~HelpPalView(void)
{
        destruct_palette_data();
}


/* -------------------------------------------------Stephen---03/19/93---
        HelpPalView::destruct_palette_data - Gets rid of current data.
------------------------------------------------------------------------ */
void HelpPalView::destruct_palette_data(void)
{
        delete fPaletteTW;
}

/* -------------------------------------------------Stephen---03/19/93---
        HelpPalView::set_help_palette_data - Sets up our data.
------------------------------------------------------------------------ */
void HelpPalView::set_help_palette_data(char* theText)
{
        //      Load in all the proper appreciation segments

        GLRect textRect;
        GLRect viewExtent = GetBounds();
        GLSetRect(&textRect, 0, viewExtent.left, 0, viewExtent.right-25);
        if (fPaletteTW)
                delete fPaletteTW;

        fpGraphEnv->Use();
        fPaletteTW = new TextWrap(fDoc, fpGraphEnv, &textRect, theText, fFont, fFontSize, fFace);
        fpGraphEnv->Unuse();
        SetVLineSize(fPaletteTW->GetLineHeight());
        DocumentResize();
}

/* -------------------------------------------------Stephen---03/19/93---
        HelpPalView::draw_view - Does the bulk of drawing our StoryPoints
        window.
------------------------------------------------------------------------ */
void HelpPalView::draw_view (const VwPaneUpdateInfo& updateInfo)
{
        LgPoint           VwOrigin = *updateInfo.InqOffset();        // local coordinates for the view's origin

        gl_coord_t        X                          = (gl_coord_t)(VwOrigin.x);
        gl_coord_t        Y                          = (gl_coord_t)(VwOrigin.y);

        // DRAW REST OF VIEW

        gl_coord_t        rowY                       = 0-Y;
        gl_coord_t        totalHeight                = 0;
```

```
        gl_coord_t          updateTop;
        gl_coord_t          updateBot;

        //      Clip out top margin area from update region, so we don't try to draw rows there

        GLPoint             marginLineLoc;
        LgPoint             marginLineDoc;
        marginLineLoc.y = 0;                                    // Local top margin of 0 is the top of the view
        marginLineLoc.x = 0;
        loc_to_doc(marginLineLoc, &marginLineDoc);

        LgRect myUpdateRect;
        updateInfo.InqDocRgn()->GetRect(&myUpdateRect);
        myUpdateRect.top                    = MAX(myUpdateRect.top, marginLineDoc.y);
        myUpdateRect.bottom                 = MAX(myUpdateRect.top, myUpdateRect.bottom);

        updateTop           = (gl_coord_t)(myUpdateRect.top);
        updateBot           = (gl_coord_t)(myUpdateRect.bottom);


        if (fPaletteTW)
                totalHeight = fPaletteTW->Draw(fpGraphEnv, &updateInfo, kNeverPrint, rowY+1, 5-X);

#if 0
        if (!fInitedView) {
                SetVLineSize(rowHeight);
                DocumentResize();
                fInitedView = true;
        }
#endif

} /* HelpPalView::draw_view */


/* ---------------------------------------------------Stephen---03/19/93---
        HelpPalView::Resize -
------------------------------------------------------------------------- */
void HelpPalView::Resize(void *pNewSize, TObject *pSender)
{
//      TView::Resize(pNewSize, pSender);
        GLRect myBounds;
        GetParentWindow()->GetPortRect(&myBounds);
//      myBounds.bottom-=14;
        myBounds.bottom+=1;
        myBounds.top-=1;
        myBounds.left-=1;
        myBounds.right+=1;
        SetBounds(&myBounds);

//      destruct_palette_data();

}


#if 0

/* ---------------------------------------------------Stephen---03/19/93---
        StoryPoints::GetNumVLines -
------------------------------------------------------------------------- */
long StoryPoints::GetNumVLines(void)
{
         return (long)(SP_ROWS);
}

/* ---------------------------------------------------Sandy---11/04/92---
        TView::calculate_size_of_v_lines - returns the vertical size in pixels
                of the lines starting from the current value of the vertical
                scroll bar
------------------------------------------------------------------------- */
long    StoryPoints::calculate_size_of_v_lines(short numberOfLines)
{
        long    theLine = GetVScrollPos();
        long    theNumberOfPixels = 0;
        short   theNumberOfLines = numberOfLines >= 0 ? numberOfLines : -numberOfLines;
        short   theIncrement = numberOfLines >= 0 ? 1 : -1;

        assert(HasVariableSizeVLines());

        while (theNumberOfLines--) {
                theNumberOfPixels += GetVLineSize((theIncrement==1) ? theLine-1 : theLine);
                theLine += theIncrement;
        }
        theNumberOfPixels = numberOfLines >= 0 ? theNumberOfPixels : -theNumberOfPixels;
        return theNumberOfPixels;

} /* StoryPoints::calculate_size_of_v_lines */


/* ---------------------------------------------------Stephen---03/19/93---
        StoryPoints::GetVLineSize -
        NOTE: line can be 0!
------------------------------------------------------------------------- */
long StoryPoints::GetVLineSize(long line)
{
//      lprintf("GetVLineSize(%ld)\n",line);
//      assert(line+1 <= SP_ROWS+2);
        if ((line+1) > SP_ROWS)                                          // no height for line at very end
                return (0);

        long vLineSize = (long)(SPData[(int)(line+1)].rowHeight);
        return vLineSize;
}


/* ---------------------------------------------------Stephen---03/19/93---
        StoryPoints::SetVLineSize -
------------------------------------------------------------------------- */
void StoryPoints::SetVLineSize(gl_coord_t size, long line)
{
        if (line+1 > SP_ROWS) {                 // DEBUGGING
```

```
                assert((line+1) <= SP_ROWS);
        }

        SPData[(int)(line+1)].rowHeight = size;
}

/* ---------------------------------------------------Sandy---11/05/92---
        StoryPoints::GetPageIncrement - returns the number of lines to scroll by a
                "page" of data from the row or column specified by 'line' in the
                direction specified by 'destination'.
----------------------------------------------------------------------- */
long StoryPoints::GetPageIncrement(long line, short destination)
{
        long    lines;

        switch (destination) {
                case kNextHPage:
                        lines = GetNumHLinesVis();
                        break;

                case kPrevHPage:
                        lines = -GetNumHLinesVis();
                        break;

                case kNextVPage:
                        lines = GetNumVLinesVis();              // +1 by SMG (and CNH)
                        break;

                case kPrevVPage:
                        lines = -GetNumVLinesVis();
                        break;

                default:
                        assert(false);
                        break;
        }
        return lines;

} /* StoryPoints::GetPageIncrement */


/* -----------------------------------------------------------------------
        StoryPoints::GetLineVPosition - return the offset (in document coordinates)
                from the origin of the document to the top edge of the specified
                row.
----------------------------------------------------------------------- */
doc_coord_t StoryPoints::GetLineVPosition(long line)
{
        doc_coord_t lineVPos = 0;
        long            n;
        long            vLineSize;

        if (line >= GetNumVLines()+1) {                                 // DEBUGGING
                assert(line >= 0 && line < GetNumVLines()+1);
        }

        for (n=0; n<line; ++n) {
                vLineSize = GetVLineSize(n);
                lineVPos += vLineSize;
        }

        return lineVPos;

} /* StoryPoints::GetLineVPosition */
#endif


/* -----------------------------------------------------------------------
        OutlineView::Print - prints the contents of the OutlineView.
----------------------------------------------------------------------- */
err_t HelpPalView::PrintView(Printing *pPrintMgr)
{
        LgPoint offset;
        offset.x = 0;                                   // print in an unscrolled position.
        offset.y = 0;
        Rgn updateRgn;
        VwPaneUpdateInfo updateInfo(pPrintMgr->GetPrinterEnv()->InqEnvRef(), offset, updateRgn);
        draw_view(updateInfo);

        return NOERR;

} /* HelpPalView::PrintView */


/* =======================================================================
                                                        Definitions Palette CLASS
   ==================================================================== */

/* ---------------------------------------------------Stephen---06/02/93---
        DefinitView::Constructor
----------------------------------------------------------------------- */
DefinitView::DefinitView(DRDoc* theDoc, ItemList* pParent, vw_flags vflags, const GLRect *extent, it_flags iflags, const
GLColor *color)
           : HelpPalView(theDoc, pParent, vflags, extent, iflags, color),
             fSemVal (0)
{
}


/* ---------------------------------------------------Stephen---06/02/93---
        DefinitView::~DefinitView - destructor
----------------------------------------------------------------------- */
DefinitView::~DefinitView(void)
{
}


/* ---------------------------------------------------Stephen---06/02/93---
        DefinitView::SetDefinition - Sets a definition
----------------------------------------------------------------------- */
void DefinitView::SetDefinition(short semVal, bool_t drawNow, bool_t beSmart)
```

```
{
                char tempStr[300];
        if (beSmart && semVal == fSemVal)                               // Prevent excessive redrawing of same value
                return;

        if (semVal) {
                Unit* theUnit = Addr2Item(RefSC, SEMTBL_ADDRESS(semVal));
                int n = sprintf(tempStr,"(SNF(%hd)):  (SDF(%hd)).",theUnit->semVal, theUnit->semVal);
                assert (n < 300);
        }
        else
                tempStr[0] = 0;

        set_help_palette_data(tempStr);
        fSemVal = semVal;

        if (!drawNow)
                AP_InvalGLRect(GetParentWindow()->GetWindowRef(), &fContent);
//              Inval();
        else {
                GLRect clearTextRect;
                GLRect   windBounds;
                fWindow->GetPortRect(&windBounds);
                GLSetRect(&clearTextRect, 2, 102, 34, windBounds.right-16-2);

                fpGraphEnv->Use();
                fpGraphEnv->EraseRect(clearTextRect);

                LgPoint offset;
                offset.x = 0;                                                   // print in an unscrolled
position.
                offset.y = 0;
                Rgn updateRgn(windBounds);
                GL_ENV_REF env = fpGraphEnv->InqEnvRef();
                VwPaneUpdateInfo updateInfo(env, offset, updateRgn);
                draw_view(updateInfo);
                fpGraphEnv->Unuse();
        }
} /* DefinitView::SetDefinition */


/* -------------------------------------------------Stephen---03/19/93---
        DefinitView::Resize -
------------------------------------------------------------------------ */
void DefinitView::Resize(void *pNewSize, TObject *pSender)
{
        GLRect myBounds;
        GetParentWindow()->GetPortRect(&myBounds);
        myBounds.bottom+=1;
        myBounds.top-=1;
        myBounds.left-=1;
        myBounds.right+=1;
        SetBounds(&myBounds);
        SetDefinition(fSemVal, false, false);
}



/* ======================================================================
                                                        Help Palette CLASS
   ====================================================================== */

/* ----------------------------------------------------------------------
        helpPalette::helpPalette - CONSTRUCTOR
------------------------------------------------------------------------ */
helpPalette::helpPalette(TAppl *pTAppl, TDoc *pTDoc, GLRect *bounds, wn_type windowType, const char *title, ptr_t
storage)
                : TPalette(pTAppl, bounds, title),
                  fDoc((DRDoc*)pTDoc),
                  fVisible (false),
                  fMyView (NULL)
{
}


/* ----------------------------------------------------------------------
        helpPalette::SetupWindow -
------------------------------------------------------------------------ */
void helpPalette::SetupWindow(void)
{
        if (fItems)
                delete fItems;     // free any existing item list.

        if (ASSERT(fItems = new ItemList(this))) {
                it_test_proc       pDoesKeyDowns = &TItem::DoesKeyDowns;

                // STUFF IN OUR VIEW

                GLRect myBounds;
                GetPortRect(&myBounds);
                TItem* newHelpPalItem = new DefinitView(fDoc, fItems, (TView::kVScroll + TView::kHScroll), &myBounds,
TItem::kResizable);
                assert(newHelpPalItem);
                fMyView = (DefinitView*)newHelpPalItem;
                fItems->Append(newHelpPalItem);
//              fMyView->init_view();
                SetPaletteVisible(true);
                GetView()->SetDefinition(85, true);

                set_window_content_color();

                if (ASSERT(fItems)) {
                        for (ls_index i = 0; i < fItems->Size(); i++) {
                                TItem*   pTItem = fItems->Elem(i);

                                if (pTItem->Is(&TItem::kResizable))
                                        pTItem->Resize();

                                pTItem->Awaken(&i);
                        }
                        if (fKeyItem == kItNoItem)
```

```
                                SetKeyItem(fItems->FirstObjThat((test_pp) &pDoesKeyDowns));
                        if (fKeyItem != kItNoItem) {
                                fGraphEnv.Use();
                                        GetItem(fKeyItem)->FocusIn();
                                fGraphEnv.Unuse();
                        }
                }
        }
} /* helpPalette::SetupWindow */


void helpPalette::draw_window(GL_ENV_REF env)
{
        TPalette::draw_window(env);

} /* helpPalette::draw_window */


void helpPalette::Resize(void *pNewSize, TObject *pSender)
{
        TWindow::Resize(pNewSize, pSender);
        fItems->Resize();
}


#if 0
/* --------------------------------------------------------------------------
                                                Definitions COMMAND CLASS
-------------------------------------------------------------------------- */

/* --------------------------------------------------------------------------
        DefinitCmd::IsValid -
-------------------------------------------------------------------------- */
bool_t DefinitCmd::IsValid(TAppl *pApp)
{
        ls_index        activeDoc       = pApp->ActiveDoc();
        if (activeDoc != kLsNoElem) {
                DRDoc*  theDoc = ((DRDoc*)pApp->GetDoc(activeDoc));
                return (theDoc == NULL) ? false : true;
        }
        return (false);
} /* DefinitCmd::IsValid */


/* --------------------------------------------------------------------------
        DefinitCmd::do_cmd -
-------------------------------------------------------------------------- */
err_t DefinitCmd::do_cmd(void)
{
        GLRect                  myBounds;
        Dramatica*              fApp            = (Dramatica*)AP_Data()->fApp;
        DRDoc*                  theDoc = ((DRDoc*)fParentApp->ActiveWindow()->GetDoc());
        assert(theDoc);

        helpPalette*    pTPalette;

        pTPalette = fApp->GetDefinePalette();
        if (pTPalette) {
                if (pTPalette->IsPaletteVisible()) {            // if visible, hide it.
                        pTPalette->HideWindow(NULL, NULL);
                        pTPalette->SetPaletteVisible(false);
                } else {                                                        // if hidden,
show it.
                        pTPalette->ShowWindow();
                        pTPalette->SetPaletteVisible(true);
                        fApp->SetActiveWindows();                       // Cause list to be resorted, so palette
appears on top
                }
                return NOERR;
        } else {
                GLSetRect(&myBounds, 260, 10, 340, 500);
                pTPalette = new helpPalette(fParentApp, theDoc, &myBounds, WN_DOC_WINDOW, "Definitions");
                pTPalette->SetupWindow();
                fApp->SetDefinePalette(pTPalette);
                pTPalette->SetPaletteVisible(true);
        }

#ifdef WHENNEWCLASSLIB
        if (pTPalette->IsPaletteVisible()) {
                ls_index refMenu = fApp->GetReferenceMenu();
                pMenu->SetItemName("Hide Definitions",3);
        }
#endif

        return NOERR;
} /* DefinitCmd::do_cmd */

#endif

#pragma segment main


/* xxxxxxxxxxxxxxxxxxxxxxxxxxxxxxxxxxxxxxxxxxxxxxxxxxxxxxxxxxxxxxxxxxxxxxxxxx
 * $Log:          helppal.cc,v $
Revision 1.5  93/09/24  15:31:04  stephen
Cleaned up warnings.

Revision 1.4  93/08/20  14:00:00  stephen
Help palletes were modified to move some routines into public view.

Revision 1.3  93/06/10  14:48:23  stephen
Help palette connection.

Revision 1.2  93/06/05  01:13:51  stephen
Attempted to get help palette working...

Revision 1.1  93/06/03  23:15:12  stephen
Initial revision

 */
```

```
/* -------------------------------------------------------------------------
        HELPPAL.H
        Outline view class
        Copyright (C) 1993 Screenplay Systems Inc.
        Revised:         $Id$
------------------------------------------------------------------------- */

#pragma once

#ifndef __HELPPAL__
#define __HELPPAL__

#include "ItemList.h"
#include "tview.h"
#include "tpalette.h"

#include "consts.h"
#include "textwrap.h"

#pragma segment helppal

class Dramatica;
class DRDoc;

/* -------------------------------------------------------------------------
        HelpPalView - General Help Pallet View class.
------------------------------------------------------------------------- */
class HelpPalView : public TView {
public:
        // CONSTRUCTION/DESTRUCTION
        HelpPalView(DRDoc* theDoc, ItemList* pParent, vw_flags vflags = kNoFlags, const GLRect *extent = NULL, it_flags
iflags = List::kNoFlags, const GLColor *color = &kGLBlackClr);
        ~HelpPalView(void);

        // PUBLIC UTILITIES
        virtual char*     ClassName(void) const      { return "HelpPalView"; }
        virtual class_t   ClassType(void) const      { return kHelpPalView; }
        virtual bool_t    IsOfType(const void *pType) const { return *(class_t*) pType == kHelpPalView ||
TView::IsOfType(pType); }
        virtual TObject* Duplicate(void) const      { return new HelpPalView(*this); }


        // ACTION PROCS

        // PUBLIC BEHAVIOR
        virtual void      Frame(void *env, TObject *pSender = NULL) {}         // TItem:: function.  Overriden here to
prevent framing of view
        virtual void      draw_view(const VwPaneUpdateInfo& updateInfo);
        virtual err_t     PrintView(Printing *pPrintMgr);
        virtual void      Resize(void *pNewSize, TObject *pSender);
//      char*                     PID2Ptr(pl_id dataID)                                  { /* assert (dataID >=
0); */  if (dataID < 0) return ((char*)PT_UNDEFINED); else return ((char*)fTextPool.DataPtr(dataID)); }

        virtual  void     init_view(void)                                                {
set_help_palette_data("Context sensitive definitions"); }
        void                      SetHelpPaletteText(char* theText)          { set_help_palette_data(theText); }
        virtual  long     GetNumVLines(void)                                             { return (fPaletteTW)
? fPaletteTW->GetLines() : 0; }

        void                      GetTextFontSpec(gl_font_t *pFont, short *pSize, gl_face_t *pFace)       { *pFont =
fFont; *pSize = fFontSize; *pFace = fFace; }
        void                      SetTextFontSpec(gl_font_t *pFont, short *pSize, gl_face_t *pFace)       { fFont =
*pFont; fFontSize = *pSize; fFace = *pFace; }

protected:
        Dramatica*        fApp;
        DRDoc*            fDoc;
        TWindow*          fWindow;
        pfm_fd_t          fAppPFMFile;
        TextWrap*         fPaletteTW;                     // the text to be displayed
        GLRect            fExtent;                        // The view's rectangle
        GLRect            fContent;                       // Content region only

        gl_font_t         fFont;                          // Font for this window
        short             fFontSize;                      // Size of font
        gl_face_t         fFace;                          // Face of the font

        short             fNmOfLines;                     // Current number of lines for this window

        // LOCAL UTILITIES

        void              set_help_palette_data(char* theText);
        void              destruct_palette_data(void);

}; /* HelpPalView */


/* -------------------------------------------------------------------------
        DefinitView - Definition Pallet view class.
------------------------------------------------------------------------- */
class DefinitView : public HelpPalView {
public:
        // CONSTRUCTION/DESTRUCTION
        DefinitView(DRDoc* theDoc, ItemList* pParent, vw_flags vflags = kNoFlags, const GLRect *extent = NULL, it_flags
iflags = List::kNoFlags, const GLColor *color = &kGLBlackClr);
        ~DefinitView(void);

        // PUBLIC UTILITIES
        virtual char*     ClassName(void) const      { return "DefinePalView"; }
        virtual class_t   ClassType(void) const      { return kDefinePalView; }
        virtual bool_t    IsOfType(const void *pType) const { return *(class_t*) pType == kDefinePalView ||
TView::IsOfType(pType); }
        virtual TObject* Duplicate(void) const      { return new DefinitView(*this); }

        virtual void      Resize(void *pNewSize, TObject *pSender);
        virtual  void     init_view(void)                   { set_help_palette_data("This is my function"); }

        void                      SetDefinition(short semVal, bool_t drawNow = false, bool_t beSmart = false);
        short                     GetDefSemVal(void)                     { return fSemVal; }

protected:
```

```
        short                   fSemVal;                                        // SemVal of the current definition we
are looking at

}; /* DefinitView */


/* ------------------------------------------------------------------------
                                                        Help Palette (window) CLASS
-------------------------------------------------------------------------- */
class helpPalette : public TPalette {
public:
        // CONSTRUCTION/DESTRUCTION
        helpPalette(TAppl *pTAppl, TDoc *pTDoc, GLRect *bounds, wn_type windowType, const char *title, ptr_t storage =
NULL);

        // PUBLIC UTILITIES
        virtual char*     ClassName(void) const       { return "helpPalette"; }
        virtual class_t   ClassType(void) const       { return kHelpPalette; }
        virtual bool_t    IsOfType(const void *pType) const { return *(class_t*) pType == kHelpPalette ||
TPalette::IsOfType(pType); }

        // CUSTOMIZED BEHAVIOR
        void                    SetupWindow(void);
        DefinitView*      GetView(void)                                 { return fMyView; }
        bool_t                  IsPaletteVisible(void)                  { return fVisible; }
        void                    SetPaletteVisible(bool_t state)    { fVisible = state; }

protected:
        // DATA MEMBERS
        DRDoc*                  fDoc;
        DefinitView*      fMyView;              // Pointer to our view
        bool_t                  fVisible;                 // TRUE if the palette is currently visible

        // LOCAL UTILITIES
        virtual void      draw_window(GL_ENV_REF env);
        virtual void      Resize(void *pNewSize, TObject *pSender = NULL);

}; /* helpPalette */


#if 0
/* ------------------------------------------------------------------------
        DefinitCmd - the command class associated Definitions help palette in
        the Reference menu.
-------------------------------------------------------------------------- */
class DefinitCmd : public TCommand {
public:
        DefinitCmd(TAppl* pTAppl) : TCommand(pTAppl) {}

        virtual char*     ClassName(void)    const    { return "DefinitCmd"; }
        virtual class_t   ClassType(void) const       { return kDefinitCmd; }
        virtual bool_t    IsOfType(const void *pType) const { return *(class_t*) pType == kDefinitCmd ||
TCommand::IsOfType(pType); }
        virtual TObject* Duplicate(void) const        { return new DefinitCmd(*this); }

        static bool_t     IsValid(TAppl *pTAppl);

protected:
        virtual err_t     do_cmd(void);

}; /* DefinitCmd */
#endif

#pragma segment main

/* xxxxxxxxxxxxxxxxxxxxxxxxxxxxxxxxxxxxxxxxxxxxxxxxxxxxxxxxxxxxxxxxxxxxxxxxxx
 *  $Log:         helppal.h,v $
 * Revision 1.3  93/08/20  14:00:29  stephen
 * Help palletes were modified to move some routines into public view.
 *
 * Revision 1.2  93/06/10  14:51:00  stephen
 * Help palette connection.
 *
 * Revision 1.1  93/06/03  23:15:20  stephen
 * Initial revision
 *
 */

#endif /* __HELPPAL__ */
```

```
/*********************************************************************
        JUSTIFY.CC
        Dramatica Justification Functions
        (c) 1993 Screenplay Systems
        Authors:        S. Greenfield & C. Huntley
        Created:        January 31, 1993
        Revised:        $Id$
**********************************************************************
*/

#include <stdio.h>
#include <string.h>

#include "genutls.h"

#include "tappl.h"
#include "document.h"
#include "structs.h"
#include "address.h"
#include "opquad.h"
#include "query.h"
#include "relation.h"
#include "semtable.h"
#include "justify.h"
#include "apprec.h"

enum { PRIMARY=1, SECONDARY };

static bool_t     OK2Justify(DRDoc* theDoc);

static void             objectiveJustification(DRDoc* theDoc, SuperClass *justSC, OpQuadGroup *OpQdGp, AddrPtr
objAddr, AddrPtr subAddr, enum JUSTORDER justOrder);
static void             subjectiveJustification(DRDoc* theDoc, SuperClass *theSC, OpQuadGroup *OpQdGp, AddrPtr
objAddr, AddrPtr subAddr, enum JUSTORDER justOrder);

static void             findFocus(DRDoc* theDoc, SuperClass *justSC, AddrPtr probElemAddr, AddrPtr focusElement);

static void             buildSecondaryClassAddr(DRDoc* theDoc, enum OPJUSTS justification, SuperClass *justSC, AddrPtr
firstAddr, AddrPtr secondAddr);
static int              FindAddrProc(AddrPtr secondAddr, void *firstAddrPtr, void *secondSC);

static void             doObjFlipOp(DRDoc* theDoc, SuperClass *theSC, short sequence, OpQuadGroup *OpQdGp, AddrPtr
problemAddr, short res, short lev);
static void             doSubFlipOp(DRDoc* theDoc, SuperClass *theSC, short sequence, OpQuadGroup *OpQdGp, AddrPtr
problemAddr, short resolution, short level);
static void             doObjRotateOp(DRDoc* theDoc, SuperClass *theSC, short sequence, OpQuadGroup *OpQdGp, AddrPtr
problemAddr, short resolution, short level);
static void             doSubRotateOp(DRDoc* theDoc, SuperClass *theSC, short sequence, OpQuadGroup *OpQdGp, AddrPtr
problemAddr, short resolution, short level);

static int              getObjOperation(OpQuadPtr opQdPtr, short res, short lev);
static int              getSubOperation(OpQuadPtr opQdPtr, short res, short lev);
static void             executeObjOpQuads(DRDoc* theDoc, SuperClass *theSC, OpQuadGroup *OpQdGp, AddrPtr problemAddr,
AddrPtr opAddr);
static void             executeSubOpQuads(DRDoc* theDoc, SuperClass *theSC, OpQuadGroup *OpQdGp, AddrPtr problemAddr,
AddrPtr opAddr);

static int              setTKADProc(AddrPtr addr, void *theSC, void *unused);
static int              setPRCPProc(AddrPtr addr, void *theSC, void *unused);
static int              set1234Proc(AddrPtr addr, void *theSC, void *unused);


/* ----------------------------------------------------------------------
        FUNCTION:       setTKADProc
        Purpose:        To go through and set the TKAD for a given SuperClass
        Accepts:        An address to test from the SuperClass.
        Returns:        Nothing.
------------------------------------------------------------------------ */
static int setTKADProc(AddrPtr addr, void *theSC, void *unused)
{
        Unit *theUnit;

        assert(theSC != RefSC);

        theUnit = Addr2Item((SuperClass *)theSC, addr);
        theUnit->theTKAD = Addr2QuadPos(addr);                          /* assign the unit's quad
position as the TKAD */

        return (FOR_CONTINUE);                                          /* next
address */
// #pragma unused(unused)
}



/* ----------------------------------------------------------------------
        FUNCTION:       setPRCPProc
        Purpose:        To go through and set the PRCO for a given SuperClass
        Accepts:        An address to test from the SuperClass.
        Returns:        Nothing.
------------------------------------------------------------------------ */
static int setPRCPProc(AddrPtr addr, void *theSC, void *unused)
{
        Unit *theUnit;

        assert(theSC != RefSC);

        theUnit = Addr2Item((SuperClass *)theSC, addr);
        theUnit->thePRCO = Addr2QuadPos(addr);                          /* assign the unit's quad
position as the PRCO */

        return (FOR_CONTINUE);                                          /* next
address */
//#pragma unused(unused)
}


/* ----------------------------------------------------------------------
        FUNCTION:       set1234Proc
        Purpose:        To go through and set the 1234 for a given SuperClass
        Accepts:        An address to test from the SuperClass.
```

```
        Returns:        Nothing.
------------------------------------------------------------------------ */
static int set1234Proc(AddrPtr addr, void *theSC, void *unused)
{
        Unit *theUnit;

        assert(theSC != RefSC);

        theUnit = Addr2Item((SuperClass *)theSC, addr);
        theUnit->the1234 = Addr2QuadPos(addr);                                  /* assign the unit's quad
position as the 1234 */

        return (FOR_CONTINUE);                                                  /* next
address */
//#pragma unused(unused)
}


/* ------------------------------------------------------------------------
        FUNCTION:       OK2Justify
        Purpose:        Determines if we have all the right info to perform
                                justification.
------------------------------------------------------------------------ */
static bool_t OK2Justify(DRDoc* theDoc)
{
        return (theDoc->GetTotalStories() == 1);

#if 0
        for (appr_index_t apprIndex=kApprResolve; apprIndex<=kApprJudgment; apprIndex+=3)
                if (theDoc->GetApprValByIndex(apprIndex) <= 0)
                        return (false);

        if (((theDoc->GetApprValByIndex(kApprSTPbm) <= 0 && CHANGE) ||
            (theDoc->GetApprValByIndex(kApprMCPbm)) <= 0 && STEADFAST))
                        return (false);

        return (true);
#endif
} /* OK2Justify */


/* ------------------------------------------------------------------------
        FUNCTION:       JustifyStory
        Purpose:        builds entire story universe(s).
        Accepts:        pointers to the two justified classes.
        Method:
        Melanie Sez: It's the heart of the whole thing, it's metaphysics, its the
                                leap between particles and waves, it's magic, no one has ever
                                been able to do it, etc... Also: it binds the universe.
------------------------------------------------------------------------ */
bool_t JustifyStory(DRDoc* theDoc, SuperClass *just1SC, SuperClass *just2SC)
{
        OpQuadGroup             OpQdGp;
        AddrText                objAddr, subAddr;

        if (!OK2Justify(theDoc))
                return (false);

        if (CHANGE) {
                semval_t semVal = theDoc->GetApprValByIndex(kApprSTPbm);
                strcpy(objAddr, SEMTBL_ADDRESS(semVal));
                strcpy(subAddr, EMPTY_ADDR);
        } else {
                semval_t semVal = theDoc->GetApprValByIndex(kApprMCPbm);
                strcpy(subAddr, SEMTBL_ADDRESS(semVal));
                strcpy(objAddr, EMPTY_ADDR);
        }


        if (FEMALE)
                ForEveryLevel(set1234Proc, just1SC, ALL_CLASSES, ALL_ITEMSIZES);                /* Female
Justification:  set the act order 1234 before any justification has occured */
        else
                ForEveryLevel(setTKADProc, just1SC, ALL_CLASSES, ALL_ITEMSIZES);                /* Male Justification:
assign the TKAD before any justification has occured */

        if (CHANGE) {
                                        /* "Change" stories have objective justification first and then subjective
justification second */
                objectiveJustification(theDoc, just1SC, &OpQdGp, objAddr, subAddr, FIRSTJUST);  /* do the first
justification (objective) to the just1SC SuperClass */
                buildSecondaryClassAddr(theDoc, OP_OBJECTIVE, just1SC, objAddr, subAddr);       /* find the problem
element in the justified SuperClass and stuff it into subAddr */
                ForEveryLevel(setPRCPProc, just1SC, ALL_CLASSES, ALL_ITEMSIZES);                /* set the PRCO in the
just1SC before we begin the second justification process */
                *just2SC = *just1SC;
                                /* "copy" the first justified SuperClass just1SC to the soon-to-be re-justified
SuperClass just2SC */
                subjectiveJustification(theDoc, just2SC, &OpQdGp, objAddr, subAddr, SECONDJUST);/* perform the second
(subjective) justification of the just2SC SuperClass */
        }
        else {
                                        /* "Steadfast" stories have subjective justification first and then
objective justification second */
                subjectiveJustification(theDoc, just1SC, &OpQdGp, objAddr, subAddr, FIRSTJUST);  /* do the first
(subjective) justification to the just1SC SuperClass */
                buildSecondaryClassAddr(theDoc, OP_SUBJECTIVE, just1SC, subAddr, objAddr);             /* find the
problem Class in the justified SuperClass and stuff it into objAddr */
                ForEveryLevel(setPRCPProc, just1SC, ALL_CLASSES, ALL_ITEMSIZES);                /* set the PRCO in the
just1SC before we begin the second justification process */
                *just2SC = *just1SC;
                                /* "copy" the first justified SuperClass just1SC to the soon-to-be re-justified
SuperClass just2SC */           *just2SC = *just1SC;
                objectiveJustification(theDoc, just2SC, &OpQdGp, objAddr, subAddr, SECONDJUST);  /* perform the second
(objective) justification of the just2SC SuperClass */
        }
        if (FEMALE)
                ForEveryLevel(setTKADProc, just1SC, ALL_CLASSES, ALL_ITEMSIZES);                /* Female
Justification:  assign the TKAD in the doubly justified SuperClass just2SC */
        else
                ForEveryLevel(set1234Proc, just1SC, ALL_CLASSES, ALL_ITEMSIZES);                /* Male Justification:
set the act order 1234 in the doubly justified SuperClass just2SC */
```

```
        CopySC(just1SC, just2SC, SC_1234);
                /* copy the 1234 to the first justified SuperClass */
        SetAllAppreciations(theDoc);

        theDoc->SetSuperAppreciations();
                // set the super appreciations

        return (true);
}


/* ------------------------------------------------------------------------
        FUNCTION:       objectiveJustification
        Purpose:        Perform Objective Justification.
        Accepts:
------------------------------------------------------------------------ */
static void objectiveJustification(DRDoc* theDoc, SuperClass *justSC, OpQuadGroup *OpQdGp, AddrPtr objAddr, AddrPtr
subAddr, enum JUSTORDER justOrder)
{
        AddrText opAddr;
        char pathString[100];
        OpQuadPtr flips = OpQdGp->flips;
        OpQuadPtr rotates = OpQdGp->rotates;

        strcpy(opAddr, EMPTY_ADDR);

/*      printf("Begining Objective Justification...\n"); */
        OP_SelectOpQuads(theDoc, OP_OBJECTIVE, OpQdGp);

        DetermineObjectiveChoices(theDoc, justSC, OpQdGp, objAddr, opAddr, justOrder);
/*      printf("Final address is: '%s' (%s)\n",objAddr,Addr2PathString(RefSC, objAddr, pathString, ALL_LEVELS)); */

        executeObjOpQuads(theDoc, justSC, OpQdGp, objAddr, opAddr);

/*      printf("'Justified' address is: '%s' (%s)\n",objAddr,Addr2PathString(justSC, objAddr, pathString, ALL_LEVELS));
*/
//#pragma unused(subAddr)
}


/* ------------------------------------------------------------------------
        FUNCTION:       subjectiveJustification
        Purpose:        Perform Subjective Justification.
        Accepts:
------------------------------------------------------------------------ */
static void subjectiveJustification(DRDoc* theDoc, SuperClass *theSC, OpQuadGroup *OpQdGp, AddrPtr objAddr, AddrPtr
subAddr, enum JUSTORDER justOrder)
{
        AddrText opAddr;

        OpQuadPtr flips = OpQdGp->flips;
        OpQuadPtr rotates = OpQdGp->rotates;

        strcpy(opAddr, EMPTY_ADDR);

/*      printf("\nBegining Subjective Justification...\n"); */
        OP_SelectOpQuads(theDoc, OP_SUBJECTIVE, OpQdGp);

        DetermineSubjectiveChoices(theDoc, theSC, OpQdGp, subAddr, opAddr, justOrder);

        executeSubOpQuads(theDoc, theSC, OpQdGp, subAddr, opAddr);

/*      printf("Final address is: '%s' (%s)\n",subAddr,Addr2PathString(theSC, subAddr, pathString, ALL_LEVELS)); */
// #pragma unused(objAddr)
}


/* ------------------------------------------------------------------------
        FUNCTION:       determineOtherClass
        Purpose:        Picks the class for the second justification.
        Accepts:        firstAddr: AddrPtr to address derived from first justification.
        Returns:        a class (1-4).
------------------------------------------------------------------------ */
short determineOtherClass(DRDoc* theDoc, AddrPtr firstAddr)
{
        int firstClass = ADDR_CLASS(firstAddr);
        int secondClass;

        if (START)
        /* START_SKEW */
                secondClass = Relations[DEPENDENT][firstClass-1];
        else
                secondClass = Relations[COMPANION][firstClass-1];

        return (secondClass);
} /* determineOtherClass */


/* ------------------------------------------------------------------------
        FUNCTION:       findFocus
        Purpose:        Find the focus element basede on the problem element of the
                                first justification.
        Accepts:        probElemAddr: the address from the first justification.
                                justSC: the justified superclass.
        Returns:        1-4, the unit position of the focus element.
------------------------------------------------------------------------ */
static void findFocus(DRDoc* theDoc, SuperClass *justSC, AddrPtr probElemAddr, AddrPtr focusElement)
{
        int problemElement;
        int focusQuadPos;
        AddrText tempAddr;

        convert2AnotherSC(justSC, probElemAddr, RefSC, tempAddr);
        problemElement = ADDR_ELEMENT(tempAddr);

        if (START)
                /* START_SKEW */
                focusQuadPos = Relations[DEPENDENT][problemElement-1];
        else
                focusQuadPos = Relations[COMPANION][problemElement-1];
```

```
        tempAddr[ELEM] = focusQuadPos+'0';
        convert2AnotherSC(RefSC, tempAddr, justSC, focusElement);
} /* findFocus */


/* ------------------------------------------------------------------------
        FUNCTION:       buildSecondaryClassAddr
        Purpose:        builds entire address for second justification.
        Accepts:        firstAddr: AddrPtr to address derived from first justification.
------------------------------------------------------------------------ */
static void buildSecondaryClassAddr(DRDoc* theDoc, enum OPJUSTS justification, SuperClass *justSC, AddrPtr firstAddr,
AddrPtr secondAddr)
{
        AddrText newAddr, newAddr2, tmpSubAddr, tmpObjAddr, focusAddr;
        AddrText tempAddr, tmpRefAddr;
        Unit *theUnit;
        int relationship;

        char pathString[60];

        strcpy(newAddr, EMPTY_ADDR);
        strcpy(newAddr2, EMPTY_ADDR);
        strcpy(tmpRefAddr, EMPTY_ADDR);

        if (justification == OP_OBJECTIVE) {                                                    /*
we did the OBjective justification first and need to do the Subjective justification prep now */
                SetObjSimpleApprec(theDoc, RefSC, firstAddr, AP_STORY);                /* setup the objective
story appreciations */
                newAddr[CLASS] = determineOtherClass(theDoc, firstAddr) + '0';        /* change class for SUBJECTIVE
justification */
                theDoc->SetApprValByIndex(kApprMCHmCl, (short)newAddr[CLASS] );       /* set main character's home
class */
                newAddr2[CLASS] = firstAddr[CLASS];
        /* set temp address so that we can compare the Objective class with it's partner class */
                relationship = GetRelationship(newAddr, newAddr2);                     /* what is
relationship between objective & subjective classes in Justified SuperClass */
                assert(relationship != NOTRELATED);
                SemanticPartner(RefSC, relationship, firstAddr, tmpSubAddr);   /* finds the semantic partner of the
problem in the Objective class (refSC) in the Subjective class (refSC) and stuffs it into the tempSubAddr */
                SetObjSimpleApprec(theDoc, RefSC, tmpSubAddr, AP_MAIN);                /* set up the
objective main character appreciations */
                convert2AnotherSC(RefSC, tmpSubAddr, justSC, secondAddr);             /* find out which class this is
in in the Justified SuperClass */
        }

        else {                          /* we did the Subjective justification first and now have to prep for Objective --
OP_SUBJECTIVE */
                SetObjSimpleApprec(theDoc, RefSC, firstAddr, AP_MAIN);                 /* setup the objective
main character appreciations */
                newAddr[CLASS] = determineOtherClass(theDoc, firstAddr) + '0';        /* change class for OBJECTIVE
justification */
                newAddr2[CLASS] = firstAddr[CLASS];
        /* set temp address so that we can compare the Objective class with it's partner class */
                theDoc->SetApprValByIndex(kApprMCHmCl, (short)newAddr2[CLASS] );/* set main character's home class */

                relationship = GetRelationship(newAddr, newAddr2);                     /* what is
relationship between objective & subjective classes in Justified SuperClass */
                assert(relationship != NOTRELATED);
//              convert2AnotherSC(RefSC, newAddr, justSC, tmpObjAddr);                /* find out which
class this is in in the Justified SuperClass */

                GetFocusOrProblemAddr(theDoc, firstAddr, tempAddr);                    /* pass firstAddr as
the problem and return tempAddr as the address of the Main Character's focus */

                theUnit = Addr2Item(RefSC, tempAddr);
                FindSemanticUnitAddr(RefSC, newAddr, theUnit->semVal);                 /* find the focus
element in the reference SC in the Main Character's class */

                GetFocusOrProblemAddr(theDoc, newAddr, tmpObjAddr);                    /* pass firstAddr as
the problem and return tempAddr as the address of the Main Character's focus */
                SetObjSimpleApprec(theDoc, RefSC, tmpObjAddr, AP_STORY);               /* setup the objective story
appreciations */

                findFocus(theDoc, RefSC, newAddr, tmpRefAddr);                          /* find
problem element in Subjective Class in RefSC for appreciations (we're passing focus elem) */
                convert2AnotherSC(RefSC, newAddr, justSC, focusAddr);                  /* find this focus
element in the justSC */
                findFocus(theDoc, justSC, focusAddr, secondAddr);                       /* actually finding
problem element in Subjective Class in justSC (we're passing focus elem) */
        }
} /* buildSecondaryClassAddr */


/* ------------------------------------------------------------------------
        FUNCTION:       executeObjOpQuads
        Purpose:        Perform operations based on the levelUsed table set up in
                                determineObjectiveChoices().
------------------------------------------------------------------------ */
static void executeObjOpQuads(DRDoc* theDoc, SuperClass *theSC, OpQuadGroup *OpQdGp, AddrPtr problemAddr, AddrPtr opAddr)
{
        short resolution = CLASS_RES;                   /* first resolution is 1 */
        short level = CLASS;                                    /* first level is 0 */
        AddrText tmpAddr;

        do {                                                                    /* go through this resolution
for the remaining levels */
                for (level=resolution-1; level<=ELEM; ++level) {
                        strcpy(tmpAddr, problemAddr);
                        tmpAddr[level] = opAddr[level];
                        if (FlipFirst(theDoc, OP_OBJECTIVE)) {
                                doObjFlipOp(theDoc, theSC, PRIMARY, OpQdGp, problemAddr, resolution, level);
                                doObjRotateOp(theDoc, theSC, SECONDARY, OpQdGp, problemAddr, resolution, level);
                        }
                        else {
                                doObjRotateOp(theDoc, theSC, PRIMARY, OpQdGp, problemAddr, resolution, level);
                                doObjFlipOp(theDoc, theSC, SECONDARY, OpQdGp, problemAddr, resolution, level);
                        }
                }

        } while (resolution++ < ELEM_RES);
```

```
}

/* ----------------------------------------------------------------------
        FUNCTION:       executeSubOpQuads
        Purpose:        Perform operations based on the levelUsed table set up in
                                determineSubjectiveChoices().
---------------------------------------------------------------------- */
static void executeSubOpQuads(DRDoc* theDoc, SuperClass *theSC, OpQuadGroup *OpQdGp, AddrPtr problemAddr, AddrPtr opAddr)
{
        short resolution;
        short level = ELEM;                                     /* first level is 3 */
        short maxResolution = SUPER_SZ;
        AddrText tmpAddr;

        strcpy(tmpAddr, problemAddr);

        do {                                                                    /* go through this level for
all the resolutions */
                for (resolution=QUAD_SZ; resolution<=maxResolution; ++resolution) {
                        if (FlipFirst(theDoc, OP_OBJECTIVE)) {
                                doSubFlipOp(theDoc, theSC, PRIMARY, OpQdGp, tmpAddr, resolution, level);
                                doSubRotateOp(theDoc, theSC, SECONDARY, OpQdGp, tmpAddr, resolution, level);
                        }
                        else {
                                doSubRotateOp(theDoc, theSC, PRIMARY, OpQdGp, tmpAddr, resolution, level);
                                doSubFlipOp(theDoc, theSC, SECONDARY, OpQdGp, tmpAddr, resolution, level);
                        }
                }
                --maxResolution;
                tmpAddr[level-1] = opAddr[level-1];                                     /* store the
operation in the proper level */

        } while (level-- >= CLASS);
}


/* ----------------------------------------------------------------------
        FUNCTION:       doObjFlipOp
        Purpose:        Execute OBJECTIVE flip operations, accounting for children...
---------------------------------------------------------------------- */
static void doObjFlipOp(DRDoc* theDoc, SuperClass *theSC, short sequence, OpQuadGroup *OpQdGp, AddrPtr problemAddr, short
resolution, short level)
{
        AddrText        addr1, addr2, tempAddr;
        int f, r, i;
        int withChildren;
        OpQuadPtr flips = OpQdGp->flips;
        OpQuadPtr rotates = OpQdGp->rotates;
        short quadLink = OP_DetermineQuadLink(theDoc, OP_OBJECTIVE);
        short ItemSizeChr = (level-(resolution-1))+'0';

        f = getObjOperation(flips, resolution, level);
        r = getObjOperation(rotates, resolution, level);

/*      Get the two addresses to flip from the Justified Superclass... */

        strcpy(tempAddr,EMPTY_ADDR);
        for (i=0; i<=level; ++i)                                        /* copy leading part of problem
address... */
                tempAddr[i] = problemAddr[i];

        strcpy(addr1,tempAddr);
        strcpy(addr2,tempAddr);

        addr1[resolution-1] = flips[f].opFunction[0];           /* build addr of first flip */
        addr1[ITEMSZ] = ItemSizeChr;                                    /* using level makes sure we MAINTAIN
the correct resolution */

        addr2[resolution-1] = flips[f].opFunction[1];           /* build addr of second flip */
        addr2[ITEMSZ] = ItemSizeChr;

        if (sequence == PRIMARY) {                                              /* Primary only
searches Reference Superclass */
                convert2AnotherSC(RefSC, addr1, theSC, addr1);          /* find item in RefSC, get addr in JustSC */
                convert2AnotherSC(RefSC, addr2, theSC, addr2);
        }

        if (quadLink == OP_A) {
                if (flips[f].childLink == OP_FLIPKIDS || flips[f].childLink == OP_BOTHKIDS)
                        withChildren = WITH_CHILDREN;
                else withChildren = NO_CHILDREN;
        }
        else {
                if (rotates[r].childLink == OP_FLIPKIDS || rotates[r].childLink == OP_BOTHKIDS)
                        withChildren = WITH_CHILDREN;
                else withChildren = NO_CHILDREN;
        }

        FlipItems(theSC, addr1, addr2, withChildren);
}


/* ----------------------------------------------------------------------
        FUNCTION:       doSubFlipOp
        Purpose:        Execute SUBJECTIVE flip operations, accounting for parents...
---------------------------------------------------------------------- */
static void doSubFlipOp(DRDoc* theDoc, SuperClass *theSC, short sequence, OpQuadGroup *OpQdGp, AddrPtr problemAddr, short
resolution, short level)
{
        AddrText        addr1, addr2, tempAddr;
        int f, r, i;
        int withParents;
        OpQuadPtr flips = OpQdGp->flips;
        OpQuadPtr rotates = OpQdGp->rotates;
        short quadLink = OP_DetermineQuadLink(theDoc, OP_SUBJECTIVE);
        short ItemSizeChr = (resolution-1)+'0';

        f = getSubOperation(flips, resolution, level);
        r = getSubOperation(rotates, resolution, level);
```

```
/*      Get the two addresses to flip from the Justified Superclass... */

        strcpy(tempAddr,EMPTY_ADDR);
        for (i=0; i<=level; ++i)                                        /* copy leading part of problem
address... */
                tempAddr[i] = problemAddr[i];

        strcpy(addr1,tempAddr);
        strcpy(addr2,tempAddr);

        addr1[level-(resolution-1)] = flips[f].opFunction[0];          /* build addr of first flip */
        addr1[ITEMSZ] = ItemSizeChr;                                                  /* using level makes
sure we MAINTAIN the correct resolution */

        addr2[level-(resolution-1)] = flips[f].opFunction[1];          /* build addr of second flip */
        addr2[ITEMSZ] = ItemSizeChr;

        if (sequence == PRIMARY) {                                                         /* Primary
only searches Reference Superclass */
                convert2AnotherSC(RefSC, addr1, theSC, addr1);          /* find item in RefSC, get addr in
JustSC */
                convert2AnotherSC(RefSC, addr2, theSC, addr2);
        }

        if (quadLink == OP_A) {
                if (flips[f].childLink == OP_FLIPKIDS || flips[f].childLink == OP_BOTHKIDS)
                        withParents = WITH_PARENTS;
                else withParents = NO_CHILDREN;
        }
        else {
                if (rotates[r].childLink == OP_FLIPKIDS || rotates[r].childLink == OP_BOTHKIDS)
                        withParents = WITH_PARENTS;
                else withParents = NO_CHILDREN;
        }

        FlipItems(theSC, addr1, addr2, withParents);
}



/* ----------------------------------------------------------------------
        FUNCTION:       doObjRotateOp
        Purpose:        Execute OBJECTIVE rotate operations, accounting for children...
---------------------------------------------------------------------- */
static void doObjRotateOp(DRDoc* theDoc, SuperClass *theSC, short sequence, OpQuadGroup *OpQdGp, AddrPtr problemAddr,
short resolution, short level)
{
        AddrText addr1, addr2, addr3, addr4, tempAddr;
        int f, r, i;
        int withChildren;
        OpQuadPtr flips = OpQdGp->flips;
        OpQuadPtr rotates = OpQdGp->rotates;
        short quadLink = OP_DetermineQuadLink(theDoc, OP_OBJECTIVE);
        short ItemSizeChr = (level-(resolution-1))+'0';

        f = getObjOperation(flips, resolution, level);
        r = getObjOperation(rotates, resolution, level);

/*      Get the four addresses to rotates from the Justified Superclass... */

        strcpy(tempAddr,EMPTY_ADDR);
        for (i=0; i<=level; ++i)                                        /* copy leading part of problem
address... */
                tempAddr[i] = problemAddr[i];

        strcpy(addr1,tempAddr);
        strcpy(addr2,tempAddr);
        strcpy(addr3,tempAddr);
        strcpy(addr4,tempAddr);

        addr1[resolution-1] = rotates[r].opFunction[0];         /* build addr of first rotate */
        addr1[ITEMSZ] = ItemSizeChr;                                    /* using level makes sure we MAINTAIN
the correct resolution */

        addr2[resolution-1] = rotates[r].opFunction[1];         /* build addr of second flip */
        addr2[ITEMSZ] = ItemSizeChr;

        addr3[resolution-1] = rotates[r].opFunction[2];         /* build addr of third flip */
        addr3[ITEMSZ] = ItemSizeChr;

        addr4[resolution-1] = rotates[r].opFunction[3];         /* build addr of fourth flip */
        addr4[ITEMSZ] = ItemSizeChr;

        if (sequence == PRIMARY) {                                              /* Primary only searches
Reference Superclass */
                convert2AnotherSC(RefSC, addr1, theSC, addr1);          /* find item in RefSC, get addr in JustSC */
                convert2AnotherSC(RefSC, addr2, theSC, addr2);
                convert2AnotherSC(RefSC, addr3, theSC, addr3);
                convert2AnotherSC(RefSC, addr4, theSC, addr4);
        }

        if (quadLink == OP_A) {
                if (flips[f].childLink == OP_ROTKIDS || flips[f].childLink == OP_BOTHKIDS)
                        withChildren = WITH_CHILDREN;
                else withChildren = NO_CHILDREN;
        }
        else {
                if (rotates[r].childLink == OP_ROTKIDS || rotates[r].childLink == OP_BOTHKIDS)
                        withChildren = WITH_CHILDREN;
                else withChildren = NO_CHILDREN;
        }

        RotateAddrs(theSC, addr1, addr2, addr3, addr4, withChildren);
}



/* ----------------------------------------------------------------------
        FUNCTION:       doSubRotateOp
        Purpose:        Execute SUBJECTIVE rotate operations, accounting for parents...
---------------------------------------------------------------------- */
static void doSubRotateOp(DRDoc* theDoc, SuperClass *theSC, short sequence, OpQuadGroup *OpQdGp, AddrPtr problemAddr,
short resolution, short level)
```

```
{
        AddrText addr1, addr2, addr3, addr4, tempAddr;
        int f, r, i;
        int withParents;
        OpQuadPtr flips = OpQdGp->flips;
        OpQuadPtr rotates = OpQdGp->rotates;
        short quadLink = OP_DetermineQuadLink(theDoc, OP_OBJECTIVE);
        short ItemSizeChr = (resolution-1)+'0';

        f = getSubOperation(flips, resolution, level);
        r = getSubOperation(rotates, resolution, level);

/*      Get the four addresses to rotates from the Justified Superclass... */

        strcpy(tempAddr,EMPTY_ADDR);
        for (i=0; i<=level; ++i)                                        /* copy leading part of problem
address... */
                tempAddr[i] = problemAddr[i];

        strcpy(addr1,tempAddr);
        strcpy(addr2,tempAddr);
        strcpy(addr3,tempAddr);
        strcpy(addr4,tempAddr);

        addr1[level-(resolution-1)] = rotates[r].opFunction[0];         /* build addr of first rotate */
        addr1[ITEMSZ] = ItemSizeChr;                                                            /* using
level makes sure we MAINTAIN the correct resolution */

        addr2[level-(resolution-1)] = rotates[r].opFunction[1];         /* build addr of second flip */
        addr2[ITEMSZ] = ItemSizeChr;

        addr3[level-(resolution-1)] = rotates[r].opFunction[2];         /* build addr of third flip */
        addr3[ITEMSZ] = ItemSizeChr;

        addr4[level-(resolution-1)] = rotates[r].opFunction[3];         /* build addr of fourth flip */
        addr4[ITEMSZ] = ItemSizeChr;

        if (sequence == PRIMARY) {                                              /* Primary only searches
Reference Superclass */
                convert2AnotherSC(RefSC, addr1, theSC, addr1);        /* find item in RefSC, get addr in JustSC */
                convert2AnotherSC(RefSC, addr2, theSC, addr2);
                convert2AnotherSC(RefSC, addr3, theSC, addr3);
                convert2AnotherSC(RefSC, addr4, theSC, addr4);
        }

        if (quadLink == OP_A) {
                if (flips[f].childLink == OP_ROTKIDS || flips[f].childLink == OP_BOTHKIDS)
                        withParents = WITH_PARENTS;
                else withParents = NO_CHILDREN;
        }
        else {
                if (rotates[r].childLink == OP_ROTKIDS || rotates[r].childLink == OP_BOTHKIDS)
                        withParents = WITH_PARENTS;
                else withParents = NO_CHILDREN;
        }

        RotateAddrs(theSC, addr1, addr2, addr3, addr4, withParents);
}



/* ----------------------------------------------------------------------
        FUNCTION:       getObjOperation
        Purpose:        locate correct OpQuad unit to execute at this resolution and
                                level.
        Accepts:        Ptr to an OpQuad (either flips or rotates), and desired
                                resolution and level.
        Note:           Level is zero adjusted (0-3).  Resolution is 1-4.
        Returns:        Unit position (0-3) of OpQuad unit to execute.
------------------------------------------------------------------------ */
static int getObjOperation(OpQuadPtr opQdPtr, short res, short lev)
{
        int n;

        for (n=0; n<=3; ++n)
                if (opQdPtr[n].levelUsed[lev] == res)
                        return (n);

        assert (FALSE);
}



/* ----------------------------------------------------------------------
        FUNCTION:       getSubOperation
        Purpose:        locate correct OpQuad unit to execute at this resolution and
                                level (SUBJECTIVE JUSTIFICATION).
        Accepts:        Ptr to an OpQuad (either flips or rotates), and desired
                                resolution and level.
        Note:           Level is zero adjusted (0-3).  Resolution is 1-4.
        Returns:        Unit position (0-3) of OpQuad unit to execute.
------------------------------------------------------------------------ */
static int getSubOperation(OpQuadPtr opQdPtr, short res, short lev)
{
        int n;

        for (n=0; n<=3; ++n)
                if (opQdPtr[n].levelUsed[res-1] == lev+1)
                        return (n);

        assert (FALSE);
}



/* ----------------------------------------------------------------------
        FUNCTION:       convert2AnotherSC
        Purpose:        Find the addr in the first Superclass and convert it to
                                the addr of the item in the second Superclass.
        Accepts:        Ptr to the Superclasses, and the addr of the item.
```

```
        Returns:            The original addr is converted and copied to convAddr (which
                                    could be the same address as refAddr).
------------------------------------------------------------------------------ */
void convert2AnotherSC(SuperClass *firstSC, AddrPtr firstAddr, SuperClass *secondSC, AddrPtr secondAddr)
{
        Unit *firstAddrPtr;
        int theClass;
        short ItemSize = ADDR_ITEMSIZE(firstAddr);
        short level = Addr2Level(firstAddr)-1;

        firstAddrPtr = Addr2Item(firstSC, firstAddr);

/*      Search through the appropriate levels for a unit with the correct homeClass.  The
        FindAddrProc() will terminate immediately with -1 if we search the wrong class. */

        for (theClass=CLASS; theClass<=ELEM; ++theClass) {
                int retVal = ForEveryAddr(FindAddrProc, theClass+1, level, ItemSize, firstAddrPtr, secondSC);
                if (retVal == -1)
                        continue;
                assert(retVal > 0);                                                                      /* WHAT?!
Couldn't locate semantic value! */
                strcpy(secondAddr, SEMTBL_ADDRESS(retVal));
                return;
        }
        assert(FALSE);                                                                                   /* Also
couldn't locate semantic Value! */
}


/* ------------------------------------------------------------------------
        FUNCTION:           FindAddrProc
        Purpose:            Compares homeClass first to determine if we are searching
                                    the correct class.  if we are, compares semantic value of
                                    item from first SuperClass for equality.
        Accepts:            An address to test from the second SC, a Unit * to the item
                                    in the first SuperClass, and a Ptr to the second Superclass.
        Returns:            -1: wrong Superclass;   FOR_RETURN: matched items.
------------------------------------------------------------------------ */
static int FindAddrProc(AddrPtr secondAddr, void *firstAddrPtr, void *secondSC)
{
        Unit *secondAddrPtr = Addr2Item((SuperClass *)secondSC, secondAddr);

        if (secondAddrPtr->homeClass != ((Unit*)firstAddrPtr)->homeClass)
                return (-1);                                                                                    /*
Wrong homeclass!  Skip ENTIRE CLASS!  terminate ForEveryAddr */

        if (secondAddrPtr->semVal == ((Unit*)firstAddrPtr)->semVal)
                return (FOR_RETURN);                                                                            /*
found a semantic match! */
        else return (FOR_CONTINUE);                                                                             /*
no match -- try next address */
}


/* $Log:          justify.cc,v $
Revision 1.8  93/05/26  19:46:33  stephen
Windows fixes.

Revision 1.7  93/05/14  14:12:58  chris
Made correction in BuildSecondObjAddr to match story table.

Revision 1.6  93/05/07  10:16:31  chris
Added high level dynamics to the story points window.

Revision 1.5  93/05/03  16:38:43  stephen
Changed address setup so calling Justification works.

Revision 1.4  93/04/24  09:56:47  stephen
Passed appreciations to justification structures.

Revision 1.3  93/04/13  16:03:47  chris
Add justification material from .c files.

Revision 1.2  93/04/06  19:42:10  stephen
 [3First General Revisions

Revision 1.1  93/03/31  22:40:12  stephen
Initial revision

 */
```

```
/* -----------------------------------------------------------------------
        JUSTIFY.H
        Dramatica Model Relationships
        Copyright (C) 1993 Screenplay Systems Inc.
        Revised:        $Id$
----------------------------------------------------------------------- */

#ifndef __JUSTIFY__
#define __JUSTIFY__

class DRDoc;

#include "opquad.h"


bool_t  JustifyStory(DRDoc* theDoc, SuperClass *just1SC, SuperClass *just2SC);
void    convert2AnotherSC(SuperClass *firstSC, AddrPtr firstAddr, SuperClass *secondSC, AddrPtr secondAddr);
short   determineOtherClass(DRDoc* theDoc, AddrPtr firstAddr);

#endif /* __JUSTIFY__ */


/* $Log:          justify.h,v $
 * Revision 1.3  93/05/03  16:39:14  stephen
 * Changed address setup so calling Justification works.
 *
 * Revision 1.2  93/04/13  16:04:34  chris
 * Add justification material from .c files.
 *
 * Revision 1.1  93/03/31  22:40:30  stephen
 * Initial revision
 *
 */
```

```
/* ------------------------------------------------------------------------
	LDEFINE.R
	Dramatica's Semantic Loose Definitions
	Copyright (C) 1993 Screenplay Systems Inc.
	$Id$
--------------------------------------------------------------------------- */

#ifdef macintosh
	#include "systypes.r"
	#include "types.r"
#else
	#include <systypes.r>
	#include <types.r>
#endif

#include "apprdefs.h"

/* ------------------------------------------------------------------------
	'LDEF' - Loose semantic definitions for Definition window (?) in semval order.
--------------------------------------------------------------------------- */
type 'LDEF' {
	cstring;			/* the definition text */
};

			/****************************/
			/*  DYNAMIC APPRECIATIONS  */
			/****************************/

resource 'LDEF' (rApprResolve, PFM_MIN_PRIO) {							/* Resolve */
	"There are two major ways in which an author can illustrate the best way to solve the problem explored in a
story:  One is to show the proper way of going about solving the problem, the other is to show the wrong way to solve the
problem. "
	"To illustrate the proper way,  your Main Character should hold on to their resolve and remain steadfast,
because they truly are on the right path.  To illustrate the improper way of dealing with a problem, your  Main Character
MUST change, for they are going about it the wrong way."
};

resource 'LDEF' (rApprChange, PFM_MIN_PRIO) {							/* Change */
	"Every Main Character represents one special character element.  This element is either the cause of the story's
problem, or its solution.  The Main Character cannot be sure which it represents since it is too close to home.  Near the
climax of the story, the Main Character must make a Leap of Faith and decide if they should stick with their approach in
the belief that it is the solution, or jump to the opposite trait in the belief they have been wrong.  "
	"When a Main Character decides to abandon their story-long approach for its counterpart, they are said to
Change.  And as a Changing Main Character, they will contain the problem element/characteristic in the story."
};

resource 'LDEF' (rApprSteadfast, PFM_MIN_PRIO) {							/* Steadfast
*/
	"Every Main Character represents one special character element.  This element is either the cause of the story's
problem, or its solution.  The Main Character cannot be sure which they represent since it is too close to home.  Near
the climax of the story, the Main Character must make a Leap of Faith and decide if they should stick with their approach
in the belief that it is the solution, or jump to the opposite trait in the belief they have been wrong.  "
	"When a Main Character decides to stick with their story-long approach , they are said to remain Steadfast."
};

resource 'LDEF' (rApprDirection, PFM_MIN_PRIO) {							/* Direction
*/
	"Sometimes a problem is created by too much of something, other times by too little.  If a character must
change, they have one of these two kinds of problems.  Either they are bullheaded in sticking with an inappropriate
approach, or they simply don't use an approach that would be appropriate.  In the \"too much\" scenario, the character
comes off as aggressively obstinate.  In the \"too little\" scenario the character comes off as stubbornly ignorant.  The
\"too much\" character needs to \"stop\".  The \"too little\" character needs to  \"start\"."
};

resource 'LDEF' (rApprStop, PFM_MIN_PRIO) {							/* Stop */
	"In each story is a character who will change, though this does not have to be the Main Character.  If the
reason they must change is because they posses a detrimental trait, then they must Stop doing or being something they
have been."
};

resource 'LDEF' (rApprStart, PFM_MIN_PRIO) {							/* Start */
	"In each story is a character who will change, though this does not have to be the Main Character.  If the
reason they must change is because they lack an essential trait, then they must Start doing or being something they
currently are not."
};

resource 'LDEF' (rApprApproach, PFM_MIN_PRIO) {							/* Approach
*/
	"By temperament, Main Characters (like each of us) have a preferential method of approaching problems.  Some
would rather adapt their environment to themselves, others would rather adapt themselves to their environment.  There is
nothing intrinsically right or wrong with either approach, yet it does affect how one will respond to problems.  Choosing
\"Do-er\" or \"Be-er\" does not prevent a Main Character from using either approach, but merely defines the way they are
likely to first approach a problem, using the other method only if the first one fails."
};

resource 'LDEF' (rApprDoer, PFM_MIN_PRIO) {							/* Do-er */
	"Every Main Character will have a preference to deal with problems by either physical effort  or by
mental/emotional effort.  When a Main Character prefers working in the external environment, they are a Do-er."
};

resource 'LDEF' (rApprBeer, PFM_MIN_PRIO) {							/* Be-er */
	"Every Main Character will have a preference to deal with problems by either physical effort  or by
mental/emotional effort.  When a Main Character prefers adapting themselves to the environment over working directly in
the external environment to resolve problems, they are a Be-er."
};

resource 'LDEF' (rApprSex, PFM_MIN_PRIO) {							/* Sex */
	"Much of what we are as individuals is learned behavior.  Yet, the basic operating system of the mind is cast
biologically before birth.  Talents, intellectual capacity, instincts - all of these are not learned, but inherited.
Among these traits are those specific to females and others specific to males.  To be sure, we can go a long way toward
balancing out those traits, yet that does not eliminate them nor diminish their impact.  In dealing with the psychology
of a Main Character, it is essential to understand upon which foundation their experience rests."
};

resource 'LDEF' (rApprMale, PFM_MIN_PRIO) {							/* Male */
	"A choice of male selects a psychology for the Main Character based on causal relationships.  A male Main
Character solves problems by examining what cause or group of causes is responsible for an effect or group of effects.
The effort made to solve the problem will focus on affecting a cause, causing an effect, affecting an effect or causing a
cause.  This describes four different approaches.  "
	"Affecting a cause is manipulating an existing force to change its eventual impact.  Causing an effect means
applying a new force that will create an impact.  Affecting an effect is altering an effect after it has happened.
Causing a cause is applying a new force that will make some other force come into play to ultimately create an impact.
```

```
These are the four primary problem solving techniques of a male minded character.  It is important to note that these
techniques can be applied to either external or internal problems.  "
        "Either way, manipulating cause and effect is the modus operandi.  When selecting female or male, typically, the
choice is as simple as deciding if you want to tell a story about a man or a woman.  But there is another consideration
that is being employed with growing frequency in modern stories: putting the psyche of one sex into the skin of another.
This does not refer only to the \"sex change\" comedies, but to many action stories with female Main Characters (e.g.
Aliens) and many decision stories with male Main Characters (Prince of Tides).  "
        "When an author writes a part for a man, they would intuitively create a male psyche for that character.  Yet,
by simply changing the name of the character from Joe to Mary and shifting the appropriate gender terms, the character
would ostensibly become a woman.  But that woman would not seem like a woman  Even if all the specific masculine dialog
were changed, even if all the culturally dictated manifestations were altered, the underlying psyche of the character
would have a male bias, rather than a female bias.  "
        "Sometimes stereotypes are propagated by what an audience expects to see, which filters the message and dilutes
the truth.  By placing a male psyche in a female character, preconceptions no longer prevent the message from being
heard.  The word of warning is that this technique can make a Main Character seem \"odd\" in some hard to define way to
your audience.  So although the message may fare better, empathy between your audience and your Main Character may not."
};

resource 'LDEF' (rApprFemale, PFM_MIN_PRIO) {                                              /* Female */
        "A choice of female creates a Main Character whose psychology is based on assessing balance.  A female Main
Character resolves inequities by comparing surpluses to deficiencies.  The manner employed in resolving the inequity will
involve creating a surplus where a surplus is desired, creating a deficiency where a deficiency is desired, creating a
surplus so a deficiency is felt elsewhere, creating a deficiency so a surplus will be felt elsewhere.  "
        "Through the application of one's own force, hills and valleys can be created and filled either to directly
address the inequity or to create a change in the flow of energies that will ultimately come together in a new hill or
disperse creating a new valley.  These are the four primary inequity resolving techniques of a female character.  It is
important to note that these techniques are applied both to others and to oneself.  Either way, manipulating surplus and
deficiency describes the approach.  "
        "When selecting female or male, typically, the choice is as simple as deciding if you want to tell a story about
a man or a woman.  But there is another consideration that is being employed with growing frequency in modern stories:
putting the psyche of one sex into the skin of another.  This does not refer only to the \"sex change\" comedies, but to
many action stories with female Main Characters (e.g. Aliens) and many decision stories with male Main Characters (Prince
of Tides).  "
        "When an author writes a part for a woman, they would intuitively create a female psyche for that character.
Yet, by simply changing the name of the character from Mary to Joe and shifting the appropriate gender terms, the
character would ostensibly become a man.  But that man would not seem like a man.  Even if all the specific feminine
dialog were changed, even if all the culturally dictated manifestations were altered, the underlying psyche of the
character would have a female bias, rather than a male bias.  "
        "Sometimes stereotypes are propagated by what an audience expects to see, which filters the message and dilutes
the truth.  By placing a female psyche in a male character, preconceptions no longer prevent the message from being
heard.  The word of warning is that this technique can make a Main Character seem \"odd\" in some hard to define way to
your audience.  So although the message may fare better, empathy between your audience and your Main Character may not."
};

resource 'LDEF' (rApprWork, PFM_MIN_PRIO) {                                         /* Work */
        "Action or Decision describes how the problem of the Story will primarily be explored.  The primary concern is
the kind of storytelling you want to do.  If you want action to be the focus of your storytelling, choose action.  If you
want deliberation to be the focus of your storytelling, choose decision.  It's that simple."
};

resource 'LDEF' (rApprAction, PFM_MIN_PRIO) {                                              /* Action */
        "All stories have both Action and Decision.  Typically, one defines an Action story as having more Action or
more intense Action than Decision.  This view is overly influenced by how the story is told, rather than what it
represents.  Dramatica takes a different view of Action and Decision.  Either Actions force the need for Decisions or
Decisions force the need for Actions in order to advance the plot.  Over the course of the story as a whole (independent
of the nature of the Main Character) if Actions precipitate the progression of the plot, it is an Action story."
};

resource 'LDEF' (rApprDecision, PFM_MIN_PRIO) {                                            /* Decision
*/
        "All stories have both Action and Decision.  Typically, one defines a Decision story as having more or more
intense Deliberation than Action.  This view is overly influenced by how the story is told, rather than what it
represents.  Dramatica takes a different view of Action and Decision.  Either Actions force the need for Decisions or
Decisions force the need for Actions in order to advance the plot.  Over the course of the story as a whole (independent
of the nature of the Main Character) if Decisions precipitate the progression of the plot, it is a Decision story."
};

resource 'LDEF' (rApprLimit, PFM_MIN_PRIO) {                                               /* Limit */
        "No one can be sure of the future, including Main Characters.  One of the functions of a story is to give the
audience the value of experiences they have not had themselves by living through the Main Character.  As such, the
audience would have to take the story's message on faith to make use of it.  To help with this, the Main Character must
also make their decision based on faith.  They decide and hope for the best, and we learn from their accomplishments or
disappointments.  "
        "Yet, even a Main Character would not jump into the void and commit to a course of action or decision unless
forced into it.  To force the Main Character to decide, the story provides all the necessary information to make an
educated guess while progressively closing in on the Main Character until they have no alternative but to choose.  This
closing in can be accomplished in either of two ways.  Either they run out of places to look for the solution or they run
out of time to work one out.  "
        "Running out of options is accomplished by a Optionlock; a deadline is accomplished by a timelock.  Both of
these means of limiting the story and forcing the Main Character to decide are felt from early on in the story and get
stronger until the moment of truth.  Optionlocks need not be claustrophobic so much as they only provide limited pieces
with which to solve the problem.  Timelocks need not be hurried so much as limiting the interval during which something
can happen."
};

resource 'LDEF' (rApprTimelock, PFM_MIN_PRIO) {                                           /* Timelock
*/
        "If not for the story being forced to a climax, it might continue forever.  When a story is brought to a
conclusion because the characters run out of time, it is said to contain a Timelock.  As an analogy, a story might be
thought of as the effort to find the solution to the story's problem which is hidden in one of the rooms of a mansion.
Each room contains a clue to the actual location of the solution.  The Main Character is told they may search as many
rooms as they like in five minutes.  "
        "At the end of five minutes they are given a choice: based on the clues they have already found, they must
decide if the solution is in one of the rooms they already searched or in one of the rooms they have not yet searched.
Either choice may lead to success or failure, but because running out of time forced the choice it is an Timelock story.
The choice is the Timelock leap of faith that determines Change or Steadfast."
};

resource 'LDEF' (rApprOptionlock, PFM_MIN_PRIO) {                                         /* Optionlock
*/
        "If not for the story being forced to a climax, it might continue forever.  When a story is brought to a
conclusion because the characters run out of options, it is said to contain a Optionlock.  As an analogy, one might think
of a story as the process of examining rooms in a mansion to find a solution to the story's problem.  Each room in the
mansion will contain a clue to the actual location of the solution.  In an optionlock, the Main Character might be told
they could examine any five rooms they wanted, but only five.  "
        "They must pick the five rooms ahead of time.  They can take as long as they like to search each one, and go
thoroughly examine four of the rooms.  After the fourth they are given a choice: based on the clues they have found so
far, do they wish to stick with their original fifth choice or pick another room instead out of all that remain.  Either
choice may lead to success or failure, but because running out of options forced the choice it is an Optionlock story.
The choice is the Optionlock leap of faith that determines Change or Steadfast."
};

resource 'LDEF' (rApprOutcome, PFM_MIN_PRIO) {                                             /* Outcome */
```

```
"When one is creating a story, one must consider how it all comes out. This will not just be a description of the situation, but also of what potentials remain and how they have changed over the course of the story. Often, an author may wish to show the Outcome of a dramatic movement at the beginning or middle, rather than the end. In this way the audience will focus more on how that eventuality came to be, rather than trying to figure out what is going to happen."
};

resource 'LDEF' (rApprSuccess, PFM_MIN_PRIO) {                                   /* Success */
    "Every objective storyline in a Grand Argument Story has at its beginning a desired outcome to be sought after. Ultimately, the characters will either Succeed in achieving that outcome or fail to do so. However, Success is not always a good thing. For example, it may be that a character succeeds at something hurtful or evil. Even a good intentioned character might achieve something that they are unaware will cause harm. Whatever its quality, worth or ramifications, if the outcome desired at the story's beginning is achieved, the story ends in Success."
};

resource 'LDEF' (rApprFailure, PFM_MIN_PRIO) {                                   /* Failure */
    "Every objective storyline in a Grand Argument Story has at its beginning a desired outcome to be sought after. Ultimately, the characters will either achieve that outcome or Fail to do so. The reasons for Failure (and in fact the Failure itself) may not be bad. For example, in the course of trying to arrive at an outcome, the characters may decide it was wrong to want it, or learn that achieving it would hurt people. Whatever the reason , be it nobility or no ability, if the outcome desired at the story's beginning is not achieved, the story ends in Failure."
};

resource 'LDEF' (rApprJudgment, PFM_MIN_PRIO) {                                  /* Judgment
*/
    "The notion that the good guys win and the bad guys lose is not always true. In stories, as in life, we often see very bad people doing very well for themselves (if not for others). And even more often, we see very good people striking out. If we only judged things by success and failure, it wouldn't matter if the outcome was good or bad, as long as it was accomplished. The choice of Good or Bad, places the author's moralistic judgment on the value of the Main Character's success or failure in resolving their personal problems. "
    "It is an opportunity not only to address good guys that win and bad guys that fail, as well as good guys that fail and the bad guys that win, but to comment on the success or failure of their growth as human beings."
};

resource 'LDEF' (rApprGood, PFM_MIN_PRIO) {                                      /* Good */
    "Even though the effort to achieve the story's goal may result in success, this is not necessarily a good thing for the Main Character. In fact, success might be obtained in the objective story even though the Main Character fails to resolve their personal problems. Similarly, the effort to achieve the story goal might end in failure, yet the Main Character ends up overcoming their personal problems. Regardless of whether the objective story ends in Success or Failure, if the Main Character succeeds in resolving their personal problems, the outcome is deemed Good."
};

resource 'LDEF' (rApprBad, PFM_MIN_PRIO) {                                       /* Bad */
    "Even though the effort to achieve the story's goal may result in success, this is not necessarily a good thing for the Main Character. In fact, success might be obtained in the objective story even though the Main Character fails to resolve their personal problems. Similarly, the effort to achieve the story goal might end in failure, yet the Main Character ends up overcoming their personal problems. Regardless of whether the objective story ends in Success or Failure, if the Main Character fails to resolve their personal problems, the outcome is deemed Bad."
};

                    /************************/
                    /* SUPERAPPRECIATIONS   */
                    /************************/

resource 'LDEF' (rApprNature, PFM_MIN_PRIO) {                                    /* Nature */
    "A story can be appreciated as a structure in which the beginning, middle, and end can all be seen at the same time. From this point of view, the Objective and Subjective storylines can be compared. The Objective storyline determines if the solution to the problem can be found in the environment or if the problem is actually caused by a character flaw of the Main Character themselves. The Subjective storyline determines if the Main Character will remain steadfast in the belief the problem can be solved in the environment or will change in the belief they themselves are the cause of the problem. "
    "When the Main Character remains steadfast, they spend the entire story doing work to try and solve the problem. This is called a Work Story. If the Main Character is correct in believing the solution to the problem to lies in the environment it is an Actual Work story. If the steadfast Main Character is wrong and they are the true cause of the problem, it is an Apparent Work story, since they believe Work is all that is necessary and that is not the case. "
    "When the Main Character changes, they have come to believe that they are the real cause of the problem. This is called a Dilemma Story because the Main Character spends the story wrestling with an internal dilemma. If the Main Character is correct in believing themselves to be the source of the problem it is an Actual Dilemma Story. If they are incorrect and change, even though the problem was truly in the environment it is an Apparent Dilemma Story. "
    "Each of these four combinations creates a different mechanism in order to arrive at the climax with the appropriate match up between the true location of the problem and the Main Character's assessment of where to find the solution."
};

resource 'LDEF' (rApprActualDilemma, PFM_MIN_PRIO) {                             /* Actual
Dilemma */
    "In an Actual Dilemma, the Main Character cannot succeed if they keep to the path they began on. Unless they change, they are doomed to failure. Of course, the Main Character cannot see the future and therefore can never be absolutely sure if they should change or not. That is why they must make a leap of faith at the moment of climax and decide to change or remain steadfast. In stories where the Main Character decides to change and as a result they succeed, then the Dilemma is said to have been Actual."
};

resource 'LDEF' (rApprApparentDilemma, PFM_MIN_PRIO) {                           /*
Apparent Dilemma */
    "A Dilemma story is one in which the Main Character's path cannot lead to success. However, when the Main Character mistakenly believes they are on the wrong path when it is truly the correct one, their assessment of Dilemma is said to be Apparent."
};

resource 'LDEF' (rApprActualWork, PFM_MIN_PRIO) {                                /* Actual
Work */
    "A Work story is one in which remaining steadfast is the path to success. When the Main Character's appraisal matches the reality of the situation, their assessment of the Work required is said to be Actual."
};

resource 'LDEF' (rApprApparentWork, PFM_MIN_PRIO) {                              /* Apparent
Work */
    "A Work story is one in which remaining steadfast is the path to success. When the Main Character mistakenly believes themselves to be on the proper path, when indeed they need to change, their assessment that only Work is required is said to be Apparent."
};

resource 'LDEF' (rApprEssence, PFM_MIN_PRIO) {                                   /* Essence */
    "A story can be appreciated as the interaction of dynamics that converge at the climax. From this point of view, the feel of the dramatic tension can be defined. Dramatic tension is created between the direction the Main Character is growing compared to the author's value judgment of that growth. "
    "A Main Character will either grow out of something or grow into something. In the first case, they possess a characteristic that they let go. In the second case, they add a new characteristic to their make-up. But are they correct in stopping something they have been doing or starting to do something new? "
```

```
        "This is determined by the author's value judgment of Good or Bad.  When a Main Character Stops doing something Bad, that is positive.  When a Main Character Starts doing something Good, that also is positive.  However, when a Main Character Starts doing something Bad or Stops doing something Good, these are negative.  "
        "Positive and Negative affect where the audience places their focus on the story.  In a Positive story, the focus is on the effort to find the solution.  In a Negative story, the focus in on the effort to escape the problem."
};

resource 'LDEF' (rApprPositive, PFM_MIN_PRIO) {                                                  /* Positive Feel */
        "An author can pass judgment on the appropriateness of a Main Character's approach to the problem.  When a Main Character's approach is deemed proper, the audience hopes for them to remain steadfast in that approach and to succeed. Regardless of whether they actually succeed or fail, if they remain steadfast they win a moral victory and the audience feels the story is positive.  When the approach is deemed improper, the audience hopes for them to change.  "
        "Whether or not the Main Character succeeds, if they change from improper, they also win a moral victory, and the story feels positive."
};

resource 'LDEF' (rApprNegative, PFM_MIN_PRIO) {                                                  /* Negative Feel */
        "Overall, stories feel like \"uppers\" or \"downers\".  This is not a description of whether or not things turn out okay in the end, but a sense of direction created by the kind of tension that permeates the story up to the moment of climax.  When the focus is on characters doggedly pursuing a SOLUTION, the story feels positive.  When the focus is on characters being dogged by a relentless PROBLEM, the story feels negative.  Another way to appreciate the difference is to look at the Main Character.  "
        "An audience can sense whether the author feels a Main Character should or should not change.  If the character is growing toward the proper choice, the story feels positive.  If they are growing toward the improper choice, the story feels negative.  Both these views are created by the friction between the Objective view that indicates what is truly needed to solve the problem and the Subjective view of the Main Character as to what SEEMS to be the solution to the problem."
};

resource 'LDEF' (rApprTendency, PFM_MIN_PRIO) {                                                  /* Tendency */
        "Not all Main Characters are well suited to solve the problem in their story.  They may possess the crucial element essential to the solution, yet not possess experience in using the tools needed to bring it into play.  Like most of us, Main Characters have a preference for how to go about solving problems.  Some prefer to immediately take action. We call these characters Do-ers.  "
        "Others prefer to deliberate first to determine if the problem might go away by itself, or perhaps they can adapt to it.  We call these characters Be-ers.  When a Do-er finds themselves in a story driven by Action they are quite at home.  Similarly, when a Be-er finds themselves in a Decision driven story, they are quite content.  "
        "Both of these combination lead to Main Characters who are more than Willing to accept the quest for a solution to the story's problem: they are comfortable with the tools they will be required to use.  But if a Do-er is placed in a Decision story or a Be-er is drawn into an Action story, the Main Character will be very UnWilling to participate in the quest at all, for the tools they must use are not in their area of experience.  "
        "Willing Main Characters force the plot forward.  Unwilling Main Characters are dragged along by circumstances beyond their control."
};

resource 'LDEF' (rApprWilling, PFM_MIN_PRIO) {                                                   /* Willing */
        "Willing describes a Main Character who is self-motivated to find a solution to the story's problem.  Even if the going is tough, they require no outside encouragement or compulsion to keep up the effort."
};

resource 'LDEF' (rApprUnwilling, PFM_MIN_PRIO) {                                                 /* Unwilling */
        "Unwilling describes a Main Character who would prefer not to become involved in neither the problem, nor the search for a solution.  As a result, some sort of leverage must be applied to \"force\" them to join the quest.  "
        "Once the Main Character is enticed or coerced into beginning the journey toward a solution, they require outside encouragement or compulsion to keep up the effort."
};

resource 'LDEF' (rApprReach, PFM_MIN_PRIO) {                                                     /* Reach */
        "The Reach of a story describes the relationship between the audience and the Main Character.  An audience might Empathize with a Main Character in which case the audience identifies with the Main Character and sees the story through their eyes.  Alternatively, an audience might Sympathize with the Main Character in which case they stand next to the Main Character as if they are a close acquaintance.  The story dynamics that determine Empathy or Sympathy are different for men than for women.  "
        "Women tend to identify and Empathize with a Main Character of either sex who is limited by a spacelock.  Men tend to only Empathize with male Main Characters.  Women tend to Sympathize with a Main Character of either sex who is limited by a timelock.  Men tend only to Sympathize with female Main Characters.  As a result of these dynamics, sometimes both women and men will Empathize, sometimes women only, sometimes men only, sometimes neither (both will Sympathize).  "
        "It should be noted that these are tendencies only.  Training, experience, and personal choice in any individual audience member can slip the balance wholly to the other side.  Nevertheless, at the subconscious level, these tendencies will hold true."
};

resource 'LDEF' (rApprBoth, PFM_MIN_PRIO) {                                                      /* Both */
        "Although there is much common ground in a story that is appreciated equally by women and men, some dramatic messages speak to one group more profoundly than the other.  One particular area of difference is the relationship of female and male audience members to the Main Character.  "
        "In some stories an audience member will feel Empathy with the Main Character, as if they were standing in the Main Character's shoes.  In other stories, an audience member will feel Sympathy for the Main Character, as if the Main Character is a close acquaintance.  "
        "The dynamics that control this for women and men are quite different.  \"Both\" indicates that as a result of this storyform's dynamics, both male and female audience members will tend to empathize with the Main Character.  Neither will sympathize."
};

resource 'LDEF' (rApprMaleEmpathy, PFM_MIN_PRIO) {                                               /* Male */
        "Although there is much common ground in a story that is appreciated equally by women and men, some dramatic messages speak to one group more profoundly than the other.  One particular area of difference is the relationship of female and male audience members to the Main Character.  "
        "In some stories an audience member will feel Empathy with the Main Character, as if they were standing in the Main Character's shoes.  In other stories, an audience member will feel Sympathy for the Main Character, as if the Main Character is a close acquaintance.  "
        "The dynamics that control this for women and men are quite different.  \"Male\" indicates that as a result of this storyform's dynamics, male audience members will tend to empathize with the Main Character.  Female audience members will sympathize."
};

resource 'LDEF' (rApprFemaleEmpathy, PFM_MIN_PRIO) {                                             /* Female */
        "Although there is much common ground in a story that is appreciated equally by women and men, some dramatic messages speak to one group more profoundly than the other.  One particular area of difference is the relationship of female and male audience members to the Main Character.  "
        "In some stories an audience member will feel Empathy with the Main Character, as if they were standing in the Main Character's shoes.  In other stories, an audience member will feel Sympathy for the Main Character, as if the Main Character is a close acquaintance.  "
        "The dynamics that control this for women and men are quite different.  \"Female\" indicates that as a result of this storyform's dynamics, female audience members will tend to empathize with the Main Character.  Male audience members will tend to sympathize."
};
```

```
resource 'LDEF' (rApprNeither, PFM_MIN_PRIO) {                                                    /* Neither */
	"Although there is much common ground in a story that is appreciated equally by women and men, some dramatic messages speak to one group more profoundly than the other.  One particular area of difference is the relationship of female and male audience members to the Main Character.  "
	"In some stories an audience member will feel Empathy with the Main Character, as if they were standing in the Main Character's shoes.  In other stories, an audience member will feel Sympathy for the Main Character, as if the Main Character is a close acquaintance.  "
	"The dynamics that control this for women and men are quite different.  \"Neither\" indicates that as a result of this storyform's dynamics, neither male and female audience members will tend to empathize with the Main Character.  Both will sympathize."
};

			/****************/
			/*     CLASSES      */
			/****************/

resource 'LDEF' (rSvUniverse, PFM_MIN_PRIO) {                                                    /* Universe */
	"The Universe Domain is where any fixed state of affairs is explored, such as an institution, system, or situation that remains stable and unchanging.  The point may be to show that the system is good, bad, or neutral, but the focus must be on the system, not on how the system is changing."
};

resource 'LDEF' (rSvPhysics, PFM_MIN_PRIO) {                                                    /* Physics */
	"The Physics Domain is one of action.  Whereas the Universe Domain describes a fixed situation, Physics is a Domain of dynamics.  Situations evolve, develop, and change.  Activities are engaged in and endeavors undertaken."
};

resource 'LDEF' (rSvPsychology, PFM_MIN_PRIO) {                                                    /* Psychology */
	"The Psychology Domain is where the evolution or change in an attitude is explored, unlike the Mind Class which describes the nature of a fixed state of mind.  This is a more deliberation-oriented class where the focus is not on the attitude itself, but whether it is changing for better or for worse."
};

resource 'LDEF' (rSvMind, PFM_MIN_PRIO) {                                                    /* Mind */
	"The Mind Domain describes a fixed attitude.  This can be a bias, prejudice or even a \"positive\" opinion about anything at all.  They key is that the attitude is fixed, meaning it is accepted as a given and not re-evaluated.  Often the Mind Domain is represented by a group of people who share a common bias for or against something."
};

			/****************/
			/*     TYPES        */
			/****************/

resource 'LDEF' (rSvPast, PFM_MIN_PRIO) {                                                    /* Past */
	"The past is not unchanging.  Often we learn new things which change our understanding of what past events truly meant and create new appreciations of how things really fit together.  A Story that focuses on the Past, may be much more than a documentation of what happened.  Frequently, it is a re-evaluation of the meaning of what has occurred that can lead to changing one's understanding of what is happening in the present or will eventually happen in the future."
};

resource 'LDEF' (rSvProgress, PFM_MIN_PRIO) {                                                    /* Progress */
	"Progress concerns itself with change: what direction and how fast?  It is not so important where things were, are, or will be, but rather how the struggle between inertia and change seesaws over the course of the story."
};

resource 'LDEF' (rSvFuture, PFM_MIN_PRIO) {                                                    /* Future */
	"A story focusing on the Future concerns itself with what will be.  This does not require the story to be \"set\" in the Future - only that the Future state of external and/or internal issues is the subject that is addressed by the story.  A character centered on Future may be trying to discover what will be, or may be trying a achieve a particular state of affairs down the line.  In both the Story and Character sense, the end is more important than the present, although it still may not justify the means."
};

resource 'LDEF' (rSvPresent, PFM_MIN_PRIO) {                                                    /* Present */
	"\"Present\" does not refer to the way things are going, but to the way things are.  It is a here and now judgment of the arrangement of a situation and the circumstances surrounding it.  A story that focuses on the Present is not concerned with how events led to the current situation nor where the current situation will lead, but defines the scenario that exists at the moment."
};

resource 'LDEF' (rSvUnderstanding, PFM_MIN_PRIO) {                                                    /* Understanding */
	"Understanding is different from knowledge.  From knowledge one gets awareness, from Understanding, one gets meaning.  To obtain meaning requires not only knowing the substance of its nature, but the context of its essence.  In other words, one must not only define what something is, but how it fits into the larger picture as well.  To this end, Reason describes the function and Emotion defines the purpose.  "
	"So Understanding is not just an intellectual pursuit, but requires an empathy with the meaning as well.  It is useful to note that many Eastern and ancient philosophies define Understanding as \"becoming one with\" that which is being considered.  Until one joins her subject in unity, she cannot understand it."
};

resource 'LDEF' (rSvDoing, PFM_MIN_PRIO) {                                                    /* Doing */
	"Doing is the process of being physically  active.  In and of itself, Doing does not require any purpose, but simply describes engaging in a process, task, or endeavor, whether for pleasure or by necessity or compulsion."
};

resource 'LDEF' (rSvObtaining, PFM_MIN_PRIO) {                                                    /* Obtaining */
	"Obtaining includes not only that which is possessed but also that which is achieved.  For example, one might obtain a law degree or the love of a parent.   One can also obtain a condition, such as obtaining a smoothly operating political system.  Whether it refers to a mental or physical state or process, obtaining describes the concept of attaining."
};

resource 'LDEF' (rSvLearning, PFM_MIN_PRIO) {                                                    /* Learning */
	"Learning describes the process of acquiring knowledge.  It is not the knowledge itself.  When a portion of a story focuses on learning, it is the gathering of an education that is of concern, not the education that ultimately has been gathered.  Learning need not be an academic endeavor.  One might learn to express their feelings, or learn about love.  "
	"Learning does not even require new information, as sometimes one learns simply by looking through old information from a different perspective or with a new approach.  It is not important if one is learning to arrive at a particular understanding or just to gather data.  As long as the focus in on the process of gaining information, Learning is the operative word."
};
```

```
resource 'LDEF' (rSvConceptualizing, PFM_MIN_PRIO) {                                                    /*
Conceptualizing */
        "Conceptualizing means coming up with a practical implementation of an idea.  It is not enough to simply have
the idea.  To conceptualize, one must develop an actual mental model of how such an idea might be made manifest.  "
        "In other words, one might have an idea to build a spacious house.  But to conceptualize the house, one must
imagine everything that makes up the house -- the design, the layout, the colors & textures, everything that is essential
to understanding what that specific house is.  A character that deals with conceptualizing would be well aware of the
kind of solution that will eliminate the problem, but spend their time trying to devise a specific way of achieving that
solution."
};

resource 'LDEF' (rSvBeing, PFM_MIN_PRIO) {                                                    /* Being */
        "\"Being\" is an elusive word, subject to inconsistent common usage.  For purposes of story, Being is meant to
describe the condition of existing in a certain manner.  This does not mean that whomever or whatever is being a
particular way is truly of that nature to the core.  In fact, it may be put on, as an act or to deceive.  However, as
long as there is nothing more or less to the functioning of person or thing, it can be said to \"be\" what it appears to
be.  "
        "Stories often focus on someone who want to \"be\" something, without actually \"becoming\" it.  The important
difference is that to \"be\" requires that all the elements of what one wants to be are present in oneself.  To
\"become\" requires that there are no elements in oneself that are not  in what one wants to become."
};

resource 'LDEF' (rSvBecoming, PFM_MIN_PRIO) {                                                    /*
Becoming */
        "Becoming means achieving an identity with something.  This is different from \"being\" which merely requires
posing as something.  To become, one must do more than just pretend to be by mimicking all the traits of what one wants
to become.  Rather, one must also lose all those parts of oneself that are inconsistent with what one wants to become.
\"Giving up\" a part of oneself is always the hardest part of becoming and the reason so many characters spend a lot of
time \"being\" without ever becoming."
};

resource 'LDEF' (rSvConceiving, PFM_MIN_PRIO) {                                                    /*
Conceiving */
        "Conceiving is the process of arriving at an idea.  If there were no artificial light in the world, one might
conceive the need for some form of electric torch.  That would be conceiving.  But the design of an actual incandescent
bulb versus a fluorescent one would require conceptualizing a specific implementation of the idea one has conceived.
Conceiving need not come before conceptualizing.  "
        "For example, a common dramatic technique is to give a character a very clear mental image of an object or
arrangement that holds the solution to the story's problem.  But the character does not know the solution lies in the
conceptualization.  It is only when they finally conceive of the need for a particular kind  of solution do they realize
they had the answer all along.  Simply put, Conceiving defines the question, Conceptualizing clarifies the answer."
};

resource 'LDEF' (rSvMemory, PFM_MIN_PRIO) {                                                    /* Memory */
        "The Past is an objective look at what has happened.  In contrast, Memory is a subjective look at what has
happened.  Therefore, Memory of the same events varies among individuals creating many different and possibly conflicting
recollections.  Often one's current feelings come from memories, both pleasant and unpleasant.  Many a taut story
revolves around a character's effort to resolve open issues from their memories."
};

resource 'LDEF' (rSvPreconscious, PFM_MIN_PRIO) {                                                    /*
Preconscious */
        "Built into the mind is an instinctual base of reactions and attitudes that cannot be altered but merely
compensated for.  When a story's problem revolves around the unsuitability of someone's essential nature to a given
situation or environment, the central issue is the Pre-Conscious.  The solution lies in the character conditioning
themselves to either hold their tendencies in check or develop methods of enhancing areas in which they are naturally
weak in reason, ability, emotion, or intellect."
};

resource 'LDEF' (rSvSubconscious, PFM_MIN_PRIO) {                                                    /*
Subconscious */
        "Subconscious describes the essential feelings that form the foundation of character.  These feelings are so
basic that a character is often not aware of what they truly are.  When the Subconscious is involved, a character is
moved right to the fiber of their being."
};

resource 'LDEF' (rSvConscious, PFM_MIN_PRIO) {                                                    /*
Conscious */
        "When one has all the facts, knows all the impact - both positive and negative; when one is fully aware of
detrimental consequences and still  decides on  the poor course of action, there is something wrong with the way one
arrives at conclusions.  This is the subject of stories focusing on the Conscious.  The key here is not to redefine who a
character is, but to lead them to relearn how to weigh an issue so that their conclusions are less destructive to
themselves and/or others."
};

                    /****************/
                    /*    VARIATIONS     */
                    /****************/

resource 'LDEF' (rSvFate, PFM_MIN_PRIO) {                                                    /* Fate */
        "The distinction between Fate and destiny is an important one.  Destiny is the direction one's life must take,
Fate is any given moment along that direction.  So whereas one can have many Fates, one can only have one destiny.  Fate
describes a state of situation and circumstance that exists at a particular point in time.  In other words, Fate is
something of an outcome, or perhaps a step - just one of a number of Fates along the path of one's destiny.  "
        "Characters often either make the mistake of assuming that they have only one Fate and are therefore stuck with
it, or they mistakenly believe they can achieve their destiny without \"passing through\" unattractive fates that lie
along the path.  The nature of a Fate is that no matter how you try to avoid it, it tracks you.  All options that you
might exercise still lead to that Fate.  "
        "That is what also defines Destiny as the limitations on free will that force you to arrive at your Fate no
matter how you alter what you do or what kind of person you are.  If we all knew the future, there would be no freewill."
};

resource 'LDEF' (rSvPrediction, PFM_MIN_PRIO) {                                                    /*
Prediction */
        "Prediction explores the effort to learn the course of one's destiny.  Destiny is the path to a particular fate,
or through a series of fates.  Fates are experiences or conditions one must encounter along the way as one's destiny
directs one's course.  The nature of destiny is such that no matter how much a character is aware of the nature and
location of an undesirable fate, nothing they can do is enough to pull them off the path.  However, if one could know the
future course, one could prepare for each eventuality in order to minimize or maximize its effect."
};

resource 'LDEF' (rSvInterdiction, PFM_MIN_PRIO) {                                                    /*
Interdiction */
        "Interdiction is the effort to change the course of one's destiny.  Once a character determines that her destiny
is pulling her toward an undesirable fate, she tries to Interdict and thereby avoid the fate.  But has she correctly
identified the course of her destiny or in actuality is what she sees as Interdiction just another pre-destined step
toward her fate?"
};

resource 'LDEF' (rSvDestiny, PFM_MIN_PRIO) {                                                    /*
Destiny */
        "Destiny is the path to a particular fate, or through a series of fates.  Fates are experiences or conditions
one must encounter along the way as one's Destiny directs one's course.  The nature of Destiny is such that no matter how
```

```
much a character is aware of the nature an location of an undesirable fate, nothing they can do is enough to pull them
off the path.  Characters often try to deny Destiny by jumping to an entirely different path, only to discover that all
roads lead to Rome."
};

resource 'LDEF' (rSvFact, PFM_MIN_PRIO) {                                                        /* Fact */
	"Fact is something that is truly real, as opposed to just seeming to be real.  Of course, from a character's
subjective view, when something seems to be real, it is impossible to tell from actual fact.  No matter how strongly a
belief, understanding, or knowledge of something is held, subjectively there is always the possibility some change in the
situation or additional information will prove it to be unfactual.  Optical illusions are a good case in point.  The
moment a character accepts something as fact is the moment a thematic conflict might begin to grow."
};

resource 'LDEF' (rSvSecurity, PFM_MIN_PRIO) {                                                    /*
Security */
	"Before one can expand to greater achievements, it is important to protect what one has already achieved.  When
a character is concerned with Security, they build defenses against threats both known and anticipated.  However, actual
dangers may or may not fall within the ability of the protections to keep one secure.  Subjectively, a character must
determine when they feel secure, based on their experience.  For example, a famous comedian once related that he always
bought so many groceries he had to throw many away when they spoiled.  "
	"This, he said, was because he had gone hungry so often as a child.  When a character's experiences motivate
them to over or under prepare for dangers, Security may actually become a danger itself."
};

resource 'LDEF' (rSvThreat, PFM_MIN_PRIO) {                                                      /* Threat */
	"Threats are indicators or warnings that danger lurks.  Avoiding real danger can be enhanced by acting at the
first sign of a Threat.  However, reading the indicators is a subjective endeavor.  One's biases and experiences may lead
to inaccurate assessments of Threats.  They may be real or imagined.  When a character avoids actions or behaviors
because the perceive a Threat that is truly imaginary, they might stunt their own progress toward their purpose based on
an unreal fear."
};

resource 'LDEF' (rSvFantasy, PFM_MIN_PRIO) {                                                     /*
Fantasy */
	"Fantasy is something that although seemingly real, truly is not.  Fantasies exist subjectively, so they can
either be misinterpretations of the meaning of actual things or internal fabrications of meanings that are not accurate.
Neither one can be consciously intentional, or one would be aware of the untruth of the Fantasy.  Fantasies are not
necessarily bad.  In fact, they can be the best way for a character to clarify the nature of their goal.  "
	"Maintaining the Fantasy allows one to practice responses so that Fantasy might actually turn into fact.  Of
course, when one let's a Fantasy grow, such that it extends beyond the goal and into the means of evaluating progress
toward the goal, the Fantasy can become self-sustaining and only imagined progress is ever made."
};

resource 'LDEF' (rSvOpenness, PFM_MIN_PRIO) {                                                    /*
Openness */
	"Openness simply means entertaining alternatives.  When a character's pre-conceptions come into conflict with
new information, if they are open, they will not be biased or blind to it.  They put openness above holding on to a
point of view.  Of course, this can easily be carried to extreme, when someone seems to have no opinion at all and just
goes with whatever anyone else says.  Some degree of pre-conception is necessary to benefit from the value of one's own
experience."
};

resource 'LDEF' (rSvDelay, PFM_MIN_PRIO) {                                                       /* Delay */
	"Delay is the decision not to make a decision.  Whenever the options are too closely balanced to see a clear
path, whenever there is not enough information to be confident of an outcome, a character will Delay.  The purpose is to
wait until one gathers more information or until the situation changes to present a clear best course.  But how long does
one wait?  And what if something distracts the character and the forget to check and see if things have changed?  "
	"Now the character has left a problem unresolved, and unless it intrudes upon their thinking, it will never be
thought of again.  Yet deep within them, they will be influenced to avoid what created that problem or to take steps to
protect against its recurrence.  Until the original problem is addressed and a choice of path is made, the character will
not be free of the problem's influence."
};

resource 'LDEF' (rSvChoice, PFM_MIN_PRIO) {                                                      /* Choice */
	"Choice is simply a decision as to which is the best path toward resolving a problem.  A character will ponder
all the information and factor in all her feelings and arrive at a decision.  Sometimes, a character will choose before
all the information is in.  This can lead them to take steps that may ultimately prove to be counter-productive or even
self-destructive.  On the other hand, such intuitive leaps can bypass a number of obstacles on the way to a story's
conclusion.  Still, \"Snap judgments often lead to regrets for those whose only exercise is jumping to conclusions\" -
Dramatica fortune cookie."
};

resource 'LDEF' (rSvPreconception, PFM_MIN_PRIO) {                                               /*
Preconception */
	"Preconception is a prejudice that prevents one from entertaining information contrary to a held conclusion.
When one shuts their mind to additional data, there is no way to realize that the conclusion might be in error.
Contradictory observation no longer becomes part of experience, so experience ceases to grow.  Obviously, this can lead
to all kinds of actions and attitudes that work to the detriment of oneself and others.  On the other hand, Prejudice can
steel one against temporary exceptions that tempt one to veer from the true path.  Question: Is it bad to have
Preconceptions against evil?"
};

resource 'LDEF' (rSvWork, PFM_MIN_PRIO) {                                                        /* Work */
	"When a task lies within one's known abilities, effort applied to the task is Work.  There are no surprises; no
short-comings.  But has one accurately judged both one's abilities and the demands of the task?  If not, perhaps the task
is not achievable, or of a size that one must increase one's abilities before undertaking it."
};

resource 'LDEF' (rSvAttraction, PFM_MIN_PRIO) {                                                  /*
Attract */
	"How hard should one try?  How much work should one do?  This is modulated by the Attraction of what one is
trying to achieve.  Attract is a directional factor that indicates what lies ahead is a positive reward.  When a
character strives toward a goal, they pass many veils along the way.  Each one is a curtain to the future that must be
ripped away to see what lies beyond.  Attract describes the nature of the curtain itself.  Can you judge the pleasure of
book by the art on its cover?  In the parable of the carrot and the stick, Attract is the carrot."
};

resource 'LDEF' (rSvRepulsion, PFM_MIN_PRIO) {                                                   /*
Repel */
	"A character's path to her goal is blocked by many curtains.  The future beyond each cannot be seen until she
has passed through to the other side.  Sometimes the curtain itself is attractive, encouraging one to continue.  Other
times it is negative, indicating danger or loss or something unsavory lies behind.  This is the nature of Repel.  The
warning is, \"I'd go back if I were you.\" or \"Don't spit into the wind\".  But does the curtain truly represent
something distasteful that waits beyond, or is it simple a false front, a mask to scare off the less tenacious?"
};

resource 'LDEF' (rSvAttempt, PFM_MIN_PRIO) {                                                     /*
Attempt */
	"When there is a question as to the match-up of one's abilities to the demands of a task, one may still elect to
attempt to complete the task.  However, sometimes a character has lost sight of the purpose of the task or underestimated
their progress, and has actually done the work while it continues to try.  Why does one beat a dead horse?  Why does a
billionaire struggle to earn one more million?"
};
```

```
resource 'LDEF' (rSvInstinct, PFM_MIN_PRIO) {                                   /*
Instinct */
	"Instinct describes those built- in responses to situations and circumstances that are not learned, yet drive
one to comply with their urges. How much sway they have over an individual depends both upon the nature of the instinct
and the intensity of conditioning against the instinct that they have experienced by accident, design, or choice. When
one acts or responds according to instinct, there is no conscious consideration beforehand. "
	"Only after the fact, does the consciousness become aware that an instinct has been triggered. Nonetheless, one
can learn to inhibit instinctual commands until the consciousness has the opportunity to consider the propriety of
conforming to it."
};

resource 'LDEF' (rSvSenses, PFM_MIN_PRIO) {                                     /* Senses */
	"Senses refers to the raw data supplied to the mind to interpret. Sometimes the data is accurate, other times
it is faulty even before the mind gets hold of it. Senses then, describes the overall accuracy of an observation (such
as seeing a crime or checking the results of a test). When taken in conjunction with its Dynamic Pair of Interpretation,
all manner of error or accuracy can be created. "
	"This provides the author with a powerful storytelling tool to create comedies and tragedies based in error and
misunderstanding."
};

resource 'LDEF' (rSvInterpretation, PFM_MIN_PRIO) {                             /*
Interpretation */
	"Once an observation is made, its meaning must be Interpreted by the mind. Even if seen exactly as it happened,
the forces or intents behind what is seen are often misconstrued. Stories revolving around eye witness accounts
frequently employ Interpretation (and its Dynamic Partner, Senses) to great dramatic advantage."
};

resource 'LDEF' (rSvConditioning, PFM_MIN_PRIO) {                               /*
Conditioning */
	"Conditioning describes the learned responses to various stimuli. Similar to Instinct in that the Consciousness
in not involved until after the fact, Conditioning differs insofar as it was not inherent in the basic nature of a
character, but acquired though training or familiarity to impose its triggers on the mind. Since Instincts are
intrinsic, and Conditioning is learned, they frequently come in conflict over how to respond. This concept alone has
provided the theme for many intriguing stories."
};

resource 'LDEF' (rSvWisdom, PFM_MIN_PRIO) {                                     /* Wisdom */
	"Wisdom is the meaning of what is known. A Character may be aware of facts, but unless she sees the pattern
that organizes those facts, the knowledge alone may be useless. Wisdom, therefore, does not describe just being aware of
something, but understanding how many bits of knowledge fit together."
};

resource 'LDEF' (rSvSkill, PFM_MIN_PRIO) {                                      /* Skill */
	"Skill is the innate potential to accomplish either that which is physical or mental. It does not require the
practical experience necessary to tap that potential, just that the latent capacity exists. Skill might be seen as raw
physical ability, talent, or intellectual or emotional aptitude which may or may not ever be developed."
};

resource 'LDEF' (rSvExperience, PFM_MIN_PRIO) {                                 /*
Experience */
	"Experience refers to the cumulative effect of observing or participating in mental or physical activities until
they become familiar. However, just because the activities become second nature does not mean a character is necessarily
good at them. To excel, a character need both Experience AND the innate Skills that can be honed by that experience. If
either is lacking or deficient, the character's real ability will be less than its Experiential potential."
};

resource 'LDEF' (rSvEnlightenment, PFM_MIN_PRIO) {                              /*
Enlightenment */
	"Not all meaning comes from experience. The mind has the ability to synthesize abstract truth that has not been
or cannot be observed. When a character is able to come to an understanding of the whole that exceeds the sum of the
observed parts, they are said to be Enlightened. A truly refined thematic conflict can be explored in the relationship
between the practical Wisdom born of great experience and the aesthetic Enlightenment born of great insight."
};

resource 'LDEF' (rSvApproach, PFM_MIN_PRIO) {                                   /*
Approach */
	"Approach is the manner in which a character chooses to seek the solution to a problem. This might be a
specific method, or just a general set of tools or guidelines that is deemed appropriate for the job. These tools can be
physical or mental ones, depending upon the nature of the problem and the determined solution."
};

resource 'LDEF' (rSvSelfInterest, PFM_MIN_PRIO) {                               /*
Self-Interest */
	"In its pure form, Self-Interest is defined as the quality of ALWAYS choosing what is best for oneself with NO
consideration as to the effect on others. This does not require ill intent toward others. A character who is Self-
Interested simply focuses on the personal ramifications of decisions. In fact, in stories that show the evil nature of
an oppressive society or regime, Self-Interest can be a very positive thing."
};

resource 'LDEF' (rSvMorality, PFM_MIN_PRIO) {                                   /*
Morality */
	"Not to be taken as a spiritual or religious sense of right and wrong, Morality here is intended to describe the
quality of character that puts others before self. This is not, however, always a good thing. If a character is
besieged by Self-Interested parties that grasp and take whatever they can, Morality (in this limited sense) is most
inappropriate. Also, Morality does not always require sacrifice. "
	"It simply means that a Moral character will consider the needs of others before their own. If the needs are
compatible, it can create a win/win scenario where no one need suffer."
};

resource 'LDEF' (rSvAttitude, PFM_MIN_PRIO) {                                   /*
Attitude */
	"Attitude describes the manner in which a character proceeds with an approach. One character might be hard-
driven, another laid back. One may be willing to sacrifice efficiency for the sake of a pleasant approach. Another
might sacrifice pleasure in order to make the approach most efficient. Sometimes an approach can be pushed too hard, or
not hard enough. It requires not only the proper approach, but the appropriate attitude to arrive at the solution to a
problem."
};

resource 'LDEF' (rSvPrerequisites, PFM_MIN_PRIO) {                              /*
Prerequisites */
	"Prerequisites are the essential or necessary steps or accomplishments that must be achieved in order for
something to occur. If a goal has a single requirement, there may be many prerequisites to meeting that requirement."
};

resource 'LDEF' (rSvStrategy, PFM_MIN_PRIO) {                                   /*
Strategy */
	"The specific plan or series of interconnected plans that are intended to produce a desired result is called a
Strategy. The sophistication of a strategy can range from complex to non-existent (if a character prefers to wing it).
Sometimes a strategy is on the mark, other times it is completely inappropriate to its intended purpose. "
	"Either way, for the audience to appreciate its apt or inept construction, the plan must be spelled out in full.
In storytelling, Strategy can define limits and draw out parameters for a story. This is a useful variation to use for
connecting theme to plot."
```

```
};

resource 'LDEF' (rSvAnalysis, PFM_MIN_PRIO) {                                          /*
Analysis */
        "Eisenhower said, \"Planning is vital; plans are useless\".  Analysis sits on one side of planning and strategy
sits on the other.  Analysis is the interpretation of available data in order to establish the approach most likely
succeed.  If the Analysis is faulty, it limits the potential of a Strategy.  If a Strategy is faulty, it limits the
effectiveness of Analysis."
};

resource 'LDEF' (rSvPreconditions, PFM_MIN_PRIO) {                                     /*
Preconditions */
        "When access to resources necessary to meeting pre-requisites is made contingent upon some non-essential
accomplishment or limitation, the extra baggage is referred to as Pre-conditions.  Depending upon the nature of the Pre-
conditions and the nature of a character, it may turn out that although the pre-requisites will achieve the goal, the
goal itself is improper and only the Pre-conditions can actually solve the problem.  Misplaced emphasis is a common
thematic exploration."
};

resource 'LDEF' (rSvStateOfBeing, PFM_MIN_PRIO) {                                      /*
State-of-Being */
        "State of Being describes the actual nature of a character.  The character herself, is often not aware of the
true nature of her being.  In fact, there may be no one at all who fully understands all that she is.  However, in the
communication between Author and Audience, the essence of a character must be fully explained or the story's message will
be obscured."
};

resource 'LDEF' (rSvSituation, PFM_MIN_PRIO) {                                         /*
Situation */
        "Situation describes the ins, outs and practical considerations of the environment in which a character finds
herself.  Throughout a story, the situation may evolve or may remain constant, depending upon the essence of the message
and the nature of the plot.  Since it is limited to the practical, Situation can only be measured and/or interpreted
though Reason."
};

resource 'LDEF' (rSvCircumstances, PFM_MIN_PRIO) {                                     /*
Circumstances */
        "Circumstances describes the way a character feels about their environment.  Whereas Situation is rated in terms
of satisfaction, Circumstances are rated in terms of fulfillment.  Emotion, therefore, is the standard of measure a
character uses to evaluate their Circumstances.  The expression, \"There's no such thing as a free lunch\", neatly
describes the dramatic tension that can arise between Circumstances and Situation.  "
        "Often a character must accept unfulfilling Circumstances because they need the benefits of the Situation .  Or,
a character may accept an unsatisfying Situation because it comes with fulfilling Circumstances.  Over the course of a
story, the balance between the two measurements can vary greatly."
};

resource 'LDEF' (rSvSenseOfSelf, PFM_MIN_PRIO) {                                       /*
Sense-of-Self */
        "Simply put, Sense of Self is our own Self Image.  A character may not truly know who they are, but they always
know who they think they are.  This inward-looking view may be right on the mark or not even close.  The difficulty a
character has is that from inside themselves is it impossible to be sure who they are.  "
        "All they can do is take clues from the reaction of those around them.  Interesting storytelling sometimes
places a character among those who provide a warped feedback that creates a false Sense of Self in the character.  This
erroneous image may be far better, far worse, or simply different than their actual state of being.  "
        "Other stories force a character to come to grips with the fact that they are wrong about themselves, and the
opinions of others are accurate.  In a Main Character, the differential between Sense of Self and State of Being is part
of what separates the Subjective from the Objective story lines."
};

resource 'LDEF' (rSvKnowledgeVar, PFM_MIN_PRIO) {                                      /*
Knowledge */
        "Knowledge is something a character holds to be true.  That does not necessarily mean it IS true, but just that
the character believes it is.  The gulf between what is known and what is true can create enormous misconceptions and
inaccurate evaluations."
};

resource 'LDEF' (rSvAbilityVar, PFM_MIN_PRIO) {                                        /*
Ability */
        "Ability describes the actual capacity to accomplish something.  However, even the greatest Ability may need
experience to become practical.  Also, Ability may be hindered by limitations placed on a character and/or limitations
imposed by the character upon themselves."
};

resource 'LDEF' (rSvDesireVar, PFM_MIN_PRIO) {                                         /*
Desire */
        "Desire describes an awareness that something better exists than what currently is.  This doesn't mean things
have to be bad now, just that one perceives something better.  The key word here is \"perceives\".  Desires are based not
on what is truly better, but on what one imagines will be better.  Often there is a large gap between the two.  (Recall
the story of the dog with the bone, jumping into the pond to get the bone from his reflection and ending up with no bone
at all.)  "
        "Little tension is produced if a character can try out her desires at no cost.  But great tension is produced
when she must give up something good forever in the belief that something else is better.  (\"Do you want [desire] what's
in the box, or what's behind door number 3?\")"
};

resource 'LDEF' (rSvThoughtVar, PFM_MIN_PRIO) {                                        /*
Thought */
        "Thought is not always directed.  Often it wanders, experiential and without conscious purpose.  Thought might
be about a topic or simple random musings or creative daydreaming or inspiration.  At its most essential level, Thought
is simply the mental force of change that rearranges the inertia of knowledge."
};

resource 'LDEF' (rSvRationalization, PFM_MIN_PRIO) {                                   /*
Rationalization */
        "Rationalization is the attempt to have your cake and eat it too.  When a character expects that catering to
their desires will bring about some cost or punishment, they try to do what they'd like, yet avoid retribution.  One way
is to come up with an excuse.  Rationalization involves fabricating an artificial reason for one's attitude or actions
that will excuse them.  "
        "The reason must make sense as being a possible actual cause of the character's activities.  In fact, it might
very well have been the reason, except that it wasn't, which is what makes it a Rationalization."
};

resource 'LDEF' (rSvCommitment, PFM_MIN_PRIO) {                                        /*
Commitment */
        "A commitment forms the essence of the steadfast character.  When a character makes a commitment, it is a
decision not to quit regardless of the obstacles that may come.  This allows the character to accept much higher costs on
the way to a goal than they would if they re-evaluated every time something went wrong.  The problem arises when one of
those obstacles turns out to be impassable.  At that point, the character cannot achieve the goal.  "
        "But since they are committed, they do not re-evaluate and instead continue to beat their head against a brick
wall.  In a sense, it is the realization that a commitment must be broken that constitutes change in a character."
};
```

```
resource 'LDEF' (rSvResponsibility, PFM_MIN_PRIO) {                                                    /*
Responsibility */
        "The instinct for survival is paramount under normal circumstances. Still, even animals throw themselves into
danger to help a human friend. The drive that overcomes self-interest is Responsibility.   Responsibility exists when
one cares more for others than for oneself. The problem occurs when a character believes she knows what is best for
someone, and that someone doesn't agree. "
        "\"Its for your own good\", and, \"This is going to hurt me more than you\" are two expressions that exemplify
this attitude. Sometimes the character is right in believing they know best, other times not. But either way,
Responsibility can cause problems when it is imposed on another, rather than offered to them. Responsibility can both be
given or taken."
};

resource 'LDEF' (rSvObligation, PFM_MIN_PRIO) {                                                        /*
Obligation */
        "Obligation is a mental trick we play when we accept a poor situation now in the hopes it will lead to a better
one later. If we do not feel Obligated, we know we are really in control of the situation since we can leave at any
time. "
        "However, we would then lose any chance of a reward at the end, and even risk consequences that might befall us
as a result of leaving. But by focusing on the hope of a reward and protection from consequences, our current suffering
can be tolerated and we feel we have no choice but to stick it out. "
        "The problem is, that as long as we continue to feel we have no choice, the suffering can increase way beyond
any realistic hope of recouping, and yet we \"must\" stay."
};

resource 'LDEF' (rSvPermission, PFM_MIN_PRIO) {                                                        /*
Permission */
        "Permission means Ability limited by restrictions. These constraints may be self imposed or imposed by others.
When a Character considers what they can or cannot do, they are not assessing their ability, but the limitations to their
ability. When one worries about the consequences born of disapproval or self-loathing, one halts for the lack of
Permission. The frustration of a character suffering a vice-grip on their ability may eventually erupt in an explosive
reaction if the noose gets too tight."
};

resource 'LDEF' (rSvNeed, PFM_MIN_PRIO) {                                                       /* Need */
        "It is often assumed that NEED describes something absolutely required in an objective sense. But NEED is
really a subjective judgment of what is lacking to fulfill a requirement. To illustrate this, we might consider the
statement, \"We all need food and water\". This statement seems to make sense, but is not actually correct. In truth,
we only need food and water if we want to live. For a paralyzed patient who wishes to be allowed to die, the last thing
they NEED is food and water. "
        "Clearly, need depends upon what one subjectively desires. That which is required to fulfill that desire is the
subjective NEED."
};

resource 'LDEF' (rSvExpediency, PFM_MIN_PRIO) {                                                        /*
Expediency */
        "It is important not to consider Expediency as only meaning efficiency.    In terms of story, Expediency
describes what a character FEELS they must do or be in order to avoid potential consequences. These consequences can
come from without in the form of disapproval by others or from within in the form of self-recrimination. If they are
internal, Expediency feels like a \"moral\" pressure, but is really the emotional retribution one flails against oneself
for disappointing their self-image. "
        "If they are external, Expediency feels like peer pressure or a threat to social standing. Expediency is as
important an emotional motivation as Need is a motivator of reason. Since Expediency is based on avoiding future
punishments or disappointments that may or may not be real, dramatic tension can be easily created between the subjective
and objective views."
};

resource 'LDEF' (rSvDeficiency, PFM_MIN_PRIO) {                                                        /*
Deficiency */
        "When a character Desires something, they are content with what they have, yet may imagine something better that
could improve things. When a character lacks, they are NOT content with what they have, and REQUIRE something more in
order to become content.   In short, Lack is closely related to Need, just seen in a negative light.   Many a misguided
character strives for what they believe they Need only to find out they did not truly Lack it. Only when Needs are real
and matched to appropriate lacks will one fulfill the other."
};

resource 'LDEF' (rSvTruth, PFM_MIN_PRIO) {                                                      /* Truth */
        "Truth is more than facts and accuracy. Truth is meaning. Whenever someone is quoted out of context, what is
reported may be factual and may be accurate, but it is not Truthful. Meaning depends upon intent and purpose. That is
the beauty of the legal system: that even if someone is caught red-handed, the jury can acquit because they feel there
were mitigating circumstances. The problem with Truth is that is an interpretation, and therefore open to debate. One
person's Truth is another's Falsehood."
};

resource 'LDEF' (rSvEvidence, PFM_MIN_PRIO) {                                                          /*
Evidence */
        "Evidence is information one gathers to develop an understanding about something.   When looking at Evidence, a
character does not necessarily have to know exactly what she is looking for, just that the information pertains to the
nature of what she is trying to learn about. As a result, she tends to examine the Evidence only in terms of whether or
not it is something that falls into a pre-determined category. "
        "Therefore, errors can occur when the Evidence (although it pertains to the subject of interest) actually holds
much more information in another area. This can lead a character to \"not see the forest for the trees\" because she is
looking at the small picture and ignoring the big one. "
        "For example, in a mystery, a detective may be looking for Evidence of who committed a murder, when in truth the
victim died of natural causes, which is clearly indicated if the detective had only thought to look for that."
};

resource 'LDEF' (rSvSuspicion, PFM_MIN_PRIO) {                                                         /*
Suspicion */
        "Suspicion is a preliminary conclusion arrived at with insufficient evidence. It is valuable in helping one
know what kinds of things to look for in gathering additional evidence. But can also be a detriment because once a
character suspects something, they are less likely to examine all the evidence for a completely alternative explanation."
};

resource 'LDEF' (rSvFalsehood, PFM_MIN_PRIO) {                                                         /*
Falsehood */
        "Falsehood does not mean incorrect, but in error. In other words, what is presented may be absolutely accurate
and yet not reflect what is really going on. Perhaps only a portion of the truth is expressed, or more information than
is pertinent causes one to misconstrue. A danger is that Falsehood can get away from the control of its creator. Once
an error has been passed off as truth, some will continue to accept it as truth, even if it is recanted by the person
that gave the False account."
};

resource 'LDEF' (rSvValue, PFM_MIN_PRIO) {                                                      /* Value */
        "Value is an objective measurement of the usefulness or desirability of something in general. This is a good
indicator by which to predict its import to others. However, no one really thinks completely objectively, so there is
always a degree of personal preference included in a determination of Value. Difficulties arise when a character
neglects the personal worth someone else may or may not find in something of specific value. "
        "For example, a Boss may find it of no direct Value, but placing a candy bar on each employees desk for them to
find in the morning can have a lot of worth to the employee. Indirectly then, Value is returned to the Boss in the form
of a better day's work. But seeing the indirect Value is difficult from the subjective view. "
        "Learning to see items and actions not just for their intrinsic Value, but for their conditional Value is a
strong thematic message."
};
```

```
resource 'LDEF' (rSvConfidence, PFM_MIN_PRIO) {                                                         /*
Confidence */
	"Confidence points to the future.  It is not a rating of the present situation, but a positive evaluation of how things will turn out.  Confidence, therefore, is a great motivator in unknown situations.  This is because Confidence is not based on predicting a situation, but on the experience of past situations.  The downside is that Confidence erodes the motivation to prepare for the unexpected.  "
	"If past experience has always shown that even the most threatening disasters have worked themselves out, then one will ignore potential danger that may turn out to be real.  We see this in history time and time again, such as the way the people of Pompeii remained in their homes while Vesuvius bellowed smoke for the umpteenth time."
};

resource 'LDEF' (rSvWorry, PFM_MIN_PRIO) {                                                      /* Worry */
	"Like confidence, Worry looks toward the future, but is based on a projection of negative experience.  When, in the past, seemingly innocuous situations have developed into disasters, one learns to Worry at the slightest evidence of instability.  Worry has the positive quality of motivating one to prepare for the worst.  If the worst happens, the character representing Worry is truly prepared.  But how often does the worst actually happen?  "
	"The downside is that resources one might use to make advances are wasted just trying to protect the status quo. And those who worry tend to avoid unknown situations that might hold substantial rewards."
};

resource 'LDEF' (rSvWorth, PFM_MIN_PRIO) {                                                      /* Worth */
	"Worth describes the subjective value of an item or action to an individual.  Of course, this varies greatly from individual to individual.  This is the nature of garage sales: one woman's trash is another woman's treasure. Making choices on the basis of Worth is an efficient way to get the most with one's resources.  But there may be all kinds of potential locked in something a character considers worthless, because objectively it has great Value.  "
	"For example, Native Americans used gold simply as a decoration.  To them, it had little other Worth.  Of course to Europeans, it had significant Value.  A character who ignores potential value because of low Worth can live to regret the deals they make in a story, both physically and emotionally."
};

resource 'LDEF' (rSvClosure, PFM_MIN_PRIO) {                                                            /*
Closure */
	"Closure can be seen in two ways.  One, it can be an ending.  In this sense, it prevents what has happened from being changed: it protects a memory or a situation because the window of opportunity for change has ended.  In the other sense, Closure can be seen as a continuance.  This is because a process made into a closed loop will just go on forever, repeating the same course.  In some stories Closure settles all the dramatic potentials to show that the issue of the story has been resolved.  "
	"In other stories, Closure is used to show that even though the immediate problem has been resolved, the volatile relationships among the characters is never-ending.  Closure is useful in letting one know when the job is done. Negatively, Closure tries to bring everything to a conclusion, even if it is a continuously growing process that is completely open-ended.  The attempt to stop such an evolution would be either fruitless or disastrous.  But is a process closed or not?  When is a career at an end?"
};

resource 'LDEF' (rSvHope, PFM_MIN_PRIO) {                                                       /* Hope */
	"Hope is based on a projection of the way things are going.  When one looks at the present situation and notes the direction of change, Hope lies somewhere along that line.  As an example, if one is preparing for a picnic and the weather has been sunny, one Hopes for a sunny day.  If it was raining for days, one could not Hope, but only Dream. Still, Hope acknowledge that things can change in unexpected ways.  That means that Hoping for something is not the same as expecting something.  "
	"Hope is just the expectation that something will occur unless something interferes.  How accurately a character evaluates the potential for change determines whether they are Hoping or dreaming.  When a character is dreaming and thinks they are Hoping, they prepare for things there is no indication will come true."
};

resource 'LDEF' (rSvDream, PFM_MIN_PRIO) {                                                      /* Dream */
	"Dream describes a character who speculates on a future that has not been ruled out, however unlikely.  Dreaming is full of \"what ifs\".  Cinderella Dreamed of her prince, because it wasn't quite unimaginable.  One Dreams of winning the lottery even though one \"hasn't got a hope\".  Hope requires the expectation that something will happen if nothing goes wrong.  Dreaming has no such limitation.  Nothing has to indicate that a Dream will come true, only that its not impossible.  "
	"Dreaming can offer a positive future in the midst of disaster.  It can also motivate one to try for things others scoff at.  Many revolutionary inventors have been labeled as Dreamers.  Still and all, to Dream takes away time from doing, and unless one strikes a balance and does the groundwork, one can Dream while hopes go out the window for lack of effort."
};

resource 'LDEF' (rSvDenial, PFM_MIN_PRIO) {                                                     /* Denial */
	"Denial is the refusal to accept that something is or has become closed.  How many people continue to make a point after they have won the argument?  More than just not accepting a conclusion, Denial can also be not accepting that a process will just keep repeating.  A repeating process has a cycle: once around the loop.  In a story, a character comes into such circle at one point and follows it around back to start.  "
	"At that point, a theme of Denial would have that character refusing to believe that she has been just been chasing her own tail.  At the leap of faith she will just push off again and keep on circling a no-win situation in the hopes it will change this time around.  Inertia does not always travel in straight lines."
};

resource 'LDEF' (rSvInvestigation, PFM_MIN_PRIO) {                                                      /*
Investigation */
	"Investigation is a pro-active word, for it describes a character who makes an effort to seek out evidence. Obviously this usually tends to bring one closer to a conclusion sooner than without the effort.  But Investigation can cause trouble since the character must pre-determine where to look.  This leads to a meandering path through the evidence that may miss whole pockets of essential information.  "
	"Sometimes a single missed piece can flip the entire conclusion 180 degrees.  So Investigating to one's satisfaction depends on random success and the limits of one's tenacity, not necessarily on learning the whole picture."
};

resource 'LDEF' (rSvAppraisal, PFM_MIN_PRIO) {                                                          /*
Appraisal */
	"When determining which parts of evidence she should investigate and which parts she doubts and therefore chooses to ignore, a character makes an initial Appraisal of where the evidence seems to be leading.  Although there is not enough evidence to really draw a conclusion, there is enough to indicate the direction evidence seems to be leading. That which is not in line is doubted, and the more out of line, the more doubt.  "
	"That which is in line is investigated.  Of course, since this Appraisal is based on insufficient evidence, the big picture can change dramatically over the course of investigation.  Yet, like everyday people a character is strongly influenced by first impressions, and can become attached to an Appraisal  and fail to see that the direction of evidence has changed."
};

resource 'LDEF' (rSvReappraisal, PFM_MIN_PRIO) {                                                        /*
Reappraisal */
	"When one has made an initial appraisal as to where preliminary evidence seems to be leading, there comes a time when one must make a Reappraisal of the evidence to see if its direction has changed.  This, of course, tends to keep one on the right track.  But characters, like everyday people, are influenced by what has occurred most recently - \"What have you done for me lately?\"  As a result, during Reappraisal, a character might discount the body of evidence in favor of that which is most fresh in her mind."
};

resource 'LDEF' (rSvDoubt, PFM_MIN_PRIO) {                                                      /* Doubt */
	"Here Doubt is defined as the lack of faith that evidence leads to a certain conclusion.  This means that even though evidence supports a particular concept, the character is unwilling to abandon the belief that alternative explanations can be found.  Certainly this approach has the advantage of keeping one's mind open.  Problem is, sometimes
```

```
a mind can be too open.  If a character Doubts too much, they will not accept solid evidence no matter how conclusive.
This can prevent the character from ever accepting the obvious truth, and continuing to labor under a delusion."
};

                    /*****************/
                    /*     ELEMENTS    */
                    /*****************/

resource 'LDEF' (rSvAbilityElem, PFM_MIN_PRIO) {                                                    /*
Ability */
        "An aspect of the Ability element is an innate capacity to do or to be.  Although all characters will have
abilities of one sort or another, only the character containing the Ability characteristic will seem to have them all.
This does not mean they have developed any of their Abilities, but just that they have the capacity to.  The positive
side is that the character containing the Ability Characteristic can develop any skill that they may need.  The negative
side is that just because something can be done does not mean it should be done.  In other words, sometimes Ability is
more a curse than a blessing because it can motivate a character to exercise capacities that may be negative."
};

resource 'LDEF' (rSvAcceptance, PFM_MIN_PRIO) {                                                     /*
Acceptance */
        "When a character represents Acceptance, it simply adapts to whatever comes its way without opposition.  Of
course, this can eliminate many potential conflicts by refusing to stand against inequity.  On the other hand, if the
source of the inequity keeps churning out trouble, Acceptance will allow that negative process to continue unencumbered."
};

resource 'LDEF' (rSvAccurate, PFM_MIN_PRIO) {                                                       /*
Accurate */
        "Not all concepts work all the time.  When an understanding has uses within limitations or is mostly or often
true, it can still provide a useful way of looking at the broad issues.  The more accurate an understanding, the more
specifically one can apply it with certainty.  The character possessing the Accurate characteristic will accept rough
approximations and will make judgments and perform activities that are \"within tolerance\" or \"good enough\" for the
purpose at hand.  The advantage is that little energy is wasted on \"the law of diminishing returns\".  "
        "The disadvantage is that appraising things as Accurate can lead to gross generalizations.  If the character
containing Accurate is not careful, it may assume that an understanding applies to every instance all the time."
};

resource 'LDEF' (rSvActuality, PFM_MIN_PRIO) {                                                      /*
Actuality */
        "Actuality refers to the true state of things.  A character who represents Actuality sees right through image
and pretense, preferring to get to the heart of the matter.  It also will not accept foregone conclusions until they have
materialized.  It feels that without substance, there is no meaning.  The problem is, that anything that does not meet
its strict definitions is ignored as irrelevant.  It is often surprised when the undefined or unformed turns out to be
very real."
};

resource 'LDEF' (rSvAvoidance, PFM_MIN_PRIO) {                                                      /*
Avoid */
        "Like its counter-part, Pursue, the Avoid characteristic causes a character to be a real self-starter.  The
difference is, just as strongly as Pursuit tries to close in on the something, Avoid tries to escape it.  Avoid can take
the forms \"escape\" or \"prevent\", depending upon whether the focus of the effort is an object or a process.  Avoid
might be seen as running away, but that has its place.  And certainly, when seen as \"prevent\", it might be applied to
stopping something very negative from happening.  "
        "Of course, it could also prevent something positive or really just be running away from something that should
be faced.  Pursue and Avoid are not value judgments but directions."
};

resource 'LDEF' (rSvAware, PFM_MIN_PRIO) {                                                     /* Aware */
        "Awareness refers to being conscious of things outside oneself.  A character that represents Awareness misses
nothing that happens around them.  A drawback is they may forget to figure themselves into the equation."
};

resource 'LDEF' (rSvCause, PFM_MIN_PRIO) {                                                     /* Cause */
        "The character containing the Cause characteristic is concerned with what is behind a situation or its
circumstances.  This can lead it right to the source of trouble, the source of control.  However, sometimes many things
came together to create a particular effect.  In that case, the Cause characteristic may fail by either looking for a
single source or trying to address them all, while ignoring the option of simply dealing with the effect."
};

resource 'LDEF' (rSvCertainty, PFM_MIN_PRIO) {                                                      /*
Certainty */
        "The character representing the Certainty characteristic is not a risk taker.  It must be completely sure before
it takes action or accepts information as true.  The slightest potential for error or change will stop it in its tracks.
On the plus side, it never goes out on a limb far enough to break it; on the minus side, it might never get out far
enough to get the fruit either.  Many opportunities are lost to it because it hesitates until it is too late."
};

resource 'LDEF' (rSvChange, PFM_MIN_PRIO) {                                                   /* Change */
        "Change is the force that alters.  A characteristic representing change is quick to adapt but also cannot leave
well enough alone.  It feels that if things have been one way long enough to establish a pattern, its time to change it."
};

resource 'LDEF' (rSvChaos, PFM_MIN_PRIO) {                                                     /* Chaos */
        "Chaos is disorder, randomness, anarchy.  The Chaos characteristic is brilliant at cutting through a Gordian
knot.  But then it just keep cutting every rope it see until the chandelier falls on its head.  It \"stirs the pot\" just
to see what will bubble up to the top."
};

resource 'LDEF' (rSvConscience, PFM_MIN_PRIO) {                                                     /*
Conscience */
        "Conscience is the motivation that negative consequences are unavoidable if a present desire is acted upon.
Conscience can serve a character well in overcoming strong transient desires that would bring disasters upon them.  But
if the negative consequences are purely imaginary, Conscience constricts the free expression of one's heart."
};

resource 'LDEF' (rSvConsider, PFM_MIN_PRIO) {                                                       /*
Consideration */
        "A Consideration is the act of deliberation.  A character possessing the Consideration characteristic keeps
pondering an issue, running it over in their minds.  Once they have latched onto a topic, they refuse to let it go until
it is resolved.  This trait aids in keeping one's motivations impervious to erosion.  On the other hand, the
Consideration characteristic may not let sleeping dogs lie.  Therefore it can lead to stirring up all kinds of negative
reactions."
};

resource 'LDEF' (rSvControlled, PFM_MIN_PRIO) {                                                     /*
Controlled */
        "The Controlled characteristic causes a character to methodically directs its actions and deliberations to the
specific purpose at hand.  This leads to a great degree of focus.  The drawback is that when one focuses, one loses
peripheral vision.  The purpose becomes so all consuming that many peripheral, yet essential parts of the equation are
ignored until it is too late to save the whole project."
};
```

```
resource 'LDEF' (rSvDeduction, PFM_MIN_PRIO) {                                                          /*
Deduction */
        "Deduction is the process of thought that arrives at a determination of what is, by limiting out all that cannot
be.  It has been said, \"When you have ruled out the impossible, whatever is left, no matter how improbable, must be
true.\"  The characteristic representing Deduction will arrive at conclusions by eliminating all competing theories that
have holes until only one remains.  "
        "This is fine for cutting away the nonsense and discovering understanding, unless the competing theories were
not all the available theories and the real answer was never even considered.  Also , Deduction often fails to look for
situations in which alternative truths exist.  A famous story had a detective narrowing down murder suspects only to
discover that they all did it!"
};

resource 'LDEF' (rSvDesireElem, PFM_MIN_PRIO) {                                                         /*
Desire */
        "The Desire element is the essence of motivation.  A characteristic representing Desire is mindful of a future
in which situation or circumstances are improved.  This does not mean that it is unhappy with what it has, but rather
that it can imagine something better.  On the plus side, Desire primes the characteristic to seek to better its
environment or itself. "
        "On the minus side, Desire is not always coupled with an ability to achieve that which is Desired.  In this
case, Desire may no longer felt as a positive motivator but as a negative lack, and may become a measurement of one's
limitations and constraints."
};

resource 'LDEF' (rSvDetermination, PFM_MIN_PRIO) {                                                 /*
Determination */
        "Determination is an evaluation of the forces driving a process.  This allows one to anticipate future effects
or to take action to stop or enhance a current effect.  However, it may just be that a completely different set of forces
is really behind the process, causing one to put her efforts in the wrong place.  When a person swims directly toward the
shore, the current can carry her far down shore.  As long as the character possessing Determination sticks with a
particular concept of the powers that be, there is the potential it may not get what it expects."
};

resource 'LDEF' (rSvDisbelief, PFM_MIN_PRIO) {                                                  /* Disbelief
*/
        "Disbelief is not the same thing as a lack of faith.  Lack of faith is the absence of absolute confidence that
something is or will be true.  Disbelief is absolute confidence that something is not true.  Disbelief may make one a
skeptic, but sometimes it makes a character the only one with the confidence to tell the Emperor \"You have no
clothes!\""
};

resource 'LDEF' (rSvEffect, PFM_MIN_PRIO) {                                                          /* Effect */
        "Effect is the end product of an effort or series of efforts.  One might argue its pros and cons, yet ignore how
the Effect came to be in the first place.  On the plus side, concentrating on Effect keeps the effort focused on the
problem or goal.  On the minus side, it can lead to beating a dead horse.  Failure may follow if one puts all one's
efforts into dealing with  the Effect while ignoring the cause.   Should a mayor add to the police force to battle crime
or improve social services?"
};

resource 'LDEF' (rSvEnding, PFM_MIN_PRIO) {                                                          /* Ending */
        "The Ending characteristic causes a character to look toward the conclusion in every process or situation.  She
may wish to prevent it or to hasten it, but her primary concern is when it's going to be over.  A very useful trait in
dealing with steps or phases.  Not very useful if the process or situation is really un-ending.  "
        "Since the character representing the Ending characteristic assumes that everything must end sooner or later,
she cannot accept that some things never end.  Some relationships will last a lifetime, come what may.  But if one
partner believes it can end, she will always worry, looking for signs of its demise.  If he was an Ending person,
Prometheus was sorely mistaken.  (Weeds grow back and Rust never sleeps!)"
};

resource 'LDEF' (rSvEquity, PFM_MIN_PRIO) {                                                          /* Equity */
        "Equity is balance.  The Equity characteristic makes a character want everything to work out fair and square.
She will spend her time trying to maintain balance and will judge the acceptability of a situation by its apparent
equilibrium.  On the downside, she may not realize that without inequity there is no motivation and hence, no progress.
Also, there may not be enough to go around.  By \"robbing Peter to pay Paul\" she might be moving resources back and
forth in a way that stresses the whole system which might crumble from the strain."
};

resource 'LDEF' (rSvEvaluation, PFM_MIN_PRIO) {                                                 /* Evaluation
*/
        "Evaluation is the meaning a character finds in a situation or circumstances.  Rather than just grappling with
the bits and pieces, the character creates an understanding of how all the parts fit together.  This gives her a better
grasp of how to deal with the issue.  The danger is that once she has Evaluated, the situation or circumstances change,
yet she is still using the old evaluation as a unit of measure.  Meanings change over time and need to be updated to
maintain accuracy."
};

resource 'LDEF' (rSvExpectation, PFM_MIN_PRIO) {                                                   /*
Expectation */
        "Expectation is the projection of what one expects to find at the end of a path.  Expectations allow one to
anticipate and make plans for both rewards and troubles.  However, if the character representing Expectation does not
occasionally question the basis of their projections, they may find the world has turned under their feet."
};

resource 'LDEF' (rSvFaith, PFM_MIN_PRIO) {                                                            /* Faith */
        "Faith is a belief in something without the support of proof.  Since the future is uncertain, Faith in one's
ability to arrive at one's purpose is a very strong motivator.  However, when one has Faith, it cannot be argued with
since it does not rely on logic or proof.  The danger of Faith is that it does not allow one to determine if obstacles
are signs that ones motivations are misplaced, because the obstacles seem to be tests that must be overcome through
steadfast belief. "
};

resource 'LDEF' (rSvFeeling, PFM_MIN_PRIO) {                                                      /* Feeling */
        "Feeling is the mental process of seeking the most fulfilling course or correct explanation based on emotion.
The Feeling characteristic believes \"ya gotta have heart.\"  It cares not for what is efficient or even practical as
long as it is \"feels\" right.  This makes the Feeling characteristic very empathetic to the emotional atmosphere in a
situation, yet apt to ignore or pay little attention to necessities."
};

resource 'LDEF' (rSvHelp, PFM_MIN_PRIO) {                                                              /* Help */
        "The Help characteristic assists another's efforts.  This can be a real boon to someone struggling to achieve.
But sometimes someone doesn't want any help.  They either want to do it on their own, or what they are trying to do has
been misread by the character representing the Help characteristic, who is actually hindering them.  Did you hear the one
about the Boy Scout who helped the little old lady across the street and then she bashed him with her handbag because she
had been waiting for a bus?"
};

resource 'LDEF' (rSvHinder, PFM_MIN_PRIO) {                                                          /* Hinder */
        "The Hinder characteristic strives to undermine another's efforts. This might be seen as a negative, as it often
is.  But sometimes a character functions to hinder an \"evil\" character, disrupting their plans.  Hinder merely
indicates the effect on the plans, not whether that is a good or bad thing."
};

resource 'LDEF' (rSvHunch, PFM_MIN_PRIO) {                                                            /* Hunch */
```

```
        "A Hunch is an understanding arrived at by circumstantial evidence.  The phrase \"where there's smoke, there's
fire\" describes the concept .  The advantage is that when evidence mounts, even without direct connections, one may draw
an analogy that has a substantial likelihood of being correct as in \"I've seen that pattern before!\".  Of course, a
Hunch is merely a suspicion .  The danger is acting upon it as if it were fact."
};

resource 'LDEF' (rSvInaction, PFM_MIN_PRIO) {                                                      /* Inaction
*/
        "Inaction does not mean simply sitting still.  The Inactive characteristic might choose to allow a course of
action by not interfering.  Or, it might refuse to move out of harm's way, thereby forming a resistance to the progress
that drives the harm.  Both of these are efficient tools for altering the course of an interaction.  However, the
Inactive characteristic may also drag its feet in all areas and form a resistance to both good and bad things, so that
its influence simply hinders everything but changes nothing."
};

resource 'LDEF' (rSvInduction, PFM_MIN_PRIO) {                                                     /* Induction
*/
        "Induction is the process of thought that determines where an unbroken line of causal relationships leads.  The
purpose is to see if it is possible that something connects to something else.  The character containing the Inductive
characteristic has an advantage in taking seemingly unrelated facts and putting them in an order that establishes a
potential causal relationship.  This allows them to arrive at conclusions that \"limit in\" something as a possibility.
"
        "The drawback is that the conclusion only illustrates one possibility out of an unknown number of possibilities.
Unlike deduction, Induction does not rule out competing theories until only one remains.  Rather, Induction simply
determines that a particular theory is not ruled out.  Problems occur when it is assumed that simply because a causal
relationship might exist that it does exist.  This leads to blaming and holding responsible both people and situations
that were not actually the real cause.  "
        "Only if all possible Inductions are compared can the likelihood of any single one be determined."
};

resource 'LDEF' (rSvInequity, PFM_MIN_PRIO) {                                                      /* Inequity
*/
        "When a character focuses on Inequity she is evaluating in terms of what is wrong or unfair with a situation.
No matter how much is working right, or how much is good, it is the part that is out of balance that occupies her
attention.  A character with this trait will spot trouble before anyone else, but she will also never be satisfied unless
absolutely everything is worked out."
};

resource 'LDEF' (rSvInertia, PFM_MIN_PRIO) {                                                       /* Inertia */
        "Inertia is a tendency to maintain the status quo.  That which is moving wants to keep moving.  That which is at
rest wants to stay at rest.  An Inertia-oriented character concerns herself with keeping things on an even keel.  She
tries to avoid or prevent anything that rocks the boat.  She also does not adapt well to change."
};

resource 'LDEF' (rSvKnowledgeElem, PFM_MIN_PRIO) {                                                 /* Knowledge
*/
        "The Knowledge characteristic urges a character to rely on what is held to be true.  The Character representing
Knowledge will tap the resources of its information to find parallels and understanding that she can apply to the issue
at hand.  The advantage of Knowledge is that one need not learn what is already known, thereby skipping non-essential re-
evaluations and getting a head start with solving a problem.  The difficulty is that Knowledge can be wrong.  "
        "Without re-evaluation dogma sets in - rigor mortis of thought, leading to inflexibility and closed minded-ness
because the Character believes no re-consideration is needed since the subject is already \"known\"."
};

resource 'LDEF' (rSvLogic, PFM_MIN_PRIO) {                                                         /* Logic */
        "Logic is the mental process of choosing the most efficient course or explanation based on reason.  The Logic
characteristic exemplifies the theory behind \"Occam's Razor\": that the simplest explanation is the correct explanation.
Therefore, the Logic characteristic is very efficient, but has no understanding or tolerance that people do not live by
reason alone.  As a result, the character with the Logic characteristic often ignores how other's \"unreasonable\"
feelings may cause a very real backlash to their approach."
};

resource 'LDEF' (rSvNonAcceptance, PFM_MIN_PRIO) {                                                 /* Non-
acceptance */
        "The character containing the Non-Acceptance characteristic will not compromise.  She stands her ground
regardless of how unimportant the issue may be.  Certainly, this characteristic nips attrition in the bud, but also loses
the benefits of give and take relationships."
};

resource 'LDEF' (rSvNonAccurate, PFM_MIN_PRIO) {                                                   /* Non-
Accurate */
        "Non-Accurate describes a concept that is not functional for the purpose at hand.  There may be some value in
the concept in other areas, but for the intended use, it is not at all correct.  The Non-Accurate characteristic will
find the exceptions to the rule that ruin an argument.  "
        "This makes it nearly immune to generalizations.  Unfortunately this can also make it unable to accept any
explanation or concept that has an exception, even if the exception has no real effect on how the concept is being
applied.  Anything that is not right all the time for every use is rejected  as Non-Accurate. "
};

resource 'LDEF' (rSvOppose, PFM_MIN_PRIO) {                                                        /* Oppose */
        "The Oppose characteristic causes a character to speak out against any effort, although they do not actively
engage in preventing it.  As in \"the Loyal Opposition\", an opposing view can be useful in seeing the negative side of
an endeavor.  However it can also wear thin really fast, with the constant nag, nag, nag."
};

resource 'LDEF' (rSvOrder, PFM_MIN_PRIO) {                                                         /* Order */
        "The character containing the Order characteristic is concerned with keeping things organized.  Change is not a
problem as long as it is orderly.  However, sometimes you can't get there from here and the whole system has to be blown
apart to rebuild from the ground up.  Sometimes a little chaos needs to reign so that a log jam can be broken or a
process speeded up.  The character representing Order is an organization fiend."
};

resource 'LDEF' (rSvPerception, PFM_MIN_PRIO) {                                                    /* Perception
*/
        "Perception is a point of view on reality.  In truth, we cannot truly get beyond perception in our understanding
of our world.  A character that represents Perception is more concerned with the way things seem than what it is.
Therefore she can be caught off-guard by anything that is not what it seems."
};

resource 'LDEF' (rSvPossibility, PFM_MIN_PRIO) {                                                   /*
Possibility */
        "The Possibility element endows a character with an open-minded assessment of her environment and relationships.
However, it gives less weight to the single most likely explanation, looking instead at the whole range of known
alternatives.  Since the most likely scenario does not always happen, the Possibility element aids in having \"Plan B\"
ready.  On the downside, this characteristic may \"over think\" things and lose track of what is most probable."
};

resource 'LDEF' (rSvPotentiality, PFM_MIN_PRIO) {                                                  /*
Potentiality */
        "The element of Potentiality drives a character to take risks on long odds.  Always looking at what is not
specifically ruled out, they are even beyond the realm of possibility and spend their time focusing on the greatest
possible potential.  As long as there is no reason why something should not be a certain way, the character representing
Potentiality acts as if it is.  "
```

```
        "Of course this leads them to see benefits and dangers others might miss, but it also leads them to starve on
\"pie in the sky\".  This characteristic always looks at what might be, never stopping to take stock of what is."
};

resource 'LDEF' (rSvProaction, PFM_MIN_PRIO) {                                                    /* Proaction
*/
        "The Proactive characteristic will urge a character to begin problem solving on their own.  This character will
be a self-starter who is up and at it the moment she realizes a potential problem exists.  Sometimes, however, a
potential problem may not actually materialize and would have disappeared in short order by itself.   Proaction may
actually cause the problem to occur by irritating the situation.  "
        "Worse yet, the character representing Proaction may act before the true nature of the problem is seen, leading
her to cause damage to innocent or non-responsible parties, sometimes actually aiding the real source of the problem."
};

resource 'LDEF' (rSvProbability, PFM_MIN_PRIO) {                                                  /*
Probability */
        "The character having the Probability characteristic puts its beliefs and efforts behind what is most likely.
It is not as bound to safety as a character containing the Certainty characteristic, yet will still only take
\"calculated\" risks.  It is always playing the odds, and changes direction in mid-stride if the odds change.  This
allows it to steer clear of many dangers, but also tends to make it fickle."
};

resource 'LDEF' (rSvProcess, PFM_MIN_PRIO) {                                                      /* Process */
        "A Process is a series of interactions that create results.  The character representing Process will concentrate
on keeping the engine running smoothly.  Unfortunately, they often forget to look where the car is actually going.
Sometimes experiences along the way the important part, other times it is arriving at the destination."
};

resource 'LDEF' (rSvProduction, PFM_MIN_PRIO) {                                                   /* Production
*/
        "Production is a process of thought that determines potential.  Almost like deduction in reverse, rather than
arriving at a present truth by limiting out what cannot be, Production arrives at a future truth by limiting out what can
not happen.  Anything that remains has potential.  The problem for the character representing the Production
characteristic is that Potentiality is often mistaken for Certainty if they fail to realize that any overlooked or
unknown information can completely alter the course of the future."
};

resource 'LDEF' (rSvProjection, PFM_MIN_PRIO) {                                                   /* Projection
*/
        "Projection is a means of anticipating events and situations by extending the line of how things have been
happening into the future.  A character that represents Projection has a good grasp of what she might look for in things
to come.  However, this character will give great weight to past experience, so abrupt changes in direction might be
ignored until it is too late."
};

resource 'LDEF' (rSvProtection, PFM_MIN_PRIO) {                                                   /* Protection
*/
        "Protection is the act of building one's defenses against actual and potential threats.  Certainly, preparing
for problems brings a character advantages should the problems occur.  However, the very act of building defenses can be
interpreted as a threat to others who rely on Proaction and thereby precipitate the very aggression the character had
tried to protect against.  "
        "Also, a character representing Protection may stifle another's need for risk-taking, or become so wrapped up in
preparations that there are no resources left to use for advancement."
};

resource 'LDEF' (rSvProven, PFM_MIN_PRIO) {                                                       /* Proven */
        "Proven refers to an understanding that has been shown to be correct enough times to enough people to hold it as
fact.  The character representing Proven will judge truth only by what has been sufficiently verified.  This makes it
wary of unsubstantiated rumors, evidence or conclusions.  In the negative column, determining something is Proven
requires drawing an arbitrary line that says, \"Enough it enough, it's true!\"  "
        "The moment one assumes that the understanding is Proven, one ceases to look for exceptions.  When a connection
is made between two events or people on the basis of a series of \"Proven\" facts, all it takes is one exception to ruin
the argument."
};

resource 'LDEF' (rSvPursuit, PFM_MIN_PRIO) {                                                      /* Pursuit */
        "The character representing Pursuit is a real self-starter.  The Pursuit characteristic leads a character to
determine what they need to achieve and then make a bee-line for it.  This may seem admirable, and it can be.  Unless, of
course, they are trying to pursue something bad for themselves and/or for others.  In fact, it may be that the object of
the Pursuit doesn't want to be pursued.  \"If you love something let it go... If it loves you, it will come back.  If it
doesn't come back, hunt it down and kill it.\""
};

resource 'LDEF' (rSvReevaluation, PFM_MIN_PRIO) {                                                 /* Re-
evaluation */
        "Re-Evaluation is the act of re-considering one's first impressions.  This may be in regard to a person,
situation, goal, or even oneself.  Re-Evaluation is a helpful characteristic in dispelling incorrect initial assessments
of the meaning behind things, but is a real drawback when a person or situation conspires to lure one's understanding
away from an accurate Evaluation.  Perhaps a series of coincidences or a concerted effort can present information that
conflicts with an earlier Evaluation that was actually quite on the mark.  "
        "A character containing the Re-Evaluation characteristic can be swayed by new misleading information and form
new, mistaken understandings."
};

resource 'LDEF' (rSvReaction, PFM_MIN_PRIO) {                                                     /* Reaction
*/
        "The Reaction characteristic leads a character to strike back at the source of a problem.  Reaction is less
precipitative than Proaction requiring the problem to materialize before it acts.  It does not take pre-emptive first
strikes, nor does it turn the other cheek.  As a result it often waits too long to tackle a problem that could easily
have been prevented, then gets in a brawl that actually becomes a problem.  "
        "Many authors try to pit one Proactive character against another.  This actually diminishes the drama of the
conflict, as both characters are taking the same approach.  By making one character Proactive and another Reactive, a
much more real and powerful interaction is created."
};

resource 'LDEF' (rSvReconsider, PFM_MIN_PRIO) {                                                   /*
Reconsideration */
        "The Reconsideration characteristic represents the drive to re-examine one's conclusions to see if they are
still valid.  This leads to a pragmatic approach to one's own beliefs, but also undermines resolve with every new
obstacle that crosses one's path."
};

resource 'LDEF' (rSvReduction, PFM_MIN_PRIO) {                                                    /* Reduction
*/
        "Reduction is a process of thought that compares the likelihood of several incomplete lines of deduction.
Sometimes there is not enough information to fully deduce the ultimate truth in a matter.  However, there is enough
information to narrow the field of possibilities.  When all the possibilities are considered, each can be rated on its
individual merits as to how much each has.  The potentialities are compared, arriving at the most likely conclusion.  "
        "This allows the Reduction characteristic to act with a greater degree of confidence than if no \"favorite\"
theory or explanation had emerged.  Of course, dealing with incomplete data is a horse race, where even the most unlikely
explanation may surge ahead when the last piece is in place, and prove to be the actual fact of the matter.  It is when
the Reduction characteristic gives probability the weight of certainty or fails to reevaluate that problems can arise."
};
```

```
resource 'LDEF' (rSvResult, PFM_MIN_PRIO) {                                        /* Result */
        "Result is a holistic view of all the end products of a process.  When a cause generates an effect, how does the
effect upset the overall balance of a situation?  In a balance of power, one must consider the results of arming an ally,
not just the immediate effect of strengthening its military.  The character possessing the Result characteristic
considers the ripples that might occur because of a given effect.  "
        "The negative aspect is that it often over think the situation until its considerations are ranging far beyond
the scope of any real concerns.  This can inhibit useful actions for insignificant reasons.  Stop a new factory that will
create jobs to protect a previously unknown species of gnat?  It depends on the scope of the concern."
};

resource 'LDEF' (rSvSelfAware, PFM_MIN_PRIO) {                                     /* Self-Aware
*/
        "When a character possesses Self-Awareness they fully appreciate all their feelings, thoughts, abilities and
knowledge.  Everything they experience or observe is couched in terms of their own point of view.  As the downside, they
may not be able to understand that some things that happen don't pertain to them at all, and in fact happen best without
them."
};

resource 'LDEF' (rSvSpeculation, PFM_MIN_PRIO) {                                   /*
Speculation */
        "Speculation is the effort to determine what could conceivably happen in the future, even though it is not the
most likely scenario.  Speculation leads a character to expect the unlikely in the event that it actually occurs.
Difficulties arise when Speculation runs rampant and a character puts effort into preparing for things that are so
unlikely as to be unreasonably improbable."
};

resource 'LDEF' (rSvSupport, PFM_MIN_PRIO) {                                       /* Support */
        "Support is not direct help.  Direct help is actively joining someone in an effort.  Support is aiding the
effort without actually participating in it.  For example, A character possessing the Help characteristic would join
someone in digging a ditch.  The character representing Support would provide a shovel and cheer them on.  Support is a
fine thing to keep one's spirits up, but is awfully frustrating when you just need someone to lend you a hand."
};

resource 'LDEF' (rSvTemptation, PFM_MIN_PRIO) {                                    /* Temptation
*/
        "Temptation is the draw to belief that the negative consequences of an action are imaginary or can be avoided.
Often, this is just a pipe dream, and when one gives into Temptation one must pay a price.  However, just as often one
can avoid negative consequence, and indulge one's desires.  "
        "It is our Faith and Disbelief in consequences that defines the struggle between Conscience and Temptation.
(\"Psssst... We've got this new Dramatica program that will solve all your story problems, but it's going to cost you
some bucks....\")"
};

resource 'LDEF' (rSvTest, PFM_MIN_PRIO) {                                          /* Test */
        "To test is to try out a supposition to determine if it is correct.  \"Run it up the flagpole and see if people
salute it\" is the concept here.  Any explanation that makes sense has the potential to be correct or incorrect once it
is actually tried in \"the real world\".  The Test characteristic will always want to try things out  before using it.  "
        "This can weed out faulty items before they break down when one relies on them.  However, it can also waste
time, when it is of the essence, or waste one of the three wishes just to see if it works."
};

resource 'LDEF' (rSvTheory, PFM_MIN_PRIO) {                                        /* Theory */
        "A Theory is an unbroken web of relationships that describes a mechanism.  To be a theory, the actual mechanism
of each relationship in the Theory must be known as well.  Unless it is understood how point A gets to point B, it might
just be coincidental.  For example, if two completely different and separate mechanisms are working in the same area, it
may appear that one is causing a certain effect when it is really the other.  "
        "Developing Theories gives the character representing Theory the ability to understand and predict how things
work and fit together.  The drawback is that they will not accept an obvious relationship unless all its steps can be
discovered.  As a result, many \"common sense\" approaches and understandings are not used, despite their proven value."
};

resource 'LDEF' (rSvThoughtElem, PFM_MIN_PRIO) {                                   /* Thought */
        "When a character represents Thought, they illustrate the process of consideration.  Unlike the logic element
that is only concerned with arriving at a conclusion via reason, Thought deliberates both logical and emotional aspects
of a problem, not particularly to decide an issue so much as to examine it from all perspectives.  "
        "This has the advantage of illuminating every side of an issue, but has the potential disadvantage of Thought
becoming an endless loop where consideration runs round in circles, chasing its mental tail and never coming to rest in a
decision."
};

resource 'LDEF' (rSvTrust, PFM_MIN_PRIO) {                                         /* Trust */
        "To Trust is to accept without trial.  Whether a concept, relationship, person or mechanism, it will be accepted
by the character possessing the Trust characteristic without supportive evidence.  This helps them to get on with the job
at hand in the most efficient manner, but opens them up to disastrous surprises when an assumption is proven incorrect at
a critical moment."
};

resource 'LDEF' (rSvUnEnding, PFM_MIN_PRIO) {                                      /* Un-Ending
*/
        "The Un-ending characteristic sees nothing as ever coming to completion.  What others may see as an end, this
characteristic sees as a change of direction.  For example, obtaining a diploma is seen not as an end of college, but as
another step in one's career (which is Un-ending).  This has an advantage of \"never saying 'die'\", which helps the
motivation stay alive to keep trying.  "
        "On the other hand, seeing a bad thing as unending can rob one of motivation.  Also, when something is really
over, the character representing Un-ending can't see it.  This might be a former relationship or a current job that they
take for granted."
};

resource 'LDEF' (rSvUncontrolled, PFM_MIN_PRIO) {                                  /*
Uncontrolled */
        "The character representing Un-Controlled spreads themself very thin by expending their energy and motivation in
all directions at once.  As a result, they are fully involved in their environment, which covers all the bases.  Yet,
because they are randomly distributed, there is not single direction to their thrust.  Therefore, the Un-Controlled
character frequently spends a lot of energy getting nowhere (frenzy)."
};

resource 'LDEF' (rSvUnproven, PFM_MIN_PRIO) {                                      /* Unproven
*/
        "Un-Proven describes an understanding suspected to be true, but not substantiated enough to call it fact.  The
character representing Un-Proven will not accept anything as fact just because the theory has worked so far.  No matter
how many times or how many ways evidence builds to support the contention, Un-Proven will not be satisfied until the
conclusion is absolutely drawn in hard data, not just road tests.  "
        "This keeps the character representing Un-Proven from jumping to conclusions, but makes them less able to accept
the obvious conclusion unless it is directly observed in a way that is not open to alternative interpretation.  "
};


/* $Log:        ldefine.r,v $
# Revision 1.10  93/09/03  15:51:46  chris
# Definitions updated.
#
```

```
# Revision 1.9  93/08/24  14:11:03  chris
# Cleanup.
#
# Revision 1.8  93/06/05  01:16:35  chris
# cleanup.
#
# Revision 1.7  93/06/02  21:46:10  chris
# Changed positions of type, variations, and elements between classes.
#
# Revision 1.6  93/06/02  16:07:50  chris
# Misc. clean up.
#
# Revision 1.5  93/05/30  17:23:55  chris
# Added long definitions for appreciations.
#
# Revision 1.4  93/05/26  19:46:38  stephen
# Windows fixes.
#
# Revision 1.3  93/05/13  15:39:23  chris
# Definition cleanup.
#
# Revision 1.2  93/05/12  17:59:07  chris
# Modified definitions.
#
# Revision 1.1  93/05/10  10:23:15  chris
# Initial revision
#
*/
```

```
/* ------------------------------------------------------------------------
	$Id: main.cc,v 1.3 92/11/25 10:45:36 ken Exp $

	Copyright (C) 1990-91 Screenplay Systems Inc.

	This file contains the main program entrypoint for an application that
	uses AppLib.  This module MUST be statically linked to the executable
	(unlike all the other modules in AppLib which may statically or
	dynamically linked).

	Note that this file contains one AppStatics object.  This object contains
	Applib's static variables that reflect the state of the application,
	allowing Applib to be re-entrant.  See the header comment in static.h for
	more information.
------------------------------------------------------------------------ */
#ifdef __BORLANDC__
	#include <process.h>
#endif
#include "tappl.h"
#include "apputls.h"
#include "appdlogs.h"

#pragma segment Main

#ifndef MIN_STRINGS
	char main_id[] = "$Id: main.cc,v 1.3 92/11/25 10:45:36 ken Exp $";
#endif
/* ------------------------------------------------------------------------
	TYPEDEFS/CONSTANTS
------------------------------------------------------------------------ */
#ifdef WINDOWS
	#ifdef __BORLANDC__
		#define argc	_argc
		#define argv	_argv
	#else
		#define argc	__argc
		#define argv	__argv
	#endif
	extern int			argc;
	extern char**		argv;
#endif
/* ------------------------------------------------------------------------
	STATIC DATA
------------------------------------------------------------------------ */
#include "mmstatic.h"				// needed to init memmgr.

static AppStatics	sAppStatics;	// AppLib's non-reentrant static data.

/* ------------------------------------------------------------------------
	LOCAL UTILITY FUNCTIONS
------------------------------------------------------------------------ */
static int		run_the_app(AP_AppParams *pParams);
static bool_t	sys_env_ok(AP_AppParams *pParams);

#ifdef TOOLBOX

/* ------------------------------------------------------------------------
	main - a TOOLBOX program's entrypoint.  MaxApplZone() is called to
		expand the heap before any initialization code is loaded.
------------------------------------------------------------------------ */
int main(int argc, char *argv[])
{
	AP_AppParams params;

	params.argc = argc;
	params.argv = argv;

	MaxApplZone();

	return run_the_app(&params);

} /* main */

#else /* WINDOWS */

/* ------------------------------------------------------------------------
	WinMain - a WINDOWS program's entrypoint.  argc and argv are supplied
		as globals (see MS-Windows SDK "Guide to Programming" p.14-3).
------------------------------------------------------------------------ */
int PASCAL WinMain(HANDLE hInst, HANDLE hPrevInst, LPSTR cmdStr, int appState)
{
	AP_AppParams params = { argc, argv, hInst, hPrevInst, cmdStr, appState };

	return run_the_app(&params);

} /* WinMain */

#endif /* TOOLBOX -> WINDOWS */

/* ------------------------------------------------------------------------
	run_the_app - first check to make sure we have a valid system to run on
		by calling sys_env_ok().  Then call NewAppObject() to create the
		application object.  NOTE: NewAppObject() must be supplied by the
		application programmer.  Some application initialization occurs in
		the application's constructor, however most occurs at the beginning
		of TAppl::EventLoop() so that virtual functions can be taken advantage
		of.  Once the EventLoop() ends, delete the app. object and return.
------------------------------------------------------------------------ */
int run_the_app(AP_AppParams *pParams)
{
	int		status = EXIT_FAILURE;

	GN_Init();
	AP_Init();

	if (sys_env_ok(pParams)) {

		TAppl*	pApp = AP_NewAppObject(pParams, &sAppStatics);

		if (ASSERT(pApp)) {

			pApp->EventLoop();
```

```
                    delete pApp;

                    status = EXIT_SUCCESS;
                }
        }
#ifdef __BORLANDC__
        _cexit();                       // needed to call static object destructors!
#endif
        AP_Exit();
        GN_Exit();

        return status;

} /* run_the_app */

/* -------------------------------------------------------------------------
        sys_env_ok - check to make sure that we can run.  On the Mac/MCP plat-
                form we need to wait until TAppl::init_app() to do these tests.
---------------------------------------------------------------------------- */
bool_t sys_env_ok(AP_AppParams *pParams)
{
#ifdef WINDOWS
        if ( ! AP_Win30OrBetter() ) {
                AP_UserAlert(rMemAlerts, eWrongMachine, NULL);
                return false;
        }
        if ( ! AP_ProtectedMode() ) {
                AP_UserAlert(rMemAlerts, eProtectedModeOnly, NULL);
                return false;
        }
        if (pParams->hPrevInst) {
                AP_UserAlert(rMemAlerts, eOnlyOneInstance, NULL);
                return false;
        }
#endif
        return true;

} /* sys_env_ok */

/* xxxxxxxxxxxxxxxxxxxxxxxxxxxxxxxxxxxxxxxxxxxxxxxxxxxxxxxxxxxxxxxxxxxxxxxx */
/* $Log:        main.cc,v $
 * Revision 1.3  92/11/25  10:45:36  ken
 * added AP_Init and AP_Exit to fix DLL termination problem.  See log entries
 * in genutls.h for more info.
 *
 * Revision 1.2  92/07/16  11:18:26  ken
 * sweeping checking after porting SSI Edit to both Mac and Windows.  Probably
 * will "freeze" class libraries at version 1.0 after this, although I still
 * have to build AppTest and HyperTbl with the latest changes, so minor fixes
 * will clearly follow version 1.0.
 *
 * Revision 1.1  92/04/28  13:35:21  ken
 * Initial revision
 *
 */
```

```
/*****************************************************************
	MAINOBST.CC
	Setup Main/Obstacle window
	(c) 1993-94 Screenplay Systems
	Authors:	S. Greenfield & C. Huntley
	Created:	March 1, 1994
	Revised:	$Id$
*****************************************************************

*/

#include "editview.h"

#include "structs.h"
#include "apprdefs.h"
#include "dramatic.h"
#include "storytbl.h"
#include "mainobst.h"

#pragma segment mainobst

STPopupInit MOPopupInitTable[] =
{
	{ rApprMCPbm,		kMCProblem,		0	},	// [0] - MC Problem
	{ rApprMCSol,		kMCSolution,	0	},	// [1] - MC Solution
	{ rApprMCFoc,		kMCFocus,		0	},	// [2] - MC Focus
	{ rApprMCDir,		kMCDirection,	0	},	// [3] - MC Direction

	{ rApprMCDom,		kMCDomain,		0	},	// [4] - MC Domain
	{ rApprMCRng,		kMCRange,		0	},	// [5] - MC Range (Thematic Focus)
	{ rApprMCUnRng,		kMCUniqAbility,	0	},	// [6] - MC Unique Range (Unique Ability)
	{ rApprMCCrFl,		kMCCritFlaw,	0	},	// [7] - MC Critical Flaw

	{ rApprOCPbm,		kOCProblem,		0	},	// [8] - OC Problem
	{ rApprOCSol,		kOCSolution,	0	},	// [9] - OC Solution
	{ rApprOCFoc,		kOCFocus,		0	},	// [10] - OC Focus
	{ rApprOCDir,		kOCDirection,	0	},	// [11] - OC Direction

	{ rApprOCDom,		kOCDomain,		0	},	// [12] - OC Domain
	{ rApprOCRng,		kOCRange,		0	},	// [13] - OC Range (Thematic Focus)
	{ rApprOCUnRng,		kOCUniqAbility,	0	},	// [14] - OC Unique Range (Unique Ability)
	{ rApprOCCrFl,		kOCCritFlaw,	0	},	// [15] - OC Critical Flaw

	{ 0,				0,				0	},	// [24] - Sentinal for
table's end
};

/* -----------------------------------------------------------------------
	MainObstDlog::~MainObstDlog - Destructor.
----------------------------------------------------------------------- */
MainObstDlog::~MainObstDlog(void)
{
	if (fItemHit == fDefaultBtn) {
		CharInfoRec charInfo;
		fDoc->GetCharInfoRec(fDoc->GetMainCharID(), &charInfo);

		byte_cnt		textSize = kMaxCNameLength;
		((EditView*)GetItem(kMCNameEditView))->GetText(charInfo.name, &textSize);
		fDoc->SetCharInfoRec(fDoc->GetMainCharID(), &charInfo);
		charInfo.charPT->SetParam("NM", 'c', charInfo.name);

		textSize = kMaxCNameLength;
		fDoc->GetCharInfoRec(fDoc->GetObstacleCharID(), &charInfo);
		((EditView*)GetItem(kOCNameEditView))->GetText(charInfo.name, &textSize);
		fDoc->SetCharInfoRec(fDoc->GetObstacleCharID(), &charInfo);
		charInfo.charPT->SetParam("NM", 'c', charInfo.name);

		fDoc->SetFileSaveFlag();
		fDoc->SortCharList();
		fDoc->SetMainObstacleIDs();
		fDoc->UpdateCastViews();
	}

} /* MainObstDlog::~MainObstDlog */

/* -----------------------------------------------------------------------
	MainObstDlog::init_dlog - initialize the Main/Obstacle Dialog.
----------------------------------------------------------------------- */
void MainObstDlog::init_dlog(void)
{
	TDialog::init_dlog();

	while (fPopupInitTable[fNmOfPopups].apprID)
		++fNmOfPopups;

	//	Set title of dialog to include story's name

	PText* storyDocPT		= fDoc->GetSDOC();
	char dialogTitle[150];
	strcpy(dialogTitle, "Main & Obstacle Characters");
	char titleTxt[100];
	titleTxt[0] = 0;
	storyDocPT->GetParam("Title", 'c', titleTxt);
	if (titleTxt[0]) {
		strcat(dialogTitle, " for ");
		strcat(dialogTitle, titleTxt);
	}

	SetTitle(dialogTitle);

	char charName[50];
	PText* mainCharPT		= fDoc->GetMainCharPT();
	EditView* MCNameEditView = (EditView*)GetItem(kMCNameEditView);
	mainCharPT->GetParam("NM", 'c', charName);
	MCNameEditView->SetText(charName);
```

```
        PText* obstCharPT           = fDoc->GetObstacleCharPT();
        EditView* OCNameEditView = (EditView*)GetItem(kOCNameEditView);
        obstCharPT->GetParam("NM", 'c', charName);
        OCNameEditView->SetText(charName);

//      fApp->PushCursor(AP_WATCH_CURS);
        st_err   theErr;
        fStoryTbl = new StoryTbl(fDoc, &theErr);
        fApprecCopyHdl = fDoc->CopyAppreciations();
        fTotalStories = fInitialStoryCount = init_storyTable();

        buildAllMenus();
        displayStoryCount();

        //      Set Radio Buttons

        fMCResolveChangeBtn = (RadioBtn*)GetItem(kMCResolveChange);
        fMCResolveSteadBtn          = (RadioBtn*)GetItem(kMCResolveSteadfast);
        fOCResolveChangeBtn = (RadioBtn*)GetItem(kOCResolveChange);
        fOCResolveSteadBtn          = (RadioBtn*)GetItem(kOCResolveSteadfast);

        set_subjective_buttons();

//      fApp->PopCursor();
        fCurrentCursor = AP_ARROW_CURS;

} /* MainObstDlog::init_dlog */


/* ----------------------------------------------------------------------
        MainObstDlog::init_storyTable - does the initial work of setting up our
        story table for the control panel dialog.
---------------------------------------------------------------------- */
ushort MainObstDlog::init_storyTable(void)
{
        short whichTables[] = {    rApprResolve, rApprDirection, rApprApproach, rApprSex,
                                                        rApprWork, rApprLimit, rApprOutcome, rApprJudgment,

                                                        rApprMCPbm, rApprMCSol, rApprMCFoc, rApprMCDir,
                                                        rApprMCDom, rApprMCRng, rApprMCUnRng, rApprMCCrFl,

                                                        rApprOCPbm, rApprOCSol, rApprOCFoc, rApprOCDir,
                                                        rApprOCDom, rApprOCRng, rApprOCUnRng, rApprOCCrFl, 0 };

        short nonVisibleTables[kMaxSearchSlots+1];
        fStoryTbl->CreateSearchTableSet(nonVisibleTables, 0, fDoc->GetTotalStories());
        fStoryTbl->MergeSearchTableSets(whichTables, nonVisibleTables, fWhichTables);
        fStoryTbl->init_menu_item_structs(fPopupInitTable, fWhichTables, fDoc->GetRESP());

        ushort nmOfStories = fStoryTbl->ScanStoryTable(false);
        return (nmOfStories);

} /* MainObstDlog::init_storyTable */


/* ----------------------------------------------------------------------
        MainObstDlog::DoItemHit - react to a user action in the dialog.
---------------------------------------------------------------------- */
void MainObstDlog::DoItemHit(ls_index itemHit)
{
        if (itemHit == fClearBtn) {
                reset_menus();
                set_subjective_buttons();
        }
        else if (itemHit == fRevertBtn) {
//              fApp->PushCursor(AP_WATCH_CURS);
                fDoc->RestoreAppreciations(fApprecCopyHdl);          // Restore appreciations, 'cause user pressed
REVERT
                fApprecCopyHdl = fDoc->CopyAppreciations();          // Now grab a fresh copy, since memory was
deallocated

                fTotalStories = init_storyTable();

                buildAllMenus();
                set_subjective_buttons();
                displayStoryCount();
//              fApp->PopCursor();
        }

        else if (itemHit != fDefaultBtn && itemHit != fCancelBtn) {
                STSearchRec* searchRec;
                bool_t   doScan = false;
                short semVal = -1;

                searchRec           = fStoryTbl->GetSearchRec(0);
                if (itemHit == kMCResolveChange) {                                          //
MC is Change
                        semVal = 1;
                                // 1 == "change"
                        fOCResolveChangeBtn->SetCntlVal(AP_OFF);
                        fOCResolveSteadBtn->SetCntlVal(AP_ON);
                }
                else if (itemHit == kMCResolveSteadfast) {                               // MC is
Steadfast
                        semVal = 2;
                                // 2 == "Steadfast"
                        fOCResolveChangeBtn->SetCntlVal(AP_ON);
                        fOCResolveSteadBtn->SetCntlVal(AP_OFF);
                }

                else if (itemHit == kOCResolveChange) {                                     //
MC is Steadfast
                        semVal = 2;
                                // 2 == "Steadfast"
                        fMCResolveChangeBtn->SetCntlVal(AP_OFF);
                        fMCResolveSteadBtn->SetCntlVal(AP_ON);
                }
                else if (itemHit == kOCResolveSteadfast) {                               // MC is
Change
                        semVal = 1;
                                // 1 == "change"
                        fMCResolveChangeBtn->SetCntlVal(AP_ON);
                        fMCResolveSteadBtn->SetCntlVal(AP_OFF);
```

```
                }
                else if (itemHit >= kMCProblem && itemHit <= kOCCritFlaw) {
                        if (popup_menu_hit(itemHit, &searchRec)) {
                                doScan = true;
                        }
                }

                if (semVal != -1) {
//                      searchRec->fItemTally[0] = 0;
//                      searchRec->fItemTally[1] = 0;
                        searchRec->validChoice     = false;
                        searchRec->matchAny               = true;
                        searchRec->searchVal       = semVal-1;
//                      searchRec->fItemTally[semVal-1] = semVal;
                        doScan = true;
                }

                if (doScan) {
//                      fApp->PushCursor(AP_WATCH_CURS);
                        fTotalStories = fStoryTbl->ScanStoryTable((searchRec->validChoice) && (fTotalStories !=
MAXSTORIES));

                        buildAllMenus();
                        displayStoryCount();
                        set_subjective_buttons();
//                      fApp->PopCursor();
                }

        }
} /* MainObstDlog::DoItemHit */


/* ----------------------------------------------------------------------
        MainObsDlog::set_subjective_buttons - changes the subjective
        characteristics of a given character.
---------------------------------------------------------------------- */
void MainObstDlog::set_subjective_buttons(void)
{
        STSearchRec* resolveSearchRec        = fStoryTbl->GetSearchRec(0);
        if (resolveSearchRec->nmValidChoices == 1) {                        // Only one choice?
                if (resolveSearchRec->semVal) {                                       // Main Character
Steadfast?
                        fMCResolveChangeBtn->SetCntlVal(AP_OFF);
                        fOCResolveSteadBtn->SetCntlVal(AP_OFF);
                        fMCResolveSteadBtn->SetCntlVal(AP_ON);                  // yep!
                        fOCResolveChangeBtn->SetCntlVal(AP_ON);                 // Then Obstacle is Change
                }
                else {
                        fMCResolveSteadBtn->SetCntlVal(AP_OFF);
                        fOCResolveChangeBtn->SetCntlVal(AP_OFF);
                        fMCResolveChangeBtn->SetCntlVal(AP_ON);                 // Otherwise, MC is Change
                        fOCResolveSteadBtn->SetCntlVal(AP_ON);                  // And OC is Steadfast
                }
                if (resolveSearchRec->matchAny) {                               // Implied choice -- grey items
so user can't change
                        set_button_enable(AP_OFF);
                }
                else {
                        set_button_enable(AP_ON);                       // Re-enable (un-grey) all items in case
they're grey
                }
        }
        else {                                                                              // Possible
un-set of all Radio buttons, due to multiple choices
                set_button_enable(AP_ON);                               // Re-enable (un-grey) all items in case
they're grey
        }

} /* MainObsDlog::set_subjective_buttons */


/* ----------------------------------------------------------------------
        MainObstDlog::set_button_enable - sets all the buttons to grey
        (disabled) or black (enabled).
---------------------------------------------------------------------- */
void MainObstDlog::set_button_enable(bool_t state)
{
        fMCResolveChangeBtn->Enable(&state);
        fMCResolveSteadBtn->Enable(&state);
        fOCResolveChangeBtn->Enable(&state);
        fOCResolveSteadBtn->Enable(&state);
} /* MainObstDlog::set_button_enable */

//              thisRB =  (fRadioBtns[rb]->GetCntlVal() == AP_ON);


/* ----------------------------------------------------------------------
        MainObstDlog::save_story_settings - takes all of the user's choices and
        stuffs them back into the appropriate structures so they can be saved
        as PTEXT.
---------------------------------------------------------------------- */
void MainObstDlog::save_story_settings(void)
{
#if 0
        STSearchRec*        searchRec = fStoryTbl->GetSearchRec(20);
        fApprecPtr[AP_MAIN].ap[kDomain] = (searchRec->nmValidChoices == 1) ? searchRec->semVal : 0;
#endif

        short maxSlots = fStoryTbl->GetNmOfSearchSlots();
        for (short slot=0; slot<maxSlots; ++slot) {
                STSearchRec* searchRec = fStoryTbl->GetSearchRec(slot);
                if (!searchRec->tableUsed)
                        break;
                        // reached end of table
//              if (searchRec->popupMenuID)
                        fStoryTbl->SaveStorySetting(slot, fResponses, fTotalStories);
        }

} /* MainObstDlog::save_story_settings */
```

```
/* ------------------------------------------------------------------------
                                               Setup Main/Obstacle COMMAND CLASS
--------------------------------------------------------------------------- */

/* ------------------------------------------------------------------------
        MainObstCmd::IsValid -
--------------------------------------------------------------------------- */
bool_t MainObstCmd::IsValid(TAppl *pApp)
{
        ls_index          activeDoc          = pApp->ActiveDoc();
        if (activeDoc != kLsNoElem) {
                DRDoc*   theDoc = ((DRDoc*)pApp->GetDoc(activeDoc));
                return (theDoc == NULL) ? false : true;
        }
        return (false);

//      return pApp->ActiveWindow() && ! pApp->ActiveWindow()->IsModalDlog();

} /* MainObstCmd::IsValid */

/* ------------------------------------------------------------------------
        MainObstCmd::do_cmd -
--------------------------------------------------------------------------- */
err_t MainObstCmd::do_cmd(void)
{
        TAppl*            pApp               = (Dramatica*)AP_Data()->fApp;
        ls_index          activeDoc          = pApp->ActiveDoc();
        assert(activeDoc != kLsNoElem);
        DRDoc*   theDoc = ((DRDoc*)pApp->GetDoc(activeDoc));
        assert(theDoc != NULL);
        (new MainObstDlog(theDoc, MOPopupInitTable, kMOClearBtn, kMORevertBtn, kMOStoryCount))->ModalLoop();

        return NOERR;

} /* MainObstCmd::do_cmd */
```

```
/* -----------------------------------------------------------------------
	MAINOBST.H
	Setup Main/Obstacle window
	Copyright (C) 1994 Screenplay Systems Inc.
	Revised:	$Id$
----------------------------------------------------------------------- */

#pragma once

#ifndef __MAINOBST__
#define __MAINOBST__

#include "appcntls.h"
#include "drrez.h"
#include "cpanel.h"


#pragma segment mainobst

const ls_index	kMOClearBtn			= 51;
const ls_index	kMORevertBtn		= 50;
const ls_index	kMOStoryCount		= 53;

//	Main Character section

const ls_index	kMCNameEditView		= 0;
const ls_index	kMCResolveChange	= 3;
const ls_index	kMCResolveSteadfast	= 4;

const ls_index	kMCProblem			= 5;
const ls_index	kMCSolution			= 7;
const ls_index	kMCFocus			= 9;
const ls_index	kMCDirection		= 11;

const ls_index	kMCDomain			= 13;
const ls_index	kMCRange			= 15;
const ls_index	kMCUniqAbility		= 17;
const ls_index	kMCCritFlaw			= 19;

//	Obstacle Character section

const ls_index \ kOCNameEditView	= 22;
const ls_index	kOCResolveChange	= 25;
const ls_index	kOCResolveSteadfast	= 26;

const ls_index	kOCProblem			= 27;
const ls_index	kOCSolution			= 29;
const ls_index	kOCFocus			= 31;
const ls_index	kOCDirection		= 33;

const ls_index	kOCDomain			= 35;
const ls_index	kOCRange			= 37;
const ls_index	kOCUniqAbility		= 39;
const ls_index	kOCCritFlaw			= 41;


/* -----------------------------------------------------------------------
	MainObstDlog - A story Engine Dialog for setting up the Main & Obstacle
	character.
----------------------------------------------------------------------- */
class EXPORT_CLASS MainObstDlog : public CPanelDlog {
public:
	MainObstDlog(DRDoc* theDoc, STPopupInit* popupInitTable, ls_index clearBtn = 0, ls_index revertBtn = 0, ls_index
storyCountBtn = 0)
			: CPanelDlog(rMainObstDlog, theDoc, popupInitTable, clearBtn, revertBtn, storyCountBtn) {}
	virtual ~MainObstDlog(void);

	virtual void	DoItemHit(ls_index itemHit);

protected:
	virtual void	init_dlog(void);
	virtual ushort	init_storyTable(void);
	virtual void	save_story_settings(void);

	virtual void	set_help_values(ls_index ItemHit, short semVal) {}
	virtual void	draw_locks() {}

			void	set_subjective_buttons(void);
			void	set_button_enable(bool_t state);

	// DATA MEMBERS

	RadioBtn*		fMCResolveChangeBtn;	// Radio buttons for Main Character's Change Resolve
	RadioBtn*		fMCResolveSteadBtn;		// Radio buttons for Main Character's Steadfast
Resolve

	RadioBtn*		fOCResolveChangeBtn;	// Radio buttons for Obstacle Character's Change Resolve
	RadioBtn*		fOCResolveSteadBtn;		// Radio buttons for Obstacle Character's
Steadfast Resolve

}; /* MainObstDlog */


/* -----------------------------------------------------------------------
	MainObstCmd - Run the setuip main/obstacle command.
----------------------------------------------------------------------- */
class MainObstCmd : public TCommand {
public:
	MainObstCmd(TAppl* pTAppl) : TCommand(pTAppl) {}

	virtual char*	ClassName(void)	const	{ return "MainObstCmd"; }
	virtual class_t	ClassType(void) const	{ return kMainObstCmd; }
	virtual bool_t	IsOfType(const void *pType) const { return *(class_t*) pType == kMainObstCmd ||
TCommand::IsOfType(pType); }
	virtual TObject* Duplicate(void) const	{ return new MainObstCmd(*this); }

	static bool_t	IsValid(TAppl *pTAppl);

protected:
	virtual err_t	do_cmd(void);
```

```
}; /* MainObstCmd */

#endif /* __MAINOBST__ */
```

```
/***********************************************************************
        MENU.CC
        Implementation of Dramatica's custom menu classes
        (c) 1993 Screenplay Systems
        Authors:        S. Greenfield & C. Huntley
        Created:        April 1, 1993
        Revised:        $Id$
***********************************************************************

*/

#include "menu.h"

#pragma segment menus


/* -----------------------------------------------------------------------
        StoryFormingMenu::IsAvailable - return true if the menu is currently valid.
------------------------------------------------------------------------ */
bool_t StoryFormingMenu::IsAvailable(const void *pUnused)
{
        return fParentApp->ActiveWindow() && ! fParentApp->ActiveWindow()->IsModalDlog();

} /* StoryFormingMenu::IsAvailable */


/* -----------------------------------------------------------------------
        CharMenu::IsAvailable - return true if the menu is currently valid.
------------------------------------------------------------------------ */
bool_t CharMenu::IsAvailable(const void *pUnused)
{
        return fParentApp->ActiveWindow() && ! fParentApp->ActiveWindow()->IsModalDlog();

} /* CharMenu::IsAvailable */


/* -----------------------------------------------------------------------
        StoryTellingMenu::IsAvailable - return true if the menu is currently valid.
------------------------------------------------------------------------ */
bool_t StoryTellingMenu::IsAvailable(const void *pUnused)
{
        return fParentApp->ActiveWindow() && ! fParentApp->ActiveWindow()->IsModalDlog();

} /* StoryTellingMenu::IsAvailable */


/* -----------------------------------------------------------------------
        ReferenceMenu::IsAvailable - return true if the menu is currently valid.
------------------------------------------------------------------------ */
bool_t ReferenceMenu::IsAvailable(const void *pUnused)
{
        return fParentApp->ActiveWindow() && ! fParentApp->ActiveWindow()->IsModalDlog();

} /* ReferenceMenu::IsAvailable */


/* -----------------------------------------------------------------------
        WritersBlockMenu::IsAvailable - return true if the menu is currently valid.
------------------------------------------------------------------------ */
bool_t WritersBlockMenu::IsAvailable(const void *pUnused)
{
        return fParentApp->ActiveWindow() && ! fParentApp->ActiveWindow()->IsModalDlog();

} /* WritersBlockMenu::IsAvailable */


/* xxxxxxxxxxxxxxxxxxxxxxxxxxxxxxxxxxxxxxxxxxxxxxxxxxxxxxxxxxxxxxxxxxxxxxx
 * $Log:        menu.cc,v $
Revision 1.5  93/06/01  16:17:19  stephen
Massive menu rearranging!

Revision 1.4  93/05/18  11:21:57  stephen
New Characters menu & commands.

Revision 1.3  93/04/19  18:57:41  stephen
Removed OptionsFont menu.

Revision 1.2  93/04/06  19:42:19  stephen
 [3First General Revisions

Revision 1.1  93/03/31  22:41:00  stephen
Initial revision

 */
```

```
/* -----------------------------------------------------------------------
	MENU.H
	Declaration of the Dramatica's custom menu classes
	Copyright (C) 1993 Screenplay Systems Inc.
	Revised:		$Id: menu.h,v 1.5 93/06/01 16:17:21 stephen Exp Locker: stephen $
----------------------------------------------------------------------- */

#pragma once

#ifndef __MENU__
#define __MENU__

#include "tmenu.h"
#include "consts.h"

#pragma segment menus


/* -----------------------------------------------------------------------
	StoryFormingMenu - Dramatica's "StoryForming" menu.
----------------------------------------------------------------------- */
class StoryFormingMenu : public TMenu {
public:
	// CONSTRUCTION/DESTRUCTION
	StoryFormingMenu(TAppl *pTAppl, short resID) : TMenu(pTAppl, resID) {
		#ifdef TOOLBOX
			::InsertMenu(fMenuRef, fParentApp->NumMenus());
		#endif
	}
	// PUBLIC UTILITIES
	virtual char*	ClassName(void) const	{ return "StoryFormingMenu"; }
	virtual class_t	ClassType(void) const	{ return kStoryFormingMenu; }
	virtual bool_t	IsOfType(const void *pType) const { return *(class_t*) pType == kStoryFormingMenu ||
TMenu::IsOfType(pType); }

	virtual bool_t	IsAvailable(const void *p = NULL);

}; /* StoryFormingMenu */


/* -----------------------------------------------------------------------
	CharMenu - Dramatica's "Characters" menu.
----------------------------------------------------------------------- */
class CharMenu : public TMenu {
public:
	// CONSTRUCTION/DESTRUCTION
	CharMenu(TAppl *pTAppl, short resID) : TMenu(pTAppl, resID) {
		#ifdef TOOLBOX
			::InsertMenu(fMenuRef, fParentApp->NumMenus());
		#endif
	}
	// PUBLIC UTILITIES
	virtual char*	ClassName(void) const	{ return "CharMenu"; }
	virtual class_t	ClassType(void) const	{ return kCharsMenu; }
	virtual bool_t	IsOfType(const void *pType) const { return *(class_t*) pType == kCharsMenu ||
TMenu::IsOfType(pType); }

	virtual bool_t	IsAvailable(const void *p = NULL);

}; /* CharMenu */


/* -----------------------------------------------------------------------
	StoryTellingMenu - Dramatica's "StoryTelling" menu.
----------------------------------------------------------------------- */
class StoryTellingMenu : public TMenu {
public:
	// CONSTRUCTION/DESTRUCTION
	StoryTellingMenu(TAppl *pTAppl, short resID) : TMenu(pTAppl, resID) {
		#ifdef TOOLBOX
			::InsertMenu(fMenuRef, fParentApp->NumMenus());
		#endif
	}
	// PUBLIC UTILITIES
	virtual char*	ClassName(void) const	{ return "StoryTellingMenu"; }
	virtual class_t	ClassType(void) const	{ return kStoryTellingMenu; }
	virtual bool_t	IsOfType(const void *pType) const { return *(class_t*) pType == kStoryTellingMenu ||
TMenu::IsOfType(pType); }

	virtual bool_t	IsAvailable(const void *p = NULL);

}; /* StoryTellingMenu */


/* -----------------------------------------------------------------------
	ReferenceMenu - Dramatica's "Reference" menu.
----------------------------------------------------------------------- */
class ReferenceMenu : public TMenu {
public:
	// CONSTRUCTION/DESTRUCTION
	ReferenceMenu(TAppl *pTAppl, short resID) : TMenu(pTAppl, resID) {
		#ifdef TOOLBOX
			::InsertMenu(fMenuRef, fParentApp->NumMenus());
		#endif
	}
	// PUBLIC UTILITIES
	virtual char*	ClassName(void) const	{ return "ReferenceMenu"; }
	virtual class_t	ClassType(void) const	{ return kReferenceMenu; }
	virtual bool_t	IsOfType(const void *pType) const { return *(class_t*) pType == kReferenceMenu ||
TMenu::IsOfType(pType); }

	virtual bool_t	IsAvailable(const void *p = NULL);

}; /* ReferenceMenu */


/* -----------------------------------------------------------------------
	WritersBlockMenu - Dramatica's "Writer's Block" menu.
```

```
------------------------------------------------------------------------------- */
class WritersBlockMenu : public TMenu {
public:
        // CONSTRUCTION/DESTRUCTION
        WritersBlockMenu(TAppl *pTAppl, short resID) : TMenu(pTAppl, resID) {
                #ifdef TOOLBOX
                        ::InsertMenu(fMenuRef, fParentApp->NumMenus());
                #endif
        }
        // PUBLIC UTILITIES
        virtual char*     ClassName(void) const       { return "WritersBlockMenu"; }
        virtual class_t   ClassType(void) const       { return kWritersBlockMenu; }
        virtual bool_t    IsOfType(const void *pType) const { return *(class_t*) pType == kWritersBlockMenu ||
TMenu::IsOfType(pType); }

        virtual bool_t    IsAvailable(const void *p = NULL);

}; /* WritersBlockMenu */


/* xxxxxxxxxxxxxxxxxxxxxxxxxxxxxxxxxxxxxxxxxxxxxxxxxxxxxxxxxxxxxxxxxxxxxxxxxxxxx
 * $Log:          menu.h,v $
 * Revision 1.5  93/06/01  16:17:21  stephen
 * Massive menu rearranging!
 *
 * Revision 1.4  93/05/18  11:22:03  stephen
 * New Characters menu & commands.
 *
 * Revision 1.3  93/04/19  18:57:51  stephen
 * Removed OptionsFont menu.
 *
 * Revision 1.2  93/04/06  19:42:23  stephen
 *  [3First General Revisions
 *
 * Revision 1.1  93/03/31  22:41:15  stephen
 * Initial revision
 *
 */

#endif /* __MENU__ */
```

```
/*********************************************************************
        MISCUTIL.CC
        Miscelaneous Utilities
        (c) 1993 Screenplay Systems
        Authors:            S. Greenfield & C. Huntley
        Created:            March 4, 1994
        Revised:            $Id$
*********************************************************************

*/

#include "miscutil.h"

#pragma segment miscutil



/* -------------------------------------------------Chris--05/21/93------
        CoolFrameRect
        Will frame the rectangle with a pattern (bevel, groove, etc.).  When
        width and/or height is greater than 1, the frame will move into the
        rectangle -- it will never extend outside of the rectangle.  Note: the
        groove pattern will use the width and heighth as the depth so that a
        value of 1 will actually be two pixels wide (one black and one white).
------------------------------------------------------------------------- */
void CoolFrameRect(TGraphEnv* pGraphEnv, GLRect *rect, const gl_pat_id *frameType, short width, const GLColor *hiliteClr,
const GLColor *shadowClr)
{
        assert(pGraphEnv);
        assert(pGraphEnv->IsInUse());
        short i;
        GLColor savedForeColor;

        pGraphEnv->GetForeColor(&savedForeColor);                                   // get and store the current
background color


        // TOP
        if (width>0) {
        // used to check for heighth -- may reimplement if needed
                if (*frameType == kGLBevelDownPat || *frameType == kGLGroovePat)
                        pGraphEnv->SetForeColor(*shadowClr);                                // set the
foreground color
                else
                        pGraphEnv->SetForeColor(*hiliteClr);                                // set the
foreground color

                for (i=0; i<width; ++i) {
                        pGraphEnv->MoveTo(rect->left+i, rect->top+i);
                        pGraphEnv->LineTo(rect->right-i, rect->top+i);
                }
                if (*frameType == kGLGroovePat) {
                        pGraphEnv->SetForeColor(*hiliteClr);                                        //
set the foreground color
                        for (i=0; i<width; ++i) {
                                pGraphEnv->MoveTo(rect->left+i+width, rect->top+i+width);
                                pGraphEnv->LineTo(rect->right-i-width, rect->top+i+width);
                        }
                }
        }

        // RIGHT
        if (width>0) {
                if (*frameType == kGLBevelUpPat)
                        pGraphEnv->SetForeColor(*shadowClr);                                        //
set the foreground color
                else
                        pGraphEnv->SetForeColor(*hiliteClr);                                        //
set the foreground color

                for (i=0; i<width; ++i) {
                        pGraphEnv->MoveTo(rect->right-i, rect->top+i);
                        pGraphEnv->LineTo(rect->right-i, rect->bottom-i);
                }
                if (*frameType == kGLGroovePat) {
                        pGraphEnv->SetForeColor(*shadowClr);                                        //
set the foreground color
                        for (i=0; i<width; ++i) {
                                pGraphEnv->MoveTo(rect->right-i-width, rect->top+i+width);
                                pGraphEnv->LineTo(rect->right-i-width, rect->bottom-i-width);
                        }
                }
        }

        // BOTTOM
        if (width>0) {
                if (*frameType == kGLBevelUpPat)
                        pGraphEnv->SetForeColor(*shadowClr);                                        //
set the foreground color
                else
                        pGraphEnv->SetForeColor(*hiliteClr);                                        //
set the foreground color

                for (i=0; i<width; ++i) {
                        pGraphEnv->MoveTo(rect->right-i, rect->bottom-i);
                        pGraphEnv->LineTo(rect->left+i, rect->bottom-i);
                }
                if (*frameType == kGLGroovePat) {
                        pGraphEnv->SetForeColor(*shadowClr);                                        //
set the foreground color
                        for (i=0; i<width; ++i) {
                                pGraphEnv->MoveTo(rect->right-i-width, rect->bottom-i-width);
                                pGraphEnv->LineTo(rect->left+i+width, rect->bottom-i-width);
                        }
                }
        }

        // LEFT
        if (width>0) {
                if (*frameType == kGLBevelDownPat || *frameType == kGLGroovePat)
```

```
                    pGraphEnv->SetForeColor(*shadowClr);                                          //
set the foreground color
              else
                    pGraphEnv->SetForeColor(*hiliteClr);                                          //
set the foreground color

              for (i=0; i<width; ++i) {
                    pGraphEnv->MoveTo(rect->left+i, rect->bottom-i);
                    pGraphEnv->LineTo(rect->left+i, rect->top+i);
              }
              if (*frameType == kGLGroovePat) {
                    pGraphEnv->SetForeColor(*hiliteClr);                                          //
set the foreground color
                    for (i=0; i<width; ++i) {
                          pGraphEnv->MoveTo(rect->left+i+width, rect->bottom-i-width);
                          pGraphEnv->LineTo(rect->left+i+width, rect->top+i+width);
                    }
              }
       }

       pGraphEnv->SetForeColor(savedForeColor);                           // get and store the current
background color

} /* CoolFrameRect */
```

```
/* -------------------------------------------------------------------------
        MISCUTIL.H
        Miscelaneous Utilities
        Copyright (C) 1994 Screenplay Systems Inc.
        Revised:        $Id$
------------------------------------------------------------------------- */

#pragma once

#include "tgraphen.h"
#include "graphics.h"

#pragma segment miscutil

#ifndef __MISCUTIL__
#define __MISCUTIL__

        void CoolFrameRect(TGraphEnv* graphEnv, GLRect *rect, const gl_pat_id *frameType, short width, const GLColor
*hiliteClr, const GLColor *shadowClr);


#endif /* __MISCUTIL__ */
```

```
/*********************************************************************
        NEWCHAR.CC
        Create a new character
        (c) 1993 Screenplay Systems
        Authors:        S. Greenfield & C. Huntley
        Created:        May 17, 1993
        Revised:        $Id$
*********************************************************************

*/

#include "genutls.h"

#include "grphitms.h"
#include "editview.h"

#include "dramatic.h"
#include "document.h"
#include "appdlogs.h"
#include "popup.h"
#include "drrez.h"
#include "castlist.h"
#include "semtable.h"
#include "newchar.h"

#pragma segment newchar

#define MAX_DESC_SIZE       5000    //      Maximum description size

/* -----------------------------------------------------------------------
                                NewCharDlog (Create character) DIALOG CLASS
----------------------------------------------------------------------- */
NewCharDlog::NewCharDlog(DRDoc* theDoc, short whichChar)
        : TDialog(rCreateCharDlog),
                fWhichChar (whichChar),
                        fWhichPict (0),
                        fCurrentPictIndex (0),
                        fDoc (theDoc)
{
        fApp            = (Dramatica*)AP_Data()->fApp;
        assert(theDoc);
        fParentDoc      = theDoc;
        fCharIsNew      = (whichChar == kAddNewChar);

        fDescStrHdl = MM_ALLOC_INIT(MAX_DESC_SIZE, mm_no_flags, 0, "Temp Description String", NULL);
        assert(fDescStrHdl);
        fDescStr        = (char*)MM_USE(fDescStrHdl);

} /* NewCharDlog::NewCharDlog */


/* --------------------------------------------------------Ken---06/08/92---
        NewCharDlog::init_dlog - initialize the question and answer text.
----------------------------------------------------------------------- */
void NewCharDlog::init_dlog(void)
{
        TDialog::init_dlog();

        PushBtn* cancelBtn          = (PushBtn*)GetItem(kCancelBtn);
        bool_t onState              = AP_ON;
        cancelBtn->Enable(&onState);
                // Make sure CANCEL is re-enabled

        fPictTrimBoxRect = ((TrimBox*)GetItem(kCrChPicTrimBox))->GetBounds();
        short subjectiveChar = kCHNeither;
        short   form = 1;
        short   sex = 0;
        short   archetype = 0;                                  // initialize

        EditView* charNameEditView = (EditView*)GetItem(kCrChNameText);
        char    charName[50];
        char    charRole[50];
        fDescStr[0] = charRole[0] = charName[0] = 0;

        if (fWhichChar != kAddNewChar) {
                PText*  theCharPT;
                char    windowTitle[60];

                CharInfoRec charInfo;
                theCharPT           = fDoc->GetCharPT(fWhichChar,  &charInfo);

                theCharPT->GetParam("NM", 'c', charName);

                theCharPT->GetParam("Role", 'c', charRole);

                theCharPT->GetParam("Des", 'c', fDescStr);

                strcpy(windowTitle, charName);
                strcat(windowTitle, "'s Character Info");
                SetTitle(windowTitle);

                subjectiveChar = (charInfo.subjective) ? charInfo.subjective + 1 : charInfo.subjective;

                form = charInfo.form;
                sex       = charInfo.sex;

                theCharPT->GetParam("Arch", 's', &archetype);

                fWhichPict = charInfo.charPixID;
                fCurrentPictIndex = fDoc->GetCharPictList()->BSearch(&fWhichPict);

                short semValTbl[16];
                short nmOfCharacteristics;
                short whichSet;
                char tmpStr[100];
                char *attribStr[4];

                attribStr[0] = "Motivation";
                attribStr[1] = "Methodology";
                attribStr[2] = "Evaluation";
```

```
                attribStr[3] = "Purpose";

                ((EditView*)GetItem(kCrChCharacteristics))->SetText(charName);

                PText* charPT = fDoc->GetCharPT(fWhichChar);
                sprintf(tmpStr,"'s Characteristics:\n", );
                ((EditView*)GetItem(kCrChCharacteristics))->CatText(tmpStr);
                for (whichSet=0; whichSet <=3; ++whichSet) {
                        nmOfCharacteristics = fDoc->GetCharacteristics(fWhichChar, whichSet, (short*)&semValTbl);
                        if (nmOfCharacteristics) {
                                sprintf(tmpStr,"• %s:\n", attribStr[whichSet]);
                                ((EditView*)GetItem(kCrChCharacteristics))->CatText(tmpStr);
                                short n;
                                for (n=0; n<nmOfCharacteristics; ++n) {
                                        sprintf(tmpStr,"        %s\n", SEMTBL_NAME(semValTbl[n]));
                                        ((EditView*)GetItem(kCrChCharacteristics))->CatText(tmpStr);
                                }
                        }
                }
        }
        else {
                SetTitle("Create a New Character");
                sprintf(charName, "Character #%d", fDoc->GetNmCharacters() + 1);
                charNameEditView->SetText(charName);
                ((EditView*)GetItem(kCrChCharacteristics))->SetText("");
        }

        //      Set these no matter what, so the fields become re-initialized with each new character

        charNameEditView->SetText(charName);
        ((EditView*)GetItem(kCrChRoleText))->SetText(charRole);
        ((EditView*)GetItem(kCrChDescription))->SetText(fDescStr);
        ((Popup*)GetItem(kCrChSubjCharPopup))->SetCntlVal(subjectiveChar, false);
        ((Popup*)GetItem(kCrChGenderPopup))->SetCntlVal(sex, false);
        ((Popup*)GetItem(kCrChPluralPopup))->SetCntlVal(form-1, false);
        ((Popup*)GetItem(kCrChObjArchetypePopup))->SetCntlVal(archetype, false);

        ls_index itemToGetFocus = kCrChNameText;
        SwitchFocus(&itemToGetFocus, NULL);                     // hightlighting name
        charNameEditView->SelectAll();

        fOrigSubjectiveType = subjectiveChar;           // Save in case we have to revert this choice

        //      Now add the character right now, so we get a legit index

        if (fWhichChar == kAddNewChar)
                fDoc->AddNewChar(charName, sex, form, fWhichPict, subjectiveChar, &fWhichChar);         // Just add
the character a get a valid ID

} /* NewCharDlog::init_dlog */


/* -----------------------------------------------Stephen---03/19/93---
        NewCharDlog::~NewCharDlog - Destructor.
------------------------------------------------------------------------ */
NewCharDlog::~NewCharDlog (void)
{
        char            charName[50];
        char            charRole[50];
        byte_cnt        textSize = sizeof(charName);
        byte_cnt        textSize2 = MAX_DESC_SIZE;
        byte_cnt        textSize3 = sizeof(charRole);
        short           subjectiveChar;
        char            idText[10];
        byte_cnt        idTextSize = 10;
        PText*          newCharPT = NULL;
        short           sex;
        short           resolve;
        short           form;
        short           archetype;
        short           foe;
        short           opponent;
        short           nmOfChars;

        subjectiveChar    = (short)((Popup*)GetItem(kCrChSubjCharPopup))->GetCntlVal();
        subjectiveChar = (subjectiveChar) ? subjectiveChar - 1 : subjectiveChar;

        if (fItemHit == kOkBtn) {

                sex                     = (short)((Popup*)GetItem(kCrChGenderPopup))->GetCntlVal();
                form                    = (short)((Popup*)GetItem(kCrChPluralPopup))->GetCntlVal() + 1;
                archetype               = (short)((Popup*)GetItem(kCrChObjArchetypePopup))->GetCntlVal();

                ((EditView*)GetItem(kCrChRoleText))->GetText(charRole, &textSize3);
                ((EditView*)GetItem(kCrChDescription))->GetText(fDescStr, &textSize2);
                ((EditView*)GetItem(kCrChNameText))->GetText(charName, &textSize);

                assert(fWhichChar != kAddNewChar);
//              if (fWhichChar != kAddNewChar) {                        // Add or modify a character?
                        CharInfoRec charInfo;
                        newCharPT = fDoc->GetCharPT(fWhichChar, &charInfo);
                        fDoc->SetMinCharInfo(&charInfo, charName, sex, form, fWhichPict, subjectiveChar);       //
Modify...
                        fDoc->SetCharInfoRec(fWhichChar, &charInfo);
//              }

                // Code below for Creating NEW character!

#if 0
//              nmOfChars = fDoc->GetNmCharacters();

                else

                        newCharPT = fDoc->AddNewChar(charName, sex, form, fWhichPict, subjectiveChar);          //
Just add the character a get a valid ID
#endif

                newCharPT->SetParam("Arch", 's', archetype);
                newCharPT->SetParam("Des", 'c', fDescStr);
                newCharPT->SetParam("Role", 'c', charRole);

                fDoc->SetFileSaveFlag();
```

```
                fDoc->SortCharList();
                fDoc->SetMainObstacleIDs();
                fDoc->UpdateCastViews();

        }
        else {
                //      User pressed CANCEL.  If the character is "new", then it MUST be deleted.

                if (fCharIsNew) {
                        assert (subjectiveChar == kCHNeither);
                        fDoc->DeleteChar(fWhichChar);
                }
        }

        MM_UNUSE(fDescStrHdl);
        MMFree(fDescStrHdl);

} /* NewCharDlog::~NewCharDlog */


/* -----------------------------------------------------Chris---05/30/93---
        NewCharDlog::draw_window
------------------------------------------------------------------------ */
void NewCharDlog::draw_window(GL_ENV_REF env)
{
        TWindow::draw_window(env);

#ifdef TOOLBOX
        outline_ok_btn(env);
#endif

        drawCharPict();

} /* NewCharDlog::draw_window */


/* -----------------------------------------------------Chris---05/30/93---
        NewCharDlog::drawCharPict
------------------------------------------------------------------------ */
void NewCharDlog::drawCharPict()
{
        fGraphEnv.Use();
        Bitmap* charPict = fDoc->UseCharPICT(fWhichPict);
        assert (charPict);

        //      THIS STUFF GOES INTO DOCUMENT CLASS

        gl_coord_t              stdCharPictHeight       = fDoc->GetStdCharPictHeight();
        gl_coord_t              stdCharPictWidth  = fDoc->GetStdCharPictWidth();

        GLRect                  destRect;
        destRect.top      = fPictTrimBoxRect.top + ((fPictTrimBoxRect.bottom - fPictTrimBoxRect.top) / 2) -
(stdCharPictHeight / 2);
        destRect.left     = fPictTrimBoxRect.left + ((fPictTrimBoxRect.right - fPictTrimBoxRect.left) / 2) -
(stdCharPictWidth / 2);
        destRect.bottom   = destRect.top + stdCharPictHeight;
        destRect.right    = destRect.left + stdCharPictWidth;

        //      CALCULATE PICTURE'S SOURCE RECT

        gl_coord_t      pictHeight      = charPict->GetHeight();
        gl_coord_t      pictWidth       = charPict->GetWidth();
        GLRect srcRect;
        GLSetRect(&srcRect, 0, 0, pictHeight, pictWidth);

        GLColor  savedBackColor;
        GLColor  savedForeColor;

        fGraphEnv.GetBackColor(&savedBackColor);                        // get and store the current background
color
        fGraphEnv.GetForeColor(&savedForeColor);                        // get and store the current background
color
        fGraphEnv.SetBackColor(kGLWhiteClr);                                    // set the bg color
        fGraphEnv.SetForeColor(kGLWhiteClr);                                    // set the foreground color
        fGraphEnv.PaintRect(destRect);                                                  // fill the picture
area with a color
        fGraphEnv.SetForeColor(savedForeColor);                                 // reset the bg to its original
color

        charPict->CopyToScreen(fWindowRef, &destRect, &srcRect);
        fDoc->UnuseCharPICT(charPict);

        fGraphEnv.SetBackColor(savedBackColor);                                 // reset the bg to its original
color
        fGraphEnv.Unuse();
} /* NewCharDlog::drawCharPict */


/* -------------------------------------------------------Ken---06/08/92---
        NewCharDlog::DoItemHit - react to a user action in the dialog.
------------------------------------------------------------------------ */
void NewCharDlog::DoItemHit(ls_index itemHit)
{
        if (itemHit != kOkBtn && itemHit != kCancelBtn) {
                switch (itemHit) {
                        case kCrChPrevPictButton:  prev_char_cmd();
                                                                        break;
                        case kCrChNextPictButton:  next_char_cmd();
                                                                        break;
                        case kCrChSubjCharPopup:   test_duplicate_subj_chars();
                                                                        break;
                }
        }
} /* NewCharDlog::DoItemHit */


/* ------------------------------------------------------------------------
        NewCharDlog::test_duplicate_subj_chars - keeps user from randomly
        setting another main/obstacle.
------------------------------------------------------------------------ */
void NewCharDlog::test_duplicate_subj_chars(void)
{
```

```
        short subjectiveCharMenu = (short)((Popup*)GetItem(kCrChSubjCharPopup))->GetCntlVal();
        short subjectiveChar = (subjectiveCharMenu) ? subjectiveCharMenu - 1 : subjectiveCharMenu;
        CharInfoRec MCInfo;
        CharInfoRec OCInfo;
        CharInfoRec thisCharInfo;
        char tempStr [200];
        char charName[40];

        byte_cnt textSize = 40;
        ((EditView*)GetItem(kCrChNameText))->GetText(charName, &textSize);

        ls_index mainCharID = fDoc->GetMainCharID();
        fDoc->GetCharInfoRec(mainCharID, &MCInfo);

        ls_index obstacleCharID = fDoc->GetObstacleCharID();
        fDoc->GetCharInfoRec(obstacleCharID, &OCInfo);

//      fDoc->GetCharInfoRec(fWhichChar, &thisCharInfo);

        PushBtn* cancelBtn          = (PushBtn*)GetItem(kCancelBtn);
        bool_t offState             = AP_OFF;

        if (subjectiveChar == kCHMain) {
                if ((mainCharID != fNoCharDefined) && (mainCharID != fWhichChar)) {
                        sprintf(tempStr, "'%s' is currently the MAIN CHARACTER.  Make '%s' your new Main character",
MCInfo.name, charName);
                        ls_index whichBtn = AP_YesNoAlert(0, 0, tempStr, kOkBtn, AP_FORCEABLY);
                        if (whichBtn != kOkBtn) {
                                ((Popup*)GetItem(kCrChSubjCharPopup))->SetCntlVal(fOrigSubjectiveType, false);
                        }
                        else {
                                //      First, change "original" Main Character:

                                MCInfo.subjective = (fOrigSubjectiveType) ? fOrigSubjectiveType -1 :
fOrigSubjectiveType;
                                // Exchange this character's subjective type with the current main char
                                if (MCInfo.subjective == kCHObstacle)                   // If the current char
WAS Obstacle, then the original Main is now Obstacle...
                                        fDoc->SetObstacleCharID(mainCharID);            // So now set old main
to be new Obstacle

                                fDoc->SetCharInfoRec(mainCharID, &MCInfo);
                                fOrigSubjectiveType = subjectiveCharMenu;

                                // Now, make this character the new Main Character

                                fDoc->SetMainCharID(fWhichChar);                        // this char becomes
MAIN CHARACTER!
                                cancelBtn->Enable(&offState);
                                                                                        // CANCEL button MUST
be disabled in this case (because changes have been made outside this character)
                        }
                }
        }
        else if (subjectiveChar == kCHObstacle) {
                if ((obstacleCharID != fNoCharDefined) && (obstacleCharID != fWhichChar)) {
                        sprintf(tempStr, "'%s' is currently the OBSTACLE CHARACTER.  Make '%s' your new Obstacle
character", OCInfo.name, charName);
                        ls_index whichBtn = AP_YesNoAlert(0, 0, tempStr, kOkBtn, AP_FORCEABLY);
                        if (whichBtn != kOkBtn) {
                                ((Popup*)GetItem(kCrChSubjCharPopup))->SetCntlVal(fOrigSubjectiveType, false);
                        }
                        else {
                                //      First, change "original" Obstacle Character:

                                OCInfo.subjective = (fOrigSubjectiveType) ? fOrigSubjectiveType -1 :
fOrigSubjectiveType;
                                // Exchange this character's subjective type with the current obstacle char
                                if (MCInfo.subjective == kCHMain)                                 // If the
current char WAS Main, then the original Obstacle is now Main...
                                        fDoc->SetMainCharID(obstacleCharID);                      // So now set
old Obstacle to be new Main

                                // Now, make this character the new Obstacle Character

                                fDoc->SetCharInfoRec(obstacleCharID, &OCInfo);
                                fOrigSubjectiveType = subjectiveCharMenu;
                                fDoc->SetObstacleCharID(fWhichChar);
                                cancelBtn->Enable(&offState);
                                                                                        // CANCEL button MUST
be disabled in this case (because changes have been made outside this character)
                        }
                }
        }
        else if ((subjectiveChar == kCHNeither) && (fOrigSubjectiveType != kCHNeither)) {
                char* typeStr = (fOrigSubjectiveType-1 == kCHMain) ? "Main" : "Obstacle";
                char tempStr[150];
                sprintf(tempStr,"You must have a %s character.  To remove this character's '%s' status, make another
character '%s' first.", typeStr, typeStr, typeStr);
                AP_UserMessage(tempStr);
                ((Popup*)GetItem(kCrChSubjCharPopup))->SetCntlVal(fOrigSubjectiveType, false);
        }

} /* NewCharDlog::test_duplicate_subj_chars */


/* ------------------------------------------------------------------------
        NewCharDlog::prev_char_cmd - Switch to previous character icon.
--------------------------------------------------------------------------- */
void NewCharDlog::prev_char_cmd(void)
{
        if (--fCurrentPictIndex < 0)
                fCurrentPictIndex = fDoc->GetNmCharPicts() - 1;

        fWhichPict = fDoc->GetCharPictList()->Elem(fCurrentPictIndex);

        drawCharPict();
} /* NewCharDlog::prev_char_cmd */

/* ----------------------------------------------------Steve---05/31/93---
        NewCharDlog::next_char_cmd - Switch to previous character icon.
--------------------------------------------------------------------------- */
void NewCharDlog::next_char_cmd(void)
{
```

```
	if (++fCurrentPictIndex >= fDoc->GetNmCharPicts())
		fCurrentPictIndex = 0;

	fWhichPict = fDoc->GetCharPictList()->Elem(fCurrentPictIndex);

	drawCharPict();
} /* NewCharDlog::next_char_cmd */

/* ---------------------------------------------------------------------
									NewCharCmd COMMAND CLASS
------------------------------------------------------------------------- */

/* ---------------------------------------------------------------------
	NewCharCmd::IsValid -
------------------------------------------------------------------------- */
bool_t NewCharCmd::IsValid(TAppl *pApp)
{
	ls_index		activeDoc		= pApp->ActiveDoc();
	if (activeDoc != kLsNoElem) {
		DRDoc*	theDoc = ((DRDoc*)pApp->GetDoc(activeDoc));
		return (theDoc == NULL) ? false : true;
	}
	return (false);

} /* NewCharCmd::IsValid */

/* ---------------------------------------------------------------------
	NewCharCmd::InfoIsValid - determines if info command is valid
------------------------------------------------------------------------- */
bool_t NewCharCmd::InfoIsValid(TAppl *pApp)
{
	TWindow* theWindow = pApp->ActiveWindow();
	if (theWindow->IsOfType(&kCLWindow) || theWindow->IsOfType(&kBCWindow)) {
		ls_index activeDoc		= pApp->ActiveDoc();
		if (activeDoc != kLsNoElem) {
			DRDoc* theDoc = ((DRDoc*)pApp->GetDoc(activeDoc));
			if (theDoc) {
				CastListView* CLView = (theWindow->IsOfType(&kCLWindow)) ? theDoc->GetCastListView()
: theDoc->GetBCCastListView();
				if (CLView && CLView->SelectionExists())
					return true;
			}
		}
	}
	return false;
} /* NewCharCmd::InfoIsValid */

/* ---------------------------------------------------------------------
	Query::do_cmd -
------------------------------------------------------------------------- */
err_t NewCharCmd::do_cmd(void)
{
	TAppl*		pApp		= (Dramatica*)AP_Data()->fApp;
	ls_index		activeDoc		= pApp->ActiveDoc();
	assert(activeDoc != kLsNoElem);
	DRDoc*	theDoc = ((DRDoc*)pApp->GetDoc(activeDoc));
	assert(theDoc != NULL);

	(new NewCharDlog(theDoc, kAddNewChar))->ModalLoop();

	return NOERR;

} /* NewCharCmd::do_cmd */

#pragma segment main


/* $Log:		newchar.cc,v $
Revision 1.11  93/09/24  15:31:09  stephen
Cleaned up warnings.

Revision 1.10  93/08/02  15:58:28  chris
Added description field.

Revision 1.9  93/06/05  01:16:50  chris
Added characteristics in the newchar editview.

Revision 1.8  93/06/04  19:56:07  stephen
Worked on auto-update of views.

Revision 1.7  93/06/02  16:08:00  chris
Hooked up all of the fields and popups in new character.

Revision 1.6  93/05/31  18:21:24  stephen
Made arrow keys work to select icon of character...

Revision 1.5  93/05/30  21:59:14  chris
Added icon in the new character window.

Revision 1.4  93/05/24  21:37:09  stephen
Made IsValid respect current document.

Revision 1.3  93/05/20  17:20:38  stephen
Allowed NewCharDlog to bring up existing characters.

Revision 1.2  93/05/18  20:46:37  stephen
Made add new char actually work for characters other than main & obs.

Revision 1.1  93/05/18  11:22:05  stephen
Initial revision

 */
```

```
/* -------------------------------------------------------------------------
        NEWCHAR.H
        Create a new character
        Copyright (C) 1993 Screenplay Systems Inc.
        Revised:        $Id$
------------------------------------------------------------------------- */

#pragma once

#ifndef __NEWCHAR__
#define __NEWCHAR__

#include "tappl.h"
#include "tdialog.h"
#include "appcmds.h"

#include "ptext.h"

#pragma segment newchar

/* -------------------------------------------------------------------------
        DITL Constants - QueryDlog
------------------------------------------------------------------------- */
const ls_index  kCrChNameText                   = 3;
const ls_index  kCrChRoleText                   = 4;
const ls_index  kCrChGenderPopup                = 6;
const ls_index  kCrChPluralPopup                = 7;
const ls_index  kCrChObjArchetypePopup          = 8;
const ls_index  kCrChDescription                = 10;
const ls_index  kCrChCharacteristics            = 12;
const ls_index  kCrChPicTrimBox                 = 13;
const ls_index  kCrChPrevPictButton             = 14;
const ls_index  kCrChNextPictButton             = 15;
const ls_index  kCrChSubjCharPopup              = 16;   // Special attribute: "Subjective character"

const short             kAddNewChar             = -1;

/* -------------------------------------------------------------------------
        NewCharDlog - add a new character to our story.
------------------------------------------------------------------------- */
class EXPORT_CLASS NewCharDlog : public TDialog {
public:
        NewCharDlog(DRDoc* theDoc, short whichChar);
        ~NewCharDlog(void);

        // PUBLIC UTILITIES
        virtual char*      ClassName(void) const      { return "NewCharDlog"; }
        virtual class_t    ClassType(void) const      { return kCharDlog; }
        virtual bool_t     IsOfType(const void *pType) const { return *(class_t*) pType == kCharDlog ||
TDialog::IsOfType(pType); }

        virtual void       DoItemHit(ls_index itemHit);

protected:
        // DATA MEMBERS
        Dramatica*         fApp;
        DRDoc*             fDoc;

        bool_t             fCharIsNew;                  // True if this is a newly-added character
        hdl_t              fDescStrHdl;                 // Description string handle
        char*              fDescStr;                    // Description text

        short              fWhichChar;
        short              fWhichPict;
        ls_index           fCurrentPictIndex;

        short              fOrigSubjectiveType;

        GLRect             fPictTrimBoxRect;

        // LOCAL UTILITIES
        void                       test_duplicate_subj_chars(void);
        void                       prev_char_cmd(void);
        void                       next_char_cmd(void);
        virtual void       init_dlog(void);
        virtual void       draw_window(GL_ENV_REF env);
        void                       drawCharPict();

}; /* NewCharDlog */


/* -------------------------------------------------------------------------
        NewCharCmd - Invokes the Create character dialog.
------------------------------------------------------------------------- */
class NewCharCmd : public TCommand {
public:
        NewCharCmd(TAppl* pTAppl) : TCommand(pTAppl) {}

        virtual char*      ClassName(void)   const     { return "Create"; }
        virtual class_t    ClassType(void) const       { return kCreateCharCmd; }
        virtual bool_t     IsOfType(const void *pType) const { return *(class_t*) pType == kCreateCharCmd ||
TCommand::IsOfType(pType); }
        virtual TObject* Duplicate(void) const         { return new NewCharCmd(*this); }

        static bool_t      IsValid(TAppl *pTAppl);
        static bool_t      InfoIsValid(TAppl *pApp);

protected:
        virtual err_t      do_cmd(void);

}; /* NewCharCmd */

#pragma segment main

#endif /* __NEWCHAR__ */


/* $Log:          newchar.h,v $
 * Revision 1.7  93/08/02  15:58:38  chris
```

```
* Added description field.
*
* Revision 1.6  93/06/05  01:17:13  chris
* Added characteristics in the newchar editview.
*
* Revision 1.5  93/05/31  18:21:49  stephen
* Made arrow keys work to select icon of character...
*
* Revision 1.4  93/05/30  21:59:28  chris
* Added icon in the new character window.
*
* Revision 1.3  93/05/30  16:26:56  chris
* Added next and previous buttons under character icon.
*
* Revision 1.2  93/05/20  17:21:31  stephen
* Allowed NewCharDlog to bring up existing characters.
*
* Revision 1.1  93/05/18  11:22:17  stephen
* Initial revision
*
*/
```

```
/* -----------------------------------------------------------------------
	NOUNS.R
	Dramatica's Verb Text for Replacement Text
	Copyright (C) 1993 Screenplay Systems Inc.
	$Id: nouns.r,v 1.7 93/06/02 21:46:19 chris Exp Locker: stephen $
----------------------------------------------------------------------- */

#ifdef macintosh
	#include "systypes.r"
	#include "types.r"
#else
	#include <systypes.r>
	#include <types.r>
#endif

/* -----------------------------------------------------------------------
	'SNNS' - Semantic nouns.
----------------------------------------------------------------------- */
type 'SNNS' {
	cstring;			/* linking verb text */
};

resource 'SNNS' (1, PFM_MIN_PRIO) {						/* Universe
*/
	"situation"
};

resource 'SNNS' (2, PFM_MIN_PRIO) {						/* Physics */
	"activity"
};

resource 'SNNS' (3, PFM_MIN_PRIO) {						/* Psychology
*/
	"manner of thinking"
};

resource 'SNNS' (4, PFM_MIN_PRIO) {						/* Mind */
	"fixed attitude"
};

resource 'SNNS' (5, PFM_MIN_PRIO) {						/* Past */
	"past"
};

resource 'SNNS' (6, PFM_MIN_PRIO) {						/* Progress
*/
	"progress"
};

resource 'SNNS' (7, PFM_MIN_PRIO) {						/* Future */
	"future"
};

resource 'SNNS' (8, PFM_MIN_PRIO) {						/* Present */
	"present"
};

resource 'SNNS' (9, PFM_MIN_PRIO) {						/*
Understanding */
	"understanding"
};

resource 'SNNS' (10, PFM_MIN_PRIO) {					/* Doing */
	"activity"
};

resource 'SNNS' (11, PFM_MIN_PRIO) {					/* Obtaining */
	"possession"
};

resource 'SNNS' (12, PFM_MIN_PRIO) {					/* Learning */
	"learning"
};


resource 'SNNS' (13, PFM_MIN_PRIO) {						/*
Conceptualizing */
	"concept"
};

resource 'SNNS' (14, PFM_MIN_PRIO) {						/* Being */
	"being"
};

resource 'SNNS' (15, PFM_MIN_PRIO) {						/* Becoming
*/
	"transformation"
};

resource 'SNNS' (16, PFM_MIN_PRIO) {						/* Conceiving
*/
	"idea"
};

resource 'SNNS' (17, PFM_MIN_PRIO) {						/* Memory */
	"memory"
};

resource 'SNNS' (18, PFM_MIN_PRIO) {						/*
Preconscious */
	"response"
};

resource 'SNNS' (19, PFM_MIN_PRIO) {						/*
Subconscious */
	"drive"
};

resource 'SNNS' (20, PFM_MIN_PRIO) {						/* Conscience
*/
	"deliberation"
```

```
};

resource 'SNNS' (21, PFM_MIN_PRIO) {                                    /* Fate */
        "fate"
};

resource 'SNNS' (22, PFM_MIN_PRIO) {                                    /* Prediction
*/
        "prediction"
};

resource 'SNNS' (23, PFM_MIN_PRIO) {                                    /*
Interdiction */
        "interdiction"
};

resource 'SNNS' (24, PFM_MIN_PRIO) {                                    /* Destiny */
        "destiny"
};

resource 'SNNS' (25, PFM_MIN_PRIO) {                                    /* Fact */
        "fact"
};

resource 'SNNS' (26, PFM_MIN_PRIO) {                                    /* Security
*/
        "security"
};

resource 'SNNS' (27, PFM_MIN_PRIO) {                                    /* Threat */
        "threat"
};

resource 'SNNS' (28, PFM_MIN_PRIO) {                                    /* Fantasy */
        "fantasy"
};

resource 'SNNS' (29, PFM_MIN_PRIO) {                                    /* Openness
*/
        "openness"
};

resource 'SNNS' (30, PFM_MIN_PRIO) {                                    /* Delay */
        "delay"
};

resource 'SNNS' (31, PFM_MIN_PRIO) {                                    /* Choice */
        "choice"
};

resource 'SNNS' (32, PFM_MIN_PRIO) {                                    /*
Preconception */
        "preconception"
};

resource 'SNNS' (33, PFM_MIN_PRIO) {                                    /* Work */
        "work"
};

resource 'SNNS' (34, PFM_MIN_PRIO) {                                    /* Attract --
was Do */
        "attraction"
};

resource 'SNNS' (35, PFM_MIN_PRIO) {                                    /* Repel --
was Don't */
        "repulsion"
};

resource 'SNNS' (36, PFM_MIN_PRIO) {                                    /* Try */
        "attempt"
};

resource 'SNNS' (37, PFM_MIN_PRIO) {                                    /* Instinct
*/
        "instinct"
};

resource 'SNNS' (38, PFM_MIN_PRIO) {                                    /* Senses */
        "sense"
};

resource 'SNNS' (39, PFM_MIN_PRIO) {                                    /*
Interpretation */
        "interpretation"
};

resource 'SNNS' (40, PFM_MIN_PRIO) {                                    /*
Conditioning */
        "conditioning"
};

resource 'SNNS' (41, PFM_MIN_PRIO) {                                    /* Wisdom */
        "wisdom"
};

resource 'SNNS' (42, PFM_MIN_PRIO) {                                    /* Skill */
        "skill"
};

resource 'SNNS' (43, PFM_MIN_PRIO) {                                    /* Experience
*/
        "experience"
};

resource 'SNNS' (44, PFM_MIN_PRIO) {                                    /*
Enlightenment */
        "enlightenment"
```

```
};

resource 'SNNS' (45, PFM_MIN_PRIO) {                          /* Approach
*/
        "approach"
};

resource 'SNNS' (46, PFM_MIN_PRIO) {                          /* Self-
Interest */
        "self interest"
};

resource 'SNNS' (47, PFM_MIN_PRIO) {                          /* Morality
*/
        "morality"
};

resource 'SNNS' (48, PFM_MIN_PRIO) {                          /* Attitude
*/
        "attitude"
};

resource 'SNNS' (49, PFM_MIN_PRIO) {                          /*
Prerequisites */
        "prerequisite"
};

resource 'SNNS' (50, PFM_MIN_PRIO) {                          /* Strategy
*/
        "strategy"
};

resource 'SNNS' (51, PFM_MIN_PRIO) {                          /* Analysis
*/
        "analysis"
};

resource 'SNNS' (52, PFM_MIN_PRIO) {                          /*
Preconditions */
        "precondition"
};

resource 'SNNS' (53, PFM_MIN_PRIO) {                          /* State-of-
Being */
        "state of being"
};

resource 'SNNS' (54, PFM_MIN_PRIO) {                          /* Situation
*/
        "situation"
};

resource 'SNNS' (55, PFM_MIN_PRIO) {                          /*
Circumstances */
        "circumstance"
};

resource 'SNNS' (56, PFM_MIN_PRIO) {                          /* Sense-of-
Self */
        "sense of self"
};

resource 'SNNS' (57, PFM_MIN_PRIO) {                          /* Knowledge
*/
        "knowledge"
};

resource 'SNNS' (58, PFM_MIN_PRIO) {                          /* Ability */
        "ability"
};

resource 'SNNS' (59, PFM_MIN_PRIO) {                          /* Desire */
        "desire"
};

resource 'SNNS' (60, PFM_MIN_PRIO) {                          /* Thought */
        "thought"
};

resource 'SNNS' (61, PFM_MIN_PRIO) {                          /*
Rationalization */
        "rationalization"
};

resource 'SNNS' (62, PFM_MIN_PRIO) {                          /* Commitment
*/
        "commitment"
};

resource 'SNNS' (63, PFM_MIN_PRIO) {                          /*
Responsibility */
        "responsibility"
};

resource 'SNNS' (64, PFM_MIN_PRIO) {                          /* Obligation
*/
        "obligation"
};

resource 'SNNS' (65, PFM_MIN_PRIO) {                          /* permission
*/
        "permission"
};
```

```
resource 'SNNS' (66, PFM_MIN_PRIO) {                                  /* Need */
        "need"
};
resource 'SNNS' (67, PFM_MIN_PRIO) {                                  /* expediency
*/
        "expediency"
};
resource 'SNNS' (68, PFM_MIN_PRIO) {                                  /* deficiency
*/
        "deficiency"
};
resource 'SNNS' (69, PFM_MIN_PRIO) {                                  /* Truth */
        "truth"
};
resource 'SNNS' (70, PFM_MIN_PRIO) {                                  /* Evidence
*/
        "evidence"
};
resource 'SNNS' (71, PFM_MIN_PRIO) {                                  /* Suspicion
*/
        "suspicion"
};
resource 'SNNS' (72, PFM_MIN_PRIO) {                                  /* Falsehood
*/
        "falsehood"
};
resource 'SNNS' (73, PFM_MIN_PRIO) {                                  /* Value */
        "value"
};
resource 'SNNS' (74, PFM_MIN_PRIO) {                                  /* Confidence
*/
        "confidence"
};
resource 'SNNS' (75, PFM_MIN_PRIO) {                                  /* Worry */
        "worry"
};
resource 'SNNS' (76, PFM_MIN_PRIO) {                                  /* Worth */
        "worth"
};
resource 'SNNS' (77, PFM_MIN_PRIO) {                                  /* Closure */
        "closure"
};
resource 'SNNS' (78, PFM_MIN_PRIO) {                                  /* Hope */
        "hope"
};
resource 'SNNS' (79, PFM_MIN_PRIO) {                                  /* Dream */
        "dream"
};
resource 'SNNS' (80, PFM_MIN_PRIO) {                                  /* Denial */
        "denial"
};
resource 'SNNS' (81, PFM_MIN_PRIO) {                                  /*
Investigation */
        "investigation"
};
resource 'SNNS' (82, PFM_MIN_PRIO) {                                  /* Appraisal
*/
        "appraisal"
};
resource 'SNNS' (83, PFM_MIN_PRIO) {                                  /*
Reappraisal */
        "reappraisal"
};
resource 'SNNS' (84, PFM_MIN_PRIO) {                                  /* Doubt */
        "doubt"
};


resource 'SNNS' (85, PFM_MIN_PRIO) {                                  /* Ability */
        "ability"
};
resource 'SNNS' (86, PFM_MIN_PRIO) {                                  /* Acceptance
*/
        "acceptance"
};
resource 'SNNS' (87, PFM_MIN_PRIO) {                                  /* Accurate
*/
        "accuracy"
};
resource 'SNNS' (88, PFM_MIN_PRIO) {                                  /* Actuality
*/
        "actuality"
};
resource 'SNNS' (89, PFM_MIN_PRIO) {                                  /* Avoid */
        "avoidance"
```

```
};
resource 'SNNS' (90, PFM_MIN_PRIO) {                    /* Aware */
        "awareness"
};
resource 'SNNS' (91, PFM_MIN_PRIO) {                    /* Cause */
        "cause"
};
resource 'SNNS' (92, PFM_MIN_PRIO) {                    /* Certainty
*/
        "certainty"
};
resource 'SNNS' (93, PFM_MIN_PRIO) {                    /* Change */
        "change"
};
resource 'SNNS' (94, PFM_MIN_PRIO) {                    /* Chaos */
        "chaos"
};
resource 'SNNS' (95, PFM_MIN_PRIO) {                    /* Conscience
*/
        "conscience"
};
resource 'SNNS' (96, PFM_MIN_PRIO) {                    /*
Consideration */
        "consideration"
};
resource 'SNNS' (97, PFM_MIN_PRIO) {                    /* controlled
-- was Calm */
        "control"
};
resource 'SNNS' (98, PFM_MIN_PRIO) {                    /* Deduction
*/
        "deduction"
};
resource 'SNNS' (99, PFM_MIN_PRIO) {                    /* Desire */
        "desire"
};
resource 'SNNS' (100, PFM_MIN_PRIO) {           /* Determination */
        "determination"
};
resource 'SNNS' (101, PFM_MIN_PRIO) {           /* Disbelief */
        "disbelief"
};
resource 'SNNS' (102, PFM_MIN_PRIO) {           /* Effect */
        "effect"
};
resource 'SNNS' (103, PFM_MIN_PRIO) {           /* Ending */
        "ending"
};
resource 'SNNS' (104, PFM_MIN_PRIO) {           /* Equity */
        "equity"
};
resource 'SNNS' (105, PFM_MIN_PRIO) {           /* Evaluation */
        "evaluation"
};
resource 'SNNS' (106, PFM_MIN_PRIO) {           /* Expectation */
        "expectation"
};
resource 'SNNS' (107, PFM_MIN_PRIO) {           /* Faith */
        "faith"
};
resource 'SNNS' (108, PFM_MIN_PRIO) {           /* Feeling */
        "feeling"
};
resource 'SNNS' (109, PFM_MIN_PRIO) {           /* Help */
        "help"
};
resource 'SNNS' (110, PFM_MIN_PRIO) {           /* Hinder */
        "hinderance"
};
resource 'SNNS' (111, PFM_MIN_PRIO) {           /* Hunch */
        "hunch"
};
resource 'SNNS' (112, PFM_MIN_PRIO) {           /* Inaction */
        "inaction"
};
resource 'SNNS' (113, PFM_MIN_PRIO) {           /* Induction */
        "induction"
};
resource 'SNNS' (114, PFM_MIN_PRIO) {           /* Inequity */
        "inequity"
};
resource 'SNNS' (115, PFM_MIN_PRIO) {           /* Inertia */
        "inertia"
};
resource 'SNNS' (116, PFM_MIN_PRIO) {           /* Knowledge */
        "knowledge"
```

```
};
resource 'SNNS' (117, PFM_MIN_PRIO) {                          /* Logic */
        "logic"
};
resource 'SNNS' (118, PFM_MIN_PRIO) {                          /* Non-acceptance */
        "non-acceptance"
};
resource 'SNNS' (119, PFM_MIN_PRIO) {                          /* Non-Accurate */
        "non-accuracy"
};
resource 'SNNS' (120, PFM_MIN_PRIO) {                          /* Oppose */
        "opposition"
};
resource 'SNNS' (121, PFM_MIN_PRIO) {                          /* Order */
        "order"
};
resource 'SNNS' (122, PFM_MIN_PRIO) {                          /* Perception */
        "perception"
};
resource 'SNNS' (123, PFM_MIN_PRIO) {                          /* Possibility */
        "possibility"
};
resource 'SNNS' (124, PFM_MIN_PRIO) {                          /* Potentiality */
        "potentiality"
};
resource 'SNNS' (125, PFM_MIN_PRIO) {                          /* Proaction */
        "proaction"
};
resource 'SNNS' (126, PFM_MIN_PRIO) {                          /* Probability */
        "probability"
};
resource 'SNNS' (127, PFM_MIN_PRIO) {                          /* Process */
        "process"
};
resource 'SNNS' (128, PFM_MIN_PRIO) {                          /* Production */
        "production"
};
resource 'SNNS' (129, PFM_MIN_PRIO) {                          /* Projection */
        "projection"
};
resource 'SNNS' (130, PFM_MIN_PRIO) {                          /* Protection */
        "protection"
};
resource 'SNNS' (131, PFM_MIN_PRIO) {                          /* Proven */
        "proof"
};
resource 'SNNS' (132, PFM_MIN_PRIO) {                          /* Pursuit */
        "pursuit"
};
resource 'SNNS' (133, PFM_MIN_PRIO) {                          /* Re-evaluation */
        "re-evaluation"
};
resource 'SNNS' (134, PFM_MIN_PRIO) {                          /* Reaction */
        "reaction"
};
resource 'SNNS' (135, PFM_MIN_PRIO) {                          /* Reconsideration */
        "reconsideration"
};
resource 'SNNS' (136, PFM_MIN_PRIO) {                          /* Reduction */
        "reduction"
};
resource 'SNNS' (137, PFM_MIN_PRIO) {                          /* Result */
        "result"
};
resource 'SNNS' (138, PFM_MIN_PRIO) {                          /* Self-Aware */
        "self-awareness"
};
resource 'SNNS' (139, PFM_MIN_PRIO) {                          /* Speculation */
        "speculation"
};
resource 'SNNS' (140, PFM_MIN_PRIO) {                          /* Support */
        "support"
};
resource 'SNNS' (141, PFM_MIN_PRIO) {                          /* Temptation */
        "temptation"
};
resource 'SNNS' (142, PFM_MIN_PRIO) {                          /* Test */
        "test"
};
resource 'SNNS' (143, PFM_MIN_PRIO) {                          /* Theory */
        "theory"
};
resource 'SNNS' (144, PFM_MIN_PRIO) {                          /* Thought */
        "thought"
};
```

```
resource 'SNNS' (145, PFM_MIN_PRIO) {                                          /* Trust */
        "trust"
};

resource 'SNNS' (146, PFM_MIN_PRIO) {                                          /* Un-Ending */
        "continuance"
};

resource 'SNNS' (147, PFM_MIN_PRIO) {                                          /* Uncontrolled */
        "frenzy"
};

resource 'SNNS' (148, PFM_MIN_PRIO) {                                          /* Unproven */
        "disproof "
};


/*****************************************************************************************************/


/* -------------------------------------------------------------------------
        'SNPL' - Semantic nouns Plural.
---------------------------------------------------------------------------- */
type 'SNPL' {
        cstring;                    /* linking verb text */
};

resource 'SNPL' (1, PFM_MIN_PRIO) {                                                 /* Universe
*/
        "situations"
};

resource 'SNPL' (2, PFM_MIN_PRIO) {                                                 /* Physics */
        "activities"
};

resource 'SNPL' (3, PFM_MIN_PRIO) {                                                 /* Psychology
*/
        "manners of thinking"
};

resource 'SNPL' (4, PFM_MIN_PRIO) {                                                 /* Mind */
        "fixed attitudes"
};

resource 'SNPL' (5, PFM_MIN_PRIO) {                                                 /* Past */
        "pasts"
};

resource 'SNPL' (6, PFM_MIN_PRIO) {                                                 /* Progress
*/
        "progresses"
};

resource 'SNPL' (7, PFM_MIN_PRIO) {                                                 /* Future */
        "futures"
};

resource 'SNPL' (8, PFM_MIN_PRIO) {                                                 /* Present */
        "presents"
};

resource 'SNPL' (9, PFM_MIN_PRIO) {                                                 /*
Understanding */
        "understandings"
};

resource 'SNPL' (10, PFM_MIN_PRIO) {                                           /* Doing */
        "activities"
};

resource 'SNPL' (11, PFM_MIN_PRIO) {                                           /* Obtaining */
        "possessions"
};

resource 'SNPL' (12, PFM_MIN_PRIO) {                                           /* Learning */
        "learnings"
};


resource 'SNPL' (13, PFM_MIN_PRIO) {                                                /*
Conceptualizing */
        "concepts"
};

resource 'SNPL' (14, PFM_MIN_PRIO) {                                                /* Being */
        "beings"
};

resource 'SNPL' (15, PFM_MIN_PRIO) {                                                /* Becoming
*/
        "transformations"
};

resource 'SNPL' (16, PFM_MIN_PRIO) {                                                /* Conceiving
*/
        "ideas"
};

resource 'SNPL' (17, PFM_MIN_PRIO) {                                                /* Memory */
        "memories"
};

resource 'SNPL' (18, PFM_MIN_PRIO) {                                                /*
Preconscious */
        "responses"
};
```

```
resource 'SNPL' (19, PFM_MIN_PRIO) {                                          /*
Subconscious */
        "drives"
};

resource 'SNPL' (20, PFM_MIN_PRIO) {                                          /* Conscience
*/
        "deliberations"
};



resource 'SNPL' (21, PFM_MIN_PRIO) {                                          /* Fate */
        "fates"
};

resource 'SNPL' (22, PFM_MIN_PRIO) {                                          /* Prediction
*/
        "predictions"
};

resource 'SNPL' (23, PFM_MIN_PRIO) {                                          /*
Interdiction */
        "interdictions"
};

resource 'SNPL' (24, PFM_MIN_PRIO) {                                          /* Destiny */
        "destinies"
};

resource 'SNPL' (25, PFM_MIN_PRIO) {                                          /* Fact */
        "facts"
};

resource 'SNPL' (26, PFM_MIN_PRIO) {                                          /* Security
*/
        "securities"
};

resource 'SNPL' (27, PFM_MIN_PRIO) {                                          /* Threat */
        "threats"
};

resource 'SNPL' (28, PFM_MIN_PRIO) {                                          /* Fantasy */
        "fantasies"
};

resource 'SNPL' (29, PFM_MIN_PRIO) {                                          /* Openness
*/
        "openness"
};

resource 'SNPL' (30, PFM_MIN_PRIO) {                                          /* Delay */
        "delays"
};

resource 'SNPL' (31, PFM_MIN_PRIO) {                                          /* Choice */
        "choices"
};

resource 'SNPL' (32, PFM_MIN_PRIO) {                                          /*
Preconception */
        "preconceptions"
};

resource 'SNPL' (33, PFM_MIN_PRIO) {                                          /* Work */
        "works"
};

resource 'SNPL' (34, PFM_MIN_PRIO) {                                          /* Attract --
was Do */
        "attractions"
};

resource 'SNPL' (35, PFM_MIN_PRIO) {                                          /* Repel --
was Don't */
        "repulsions"
};

resource 'SNPL' (36, PFM_MIN_PRIO) {                                          /* Try */
        "attempts"
};

resource 'SNPL' (37, PFM_MIN_PRIO) {                                          /* Instinct
*/
        "instincts"
};

resource 'SNPL' (38, PFM_MIN_PRIO) {                                          /* Senses */
        "senses"
};

resource 'SNPL' (39, PFM_MIN_PRIO) {                                          /*
Interpretation */
        "interpretations"
};

resource 'SNPL' (40, PFM_MIN_PRIO) {                                          /*
Conditioning */
        "conditionings"
};

resource 'SNPL' (41, PFM_MIN_PRIO) {                                          /* Wisdom */
        "wisdoms"
};

resource 'SNPL' (42, PFM_MIN_PRIO) {                                          /* Skill */
        "skills"
};
```

```
resource 'SNPL' (43, PFM_MIN_PRIO) {                                        /* Experience
*/
        "experiences"
};

resource 'SNPL' (44, PFM_MIN_PRIO) {                                        /*
Enlightenment */
        "enlightenments"
};

resource 'SNPL' (45, PFM_MIN_PRIO) {                                        /* Approach
*/
        "approaches"
};

resource 'SNPL' (46, PFM_MIN_PRIO) {                                        /* Self-
Interest */
        "self interests"
};

resource 'SNPL' (47, PFM_MIN_PRIO) {                                        /* Morality
*/
        "moralities"
};

resource 'SNPL' (48, PFM_MIN_PRIO) {                                        /* Attitude
*/
        "attitudes"
};

resource 'SNPL' (49, PFM_MIN_PRIO) {                                        /*
Prerequisites */
        "prerequisites"
};

resource 'SNPL' (50, PFM_MIN_PRIO) {                                        /* Strategy
*/
        "strategies"
};

resource 'SNPL' (51, PFM_MIN_PRIO) {                                        /* Analysis
*/
        "analyses"
};

resource 'SNPL' (52, PFM_MIN_PRIO) {                                        /*
Preconditions */
        "preconditions"
};

resource 'SNPL' (53, PFM_MIN_PRIO) {                                        /* State-of-
Being */
        "states of being"
};

resource 'SNPL' (54, PFM_MIN_PRIO) {                                        /* Situation
*/
        "situations"
};

resource 'SNPL' (55, PFM_MIN_PRIO) {                                        /*
Circumstances */
        "circumstances"
};

resource 'SNPL' (56, PFM_MIN_PRIO) {                                        /* Sense-of-
Self */
        "senses of self"
};

resource 'SNPL' (57, PFM_MIN_PRIO) {                                        /* Knowledge
*/
        "knowledges"
};

resource 'SNPL' (58, PFM_MIN_PRIO) {                                        /* Ability */
        "abilities"
};

resource 'SNPL' (59, PFM_MIN_PRIO) {                                        /* Desire */
        "desires"
};

resource 'SNPL' (60, PFM_MIN_PRIO) {                                        /* Thought */
        "thoughts"
};

resource 'SNPL' (61, PFM_MIN_PRIO) {                                        /*
Rationalization */
        "rationalizations"
};

resource 'SNPL' (62, PFM_MIN_PRIO) {                                        /* Commitment
*/
        "commitments"
};

resource 'SNPL' (63, PFM_MIN_PRIO) {                                        /*
Responsibility */
        "responsibilities"
};
```

```
resource 'SNPL' (64, PFM_MIN_PRIO) {                                  /* Obligation
*/
        "obligations"
};
resource 'SNPL' (65, PFM_MIN_PRIO) {                                  /* permission
*/
        "permissions"
};
resource 'SNPL' (66, PFM_MIN_PRIO) {                                  /* Need */
        "needs"
};
resource 'SNPL' (67, PFM_MIN_PRIO) {                                  /* expediency
*/
        "expediencies"
};
resource 'SNPL' (68, PFM_MIN_PRIO) {                                  /* deficiency
*/
        "deficiencies"
};
resource 'SNPL' (69, PFM_MIN_PRIO) {                                  /* Truth */
        "truths"
};
resource 'SNPL' (70, PFM_MIN_PRIO) {                                  /* Evidence
*/
        "evidences"
};
resource 'SNPL' (71, PFM_MIN_PRIO) {                                  /* Suspicion
*/
        "suspicions"
};
resource 'SNPL' (72, PFM_MIN_PRIO) {                                  /* Falsehood
*/
        "falsehoods"
};
resource 'SNPL' (73, PFM_MIN_PRIO) {                                  /* Value */
        "values"
};
resource 'SNPL' (74, PFM_MIN_PRIO) {                                  /* Confidence
*/
        "confidences"
};
resource 'SNPL' (75, PFM_MIN_PRIO) {                                  /* Worry */
        "worries"
};
resource 'SNPL' (76, PFM_MIN_PRIO) {                                  /* Worth */
        "worths"
};
resource 'SNPL' (77, PFM_MIN_PRIO) {                                  /* Closure */
        "closures"
};
resource 'SNPL' (78, PFM_MIN_PRIO) {                                  /* Hope */
        "hopes"
};
resource 'SNPL' (79, PFM_MIN_PRIO) {                                  /* Dream */
        "dreams"
};
resource 'SNPL' (80, PFM_MIN_PRIO) {                                  /* Denial */
        "denials"
};
resource 'SNPL' (81, PFM_MIN_PRIO) {                                  /*
Investigation */
        "investigations"
};
resource 'SNPL' (82, PFM_MIN_PRIO) {                                  /* Appraisal
*/
        "appraisals"
};
resource 'SNPL' (83, PFM_MIN_PRIO) {                                  /*
Reappraisal */
        "reappraisals"
};
resource 'SNPL' (84, PFM_MIN_PRIO) {                                  /* Doubt */
        "doubts"
};


resource 'SNPL' (85, PFM_MIN_PRIO) {                                  /* Ability */
        "abilities"
};
resource 'SNPL' (86, PFM_MIN_PRIO) {                                  /* Acceptance
*/
        "acceptances"
};
resource 'SNPL' (87, PFM_MIN_PRIO) {                                  /* Accurate
*/
        "accuracies"
```

```
};
resource 'SNPL' (88, PFM_MIN_PRIO) {                    /* Actuality
*/
        "actualities"
};
resource 'SNPL' (89, PFM_MIN_PRIO) {                    /* Avoid */
        "avoidances"
};
resource 'SNPL' (90, PFM_MIN_PRIO) {                    /* Aware */
        "awarenesses"
};
resource 'SNPL' (91, PFM_MIN_PRIO) {                    /* Cause */
        "causes"
};
resource 'SNPL' (92, PFM_MIN_PRIO) {                    /* Certainty
*/
        "certainties"
};
resource 'SNPL' (93, PFM_MIN_PRIO) {                    /* Change */
        "changes"
};
resource 'SNPL' (94, PFM_MIN_PRIO) {                    /* Chaos */
        "chaos"
};
resource 'SNPL' (95, PFM_MIN_PRIO) {                    /* Conscience
*/
        "consciences"
};
resource 'SNPL' (96, PFM_MIN_PRIO) {                    /*
Consideration */
        "considerations"
};
resource 'SNPL' (97, PFM_MIN_PRIO) {                    /* Control */
        "controls"
};
resource 'SNPL' (98, PFM_MIN_PRIO) {                    /* Deduction
*/
        "deductions"
};
resource 'SNPL' (99, PFM_MIN_PRIO) {                    /* Desire */
        "desires"
};
resource 'SNPL' (100, PFM_MIN_PRIO) {               /* Determination */
        "determinations"
};
resource 'SNPL' (101, PFM_MIN_PRIO) {               /* Disbelief */
        "disbeliefs"
};
resource 'SNPL' (102, PFM_MIN_PRIO) {               /* Effect */
        "effects"
};
resource 'SNPL' (103, PFM_MIN_PRIO) {               /* Ending */
        "endings"
};
resource 'SNPL' (104, PFM_MIN_PRIO) {               /* Equity */
        "equities"
};
resource 'SNPL' (105, PFM_MIN_PRIO) {               /* Evaluation */
        "evaluations"
};
resource 'SNPL' (106, PFM_MIN_PRIO) {               /* Expectation */
        "expectations"
};
resource 'SNPL' (107, PFM_MIN_PRIO) {               /* Faith */
        "faiths"
};
resource 'SNPL' (108, PFM_MIN_PRIO) {               /* Feeling */
        "feelings"
};
resource 'SNPL' (109, PFM_MIN_PRIO) {               /* Help */
        "helps"
};
resource 'SNPL' (110, PFM_MIN_PRIO) {               /* Hinder */
        "hinderances"
};
resource 'SNPL' (111, PFM_MIN_PRIO) {               /* Hunch */
        "hunches"
};
resource 'SNPL' (112, PFM_MIN_PRIO) {               /* Inaction */
        "inactions"
};
resource 'SNPL' (113, PFM_MIN_PRIO) {               /* Induction */
        "inductions"
};
resource 'SNPL' (114, PFM_MIN_PRIO) {               /* Inequity */
        "inequities"
```

```
};
resource 'SNPL' (115, PFM_MIN_PRIO) {                    /* Inertia */
        "inertia"
};
resource 'SNPL' (116, PFM_MIN_PRIO) {                    /* Knowledge */
        "knowledges"
};
resource 'SNPL' (117, PFM_MIN_PRIO) {                    /* Logic */
        "logics"
};
resource 'SNPL' (118, PFM_MIN_PRIO) {                    /* Non-acceptance */
        "non-acceptances"
};
resource 'SNPL' (119, PFM_MIN_PRIO) {                    /* Non-Accurate */
        "non-accuracies"
};
resource 'SNPL' (120, PFM_MIN_PRIO) {                    /* Oppose */
        "oppositions"
};
resource 'SNPL' (121, PFM_MIN_PRIO) {                    /* Order */
        "orders"
};
resource 'SNPL' (122, PFM_MIN_PRIO) {                    /* Perception */
        "perceptions"
};
resource 'SNPL' (123, PFM_MIN_PRIO) {                    /* Possibility */
        "possibilities"
};
resource 'SNPL' (124, PFM_MIN_PRIO) {                    /* Potentiality */
        "potentialities"
};
resource 'SNPL' (125, PFM_MIN_PRIO) {                    /* Proaction */
        "proactions"
};
resource 'SNPL' (126, PFM_MIN_PRIO) {                    /* Probability */
        "probabilities"
};
resource 'SNPL' (127, PFM_MIN_PRIO) {                    /* Process */
        "processes"
};
resource 'SNPL' (128, PFM_MIN_PRIO) {                    /* Production */
        "productions"
};
resource 'SNPL' (129, PFM_MIN_PRIO) {                    /* Projection */
        "projections"
};
resource 'SNPL' (130, PFM_MIN_PRIO) {                    /* Protection */
        "protections"
};
resource 'SNPL' (131, PFM_MIN_PRIO) {                    /* Proven */
        "proofs"
};
resource 'SNPL' (132, PFM_MIN_PRIO) {                    /* Pursuit */
        "pursuits"
};
resource 'SNPL' (133, PFM_MIN_PRIO) {                    /* Re-evaluation */
        "re-evaluations"
};
resource 'SNPL' (134, PFM_MIN_PRIO) {                    /* Reaction */
        "reactions"
};
resource 'SNPL' (135, PFM_MIN_PRIO) {                    /* Reconsideration */
        "reconsiderations"
};
resource 'SNPL' (136, PFM_MIN_PRIO) {                    /* Reduction */
        "reductions"
};
resource 'SNPL' (137, PFM_MIN_PRIO) {                    /* Result */
        "results"
};
resource 'SNPL' (138, PFM_MIN_PRIO) {                    /* Self-Aware */
        "self-awarenesses"
};
resource 'SNPL' (139, PFM_MIN_PRIO) {                    /* Speculation */
        "speculations"
};
resource 'SNPL' (140, PFM_MIN_PRIO) {                    /* Support */
        "supports"
};
resource 'SNPL' (141, PFM_MIN_PRIO) {                    /* Temptation */
        "temptations"
};
resource 'SNPL' (142, PFM_MIN_PRIO) {                    /* Test */
        "tests"
};
```

```
resource 'SNPL' (143, PFM_MIN_PRIO) {                    /* Theory */
	"theories"
};

resource 'SNPL' (144, PFM_MIN_PRIO) {                    /* Thought */
	"thoughts"
};

resource 'SNPL' (145, PFM_MIN_PRIO) {                    /* Trust */
	"trusts"
};

resource 'SNPL' (146, PFM_MIN_PRIO) {                    /* Un-Ending */
	"continuances"
};

resource 'SNPL' (147, PFM_MIN_PRIO) {                    /* Uncontrolled */
	"frenzies"
};

resource 'SNPL' (148, PFM_MIN_PRIO) {                    /* Unproven */
	"disproofs"
};

/* $Log:          nouns.r,v $
# Revision 1.7  93/06/02  21:46:19  chris
# Changed positions of type, variations, and elements between classes.
#
# Revision 1.6  93/05/30  16:27:20  chris
# Changed designation from SNN to SNPL and hooked into dramatic.r.
#
# Revision 1.5  93/05/26  19:46:44  stephen
# Windows fixes.
#
# Revision 1.4  93/05/13  15:39:32  chris
# Definition cleanup.
#
# Revision 1.3  93/05/05  14:25:51  chris
# Changed resource designation to SNN from SN.
#
# Revision 1.2  93/04/29  14:20:05  chris
# Changed "Do" and "Don't" to "Attract" and "Repel".
#
# Revision 1.1  93/04/23  16:37:39  chris
# Initial revision
#
 */
```

```
/*********************************************************************
        OPQUAD.CC
        Dramatica Operation Quads functions
        (c) 1993 Screenplay Systems
        Authors:        S. Greenfield & C. Huntley
        Created:        January 31, 1993
        Revised:        $Id$
**********************************************************************

*/

#include <stdio.h>
#include <string.h>

#include "genutls.h"

#include "structs.h"
#include "address.h"
#include "semtable.h"
#include "query.h"
#include "relation.h"
#include "document.h"
#include "opquad.h"
#include "apprec.h"

static short*   excludeClassChoices(DRDoc* theDoc, enum OPJUSTS justification);
static char*    DetermineOrder(DRDoc* theDoc, enum OPJUSTS whichJustification, short theChoice, OpQuadGroup *OpQdGp);
static short    whereOpsStart(DRDoc* theDoc, char *theFlipStr, char *theRotateStr, enum OPJUSTS justification);
static char*    DetermineOpBSlaveOrder(DRDoc* theDoc, char *orderString, OpQuadGroup *OpQdGp, short masterIndex, short
slaveIndex);
static char*    DetermineOpASlaveOrder(DRDoc* theDoc, char *orderString, short slaveIndex);

/* ---------------------------------------------------------------------
        These are the definitions for the two basic sets of Operation Quads
        (OpQuads).  Each OpQuad set is comprised of three quads of units,
        which contain information about specific operations to be executed
        on a copy of a SuperClass.

        OpQuads are similar to the structural Quads: they have four units that
        are examined in the traditional quad arrangement.  However, temporal
        movement through the four items proceeds CLOCKWISE, versus the Z-pattern
        seen in structural Quads.

        Because of these differences, we have opted to implement a custom
        implementation for the OpQuad data structures and dynamics.
------------------------------------------------------------------------ */

static const OpQuad OpQuad_A1= {
        { OP_FLIP, OP_DYNAMIC,              4, 0, { 0, 0, 0, 0 },"14", 0, 0, 0, '\\' },
        { OP_FLIP, OP_COMPANION,   3, 0, { 0, 0, 0, 0 },"12", 0, 0, 0, '+' },
        { OP_FLIP, OP_COMPANION,   2, 0, { 0, 0, 0, 0 },"34", 0, 0, 0, '-' },
        { OP_FLIP, OP_DYNAMIC,              1, 0, { 0, 0, 0, 0 },"32", 0, 0, 0, '/' }
};

static const OpQuad OpQuad_A2= {
        { OP_ROTATE, OP_ZPATTERN, 4, 0, { 0, 0, 0, 0 },"1234", 0, 0, 0, '1' },
        { OP_ROTATE, OP_NPATTERN, 3, 0, { 0, 0, 0, 0 },"2143", 0, 0, 0, '2' },
        { OP_ROTATE, OP_NPATTERN, 2, 0, { 0, 0, 0, 0 },"4321", 0, 0, 0, '4' },
        { OP_ROTATE, OP_ZPATTERN, 1, 0, { 0, 0, 0, 0 },"3412", 0, 0, 0, '3' }
};

static const OpQuad OpQuad_A3= {
        { OP_CHILDREN, OP_NONE, 4, 0, { 0, 0, 0, 0 },"3", 0, 0, 0, 0 },           /* both */
        { OP_CHILDREN, OP_NONE, 3, 0, { 0, 0, 0, 0 },"2", 0, 0, 0, 0 },           /* flips */
        { OP_CHILDREN, OP_NONE, 1, 0, { 0, 0, 0, 0 },"1", 0, 0, 0, 0 },           /* rotates */
        { OP_CHILDREN, OP_NONE, 2, 0, { 0, 0, 0, 0 },"0", 0, 0, 0, 0 }            /* neither */
};

static const OpQuad OpQuad_B1= {
        { OP_FLIP, OP_DYNAMIC,              2, 0, { 0, 0, 0, 0 },"14", 0, 0, 0, '\\' },
        { OP_FLIP, OP_DYNAMIC,              1, 0, { 0, 0, 0, 0 },"32", 0, 0, 0, '/' },
        { OP_FLIP, OP_COMPANION,   4, 0, { 0, 0, 0, 0 },"34", 0, 0, 0, '-' },
        { OP_FLIP, OP_COMPANION,   3, 0, { 0, 0, 0, 0 },"12", 0, 0, 0, '+' }
};

static const OpQuad OpQuad_B2= {
        { OP_ROTATE, OP_ZPATTERN, 2, 0, { 0, 0, 0, 0 },"1234", 0, 0, 0, '1' },
        { OP_ROTATE, OP_ZPATTERN, 1, 0, { 0, 0, 0, 0 },"3412", 0, 0, 0, '3' },
        { OP_ROTATE, OP_NPATTERN, 4, 0, { 0, 0, 0, 0 },"4321", 0, 0, 0, '4' },
        { OP_ROTATE, OP_NPATTERN, 3, 0, { 0, 0, 0, 0 },"2143", 0, 0, 0, '2' }
};

static const OpQuad OpQuad_B3= {
        { OP_CHILDREN, OP_NONE, 2, 0, { 0, 0, 0, 0 },"3", 0, 0, 0, 0 },           /* both */
        { OP_CHILDREN, OP_NONE, 1, 0, { 0, 0, 0, 0 },"1", 0, 0, 0, 0 },           /* rotates */
        { OP_CHILDREN, OP_NONE, 3, 0, { 0, 0, 0, 0 },"2", 0, 0, 0, 0 },           /* flips */
        { OP_CHILDREN, OP_NONE, 4, 0, { 0, 0, 0, 0 },"0", 0, 0, 0, 0 },           /* neither */
};


/* ----------------------------------------------------------------------
        FUNCTION:       OP_InitOpQuads
        Purpose:        Given an OpQuad*, which OpQuad Set (A or B), and what type
                                of OpQuad, initialize the OpQuad.
        Returns:        Ptr to the OpQuad initialized.
---------------------------------------------------------------------- */
OpQuad* OP_InitOpQuads(OpQuadPtr theOpQuad, enum OPGROUP OpSet, enum OPERATION OpType)
{

        memset(theOpQuad, 0, sizeof(OpQuad));

        switch (OpType) {
          case OP_FLIP:         return (OpQuad *)(memcpy(theOpQuad, (OpSet == OP_A ? &OpQuad_A1 : &OpQuad_B1),
sizeof(OpQuad)));
          case OP_ROTATE:       return (OpQuad *)(memcpy(theOpQuad, (OpSet == OP_A ? &OpQuad_A2 : &OpQuad_B2),
sizeof(OpQuad)));
          case OP_CHILDREN:     return (OpQuad *)(memcpy(theOpQuad, (OpSet == OP_A ? &OpQuad_A3 : &OpQuad_B3),
sizeof(OpQuad)));
        }

        assert (FALSE);
}
```

```
/* ---------------------------------------------------------------------------
        FUNCTION:       OP_SelectOpQuads
        Purpose:        Chooses OpQuad set "A" or "B", depending on the setting
                                of SKEW:Action/Decision and BIAS:Success/Failure.
                                Initializes the three OpQuads in an OpQuadSet.
        Accepts:        whichJustification: OP_SUBJECTIVE, or OP_OBJECTIVE
        Method:         Objective Justification: if (Action && Success) ||
                                (Decision && Failure) then choose group "A". else "B".
                                Subjective Justification: If (Do-er) then "A". else "B".
--------------------------------------------------------------------------- */
void OP_SelectOpQuads(DRDoc* theDoc, enum OPJUSTS whichJustification, OpQuadGroup *OpQdGp)
{
        if (whichJustification == OP_OBJECTIVE) {                       /* if this is the objective
justification */
                if ((ACTION && SUCCESS) || (DECISION && FAILURE))
                                OpQdGp->OpGroup = OP_A;                                          /* select
OpGroup A if it is Action and Success or Decision and Failure */
                        else
                                OpQdGp->OpGroup = OP_B;                                          /* otherwise
select OpGroup B if it is Action and Fail or Decision and Success */
        }
        else {
        /* OP_SUBJECTIVE */
                if (MALE)
        /* if this is subjective, Male means OpGroup A */
                        OpQdGp->OpGroup = OP_A;
                else
                        OpQdGp->OpGroup = OP_B;                                                  /* else, if
subjective and Female, OpGroup B -- OP_B if FEMALE */
        }

        if (OpQdGp->OpGroup == OP_A) {                                                  /* initialize the
three OpQuads in the OpGroup A arrangement */
                OP_InitOpQuads(OpQdGp->flips, OP_A, OP_FLIP);
                OP_InitOpQuads(OpQdGp->rotates, OP_A, OP_ROTATE);
                OP_InitOpQuads(OpQdGp->children, OP_A, OP_CHILDREN);
        }
        else {
        /* initialize the three OpQuads in the OpGroup B arrangement */
                OP_InitOpQuads(OpQdGp->flips, OP_B, OP_FLIP);
                OP_InitOpQuads(OpQdGp->rotates, OP_B, OP_ROTATE);
                OP_InitOpQuads(OpQdGp->children, OP_B, OP_CHILDREN);
        }
}


/* ---------------------------------------------------------------------------
        FUNCTION:       OP_DetermineQuadLink
        Purpose:        Links either OpQuad "1" (flips) with "3" (children), or
                                "2" (rotates) with "3".
        Accepts:        whichJustification: OP_OBJECTIVE or OP_SUBJECTIVE.
        Method:         Examines SKEW:Time Lock/Space Lock.  If Space Lock, then lock
                                OpQuad "1", otherwise lock OpQuad "2".
        Returns:        The number of the OpQuad that is locked, either 1 or 2.
        Note:           Locking the quads currently affects only XXXX.
--------------------------------------------------------------------------- */
short OP_DetermineQuadLink(DRDoc* theDoc, enum OPJUSTS justification)
{
        short objectiveJustification;

                if (SPACELOCK)
                        objectiveJustification = OP_A;                                  /* if Spacelock --
Children linked to OpQuad A */
                else objectiveJustification = OP_B;                                    /* if Timelock --
Children linked to OpQuad B */

        if (justification == OP_OBJECTIVE)                                      /* for objective justification,
only spacelock/timelock needs to be known */
                return (objectiveJustification);
        else {
        /* OP_SUBJECTIVE */
                if (START)
                        return (objectiveJustification);                        /* if subjective justification
and Start, the quadlink will be the same as the objective justification */
                else {
                        if (objectiveJustification == OP_A)                             /* if subjective
justification and Stop, the quadlink will be the opposite as the objective justification */
                                return (OP_B);
                        else
                                return (OP_A);
                }
        }
} /* OP_DetermineQuadLink */


/* ---------------------------------------------------------------------------
        FUNCTION:       excludeClassChoices
        Purpose:        Limits class choices based on DOER_BEER & START_STOP skews.
        Accepts:        Justification: OP_OBJECTIVE or OP_SUBJECTIVE.
        Returns:        short * to array of available quad positions (TRUE means
                                position is available).
        Method:         if SUBJECTIVE:
                                        If SKEW:DOER, subjective class will be in Positive position.
                                        If BEER, subjective class will be in negative position.
                                        If SKEW:STOP, the two classes will be COMPANIONS.
                                        If START, the two classes will be DEPENDENT.
--------------------------------------------------------------------------- */
static short* excludeClassChoices(DRDoc* theDoc, enum OPJUSTS justification)
{
        static short excludedClasses[4];

        memset(excludedClasses, 0 ,sizeof(excludedClasses));

        if (justification == OP_OBJECTIVE) {                    /* OP_OBJECTIVE */
                if (DOER) {                                                                     /* DOER_SKEW
*/
                        if (START) {                                                    /* START_SKEW */
                                excludedClasses[0] = TRUE;                      /* exclude companion
relationships */
                                excludedClasses[1] = TRUE;
                        }
```

```
                else {                                                              /* STOP_SKEW
*/
                        excludedClasses[2] = TRUE;                  /* exclude dependent
relationships */
                        excludedClasses[3] = TRUE;
                }
            }
            else {                                                                  /* BEER_SKEW
*/
                if (START) {                                                /* START_SKEW */
                        excludedClasses[2] = TRUE;                  /* exclude companion
relationships */
                        excludedClasses[3] = TRUE;
                }
                else {                                                              /* STOP_SKEW
*/
                        excludedClasses[0] = TRUE;                  /* exclude dependent
relationships */
                        excludedClasses[1] = TRUE;
                }
            }
        }

        else {                                                                      /*
OP_SUBJECTIVE */
            if (DOER) {                                                             /* DOER_SKEW
*/
                excludedClasses[2] = TRUE;                          /* exclude beer companion pair
*/
                excludedClasses[3] = TRUE;
            }
            else {                                                                  /* BEER_SKEW
*/
                excludedClasses[0] = TRUE;                          /* exclude doer companion pair
*/
                excludedClasses[1] = TRUE;
            }
        }
        return (excludedClasses);
}

/* -----------------------------------------------------------------------
        FUNCTION:       DetermineObjectiveChoices
        Purpose:        Determine which units at a given level in the Reference
                                Superclass are available.  Also rules out unavailable operations
                                in the OpQuads.
        Note:           Level is zero adjusted (0-3).
        Method:
----------------------------------------------------------------------- */
void DetermineObjectiveChoices(DRDoc* theDoc, SuperClass *theSC, OpQuadGroup *OpQdGp, AddrText curAddr, AddrText opAddr,
enum JUSTORDER justOrder)
{
        int i, r, f, lev;
        short *excludedChoices;
        int theChoice;
        int flipChoiceIndex=-1, rotateChoiceIndex=-1;
        int firstOp = 0;                                                    /* this is the first
operation in the "master" OpQuad that is used to Determine the orderString */
        char *orderString;
        int indexIntoFlipStr, indexIntoRotateStr;
        short semChoices[4] = { 0, 0, 0, 0 };
        short res;
        OpQuadPtr flips = OpQdGp->flips;
        OpQuadPtr rotates = OpQdGp->rotates;
        OpQuadPtr children = OpQdGp->children;
        static const short Op_a_StartAdj[4]     = { 0, 2, 0, 2 };           /* adjustments into orderString
for opGroup A -- resolution dependent */
        static const short Op_b_StartAdj[4]     = { 0, 0, 0, 0 };           /* adjustments into orderString
for opGroup B -- resolution dependent */
        const short *startAdj = (OpQdGp->OpGroup == OP_A) ? Op_a_StartAdj : Op_b_StartAdj;

        char pathString[100];

        if (justOrder == FIRSTJUST) {
                                /* we only ask questions if this is the first justification */

                excludedChoices = excludeClassChoices(theDoc, OP_OBJECTIVE);
        /* determine which classes are not available based on the answers to the Bias and Skew questions */
                for (r=0; r<=3; ++r) {
                        semChoices[r] = !excludedChoices[r];
                        /* reverse to indicate possible choices, not exlcusions */
                }

#if 0   /******** 4/7/93 *********/
                for (r=0; r<=3; ++r) {
                        if (FlipFirst(theDoc, OP_OBJECTIVE))
                                        /* This looks bogus !!!!!!!****** 4/7/93 */
                                semChoices[rotates[r].opFunction[0]-'1'] = !excludedChoices[r];         /* if flip
first, the rotate operations that are valid must correspond to the "afterflip" position */
                        else
                                semChoices[rotates[r].opFunction[0]-'1'] = excludedChoices[r];                  /*
if rotate first, then unavailable choices correspond directly to unavailable rotate operations */
                }

/*      Prompt user to make the proper semantic choices for this level.  NOTE: theChoice
        is a SHORT, but it is NOT zero offset (i.e. it returns 1-4)  */

                if (tester == 0) {
                        PromptForChoices(curAddr, semChoices, CLASS);
                        /* show user what they have to choose from  */
                        printf("\n\nEnter 5-digit address of problem element (e.g. 12340): ");
//                      myGets(curAddr);
                                                /* what did the user choose?  */
                }
#endif
        }
        theChoice = curAddr[CLASS]-'0';
                /* since the objective justification starts at the Class ResLev, assign the CLASS digit of the address
we are building based on the address we have been passed (second justification) */
        strcpy(opAddr, curAddr);
                                /* copy the address of the problem element to the operations address *.
```

```
/*      loads into the levelUsed table which operations are going to be used for this
        level. */

        if (FlipFirst(theDoc, OP_OBJECTIVE)) {
                                        /* if we are flipping before rotating... */
                for (f=0; f<=3; ++f) {

/*      Eliminate unavailable opFunctions.  No companions at CLASS ResLev -- for either
        opGroup.
*/

                        if (OpQdGp->OpGroup == OP_A) {
                                if (f == 1 || f == 2)                           /* OpGroup A: cannot match
companion pair flip operations -- EVER! */
                                        continue;                                                       /* so skip
past OpUnits 2 & 3 ([1] & [2]) */
                        }
                        else {
                                if (f == 2 || f == 3)                           /* OpGroup B: cannot match
companion pair flip operations -- EVER! */
                                        continue;                                                       /* so skip
past OpUnits 3 & 4 ([2] & [3]) */
                        }

/*      If we're flipping first, find which OpFunction contains theChoice. */

                        if (theChoice == flips[f].opFunction[0]-'0' ||
                            theChoice == flips[f].opFunction[1]-'0')                    /* if either digit of
the flip function matches the choice ... */
                                        flipChoiceIndex = firstOp = f;                                  /*
make a note of which OpUnit has the matching OpFunction */
                }

/*      If we're flipping first, then the rotate operation is will begin in the dynamic pair
        of theChoice.  e.g. if theChoice = 1, the rotate opFunction should begin in 4.
*/

                for (r=0; r<=3; ++r)
                        if (Relations[DYNAMIC][theChoice - 1] == rotates[r].opFunction[0]-'0')          /* compare
the "ending postion" of theChoice to the first digit of each rotate function */
                                rotateChoiceIndex = r;
        /* make a note of which OpUnit has the matching OpFunction */
        }

/*      Do "Rotate First" */

        else {
                        /* we are rotating before flipping */

/*      If Rotate first, match theChoice to the first digit of the rotate opFunction */

                for (r=0; r<=3; ++r)
                        if (theChoice == rotates[r].opFunction[0]-'0')                  /* compare theChoice
to the first digit of each rotate function */
                                rotateChoiceIndex = firstOp = r;
                /* make a note of which OpUnit has the matching OpFunction */

/*      Eliminate unavailable opFunctions.  No companions at CLASS ResLev -- for either
        opGroup.
*/

                for (f=0; f<=3; ++f) {

                        if (OpQdGp->OpGroup == OP_A) {
                                if (f == 1 || f == 2)                           /* OpGroup A: cannot match
companion pair flip operations -- EVER! */
                                        continue;                                                       /* so skip
past OpUnits 2 & 3 ([1] & [2]) */
                        }
                        else {
                                if (f == 2 || f == 3)                           /* OpGroup B: cannot match
companion pair flip operations -- EVER! */
                                        continue;                                                       /* so skip
past OpUnits 3 & 4 ([2] & [3]) */
                        }

/*      If Rotate first, match second digit in rotate opFunction to either digit of flip */

                        if (rotates[rotateChoiceIndex].opFunction[1] == flips[f].opFunction[0] ||
                                rotates[rotateChoiceIndex].opFunction[1] == flips[f].opFunction[1])
                                flipChoiceIndex = f;
        /* make a note of which OpUnit has the matching OpFunction */
                }
        }

/*      Determine Direction and Pattern of operations */

        orderString = DetermineOrder(theDoc, OP_OBJECTIVE, firstOp, OpQdGp);

/*      Find place to start in orderString.  The string is set up so we can start at any
        point and continue with the next three OpQuad operations.
*/

        for (i=0; i<=7; ++i)
                if (orderString[i] == flipChoiceIndex+'1') {            /* find the starting flip OpUnit in the
orderString */
                        indexIntoFlipStr = i;                                                   /* save index into the
orderString for the flip opQuad functions */
                        break;
                }

        for (i=0; i<=7; ++i)
                if (orderString[i] == rotateChoiceIndex+'1') {          /* find the starting rotate OpUnit in the
orderString */
                        indexIntoRotateStr = i;                                                 /* save index into the
orderString for the rotate opQuad functions */
                        break;
                }

/*  Assign the operations for Flips and Rotates to the levels at all resolutions. */
```

```
        for (res=CLASS_RES; res<=ELEM_RES; ++res) {
                        /* starting at the Class resolution and going down to the Element resolution . . . */
                for (lev=res-1, f=indexIntoFlipStr+startAdj[res-1];  lev<=ELEM;  ++lev, ++f) {   /* starting at the
Class level and going down to the Element level . . . */
                        assert(flips[orderString[f]-'1'].levelUsed[lev] == 0);
                        flips[orderString[f]-'1'].levelUsed[lev] = res;
                        /* assign the order to execute the Flip OpUnit OpFunctions as dictated by the orderString */
                }

                for (lev=res-1, r=indexIntoRotateStr+startAdj[res-1];  lev<=ELEM;  ++lev, ++r) {          /* starting
at the Class level and going down to the Element level . . . */
                        assert(rotates[orderString[r]-'1'].levelUsed[lev] == 0);
                        rotates[orderString[r]-'1'].levelUsed[lev] = res;
                /* assign the order to execute the Rotate OpUnit OpFunctions as dictated by the orderString */
                }

/*      Build opAddr.  This is the address that is used to build the addresses for the justification,
        for the execution of the operations.
*/
                if (res > CLASS_RES)
        /* already done for CLASS_RES! */
                        opAddr[res-1] = whereOpsStart(theDoc, flips[orderString[indexIntoFlipStr+startAdj[res-1]]-
'1'].opFunction,

rotates[orderString[indexIntoRotateStr+startAdj[res-1]]-'1'].opFunction, OP_OBJECTIVE);
        }

/*      Now set execution order for CHILDREN.  */

        if (OP_DetermineQuadLink(theDoc, OP_OBJECTIVE) == OP_A) {       /* OpQuad A (flips) is linked with children */
                for (i=3; i>=0; --i)                                                                            /*
move down the resolutions ... */
                        for (f=0;  f<=3;  ++f)                                                                  /*
...for each operation  */
                                if (flips[f].levelUsed[i] == CLASS_RES)                         /* if class resolution
found (the largest in the obj. Justification, ... */
                                        flips[f].childLink = i;                                                 /*
set the childLink */
        }
        else {
                /* OpQuad B (rotates) is linked with children */
                for (i=3; i>=0; --i)                                                                            /*
same as above loop */
                        for (r=0;  r<=3;  ++r)
                                if (rotates[r].levelUsed[i] == CLASS_RES)
                                        rotates[r].childLink = i;
        }

#if 0
        if (justOrder != FIRSTJUST)
                printf("'Final' address before execution is: '%s' (%s)\n",curAddr,Addr2PathString(theSC, curAddr,
pathString, ALL_LEVELS));
#endif
}


/* --------------------------------------------------------------------------
        FUNCTION:       PromptForChoices
        Purpose:        Prompt user for a choice of 2-4 units in the Quad at the
                                appropriate level.
        Returns:        1-4, the position in the quad chosen by the user.
-------------------------------------------------------------------------- */
short PromptForChoices(AddrPtr curAddr, short *semChoicesArray, short theLevel)
{
        int i;
        char                    theChoice[10];
        char                    pathString[4 * MAX_SEMNAME_LEN];
        AddrPtrStruct   aPtrs;
        Quad                    *theQuad;
        int                             chosenUnit;
        char *levelNameTbl[4] = { "CLASS", "TYPE", "VARIATION", "ELEMENT" };

        Addr2Ptrs(RefSC, curAddr, &aPtrs);
        theQuad = (Quad *)aPtrs.itemPtrs[theLevel][QUAD_SZ];

        do {
                printf("\nChoices for %s Level, address '%s'\n",levelNameTbl[theLevel],curAddr);
                printf("address path: %s\n",Addr2PathString(RefSC, curAddr, pathString, ALL_LEVELS));


                for (i=0; i<=3; ++i) {
                        if (semChoicesArray[i]) {
                                printf("  Unit %d:  '%s'\n",i+1,SEMTBL_NAME(theQuad->Units[i].semVal));
                        }
                }
                printf("Select Unit: ");
//              myGets(theChoice);
                chosenUnit = theChoice[0]-'0';
        } while (semChoicesArray[chosenUnit-1] == 0);                   /* don't allow user to make bad choice
*/

        return (theChoice[0]-'0');
}

enum { S_ELEM, S_VAR, S_TYPE, S_CLASS };      /* indexes into the levelUsed array, where 0 = ELEMENT Resolution column */

/* --------------------------------------------------------------------------
        FUNCTION:       DetermineSubjectiveChoices
        Purpose:        Determine which units at a given level in the Reference
                                Superclass are available.  Also rules out unavailable operations
                                in the OpQuads.
        Note:           Res (Resolution) is (1-4) -- NOT zero adjusted!
                                level (3-0) IS zero adjusted.
        Method:
-------------------------------------------------------------------------- */
void DetermineSubjectiveChoices(DRDoc* theDoc, SuperClass *theSC, OpQuadGroup *OpQdGp, AddrText curAddr, AddrText opAddr,
enum JUSTORDER justOrder)
{
        int i, r, f, lev;                       /* looping and index */
        short *excludedChoices;
```

```
        int theChoice;
        int firstOp = 0;                                    /* this is the first operation in the "master" OpQuad that is used
to Determine the orderString */
        int flipChoiceIndex=-1, rotateChoiceIndex=-1;
        char *orderString;
        char *flipOrderString;
        char *rotateOrderString;
        int indexIntoFlipStr, indexIntoRotateStr;
        short semChoices[4] = { 0, 0, 0, 0 };
        short res;
        OpQuadPtr flips = OpQdGp->flips;
        OpQuadPtr rotates = OpQdGp->rotates;
        OpQuadPtr children = OpQdGp->children;
        static const short Op_a_StartAdj[4]         = { 3, 2, 1, 0 };              /* adjustments into orderString
for opGroup A -- resolution dependent */
        static const short Op_b_StartAdj[4]         = { 3, 2, 1, 0 };              /* adjustments into orderString
for opGroup B -- resolution dependent */
        const short *startAdj = (OpQdGp->OpGroup == OP_A) ? Op_a_StartAdj : Op_b_StartAdj;

        char pathString[100];

        if (justOrder == FIRSTJUST) {
                                /* we only ask questions if this is the first justification */

                excludedChoices = excludeClassChoices(theDoc, OP_SUBJECTIVE);
        /* determine which classes are not available based on the answers to the Bias and Skew questions */
                for (r=0; r<=3; ++r) {
                        semChoices[r] = !excludedChoices[r];
                        /* reverse to indicate possible choices, not exlcusions */
                }

#if 0   /********* 4/7/93 *********/
                for (r=0; r<=3; ++r) {
                        if (FlipFirst(theDoc, OP_SUBJECTIVE))
                                semChoices[rotates[r].opFunction[0]-'1'] = !excludedChoices[r];         /* if flip
first, the rotate operations that are valid must correspond to the "afterflip" position */
                        else
                                semChoices[rotates[r].opFunction[0]-'1'] = excludedChoices[r];                 /*
if rotate first, then unavailable choices correspond directly to unavailable rotate operations */
                }

/*      Prompt user to make the proper semantic choices for this level.  NOTE: theChoice
        is a SHORT, but it is NOT zero offset (i.e. it returns 1-4)  */
                if (tester == 0) {
                        PromptForChoices(curAddr, semChoices, CLASS);
                        /* show user what they have to choose from  */
                        printf("\n\nEnter 5-digit address of problem element (e.g. 12340): ");
//                      myGets(curAddr);
                                                    /* what did the user choose?  */
                }
#endif
        }
        theChoice = curAddr[ELEM]-'0';
                                /* element choice based on chosen address */
        strcpy(opAddr, curAddr);
                                /* copy the address of the problem element to the operations address *.


/*      loads into the levelUsed table which operations are going to be used for this
        level. */

        if (FlipFirst(theDoc, OP_SUBJECTIVE)) {
                                        /* if we are flipping before rotating... */
                for (f=0; f<=3; ++f) {

/*      Eliminate unavailable opFunctions.  No companions at CLASS ResLev -- for either
        opGroup.
*/

                        if (OpQdGp->OpGroup == OP_A) {
                                if (f == 0 || f == 3)                       /* OpGroup A: cannot match
dynamic pair flip operations -- EVER! */
                                        continue;                                        /* so skip
past OpUnits 1 & 4 ([0] & [3]) */
                        }
                        else {
                                if (f == 0 || f == 1)                       /* OpGroup B: cannot match
dynamic pair flip operations -- EVER! */
                                        continue;                                        /* so skip
past OpUnits 1 & 2 ([0] & [1]) */
                        }

/*      If we're flipping first, find which OpFunction contains theChoice. */

                        if (theChoice == flips[f].opFunction[0]-'0' ||
                            theChoice == flips[f].opFunction[1]-'0')              /* if either digit of
the flip function matches the choice ... */
                                        flipChoiceIndex = firstOp = f;                           /*
make a note of which OpUnit has the matching OpFunction */
                }

/*      If we're flipping first, then the rotate operation is will begin in the dynamic pair
        of theChoice.  e.g. if theChoice = 1, the rotate opFunction should begin in 4.
*/

                for (r=0; r<=3; ++r)
                                                /* compare the "ending postion" of theChoice to the first digit of
each rotate function */
                        if (Relations[COMPANION][theChoice - 1] == rotates[r].opFunction[0]-'0')
                                rotateChoiceIndex = r;
                                                /* make a note of which OpUnit has the matching OpFunction */
        }

/*      Do "Rotate First" */

        else {
                        /* we are rotating before flipping */

/*      If Rotate first, match theChoice to the first digit of the rotate opFunction */

                for (r=0; r<=3; ++r)
                        if (theChoice == rotates[r].opFunction[0]-'0')                  /* compare theChoice
to the first digit of each rotate function */
```

```
                                rotateChoiceIndex = firstOp = r;                              /* make a
note of which OpUnit has the matching OpFunction */

/*      Eliminate unavailable opFunctions.  No companions at CLASS ResLev -- for either
        opGroup.
*/

                for (f=0; f<=3; ++f) {

                        if (OpQdGp->OpGroup == OP_A) {
                                if (f == 0 || f == 3)                     /* OpGroup A: cannot match
dynamic pair flip operations -- EVER! */
                                        continue;                                     /* so skip
past OpUnits 1 & 4 ([0] & [3]) */
                        }
                        else {
                                if (f == 0 || f == 1)                     /* OpGroup B: cannot match
dynamic pair flip operations -- EVER! */
                                        continue;                                     /* so skip
past OpUnits 1 & 2 ([0] & [1]) */
                        }

/*      If Rotate first, match second digit in rotate opFunction to either digit of flip */

                        if (rotates[rotateChoiceIndex].opFunction[1] == flips[f].opFunction[0] ||
                                rotates[rotateChoiceIndex].opFunction[1] == flips[f].opFunction[1])
                                flipChoiceIndex = f;
        /* make a note of which OpUnit has the matching OpFunction */
                }
        }

/*      Determine Direction and Pattern of operations */

        orderString = DetermineOrder(theDoc, OP_SUBJECTIVE, firstOp, OpQdGp);
        flipOrderString = rotateOrderString = orderString;

/*      Find place to start in orderString.  The string is set up so we can start at any
        point and continue with the next three OpQuad operations.
*/

        for (i=0; i<=7; ++i)
                if (orderString[i] == flipChoiceIndex+'1') {          /* find the starting flip OpUnit in the
orderString */
                        indexIntoFlipStr = i;                                  /* save index into the
orderString for the flip opQuad functions */
                        break;
                }

                for (i=0; i<=7; ++i)
                        if (orderString[i] == rotateChoiceIndex+'1') {         /* find the starting rotate OpUnit in
the orderString */
                                indexIntoRotateStr = i;                                   /* save index
into the orderString for the rotate opQuad functions */
                                break;
                        }

        if (OpQdGp->OpGroup == OP_B) {                                              /* must change the
"slave" (second) OpQuad opOrder if we are in OP_B */
                if (FlipFirst(theDoc, OP_SUBJECTIVE)) {                      /* if flip first, need to
adjust the  rotates orderString */
                        rotateOrderString = DetermineOpBSlaveOrder(theDoc, orderString, OpQdGp, indexIntoFlipStr,
indexIntoRotateStr);
                        indexIntoRotateStr = 0;                                              /* clear this
for our "special" order string */
                }
                else {
        /* if rotate first, need to adjust the flips "orderString" */
                        flipOrderString = DetermineOpBSlaveOrder(theDoc, orderString, OpQdGp, indexIntoRotateStr,
indexIntoFlipStr);
                        indexIntoFlipStr = 0;                                                /* clear this
for our "special" order string */
                }
        }
        else {
        /* OP_A */
                if (FlipFirst(theDoc, OP_SUBJECTIVE)) {                      /* if flip first, need to
adjust the  rotates orderString */
                        rotateOrderString = DetermineOpASlaveOrder(theDoc, orderString, indexIntoRotateStr);
                        indexIntoRotateStr = 0;                                              /* clear this
for our "special" order string */
                }
                else {
        /* if rotate first, need to adjust the flips "orderString" */
                        flipOrderString = DetermineOpASlaveOrder(theDoc, orderString, indexIntoFlipStr);
                        indexIntoFlipStr = 0;                                                /* clear this
for our "special" order string */
                }
        }


/*  Assign the operations for Flips and Rotates to the levels at all resolutions. */

        for (lev=ELEM; lev>=CLASS; --lev) {
                                /* starting at the element level and going to the Class level . . . */
                short s_lev;
                for (res=lev+1, s_lev=S_ELEM, f=indexIntoFlipStr+startAdj[lev];  res>=CLASS_RES;  --res, ++s_lev, ++f)
{       /* starting at element resolution and going to the Class resolution . . . */
                        assert(flips[flipOrderString[f]-'1'].levelUsed[s_lev] == 0);
                        flips[flipOrderString[f]-'1'].levelUsed[s_lev] = lev+1;
        /* assign the order to execute the Flip OpUnit OpFunctions based on the flipOrderString */
                }

                for (res=lev+1, s_lev=S_ELEM, r=indexIntoRotateStr+startAdj[lev];  res>=CLASS_RES;  --res, ++s_lev,
++r) {
                        assert(rotates[rotateOrderString[r]-'1'].levelUsed[s_lev] == 0);
                        rotates[rotateOrderString[r]-'1'].levelUsed[s_lev] = lev+1;                    /*
assign the order to execute the Rotate OpUnit OpFunctions based on the rotateOrderString */
                }

/*      Build opAddr.  This is the address that is used to build the addresses for the justification,
        for the execution of the operations.
*/
```

```
/*  printf("lev = %d, flips[%d].opFunction = %s, rotates[%d].opFunction = %s, Flipfirst = %d.\n", lev,
flipOrderString[indexIntoFlipStr+startAdj[lev]]-'1', flips[flipOrderString[indexIntoFlipStr+startAdj[lev]]-
'1'].opFunction, rotateOrderString[indexIntoRotateStr+startAdj[lev]]-'1',
rotates[rotateOrderString[indexIntoRotateStr+startAdj[lev]]-'1'].opFunction, FlipFirst(theDoc, OP_SUBJECTIVE)); */
                if (lev < ELEM)                                                                          /*
already done for ELEM level! */
                        opAddr[lev] = whereOpsStart(theDoc, flips[flipOrderString[indexIntoFlipStr+startAdj[lev]]-
'1'].opFunction,

rotates[rotateOrderString[indexIntoRotateStr+startAdj[lev]]-'1'].opFunction, OP_SUBJECTIVE);
        }

/*      Now set execution order for CHILDREN.  Start by finding the initial operation at the element level. */

        if (OP_DetermineQuadLink(theDoc, OP_SUBJECTIVE) == OP_A) {      /* OpQuad A (flips) is linked with children */
                for (i=3; i>=0; --i)                                                                     /*
move down the resolutions ... */
                        for (f=0;  f<=3;  ++f)                                                           /*
...for each operation  */
                                if (flips[f].levelUsed[i] == ELEM_LEV)                         /* if ELEM_LEV
resolution found (the smallest in the subjective Justification, ...) */
                                        flips[f].childLink = i;                                          /*
set the childLink */
        }
        else {
                /* OpQuad B (rotates) is linked with children */
                for (i=3; i>=0; --i)                                                                     /*
same as above loop */
                        for (r=0;  r<=3;  ++r)
                                if (rotates[r].levelUsed[i] == ELEM_LEV)
                                        rotates[r].childLink = i;
        }

#if 0
        strcpy(tmpAddr, curAddr);                                                                /* FOR THE
SUBJECTIVE APPRECIATIONS */
        for (i=ELEM; i>=CLASS; --i) {
                theUnit = Addr2Item(theSC, tmpAddr);
                /* get the pointer to the unit in the element position in the SuperClass */
                if (i==ELEM)
                        Appreciation[AP_MAIN].ap[kProblem] = theUnit->semVal;
        /* stuff the index into the semantic value table into the appreciations structure */
                else if (i==VAR)
                        Appreciation[AP_MAIN].ap[kRange] = theUnit->semVal;
        /* stuff the index into the semantic value table into the appreciations structure */
                else if (i==TYPE)
                        Appreciation[AP_MAIN].ap[kConcern] = theUnit->semVal;
        /* stuff the index into the semantic value table into the appreciations structure */
                else
                        Appreciation[AP_MAIN].ap[kDomain] = theUnit->semVal;
        /* stuff the index into the semantic value table into the appreciations structure */
                tmpAddr[i] = '0';
                if (i>CLASS)
                        tmpAddr[i-1] = opAddr[i-1];
                                /* adjust address based on the OpQd operations */
        }

        if (justOrder != FIRSTJUST)
                printf("'Final' address before execution is: '%s' (%s)\n",curAddr,Addr2PathString(theSC, curAddr,
pathString, ALL_LEVELS));
#endif

}



/* ------------------------------------------------------------------------
        FUNCTION:       whereOpsStart
        Purpose:        Determine the intersection of the Flip and Rotate operation
                                for building the address.
        Accepts:        theFlipStr and theRotateStr (the operation strings).
        Returns:        The character that represents the beginning position of the
                                operations that intersect ('1' to '4').  ASSERT if not found!
------------------------------------------------------------------------ */
static short whereOpsStart(DRDoc* theDoc, char *theFlipStr, char *theRotateStr, enum OPJUSTS justification)
{
        if ((FlipFirst(theDoc, OP_OBJECTIVE) && justification == OP_OBJECTIVE) ||
             (FlipFirst(theDoc, OP_SUBJECTIVE) && justification == OP_SUBJECTIVE)) {        /* we are flipping
first */
                if (theFlipStr[0] == theRotateStr[0])                                           /* if the first digit
of the flip matches the first digit of the rotate... */
                        return(theFlipStr[1]);                                                           /*
return the value of the second digit of the flip -- the place the flip would begin in order to intersect at the first
digit */
                else
                        if (theFlipStr[1] == theRotateStr[0])                                    /* the second digit of
the flip is the same as the first digit of the rotates */
                                return(theFlipStr[0]);                                                   /*
return the value of the first position of the flip operation */
        }
        else {
                /* we are rotatiing first */
                if (theRotateStr[1] == theFlipStr[0] ||
                        theRotateStr[1] == theFlipStr[1])                                                /* if the
second digit of the rotate matches the first or second digit of the flip... */
                        return(theRotateStr[0]);                                                 /* return the
value of the first digit of the rotate -- the place the rotate would begin in order to intersect at the first digit */
        }
        assert(FALSE);
        /* no match */
}


/* ------------------------------------------------------------------------
        FUNCTION:       FlipFirst
        Purpose:        Determine if we are flipping or rotating as first operation.
        Accepts:        whichJustification: OP_OBJECTIVE or OP_SUBJECTIVE.
------------------------------------------------------------------------ */
short FlipFirst(DRDoc* theDoc, enum OPJUSTS justification)
{
        if (justification == OP_OBJECTIVE) {
                if (ACTION)
```

```
                        return (TRUE);                                                                  /* flip first
*/
                else
                        return (FALSE);                                                                 /* DECISION
rotate first */
        }
        else {
                if (DOER)                                                                                       /*
DOER */
                        return (TRUE);                                                                  /* flip first
*/
                else
                        return (FALSE);                                                                 /* BEER
rotate first */
        }
} /* FlipFirst */


/* ------------------------------------------------------------------------
        FUNCTION:       DetermineOrder
        Purpose:        Determine direction of Quad operations.
        Returns:        1 (positive #), direction is clockwise.
                                -1 (negative number), direction is counter-clockwise.
        Note:           Although this function could have been tightened up and
                                further optimized, it was left to be as clear as possible.
-------------------------------------------------------------------------- */
enum    { OP_CLOCKWISE_C=1, OP_COUNTERWISE_C=-1, OP_CLOCKWISE_Z=2, OP_COUNTERWISE_Z=-2 };
enum    { OP_CIRCLE=1, OP_Z=2 };
enum    { OP_CLOCKWISE=1, OP_COUNTERWISE=-1 };

static char* DetermineOrder(DRDoc* theDoc, enum OPJUSTS justification, short theChoice, OpQuadGroup *OpQdGp)
{
        static char *clockwiseCirOrder          = "12431243124312431243";
        static char *counterwiseCirOrder    = "13421342134213421342";
        static char *clockwiseZorder            = "12341234123412341234";
        static char *counterwiseZorder          = "14321432143214321432";
        short subDirection=0;
        short objDirection=0;
        short subPattern=0;
        short objPattern=0;
        short subOrder=0;
        short objOrder=0;
        short firstOp=theChoice;
        static short circularDirection[4] = { 1, -1, -1, 1 };                                   /* theChoice is used
as an index into this table -- 1 means clockwise circle, -1 means counterwise circle */
        static short zPatternDirection[4] = { 1, -1, 1, -1 };                                   /* theChoice is used
as an index into this table -- 1 means clockwise Z, -1 means counterwise Z */

/*      determine SUBJECTIVE order or pattern */
        if (MALE)
                subOrder = (STEADFAST) ? OP_CLOCKWISE_C : OP_COUNTERWISE_C;             /* subjective Male is OpGroup
"A" */
        else
                subPattern = (STEADFAST) ? OP_Z : OP_CIRCLE;                                    /* subjective
Female is OpGroup "B" */

        if (!subOrder) {
                /* if we haven't determined the order yet... */
                if (subPattern == OP_CIRCLE)
        /* if the subjective pattern is a circle... */
                        subDirection = circularDirection[firstOp];                              /* the
direction will be based what theChoice is (see declaration of circularDirection above) */
                else
                        subDirection = zPatternDirection[firstOp];                              /* the
direction will be based what theChoice is (see declaration of zPatternDirection above) */

                subOrder = subPattern * subDirection;                                                   /*
multiply the pattern times the direction to get the subjective order */
        }
        else
                subDirection = (STEADFAST) ? OP_CLOCKWISE : OP_COUNTERWISE;             /* make sure subDirection is
set -- it's used to determine objOrder */

        assert(subOrder);
        if (justification == OP_SUBJECTIVE) {
                switch (subOrder) {
                        case OP_CLOCKWISE_C:        return (clockwiseCirOrder);                 /* subOrder =
1 */
                        case OP_COUNTERWISE_C:      return (counterwiseCirOrder);       /* subOrder = -1 */
                        case OP_CLOCKWISE_Z:        return (clockwiseZorder);           /* subOrder =  2 */
                        case OP_COUNTERWISE_Z:    . return (counterwiseZorder);                 /* subOrder =
-2 */
                }
        }


/*      determine OBJECTIVE order or pattern */

        if (OpQdGp->OpGroup == OP_A) {
        /* we're not looking for the subjective -- we're looking for the objective order for OpGroup A */
                if (FEMALE) {
                        if (STEADFAST)
                                objOrder = (GOOD) ? OP_CLOCKWISE_C : OP_COUNTERWISE_C;          /* if
Female/Steadfast/Good the objective order is a clockwise circle;  if Female/Steadfast/Bad the order is a counterwise
circle */
                        else
                                objOrder = (GOOD) ? OP_COUNTERWISE_C : OP_CLOCKWISE_C;          /* if
Female/Change/Good the order is a counterwise circle; if Female/Change/Bad the objective order is a clockwise circle */
                }
                else {
                                /* MALE (used to be here as DOER; 3/3/93) */
                        if (GOOD)
                                objOrder = OP_CIRCLE * subDirection;                                            /*
if Male/Good the objective order is a circle going the same direction as the subjective justification */
                        else
                                objOrder = OP_CIRCLE * -subDirection;                                           /*
if Male/Bad the objective order is a circle going the opposite direction as the subjective justification */
                }
        }
        else {
                                /* we're looking for the objective order for OpGroup "B" */
```

```
		if (MALE) {
					/* we don't have enough information to determine the order, just the pattern */
			if (STEADFAST)
					objPattern = (GOOD) ? OP_Z : OP_CIRCLE;						/*
if Male/Steadfast/Good the pattern will be a Z; if Male/Steadfast/Bad the pattern will be a circle */
			else
					objPattern = (GOOD) ? OP_CIRCLE : OP_Z;						/*
if Male/Change/Good the pattern will be a circle: if Male/Change/Bad the pattern will be a Z */
		}
		else {
					/* FEMALE (used to be here as BEER; 3/3/93) */
			if (GOOD)
					objPattern = subPattern;
	/* if Female/Good the objective pattern is the same pattern as the subjective justification */
			else
					objPattern = (subPattern == OP_CIRCLE) ? OP_Z : OP_CIRCLE;	/* if Female/Bad the
objective pattern is the the opposite pattern as the subjective justification */
		}

		if (!objOrder) {
		/* if we haven't determined the order yet... */
			if (objPattern == OP_CIRCLE)
	/* if the sobjective pattern is a circle... */
					objDirection = circularDirection[firstOp];				/* the
direction will be based what theChoice is (see declaration of circularDirection above) */
			else
					objDirection = zPatternDirection[firstOp];				/* the
direction will be based what theChoice is (see declaration of zPatternDirection above) */

			objOrder = objPattern * objDirection;							/*
multiply the pattern times the direction to get the subjective order */
		}
	}

	assert(objOrder);

	switch (objOrder) {
		case OP_CLOCKWISE_C:		return (clockwiseCirOrder);			/* subOrder =  1 */
		case OP_COUNTERWISE_C:		return (counterwiseCirOrder);		/* subOrder = -1 */
		case OP_CLOCKWISE_Z:		return (clockwiseZorder);			/* subOrder =  2 */
		case OP_COUNTERWISE_Z:		return (counterwiseZorder);			/* subOrder = -2 */
	}
	assert(FALSE);
}


/* -----------------------------------------------------------------------
	FUNCTION:		DetermineOpASlaveOrder
	Purpose:		Determine direction of Seconday "Slave" Quad operations
					for Subjective OP_B OpQuads.
	Returns:		Pointer to the slaveOrderStr.
----------------------------------------------------------------------- */

static char* DetermineOpASlaveOrder(DRDoc* theDoc, char *orderString, short slaveIndex)
{
	char *slaveOrderStr = "00000";
	int i;
	int reverseIndex;

	if (FlipFirst(theDoc, OP_SUBJECTIVE)) {
		for (i=0; i<=3; ++i)
			slaveOrderStr[i] = orderString[slaveIndex+i];
	}
	else {
		reverseIndex = slaveIndex+8;
		for (i=0; i<=3; ++i)
			slaveOrderStr[i] = orderString[reverseIndex-i];
	}
	return(slaveOrderStr);
}


/* -----------------------------------------------------------------------
	FUNCTION:		DetermineOpBSlaveOrder
	Purpose:		Determine direction of Seconday "Slave" Quad operations
					for Subjective OP_B OpQuads.
	Returns:		Pointer to the slaveOrderStr.
----------------------------------------------------------------------- */
static char* DetermineOpBSlaveOrder(DRDoc* theDoc, char *orderString, OpQuadGroup *OpQdGp, short masterIndex, short
slaveIndex)
{
	char *slaveOrderStr = "0000";
	OpQuadPtr flips = OpQdGp->flips;
	OpQuadPtr rotates = OpQdGp->rotates;

	slaveOrderStr[0] = orderString[slaveIndex];						/* stuff the first operation
into the slaveOrderString */
	slaveOrderStr[1] = Relations[COMPANION][slaveOrderStr[0]-'1']+'0';	/* stuff the companion operation into
the second spot in the orderString */


	/* Determine which of the remaining two available operations line up with the
	third "master" operation */

	if (FlipFirst(theDoc, OP_SUBJECTIVE)) {
					/* we are flipping first */
		if (rotates[Relations[DEPENDENT][slaveOrderStr[0]-'1']-1].opFunction[0] ==		/* if the
first digit of the OpFunction of the rotation that is in the dependent position to the first rotation operation equals...
*/
						flips[orderString[masterIndex+2]-'1'].opFunction[0] ||
			/* ...the first digit of the third Flip OpFunction... */
			rotates[Relations[DEPENDENT][slaveOrderStr[0]-'1']-1].opFunction[0] ==
					flips[orderString[masterIndex+2]-'1'].opFunction[1])			/*
...or the second digit of the third Flip OpFunction... */
				slaveOrderStr[2] = Relations[DEPENDENT][slaveOrderStr[0]-'1']+'0';		/*
...then we have found the third rotation and must stuff its index into the slaveOrderString */

		else
				slaveOrderStr[2] = Relations[DEPENDENT][slaveOrderStr[1]-'1']+'0';		/*
otherwise it MUST be the only remaining rotation available (the dependent of the second rotation) and we must stuff ITS
index into the slaveOrderString */
```

```
        }
        else {
                                                                    /******** WE ARE TOTATING FIRST *********/
                if (rotates[Relations[DEPENDENT][slaveOrderStr[0]-'1']-1].opFunction[1] ==       /* if the second digit
of the OpFunction of the rotation that is in the dependent position to the first rotation operation equals... */
                                        flips[orderString[masterIndex+2]-'1'].opFunction[0] ||
                /* ...the first digit of the third Flip OpFunction... */
                        rotates[Relations[DEPENDENT][slaveOrderStr[0]-'1']-1].opFunction[1] ==
                                flips[orderString[masterIndex+2]-'1'].opFunction[1])                  /*
...or the second digit of the third Flip OpFunction... */
                        slaveOrderStr[2] = Relations[DEPENDENT][slaveOrderStr[0]-'1']+'0';            /*
...then we have found the third flip and must stuff its index into the slaveOrderString */

                else
                        slaveOrderStr[2] = Relations[DEPENDENT][slaveOrderStr[1]-'1']+'0';            /*
otherwise it MUST be the only remaining flip available (the dependent of the second flip) and we must stuff ITS index
into the slaveOrderString */
        }

        slaveOrderStr[3] = Relations[COMPANION][slaveOrderStr[2]-'1']+'0';                            /*
stuff the companion of the third operation into the fourth spot in the orderString */
        return(slaveOrderStr);
}


/* $Log:          opquad.cc,v $
Revision 1.6  93/05/26  19:46:48  stephen
Windows fixes.

Revision 1.5  93/05/03  16:39:23  stephen
Changed address setup so calling Justification works.

Revision 1.4  93/04/24  14:09:04  chris
Changed appreciations structure to array of 10 shorts.

Revision 1.3  93/04/13  16:04:37  chris
Add justification material from .c files.

Revision 1.2  93/04/06  19:42:26  stephen
 [3First General Revisions

Revision 1.1  93/03/31  22:41:23  stephen
Initial revision

 */
```

```
/* -----------------------------------------------------------------------
	OPQUAD.H
	Dramatica Model Relationships
	Copyright (C) 1993 Screenplay Systems Inc.
	Revised:	$Id$
----------------------------------------------------------------------- */

#ifndef __OPQUAD__
#define __OPQUAD__

#include "apprec.h"

class DRDoc;

enum OPERATION	{ OP_FLIP, OP_ROTATE, OP_CHILDREN };
enum OPTYPE	{ OP_DYNAMIC, OP_COMPANION, OP_ZPATTERN, OP_NPATTERN, OP_NONE};
enum OPGROUP	{ OP_A, OP_B };
enum OPKIDTYPE	{ OP_BOTHKIDS, OP_FLIPKIDS, OP_ROTKIDS, OP_NOKIDS };
enum OPJUSTS	{ OP_OBJECTIVE, OP_SUBJECTIVE };		/* types of justification functions */
enum JUSTORDER	{ FIRSTJUST, SECONDJUST };

/* -----------------------------------------------------------------------
	The OpUnit is the information contained within an OpQuad.
----------------------------------------------------------------------- */

typedef struct {
	enum OPERATION	operation;		/* Operation: Flip, Rotate, Children */
	enum OPTYPE		OpType;		/* What type of Flip, Rotate? (dynamic,
companion, Z or N) */
	short			OpPartner;		/* the dynamic partner of the OpQuad operation */
	short			childLink;		/* remember the linked OpQuad unit used with a
children operation */
	short			levelUsed[4];		/* Indicates which level this operation has been used on
*/
	char			opFunction[8];		/* operand of OpType: "xx" or "xxxx" for flip/rotates,
"0123" for children */
	short			matched[2];		/* [n] is TRUE if matched first digit of dynamic
pair */
	short			excluded;		/* TRUE if this operation is excluded at this
level */
	short			OpChar;		/* Temp for printing:  flips '\', '/', '+' for
pos companion pair, '-' for neg companion pair -- rotates '1', '2', '3', '4' */
} OpUnit;


/* -----------------------------------------------------------------------
	An OpQuad is made up of four OpUnits.
----------------------------------------------------------------------- */

typedef OpUnit		OpQuad[4];
typedef OpUnit*		OpQuadPtr;


/* -----------------------------------------------------------------------
	An OpQuadGroup is made up of three OpQuads.
----------------------------------------------------------------------- */

typedef struct {
	short	OpGroup;		/* records if we have OpGroup A or B */
	OpQuad	flips;
	OpQuad	rotates;
	OpQuad	children;
} OpQuadGroup;


	void	OP_SelectOpQuads(DRDoc* theDoc, enum OPJUSTS whichJustification, OpQuadGroup *OpQdGp);
	OpQuad*	OP_InitOpQuads(OpQuadPtr theOpQuad, enum OPGROUP OpSet, enum OPTYPE OpType);
	short	OP_DetermineQuadLink(DRDoc* theDoc, enum OPJUSTS justification);
	void	DetermineObjectiveChoices(DRDoc* theDoc, SuperClass *theSC, OpQuadGroup *OpQdGp, AddrText curAddr,
AddrText opAddr, enum JUSTORDER justOrder);
	short	PromptForChoices(AddrPtr curAddr, short *semChoicesArray, short theLevel);
	void	DetermineSubjectiveChoices(DRDoc* theDoc, SuperClass *theSC, OpQuadGroup *OpQdGp, AddrText curAddr,
AddrText opAddr, enum JUSTORDER justOrder);
	short	FlipFirst(DRDoc* theDoc, enum OPJUSTS whichJustification);

#endif /* __OPQUAD__ */


/* $Log:		opquad.h,v $
 * Revision 1.3  93/05/03  16:39:30  stephen
 * Changed address setup so calling Justification works.
 *
 * Revision 1.2  93/04/13  16:04:41  chris
 * Add justification material from .c files.
 *
 * Revision 1.1  93/03/31  22:41:38  stephen
 * Initial revision
 *
 */
```

```
/************************************************************************
        OUTLINE.CC
        Implementation Outline view class
        (c) 1993 Screenplay Systems
        Authors:        S. Greenfield & C. Huntley
        Created:        May 4, 1993
        Revised:        $Id$
************************************************************************

*/

#include "tappl.h"
#include "appdlogs.h"
#include "graphics.h"
#include "tview.h"
#include "printx.h"

#include "ptext.h"
#include "dramatic.h"
#include "document.h"

#include "structs.h"
#include "address.h"
#include "apprec.h"
#include "semtable.h"
#include "relation.h"
#include "textwrap.h"
#include "subtext.h"
#include "storypnt.h"
#include "repwind.h"
#include "outline.h"

#pragma segment outline


char *stStr = "the Objective Story Line";
char *mcStr = "(CNN(MC,NM))";
char *ocStr = "(CNN(OC,NM))";
char *plStr = "the Subjective Story Line";

char *apprecTbl[4];


/* -----------------------------------------------Stephen---03/19/93---
        OutlineView::Constructor
---------------------------------------------------------------------- */
OutlineView::OutlineView(ItemList* pParent, vw_flags vflags, const GLRect *extent, it_flags iflags, const GLColor *color)
            : TView(pParent, vflags, extent, iflags, color),
                fOutlineTW (NULL),
                fPrinting (false),
                fDisplayTutorial (false),
                fDisplayStorytelling (false),
            fInitedView (false)
{
        init_scrollers();

        fWindow         = (RepWindow*)pParent->GetParent();
        fApp            = (Dramatica*)AP_Data()->fApp;
        fAppPFMFile = fApp->GetPFMFile();
        fDoc            = (DRDoc*)fApp->ActiveWindow()->GetDoc();
        assert(fDoc);
        theDoc          = fDoc;                                         // theDoc is actually a class data
member.  This was done so appreciations macros will work
        fResponses      = fDoc->GetRESP();
        fStellingPT = fDoc->GetSTEL();

        semDspStyle = 1;                                        // style for semantic term display

        GLSetRect(&fIconRect[0], O_ITOP, O_IOFF, O_ITOP+O_ISZ, O_IOFF+94);                      // icon in
ruler for column 1
        GLSetRect(&fIconRect[1], O_ITOP, O_IOFF+104, O_ITOP+O_ISZ, O_IOFF+104+80);              // icon in ruler for
column 2
        GLSetRect(&fIconRect[2], O_ITOP, O_ISZ, O_ITOP+O_ISZ, O_ISZ*2);                                 //
icon in ruler for temp
        GLSetRect(&fIconRect[3], O_ITOP, (O_ISZ*2)+4, O_ITOP+O_ISZ, (O_ISZ*3)+4);               // icon in ruler for
temp
        GLSetRect(&fIconRect[4], O_ITOP, (O_ISZ*3)+8, O_ITOP+O_ISZ, (O_ISZ*4)+8);               // icon in ruler for
temp
        GLSetRect(&fIconRect[5], O_ITOP, (O_ISZ*4)+12, O_ITOP+O_ISZ, (O_ISZ*5)+12);             // icon in ruler for
temp
        GLSetRect(&fIconRect[6], O_ITOP, (O_ISZ*5)+16, O_ITOP+O_ISZ, (O_ISZ*6)+16);             // icon in ruler for
temp


        apprecTbl[0] = stStr;
        apprecTbl[1] = mcStr;
        apprecTbl[2] = ocStr;
        apprecTbl[3] = plStr;

#ifdef TOOLBOX
        fFont           = 21;                           // Helvetica
#else
        fFont           = GL_GENEVA;            // For Windows
#endif
        fFontSize       = 12;
        fFace           = GL_NORMAL;
        PText*          repPrefsPT = fWindow->GetRepPrefsPT();
        fDoc->GetFontPref(repPrefsPT, "Rep", &fFont, &fFontSize, &fFace);

//      SetTopMargin(40);                               // Number of pixel for ruler area
}


/* -----------------------------------------------Stephen---03/19/93---
        OutlineView::~OutlineView - Destructor
---------------------------------------------------------------------- */
OutlineView::~OutlineView(void)
{
        destruct_outline_data();

}
```

```
/* -----------------------------------------------Stephen---03/19/93---
        OutlineView::destruct_outline_data
------------------------------------------------------------------------- */
void OutlineView::destruct_outline_data(void)
{
        fOutlineStr.SetAllocSize(0);
        delete fOutlineTW;
        fOutlineTW = NULL;
}


/* -----------------------------------------------------------------------
        OutlineView::init_outline_data - Sets up our data.  This function
        assumes that the user has already set the fOutlineStr STRING class
        to contain the desired report.
------------------------------------------------------------------------- */
void OutlineView::init_outline_data(void)
{
//      fApp->PushCursor(AP_WATCH_CURS);

        fpGraphEnv->Use();
        fpGraphEnv->SetTextAttr(fFont, fFontSize, fFace);

        GLRect   textRect;
        GLRect viewExtent = GetBounds();
        GLSetRect(&textRect, 0, viewExtent.left, 0, viewExtent.right-30);
        fOutlineStr.Use();
        char* cp = fOutlineStr.StrPtr();
        if (fOutlineTW)
                delete fOutlineTW;
        fOutlineTW = new TextWrap(fDoc, fpGraphEnv, &textRect, cp, fFont, fFontSize, fFace);
        fOutlineStr.Unuse();
        SetVLineSize(fOutlineTW->GetLineHeight());
        DocumentResize();
//      fApp->PopCursor();
        fpGraphEnv->Unuse();
} /* OutlineView::init_outline_data */


/* -----------------------------------------------Stephen---03/19/93---
        OutlineView::draw_view - Does the bulk of drawing our StoryPoints
        window.
------------------------------------------------------------------------- */
void OutlineView::draw_view (const VwPaneUpdateInfo& updateInfo)
{

        TGraphEnv*      pMyGraphEnv;

        if (fPrinting) {
                fpPrintMgr      = AP_App()->GetPrintInfo();
                pMyGraphEnv     = fpPrintMgr->GetPrinterEnv();
        }
        else {
                pMyGraphEnv = fpGraphEnv;
                fpPrintMgr      = NULL;
        }

        assert(pMyGraphEnv->IsInUse());


        LgPoint         VwOrigin = *updateInfo.InqOffset();        // local coordinates for the view's origin

        gl_coord_t      X                       = (gl_coord_t)(VwOrigin.x);
        gl_coord_t      Y                       = (gl_coord_t)(VwOrigin.y);
        gl_coord_t      rowHeight       = 10;

        gl_coord_t      topMarPos = 40;                          // This is the bottom line of the ruler
area
        GLRect viewExtent = GetBounds();

        // DRAW REST OF VIEW

        pMyGraphEnv->SetTextAttr(fFont, fFontSize, fFace);

        gl_coord_t      rowY                    = 0-Y;
        gl_coord_t      totalHeight             = 0;
        gl_coord_t      updateTop;
        gl_coord_t      updateBot;

        //      Clip out top margin area from update region, so we don't try to draw rows there

        GLPoint         marginLineLoc;
        LgPoint         marginLineDoc;
        marginLineLoc.y = topMarPos + 1;                         // Local top margin of 0 is the top of the view
        marginLineLoc.x = 0;
        loc_to_doc(marginLineLoc, &marginLineDoc);

        LgRect myUpdateRect;
        updateInfo.InqDocRgn()->GetRect(&myUpdateRect);
        myUpdateRect.top                = MAX(myUpdateRect.top, marginLineDoc.y);
        myUpdateRect.bottom             = MAX(myUpdateRect.top, myUpdateRect.bottom);

        updateTop       = (gl_coord_t)(myUpdateRect.top);
        updateBot       = (gl_coord_t)(myUpdateRect.bottom);

        assert(fOutlineTW);
        totalHeight = fOutlineTW->Draw(pMyGraphEnv, &updateInfo, fpPrintMgr, rowY, 5-X);

#if 0
        if (!fInitedView) {
                SetVLineSize(rowHeight);
                DocumentResize();
                fInitedView = true;
        }
#endif

} /* OutlineView::draw_view */

/* -----------------------------------------------------------------------
        OutlineView::ExportReport - Asks the user the name of a file then
        dumps the current TextWrap into an ASCII file
------------------------------------------------------------------------- */
```

```
void OutlineView::ExportReport(void)
{
	GN_FileRef		fRef;
	FILE *			exportFile;
	memset(&fRef, '\0', sizeof(fRef));
	if (AP_PutFile(fApp->GetDocFileTypes(), &fRef) == kOkBtn) {
		strcpy(fRef.mode, "w+t");						// Make sure we go out text
mode
		err_t theErr = GN_Open(&fRef, &exportFile);
		assert(theErr == NOERR);
		fpGraphEnv->Use();
		fOutlineTW->Export(exportFile, fpGraphEnv, 0, 0);
		fpGraphEnv->Unuse();
		theErr = GN_Close(exportFile);
		assert(theErr == NOERR);
	}

} /* OutlineView::ExportReport */



/************************************************************************
				S T A R T   O F   R E P O R T   C O D E   S E C T I O N
************************************************************************/

#if 1
/* ------------------------------------------------------------------------
	FUNCTION:		OutlineView::buildTypeVars
	Purpose:		Build the string of the Types and quads of Variations
				for a given throughline for the outline text of the story
				(one line) outline.
------------------------------------------------------------------------ */

void OutlineView::buildTypeVars(short whichLine)
{
	Unit*			typeUnit;
	short			t;
	AddrText		typeAddr;
	AddrText		varAddr;

	char			tmpStr[500];
	char*			introStr[4];
	char*			andStr;

	strcpy(typeAddr, EMPTY_ADDR);
	strcpy(varAddr, EMPTY_ADDR);

	SuperClass* mySC		= fDoc->GetSuperClass(kMySC);
	SuperClass* just1SC = fDoc->GetSuperClass(kJust1SC);
	SuperClass* just2SC = fDoc->GetSuperClass(kJust2SC);

	if (MALE)
		*mySC = *just2SC;
	else
		*mySC = *just1SC;

	andStr = "";
	introStr[0] = "In act one,";
	introStr[1] = "Act two concentrates on";
	introStr[2] = "Act three focuses on";
	introStr[3] = "And act four illustrates";


	hdl_t s1Hdl			= MM_ALLOC_INIT(1000, mm_no_flags, 0, "Temp Strings", NULL);
	char* s1			= (char*)MM_USE(s1Hdl);

	varAddr[CLASS] = SEMTBL_ADDRESS(fDoc->GetApprValByIndex(MakeApprIndex(whichLine, kType1)))[CLASS];
	for (t=0; t<=3; ++t) {
		varAddr[TYPE] = t+'1';
		if (t == 0)
			andStr = "";
		else
			andStr = "and ";
		semval_t typesSemVal = fDoc->GetApprValByIndex(MakeApprIndex(whichLine, kType1+t));
		typeUnit = Addr2Item(mySC, SEMTBL_ADDRESS(typesSemVal));					/*
get the pointer to the domain unit in the first position in the SuperClass */
		sprintf(tmpStr," %s \"(SDF(%hd))\" ((SNF(%hd)) %sis explored in terms of ", introStr[t], typesSemVal,
typesSemVal, andStr);
		fOutlineStr.CatStr(tmpStr);
		buildVarQuad(mySC, varAddr);
		fOutlineStr.CatStr(".");
	}
	MM_UNUSE(s1Hdl);
	MMFree(s1Hdl);

	fDoc->SaveSuperClass(kMySC, kSaveSC);
	fDoc->SaveSuperClass(kJust1SC, kNoSaveSC);
	fDoc->SaveSuperClass(kJust2SC, kNoSaveSC);

}

#endif


#if 0

/* ------------------------------------------------------------------------
	FUNCTION:		OutlineView::substituteStelling
	Purpose:		Get the substituted text for a specific storytelling item.
------------------------------------------------------------------------ */

bool_t OutlineView::substituteStelling(char *theItem, char *stellingText)
{
	byte_cnt theLen			= 0;
	SubText* SbTxt			= NULL;
	char tmpStr1[1000];
	char *cp;

	sprintf(tmpStr1,"(STF(%s))", theItem);
	SbTxt = new SubText(fDoc, tmpStr1);
	assert (SbTxt);
```

```
	cp = SbTxt->DoSubstitution(&theLen);
	if (theLen>0) {
		strcpy(stellingText, cp);
		delete SbTxt;
		return(true);
	} else {
		stellingText[0] = 0;
		delete SbTxt;
		return(false);
	}
}
#endif



/* -------------------------------------------------CNH---02/08/94---
	OutlineView::os_theme_report  - builds a report for the objective
									story thematic material.
------------------------------------------------------------------------ */
void OutlineView::os_theme_report(void)
{
	short i;
	char tmpStr[300];
	AddrText tmpAddr;
	char *varStr[23];											// an array
of character string pointers used to store the "mix-n-match" strings for the last two paragraphs

	Unit *dynRangeUnit;											// dynamic
pair of the thematic range
	Unit *comRangeUnit;											// companion
pair of the thematic range
	Unit *depRangeUnit;											// dependent
pair of the thematic range

	short dynSemVal = 0;										// semVal of the
dynamic pair of the thematic range
	short comSemVal = 0;										// semVal of the
companion pair of the thematic range
	short depSemVal = 0;										// semVal of the
dependent pair of the thematic range

	bool_t tutorialON = GetTutorialBtn();

	SuperClass* mySC		= fDoc->GetSuperClass(kMyRefSC);

	semval_t storyRange = fDoc->GetApprValByIndex(kApprSTRng);
	GetPartner(INDEPENDENT, DYNAMIC, SEMTBL_ADDRESS(storyRange), tmpAddr);
	dynRangeUnit = Addr2Item(mySC, tmpAddr);				/* get the pointer to the dynamic pair of the
range */
	dynSemVal = dynRangeUnit->semVal;						// semVal of the dynamic pair of the
thematic range

	GetPartner(INDEPENDENT, COMPANION, SEMTBL_ADDRESS(storyRange), tmpAddr);
	comRangeUnit = Addr2Item(mySC, tmpAddr);				/* get the pointer to the companion pair of the
range */
	comSemVal = comRangeUnit->semVal;						// semVal of the companion pair of the
thematic range

	GetPartner(INDEPENDENT, DEPENDENT, SEMTBL_ADDRESS(storyRange), tmpAddr);
	depRangeUnit = Addr2Item(mySC, tmpAddr);				/* get the pointer to the dependent pair of the
range */
	depSemVal = depRangeUnit->semVal;						// semVal of the dependent pair of the
thematic range


	do_title("Objective Story Thematic Report for \"{SDI(Title)}\"");

	if (tutorialON) {
		fOutlineStr.CatStr("The objective theme describes how the objective characters see ");
		fOutlineStr.CatStr("the nature of the story's problem and its ramifications.  ");
		fOutlineStr.CatStr("In a sense, the objective theme classifies the effects of the problem.  ");
		fOutlineStr.CatStr("This is a strictly neutral classification, unlike the ");
		fOutlineStr.CatStr("subjective theme in which the author takes a stand on the issues.");
		doubleSpace();

		fOutlineStr.CatStr("Perhaps the most basic examination of a story's problem is to ");
		fOutlineStr.CatStr("determine if it exists because of the environment or ");
		fOutlineStr.CatStr("because of a character or characters.  ");
		fOutlineStr.CatStr("This is governed by the problem's Domain.  ");
		fOutlineStr.CatStr("As its name indicates, the Domain describes ");
		fOutlineStr.CatStr("the location in which the problem resides.  ");
		fOutlineStr.CatStr("There are four Domains: two that pertain to ");
		fOutlineStr.CatStr("the environment and two that pertain to characters as the source of the problem.
");
		fOutlineStr.CatStr("Universe and Physics are the environmental Domains, ");
		fOutlineStr.CatStr("while Mind and Psychology are character oriented Domains.  ");
		fOutlineStr.CatStr("Another basic aspect of a problem is whether ");
		fOutlineStr.CatStr("it is perceived as a state or a process.  ");
		fOutlineStr.CatStr("In the environmental Domains, Universe is a state (or situation); ");
		fOutlineStr.CatStr("Physics is a process (or activity) that is at the heart of the story's problem.
");
		fOutlineStr.CatStr("For the character Domains, Mind represents a mental ");
		fOutlineStr.CatStr("state (a fixed state of mind) and Psychology indicates ");
		fOutlineStr.CatStr("a problem with a mental process (a manner of thinking).");
		doubleSpace();
	}

	fOutlineStr.CatStr("The Objective Story of \"{SDI(Title)}\" takes place in ");
	fOutlineStr.CatStr("the {SNF(STDom)} Domain, indicating that the problem ");
	fOutlineStr.CatStr("exists because there is something wrong with {SDF(STDom)}.  ");

	if (tutorialON) {
		doubleSpace();
		fOutlineStr.CatStr("Of course, this is a rather broad classification.  ");
		fOutlineStr.CatStr("To get closer to the essence of the problem we ");
		fOutlineStr.CatStr("can examine the objective characters' Concern.  ");
		fOutlineStr.CatStr("The Concern describes the area in which the objective ");
		fOutlineStr.CatStr("characters are most aware of the problem's effects, ");
		fOutlineStr.CatStr("regardless of their position on the issues.  ");
		fOutlineStr.CatStr("In \"{SDI(Title)}\", the objective characters ");
```

```
	} else {
		fOutlineStr.CatStr("Additionally, the objective characters ");
	}

	fOutlineStr.CatStr("are primarily Concerned with {SNF(STCon)}.  ");
	fOutlineStr.CatStr("So, putting it together, the objective characters ");
	fOutlineStr.CatStr("are concerned with {SDF(STDom)} pertaining to {SNF(STCon)}.  ");

	if (tutorialON) {
		doubleSpace();
		fOutlineStr.CatStr("So far, the objective characters are in agreement: ");
		fOutlineStr.CatStr("they are all concerned with the same thing.  ");
		fOutlineStr.CatStr("However, they do not agree on everything.  ");
		fOutlineStr.CatStr("In fact, one of the major differences is ");
		fOutlineStr.CatStr("in the way they deal with their common concern.  ");
		fOutlineStr.CatStr("In \"{SDI(Title)}\", some of the objective ");
	} else {
		fOutlineStr.CatStr("Some of the objective ");
	}

	fOutlineStr.CatStr("characters respond to {SNF(STCon)} with ");
	fOutlineStr.CatStr("{SNF(STRng)} while others respond with {SNF(STRng2)}.  ");
	fOutlineStr.CatStr("Since this is part of the rational argument, ");
	fOutlineStr.CatStr("an author can examine the relative practicality of ");
	fOutlineStr.CatStr("responding to {SNF(STCon)} with {SNF(STRng)} or {SNF(STRng2)} ");
	fOutlineStr.CatStr("by illustrating their effects on ");
	sprintf(tmpStr,"{SNF(%hd)}", comSemVal);				// semVal of the companion pair
of the thematic range
	fOutlineStr.CatStr(tmpStr);
	fOutlineStr.CatStr(" and ");
	sprintf(tmpStr,"{SNF(%hd)}", depSemVal);				// semVal of the dependent pair
of the thematic range
	fOutlineStr.CatStr(tmpStr);
	fOutlineStr.CatStr(".  ");

	if (tutorialON) {
		fOutlineStr.CatStr("The negative side-effects and positive advantages ");
		fOutlineStr.CatStr("of each approach can then be compared, ");
		fOutlineStr.CatStr("allowing an author to indicate that one or the other ");
		fOutlineStr.CatStr("is the most practical approach (from an objective standpoint).  ");
		fOutlineStr.CatStr("In some stories, an author may even choose to ");
		fOutlineStr.CatStr("balance both approaches, forcing the audience to consider the issue for
themselves.");
	}
	doubleSpace();

	fOutlineStr.CatStr("Just because characters happen to find themselves ");
	fOutlineStr.CatStr("on the same side because they share a particular ");
	fOutlineStr.CatStr("approach does not mean they can agree on the essential ");
	fOutlineStr.CatStr("nature of the problem or the best solution.  ");
	fOutlineStr.CatStr("In \"{SDI(Title)}\", some see {SNF(STPbm)} as causing ");
	fOutlineStr.CatStr("the problem and {SNF(STSol)} as the means to resolve it.  ");
	fOutlineStr.CatStr("Others are convinced that {SNF(STFoc)} is at the heart ");
	fOutlineStr.CatStr("of the problem and {SNF(STDir)} will best solve it.");
	doubleSpace();

	fOutlineStr.CatStr("These two areas of disagreement ({SNF(STRng)} vs. {SNF(STRng2)} ");
	fOutlineStr.CatStr("as an approach with {SNF(STSol)} or {SNF(STFoc)} as ");
	fOutlineStr.CatStr("the solution) form four perspectives that conflict ");
	fOutlineStr.CatStr("with each other over the course of the story.  ");
	fOutlineStr.CatStr("Because they are so balanced, they tend to lock up ");
	fOutlineStr.CatStr("like wrestlers and bring the plot to a halt.  ");
	fOutlineStr.CatStr("Fortunately, like a referee, there is a Catalyst ");
	fOutlineStr.CatStr("that moves in to break it up.  ");
	fOutlineStr.CatStr("In \"{SDI(Title)}\", {SNF(STUnRng)} is the Catalyst ");
	fOutlineStr.CatStr("that gets things moving again.  ");
	fOutlineStr.CatStr("However, once moving, the plot tends to pick ");
	fOutlineStr.CatStr("up too much speed, as if the accelerator ");
	fOutlineStr.CatStr("pedal were stuck to the floor.  ");
	fOutlineStr.CatStr("Once again, a force comes into play to regulate the speed.  ");
	fOutlineStr.CatStr("In \"{SDI(Title)}\" this Inhibitor is {SNF(STCrFl)}.  ");
	fOutlineStr.CatStr("Any other means of arbitrating the speed of the plot might seem arbitrary.  ");
	fOutlineStr.CatStr("However, because of their relationship to {SNF(STCon)}, ");
	fOutlineStr.CatStr("{SNF(STUnRng)} and {SNF(STCrFl)} provide an author ");
	fOutlineStr.CatStr("with unobtrusive tools to adjust the pacing of the story's progress.");
	doubleSpace();

	fOutlineStr.CatStr("Speed is one thing; distance to the destination is another.  ");
	fOutlineStr.CatStr("That's where the Objective Story Stipulation comes into play.  ");
	fOutlineStr.CatStr("The Stipulation serves as a yardstick providing milestones ");
	fOutlineStr.CatStr("that tell an audience how far it is to the climax.  ");
	fOutlineStr.CatStr("In \"{SDI(Title)}\", distance to the goal is measured by changes in {SNF(STStp)}.");
	doubleSpace();

	fOutlineStr.CatStr("In summary, the objective problem in \"{SDI(Title)}\" resides ");
	fOutlineStr.CatStr("in «B+»{SDF(STDom)}«B-»");
	apropos_STF("STDom", " ", true);
	fOutlineStr.CatStr("pertaining to {SNF(STCon)}");
	apropos_STF("STCon", ".  ", false);
	fOutlineStr.CatStr("Although the objective characters share a ");
	fOutlineStr.CatStr("Concern about {SNF(STCon)}, they differ in approach: ");
	fOutlineStr.CatStr("some responding with {SNF(STRng)} and others with {SNF(STRng2)}");
	apropos_STF("STRng", ".  ", false);
	fOutlineStr.CatStr("The relative practicality of both approaches is ");
	fOutlineStr.CatStr("seen by how they each affect ");
	sprintf(tmpStr,"{SNF(%hd)}", comSemVal);				// semVal of the companion pair
of the thematic range
	fOutlineStr.CatStr(tmpStr);
	fOutlineStr.CatStr(" and ");
	sprintf(tmpStr,"{SNF(%hd)}", depSemVal);				// semVal of the dependent pair
of the thematic range
	fOutlineStr.CatStr(tmpStr);
	fOutlineStr.CatStr(".  ");
	fOutlineStr.CatStr("In addition, the objective characters disagree on the ");
	fOutlineStr.CatStr("true cause of the problem, and therefore on the appropriate solution.  ");
	fOutlineStr.CatStr("While some see {SNF(STPbm)} as the problem");
	apropos_STF("STPbm", " ", true);
	fOutlineStr.CatStr("and {SNF(STSol)} the best solution");
	apropos_STF("STSol", ", ", true);
	fOutlineStr.CatStr("others find {SNF(STFoc)} at the heart of the problem");
	apropos_STF("STFoc", " ", true);
	fOutlineStr.CatStr("and {SNF(STDir)} the best way to resolve it");
	apropos_STF("STPbm", ".  ", false);
```

```
        fOutlineStr.CatStr("These perspectives come into conflicts that are ");
        fOutlineStr.CatStr("moved forward by (SNF(STUnRng))");
        apropos_STF("STUnRng", ", ", true);
        fOutlineStr.CatStr("and held back by (SNF(STCrFl))");
        apropos_STF("STCrFl", ", ", true);
        fOutlineStr.CatStr("while the distance to the ");
        fOutlineStr.CatStr("goal is measured by changes in (SNF(STStp)).");
        apropos_STF("STStp", ".  ", false);
        doubleSpace();

        if (GetStorytellingBtn()) {
                separator_line(30);
                os_stelling_output();                                   // objective story
storytelling output
                more_os_stelling_output();                              // additional
objective story storytelling output
        }

        fDoc->SaveSuperClass(kMyRefSC, kNoSaveSC);

} /* OutlineView::os_theme_report */



/* --------------------------------------------------CNH---02/04/94---
        OutlineView::ss_theme_report  - builds a report for the subjective
                                                        story thematic material.
-------------------------------------------------------------------------- */
void OutlineView::ss_theme_report(void)
{
        short i;
        char tmpStr[100];
        char firstName[100];                                            // used to save main
OR obstacle character name for conditional use in text
        char secondName[100];                                           // same as above
        AddrText tmpAddr;
        Unit *dynRangeUnit;                                             // dynamic
pair of the thematic range
        Unit *comRangeUnit;                                             // companion
pair of the thematic range
        Unit *depRangeUnit;                                             // dependent
pair of the thematic range
        char *focChar;                                                  // name of
the subj. character who is mostly interested on the Focus
        char *dirChar;                                                  // name of
the subj. character who is mostly interested on the Direction

        SuperClass* mySC            = fDoc->GetSuperClass(kMyRefSC);

        semval_t plotRange = fDoc->GetApprValByIndex(kApprPLRng);
        GetPartner(INDEPENDENT, DYNAMIC, SEMTBL_ADDRESS(plotRange), tmpAddr);
        dynRangeUnit = Addr2Item(mySC, tmpAddr);            /* get the pointer to the dynamic pair of the
range */
        GetPartner(INDEPENDENT, COMPANION, SEMTBL_ADDRESS(plotRange), tmpAddr);
        comRangeUnit = Addr2Item(mySC, tmpAddr);            /* get the pointer to the companion pair of the
range */
        GetPartner(INDEPENDENT, DEPENDENT, SEMTBL_ADDRESS(plotRange), tmpAddr);
        depRangeUnit = Addr2Item(mySC, tmpAddr);            /* get the pointer to the dependent pair of the
range */

        if (GOOD) {                                                     // this large test
statement is to determine which subjective character is looking at the subjective focus and which the direction
                if (CHANGE) {
                        if (START) {
                                focChar = "MC";                         // main character
                                dirChar = "OC";                         // obstacle character
                        } else {  // STOP
                                focChar = "OC";                         // obstacle character
                                dirChar = "MC";                         // main character
                        }
                } else {  //STEADFAST
                        if (START) {
                                focChar = "OC";                         // obstacle character
                                dirChar = "MC";                         // main character
                        } else {  // STOP
                                focChar = "MC";                         // main character
                                dirChar = "OC";                         // obstacle character
                        }
                }
        } else {  // BAD
                if (CHANGE) {
                        if (START) {
                                focChar = "OC";                         // obstacle character
                                dirChar = "MC";                         // main character
                        } else {  // STOP
                                focChar = "MC";                         // main character
                                dirChar = "OC";                         // obstacle character
                        }
                } else {  //STEADFAST
                        if (START) {
                                focChar = "MC";                         // main character
                                dirChar = "OC";                         // obstacle character
                        } else {  // STOP
                                focChar = "OC";                         // obstacle character
                                dirChar = "MC";                         // main character
                        }
                }
        }

        do_title("Subjective Story Thematic Report for \"(SDI(Title))\"");

        fOutlineStr.CatStr("Generically, the Subjective Storyline deals with the relationship between the Main and
Obstacle Characters.  ");
        fOutlineStr.CatStr("It is the passionate argument that presents the emotional case for the author's point of
view.  ");
        fOutlineStr.CatStr("In fact, this bias forms the heart of the thematic exploration.  ");
        fOutlineStr.CatStr("In \"(SDI(Title))\" the author's views can be ");
        fOutlineStr.CatStr("explored in terms of (SNF(PLRng)) vs. (SNF(PLRng2)).  ");
        fOutlineStr.CatStr("Although (SNF(PLRng)) and (SNF(PLRng2)) describe both sides of the thematic argument, ");
        fOutlineStr.CatStr("as author, you will need to take one side over ");
        fOutlineStr.CatStr("the other in order to make a thematic statement ");
```

```
	fOutlineStr.CatStr("in the passionate argument.  ");
	fOutlineStr.CatStr("In \"{SDI(Title)}\", your point of view can be ");
	fOutlineStr.CatStr("expressed by examining both {SNF(PLRng)} ");
	fOutlineStr.CatStr("and {SNF(PLRng2)} in terms of the contrast in ");
	sprintf(tmpStr,"{SPN(%hd)}", comRangeUnit->semVal);                    // companion of the
thematic range
	fOutlineStr.CatStr(tmpStr);
	fOutlineStr.CatStr(" and ");
	sprintf(tmpStr,"{SPN(%hd)}", depRangeUnit->semVal);                    // dependent of the
thematic range
	fOutlineStr.CatStr(tmpStr);
	fOutlineStr.CatStr(" between {CNN(MC,NM)} and {CNN(OC,NM)}.");
	doubleSpace();

	fOutlineStr.CatStr("For most of the story, {CNN(MC,NM)} and ");
	fOutlineStr.CatStr("{CNN(OC,NM)} may spend a good deal of their ");
	fOutlineStr.CatStr("time focusing on {SVB(S,PLFoc,PRESP)}.  ");
	fOutlineStr.CatStr("Although they will both agree that {SVB(S,PLFoc,PRESP)} ");
	fOutlineStr.CatStr("is the primary area of friction between them, ");
	sprintf(tmpStr,"{CNN(%s,NM)} ", focChar);
	// which subjective character is looking at the focus?
	fOutlineStr.CatStr(tmpStr);
	fOutlineStr.CatStr("will argue that {SVB(S,PLFoc,PRESP)} is ");
	fOutlineStr.CatStr("the way to resolve their personal problems.  ");
	fOutlineStr.CatStr("{CNN(MC,NM)} will argure that {SVB(S,PLDir,PRESP)} is the way to go.");
	doubleSpace();

	fOutlineStr.CatStr("Having taken up sides on all of these issues, ");
	fOutlineStr.CatStr("{CNN(MC,NM)} and {CNN(OC,NM)} would simply sit ");
	fOutlineStr.CatStr("on their own positions and the passionate ");
	fOutlineStr.CatStr("argument of \"{SDI(Title)}\" would be reduced ");
	fOutlineStr.CatStr("to a shouting match in which no progress ");
	fOutlineStr.CatStr("is made toward a resolution.  ");
	fOutlineStr.CatStr("However, there is another thematic aspect ");
	fOutlineStr.CatStr("to the story that breaks the log ");
	fOutlineStr.CatStr("jam and keeps the plot moving along.  ");
	fOutlineStr.CatStr("In \"{SDI(Title)}\" this Catalyst is {SNF(PLUnRng)}.  ");
	fOutlineStr.CatStr("Any other way of moving the plot along ");
	fOutlineStr.CatStr("might seem artificial, however everytime ");
	fOutlineStr.CatStr("{SNF(PLUnRng)} gets things moving, ");
	fOutlineStr.CatStr("it somehow seems appropriate, due to the ");
	fOutlineStr.CatStr("relationship between {SNF(PLRng)} and {SNF(PLUnRng)}.");
	doubleSpace();

	fOutlineStr.CatStr("In contrast, if the plot moved forward without any resistance, ");
	fOutlineStr.CatStr("the story would end before all sides of all issues could be explored.  ");
	fOutlineStr.CatStr("That's why in \"{SDI(Title)}\" {SNF(PLCrFl)} serves ");
	fOutlineStr.CatStr("to inhibit progress toward a solution.  ");
	fOutlineStr.CatStr("It is the balance between {SNF(PLUnRng)} ");
	fOutlineStr.CatStr("and {SNF(PLCrFl)} that determines how ");
	fOutlineStr.CatStr("quickly the passionate argument will move forward.  ");
	fOutlineStr.CatStr("In fact, in working with this story you ");
	fOutlineStr.CatStr("can increase the pace toward the climax ");
	fOutlineStr.CatStr("by adding in more {SNF(PLUnRng)} (or ");
	fOutlineStr.CatStr("strengthening its presence) or slow down the story ");
	fOutlineStr.CatStr("to linger at points of special interest ");
	fOutlineStr.CatStr("by adding more {SNF(PLCrFl)}.  ");
	fOutlineStr.CatStr("Even more variety can be achieved by lowering ");
	fOutlineStr.CatStr("the presence of {SNF(PLUnRng)} or {SNF(PLCrFl)} to make ");
	fOutlineStr.CatStr("the story move slower or faster, respectively.");
	doubleSpace();

	fOutlineStr.CatStr("Putting the items in place that will change ");
	fOutlineStr.CatStr("the pace of a story makes an audience feel ");
	fOutlineStr.CatStr("they are rushing, crawling or any speed ");
	fOutlineStr.CatStr("in between on the way to the climax of the story.  ");
	fOutlineStr.CatStr("In the Subjective Story, this climax is reached ");
	fOutlineStr.CatStr("when the relationship between the Main and ");
	fOutlineStr.CatStr("Obstacle characters grows to its maximum dimensions.  ");
	fOutlineStr.CatStr("In \"{SDI(Title)}\" the growth between {CNN(MC,NM)} ");
	fOutlineStr.CatStr("and {CNN(OC,NM)} is measured in terms of {SNF(PLStp)}.  ");
	fOutlineStr.CatStr("What is {SVB(S,PLStp,PAST)}, then, becomes the thematic yardstick ");
	fOutlineStr.CatStr("that clues the audience in as to the distance ");
	fOutlineStr.CatStr("to the climax of the passionate argument.");
	doubleSpace();

	fOutlineStr.CatStr("In summary, the Subjective Storyline of \"{SDI(Title)}\" ");
	fOutlineStr.CatStr("involves a divergence between {CNN(MC,NM)} and {CNN(OC,NM)} in terms of {SNF(PLRng)} vs.
{SNF(PLRng2)}");
	apropos_STF("PLRng", ".  ", false);
	fOutlineStr.CatStr("The author takes sides by examining their ");
	sprintf(tmpStr,"{SPN(%hd)}", comRangeUnit->semVal);                    // companion of the
thematic range
	fOutlineStr.CatStr(tmpStr);
	fOutlineStr.CatStr(" and ");
	sprintf(tmpStr,"{SPN(%hd)}", depRangeUnit->semVal);                    // dependent of the
thematic range
	fOutlineStr.CatStr(tmpStr);
	fOutlineStr.CatStr(".  ");
	fOutlineStr.CatStr("Still, {CNN(MC,NM)} and {CNN(OC,NM)} spend ");
	fOutlineStr.CatStr("most of their time focusing on {SVB(P,PLFoc,PRESP)}.  ");
	apropos_STF("PLFoc", ".  ", false);
	fOutlineStr.CatStr("The passionate argument is moved forward by {SNF(PLUnRng)}");
	apropos_STF("PLUnRng", ", ", true);
	fOutlineStr.CatStr("held back by {SNF(PLCrFl)}");
	apropos_STF("PLCrFl", ", ", true);
	fOutlineStr.CatStr("and the audience can measure progress toward the ");
	fOutlineStr.CatStr("climax in terms of what is {SVB(S,PLStp,PAST)}");
	apropos_STF("PLStp", ".  ", false);
	doubleSpace();

	if (GetStorytellingBtn()) {
		separator_line(30);
		ss_stelling_output();
	}

	fDoc->SaveSuperClass(kMyRefSC, kNoSaveSC);

} /* OutlineView::ss_theme_report */
```

```
/* -------------------------------------------------CNH---02/10/94---
        OutlineView::mc_theme_report  - builds a report for the main
                                                                    character thematic material.
------------------------------------------------------------------------- */
void OutlineView::mc_theme_report(void)
{
        short i;
        char tmpStr[300];
        AddrText tmpAddr;
        char *varStr[23];                                                              // an array
of character string pointers used to store the "mix-n-match" strings for the last two paragraphs

        Unit *dynRangeUnit;                                                            // dynamic
pair of the thematic range
        short dynSemVal = 0;                                                         // semVal of the
dynamic pair of the thematic range

        bool_t tutorialON = GetTutorialBtn();

        SuperClass* mySC          = fDoc->GetSuperClass(kMyRefSC);

        GetPartner(INDEPENDENT, DYNAMIC, SEMTBL_ADDRESS(fDoc->GetApprValByIndex(kApprMCRng)), tmpAddr);
        dynRangeUnit = Addr2Item(mySC, tmpAddr);                  /* get the pointer to the dynamic pair of the
range */
        dynSemVal = dynRangeUnit->semVal;                                // semVal of the dynamic pair of the
thematic range


/********************************** Big test section to determine variable string text
**********************************/
        for (i = 0; i <= 22; ++i)
                varStr[i] = "UNDEFINED";                                               // initialize the
string pointers


        if (STOP) {
                varStr[1] = "an over abundance";
                varStr[2] = "excess";
                varStr[3] = "over abundance";
                varStr[4] = "drives";
        } else {            // (START)
                varStr[1] = "a deficiency";
                varStr[2] = "lack";
                varStr[3] = "deficiency";
                varStr[4] = "pulls";
        }

        if (TIMELOCK) {
                varStr[5] = "in time";
                varStr[8] = "long enough";
        } else {             // (OPTIONLOCK)
                varStr[5] = "before (PPN(MC,P1)) options run out";
                varStr[8] = "until all the pieces are in place";
        }


        if (UNWILLING) {
                varStr[9] = "not comfortable with the approach";
                varStr[10] = "dragged along";
                varStr[11] = "avoid";
                varStr[15] = "with";
        } else {             // (WILLING)
                varStr[9] = "also interested in working";
                varStr[10] = "indispensable";
                varStr[11] = "resist";
                varStr[15] = "in";
        }


        if (CHANGE) {
                if (GOOD) {
                        varStr[13] = "prevents";
                        varStr[14] = "from being";
                } else {  //  BAD
                        varStr[13] = "allows";
                        varStr[14] = "to be";
                }
        } else {  //  STEADFAST
                if (GOOD) {
                        varStr[13] = "allows";
                        varStr[14] = "to be";
                } else {  //  BAD
                        varStr[13] = "prevents";
                        varStr[14] = "from being";
                }
        }

/*********************************** End of Test **********************************/


        do_title("Main Character Story Thematic Report for \"(SDI(Title))\"");

        if (tutorialON) {
                fOutlineStr.CatStr("Main character thematics describe the essence of the person through whose ");
                fOutlineStr.CatStr("eyes the audience experiences the most personal side of the story's argument.  ");
                fOutlineStr.CatStr("In a sense, these thematics describe the filtering effect on the story when it ");
                fOutlineStr.CatStr("is seen by the audience through Main character colored glasses.  ");
                fOutlineStr.CatStr("The Main Character's Domain (as its name implies) ");
                fOutlineStr.CatStr("describes the realm in which the Main character operates.  ");
        }

        fOutlineStr.CatStr("In \"(SDI(Title))\", (CNN(MC,NM))'s Domain is (SDF(MCDom)).  ");
        fOutlineStr.CatStr("In fact, (CNN(MC,NM))'s Concerns revolve around (SDF(MCDom)) of (SNF(MCCon)).  ");
        fOutlineStr.CatStr("This is not necessarily (CNN(MC,NM))'s goal (although it ");
        fOutlineStr.CatStr("could be) but is better thought of as (PPN(MC,P1)) primary Concern.  ");
        doubleSpace();

        if (tutorialON) {
                fOutlineStr.CatStr("Part of what defines a Main Character is a description ");
```

```
			fOutlineStr.CatStr("of the kinds of things they are sensitive to.  ");
			fOutlineStr.CatStr("This is called their Range, which represents the Main Character's Thematic Focus.
");

			fOutlineStr.CatStr("In \"{SDI(Title)}\", ");
		}

		fOutlineStr.CatStr("{CNN(MC,NM)} proves to be sensitive to ");
		fOutlineStr.CatStr("issues pertaining to %SNF(MCRng)}, especially in reference to {SNF(MCCon)}.  ");
		fOutlineStr.CatStr("In fact, when it comes to {SNF(MCCon)}, {CNN(MC,NM)} often ");
		fOutlineStr.CatStr("notices a disparity between {SNF(MCRng)} and {SNF(MCRng2)}");
		fOutlineStr.CatStr(" that others just don't see.  ");
		fOutlineStr.CatStr("The audience, therefore, is provided a very personal ");
		fOutlineStr.CatStr("commentary on the meaning of {SNF(MCCon)} through {CNN(MC,NM)}'s perspective.");
		doubleSpace();

		if (tutorialON) {
			fOutlineStr.CatStr("When trying to understand a Main Character, it is important to ");
			fOutlineStr.CatStr("know what drives them, and also what they are striving for.  ");
			fOutlineStr.CatStr("In other words, what makes {CNN(MC,NM)} run?  ");
		}

		fOutlineStr.CatStr("As the story develops we learn that {CNN(MC,NM)}'s motivation ");
		fOutlineStr.CatStr("comes from an imbalance between {SNF(MCPbm)} and {SNF(MCSol)}.  ");
		sprintf(tmpStr,"Specifically, what %s {CNN(MC,NM)} forward ", varStr[4]);
		fOutlineStr.CatStr(tmpStr);
		sprintf(tmpStr,"through the story is %s of {SNF(MCPbm)}.", varStr[1]);
		fOutlineStr.CatStr(tmpStr);
		doubleSpace();

		if ((CHANGE && GOOD) || (STEADFAST && BAD)) {
			sprintf(tmpStr,"Unfortunately, {CNN(MC,NM)}'s %s of {SNF(MCPbm)} is what ", varStr[2]);
			fOutlineStr.CatStr(tmpStr);
			fOutlineStr.CatStr("gets {PPN(MC,OC)} into trouble.  In fact, this imbalance ");
			fOutlineStr.CatStr("causes trouble for everyone else as well.  ");
			fOutlineStr.CatStr("Only if {CNN(MC,NM)} comes to realize that it is {PPN(MC,P1)} ");
			sprintf(tmpStr,"own %s of {SNF(MCPbm)}  that is causing all the problems ", varStr[3]);
			fOutlineStr.CatStr(tmpStr);
			fOutlineStr.CatStr("will {PPN(MC,NC)} be able to set things right.  ");
			sprintf(tmpStr,"The question is, will {PPN(MC,NC)} see this %s?", varStr[5]);
			fOutlineStr.CatStr(tmpStr);
			doubleSpace();

			fOutlineStr.CatStr("What holds {CNN(MC,NM)} back is that {PPN(MC,P1)} focus is elsewhere.  ");
			fOutlineStr.CatStr("{CNN(MC,NM)} doesn't see the problem to be in {PPN(MC,IR)}.  ");
			fOutlineStr.CatStr("Rather, {PPN(MC,NC)} believes the problem to be {SNF(MCFoc)} and ");
			fOutlineStr.CatStr("sees {SNF(MCDir)} as the solution.  ");
			fOutlineStr.CatStr("As a result, {CNN(MC,NM)} might never come to understand ");
			fOutlineStr.CatStr("that {PPN(MC,NC)} holds the key to solving the problem ");
			fOutlineStr.CatStr("unless {PPN(MC,NC)} is forced by circumstance to address the issue.");
			doubleSpace();

		} else {			//  STEADFAST & GOOD, or CHANGE & BAD

			sprintf(tmpStr,"In fact, it is {CNN(MC,NM)}'s %s of {SNF(MCPbm)} is ", varStr[2]);
			fOutlineStr.CatStr(tmpStr);
			fOutlineStr.CatStr("what gets {PPN(MC,OC)} into trouble.  ");
			fOutlineStr.CatStr("In addition, this imbalance causes trouble for everyone else as well.  ");
			fOutlineStr.CatStr("However, only if {CNN(MC,NM)} continues to believe ");
			sprintf(tmpStr,"that {PPN(MC,P1)} own %s of {SNF(MCPbm)} is not ", varStr[3]);
			fOutlineStr.CatStr(tmpStr);
			fOutlineStr.CatStr("really causing all the problems but is just the work {PPN(MC,NC)} must ");
			fOutlineStr.CatStr("do to resolve the problems will {PPN(MC,NC)} be able to set things right.  ");
			fOutlineStr.CatStr("The question is, will {PPN(MC,NC)} be able to hold on ");
			sprintf(tmpStr,"to {PPN(MC,P1)} resolve %s?", varStr[8]);
			fOutlineStr.CatStr(tmpStr);
			doubleSpace();

			fOutlineStr.CatStr("What moves {CNN(MC,NM)} forward is that {PPN(MC,P1)} focus is on the problem.  ");
			fOutlineStr.CatStr("{CNN(MC,NM)} doesn't see the problem to be in {PPN(MC,IR)}.  ");
			fOutlineStr.CatStr("Rather, {PPN(MC,NC)} believes the problem to be {SNF(MCFoc)} and ");
			fOutlineStr.CatStr("sees {SNF(MCDir)} as the solution.  ");
			fOutlineStr.CatStr("As a result, {CNN(MC,NM)} will make progress toward the solution ");
			fOutlineStr.CatStr("unless {PPN(MC,NC)} begins to doubt {PPN(MC,IR)}, and comes ");
			fOutlineStr.CatStr("to believe that {PPN(MC,NC)} is preventing the problem from being solved.");
			doubleSpace();

		}


		sprintf(tmpStr,"Although {CNN(MC,NM)} is %s toward ", varStr[9]);
		fOutlineStr.CatStr(tmpStr);
		fOutlineStr.CatStr("the goal regarding {SNF(STGoal)} that everyone seems concerned with, ");
		sprintf(tmpStr,"{PPN(MC,NC)} finds {PPN(MC,IR)} %s on the ", varStr[10]);
		fOutlineStr.CatStr(tmpStr);
		fOutlineStr.CatStr("quest because of {PPN(MC,P1)} Abilities in the area of {SNF(MCUnRng)}.  ");
		fOutlineStr.CatStr("Actually, {CNN(MC,NM)} is Uniquely Able in this area, which is ");
		sprintf(tmpStr,"why {PPN(MC,NC)} cannot %s participating in the quest ", varStr[11]);
		fOutlineStr.CatStr(tmpStr);
		fOutlineStr.CatStr("where {PPN(MC,NC)} begins to see that {PPN(MC,NC)} holds ");
		fOutlineStr.CatStr("the means to resolving the story's problems.");
		doubleSpace();

		fOutlineStr.CatStr("{CNN(MC,NM)}'s Unique Ability of {SNF(MCUnRng)} can move the story ");
		fOutlineStr.CatStr("toward a positive conclusion.  However, {PPN(MC,P1)} use ");
		fOutlineStr.CatStr("of {SNF(MCUnRng)} is undermined by an aspect ");
		fOutlineStr.CatStr("of {SNF(MCCrFl)} which always seems to get in the way.  ");
		fOutlineStr.CatStr("This resistance to {PPN(MC,P1)} effectiveness varies as {CNN(MC,NM)} grows over the course
of the story.  ");
		fOutlineStr.CatStr("It becomes clear that when {CNN(MC,NM)} can overcome {PPN(MC,P1)} {SNF(MCCrFl)} and ");
		fOutlineStr.CatStr("effectively rely on {SNF(MCUnRng)}, {PPN(MC,NC)} may be able to address ");
		fOutlineStr.CatStr("the fact that {PPN(MC,NC)} has the power to resolve the story's problems.  ");
		fOutlineStr.CatStr("This tug of war between {SNF(MCUnRng)} and {SNF(MCCrFl)} causes ");
		fOutlineStr.CatStr("both growth and backsliding in {CNN(MC,NM)}, as evidenced ");
		fOutlineStr.CatStr("by {PPN(MC,P1)} varying degree of {SNF(MCStp)}.");
		doubleSpace();

		fOutlineStr.CatStr("In summary, «B+»{SDF(MCDom)}«B-» is the realm in which {CNN(MC,NM)} primarily operates");
		apropos_STF("MCDom", ", ", true);
		fOutlineStr.CatStr("especially in regard to {SNF(MCCon)}, which is {PPN(MC,P1)} chief Concern.  ");
		apropos_STF("MCCon", ".  ", false);
		fOutlineStr.CatStr("As an individual, {CNN(MC,NM)} is more sensitive to issues ");
		fOutlineStr.CatStr("involving {SNF(MCRng)} than most, and often perceives ");
		fOutlineStr.CatStr("a disparity between {SNF(MCRng)} and {SNF(MCRng2)}");
```

```
        apropos_STF("MCRng", ".  ", false);
        sprintf(tmpStr,"{CNN(MC,NM)} is driven by %s of {SNF(MCPbm)}", varStr[1]);
        fOutlineStr.CatStr(tmpStr);
        apropos_STF("MCPbm", ", ", true);
        fOutlineStr.CatStr("which causes {PPN(MC,OC)} to see {SNF(MCFoc)} as the source of {PPN(MC,P1)} problems");
        apropos_STF("MCFoc", " ", true);
        fOutlineStr.CatStr("and {SNF(MCDir)} as the best solution");
        apropos_STF("MCDir", ".  ", false);
        sprintf(tmpStr,"In fact, {CNN(MC,NM)}'s own %s of {SNF(MCPbm)} is ", varStr[2]);
        fOutlineStr.CatStr(tmpStr);
        sprintf(tmpStr,"what %s the story's problem %s resolved.  ", varStr[13], varStr[14]);
        fOutlineStr.CatStr(tmpStr);
        fOutlineStr.CatStr("{CNN(MC,NM)} is given the opportunity to see this as {PPN(MC,NC)} becomes ");
        sprintf(tmpStr,"wholly involved %s the effort to achieve the goal.  ", varStr[15]);
        fOutlineStr.CatStr(tmpStr);
        fOutlineStr.CatStr("It is {CNN(MC,NM)}'s Unique Ability pertaining to {SNF(MCUnRng)} that ");
        fOutlineStr.CatStr("holds the means to resolving the story's problem");
        apropos_STF("MCUnRng", ".  ", false);
        fOutlineStr.CatStr("Unfortunately, {PPN(MC,P1)} effectiveness is undermined by an ");
        fOutlineStr.CatStr("aspect of {SNF(MCCrFl)}");
        apropos_STF("MCCrFl", ".  ", false);
        fOutlineStr.CatStr("Over the course of the story {CNN(MC,NM)}'s growth (and backsliding) in effectiveness can
");

        fOutlineStr.CatStr("be seen in the degree to which {PPN(MC,NC)} engages in {SNF(MCStp)}");
        apropos_STF("MCStp", ".", false);
        doubleSpace();

        if (GetStorytellingBtn()) {
                separator_line(30);
                mc_stelling_output();
        }


        fDoc->SaveSuperClass(kMyRefSC, kNoSaveSC);

} /* OutlineView::mc_theme_report */




/* -------------------------------------------------CNH---02/23/94---
        OutlineView::oc_theme_report  - builds a report for the obstacle
                                                                character thematic material.
------------------------------------------------------------------------ */
void OutlineView::oc_theme_report(void)
{
        short i;
        char tmpStr[300];
        AddrText tmpAddr;
        char *varStr[11];                                                                       // an array
of character string pointers used to store the "mix-n-match" strings for the last two paragraphs

        Unit *dynRangeUnit;                                                                     // dynamic
pair of the thematic range
        short dynSemVal = 0;                                                                // semVal of the
dynamic pair of the thematic range


        SuperClass* mySC            = fDoc->GetSuperClass(kMyRefSC);

        GetPartner(INDEPENDENT, DYNAMIC, SEMTBL_ADDRESS(fDoc->GetApprValByIndex(kApprOCRng)), tmpAddr);
        dynRangeUnit = Addr2Item(mySC, tmpAddr);                           /* get the pointer to the dynamic pair of the
range */
        dynSemVal = dynRangeUnit->semVal;                                         // semVal of the dynamic pair of the
thematic range

        short whichClass = 0;

        strcpy(tmpAddr, SEMTBL_ADDRESS(fDoc->GetApprValByIndex(kApprOCPbm)));
        whichClass = tmpAddr[0]-'0';                                                        // the class of the
main character domain as indicated by the first digit in the address


/*********************************** Big test section to determine variable string text
***********************************/
        for (i = 0; i <= 10; ++i)
                varStr[i] = "UNDEFINED";                                                    // initialize the
string pointers

        if (whichClass == 1) {
                varStr[3] = "by changing the situation";
                varStr[4] = "situation";
        } else if (whichClass == 2) {
                varStr[3] = "by taking action";
                varStr[4] = "activity";
        } else if (whichClass == 3) {
                varStr[3] = "through manipulation";
                varStr[4] = "manner of thinking";
        } else {
                varStr[3] = "through adopting an attitude";
                varStr[4] = "state of mind";
        }


        if ((CHANGE && GOOD) || (STEADFAST && BAD)) {
                varStr[1] = "wrong";
                varStr[2] = "better";
//              varStr[3] = "more";
        } else {          //  (STEADFAST && GOOD) || (CHANGE && BAD)
                varStr[1] = "right";
                varStr[2] = "worse";
//              varStr[3] = "less";
        }
/*********************************** End of Test ***********************************/


        do_title("Obstacle Character Story Thematic Report for \"{SDI(Title)}\"");

        fOutlineStr.CatStr("In \"{SDI(Title)}\", {CNN(OC,NM)} is the obstacle character, ");
        fOutlineStr.CatStr("meaning that we see {CNN(OC,NM)} as ");
        fOutlineStr.CatStr("the primary influence on {CNN(MC,NM)}'s personal fulfillment.  ");
```

```
	sprintf(tmpStr,"In fact, {CNN(MC,NM)} is on the %s path, ", varStr[1]);
	fOutlineStr.CatStr(tmpStr);
	sprintf(tmpStr,"and {CNN(OC,NM)} pressures {PPN(MC,OC)} to take a %s approach.  ", varStr[2]);
	fOutlineStr.CatStr(tmpStr);
	sprintf(tmpStr,"As a {SNF(OCDom)} character, {CNN(OC,NM)} works %s.  ", varStr[3]);
	fOutlineStr.CatStr(tmpStr);
	doubleSpace();

	sprintf(tmpStr,"With regard to that \"%s\", ", varStr[4]);
	fOutlineStr.CatStr(tmpStr);
	fOutlineStr.CatStr("{CNN(OC,NM)} is primarily Concerned with {SNF(OCCon)}, ");
	fOutlineStr.CatStr("especially in terms of {SNF(OCRng)}.  ");
	fOutlineStr.CatStr("In fact, it is the discrepancy between {SNF(OCRng)} and {SNF(OCRng2)} that ");
	fOutlineStr.CatStr("is most exemplified by {CNN(OC,NM)}.  ");
	fOutlineStr.CatStr("Driving a wedge between these two items is the source of {PPN(OC,P1)} drive, ");
	fOutlineStr.CatStr("which is {SNF(OCPbm)}.  ");
	fOutlineStr.CatStr("In other words, changes in {PPN(OC,P1)} {SNN(OCPbm)} over ");
	fOutlineStr.CatStr("the course of the story create direct responses ");
	fOutlineStr.CatStr("in the level of {CNN(OC,NM)}'s satisfaction.  ");
	fOutlineStr.CatStr("Only if {SNF(OCSol)} replaced {SNF(OCPbm)} ");
	fOutlineStr.CatStr("would {CNN(OC,NM)} be satisfied.");
	doubleSpace();

	fOutlineStr.CatStr("{CNN(OC,NM)} is uniquely able to pursue ");
	fOutlineStr.CatStr("this course as a result of {PPN(OC,P1)} ");
	fOutlineStr.CatStr("association with {SNF(OCUnRng)}.  ");
	fOutlineStr.CatStr("At least, {PPN(OC,NC)} would be able ");
	fOutlineStr.CatStr("to if {SNF(OCCrFl)} didn't always ");
	fOutlineStr.CatStr("get in {PPN(OC,P1)} way.  ");
	fOutlineStr.CatStr("The frustrations {CNN(OC,NM)} feels ");
	fOutlineStr.CatStr("when {PPN(OC,NC)} is held back only serve ");
	fOutlineStr.CatStr("to increase the extent of {PPN(OC,P1)} ");
	fOutlineStr.CatStr("Concern with {SNF(OCCon)}.  ");
	doubleSpace();

	fOutlineStr.CatStr("In summary, {CNN(OC,NM)}'s primary Concern ");
	fOutlineStr.CatStr("is «B+»{SDF(OCDom)}«B-»");
	apropos_STF("OCDom", " ", true);
	fOutlineStr.CatStr("regarding {SNF(OCCon)}");
	apropos_STF("OCCon", ".  ", false);
	fOutlineStr.CatStr("More specifically, it is the ");
	fOutlineStr.CatStr("discrepancy between {SNF(OCRng)} and {SNF(OCRng2)} ");
	fOutlineStr.CatStr("where {PPN(OC,NC)} focuses {PPN(OC,P1)} interest");
	apropos_STF("OCRng", ".  ", false);
	fOutlineStr.CatStr("Affecting {PPN(OC,P1)} impact are {PPN(OC,P1)} drive ");
	fOutlineStr.CatStr("regarding {SNF(OCPbm)}");
	apropos_STF("OCPbm", " ", true);
	fOutlineStr.CatStr("and {PPN(OC,P1)} satisfaction with {SNF(OCSol)}");
	apropos_STF("OCSol", ".  ", false);
	fOutlineStr.CatStr("Aided in this ");
	fOutlineStr.CatStr("effort by {PPN(OC,P1)} unique abilities in the ");
	fOutlineStr.CatStr("area of {SNF(OCUnRng)}");
	apropos_STF("OCUnRng", ", ", true);
	fOutlineStr.CatStr("{PPN(OC,NC)} is held back by an aspect of {SNF(OCCrFl)}");
	apropos_STF("OCCrFl", ".", false);
	doubleSpace();


	if (GetStorytellingBtn()) {
		separator_line(30);
		oc_stelling_output();
	}

	fDoc->SaveSuperClass(kMyRefSC, kNoSaveSC);

} /* OutlineView::oc_theme_report */



/* -------------------------------------------------CNH---02/10/94---
	OutlineView::mc_character_report  - builds a report for the main
                                                                            character "character" material.
------------------------------------------------------------------------- */
void OutlineView::mc_character_report(void)
{
	short i;
	char tmpStr[300];
	AddrText tmpAddr;
	char *varStr[60];                                                       // an array
of character string pointers used to store the "mix-n-match" strings for the last two paragraphs
	short whichClass = 0;
	short whichSet = 0;

	strcpy(tmpAddr, SEMTBL_ADDRESS(fDoc->GetApprValByIndex(kApprMCPbm)));
	whichClass = tmpAddr[0]-'0';                                            // the class of the
main character domain as indicated by the first digit in the address
	whichSet = tmpAddr[1]-'0';                                              // the set
the main character problem as indicated by the second digit in the address


/********************************** Big test section to determine variable string text
**********************************/
	for (i = 0; i <= 59; ++i)
		varStr[i] = "UNDEFINED";                                        // initialize the
string pointers

	if (whichClass == 1) {
		varStr[20] = "situation";
	} else if (whichClass == 2) {
		varStr[20] = "activities";
	} else if (whichClass == 3) {
		varStr[20] = "manner of thinking";
	} else {
		varStr[20] = "state of mind";
	}

	if (whichClass == 1 || whichClass == 2) {                        // test if domain is universe or physics
		varStr[35] = "steps to be taken";
	} else {
		varStr[35] = "coping";
	}

	varStr[47] = "";
```

```
        varStr[48] = "";
        varStr[49] = "";
        varStr[50] = "";

        if (whichSet == 1) {                                                     // purpose
set
                varStr[16] = "sense of purpose has";
                varStr[17] = "sense of purpose) holds";
                varStr[27] = "purpose";
                varStr[50] = "additional ";
        } else if (whichSet == 2) {                                              //
evaluation set
                varStr[16] = "way of evaluating has";
                varStr[17] = "way of evaluating) holds";
                varStr[27] = "way of evaluating";
                varStr[49] = "additional ";
        } else if (whichSet == 3) {                                              //
motivation set
                varStr[16] = "motivations have";
                varStr[17] = "motivations) hold";
                varStr[27] = "motivation";
                varStr[47] = "additional ";
        } else {
        //  methodology set
                varStr[16] = "methods have";
                varStr[17] = "methods) hold";
                varStr[27] = "method";
                varStr[48] = "additional ";
        }

        if (DOER) {
                varStr[1] = "adapt";
                varStr[2] = "to";
                varStr[3] = "(PPN(MC,IR))";
                varStr[4] = "";
                varStr[5] = "";
                varStr[6] = "doing";
                varStr[7] = "cope";
                varStr[8] = "doing something about them";
                varStr[12] = "coping";
                varStr[31] = "to cope";
                if (WILLING) {
                        varStr[11] = "doing";
                        varStr[12] = "coping";
                } else {            // (UNWILLING)
                        varStr[11] = "coping";
                        varStr[12] = "doing";
                }
        } else {            //  (BEER)
                varStr[1] = "adapt to";
                varStr[2] = "";
                varStr[3] = "";
                varStr[4] = " to";
                varStr[5] = " (PPN(MC,IR))";
                varStr[6] = "coping";
                varStr[7] = "take steps";
                varStr[8] = "coping with them";
                varStr[12] = "doing";
                varStr[31] = "to take steps";
                if (WILLING) {
                        varStr[11] = "coping";
                        varStr[12] = "doing";
                } else {            // (UNWILLING)
                        varStr[11] = "doing";
                        varStr[12] = "coping";
                }
        }

        if (WILLING) {
                varStr[9] = "Fortunately";
                varStr[13] = "willingly participates";
                varStr[14] = "Elsewhere";
                varStr[33] = "Fortunately";
                varStr[36] = "actively";
        } else {            // (UNWILLING)
                varStr[9] = "Unfortunately";
                varStr[13] = "is uncomfortable participating";
                varStr[14] = "In addition";
                varStr[33] = "However";
                varStr[36] = "uncomfortably";
        }

        if (ACTION) {
                varStr[15] = "an action";
                varStr[23] = "actions achieve";
                varStr[24] = "actions";
                varStr[39] = "takes action";
                varStr[53] = "action";
                varStr[56] = "doing";
        } else {            //  (DECISION)
                varStr[15] = "a decision";
                varStr[23] = "decision achieves";
                varStr[24] = "decision";
                varStr[39] = "makes a decision";
                varStr[53] = "decision";
                varStr[56] = "coping";
        }

        if (CHANGE) {
                varStr[19] = "changes";
                varStr[25] = "change";
                varStr[41] = "adopts";
                varStr[52] = "However, as";
                if (SUCCESS) {
                        varStr[29] = "(SNF(STPbm))";
                        varStr[28] = "(SVB(MC,STPbm,INF))";
                        varStr[42] = "(SNF(STSol))";
                        varStr[43] = "(SVB(MC,STSol,INF))";
                } else {            // (FAILURE)
                        varStr[29] = "(SNF(STSol))";
                        varStr[28] = "(SVB(MC,STSol,INF))";
                        varStr[42] = "(SNF(STPbm))";
                        varStr[43] = "(SVB(MC,STPbm,INF))";
```

```
		}
		if (TIMELOCK) {
			varStr[21] = "at the very last moment";
		} else {		// (SPACELOCK)
			varStr[21] = "just before the options run out";
		}
	} else {		// (STEADFAST)
		varStr[19] = "continues";
		varStr[25] = "remain steadfast";
		varStr[41] = "holds onto";
		varStr[52] = "As";
		if (SUCCESS) {
			varStr[29] = "{SNF(STDir)}";
			varStr[28] = "{SVB(MC,STDir,INF)}";
			varStr[42] = "{SNF(STDir)}";
			varStr[43] = "{SVB(MC,STDir,INF)}";
		} else {		// (FAILURE)
			varStr[29] = "{SNF(STFoc)}";
			varStr[28] = "{SVB(MC,STFoc,INF)}";
			varStr[42] = "{SNF(STFoc)}";
			varStr[43] = "{SVB(MC,STFoc,INF)}";
		}
		if (TIMELOCK) {
			varStr[21] = "past the point of no return";
		} else {		// (SPACELOCK)
			varStr[21] = "as the options run out";
		}
	}

	if (GOOD) {
		varStr[26] = "a favorable";
		varStr[46] = "favorable";
		varStr[55] = "is successful";
		varStr[58] = "are resolved";
		if (SUCCESS) {
			varStr[22] = "";
			varStr[54] = "and ";
			varStr[57] = "In addition";
		} else {		// (FAILURE)
			varStr[22] = "Although ";
			varStr[54] = "";
			varStr[57] = "Fortunately";
		}
	} else {		// (BAD)
		varStr[26] = "an unfavorable";
		varStr[46] = "unfavorable";
		varStr[55] = "fails";
		varStr[58] = "remain unresolved";
		if (SUCCESS) {
			varStr[22] = "Although ";
			varStr[54] = "";
			varStr[57] = "Unfortunately";
		} else {		// (FAILURE)
			varStr[22] = "";
			varStr[54] = "and ";
			varStr[57] = "In addition";
		}
	}

	if (START) {
		varStr[38] = "begins";
	} else {		// (STOP)
		varStr[38] = "ends";
	}


/*********************************** End of Test ***********************************/


	do_title("Character Report for the Main Character of \"{SDI(Title)}\"");

	fOutlineStr.CatStr("Dynamically, {CNN(MC,NM)} is a {SNF(Approach)} by preference, ");
	fOutlineStr.CatStr("which means {PPN(MC,NC)} would rather try ");
	sprintf(tmpStr,"to %s {PPN(MC,P1)} ", varStr[1]);
	fOutlineStr.CatStr(tmpStr);
	sprintf(tmpStr,"environment %s %s than to try ", varStr[2], varStr[3]);
	fOutlineStr.CatStr(tmpStr);
	sprintf(tmpStr,"to adapt to {PPN(MC,P1)} environment%s%s.  ", varStr[4], varStr[5]);
	fOutlineStr.CatStr(tmpStr);
	sprintf(tmpStr,"Of course, if %s doesn't work, ", varStr[6]);
	fOutlineStr.CatStr(tmpStr);
	sprintf(tmpStr,"{PPN(MC,NC)} will begrudingly make an effort to %s.  ", varStr[7]);
	fOutlineStr.CatStr(tmpStr);
	fOutlineStr.CatStr("Still, {PPN(MC,NC)} is much happier if {PPN(MC,NC)} can ");
	sprintf(tmpStr,"resolve {PPN(MC,P1)} problems by %s.  %s. ", varStr[8], varStr[9]);
	fOutlineStr.CatStr(tmpStr);
	fOutlineStr.CatStr("in \"{SDI(Title)}\" {CNN(MC,NM)} finds {PPN(MC,IR)} ");
	fOutlineStr.CatStr("facing a problem with \"{SDF(STDom)}\" that ");
	sprintf(tmpStr,"requires %s, NOT %s.  ", varStr[11], varStr[12]);
	fOutlineStr.CatStr(tmpStr);
	sprintf(tmpStr,"As a result, {PPN(MC,NC)} %s ", varStr[13]);
	fOutlineStr.CatStr(tmpStr);
	fOutlineStr.CatStr("in the efforts surrounding the goal of the objective story.");
	doubleSpace();

	fOutlineStr.CatStr("{CNN(MC,NM)} sees {PPN(MC,P1)} problems stemming ");
	fOutlineStr.CatStr("from {SNF(MCFoc)}, and believes ");
	fOutlineStr.CatStr("the solution to be {SNF(MCDir)}.  ");
	fOutlineStr.CatStr("However, {PPN(MC,NC)} may come to wonder if the real ");
	fOutlineStr.CatStr("problem might not be {SNF(MCPbm)}, ");
	fOutlineStr.CatStr("which would require {SNF(MCSol)} to be the solution.");
	doubleSpace();

	if (CHANGE) {
		fOutlineStr.CatStr("Ultimately, {PPN(MC,NC)} changes, ");
		fOutlineStr.CatStr("believing {PPN(MC,P1)} problems will only be solved by adopting a different
approach.  ");
		fOutlineStr.CatStr("{CNN(MC,NM)} gives up on {SNF(MCDir)} and ");
		fOutlineStr.CatStr("adopts {SNF(MCSol)} as {PPN(MC,P1)} best hope for a solution.");
		doubleSpace();
```

```
} else {		// (STEADFAST)
	fOutlineStr.CatStr("Ultimately, (PPN(MC,NC)) decides to remain steadfast, ");
	fOutlineStr.CatStr("believing that (PPN(MC,P1)) resolve (specifically ");
	sprintf(tmpStr,"(PPN(MC,P1)) %s the best hope for a solution.", varStr[17]);
	fOutlineStr.CatStr(tmpStr);
	doubleSpace();
}

fOutlineStr.CatStr("Owing to (PPN(MC,P1)) role as the main character, ");
sprintf(tmpStr,"(CNN(MC,NM))'s %s is \"to %s\" in the objective story.  ", varStr[27], varStr[28]);
fOutlineStr.CatStr(tmpStr);
sprintf(tmpStr,"Whenever \"%s\" comes up in the objective argument, ", varStr[29]);
fOutlineStr.CatStr(tmpStr);
fOutlineStr.CatStr("it would be appropriate for (CNN(MC,NM)) to be involved.  ");
fOutlineStr.CatStr("In addition, (CNN(MC,NM)) also represents the ");


short n;
short motTbl[16];
short methTbl[16];
short evalValTbl[16];
short purValTbl[16];
short nmOfMotivations;
short nmOfMethodologies;
short nmOfEvaluations;
short nmOfPurposes;
ls_index whichChar = fDoc->GetMainCharID();

nmOfMotivations = fDoc->GetCharacteristics(whichChar, 0, (short*)&motTbl);
nmOfMethodologies = fDoc->GetCharacteristics(whichChar, 1, (short*)&methTbl);
nmOfEvaluations = fDoc->GetCharacteristics(whichChar, 2, (short*)&evalValTbl);
nmOfPurposes = fDoc->GetCharacteristics(whichChar, 3, (short*)&purValTbl);

if (nmOfMotivations) {
	sprintf(tmpStr,"%smotivations of ", varStr[47]);
	fOutlineStr.CatStr(tmpStr);
	for (n=0; n<nmOfMotivations; ++n) {
		if ((nmOfMotivations > 1) && (n == nmOfMotivations-1))
			fOutlineStr.CatStr("and ");
		sprintf(tmpStr,"(SNF(%hd))", motTbl[n]);
		fOutlineStr.CatStr(tmpStr);
		if ( nmOfMethodologies || nmOfEvaluations || nmOfPurposes )			// make sure
there are more characteristics
			fOutlineStr.CatStr(", ");
		else
			fOutlineStr.CatStr(".");
		// otherwise end the sentence
	}
}
if (nmOfMethodologies) {
	sprintf(tmpStr,"the %smethodologies of ", varStr[48]);
	fOutlineStr.CatStr(tmpStr);
	for (n=0; n<nmOfMethodologies; ++n) {
		if ((nmOfMethodologies > 1) && (n == nmOfMethodologies-1))
			fOutlineStr.CatStr("and ");
		sprintf(tmpStr,"(SNF(%hd))", methTbl[n]);
		fOutlineStr.CatStr(tmpStr);
		if ( nmOfEvaluations || nmOfPurposes )
	// make sure there are more characteristics
			fOutlineStr.CatStr(", ");
		else
			fOutlineStr.CatStr(".");
		// otherwise end the sentence
	}
}
if (nmOfEvaluations) {
	sprintf(tmpStr,"the %smeans of evaluating in terms of ", varStr[49]);
	fOutlineStr.CatStr(tmpStr);
	for (n=0; n<nmOfEvaluations; ++n) {
		if ((nmOfEvaluations > 1) && (n == nmOfEvaluations-1))
			fOutlineStr.CatStr("and ");
		sprintf(tmpStr,"(SNF(%hd))", evalValTbl[n]);
		fOutlineStr.CatStr(tmpStr);
		if ( nmOfPurposes )
				// make sure there are more characteristics
			fOutlineStr.CatStr(", ");
		else
			fOutlineStr.CatStr(".");
		// otherwise end the sentence
	}
}
if (nmOfPurposes) {
	sprintf(tmpStr,"and striving for the %spurposes of", varStr[50]);
	fOutlineStr.CatStr(tmpStr);
	for (n=0; n<nmOfPurposes; ++n) {
		if ((nmOfPurposes > 1) && (n == nmOfPurposes-1))
			fOutlineStr.CatStr(" and");
		sprintf(tmpStr," (SNF(%hd))", purValTbl[n]);
		fOutlineStr.CatStr(tmpStr);
		if (n == nmOfPurposes-1)
			fOutlineStr.CatStr(".");
		else
			fOutlineStr.CatStr(",");
	}
}

doubleSpace();

fOutlineStr.CatStr("In summary, (CNN(MC,NM)) approaches problems ");
fOutlineStr.CatStr("as a (SNF(Approach)), and only ");
sprintf(tmpStr,"tries %s if %s fails", varStr[31], varStr[6]);
fOutlineStr.CatStr(tmpStr);
apropos_STF("Approach", ".  ", false);
sprintf(tmpStr,"%s, the problem in \"(SDI(Title))\" has to ", varStr[33]);
fOutlineStr.CatStr(tmpStr);
sprintf(tmpStr,"do with «B+»(SDF(STDom))«B-» that requires %s", varStr[56]);
fOutlineStr.CatStr(tmpStr);
apropos_STF("STDom", ".  ", false);

sprintf(tmpStr,"So, (CNN(MC,NM)) finds (PPN(MC,IR)) %s involved ", varStr[36]);
fOutlineStr.CatStr(tmpStr);
fOutlineStr.CatStr("in the efforts surrounding the goal.  (CNN(MC,NM)) ");
fOutlineStr.CatStr("believes (PPN(MC,P1)) problems to stem from (SNF(MCFoc))");
```

```
        apropos_STF("MCFoc", " ", true);
        fOutlineStr.CatStr("and sees {SNF(MCDir)} to be the best solution");
        apropos_STF("MCDir", ".  ", false);
        fOutlineStr.CatStr("Still, {PPN(MC,NC)} may come to wonder if {SNF(MCPbm)} might ");
        fOutlineStr.CatStr("actually be the source of the problem. ");
        apropos_STF("MCPbm", ", ", true);
        fOutlineStr.CatStr("and {SNF(MCSol)} the solution");
        apropos_STF("MCSol", ".  ", false);
        fOutlineStr.CatStr("For most of the story {CNN(MC,NM)} sticks ");
        sprintf(tmpStr,"with \"%s\".  ", varStr[29]);
        fOutlineStr.CatStr(tmpStr);
        sprintf(tmpStr,"Ultimately, {CNN(MC,NM)} %s to %s and ", varStr[39], varStr[25]);
        fOutlineStr.CatStr(tmpStr);
        sprintf(tmpStr,"%s \"%s\" as the solution.  ", varStr[41], varStr[42]);
        fOutlineStr.CatStr(tmpStr);
        sprintf(tmpStr,"In the end, {CNN(MC,NM)}'s %s to \"%s\" results ", varStr[27], varStr[43]);
        fOutlineStr.CatStr(tmpStr);
        fOutlineStr.CatStr("in {SNF(Outcome)} in the effort to achieve the goal");
        apropos_STF("Outcome", ".  ", false);
        sprintf(tmpStr,"%s, {PPN(MC,P1)} personal problems %s, ", varStr[57], varStr[58]);
        fOutlineStr.CatStr(tmpStr);
        sprintf(tmpStr,"and therefore the audience views {CNN(MC,NM)}'s %s to %s as %s for {PPN(MC,IR)}.", varStr[24],
varStr[25], varStr[46]);
        fOutlineStr.CatStr(tmpStr);
        doubleSpace();

        if (GetStorytellingBtn()) {
                separator_line(30);
                charDyn_stelling_output();
                mc_stelling_output();
        }

        if (fWindow->GetVocabularyBtn()) {                              // the vocabulary button is pushed down
                separator_line(30);                                                                       //
draw separator between bottom of report and vocabulary list
                doubleSpace();
                fOutlineStr.CatStr("Semantic items in this report:  ");
                fOutlineStr.CatStr("{SNF(Approach)}; ");
                fOutlineStr.CatStr("{SNF(Tendency)}; ");
                fOutlineStr.CatStr("{SNF(Work)}; ");
                fOutlineStr.CatStr("{SNF(Resolve)}; ");
                fOutlineStr.CatStr("{SNF(Outcome)}; ");
                fOutlineStr.CatStr("{SNF(Limit)}; ");
                fOutlineStr.CatStr("{SNF(Judgment)}.");
                fOutlineStr.CatStr("{SNF(Direction)}; ");

                fOutlineStr.CatStr("{SNF(MCDom)}; ");
                fOutlineStr.CatStr("{SNF(MCPbm)}; ");
                fOutlineStr.CatStr("{SNF(MCSol)}; ");
                fOutlineStr.CatStr("{SNF(MCFoc)}; ");
                fOutlineStr.CatStr("{SNF(MCDir)}; ");
                fOutlineStr.CatStr("{SNF(MCUnRng)}; ");
                fOutlineStr.CatStr("{SNF(MCCrFl)}; ");

                doubleSpace();
        }


} /* OutlineView::mc_character_report */


/* ---------------------------------------------------CNH---04/10/94---
        OutlineView::mc_basics_report  - builds a simplified report for the
                                                                        main character "character"
material.
------------------------------------------------------------------------- */
void OutlineView::mc_basics_report(void)
{
        short i;
        char tmpStr[2000];
        char *varStr[60];                                                                  // an array
of character string pointers used to store the "mix-n-match" strings for the last two paragraphs

/********************************** Big test section to determine variable string text
**********************************/
        for (i = 0; i <= 59; ++i)
                varStr[i] = "UNDEFINED";                                                   // initialize the
string pointers

        if (ACTION)
                varStr[1] = "take «B+»Action«B-»";
        else
                varStr[1] = "make this «B+»Decision«B-»";

        if (TIMELOCK)
                varStr[2] = "«B+»Time«B-»";
        else
                varStr[2] = "«B+»Options«B-»";

        if (CHANGE)
                varStr[3] = "«B+»Changes«B-»";
        else
                varStr[3] = "«B+»Remains Steadfast«B-»";

        if (SUCCESS)
                varStr[4] = "«B+»Succeed«B-»";
        else
                varStr[4] = "«B+»Fail«B-»";


/********************************** End of Test **********************************/

        do_title("Character Report for the Main Character of \"{SDI(Title)}\"");

        fOutlineStr.CatStr("The story is about {CNN(MC,NM)}.");
        doubleSpace();
```

```
	fOutlineStr.CatStr("{CNN(MC,NM)} is a person who needs to {SNF(Direction)} something");
	apropos_STF("Direction", ".", false);
	doubleSpace();

	fOutlineStr.CatStr("{CNN(MC,NM)} is impacted by {SNF(MCCrFl)},");
	apropos_STF("MCCrFl", ", ", true);
	fOutlineStr.CatStr("and affected by {SNF(MCPbm)}");
	apropos_STF("MCPbm", ".", false);
	doubleSpace();

	fOutlineStr.CatStr("{CNN(MC,NM)} is a {SNF(Approach)}");
	apropos_STF("Approach", ".  ", false);
	sprintf(tmpStr,"At the climax of this story, {CNN(MC,NM)} must %s", varStr[1]);
	fOutlineStr.CatStr(tmpStr);
	apropos_STF("Work", ".  ", false);
	sprintf(tmpStr,"{CNN(MC,NM)} will eventually be forced to %s ", varStr[1]);
	fOutlineStr.CatStr(tmpStr);
	sprintf(tmpStr,"because {PPN(MC,NC)} is running out of %s", varStr[2]);
	fOutlineStr.CatStr(tmpStr);
	apropos_STF("Limit", ".", false);
	doubleSpace();

	fOutlineStr.CatStr("{CNN(MC,NM)} thinks {PPN(MC,P1)} problem is due to {SNF(MCFoc)}");
	apropos_STF("MCFoc", ".  ", false);
	fOutlineStr.CatStr("And, {PPN(MC,NC)} believes {PPN(MC,NC)} can solve this problem through {SNF(MCDir)}");
	apropos_STF("MCDir", ".", false);
	doubleSpace();

	fOutlineStr.CatStr("As the story progresses, {CNN(MC,NM)} slowly realizes that ");
	fOutlineStr.CatStr("the solution to {PPN(MC,P1)} problems is not due ");
	fOutlineStr.CatStr("to {SNF(MCFoc)}, but {SNF(MCSol)}");
	apropos_STF("MCSol", ".", false);
	doubleSpace();

	sprintf(tmpStr,"Now, due to lack of %s", varStr[2]);
	fOutlineStr.CatStr(tmpStr);
	apropos_STF("Limit", ", ", true);
	sprintf(tmpStr,"{CNN(MC,NM)} is forced to %s", varStr[1]);
	fOutlineStr.CatStr(tmpStr);
	apropos_STF("Work", ".", false);
	doubleSpace();

	if (CHANGE) {
		fOutlineStr.CatStr("Ultimately, because {CNN(MC,NM)} has {SNN(MCUnRng)}");
		apropos_STF("MCUnRng", ", ", true);
		sprintf(tmpStr,"{CNN(MC,NM)} %s", varStr[3]);
		fOutlineStr.CatStr(tmpStr);
		apropos_STF("Resolve", " ", true);
		fOutlineStr.CatStr("to {SNN(MCSol)}");
		apropos_STF("MCSol", ".", false);
	} else {  //  STEADFAST
		fOutlineStr.CatStr("Ultimately, because of {CNN(MC,NM)}'s {SNN(MCUnRng)}");
		apropos_STF("MCUnRng", ", ", true);
		sprintf(tmpStr,"{PPN(MC,NC)} %s", varStr[3]);
		fOutlineStr.CatStr(tmpStr);
		apropos_STF("Resolve", " ", true);
		fOutlineStr.CatStr("in his ");
		if (STOP) {
			fOutlineStr.CatStr("{SNN(MCFoc)}");
			apropos_STF("MCFoc", ".", false);
		} else {
			fOutlineStr.CatStr("{SNN(MCDir)}");
			apropos_STF("MCDir", ".", false);
		}
	}
	doubleSpace();

	sprintf(tmpStr,"In this story, {CNN(MC,NM)} will %s", varStr[4]);
	fOutlineStr.CatStr(tmpStr);
	apropos_STF("Outcome", " ", true);
	fOutlineStr.CatStr("which the audience would judge as {SNF(Judgment)} for {PPN(MC,IR)}");
	apropos_STF("Judgment", ".", false);
	doubleSpace();

	if (fWindow->GetVocabularyBtn()) {                          // the vocabulary button is pushed down
		separator_line(30);                                                                       //
draw separator between bottom of report and vocabulary list
		doubleSpace();
		fOutlineStr.CatStr("Semantic items in this report:  ");
		fOutlineStr.CatStr("{SNF(Direction)}; ");
		fOutlineStr.CatStr("{SNF(MCCrFl)}; ");
		fOutlineStr.CatStr("{SNF(MCPbm)}; ");
		fOutlineStr.CatStr("{SNF(Approach)}; ");
		fOutlineStr.CatStr("{SNF(Work)}; ");
		fOutlineStr.CatStr("{SNF(Limit)}; ");
		fOutlineStr.CatStr("{SNF(MCFoc)}; ");
		fOutlineStr.CatStr("{SNF(MCDir)}; ");
		fOutlineStr.CatStr("{SNF(MCSol)}; ");
		fOutlineStr.CatStr("{SNF(MCUnRng)}; ");
		fOutlineStr.CatStr("{SNF(Resolve)}; ");
		fOutlineStr.CatStr("{SNF(Outcome)}; ");
		fOutlineStr.CatStr("{SNF(Judgment)}.");
		doubleSpace();
	}

#if 0
	if (GetStorytellingBtn()) {
		separator_line(30);
		charDyn_stelling_output();
		mc_stelling_output();
	}
#endif

} /* OutlineView::mc_basics_report */



/* -------------------------------------------------CNH---02/23/94---
	OutlineView::oc_character_report  - builds a report for the obstacle
```

```
                                                                                character Character material.
------------------------------------------------------------------------------ */
void OutlineView::oc_character_report(void)
{
        short i;
        char tmpStr[300];
        char *varStr[31];                                                                       // an array
of character string pointers used to store the "mix-n-match" strings for the last two paragraphs


/********************************** Big test section to determine variable string text
**********************************/
        for (i = 0; i <= 30; ++i)
                varStr[i] = "UNDEFINED";                                                  // initialize the
string pointers

        varStr[1] = "(SNF(STSol))";

        if (CHANGE) {
                varStr[1] = "succumbs to";
                varStr[2] = "and does so, adopting";
                varStr[9] = "successful";
                varStr[11] = "abandons";
                varStr[27] = "in favor of";
                if (GOOD) {
                        varStr[7] = "not";
                        varStr[8] = " after all";
                        varStr[15] = "(SNF(PLFoc))";
                        varStr[17] = "(SNF(PLDir))";
                        varStr[18] = "(SNF(PLPbm))";
                        varStr[19] = "(SNF(PLSol))";
                } else {  //  BAD
                        varStr[7] = "truly";
                        varStr[8] = "";
                        varStr[15] = "(SNF(PLPbm))";
                        varStr[17] = "(SNF(PLSol))";
                        varStr[18] = "(SNF(PLFoc))";
                        varStr[19] = "(SNF(PLDir))";
                }

                if (SUCCESS) {
                        varStr[20] = "(SVB(OC,STPbm,INF))";
                        varStr[21] = "(SVB(OC,STSol,INF))";
                } else {  //  (FAILURE)
                        varStr[20] = "(SVB(OC,STSol,INF))";
                        varStr[21] = "(SVB(OC,STPbm,INF))";
                }

                if (TIMELOCK) {
                        varStr[3] = "at the very last minute";
                } else {  //  (SPACELOCK)
                        varStr[3] = "just before (PPN(MC,P1)) options run out";
                }

        } else {                //  (STEADFAST)
                varStr[1] = "holds out against";
                varStr[2] = "and sticks with";
                varStr[9] = "unsuccessful";
                varStr[11] = "decides to hold onto";
                varStr[27] = "rejecting";
                if (GOOD) {
                        varStr[7] = "truly";
                        varStr[8] = "";
                        varStr[15] = "(SNF(PLPbm))";
                        varStr[17] = "(SNF(PLSol))";
                        varStr[18] = "(SNF(PLFoc))";
                        varStr[19] = "(SNF(PLDir))";
                } else {  //  BAD
                        varStr[7] = "not";
                        varStr[8] = " after all";
                        varStr[15] = "(SNF(PLFoc))";
                        varStr[17] = "(SNF(PLDir))";
                        varStr[18] = "(SNF(PLPbm))";
                        varStr[19] = "(SNF(PLSol))";
                }

                if (SUCCESS) {
                        varStr[20] = "(SVB(OC,STDir,INF))";
                        varStr[21] = "(SVB(OC,STFoc,INF))";
                } else {  //  (FAILURE)
                        varStr[20] = "(SVB(OC,STFoc,INF))";
                        varStr[21] = "(SVB(OC,STDir,INF))";
                }

                if (TIMELOCK) {
                        varStr[3] = "until time runs out";
                } else {  //  (SPACELOCK)
                        varStr[3] = "until all options have run out";
                }
        }

        if (SUCCESS) {
                varStr[13] = "";
                if (GOOD) {
                        varStr[4] = "not only does";
                        varStr[5] = "but ";
                        varStr[12] = "";
                } else {  //  BAD
                        varStr[4] = "although";
                        varStr[5] = "";
                        varStr[12] = "even though ";
                }

        } else {                //  (FAILURE)
                varStr[13] = "not ";
                if (GOOD) {
                        varStr[4] = "although";
                        varStr[5] = "";
                        varStr[12] = "even though ";
                } else {  //  BAD
                        varStr[4] = "not only does";
                        varStr[5] = "but ";
                        varStr[12] = "";
```

```
                }
        }
        if (GOOD) {
                varStr[6] = "resolves";
                varStr[14] = "are resolved";
        } else {        // (BAD)
                varStr[6] = "fails to resolve";
                varStr[14] = "remain unresolved";
        }

        if (TIMELOCK) {
                varStr[10] = "At the very last moment";
        } else {  //  (SPACELOCK)
                varStr[10] = "Just as (PPN(MC,NM)) options run out";
        }

/********************************** End of Test **********************************/


        do_title("Character Report for the Obstacle Character of \"(SDI(Title))\"");

        fOutlineStr.CatStr("This report is currently under deconstruction.  ");

#if 0
        fOutlineStr.CatStr("The Obstacle character is not necessarily a villain.  ");
        fOutlineStr.CatStr("In fact, just as often they can be heroes.  ");
        fOutlineStr.CatStr("They serve as obstacles only because they stand in ");
        fOutlineStr.CatStr("the way of the Main character's path.  ");
        fOutlineStr.CatStr("If the Main Character is on the correct track, the Obstacle ");
        fOutlineStr.CatStr("character works to force or draw them off that track. ");
        fOutlineStr.CatStr("If the Main character is on the wrong track, ");
        fOutlineStr.CatStr("the Obstacle character works to set them straight.  ");
        fOutlineStr.CatStr("Either way, to the Main Character the Obstacle character appears against them.");
        doubleSpace();

        fOutlineStr.CatStr("In \"(SDI(Title))\", (CNN(OC,NM)) is the primary adversary ");
        fOutlineStr.CatStr("toward (CNN(MC,NM))'s direction of growth.  ");
        fOutlineStr.CatStr("Throughout the story, (CNN(OC,NM)) tries to ");
        fOutlineStr.CatStr("get (CNN(MC,NM)) to change course, ");
        fOutlineStr.CatStr("but (CNN(MC,NM)) stubbornly holds on right up to the moment of climax.");
        doubleSpace();

        fOutlineStr.CatStr("(CNN(OC,NM)) argues that (CNN(MC,NM))'s personal problems ");
        sprintf(tmpStr,"stem from \"%s\" and that \"%s\" will resolve them.  ", varStr[15], varStr[17]);
        fOutlineStr.CatStr(tmpStr);
        fOutlineStr.CatStr("But (CNN(MC,NM)) sees (PPN(MC,P1)) personal problems ");
        sprintf(tmpStr,"stemming from \"%s\" and is ", varStr[18]);
        fOutlineStr.CatStr(tmpStr);
        sprintf(tmpStr,"convinced that \"%s\" will resolve them.", varStr[19]);
        fOutlineStr.CatStr(tmpStr);
        doubleSpace();

        fOutlineStr.CatStr("Because (CNN(MC,NM)) holds the key to objective ");
        fOutlineStr.CatStr("success as well as to (PPN(MC,P1)) personal fulfillment, ");
        fOutlineStr.CatStr("(CNN(OC,NM))'s efforts have an impact in the objective story as well.  ");
        fOutlineStr.CatStr("Whereas (CNN(MC,NM)) represents the motivation ");
        sprintf(tmpStr,"to \"%s\", (CNN(OC,NM)) represents the ", varStr[20]);
        fOutlineStr.CatStr(tmpStr);
        sprintf(tmpStr,"motivation to \"%s\", in regard to the story goal.", varStr[21]);
        doubleSpace();

        sprintf(tmpStr,"In the end, (CNN(MC,NM)) %s ", varStr[1]);
        fOutlineStr.CatStr(tmpStr);
        fOutlineStr.CatStr("(CNN(OC,NM))'s story-long pressure to change, ");
        sprintf(tmpStr,"%s \"%s\" %s.  ", varStr[2], varStr[19], varStr[3]);
        fOutlineStr.CatStr(tmpStr);
        sprintf(tmpStr,"As a result, %s the Objective Story ", varStr[4]);
        fOutlineStr.CatStr(tmpStr);
        fOutlineStr.CatStr("meets with \"(SNF(Outcome))\" in the efforts surrounding the goal, ");
        sprintf(tmpStr,"%s(CNN(MC,NM)) %s (PPN(MC,P1)) personal ", varStr[5], varStr[6]);
        fOutlineStr.CatStr(tmpStr);
        sprintf(tmpStr,"problems, proving (CNN(OC,NM)) to have %s been ", varStr[7]);
        fOutlineStr.CatStr(tmpStr);
        sprintf(tmpStr,"an obstacle to (CNN(MC,NM))'s pursuit of happiness%s.", varStr[8]);
        fOutlineStr.CatStr(tmpStr);
        doubleSpace();

        fOutlineStr.CatStr("In Summary, (CNN(OC,NM)) works throughout the story ");
        fOutlineStr.CatStr("to convince (CNN(MC,NM)) that (PPN(MC,P1)) personal problems stem ");
        sprintf(tmpStr,"from \"%s\" and that \"%s\" is the only ", varStr[15], varStr[17]);
        fOutlineStr.CatStr(tmpStr);
        fOutlineStr.CatStr("way to resolve them.  For most of the story, ");
        fOutlineStr.CatStr("(CNN(MC,NM)) holds onto (PPN(MC,P1)) own view ");
        sprintf(tmpStr,"that \"%s\" is at the root of (PPN(MC,P1)) ", varStr[18]);
        fOutlineStr.CatStr(tmpStr);
        sprintf(tmpStr,"problems and \"%s\" is the best solution.  ", varStr[19]);
        fOutlineStr.CatStr(tmpStr);
        sprintf(tmpStr,"In the end, (CNN(OC,NM)) is %s in changing ", varStr[9]);
        fOutlineStr.CatStr(tmpStr);
        sprintf(tmpStr,"(CNN(MC,NM))'s mind.  %s, ", varStr[10]);
        fOutlineStr.CatStr(tmpStr);
        sprintf(tmpStr,"(CNN(MC,NM)) %s \"%s\" %s \"%s\".  ", varStr[11], varStr[19], varStr[27], varStr[17]);
        fOutlineStr.CatStr(tmpStr);
        sprintf(tmpStr,"As a result, %s success is%s achieved ", varStr[12], varStr[13]);
        fOutlineStr.CatStr(tmpStr);
        fOutlineStr.CatStr("in regard to the objective goal, ");
        sprintf(tmpStr,"(CNN(MC,NM))'s personal problems %s.", varStr[14]);
        fOutlineStr.CatStr(tmpStr);
        doubleSpace();
#endif

} /* OutlineView::oc_character_report */


/* -------------------------------------------------CNH---02/10/94---
        OutlineView::os_plot_report  - builds a report for the objective story
                                                                plot material.
```

```
----------------------------------------------------------------------------- */
void OutlineView::os_plot_report(void)
{
	bool_t tutorialON = GetTutorialBtn();

	do_title("Objective Story Plot Report\n");
	do_title("Story Appreciations for \"(SDI(Title))\"");

	if (tutorialON) {
		fOutlineStr.CatStr("The Objective Plot represents the course of the rational argument ");
		fOutlineStr.CatStr("as to the most practical solution for a given problem.  ");
		fOutlineStr.CatStr("The events and interactions that occur in scenes, ");
		fOutlineStr.CatStr("sequences and acts are the givens, postulates and theorems of that argument.  ");
		fOutlineStr.CatStr("Looking at a plot as a single thread is much too simple.  ");
		fOutlineStr.CatStr("In fact, constructing a plot is more like building a pyramid.  ");
		fOutlineStr.CatStr("The effort begins at the ground floor with the problem.  ");
		fOutlineStr.CatStr("Level by level, one layer of the argument is built upon the last, ");
		fOutlineStr.CatStr("scene upon sequence upon act, until all sides converge on a single ");
		fOutlineStr.CatStr("point that represents the focal point (or conclusion) of the rational argument.");
		doubleSpace();


		fOutlineStr.CatStr("This focal point is called the goal, and it depends upon a network ");
		fOutlineStr.CatStr("of previous successes if it is to be reached.  ");
		fOutlineStr.CatStr("This goal, however, may or may not be what an author feels is the proper solution.
");
		fOutlineStr.CatStr("Therefore, in some stories the author leads the audience to hope for achievement of
the goal; ");
		fOutlineStr.CatStr("in other stories the audience is made to hope the goal is prevented.  ");
		fOutlineStr.CatStr("Sometimes, the author's purpose is to weigh both sides of the argument so ");
		fOutlineStr.CatStr("equally that there is not a clear cut bias as to ");
		fOutlineStr.CatStr("whether the goal is to be desired or spurned.  ");
		fOutlineStr.CatStr("These stories leave that conclusion unresolved ");
		fOutlineStr.CatStr("so that the audience will continue to ponder the issues.");
		doubleSpace();

		fOutlineStr.CatStr("The following report is based on your decision to take a ");
		fOutlineStr.CatStr("neutral ");
		fOutlineStr.CatStr("stand regarding the desirability of achieving the goal.");
		doubleSpace();
	}

	fOutlineStr.CatStr("In \"(SDI(Title))\", the Goal is (SNF(STGoal)).  ");
	fOutlineStr.CatStr("Some of the objective characters are for the Goal, while others are against it.  ");
	fOutlineStr.CatStr("Regardless, before (SNF(STGoal)) can be achieved, certain Requirements must be met.  ");
	fOutlineStr.CatStr("These Requirements all involve (SNF(STReq)) in one way or another.  ");
	fOutlineStr.CatStr("As a result, although the objective characters are all ");
	fOutlineStr.CatStr("concerned with (SNF(STGoal)) they spend most of their ");
	fOutlineStr.CatStr("time concentrating on (SNF(STReq)) as the means of ");
	fOutlineStr.CatStr("achieving it or the best place to prevent it, ");
	fOutlineStr.CatStr("depending upon their point of view.");
	doubleSpace();

	fOutlineStr.CatStr("Just as the Goal depends upon Requirements, Requirements depend up Pre-requisites.  ");
	fOutlineStr.CatStr("In \"(SDI(Title))\", these Pre-requisites all have to do with (SNF(PLReq)).  ");
	fOutlineStr.CatStr("In other words, only though progress in (SNF(PLReq)) will ");
	fOutlineStr.CatStr("Requirements of (SNF(STReq)) be met, clearing the way toward (SNF(STGoal)).");
	doubleSpace();

	fOutlineStr.CatStr("What if the Goal is not achieved?  The alternative is the Consequence.  ");
	fOutlineStr.CatStr("The Consequence may appear to be positive or negative, ");
	fOutlineStr.CatStr("depending upon which side of the Goal one is on.  ");
	fOutlineStr.CatStr("In \"(SDI(Title))\", this Consequence involves (SNF(PLGoal)).  ");
	fOutlineStr.CatStr("Something to do with (SNF(PLGoal)) then will happen ");
	fOutlineStr.CatStr("if a Goal regarding (SNF(STGoal)) is not achieved.");
	doubleSpace();

	fOutlineStr.CatStr("The audience can judge progress toward the Goal ");
	fOutlineStr.CatStr("by the number of Requirements that are met.  ");
	fOutlineStr.CatStr("Indications that the Consequence is becoming more imminent is provided by Forewarnings.  ");
	fOutlineStr.CatStr("In \"(SDI(Title))\", changes in (SNF(MCReq)) act ");
	fOutlineStr.CatStr("as indicators that the Consequence is drawing near.");
	doubleSpace();

	fOutlineStr.CatStr("Just as Pre-requisites provide the groundwork necessary to meet the Requirements, ");
	fOutlineStr.CatStr("Pre-conditions set the stage for the advent of Forewarnings.  ");
	fOutlineStr.CatStr("So, in \"(SDI(Title))\", Forewarnings in the form of (SNF(MCReq)) are ");
	fOutlineStr.CatStr("preceded by Pre-conditions of (SNF(OCReq)).  ");
	fOutlineStr.CatStr("A sure way to tell a Pre-requisite from a Pre-condition ");
	fOutlineStr.CatStr("is that Pre-requisites are an essential part of the ");
	fOutlineStr.CatStr("effort toward the Goal, while Pre-conditions are only made ");
	fOutlineStr.CatStr("essential due to someone's insistence that the conditions be met.");
	doubleSpace();

	fOutlineStr.CatStr("While all this effort is going on, certain Costs are incurred ");
	fOutlineStr.CatStr("and Dividends accrued that make the effort all that more draining or rewarding.  ");
	fOutlineStr.CatStr("In \"(SDI(Title))\", Costs involve (SNF(OCGoal)), ");
	fOutlineStr.CatStr("while Dividends are found in (SNF(MCGoal)).");
	doubleSpace();

	fOutlineStr.CatStr("In summary, \"(SDI(Title))\" concerns a Goal regarding (SNF(STGoal))");
	apropos_STF("STGoal", ", ", true);
	fOutlineStr.CatStr("which Requires progress to be made in (SNF(STReq))");
	apropos_STF("STReq", ".  ", false);
	fOutlineStr.CatStr("If the Goal is not achieved, a Consequence regarding (SNF(PLGoal)) will transpire");
	apropos_STF("PLGoal", ".  ", false);
	fOutlineStr.CatStr("The imminent approach of the Consequence is gauged by instances or ");
	fOutlineStr.CatStr("degrees of (SNF(MCReq))");
	apropos_STF("MCReq", ", ", true);
	fOutlineStr.CatStr("which come when Pre-conditions of (SNF(OCReq)) exist");
	apropos_STF("OCReq", ".  ", false);
	fOutlineStr.CatStr("(SNF(OCReq)) is not intrinsically essential to progress ");
	fOutlineStr.CatStr("toward the goal (essential Pre-requisites pertain to (SNF(PLReq)))");
	apropos_STF("PLReq", " ", true);
	fOutlineStr.CatStr("but are made essential by someone's insistence.  ");
	fOutlineStr.CatStr("As a result of these efforts, Costs involving (SNF(OCGoal)) are incurred");
	apropos_STF("OCGoal", ", ", true);
	fOutlineStr.CatStr("while Dividends are found in (SNF(MCGoal))");
	apropos_STF("MCGoal", ".", false);

	fOutlineStr.CatStr("");
	doubleSpace();
```

```
} /* OutlineView::os_plot_report */


/* --------------------------------------------------CNH---02/14/94---
        OutlineView::os_dynamics_report  - builds a report for the objective story
                                                                  dynamics material.
----------------------------------------------------------------------------- */
void OutlineView::os_dynamics_report(void)
{
        short i;
        char tmpStr[300];
        char *varStr[23];                                                    // an array
of character string pointers used to store the "mix-n-match" strings for the last two paragraphs

        bool_t tutorialON = GetTutorialBtn();

/********************************** Big test section to determine variable string text
**********************************/
        for (i = 0; i <= 22; ++i)
                varStr[i] = "UNDEFINED";                                     // initialize the
string pointers

        if (ACTION) {
                varStr[1] = "taken";
                varStr[2] = "deliberate";
                varStr[3] = "decide";
                varStr[4] = "decision";
                varStr[17] = "made";
        } else {        // (DECISION)
                varStr[1] = "made";
                varStr[2] = "respond";
                varStr[3] = "take action";
                varStr[4] = "action";
                varStr[17] = "taken";
        }

        if (SPACELOCK) {
                varStr[5] = "options are";
                varStr[6] = "options";
                varStr[7] = "an optionlock";
                varStr[8] = "ticking clock";
                varStr[9] = "the closing down of options";
                varStr[16] = "all options have been exhausted";
        } else {        // (TIMELOCK)
                varStr[5] = "time is";
                varStr[6] = "time";
                varStr[7] = "a timelock";
                varStr[8] = "running out of options";
                varStr[9] = "by running out of time";
                varStr[16] = "time has run out";
        }

        if (SUCCESS) {
                varStr[10] = "is";
                varStr[11] = "been achieved";
                if (GOOD) {
                        varStr[12] = "not only does";
                        varStr[13] = "but ";
                } else {        // (BAD)
                        varStr[12] = "although";
                        varStr[13] = "";
                }
        } else {        // (FAILURE)
                varStr[10] = "is NOT";
                varStr[11] = "occurred";
                if (GOOD) {
                        varStr[12] = "although";
                        varStr[13] = "";
                } else {        // (BAD)
                        varStr[12] = "not only does";
                        varStr[13] = "but ";
                }
        }

        if (GOOD) {
                varStr[14] = "favorable";
        } else {        // (BAD)
                varStr[14] = "unfavorable";
        }
/********************************** END of Big test section **********************************/


        do_title("Objective Story Plot Dynamics Report for \"(SDI(Title))\"");

        if (tutorialON) {
                fOutlineStr.CatStr("Plot is best thought of as having two distinct aspects: ");
                fOutlineStr.CatStr("how dramatic dynamics change over the course of ");
                fOutlineStr.CatStr("the story and the sequence in which  events occur.  ");
                fOutlineStr.CatStr("This is quite different from theme.  ");
                fOutlineStr.CatStr("While theme describes the influence dynamics have ");
                fOutlineStr.CatStr("on a story, plot examines how that ");
                fOutlineStr.CatStr("influence changes as the story develops.  ");
                fOutlineStr.CatStr("And while theme describes the nature of the ");
                fOutlineStr.CatStr("events that transpire, plot delineates the order in which they occur.");
                doubleSpace();
        }

        fOutlineStr.CatStr("In terms of plot dynamics, \"(SDI(Title))\" is a story driven by (SNF(Work)).  ");
        fOutlineStr.CatStr("This does not necessarily mean that the focus ");
        fOutlineStr.CatStr("of the plot is about (SNF(Work))s occurring, but rather ");
        fOutlineStr.CatStr("that the plot is driven forward by (SNF(Work))s.  ");
        sprintf(tmpStr,"In other words, when (SNF(Work))s are %s it ", varStr[1]);
        fOutlineStr.CatStr(tmpStr);
        sprintf(tmpStr,"forces the objective characters to ", );
        fOutlineStr.CatStr(tmpStr);
        sprintf(tmpStr,"%s and ultimately %s.  ", varStr[2], varStr[3]);
        fOutlineStr.CatStr(tmpStr);
        sprintf(tmpStr,"In \"(SDI(Title))\", these %ss would never be %s ", varStr[4], varStr[17]);
        fOutlineStr.CatStr(tmpStr);
```

```
	sprintf(tmpStr,"if (SNF(Work))s had not been %s.  ", varStr[1]);
	fOutlineStr.CatStr(tmpStr);
	sprintf(tmpStr,"So, in short, it is a causal relationship that exists: (SNF(Work))s force %ss.", varStr[4]);
	fOutlineStr.CatStr(tmpStr);
	doubleSpace();

	if (tutorialON) {
		fOutlineStr.CatStr("If (SNF(Work))s are driving the plot forward, ");
		fOutlineStr.CatStr("what determines the point of climax?  ");
		fOutlineStr.CatStr("Stories come to a conclusion because the objective characters ");
		fOutlineStr.CatStr("have either run out of time or run out of options.  ");
	}

	fOutlineStr.CatStr("In \"(SDI(Title))\", the plot reaches a climax because the objective characters ");
	sprintf(tmpStr,"run out of %s.  This is called %s, ", varStr[6], varStr[7]);
	fOutlineStr.CatStr(tmpStr);
	fOutlineStr.CatStr("which means that the tension of the plot is not created by ");
	sprintf(tmpStr,"a %s but %s.  ", varStr[8], varStr[9]);
	fOutlineStr.CatStr(tmpStr);
	sprintf(tmpStr,"When all the %s gone, the climax (or moment of truth) is reached.", varStr[5]);
	fOutlineStr.CatStr(tmpStr);
	doubleSpace();

	fOutlineStr.CatStr("What happens at that moment of truth?  ");
	fOutlineStr.CatStr("Do the objective characters achieve what they set out to achieve?  ");
	fOutlineStr.CatStr("In \"(SDI(Title))\", the efforts of the objective characters ");
	fOutlineStr.CatStr("ultimately result in (SNF(Outcome)).  ");
	fOutlineStr.CatStr("Of course, there are characters both for and ");
	fOutlineStr.CatStr("against the effort to achieve the goal, ");
	fOutlineStr.CatStr("and the audience might be rooting for either side.  ");
	fOutlineStr.CatStr("Therefore it is important to realize that (SNF(Outcome)) ");
	fOutlineStr.CatStr("does not necessarily mean the audience will be pleased with the outcome.  ");
	fOutlineStr.CatStr("In fact, if the goal is seen as a negative thing, ");
	fOutlineStr.CatStr("the audience might very well be rooting for failure.  ");
	fOutlineStr.CatStr("Still, ");
						// by the narrow definition above,
	sprintf(tmpStr,"since the goal %s achieved in \"(SDI(Title))\", ", varStr[10]);
	fOutlineStr.CatStr(tmpStr);
	fOutlineStr.CatStr("the efforts of those for the goal meet with (SNF(Outcome)).");
	doubleSpace();

	fOutlineStr.CatStr("But what about main character's personal problems?  ");
	sprintf(tmpStr,"Once (SNF(Outcome)) has %s, ", varStr[11]);
	fOutlineStr.CatStr(tmpStr);
	fOutlineStr.CatStr("is the main character satisfied as well?  ");

	if (tutorialON) {
		fOutlineStr.CatStr("An author can instill a sense that the outcome of a story ");
		fOutlineStr.CatStr("is either a good thing or a bad thing regardless ");
		fOutlineStr.CatStr("if that outcome was a success or failure.  ");
	}

	fOutlineStr.CatStr("In \"(SDI(Title))\", plot dynamics indicate ");
	sprintf(tmpStr,"that %s the effort to achieve ", varStr[12]);
	fOutlineStr.CatStr(tmpStr);
	sprintf(tmpStr,"the goal meets with (SNF(Outcome)), %sthis ", varStr[13]);
	fOutlineStr.CatStr(tmpStr);
	sprintf(tmpStr,"is %s in context of the main character ", varStr[14]);
	fOutlineStr.CatStr(tmpStr);
	fOutlineStr.CatStr("and therefore seen as (SNF(Judgment)).");
	doubleSpace();

	fOutlineStr.CatStr("In summary, the plot dynamics of \"(SDI(Title))\" indicate ");
	fOutlineStr.CatStr("that the plot is driven by (SNF(Work))s which ");
	sprintf(tmpStr,"force %ss to be %s", varStr[4], varStr[1]);
	fOutlineStr.CatStr(tmpStr);
	apropos_STF("Work", ".  ", false);
	sprintf(tmpStr,"This drive forces the plot to a climax when %s", varStr[16]);
	fOutlineStr.CatStr(tmpStr);
	apropos_STF("Limit", ".  ", false);
	fOutlineStr.CatStr("In the end, the efforts to achieve the goal meet with (SNF(Outcome))");
	apropos_STF("Outcome", ", ", true);
	fOutlineStr.CatStr("which is seen as a (SNF(Judgment)) outcome in terms of the main character's problems.");
	apropos_STF("Judgment", ".", false);
	doubleSpace();

	sprintf(tmpStr,"", );
	fOutlineStr.CatStr(tmpStr);
	fOutlineStr.CatStr("");
	doubleSpace();

} /* OutlineView::os_dynamics_report */



/* ---------------------------------------------------CNH---02/10/94---
	OutlineView::plot_sequence_report  - builds a report for the all of
						the summary report material.
---------------------------------------------------------------------------- */
void OutlineView::plot_sequence_report(void)
{
	char tmpStr[300];
	bool_t tutorialON = GetTutorialBtn();

	do_title("Plot Sequence Report for \"(SDI(Title))\"");

	if (tutorialON) {
		fOutlineStr.CatStr("A slap in the face followed by a scream is not the ");
		fOutlineStr.CatStr("same as a scream followed by a slap in the face.  ");
		fOutlineStr.CatStr("Meaning changes depending upon the order in which events occur.  ");
		fOutlineStr.CatStr("This is also true of the order in which the aspects ");
		fOutlineStr.CatStr("of a story problem are explored, most noticeably at the act level.  ");
		fOutlineStr.CatStr("Even slightly different paths can create ");
		fOutlineStr.CatStr("significantly different impact on an audience.");
		doubleSpace();

		fOutlineStr.CatStr("Acts, Sequences, Scenes, and Events work together ");
		fOutlineStr.CatStr("at different levels of resolution like wheels within wheels.  ");
		fOutlineStr.CatStr("This is what allows plots to make sense and also be unpredictable.  ");
		fOutlineStr.CatStr("As each wheel turns the story unfolds, like tumblers ");
		fOutlineStr.CatStr("on a combination lock, until the final event clicks into ");
```

```
                fOutlineStr.CatStr("place and the meaning of the story opens for the audience.");
                doubleSpace();

                fOutlineStr.CatStr("In terms of Acts, Dramatica sees both a three act ");
                fOutlineStr.CatStr("and a four act structure to stories.  ");
                fOutlineStr.CatStr("To illustrate this, hold up four fingers on one hand.  ");
                fOutlineStr.CatStr("Each finger represents the topic of an act in a four act structure.  ");
                fOutlineStr.CatStr("However, if you begin at the first topic and move ");
                fOutlineStr.CatStr("to the second, you have created one dynamic act.  ");
                fOutlineStr.CatStr("Second finger to third finger is act two, ");
                fOutlineStr.CatStr("and third finger to fourth finger is act three.  ");
                fOutlineStr.CatStr("So, although there are four structural acts when ");
                fOutlineStr.CatStr("you see the wholeness of a story, there are only three ");
                fOutlineStr.CatStr("dynamic acts when you experience the story as it unfolds.");
                doubleSpace();

                fOutlineStr.CatStr("The meaning of a three act appreciation is largely open ");
                fOutlineStr.CatStr("to interpretation because it deals with ongoing changes. ");
                fOutlineStr.CatStr(" A four act appreciation, however, is wholly objective, ");
                fOutlineStr.CatStr("and therefore provides a much more consistent ");
                fOutlineStr.CatStr("approach to story creation and analysis.  ");
                fOutlineStr.CatStr("It is useful to keep in mind that when writing ");
                fOutlineStr.CatStr("in a four act structure, each act has a purpose ");
                fOutlineStr.CatStr("that stands alone, independent of the other acts.  ");
                fOutlineStr.CatStr("So although their overall impact is felt by ");
                fOutlineStr.CatStr("the audience as the story unfolds, the topic of ");
                fOutlineStr.CatStr("each act may be explored as an individual dramatic unit.");
                doubleSpace();

                separator_line(25);                                          // THE OBJECTIVE
STORYLINE
        }

        fOutlineStr.CatStr("\n");
        do_title("THE OBJECTIVE STORYLINE");

        fOutlineStr.CatStr("The Objective Storyline deals with the kinds of ");
        fOutlineStr.CatStr("activities the objective characters will be engaged in, act by act.  ");
        fOutlineStr.CatStr("In \"(SDI(Title))\", act one deals primarily ");
        sprintf(tmpStr,"with (SNF(%hd)), ", fDoc->GetApprValByIndex(kApprSTType1));
        fOutlineStr.CatStr(tmpStr);
        sprintf(tmpStr,"act two with (SNF(%hd)), ", fDoc->GetApprValByIndex(kApprSTType2));
        fOutlineStr.CatStr(tmpStr);
        sprintf(tmpStr,"act three with (SNF(%hd)) ", fDoc->GetApprValByIndex(kApprSTType3));
        fOutlineStr.CatStr(tmpStr);
        sprintf(tmpStr,"and act four concentrates on (SNF(%hd)).  ", fDoc->GetApprValByIndex(kApprSTType4));
        fOutlineStr.CatStr(tmpStr);
        fOutlineStr.CatStr("Each of these acts is made richer by the thematic topics that are explored within it.");
        buildTypeVars(AP_STORY);                            // Build the variations list
        doubleSpace();

        separator_line(25);                                          // THE SUBJECTIVE STORYLINE
        fOutlineStr.CatStr("\n");
        do_title("THE SUBJECTIVE STORYLINE");

        fOutlineStr.CatStr("The Subjective Storyline deals with the interactions ");
        fOutlineStr.CatStr("that occur between the main and obstacle characters, act by act.  ");
        fOutlineStr.CatStr("In \"(SDI(Title))\", act one deals primarily ");
        sprintf(tmpStr,"with (SNF(%hd)), act two with (SNF(%hd)), ", fDoc->GetApprValByIndex(kApprPLType1), fDoc-
>GetApprValByIndex(kApprPLType2));
        fOutlineStr.CatStr(tmpStr);
        sprintf(tmpStr,"act three with (SNF(%hd)) and act four concentrates on (SNF(%hd)).  ", fDoc-
>GetApprValByIndex(kApprPLType3), fDoc->GetApprValByIndex(kApprPLType4));
        fOutlineStr.CatStr(tmpStr);
        fOutlineStr.CatStr("Each of these acts is made richer by the thematic topics that are explored within it.");
        buildTypeVars(AP_PLOT);                                   // Build the variations list
        doubleSpace();

        separator_line(25);                                          // THE MAIN CHARACTER
THROUGHLINE
        fOutlineStr.CatStr("\n");
        do_title("THE MAIN CHARACTER THROUGHLINE");

        fOutlineStr.CatStr("The Main Character Storyline deals with the areas ");
        fOutlineStr.CatStr("that most concern the main character, act by act.  ");
        fOutlineStr.CatStr("In \"(SDI(Title))\", act one deals primarily ");
        sprintf(tmpStr,"with (SNF(%hd)), act two with (SNF(%hd)), ", fDoc->GetApprValByIndex(kApprMCType1), fDoc-
>GetApprValByIndex(kApprMCType2));
        fOutlineStr.CatStr(tmpStr);
        sprintf(tmpStr,"act three with (SNF(%hd)) and act four concentrates on (SNF(%hd)).  ", fDoc-
>GetApprValByIndex(kApprMCType3), fDoc->GetApprValByIndex(kApprMCType4));
        fOutlineStr.CatStr(tmpStr);
        fOutlineStr.CatStr("Each of these acts is made richer by the thematic topics that are explored within it.");
        buildTypeVars(AP_MAIN);                                   // Build the variations list
        doubleSpace();

        separator_line(25);                                          // THE OBSTACLE CHARACTER
THROUGHLINE
        fOutlineStr.CatStr("\n");
        do_title("THE OBSTACLE CHARACTER THROUGHLINE");

        fOutlineStr.CatStr("The Objective Character Storyline deals with the areas ");
        fOutlineStr.CatStr("most affected by the obstacle character, act by act.  ");
        fOutlineStr.CatStr("In \"(SDI(Title))\", act one deals primarily ");
        sprintf(tmpStr,"with (SNF(%hd)), act two with (SNF(%hd)), ", fDoc->GetApprValByIndex(kApprOCType1), fDoc-
>GetApprValByIndex(kApprOCType2));
        fOutlineStr.CatStr(tmpStr);
        sprintf(tmpStr,"act three with (SNF(%hd)) and act four concentrates on (SNF(%hd)).  ", fDoc-
>GetApprValByIndex(kApprOCType3), fDoc->GetApprValByIndex(kApprOCType4));
        fOutlineStr.CatStr(tmpStr);
        fOutlineStr.CatStr("Each of these acts is made richer by the thematic topics that are explored within it.");
        buildTypeVars(AP_OBSTACLE);                               // Build the variations list
        doubleSpace();

        fOutlineStr.CatStr("");
        fOutlineStr.CatStr("");
        fOutlineStr.CatStr("");

        sprintf(tmpStr,"", );
        fOutlineStr.CatStr(tmpStr);

        fOutlineStr.CatStr("");
        doubleSpace();
```

```
#if 0

        short i;
        char tmpStr[500];
        for (i = 0; i <= 3; ++i) {
        // for going through appreciations
                sprintf(tmpStr,"The %s:\n\n", theApprecStr[apprecOrder[i]]);
                fOutlineStr.CatStr(tmpStr);
                buildTypeVars(i);
                fOutlineStr.CatStr("\n");
        }

#endif


} /* OutlineView::plot_sequence_report */


/* -------------------------------------------------CNH---02/10/94---
        OutlineView::summary_report  - builds a report for the all of
                                                                the summary report material.
-------------------------------------------------------------------------- */
void OutlineView::summary_report(void)
{
        short i;
        char tmpStr[300];
        AddrText tmpAddr;
        char *varStr[23];                                                              // an array
of character string pointers used to store the "mix-n-match" strings for the last two paragraphs

        Unit *dynRangeUnit;                                                            // dynamic
pair of the thematic range
        Unit *comRangeUnit;                                                            // companion
pair of the thematic range
        Unit *depRangeUnit;                                                            // dependent
pair of the thematic range

        short dynSemVal = 0;                                                   // semVal of the
dynamic pair of the thematic range
        short comSemVal = 0;                                                   // semVal of the
companion pair of the thematic range
        short depSemVal = 0;                                                   // semVal of the
dependent pair of the thematic range

        SuperClass* mySC           = fDoc->GetSuperClass(kMyRefSC);

        if (fDoc->IsStoryJustified()) {

                semval_t storyRange = fDoc->GetApprValByIndex(kApprSTRng);
                GetPartner(INDEPENDENT, DYNAMIC, SEMTBL_ADDRESS(storyRange), tmpAddr);
                dynRangeUnit = Addr2Item(mySC, tmpAddr);               /* get the pointer to the dynamic pair
of the range */
                dynSemVal = dynRangeUnit->semVal;                              // semVal of the dynamic pair
of the thematic range

                GetPartner(INDEPENDENT, COMPANION, SEMTBL_ADDRESS(storyRange), tmpAddr);
                comRangeUnit = Addr2Item(mySC, tmpAddr);               /* get the pointer to the companion pair
of the range */
                comSemVal = comRangeUnit->semVal;                              // semVal of the companion pair
of the thematic range

                GetPartner(INDEPENDENT, DEPENDENT, SEMTBL_ADDRESS(storyRange), tmpAddr);
                depRangeUnit = Addr2Item(mySC, tmpAddr);               /* get the pointer to the dependent pair
of the range */
                depSemVal = depRangeUnit->semVal;                              // semVal of the dependent pair
of the thematic range
        }


        fOutlineStr.CatStr("SUMMARY REPORT for \"{SDI(Title)}\"\n\n");

/********************************** Summary of Objective Story Thematics **********************************/

        separator_line(30);

        if (fDoc->IsStoryJustified()) {

                fOutlineStr.CatStr("Summary of Objective Story Thematics");
                doubleSpace();

                fOutlineStr.CatStr("The objective problem in \"{SDI(Title)}\" resides ");
                fOutlineStr.CatStr("in \"{SDF(STDom)}\" pertaining to {SNF(STCon)}.  ");
                fOutlineStr.CatStr("Although the objective characters share a ");
                fOutlineStr.CatStr("Concern about {SNF(STCon)}, they differ in approach: ");
                fOutlineStr.CatStr("some responding with {SNF(STRng)} and others with ");
                sprintf(tmpStr,"{SNF(%hd)}.  ", dynSemVal);                    // semVal of the
dynamic pair of the thematic range
                fOutlineStr.CatStr(tmpStr);
                fOutlineStr.CatStr("The relative practicality of both approaches is ");
                fOutlineStr.CatStr("seen by how they each affect ");
                sprintf(tmpStr,"{SNF(%hd)}", comSemVal);                       // semVal of the
companion pair of the thematic range
                fOutlineStr.CatStr(tmpStr);
                fOutlineStr.CatStr(" and ");
                sprintf(tmpStr,"{SNF(%hd)}", depSemVal);                       // semVal of the
dependent pair of the thematic range
                fOutlineStr.CatStr(tmpStr);
                fOutlineStr.CatStr(".  ");
                fOutlineStr.CatStr("In addition, the objective characters disagree on the ");
                fOutlineStr.CatStr("true cause of the problem, and therefore on the appropriate solution.  ");
                fOutlineStr.CatStr("While some see {SNF(STPbm)} as the problem ");
                fOutlineStr.CatStr("and {SNF(STSol)} the best solution, ");
                fOutlineStr.CatStr("others find {SNF(STFoc)} at the heart of ");
                fOutlineStr.CatStr("the problem and {SNF(STDir)} the best way to resolve it.  ");
                fOutlineStr.CatStr("These perspectives come into conflicts that are ");
                fOutlineStr.CatStr("moved forward by {SNF(STUnRng)}, and held ");
                fOutlineStr.CatStr("back by {SNF(STCrFl)}, while the distance to the ");
                fOutlineStr.CatStr("goal is measured by changes in {SNF(STStp)}.");
```

```
                doubleSpace();
        }
/********************************** End of Objective Story Thematics **********************************/

        separator_line(30);

        if (fDoc->IsStoryJustified()) {

                short focChar;                                                                               //
name of the subj. character who is mostly interested on the Focus
                short dirChar;                                                                               //
name of the subj. character who is mostly interested on the Direction

                semval_t plotRange = fDoc->GetApprValByIndex(kApprPLRng);
                GetPartner(INDEPENDENT, DYNAMIC, SEMTBL_ADDRESS(plotRange), tmpAddr);
                dynRangeUnit = Addr2Item(mySC, tmpAddr);                    /* get the pointer to the dynamic pair
of the range */
                GetPartner(INDEPENDENT, COMPANION, SEMTBL_ADDRESS(plotRange), tmpAddr);
                comRangeUnit = Addr2Item(mySC, tmpAddr);                    /* get the pointer to the companion pair
of the range */
                GetPartner(INDEPENDENT, DEPENDENT, SEMTBL_ADDRESS(plotRange), tmpAddr);
                depRangeUnit = Addr2Item(mySC, tmpAddr);                    /* get the pointer to the dependent pair
of the range */

                if (GOOD) {                                                                          // this large
test statement is to determine which subjective character is looking at the subjective focus and which the direction
                        if (CHANGE) {
                                if (START) {
                                        focChar = 0;                                    //  main character
                                        dirChar = 1;                                    //  obstacle character
                                } else {  // STOP
                                        focChar = 1;                                    //  obstacle character
                                        dirChar = 0;                                    //  main character
                                }
                        } else {  //STEADFAST
                                if (START) {
                                        focChar = 1;                                    //  obstacle character
                                        dirChar = 0;                                    //  main character
                                } else {  // STOP
                                        focChar = 0;                                    //  main character
                                        dirChar = 1;                                    //  obstacle character
                                }
                        }
                } else {  // BAD
                        if (CHANGE) {
                                if (START) {
                                        focChar = 1;                                    //  obstacle character
                                        dirChar = 0;                                    //  main character
                                } else {  // STOP
                                        focChar = 0;                                    //  main character
                                        dirChar = 1;                                    //  obstacle character
                                }
                        } else {  //STEADFAST
                                if (START) {
                                        focChar = 0;                                    //  main character
                                        dirChar = 1;                                    //  obstacle character
                                } else {  // STOP
                                        focChar = 1;                                    //  obstacle character
                                        dirChar = 0;                                    //  main character
                                }
                        }
                }
        /********************************** Summary of Subjective Story Thematics **********************************/
                fOutlineStr.CatStr("Summary of Subjective Story Thematics");
                doubleSpace();

                fOutlineStr.CatStr("In summary, the Subjective Storyline of \"{SDI(Title)}\" ");
                fOutlineStr.CatStr("involves \"{SDF(PLDom)}\" in which the ");
                fOutlineStr.CatStr("chief concern is \"{SNF(PLCon)}\", over ");
                fOutlineStr.CatStr("which {CNN(MC,NM)} and {CNN(OC,NM)} diverge.  ");
                fOutlineStr.CatStr("This divergence is explored in terms of \"{SNF(PLRng)}\" vs. \"{SNF(PLRng2)}\", ");
                fOutlineStr.CatStr("and the author takes sides examining ");
                fOutlineStr.CatStr("{CNN(MC,NM)}'s and {CNN(OC,NM)}'s \"");
                sprintf(tmpStr,"{SNF(%hd)}", comRangeUnit->semVal);                          // companion
of the thematic range
                fOutlineStr.CatStr(tmpStr);
                fOutlineStr.CatStr("\" and \"");
                sprintf(tmpStr,"{SNF(%hd)}", depRangeUnit->semVal);                          // dependent
of the thematic range
                fOutlineStr.CatStr(tmpStr);
                fOutlineStr.CatStr("\".  At the heart of the matter, ");
                fOutlineStr.CatStr("\"{SNF(PLSol)}\" is being pitted against ");
                fOutlineStr.CatStr("\"{SNF(PLPbm)}\", and only if \"{SNF(PLSol)}\" wins ");
                fOutlineStr.CatStr("out over \"{SNF(PLPbm)}\" can the ");
                fOutlineStr.CatStr("Subjective difficulties be resolved.  ");
                fOutlineStr.CatStr("Still, {CNN(MC,NM)} and {CNN(OC,NM)} spend ");
                fOutlineStr.CatStr("most of their time focusing on \"{SNF(PLFoc)}\" and ");
                fOutlineStr.CatStr("whether or not \"{SNF(PLDir)}\" would be the best solution.  ");
                fOutlineStr.CatStr("The passionate argument is moved forward by \"{SNF(PLUnRng)}\", ");
                fOutlineStr.CatStr("held back by \"{SNF(PLCrFl)}\", and the audience ");
                fOutlineStr.CatStr("can measure progress toward the ");
                fOutlineStr.CatStr("climax in terms of \"{SNF(PLStp)}\".");
                doubleSpace();
        }

/********************************** End of Subjective Story Thematics **********************************/

        separator_line(30);

        if (fDoc->IsStoryJustified()) {

                GetPartner(INDEPENDENT, DYNAMIC, SEMTBL_ADDRESS(fDoc->GetApprValByIndex(kApprMCRng)), tmpAddr);
                dynRangeUnit = Addr2Item(mySC, tmpAddr);                    /* get the pointer to the dynamic pair
of the range */
                dynSemVal = dynRangeUnit->semVal;                              // semVal of the dynamic pair
of the thematic range

                for (i = 0; i <= 22; ++i)
```

```
		varStr[i] = "UNDEFINED";                                        // initialize
the string pointers

	if (STOP) {
		varStr[1] = "an over abundance";
		varStr[2] = "excess";
		varStr[3] = "over abundance";
		varStr[4] = "drives";
	} else {		// (START)
		varStr[1] = "a deficiency";
		varStr[2] = "lack";
		varStr[3] = "deficiency";
		varStr[4] = "pulls";
	}

	if (TIMELOCK) {
		varStr[5] = "in time";
		varStr[8] = "long enough";
	} else {		// (OPTIONLOCK)
		varStr[5] = "before {PPN(MC,P1)} options run out";
		varStr[8] = "until all the pieces are in place";
	}


	if (UNWILLING) {
		varStr[9] = "not";
		varStr[10] = "dragged along";
		varStr[11] = "avoid";
		varStr[15] = "with";
	} else {		// (WILLING)
		varStr[9] = "also";
		varStr[10] = "indispensable";
		varStr[11] = "resist";
		varStr[15] = "in";
	}


	if (CHANGE) {
		if (GOOD) {
			varStr[13] = "prevents";
			varStr[14] = "from being";
		} else {  //  BAD
			varStr[13] = "allows";
			varStr[14] = "to be";
		}
	} else {  //  STEADFAST
		if (GOOD) {
			varStr[13] = "allows";
			varStr[14] = "to be";
		} else {  //  BAD
			varStr[13] = "prevents";
			varStr[14] = "from being";
		}
	}
/*********************************** Summary of Main Character Thematics ***********************************/
	fOutlineStr.CatStr("Summary of the Main Character Thematics");
	doubleSpace();

	fOutlineStr.CatStr("In \"{SDI(Title)}\", \"{SDF(MCDom)}\" is the realm in which {CNN(MC,NM)} primarily
operates, ");
	fOutlineStr.CatStr("especially in regard to \"{SNF(MCCon)}\", which is {PPN(MC,P1)} chief Concern.  ");
	fOutlineStr.CatStr("As an individual, {CNN(MC,NM)} is more sensitive to issues ");
	fOutlineStr.CatStr("involving \"{SNF(MCRng)}\" than most, and often perceives ");
	fOutlineStr.CatStr("a disparity between \"{SNF(MCRng)}\" and \"{SNF(MCRng2)}\".  ");
	sprintf(tmpStr,"{CNN(MC,NM)} is driven by %s of \"{SNF(MCPbm)}\", which ", varStr[1]);
	fOutlineStr.CatStr(tmpStr);
	fOutlineStr.CatStr("causes {PPN(MC,OC)} to see \"{SNF(MCFoc)}\" as the source ");
	fOutlineStr.CatStr("of {PPN(MC,P1)} problems and \"{SNF(MCDir)}\" as the best solution.  ");
	sprintf(tmpStr,"In fact, {CNN(MC,NM)}'s own %s of \"{SNF(MCPbm)}\" is ", varStr[2]);
	fOutlineStr.CatStr(tmpStr);
	sprintf(tmpStr,"what %s the story's problem %s resolved.  ", varStr[13], varStr[14]);
	fOutlineStr.CatStr(tmpStr);
	fOutlineStr.CatStr("{CNN(MC,NM)} is given the opportunity to see this as {PPN(MC,NC)} becomes ");
	sprintf(tmpStr,"wholly involved %s the effort to achieve the goal.  ", varStr[15]);
	fOutlineStr.CatStr(tmpStr);
	fOutlineStr.CatStr("It is {CNN(MC,NM)}'s Unique Ability pertaining to \"{SNF(MCUnRng)}\" that ");
	fOutlineStr.CatStr("holds the means to resolving the story's problem.  ");
	fOutlineStr.CatStr("Unfortunately, {PPN(MC,P1)} effectiveness is undermined by an ");
	fOutlineStr.CatStr("aspect of \"{SNF(MCCrF1)}\".  Over the course of the story ");
	fOutlineStr.CatStr("{CNN(MC,NM)}'s growth (and backsliding) in effectiveness can ");
	fOutlineStr.CatStr("be seen in the degree to which {PPN(MC,NC)} engages in \"{SNF(MCStp)}\".");
	doubleSpace();
}
/*********************************** End of Main Character Thematics ***********************************/

	separator_line(30);

/*********************************** Summary of Objective Story Plot ***********************************/
	fOutlineStr.CatStr("Summary of Objective Story Plot");
	doubleSpace();

	fOutlineStr.CatStr("\"{SDI(Title)}\" concerns a Goal regarding \"{SNF(STGoal)}\", ");
	fOutlineStr.CatStr("which Requires progress to be made in \"{SNF(STReq)}\".  ");
	fOutlineStr.CatStr("If the Goal is not achieved, a Consequence regarding \"{SNF(PLGoal)}\" will transpire.  ");
	fOutlineStr.CatStr("The imminent approach of the Consequence is gauged by instances or ");
	fOutlineStr.CatStr("degrees of \"{SNF(MCReq)}\", which come when Pre-conditions of \"{SNF(OCReq)}\" exist.  ");
	fOutlineStr.CatStr("\"{SNF(OCReq)}\" is not intrinsically essential to progress ");
	fOutlineStr.CatStr("toward the goal (essential Pre-requisites pertain to \"{SNF(PLReq)}\") ");
	fOutlineStr.CatStr("but are made essential by someone's insistence.  ");
	fOutlineStr.CatStr("As a result of these efforts, Costs involving \"{SNF(OCGoal)}\" are ");
	fOutlineStr.CatStr("incurred, while Dividends are found in \"{SNF(MCGoal)}\".");
	doubleSpace();

/*********************************** End of Objective Story Plot ***********************************/

	separator_line(30);

	for (i = 0; i <= 22; ++i)
		varStr[i] = "UNDEFINED";                                        // initialize the
string pointers
```

```
        if (ACTION) {
                varStr[1] = "taken";
                varStr[2] = "respond";
                varStr[3] = "take action";
                varStr[4] = "decision";
        } else {            // (DECISION)
                varStr[1] = "made";
                varStr[2] = "deliberate";
                varStr[3] = "decide";
                varStr[4] = "action";
        }

        if (SPACELOCK) {
                varStr[5] = "options are";
                varStr[6] = "options";
                varStr[7] = "an optionlock";
                varStr[8] = "ticking clock";
                varStr[9] = "the closing down of options";
                varStr[16] = "all options have been exhausted";
        } else {            // (TIMELOCK)
                varStr[5] = "time is";
                varStr[6] = "time";
                varStr[7] = "a timelock";
                varStr[8] = "running out of options";
                varStr[9] = "by running out of time";
                varStr[16] = "time has run out";
        }

        if (SUCCESS) {
                varStr[10] = "is";
                varStr[11] = "been achieved";
                if (GOOD) {
                        varStr[12] = "not only does";
                        varStr[13] = "but ";
                } else {            // (BAD)
                        varStr[12] = "although";
                        varStr[13] = "";
                }
        } else {            // (FAILURE)
                varStr[10] = "is NOT";
                varStr[11] = "occurred";
                if (GOOD) {
                        varStr[12] = "although";
                        varStr[13] = "";
                } else {            // (BAD)
                        varStr[12] = "not only does";
                        varStr[13] = "but ";
                }
        }

        if (GOOD) {
                varStr[14] = "favorable";
        } else {            // (BAD)
                varStr[14] = "unfavorable";
        }

/*********************************** Summary of Objective Story Plot Dynamics ***********************************/
        fOutlineStr.CatStr("Summary of Objective Story Plot Dynamics");
        doubleSpace();

        fOutlineStr.CatStr("The plot dynamics of \"{SDI(Title)}\" indicate ");
        fOutlineStr.CatStr("that the plot is driven by {SNF(Work)}s which ");
        sprintf(tmpStr,"force %ss to be %s.  ", varStr[4], varStr[1]);
        fOutlineStr.CatStr(tmpStr);
        sprintf(tmpStr,"This drive forces the plot to a climax when %s.  ", varStr[16]);
        fOutlineStr.CatStr(tmpStr);
        fOutlineStr.CatStr("In the end, the efforts to achieve the goal meet with {SNF(Outcome)}, ");
        fOutlineStr.CatStr("which is seen as a {SNF(Judgment)} outcome in terms of the \"big picture\".");
        doubleSpace();

/*********************************** End of Objective Story PlotDynamics ***********************************/

#if 0

        separator_line(30);

/*********************************** Summary of Subjective Story Thematics ***********************************/
        fOutlineStr.CatStr("Summary of Subjective Story Thematics");
        doubleSpace();

/*********************************** End of Subjective Story Thematics ***********************************/

        separator_line(30);

/*********************************** Summary of Subjective Story Thematics ***********************************/
        fOutlineStr.CatStr("Summary of Subjective Story Thematics");
        doubleSpace();

/*********************************** End of Subjective Story Thematics ***********************************/

        separator_line(30);

#endif

        fDoc->SaveSuperClass(kMyRefSC, kNoSaveSC);

} /* OutlineView::summary_report */


/* -------------------------------------------------CNH---02/23/94---
        OutlineView::storytbl_report  - builds a report for the story
                                                        table/engine settings (a summary).
------------------------------------------------------------------------ */
void OutlineView::storytbl_report(void)
{
#if 1
```

```
fOutlineStr.CatStr("STORY ENGINE SETTINGS\n\n");

separator_line(30);
fOutlineStr.CatStr("STORY TITLE:  \"{SDI(Title)}\"\n\n");
fOutlineStr.CatStr("RESOLVE:      {SNF(Resolve)}\n");
fOutlineStr.CatStr("DIRECTION:  {SNF(Direction)}\n");
fOutlineStr.CatStr("APPROACH:  {SNF(Approach)}\n");
fOutlineStr.CatStr("SEX:                  {SNF(Sex)}\n");
fOutlineStr.CatStr("WORK:              {SNF(Work)}\n");
fOutlineStr.CatStr("LIMIT:                {SNF(Limit)}\n");
fOutlineStr.CatStr("OUTCOME:      {SNF(Outcome)}\n");
fOutlineStr.CatStr("JUDGMENT:    {SNF(Judgment)}\n");
doubleSpace();

separator_line(30);
fOutlineStr.CatStr("OBJECTIVE STORY\n");
fOutlineStr.CatStr("  DOMAIN:          {SNF(STDom)}\n");
fOutlineStr.CatStr("  CONCERN:     {SNF(STCon)}\n");
fOutlineStr.CatStr("  RANGE:            {SNF(STRng)}\n");
fOutlineStr.CatStr("  PROBLEM:      {SNF(STPbm)}\n");
fOutlineStr.CatStr("  SOLUTION:     {SNF(STSol)}\n");
fOutlineStr.CatStr("  FOCUS:            {SNF(STFoc)}\n");
fOutlineStr.CatStr("  DIRECTION:   {SNF(STDir)}\n");
fOutlineStr.CatStr("  CATALYST:      {SNF(STUnRng)}\n");
fOutlineStr.CatStr("  INHIBITOR:     {SNF(STCrFl)}\n");
fOutlineStr.CatStr("  STIPULATION: {SNF(STStp)}\n");
doubleSpace();

separator_line(30);
fOutlineStr.CatStr("SUBJECTIVE STORY\n");
fOutlineStr.CatStr("  DOMAIN:          {SNF(PLDom)}\n");
fOutlineStr.CatStr("  CONCERN:     {SNF(PLCon)}\n");
fOutlineStr.CatStr("  RANGE:            {SNF(PLRng)}\n");
fOutlineStr.CatStr("  PROBLEM:      {SNF(PLPbm)}\n");
fOutlineStr.CatStr("  SOLUTION:     {SNF(PLSol)}\n");
fOutlineStr.CatStr("  FOCUS:            {SNF(PLFoc)}\n");
fOutlineStr.CatStr("  DIRECTION:   {SNF(PLDir)}\n");
fOutlineStr.CatStr("  CATALYST:      {SNF(PLUnRng)}\n");
fOutlineStr.CatStr("  INHIBITOR:     {SNF(PLCrFl)}\n");
fOutlineStr.CatStr("  STIPULATION: {SNF(PLStp)}\n");
doubleSpace();

separator_line(30);
fOutlineStr.CatStr("MAIN CHARACTER THROUGHLINE\n");
fOutlineStr.CatStr("  DOMAIN:          {SNF(MCDom)}\n");
fOutlineStr.CatStr("  CONCERN:     {SNF(MCCon)}\n");
fOutlineStr.CatStr("  RANGE:            {SNF(MCRng)}\n");
fOutlineStr.CatStr("  PROBLEM:      {SNF(MCPbm)}\n");
fOutlineStr.CatStr("  SOLUTION:     {SNF(MCSol)}\n");
fOutlineStr.CatStr("  FOCUS:            {SNF(MCFoc)}\n");
fOutlineStr.CatStr("  DIRECTION:    {SNF(MCDir)}\n");
fOutlineStr.CatStr("  UNIQUE AB:    {SNF(MCUnRng)}\n");
fOutlineStr.CatStr("  C. FLAW:             {SNF(MCCrFl)}\n");
fOutlineStr.CatStr("  STIPULATION: {SNF(MCStp)}\n");
doubleSpace();

separator_line(30);
fOutlineStr.CatStr("OBSTACLE CHARACTER THROUGHLINE\n");
fOutlineStr.CatStr("  DOMAIN:          {SNF(OCDom)}\n");
fOutlineStr.CatStr("  CONCERN:     {SNF(OCCon)}\n");
fOutlineStr.CatStr("  RANGE:            {SNF(OCRng)}\n");
fOutlineStr.CatStr("  PROBLEM:      {SNF(OCPbm)}\n");
fOutlineStr.CatStr("  SOLUTION:     {SNF(OCSol)}\n");
fOutlineStr.CatStr("  FOCUS:            {SNF(OCFoc)}\n");
fOutlineStr.CatStr("  DIRECTION:    {SNF(OCDir)}\n");
fOutlineStr.CatStr("  UNIQUE AB:    {SNF(OCUnRng)}\n");
fOutlineStr.CatStr("  C. FLAW:             {SNF(OCCrFl)}\n");
fOutlineStr.CatStr("  STIPULATION: {SNF(OCStp)}\n");
doubleSpace();

separator_line(30);
fOutlineStr.CatStr("ADDITIONAL STORY APPRECIATIONS\n");
fOutlineStr.CatStr("  GOAL:             {SNF(STGoal)}\n");
fOutlineStr.CatStr("  CONS:             {SNF(PLGoal)}\n");
fOutlineStr.CatStr("  COST:              {SNF(OCGoal)}\n");
fOutlineStr.CatStr("  DIVID:                {SNF(MCGoal)}\n");
fOutlineStr.CatStr("  REQ:                  {SNF(STReq)}\n");
fOutlineStr.CatStr("  PreRE:              {SNF(PLReq)}\n");
fOutlineStr.CatStr("  PreCO:            {SNF(OCReq)}\n");
fOutlineStr.CatStr("  FORE:             {SNF(MCReq)}\n");


    if (GetStorytellingBtn()) {
        separator_line(30);
        charDyn_stelling_output();                          // character dynamics
storytelling output
        plotDyn_stelling_output();                          // plot dynamics
storytelling output
        os_stelling_output();                               // objective story
storytelling output
        more_os_stelling_output();                          // additional
objective story storytelling output
        ss_stelling_output();                               // subjective story
storytelling output
        mc_stelling_output();                               // main character
storytelling output
        oc_stelling_output();                               // obstacle character
storytelling output
    }

//                  sprintf(tmpStr,"{SNF(%hd)}:{SDF(%hd)}:{SLD(%hd)}\n", i, i, i);

#endif

#if 0
            short i;
            char tmpStr[300];
            tmpStr[0] = 0;

            for (i = 1; i <=148; ++i) {
                  sprintf(tmpStr,"{SNF(%hd)}:  {SNN(%hd)}, n.;  to {SVB(0,%hd,INF)}, v.;  \"{SDF(%hd)}\".\n\n",
i, i, i, i);
```

```
                fOutlineStr.CatStr(tmpStr);
        }
#endif

#if 0
        short i;
        char tmpStr[300];
        tmpStr[0] = 0;

        for (i = 1; i <=148; ++i) {
                sprintf(tmpStr,"{SNF(%hd)}:  {SDF(%hd)}\n", i, i);
                fOutlineStr.CatStr(tmpStr);
        }
#endif


#if 0
        short i;
        char tmpStr[300];
        tmpStr[0] = 0;

        for (i = 101; i <=148; ++i) {
                sprintf(tmpStr,"{SNF(%hd)}:{SDF(%hd)}:{SLD(%hd)}\n", i, i, i);
                fOutlineStr.CatStr(tmpStr);
        }
#endif

#if 0
        short i;
        char tmpStr[2000];
        tmpStr[0] = 0;

        fOutlineStr.CatStr("{SNF(1000)}::{SLD(1000)}\n");
        fOutlineStr.CatStr("{SNF(1001)}:{SDF(1001)}:{SLD(1001)}\n");
        fOutlineStr.CatStr("{SNF(1002)}:{SDF(1002)}:{SLD(1002)}\n");

        fOutlineStr.CatStr("{SNF(1010)}::{SLD(1010)}\n");
        fOutlineStr.CatStr("{SNF(1011)}:{SDF(1011)}:{SLD(1011)}\n");
        fOutlineStr.CatStr("{SNF(1012)}:{SDF(1012)}:{SLD(1012)}\n");

        fOutlineStr.CatStr("{SNF(1020)}::{SLD(1020)}\n");
        fOutlineStr.CatStr("{SNF(1021)}:{SDF(1021)}:{SLD(1021)}\n");
        fOutlineStr.CatStr("{SNF(1022)}:{SDF(1022)}:{SLD(1022)}\n");

        fOutlineStr.CatStr("{SNF(1030)}::{SLD(1030)}\n");
        fOutlineStr.CatStr("{SNF(1031)}:{SDF(1031)}:{SLD(1031)}\n");
        fOutlineStr.CatStr("{SNF(1032)}:{SDF(1032)}:{SLD(1032)}\n");

        fOutlineStr.CatStr("{SNF(1040)}::{SLD(1040)}\n");
        fOutlineStr.CatStr("{SNF(1041)}:{SDF(1041)}:{SLD(1041)}\n");
        fOutlineStr.CatStr("{SNF(1042)}:{SDF(1042)}:{SLD(1042)}\n");

        fOutlineStr.CatStr("{SNF(1050)}::{SLD(1050)}\n");
        fOutlineStr.CatStr("{SNF(1051)}:{SDF(1051)}:{SLD(1051)}\n");
        fOutlineStr.CatStr("{SNF(1052)}:{SDF(1052)}:{SLD(1052)}\n");

        fOutlineStr.CatStr("{SNF(1060)}::{SLD(1060)}\n");
        fOutlineStr.CatStr("{SNF(1061)}:{SDF(1061)}:{SLD(1061)}\n");
        fOutlineStr.CatStr("{SNF(1062)}:{SDF(1062)}:{SLD(1062)}\n");

        fOutlineStr.CatStr("{SNF(1070)}::{SLD(1070)}\n");
        fOutlineStr.CatStr("{SNF(1071)}:{SDF(1071)}:{SLD(1071)}\n");
        fOutlineStr.CatStr("{SNF(1072)}:{SDF(1072)}:{SLD(1072)}\n");

        fOutlineStr.CatStr("{SNF(1100)}::{SLD(1100)}\n");
        fOutlineStr.CatStr("{SNF(1101)}:{SDF(1101)}:{SLD(1101)}\n");
        fOutlineStr.CatStr("{SNF(1102)}:{SDF(1102)}:{SLD(1102)}\n");
        fOutlineStr.CatStr("{SNF(1103)}:{SDF(1103)}:{SLD(1103)}\n");
        fOutlineStr.CatStr("{SNF(1104)}:{SDF(1104)}:{SLD(1104)}\n");

        fOutlineStr.CatStr("{SNF(1110)}::{SLD(1110)}\n");
        fOutlineStr.CatStr("{SNF(1111)}:{SDF(1111)}:{SLD(1111)}\n");
        fOutlineStr.CatStr("{SNF(1112)}:{SDF(1112)}:{SLD(1112)}\n");

        fOutlineStr.CatStr("{SNF(1120)}::{SLD(1120)}\n");
        fOutlineStr.CatStr("{SNF(1121)}:{SDF(1121)}:{SLD(1121)}\n");
        fOutlineStr.CatStr("{SNF(1122)}:{SDF(1122)}:{SLD(1122)}\n");

        fOutlineStr.CatStr("{SNF(1130)}::{SLD(1130)}\n");
        fOutlineStr.CatStr("{SNF(1131)}:{SDF(1131)}:{SLD(1131)}\n");
        fOutlineStr.CatStr("{SNF(1132)}:{SDF(1132)}:{SLD(1132)}\n");
        fOutlineStr.CatStr("{SNF(1133)}:{SDF(1133)}:{SLD(1133)}\n");
        fOutlineStr.CatStr("{SNF(1134)}:{SDF(1134)}:{SLD(1134)}\n");

#endif

} /* OutlineView::storytbl_report */


/* ------------------------------------------------------------------------
        OutlineView::bold_on - turns boldface ON by appending appropriate
        codes.
------------------------------------------------------------------------- */
void OutlineView::bold_on(void)
{
        fOutlineStr.CatStr("«B+»");

} /* OutlineView::bold_on */


/* ------------------------------------------------------------------------
        OutlineView::bold_off - turns boldface OFF by appending appropriate
        codes.
------------------------------------------------------------------------- */
void OutlineView::bold_off(void)
{
        fOutlineStr.CatStr("«B-»");

} /* OutlineView::bold_off */

/* ------------------------------------------------------------------------
```

```
        OutlineView::underline_on - turns underline ON by appending
        appropriate codes.
-------------------------------------------------------------------------- */
void OutlineView::underline_on(void)
{
        fOutlineStr.CatStr("«U+»");

} /* OutlineView::underline_on */


/* ------------------------------------------------------------------------
        OutlineView::underline_off - turns underline OFF by appending
        appropriate codes.
-------------------------------------------------------------------------- */
void OutlineView::underline_off(void)
{
        fOutlineStr.CatStr("«U-»");

} /* OutlineView::underline_off */


const char* kDoubleSpace    = "\n\n";

/* ------------------------------------------------------------------------
        OutlineView::doubleSpace() - does a doubleSpace by appending two
        newlines into the fOutlineStr.
-------------------------------------------------------------------------- */
void OutlineView::doubleSpace()
{
        fOutlineStr.CatStr(kDoubleSpace);
} /* OutlineView::doubleSpace */


/* ------------------------------------------------------------------------
        OutlineView::apropos_STF - inserts appropriate storytelling,
        if button is on.
-------------------------------------------------------------------------- */
bool_t OutlineView::apropos_STF(char* STFChoice, char* textIfNoST, bool_t interrupted)
{
        char tempSTText[120];
        bool_t storytellingON = GetStorytellingBtn();

        if (storytellingON) {
                sprintf(tempSTText, ":\n\n«M(40,40,40)»{STF(%s)}\n\n«M(0,0,0)»", STFChoice);
                if (interrupted)
                        strcat(tempSTText, "...");
                fOutlineStr.CatStr(tempSTText);
        }
        else
                fOutlineStr.CatStr(textIfNoST);

        return (storytellingON);

} /* OutlineView::apropos_STF */


/* ------------------------------------------------------------------------
        OutlineView::do_title - shortcut for doing a report title
-------------------------------------------------------------------------- */
void OutlineView::do_title(char* theTitle)
{
        underline_on();
        bold_on();
        fOutlineStr.CatStr(theTitle);
        bold_off();
        underline_off();
        doubleSpace();

} /* OutlineView::do_title */


/* ---------------------------------------------------CNH---04/12/94---
        OutlineView::STGoal_STReq_report  - builds a Goal/Requirement report
-------------------------------------------------------------------------- */
void OutlineView::STGoal_STReq_report(void)
{
        do_title("Goal / Requirement");

        fOutlineStr.CatStr("For most characters, the central objective of \"{SDI(Title)}\" has to do with
{SNF(STGoal)}");
        apropos_STF("STGoal", ".  ", false);

        fOutlineStr.CatStr("In order to bring about {SNF(STGoal)} these characters must meet requirements revolving
around {SNF(STReq)}");
        apropos_STF("STReq", ".  ", false);

        fOutlineStr.CatStr("Only if efforts directed toward {SNF(STReq)} are successful will the desired state of
{SNF(STGoal)} be realized.");
        doubleSpace();

} /* OutlineView::STGoal_STReq_report */


/* ---------------------------------------------------CNH---04/12/94---
        OutlineView::STGoal_PLGoal_report  - builds a Goal/Consequence report
-------------------------------------------------------------------------- */
void OutlineView::STGoal_PLGoal_report(void)
{
        do_title("Goal / Consequence");

        fOutlineStr.CatStr("If the goal-oriented characters of \"{SDI(Title)}\" are unable to bring about the desired
state of {SNF(STGoal)}");
        apropos_STF("STGoal", ", ", true);

        fOutlineStr.CatStr("circumstances pertaining to the {SNF(PLGoal)} will be adversely affected");
        apropos_STF("PLGoal", ".", false);

        doubleSpace();

} /* OutlineView::STGoal_PLGoal_report */
```

```
/* -------------------------------------------------CNH---04/12/94---
	OutlineView::OCGoal_MCGoal_report  - builds a Cost/Dividend report
---------------------------------------------------------------------------- */
void OutlineView::OCGoal_MCGoal_report(void)
{
	do_title("Cost / Dividend");

	fOutlineStr.CatStr("In their efforts to achieve the goal, ");
	fOutlineStr.CatStr("characters in \"{SDI(Title)}\" pay a price that involves {SVB(P,OCGoal,PRESP)}");
	apropos_STF("OCGoal", ".  ", false);

	fOutlineStr.CatStr("However, this cost is somewhat balanced by the benefits they receive along the way in regard
to {SVB(P,MCGoal,PRESP)}");
	apropos_STF("MCGoal", ".", false);
	doubleSpace();

} /* OutlineView::OCGoal_MCGoal_report */


/* -------------------------------------------------CNH---04/12/94---
	OutlineView::STReq_PLReq_report  - builds a Requirement/Prerequisites report
---------------------------------------------------------------------------- */
void OutlineView::STReq_PLReq_report(void)
{
	do_title("Requirement / Prerequisites");

	fOutlineStr.CatStr("In order to achieve the goal of \"{SDI(Title)}\", ");
	fOutlineStr.CatStr("a requirement revolving around {SNF(STReq)} must be met");
	apropos_STF("STReq", ".  ", false);

	fOutlineStr.CatStr("To meet this requirement, characters must fulfill certain prerequisites involving
{SNF(PLReq)}");
	apropos_STF("PLReq", ".", false);

	doubleSpace();

} /* OutlineView::STReq_PLReq_report */


/* -------------------------------------------------CNH---04/12/94---
	OutlineView::PLReq_OCReq_report  - builds a Prerequisites/Preconditions report
---------------------------------------------------------------------------- */
void OutlineView::PLReq_OCReq_report(void)
{
	do_title("Prerequisites / Preconditions");

	fOutlineStr.CatStr("To make progress toward the goal, characters in \"{SDI(Title)}\" must ");
	fOutlineStr.CatStr("fulfill certain essential prerequisites involving {SNF(PLReq)}");
	apropos_STF("PLReq", ".  ", false);

	fOutlineStr.CatStr("As they proceed in this effort, people they encounter ");
	fOutlineStr.CatStr("from time to time insist on special favors in exchange for their help.  ");
	fOutlineStr.CatStr("These favors all take the form of some kind of {SVB(P,OCReq,PRESP)}");
	apropos_STF("OCReq", ".  ", false);

	fOutlineStr.CatStr("In other words, in exchange for their assistance, people require those seeking the goal to
{SVB(P,OCReq,INF)}.");
	doubleSpace();

} /* OutlineView::PLReq_OCReq_report */


/* -------------------------------------------------CNH---04/12/94---
	OutlineView::PLGoal_MCReq_report  - builds a Consequence/Forewarnings report
---------------------------------------------------------------------------- */
void OutlineView::PLGoal_MCReq_report(void)
{
	do_title("Consequence / Forewarnings");

	fOutlineStr.CatStr("If the desired goal of \"{SDI(Title)}\" is not achieved, ");
	fOutlineStr.CatStr("the characters will suffer a consequence that adversely affects {SNF(PLGoal)}");
	apropos_STF("PLGoal", ".  ", false);

	fOutlineStr.CatStr("There are certain forewarnings that indicate how close the consequence is to actually
occurring.  ");
	fOutlineStr.CatStr("In \"{SDI(Title)}\", the imminent approach of adverse affects upon {SNF(PLGoal)} is
indicated by changes in {SNF(MCReq)}");
	apropos_STF("MCReq", ".", false);

	doubleSpace();

} /* OutlineView::PLGoal_MCReq_report */


/* -------------------------------------------------CNH---04/12/94---
	OutlineView::STDom_PLDom_report  - builds a Objective Domain/Subjective Domain report
---------------------------------------------------------------------------- */
void OutlineView::STDom_PLDom_report(void)
{
	do_title("Objective Domain / Subjective Domain");

	fOutlineStr.CatStr("In \"{SDI(Title)}\", the events that affect people revolve around {SDF(STDom)}");
	apropos_STF("STDom", ".  ", false);

	fOutlineStr.CatStr("The relationships between people In \"{SDI(Title)}\" are most influenced by {SPN(PLDom)}");
	apropos_STF("PLDom", ".", false);

	doubleSpace();

} /* OutlineView::STDom_PLDom_report */


/* -------------------------------------------------CNH---04/12/94---
	OutlineView::STCon_STStp_report  - builds a Objective Concern/Objective Stipulation report
---------------------------------------------------------------------------- */
```

```
void OutlineView::STCon_STStp_report(void)
{
        do_title("Objective Concern / Objective Stipulation");

        fOutlineStr.CatStr("One thing all the characters in \"{SDI(Title)}\" share is a concern with {SNF(STCon)}");
        apropos_STF("STCon", ".  ", false);

        fOutlineStr.CatStr("The characters become concerned with {SNF(STCon)}, the more they look to {SNF(STStp)}");
        apropos_STF("STStp", ".", false);

        doubleSpace();

} /* OutlineView::STCon_STStp_report */


/* ------------------------------------------------CNH---04/12/94---
        OutlineView::STUnRng_STCrFl_report  - builds a Objective Catalyst/Objective Inhibitor report
------------------------------------------------------------------------ */
void OutlineView::STUnRng_STCrFl_report(void)
{
        do_title("Objective Catalyst / Objective Inhibitor");

        fOutlineStr.CatStr("In \"{SDI(Title)}\", the catalyst that moves events forward operates through
{SPN(STUnRng)}");
        apropos_STF("STUnRng", ".  ", false);

        fOutlineStr.CatStr("While {SPN(STUnRng)} of one sort or another keep forcing things forward, {SPN(STCrFl)} keep
slowing them down");
        apropos_STF("STCrFl", ".  ", false);

        fOutlineStr.CatStr("In fact, {SPN(STCrFl)} would bring the whole plot to a halt if not for the push supplied by
{SPN(STUnRng)}.");

        doubleSpace();

} /* OutlineView::STUnRng_STCrFl_report */


/* ------------------------------------------------CNH---04/12/94---
        OutlineView::PLCon_PLStp_report  - builds a Subjective Concern/Subjective Stipulation report
------------------------------------------------------------------------ */
void OutlineView::PLCon_PLStp_report(void)
{
        do_title("Subjective Concern / Subjective Stipulation");

        fOutlineStr.CatStr("Although the specifics may be different, both {CNN(MC,NM)} and {CNN(OC,NM)} in
\"{SDI(Title)}\" ");
        fOutlineStr.CatStr("share a common concern with matters involving {SNF(PLCon)}");
        apropos_STF("PLCon", ".  ", false);

        fOutlineStr.CatStr("The degree of their pre-occupation with {SNF(PLStp)} gauges progress in resolving their
concerns");
        apropos_STF("PLStp", ".", false);

        doubleSpace();

} /* OutlineView::PLCon_PLStp_report */


/* ------------------------------------------------CNH---04/12/94---
        OutlineView::PLUnRng_PLCrFl_report  - builds a Subjective Catalyst/Subjective Inhibitor report
------------------------------------------------------------------------ */
void OutlineView::PLUnRng_PLCrFl_report(void)
{
        do_title("Subjective Catalyst / Subjective Inhibitor");

        fOutlineStr.CatStr("In \"{SDI(Title)}\", the speed at which the relationship between {CNN(MC,NM)}");
        fOutlineStr.CatStr(" and {CNN(OC,NM)} grows is accelerated by {SNN(PLUnRng)}");
        apropos_STF("PLUnRng", ".  ", false);

        fOutlineStr.CatStr("Whereas {SNN(PLUnRng)} works to hasten the growth of their relationship, ");
        fOutlineStr.CatStr("{SNN(PLCrFl)} keeps putting on the damper");
        apropos_STF("PLCrFl", ".  ", false);

        doubleSpace();

} /* OutlineView::PLUnRng_PLCrFl_report */


/* ------------------------------------------------CNH---04/12/94---
        OutlineView::STRng_STRng2_report  - builds a Objective Thematic Conflict report
------------------------------------------------------------------------ */
void OutlineView::STRng_STRng2_report(void)
{
        do_title("Objective Thematic Conflict");

        fOutlineStr.CatStr("From a standpoint of Reason, \"{SDI(Title)}\" explores and analyzes ");
        fOutlineStr.CatStr("the thematic conflict of {SNN(STRng)} vs. {SNN(STRng2)}.  ");

        fOutlineStr.CatStr("Of the two, {SNN(STRng)} is the thematic focus");
        apropos_STF("STRng", ".  ", false);

        fOutlineStr.CatStr("This contrasts with the objective thematic counterpoint of {SNN(STRng2)}");
        apropos_STF("STRng2", ".  ", false);

        fOutlineStr.CatStr("As this conflict develops, debate centers on {SNN(STRng)} as a result of {SPN(STRng2)}
coming into question.");
        doubleSpace();

} /* OutlineView::STRng_STRng2_report */


/* ------------------------------------------------CNH---04/12/94---
        OutlineView::PLRng_PLRng2_report  - builds a Subjective Thematic Conflict report
------------------------------------------------------------------------ */
void OutlineView::PLRng_PLRng2_report(void)
{
        do_title("Subjective Thematic Conflict");
```

```
        fOutlineStr.CatStr("The passionate argument made in \"{SDI(Title)}\" explores the thematic ");
        fOutlineStr.CatStr("conflict of {SNN(PLRng)} vs. {SNN(PLRng2)}.  ");

        fOutlineStr.CatStr("Of the two, {SNN(PLRng)} is the thematic focus");
        apropos_STF("PLRng", ".  ", false);

        fOutlineStr.CatStr("This contrasts with the subjective thematic counterpoint of {SNN(PLRng2)}");
        apropos_STF("PLRng2", ".  ", false);

        fOutlineStr.CatStr("As the story develops, all the passionate {SPN(PLRng2)} that ");
        fOutlineStr.CatStr("come into play revolve around the central issue of {SNN(PLRng)}.");
        doubleSpace();

} /* OutlineView::PLRng_PLRng2_report */


/* --------------------------------------------------CNH---04/12/94---
        OutlineView::MCRng_MCRng2_report  - builds a Main Character Thematic Conflict report
------------------------------------------------------------------------ */
void OutlineView::MCRng_MCRng2_report(void)
{
        do_title("Main Character Thematic Conflict");

        fOutlineStr.CatStr("In \"{SDI(Title)}\", {CNN(MC,NM)} grapples with the conflict of {SNN(MCRng)} vs.
{SNN(MCRng2)}.  ");

        fOutlineStr.CatStr("Of the two, {SNN(MCRng)} is {CNN(MC,NM)}'s thematic focus");
        apropos_STF("MCRng", ".  ", false);

        fOutlineStr.CatStr("This contrasts with {PPN(MC,P1)} thematic counterpoint of {SNN(MCRng2)}");
        apropos_STF("MCRng2", ".  ", false);

        fOutlineStr.CatStr("In fact, events conspire in such a way that {CNN(MC,NM)} may feel ");
        fOutlineStr.CatStr("hounded to consider how much {SNN(MCRng2)} appears to be behind {PPN(MC,P1)} actions ");
        fOutlineStr.CatStr("in relation to some accepted norm pertaining to {SNN(MCRng)}.");

        doubleSpace();

} /* OutlineView::MCRng_MCRng2_report */


/* --------------------------------------------------CNH---04/12/94---
        OutlineView::OCRng_OCRng2_report  - builds a Obstacle Character Thematic Conflict report
------------------------------------------------------------------------ */
void OutlineView::OCRng_OCRng2_report(void)
{
        do_title("Obstacle Character Thematic Conflict");

        fOutlineStr.CatStr("In \"{SDI(Title)}\", {CNN(OC,NM)} illustrates the impact of the ");
        fOutlineStr.CatStr("conflict between {SNN(OCRng)} vs. {SNN(OCRng2)}.  ");

        fOutlineStr.CatStr("Of the two, {SNN(OCRng)} is {CNN(OC,NM)}'s thematic focus");
        apropos_STF("OCRng", ".  ", false);

        fOutlineStr.CatStr("This contrasts with {PPN(OC,P1)} thematic counterpoint of {SNN(OCRng2)}");
        apropos_STF("OCRng2", ".  ", false);

        fOutlineStr.CatStr("As they seek to strike a balance between these two extremes, ");
        fOutlineStr.CatStr("{CNN(OC,NM)}'s effect upon others illustrates the ");
        fOutlineStr.CatStr("relative value of {SNN(OCRng)} vs. {SNN(OCRng2)}.");

        doubleSpace();

} /* OutlineView::OCRng_OCRng2_report */


/* --------------------------------------------------CNH---04/12/94---
        OutlineView::STPbm_STSol_report  - builds a Objective Problem/Solution report
------------------------------------------------------------------------ */
void OutlineView::STPbm_STSol_report(void)
{
        do_title("Objective Problem / Solution");

        fOutlineStr.CatStr("At the heart of all the difficulties experienced by the characters ");
        fOutlineStr.CatStr("in \"{SDI(Title)}\" is the central problem of {SNN(STPbm)}");
        apropos_STF("STPbm", ".  ", false);

        fOutlineStr.CatStr("As the story develops, it becomes clear that these difficulties ");
        fOutlineStr.CatStr("will only be resolved if {SNN(STPbm)} is overcome by {SNN(STSol)}.");
        apropos_STF("STSol", ".", false);

        doubleSpace();

} /* OutlineView::STPbm_STSol_report */


/* --------------------------------------------------CNH---04/12/94---
        OutlineView::STPbm_STFoc_report  - builds a Objective Problem/Focus report
------------------------------------------------------------------------ */
void OutlineView::STPbm_STFoc_report(void)
{
        do_title("Objective Problem / Focus");

        fOutlineStr.CatStr("Although {SNN(STPbm)} is the heart of \"{SDI(Title)}\"'s problems");
        apropos_STF("STPbm", ", ", true);

        fOutlineStr.CatStr("most of the attention is focused on characters who {SVB(P,STFoc,PTG)}");
        apropos_STF("STFoc", ".", false);

        doubleSpace();

} /* OutlineView::STPbm_STFoc_report */


/* --------------------------------------------------CNH---04/12/94---
        OutlineView::STFoc_STDir_report  - builds a Objective Focus/Direction report
```

```
------------------------------------------------------------------------- */
void OutlineView::STFoc_STDir_report(void)
{
        do_title("Objective Focus / Direction");

        fOutlineStr.CatStr("In \"(SDI(Title))\", most of the attention is focused on characters who
(SVB(P,STFoc,PTG))");
        apropos_STF("STFoc", ".  ", false);

        fOutlineStr.CatStr("The response to (SVB(P,STFoc,PRESP)) in one area leads to (SVB(P,STDir,PRESP)) in another");
        apropos_STF("STDir", ".", false);

        doubleSpace();

} /* OutlineView::STFoc_STDir_report */


/* -------------------------------------------------CNH---04/12/94---
        OutlineView::PLPbm_PLSol_report  - builds a Subjective Problem/Solution report
------------------------------------------------------------------------- */
void OutlineView::PLPbm_PLSol_report(void)
{
        do_title("Subjective Problem / Solution");

        fOutlineStr.CatStr("In \"(SDI(Title))\", (SNN(PLPbm)) is the cause of trouble in the relationships between
people");
        apropos_STF("PLPbm", ".  ", false);

        fOutlineStr.CatStr("Only if (SNN(PLSol)) is employed will these troubles be resolved");
        apropos_STF("PLSol", ".", false);
        doubleSpace();

} /* OutlineView::PLPbm_PLSol_report */


/* -------------------------------------------------CNH---04/12/94---
        OutlineView::PLPbm_PLFoc_report  - builds a Subjective Problem/Focus report
------------------------------------------------------------------------- */
void OutlineView::PLPbm_PLFoc_report(void)
{
        do_title("Subjective Problem / Focus");

        fOutlineStr.CatStr("Relationships in \"(SDI(Title))\" are troubled by (SNN(PLPbm))");
        apropos_STF("PLPbm", ".  ", false);

        fOutlineStr.CatStr("As a result, attention becomes focused on the (SPN(PLFoc)) characters go through");
        apropos_STF("PLFoc", ".", false);

        doubleSpace();

} /* OutlineView::PLPbm_PLFoc_report */


/* -------------------------------------------------CNH---04/12/94---
        OutlineView::PLFoc_PLDir_report  - builds a Subjective Focus/Direction report
------------------------------------------------------------------------- */
void OutlineView::PLFoc_PLDir_report(void)
{
        do_title("Subjective Focus / Direction");

        fOutlineStr.CatStr("In \"(SDI(Title))\", relationships are focused on the (SPN(PLFoc)) characters go through");
        apropos_STF("PLFoc", ".  ", false);

        fOutlineStr.CatStr("This drives them to engage in (SPN(PLDir)) elsewhere");
        apropos_STF("PLDir", ".", false);

        doubleSpace();

} /* OutlineView::PLFoc_PLDir_report */


/* -------------------------------------------------CNH---04/12/94---
        OutlineView::MCDom_OCDom_report  - builds a Main/Obstacle Domains report
------------------------------------------------------------------------- */
void OutlineView::MCDom_OCDom_report(void)
{
        short i;
        char tmpStr[4000];
        AddrText tmpAddr;
        char *varStr[11];                                                       // an array
of character string pointers used to store the "mix-n-match" strings for the last two paragraphs
        short whichClass = 0;

        strcpy(tmpAddr, SEMTBL_ADDRESS(fDoc->GetApprValByIndex(kApprMCDom)));
        whichClass = tmpAddr[0]-'0';                                            // the class of the
main character domain as indicated by the first digit in the address


        for (i = 0; i <= 10; ++i)                                               // initialize the
                varStr[i] = "UNDEFINED";
string pointers

        if (whichClass == 1) {
                varStr[1] = "foster situations";
                varStr[2] = "hold onto fixed attitudes";
        } else if (whichClass == 2) {
                varStr[1] = "take action";
                varStr[2] = "manipulate";
        } else if (whichClass == 3) {
                varStr[1] = "manipulate";
                varStr[2] = "take action";
        } else {
                varStr[1] = "hold onto fixed attitudes";
                varStr[2] = "foster situations";
        }

        do_title("Main / Obstacle Domains");

        fOutlineStr.CatStr("As a result of their intrinsic natures in \"(SDI(Title))\", ");
        sprintf(tmpStr,"(CNN(MC,NM))'s tendency to %s comes into ", varStr[1]);
```

```
        fOutlineStr.CatStr(tmpStr);
        sprintf(tmpStr,"conflict with {CNN(OC,NM)}'s tendency to %s.", varStr[2]);
        fOutlineStr.CatStr(tmpStr);

        doubleSpace();

} /* OutlineView::MCDom_OCDom_report */


/* --------------------------------------------------CNH---04/12/94---
        OutlineView::MCPbm_MCSol_report  - builds a Main Character Problem/Focus report
------------------------------------------------------------------------- */
void OutlineView::MCPbm_MCSol_report(void)
{
        do_title("Main Character Problem / Solution");

        fOutlineStr.CatStr("In \"{SDI(Title)}\", {CNN(MC,NM)} is driven by {SNN(MCPbm)}");
        apropos_STF("MCPbm", ".  ", false);

        fOutlineStr.CatStr("Ultimately, only {SNN(MCSol)} can satisfy that drive");
        apropos_STF("MCSol", ".", false);

        doubleSpace();

} /* OutlineView::MCPbm_MCSol_report */


/* --------------------------------------------------CNH---04/12/94---
        OutlineView::MCPbm_MCFoc_report  - builds a Main Character Problem/Focus report
------------------------------------------------------------------------- */
void OutlineView::MCPbm_MCFoc_report(void)
{
        do_title("Main Character Problem / Focus");

        fOutlineStr.CatStr("Because {SNN(MCPbm)} is what drives {CNN(MC,NM)} in \"{SDI(Title)}\"");
        apropos_STF("MCPbm", ".  ", true);

        fOutlineStr.CatStr("{PPN(MC,NC)} tends to focus on {SNN(MCFoc)} which {PPN(MC,NC)} sees as the cause of
{PPN(MC,P1)} troubles");
        apropos_STF("MCFoc", ".", false);

        doubleSpace();

} /* OutlineView::MCPbm_MCFoc_report */


/* --------------------------------------------------CNH---04/12/94---
        OutlineView::MCFoc_MCDir_report  - builds a Main Character Focus/Direction report
------------------------------------------------------------------------- */
void OutlineView::MCFoc_MCDir_report(void)
{
        do_title("Main Character Focus / Direction");

        fOutlineStr.CatStr("In \"{SDI(Title)}\", {CNN(MC,NM)} focuses on {SNN(MCFoc)}");
        apropos_STF("MCFoc", ".  ", false);

        fOutlineStr.CatStr("As a result, {PPN(MC,NC)} finds {PPN(MC,IR)} pulled toward {SNN(MCDir)}");
        apropos_STF("MCDir", ".", false);

        doubleSpace();

} /* OutlineView::MCFoc_MCDir_report */


/* --------------------------------------------------CNH---04/12/94---
        OutlineView::OCPbm_OCSol_report  - builds a Obstacle Character Problem/Solution report
------------------------------------------------------------------------- */
void OutlineView::OCPbm_OCSol_report(void)
{
        do_title("Obstacle Character Problem / Solution");

        fOutlineStr.CatStr("In \"{SDI(Title)}\", {CNN(OC,NM)} is driven to {SVB(OC,OCPbm,INF)}");
        apropos_STF("OCPbm", ".  ", false);

        fOutlineStr.CatStr("However, {PPN(OC,NC)} will not be truly satisfied unless {PPN(OC,NC)} comes to
{SVB(OC,OCSol,INF)}");
        apropos_STF("OCSol", ".", false);

        doubleSpace();

} /* OutlineView::OCPbm_OCSol_report */


/* --------------------------------------------------CNH---04/12/94---
        OutlineView::OCPbm_OCFoc_report  - builds a Obstacle Character Problem/Focus report
------------------------------------------------------------------------- */
void OutlineView::OCPbm_OCFoc_report(void)
{
        do_title("Obstacle Character Problem / Focus");

        fOutlineStr.CatStr("in \"{SDI(Title)}\", {CNN(OC,NM)} is driven to {SVB(OC,OCPbm,INF)}");
        apropos_STF("OCPbm", ".  ", false);

        fOutlineStr.CatStr("As a result, {PPN(OC,NC)} tends to focus on {SVB(OC,OCFoc,PRESP)}");
        apropos_STF("OCFoc", ".", false);

        doubleSpace();

} /* OutlineView::OCPbm_OCFoc_report */


/* --------------------------------------------------CNH---04/12/94---
        OutlineView::OCFoc_OCDir_report  - builds a Obstacle Character Focus/Direction report
------------------------------------------------------------------------- */
void OutlineView::OCFoc_OCDir_report(void)
{
        do_title("Obstacle Character Focus / Direction");
```

```
        fOutlineStr.CatStr("In \"{SDI(Title)}\", {CNN(OC,NM)} {SVB(OC,OCDir,PT3)} something");
        apropos_STF("OCDir", " ", true);

        fOutlineStr.CatStr("in response to having {SVB(OC,OCFoc,PASTP)} something else");
        apropos_STF("OCFoc", ".", true);

        doubleSpace();

} /* OutlineView::OCFoc_OCDir_report */


/* --------------------------------------------------CNH---04/12/94---
        OutlineView::MCUnRng_MCCrFl_report  - builds a Main Character Unique Ability/Critical Flaw report
------------------------------------------------------------------------ */
void OutlineView::MCUnRng_MCCrFl_report(void)
{
        do_title("Main Character Unique Ability / Critical Flaw");

        fOutlineStr.CatStr("In \"{SDI(Title)}\", {CNN(MC,NM)} is uniquely able to drive the story toward a conclusion
");
        fOutlineStr.CatStr("because of {PPN(MC,P1)} {SNN(MCUnRng)}");
        apropos_STF("MCUnRng", ".  ", false);

        fOutlineStr.CatStr("However, this impact is undermined by a tendency to {SVB(MC,MCCrFl,INF)}");
        apropos_STF("MCCrFl", ".", false);

        doubleSpace();

} /* OutlineView::MCUnRng_MCCrFl_report */


/* --------------------------------------------------CNH---04/12/94---
        OutlineView::OCUnRng_OCCrFl_report  - builds a Obstacle Character Unique Ability/Critical Flaw report
------------------------------------------------------------------------ */
void OutlineView::OCUnRng_OCCrFl_report(void)
{
        do_title("Obstacle Character Unique Ability / Critical Flaw");

        fOutlineStr.CatStr("In \"{SDI(Title)}\", {CNN(OC,NM)} is uniquely able to pressure {CNN(MC,NM)} because of
{PPN(OC,P1)} {SNN(OCUnRng)}");
        apropos_STF("OCUnRng", ".  ", false);

        fOutlineStr.CatStr("However, this impact on {CNN(MC,NM)} is undermined by a tendency toward {SNN(OCCrFl)}");
        apropos_STF("OCCrFl", ".", false);

        doubleSpace();

} /* OutlineView::OCUnRng_OCCrFl_report */


/* --------------------------------------------------CNH---04/12/94---
        OutlineView::MCCon_MCStp_report  - builds a Main Character Concern/Stipulation report
------------------------------------------------------------------------ */
void OutlineView::MCCon_MCStp_report(void)
{
        do_title("Main Character Concern / Stipulation");

        fOutlineStr.CatStr("Although {CNN(MC,NM)}'s chief concern in \"{SDI(Title)}\" is {SNF(MCCon)}");
        apropos_STF("MCCon", ", ", true);
        fOutlineStr.CatStr("the degree of {PPN(MC,P1)} concern is measured by how fully {PPN(MC,NC)} accommodates
{SNF(MCStp)}");
        apropos_STF("MCStp", ".", false);

        doubleSpace();

} /* OutlineView::MCCon_MCStp_report */


/* --------------------------------------------------CNH---04/12/94---
        OutlineView::OCCon_OCStp_report  - builds a Obstacle Character Concern/Stipulation report
------------------------------------------------------------------------ */
void OutlineView::OCCon_OCStp_report(void)
{
        do_title("Obstacle Character Concern / Stipulation");

        fOutlineStr.CatStr("Although {CNN(OC,NM)}'s chief concern in \"{SDI(Title)}\" is {SNN(OCCon)}");
        apropos_STF("OCCon", ", ", true);
        fOutlineStr.CatStr("the extent of {PPN(OC,P1)} concern is measured by how intently {PPN(OC,NC)} works at
{SVB(OC,OCStp,PRESP)}");
        apropos_STF("OCStp", ".", false);

        doubleSpace();

} /* OutlineView::OCCon_OCStp_report */



/* --------------------------------------------------CNH---04/17/94---
        OutlineView::Work_Approach_report  - builds a Work/Approach report
------------------------------------------------------------------------ */
void OutlineView::Work_Approach_report(void)
{
        short i;
        char tmpStr[4000];
        char *varStr[11];                                                               // an array
of character string pointers used to store the "mix-n-match" strings for the last two paragraphs

        for (i = 0; i <= 10; ++i)
                varStr[i] = "UNDEFINED";                                                // initialize the
string pointers


        if ((ACTION && BEER) || (DECISION && DOER))
                varStr[0] = "Unsuited";
        else if ((ACTION && DOER) || (DECISION && BEER))
```

```
                varStr[0] = "Suited";

        do_title("Work / Approach");

        fOutlineStr.CatStr("In \"{SDI(Title)}\", the story is forced forward by {SNF(Work)}s.  ");
        sprintf(tmpStr,"This makes {CNN(MC,NM)} particularly %s to dealing ", varStr[0]);
        fOutlineStr.CatStr(tmpStr);
        fOutlineStr.CatStr("with the issues since by nature {PPN(MC,NC)} {SVB(MC,14,PTG)} a {SNF(Approach)}.");
        doubleSpace();

} /* OutlineView::Work_Approach_report */



/* ------------------------------------------------CNH---04/17/94---
        OutlineView::Limit_Sex_report  - builds a Limit/Mental Sex report
---------------------------------------------------------------------------- */
void OutlineView::Limit_Sex_report(void)
{
        short i;
        char tmpStr[4000];
        char *varStr[11];                                                                       // an array
of character string pointers used to store the "mix-n-match" strings for the last two paragraphs

        for (i = 0; i <= 10; ++i)
                varStr[i] = "UNDEFINED";                                                    // initialize the
string pointers


        if (FEMALE && TIMELOCK)
                varStr[0] = "a Reasonable";
        else if (FEMALE && SPACELOCK)
                varStr[0] = "an Emotional";
        else if (MALE && SPACELOCK)
                varStr[0] = "an Internal";
        else if (MALE && TIMELOCK)
                varStr[0] = "an External";

        if (TIMELOCK)
                varStr[1] = "time runs out";
        else
                varStr[1] = "there are no more opitions left";

        do_title("Limit / Mental Sex");

        fOutlineStr.CatStr("In \"{SDI(Title)}\", {CNN(MC,NM)}'s use of {SNF(Sex)} problem ");
        fOutlineStr.CatStr("solving techniques lead to pressure to come up with ");
        sprintf(tmpStr,"a %s solution when %s.", varStr[0], varStr[1]);
        fOutlineStr.CatStr(tmpStr);
        doubleSpace();

} /* OutlineView::Limit_Sex_report */



/* ------------------------------------------------CNH---04/17/94---
        OutlineView::Direction_Judgment_report  - builds a Direction/Judgment report
---------------------------------------------------------------------------- */
void OutlineView::Direction_Judgment_report(void)
{
        short i;
        char tmpStr[4000];
        char *varStr[11];                                                                       // an array
of character string pointers used to store the "mix-n-match" strings for the last two paragraphs

        for (i = 0; i <= 10; ++i)
                varStr[i] = "UNDEFINED";                                                    // initialize the
string pointers


        if (GOOD) {
                varStr[0] = "Fulfilled";
                varStr[1] = "Resolved";
        } else {
                varStr[0] = "Unfulfilled";
                varStr[1] = "Unresolved";
        }

        do_title("Direction / Judgment");

        fOutlineStr.CatStr("As \"{SDI(Title)}\" unfolds, the audience yearns ");
        fOutlineStr.CatStr("for something to {SNF(Direction)}.  ");
        sprintf(tmpStr,"In the end, the audience is %s when ", varStr[0]);
        fOutlineStr.CatStr(tmpStr);
        sprintf(tmpStr,"{CNN(MC,NM)}'s personal problems are %s.", varStr[1]);
        fOutlineStr.CatStr(tmpStr);
        doubleSpace();

} /* OutlineView::Direction_Judgment_report */



/* ------------------------------------------------CNH---04/17/94---
        OutlineView::Resolve_Outcome_report  - builds a Resolve/Outcome report
---------------------------------------------------------------------------- */
void OutlineView::Resolve_Outcome_report(void)
{
        short i;
        char tmpStr[4000];
        char *varStr[11];                                                                       // an array
of character string pointers used to store the "mix-n-match" strings for the last two paragraphs

        for (i = 0; i <= 10; ++i)
                varStr[i] = "UNDEFINED";                                                    // initialize the
string pointers


        if (CHANGE) {
                varStr[0] = "Change";
        } else {
```

```
                varStr[0] = "Remain Steadfast";
        }

        do_title("Resolve / Outcome");

        fOutlineStr.CatStr("By the end of \"{SDI(Title)}\", {CNN(MC,NM)}'s ");
        sprintf(tmpStr,"decision to %s causes the effort ", varStr[0]);
        fOutlineStr.CatStr(tmpStr);
        fOutlineStr.CatStr("to achieve the goal to culminate in {SNF(Outcome)}.");
        doubleSpace();

} /* OutlineView::Resolve_Outcome_report */



/* --------------------------------------------------CNH---04/17/94---
        OutlineView::All_Dynamics_report  - builds a report of all the dynamics
------------------------------------------------------------------------------- */
void OutlineView::All_Dynamics_report(void)
{
        do_title("All Dynamics Report for \"{SDI(Title)}\"");
        doubleSpace();
        Work_Approach_report();
        doubleSpace();
        Limit_Sex_report();
        doubleSpace();
        Direction_Judgment_report();
        doubleSpace();
        Resolve_Outcome_report();
        doubleSpace();

} /* OutlineView::All_Dynamics_report */



/* --------------------------------------------------CNH---04/17/94---
        OutlineView::intro_report  - builds the Reports Intro screen report
------------------------------------------------------------------------------- */
void OutlineView::intro_report(void)
{
        char tmpStr[3000];
        ushort numStories;

        numStories = fDoc->GetTotalStories();

        doubleSpace();
        do_title("Welcome to the Dramatica Reports");

        if (numStories != 1) {
                if (numStories <1)
                        numStories = 32568;
                sprintf(tmpStr,"You have \"%hd\" possible Storyforms for this story.", numStories);
                fOutlineStr.CatStr(tmpStr);
                doubleSpace();

                fOutlineStr.CatStr("Thought you could get away with it, didn't you?  ");
                fOutlineStr.CatStr("Come on, admit it... DIDN'T YOU!!! ");
                fOutlineStr.CatStr("Trying to jump ahead to the reports without answering ");
                fOutlineStr.CatStr("enough questions to get down to one single storyform.  ");
                fOutlineStr.CatStr("Well... the joke's on you!  You can't access most of these ");
                fOutlineStr.CatStr("reports because they require a complete storyform.  ");
                fOutlineStr.CatStr("So, browse around all you like.  Pull up the few reports ");
                fOutlineStr.CatStr("you CAN access, and take note of all the gray-ed out ");
                fOutlineStr.CatStr("ones you can't.  Then go back to storyforming ");
                fOutlineStr.CatStr("and get it over with.  You'll be glad you did.");
                doubleSpace();

                fOutlineStr.CatStr("SERIOUSLY...Until you have completed the Storyforming Stage by getting ");
                fOutlineStr.CatStr("down to a single storyform, Dramatica can only offer ");
                fOutlineStr.CatStr("a limited number of reports.  This is because Dramatica's ");
                fOutlineStr.CatStr("Story Engine requires YOUR input in order to run.  \n\n");
                fOutlineStr.CatStr("However, there are several reports already available that have organized ");
                fOutlineStr.CatStr("your Storytelling into easily referenced presentations.  ");
                fOutlineStr.CatStr("Browse through these existing reports.  ");
                fOutlineStr.CatStr("Then, should you wish to enable additional reports, return to the ");
                fOutlineStr.CatStr("Storyforming stage and continue to work with your story until ");
                fOutlineStr.CatStr("you have reached the single storyform that best represents what you have in
mind.");
                doubleSpace();

        } else {

                fOutlineStr.CatStr("As a result of having arrived at a single Storyform, ");
                fOutlineStr.CatStr("Dramatica is able to offer a wide range of reports ");
                fOutlineStr.CatStr("that organize the essential dramatics of your ");
                fOutlineStr.CatStr("story in an easily referenced manner.  \n\n");
                fOutlineStr.CatStr("Where appropriate, your Storytelling input has been ");
                fOutlineStr.CatStr("added so the shape of your story can become more tangible.  ");
                fOutlineStr.CatStr("As you find areas that are less fully developed, ");
                fOutlineStr.CatStr("you may wish to return to the Storytelling Stage ");
                fOutlineStr.CatStr("and continue to illustrate additional aspects of your \"raw\" Storyform.");
                doubleSpace();
        }

} /* OutlineView::intro_report */



/* --------------------------------------------------CNH---04/17/94---
        OutlineView::Overview_apprec_report  - builds a overview appreciations report
------------------------------------------------------------------------------- */
void OutlineView::Overview_apprec_report(void)
{
        short i;
        char tmpStr[4000];
```

```
	char *varStr[11];                                                         // an array
of character string pointers used to store the "mix-n-match" strings for the last two paragraphs

	for (i = 0; i <= 10; ++i)
		varStr[i] = "UNDEFINED";                                          // initialize the
string pointers


	do_title("Overview Appreciations");

	do_title("Nature");

	if (CHANGE) {
		varStr[5] = "Change";
	} else {
		varStr[5] = "Remain Steadfast";
	}

	fOutlineStr.CatStr("\"{SDI(Title)}\" is an {SNF(Nature)} story because {CNN(MC,NM)}'s ");
	sprintf(tmpStr,"decision to %s results in {SNF(Outcome)}.", varStr[5]);
	fOutlineStr.CatStr(tmpStr);
	doubleSpace();
	doubleSpace();


	do_title("Essence");

	if (POSITIVE)
		varStr[0] = "characters are closing in on the solution to the solution to the story's problem";
	else
		varStr[0] = "story's problems are closing in on the characters";

	sprintf(tmpStr,"The undercurrent of \"{SDI(Title)}\" has a {SNF(Essence)} since the %s.", varStr[0]);
	fOutlineStr.CatStr(tmpStr);
	doubleSpace();
	doubleSpace();


	do_title("Reach");

	if (BOTH_EMPATHIZE || NEITHER_EMPATHIZE) {
		if (BOTH_EMPATHIZE) {
			varStr[1] = "empathize";
			varStr[2] = "sympathize";
		} else {
			varStr[1] = "sympathize";
			varStr[2] = "empathize";
		}
		sprintf(tmpStr,"Both women and men will %s with {CNN(MC,NM)} in \"{SDI(Title)}\".  ", varStr[1]);
		fOutlineStr.CatStr(tmpStr);
		sprintf(tmpStr,"Neither will %s.", varStr[2]);
		fOutlineStr.CatStr(tmpStr);

	} else {
		if (MALE_EMPATHIZE) {
			varStr[1] = "Men";
			varStr[2] = "Women";
		} else {
			varStr[1] = "Women";
			varStr[2] = "Men";
		}
		sprintf(tmpStr,"%s will empathize with {CNN(MC,NM)} in \"{SDI(Title)}\".  ", varStr[1]);
		fOutlineStr.CatStr(tmpStr);
		sprintf(tmpStr,"%s will sympathize.", varStr[2]);
		fOutlineStr.CatStr(tmpStr);
	}
	doubleSpace();
	doubleSpace();


	if (ACTION)
		varStr[3] = "an action";
	else
		varStr[3] = "a decision";

	if (UNWILLING)
		varStr[4] = "an unwilling";
	else
		varStr[4] = "a willing";

	do_title("Tendency");

	sprintf(tmpStr,"As a {SNF(Approach)} in %s story, {CNN(MC,NM)} in \"{SDI(Title)}\" ", varStr[3]);
	fOutlineStr.CatStr(tmpStr);
	sprintf(tmpStr,"is %s participant in the effort to achieve the goal.", varStr[4]);
	fOutlineStr.CatStr(tmpStr);

	doubleSpace();

} /* OutlineView::Overview_apprec_report */



/* -------------------------------------------------CNH---04/17/94---
	OutlineView::Essential_ques_report  - builds an Essention Questions report
--------------------------------------------------------------------------- */
void OutlineView::Essential_ques_report(void)
{
	do_title("Report on the 12 Essential Questions");
	doubleSpace();

	Resolve_to_Sex__report();                        // the 4 character dynamics questions
	Work_to_Judgment__report();                                // the 4 plot dynamics questions
	STDom_to_MCPbm_report();                         // the 4 story thematics questions

} /* OutlineView::Essential_ques_report */
```

```
/* -------------------------------------------------CNH---04/17/94---
        OutlineView::STDom_to_MCPbm_report  - builds a report for the four thematic
                                                                                items in Quick Start
------------------------------------------------------------------------- */
void OutlineView::STDom_to_MCPbm_report(void)
{
        short i;
        char tmpStr[300];
        char *varStr[11];                                                               // an array
of character string pointers used to store the "mix-n-match" strings for the last two paragraphs

        AddrText tmpAddr;
        short whichClass = 0;
        strcpy(tmpAddr, SEMTBL_ADDRESS(fDoc->GetApprValByIndex(kApprMCPbm)));
        whichClass = tmpAddr[0]-'0';                                                    // the class of the
main character domain as indicated by the first digit in the address


        for (i = 0; i <= 10; ++i)
                varStr[i] = "UNDEFINED";                                                // initialize the
string pointers

        if (whichClass == 1) {
                varStr[0] = "situations and purposes";
        } else if (whichClass == 2) {
                varStr[0] = "activities and methods";
        } else if (whichClass == 3) {
                varStr[0] = "how people think and evaluations";
        } else {
                varStr[0] = "attitudes and motivations";
        }

        do_title("Objective Domain");

        sprintf(tmpStr,"In \"{SDI(Title)}\", the events that affect people revolve around %s.", varStr[0]);
        fOutlineStr.CatStr(tmpStr);
        doubleSpace();
        doubleSpace();


        do_title("Objective Concern");

        fOutlineStr.CatStr("All the characters in \"{SDI(Title)}\" share a concern with {SNF(STCon)}.");
        doubleSpace();
        doubleSpace();


        do_title("Objective Range");

        fOutlineStr.CatStr("The thematic conflict that involves most of the characters ");
        fOutlineStr.CatStr("in \"{SDI(Title)}\" examines {SNF(STRng)} vs. {SNF(STRng2)}, ");
        fOutlineStr.CatStr("with the focus being on {SNF(STRng)}.");
        doubleSpace();
        doubleSpace();


        do_title("Objective Problem");

        if (STOP)
                varStr[7] = "an overabundance";
        else
                varStr[7] = "a deficiency";

        sprintf(tmpStr,"At the heart of all the troubles in \"{SDI(Title)}\" is %s of {SNF(STPbm)}.", varStr[7]);
        fOutlineStr.CatStr(tmpStr);
        doubleSpace();
        doubleSpace();

} /* OutlineView::STDom_to_MCPbm_report */



/* -------------------------------------------------CNH---04/17/94---
        OutlineView::Resolve_to_Sex__report  - builds a report for the
                                                                                four character dynamics
found in
                                                                                the 12 essential questions
------------------------------------------------------------------------- */
void OutlineView::Resolve_to_Sex__report(void)
{
        short i;
        char tmpStr[300];
        char *varStr[11];                                                               // an array
of character string pointers used to store the "mix-n-match" strings for the last two paragraphs

        for (i = 0; i <= 10; ++i)
                varStr[i] = "UNDEFINED";                                                // initialize the
string pointers


        do_title("Resolve");

        if (CHANGE) {
                varStr[3] = "Change";
        } else {
                varStr[3] = "Remain Steadfast";
        }

        fOutlineStr.CatStr("In \"{SDI(Title)}\", after maintaining {PPN(MC,P1)} story-long approach, ");
        fOutlineStr.CatStr("{CNN(MC,NM)} arrives at a moment of truth in ");

        sprintf(tmpStr,"which {PPN(MC,NC)} ultimately will %s.", varStr[3]);
        fOutlineStr.CatStr(tmpStr);
        doubleSpace();
        doubleSpace();


        do_title("Direction");

        if (CHANGE) {
                if (STOP)
                        varStr[0] = "stopping something inappropriate";
```

```
		else
			varStr[0] = "starting something they have lacked";

		sprintf(tmpStr,"In \"(SDI(Title)}\", {CNN(MC,NM)} grows by %s.", varStr[0]);
		fOutlineStr.CatStr(tmpStr);

	} else {
		fOutlineStr.CatStr("In \"(SDI(Title)}\", {CNN(MC,NM)} grows in {PPN(MC,P1)} resolve ");
		fOutlineStr.CatStr("while holding out for something to {SNF(Direction)}.");
	}

	doubleSpace();
	doubleSpace();


	do_title("Approach");

	if (BEER)
		varStr[1] = "Internal";
	else
		varStr[1] = "External";

	sprintf(tmpStr,"Because of {PPN(MC,P1)} reliance on %s problem ", varStr[1]);
	fOutlineStr.CatStr(tmpStr);
	fOutlineStr.CatStr("solving in \"(SDI(Title)}\", {CNN(MC,NM)} is principally a {SNF(Approach)}.");
	doubleSpace();
	doubleSpace();


	do_title("Mental Sex");

	if (MALE)
		varStr[2] = "Linear, Cause and Effect";
	else
		varStr[2] = "Holistic, Process and Result";

	sprintf(tmpStr,"Due to {PPN(MC,P1)} %s approach to problem solving in \"(SDI(Title)}\", ", varStr[2]);
	fOutlineStr.CatStr(tmpStr);
	fOutlineStr.CatStr("{CNN(MC,NM)}'s mental sex is seen to be {SNF(Sex)}.");
	doubleSpace();
	doubleSpace();

} /* OutlineView::Resolve_to_Sex__report */



/* --------------------------------------------------CNH---04/17/94---
	OutlineView::Work_to_Judgment__report  - builds a report for the
										four plot dynamics found in
										the 12 essential questions
--------------------------------------------------------------------------- */
void OutlineView::Work_to_Judgment__report(void)
{
	short i;
	char tmpStr[300];
	char *varStr[11];								// an array
of character string pointers used to store the "mix-n-match" strings for the last two paragraphs

	for (i = 0; i <= 10; ++i)
		varStr[i] = "UNDEFINED";						// initialize the
string pointers


	do_title("Work");

	if (ACTION)
		varStr[3] = "Decision";
	else
		varStr[3] = "Action";

	sprintf(tmpStr,"In \"(SDI(Title)}\", essential %ss are only made in response to precipitive {SNF(Work)}s.",
varStr[3]);
	fOutlineStr.CatStr(tmpStr);
	doubleSpace();
	doubleSpace();


	do_title("Limit");

	if (TIMELOCK)
		varStr[4] = "Time";
	else
		varStr[4] = "Options";

	sprintf(tmpStr,"The climax of \"(SDI(Title)}\" is brought about when the characters run out of %s.", varStr[4]);
	fOutlineStr.CatStr(tmpStr);
	doubleSpace();
	doubleSpace();


	do_title("Outcome");

	fOutlineStr.CatStr("When all is said and done, the effort to achieve ");
	fOutlineStr.CatStr("the goal in \"(SDI(Title)}\" turns out to be a {SNF(Outcome)}.");
	doubleSpace();
	doubleSpace();


	do_title("Judgment");

	if ((SUCCESS && BAD) || (FAILURE && GOOD))
		varStr[5] = "Even though";
	else if ((SUCCESS && GOOD) || (FAILURE && BAD))
		varStr[5] = "Not only does";

	sprintf(tmpStr,"%s the outcome of the effort to achieve the ", varStr[5]);
	fOutlineStr.CatStr(tmpStr);
	fOutlineStr.CatStr("goal in \"(SDI(Title)}\" turn out to be a {SNF(Outcome)}, ");
	fOutlineStr.CatStr("{CNN(MC,NM)}'s effort to resolve {PPN(MC,P1)} personal ");
```

```
        fOutlineStr.CatStr("problems turns out {SNF(Judgment)}.");
        doubleSpace();
        doubleSpace();

} /* OutlineView::Work_to_Judgment__report */

/* ---------------------------------------------------CNH---02/08/94---
        OutlineView::misc_os_reports  - builds a report for the objective
                                                        story thematic material.
--------------------------------------------------------------------------- */
void OutlineView::misc_os_reports(void)
{

#if 0

        Overview_apprec_report();
        doubleSpace();
        separator_line(15);
        doubleSpace();

        All_Dynamics_report();
        doubleSpace();
        separator_line(15);
        doubleSpace();

        Essential_ques_report();
        doubleSpace();
        separator_line(15);
        doubleSpace();

        plot_sequence_report();
        doubleSpace();
        separator_line(15);
        doubleSpace();

        os_theme_report();
        doubleSpace();
        separator_line(15);
        doubleSpace();

        os_plot_report();
        doubleSpace();
        separator_line(15);
        doubleSpace();

        os_dynamics_report();
        doubleSpace();
        separator_line(15);
        doubleSpace();

        os_character_report();
        doubleSpace();
        separator_line(15);
        doubleSpace();

        ss_theme_report();
        doubleSpace();
        separator_line(15);
        doubleSpace();

        ss_character_report();
        doubleSpace();
        separator_line(15);
        doubleSpace();

        mc_theme_report();
        doubleSpace();
        separator_line(15);
        doubleSpace();

        mc_basics_report();
        doubleSpace();
        separator_line(15);
        doubleSpace();

        mc_character_report();
        doubleSpace();
        separator_line(15);
        doubleSpace();

        oc_theme_report();
        doubleSpace();
        separator_line(15);
        doubleSpace();

#endif
        STGoal_STReq_report();                          // Goal/Requirement
        doubleSpace();
        STGoal_PLGoal_report();                         // Goal/Consequence
        doubleSpace();
        OCGoal_MCGoal_report();                         // Cost/Dividend
        doubleSpace();
        STReq_PLReq_report();                           // Requirement/Prerequisites
        doubleSpace();
        PLReq_OCReq_report();                           // Prerequisites/Preconditions
        doubleSpace();
        PLGoal_MCReq_report();                          // Consequence/Forewarnings
        doubleSpace();

        STDom_PLDom_report();                           // Objective Domain/Subjective Domain
        doubleSpace();
        STCon_STStp_report();                           // Objective Concern/Objective Stipulation
        doubleSpace();
        STUnRng_STCrFl_report();                // Objective Catalyst/Objective Inhibitor
        doubleSpace();
        PLCon_PLStp_report();                           // Subjective Concern/Subjective Stipulation
        doubleSpace();
        PLUnRng_PLCrFl_report();
        doubleSpace();

        STRng_STRng2_report();                          // Objective Thematic Conflict
```

```
        doubleSpace();
        PLRng_PLRng2_report();                       // Subjective Thematic Conflict
        doubleSpace();
        MCRng_MCRng2_report();                       // Main Character Thematic Conflict
        doubleSpace();
        OCRng_OCRng2_report();                       // Obstacle Character Thematic Conflict
        doubleSpace();

        STPbm_STSol_report();                        // Objective Problem/Solution
        doubleSpace();
        STPbm_STFoc_report();                        // Objective Problem/Focus
        doubleSpace();
        STFoc_STDir_report();                        // Objective Focus/Direction
        doubleSpace();

        PLPbm_PLSol_report();                        // Subjective Problem/Solution
        doubleSpace();
        PLPbm_PLFoc_report();                        // Subjective Problem/Focus
        doubleSpace();
        PLFoc_PLDir_report();                        // Subjective Focus/Direction
        doubleSpace();

        MCDom_OCDom_report();                        // Main/Obstacle Domains
        doubleSpace();
        MCPbm_MCSol_report();                        // Main Character Problem/Solution
        doubleSpace();
        MCPbm_MCFoc_report();                        // Main Character Problem/Focus
        doubleSpace();
        MCFoc_MCDir_report();                        // Main Character Focus/Direction
        doubleSpace();

        OCPbm_OCSol_report();                        // Obstacle Character Problem/Solution
        doubleSpace();
        OCPbm_OCFoc_report();                        // Obstacle Character Problem/Focus
        doubleSpace();
        OCFoc_OCDir_report();                        // Obstacle Character Focus/Direction
        doubleSpace();

        MCUnRng_MCCrFl_report();             // Main Character Unique Ability/Critical Flaw
        doubleSpace();
        OCUnRng_OCCrFl_report();             // Obstacle Character Unique Ability/Critical Flaw
        doubleSpace();
        MCCon_MCStp_report();                        // Main Character Concern/Stipulation
        doubleSpace();
} /* OutlineView::misc_os_reports */


/* -------------------------------------------------CNH---02/08/94---
        OutlineView::basic_plot_dramatics  - builds a report for the Plot Dramatics
------------------------------------------------------------------------ */
void OutlineView::basic_plot_dramatics(void)
{

        do_title("Basic Plot Dramatics");

        fOutlineStr.CatStr("The following items reflect the principal story points ");
        fOutlineStr.CatStr("that shape events in \"{SDI(Title)}\".");
        doubleSpace();

        STDom_PLDom_report();                        // Objective Domain/Subjective Domain
        doubleSpace();

        STGoal_STReq_report();                       // Goal/Requirement
        doubleSpace();

        STGoal_PLGoal_report();                      // Goal/Consequence
        doubleSpace();

        STReq_PLReq_report();                        // Requirement/Prerequisites
        doubleSpace();

        PLGoal_MCReq_report();                       // Consequence/Forewarnings
        doubleSpace();

        OCGoal_MCGoal_report();                      // Cost/Dividend
        doubleSpace();

        PLReq_OCReq_report();                        // Prerequisites/Preconditions
        doubleSpace();

} /* OutlineView::basic_plot_dramatics */


/* -------------------------------------------------CNH---02/08/94---
        OutlineView::basic_mc_dramatics  - builds a report for the MC Dramatics
------------------------------------------------------------------------ */
void OutlineView::basic_mc_dramatics(void)
{
        do_title("Basic Main Character Dramatics");

        fOutlineStr.CatStr("The following items reflect the principal story points that ");
        fOutlineStr.CatStr("shape the growth of {CNN(MC.NM)} in \"{SDI(Title)}\".");
        doubleSpace();

        MCPbm_MCSol_report();                        // Main Character Problem/Solution
        doubleSpace();

        MCPbm_MCFoc_report();                        // Main Character Problem/Focus
        doubleSpace();

        MCFoc_MCDir_report();                        // Main Character Focus/Direction
        doubleSpace();

        MCCon_MCStp_report();                        // Main Character Concern/Stipulation
        doubleSpace();

        MCUnRng_MCCrFl_report();             // Main Character Unique Ability/Critical Flaw
        doubleSpace();
```

```
} /* OutlineView::basic_mc_dramatics */


/* -------------------------------------------------CNH---02/08/94---
        OutlineView::basic_oc_dramatics  - builds a report for the obstacle character Dramatics
---------------------------------------------------------------------------- */
void OutlineView::basic_oc_dramatics(void)
{
        do_title("Basic Obstacle Character Dramatics");

        fOutlineStr.CatStr("The following items reflect the principal story points that shape ");
        fOutlineStr.CatStr("the development of (CNN(OC,NM)) in \"(SDI(Title))\".");
        doubleSpace();

        OCPbm_OCSol_report();                                   // Obstacle Character Problem/Solution
        doubleSpace();

        OCPbm_OCFoc_report();                                   // Obstacle Character Problem/Focus
        doubleSpace();

        OCFoc_OCDir_report();                                   // Obstacle Character Focus/Direction
        doubleSpace();

        OCCon_OCStp_report();                                   // Obstacle Character Concern/Stipulation
        doubleSpace();

        OCUnRng_OCCrFl_report();                        // Obstacle Character Unique Ability/Critical Flaw
        doubleSpace();

} /* OutlineView::basic_oc_dramatics */



/* -------------------------------------------------CNH---02/08/94---
        OutlineView::basic_thematics_dramatics  - builds a report for the thematics Dramatics
---------------------------------------------------------------------------- */
void OutlineView::basic_thematics_dramatics(void)
{
        do_title("Basic Thematics Report");

        fOutlineStr.CatStr("The following items reflect the principal story points ");
        fOutlineStr.CatStr("that shape the thematic message of \"(SDI(Title))\".");
        doubleSpace();

        STRng_STRng2_report();                                  // Objective Thematic Conflict
        doubleSpace();

        PLRng_PLRng2_report();                                  // Subjective Thematic Conflict
        doubleSpace();

        MCRng_MCRng2_report();                                  // Main Character Thematic Conflict
        doubleSpace();

        OCRng_OCRng2_report();                                  // Obstacle Character Thematic Conflict
        doubleSpace();

} /* OutlineView::basic_thematics_dramatics */



/* -------------------------------------------------CNH---02/08/94---
        OutlineView::basic_objchar_dramatics  - builds a report for objective character Dramatics
---------------------------------------------------------------------------- */
void OutlineView::basic_objchar_dramatics(void)
{
        do_title("Basic Objective Character Dramatics");

        fOutlineStr.CatStr("The following items reflect the principal concerns ");
        fOutlineStr.CatStr("of characters in \"(SDI(Title))\".");
        doubleSpace();

        STCon_STStp_report();                                   // Objective Concern/Objective Stipulation
        doubleSpace();

        STPbm_STSol_report();                                   // Objective Problem/Solution
        doubleSpace();

        STPbm_STFoc_report();                                   // Objective Problem/Focus
        doubleSpace();

        STFoc_STDir_report();                                   // Objective Focus/Direction
        doubleSpace();

        STUnRng_STCrFl_report();                        // Objective Catalyst/Objective Inhibitor
        doubleSpace();

} /* OutlineView::basic_objchar_dramatics */


/* -------------------------------------------------CNH---02/08/94---
        OutlineView::basic_subjchar_dramatics  - builds a report for the subjective character Dramatics
---------------------------------------------------------------------------- */
void OutlineView::basic_subjchar_dramatics(void)
{
        do_title("Basic Subjective Character Dramatics");

        fOutlineStr.CatStr("Subjective Characters in \"(SDI(Title))\".");
        doubleSpace();

        MCDom_OCDom_report();                                   // Main/Obstacle Domains
        doubleSpace();

        PLCon_PLStp_report();                                   // Subjective Concern/Subjective Stipulation
        doubleSpace();

        PLPbm_PLSol_report();                                   // Subjective Problem/Solution
        doubleSpace();
```

```
        PLPbm_PLFoc_report();                               // Subjective Problem/Focus
        doubleSpace();

        PLFoc_PLDir_report();                               // Subjective Focus/Direction
        doubleSpace();

        OCGoal_MCGoal_report();                             // Cost/Dividend
        doubleSpace();

} /* OutlineView::basic_subjchar_dramatics */




/* ------------------------------------------------CNH---02/23/94---
        OutlineView::ss_character_report  - builds a report for the subjective
                                                                  story character material.
------------------------------------------------------------------------- */
void OutlineView::ss_character_report(void)
{
        short i;
        char tmpStr[300];
        AddrText tmpAddr;
        char *varStr[31];                                                        // an array
of character string pointers used to store the "mix-n-match" strings for the last two paragraphs

        Unit *dynRangeUnit;                                                      // dynamic
pair of the thematic range
        short mcSemVal = 0;                                                      // semVal of
the dynamic pair of the MC thematic range
        short ocSemVal = 0;                                                      // semVal of
the dynamic pair of the OC thematic range


        SuperClass* mySC          = fDoc->GetSuperClass(kMyRefSC);

        GetPartner(INDEPENDENT, DYNAMIC, SEMTBL_ADDRESS(fDoc->GetApprValByIndex(kApprMCRng)), tmpAddr);
        dynRangeUnit = Addr2Item(mySC, tmpAddr);              /* get the pointer to the dynamic pair of the
range */
        mcSemVal = dynRangeUnit->semVal;                              // semVal of the dynamic pair of the
thematic range

        GetPartner(INDEPENDENT, DYNAMIC, SEMTBL_ADDRESS(fDoc->GetApprValByIndex(kApprOCRng)), tmpAddr);
        dynRangeUnit = Addr2Item(mySC, tmpAddr);              /* get the pointer to the dynamic pair of the
range */
        ocSemVal = dynRangeUnit->semVal;                              // semVal of the dynamic pair of the
thematic range


/********************************** Big test section to determine variable string text
**********************************/
        for (i = 0; i <= 30; ++i)
                varStr[i] = "UNDEFINED";                                           // initialize the
string pointers


        if (CHANGE) {
                varStr[7] = "(CNN(MC,NM))";
                varStr[8] = "(CNN(OC,NM))";
                varStr[20] = "(PPN(MC,P1))";
        } else {            //  (STEADFAST)
                varStr[7] = "(CNN(OC,NM))";
                varStr[8] = "(CNN(MC,NM))";
                varStr[20] = "(PPN(OC,P1))";
        }

        if ((CHANGE && GOOD) || (STEADFAST && BAD)) {
                varStr[3] = "(SNF(PLPbm))";
                varStr[4] = "(SNF(PLSol))";
                varStr[5] = "(SNF(PLFoc))";
                varStr[6] = "(SNF(PLDir))";
                varStr[13] = "was";
                varStr[14] = "really was";
                varStr[18] = "(CNN(OC,NM))";
        } else {            //  (STEADFAST && GOOD) || (CHANGE && BAD)
                varStr[3] = "(SNF(PLFoc))";
                varStr[4] = "(SNF(PLDir))";
                varStr[5] = "(SNF(PLPbm))";
                varStr[6] = "(SNF(PLSol))";
                varStr[13] = "was not";
                varStr[14] = "wasn't really";
                varStr[18] = "(CNN(MC,NM))";
        }

        if ((SUCCESS && GOOD) || (FAILURE && BAD)) {
                varStr[9] = "";
                varStr[11] = "and ";
                varStr[16] = "and";
        } else {            //  (FAILURE && GOOD) || (SUCCESS && BAD)
                varStr[9] = "although ";
                varStr[11] = "";
                varStr[16] = "but";
        }

        if (SUCCESS) {
                varStr[10] = "";
        } else {            //  (FAILURE)
                varStr[10] = "not ";
        }

        if (GOOD) {
                varStr[12] = "resolves";
                varStr[17] = "succeeded in resolving";
        } else {            //  (BAD)
                varStr[12] = "fails to resolve";
                varStr[17] = "failed to resolve";
        }
```

```
        if (CHANGE && BAD) {
                varStr[19] = "in the first place";
        } else {
                varStr[19] = "all along";
        }

        if ((CHANGE && STOP) || (STEADFAST && START)) {
                varStr[22] = "";                                        // mc will end up "we
must"
                varStr[23] = " not";                                    // oc will end up "we
must NOT"
        } else {
                varStr[22] = " not";                                    // mc will end up "we
must"
                varStr[23] = "";                                        // oc will end up "we
must NOT"
        }

/********************************* End of Test *********************************/

        do_title("Subjective Story Character Report for \"{SDI(Title)}\"");

        fOutlineStr.CatStr("The Subjective Storyline is the battle ground ");
        fOutlineStr.CatStr("of the Main and Obstacle characters.  ");
        fOutlineStr.CatStr("It is the realm in which the passionate argument is explored.  ");
        fOutlineStr.CatStr("We see this argument through the eyes of the Main Character.  ");
        fOutlineStr.CatStr("We also see how it is affected ");
        fOutlineStr.CatStr("by the impact of the Obstacle Character.  ");
        doubleSpace();

        fOutlineStr.CatStr("This is illustrated in \"{SDI(Title)}\" by the ");
        fOutlineStr.CatStr("relationship between {CNN(MC,NM)} and {CNN(OC,NM)}.  ");
        fOutlineStr.CatStr("To start with, {CNN(MC,NM)} is primarily Concerned ");
        fOutlineStr.CatStr("with {SDF(MCDom)} in regard to {SNF(MCCon)}, ");
        fOutlineStr.CatStr("while {CNN(OC,NM)}'s chief Concern is {SDF(OCDom)} ");
        fOutlineStr.CatStr("of {SNF(OCCon)}.  Clearly, they are not concerned with the same things.");
        doubleSpace();

        fOutlineStr.CatStr("{CNN(MC,NM)} evaluates {SNF(MCCon)} in ");
        fOutlineStr.CatStr("terms of {SNF(MCRng)} ");
        sprintf(tmpStr,"and {SNF(%hd)}.  ", mcSemVal);                  // semVal of the
dynamic pair of the MC thematic range
        fOutlineStr.CatStr(tmpStr);
        fOutlineStr.CatStr("In contrast, {CNN(OC,NM)} measures {PPN(OC,P1)} ");
        fOutlineStr.CatStr("concern with {SNF(OCCon)} by how it relates to {SNF(OCRng)} ");
        sprintf(tmpStr,"and {SNF(%hd)}.  ", ocSemVal);                  // semVal of the
dynamic pair of the OC thematic range
        fOutlineStr.CatStr(tmpStr);
        doubleSpace();

        fOutlineStr.CatStr("If they were to argue, {CNN(MC,NM)} might say, ");
        sprintf(tmpStr,"\"We must%s {SVB(MC,MCCon,INF)} because of our {SNF(MCRng)}.\"  ", varStr[22]);
        fOutlineStr.CatStr(tmpStr);
        sprintf(tmpStr,"To which {CNN(OC,NM)} might respond, \"No, we must%s ", varStr[23]);
        fOutlineStr.CatStr(tmpStr);
        fOutlineStr.CatStr("{SVB(OC,OCCon,INF)} because of {SNF(OCRng)}.\"  ");
        fOutlineStr.CatStr("Definitely apples and oranges.  ");
        fOutlineStr.CatStr("But that is what makes any argument real.  ");
        fOutlineStr.CatStr("Arguments occur not so much because people disagree, ");
        fOutlineStr.CatStr("but because they simply aren't really talking about the same things.");
        doubleSpace();

        fOutlineStr.CatStr("Of course, many other arguments will occur ");
        fOutlineStr.CatStr("between {CNN(MC,NM)} and {CNN(OC,NM)} involving ");
        fOutlineStr.CatStr("not only {SNF(MCRng)} vs. {SNF(OCRng)} ");
        sprintf(tmpStr,"but {SNF(%hd)} ", mcSemVal);                                    //
semVal of the dynamic pair of the MC thematic range
        fOutlineStr.CatStr(tmpStr);
        sprintf(tmpStr,"vs. {SNF(%hd)} as well.  ", ocSemVal);                  // semVal of
the dynamic pair of the OC thematic range
        fOutlineStr.CatStr(tmpStr);
        fOutlineStr.CatStr("And, they will argue as to whether {SNF(MCCon)} ");
        fOutlineStr.CatStr("or {SNF(OCCon)} is of more concern.  ");
        doubleSpace();

        fOutlineStr.CatStr("{CNN(MC,NM)} will press {PPN(MC,P1)} argument ");
        fOutlineStr.CatStr("forward using {PPN(MC,P1)} abilities involving {SNF(MCUnRng)}, ");
        fOutlineStr.CatStr("while {CNN(OC,NM)} will respond with {PPN(OC,P1)} ");
        fOutlineStr.CatStr("own strengths in regard to {SNF(OCUnRng)}.  ");
        fOutlineStr.CatStr("Things would really heat up fast if {CNN(MC,NM)} ");
        fOutlineStr.CatStr("were not undermined by {SNF(MCCrF1)} ");
        fOutlineStr.CatStr("and {CNN(OC,NM)} hamstrung by {SNF(OCCrF1)}.  ");
        doubleSpace();

        fOutlineStr.CatStr("What happens?  ");
        sprintf(tmpStr,"In the end, %s success ", varStr[9]);
        fOutlineStr.CatStr(tmpStr);
        sprintf(tmpStr,"is %sachieved in the objective story, ", varStr[10]);
        fOutlineStr.CatStr(tmpStr);
        sprintf(tmpStr,"%s{CNN(MC,NM)} %s {PPN(MC,P1)} ", varStr[11], varStr[12]);
        fOutlineStr.CatStr(tmpStr);
        fOutlineStr.CatStr("personal problems, clearly showing that {CNN(OC,NM)} ");
        sprintf(tmpStr,"%s really giving {PPN(MC,OC)} good advice all along. ", varStr[13]);
        fOutlineStr.CatStr(tmpStr);
        doubleSpace();

        fOutlineStr.CatStr("In summary, {CNN(MC,NM)} and {CNN(OC,NM)} fail ");
        fOutlineStr.CatStr("to see eye to eye.  ");
        fOutlineStr.CatStr("While {CNN(MC,NM)} is concerned with {SDF(MCDom)} in regard to {SNF(MCCon)}");
        apropos_STF("MCCon", ", ", true);
        fOutlineStr.CatStr("{CNN(OC,NM)}'s chief ");
        fOutlineStr.CatStr("concern is {SDF(OCDom)} of {SNF(OCCon)}");
        apropos_STF("OCCon", ".  ", false);
        fOutlineStr.CatStr("{CNN(MC,NM)} looks at {SNF(MCCon)} as it ");
        fOutlineStr.CatStr("relates to {SNF(MCRng)} and {SNF(MCRng2)}");
        apropos_STF("MCRng", ", ", true);
        fOutlineStr.CatStr("but {CNN(OC,NM)} is more interested ");
        fOutlineStr.CatStr("in how {SNF(OCCon)} relates to {SNF(OCRng)} and {SNF(OCRng2)}");
```

```
	apropos_STF("OCRng", ".  ", false);
	fOutlineStr.CatStr("Each strives to press their point home: ");
	fOutlineStr.CatStr("{CNN(MC,NM)} bolstered by {PPN(MC,P1)} abilities ");
	fOutlineStr.CatStr("involving {SNF(MCUnRng)}");
	apropos_STF("MCUnRng", " ", true);
	fOutlineStr.CatStr("(though held back by {SNF(MCCrFl)})");
	apropos_STF("MCCrFl", ", ", true);
	fOutlineStr.CatStr("and {CNN(OC,NM)} relying on {PPN(OC,P1)} strengths in regard ");
	fOutlineStr.CatStr("to {SNF(OCUnRng)} ");
	apropos_STF("OCUnRng", " ", true);
	fOutlineStr.CatStr("(though {PPN(OC,NC)} too is held back, undermined by {SNF(OCCrFl)})");
	apropos_STF("OCCrFl", ".  ", false);
	sprintf(tmpStr,"When the smoke clears, success has %sbeen achieved in the objective story", varStr[10]);
	fOutlineStr.CatStr(tmpStr);
	apropos_STF("Resolve", ", ", true);
	sprintf(tmpStr,"%s ", varStr[16]);
	fOutlineStr.CatStr(tmpStr);
	sprintf(tmpStr,"{CNN(MC,NM)} has %s {PPN(MC,P1)} personal problems", varStr[17]);
	fOutlineStr.CatStr(tmpStr);
	apropos_STF("Judgment", ".", false);
	doubleSpace();

	if (fWindow->GetVocabularyBtn()) {                              // the vocabulary button is pushed down
		separator_line(30);                                                                   //
draw separator between bottom of report and vocabulary list
		doubleSpace();
		fOutlineStr.CatStr("Semantic items in this report:  ");
		fOutlineStr.CatStr("{SNF(Resolve)}; ");
		fOutlineStr.CatStr("{SNF(Outcome)}; ");
		fOutlineStr.CatStr("{SNF(Judgment)}.");
		fOutlineStr.CatStr("{SNF(Direction)}; ");
		fOutlineStr.CatStr("{SNF(MCDom)}; ");
		fOutlineStr.CatStr("{SNF(MCCon)}; ");
		fOutlineStr.CatStr("{SNF(OCDom)}; ");
		fOutlineStr.CatStr("{SNF(OCCon)}; ");
		fOutlineStr.CatStr("{SNF(MCRng)}; ");
		fOutlineStr.CatStr("{SNF(MCRng2)}; ");
		fOutlineStr.CatStr("{SNF(OCRng)}; ");
		fOutlineStr.CatStr("{SNF(OCRng2)}; ");
		fOutlineStr.CatStr("{SNF(MCUnRng)}; ");
		fOutlineStr.CatStr("{SNF(MCCrFl)}; ");
		fOutlineStr.CatStr("{SNF(OCUnRng)}; ");
		fOutlineStr.CatStr("{SNF(OCCrFl)}; ");

		doubleSpace();
	}


	fDoc->SaveSuperClass(kMyRefSC, kNoSaveSC);

} /* OutlineView::ss_character_report */


/* ---------------------------------------------------CNH---02/23/94---
	OutlineView::os_character_report  - builds a report for the
                                                          objective character set.
------------------------------------------------------------------------ */
void OutlineView::os_character_report(void)
{


	do_title("OBJECTIVE CHARACTERS for \"{SDI(Title)}\":");
	doubleSpace();

	list_characteristics();                    // list the objective characters and their attributes

} /* OutlineView::os_character_report */



/* -----------------------------------------------Stephen---05/27/93---
	OutlineView::list_characteristics  - list the characters and their
	                               characteristics.
------------------------------------------------------------------------ */
void OutlineView::list_characteristics(void)
{
	short i;
	short semValTbl[16];
	short nmOfCharacteristics;
	short whichChar;
	short whichSet;
	char tmpStr[2000];
	char *attribStr[4];

	for (i=0; i<64; ++i)
		fCharacteristicTbl[i] = -1;                                          // initialize the
table: -1 = not assigned

	attribStr[0] = "Motivation";
	attribStr[1] = "Methodology";
	attribStr[2] = "Evaluation";
	attribStr[3] = "Purpose";

	for (whichChar=0; whichChar < fDoc->GetNmCharacters(); ++whichChar) {
		PText* charPT = fDoc->GetCharPT(whichChar);
		char charName[100];
		char charRole[100];
		char description[1000];
		charName[0] = charRole[0] = description[0] = 0;
		charPT->GetParam("NM", 'c', &charName);

		fOutlineStr.CatStr("«M(0,0,0)»");
		bold_on();
		sprintf(tmpStr,"%s's ", charName);
		fOutlineStr.CatStr(tmpStr);
		bold_off();
		fOutlineStr.CatStr("Characteristics");
		charPT->GetParam("Role", 'c', &charRole);
		if (charRole[0]) {
			sprintf(tmpStr," (as the «I+»%s«I-»)", charRole);
			fOutlineStr.CatStr(tmpStr);
		}
		charPT->GetParam("Des", 'c', &description);
```

```
		if (GetStorytellingBtn()) {
			if (description[0]) {
				fOutlineStr.CatStr("\n«M(20,20,20)»«I+»");
				sprintf(tmpStr,"%s", description);
				fOutlineStr.CatStr(tmpStr);
				fOutlineStr.CatStr("«I-»«M(0,0,0)»");
			}
		}
		fOutlineStr.CatStr("\n");

		for (whichSet=0; whichSet <=3; ++whichSet) {
			nmOfCharacteristics = fDoc->GetCharacteristics(whichChar, whichSet, (short*)&semValTbl);
			if (nmOfCharacteristics) {
				fOutlineStr.CatStr("«M(40,60,60)»");
				bold_on();
				underline_on();
				sprintf(tmpStr,"%s", attribStr[whichSet]);
				fOutlineStr.CatStr(tmpStr);
				bold_off();
				underline_off();
				fOutlineStr.CatStr(":  ");
				short n;
				for (n=0; n<nmOfCharacteristics; ++n) {
					sprintf(tmpStr,"{SNF(%hd)}", semValTbl[n]);
					fOutlineStr.CatStr(tmpStr);
					if (GetTutorialBtn()) {
						sprintf(tmpStr," («I+»{SDF(%hd)}«I-»)", semValTbl[n]);
						fOutlineStr.CatStr(tmpStr);
					}
					fOutlineStr.CatStr("; ");
					fCharacteristicTbl[SEMELEM_NORMALIZE(semValTbl[n])-1] = whichChar;
			// assign the character to the table of characteristics
				}
				fOutlineStr.CatStr("\n");
			}
		}
		doubleSpace();
	}

}


/* -----------------------------------------------------------------------
	FUNCTION:		OutlineView::stelling_report
	Purpose:		Build the string for the outline text of the storytelling input.
----------------------------------------------------------------------- */

void OutlineView::stelling_report(void)
{
	PText*			PT;
	pt_err			theErr;
	short i, x;
	char tmpStr[1010];
	char stellingText[1000];
	char theItem[20];
	char theName[100];

	stellingText[0] = theItem[0] = theName[0] = 0;


	do_title("Storytelling Ouput for \"{SDI(Title)}\"");

	for (i=3; i<SP_ROWS; ++i) {
		if (i!=7 && i!=16 && i!=17 && i!=36 && i!=47 && i!=52 && i!=57 && i!=62 &&
				i!=67 && i!=72 && i!=73 && i!=84) {

				PT = new PText(fAppPFMFile, _OSType("APPR"), i, &theErr, kRdOnly);	// Grab APPR segment
from .pfm file
				assert(theErr != kNoSuchPFMSeg);
				PT->GetParam("VN", 'c', theItem);
				PT->GetParam("NM", 'c', theName);
				x = substituteStelling(theItem,stellingText);
				if (strlen(stellingText) > 1) {
					if (i==18) {
						do_title("The Objective Storyline:");
					} else if (i==58) {
						do_title("\nThe Subjective Storyline:");
					} else if (i==74) {
						do_title("\n{CNN(MC,NM)}'s Throughline:");
					} else if (i==85) {
						do_title("\n{CNN(OC,NM)}'s Throughline:");
					}
					sprintf(tmpStr,"• %s:  %s\n\n", theName, stellingText);
					fOutlineStr.CatStr(tmpStr);
				}
				delete PT;
		}
	}

} /* OutlineView::stelling_report */


/* -----------------------------------------------------------------------
	FUNCTION:		OutlineView::substituteStelling
	Purpose:		Get the substituted text for a specific storytelling item.
----------------------------------------------------------------------- */

bool_t OutlineView::substituteStelling(char *theItem, char *stellingText)
{
	byte_cnt theLen				= 0;
	SubText* SbTxt				= NULL;
	char tmpStr1[1000];
	char *cp;

	sprintf(tmpStr1,"{STF(%s)}", theItem);
	SbTxt = new SubText(fDoc, tmpStr1);
	assert (SbTxt);
	cp = SbTxt->DoSubstitution(&theLen);
	if (theLen>0) {
		strcpy(stellingText, cp);
		delete SbTxt;
		return(true);
	} else {
```

```
                stellingText[0] = 0;
                delete SbTxt;
                return(false);
        }
}



/* ------------------------------------------------------------------------
        FUNCTION:       OutlineView::buildVarQuad
        Purpose:        Build the string for the outline text of the story thumbnail
                                (one line) outline.
--------------------------------------------------------------------------- */

void OutlineView::buildVarQuad(SuperClass *theSC, AddrPtr varAddr)
{
        Unit *varUnit;
        short v;
        char tmpStr[1000];
        char tmpVal[10];
        hdl_t slHdl             = MM_ALLOC_INIT(1000, mm_no_flags, 0, "Temp Strings", NULL);
        char* sl                = (char*)MM_USE(slHdl);


        for (v=0; v<=3; ++v) {
                varAddr[VAR] = v+'1';
                varUnit = Addr2Item(theSC, varAddr);
                                                        /* get the pointer to the domain unit in
the first position in the SuperClass */
                sprintf(tmpVal,"%hd", varUnit->semVal);
                if (v==3)
                        fOutlineStr.CatStr("and ");
                sprintf(tmpStr,"{SNF(%hd)}", varUnit->semVal);
                fOutlineStr.CatStr(tmpStr);
                if (v!=3)
                        fOutlineStr.CatStr(", ");
        }

        MM_UNUSE(slHdl);
        MMFree(slHdl);
}


/* ------------------------------------------------------------------------
        OutlineView::vocabulary_list - prints an alphabetical vocabulary list
--------------------------------------------------------------------------- */
void OutlineView::vocabulary_list(void)
{
        SubText* SbTxt;
        fOutlineStr.Use();
        SbTxt = new SubText(fDoc, fOutlineStr.StrPtr());
        assert (SbTxt);

        SList* theList = new SList;
        SbTxt->TrackingOn(theList);
        byte_cnt theLen = fOutlineStr.StrLen();
        char* cp = SbTxt->DoSubstitution(&theLen);
        SbTxt->TrackingOff();
        fOutlineStr.Unuse();
        fOutlineStr.SetStr(cp);
        delete SbTxt;

        separator_line(30);                                                             // draw
separator between bottom of report and vocabulary list
        String* vocabStr = new String("\nVOCABULARY:\n\n", 26);
        for (ls_index whichSemVal = 0; whichSemVal < theList->Size(); ++whichSemVal) {
                char temp [100];
                short semVal = theList->Elem(whichSemVal);
                sprintf(temp, "{SNF(%hd)}:  {SDF(%hd)}\n\n", semVal, semVal);
                vocabStr->CatStr(temp);
        }
        delete theList;

        // Pass vocabulary thru SubText twice for good measure

        vocabStr->Use();
        SbTxt = new SubText(fDoc, vocabStr->StrPtr());
        assert (SbTxt);

        theLen = vocabStr->StrLen();
        cp = SbTxt->DoSubstitution(&theLen);
        vocabStr->Unuse();
        fOutlineStr.CatStr(cp);
        delete SbTxt;
        delete vocabStr;

} /* OutlineView::vocabulary_list */



/* ------------------------------------------------------------------------
        OutlineView::separator_line - prints a horizontal line of "______"
--------------------------------------------------------------------------- */
void OutlineView::separator_line(short howMany)
{
        short i;

        fOutlineStr.CatStr("\n");
        for (i = 1; i <= howMany; ++i)
                fOutlineStr.CatStr("_");
        fOutlineStr.CatStr("\n");

} /* OutlineView::separator_line */



/* ------------------------------------------------------------------------
        OutlineView::os_stelling_output - prints out objective story storytelling
--------------------------------------------------------------------------- */
void OutlineView::os_stelling_output(void)
{
```

```
		doubleSpace();
		do_title("Objective Story Storytelling for {SDI(Title)}.");
		doubleSpace();
		fOutlineStr.CatStr("\"{SNF(STDom)}\" as the Objective Story Domain:  {STF(STDom)}\n\n");
		fOutlineStr.CatStr("\"{SNF(STCon)}\" as the Objective Story Concern:  {STF(STCon)}\n\n");
		fOutlineStr.CatStr("\"{SNF(STRng)}\" as the Objective Story Range:  {STF(STRng)}\n\n");
		fOutlineStr.CatStr("\"{SNF(STPbm)}\" as the Objective Story Problem:  {STF(STPbm)}\n\n");
		fOutlineStr.CatStr("\"{SNF(STSol)}\" as the Objective Story Solution:  {STF(STSol)}\n\n");
		fOutlineStr.CatStr("\"{SNF(STFoc)}\" as the Objective Story Focus:  {STF(STFoc)}\n\n");
		fOutlineStr.CatStr("\"{SNF(STDir)}\" as the Objective Story Direction:  {STF(STDir)}\n\n");
		fOutlineStr.CatStr("\"{SNF(STUnRng)}\" as the Objective Story Catalyst:  {STF(STUnRng)}\n\n");
		fOutlineStr.CatStr("\"{SNF(STCrFl)}\" as the Objective Story Inhibitor:  {STF(STCrFl)}\n\n");
		fOutlineStr.CatStr("\"{SNF(STStp)}\" as the Objective Story Stipulation:  {STF(STStp)}\n\n");
		doubleSpace();

} /* OutlineView::os_stelling_output */


/* ------------------------------------------------------------------------
	OutlineView::more_os_stelling_output - prints out the additional
								objective story storytelling
------------------------------------------------------------------------ */
void OutlineView::more_os_stelling_output(void)
{
		doubleSpace();
		do_title("Additional Objective Story Storytelling for {SDI(Title)}.");
		doubleSpace();
		fOutlineStr.CatStr("\"{SNF(STGoal)}\" as the Objective Story Goal:  {STF(STGoal)}\n\n");
		fOutlineStr.CatStr("\"{SNF(PLGoal)}\" as the Objective Story Consequence:  {STF(PLGoal)}\n\n");
		fOutlineStr.CatStr("\"{SNF(OCGoal)}\" as the Objective Story Cost:  {STF(OCGoal)}\n\n");
		fOutlineStr.CatStr("\"{SNF(MCGoal)}\" as the Objective Story Dividend:  {STF(MCGoal)}\n\n");
		fOutlineStr.CatStr("\"{SNF(STReq)}\" as the Objective Story Requirement:  {STF(STReq)}\n\n");
		fOutlineStr.CatStr("\"{SNF(PLReq)}\" as the Objective Story Prerequisite:  {STF(PLReq)}\n\n");
		fOutlineStr.CatStr("\"{SNF(OCReq)}\" as the Objective Story Preconditions:  {STF(OCReq)}\n\n");
		fOutlineStr.CatStr("\"{SNF(MCReq)}\" as the Objective Story Forewarnings:  {STF(MCReq)}\n\n");
		doubleSpace();

} /* OutlineView::more_os_stelling_output */


/* ------------------------------------------------------------------------
	OutlineView::ss_stelling_output - prints out subjective story storytelling
------------------------------------------------------------------------ */
void OutlineView::ss_stelling_output(void)
{
		doubleSpace();
		do_title("Subjective Story Storytelling for {SDI(Title)}.");
		doubleSpace();
		fOutlineStr.CatStr("\"{SNF(PLDom)}\" as the Subjective Story Domain:  {STF(PLDom)}\n\n");
		fOutlineStr.CatStr("\"{SNF(PLCon)}\" as the Subjective Story Concern:  {STF(PLCon)}\n\n");
		fOutlineStr.CatStr("\"{SNF(PLRng)}\" as the Subjective Story Range:  {STF(PLRng)}\n\n");
		fOutlineStr.CatStr("\"{SNF(PLPbm)}\" as the Subjective Story Problem:  {STF(PLPbm)}\n\n");
		fOutlineStr.CatStr("\"{SNF(PLSol)}\" as the Subjective Story Solution:  {STF(PLSol)}\n\n");
		fOutlineStr.CatStr("\"{SNF(PLFoc)}\" as the Subjective Story Focus:  {STF(PLFoc)}\n\n");
		fOutlineStr.CatStr("\"{SNF(PLDir)}\" as the Subjective Story Direction:  {STF(PLDir)}\n\n");
		fOutlineStr.CatStr("\"{SNF(PLUnRng)}\" as the Subjective Story Catalyst:  {STF(PLUnRng)}\n\n");
		fOutlineStr.CatStr("\"{SNF(PLCrFl)}\" as the Subjective Story Inhibitor:  {STF(PLCrFl)}\n\n");
		fOutlineStr.CatStr("\"{SNF(PLStp)}\" as the Subjective Story Stipulation:  {STF(PLStp)}\n\n");
		doubleSpace();

} /* OutlineView::ss_stelling_output */


/* ------------------------------------------------------------------------
	OutlineView::mc_stelling_output - prints out main character storytelling
------------------------------------------------------------------------ */
void OutlineView::mc_stelling_output(void)
{
		doubleSpace();
		do_title("Main Character Storytelling for {SDI(Title)}.");
		doubleSpace();
		fOutlineStr.CatStr("\"{SNF(MCDom)}\" as the Main Character Domain:  {STF(MCDom)}\n\n");
		fOutlineStr.CatStr("\"{SNF(MCCon)}\" as the Main Character Concern:  {STF(MCCon)}\n\n");
		fOutlineStr.CatStr("\"{SNF(MCRng)}\" as the Main Character Range:  {STF(MCRng)}\n\n");
		fOutlineStr.CatStr("\"{SNF(MCPbm)}\" as the Main Character Problem:  {STF(MCPbm)}\n\n");
		fOutlineStr.CatStr("\"{SNF(MCSol)}\" as the Main Character Solution:  {STF(MCSol)}\n\n");
		fOutlineStr.CatStr("\"{SNF(MCFoc)}\" as the Main Character Focus:  {STF(MCFoc)}\n\n");
		fOutlineStr.CatStr("\"{SNF(MCDir)}\" as the Main Character Direction:  {STF(MCDir)}\n\n");
		fOutlineStr.CatStr("\"{SNF(MCUnRng)}\" as the Main Character Unique Ability:  {STF(MCUnRng)}\n\n");
		fOutlineStr.CatStr("\"{SNF(MCCrFl)}\" as the Main Character Critical Flaw:  {STF(MCCrFl)}\n\n");
		fOutlineStr.CatStr("\"{SNF(MCStp)}\" as the Main Character Stipulation:  {STF(MCStp)}\n\n");
		doubleSpace();

} /* OutlineView::mc_stelling_output */


/* ------------------------------------------------------------------------
	OutlineView::oc_stelling_output - prints out obstacle character storytelling
------------------------------------------------------------------------ */
void OutlineView::oc_stelling_output(void)
{
		doubleSpace();
		do_title("Obstacle Character Storytelling for {SDI(Title)}.");
		doubleSpace();
		fOutlineStr.CatStr("\"{SNF(OCDom)}\" as the Obstacle Character Domain:  {STF(OCDom)}\n\n");
		fOutlineStr.CatStr("\"{SNF(OCCon)}\" as the Obstacle Character Concern:  {STF(OCCon)}\n\n");
		fOutlineStr.CatStr("\"{SNF(OCRng)}\" as the Obstacle Character Range:  {STF(OCRng)}\n\n");
		fOutlineStr.CatStr("\"{SNF(OCPbm)}\" as the Obstacle Character Problem:  {STF(OCPbm)}\n\n");
		fOutlineStr.CatStr("\"{SNF(OCSol)}\" as the Obstacle Character Solution:  {STF(OCSol)}\n\n");
		fOutlineStr.CatStr("\"{SNF(OCFoc)}\" as the Obstacle Character Focus:  {STF(OCFoc)}\n\n");
		fOutlineStr.CatStr("\"{SNF(OCDir)}\" as the Obstacle Character Direction:  {STF(OCDir)}\n\n");
		fOutlineStr.CatStr("\"{SNF(OCUnRng)}\" as the Obstacle Character Unique Ability:  {STF(OCUnRng)}\n\n");
		fOutlineStr.CatStr("\"{SNF(OCCrFl)}\" as the Obstacle Character Critical Flaw:  {STF(OCCrFl)}\n\n");
		fOutlineStr.CatStr("\"{SNF(OCStp)}\" as the Obstacle Character Stipulation:  {STF(OCStp)}\n\n");
		doubleSpace();

} /* OutlineView::oc_stelling_output */
```

```
/* -----------------------------------------------------------------------
        OutlineView::charDyn_stelling_output - prints out character dynamics
                                                                    story storytelling
------------------------------------------------------------------------- */
void OutlineView::charDyn_stelling_output(void)
{
                doubleSpace();
                do_title("Character Dynamics Storytelling for {SDI(Title)}.");
                doubleSpace();
                fOutlineStr.CatStr("\"{SNF(Resolve)}\" as {CNN(MC,NM)}'s Resolve:  {STF(Resolve)}\n\n");
                fOutlineStr.CatStr("\"{SNF(Direction)}\" as {CNN(MC,NM)}'s Direction:  {STF(Direction)}\n\n");
                fOutlineStr.CatStr("\"{SNF(Approach)}\" as {CNN(MC,NM)}'s Approach:  {STF(Approach)}\n\n");
                fOutlineStr.CatStr("\"{SNF(Sex)}\" as {CNN(MC,NM)}'s Mental Sex:  {STF(Sex)}\n\n");
                doubleSpace();

} /* OutlineView::charDyn_stelling_output */


/* -----------------------------------------------------------------------
        OutlineView::plotDyn_stelling_output - prints out plot dynamics
                                                                    story storytelling
------------------------------------------------------------------------- */
void OutlineView::plotDyn_stelling_output(void)
{
                doubleSpace();
                do_title("Plot Dynamics Storytelling for {SDI(Title)}.");
                doubleSpace();
                fOutlineStr.CatStr("\"{SNF(Work)}\" as the instigating form of Work:  {STF(Work)}\n\n");
                fOutlineStr.CatStr("\"{SNF(Limit)}\" as the story's Limit:  {STF(Limit)}\n\n");
                fOutlineStr.CatStr("\"{SNF(Outcome)}\" as the story's Outcome:  {STF(Outcome)}\n\n");
                fOutlineStr.CatStr("\"{SNF(Judgment)}\" as the author's Judgment:  {STF(Judgment)}\n\n");
                doubleSpace();

} /* OutlineView::plotDyn_stelling_output */


/* -----------------------------------------------------------------------
        OutlineView::Resize -
------------------------------------------------------------------------- */
void OutlineView::Resize(void *pNewSize, TObject *pSender)
{
//      TView::Resize(pNewSize, pSender);
        GLRect myBounds;
        GetParentWindow()->GetPortRect(&myBounds);
        myBounds.top      = fExtent.top;
        myBounds.left     = fExtent.left;
        myBounds.bottom   -=16;
        SetBounds(&myBounds);

        init_outline_data();
        DocumentResize();
} /* OutlineView::Resize */


/* -----------------------------------------------------------------------
        OutlineView::SetTextFontSpec - changes the font of our report view.
------------------------------------------------------------------------- */
void OutlineView::SetTextFontSpec(gl_font_t *pFont, short *pSize, gl_face_t *pFace)
{
        fFont = *pFont;
        fFontSize = *pSize;
        fFace = *pFace;

        init_outline_data();
        DocumentResize();
        Inval();

} /* OutlineView::SetTextFontSpec */


/* -----------------------------------------------------------------------
        OutlineView::Print - prints the contents of the OutlineView.
------------------------------------------------------------------------- */
err_t OutlineView::PrintView(Printing *pPrintMgr)
{
        SetPrinting(true);
        LgPoint offset;
        offset.x = 0;                                           // print in an unscrolled position.
        offset.y = 0;
        Rgn updateRgn;
        VwPaneUpdateInfo updateInfo(pPrintMgr->GetPrinterEnv()->InqEnvRef(), offset, updateRgn);
        draw_view(updateInfo);
        SetPrinting(false);

        return NOERR;

} /* OutlineView::PrintView */

#pragma segment main


/* xxxxxxxxxxxxxxxxxxxxxxxxxxxxxxxxxxxxxxxxxxxxxxxxxxxxxxxxxxxxxxxxxxxxxxx
 * $Log:          outline.cc,v $
Revision 1.39  93/09/24  15:31:54  stephen
Cleaned up warnings.

Revision 1.38  93/09/02  14:13:25  chris
Cleanup

Revision 1.37  93/06/23  17:15:48  chris
Clean up.

Revision 1.36  93/06/21  10:39:49  chris
Added printout of story points.

Revision 1.35  93/06/10  14:51:19  chris
Added character names, though commented out, in scene level.

Revision 1.34  93/06/05  01:17:16  chris
```

```
Added characteristic printing plus misc. cleanup.

Revision 1.33  93/06/04  19:18:03  chris
Clean up.

Revision 1.32  93/06/04  15:52:02  chris
Fixed bug display   function.

Revision 1.31  93/06/04  14:46:09  chris
Added storytelling only output.

Revision 1.30  93/06/03  23:20:01  chris
Added ShowBiz text function and storytelling text function.

Revision 1.29  93/06/02  21:46:22  chris
began building in conditional definitions.

Revision 1.28  93/06/02  16:09:12  chris
Clean up.

Revision 1.27  93/06/01  09:28:00  chris
Added the story title to the outline text.

Revision 1.26  93/05/30  18:20:45  chris
Clean up.

Revision 1.25  93/05/30  16:27:59  chris
Clean up.

Revision 1.24  93/05/29  17:28:11  chris
Clean up.

Revision 1.23  93/05/28  23:12:19  chris
Added beginning of character scene stuff.

Revision 1.22  93/05/28  15:47:25  chris
Made changes to CoolFrameRect calls to accomodate changes in function.

Revision 1.21  93/05/27  16:34:48  stephen
Get SuperClass* from Document class...

Revision 1.20  93/05/26  19:46:52  stephen
Windows fixes.

Revision 1.19  93/05/26  17:32:18  chris
Added three view mode and finished version 1 of sequence view.

Revision 1.18  93/05/25  22:28:20  chris
Cleaned up the draw functions and added early version of sequence stuff.

Revision 1.17  93/05/25  18:41:15  stephen
Made outline print.

Revision 1.16  93/05/25  15:11:06  stephen
Worked on several allocation problems w/Chris

Revision 1.15  93/05/24  21:03:55  chris
Added lots more act order stuff.

Revision 1.14  93/05/22  19:34:17  stephen
Better IsValid() testing...

Revision 1.13  93/05/21  21:05:39  chris
Cosmetic work in the ruler area including CoolFrameRect().

Revision 1.12  93/05/21  18:23:24  chris
Misc. cleanup.


Revision 1.11  93/05/21  15:22:57  chris
Adding more act material to outline text.

Revision 1.10  93/05/20  17:39:32  chris
Added beginnings of outline thumbnail sketch.

Revision 1.9  93/05/18  20:35:11  chris
More outline text corrections.

Revision 1.8  93/05/18  18:14:33  chris
Further outline text cleanup.

Revision 1.7  93/05/18  15:00:38  chris
Outline text refinement.

Revision 1.6  93/05/13  15:39:35  chris
Added some new text to the outline stuff.

Revision 1.5  93/05/12  21:04:14  stephen
Initial work to get printing to happen for outline view.

Revision 1.4  93/05/12  17:59:34  chris
Implemented story text.

Revision 1.3  93/05/10  16:53:33  stephen
Minor changes in prep for Chris' big changes.

Revision 1.2  93/05/06  11:00:14  stephen
Added SubText class

Revision 1.1  93/05/04  21:32:24  stephen
Initial revision

 */
```

```
/* -----------------------------------------------------------------------
	OUTLINE.H
	Outline view class
	Copyright (C) 1993 Screenplay Systems Inc.
	Revised:		$Id$
------------------------------------------------------------------------ */

#pragma once

#ifndef __OUTLINE__
#define __OUTLINE__

#include "ItemList.h"
#include "tview.h"
#include "tcommand.h"
#include "consts.h"
#include "apprec.h"
#include "semtable.h"
#include "textwrap.h"

#pragma segment outline

#define		O_ICONS		7				// number of custom icon/buttons in ruler
#define		O_ITOP		8				// Position of icon tops in ruler
#define		O_ISZ		24				// Icon Size of icons in ruler
#define		O_IOFF		220				// Offset from left of icons in ruler

const short		kMC		= 0;			// Main Character used for replacement text
const short		kOC		= 1;			// Obstacle Character used for replacement text

class RepWindow;

/* -----------------------------------------------------------------------
	OutlineView - Dramatica's Outline Window view class.
------------------------------------------------------------------------ */
class OutlineView : public TView {
public:
	// CONSTRUCTION/DESTRUCTION
	OutlineView(ItemList* pParent, vw_flags vflags = kNoFlags, const GLRect *extent = NULL, it_flags iflags =
List::kNoFlags, const GLColor *color = &kGLBlackClr);
	~OutlineView(void);

	// PUBLIC UTILITIES
	virtual char*	ClassName(void) const	{ return "OutlineView"; }
	virtual class_t	ClassType(void) const	{ return kOLView; }
	virtual bool_t	IsOfType(const void *pType) const { return *(class_t*) pType == kOLView ||
TView::IsOfType(pType); }
	virtual TObject* Duplicate(void) const	{ return new OutlineView(*this); }
//	virtual bool_t	DoItemHit(EVENT_REC *pEvt, GLPoint mPt);
//	virtual bool_t	DoKeyDown(EVENT_REC *pEvt);

			void	ExportReport(void);

	// ACTION PROCS

	// PUBLIC BEHAVIOR
	void			init_outline_data(void);
	void			destruct_outline_data(void);
	virtual void	draw_view(const VwPaneUpdateInfo& updateInfo);
	virtual err_t	PrintView(Printing *pPrintMgr);
	virtual void	Resize(void *pNewSize, TObject *pSender);
	virtual void	Frame(void *env, TObject *pSender = NULL) {}		// TItem:: function.  Overriden here to
prevent framing of view
	virtual long	GetNumVLines(void)	{ return (long)((fOutlineTW) ? fOutlineTW->GetLines() : 0); }
	void			SetPrinting(bool_t AmIPrinting)			{ fPrinting = AmIPrinting; }
	void			ClearView(void)							{
fOutlineStr.SetAllocSize(0); }

	void			SetTutorialBtn(bool_t displayTutorial)			{ fDisplayTutorial =
displayTutorial;}
	bool_t			GetTutorialBtn(void)							{
return fDisplayTutorial; }

	void			SetStorytellingBtn(bool_t displayStorytelling)	{ fDisplayStorytelling =
displayStorytelling;}
	bool_t			GetStorytellingBtn(void)						{ return
fDisplayStorytelling; }

	void			GetTextFontSpec(gl_font_t *pFont, short *pSize, gl_face_t *pFace)	{ *pFont =
fFont; *pSize = fFontSize; *pFace = fFace; }
	void			SetTextFontSpec(gl_font_t *pFont, short *pSize, gl_face_t *pFace);

	//		FORMATTING SHORTCUTS

	void			bold_on(void);
	void			bold_off(void);
	void			underline_on(void);
	void			underline_off(void);
	void			doubleSpace();
	bool_t			apropos_STF(char* STFChoice, char* textIfNoST, bool_t interrupted);
	void			do_title(char* theTitle);

	// PUBLIC REPORT FUNCTIONS (called via repwind.cc)

	void		oc_character_report(void);
	void		oc_theme_report(void);
	void		os_theme_report(void);
	void		ss_theme_report(void);
	void		mc_theme_report(void);
	void		mc_character_report(void);
	void		mc_basics_report(void);
	void		os_plot_report(void);
	void		os_dynamics_report(void);
	void		plot_sequence_report(void);
	void		summary_report(void);
	void		storytbl_report(void);
	void		ss_character_report(void);
	void		os_character_report(void);
	void		stelling_report(void);

	void		STGoal_STReq_report(void);
	void		STGoal_PLGoal_report(void);
	void		OCGoal_MCGoal_report(void);
```

```
        void            STReq_PLReq_report(void);
        void            PLReq_OCReq_report(void);
        void            PLGoal_MCReq_report(void);

        void            STDom_PLDom_report(void);
        void            STCon_STStp_report(void);
        void            STUnRng_STCrFl_report(void);
        void            PLCon_PLStp_report(void);
        void            PLUnRng_PLCrFl_report(void);

        void            STRng_STRng2_report(void);
        void            PLRng_PLRng2_report(void);
        void            MCRng_MCRng2_report(void);
        void            OCRng_OCRng2_report(void);

        void            STPbm_STSol_report(void);
        void            STPbm_STFoc_report(void);
        void            STFoc_STDir_report(void);

        void            PLPbm_PLSol_report(void);
        void            PLPbm_PLFoc_report(void);
        void            PLFoc_PLDir_report(void);

        void            MCDom_OCDom_report(void);
        void            MCPbm_MCSol_report(void);
        void            MCPbm_MCFoc_report(void);
        void            MCFoc_MCDir_report(void);
        void            OCPbm_OCSol_report(void);
        void            OCPbm_OCFoc_report(void);
        void            OCFoc_OCDir_report(void);

        void            MCUnRng_MCCrFl_report(void);
        void            OCUnRng_OCCrFl_report(void);
        void            MCCon_MCStp_report(void);
        void            OCCon_OCStp_report(void);

        void            Work_Approach_report(void);
        void            Limit_Sex_report(void);
        void            Direction_Judgment_report(void);
        void            Resolve_Outcome_report(void);
        void            All_Dynamics_report(void);

        void            intro_report(void);

        void            Overview_apprec_report(void);
        void            Essential_ques_report(void);
        void            STDom_to_MCPbm_report(void);
        void            Resolve_to_Sex__report(void);
        void            Work_to_Judgment__report(void);

        void            misc_os_reports(void);

        void            basic_plot_dramatics(void);
        void            basic_mc_dramatics(void);
        void            basic_oc_dramatics(void);
        void            basic_thematics_dramatics(void);
        void            basic_objchar_dramatics(void);
        void            basic_subjchar_dramatics(void);

        void            vocabulary_list(void);

protected:
        Dramatica*      fApp;
        DRDoc*          fDoc;
        DRDoc*          theDoc;                 // This is a duplicate of fDoc, so appreciation macros will work!
        RepWindow*      fWindow;
        pfm_fd_t        fAppPFMFile;
        PText*          fResponses;
        PText*          fStellingPT;

        String          fOutlineStr;    // Text for the outline window that we are building
        TextWrap*       fOutlineTW;             // Ptr to our pre-wrapped outline text
        bool_t          fInitedView;    // TRUE if we have inited our view

        bool_t          fPrinting;              // TRUE if the view is being used for printing!
        Printing*       fpPrintMgr;             // Ptr to printing manager class

        gl_font_t       fFont;                  // Font for this window
        short           fFontSize;              // Size of font
        gl_face_t       fFace;                  // Face of font

        short           semDspStyle;    // 1 = semantic name; 2 = semantic definition; 3 = verb form of semantic

        short           fIconFlag[O_ICONS];             // flags for "icons" -- the custom pushbuttons
        GLRect          fIconRect[O_ICONS];             // rects for "icons" -- the custom pushbuttons

        bool_t          fDisplayTutorial;               // set to true to when user presses "Tutorial" button
        bool_t          fDisplayStorytelling;   // set to true to when user presses "storytelling" button

        short           fCharacteristicTbl[64];         // a table indicating which character is assigned to each
trait

        // LOCAL UTILITIES

        void            list_characteristics(void);
        bool_t          substituteStelling(char *theItem, char *stellingText);
        void            buildTypeVars(short whichLine);
        void            buildVarQuad(SuperClass *theSC, AddrPtr varAddr);
        void            separator_line(short howMany);
        void            os_stelling_output(void);
        void            more_os_stelling_output(void);
        void            ss_stelling_output(void);
        void            mc_stelling_output(void);
        void            oc_stelling_output(void);
        void            charDyn_stelling_output(void);
        void            plotDyn_stelling_output(void);

}; /* OutlineView */


#pragma segment main
```

```
/* xxxxxxxxxxxxxxxxxxxxxxxxxxxxxxxxxxxxxxxxxxxxxxxxxxxxxxxxxxxxxxxxxxxxxx
 *  $Log:        outline.h,v $
 * Revision 1.21  93/06/21  10:40:13  chris
 * Added printout of story points.
 *
 * Revision 1.20  93/06/10  14:52:43  chris
 * Added character names, though commented out, in scene level.
 *
 * Revision 1.19  93/06/05  01:34:59  chris
 * Added list characteristics function.
 *
 * Revision 1.18  93/06/04  14:46:29  chris
 * Added storytelling only output.
 *
 * Revision 1.17  93/06/03  23:20:51  chris
 * Added ShowBiz text function and storytelling text function.
 *
 * Revision 1.16  93/05/29  17:28:58  chris
 * Clean up.
 *
 * Revision 1.15  93/05/28  23:12:54  chris
 * Added beginning of character scene stuff.
 *
 * Revision 1.14  93/05/28  15:47:32  chris
 * Made changes to CoolFrameRect calls to accomodate changes in function.
 *
 * Revision 1.13  93/05/26  19:46:58  stephen
 * Windows fixes.
 *
 * Revision 1.12  93/05/26  17:32:50  chris
 * Added three view mode and finished version 1 of sequence view.
 *
 * Revision 1.11  93/05/25  22:29:00  chris
 * Cleaned up the draw functions and added early version of sequence stuff.
 *
 * Revision 1.10  93/05/25  18:41:27  stephen
 * Made outline print.
 *
 * Revision 1.9  93/05/25  15:11:29  stephen
 * Worked on several allocation problems w/Chris
 *
 * Revision 1.8  93/05/24  21:04:25  chris
 * Added lots more act order stuff.
 *
 * Revision 1.7  93/05/21  21:06:14  chris
 * Cosmetic work in the ruler area including CoolFrameRect().
 *
 * Revision 1.6  93/05/21  18:23:43  chris
 * Misc. cleanup.
 *
 *
 * Revision 1.5  93/05/21  15:23:15  chris
 * Adding more act material to outline text.
 *
 * Revision 1.4  93/05/12  21:04:36  stephen
 * Initial work to get printing to happen for outline view.
 *
 * Revision 1.3  93/05/12  18:01:15  chris
 * Implemented story text.
 *
 * Revision 1.2  93/05/06  11:00:20  stephen
 * Added SubText class
 *
 * Revision 1.1  93/05/04  21:32:36  stephen
 * Initial revision
 *
 */

#endif /* __OUTLINE__ */
```

```
/* -----------------------------------------------------------------------
        PNOUNS.R
        Dramatica's Personal Pronoun Text
        Copyright (C) 1993 Screenplay Systems Inc.
        $Id: pnouns.r,v 1.4 93/05/26 19:47:01 stephen Exp Locker: stephen $
------------------------------------------------------------------------ */

#ifdef macintosh
        #include "systypes.r"
        #include "types.r"
#else
        #include <systypes.r>
        #include <types.r>
#endif


/* -----------------------------------------------------------------------
        'PPN' - Conjugations for personal pronouns.
------------------------------------------------------------------------ */
type 'PPNN' {
        cstring;                /* the personal pronoun text */
};

/* -----------------------------------------------------------------------
        Actual PPN segment which contains all the values, which are organize:

                form                    person                  gender
                ==================================================
                S  singular             1  1rst person          0  male
                P  plural               2  2nd person           1  female
                                        3  3rd person           2  neuter

        Followed by:

            key         type    value
          ===================================
                NC:     c               Nominative Case (I, we, you, you, he/she/it, they)
                P1:     c               Possessive Case 1 (my, our, your, your, his/her/its, their)
                P2:     c               Possessive Case 2 (mine, ours, yours, yours, his/hers/its, theirs)
                OC:     c               Objective Case (me, us, you, you, him/her/it, them)
                IR:     c               Intensive/Reflexive Case (myself, ourselves, yourself, yourselves,
himself/herslef/itself, themselves)

        Segment text takes the form: <slash><key><type><colon><value><slash>
        <slash> must be entered as a double-backslash "\\".

------------------------------------------------------------------------ */

resource 'PPNN' (1, PFM_MIN_PRIO) {

/*  First Person Singular  */

    "\\S12NCc:I"                        /* Nominative Case */
    "\\S12P1c:my"                       /* Possessive Case 1 */
    "\\S12P2c:mine"                     /* Possessive Case 2 */
    "\\S12OCc:me"                       /* Objective Case */
    "\\S12IRc:myself"                   /* Intensive/Reflexive Case */

/*  First Person Plural  */

    "\\P12NCc:we"                       /* Nominative Case */
    "\\P12P1c:our"                      /* Possessive Case 1 */
    "\\P12P2c:ours"                     /* Possessive Case 2 */
    "\\P12OCc:us"                       /* Objective Case */
    "\\P12IRc:ourselves"                /* Intensive/Reflexive Case */

/*  Second Person Singular  */

    "\\S22NCc:you"                      /* Nominative Case */
    "\\S22P1c:your"                     /* Possessive Case 1 */
    "\\S22P2c:yours"                    /* Possessive Case 2 */
    "\\S22OCc:you"                      /* Objective Case */
    "\\S22IRc:yourself"                 /* Intensive/Reflexive Case */

/*  Second Person Plural  */

    "\\P22NCc:you"                      /* Nominative Case */
    "\\P22P1c:your"                     /* Possessive Case 1 */
    "\\P22P2c:yours"                    /* Possessive Case 2 */
    "\\P22OCc:you"                      /* Objective Case */
    "\\P22IRc:yourselves"               /* Intensive/Reflexive Case */

/*  Third Person Singular Female  */

    "\\S31NCc:she"                      /* Nominative Case */
    "\\S31P1c:her"                      /* Possessive Case 1 */
    "\\S31P2c:hers"                     /* Possessive Case 2 */
    "\\S31OCc:her"                      /* Objective Case */
    "\\S31IRc:herself"                  /* Intensive/Reflexive Case */

/*  Third Person Singular Male  */

    "\\S30NCc:he"                       /* Nominative Case */
    "\\S30P1c:his"                      /* Possessive Case 1 */
    "\\S30P2c:his"                      /* Possessive Case 2 */
    "\\S30OCc:him"                      /* Objective Case */
    "\\S30IRc:himself"                  /* Intensive/Reflexive Case */

/*  Third Person Singular Neuter  */

    "\\S32NCc:it"                       /* Nominative Case */
    "\\S32P1c:its"                      /* Possessive Case 1 */
    "\\S32P2c:its"                      /* Possessive Case 2 */
    "\\S32OCc:it"                       /* Objective Case */
    "\\S32IRc:itself"                   /* Intensive/Reflexive Case */

/*  Third Person Plural  */

    "\\P32NCc:they"                     /* Nominative Case */
    "\\P32P1c:their"                    /* Possessive Case 1 */
    "\\P32P2c:theirs"                   /* Possessive Case 2 */
    "\\P32OCc:them"                     /* Objective Case */
```

```
    "\\P32IRc:themselves"                              /* Intensive/Reflexive Case */
        "\\"
};


/* $Log:           pnouns.r,v $
# Revision 1.4  93/05/26  19:47:01  stephen
# Windows fixes.
#
# Revision 1.3  93/05/20  17:21:34  stephen
# Changed gender of personal pronouns from 'M' to 0 (char to short).
#
# Revision 1.2  93/05/10  16:56:20  stephen
# Complete rewrite of PText structure.  Now pnouns.r is all in
# one file.
#
# Revision 1.1  93/04/23  16:38:04  chris
# Initial revision
#
 */
```

```
/*************************************************************************
	PTEXT.CC
	Parameterized Text Management
	(c) 1993 Screenplay Systems
	Author:		S. Greenfield
	Created:	March 27, 1993
	Revised:	$Id: ptext.cc,v 1.15 93/06/04 19:56:15 stephen Exp Locker: stephen $
*************************************************************************/


#include <CType.h>
#include "genutls.h"
#include "memmgr.h"
#include "pfm.h"
#include "ptext.h"

#pragma segment ptext


static int nParam;					// used for directory dump
const char *	PT_UNDEFINED			= "(no such param)";


/* -----------------------------------------------------------------------
	FUNCTION:		PText::PText - default constructor
	Purpose:		Get a PTEXT segment from the PFM.  The PTEXT is then
				scaned, and dictionaries of the segment are produced.
	Accepts:		PFMType: seg_type_t which is the name of the type.
				PFMID: ID of PFM segment.
------------------------------------------------------------------------ */
PText::PText(pfm_fd_t PFMFile, seg_type_t PFMType, seg_id_t PFMID, pt_err* theErr, bool_t rdOnly)
     : fDictionary (sizeof(PTKeyRec), 10 * sizeof(PTKeyRec)),
		fDataPool (0U),
		fUserSuppliedMem (false),
		fPFMType (PFMType),
		fPFMID (PFMID),
		fRdOnly (rdOnly),
		fParamCount (0),
		fSaveThisSeg (false),
		fDeleteThisSeg (false),
		fAnyChanges (false),
		fLengthThresh (99)
{
	pfm_fd_t currentFile;
	if (PFMFile) {
		fPFMFile = PFMFile;
		currentFile = PFMSetCurrentFile(fPFMFile);
	}

	fSegmentHdl = (hdl_t) PFMCheckoutSeg(fPFMType, fPFMID);

	if (fSegmentHdl != PFM_NO_SEG) {
		assert(fRdOnly || (!fRdOnly && PFMGetSegRefCount(fPFMType, fPFMID) == 1));
		fPFMSegInFile = true;
		*theErr = scan_segment();
	} else {
		fPFMSegInFile = false;
		*theErr = kNoSuchPFMSeg;
		fSegmentHdl = NULL;
	}

	if (PFMFile)
		PFMSetCurrentFile(currentFile);

}	/* PText::PText */



/* -----------------------------------------------------------------------
	FUNCTION:		PText::PText - secondary constructor
	Purpose:		Take the PText supplied by the user via a chunk of memory.
				The PTEXT is then scaned, and dictionaries of the segment
				are produced.
	Accepts:		PFMType: seg_type_t which is the name of the type.
				memPtr -- chunk of memory containing PTEXT to interpret
------------------------------------------------------------------------ */
PText::PText(seg_type_t PFMType,  hdl_t memHdl,  pt_err* theErr, bool_t rdOnly)
     : fDictionary(sizeof(PTKeyRec), 10 * sizeof(PTKeyRec)),
		fDataPool(0U),
		fSegmentHdl(memHdl),
		fUserSuppliedMem(true),
		fPFMFile(0),
		fPFMType(0U),
		fPFMID(0),
		fRdOnly (rdOnly),
		fPFMSegInFile(false),
		fParamCount(0),
		fSaveThisSeg(false),
		fAnyChanges(false),
		fDeleteThisSeg(false),
		fLengthThresh (99)
{
	*theErr = scan_segment();

}	/* PText::PText */


/* -----------------------------------------------------------------------
	FUNCTION:		PText::~PText - destructor
	Purpose:		Frees up lists & data.
------------------------------------------------------------------------ */
PText::~PText(void)
{
	err_t theErr;

	if (fPFMFile) {
		pfm_fd_t  currentFile = PFMSetCurrentFile(fPFMFile);

		if (fSegmentHdl) {						// If handle is
asleep, segment is already checked-in
			theErr = PFMCheckinSeg(fSegmentHdl);
			assert(theErr == noerr);
		}
```

```
                if (fDeleteThisSeg) {
                        theErr = PFMRemoveSeg(fPFMType, fPFMID);
                        assert((theErr == true) || ((theErr == false) && !fPFMSegInFile));
                }
                PFMSetCurrentFile(currentFile);
        }

}       /* PText::~PText */


/* ------------------------------------------------------------------------
        FUNCTION:       PText::set_param
        Purpose:        Set/Create a param in the PTEXT.
        Accepts:        paramKey: textual key for desired data.
                                theData: void * which points to the data to store.
        Returns:        pt_err: FALSE, no error;  positive, error.
        NOTE:           Local function is called by inlined overloaded functions!
------------------------------------------------------------------------ */
pl_id PText::set_param(ptm_key_t paramKey, ls_index paramPos, short type, void* theData)
{
        PTKeyRec        keyRec;
        ls_index        listPos;

        assert(fRdOnly == false);                                       // Can't call set_param if seg is Read
Only!

        if (paramKey)
                listPos = GetKeyRec(paramKey, &keyRec);                 // Call by <key>
        else
                listPos = GetPosRec(paramPos, &keyRec);                 // Call by <pos>

        if (listPos == kLsNotFound) {                                   // Param not found -- so create it!
                keyRec.fcStart = 0;
                keyRec.fcEnd = 0;
                keyRec.type = type;
                keyRec.sizeInSeg = 0;
                keyRec.fcData = 0;
                keyRec.flags = kPTNewKey | kPTModified;
                fAnyChanges = true;
                if (fDeleteThisSeg)                                                     // User has requested
to delete the seg, but then added data!
                        fDeleteThisSeg = false;                                 // Guess this means don't
delete the seg?
                size_t theSize = Type2Size(type, theData);
                assert(theSize != kNoSuchType);
                if (type =='c' && theSize <= fLengthThresh && strchr((char*)theData, '\\'))
                        keyRec.flags |= kPTHasSlash;


                keyRec.curSize = theSize;
                keyRec.dataID = fDataPool.AddData(theData, theSize);
                fDictionary.Merge(&keyRec, &CompPtextKeyAsc);

                ++fParamCount;
                return (keyRec.dataID);
        }

//      Param exists -- so update it!

        if (keyRec.type != type)                                        // User confused about <type>?
                return (kTypeMismatch);

        keyRec.curSize = Type2Size(type, theData);

        if (keyRec.dataID != kPlNoElem) {                               // If Pool data already allocated, we must update
what's there
                err_t theErr = fDataPool.UpdateData(keyRec.dataID, theData, keyRec.curSize);
                assert(theErr == noerr);
        } else {
                keyRec.dataID = fDataPool.AddData(theData, keyRec.curSize);
                assert(keyRec.dataID >= 0);
        }

        keyRec.flags |= kPTModified;
        fAnyChanges = true;
        fDictionary.SetElem(&keyRec, listPos);                          // save our changes
        fDictionary.ForceSorted();                                                      // must do this 'cause SetElem
causes the kSorted flag to become unset

        return (keyRec.dataID);
}


/* ------------------------------------------------------------------------
        FUNCTION:       PText::get_param
        Purpose:        Get a param from the PTEXT.
        Accepts:        paramKey: textual key for desired data.
                                theType: single char which defines <type> of data (i.e 'c')
                                destBuf: void * which will point to the destination buffer
                                  where PTM will stuff data.  (NULL ptr for no transfer).
        Returns:        a pl_id (Pool ID) to the data.
                                NULL if no data exists for this key.
        NOTE:           The pool is unlocked while getting a param for the first
                                time.  This means any pointers selected by the user might
                                have moved around.  Call pID2Ptr() to convert the pool_id
                                to a pointer.
                                Local function is called by inlined overloaded functions!
------------------------------------------------------------------------ */
pl_id PText::get_param(ptm_key_t paramKey, ls_index paramPos, short theType, void* destBuf)
{
        PTKeyRec        keyRec;
        ls_index        listPos;

        if (paramKey)
                listPos = GetKeyRec(paramKey, &keyRec);                 // Call by <key>
        else
                listPos = GetPosRec(paramPos, &keyRec);                 // Call by <pos>

        if (listPos == kLsNotFound)
                return (kParamNotFound);                                                // Param Not Found!
```

```
        if (keyRec.dataID != kPlNoElem) {                                    // Already got data once before!
                if (destBuf)
                        fDataPool.GetData(destBuf, keyRec.dataID);   // Copy data right now into user's ptr
                assert(theType == keyRec.type);                                  // User MUST specify type
correctly!
                return (keyRec.dataID);                                                   // And return a ptr to
the data
        }

//      Need to get data for this paramKey for the very first time.  So we must store
//      it in the Pool.

        size_t  theSize;
        void*   theData;
        pt_err  theErr = AddParamData2Pool(&keyRec, &theSize, &theData);
        if (theErr)
                return (theErr);

        //      For char data, this next step is needed to insure that a NULL byte is tacked
        //      onto the end of the string in the pool.  This is done because there were
        //      originaly no NULLs at the end of the params in the PText segment.

        if (keyRec.type == 'c') {
                fDataPool.Use();
                char* dataPtr = (char*)PID2Ptr(keyRec.dataID);
                dataPtr[keyRec.sizeInSeg-1] = 0;                             // ugly, but necessary to tack on the
null byte
                if (destBuf)
                        strcpy((char*)destBuf, dataPtr);                     // Make a copy of the string for the
user (before Pool is unused)
                fDataPool.Unuse();
        }
        else
                if (destBuf)
                        memcpy(destBuf, theData, theSize);                   // return non-char data (theData points
to statically allocated memory in this case)

        fDictionary.SetElem(&keyRec, listPos);
        fDictionary.ForceSorted();                                                        // must do this 'cause
SetElem causes the kSorted flag to become unset

        return (keyRec.dataID);
}


/* ---------------------------------------------------------------------------
        FUNCTION:       PText::GetFirstParam
        Purpose:        Returns the first param, and ls_index to be passed to
                                GetNextParam().
        Accepts:        ls_index *listPos: where to store index to next param.
                                PTKeyRec *, where the keyRec should be stored.
        Returns:        pt_err noerr, or kNoMoreParams if there are no params.
                                ls_index listPos will contain next index or kNoMoreParams.
--------------------------------------------------------------------------- */
pt_err PText::GetFirstParam(ls_index* listPos, PTKeyRec* keyRec)
{
        pt_err theErr;

        *listPos = -1;
        theErr = GetNextParam(listPos, keyRec);

        return (theErr);
}


/* ---------------------------------------------------------------------------
        FUNCTION:       PText::GetNextParam
        Purpose:        Returns the next param based on the keyIndex passed, and
                                returns the keyIndex of the NEXT param for subsequent
                                GetNextParam() calls.
        Accepts:        ls_index * of the next param desired to be read.  The
                                keyIndex will be updated with the proper keyIndex for the
                                NEXT GetNextParam() call.
                                void *, where theData will be stored.
        Returns:
--------------------------------------------------------------------------- */
pt_err PText::GetNextParam(ls_index* listPos, PTKeyRec* keyRec)
{
        ls_index        desiredParam = (*listPos) + 1;

        if (fDictionary.Size() <= desiredParam)
                return (kNoMoreParams);

        fDictionary.GetElem(keyRec, desiredParam);
        *listPos = desiredParam;
        return (noerr);
}


/* ---------------------------------------------------------------------------
        FUNCTION:       PText::RemoveParam
        Purpose:        Delete a param in the PTEXT.  Any memory associated with the
                                param is released, and the param is marked for deletion.
                                This means that when the PTEXT segment is saved, the param
                                will be eliminated.
        Accepts:        paramKey: textual key for desired data.
        Returns:        pt_err: FALSE, no error;  positive, error.
        NOTE:           Even after deletion, it is still possible to "undelete"
                                the param, by calling RevertParam [not implemented yet].
--------------------------------------------------------------------------- */
pt_err PText::RemoveParam(ptm_key_t paramKey)
{
        PTKeyRec        keyRec;
        ls_index        listPos;

        listPos = GetKeyRec(paramKey, &keyRec);

        if (listPos == kLsNotFound)
                return (kParamNotFound);                                 // Param Not Found!

        if (keyRec.dataID != kPlNoElem)                                  // Any pool data allocated?
                fDataPool.Remove(keyRec.dataID);                 // lose it
```

```
        fDictionary.Remove(listPos);                              // removing KeyRec guarantees deletion of param

        --fParamCount;
        fAnyChanges = true;                                                  // make sure the segment gets
saved!

        return (noerr);
}


/* ----------------------------------------------------------------------
        FUNCTION:       PText::RevertParam [not implemented yet]
        Purpose:        Undoes and changes to a param, restoring the param to the
                                value at construction.
        Accepts:        paramKey: textual key for desired data.
        Returns:        pt_err: FALSE, no error;  positive, error.
---------------------------------------------------------------------- */
pt_err PText::RevertParam(ptm_key_t paramKey)
{
        return (NOERR);
}


/* ----------------------------------------------------------------------
        FUNCTION:       PText::RemoveAllParams
        Purpose:        Deletes all params.  This is like calling RemoveParam()
                                for each and every param in the segment.  However, new
                                params can be added.  The deletion(s) don't become
                                permanent until after a SaveSeg().
        NOTE:           Care should be taken when calling RemoveAllParams() and
                                then creating new params before an intervening SaveSeg().
                                It SHOULD work fine -- but it hasn't been tested.
---------------------------------------------------------------------- */
void PText::RemoveAllParams(void)
{
        fDataPool.Empty();
        fDictionary.Empty();
        fAnyChanges = true;                                  // make sure the segment gets saved!
        fParamCount = 0;
}



/* ----------------------------------------------------------------------
        FUNCTION:       PText::SaveSeg
        Purpose:        Re-writes the PTEXT segment, permanently merging in changes.
                                If the Segment was passed to the PTM as a block of memory,
                                then the revised segment is written to that memory block.
        Returns:        pt_err: FALSE, no error;  positive, error.
        NOTE:           PTSave() does not actually save the segment to a file;  That
                                is the job of the PFM.  However, PTSave() DOES re-write the
                                memory block allocated by the PFM, so if the application
                                invokes a save operation, the changes will become part of
                                the file.  This function sets fSaveThisSeg, which controls
                                if PFMSavSeg() is called on object destruction.
        Example:        In a preferences dialog, you would not want to call PTSave()
                                until the user has pressed "OK".  You should skip calling
                                PTSave() if the user presses REVERT or CANCEL, so when you
                                delete the object you will abandon all changes.
---------------------------------------------------------------------- */
pt_err PText::SaveSeg(void)
{
        char *          fSegmentPtr = NULL;
        PTKeyRec        keyRec;
        size_t          newSize = 2;                         // two bytes for slash and null
        pfm_fd_t        currentFile = NULL;
#define PTAVGKEYSIZE    10
#define PTAVGDATASIZE   8

        if (IsSegModified()) {
                if (fPFMFile)
                        currentFile = PFMSetCurrentFile(fPFMFile);   // Make sure we're gonna save to the right file!
                if (fSegmentHdl == NULL) {                                   // No handle.  Segment asleep?
                        if (fPFMSegInFile)                                          // It's asleep if there's a
segment already in the file
                                AwakenSeg();                                        // We'd better wake it up,
otherwise, we got no data!
                }
                if (fSegmentHdl)                                             // If we still don't have a handle,
that's OK -- the seg's never been saved
                        fSegmentPtr = (char *)MM_USE(fSegmentHdl);

/*      Make an educated guess as to the amount of memory needed for the segment
        to be saved. */

                ls_index listPos;
                for (listPos=0; listPos < fDictionary.Size(); ++listPos) {
                        fDictionary.GetElem(&keyRec, listPos);
                        if (keyRec.flags & kPTModified) {
                                newSize += PTAVGKEYSIZE;
                                if (keyRec.type == 'c')                                  // char param?
                                        newSize += keyRec.curSize;                       // yes -- just add its
size
                                else
                                        newSize += PTAVGDATASIZE;                // use this guestimate for
other types
                        }
                        else newSize += (keyRec.fcEnd-keyRec.fcStart)+1;
                }
//              xprintf("Original Segment length was: %ld, new length is: %ld\n", strlen(fSegmentPtr), newSize);

//      Allocate a block and begin building the new segment

                hdl_t           newSegHdl = MM_ALLOC(newSize, mm_no_flags, "PText::SaveSeg", this);
                char*           newSegPtr = (char*)MM_USE(newSegHdl);
                size_t          n = 0;
                PTKeyRec        newRec;

                for (listPos=0; listPos < fDictionary.Size(); ++listPos) {
                        fDictionary.GetElem(&keyRec, listPos);
                        newRec = keyRec;                                                         //
copy key, type, & dataID (if any)
```

```
                        if (keyRec.flags & kPTModified) {
                                char      keyString[PT_MAX_KEY_LENGTH];
                                char      numericStr[20];
                                size_t    byteLength = keyRec.curSize - 1;              // this gets overwritten below
for types other than char. -1 to munch NULL byte.

                                if (keyRec.type != 'c')
                                        Ptr2ParamText(&keyRec, &byteLength, numericStr);

                                newRec.sizeInSeg = byteLength;

                                if (n + PT_MAX_KEY_LENGTH + 15 + byteLength > newSize) {
//                                      xprintf("\nREALLOCATING (1) new segment size.  Was %ld, needed %ld
bytes\n",newSize, (long)((n) + PT_MAX_KEY_LENGTH + 15 + byteLength));
                                        newSize += PT_CHUNK_SIZE;
                                        MM_UNUSE(newSegHdl);
                                        MMRealloc(newSegHdl, newSize);
                                        newSegPtr = (char *)MM_USE(newSegHdl);
                                }

                                newRec.fcStart = n;
                                n += sprintf(&newSegPtr[n], "\\%s%c",keyRec.key, keyRec.type);
                                assert(n < newSize);

                                if (byteLength > fLengthThresh || (keyRec.flags & kPTHasSlash))
                                        n += sprintf(&newSegPtr[n], "%ld", byteLength);

                                newSegPtr[n++] = ':';
                                newRec.fcData = n;
                                assert(n < newSize);

                                if (keyRec.type != 'c')
                                        strcpy(&newSegPtr[n], numericStr);
                                else
                                        fDataPool.GetData(&newSegPtr[n], keyRec.dataID);
                                n += byteLength;

                        } else {
                                // copy original, unmodified param
                                size_t copyLength = (keyRec.fcEnd-keyRec.fcStart)+1;
                                if (n + copyLength > newSize) {
//                                      xprintf("\nREALLOCATING (2) new segment size.  Was %ld, needed %ld
bytes\n",newSize, (long)(n + copyLength));
                                        newSize += PT_CHUNK_SIZE;
                                        MM_UNUSE(newSegHdl);
                                        MMRealloc(newSegHdl, newSize);
                                        newSegPtr = (char *)MM_USE(newSegHdl);
                                }
                                newRec.fcStart = n;
                                assert(n < newSize);
                                assert(fSegmentPtr);
                                memcpy(&newSegPtr[n], &fSegmentPtr[keyRec.fcStart], copyLength);
                                n += copyLength;
                                newRec.fcData = newRec.fcStart + (keyRec.fcData - keyRec.fcStart);
                        }
                        newRec.fcEnd = n - 1;
                        newRec.flags = kPTNoFlags;
                        fDictionary.SetElem(&newRec, listPos);                          // Update this param's
keyRec so table is accurate for subsequent access
                        fDictionary.ForceSorted();                                      //
must do this 'cause SetElem causes the kSorted flag to become unset
                }

                if (n + 2 > newSize) {
//                      xprintf("\nREALLOCATING (3) new segment size.  Was %ld, needed %ld bytes\n",newSize,
(long)((n) +2));
                        newSize += 2;
                        MM_UNUSE(newSegHdl);
                        MMRealloc(newSegHdl, newSize);
                        newSegPtr = (char *)MM_USE(newSegHdl);
                }

                newSegPtr[n++] = '\\';
                assert(n < newSize);
                newSegPtr[n++] = 0;

//      Copy the newly-constructed segment back into the original (but resized) handle

                if (fSegmentHdl) {
        // PFM Segment (and handle) already aloocated so resize
                        MM_UNUSE(fSegmentHdl);
                        MMRealloc(fSegmentHdl, n);
                }
                else {
                        fSegmentHdl = MM_ALLOC(n, mm_no_flags, "PText's New Segment", NULL);
                        err_t theErr = PFMAddSegWithId(fPFMType, fPFMID, fSegmentHdl, PFM_MAX_PRIO, false);
                        assert(theErr == NOERR);
                        fPFMSegInFile = true;
                }
                memcpy(MM_USE(fSegmentHdl), newSegPtr, n);
                MM_UNUSE(fSegmentHdl);

                if (fPFMFile)
                        PFMSetSegModified(fSegmentHdl, true);

                MM_UNUSE(newSegHdl);
                MMFree(newSegHdl);
                fAnyChanges = false;                                    // Seg now saved, (but not yet written
to file)
                fSaveThisSeg = true;                                    // Without this, the PFMSavSeg() would
never be called!
                SleepSeg();                                                     // Check-in the
segment, allow it to be purgable until next GetParam() or SaveSeg()
                assert(currentFile);
                PFMSetCurrentFile(currentFile);
        }
        return (noerr);
}

/* ---------------------------------------------------------------------------
        FUNCTION:       PText::DeleteSeg
        Purpose:        Removes all the params then marks the PFM segment for
```

```
                        deletion when the object is destructed.
        Returns:        pt_err: FALSE, no error; positive, error.
------------------------------------------------------------------------ */
void PText::DeleteSeg(void)
{
        RemoveAllParams();
        fDeleteThisSeg = true;
}


/* ------------------------------------------------------------------------
        FUNCTION:       PText::SleepSeg
        Purpose:        Makes the associated PFM segment purgable.  This function
                        should be called if the user has PText segments that have
                        a long life and a wide scope, and are not in constant demand.
                        Opening a PText segment and puttting it to sleep is more
                        preferred to constantly re-opening the PText segment.

                        On the other hand, DON'T call SleepSeg() for segments that
                        need rapid and constant access.

                        The PTM leaves the segment in an awakened state on con-
                        struction.

                        YOU NEVER HAVE TO CALL AwakenSeg()!  There are only two
                        functions that require access to the PFM segment, GetParam()
                        and SaveSeg().  They check to see if the segment is asleep
                        and call AwakenSeg for you.

                        SleepSeg() is called at the end of SaveSeg(), 'cause that's
                        an opportune time to check in the segment.
------------------------------------------------------------------------ */
void PText::SleepSeg(void)
{
        pt_err theErr;
        pfm_fd_t currentFile = NULL;

        if (fSegmentHdl && fPFMSegInFile) {
                if (fPFMFile)
                        currentFile = PFMSetCurrentFile(fPFMFile);   // Make sure we're gonna check-in to the right
file!
                theErr = PFMCheckinSeg(fSegmentHdl);
                assert(theErr == noerr);
                assert(fRdOnly || (!fRdOnly && PFMGetSegRefCount(fPFMType, fPFMID) == 0));
                assert(currentFile);
                PFMSetCurrentFile(currentFile);
                fSegmentHdl = NULL;
        }
}


/* ------------------------------------------------------------------------
        FUNCTION:       PText::AwakenSeg
        Purpose:        A private function called in GetParam() and SaveSeg() if the
                        fSegmentHdl is NULL.

                        THE USER OF THIS CLASS SHOULD NOT TREAT SleepSeg() and
                        AwakenSeg() as a "use() and unuse()".  The real purpose
                        is to let the user sleep the segment when it's convenient
                        and optimal, but not to have to be concerned about what
                        sleep state the segment is in.  This is in keeping with
                        the PTM's philosophy of simplified data access.
------------------------------------------------------------------------ */
void PText::AwakenSeg(void)
{
        pfm_fd_t currentFile = NULL;

        if (fSegmentHdl == NULL) {
                if (fPFMFile)
                        currentFile = PFMSetCurrentFile(fPFMFile);   // Make sure we're gonna check-out from the right
file!
                fSegmentHdl = (hdl_t) PFMCheckoutSeg(fPFMType, fPFMID);
                assert(currentFile);
                PFMSetCurrentFile(currentFile);
                if (fSegmentHdl != PFM_NO_SEG)
                        fPFMSegInFile = true;
                else {
                        fPFMSegInFile = false;
                        fSegmentHdl = NULL;
                }
        }
}


/* ------------------------------------------------------------------------
        FUNCTION:       PText::IsParamModified
        Purpose:        Returns true if a param has been modified.
        Accepts:        paramKey: textual key for desired data.
        Returns:        1=modified, 0=unmodified/doesn't exist, -1=deleted.
        NOTE:           This function doesn't try to determine if the param
                        doesn't exist -- it only looks up its state in the
                        inUseTable.  Calling this function on a non-existent
                        param will return 0.
------------------------------------------------------------------------ */
bool_t PText::IsParamModified(ptm_key_t paramKey)
{
        PTKeyRec        keyRec;
        ls_index        listPos;

        listPos = GetKeyRec(paramKey, &keyRec);
        if (listPos == kLsNotFound)
                return (false);                                          // Param Not Found!
        return (keyRec.flags & kPTModified);
}


/* ------------------------------------------------------------------------
        FUNCTION:       PText::ParamExists
        Purpose:        Returns true if a param of a specific paramKey exists.
        Accepts:        paramKey: textual key for desired data.
        Returns:        true, param exist;  false, param doesn't exist.
------------------------------------------------------------------------ */
bool_t PText::ParamExists(ptm_key_t paramKey)
```

```
{
        PTKeyRec keyRec;
        strcpy(keyRec.key, paramKey);
        ls_index pos = fDictionary.Find(&keyRec, &CompPtextKeyAsc);
        return (pos != kLsNotFound);
}


/* -------------------------------------------------------------------------
        FUNCTION:       PText::GetKeyRec
        Purpose:        Get a key Record based on a desired key.
        Accepts:        paramKey: textual key for desired data.
                                 keyRec: ptr to a PTKetRec where PTM will stuff data.
        Returns:        a ptr to the data.  NULL if no data exists for this key.
------------------------------------------------------------------------- */
ls_index PText::GetKeyRec(ptm_key_t paramKey, PTKeyRec* keyRec)
{
        strcpy(keyRec->key, paramKey);
        ls_index pos = fDictionary.Find(keyRec, &CompPtextKeyAsc);
        if (pos != kLsNotFound)
                fDictionary.GetElem(keyRec, pos);

        return (pos);
}


/* -------------------------------------------------------------------------
        FUNCTION:       PText::GetPosRec
        Purpose:        Get a key Record based on position.  Esp. useful to iterate
                                 thru read-only PText segments.
        Accepts:        paramPos: position of desired record.
                                 keyRec: ptr to a PTKetRec where PTM will stuff data.
        Returns:        a ls_index to the data.  kLsNotFound if no param exists.
------------------------------------------------------------------------- */
ls_index PText::GetPosRec(ls_index paramPos, PTKeyRec* keyRec)
{
        if (fDictionary.Size() <= paramPos)                  // asking for param we don't have?
                return (kLsNotFound);

        fDictionary.GetElem(keyRec, paramPos);

        return (paramPos);
}



/* -------------------------------------------------------------------------
                STATIC FUNCTIONS
------------------------------------------------------------------------- */


/* -------------------------------------------------------------------------
        FUNCTION:       PText::scan_segment
        Purpose:        Does the bulk of the segment interpretation work.
        Accepts:        A char * to the text segment to be interpreted.
        Returns:        false, no error.  Otherwise an pt_err of the error:
                                          kNoLeadingSlash
                                          kBadKey
                                          kKeyTooLong
                                          kNullKey
                                          kNoFinalTerminator
                                          kMissingEndSlash

                                          PTJunkAfterLastParam ???
------------------------------------------------------------------------- */
pt_err PText::scan_segment()
{
        register char* cp;                              // points to wherever we are currently scanning
        char*   paramStart;                             // points to slash
        char*   paramKey;                               // points to start of key
        char*   paramColon;                             // points to colon
        char*   paramLength;                  // points to first char of textual <length> (if present)
        size_t  sizeInSeg;                              // textual <length> converted to a long
        char*   paramType;                              // points to the <type> char
        char*   paramEndOfData;               // points to the last byte of this param's <data>


        char* fSegmentPtr = (char *)MM_USE(fSegmentHdl);
        cp = fSegmentPtr;

        if (*cp != PT_START_CH)                                 // segment must begin with a backslash!
                return (kNoLeadingSlash);

        while (*cp == PT_START_CH) {
                paramStart = cp;

                if (cp[1] == NULL) {                            // Must be a null byte after terminating slash
                        MM_UNUSE(fSegmentHdl);
                        return (noerr);
                }

                paramKey = ++cp;                                // Start scanning key of this param
                while (*cp != PT_END_CH && *cp)         // scan forward for next colon
                        ++cp;

                if (*cp == NULL) {                                      // bad news -- unexpected end-of-key!
                        MM_UNUSE(fSegmentHdl);
                        return (kBadKey);
                }

                paramColon = cp--;

                if (paramColon > paramStart + PT_MAX_KEY_LENGTH) {              // probably should be an assert
                        MM_UNUSE(fSegmentHdl);
                        return (kKeyTooLong);
                }

                while (cp > paramStart && isdigit(*cp))                 // scan backwards for length (textual
int)
                        --cp;
```

```
		if (cp == paramStart) {					// What!?  No
key?!
			MM_UNUSE(fSegmentHdl);
			return (kNullKey);
		}

		if (cp == paramColon-1)
			paramLength = NULL;							//
No <length> for this key (get it at end-of-scan, below)
		else {
			paramLength = cp + 1;
			sizeInSeg = (size_t)atol(paramLength);
		}

		paramType = cp;								//
the <type> is a single character...

		if (paramLength == NULL) {						// no
<length> -- scan for end of data...
			cp = paramColon + 1;
			while (*cp != PT_START_CH && *cp != NULL)		// ...by looking for another slash
				++cp;
			if (*cp == NULL) {							//
bad news -- unexpected end-of-key!
				MM_UNUSE(fSegmentHdl);
				return (kNoFinalTerminator);
			}
			paramEndOfData = cp - 1;					// this is the last
char of <data>
			sizeInSeg = paramEndOfData - paramColon;		// NOW we know the length!
		} else {
			paramEndOfData = paramColon + sizeInSeg;
			if (paramEndOfData[1] != PT_START_CH) {			// What?!  <length> must be
wrong, cause slash ain't there!
				MM_UNUSE(fSegmentHdl);
				return (kMissingEndSlash);
			}
		}

//	now merge this parameter into our dictionary

		PTKeyRec keyRec;
		keyRec.fcStart = paramStart - fSegmentPtr;
		keyRec.fcEnd = paramEndOfData - fSegmentPtr;
		memcpy(keyRec.key, paramKey, paramType - paramKey);
		keyRec.key[paramType-paramKey] = 0;						//
tack on a null byte
		keyRec.type = (short)*paramType;
		keyRec.sizeInSeg = sizeInSeg + ((keyRec.type == 'c') ? 1 : 0);// character text, extra byte will be for
null added later
		keyRec.curSize = 0;
		keyRec.fcData = (paramColon - fSegmentPtr) + 1;
		keyRec.dataID = kPlNoElem;
		keyRec.flags = kPTNoFlags;

		fDictionary.Merge(&keyRec, &CompPtextKeyAsc);

		++fParamCount;

		cp = paramEndOfData + 1;						// Continue with next
param...
	}

	MM_UNUSE(fSegmentHdl);
	return (noerr);
}


/* ------------------------------------------------------------------------
	FUNCTION:		PText::AddParamData2Pool
	Purpose:		Converts parameterized text to the proper value, then adds
					that value to our data pool.
	Accepts:		*keyRec: where to stuff pool id.
					size:
					**theData:
	Returns:		pt_err, result.
------------------------------------------------------------------------ */
pt_err PText::AddParamData2Pool(PTKeyRec* keyRec, size_t* size, void** theData)
{
	static short			oneShort;
	static int					oneInt;
	static long					oneLong;
	static float			oneFloat;
	static double			oneDouble;
	static long double		oneLongDouble;

//	assert(MMGetLockCount(fSegmentHdl) != 0);	// HANDLE MUST BE LOCKED OUTSIDE FUNCTION, otherwise ptr is bogus!

	if (fSegmentHdl == NULL) {					// No handle.  Segment asleep?
		if (fPFMSegInFile)							// It's asleep if there's a
segment already in the file
			AwakenSeg();							// We'd better wake it up,
otherwise, we got no data!
	}
	assert(fSegmentHdl);

	char* fSegmentPtr = (char*)MM_USE(fSegmentHdl);
	char* paramTextPtr = &fSegmentPtr[keyRec->fcData];

	switch (keyRec->type) {
		case 'c':		*size = keyRec->sizeInSeg;
						*theData = paramTextPtr;
						break;

		case 's':		*size = sizeof(short);
						oneShort = (short) atoi(paramTextPtr);
						*theData = (void *)&oneShort;
						break;

		case 'i':		*size = sizeof(int);
						oneInt = atoi(paramTextPtr);
						*theData = (void *)&oneInt;
						break;
```

```
		case 'l':	*size = sizeof(long);
				oneLong = atol(paramTextPtr);
				*theData = (void *)&oneLong;
				break;

		case 'f':	*size = sizeof(float);
				oneFloat = (float) atof(paramTextPtr);
				*theData = (void *)&oneFloat;
				break;

		case 'd':	*size = sizeof(double);
				oneDouble = (double) atof(paramTextPtr);
				*theData = (void *)&oneDouble;
				break;

		case 'x':	*size = sizeof(long double);
				oneLongDouble = (long double) atof(paramTextPtr);
				*theData = (void *)&oneLongDouble;
				break;

		default:	MM_UNUSE(fSegmentHdl);
				return (kNoSuchType);
	}

	keyRec->dataID = fDataPool.AddData(*theData, *size);
	MM_UNUSE(fSegmentHdl);
	return (noerr);
}


/* -----------------------------------------------------------------------
	FUNCTION:	PText::Ptr2ParamText
	Purpose:	Converts Pool data to Parameterized Text.
	Returns:	pt_err, result.
----------------------------------------------------------------------- */
pt_err PText::Ptr2ParamText(PTKeyRec* keyRec, size_t* size, char* textBfr)
{
	short		oneShort;			// NOTE: these are not static, 'cause their
addresses aren't being passed outside function.
	int			oneInt;
	long		oneLong;
	float		oneFloat;
	double		oneDouble;
	long double	oneLongDouble;

	if (keyRec->type != 'c') {
		switch (keyRec->type) {
			case 's':	fDataPool.GetData(&oneShort, keyRec->dataID);
					*size = sprintf(textBfr, "%hd", oneShort);
					break;
			case 'i':	assert(false);
					fDataPool.GetData(&oneInt, keyRec->dataID);
					*size = sprintf(textBfr, "%d", oneInt);
					break;
			case 'l':	fDataPool.GetData(&oneLong, keyRec->dataID);
					*size = sprintf(textBfr, "%ld", oneLong);
					break;
			case 'f':	fDataPool.GetData(&oneFloat, keyRec->dataID);
					*size = sprintf(textBfr, "%f", oneFloat);
					break;
			case 'd':	fDataPool.GetData(&oneDouble, keyRec->dataID);
					*size = sprintf(textBfr, "%f", oneDouble);
					break;
			case 'x':	fDataPool.GetData(&oneLongDouble, keyRec->dataID);
					*size = sprintf(textBfr, "%f", oneLongDouble);
					break;
			default:	return (kNoSuchType);
		}
	}
	return (noerr);
} /* PText::Ptr2ParamText */


/* -----------------------------------------------------------------------
	FUNCTION:	PText::Type2Size
	Purpose:	Given a <type>, returns the expected size of the data.
	Returns:	the size, or pt_err: kNoSuchType.
----------------------------------------------------------------------- */
size_t PText::Type2Size(short type, void* theData)
{
	switch (type) {
		case 'c':	return (strlen((char*)theData) + 1);
		case 's':	return (sizeof(short));
		case 'i':	assert(false); return (sizeof(int));
		case 'l':	return (sizeof(long));
		case 'f':	return (sizeof(float));
		case 'd':	return (sizeof(double));
		case 'x':	return (sizeof(long double));
		default:	return (kNoSuchType);
	}
	return (kNoSuchType);				// not needed, except to suppress warning
} /* PText::Type2Size */


/* -------------------------------------------------------SMG---03/25/93---
	CompPtextKeyAsc - comparison proc for sorting keys into ascending order.
----------------------------------------------------------------------- */
int CompPtextKeyAsc(const void* pKey, const void* pElem)
{
	int result = (strcmp(((PTKeyRec*)pKey)->key, ((PTKeyRec*)pElem)->key));
	if (result < 0)
		return GN_LESS;
	else if (result == 0)
		return GN_EQUAL;
	else
		return GN_GREATER;

} /* CompPtextKeyAsc */
```

```
static void printAction(void* pElem, void* unused)
{
        PTKeyRec* keyRec = (PTKeyRec*)pElem;

#ifndef NDEBUG
        xprintf("Param #%3hd: Key:'%10s' ty: %c  st:%4ld fcData: %4ld end:%4ld sz:%3ld  curLen:%3ld", ++nParam, keyRec-
>key, keyRec->type, keyRec->fcStart, keyRec->fcData, keyRec->fcEnd, keyRec->sizeInSeg, keyRec->curSize);
        xprintf("  id: %ld  Flags: %6s %8s %8s\n", keyRec->dataID, (keyRec->flags & kPTNewKey) ? "NewKey" : "", (keyRec-
>flags & kPTModified) ? "Modified" : "", (keyRec->flags & kPTHasSlash) ? "HasSlash" : "");
#endif
}


/* -----------------------------------------------------SMG---03/25/93---
        PText::dumpDictionary - simple utility function for dumping the list
---------------------------------------------------------------------- */
void PText::dumpDictionary(void) {
        nParam = 0;
        fDictionary.EachElemDo(printAction);
}


void PText::print_the_seg(char *theMsg) {
        char* fSegmentPtr = (char*)MM_USE(fSegmentHdl);
//      xprintf("%s '%s'\n",theMsg, fSegmentPtr);
        MM_UNUSE(fSegmentHdl);
}

#pragma segment main

/* xxxxxxxxxxxxxxxxxxxxxxxxxxxxxxxxxxxxxxxxxxxxxxxxxxxxxxxxxxxxxxxxxxxxxxxx
 * $Log:         ptext.cc,v $
Revision 1.15  93/06/04  19:56:15  stephen
Changed PFMPush to PFMSet.

Revision 1.14  93/06/03  23:15:30  stephen
Can't remember what I changed...

Revision 1.13  93/05/26  19:47:03  stephen
Windows fixes.

Revision 1.12  93/05/24  21:37:55  stephen
Various mucking around -- no real changes made, but checked in --
just in case...

Revision 1.11  93/05/18  20:47:04  stephen
Fixed potential bug: specifying a segment that didn't exist wouldn't
actually save to that segment #, because we were calling PFMAddSeg.
Now we call PFMAddReplaceSeg.

Revision 1.10  93/05/10  16:56:44  stephen
Fixed MAJOR bug, where we might be accidentally stuffing the last
two bytes of the newly-saved PText segment with the backslash &
null byte over memory we didn't own.  I now call MM_REALLOC.

Revision 1.9  93/05/03  16:39:33  stephen
Fixed setting of flags to use |, not +.  Adding the
flags was really screwing things up!

 * Revision 1.8  93/04/24  09:57:17  stephen
 * Added unsigned overloads for SetParam.
 *
 * Fixed problems related to SAVEs -- saving was occuring
 * every time due to a diagnostic "|| true" in a test.
 *
 * Removed lprintf() in certain places which might try to
 * print strings greater than 255 (otherwise it would bomb).
 *
 * Raised constant key limit from 15 to 25, since I was exceeding
 * it all over the place.  (maybe this should be user-definable)
 *
 * Revision 1.7  93/04/13  13:03:50  stephen
 * Minor Segment Saving changes.
 *
 * Revision 1.6  93/04/12  21:26:29  stephen
 * Added WasSegModified() function.
 *
 * Revision 1.5  93/04/08  15:02:33  stephen
 * Fixed accidental usage of pointer derived from a handle that
 * was then unlocked.  If the memory block moved in the heap,
 * we now pointed to garbage.
 *
 * Fixed saving mechanism for segments that never existed in the
 * PFM file -- it wasn't working correctly.
 *
 * Added a SleepSeg() and AwakenSeg() feature.
 *
 * Revision 1.4  93/04/06  19:42:33  stephen
 * First General Revisions
 *
 * Revision 1.3  93/04/01  22:57:21  stephen
 * Added automatic slash detection for char data
 * that would not automatically have their <length>
 * written.
 *
 * Revision 1.2  93/04/01  11:32:17  stephen
 * Changed GetParam() to accept a type;  Also, it
 * asserts() if the user specifies the wrong type.
 *
 * Revision 1.1  93/03/31  22:41:44  stephen
 * Initial revision
 *
 */
```

```
/* ---------------------------------------------------------------------------
	PTEXT.H
	Parameterized Text Manager
	Copyright (C) 1993 Screenplay Systems Inc.
	Revised:	$Id: ptext.h,v 1.11 93/05/26 19:47:09 stephen Exp Locker: stephen $
------------------------------------------------------------------------------

	The Parameterized Text Manager was designed to provide the easiest
	access to structures containing loose collections of data.	For
	example, an options dialog might have 15 different settings; some may
	be textual, some numeric.

	Rather than overload the Parameterized File Manager (PFM)  by creating
	hundreds of types with dozens of segments, the PTM allows us to place a
	block of structured data within a single PFM ID, and yet be able to
	translate that data between different platforms.

	The PTM also helps to overcome the age-old problem of file format
	incompatibilities.		Since data is not packed into binary structures,
	the addition of new ParamIDs (the smallest PTEXT unit) will not affect
	interpretation of the rest of the ParamIDs by a program ignorant of the
	meaning of those IDs.  This helps us achieve both forward and backward
	data compatibility.

	Full transparency is the goal.		The PTM:

	1) Gets the segment from the PFM (though the user can directly provide
	a block of memory to interpret).  This relationship allows the PTM to
	make disk segments purgeable, but still allows the user transparent
	access to the data members.

	2) Scans a PTEXT segment for paramIDs requested by the user.

	3) Returns a void* which points to the desired data;  The PTM allocates
	memory for paramIDs the user requests.		This allows full undo-ability
	for each and every paramID, and frees the user from the hassle of
	managing those details.

	4) Lets the user Get or Set the value of any paramID.  It should not
	be necessary to Get a paramID before setting it (this is how new IDs
	get added).

	4) Creates an updated segment from the changes, then optionally marks
	the segment to be saved by the PFM.

	The PTM tries to eliminate the time/programming penalty associated with
	overly-clever structure layout.  Using a PTEXT segment means the data
	may be randomly ordered in different versions of the segment, but that
	order is no longer the concern of the programmer.

	Also, the PTM does away with the concept of a "dictionary", which
	would be required for each and every structure.  It is the user's
	responsibility to Get and Put meaningful keys -- the PTM simply
	maintains the data.

	The PTM should not be used for highly structured data, especially for
	files which contain large numbers of similarly-sized and similarly
	structured segments.  The overhead of interpretation is a trade-off
	for the instantenousness of randomly-accessed binary structures.  In
	those cases, the PFM should suffice nicely.

	SYNTAX OF PTM SEGMENTS:

	The syntax of a PTM segment has been designed to maximize ease of
	interpretation.  Keys and data are assumed to be a stream of ASCII
	chars, but		there are no requirements which prevent the user from
	storing the bytes that compose binary structs.

	The syntax of the char stream is:

			\<key><type>[<length>]:<data>\

	Start-char:
		\ (backslash)

	Key:
		{ ascii char(s) }

	Type:
		{ c | s | i | l | f | d | x }
			c		char
			s		short
			i		int
			l		long
			f		float
			d		double
			x		long double

	Length (optional):
		{ a long int expressed in ascii digits 1-9 }

	End-char:
		: (colon)

	Data:
		{ stream of chars }

	The stream begins with a backslash.  The <key>, <type> and <length> are
	ASCII characters which must be terminated with a colon.  The <length>
	is optional, however the PTM MUST write a <length> if the data contains
	a backslash.  The <length> is also helpful in speeding up the scanning
	process for extremely long data.

	If the data is lengthy, or a binary stream (such as a bitmap) the user
	can automatically ensure that the <length> is written by calling the
	SetLengthThresh() function.  You pass the desired length which is the
	minimum data size required for the PTM to automatically generate a
	<length>.  This feature is essential, for if the keys are numerous and
	the data is small, the character bytes wasted to track size can exceed
	10% -- not to mention the overhead to convert the ascii size to longs.

	If character data is shorter than the length threshold, the PTM must
	scan the data to ensure it doesn't contain the backslash.  If it does,
```

```
        a <length> will be automatically generated.  The <length> will not be
        generated for numeric parameters and character data that DOES NOT
        contain slashes.

        The <type> is simply the last character of the <key>.  It is specified
        when the user specifies the <key>.

        FUTURE OPTIMIZATION:  profile and test efficiency of strtol() vs
        current use of atol; consider using strtod() vs atof().

        ALSO:    • Compact the Pool and possible list to save space after a Save()
                 • add constants for type names: 'c', 'i', etc.
                 • Should writing of strings write at least a null byte, if no data?
        POSSIBLE FUTURE BEHAVIOR: override TObject READ & Write to use PFM...

*/


#pragma once

#ifndef __PTEXT__
#define __PTEXT__

extern "C" {
        #include "ssi.h"
}
#include "pools.h"

#pragma segment ptext

#define xprintf          lprintf          // define to be lprintf for debugging output

/* ------------------------------------------------------------------------
                TYPEDEFS & CONSTANTS
------------------------------------------------------------------------ */
typedef ulong           seg_type_t;             // Segment type 'XXXX' for both PFM & PTM
typedef ushort          seg_id_t;               // a PFM Segment ID
typedef char*           ptm_key_t;              // a PTM key ID
typedef ushort          key_index_t;    // Index into parameter list

const class_t    kPText    =      kLastGenClass + 1;

const char              PT_START_CH                     = '\\';         // Single slash defines start of
parameterized text.
const char              PT_END_CH                       = ':';          // Colon means end of key
const short             PT_MAX_KEY_LENGTH        = 25;          // Max length of <key><type><length> (area
between backslash & colon)
const size_t    PT_CHUNK_SIZE            = 100;          // Amount of additional bytes to grown updated segment by
if guestimate fails
extern const char *     PT_UNDEFINED;

typedef  uchar    pt_key_flag;

const pt_key_flag       kPTNoFlags              = 0x00;
const pt_key_flag       kPTNewKey               = 0x01;         // Param is new, has never been saved
const pt_key_flag       kPTModified             = 0x02;         // Param has been modified
const pt_key_flag       kPTHasSlash             = 0x04;         // char <data> is shorter than the fLengthThresh
AND contains a slash!


typedef struct {                                        // NOTE: the following fc's are ALL Offsets in the Segment
-- not actual addresses!
        size_t          fcStart;                        // start of this param (the slash)
        size_t          fcEnd;                          // end of this param (last char of data before
next param's slash)
        char            key[PT_MAX_KEY_LENGTH];    // Actual text key
        short           type;                           // type of <data>
        size_t          sizeInSeg;                      // Known length of <data> in the original segment
        size_t          curSize;                        // Current size/length of data in the Pool
        size_t          fcData;                         // offset to <data>
        pl_id           dataID;                         // pool ID of referenced <data>
        pt_key_flag     flags;                          // flags for this key
} PTKeyRec;

int       CompPtextKeyAsc(const void *pKey, const void *pE);

typedef  long     pt_err;

const pt_err    noerr                           =  0;
const pt_err    kPterr                          =  -1;
const pt_err    kNoLeadingSlash         =  -2;
const pt_err    kBadKey                         =  -3;
const pt_err    kKeyTooLong                     =  -4;
const pt_err    kNullKey                        =  -5;
const pt_err    kNoFinalTerminator      =  -6;
const pt_err    kMissingEndSlash  =  -7;
const pt_err    kNoSuchType                     =  -8;
const pt_err    kTypeMismatch           =  -9;
const pt_err    kParamNotFound          = -10;
const pt_err    kNoMoreParams           = -11;
const pt_err    kNoSuchPFMSeg           = -12;

const bool_t    kRdOnly                         = true;


/* ------------------------------------------------------------------------
                PText - Parameterize Text Class.
------------------------------------------------------------------------ */
class EXPORT_CLASS PText : public TObject {
public:

//      CONSTRUCTION/DESTRUCTION
PText(pfm_fd_t PFMFile, seg_type_t PFMType, seg_id_t PFMID, pt_err* theErr, bool_t rdOnly = false);
PText(seg_type_t PFMType, hdl_t memHdl, pt_err* theErr,  bool_t rdOnly = false);
virtual ~PText(void);

//      PUBLIC UTILITIES
virtual  char*          ClassName(void) const                   { return "PText"; }
virtual  class_t        ClassType(void)   const                 { return kPText; }
virtual bool_t          IsOfType(const void* pType) const { return *(class_t*) pType == kPText ||
TObject::IsOfType(pType); }
virtual TObject*        Duplicate(void) const                   { return new PText(*this); }
```

```
virtual byte_cnt          GetObjSize(void)                    { return sizeof(PText); }
virtual byte_cnt          GetAllocSize(void)                           { return fDictionary.GetAllocSize() +
fDataPool.GetAllocSize(); }

//       PUBLIC BEHAVIOR
pl_id               SetParam(ptm_key_t paramKey, short type, char* theData)                  { return
(set_param(paramKey, 0, type, (void*)theData)); }
pl_id               SetParam(ptm_key_t paramKey, short type, short theData)                  { return
(set_param(paramKey, 0, type, (void*)&theData)); }
pl_id               SetParam(ptm_key_t paramKey, short type, ushort theData)          { return (set_param(paramKey,
0, type, (void*)&theData)); }
pl_id               SetParam(ptm_key_t paramKey, short type, int theData)                    { return
(set_param(paramKey, 0, type, (void*)&theData)); }
pl_id               SetParam(ptm_key_t paramKey, short type, uint theData)                   { return
(set_param(paramKey, 0, type, (void*)&theData)); }
pl_id               SetParam(ptm_key_t paramKey, short type, long theData)                   { return
(set_param(paramKey, 0, type, (void*)&theData)); }
pl_id               SetParam(ptm_key_t paramKey, short type, ulong theData)                  { return
(set_param(paramKey, 0, type, (void*)&theData)); }
pl_id               SetParam(ptm_key_t paramKey, short type, float theData)                  { return
(set_param(paramKey, 0, type, (void*)&theData)); }
pl_id               SetParam(ptm_key_t paramKey, short type, double theData)          { return (set_param(paramKey,
0, type, (void*)&theData)); }
pl_id               SetParam(ptm_key_t paramKey, short type, long double theData)  { return (set_param(paramKey, 0, type,
(void*)&theData)); }

pl_id               SetParam(ls_index paramPos, short type, char* theData)                   { return
(set_param(NULL, paramPos, type, (void*)theData)); }
pl_id               SetParam(ls_index paramPos, short type, short theData)                   { return
(set_param(NULL, paramPos, type, (void*)&theData)); }
pl_id               SetParam(ls_index paramPos, short type, ushort theData)                  { return
(set_param(NULL, paramPos, type, (void*)&theData)); }
pl_id               SetParam(ls_index paramPos, short type, int theData)              { return (set_param(NULL,
paramPos, type, (void*)&theData)); }
pl_id               SetParam(ls_index paramPos, short type, uint theData)                    { return
(set_param(NULL, paramPos, type, (void*)&theData)); }
pl_id               SetParam(ls_index paramPos, short type, long theData)                    { return
(set_param(NULL, paramPos, type, (void*)&theData)); }
pl_id               SetParam(ls_index paramPos, short type, ulong theData)                   { return
(set_param(NULL, paramPos, type, (void*)&theData)); }
pl_id               SetParam(ls_index paramPos, short type, float theData)                   { return
(set_param(NULL, paramPos, type, (void*)&theData)); }
pl_id               SetParam(ls_index paramPos, short type, double theData)                  { return
(set_param(NULL, paramPos, type, (void*)&theData)); }
pl_id               SetParam(ls_index paramPos, short type, long double theData)   { return (set_param(NULL, paramPos,
type, (void*)&theData)); }

pl_id               GetParam(ptm_key_t paramKey, short type, void* theData = NULL)      { return (get_param(paramKey,
0, type, (void*)theData)); }
pl_id               GetParam(ls_index paramPos, short type, void* theData = NULL)  { return (get_param(NULL, paramPos,
type, (void*)theData)); }


pt_err              GetFirstParam(ls_index* listPos, PTKeyRec* keyRec);
pt_err              GetNextParam(ls_index* listPos, PTKeyRec* keyRec);

pt_err              RemoveParam(ptm_key_t paramKey);
pt_err              RevertParam(ptm_key_t paramKey);
void                RemoveAllParams(void);

pt_err              SaveSeg(void);
void                DeleteSeg(void);

void                SleepSeg(void);                                       //       Call SleepSeg if you
wish to make the associated PFM segment be purgable;
                                                                                          //
         It's not necessary to call Awaken().  See .cc for more info.
bool_t              IsParamModified(ptm_key_t paramKey);
bool_t              IsSegModified(void)                                  { return fAnyChanges; }
bool_t              ParamExists(ptm_key_t paramKey);
bool_t              WasSegModified(void)                          { return fSaveThisSeg; }

void                SegNowSaved(void)                                    { fSaveThisSeg = false; }
                    // Call this after SAVEing the file
void                SetLengthThresh(size_t lengthThresh)        { fLengthThresh = lengthThresh; }
ls_index            GetKeyRec(ptm_key_t paramKey, PTKeyRec* keyRec);
ls_index            GetPosRec(ls_index paramPos, PTKeyRec* keyRec);
short               GetType(ptm_key_t paramKey)                   { PTKeyRec keyRec; GetKeyRec(paramKey,
&keyRec);  return (keyRec.type); }

void                UseDataPool(void)                                    { fDataPool.Use(); }
char*               PID2Ptr(pl_id dataID)                         { /* assert (dataID >= 0); */  if
(dataID < 0) return ((char*)PT_UNDEFINED); else return ((char*)fDataPool.DataPtr(dataID)); }
void                UnuseDataPool(void)                                  { fDataPool.Unuse(); }

void                dumpDictionary(void);
void                print_the_seg(char* theMsg);

protected:
//       DATA MEMBERS
hdl_t               fSegmentHdl;              // Handle to memory block containing the PText Segment
bool_t              fUserSuppliedMem;         // TRUE if user supplied handle (i.e, don't Free it up)

pfm_fd_t            fPFMFile;                          // PFM file descriptor for the open PFM file for this segment
seg_type_t          fPFMType;                          // PFM "TYPE" of this segment
seg_id_t            fPFMID;                            // PFM "ID" of this segment
bool_t              fPFMSegInFile;            // TRUE if PFM segment was checked-out, false if not in file
bool_t              fRdOnly;                           // TRUE if segment is constructed read-only

short               fParamCount;              // Number of params
bool_t              fAnyChanges;              // Becomes true if any PText params are modified, added or deleted
bool_t              fSaveThisSeg;             // If true, save the PFM seg. Becomes true if PText::SavSeg() ever did any
saving
bool_t              fDeleteThisSeg;           // If TRUE, the segment will be deleted at destruction
size_t              fLengthThresh;            // Maximum length of data which when exceeded forces <length> to be included
List                fDictionary;              // List of all the parameters
Pool                fDataPool;                         // Pool of all the data


//       LOCAL UTILITIES
pl_id               set_param(ptm_key_t paramKey, ls_index paramPos, short type, void *theData);
pl_id               get_param(ptm_key_t paramKey, ls_index paramPos, short type, void* theData);
pt_err              scan_segment(void);
```

```
pt_err          AddParamData2Pool(PTKeyRec* keyRec, size_t* size, void** theData);
pt_err          Ptr2ParamText(PTKeyRec* keyRec, size_t* size, char* textBfr);
size_t          Type2Size(short type, void* theData);
void            AwakenSeg(void);

};      /* PText */

#pragma segment main

#endif /* __PTEXT__ */

/* $Log:        ptext.h,v $
 * Revision 1.11  93/05/26  19:47:09  stephen
 * Windows fixes.
 *
 * Revision 1.10  93/05/03  16:40:19  stephen
 * Fixed setting of flags to use |, not +.  Adding the
 * flags was really screwing things up!
 *
 * Revision 1.9  93/04/24  09:59:52  stephen
 * Added unsigned overloads for SetParam.
 *
 * Fixed problems related to SAVEs -- saving was occuring
 * every time due to a diagnostic "|| true" in a test.
 *
 * Removed lprintf() in certain places which might try to
 * print strings greater than 255 (otherwise it would bomb).
 *
 * Raised constant key limit from 15 to 25, since I was exceeding
 * it all over the place.  (maybe this should be user-definable)
 *
 * Revision 1.8  93/04/19  18:58:13  stephen
 * Minor revisions.
 *
 * Revision 1.7  93/04/13  13:04:11  stephen
 * Minor Segment Saving changes.
 *
 * Revision 1.6  93/04/12  21:27:23  stephen
 * Added WasSegModified() function.
 *
 * Revision 1.5  93/04/08  15:07:01  stephen
 * Added SleepSeg() and AwakenSeg() feature.
 *
 * Revision 1.4  93/04/06  19:42:37  stephen
 * First General Revisions
 *
 * Revision 1.3  93/04/01  22:58:44  stephen
 * Added automatic slash detection for char data
 * that would not automatically have their <length>
 * written.
 *
 * Revision 1.2  93/04/01  11:33:21  stephen
 * Added GetType() inline function.
 *
 * Revision 1.1  93/03/31  22:42:05  stephen
 * Initial revision
 *
 */
```

```
/**********************************************************************
        QUADICON.CC
        Quad Icon Item class
        (c) 1993 Screenplay Systems
        Authors:        S. Greenfield & C. Huntley
        Created:        May 17, 1994
        Revised:        $Id$
***********************************************************************
*/

#include "structs.h"
#include "relation.h"
#include "quadicon.h"

#pragma segment quadicon

static GLColor kRedClr = { 0xFFFF, 0x0000, 0x0000 };

GLPoint quad1DynArrow[3]    = { {  2,  2 },   {  5, 11 },     { 11,  5 } };
GLPoint quad2DynArrow[3]    = { {  2, 11 },   { 12,  9 },     {  5,  2 } };
GLPoint quad3DynArrow[3]    = { { 11,  2 },   {  2,  5 },     {  8, 11 } };
GLPoint quad4DynArrow[3]    = { { 11, 11 },   {  8,  2 },     {  2,  8 } };

GLPoint leftCompanion[3]    = { {  7,  2 },   {  3, 10 },     { 11, 10 } };
GLPoint rightCompanion[3]   = { {  7, 11 },   { 11,  3 },     {  3,  3 } };
GLPoint topDependent[3]             = { {  2,  7 },   { 10, 11 },     { 10,  3 } };
GLPoint bottomDependent[3]          = { { 11,  7 },   {  3,  3 },     {  3, 11 } };


/* ---------------------------------------------------------------------
        QuadIcon::QuadIcon - constructor.
--------------------------------------------------------------------- */
QuadIcon::QuadIcon(ItemList* pParent, const GLRect *extent, const GLColor* hilightColor)
        :       TItem(pParent, extent, kNoFlags, &kGLBlackClr),
                fHilightColor ((GLColor*)hilightColor)
{
        fWindowRef = GetParentWindowRef();

        fMidPoint       = ((fExtent.right - fExtent.left) / 2);

        asserts(fMidPoint == ((fExtent.bottom - fExtent.top) / 2), "Non-Square Quad!");

        GLSetRect(&fUnitRects[0], fExtent.top+1, fExtent.left+1, fExtent.top+fMidPoint, fExtent.left+fMidPoint);
        GLSetRect(&fUnitRects[1], fExtent.top+1, fExtent.left+fMidPoint+1, fExtent.top+fMidPoint, fExtent.right-1);
        GLSetRect(&fUnitRects[2], fExtent.top+fMidPoint+1, fExtent.left+1, fExtent.bottom-1, fExtent.left+fMidPoint);
        GLSetRect(&fUnitRects[3], fExtent.top+fMidPoint+1, fExtent.left+fMidPoint+1, fExtent.bottom-1, fExtent.right-1);


        fArrowRgns[0][DYNAMIC]             = new Rgn(quad1DynArrow, 3);
        fArrowRgns[1][DYNAMIC]             = new Rgn(quad2DynArrow, 3);
        fArrowRgns[2][DYNAMIC]             = new Rgn(quad3DynArrow, 3);
        fArrowRgns[3][DYNAMIC]             = new Rgn(quad4DynArrow, 3);

        fArrowRgns[0][COMPANION]   = new Rgn(leftCompanion, 3);
        fArrowRgns[1][COMPANION]   = new Rgn(rightCompanion, 3);
        fArrowRgns[2][COMPANION]   = new Rgn(leftCompanion, 3);
        fArrowRgns[3][COMPANION]   = new Rgn(rightCompanion, 3);

        fArrowRgns[0][DEPENDENT]   = new Rgn(topDependent, 3);
        fArrowRgns[1][DEPENDENT]   = new Rgn(topDependent, 3);
        fArrowRgns[2][DEPENDENT]   = new Rgn(bottomDependent, 3);
        fArrowRgns[3][DEPENDENT]   = new Rgn(bottomDependent, 3);

} /* QuadIcon::QuadIcon */


/* ---------------------------------------------------------------------
        QuadIcon::~QuadIcon - destructor.
--------------------------------------------------------------------- */
QuadIcon::~QuadIcon(void)
{
        for (short q=0; q<=3; ++q)
                for (int r=DYNAMIC; r<=DEPENDENT; ++r)
                        delete fArrowRgns[q][r];

} /* QuadIcon::~QuadIcon */


/* ---------------------------------------------------------------------
        QuadIcon::SetState - sets the appropirate anchor unit as well as the
        pointed unit.  relationship is either DYNAMIC, COMPANION, DEPENDENT.
        NOTE: We try to do as little updating as possible.
--------------------------------------------------------------------- */
void QuadIcon::SetState(short state, short anchorUnit, int relationship)
{
        short newPointedUnit = GetPartnerUnit(relationship, anchorUnit);

        if ((state != fState) || (anchorUnit != fAnchorUnit) || (newPointedUnit != fPointedUnit)) {
                fpGraphEnv->Use();
                clear_quad_icon();

                fState                  = state;
                fAnchorUnit             = anchorUnit;
                fPointedUnit    = newPointedUnit;
                fRelationship   = relationship;

                draw_quad_icon();
                fpGraphEnv->Unuse();
        }

} /* QuadIcon::SetState */


/* ---------------------------------------------------------------------
        QuadIcon::draw_quad_icon - customized draw to control cases of
        highlighting and unhighlighting the QuadIcon.
--------------------------------------------------------------------- */
void QuadIcon::draw_quad_icon(void)
{
```

```
        assert(fpGraphEnv->IsInUse());

        GLColor savedForeColor;
        fpGraphEnv->GetForeColor(&savedForeColor);
        clear_quad_icon();

        fpGraphEnv->SetForeColor(kGLBlackClr);
        fpGraphEnv->FrameRect(fExtent);

        //      Add dividing lines

        fpGraphEnv->MoveTo(fExtent.left + fMidPoint, fExtent.top);
        fpGraphEnv->LineTo(fExtent.left + fMidPoint, fExtent.bottom-1);
        fpGraphEnv->MoveTo(fExtent.left, fExtent.top + fMidPoint);
        fpGraphEnv->LineTo(fExtent.right-1, fExtent.top + fMidPoint);

        //      Fill in colored portion

        if (fAnchorUnit && fPointedUnit && AP_UseColor()) {
                fpGraphEnv->SetForeColor(*fHilightColor);
                fpGraphEnv->PaintRect(fUnitRects[fAnchorUnit-1]);
                fpGraphEnv->PaintRect(fUnitRects[fPointedUnit-1]);
                fpGraphEnv->SetForeColor(savedForeColor);
        }

        //      Draw Dot & Arrow...

        if (fAnchorUnit) {
                GLRect anchorRect          = fUnitRects[fAnchorUnit-1];
                GLRect pointedRect         = fUnitRects[fPointedUnit-1];

                // draw the line...

                short midUnit = (fMidPoint / 2) - 1;

                fpGraphEnv->MoveTo(anchorRect.left+midUnit, anchorRect.top+midUnit);
                fpGraphEnv->LineTo(pointedRect.left+midUnit, pointedRect.top+midUnit);

                // fill dot with a nice red color...

                fpGraphEnv->SetForeColor(kRedClr);
                GLInsetRect(&anchorRect, 3, 3);
                fpGraphEnv->PaintOval(anchorRect);

                //      Draw the arrow...

                fpGraphEnv->SetForeColor(kGLBlackClr);
                draw_arrow(fPointedUnit);
                fpGraphEnv->SetForeColor(savedForeColor);
        }
} /* QuadIcon::draw_quad_icon */


/* -----------------------------------------------------------------------
        QuadIcon::clear_quad_icon - clears contents of the quad icon.
----------------------------------------------------------------------- */
void QuadIcon::clear_quad_icon(void)
{
        fpGraphEnv->SetForeColor(kGLWhiteClr);
        for (short q=0; q<=3; ++q)
                fpGraphEnv->PaintRect(fUnitRects[q]);
        fpGraphEnv->SetForeColor(kGLBlackClr);

} /* QuadIcon::clear_quad_icon */


/* -----------------------------------------------------------------------
        QuadIcon::draw_arrow
----------------------------------------------------------------------- */
void QuadIcon::draw_arrow(short arrowUnit)
{
        GLRect unitRect = fUnitRects[arrowUnit-1];
        Rgn* theArrow = fArrowRgns[arrowUnit-1][fRelationship];
        theArrow->Offset(unitRect.left, unitRect.top);
        fpGraphEnv->PaintRgn(*theArrow);
        theArrow->Offset(-unitRect.left, -unitRect.top);

} /* QuadIcon::draw_arrow */

/* -----------------------------------------------------------------------
        QuadIcon::draw_item - draws our QuadIcon
----------------------------------------------------------------------- */
void QuadIcon::draw_item(GL_ENV_REF env, const Rgn& updateRgn)
{
        draw_quad_icon();

} /* QuadIcon::draw_item */


#pragma segment main
```

```
/* -----------------------------------------------------------------------
        QUADICON.H
        Quad Icon Item class
        Copyright (C) 1993 Screenplay Systems Inc.
        Revised:        $Id$
------------------------------------------------------------------------- */

#pragma once

#ifndef __QUADICON__
#define __QUADICON__

#include "consts.h"
#include "titem.h"

#pragma segment quadicon

/* -----------------------------------------------------------------------
        QuadIcon - item which encapsulates a graphic quad.
------------------------------------------------------------------------- */
class QuadIcon : public TItem {
public:
        // CONSTRUCTION/DESTRUCTION
        QuadIcon(ItemList* pParent, const GLRect *extent = NULL, const GLColor* hilightColor = &kGLBlackClr);
        ~QuadIcon(void);

        // PUBLIC UTILITIES
        virtual char*           ClassName(void) const       { return "QuadIcon"; }
        virtual class_t         ClassType(void) const       { return kQuadIcon; }
        virtual bool_t          IsOfType(const void *pType) const { return *(class_t*) pType == kQuadIcon ||
TItem::IsOfType(pType); }
        virtual TObject*        Duplicate(void) const       { return new QuadIcon(*this); }
        virtual byte_cnt        GetObjSize(void)            { return sizeof(QuadIcon); }

        virtual err_t           Read(TFile &pFile)                  {}
        virtual err_t           Write(TFile &pFile)                 {}

        void            SetState(short state, short anchorUnit, int relationship);

protected:
        // DATA MEMBERS

        WINDOW_REF              fWindowRef;                     // Saved for convenience
        GLColor*                fHilightColor;          // color of highlighted quad area

        short                   fState;                         // 0, at rest.  1, indicating
        short                   fAnchorUnit;            // 1-4, which unit is "anchored"
        short                   fPointedUnit;           // 1-4, which unit is being pointed to
        int                             fRelationship;          // What type of relationship is being
displayed...

        gl_coord_t              fMidPoint;                      // Middle of height and width
        GLRect                  fUnitRects[4];          // Rect for each unit
        Rgn*                    fArrowRgns[4][3];       // One region for each arrow

        // LOCAL ROUTINES
                        void            draw_quad_icon(void);
                        void            clear_quad_icon(void);
                        void            draw_arrow(short arrowUnit);
        virtual void            draw_item(GL_ENV_REF env, const Rgn& updateRgn);

}; /* QuadIcon */

#pragma segment main

#endif /* __QUADICON__ */
```

```
/*******************************************************************
        QUADVIEW.CC
        Generalized Quad View Class
        (c) 1993 Screenplay Systems
        Authors:            S. Greenfield & C. Huntley
        Created:            May 4, 1993
        Revised:            $Id$
********************************************************************

*/

#include "tappl.h"
#include "appdlogs.h"
#include "graphics.h"
#include "tview.h"
#include "graphutl.h"

#include "ptext.h"
#include "miscutil.h"
#include "dramatic.h"
#include "document.h"

#include "structs.h"
#include "address.h"
#include "semtable.h"
#include "storypnt.h"
#include "relation.h"
#include "castlist.h"
#include "buildchr.h"
#include "quadview.h"

#pragma segment quadview

/* -------------------------------------------------Stephen---03/19/93---
        QuadView::Constructor
------------------------------------------------------------------------- */
QuadView::QuadView(ItemList* pParent, vw_flags vflags, const GLRect *extent, it_flags iflags, const GLColor *color)
            : TView(pParent, vflags, extent, iflags, color),
              fSelectionExists (false),
                    fQVDataHdl (NULL),
                    fWhichSelected (0),
                    fRelationshipsDrawn (false),
                    fPauseDragTime (0)
{
//      init_scrollers();

        fApp            = (Dramatica*)AP_Data()->fApp;
        fAppPFMFile = ((Dramatica*)fApp)->GetPFMFile();
        fDoc            = (DRDoc*)GetDoc();
        assert(fDoc);
        fResponses      = fDoc->GetRESP();
        fWindow         = (BCWindow*)pParent->GetParent();
        fWindowRef      = GetParentWindowRef();

        fQVExtent       = *extent;

        fLastMousePt.x  = 0;
        fLastMousePt.y  = 0;
}


/* -------------------------------------------------Stephen---03/19/93---
        QuadView::Destructor
------------------------------------------------------------------------- */
QuadView::~QuadView(void)
{
        save_characteristics();
        destruct_QuadView_data();
}


/* -------------------------------------------------Stephen---05/27/93---
        QuadView::init_QuadView_data  - sets up our QuadView
------------------------------------------------------------------------- */
void QuadView::init_QuadView_data(AddrPtr theAddr, short whichSet, short nmUnits, short rows, short cols)
{
        if (fQVDataHdl)
                destruct_QuadView_data();

        fWhichSet = whichSet;
        size_t allocSize = sizeof(QVDataType) * nmUnits;
        fQVDataHdl = MM_ALLOC_INIT(allocSize, mm_no_flags, 0, "QuadView Data", NULL);
        assert(fQVDataHdl);
        fQVData = (QVDataType*)MM_USE(fQVDataHdl);

        strcpy(fAddr, theAddr);
        short viewDiameter;
        short setFlag;
        short unitSize;
        short border;
        short quadSpacer;
        short setSpacer;
        short t, l;
//      short leftover;

        fNmOfUnits      = nmUnits;
        fRows           = rows;
        fCols           = cols;
        border          = 4;
        quadSpacer      = 4;
        setSpacer       = 8;
        setFlag         = 0;

        fHeight         = fQVExtent.bottom - fQVExtent.top;
        fWidth          = fQVExtent.right - fQVExtent.left;

        viewDiameter = MIN( fHeight, fWidth);
        t = l = border;
        if (fWidth > fHeight) {
                l += ((fWidth-fHeight)/2);
        } else {
                t += ((fHeight-fWidth)/2);
```

```
	}

	if (nmUnits == 4) {
		quadSpacer = setSpacer = 0;
		unitSize = ((viewDiameter-(2*border))/2);
//		leftover += ((viewDiameter-(2*border)) % 2);
//		t += leftover/2;
//		l += leftover/2;
	} else if (nmUnits == 16) {
		setSpacer = 0;
		unitSize = ((viewDiameter-(2*border)-quadSpacer)/4);
//		leftover += ((viewDiameter-(2*border)-quadSpacer) % 4);
//		t += leftover/2;
//		l += leftover/2;
//		quadSpacer += (leftover % 2);
		setFlag = 1;
	} else {						// 64 units
		unitSize = ((viewDiameter-(2*(border+quadSpacer))-setSpacer)/8);
//		leftover += ((viewDiameter-(2*(border+quadSpacer))-setSpacer) % 8);
//		t += leftover/2;
//		l += leftover/2;
//		setSpacer += (leftover % 2);
	}

	short		x, y;		// XY coordinates to address within a Quad
	short		xx, yy;		// XY coordinate to address within a Set
	short		lOffset;
	short		tOffset;
	int		unit;
	AddrText	maskAddr;

	strcpy(maskAddr, fAddr);
	maskAddr[ITEMSZ] = '0';			// Choose an item of unit size
	int ItemSize	= ADDR_ITEMSIZE(fAddr);
	int level		= Addr2Level(fAddr);
	assert(ItemSize > 0 && ItemSize < 4);

	lOffset = fQVExtent.left+l;
	tOffset = fQVExtent.top+t;
	unit = 0;

	short varIndex	= 0;
/*************************************** a set ***************************************/
	for (yy=0; yy<=setFlag; ++yy) {
		for (xx=0; xx<=setFlag; ++xx) {
			if (ItemSize == 2)
				maskAddr[level-2] = ++varIndex + '0';
/*************************************** a quad ***************************************/
			short elemIndex	= 0;
			for (y=0; y<=1; ++y) {
				for (x=0; x<=1; ++x) {
					assert(unit >=0 && unit < nmUnits);
					GLSetRect(&fQVData[unit].unitRect, tOffset+(y*unitSize),
lOffset+(x*unitSize), tOffset+(y*unitSize)+unitSize, lOffset+(x*unitSize)+unitSize);
					maskAddr[level-1] = ++elemIndex + '0';
					SetUnitData(unit, fAddr, maskAddr);
					++unit;
				}
			}
/*************************************** end of a quad ***************************************/
			lOffset += (2*unitSize)+quadSpacer;
		}
		tOffset += (2*unitSize)+quadSpacer;
		lOffset -= (4*unitSize)+(2*quadSpacer);
	}
/*************************************** end of a set ***************************************/

	init_characteristics();			// Sets up any character that should be on a unit

}

/* --------------------------------------------------Stephen---05/27/93---
	QuadView::SetUnitData  - sets specific data within each unit
---------------------------------------------------------------------------- */
void QuadView::SetUnitData(short unit, AddrPtr actualAddr, AddrPtr maskAddr)
{
	int ItemSize	= ADDR_ITEMSIZE(actualAddr);
	int targetIndex = Addr2Level(actualAddr)-1-ItemSize;

	int i;
	for (i=0; i<targetIndex; ++i)
		maskAddr[i] = actualAddr[i];

	strcpy(fQVData[unit].theAddr, maskAddr);
	Unit* theUnit = Addr2Item(RefSC, maskAddr);
	fQVData[unit].semVal = SEMELEM_LIMIT_TO_148(theUnit->semVal);

	fQVData[unit].assigned		= false;
	fQVData[unit].charPictID	= 0;
	fQVData[unit].quadPos		= Addr2QuadPos(maskAddr);
}


/* --------------------------------------------------Stephen---05/27/93---
	QuadView::init_characteristics  - restores characters to their quads
---------------------------------------------------------------------------- */
void QuadView::init_characteristics(void)
{
	short semValTbl[16];
	short nmOfCharacteristics;
	short whichChar;

	for (whichChar=0; whichChar < fDoc->GetNmCharacters(); ++whichChar) {
		nmOfCharacteristics = fDoc->GetCharacteristics(whichChar, fWhichSet, (short*)&semValTbl);
		if (nmOfCharacteristics) {
			PText* charPT = fDoc->GetCharPT(whichChar);
			short charPictID;
			charPT->GetParam("Pix", 's', &charPictID);
			short unit;
```

```
                        short n;
                        for (n=0; n<nmOfCharacteristics; ++n)
                                for (unit=0; unit < fNmOfUnits; ++unit) {
                                        if (fQVData[unit].semVal == SEMELEM_LIMIT_TO_148(semValTbl[n])) {       //
Make sure we've got an 85-148 here!
                                                fQVData[unit].assigned = true;
                                                fQVData[unit].whichChar = whichChar;
                                                fQVData[unit].charPictID = charPictID;
                                        }
                                }
                }
        }
}


/* -------------------------------------------------Stephen---05/27/93---
        QuadView::destruct_QuadView_data  - sets up our QuadView
---------------------------------------------------------------------- */
void QuadView::destruct_QuadView_data(void)
{
        MM_UNUSE(fQVDataHdl);
        MMFree(fQVDataHdl);
        fSelectionExists = false;
        fQVDataHdl = NULL;
        fWhichSelected = 0;
}


/* ---------------------------------------------------------------------
        QuadView::save_characteristics  - For each character, accumulate the
        characteristics that have been chosen for this SET then write them out.
---------------------------------------------------------------------- */
void QuadView::save_characteristics(void)
{
        short semValTbl[16];

        for (short whichChar=0; whichChar < fDoc->GetNmCharacters(); ++whichChar) {
                short nmOfShorts = 0;
                for (short unit=0; unit < fNmOfUnits; ++unit) {
                        if (fQVData[unit].assigned)
                                if (whichChar == fQVData[unit].whichChar) {
                                        assert(fQVData[unit].semVal > 0);
                                        semValTbl[nmOfShorts++] = SEMELEM_LIMIT_TO_148(fQVData[unit].semVal);
                                }
                }

                fDoc->SetCharacteristics(whichChar, fWhichSet, semValTbl, nmOfShorts);
        }

#if 0
        char    tempStr [20];
        char    buildStr [100];
        char*   paramName;
        short   whichChar;

        for (whichChar=0; whichChar < fDoc->GetNmCharacters(); ++whichChar) {
                buildStr[0] = 0;
                short unit;
                for (unit=0; unit < fNmOfUnits; ++unit) {
                        if (fQVData[unit].assigned) {
                                if (whichChar == fQVData[unit].whichChar) {
                                        assert(fQVData[unit].semVal > 0);
                                        sprintf(tempStr, "%hd,",fQVData[unit].semVal);
                                        strcat(buildStr, tempStr);
                                }
                        }
                }

                //      Write the string out to a segment.  This is done on a character-by character basis

                buildStr[strlen(buildStr)-1] = 0;               // Wipe out extra comma
                assert (fWhichSet >= 0 && fWhichSet <= 3);
                switch (fWhichSet) {
                        case 0:  paramName = "Motv";
                                        break;
                        case 1:  paramName = "Meth";
                                        break;
                        case 2:  paramName = "Eval";
                                        break;
                        case 3:  paramName = "Purp";
                                        break;
                }
                PText* charPT = fDoc->GetCharPT(whichChar);
                if (buildStr[0])
                        charPT->SetParam(paramName, 'c', buildStr);
                else if (charPT->ParamExists(paramName))
                        charPT->RemoveParam(paramName);

                charPT->SaveSeg();
                if (charPT->WasSegModified()) {
                        fDoc->Set(TDoc::kDirty);
                        charPT->SegNowSaved();
                }
        }
#endif

} /* QuadView::save_characteristics */


/* -------------------------------------------------Stephen---05/27/93---
        QuadView::get_unit_rect  - Gets rect of a particular row & column
---------------------------------------------------------------------- */
void QuadView::get_unit_rect(short row, short col, GLRect* rect)
{

        short whichHQuad = col / 2;
        short whichVQuad = row / 2;

        rect->left                      = (fUnitWidth * (col-1)) + fColSpacer[whichHQuad];
        rect->right                     = rect->left + fUnitWidth;

        rect->top                       = (fUnitHeight * (row-1)) + fRowSpacer[whichVQuad];
```

```
        rect->bottom       = rect->top + fUnitHeight;

        GLOffsetRect(rect, fQVExtent.left, fQVExtent.top);

}


/* -------------------------------------------------Stephen---05/27/93---
        QuadView::draw_view - Does the bulk of drawing the QuadView.
---------------------------------------------------------------------------- */
void QuadView::draw_view (const VwPaneUpdateInfo& updateInfo)
{
        LgPoint          VwOrigin = *updateInfo.InqOffset();          // local coordinates for the view's origin

        gl_coord_t       X                          = (gl_coord_t)(VwOrigin.x);
        gl_coord_t       Y                          = (gl_coord_t)(VwOrigin.y);

        fpGraphEnv->SetTextAttr(21, 9, GL_NORMAL);                         // 21 is GL_HELVETICA


        int unit;
        for (unit = 0; unit < fNmOfUnits; ++unit) {
                GLRect theRect = fQVData[unit].unitRect;
//              fpGraphEnv->FrameRect(theRect);

//              fpGraphEnv->StrRect(fQVData[unit].theAddr, theRect, GL_JUST_CENTER, false);

                GLRect titleRect = theRect;
                titleRect.top += 46;
                fpGraphEnv->StrRect(SEMTBL_NAME(fQVData[unit].semVal), titleRect, GL_JUST_CENTER, false);

                CoolFrameRect(fpGraphEnv, &theRect, &kGLBevelUpPat, 3, &kGL25GrayClr, &kGL75GrayClr);

                if (fQVData[unit].assigned) {
                        draw_char_in_quad(&theRect, fQVData[unit].charPictID);

                }
        }

        if (fSelectionExists)
                CoolFrameRect(fpGraphEnv, &fQVData[fWhichSelected].unitRect, &kGLBevelUpPat, 3, &kRedClr, &kRedClr);

} /* OutlineView::draw_view */

/* -------------------------------------------------Stephen---03/19/93---
        OutlineView::draw_char_in_quad - draws the char pix in the quad.
---------------------------------------------------------------------------- */
void QuadView::draw_char_in_quad(GLRect* theRect, short charPictID)
{
        GLRect destRect = *theRect, sourceRect;
        Bitmap* charPict = fDoc->UseCharPICT(charPictID);
                gl_coord_t               stdCharPictHeight          = fDoc->GetStdCharPictHeight();
                gl_coord_t               stdCharPictWidth  = fDoc->GetStdCharPictWidth();
                destRect.left += ( CL_WIDE - stdCharPictWidth ) / 2;                    // center bitmap horizontally
                destRect.right = destRect.left + stdCharPictWidth;
                destRect.top += 11;
                destRect.bottom = destRect.top + stdCharPictHeight;

                sourceRect.left = 0;
                sourceRect.top = 0;
                sourceRect.bottom = charPict->GetHeight();
                sourceRect.right = charPict->GetWidth();

                charPict->CopyToScreen( fWindowRef, &destRect, &sourceRect );
        fDoc->UnuseCharPICT(charPict);

} /* QuadView::draw_char_in_quad *//* modified Gary - 3/10/94 */

#if 0
/* -------------------------------------------------Stephen---03/19/93---
        OutlineView::Resize -
---------------------------------------------------------------------------- */
void QuadView::Resize(void *pNewSize, TObject *pSender)
{
//      TView::Resize(pNewSize, pSender);
        GLRect myBounds;
        GetParentWindow()->GetPortRect(&myBounds);
//      myBounds.bottom-=14;
        myBounds.bottom+=1;
        myBounds.top-=1;
        myBounds.left-=1;
        myBounds.right+=1;
        SetBounds(&myBounds);
}
#endif



/* -------------------------------------------------Stephen---04/19/93---
        QuadView::DoItemHit - handles mouse-down events in the QuadView.
---------------------------------------------------------------------------- */
bool_t QuadView::DoItemHit(EVENT_REC *pEvt, GLPoint mousePt)
{
        bool_t           isDblClick = AP_DblClick(pEvt);
        static short     lastItem = -1;

        if (!TView::DoItemHit(pEvt, mousePt)) {
                short               whichItem;
                QVDataType* QVPtr;
                bool_t inItem = Pt2Item(mousePt, &whichItem, &QVPtr);
                if (inItem) {
                        fpGraphEnv->Use();

                        Highlight(whichItem, true);

                        GLRect textRect = fWindow->GetContextRect();
                        TextWrap*         defTW;
                        Unit *theUnit;
                        GLRect   windBounds;
//                      GLRect clearTextRect;
                        fWindow->GetPortRect(&windBounds);
```

```
                              theUnit = Addr2Item(RefSC, QVPtr->theAddr);

//                            GLSetRect(&clearTextRect, 2, 102, 34, windBounds.right-16-2);
                              fpGraphEnv->SetForeColor(kGLWhiteClr);
                              fpGraphEnv->PaintRect(textRect);
                              fpGraphEnv->SetForeColor(kGLBlackClr);

                              if ((lastItem == whichItem) && isDblClick) {
                                      QVPtr->assigned             = false;
                                      AP_InvalGLRect(GetParentWindow()->GetWindowRef(), &QVPtr->unitRect);
                              }

//                            GLSetRect(&textRect, 0, 0, 32, windBounds.right-124-30);
                              char tempStr[200];
                              sprintf(tempStr,"(SNF(%hd)):  (SDF(%hd)).",theUnit->semVal, theUnit->semVal);
                              defTW = new TextWrap(fDoc, fpGraphEnv, &textRect, tempStr, GL_GENEVA, 9);              //
21 == GL_HELVETICA
                              defTW->Draw(fpGraphEnv, NULL, kNeverPrint, 4, 112);
                              delete defTW;

                              draw_relationships(false, whichItem);

                              lastItem = fOverItem = whichItem;

#if 0
                              fpGraphEnv->MoveTo(135, 20);
                              char tempStr[100];
                              sprintf(tempStr,"x = %hd, y = %hd, unit = %hd   Addr = %s    ",mousePt.x, mousePt.y,
whichItem, QVPtr->theAddr);
                              fpGraphEnv->DrawStr(tempStr);
#endif
                              fpGraphEnv->Unuse();
                      }

        }
        return (true);
} /* DoItemHit */


/* -------------------------------------------------Stephen---05/29/93---
        QuadView::Pt2Item - Given a point, returns TRUE if over an item, and
        which Item, plus ptr to the record.
------------------------------------------------------------------------- */
bool_t QuadView::Pt2Item(GLPoint mousePt, short* whichItem, QVDataType** QVDataPtr)
{
        int i;
        for (i=0; i<fNmOfUnits; ++i)
                if (GLPtInRect(mousePt, &fQVData[i].unitRect)) {
                        *whichItem = i;
                        *QVDataPtr = &fQVData[i];
                        return (true);
                }
        return (false);
}


/* -------------------------------------------------Stephen---05/29/93---
        QuadView::RectInItem - Given a GLRect, returns TRUE if inside an item,
        and which Item, plus ptr to the record.
------------------------------------------------------------------------- */
bool_t QuadView::RectInItem(GLRect* theRect, short* whichItem, QVDataType** QVDataPtr)
{
        int i;
        for (i=0; i<fNmOfUnits; ++i)
                if (GLRectInRect(theRect, &fQVData[i].unitRect)) {
                        *whichItem = i;
                        *QVDataPtr = &fQVData[i];
                        return (true);
                }
                *whichItem = -1;
        return (false);
}


/* -------------------------------------------------------------------------
        QuadView::Highlight - Highlights a particular rectangle.
------------------------------------------------------------------------- */
void QuadView::Highlight(short whichItem, bool_t highlightOn)
{
        fpGraphEnv->Use();

        if (fSelectionExists) {
                if (highlightOn && whichItem == fWhichSelected)         {               // Don't re-select same rect!
                        fpGraphEnv->Unuse();
                        return;
                }

                CoolFrameRect(fpGraphEnv, &fQVData[fWhichSelected].unitRect, &kGLBevelUpPat, 3, &kGL25GrayClr,
&kGL75GrayClr);
                fSelectionExists = false;
        }

        if (highlightOn) {
                CoolFrameRect(fpGraphEnv, &fQVData[whichItem].unitRect, &kGLBevelUpPat, 3, &kRedClr, &kRedClr);
                fSelectionExists = true;
                fWhichSelected = whichItem;
        }
        fpGraphEnv->Unuse();
}


/* -------------------------------------------------------------------------
        QuadView::CastToQuadDragEvent - handles events when users drags from
        the castlist over a QuadView.
------------------------------------------------------------------------- */
void QuadView::CastToQuadDragEvent(GLPoint mousePt, short whichEvent)
{
        short whichItem = 0;
        QVDataType* QVPtr;
```

```
        GLRect pictRect;
        pictRect.top      = mousePt.y - 3;         // Adding 3 makes sure we are "within" the "cool frame"
        pictRect.left     = mousePt.x - 3;
        pictRect.bottom   = mousePt.y + 35;
        pictRect.right    = mousePt.x + 35;

        if (!(GLRectInRect(&pictRect, &fQVExtent))) {                          // Is our picture rect over the
QuadView?
                GLRect notUsedRect;
                if (!GLSectRect(&pictRect, &fQVExtent, &notUsedRect))        // NO -- but make sure we're not
intersecting it, either
                        Highlight(whichItem, false);                                       // Not
intersecting any quad -- deselect if selected
        } else {
                bool_t inItem = RectInItem(&pictRect, &whichItem, &QVPtr);
                if (inItem) {
                        fOverItem = whichItem;
                        if (fLastItem != whichItem) {
                                Highlight(whichItem, true);

                                fpGraphEnv->Use();
                                draw_char_usage_info(fWhichSet, QVPtr->theAddr);
                                fRelationshipsDrawn = false;
                                fPauseDragTime = 0;
//                              draw_relationships(true, fOverItem);

                                #if 0
                                        fpGraphEnv->MoveTo(135, 20);
                                        char tempStr[150];
                                        fQVDragCharPT->UseDataPool();
                                        sprintf(tempStr,"Character '%s', over Item = %hd, address = %s
",fQVDragCharPT->PID2Ptr(fQDDragCharNmPID), whichItem, QVPtr->theAddr);
                                        fpGraphEnv->DrawStr(tempStr);
                                        fQVDragCharPT->UnuseDataPool();
                                #endif

                                fpGraphEnv->Unuse();
                        }
                        else if (!fRelationshipsDrawn && (mousePt.x == fLastMousePt.x) &&  (mousePt.y ==
fLastMousePt.y)) {
                                if (fPauseDragTime == 0)
                                        fPauseDragTime = AP_TickCount();
                                if (AP_TickCount() - fPauseDragTime > 10) {
                                        fpGraphEnv->Use();
                                        draw_relationships(true, fOverItem);
                                        fRelationshipsDrawn = true;
                                        fpGraphEnv->Unuse();
                                        fPauseDragTime = 0;
                                }
                        }

                        if (whichEvent == kQVDropEvent) {
                                fQVData[whichItem].assigned                 = true;
                                fQVData[whichItem].charPictID        = fQVDragCharPixID;
                                fQVData[whichItem].whichChar         = fQVDragCharID;
                                draw_char_in_quad(&fQVData[whichItem].unitRect, fQVDragCharPixID);
                        }
                }
                fLastItem = whichItem;
                fLastMousePt = mousePt;
        }

} /* QuadView::CastToQuadDragEvent */


static char *motivationStr1 = "the basic motivations of";
static char *methodologyStr1 = "the approach of";
static char *evaluationStr1 = "evaluating progress in terms of";
static char *purposeStr1 = "the drive to achieve";
static char *representsStr = "represents";

/* ------------------------------------------------------------------------
        QuadView::set_to_string - return the string associated with the
        currently selected set (Motivation, Methodology, Evaluation, Purpose)
--------------------------------------------------------------------------- */
char* QuadView::set_to_string(short whichSet)
{
        switch (whichSet) {
                case 0:         return motivationStr1;
                case 1:         return methodologyStr1;
                case 2:         return evaluationStr1;
                case 3:         return purposeStr1;
        }

} /*  QuadView::set_to_string */


/* ------------------------------------------------------------------------
        QuadView::draw_char_usage_info - this function creates the context of the
        character placed over any particular unit and draws the text string.
        whichSet        =       the type of set this is, i.e. motivation, methodology, etc.
--------------------------------------------------------------------------- */
void QuadView::draw_char_usage_info(short whichSet, AddrPtr quadAddr)
{
        Unit *theUnit;
        TextWrap*          usageTW;
        char tmpStr[200];
        char *part1Str;
        char charName[50];

        theUnit = Addr2Item(RefSC, quadAddr);

        fQVDragCharPT->UseDataPool();
        strcpy(charName,fQVDragCharPT->PID2Ptr(fQDDragCharNmPID));
        fQVDragCharPT->UnuseDataPool();

        part1Str = set_to_string(whichSet);

        sprintf(tmpStr,"%s %s %s \"(SNF(%hd)\" -- (SDF(%hd)).", charName, representsStr, part1Str, theUnit->semVal,
theUnit->semVal);

        GLRect textRect = fWindow->GetContextRect();
        GLInsetRect(&textRect, 1, 1);
```

```
        fpGraphEnv->SetForeColor(kGLWhiteClr);
        fpGraphEnv->PaintRect(textRect);
        fpGraphEnv->SetForeColor(kGLBlackClr);

        usageTW = new TextWrap(fDoc, fpGraphEnv, &textRect, tmpStr, 21, 9);          // 21 == GL_HELVETICA
        usageTW->Draw(fpGraphEnv, NULL, kNeverPrint, 4, textRect.left);
        delete usageTW;
} /* QuadView::draw_char_usage_info */


/* ---------------------------------------------------------------------
        QuadView::draw_relationships - handles all drawing and updating
        related to the relationship quads.
------------------------------------------------------------------------ */
void QuadView::draw_relationships(bool_t dragging, short whichItem)
{
        QVDataType* anchorData = &fQVData[whichItem];
        short anchorUnit = anchorData->quadPos;
        (fWindow->GetDynamicIcon())->SetState(1, anchorUnit, DYNAMIC);
        (fWindow->GetCompanionIcon())->SetState(1, anchorUnit, COMPANION);
        (fWindow->GetDependentIcon())->SetState(1, anchorUnit, DEPENDENT);


        //      Get character name we are dragging.  If not dragging, use name assigned to square

        char charName1[50];
        if (dragging) {
                fQVDragCharPT->UseDataPool();
                strcpy(charName1,fQVDragCharPT->PID2Ptr(fQDDragCharNmPID));
                fQVDragCharPT->UnuseDataPool();
                strcat(charName1, "'s ");
        }
        else {
                if (anchorData->assigned)
                        sprintf(charName1, "(CNN(%hd,NM))'s ", anchorData->whichChar);
                else
                        strcpy(charName1, "The ");
        }

        char dynamicText[300];
        QVDataType* dynamicData = get_relationship_unit(whichItem, DYNAMIC);
        build_relationship_text(dynamicText, DYNAMIC, anchorData, charName1, dynamicData);

        char companionText[300];
        QVDataType* companionData = get_relationship_unit(whichItem, COMPANION);
        build_relationship_text(companionText, COMPANION, anchorData, charName1, companionData);

        char dependentText[300];
        QVDataType* dependentData = get_relationship_unit(whichItem, DEPENDENT);
        build_relationship_text(dependentText, DEPENDENT, anchorData, charName1, dependentData);

        fWindow->UseGraphEnv();
        fWindow->EraseRelationshipText();
        fWindow->SetRelationshipText(dynamicText, DYNAMIC);
        fWindow->SetRelationshipText(companionText, COMPANION);
        fWindow->SetRelationshipText(dependentText, DEPENDENT);
        fWindow->UnuseGraphEnv();

} /* QuadView::draw_relationships */


/* ---------------------------------------------------------------------
        QuadView::build_relationship_text - given a few parameters, does
        all the hard work of actually assembling the relationship text.
------------------------------------------------------------------------ */
void QuadView::build_relationship_text(char* destText, int relationship, QVDataType* anchorData, char* charName1,
QVDataType* pointedData)
{
        char charName2[50];
        if (pointedData->assigned)
                sprintf(charName2, "(CNN(%hd,NM))'s ", pointedData->whichChar);
        else
                strcpy(charName2, "the ");

        char setText1[60];
        semval_t semVal = anchorData->semVal;
        get_set_relationship_text(setText1, fWhichSet, semVal);

        char setText2[60];
        semVal = pointedData->semVal;
        get_set_relationship_text(setText2, fWhichSet, semVal);

        strcpy(destText, "«M(40,4,3)»\n\n");                           // Set up margins
        strcat(destText, charName1);                                            // (NAME 1)          -
"Chewie's "
        strcat(destText, setText1);                                                     // (Set Text 1)  -
"Motivation to Avoid"

        strcat(destText, get_pair_text(relationship));          // (Pair Text)          - " is in conflict with "

        strcat(destText, charName2);                                            // (NAME 2)          -
"Luke's "
        strcat(destText, setText2);                                                     // (Set Text 2)  -
"Motivation to Pursue"

} /* QuadView::build_relationship_text */


/* ---------------------------------------------------------------------
        QuadView::get_set_relationship_text
------------------------------------------------------------------------ */
void QuadView::get_set_relationship_text(char* setText, short whichSet, semval_t semVal)
{
        switch (whichSet) {
                case 0:  sprintf(setText, "motivation to (SVB(S,%hd,INF))", semVal);
                                 break;
                case 1:  sprintf(setText, "methodology of (SNN(%hd))", semVal);
                                 break;
                case 2:  sprintf(setText, "evaluation in terms of (SNN(%hd))", semVal);
                                 break;
                case 3:  sprintf(setText, "purpose of (SNN(%hd))", semVal);
                                 break;
```

```
        }
} /* QuadView::get_set_relationship_text */

/* ------------------------------------------------------------------------
        QuadView::get_pair_text - returns the bridging pair text used for the
        relationship text.
------------------------------------------------------------------------ */
char* QuadView::get_pair_text(int relationship)
{
        char* pairText;
        switch (relationship) {
                case DYNAMIC:       pairText = " is in conflict with ";
                                                        break;
                case COMPANION:     pairText = " is compatible with ";
                                                        break;
                case DEPENDENT:     pairText = " contrasts ";
                                                        break;
        }
        return (pairText);

} /* QuadView::get_pair_text */


/* ------------------------------------------------------------------------
        QuadView::get_relationship_unit - returns a pointer to the unit with
        the desired relationship to the specified unit.
------------------------------------------------------------------------ */
QVDataType* QuadView::get_relationship_unit(short whichUnit, int relationship)
{
        short whichQuad    = whichUnit / 4;
        short quadPos              = (whichUnit - (whichQuad * 4)) + 1;
        short desiredUnit          = (whichQuad * 4) + (GetPartnerUnit(relationship, quadPos) - 1);
        return (&fQVData[desiredUnit]);

} /* QuadView::get_relationship_unit */


/* ------------------------------------------------------------------------
        QuadView::SetQVDragCharacter - Called by CastListView, this function
        registers which character is being dragged by the user.
------------------------------------------------------------------------ */
void QuadView::SetQVDragCharacter(short whichChar)
{
        assert(whichChar >=0 && whichChar < 999);
        fQVDragCharID              = whichChar;
        fQVDragCharPT              = fDoc->GetCharPT(whichChar);
        assert(fQVDragCharPT);
        fQDDragCharNmPID  = fQVDragCharPT->GetParam("NM", 'c');
        assert(fQDDragCharNmPID != kParamNotFound);
        fQVDragCharPT->GetParam("Pix", 's', &fQVDragCharPixID);
        assert(fQVDragCharPT);
}



/* ------------------------------------------------------------------------
        QuadView::Print - prints the contents of the OutlineView.
------------------------------------------------------------------------ */
err_t QuadView::PrintView(Printing *pPrintMgr)
{
        LgPoint offset;
        offset.x = 0;                                                   // print in an unscrolled position.
        offset.y = 0;
        Rgn updateRgn;
        VwPaneUpdateInfo updateInfo(pPrintMgr->GetPrinterEnv()->InqEnvRef(), offset, updateRgn);
        draw_view(updateInfo);

        return NOERR;

} /* QuadView::PrintView */


#pragma segment main

/* xxxxxxxxxxxxxxxxxxxxxxxxxxxxxxxxxxxxxxxxxxxxxxxxxxxxxxxxxxxxxxxxxxxxxxx
 * $Log:          quadview.cc,v $
Revision 1.15  93/09/24  15:32:06  stephen
Cleaned up warnings.

Revision 1.14  93/06/23  18:01:02  chris
Added item definition when dragging.

Revision 1.13  93/06/04  23:09:36  stephen
Build Characters now remembers all of it's character assignments!

Revision 1.12  93/06/04  19:56:30  stephen
Worked on changing the QuadView when buttons are pushed.

Revision 1.11  93/06/02  16:09:27  chris
Hooked in characteristic definitions when clicking on quad items.

Revision 1.10  93/06/01  13:50:35  chris
Cleaned up characteristic set buttons.

Revision 1.9  93/06/01  09:16:24  stephen
Better dragging cosmetics.

Revision 1.8  93/05/31  18:14:36  chris
Added erasing of context info.

Revision 1.7  93/05/30  22:05:26  stephen
Implemented Basic QuadView mechanics...

Revision 1.6  93/05/29  22:02:12  stephen
Initializing of QuadVIew data with correct addrs.

Revision 1.5  93/05/29  18:54:53  stephen
More fundamental work...
```

```
Revision 1.4  93/05/28  15:47:34  chris
cleaned up init_quadview_data to draw quads better.

Revision 1.3  93/05/28  10:15:20  stephen
More work on QuadView class.

Revision 1.2  93/05/24  21:38:44  stephen
Minor changes.

Revision 1.1  93/05/18  11:22:28  stephen
Initial revision

 */
```

```
/* ------------------------------------------------------------------------
	QUADVIEW.H
	Generalized Quad View Class
	Copyright (C) 1993 Screenplay Systems Inc.
	Revised:		$Id$
------------------------------------------------------------------------ */

#pragma once

#ifndef __QUADVIEW__
#define __QUADVIEW__

#include "ItemList.h"
#include "pools.h"
#include "tview.h"
#include "consts.h"
#include "textwrap.h"
#include "structs.h"

#pragma segment quadview

class Dramatica;
class DRDoc;
class PText;
class BCWindow;

const	short	kQVDragEvent	= 1;
const	short	kQVDropEvent	= 2;


typedef struct {

	short		semVal;			// Semantic value of this unit
	AddrText	theAddr;		// Address of this unit's info
	pl_id		unitNamePID;	// Pool ID of unit's name
	GLRect		unitRect;		// Enclosing rectangle for this unit
	short		quadPos;		// Position of unit in quad
	bool_t		assigned;		// TRUE if this Quad has a picture assigned
	short		charPictID;		// Picture ID of character assigned
	short		whichChar;		// Which character is assigned

	short		row;			// Row of this unit
	short		col;			// Column of this unit

	bool_t		selected;		// Unit is currently selected
	bool_t		available;		// Unit is available for selection
	bool_t		dblClickOK;		// Unit can be double-clicked

} QVDataType;


/* ------------------------------------------------------------------------
	QuadView - Dramatica's generalized Quad view class.
------------------------------------------------------------------------ */
class QuadView : public TView {
public:
	// CONSTRUCTION/DESTRUCTION
	QuadView(ItemList* pParent, vw_flags vflags = kNoFlags, const GLRect *extent = NULL, it_flags iflags =
List::kNoFlags, const GLColor *color = &kGLBlackClr);
	~QuadView(void);

	// PUBLIC UTILITIES
	virtual char*		ClassName(void) const		{ return "QuadView"; }
	virtual class_t		ClassType(void) const		{ return kQuadView; }
	virtual bool_t		IsOfType(const void *pType) const { return *(class_t*) pType == kQuadView ||
TView::IsOfType(pType); }
	virtual TObject* Duplicate(void) const		{ return new QuadView(*this); }


	// ACTION PROCS

	// PUBLIC BEHAVIOR

	virtual void		init_QuadView_data(AddrPtr theAddr, short whichSet, short nmUnits, short rows, short cols);
	virtual void		SetUnitData(short unit, AddrPtr actualAddr, AddrPtr maskAddr);
	bool_t				Pt2Item(GLPoint mousePt, short* whichItem, QVDataType** QVDataPtr);
	bool_t				RectInItem(GLRect* theRect, short* whichItem, QVDataType** QVDataPtr);
	void				Highlight(short whichItem, bool_t highlightOn);
	void				SetQVDragCharacter(short whichChar);

	virtual void		Frame(void *env, TObject *pSender = NULL) {}		// TItem:: function.  Overriden here to
prevent framing of view
	virtual void		draw_view(const VwPaneUpdateInfo& updateInfo);
	void				CastToQuadDragEvent(GLPoint mousePt, short whichEvent);
	virtual err_t		PrintView(Printing *pPrintMgr);
//	virtual void		Resize(void *pNewSize, TObject *pSender);
	void				SaveView(void)			{ save_characteristics(); }

	GLRect				GetQVBounds(void)		{ return fQVExtent; }


protected:
	Dramatica*			fApp;
	DRDoc*				fDoc;
	BCWindow*			fWindow;
	WINDOW_REF			fWindowRef;
	pfm_fd_t			fAppPFMFile;
	PText*				fResponses;

	GLRect				fQVExtent;			// Rect of desired QuadView
	gl_coord_t			fHeight;			// Available vertical pixels
	gl_coord_t			fWidth;				// Available horizontal pixels
	gl_coord_t			fUnitHeight;		// Height of one unit
	gl_coord_t			fUnitWidth;			// Width of one unit

	AddrText			fAddr;				// Address of the desired Quad(s)
	short				fWhichSet;			// (0-3) Motivation, Methodology, Evaluation,
Purpose
	short				fNmOfUnits;			// Number of units visible
	short				fRows;				// Number of rows
	short				fCols;				// Number of columns
	short				fNmQuads;			// Number of Quads
	gl_coord_t			fColSpacer[5];		// Pixels that space columns apart for each resolution
```

```
        gl_coord_t              fRowSpacer[5];          // Pixels that space rows apart for each resolution

        hdl_t                   fQVDataHdl;                     // hdl to our QuadView data
        QVDataType*             fQVData;

        bool_t                  fSelectionExists;       // TRUE if the user has a selection
        short                   fRowSelected;           // contains # of row selected
        short                   fColSelected;           // contains # of column selected
        short                   fWhichSelected;         // Index of unit selected

        short                   fOverItem;                      // Set in CastToQuadDragEvent to indicate which
item we are over
        short                   fLastItem;                      // Used by CastToQuadDragEvent to indicate last
item we were over
        short                   fQVDragCharID;          // Set to indicate which character is being dragged
        PText*                  fQVDragCharPT;          // PText of the character we're dragging
        short                   fQVDragCharPixID;       // Picture ID for this character
        pl_id                   fQDDragCharNmPID;       // Name of character we're dragging

        GLPoint                 fLastMousePt;           // Last position mouse was in
        bool_t                  fRelationshipsDrawn;// A flag to prevent excessive relationship drawing
        long                    fPauseDragTime;         // Ticks since mouse paused

        // LOCAL UTILITIES
        void                    init_characteristics(void);
        void                    destruct_QuadView_data(void);
        void                    save_characteristics(void);
        void                    get_unit_rect(short row, short col, GLRect* rect);
        bool_t                  DoItemHit(EVENT_REC *pEvt, GLPoint mousePt);
        void                    draw_char_in_quad(GLRect* theRect, short charPictID);
        void                    draw_char_usage_info(short whichSet, AddrPtr quadAddr);

        void                    build_relationship_text(char* destText, int relationship, QVDataType* anchorData,
char* charName1, QVDataType* pointedData);
        void                    draw_relationships(bool_t dragging, short whichItem);
        char*                   set_to_string(short whichSet);
        void                    get_set_relationship_text(char* setText, short whichSet, semval_t semVal);
        char*                   get_pair_text(int relationship);
        QVDataType*             get_relationship_unit(short whichUnit, int relationship);

}; /* QuadView */


#pragma segment main

/* xxxxxxxxxxxxxxxxxxxxxxxxxxxxxxxxxxxxxxxxxxxxxxxxxxxxxxxxxxxxxxxxxxxxxxxxx
 * $Log:        quadview.h,v $
 * Revision 1.7  93/06/04  23:10:03  stephen
 * Build Characters now remembers all of it's character assignments!
 *
 * Revision 1.6  93/05/31  18:14:59  chris
 * Added erasing of context info.
 *
 * Revision 1.5  93/05/30  22:05:44  stephen
 * Implemented Basic QuadView mechanics...
 *
 * Revision 1.4  93/05/29  18:55:03  stephen
 * More fundamental work...
 *
 * Revision 1.3  93/05/28  10:15:34  stephen
 * More work on QuadView class.
 *
 * Revision 1.2  93/05/24  21:40:11  stephen
 * Minor changes.
 *
 * Revision 1.1  93/05/18  11:22:40  stephen
 * Initial revision
 *
 */

#endif /* __QUADVIEW__ */
```

```
/*******************************************************************
        QUERY.CC
        Define and pre-initialize the Query Q & A Table
        (c) 1993 Screenplay Systems
        Authors:        S. Greenfield & C. Huntley
        Created:        January 28, 1993
        Revised:        $Id$
*******************************************************************

*/

#include <stdio.h>
#include <stdlib.h>
#include <string.h>
#include <time.h>

#include "genutls.h"
#include "pfm.h"

#include "tappl.h"
#include "appdlogs.h"

#include "document.h"
#include "structs.h"
#include "semtable.h"
#include "justify.h"
#include "address.h"
#include "apprec.h"
#include "query.h"
#include "relation.h"
#include "opquad.h"


/*      Change or Steadfast?
        Success or Failure?
        Good or Bad?
        Start or Stop?
        Action or Decision?
        Spacelock or Timelock?
        Do-er or Be-er?
        Male or Female?   */


static void AskQuestion(int theQuestion);
static void PRResponses(void);
static void PRWordWrap(char* theString);
static short *excludeTesterChoices(DRDoc* theDoc, short justification);

static void build2ndAddr(DRDoc* theDoc, enum OPJUSTS justification, AddrPtr firstAddr);           /****** 4/7/93
******/


/* ----------------------------------------------------------------------
        FUNCTION:       AllResponseCombos
        Purpose:        Generate all combinations of responses to all of the questions.
---------------------------------------------------------------------- */
const short             maxStoryTables          = 41;   // Total number of story tables we can load
static short*   excludedChoices;                        // Moved out of AllResponseCombos() and made static due to MPW C
bug ("Seize Register Protocol Error")

void AllResponseCombos(DRDoc* theDoc, SuperClass *just1SC, SuperClass *just2SC)
{
        ushort                  a, b, c, d, e, f, g, h;
        ushort                  i, j, k, m;
        ushort                  howMany;
        short                   nature, essence, tendency, reach;
        enum OPJUSTS    justification;
        AddrText                testerAddr;
        char                    s[80];

        GN_FileRef              FRef;
        err_t                   theErr;

        hdl_t apprecCopyHdl = theDoc->CopyAppreciations();
        theDoc->ClearAppreciations();

        pfm_fd_t currentFile = PFMGetCurrentFile();
        #ifdef TOOLBOX
                char* filename = "Story Engine";
        #else
                char* filename = "engine.pfm";
        #endif
        GN_InitFileRef(&FRef, filename, PFM_OVERWRITE, DEFAULT_VOL);
        pfm_fd_t PFMFile = PFMOpenFile(&FRef);
        assert(PFMFile != PFM_NO_FILE);

        ushort  id;
        hdl_t   tableHandles[maxStoryTables];           // handles to all the tables
        uchar*  pTables[maxStoryTables];                // Pointers to the tables we're building

        for (id=0; id<maxStoryTables; ++id) {
                tableHandles[id] = MM_ALLOC_INIT(32768, mm_no_flags, 0, "Storytable segment", NULL);
                assert(tableHandles[id]);
                pTables[id] = (uchar*)MM_USE(tableHandles[id]);

                assert(pTables[id] != PFM_NO_SEG);
        }


        howMany=0;

        ProgressDlog* progDlog = new ProgressDlog();

        for (a=1; a<=2; ++a) {
                if (a==1)
                        justification = OP_OBJECTIVE;
                else
                        justification = OP_SUBJECTIVE;
                theDoc->SetApprValByIndex(kApprResolve, (a + rApprResolve));
                // Resolve
                for (b=1; b<=2; ++b) {
                        theDoc->SetApprValByIndex(kApprOutcome, (b + rApprOutcome));
                // Outcome
```

```
                    for (c=1; c<=2; ++c) {
                            theDoc->SetApprValByIndex(kApprJudgment, (c + rApprJudgment));
                    // Judgment
                            for (d=1; d<=2; ++d) {
                                    theDoc->SetApprValByIndex(kApprDirection, (d + rApprDirection));
            // Direction
                                    for (e=1; e<=2; ++e) {
                                            theDoc->SetApprValByIndex(kApprWork, (e + rApprWork));
                            // Work
                                            for (f=1; f<=2; ++f) {
                                                    theDoc->SetApprValByIndex(kApprLimit, (f + rApprLimit));
                    // Limit
                                                    for (g=1; g<=2; ++g) {
                                                            theDoc->SetApprValByIndex(kApprApproach, (g +
rApprApproach)); // Approach
                                                            for (h=1; h<=2; ++h) {
                                                                    theDoc->SetApprValByIndex(kApprSex, (h +
rApprSex));             // Sex
                                                                    excludedChoices =
excludeTesterChoices(theDoc, justification);            /* zero is Objective justification */
                                                                    nature    = getNatureApprec(theDoc);
                                                                    essence   = getEssenceApprec(theDoc);
                                                                    tendency  = getTendencyApprec(theDoc);
                                                                    reach     = getReachApprec(theDoc);
                                                                    for (i=0; i<=3; ++i) {
                                                                            if (excludedChoices[i] != TRUE)
{                                               /* if this is NOT excluded... */
                                                                                    strcpy(testerAddr,
"00000");
                                                                                    testerAddr[CLASS] = i
+ '1';
                                                                                    for (j=1; j<=4; ++j) {
        testerAddr[TYPE] = j + '0';
                                                                                            for (k=1;
k<=4; ++k) {
        testerAddr[VAR] = k + '0';
                                                                                                    for
(m=1; m<=4; ++m) {
        testerAddr[ELEM] = m + '0';
        build2ndAddr(theDoc, justification, testerAddr);        /* 4/7/93 */    /*•  *just1SC = *RefSC; */
        SetAllAppreciations(theDoc);                                    /* 4/7/93 */    /*•
JustifyStory(just1SC, just2SC, TRUE, testerAddr); */

        uchar skewBiasByte = 0;
        skewBiasByte |=  (a-1);                         // Resolve: change/steadfast
        skewBiasByte |= ((d-1) << 1);           // Direction: start/stop
        skewBiasByte |= ((g-1) << 2);           // Approach: doer/beer
        skewBiasByte |= ((h-1) << 3);           // Sex: male/female
        skewBiasByte |= ((e-1) << 4);           // Work: action/decision
        skewBiasByte |= ((f-1) << 5);           // Limit: spacelock/timelock
        skewBiasByte |= ((b-1) << 6);           // Outcome: success/failure
        skewBiasByte |= ((c-1) << 7);           // Judgment: good/bad
        assert(howMany < 32768);
        pTables[0][howMany] = skewBiasByte;
        int tbl;
        for (tbl=0; tbl<=3; ++tbl) {
                int offset = tbl * 10;
                pTables[++offset][howMany] = SEMCLASS_TO_TOKEN(theDoc->GetApprValByIndex(MakeApprIndex(tbl,
kDomain)));             // class
                pTables[++offset][howMany] = SEMTYPE_TO_TOKEN(theDoc->GetApprValByIndex(MakeApprIndex(tbl,
kConcern)));            // type
                pTables[++offset][howMany] = SEMVAR_TO_TOKEN(theDoc->GetApprValByIndex(MakeApprIndex(tbl, kRange)));
                        // variation
                pTables[++offset][howMany] = SEMELEM_TO_TOKEN(theDoc->GetApprValByIndex(MakeApprIndex(tbl,
kProblem)));            // element
                pTables[++offset][howMany] = SEMTYPE_TO_TOKEN(theDoc->GetApprValByIndex(MakeApprIndex(tbl,
kStipulation)));  // type
                pTables[++offset][howMany] = SEMELEM_TO_TOKEN(theDoc->GetApprValByIndex(MakeApprIndex(tbl,
kSolution)));           // element
                pTables[++offset][howMany] = SEMELEM_TO_TOKEN(theDoc->GetApprValByIndex(MakeApprIndex(tbl, kFocus)));
                        // element
                pTables[++offset][howMany] = SEMELEM_TO_TOKEN(theDoc->GetApprValByIndex(MakeApprIndex(tbl,
kDirection)));          // element
                pTables[++offset][howMany] = SEMVAR_TO_TOKEN(theDoc->GetApprValByIndex(MakeApprIndex(tbl,
kUniqueRange)));  // variation
                pTables[++offset][howMany] = SEMVAR_TO_TOKEN(theDoc->GetApprValByIndex(MakeApprIndex(tbl,
kCriticalFlaw)));       // variation
        }
        ++howMany;
                                                                                                    }
                                                                                            }
                                                                                    }
```

```
                                                                        }
                                                                }
                                                        }
                                                }
                                                progDlog->UpdateProgress((int)((howMany*100)/32768.0),
kPrNoSections, kPrNoString, kPrNoString);
                                        }
                                }
                        }
                }
        }

        delete progDlog;
        progDlog = new ProgressDlog();
        PFMSetCurrentFile(PFMFile);

        for (id=0; id<maxStoryTables; ++id) {
                MM_UNUSE(tableHandles[id]);
                theErr = PFMAddSegWithId(_OSType("STBL"), id, tableHandles[id], PFM_MIN_PRIO, false);
                assert(theErr == NOERR);
                PFMSetSegModified(tableHandles[id], true);
                theErr = PFMCheckinSeg(tableHandles[id]);
                assert(theErr == NOERR);
                progDlog->UpdateProgress((int)((id+1)*100)/maxStoryTables);
        }
        PFMSetFastSave (false, PFMFile);
        theErr = PFMSaveFile(NULL);
        assert(theErr == NOERR);
        theErr = PFMCloseFile(PFMFile);
        assert(theErr == NOERR);

        PFMSetCurrentFile(currentFile);
        theDoc->RestoreAppreciations(apprecCopyHdl);
        delete progDlog;
} /* AllResponseCombos */


/* ------------------------------------------------------------------------
        FUNCTION:       excludeTesterChoices
        Purpose:        Limits class choices based on DOER_BEER & START_STOP skews.
        Accepts:        Justification: OP_OBJECTIVE or OP_SUBJECTIVE.
        Returns:        short * to array of available quad positions (TRUE means
                                position is available).
        Method:         if SUBJECTIVE:
                                        If SKEW:DOER, subjective class will be in Positive position.
                                        If BEER, subjective class will be in negative position.
                                        If SKEW:STOP, the two classes will be COMPANIONS.
                                        If START, the two classes will be DEPENDENT.
------------------------------------------------------------------------ */
static short* excludeTesterChoices(DRDoc* theDoc, short justification)
{
        static short excludedClasses[4];

        memset(excludedClasses, 0 ,sizeof(excludedClasses));

        if (justification == OP_OBJECTIVE) {                    /* OP_OBJECTIVE */
                if (DOER) {                                                             /* DOER_SKEW
*/
                        if (START) {                                                    /* START_SKEW */
                                excludedClasses[0] = TRUE;                      /* exclude companion
relationships */
                                excludedClasses[1] = TRUE;
                        }
                        else {                                                          /* STOP_SKEW
*/
                                excludedClasses[2] = TRUE;                      /* exclude dependent
relationships */
                                excludedClasses[3] = TRUE;
                        }
                }
                else {                                                                  /* BEER_SKEW
*/
                        if (START) {                                                    /* START_SKEW */
                                excludedClasses[2] = TRUE;                      /* exclude companion
relationships */
                                excludedClasses[3] = TRUE;
                        }
                        else {                                                          /* STOP_SKEW
*/
                                excludedClasses[0] = TRUE;                      /* exclude dependent
relationships */
                                excludedClasses[1] = TRUE;
                        }
                }
        }

        else {                                                                          /*
OP_SUBJECTIVE */
                if (DOER) {                                                             /* DOER_SKEW
*/
                        excludedClasses[2] = TRUE;                              /* exclude beer companion pair
*/
                        excludedClasses[3] = TRUE;
                }
                else {                                                                  /* BEER_SKEW
*/
                        excludedClasses[0] = TRUE;                              /* exclude doer companion pair
*/
                        excludedClasses[1] = TRUE;
                }
        }
        return (excludedClasses);
} /* excludeTesterChoices */


/* ------------------------------------------------------------------------
        FUNCTION:       build2ndAddr            4/7/93
        Purpose:        builds entire address for second justification.
        Accepts:        firstAddr: AddrPtr to address derived from first justification.
------------------------------------------------------------------------ */
static void build2ndAddr(DRDoc* theDoc, enum OPJUSTS justification, AddrPtr firstAddr)
{
```

```
        AddrText newAddr, newAddr2, tmpSubAddr;
        AddrText tempAddr, tmpRefAddr;
        Unit *theUnit;
        int relationship;

        char pathString[60];

        strcpy(newAddr, "00000");
        strcpy(newAddr2, "00000");
        strcpy(tmpRefAddr, "00000");

        if (justification == OP_OBJECTIVE) {                                                          /*
we did the OBjective justification first and need to do the Subjective justification prep now */
                SetObjSimpleApprec(theDoc, RefSC, firstAddr, AP_STORY);                       /* setup the objective
story appreciations */
                newAddr[CLASS] = determineOtherClass(theDoc, firstAddr) + '0';          /* change class for SUBJECTIVE
justification */
                theDoc->SetApprValByIndex(kApprMCHmCl, (short)newAddr[CLASS] );         /* set main character's home
class */

                newAddr2[CLASS] = firstAddr[CLASS];
        /* set temp address so that we can compare the Objective class with it's partner class */
                relationship = GetRelationship(newAddr, newAddr2);                              /* what is
relationship between objective & subjective classes in Justified SuperClass */
                assert(relationship != NOTRELATED);
                SemanticPartner(RefSC, relationship, firstAddr, tmpSubAddr);    /* finds the semantic partner of the
problem in the Objective class (refSC) in the Subjective class (refSC) and stuffs it into the tempSubAddr */
                SetObjSimpleApprec(theDoc, RefSC, tmpSubAddr, AP_MAIN);                         /* set up the
objective main character appreciations */
        }

        else {
                                /* we did the Subjective justification first and now have to prep for Objective --
OP_SUBJECTIVE */
                SetObjSimpleApprec(theDoc, RefSC, firstAddr, AP_MAIN);                          /* setup the objective
main character appreciations */
                newAddr[CLASS] = determineOtherClass(theDoc, firstAddr) + '0';          /* change class for OBJECTIVE
justification */
                newAddr2[CLASS] = firstAddr[CLASS];
        /* set temp address so that we can compare the Objective class with it's partner class */
                theDoc->SetApprValByIndex(kApprMCHmCl, (short)newAddr2[CLASS] );/* set main character's home class */
                relationship = GetRelationship(newAddr, newAddr2);                              /* what is
relationship between objective & subjective classes in Justified SuperClass */
                assert(relationship != NOTRELATED);

                GetFocusOrProblemAddr(theDoc, firstAddr, tempAddr);                             /* pass firstAddr as
the problem and return tempAddr as the address of the Main Character's focus */

                theUnit = Addr2Item(RefSC, tempAddr);
                FindSemanticUnitAddr(RefSC, newAddr, theUnit->semVal);                          /* find the focus
element in the reference SC in the Main Character's class */

                GetFocusOrProblemAddr(theDoc, newAddr, tmpRefAddr);                             /* find problem
element in Subjective Class in RefSC for appreciations (we're passing focus elem) */
                SetObjSimpleApprec(theDoc, RefSC, tmpRefAddr, AP_STORY);                /* setup the objective story
appreciations */
        }
} /* build2ndAddr */


/* $Log:          query.cc,v $
Revision 1.11  93/09/24  15:32:12  stephen
Cleaned up warnings.

Revision 1.10  93/06/04  13:49:27  stephen
Changed PFMPushCurFile/PopCurFile into a PFMSetfile -- this
helped to solve some crashing problems we were having.

Revision 1.9  93/05/26  19:47:12  stephen
Windows fixes.

Revision 1.8  93/05/03  16:40:23  stephen
Removed or #Ifdefed out a lot of dead code.

Revision 1.7  93/04/24  14:09:08  chris
Changed appreciations structure to array of 10 shorts.

Revision 1.6  93/04/24  12:54:42  chris
Added "nature, essence, etc." appreciations.

Revision 1.5  93/04/24  09:59:59  stephen
Made justification-related functions take a appreciations struct.

Revision 1.4  93/04/19  18:58:36  stephen
Fixes to generation of StoryTable data.

Revision 1.3  93/04/13  16:04:43  chris
Add justification material from .c files.

Revision 1.2  93/04/06  19:42:40  stephen
 (3First General Revisions

Revision 1.1  93/03/31  22:42:12  stephen
Initial revision

 */
```

```
/* --------------------------------------------------------------------------
        QUERY.H
        Query Q & A Table
        Copyright (C) 1993 Screenplay Systems Inc.
        Revised:        $Id$
-------------------------------------------------------------------------- */

#ifndef __QUERYTABLE__
#define __QUERYTABLE__

class DRDoc;

enum { NO, YES };                                   /* validation values */
enum { UNUSED_QUERY, CHANGE_STEADFAST, SUCCESS_FAILURE, GOOD_BAD, START_STOP, ACTION_DECISION,
        TIMELOCK_SPACELOCK, DOER_BEER, MALE_FEMALE, OBJ_CLASS, SUBJ_CLASS, OBJ_TYPE, SUBJ_TYPE,
        OBJ_VAR, SUBJ_VAR, OBJ_SUBJ_ELEMENT);      /* query question topics */

void AllResponseCombos(DRDoc* theDoc, SuperClass *just1SC, SuperClass *just2SC);

#endif /* __QUERYTABLE__ */


/* $Log:        query.h,v $
 * Revision 1.3  93/05/03  16:40:43  stephen
 * Removed or #Ifdefed out a lot of dead code.
 *
 * Revision 1.2  93/04/13  16:04:45  chris
 * Add justification material from .c files.
 *
 * Revision 1.1  93/03/31  22:42:28  stephen
 * Initial revision
 *
 */
```

```
/**********************************************************************
        RELATION.CC
        Dramatica Model Relationships
        (c) 1993 Screenplay Systems
        Authors:        S. Greenfield & C. Huntley
        Created:        January 23, 1993
        Revised:        $Id$
***********************************************************************

*/

#include <stdio.h>
#include <string.h>

#include "genutls.h"

#include "structs.h"
#include "address.h"
#include "semtable.h"
#include "relation.h"


/* --------------------------------------------------------------------
        These arrays define the three basic relationships: Dynamic, Companion
        and Dependent partners.  This is the usage: If we are trying to find the
        dynamic partner of a unit n in a quad, access Relations[0][n-1] to find
        out where its partner is located.
-------------------------------------------------------------------- */
short Relations[3][4] =    { 4, 3, 2, 1,              /* dynamic relationships */
                              2, 1, 4, 3,             /* companion relationships */
                              3, 4, 1, 2 };           /* dependent relationships */


/* --------------------------------------------------------------------
        FUNCTION:       GetPartner
        Purpose:        Given an address, a dynamicResolution, and a relationship,
                                return addr of item's Partner.

        Accepts:        dynamicRes - dynamic resolution: INDEPENDENT, INVERSE, CORRESPONDENT
                                relationship - DYNAMIC, COMPANION, DEPENDENT
                                addr - the given address

        Returns:        partnerAddr - the address of the item in the desired dynamic
                                resolution with the desired relationship.

        Note:           NO ADDRESS VALIDATION IS DONE -- assumes a valid address.

        Method:         This function performs the bulk of address-relationship
                                calculation.  Essentially, only ONE digit of the original
                                address is going to be changed.  The question is, which one?
                                We determine which digit by subtracting three items from
                                each other:

                                        addr2Change = level - dynamicRes - ItemSize

                                The LEVEL is which level of the four-level class structure
                                are we looking at.  For example, the level of address 13000
                                is 2.  It is 4 - the number of trailing zero digits, excluding
                                the last digit (the itemsize).

                                The DYNAMICRES is passed in by the user.  INDEPENDENT (1)
                                means we want the item in the same quad with the desired
                                relationship.  INVERSE (2) means we want the item in the
                                same position in the quad with the desired relationship.
                                CORRESPONDENT (2) means that in a ChessSet, the unit in
                                the same position in the set that has the desired relationship.
                                Correspondents can only be found at the variation and element
                                levels.

                                The ITEMSIZE is simply the last digit of the address, and
                                indicates if we are looking at a Unit (0), Quad (1), Set (2),
                                ChessSet (3) or SuperSet (4).

                                Therefore, the addr2Change for the INVERSE DYNAMIC of address
                                11000 is:

                                        level = 2
                                        dynamicRes = 2
                                        ItemSize = 0
                                        addr2Change  =  level - dynamicRes - ItemSize
                                        addr2Change  =  2 - 2 - 0
                                        addr2Change  =  0

                                The only other calculation which must be made is determining
                                the QUAD POSITION.  We must know which quad position (1-4)
                                is being looked at in the given address (addr), so that we
                                can properly determine how to apply the desired relationship
                                to it.

                                Calculating the quadPos is easy.  We simply look at the digit
                                of the address in the given address (addr) that we are planning
                                to change.  In the above example of address 11000, the addr2Change
                                is 0, so we look at addr[0], which is the first digit, "1".

                                In the code below, ASCII '0' is subtracted since the digit
                                is a character, not a number.  Then 1 is subtracted, so we
                                can get a 0-based index into the relationship table.

                                Finally, we change the desired digit in to the desired
                                relationship in a COPY of the original address.  The
                                digit to be changed is:

                                                partnerAddr[addr2Change]

                                and it is changed to the value found in:

                                                Relations[relationship][quadPos]+'0'

                                Again, '0' is added here to make a number (1-4) into
                                an ASCII character.

                                The resulant address , the INVERSE DYNAMIC of address 11000,
                                is 41000.
```

```
-------------------------------------------------------------------------- */
AddrPtr GetPartner(int dynamicRes,int relationship, AddrText addr, AddrText partnerAddr)
{
        int ItemSize = ADDR_ITEMSIZE(addr);
        int addr2Change;
        int quadPos;

        addr2Change=Addr2Level(addr)-dynamicRes-ItemSize;      /* change address slot level-dynamicSize-Itemsize. */
        asserts(!(addr2Change < 0 || addr2Change > 3),"\n\n*** GETPARTNER: ItemSize probably out of range for target
address! ***\n");

        strcpy(partnerAddr,addr);                                                    /* rest of address will be the
same */
        quadPos=(addr[addr2Change]-'0')-1;                                  /* this special case takes into account
subtraction of dynamicRes above */
        partnerAddr[addr2Change] = Relations[relationship][quadPos]+'0';

        return (partnerAddr);
}


/* --------------------------------------------------------------------------
        FUNCTION:           SemanticPartner
        Purpose:            Given an address, return addr of the unit in the element
                                     level with the SAME semantic value as in the class with the
                                     desired relationship.
        Note:               NO ADDRESS VALIDATION IS DONE -- assumes a valid address.
-------------------------------------------------------------------------- */
AddrPtr SemanticPartner(SuperClass *theSC,int relationship, AddrText addr, AddrText partnerAddr)
{
        Unit *theUnit;
        int theSemVal;
        int Class = ADDR_CLASS(addr)-1;
        int ItemSize = ADDR_ITEMSIZE(addr);
        int level = Addr2Level(addr);

        asserts((level==4),"\n\n*** SEMANTIC PARTNER: must be ELEMENT level for address ***\n");
        asserts((ItemSize==0),"\n\n*** SEMANTIC PARTNER: must start with an ELEMENT unit in address ***\n");

        theUnit = (Unit *)Addr2Ptr(theSC, addr);
        theSemVal = theUnit->semVal;                                                                        /*
This is the semVal we're searching for... */

        strcpy(partnerAddr, addr);
        partnerAddr[CLASS] = Relations[relationship][Class]+'0';            /* Set the partner's class to be the
class with the desired relationship*/
        FindSemanticUnitAddr(theSC, partnerAddr, theSemVal);

        return (partnerAddr);
}


/* --------------------------------------------------------------------------
        FUNCTION:           FindSemanticUnitAddr
        Purpose:            Given an addr and a semantic value, return addr of the
                                     unit in the element level with the SAME semantic value.
        Method:             Takes advantage of the fact that each ChessSet of elements
                                     have different semantic values, but they are all laid out in
                                     an alphabetical order.  By subtracting START_OF_ELEMENTS-1,
                                     we can then perform a modulo operation which gives us a
                                     comparative index into the 64 elements.
-------------------------------------------------------------------------- */
void FindSemanticUnitAddr(SuperClass* theSC, AddrText partnerAddr, int theSemVal)
{
        int Class = ADDR_CLASS(partnerAddr)-1;
        ChessSet *theChessSet=&theSC->Elements.ChessSets[Class];
        int scanSemVal;
        int semValModulo=(theSemVal-(START_OF_ELEMENTS-1)) % 64;
        int s=0, q=0, u=0;

        assert(theSemVal > 0 && theSemVal < TOTAL_SEMANTIC_ITEMS);

        for (s=0; s<=3; ++s)
                for (q=0; q<=3; ++q)
                        for (u=0; u<=3; ++u) {
                                scanSemVal = theChessSet->Sets[s].Quads[q].Units[u].semVal;
                                if (((scanSemVal-(START_OF_ELEMENTS-1)) % 64) == semValModulo) {
                                        partnerAddr[TYPE] = s + '1';                                /* +
'1' accounts for zero-based index */
                                        partnerAddr[VAR] = q + '1';
                                        partnerAddr[ELEM] = u + '1';
                                        return;
                                }
                        }

        assert(FALSE);
        /* fell-thru loop -- should never happen! */
}


/* --------------------------------------------------------------------------
        FUNCTION:           Charge
        Purpose:            Given an address, and a relationship, determine Positive or
                                     Negative charge.
        Returns:            1 if Positive, 0 if Negative.
        Method:             If the relationship includes the "X" position, then the
                                     Charge is Positive.  Otherwise, it's Negative.
-------------------------------------------------------------------------- */
short Charge(int relationship, AddrText addr)
{
        int addr2View = Addr2TargetIndex(addr);
        int quadPos = addr[addr2View]-'0';

        switch (relationship) {
                case DYNAMIC:       return (quadPos == 1 || quadPos == 4);
                case COMPANION:     return (quadPos == 1 || quadPos == 2);
                case DEPENDENT:     return (quadPos == 1 || quadPos == 3);
        }
        assert (FALSE);
}
```

```
/* ------------------------------------------------------------------------
        FUNCTION:       GetRelationship
        Purpose:        Given two addresses, return the relationship they have:
        Returns:        DYNAMIC, COMPANION, DEPENDENT, NOTRELATED (-1).
        Note:
------------------------------------------------------------------------ */
short GetRelationship(AddrText addr1, AddrText addr2)
{
        int relationship;
        int divergence;

        int addr2View1 = Addr2TargetIndex(addr1);
        int quadPos1 = addr1[addr2View1]-'0';

        int addr2View2 = Addr2TargetIndex(addr2);
        int quadPos2 = addr2[addr2View2]-'0';

        if (!SAME_SIZE(addr1,addr2) || addr2View1 != addr2View2)
                return (NOTRELATED);

        if ((divergence=AddrDiff(addr1, addr2))==0 || (divergence-1 < addr2View1))
                return (NOTRELATED);

        for (relationship=DYNAMIC; relationship<=DEPENDENT; ++relationship)
                if (Relations[relationship][quadPos1-1] == quadPos2 &&
                        Relations[relationship][quadPos2-1] == quadPos1 )
                        return (relationship);

        assert (FALSE);
/*      return (NOTRELATED);                /* posible situation where this should return, not assert? */
}


/* $Log:           relation.cc,v $
Revision 1.4  93/05/27  16:35:19  stephen
Gat SuperClass* from Document class...

Revision 1.3  93/05/24  21:40:15  stephen
Converted LongJmp() into asserts().

Revision 1.2  93/04/06  19:42:45  stephen
 (3First General Revisions

Revision 1.1  93/03/31  22:42:33  stephen
Initial revision

 */
```

```
/* ---------------------------------------------------------------------------
        RELATION.H
        Dramatica Model Relationships
        Copyright (C) 1993 Screenplay Systems Inc.
        Revised:        $Id$
---------------------------------------------------------------------------- */

#ifndef __RELATION__
#define __RELATION__

extern  short   Relations[3][4];                                        /* defined in Relation.c */

enum { INDEPENDENT=1, INVERSE, CORRESPONDENT };                         /* sizes of relationships */
enum { NOTRELATED=-1, DYNAMIC, COMPANION, DEPENDENT };          /* types of relationships */

AddrPtr         GetPartner(int dynamicRes, int relationship, AddrText addr, AddrText partnerAddr);
AddrPtr         SemanticPartner(SuperClass *theSC,int relationship, AddrText addr, AddrText partnerAddr);
void            FindSemanticUnitAddr(SuperClass* theSC, AddrText partnerAddr, int theSemVal);
short           Charge(int relationship, AddrText addr);
short           GetRelationship(AddrText addr1, AddrText addr2);

inline short    GetPartnerUnit(int relationship, short whichUnit);

/* ---------------------------------------------------------------------------
        FUNCTION:       GetPartnerUnit
        Purpose:        To provide a simple access to the Relations array (above).
        Note:           Unlike other routines in this module, this function doesn't
                                take "addresses". It takes a unit number. We use it in
                                classes like QuadIcon, as a convenience to avoid rewriting
                                the above table.
---------------------------------------------------------------------------- */
short GetPartnerUnit(int relationship, short whichUnit)
{
        assert(relationship >= DYNAMIC && relationship <= DEPENDENT);
        assert(whichUnit >= 1 && whichUnit <= 4);

        return (Relations[relationship][whichUnit-1]);

} /* GetPartnerUnit */


#endif /* __RELATION__ */


/* $Log:          relation.h,v $
 * Revision 1.1  93/03/31  22:42:49  stephen
 * Initial revision
 *
 */
```

```
/***********************************************************************
        REPWIND.CC
        Report Functions Window
        (c) 1993-1994 Screenplay Systems
        Authors:        S. Greenfield & C. Huntley
        Created:        Feb 22, 1994
        Revised:        $Id$
************************************************************************

*/

#include "tappl.h"
#include "apputls.h"
#include "graphics.h"
#include "tview.h"

#include "ptext.h"
#include "miscutil.h"
#include "dramatic.h"
#include "document.h"
#include "frontend.h"
#include "repwind.h"


#pragma segment repwind

static initFEDataItems ReportWinInitData[] =
{
        { 16030, kBtnDisabled,     NULL,                               NULL },
        { 16031, kBtnDisabled,     "Choose Report",  "Choose from over xx styles of reports." },
        { 16032, kBtnDisabled,     "Report Options",          "Control Report fonts, styles and other options." },
        { 16033, kBtnEnabled,      "Export",                           "Export the report to text or word processing
files." },
        { 16034, kBtnEnabled,      "Page Layout",             "Control Printer-related options." },
        { 16035, kBtnEnabled,      "Print",                            "Send this report to the printer." },
        { 16036, kBtnDisabled,     "Print Preview",  "View this report on-screen as it will apprear printed." },
        { 16030, kBtnDisabled,     NULL,                               NULL },
        { 16030, kBtnDisabled,     NULL,                               NULL },
        { 16030, kBtnDisabled,     NULL,                               NULL },
        { 16030, kBtnDisabled,     NULL,                               NULL },
        { 16030, kBtnDisabled,     NULL,                               NULL },
        { 16030, kBtnDisabled,     NULL,                               NULL },
        { 0,      kBtnDisabled,    NULL,                               NULL },
};

static const GLColor       kMyBtnOnClr       = { 0x0000, 0x0000, 45300 };


static reportTableItems reportTable[fNmOfReportTableItems] =
{
        { "Introduction to Reports",                               &OutlineView::intro_report,
                        kREP_intro_report,                                  false,   "" },
        { "-",                                                                           NULL,
                                                                   0,
                        false,   "" },

        { "Basic Plot Dramatics",                                  &OutlineView::basic_plot_dramatics,
                  kREP_basic_plot_dramatics,                true,    "" },
        { "Basic Main Character Dramatics",                        &OutlineView::basic_mc_dramatics,
        kREP_basic_mc_dramatics,            true,     "" },
        { "Basic Obstacle Character Dramatics",             &OutlineView::basic_oc_dramatics,
        kREP_basic_oc_dramatics,            true,     "" },
        { "Basic Thematics",
        &OutlineView::basic_thematics_dramatics,     kREP_basic_thematics_dramatics,     true,     "" },
        { "Basic Objective Character Dramatics",     &OutlineView::basic_objchar_dramatics,
        kREP_basic_objchar_dramatics,       true,     "" },
        { "Basic Subjective Character Dramatics",    &OutlineView::basic_subjchar_dramatics,
        kREP_basic_subjchar_dramatics,      true,     "" },
        { "-",                                                                           NULL,
                                                                   0,
                        false,   "" },

        { "Overview Appreciations",                                &OutlineView::Overview_apprec_report,
        kREP_Overview_apprec_report,        true,     "" },
        { "All Dynamics Report",                            &OutlineView::All_Dynamics_report,
        kREP_All_Dynamics_report,           true,     "" },
        { "12 Essential Questions Report",           &OutlineView::Essential_ques_report,
        kREP_Essential_ques_report,                  true,    "" },
        { "-",                                                                  NULL,
                                                     0,
        false,   "" },

        { "Story Engine Settings",                                 &OutlineView::storytbl_report,
        kREP_storytbl_report,               false,    "The Storyform Items Report presents a complete list of your
story's principal dramatic appreciations" },
        { "Plot Sequence Report",                           &OutlineView::plot_sequence_report,
        kREP_plot_sequence_report,          true,     "" ],
        { "-",                                                                  NULL,
                                            0,                                                         false,   ""
},

        { "Objective Story Theme",                                 &OutlineView::os_theme_report,
        kREP_os_theme_report,               true,     "The Objective Story Theme Report describes your story's Objective
Thematic topics" },
        { "Objective Story Plot",                           &OutlineView::os_plot_report,
        kREP_os_plot_report,                false,    "The Objective Story Plot Report describes your story's dramatic
progression through the Objective Plot" },
        { "Objective Story Dynamics",                       &OutlineView::os_dynamics_report,
        kREP_os_dynamics_report,    false,    "" },
        { "Objective Characters",                           &OutlineView::os_character_report,
        kREP_os_character_report,  true,    "The Objective Story Character Report describes the characteristics and
relationships of your Objective Characters" },
        { "-",                                                                  NULL,
                                            0,                                                         false,   ""
},

        { "Subjective Story Theme",                                &OutlineView::ss_theme_report,
        kREP_ss_theme_report,               true,     "The Subjective Story Theme Report describes the Subjective
Thematic topics at the heart of the relationship between your Main and Obstacle Characters." },
        { "Subjective Story Character",                     &OutlineView::ss_character_report,
        kREP_ss_character_report,  true,    "The Subjective Story Character Report describes the characteristics and
relationships of your Main and Obstacle Characters" },
```

```
        { "-",                                  0,                                      NULL,                           false,  ""
},
        { "Main Character Theme",                                       &OutlineView::mc_theme_report,
        kREP_mc_theme_report,           true,   "The Main Character Theme Report describes the Thematic topics that
shape your Main Character's personality" },
        { "Main Character Basics",                                              &OutlineView::mc_basics_report,
        kREP_mc_basics_report,          false,  "The Main Character's Basics Report describes in simple terms the
dynamics that drive your Main Character" },
        { "Main Character Analysis",                                    &OutlineView::mc_character_report,
        kREP_mc_character_report,  false,    "The Main Character's Character Report describes the dynamics that drive
your Main Character" },
        { "Obstacle Character Theme",                                   &OutlineView::oc_theme_report,
        kREP_oc_theme_report,           true,   "The Obstacle Character's Theme Report describes the Thematic
topics most affected by your Obstacle Character's impact" },
        { "-",                                  0,                                      NULL,                           false,  ""
},
        { "Storytelling Output",                                        &OutlineView::stelling_report,
        kREP_stelling_report,           true,   "" },
        { "Misc Topic Reports",                                                 &OutlineView::misc_os_reports,
        kREP_misc_os_reports,           true,   "" },
};

#if 0
        { "Summary Report",                                                             &OutlineView::summary_report,
        kREP_summary_report,            false,  "The Summaries Report presents condensed versions of the
appreciations contained in other Story Reports" },
        { "Obstacle Character Analysis",                        &OutlineView::oc_character_report,  kREP_oc_character_report,
        false,   "The Obstacle Chracter's Character Report describes the attributes that drive your Obstacle Character"
},
#endif

/* ----------------------------------------------------------------------
        RepFrontEnd::DoCommand - execute the button the user pressed.
---------------------------------------------------------------------- */
void RepFrontEnd::DoCommand(short whichCmd)
{
        switch (whichCmd+1) {

        case kRWChooseReport:       // ASSERT(fApp->DoCommand(kCreateCharCmd) != kCmNotFound);
                                                        break;

        case kRWReportOptions:      beep();
                                                        break;

        case kRWExport:                         ((RepWindow*)GetParentWindow())->GetRepView()->ExportReport();
                                                        break;

        case kRWPageLayout:                     ASSERT(fApp->DoCommand(kFilePageSetup) != kCmNotFound);
                                                        break;

        case kRWPrint:                          ASSERT(fApp->DoCommand(kFilePrint) != kCmNotFound);
                                                        break;

        case kRWPrintPreview:       beep();
                                                        break;

        default:                                        assert(false);
                                                        break;
        }
} /* RepFrontEnd::DoCommand */


/* ----------------------------------------------------------------------
        RepFrontEnd::Resize -
---------------------------------------------------------------------- */
void RepFrontEnd::Resize(void *pNewSize, TObject *pSender)
{
        GLRect portBounds;
        GetParentWindow()->GetPortRect(&portBounds);
        GLRect frontEndRect = portBounds;
        frontEndRect.right = REPTILEWIDTH+16;
        SetBounds(&frontEndRect);
        DocumentResize();
} /* RepFrontEnd::Resize */


/* ======================================================================
                                                Report Window CLASS
   ====================================================================== */

/* ----------------------------------------------------------------------
        RepWindow::RepWindow - CONSTRUCTOR
---------------------------------------------------------------------- */
RepWindow::RepWindow(TAppl *pTAppl, TDoc *pTDoc, const GLRect *bounds, wn_type windowType, const char *title, ptr_t
storage)
                : TWindow(pTAppl, pTDoc, windowType, TWindow::kNoFlags, bounds, title, storage)
{
        fApp = (Dramatica*)pTAppl;
        fDoc = (DRDoc*)pTDoc;
        assert(fDoc->GetReportWindow()==NULL);
        fDoc->SetReportWindow(this);

        pt_err   theErr;
        fRepPrefsPT = new PText(fApp->GetPrefsFile(), _OSType("REPT"), 0, &theErr);            // Grab Preferences
for Report Window
        assert((theErr == noerr) || (theErr == kNoSuchPFMSeg));

        //      Restore user's preferred window size & position

        fApp->RestoreWindowPosition(fRepPrefsPT, (TWindow*) this, "REP");

} /* RepWindow::RepWindow */

/* ----------------------------------------------------------------------
        RepWindow::~RepWindow - destructor.
---------------------------------------------------------------------- */
RepWindow::~RepWindow(void)
```

```
{
        DRDoc* theDoc = (DRDoc*)GetDoc();
        assert(theDoc);
        theDoc->SetReportWindow(NULL);

        //      Save off any preferences

        fApp->SaveWindowPosition(fRepPrefsPT, (TWindow*)this, "REP");

        fRepPrefsPT->SaveSeg();
        delete fRepPrefsPT;

} /* RepWindow::~RepWindow */

/* ------------------------------------------------------------------------
        RepWindow::calc_item_sizes - calculate item sizes that might change due
        to resizing.
------------------------------------------------------------------------ */
void RepWindow::calc_item_sizes(void)
{
        GLRect portBounds;
        GetPortRect(&portBounds);

        //      THIS RECT DEFINES THE GRAY 3-D TILE ABOVE THE OUTLINE VIEW

        fButtonAreaTile.top                     = portBounds.top;
        fButtonAreaTile.left            = REPTILEWIDTH+16;
        fButtonAreaTile.bottom          = portBounds.top + REPTILEHEIGHT;
        fButtonAreaTile.right           = portBounds.right;

        fPatchRect                              = fButtonAreaTile;
        fPatchRect.bottom               = portBounds.bottom;
        fPatchRect.top                  = fPatchRect.bottom - 16;
        fPatchRect.right        -= 16;

} /* RepWindow::calc_item_sizes */

/* ------------------------------------------------------------------------
        RepWindow::InitWindow -
------------------------------------------------------------------------ */
void RepWindow::InitWindow(void)
{
        fItems = new ItemList(this);
        assert(fItems);

        calc_item_sizes();

        // ADD THE FRONT END (TILES)

        GLRect portBounds;
        GetPortRect(&portBounds);

        GLRect frontEndRect = portBounds;
        frontEndRect.right = REPTILEWIDTH+16;
        TItem* newViewItem = new RepFrontEnd(ReportWinInitData, fItems, (TView::kVScroll), &frontEndRect);
        assert(newViewItem);
        fRepFrontEnd = (RepFrontEnd*)newViewItem;
        fRepFrontEnd->SetBtnInset(2);

        fFrontEndIdx = fItems->Append(newViewItem);

        //      ADD OUTLINE VIEW

        GLRect viewBounds               = portBounds;
        viewBounds.left                 = frontEndRect.right;
        viewBounds.top                  = portBounds.top + REPTILEHEIGHT;
        viewBounds.bottom               -= 14;
        viewBounds.right  += 1;

        TItem* newOLItem = new OutlineView(fItems, (TView::kVScroll + TView::kNoBorder), &viewBounds, TItem::kNoFlags);
        assert(newOLItem);
        fRepView = (OutlineView*)newOLItem;
        run_report(0);                                                                  // runs the first report,
"os_theme_report"
        fOutlineViewIdx = fItems->Append(newOLItem);

        //      ADD TOPIC POPUP MENU

        GLRect popRect;
        popRect.top                     = fButtonAreaTile.top + 5;
        popRect.left            = fButtonAreaTile.left + 10;
        popRect.bottom          = popRect.top + 20;
        popRect.right           = popRect.left + 265;

        TItem* popItm;
        fPopupIdx = fItems->Append(popItm = new Popup(fItems, &popRect, kNoFlags, kNoFlags, kCtNoFlags, &kGLBlackClr,
NULL, NULL,GL_SYS_FONT, 12, GL_NORMAL, GL_JUST_LEFT));
        popItm->Awaken(&fPopupIdx);
        fReportPopup = (Popup*)popItm;
        DRDoc* theDoc = (DRDoc*)GetDoc();
        for (short n=0; n<fNmOfReportTableItems; ++n) {
                fReportPopup->AppendItem(reportTable[n].repTitle);
                if (reportTable[n].reqJustification && !theDoc->IsStoryJustified())
                        fReportPopup->SetItemDisabled((int)n);
        }

        //      ADD OPTION BUTTONS

        GLRect optionBtnRect;
        GLSetRect(&optionBtnRect, fButtonAreaTile.top + 30, fButtonAreaTile.left + 10, optionBtnRect.top + 16,
optionBtnRect.left + 60);

        TItem* newOptionBtn = new GraphBtn(fItems, &optionBtnRect, &kMyBtnOnClr, &kGLBlackClr, kNoRadioAction);
        assert(newOptionBtn);

        fGraphBtnsIdx = fItems->Append(newOptionBtn);

        //      FINISH SETTING WINDOW UP

        fItems->SetBackClr(&kGL25GrayClr);
        init_itemlist();
```

```
        //      FINISH SETTING UP THE GRAPHIC BUTTON ITEMS...

        fOptionBtns = (GraphBtn*)newOptionBtn;
        fOptionBtns->AddButton(1, &optionBtnRect, "Vocabulary", 21, 9, kCoolBevelDown, kCoolBevelUp);

        optionBtnRect.left          = optionBtnRect.right + 3;
        optionBtnRect.right         = optionBtnRect.left + 50;
        fOptionBtns->AddButton(1, &optionBtnRect, "Tutorial", 21, 9, kCoolBevelDown, kCoolBevelUp);

        optionBtnRect.left          = optionBtnRect.right + 3;
        optionBtnRect.right         = optionBtnRect.left + 53;
        fOptionBtns->AddButton(1, &optionBtnRect, "Storytelling", 21, 9, kCoolBevelDown, kCoolBevelUp);

        fOptionBtns->SetButtonState((ls_index)kOBtnVocabulary, kBtnDown);
        fOptionBtns->SetButtonState((ls_index)kOBtnTutorial, kBtnDown);
        fOptionBtns->SetButtonState((ls_index)kOBtnStorytelling, kBtnDown);

        fRepView->init_outline_data();
        fRepFrontEnd->InitCmdPixs(&frontEndRect);
} /* RepWindow::InitWindow */


/* ------------------------------------------------------------------------
        RepWindow::draw_window - Draw any window-specific items
------------------------------------------------------------------------ */
void RepWindow::draw_window(GL_ENV_REF env)
{
        TWindow::draw_window(env);

        CoolFrameRect(&fGraphEnv, &fButtonAreaTile, &kGLBevelUpPat, 2, &kGLWhiteClr, &kGL75GrayClr);

        GLColor savedForeColor;
        fGraphEnv.GetForeColor(&savedForeColor);
        fGraphEnv.SetForeColor(kGLWhiteClr);
        fGraphEnv.PaintRect(fPatchRect);
        fGraphEnv.SetForeColor(savedForeColor);

} /* RepWindow::draw_window */


/* ------------------------------------------------------------------------
        RepWindow::DoItemHit - handles popups and button presses within the
        report window (but not presses on the frontend tiles)!
------------------------------------------------------------------------ */
void RepWindow::DoItemHit(ls_index itemHit)
{

        if ((itemHit == fPopupIdx) || (itemHit == fGraphBtnsIdx)) {
                fOptionBtns->GetAllButtonStates((short*)&fBtnStateTable);               // Get button states so we know
which options to set

                fRepView->SetTutorialBtn((bool_t)fBtnStateTable[kOBtnTutorial]);
                fRepView->SetStorytellingBtn((bool_t)fBtnStateTable[kOBtnStorytelling]);

                fRepView->ClearView();
                ct_value menuPos = (short)fReportPopup->GetCntlVal();
                assert(reportTable[menuPos].repTitle[0] != '-');

                fWhichReport = menuPos;
                run_report(fWhichReport);

                if (fBtnStateTable[kOBtnVocabulary])
                        fRepView->vocabulary_list();

                fRepView->init_outline_data();
                fRepView->Inval();
        }

} /* RepWindow::DoItemHit */


/* ------------------------------------------------------------------------
        RepWindow::run_report - run a desired report.  NOTE: this function
        will append the report onto the view, so the caller is responsible for
        clearing out the view by calling destruct_outline_data().
------------------------------------------------------------------------ */
void RepWindow::run_report(short whichReport)
{
        ReportFuncPtr reportFunc = reportTable[whichReport].reportFunc;
        (fRepView->*reportFunc)();
        // Run the desired report function
        ScrollBar*      pVScroller = fRepView->GetVScroller();
        ct_value        val                     = pVScroller->GetCntlVal();
        if (val != 0) {
                GLPoint goTo;
                goTo.x = 0;
                goTo.y = 0;
                //fRepView->AutoScrollTo(&goTo, NULL); // replaced with SetCntlVal and update flag to TRUE.
                pVScroller->SetCntlVal(0,TRUE);
        }
} /* RepWindow::run_report */


/* ------------------------------------------------------------------------
        RepWindow::min_window_size - return the minimum allowable width and
                height for this window.
------------------------------------------------------------------------ */
GLPoint RepWindow::min_window_size()
{
        GLPoint  size;

        size.x = 511;
        size.y = 302;

        return size;

} /* RepWindow::min_window_size */


void RepWindow::Resize(void *pNewSize, TObject *pSender)
{
        TWindow::Resize(pNewSize, pSender);
```

```
        fItems->Resize();
}

/* -----------------------------------------------------------------------
        RepWindow::DoGrow - This virtual function gets called when the user
        clicks on the grow box and changes the window size.
----------------------------------------------------------------------- */
bool_t  RepWindow::DoGrow(EVENT_REC *pEvt)
{
        TWindow::DoGrow(pEvt);

        calc_item_sizes();
        fRepFrontEnd->Resize(NULL, NULL);
        fRepView->Resize(NULL, NULL);
        fRepView->Inval();

} /* RepWindow::DoGrow */


/* -----------------------------------------------------------------------
        RepWindow::DoZoom - This virtual function gets called when the user
        clicks in the zoom box.
----------------------------------------------------------------------- */
void RepWindow::DoZoom(short partCode)
{
        TWindow::DoZoom(partCode);

        calc_item_sizes();
        fRepFrontEnd->Resize(NULL, NULL);
        fRepView->Resize(NULL, NULL);

} /* RepWindow::DoZoom */


/* -----------------------------------------------------------------------
        RepWindow::IsDirty - Determines if the current window needs saving.
----------------------------------------------------------------------- */
bool_t  RepWindow::IsDirty(void)
{
        DRDoc*   theDoc = (DRDoc*)GetDoc();
        assert(theDoc);
        return (theDoc->Is(&TDoc::kDirty));
}


/* -----------------------------------------------------------------------
        RepWindow::RepSelectFont - User wants to change the font of the report.
        This function is called by the "Set Font..." command.
----------------------------------------------------------------------- */
void RepWindow::RepSelectFont(void)
{
        gl_font_t         font;
        short             size;
        gl_face_t         face;

        fRepView->GetTextFontSpec(&font, &size, &face);
        if (fDoc->SelectFont(&font, &size, &face)) {                              // Get the user's choice...
                PText* prefsPT = GetRepPrefsPT();
                fDoc->SetFontPref(prefsPT, "Rep", font, size, face);  // Set the user's choice in the prefs file
                fRepView->SetTextFontSpec(&font, &size, &face);                   // Set it on-screen
        }

} /* RepWindow::RepSelectFont */


/* -----------------------------------------------------------------------
                                          OutlineCmd (REPORTS) COMMAND CLASS
----------------------------------------------------------------------- */


/* -----------------------------------------------------------------------
        OutlineCmd::IsValid -
----------------------------------------------------------------------- */
bool_t OutlineCmd::IsValid(TAppl *pApp)
{
        ls_index          activeDoc          = pApp->ActiveDoc();
        if (activeDoc != kLsNoElem) {
                DRDoc*   theDoc = ((DRDoc*)pApp->GetDoc(activeDoc));
                return (theDoc == NULL) ? false : true;
        }
        return (false);

//      return pApp->ActiveWindow() && ! pApp->ActiveWindow()->IsModalDlog();

} /* OutlineCmd::IsValid */


/* -----------------------------------------------------------------------
        OutlineCmd::do_cmd -
----------------------------------------------------------------------- */
err_t OutlineCmd::do_cmd(void)
{
        GLRect myBounds;
        DRDoc*   theDoc = ((DRDoc*)fParentApp->ActiveWindow()->GetDoc());
        assert(theDoc);

        TAppl* theApp = AP_Data()->fApp;
        GLRect screenRect;
        theApp->GetMainScreenRect(&screenRect);

        myBounds                   = screenRect;
        myBounds.left      = 1;
        if (screenRect.bottom > 400)
                myBounds.bottom = 403;
        else
                myBounds.bottom = 341;
        myBounds.right     = 511;

        RepWindow* pTWindow = new RepWindow(fParentApp, theDoc, &myBounds, WN_SIZE_WINDOW, "Reports");

        if (pTWindow) {
                theDoc->GetWindowList()->Append(pTWindow);
```

```
                pTWindow->InitWindow();
                pTWindow->ShowWindow();
                fParentApp->SetActiveWindows();

                fParentApp->ClearStoragePtr();
        }

        return NOERR;
} /* OutlineCmd::do_cmd */


#pragma segment main
```

```
/* ---------------------------------------------------------------------------
        REPWIND.H
        Report Functions window
        Copyright (C) 1993-1994 Screenplay Systems Inc.
        Revised:        $Id$
--------------------------------------------------------------------------- */

#pragma once

#ifndef __REPWIND__
#define __REPWIND__

#include "consts.h"
#include "listsx.h"
#include "popup.h"
#include "tcommand.h"

#include "graphbtn.h"
#include "outline.h"
#include "frontend.h"


#pragma segment repwind

#define REPTILEWIDTH        184
#define REPTILEHEIGHT        58

static const ushort         kRWChooseReport         = 1;
static const ushort         kRWReportOptions  = 2;
static const ushort         kRWExport                        = 3;
static const ushort         kRWPageLayout           = 4;
static const ushort         kRWPrint                         = 5;
static const ushort         kRWPrintPreview         = 6;

static const short          kOBtnVocabulary         = 0;
static const short          kOBtnTutorial           = 1;
static const short          kOBtnStorytelling       = 2;

static const short          kNmOfOptionBtns         = 3;

enum reportType {
        kREP_intro_report,

        kREP_basic_plot_dramatics,
        kREP_basic_mc_dramatics,
        kREP_basic_oc_dramatics,
        kREP_basic_thematics_dramatics,
        kREP_basic_objchar_dramatics,
        kREP_basic_subjchar_dramatics,

        kREP_Overview_apprec_report,
        kREP_All_Dynamics_report,
        kREP_Essential_ques_report,

        kREP_storytbl_report,
        kREP_plot_sequence_report,

        kREP_os_theme_report,
        kREP_os_plot_report,
        kREP_os_dynamics_report,
        kREP_os_character_report,

        kREP_ss_theme_report,
        kREP_ss_character_report,

        kREP_mc_theme_report,
        kREP_mc_basics_report,
        kREP_mc_character_report,
        kREP_oc_theme_report,

        kREP_stelling_report,
        kREP_misc_os_reports
};
//      kREP_summary_report,                              Not used right now
//      kREP_oc_character_report,                 Not used right now

static const short          fNmOfReportTableItems = 31;

typedef void (OutlineView::*ReportFuncPtr)(void);

typedef struct {
        char*                   repTitle;                       // title of report
        ReportFuncPtr     reportFunc;                   // Pointer to report function
        short                   repIndex;                       // Index into jump table
        bool_t                  reqJustification;       // TRUE if this report requires justification
        char*                   repDescription;         // A longer description
} reportTableItems;


/* ---------------------------------------------------------------------------
        RepFrontEnd - Front end for character command.
--------------------------------------------------------------------------- */
class RepFrontEnd : public FrontEndView {
public:
        // CONSTRUCTION/DESTRUCTION

        RepFrontEnd(initFEDataItems* initDataPtr, ItemList* pParent, vw_flags vflags = kNoFlags, const GLRect *extent =
NULL, it_flags iflags = List::kNoFlags, const GLColor *color = &kGLBlackClr)
                : FrontEndView(initDataPtr, pParent, vflags, extent, iflags, color) {}
        virtual ~RepFrontEnd(void) {}

        virtual  void      DoCommand(short whichCmd);
        virtual void       Resize(void *pNewSize, TObject *pSender);

}; /* RepFrontEnd */


/* ---------------------------------------------------------------------------
                                                                Report Window CLASS
--------------------------------------------------------------------------- */
class RepWindow : public TWindow {
public:
```

```
        // CONSTRUCTION/DESTRUCTION
        RepWindow(TAppl *pTAppl, TDoc *pTDoc, const GLRect *bounds, wn_type windowType, const char *title, ptr_t storage
= NULL);
        ~RepWindow(void);

        // PUBLIC UTILITIES
        virtual char*       ClassName(void) const       { return "RepWindow"; }
        virtual class_t     ClassType(void) const       { return kRepWindow; }
        virtual bool_t      IsOfType(const void *pType) const { return *(class_t*) pType == kRepWindow ||
TWindow::IsOfType(pType); }
        bool_t                      IsDirty(void);

        // CUSTOMIZED BEHAVIOR
        virtual void        InitWindow(void);
        virtual void        DoItemHit(ls_index itemHit);
        OutlineView*        GetRepView(void)            { return fRepView; }

        void                        RepSelectFont(void);
        PText*                      GetRepPrefsPT(void)         { return fRepPrefsPT; }

        bool_t                      GetVocabularyBtn(void)      { return fBtnStateTable[kOBtnVocabulary]; }

protected:
        // DATA MEMBERS

        Dramatica*                  fApp;
        DRDoc*                      fDoc;
        PText*                      fRepPrefsPT;                // Report Preferences segment

        RepFrontEnd*        fRepFrontEnd;
        OutlineView*        fRepView;

        Popup*                      fReportPopup;
        short                       fWhichReport;

        GraphBtn*                   fOptionBtns;
        short                       fBtnStateTable[kNmOfOptionBtns];

        ls_index                    fFrontEndIdx;                   // ls_index of front end item
        ls_index                    fOutlineViewIdx;            // ls_index of OutlineView
        ls_index                    fPopupIdx;                              // ls_index of Popup
        ls_index                    fGraphBtnsIdx;                  // ls_index of graphic buttons

        GLRect                      fButtonAreaTile;
        GLRect                      fPatchRect;                                     // A little white area we draw to make
view look better

        // LOCAL UTILITIES
        void                        run_report(short whichReport);
        void                        calc_item_sizes(void);
        virtual void        draw_window(GL_ENV_REF env);
        virtual void        Resize(void *pNewSize, TObject *pSender = NULL);
        virtual bool_t      DoGrow(EVENT_REC *pEvt);
        virtual  void       DoZoom(short partCode);
        virtual GLPoint     min_window_size(void);

}; /* RepWindow */


/* ------------------------------------------------------------------------
        OutlineCmd - the command class associated with the Reports tile.
------------------------------------------------------------------------ */
class OutlineCmd : public TCommand {
public:
        OutlineCmd(TAppl* pTAppl) : TCommand(pTAppl) {}

        virtual char*       ClassName(void)   const     { return "OutlineCmd"; }
        virtual class_t     ClassType(void) const       { return kOutlineCmd; }
        virtual bool_t      IsOfType(const void *pType) const { return *(class_t*) pType == kOutlineCmd ||
TCommand::IsOfType(pType); }
        virtual TObject* Duplicate(void) const        { return new OutlineCmd(*this); }

        static bool_t       IsValid(TAppl *pTAppl);

protected:
        virtual err_t       do_cmd(void);

}; /* OutlineCmd */



#pragma segment main

#endif /* __REPWIND__ */
```

```
/*********************************************************************
        SEMTABLE.CC
        Define and pre-initialize the Semantic Table
        (c) 1993 Screenplay Systems
        Authors:            S. Greenfield & C. Huntley
        Created:            January 22, 1993
        Revised:            $Id$
**********************************************************************

*/

#include <String.h>

//#include "syshdrs.h"
#include "genutls.h"

#include "structs.h"
#include "semtable.h"
#include "apprec.h"
#include "apprdefs.h"

SemanticItem SemTbl[TOTAL_SEMANTIC_ITEMS+1] =
{
        {"00000","*UNUSED*"},
        {"10000","Universe"},                               /* [1] */
        {"20000","Physics"},                                //  2
        {"30000","Psychology"},                             //  3
        {"40000","Mind"},                                           //  4

        {"11000","The Past"},                               /* start of types:[5] */
        {"12000","Progress"},                               //  6
        {"13000","The Future"},                             //  7
        {"14000","The Present"},                    //  8
        {"21000","Understanding"},                          //  9
        {"22000","Doing"},                                          //  10
        {"23000","Obtaining"},                              //  11
        {"24000","Learning"},                               //  12
        {"31000","Conceptualizing"},                //  13
        {"32000","Being"},                                          //  14
        {"33000","Becoming"},                               //  15
        {"34000","Conceiving"},                             //  16
        {"41000","Memory"},                                         //  17
        {"42000","The Preconscious"},               //  18
        {"43000","The Subconscious"},               //  19
        {"44000","The Conscious"},                          //  20

        {"11100","Fate"},                                           /* start of Variations:[21] */
        {"11200","Prediction"},                             //  22
        {"11300","Interdiction"},                   //  23
        {"11400","Destiny"},                                //  24
        {"12100","Fact"},                                           //  25
        {"12200","Security"},                               //  26
        {"12300","Threat"},                                         //  27
        {"12400","Fantasy"},                                //  28
        {"13100","Openness"},                               //  29
        {"13200","Delay"},                                          /*  30 */
        {"13300","Choice"},                                         /*  31 */
        {"13400","Preconception"},                          //  32
        {"14100","Work"},                                           //  33
        {"14200","Attraction"},                             //  34
        {"14300","Repulsion"},                              //  35
        {"14400","Attempt"},                                //  36
        {"21100","Instinct"},                               //  37
        {"21200","Senses"},                                         //  38
        {"21300","Interpretation"},                         //  39
        {"21400","Conditioning"},                   //  40
        {"22100","Wisdom"},                                         //  41
        {"22200","Skill"},                                          //  42
        {"22300","Experience"},                             //  43
        {"22400","Enlightenment"},                          //  44
        {"23100","Approach"},                               //  45
        {"23200","Self-Interest"},                          //  46
        {"23300","Morality"},                               //  47
        {"23400","Attitude"},                               //  48
        {"24100","Prerequisites"},                          //  49
        {"24200","Strategy"},                               //  50
        {"24300","Analysis"},                               //  51
        {"24400","Preconditions"},                          //  52
        {"31100","State-of-Being"},                         //  53
        {"31200","Situation"},                              //  54
        {"31300","Circumstances"},                          //  55
        {"31400","Sense-of-Self"},                          //  56
        {"32100","Knowledge"},                              //  57
        {"32200","Ability"},                                //  58
        {"32300","Desire"},                                         //  59
        {"32400","Thought"},                                //  60
        {"33100","Rationalization"},                //  61
        {"33200","Commitment"},                             //  62
        {"33300","Responsibility"},                         //  63
        {"33400","Obligation"},                             //  64
        {"34100","Permission"},                             //  65
        {"34200","Need"},                                           //  66
        {"34300","Expediency"},                             //  67
        {"34400","Deficiency"},                             //  68
        {"41100","Truth"},                                          //  69
        {"41200","Evidence"},                               //  70
        {"41300","Suspicion"},                              //  71
        {"41400","Falsehood"},                              //  72
        {"42100","Value"},                                          //  73
        {"42200","Confidence"},                             //  74
        {"42300","Worry"},                                          //  75
        {"42400","Worth"},                                          //  76
        {"43100","Closure"},                                //  77
        {"43200","Hope"},                                           //  78
        {"43300","Dream"},                                          //  79
        {"43400","Denial"},                                         //  80
        {"44100","Investigation"},                          //  81
        {"44200","Appraisal"},                              //  82
        {"44300","Reappraisal"},                    //  83
        {"44400","Doubt"},                                          //  84

        {"11310","Ability"},                                /* Start of Elements: Universe: index 85 */
```

```
{"14220","Acceptance"},                                  // 86
{"12120","Accurate"},                                    // 87
{"11210","Actuality"},                                   // 88
{"13240","Avoidance"},                                   // 89
{"11410","Aware"},                                                /* 90 */
{"12240","Cause"},                                                //  91
{"14110","Certainty"},                                   // 92
{"11230","Change"},                                               //  93
{"11130","Chaos"},                                                //  94
{"13320","Conscience"},                                  // 95
{"13110","Consider"},                                    // 96
{"13410","Control"},                                     // 97
{"14120","Deduction"},                                   // 98
{"11340","Desire"},                                               //  99
{"12330","Determination"},                               /* 100 */
{"13130","Disbelief"},                                   // 101
{"12210","Effect"},                                               //  102
{"12420","Ending"},                                               //  103
{"11320","Equity"},                                               //  104
{"14420","Evaluation"},                                  // 105
{"12320","Expectation"},                       // 106
{"13120","Faith"},                                                //  107
{"13340","Feeling"},                                     // 108
{"13420","Help"},                                                 //  109
{"13430","Hinder"},                                               /* 110 */
{"12340","Hunch"},                                                //  111
{"14410","Inaction"},                                    // 112
{"14130","Induction"},                                   // 113
{"11330","Inequity"},                                    // 114
{"11220","Inertia"},                                     // 115
{"11110","Knowledge"},                                   // 116
{"13310","Logic"},                                                //  117
{"14230","Non-acceptance"},                              // 118
{"12130","Non-Accurate"},                      // 119
{"13230","Oppose"},                                               /* 120 */
{"11120","Order"},                                                //  121
{"11240","Perception"},                                  // 122
{"14340","Possibility"},                       // 123
{"14140","Potentiality"},                      // 124
{"14210","Proaction"},                                   // 125
{"14310","Probability"},                       // 126
{"12230","Process"},                                     // 127
{"14330","Production"},                                  // 128
{"11420","Projection"},                                  // 129
{"14440","Protection"},                                  /* 130 */
{"12110","Proven"},                                               //  131
{"13210","Pursuit"},                                     // 132
{"14430","Re-evaluation"},                               // 133
{"14240","Reaction"},                                    // 134
{"13140","Reconsider"},                                  // 135
{"14320","Reduction"},                                   // 136
{"12220","Result"},                                               //  137
{"11440","Self-Aware"},                                  // 138
{"11430","Speculation"},                       // 139
{"13220","Support"},                                     /* 140 */
{"13330","Temptation"},                                  // 141
{"12440","Test"},                                                 //  142
{"12310","Theory"},                                               //  143
{"11140","Thought"},                                     // 144
{"12410","Trust"},                                                //  145
{"12430","Un-Ending"},                                   // 146
{"13440","Uncontrolled"},                      // 147
{"12140","Unproven"},                          /* end of universe elements: 148 */

{"21120","Ability"},                           /* Physics: index 149 */
{"24410","Acceptance"},                                  // 150
{"22310","Accurate"},                                    // 151
{"21210","Actuality"},                                   // 152
{"23240","Avoidance"},                                   // 153
{"21220","Aware"},                                                //  154
{"22240","Cause"},                                                //  155
{"24110","Certainty"},                                   // 156
{"21440","Change"},                                               //  157
{"21340","Chaos"},                                                //  158
{"23320","Conscience"},                                  // 159
{"23110","Consider"},                                    // 160
{"23220","Control"},                                     // 161
{"24310","Deduction"},                                   // 162
{"21130","Desire"},                                               //  163
{"22330","Determination"},                               // 164
{"23340","Disbelief"},                                   // 165
{"22210","Effect"},                                               //  166
{"22420","Ending"},                                               //  167
{"21320","Equity"},                                               //  168
{"24420","Evaluation"},                                  //       169
{"22320","Expectation"},                       // 170
{"23310","Faith"},                                                //  171
{"23130","Feeling"},                                     // 172
{"23420","Help"},                                                 //  173
{"23430","Hinder"},                                               //  174
{"22130","Hunch"},                                                //  175
{"24220","Inaction"},                                    // 176
{"24340","Induction"},                                   // 177
{"21330","Inequity"},                                    // 178
{"21410","Inertia"},                                     // 179
{"21110","Knowledge"},                                   // 180
{"23120","Logic"},                                                //  181
{"24440","Non-acceptance"},                              // 182
{"22340","Non-Accurate"},                      // 183
{"23440","Oppose"},                                               //  184
{"21310","Order"},                                                //  185
{"21240","Perception"},                                  // 186
{"24130","Possibility"},                       // 187
{"24140","Potentiality"},                      // 188
{"24210","Proaction"},                                   // 189
{"24120","Probability"},                       // 190
{"22440","Process"},                                     // 191
{"24330","Production"},                                  // 192
{"21420","Projection"},                                  // 193
{"24230","Protection"},                                  // 194
{"22110","Proven"},                                               //  195
{"23210","Pursuit"},                                     // 196
{"24430","Re-evaluation"},                               // 197
```

```
{"24240","Reaction"},                               // 198
{"23140","Reconsider"},                             // 199
{"24320","Reduction"},                              // 200
{"22410","Result"},                                         // 201
{"21230","Self-Aware"},                             // 202
{"21430","Speculation"},                  // 203
{"23410","Support"},                                // 204
{"23330","Temptation"},                             // 205
{"22230","Test"},                                           // 206
{"22120","Theory"},                                         // 207
{"21140","Thought"},                                //        208
{"22220","Trust"},                                          // 209
{"22430","Un-Ending"},                              // 210
{"23230","Uncontrolled"},                 // 211
{"22140","Unproven"},                               // 212

{"31410","Ability"},                                /* Psychology: index 213 */
{"34120","Acceptance"},                             // 214
{"32220","Accurate"},                               // 215
{"31210","Actuality"},                              // 216
{"33240","Avoidance"},                              // 217
{"31310","Aware"},                                          // 218
{"32240","Cause"},                                          // 219
{"34110","Certainty"},                              // 220
{"31130","Change"},                                         // 221
{"31230","Chaos"},                                          // 222
{"33320","Conscience"},                             // 223
{"33110","Consider"},                               // 224
{"33310","Control"},                                // 225
{"34220","Deduction"},                              // 226
{"31440","Desire"},                                         // 227
{"32330","Determination"},                          // 228
{"33230","Disbelief"},                              // 229
{"32210","Effect"},                                         // 230
{"32420","Ending"},                                         // 231
{"31320","Equity"},                                         // 232
{"34420","Evaluation"},                             // 233
{"32320","Expectation"},                  // 234
{"33220","Faith"},                                          // 235
{"33440","Feeling"},                                // 236
{"33420","Help"},                                           // 237
{"33430","Hinder"},                                         // 238
{"32440","Hunch"},                                          // 239
{"34310","Inaction"},                               // 240
{"34230","Induction"},                              // 241
{"31330","Inequity"},                               // 242
{"31120","Inertia"},                                // 243
{"31110","Knowledge"},                              // 244
{"33410","Logic"},                                          // 245
{"34130","Non-acceptance"},                         // 246
{"32230","Non-Accurate"},                 // 247
{"33130","Oppose"},                                         // 248
{"31220","Order"},                                          // 249
{"31240","Perception"},                             // 250
{"34440","Possibility"},                  // 251
{"34140","Potentiality"},                 // 252
{"34210","Proaction"},                              // 253
{"34410","Probability"},                  // 254
{"32130","Process"},                                // 255
{"34330","Production"},                             // 256
{"31420","Projection"},                             // 257
{"34340","Protection"},                             // 258
{"32110","Proven"},                                         // 259
{"33210","Pursuit"},                                // 260
{"34430","Re-evaluation"},                          // 261
{"34240","Reaction"},                               // 262
{"33140","Reconsider"},                             // 263
{"34320","Reduction"},                              // 264
{"32120","Result"},                                         // 265
{"31340","Self-Aware"},                             // 266
{"31430","Speculation"},                  // 267
{"33120","Support"},                                // 268
{"33330","Temptation"},                             // 269
{"32340","Test"},                                           // 270
{"32410","Theory"},                                         // 271
{"31140","Thought"},                                // 272
{"32310","Trust"},                                          // 273
{"32430","Un-Ending"},                              // 271
{"33340","Uncontrolled"},                 // 275
{"32140","Unproven"},                               // 276

{"41210","Ability"},                      /* Mind: index 277 */
{"44320","Acceptance"},                             // 278
{"42310","Accurate"},                               // 279
{"41120","Actuality"},                              // 280
{"43130","Avoidance"},                              // 281
{"41220","Aware"},                                          // 282
{"42130","Cause"},                                          // 283
{"44110","Certainty"},                              // 284
{"41330","Change"},                                         // 285
{"41340","Chaos"},                                          // 286
{"43410","Conscience"},                             // 287
{"43110","Consider"},                               // 288
{"43220","Control"},                                // 289
{"44310","Deduction"},                              // 290
{"41240","Desire"},                                         // 291
{"42440","Determination"},                          // 292
{"43340","Disbelief"},                              // 293
{"42120","Effect"},                                         // 294
{"42420","Ending"},                                         // 295
{"41410","Equity"},                                         // 296
{"44420","Evaluation"},                             // 297
{"42410","Expectation"},                  // 298
{"43310","Faith"},                                          // 299
{"43240","Feeling"},                                // 300
{"43420","Help"},                                           // 301
{"43430","Hinder"},                                         // 302
{"42240","Hunch"},                                          // 303
{"44220","Inaction"},                               // 304
{"44340","Induction"},                              // 305
{"41440","Inequity"},                               // 306
{"41320","Inertia"},                                // 307
{"41110","Knowledge"},                              // 308
```

```
{"43210","Logic"},                                       //  309
{"44330","Non-acceptance"},                         //  310
{"42340","Non-Accurate"},                     //  311
{"43330","Oppose"},                                      //  312
{"41310","Order"},                                       //  313
{"41130","Perception"},                             //  314
{"44240","Possibility"},                      //  315
{"44140","Potentiality"},                     //  316
{"44120","Proaction"},                              //  317
{"44210","Probability"},                      //  318
{"42330","Process"},                                //  319
{"44440","Production"},                             //  320
{"41420","Projection"},                             //  321
{"44230","Protection"},                             //  322
{"42110","Proven"},                                      //  323
{"43120","Pursuit"},                                //  324
{"44430","Re-evaluation"},                          //  325
{"44130","Reaction"},                               //  326
{"43140","Reconsider"},                             //  327
{"44410","Reduction"},                              //  328
{"42320","Result"},                                      //  329
{"41230","Self-Aware"},                             //  330
{"41430","Speculation"},                      //  331
{"43320","Support"},                                //  332
{"43440","Temptation"},                             //  333
{"42230","Test"},                                        //  334
{"42210","Theory"},                                      //  335
{"41140","Thought"},                                //  336
{"42220","Trust"},                                       //  337
{"42430","Un-Ending"},                              //  338
{"43230","Uncontrolled"},                     //  339
{"42140","Unproven"},                         /* index: 340 (the last element) */

{"10001","Superclass Classes"},          /* Beginning of item names -- Superclass resolution items (4 items)
*/
{"11002","Superclass Types"},
{"11103","Superclass Variations"},
{"11114","Superclass Elements"},
{"11001","Universe Types"},                   /* Class Resolution items (12 items) */
{"21001","Physics Types"},
{"31001","Psychology Types"},
{"41001","Mind Types"},
{"11102","Universe Variations"},
{"21102","Physics Variations"},
{"31102","Psychology Variations"},
{"41102","Mind Variations"],
{"11113","Universe Elements"},
{"21113","Physics Elements"},
{"31113","Psychology Elements"],
{"41113","Mind Elements"},
{"11101","Understanding Variations"},              /* Type Resolution items (32 items )*/
{"12101","Doing Variations"},
{"13101","Obtaining Variations"},
{"14101","Learning Variations"},
{"21101","The Past Variations"},
{"22101","Progress Variations"],
{"23101","The Future Variations"},
{"24101","The Present Variations"},
{"31101","Remembering Variations"},
{"32101","Anticipating Variations"},
{"33101","Desiring Variations"},
{"34101","Considering Variations"},
{"41101","Conceptualizing Variations"},
{"42101","Being Variations"},
{"43101","Becoming Variations"},
{"44101","Conceiving Variations"},
{"11112","Understanding Elements"},
{"12112","Doing Elements"},
{"13112","Obtaining Elements"},
{"14112","Learning Elements"},
{"21112","The Past Elements"},
{"22112","Progress Elements"},
{"23112","The Future Elements"},
{"24112","The Present Elements"},
{"31112","Remembering Elements"},
{"32112","Anticipating Elements"},
{"33112","Desiring Elements"},
{"34112","Considering Elements"},
{"41112","Conceptualizing Elements"},
{"42112","Being Elements"},
{"43112","Becoming Elements"},
{"44112","Conceiving Elements"},
{"11111","Instinct Elements"],                     /* Variation Resolution items (64 items) */
{"11211","Senses Elements"},
{"11311","Interpretation Elements"},
{"11411","Conditioning Elements"},
{"12111","Wisdom Elements"},
{"12211","Skill Elements"},
{"12311","Experience Elements"},
{"12411","Enlightenment Elements"},
{"13111","Approach Elements"},
{"13211","Self-Interest Elements"},
{"13311","Morality Elements"},
{"13411","Attitude Elements"},
{"14111","Prerequisites Elements"},
{"14211","Strategy Elements"},
{"14311","Analysis Elements"},
{"14411","Preconditions Elements"},
{"21111","Fate Elements"},
{"21211","Prediction Elements"},
{"21311","Interdiction Elements"},
{"21411","Destiny Elements"},
{"22111","Fact Elements"],
{"22211","Security Elements"},
{"22311","Threat Elements"},
{"22411","Fantasy Elements"},
{"23111","Resolution Elements"},
{"23211","Procrastination Elements"},              /* used to be Patience */
{"23311","Choice Elements"},                                  /* used to be Haste */
{"23411","Preconception Elements"},
{"24111","Work Elements"},
{"24211","Do Elements"},
{"24311","Don't Elements"},
```

```
        {"24411","Try Elements"},
        {"31111","Truth Elements"},
        {"31211","Evidence Elements"},
        {"31311","Suspicion Elements"},
        {"31411","Falsehood Elements"},
        {"32111","Value Elements"},
        {"32211","Confidence Elements"},
        {"32311","Worry Elements"},
        {"32411","Worth Elements"},
        {"33111","Closure Elements"},
        {"33211","Hope Elements"},
        {"33311","Dream Elements"},
        {"33411","Denial Elements"},
        {"34111","Investigation Elements"},
        {"34211","Appraisal Elements"},
        {"34311","Reappraisal Elements"},
        {"34411","Doubt Elements"},
        {"41111","State-of-Being Elements"},
        {"41211","Situation Elements"},
        {"41311","Circumstances Elements"},
        {"41411","Sense-of-Self Elements"},
        {"42111","Knowledge Elements"},
        {"42211","Ability Elements"},
        {"42311","Desire Elements"},
        {"42411","Thought Elements"},
        {"43111","Rationalization Elements"},
        {"43211","Commitment Elements"},
        {"43311","Responsibility Elements"},
        {"43411","Obligation Elements"},
        {"44111","Can Elements"},
        {"44211","Need Elements"},
        {"44311","Should Elements"},
        {"44411","Want Elements"},
};

/*      ****************************************************
        THIS TABLE LISTS SEMANTIC VALUES AND INFO FOR DYNAMICS
        & APPRECIATIONS (semVals > 999)
                WHEN ADDING APPRECIATIONS:  Make sure to redefine
                LAST_OTHER_APPRID in semtable.h, as well as to
                add the appropriate constants and appropriate
                apprecs_array indicies in in apprdefs.h.
                ALSO:  the constant "TOTAL_OTHERSEM_ITEMS" in
                semtable.h must be updated.
        ****************************************************/

ApprRec dynApprTbl[TOTAL_OTHERSEM_ITEMS] =
{
        { rApprResolve,         "Resolve",                      kApprDynamic,           "Resolve",              0,
                                ("Rslv")        },
                { rApprChange,  NULL,                           kApprChoice,            "Change",
        kSTNoTable,             NULL                            },
                { rApprSteadfast, NULL,         kApprChoice,            "Steadfast",    kSTNoTable,
        NULL                    },

        { rApprDirection,       "Direction",    kApprDynamic,           "Direction",    1,
                ("Dir ")        },
                { rApprStop,    NULL,                           kApprChoice,            "Stop",
        kSTNoTable,             NULL                            },
                { rApprStart,   NULL,                           kApprChoice,            "Start",
        kSTNoTable,             NULL                            },

        { rApprApproach,  "Approach",           kApprDynamic,           "Approach",             2,
                        ("Appr")        },
                { rApprDoer,    NULL,                           kApprChoice,            "Do-er",
        kSTNoTable,             NULL                            },
                { rApprBeer,    NULL,                           kApprChoice,            "Be-er",
        kSTNoTable,             NULL                            },

        { rApprSex,                     "Sex",                  kApprDynamic,           "Mental Sex",   3,
                                ("Sex ")        },
                { rApprMale,    NULL,                           kApprChoice,            "Male",
        kSTNoTable,             NULL                            },
                { rApprFemale,  NULL,                           kApprChoice,            "Female",
        kSTNoTable,             NULL                            },

        { rApprWork,            "Work",                         kApprDynamic,           "Work",                 4,
                                ("Work")        },
                { rApprAction,  NULL,                           kApprChoice,            "Action",
        kSTNoTable,             NULL                            },
                { rApprDecision, NULL,                          kApprChoice,            "Decision",
        kSTNoTable,             NULL                            },

        { rApprLimit,           "Limit",                        kApprDynamic,           "Limit",                5,
                                ("Limt")        },
                { rApprTimelock, NULL,                          kApprChoice,            "Timelock",
        kSTNoTable,             NULL                            },
                { rApprOptionlock,NULL,                         kApprChoice,            "Optionlock",   kSTNoTable,
                NULL                    },

        { rApprOutcome,         "Outcome",                      kApprDynamic,           "Outcome",              6,
                                ("Outc")        },
                { rApprSuccess, NULL,                           kApprChoice,            "Success",
        kSTNoTable,             NULL                            },
                { rApprFailure, NULL,                           kApprChoice,            "Failure",
        kSTNoTable,             NULL                            },

        { rApprJudgment,        "Judgment",     kApprDynamic,           "Judgment",             7,
                        ("Judg")        },
                { rApprGood,                    NULL,   kApprChoice,            "Good",
        kSTNoTable,             NULL                    },
                { rApprBad,                             NULL,   kApprChoice,            "Bad",
        kSTNoTable,             NULL                    },

        //      HIGH-LEVEL APPRECIATIONS

        { rApprNature,                  "Nature",       kApprOverView,          "Nature",
        kSTNoTable,     ("Natu")        },
                { rApprActualDilemma,   NULL,   kApprChoice,            "Actual Dilemma",       kSTNoTable,
        NULL                    },
                { rApprApparentDilemma, NULL,   kApprChoice,            "Apparent Dilemma",     kSTNoTable,
        NULL                    },
```

```
        { rApprActualWork,                  NULL,    kApprChoice,              "Actual Work",
kSTNoTable,     NULL                        },
        { rApprApparentWork,        NULL,    kApprChoice,           "Apparent Work",  kSTNoTable,
NULL                        },

{ rApprEssence,                     "Essence",       kApprOverView,            "Essence",
kSTNoTable,     ("Essn")            },
        { rApprPositive,            NULL,    kApprChoice,           "Positive Feel",  kSTNoTable,
NULL                        },
        { rApprNegative,            NULL,    kApprChoice,           "Negative Feel",  kSTNoTable,
NULL                        },

{ rApprTendency,            "Tendency",      kApprOverView,         "Tendency",
kSTNoTable,     ("Tend")            },
        { rApprWilling,                     NULL,    kApprChoice,              "Willing",
kSTNoTable,     NULL                        },
        { rApprUnwilling,                   NULL,    kApprChoice,              "Unwilling",
kSTNoTable,     NULL                        },

{ rApprReach,                       "Reach",         kApprOverView,            "Reach",
kSTNoTable,     ("Reac")            },
        { rApprBoth,                    NULL,        kApprChoice,              "Both",
kSTNoTable,     NULL                        },
        { rApprMaleEmpathy,             NULL,        kApprChoice,              "Male",
kSTNoTable,     NULL                        },
        { rApprFemaleEmpathy,   NULL,        kApprChoice,           "Female",
kSTNoTable,     NULL                        },
        { rApprNeither,                 NULL,        kApprChoice,              "Neither",
kSTNoTable,     NULL                        },

//      OTHER STANDARD APPRECIATIONS

{ rApprSTDom,     "STDom",          kApprClass,     "Domain",                         kSTDomain,
                        ("SDom")        },
{ rApprSTCon,     "STCon",          kApprType,      "Concern",                        kSTConcern,
                        ("SCon")        },
{ rApprSTRng,     "STRng",          kApprVar,       "Range",                          kSTRange,
                        ("SRng")        },
{ rApprSTPbm,     "STPbm",          kApprElem,      "Problem",                        kSTProblem,
                        ("SPbm")        },
{ rApprSTStp,     "STStp",          kApprType,      "Stipulation",          kSTStipulation,
        ("SStp")        },
{ rApprSTSol,     "STSol",          kApprElem,      "Solution",                       kSTSolution,
                  ("SSol")          },
{ rApprSTFoc,     "STFoc",          kApprElem,      "Focus",                          kSTFocus,
                        ("SFoc")        },
{ rApprSTDir,     "STDir",          kApprElem,      "Direction",            kSTDirection,
        ("SDir")        },
{ rApprSTUnRng,   "STUnRng",        kApprVar,       "Unique Range",         kSTUniqueAbility,
        ("SUnR")        },
{ rApprSTCrFl,    "STCrFl",         kApprVar,       "Critical Flaw",  kSTCriticalFlaw,
("SCrF")          },
{ rApprSTOrd,     "STOrd",          kApprClass,     "Objective Story Domain Position",  kSTNoTable,
NULL                    },
{ rApprSTType1,   "STType1",        kApprType,      "Act 1 Type",           kSTNoTable,
                  ("STy1")          },
{ rApprSTType2,   "STType2",        kApprType,      "Act 2 Type",           kSTNoTable,
                  ("STy2")          },
{ rApprSTType3,   "STType3",        kApprType,      "Act 3 Type",           kSTNoTable,
                  ("STy3")          },
{ rApprSTType4,   "STType4",        kApprType,      "Act 4 Type",           kSTNoTable,
                  ("STy4")          },
{ rApprSTGoal,    "STGoal",         kApprType,      "Goal",                           kSTConcern,
                        ("SGol")        },
{ rApprSTReq,     "STReq",          kApprType,      "Requirements",         kSTStipulation,
        ("SReq")        },
{ rApprSTHmCl,    "STHmCl",         kApprClass,     "Home Class",           kSTNoTable,
                  NULL                  },
{ rApprSTRng2,    "STRng2",         kApprVar,       "Thematic Counterpoint",  kSTNoTable,
NULL                    },

{ rApprMCDom,     "MCDom",          kApprClass,     "Domain",                         kSTMCDomain,
                  ("MDom")          },
{ rApprMCCon,     "MCCon",          kApprType,      "Concern",                        kSTMCConcern,
                  ("MCon")          },
{ rApprMCRng,     "MCRng",          kApprVar,       "Range",                          kSTMCRange,
                        ("MRng")        },
{ rApprMCPbm,     "MCPbm",          kApprElem,      "Problem",                        kSTMCProblem,
                  ("MPbm")          },
{ rApprMCStp,     "MCStp",          kApprType,      "Stipulation",          kSTMCStipulation,
        ("MStp")        },
{ rApprMCSol,     "MCSol",          kApprElem,      "Solution",                       kSTMCSolution,
                  ("MSol")          },
{ rApprMCFoc,     "MCFoc",          kApprElem,      "Focus",                          kSTMCFocus,
                        ("MFoc")        },
{ rApprMCDir,     "MCDir",          kApprElem,      "Direction",            kSTMCDirection,
        ("MDir")        },
{ rApprMCUnRng,   "MCUnRng",        kApprVar,       "Unique Ability",       kSTMCUniqueAbility,
        ("MUnR")        },
{ rApprMCCrFl,    "MCCrFl",         kApprVar,       "Critical Flaw",  kSTMCCriticalFlaw,
("MCrF")          },
{ rApprMCOrd,     "MCOrd",          kApprClass,     "Main Character Domain Position",  kSTNoTable,
NULL                    },
{ rApprMCType1,   "MCType1",        kApprType,      "Act 1 Type",           kSTNoTable,
                  ("MTy1")          },
{ rApprMCType2,   "MCType2",        kApprType,      "Act 2 Type",           kSTNoTable,
                  ("MTy2")          },
{ rApprMCType3,   "MCType3",        kApprType,      "Act 3 Type",           kSTNoTable,
                  ("MTy3")          },
{ rApprMCType4,   "MCType4",        kApprType,      "Act 4 Type",           kSTNoTable,
                  ("MTy4")          },
{ rApprMCGoal,    "MCGoal",         kApprType,      "Dividends",            kSTMCConcern,
        ("MGol")        },
{ rApprMCReq,     "MCReq",          kApprType,      "Forewarnings",         kSTMCStipulation,
        ("MReq")        },
{ rApprMCHmCl,    "MCHmCl",         kApprClass,     "Home Class",           kSTNoTable,
                  NULL                  },
{ rApprMCRng2,    "MCRng2",         kApprVar,       "Thematic Counterpoint",  kSTNoTable,
NULL                    },

{ rApprOCDom,     "OCDom",          kApprClass,     "Domain",                         kSTOCDomain,
                  ("ODom")          },
```

```
	{ rApprOCCon,	"OCCon",	kApprType,	"Concern",	kSTOCConcern,
("OCon")	},
	{ rApprOCRng,	"OCRng",	kApprVar,	"Range",	kSTOCRange,
("ORng")	},
	{ rApprOCPbm,	"OCPbm",	kApprElem,	"Problem",	kSTOCProblem,
("OPbm")	},
	{ rApprOCStp,	"OCStp",	kApprType,	"Stipulation",	kSTOCStipulation,
("OStp")	},
	{ rApprOCSol,	"OCSol",	kApprElem,	"Solution",	kSTOCSolution,
("OSol")	},
	{ rApprOCFoc,	"OCFoc",	kApprElem,	"Focus",	kSTOCFocus,
("OFoc")	},
	{ rApprOCDir,	"OCDir",	kApprElem,	"Direction",	kSTOCDirection,
("ODir")	},
	{ rApprOCUnRng,	"OCUnRng",	kApprVar,	"Unique Ability",	kSTOCUniqueAbility,
("OUnR")	},
	{ rApprOCCrFl,	"OCCrFl",	kApprVar,	"Critical Flaw",	kSTOCCriticalFlaw,
("OCrF")	},
	{ rApprOCOrd,	"OCOrd",	kApprClass,	"Obstacle Character Domain Position",	kSTNoTable,
NULL	},
	{ rApprOCType1,	"OCType1",	kApprType,	"Act 1 Type",	kSTNoTable,
("OTy1")	},
	{ rApprOCType2,	"OCType2",	kApprType,	"Act 2 Type",	kSTNoTable,
("OTy2")	},
	{ rApprOCType3,	"OCType3",	kApprType,	"Act 3 Type",	kSTNoTable,
("OTy3")	},
	{ rApprOCType4,	"OCType4",	kApprType,	"Act 4 Type",	kSTNoTable,
("OTy4")	},
	{ rApprOCGoal,	"OCGoal",	kApprType,	"Cost",	kSTOCConcern,
("OGol")	},
	{ rApprOCReq,	"OCReq",	kApprType,	"Preconditions",	kSTOCStipulation,
("OReq")	},
	{ rApprOCHmCl,	"OCHmCl",	kApprClass,	"Home Class",	kSTNoTable,
NULL	},
	{ rApprOCRng2,	"OCRng2",	kApprVar,	"Thematic Counterpoint",	kSTNoTable,
NULL	},

	{ rApprPLDom,	"PLDom",	kApprClass,	"Domain",	kSTPLDomain,
("PDom")	},
	{ rApprPLCon,	"PLCon",	kApprType,	"Concern",	kSTPLConcern,
("PCon")	},
	{ rApprPLRng,	"PLRng",	kApprVar,	"Range",	kSTPLRange,
("PRng")	},
	{ rApprPLPbm,	"PLPbm",	kApprElem,	"Problem",	kSTPLProblem,
("PPbm")	},
	{ rApprPLStp,	"PLStp",	kApprType,	"Stipulation",	kSTPLStipulation,
("PStp")	},
	{ rApprPLSol,	"PLSol",	kApprElem,	"Solution",	kSTPLSolution,
("PSol")	},
	{ rApprPLFoc,	"PLFoc",	kApprElem,	"Focus",	kSTPLFocus,
("PFoc")	},
	{ rApprPLDir,	"PLDir",	kApprElem,	"Direction",	kSTPLDirection,
("PDir")	},
	{ rApprPLUnRng,	"PLUnRng",	kApprVar,	"Unique Range",	kSTPLUniqueAbility,
("PUnR")	},
	{ rApprPLCrFl,	"PLCrFl",	kApprVar,	"Critical Flaw",	kSTPLCriticalFlaw,
("PCrF")	},
	{ rApprPLOrd,	"PLOrd",	kApprClass,	"Subjective Story Domain Position",	kSTNoTable,
NULL	},
	{ rApprPLType1,	"PLType1",	kApprType,	"Act 1 Type",	kSTNoTable,
("PTy1")	},
	{ rApprPLType2,	"PLType2",	kApprType,	"Act 2 Type",	kSTNoTable,
("PTy2")	},
	{ rApprPLType3,	"PLType3",	kApprType,	"Act 3 Type",	kSTNoTable,
("PTy3")	},
	{ rApprPLType4,	"PLType4",	kApprType,	"Act 4 Type",	kSTNoTable,
("PTy4")	},
	{ rApprPLGoal,	"PLGoal",	kApprType,	"Consequence",	kSTPLConcern,
("PGol")	},
	{ rApprPLReq,	"PLReq",	kApprType,	"Prerequisites",	kSTPLStipulation,
("PReq")	},
	{ rApprPLHmCl,	"PLHmCl",	kApprClass,	"Home Class",	kSTNoTable,
NULL	},
	{ rApprPLRng2,	"PLRng2",	kApprVar,	"Thematic Counterpoint",	kSTNoTable,
NULL	},
	// NOTE: Make sure when adding to this table to redefine LAST_OTHER_APPRID in semtable.h!
};


/* ------------------------------------------------------------------------
	FindApprRecIndex - Find the ApprID in the table using a simple binary
	search.  Taken from Kenny's BSearch code in the Class library.  Return
	an index into the dynApprTbl.
---------------------------------------------------------------------------- */
appr_index_t FindApprRecIndex(appr_id_t ApprID)
{
	short left = 0;
	short right = TOTAL_OTHERSEM_ITEMS -1;
	short x;

	do {
		x = (left + right) / 2;
		if (ApprID == dynApprTbl[x].apprID)
			return (x);
		if (ApprID < dynApprTbl[x].apprID)
			right = x-1;
		else
			left  = x+1;
	} while (left <= right);
	assert(false);				// theoretically should never happen
	return (0);				// return so compiler won't
complain
} /* FindApprRecIndex */


/* ------------------------------------------------------------------------
	FindApprRec - Given a ApprID, return a ptr to the ApprRec
---------------------------------------------------------------------------- */
ApprRec* FindApprRec(appr_id_t ApprID)
{
	assert((ApprID >= 1000 && ApprID <= LAST_OTHER_APPRID));

	appr_index_t n = FindApprRecIndex(ApprID);
```

```
        return (&dynApprTbl[n]);
} /* FindApprRec */

/* ------------------------------------------------------------------------
        ApprName - Given a ApprID, return a char* to the name of the
        DynAppr.
------------------------------------------------------------------------ */
char* ApprName(appr_id_t ApprID)
{
        assert(ApprID == -1 || ApprID == 0 || (ApprID >= 1000 && ApprID <= LAST_OTHER_APPRID));

        if ((ApprID == 0) || (ApprID == -1))
                return ("");

        appr_index_t n = FindApprRecIndex(ApprID);
        return (dynApprTbl[n].name);
} /* ApprName */

/* ------------------------------------------------------------------------
        GetApprVarName - Given a ApprID, return a char* to the DynAppr's variable
        name (PText Key).  This name is used to look up the current value in
        the Response PText segment.
------------------------------------------------------------------------ */
char* GetApprVarName(appr_id_t ApprID)
{
        assert(ApprID == 0 || (ApprID >= 1000 && ApprID <= LAST_OTHER_APPRID));

        if (ApprID == 0)
                return ("");

        appr_index_t n = FindApprRecIndex(ApprID);
        return (dynApprTbl[n].varName);
} /* GetApprVarName */

/* ------------------------------------------------------------------------
        VarToApprID - given an Appreciations PTEXT key (variable name)
        return the ApprID.  NOTE: this uses a painful linear search 'cause
        the PText Keys aren't in sorted order.
------------------------------------------------------------------------ */
appr_id_t VarToApprID(char* PTextKey)
{
        appr_index_t startIndex = 0;
        char c1 = PTextKey[0];
        char c2 = PTextKey[1];

        //      Skip into table: This little trick takes advantage of the fact that the PText keys are grouped

        if (c1 == 'S' && c2 == 'T')
                startIndex = kApprSTDom;
        else if (c1 == 'M' && c2 == 'C')
                startIndex = kApprMCDom;
        else if (c1 == 'O' && c2 == 'C')
                startIndex = kApprOCDom;
        else if (c1 == 'P' && c2 == 'L')
                startIndex = kApprPLDom;

        for (appr_index_t i=startIndex; i<TOTAL_OTHERSEM_ITEMS; ++i)
                if (strcmp(PTextKey, dynApprTbl[i].varName) == 0)
                        return (dynApprTbl[i].apprID);

        asserts(false, "VarToApprID failed -- probably passed a misspelled PText Key");
} /* VarToApprID */

/* ------------------------------------------------------------------------
        VarToApprIndex - given an Appreciations PTEXT key (variable name)
        return an index into the table.  NOTE: this uses a painful linear search
        'cause the PText Keys aren't in sorted order.
------------------------------------------------------------------------ */
appr_index_t VarToApprIndex(char* PTextKey)
{
        appr_index_t startIndex = 0;
        char c1 = PTextKey[0];
        char c2 = PTextKey[1];

        //      Skip into table: This little trick takes advantage of the fact that the PText keys are grouped

        if (c1 == 'S' && c2 == 'T')
                startIndex = kApprSTDom;
        else if (c1 == 'M' && c2 == 'C')
                startIndex = kApprMCDom;
        else if (c1 == 'O' && c2 == 'C')
                startIndex = kApprOCDom;
        else if (c1 == 'P' && c2 == 'L')
                startIndex = kApprPLDom;

        for (appr_index_t i=startIndex; i<TOTAL_OTHERSEM_ITEMS; ++i)
                if (PTextKey && strcmp(PTextKey, dynApprTbl[i].varName) == 0)
                        return (i);

        asserts(false, "VarToApprIndex failed -- probably passed a misspelled PText Key");
} /* VarToApprIndex */

/* ------------------------------------------------------------------------
        GetNmOfApprItems - given an Index into Appreciation, return the
        number of items (dynamic or strucutral) that this appreciation can
        represent.
------------------------------------------------------------------------ */
short GetNmOfApprItems(appr_index_t indexIntoTbl)
{
        assert((indexIntoTbl >=0) && (indexIntoTbl < TOTAL_OTHERSEM_ITEMS));

        switch (GetApprRec(indexIntoTbl)->apprType) {

                case kApprOverView:                     ASSERT(false);
                                                                        break;
                case kApprDynamic:                      return (2);
                case kApprClass:                return (4);
                case kApprType:                         return (16);
```

```
            case kApprVar:                  return (64);
            case kApprElem:                 return (64);
            case kApprChoice:               ASSERT(false);
                                                      break;
        }
} /* GetNmOfApprItems */


/* ---------------------------------------------------------------------
        MakeApprIndex - takes a two part "group" (0-3), such as AP_STORY,
        AP_MAIN, AP_OBSTACLE, AP_PLOT plus an index into the old-style
        appreciations[group].ap[oldStyleIndex] and generates a new-style
        appr_index_t.
--------------------------------------------------------------------- */
appr_index_t MakeApprIndex(short group, short oldStyleIndex)
{
        assert(group >= 0 && group <= 3);               //      0 is AP_STORY, 3 is AP_PLOT

        appr_index_t apprIndex;

        switch (group) {
            case 0:         apprIndex = kApprSTDom;                     // AP_STORY
                                                  break;
            case 1:         apprIndex = kApprMCDom;                     // AP_MAIN
                                                  break;
            case 2:         apprIndex = kApprOCDom;                     // AP_OBSTACLE
                                                  break;
            case 3:         apprIndex = kApprPLDom;                     // AP_PLOT
                                                  break;
        }
        return (apprIndex + oldStyleIndex);

} /* MakeApprIndex */


/* ---------------------------------------------------------------------
        GetFirstIndexForGroup - This rarely used function provides some
        measure of "backwards compatibility" to the old-style access method of
        fApprecPtr[apprecGroup].ap[index], so that we can still use the index
        and we wind up accessing the correct group.
--------------------------------------------------------------------- */
appr_index_t GetFirstIndexForGroup(appr_id_t apprID)
{
        assert(apprID >= rApprSTDom  && apprID <= rApprPLHmCl);

        char* apprVarName = GetApprVarName(apprID);             // Get the variable name for the requested apprID
        char* newVarName = "xxDom";
        newVarName[0] = apprVarName[0];                                 // Copy over first two digits
of appreciaiton group
        newVarName[1] = apprVarName[1];

        appr_id_t          newID          = VarToApprID(newVarName);       // Now find where this ID is located...
        appr_index_t newIndex     = FindApprRecIndex(newID);        // ...and convert to an index.

        return (newIndex);
} /* GetFirstIndexForGroup */


//      *****************************************************
//      this two tables list ptext keys and semvals for the 8
//      dynamic questions.  this is duplicated because it is
//      often more efficient for some areas of the program
//      (such as CPANEL) to directly manipulate this info.
//      *****************************************************

#if 0
dynNmTblType dynamicQuest[8]  =
{
        { "Resolve",        1000 },
        { "Direction",      1010 },
        { "Approach",       1020 },
        { "Sex",                    1030 },
        { "Work",                   1040 },
        { "Limit",                  1050 },
        { "Outcome",        1060 },
        { "Judgment",       1070 },
};
#endif

dynamicNameItems dynamicNameTbl[8] =
{
        { "Change", "Steadfast" },                      // Resolve
        { "Stop", "Start" },                            // Direction
        { "Do-er", "Be-er" },                           // Approach
        { "Male", "Female" },                           // Sex
        { "Action", "Decision" },               // Work
        { "Timelock", "Optionlock" },           // Limit
        { "Success", "Failure" },               // Outcome
        { "Good", "Bad" },                                      // Judgment
};


#if 0
short DynQuest2Offset(char* dynKey)
{
        int i;

        for (i=0; i<8; ++i)
                if (strcmp(dynKey, dynamicQuest[i].name) == 0)
                        return (dynamicQuest[i].semOffset);

        assert(false);
}
#endif


/* $Log:          semtable.cc,v $
Revision 1.17  93/06/02  21:47:48  chris
Moved types, variations, and elements between classes.
```

```
Revision 1.16  93/06/02  16:09:59  chris
Changed reconsideration and consideration to reconsider and consider.

Revision 1.15  93/05/26  19:47:19  stephen
Windows fixes.

Revision 1.14  93/05/21  17:14:48  chris
Clean-up.

Revision 1.13  93/05/18  18:15:04  chris
Changed incorrect addresses for Psychology:Inertian and Perception.

Revision 1.12  93/05/13  15:39:56  chris
Changed Calm to Controlled -- moved its position in the semtable.

Revision 1.11  93/05/12  18:01:18  chris
Modified terms.

Revision 1.10  93/05/07  10:20:35  chris
Added high level appreciations.

Revision 1.9  93/05/06  11:00:22  stephen
Minor fixes to range of DynVals.

Revision 1.8  93/05/04  21:32:49  stephen
Changes to add code for Dynamic Semvals.

Revision 1.7  93/05/04  16:22:49  stephen
Added semantic table for dynamics.

Revision 1.6  93/05/03  16:40:48  stephen
Documented the semVals of many of the semantic items

Revision 1.5  93/04/29  14:20:08  chris
Changed text of "Gender" question to "Mind Sex".

Revision 1.4  93/04/20  11:56:56  chris
Removed definition material and put it in define.r.

Revision 1.3  93/04/19  18:59:05  stephen
New SemTable features for token conversion.

Revision 1.2  93/04/06  19:42:48  stephen
 [3First General Revisions

Revision 1.1  93/03/31  22:42:55  stephen
Initial revision

 */
```

```
/* ------------------------------------------------------------------------
        SEMTABLE.H
        Semantic Table
        Copyright (C) 1993 Screenplay Systems Inc.
        Revised:        $Id: semtable.h,v 1.8 93/05/10 16:57:45 stephen Exp Locker: stephen $
------------------------------------------------------------------------ */

#ifndef __SEMTABLE__
#define __SEMTABLE__


/* ------------------------------------------------------------------------
        The semanticTable is index by a semVal and yeilds one of these
        structures.  SemTbl IS INDEX STARTING AT 1!
------------------------------------------------------------------------ */

#define  TOTAL_SEMANTIC_ITEMS          TOTAL_SEMANTIC_UNITS + TOTAL_SEMANTIC_BIGITEMS
#define TOTAL_SEMANTIC_UNITS           340             /* total # of individual & unique units (squares) in a SuperClass
*/
#define TOTAL_SEMANTIC_BIGITEMS        112             /* total # of unique items (quads or greater) in a SuperClass */
#define START_OF_ELEMENTS              85              /* index into first element unit in semTbl */
#define  MAX_SEMNAME_LEN                     40              /* Max length of a semantic name (used for allocations) */

#define TOTAL_SEMANTIC_DEFS                  148             /* total # of semantic definitions = total classes + types
+ variations + 64 elements (no duplication for element names */
#define TOTAL_CLASSES                        4               /* total # of Classes in a superclass */
#define TOTAL_TYPES                                16              /* total # of Types in a superclass */
#define TOTAL_VARS                                 64              /* total # of Variations in a superclass */
#define TOTAL_ELEMS                                256             /* total # of Elements in a superclass */
#define ELEMS_PER_CLASS                      64              /* number of elements per class */

//      ***********************************************************************
//      THIS TABLE AND FUNCTIONS DEAL WITH THE MAIN TABLE OF STRUCTURAL SEMVALS
//      ***********************************************************************

typedef struct {
        AddrText addr;                  /* address of this semantic name in Reference Superclass */
        char *name;                             /* pointer to textual name */
} SemanticItem;

extern SemanticItem             SemTbl[TOTAL_SEMANTIC_ITEMS+1];      /* zeroth element not used */

typedef struct {
        char *definition;                               /* pointer to textual definition string */
} SemDefinitionItem;

extern const                    SemDefinitionItem DefTbl[TOTAL_SEMANTIC_DEFS+1];       /* zeroth element not used */

#define SEMTBL_CLASS(n)                  (SemTbl[n].addr[0]-'0')
#define SEMTBL_TYPE(n)                   (SemTbl[n].addr[1]-'0')
#define SEMTBL_VARIATION(n)              (SemTbl[n].addr[2]-'0')
#define SEMTBL_ELEMENT(n)          (SemTbl[n].addr[3]-'0')
#define  SEMTBL_ITEMSIZE(n)              (SemTbl[n].addr[4]-'0')
#define SEMTBL_NAME(n)                   (SemTbl[n].name)
#define  SEMTBL_ADDRESS(n)               (&SemTbl[n].addr[0])

#define SEMELEM_NORMALIZE(n)                    (((n-(START_OF_ELEMENTS)) % 64) + 1)
                // gives us a 1-64, for any element in any class (85-340)
#define  SEMELEM_LIMIT_TO_148(n)                (((n-(START_OF_ELEMENTS)) % 64) + (START_OF_ELEMENTS))          //
gives us a 85-148, given any element in any class
#define SEMELEM_RECLASSIFY(class, n)           (n + (START_OF_ELEMENTS-1) + ((class-1) * 64))                  //
given a 1-64 (normalized semval), give us the correct element semVal for a desired class;  if n == 1, return 85. This
version IS correct.  The one above, I don't know

//      NOTE: these macros generate ZERO-OFFSET numbers

#define  SEMCLASS_TO_TOKEN(n)           (n-1)
#define  SEMTYPE_TO_TOKEN(n)                   (n-5)
#define  SEMVAR_TO_TOKEN(n)                    (n-21)
#define  SEMELEM_TO_TOKEN(n)                   (n-85)

#define  TOKEN_TO_SEMCLASS(n)           (n+1)
#define  TOKEN_TO_SEMTYPE(n)                   (n+5)
#define  TOKEN_TO_SEMVAR(n)                    (n+21)
#define  TOKEN_TO_SEMELEM(n)                   (n+85)                  // Converts an element semVal to a 0-255


//      ***********************************************************************
//      THESE TABLES AND FUNCTIONS DEAL WITH SEMANTIC VALUES AND INFO FOR
//      DYNAMICS & APPRECIATIONS (semVals > 999)
//      ***********************************************************************

#define  TOTAL_OTHERSEM_ITEMS          (40+76)         /* total # of dynamic & appreciation semItems & super appreciations
*/
#define  LAST_OTHER_APPRID                     rApprPLRng2       // The last appreciation in the table

const short kApprOverView           = 0;
const short        kApprDynamic            = 1;
const short        kApprClass                      = 2;
const short        kApprType                       = 3;
const short        kApprVar                        = 4;
const short        kApprElem                       = 5;
const short kApprChoice                     = 6;

typedef  short     semval_t;               // Define an appreciation semVal type
typedef  short     appr_id_t;              // Define an appreciation ID type
typedef  short     appr_index_t;     // Define an appreciation table index type

typedef struct {
        appr_id_t         apprID;                       // Numeric address of this appreciation
        char*             varName;                      // PText variable key to locate value of this appreciation
        short             apprType;                     // Structural, Dynamic or appreciation?  If structural, which
Level?
        char*             name;                         // Textual name of this appreciation
        short             myTable;                      // Which storytbl.pfm search table is associated with this
appreciation (0 for none)
        char*             storyDBSeg;                   // Seg ID for saving and retrieving info from the story database.
} ApprRec;

extern ApprRec dynApprTbl[TOTAL_OTHERSEM_ITEMS];

//      Functions to extract relevant Appreciation & apprID values.
//      NOTE: GetApprValByID() and GetApprValByIndex() are DRDoc:: member functions
```

```
inline  ApprRec*                GetApprRec(appr_index_t indexIntoTbl);
        appr_index_t            FindApprRecIndex(appr_id_t apprID);
        ApprRec*                        FindApprRec(appr_id_t apprID);
        char*                           ApprName(appr_id_t apprID);
        char*                           GetApprVarName(appr_id_t apprID);
        appr_id_t                       VarToApprID(char* PTextKey);                    // Given PText key for
an appreciation, return the ApprID
        appr_index_t            VarToApprIndex(char* PTextKey);
        short                           GetNmOfApprItems(appr_index_t indexIntoTbl);
        appr_index_t            MakeApprIndex(short group, short oldStyleIndex);
        appr_index_t            GetFirstIndexForGroup(appr_id_t apprID);


//      **********************
//      MISC. DYNAMIC FUNCTIONS
//      **********************

typedef struct {
        char*   choice[2];              /* the two different choices for each dynamic */
} dynamicNameItems;

extern dynamicNameItems     dynamicNameTbl[8];

#define  DYNTBL_NAME(whichDynamic, n)       (dynamicNameTbl[whichDynamic].choice[n-1])   /* Note: n is either 1-2 */


#if 0
typedef struct {                                        // This table used when looping thru 8 dynamic questions
        char*   name;
        short   semOffset;
} dynNmTblType;
#endif

//      *************************************************************************
//      THE FOLLOWING CONSTANTS ARE THE SEGMENT IDS FOR SEARCH SEGMENTS IN STORYTBL.PFM
//      *************************************************************************

typedef short   stbl_choices;
typedef uchar   skewBias_flags;

const stbl_choices              kSTNoTable                          = 9999;  // Table not used

const skewBias_flags    kSBNoChoices                    = 0x00;
const skewBias_flags    kSBChangeSteadfast              = 0x01;         // Resolve
const skewBias_flags    kSBStartStop                    = 0x02;         // Direction
const skewBias_flags    kSBDoerBeer                             = 0x04;         // Approach
const skewBias_flags    kSBEmpathySympathy              = 0x08;         // Sex
const skewBias_flags    kSBActionDecision               = 0x10;         // Workspace
const skewBias_flags    kSBSpacelockTimelock    = 0x20;         // Limit
const skewBias_flags    kSBSuccessFailure               = 0x40;         // Outcome
const skewBias_flags    kSBGoodBad                              = 0x80;         // Judgment

const stbl_choices              kSTSkewBias                     =  0;   // 8 Skew/Bias answers

/***************** Story Appreciations **********************/
const stbl_choices              kSTDomain                       =  1;   // Class
const stbl_choices              kSTConcern                      =  2;   // Type                 Story Goal
const stbl_choices              kSTRange                        =  3;   // Variation    Story Thematic Focus
const stbl_choices              kSTProblem                      =  4;   // Element
const stbl_choices              kSTStipulation          =  5;   // Type                 Story Requirement
const stbl_choices              kSTSolution                     =  6;   // Element
const stbl_choices              kSTFocus                        =  7;   // Element
const stbl_choices              kSTDirection            =  8;   // Element
const stbl_choices              kSTUniqueAbility        =  9;   // Variation    Story "Unique Range"
const stbl_choices              kSTCriticalFlaw         = 10;   // Variation

/***************** Main Character Appreciations **************/
const stbl_choices              kSTMCDomain                     = 11;   // Class
const stbl_choices              kSTMCConcern            = 12;   // Type                 Story Dividend
const stbl_choices              kSTMCRange                      = 13;   // Variation    MC Thematic Focus
const stbl_choices              kSTMCProblem            = 14;   // Element
const stbl_choices              kSTMCStipulation        = 15;   // Type                 Story Pre-conditions
const stbl_choices              kSTMCSolution           = 16;   // Element
const stbl_choices              kSTMCFocus                      = 17;   // Element
const stbl_choices              kSTMCDirection          = 18;   // Element
const stbl_choices              kSTMCUniqueAbility      = 19;   // Variation
const stbl_choices              kSTMCCriticalFlaw       = 20;   // Variation

/***************** Obstacle Character Appreciations **********/
const stbl_choices              kSTOCDomain                     = 21;   // Class
const stbl_choices              kSTOCConcern            = 22;   // Type                 Story Dividend
const stbl_choices              kSTOCRange                      = 23;   // Variation    OC Thematic Focus
const stbl_choices              kSTOCProblem            = 24;   // Element
const stbl_choices              kSTOCStipulation        = 25;   // Type                 Story Pre-requisites
const stbl_choices              kSTOCSolution           = 26;   // Element
const stbl_choices              kSTOCFocus                      = 27;   // Element
const stbl_choices              kSTOCDirection          = 28;   // Element
const stbl_choices              kSTOCUniqueAbility      = 29;   // Variation
const stbl_choices              kSTOCCriticalFlaw       = 30;   // Variation

/***************** Plot Appreciations **********************/
const stbl_choices              kSTPLDomain                     = 31;   // Class
const stbl_choices              kSTPLConcern            = 32;   // Type                 Story Consequence
const stbl_choices              kSTPLRange                      = 33;   // Variation    Plot Thematic Focus
const stbl_choices              kSTPLProblem            = 34;   // Element
const stbl_choices              kSTPLStipulation        = 35;   // Type                 Story Forewarnings
const stbl_choices              kSTPLSolution           = 36;   // Element
const stbl_choices              kSTPLFocus                      = 37;   // Element
const stbl_choices              kSTPLDirection          = 38;   // Element
const stbl_choices              kSTPLUniqueAbility      = 39;   // Variation
const stbl_choices              kSTPLCriticalFlaw       = 40;   // Variation

const short                     kMaxStoryTables         = 41;   // Total number of story tables we can
load

/* ----------------------------------------------------------------------
        GetApprRec - Given an index into the dynApprTbl, return a ptr to the
        ApprRec.
---------------------------------------------------------------------- */
inline ApprRec* GetApprRec(appr_index_t indexIntoTbl)
{
        assert(indexIntoTbl < TOTAL_OTHERSEM_ITEMS);
```

```
        return (&dynApprTbl[indexIntoTbl]);
} /* GetApprRec */

#endif /* __SEMTABLE__ */


/* $Log:          semtable.h,v $
 * Revision 1.8  93/05/10  16:57:45  stephen
 * New semantic-related functions.
 *
 * Revision 1.7  93/05/07  10:16:35  chris
 * Added high level dynamics to the story points window.
 *
 * Revision 1.6  93/05/04  21:33:13  stephen
 * Changes to add code for Dynamic Semvals.
 *
 * Revision 1.5  93/05/04  16:23:48  stephen
 * Added semantic table for dynamics.
 *
 * Revision 1.4  93/05/03  16:41:12  stephen
 * Added some critical macros for semantic item conversion.
 *
 * Revision 1.3  93/04/19  18:59:24  stephen
 * New SemTable features for token conversion.
 *
 * Revision 1.2  93/04/06  19:42:51  stephen
 *  [3First General Revisions
 *
 * Revision 1.1  93/03/31  22:43:23  stephen
 * Initial revision
 *
 */
```

```
/*********************************************************************
        SINFO.CC
        Storytelling info dialog
        (c) 1993 Screenplay Systems
        Authors:        S. Greenfield & C. Huntley
        Created:        May 31, 1993
        Revised:        $Id$
**********************************************************************
*/

#include "genutls.h"
#include "pools.h"

#include "editview.h"
#include "popup.h"

#include "dramatic.h"
#include "document.h"
#include "drrez.h"
#include "ptext.h"
#include "sinfo.h"


#pragma segment sinfo

/* -------------------------------------------------------------------------
                                SInfoDlog (Story info) DIALOG CLASS
--------------------------------------------------------------------------- */
SInfoDlog::SInfoDlog(void)
        : TDialog(rSInfoDlog)
{
        fApp                            = (Dramatica*)AP_Data()->fApp;
        fAppPFMFile             = fApp->GetPFMFile();

        ls_index activeDoc      = fApp->ActiveDoc();
        assert(activeDoc != kLsNoElem);

        fDoc                            = ((DRDoc*)fApp->GetDoc(activeDoc));
        assert(fDoc);
        fResponses                      = fDoc->GetRESP();
} /* SInfoDlog::SInfoDlog */


/* -------------------------------------------------Stephen---03/19/93---
        SInfoDlog::~SInfoDlog - Destructor.
------------------------------------------------------------------------- */
SInfoDlog::~SInfoDlog (void)
{

        if (fItemHit == kOkBtn) {

                PText*  storyDocPT;
                char    authorName[60];
                char    analysisName[60];
                char    storyTitle[60];
                char    sourceText[kMaxSInfoSize];
                char    synopsisText[kMaxSynopsisSize];
                char    storyDraft[60];
                char    storyGenre[100];
                char    storyPeriod[60];
                char    storyPlace[100];

                short   forum;
                short   format;
                short   MCVoice;
                short   OCVoice;
                byte_cnt        textSize;

                storyDocPT      = fDoc->GetSDOC();

                forum           = (short)((Popup*)GetItem(kSInfoForumPopup))->GetCntlVal();
                format          = (short)((Popup*)GetItem(kSInfoFormatPopup))->GetCntlVal();
                MCVoice         = (short)((Popup*)GetItem(kSInfoMCVoicePopup))->GetCntlVal();
                OCVoice         = (short)((Popup*)GetItem(kSInfoOCVoicePopup))->GetCntlVal();

                textSize = sizeof(storyTitle);
                ((EditView*)GetItem(kSInfoTitle))->GetText(storyTitle, &textSize);
                storyDocPT->SetParam("Title", 'c', storyTitle);

                textSize = sizeof(authorName);
                ((EditView*)GetItem(kSInfoAuthor))->GetText(authorName, &textSize);
                storyDocPT->SetParam("Author", 'c', authorName);

                textSize = sizeof(analysisName);
                ((EditView*)GetItem(kSInfoAnalysis))->GetText(analysisName, &textSize);
                storyDocPT->SetParam("Analysis", 'c', analysisName);

                textSize = sizeof(storyDraft);
                ((EditView*)GetItem(kSInfoDraft))->GetText(storyDraft, &textSize);
                storyDocPT->SetParam("Draft", 'c', storyDraft);

                textSize = sizeof(storyGenre);
                ((EditView*)GetItem(kSInfoGenre))->GetText(storyGenre, &textSize);
                storyDocPT->SetParam("Genre", 'c', storyGenre);

                textSize = sizeof(storyPeriod);
                ((EditView*)GetItem(kSInfoPeriod))->GetText(storyPeriod, &textSize);
                storyDocPT->SetParam("Period", 'c', storyPeriod);

                textSize = sizeof(storyPlace);
                ((EditView*)GetItem(kSInfoPlace))->GetText(storyPlace, &textSize);
                storyDocPT->SetParam("Place", 'c', storyPlace);

                storyDocPT->SetParam("Forum", 's', forum);
                storyDocPT->SetParam("Format", 's', format);
                storyDocPT->SetParam("OCVoice", 's', OCVoice);
                storyDocPT->SetParam("MCVoice", 's', MCVoice);

                textSize = sizeof(synopsisText);
                ((EditView*)GetItem(kSInfoSynopsis))->GetText(synopsisText, &textSize);
                storyDocPT->SetParam("Synopsis", 'c', synopsisText);
```

```
                textSize = sizeof(sourceText);
                ((EditView*)GetItem(kSInfoSource))->GetText(sourceText, &textSize);
                storyDocPT->SetParam("Source", 'c', sourceText);

                storyDocPT->SaveSeg();
                if (storyDocPT->WasSegModified()) {
                        fDoc->Set(TDoc::kDirty);
                        storyDocPT->SegNowSaved();                                  // Make sure we unset
this segment's saving flags
                }

        }

} /* SInfoDlog::~SInfoDlog */


/* -----------------------------------------------------Ken---06/08/92---
        SInfoDlog::init_dlog - initialize the question and answer text.
----------------------------------------------------------------------- */
void SInfoDlog::init_dlog(void)
{
        char windowTitle[60];

        TDialog::init_dlog();

        PText*  storyDocPT;
        char    storyTitle[60];
        char    authorName[50];
        char    analysisName[50];
        char    sourceText[kMaxSInfoSize];
        char    synopsisText[kMaxSynopsisSize];
        char    storyDraft[60];
        char    storyGenre[100];
        char    storyPeriod[60];
        char    storyPlace[100];
        short   forum           = 0;
        short   format          = 0;
        short   MCVoice         = 0;
        short   OCVoice         = 0;

        strcpy(storyTitle, "The Story");
        authorName[0]     = 0;
        analysisName[0] = 0;
        sourceText[0]     = 0;
        synopsisText[0] = 0;
        storyDraft[0]     = 0;
        storyGenre[0]     = 0;
        storyPeriod[0]    = 0;
        storyPlace[0]     = 0;

        storyDocPT        = fDoc->GetSDOC();
        storyDocPT->GetParam("Title", 'c', storyTitle);
        ((EditView*)GetItem(kSInfoTitle))->SetText(storyTitle);

        storyDocPT->GetParam("Author", 'c', authorName);
        ((EditView*)GetItem(kSInfoAuthor))->SetText(authorName);

        storyDocPT->GetParam("Analysis", 'c', analysisName);
        ((EditView*)GetItem(kSInfoAnalysis))->SetText(analysisName);

        storyDocPT->GetParam("Draft", 'c', storyDraft);
        ((EditView*)GetItem(kSInfoDraft))->SetText(storyDraft);

        storyDocPT->GetParam("Genre", 'c', storyPeriod);
        ((EditView*)GetItem(kSInfoGenre))->SetText(storyPeriod);

        storyDocPT->GetParam("Period", 'c', storyPeriod);
        ((EditView*)GetItem(kSInfoPeriod))->SetText(storyPeriod);

        storyDocPT->GetParam("Place", 'c', storyPlace);
        ((EditView*)GetItem(kSInfoPlace))->SetText(storyPlace);


        storyDocPT->GetParam("Forum", 's', &forum);
        ((Popup*)GetItem(kSInfoForumPopup))->SetCntlVal(forum, false);

        storyDocPT->GetParam("Format", 's', &format);
        ((Popup*)GetItem(kSInfoFormatPopup))->SetCntlVal(format, false);

        storyDocPT->GetParam("MCVoice", 's', &MCVoice);
        ((Popup*)GetItem(kSInfoMCVoicePopup))->SetCntlVal(MCVoice, false);

        storyDocPT->GetParam("OCVoice", 's', &OCVoice);
        ((Popup*)GetItem(kSInfoOCVoicePopup))->SetCntlVal(OCVoice, false);


        storyDocPT->GetParam("Synopsis", 'c', synopsisText);
        ((EditView*)GetItem(kSInfoSynopsis))->SetText(synopsisText);

        storyDocPT->GetParam("Source", 'c', sourceText);
        ((EditView*)GetItem(kSInfoSource))->SetText(sourceText);

} /* SInfoDlog::init_dlog */


/* -----------------------------------------------------Ken---06/08/92---
        SInfoDlog::DoItemHit - react to a user action in the dialog.
----------------------------------------------------------------------- */
void SInfoDlog::DoItemHit(ls_index itemHit)
{
        if (itemHit != kOkBtn && itemHit != kCancelBtn) {

        }
} /* SInfoDlog::DoItemHit */
```

```
/* ------------------------------------------------------------------------
                                              Story Info DLOG COMMAND CLASS
------------------------------------------------------------------------ */

/* ------------------------------------------------------------------------
        SInfoCmd::IsValid -
------------------------------------------------------------------------ */
bool_t SInfoCmd::IsValid(TAppl *pApp)
{
        ls_index          activeDoc          = pApp->ActiveDoc();
        if (activeDoc != kLsNoElem) {
                DRDoc*   theDoc = ((DRDoc*)pApp->GetDoc(activeDoc));
                return (theDoc == NULL) ? false : true;
        }
        return (false);

} /* SInfoCmd::IsValid */


/* ------------------------------------------------------------------------
        SInfoCmd::do_cmd -
------------------------------------------------------------------------ */
err_t SInfoCmd::do_cmd(void)
{
        (new SInfoDlog())->ModalLoop();

//      beep();

        return NOERR;

} /* SInfoCmd::do_cmd */


#pragma segment main


/* $Log:          sinfo.cc,v $
Revision 1.3  93/09/24  15:32:23  stephen
Cleaned up warnings.

Revision 1.2  93/05/31  21:27:54  chris
Added complete functionality to dlog.

Revision 1.1  93/05/31  18:21:52  stephen
Initial revision

 */
```

```
/* ----------------------------------------------------------------------
        SINFO.H
        Storytelling Info Dialog
        Copyright (C) 1993 Screenplay Systems Inc.
        Revised:        $Id$
---------------------------------------------------------------------- */

#pragma once

#ifndef __SINFO__
#define __SINFO__

#include "tappl.h"
#include "tdialog.h"
#include "appcmds.h"

#include "ptext.h"

#pragma segment sinfo


/* ----------------------------------------------------------------------
        DITL Constants - Story Info Dialog
---------------------------------------------------------------------- */
const ls_index      kSInfoXXX                       = 2;
const ls_index      kSInfoTitle                     = 3;
const ls_index      kSInfoAuthor                = 5;
const ls_index      kSInfoForumPopup        = 7;
const ls_index      kSInfoFormatPopup           = 9;
const ls_index      kSInfoAnalysis              = 11;
const ls_index      kSInfoSource                = 13;
const ls_index      kSInfoMCVoicePopup          = 16;
const ls_index      kSInfoOCVoicePopup          = 18;

const ls_index      kSInfoSynopsis              = 20;
const ls_index      kSInfoDraft                     = 22;
const ls_index      kSInfoGenre                     = 24;
const ls_index      kSInfoPeriod                = 26;
const ls_index      kSInfoPlace                     = 28;

const byte_cnt      kMaxSInfoSize               = 300;          // max source info text
const byte_cnt      kMaxSynopsisSize        = 500;          // max brief synopsis text

/* ----------------------------------------------------------------------
        SInfoDlog - Detail storytelling info
---------------------------------------------------------------------- */
class EXPORT_CLASS SInfoDlog : public TDialog {
public:
        SInfoDlog(void);
        ~SInfoDlog(void);

        // PUBLIC UTILITIES
        virtual char*       ClassName(void) const       { return "SInfoDlog"; }
        virtual class_t     ClassType(void) const       { return kSInfoDlog; }
        virtual bool_t      IsOfType(const void *pType) const { return *(class_t*) pType == kSInfoDlog ||
TDialog::IsOfType(pType); }

        virtual void        DoItemHit(ls_index itemHit);

protected:
        // DATA MEMBERS
        Dramatica*          fApp;
        DRDoc*              fDoc;
        pfm_fd_t            fAppPFMFile;
        PText*              fResponses;

        // LOCAL UTILITIES
        virtual void        init_dlog(void);

}; /* SInfoDlog */



/* ----------------------------------------------------------------------
        SInfoCmd - Invokes the Storytelling text dialog.
---------------------------------------------------------------------- */
class SInfoCmd : public TCommand {
public:
        SInfoCmd(TAppl* pTAppl) : TCommand(pTAppl) {}

        virtual char*       ClassName(void)     const       { return "SInfoCmd"; }
        virtual class_t     ClassType(void) const       { return kSInfoCmd; }
        virtual bool_t      IsOfType(const void *pType) const { return *(class_t*) pType == kSInfoCmd ||
TCommand::IsOfType(pType); }
        virtual TObject* Duplicate(void) const      { return new SInfoCmd(*this); }

        static bool_t       IsValid(TAppl *pTAppl);

protected:
        virtual err_t       do_cmd(void);

}; /* SInfoCmd */

#pragma segment main

#endif /* __SINFO__ */


/* $Log:        sinfo.h,v $
 * Revision 1.2  93/05/31  21:28:16  chris
 * Added complete functionality to dlog.
 *
 * Revision 1.1  93/05/31  18:22:01  stephen
 * Initial revision
 *
 */
```

```
/*********************************************************************
        STELLING.CC
        Stroytelling Dialog
        (c) 1993 Screenplay Systems
        Authors:        S. Greenfield & C. Huntley
        Created:        May 25, 1993
        Revised:        $Id$
**********************************************************************

*/


#include "genutls.h"
#include "stringx.h"
#include "pools.h"

#include "popup.h"
#include "editview.h"

#include "dramatic.h"
#include "document.h"
#include "ptext.h"
#include "subtext.h"
#include "semtable.h"
#include "textwrap.h"
#include "storypnt.h"
#include "drrez.h"
#include "stelling.h"


#pragma segment stelling

/* --------------------------------------------------------------------------
                                    STellDlog (Storytelling info) DIALOG CLASS
---------------------------------------------------------------------------- */
STellDlog::STellDlog(char* whichItem, short theRow)
          : TDialog(rSTellDlog),
                  fWhichItem (whichItem),
                  fRow (theRow)
{
        fApp            = (Dramatica*)AP_Data()->fApp;
        fAppPFMFile = fApp->GetPFMFile();
        ls_index activeDoc        = fApp->ActiveDoc();
        assert(activeDoc != kLsNoElem);
        fDoc            = ((DRDoc*)fApp->GetDoc(activeDoc));
        assert(fDoc);
        fResponses      = fDoc->GetRESP();
        fStellingPT = fDoc->GetSTEL();

        fApprIndex = VarToApprIndex(fWhichItem);


        fFont = GL_SYS_FONT;
        fFontSize = 12;

        int i;
        for (i=0; i<=SP_ROWS; ++i) {
                fStellingFlag[i] = true;                    // initialize them to true
        }
        fStellingFlag[0] = false;
        fStellingFlag[1] = false;
        fStellingFlag[2] = false;
        fStellingFlag[7] = false;
        fStellingFlag[16] = false;
        fStellingFlag[17] = false;
        fStellingFlag[36] = false;
        fStellingFlag[47] = false;
        fStellingFlag[48] = false;
        fStellingFlag[49] = false;
        fStellingFlag[50] = false;
        fStellingFlag[51] = false;
        fStellingFlag[52] = false;
        fStellingFlag[57] = false;
        fStellingFlag[62] = false;
        fStellingFlag[67] = false;
        fStellingFlag[72] = false;
        fStellingFlag[73] = false;
        fStellingFlag[84] = false;

}


/* ------------------------------------------------Stephen---03/19/93---
        STellDlog::~STellDlog - Destructor.
---------------------------------------------------------------------- */
STellDlog::~STellDlog (void)
{

        if (fItemHit == kOkBtn) {
                byte_cnt textSize = kMaxStellSize;
                hdl_t       stellStrHdl = MM_ALLOC_INIT(textSize, mm_no_flags, 0, "stellStr Hdl", NULL);
                assert(stellStrHdl);
                char* stellText = (char*)MM_USE(stellStrHdl);

                ((EditView*)GetItem(kSTellEditText))->GetText(stellText, &textSize);

                fStellingPT->SetParam(fWhichItem, 'c', stellText);

                fStellingPT->SaveSeg();
                if (fStellingPT->WasSegModified()) {
                        fDoc->Set(TDoc::kDirty);
                        fStellingPT->SegNowSaved();
                }
                MM_UNUSE(stellStrHdl);
                MMFree(stellStrHdl);

        }
        destruct_context_data();

} /* STellDlog::~STellDlog */
```

```
void STellDlog::draw_window(GL_ENV_REF env)
{
	assert(fGraphEnv.IsInUse());
	TWindow::draw_window(env);

#ifdef TOOLBOX
	outline_ok_btn(env);
#endif

	fContextTW->Draw(&fGraphEnv, NULL, kNeverPrint, 8, 16);

}

/* -----------------------------------------------------Ken---06/08/92---
	STellDlog::init_dlog - initialize the question and answer text.
------------------------------------------------------------------------ */
void STellDlog::init_dlog(void)
{
	char windowTitle[60];

	TDialog::init_dlog();

	init_context_data();
	init_pool_data();

} /* STellDlog::init_dlog */


/* ----------------------------------------------------Chris---06/22/93---
	STellDlog::init_pool_data - initialize the stelling pool text.
------------------------------------------------------------------------ */
void STellDlog::init_pool_data(void)
{
	pl_id stPID = fStellingPT->GetParam(fWhichItem, 'c');
	if (stPID >= 0) {
		fStellingPT->UseDataPool();
		((EditView*)GetItem(kSTellEditText))->SetText(fStellingPT->PID2Ptr(stPID));
		fStellingPT->UnuseDataPool();
	} else {
		((EditView*)GetItem(kSTellEditText))->SetText("");
	}
} /* STellDlog::init_pool_data */


/* ----------------------------------------------------Chris---05/29/93---
	STellDlog::build_context - builds the context string of the
	storytelling question.
------------------------------------------------------------------------ */
void STellDlog::build_context(void)
{
	PText*		PT;
	pt_err		theErr;
	SubText* SbTxt			= NULL;
	short theType;
	semval_t theValue;
	char tmpStr1[200];
	char tmpStr2[200];
	char *cp;

	tmpStr1[0] = 0;
	tmpStr2[0] = 0;

	PT = new PText(fAppPFMFile, _OSType("APPR"), fRow, &theErr, kRdOnly);   // Grab APPR segment from .pfm file
	assert(theErr != kNoSuchPFMSeg);

	PT->GetParam("TY", 's', &theType);

	if ((theType >= 1 && theType <= 6 ) || (theType == 8)) {

		fContextStr.CatStr("Illustrate how ");

		if (fRow > 15) {					// only do this for basic eight
appreciations
			PT->GetParam("DF", 'c', tmpStr1);
			sprintf(tmpStr2,"%s ", tmpStr1);
			fContextStr.CatStr(tmpStr2);

			PT->GetParam("NM", 'c', tmpStr1);
			sprintf(tmpStr2,"(%s) ", tmpStr1);
			fContextStr.CatStr(tmpStr2);
			fContextStr.CatStr("concerns ");
		}

		tmpStr1[0] = 0;
		PT->GetParam("VN", 'c', tmpStr1);
		appr_index_t apprIndex = VarToApprIndex(tmpStr1);
		theValue = fDoc->GetApprValByIndex(apprIndex);

		tmpStr2[0] = 0;
		sprintf(tmpStr2,"{SDF(%hd)} ({SNF(%hd)}):", theValue, theValue);
		SbTxt = new SubText(fDoc, tmpStr2);
		assert (SbTxt);
		cp = SbTxt->DoSubstitution();
		fContextStr.CatStr(cp);

		short theNewValue = theValue;
		if (theValue >=85 && theValue <1000)
			theNewValue = SEMELEM_LIMIT_TO_148(theValue);
		pfm_fd_t currentFile = PFMSetCurrentFile(fAppPFMFile);
		hdl_t DefSegHdl = (hdl_t) PFMCheckoutSeg(_OSType("LDEF"), theNewValue);
		if (DefSegHdl) {
			char* DefSegPtr = (char *)MM_USE(DefSegHdl);

			((EditView*)GetItem(kSTellLDefineText))->SetText(DefSegPtr);

			MM_UNUSE(DefSegHdl);
			theErr = PFMCheckinSeg(DefSegHdl);
			assert(theErr == noerr);
		}
		PFMSetCurrentFile(currentFile);
	}

	delete PT;
```

```
        if (SbTxt)
                delete SbTxt;

}

/* ------------------------------------------------------CNH---05/29/93---
        STellDlog::init_context_data - Sets up our data.
----------------------------------------------------------------------- */
void STellDlog::init_context_data(void)
{
//      fApp->PushCursor(AP_WATCH_CURS);

//      Load in all the proper appreciation segments

        build_context();

        GLRect   textRect;
        GLSetRect(&textRect, 0, 0, 100, 380);
        fContextStr.Use();
        char* cp = fContextStr.StrPtr();

        fGraphEnv.Use();
        fContextTW = new TextWrap(fDoc, &fGraphEnv, &textRect, cp, fFont, fFontSize);
        fGraphEnv.Unuse();
        fContextStr.Unuse();
//      fApp->PopCursor();
}

/* ------------------------------------------------------CNH---06/22/93---
        STellDlog::destruct_context_data - initialize the question and answer text.
----------------------------------------------------------------------- */
void STellDlog::destruct_context_data(void)
{
        delete fContextTW;

} /* STellDlog::init_dlog */


// USE CODE BELOW TO CHANGE WINDOW TITLE...
#if 0
        strcpy(windowTitle, charName);
        strcat(windowTitle, "'s Character Info");
        SetTitle(windowTitle);
#endif



/* ------------------------------------------------------Ken---06/08/92---
        STellDlog::DoItemHit - react to a user action in the dialog.
----------------------------------------------------------------------- */
void STellDlog::DoItemHit(ls_index itemHit)
{
        if (itemHit != kOkBtn && itemHit != kCancelBtn) {
                int r;
                if ((itemHit == kSTellNextBtn) || (itemHit == kSTellPreviousBtn)) {
                        if (((fRow == SP_ROWS) && (itemHit == kSTellNextBtn)) || ((fRow == 3) && (itemHit ==
kSTellPreviousBtn))) {                          // we are at the end or beginning
                                beep();
                        } else {
                                if (itemHit == kSTellNextBtn) {
                                        for (r=fRow+1; r<=SP_ROWS; ++r) {
                                                if (fStellingFlag[r] == true) {
                                                        break;
                                                }
                                        }
                                } else {
                                        for (r=fRow-1; r>=3; --r) {
                                                if (fStellingFlag[r] == true) {
                                                        break;
                                                }
                                        }
                                }

                                byte_cnt textSize = kMaxStellSize;
                                hdl_t    stellStrHdl = MM_ALLOC_INIT(textSize, mm_no_flags, 0, "stellStr Hdl",
NULL);

                                assert(stellStrHdl);
                                char* stellText = (char*)MM_USE(stellStrHdl);
                                ((EditView*)GetItem(kSTellEditText))->GetText(stellText, &textSize);

                                fStellingPT->SetParam(fWhichItem, 'c', stellText);
                                fStellingPT->SaveSeg();
                                if (fStellingPT->WasSegModified()) {
                                        fDoc->Set(TDoc::kDirty);
                                        fStellingPT->SegNowSaved();
                                }
                                MM_UNUSE(stellStrHdl);
                                MMFree(stellStrHdl);

                                fRow = r;

                                PText*          PT;
                                pt_err          theErr;
                                PT = new PText(fAppPFMFile, _OSType("APPR"), r, &theErr, kRdOnly);      // Grab APPR
segment from .pfm file

                                assert(theErr != kNoSuchPFMSeg);
                                PT->GetParam("VN", 'c', fWhichItem);
                                delete PT;

                                fContextStr.SetAllocSize(0);
                                destruct_context_data();
                                init_context_data();
                                init_pool_data();

                                GLRect   textRect;
                                GLColor savedForeColor;

                                fGraphEnv.Use();
                                fGraphEnv.GetForeColor(&savedForeColor);
```

```
                                        fGraphEnv.SetForeColor(kGL25GrayClr);
                                        GLSetRect(&textRect, 4, 8, 115, 396);
                                        fGraphEnv.PaintRect(textRect);
                                        fGraphEnv.SetForeColor(savedForeColor);

                                        GL_ENV_REF env = fGraphEnv.InqEnvRef();
                                        draw_window(env);
                                        fGraphEnv.Unuse();
                                }
                        }
                }
} /* STellDlog::DoItemHit */


#if 0
/* ------------------------------------------------------------------------
                                                        Storytelling info COMMAND CLASS
------------------------------------------------------------------------ */

/* ------------------------------------------------------------------------
        STellCmd::IsValid -
------------------------------------------------------------------------ */
bool_t STellCmd::IsValid(TAppl *pApp)
{
        ls_index        activeDoc       = pApp->ActiveDoc();
        if (activeDoc != kLsNoElem) {
                DRDoc*  theDoc = ((DRDoc*)pApp->GetDoc(activeDoc));
                return (theDoc == NULL) ? false : true;
        }
        return (false);

//      return pApp->ActiveWindow() && ! pApp->ActiveWindow()->IsModalDlog();

} /* STellCmd::IsValid */


/* ------------------------------------------------------------------------
        STellCmd::do_cmd -
------------------------------------------------------------------------ */
err_t STellCmd::do_cmd(void)
{
        (new STellDlog("STDom", 18))->ModalLoop();
        (new STellDlog("STCon", 19))->ModalLoop();
        (new STellDlog("STRng", 20))->ModalLoop();
        (new STellDlog("STPbm", 21))->ModalLoop();
        (new STellDlog("STSol", 30))->ModalLoop();

        beep();

        return NOERR;

} /* STellCmd::do_cmd */
#endif

#pragma segment main


/* $Log:          stelling.cc,v $
Revision 1.14  93/09/24  15:32:26  stephen
Cleaned up warnings.

Revision 1.13  93/08/24  14:11:14  chris
Cleanup.

Revision 1.12  93/06/23  16:03:05  chris
Added "Next" and "Previous" functions.

Revision 1.11  93/06/21  10:40:16  chris
Clean up.

Revision 1.10  93/06/04  19:56:51  stephen
Changed PFMPush to PFMSet.

Revision 1.9  93/06/04  14:46:31  chris
Added hardwired storytelling input command for ShowBiz (temporary).

Revision 1.8  93/06/04  10:32:50  stephen
Minor changes to allow Chris to put in storytelling query.

Revision 1.7  93/06/02  16:10:24  chris
Re-allowed stelling to come up on high level appreciations.

Revision 1.6  93/06/01  17:57:44  chris
Correction -- added semtable.h included.

Revision 1.5  93/06/01  17:51:20  chris
Corrected ldefine problem to adjust to the 148 limit.

Revision 1.4  93/05/30  16:28:10  chris
Added long definitions to the window, added subtext for contect def.

Revision 1.3  93/05/29  17:29:06  chris
Added story point textwrap to the storytelling dialog.

Revision 1.2  93/05/27  08:55:09  stephen
Fixed "(No Param)" message...

Revision 1.1  93/05/26  19:47:22  stephen
Initial revision

 */
```

```
/* -----------------------------------------------------------------------
        STELLING.H
        Storytelling Dialog
        Copyright (C) 1993 Screenplay Systems Inc.
        Revised:        $Id$
----------------------------------------------------------------------- */

#pragma once

#ifndef __STELLING__
#define __STELLING__

#include "tappl.h"
#include "tdialog.h"
#include "appcmds.h"

#include "ptext.h"
#include "storypnt.h"
#include "textwrap.h"

#pragma segment stelling


/* -----------------------------------------------------------------------
        DITL Constants - Storytelling Dialog
----------------------------------------------------------------------- */
const ls_index    kSTellEditText          = 2;
const ls_index    kSTellLDefineText       = 3;
const ls_index    kSTellLStaticText       = 4;
const ls_index    kSTellNextBtn           = 6;
const ls_index    kSTellPreviousBtn       = 7;

const byte_cnt    kMaxStellSize     = 4000;

/* -----------------------------------------------------------------------
        STellDlog - Detail storytelling info
----------------------------------------------------------------------- */
class EXPORT_CLASS STellDlog : public TDialog {
public:
        STellDlog(char* whichItem, short theRow);
        ~STellDlog(void);

        // PUBLIC UTILITIES
        virtual char*     ClassName(void) const      { return "STellDlog"; }
        virtual class_t   ClassType(void) const      { return kSTellDlog; }
        virtual bool_t    IsOfType(const void *pType) const { return *(class_t*) pType == kSTellDlog ||
TDialog::IsOfType(pType); }

        virtual void      DoItemHit(ls_index itemHit);

protected:
        // DATA MEMBERS
        Dramatica*        fApp;
        DRDoc*            fDoc;
        pfm_fd_t          fAppPFMFile;
        PText*            fResponses;
        PText*            fStellingPT;
        PText*            fLDefinePT;
        TextWrap*         fContextTW;                           // A TextWrap for a the topic to be illustrated
        String            fContextStr;                          // Text for the storytelling window that we are building

        bool_t            fStellingFlag[SP_ROWS+1];  // an array of shorts indicating which rows in story points have
stelling info and which do not

        gl_font_t         fFont;                        // Font for this window
        short             fFontSize;                    // Size of font

        short             fRow;                         // which row in appreciation table this is.
        char*             fWhichItem;                   // Variable name of item to storytell
        appr_id_t         fApprIndex;                   // Appreciation index of item to tell (use for getting and
setting semVals)

        // LOCAL UTILITIES
        virtual void      draw_window(GL_ENV_REF env);
        virtual void      init_dlog(void);
        void                    build_context(void);
        void                    init_context_data(void);
        void                    destruct_context_data(void);
        void                    init_pool_data(void);

}; /* STellDlog */


#if 0
/* -----------------------------------------------------------------------
        STellCmd - Invokes the Storytelling text dialog.
----------------------------------------------------------------------- */
class STellCmd : public TCommand {
public:
        STellCmd(TAppl* pTAppl) : TCommand(pTAppl) {}

        virtual char*     ClassName(void)   const     { return "STellCmd"; }
        virtual class_t   ClassType(void) const       { return kSTellCmd; }
        virtual bool_t    IsOfType(const void *pType) const { return *(class_t*) pType == kSTellCmd ||
TCommand::IsOfType(pType); }
        virtual TObject* Duplicate(void) const        { return new STellCmd(*this); }

        static bool_t     IsValid(TAppl *pTAppl);

protected:
        virtual err_t     do_cmd(void);

}; /* STellCmd */
#endif

#pragma segment main

#endif /* __STELLING__ */

/* $Log:          stelling.h,v $
```

```
* Revision 1.5  93/06/23  16:03:29  chris
* Added "Next" and "Previous" functions.
*
* Revision 1.4  93/06/03  10:58:10  chris
* Added textwrap.h in the included files.
*
* Revision 1.3  93/05/30  16:29:00  chris
* Added long definitions to the window, added subtext for contect def.
*
* Revision 1.2  93/05/29  17:29:40  chris
* Added story point textwrap to the storytelling dialog.
*
* Revision 1.1  93/05/26  19:47:30  stephen
* Initial revision
*
*/
```

```
/*******************************************************************
        STORYPNT.CC
        Implementation Storypoints view class
        (c) 1993 Screenplay Systems
        Authors:         S. Greenfield & C. Huntley
        Created:         April 23, 1993
        Revised:         $Id$
*******************************************************************
*/

#include "tappl.h"
#include "appdlogs.h"
#include "graphics.h"

#include "ptext.h"
#include "miscutil.h"
#include "dramatic.h"
#include "document.h"
#include "tview.h"

#include "structs.h"
#include "semtable.h"
#include "relation.h"
#include "textwrap.h"
#include "stelling.h"
#include "storypnt.h"

#pragma segment storypnt

static void lightenColor(GLColor *theColor, GLColor *newColor, short tintPercent);

/* -------------------------------------------------Stephen---03/19/93---
        StoryPoints::Constructor
------------------------------------------------------------------------ */
StoryPoints::StoryPoints(ItemList* pParent, vw_flags vflags, const GLRect *extent, it_flags iflags, const GLColor *color)
            : TView(pParent, vflags, extent, iflags, color),
                fTextPool (0U),
                fInitedScroll (false),
                fHeightValid (false),
                fViewPixelHeight (0),
                fNmColumnsVis (SP_COLS),
                fSelectionExists (false),              // start off with no cells selected
                fRulerBottom (40)                               // CNH - Number of vertical pixels for ruler area

{
        init_scrollers();

        fWindow             = pParent->GetParent();
        fApp                = (Dramatica*)AP_Data()->fApp;
        fAppPFMFile = fApp->GetPFMFile();
        fDoc                = (DRDoc*)GetDoc();
        assert(fDoc);
        fResponses          = fDoc->GetRESP();
        fStellingPT         = fDoc->GetSTEL();

        SetTopMargin(fRulerBottom);                                      // Number of pixel for ruler area

} /* StoryPoints::StoryPoints */

/* -------------------------------------------------Stephen---03/19/93---
        StoryPoints::Destructor
------------------------------------------------------------------------ */
StoryPoints::~StoryPoints(void)
{
        short i;
        for (i=1; i<=SP_ROWS; ++i) {
                delete SPData[i].DefineTW;
//              delete SPData[i].ADefineTW;
                delete SPData[i].ApprecNameTW;
                delete SPData[i].ValueTW;
                delete SPData[i].STellingTW;
        }
} /* StoryPoints::~StoryPoints */

/* ---------------------------------------------------------------------
        StoryPoints::InitView - initialize storypoints view.
------------------------------------------------------------------------ */
void StoryPoints::InitView(void)
{
        fColWidth[SP_APPR]      =       90;
        fColWidth[SP_ITEM]      =       90;
        fColWidth[SP_USE]       =       110;
        fColWidth[SP_STEL]      =       200;

        GLRect winArea = GetBounds();                                          // get the size of the window
        short newWidth = winArea.right-winArea.left;             // find out how wide it is and store it in
newWidth
        if (newWidth > (fColWidth[0] + fColWidth[1] + fColWidth[2] + fColWidth[3]))
                fColWidth[3] += newWidth - (fColWidth[0] + fColWidth[1] + fColWidth[2] + fColWidth[3]);        //
increase the fourth column width to expand to wide windows

#if 0
        fColWidth[0]    =       100;
        fColWidth[1]    =       140;
        fColWidth[2]    =       100;
        fColWidth[3]    =       140;
        fColWidth[4]    =       300;
#endif

        fColFlag[0]     =       1;                      // Icon status -- 1 = Up, -1 = Down
        fColFlag[1]     =       1;                      // Icon status -- 1 = Up, -1 = Down
        fColFlag[2]     =       1;                      // Icon status -- 1 = Up, -1 = Down
        fColFlag[3]     =       1;                      // Icon status -- 1 = Up, -1 = Down
        fColFlag[4]     =       1;                      // Icon status -- 1 = Up, -1 = Down

        GLSetRect(&fColIconRect[0], SP_ITOP, SP_IOFF+(0*4)+(0*SP_ISZ), SP_ITOP+SP_ISZ, SP_IOFF+(0*4)+(1*SP_ISZ));
        // icon in ruler for column 1
        GLSetRect(&fColIconRect[1], SP_ITOP, SP_IOFF+(1*4)+(1*SP_ISZ), SP_ITOP+SP_ISZ, SP_IOFF+(1*4)+(2*SP_ISZ));
        // icon in ruler for column 2
```

```
        GLSetRect(&fColIconRect[2], SP_ITOP, SP_IOFF+(2*4)+(2*SP_ISZ), SP_ITOP+SP_ISZ, SP_IOFF+(2*4)+(3*SP_ISZ));
        // icon in ruler for column 3
        GLSetRect(&fColIconRect[3], SP_ITOP, SP_IOFF+(3*4)+(3*SP_ISZ), SP_ITOP+SP_ISZ, SP_IOFF+(3*4)+(4*SP_ISZ));
        // icon in ruler for column 4

#if 0
        GLSetRect(&fColIconRect[0], SP_ITOP, SP_IOFF+(0*4)+(0*SP_ISZ), SP_ITOP+SP_ISZ, SP_IOFF+(0*4)+(1*SP_ISZ));
        // icon in ruler for column 1
        GLSetRect(&fColIconRect[1], SP_ITOP, SP_IOFF+(1*4)+(1*SP_ISZ), SP_ITOP+SP_ISZ, SP_IOFF+(1*4)+(2*SP_ISZ));
        // icon in ruler for column 2
        GLSetRect(&fColIconRect[2], SP_ITOP, SP_IOFF+(2*4)+(2*SP_ISZ), SP_ITOP+SP_ISZ, SP_IOFF+(2*4)+(3*SP_ISZ));
        // icon in ruler for column 3
        GLSetRect(&fColIconRect[3], SP_ITOP, SP_IOFF+(3*4)+(3*SP_ISZ), SP_ITOP+SP_ISZ, SP_IOFF+(3*4)+(4*SP_ISZ));
        // icon in ruler for column 4
        GLSetRect(&fColIconRect[4], SP_ITOP, SP_IOFF+(4*4)+(4*SP_ISZ), SP_ITOP+SP_ISZ, SP_IOFF+(4*4)+(5*SP_ISZ));
        // icon in ruler for column 5
#endif

        fSecFlag[0]     =       -1;                     // Icon status -- 1 = Up, -1 = Down
        fSecFlag[1]     =        1;                     // Icon status -- 1 = Up, -1 = Down
        fSecFlag[2]     =        1;                     // Icon status -- 1 = Up, -1 = Down
        fSecFlag[3]     =        1;                     // Icon status -- 1 = Up, -1 = Down
        fSecFlag[4]     =        1;                     // Icon status -- 1 = Up, -1 = Down

        GLSetRect(&fSecIconRect[0], SP_ITOP, SP_ILFT+(0*4)+(0*SP_ISZ), SP_ITOP+SP_ISZ, SP_ILFT+(0*4)+(1*SP_ISZ));
        // icon in ruler for column 1
        GLSetRect(&fSecIconRect[1], SP_ITOP, SP_ILFT+(1*4)+(1*SP_ISZ), SP_ITOP+SP_ISZ, SP_ILFT+(1*4)+(2*SP_ISZ));
        // icon in ruler for column 2
        GLSetRect(&fSecIconRect[2], SP_ITOP, SP_ILFT+(2*4)+(2*SP_ISZ), SP_ITOP+SP_ISZ, SP_ILFT+(2*4)+(3*SP_ISZ));
        // icon in ruler for column 3
        GLSetRect(&fSecIconRect[3], SP_ITOP, SP_ILFT+(3*4)+(3*SP_ISZ), SP_ITOP+SP_ISZ, SP_ILFT+(3*4)+(4*SP_ISZ));
        // icon in ruler for column 4
        GLSetRect(&fSecIconRect[4], SP_ITOP, SP_ILFT+(4*4)+(4*SP_ISZ), SP_ITOP+SP_ISZ, SP_ILFT+(4*4)+(5*SP_ISZ));
        // icon in ruler for column 5

        fSecColor[0]    =       kGreenClr;
        fSecColor[1]    =       kRedClr;
        fSecColor[2]    =       kYellowClr;
        fSecColor[3]    =       kLtblueClr;
        fSecColor[4]    =       kBlueClr;

        init_table_data();

        SetHLineSize(1);        // A terrible kludge, but fa naw...

} /* StoryPoints::InitView */


/* ---------------------------------------------------Stephen---03/19/93---
        StoryPoints::init_table_data - Sets up our data.
------------------------------------------------------------------------ */
void StoryPoints::init_table_data(void)
{
//      fApp->SetCursor(AP_WATCH_CURS);
        fColPos[0] = 0;
        fColPos[1] = fColWidth[SP_APPR];
        fColPos[2] = fColWidth[SP_APPR]+fColWidth[SP_ITEM];
        fColPos[3] = fColWidth[SP_APPR]+fColWidth[SP_ITEM]+fColWidth[SP_USE];
        fColPos[4] = fColWidth[SP_APPR]+fColWidth[SP_ITEM]+fColWidth[SP_USE]+fColWidth[SP_STEL];

#if 0
        fColPos[0] = 0;
        fColPos[1] = (fColWidth[0]*fColFlag[0]);
        fColPos[2] = (fColWidth[0]*fColFlag[0])+(fColWidth[1]*fColFlag[1]);
        fColPos[3] = (fColWidth[0]*fColFlag[0])+(fColWidth[1]*fColFlag[1])+(fColWidth[2]*fColFlag[2);
        fColPos[4] =
(fColWidth[0]*fColFlag[0])+(fColWidth[1]*fColFlag[1])+(fColWidth[2]*fColFlag[2])+(fColWidth[3]*fColFlag[3]);
        fColPos[5] =
(fColWidth[0]*fColFlag[0])+(fColWidth[1]*fColFlag[1])+(fColWidth[2]*fColFlag[2])+(fColWidth[3]*fColFlag[3])+(fColWidth[4]
*fColFlag[4]);
#endif

        fFont = GL_GENEVA;
        fFontSize = 10;

        short                   savedFontSize   = fFontSize;                            // for saving
the fFontSize
        short                   sectionFontSize = 14;                                   //
section heading fFontSize
        short                   headingFontSize = 12;                                   //
subsection heading fFontSize
        short                   defFontSize     = 9;
        // definitions fFontSize

        gl_font_t       savedFont               = fFont;                                //
for saving the fFont
        gl_font_t       headingFont             = GL_SYS_FONT;                          // for saving
the fFont
        GLColor         fillClr                 = { 0xFFFF, 0xFFFF, 0xFFFF };   // foreground/background color
        GLColor         textClr                 = { 0x0000, 0x0000, 0x0000 };   // text color

        GLColor  bodyFillClr     = { 0xFFFF, 0xFFFF, 0xFFFF };
        GLColor  bodyTextClr     = { 0x0000, 0x0000, 0x0000 };
        GLColor  secFillClr      = { 0x0000, 0x0000, 0x0000 };                  // black
        GLColor  secTextClr      = { 0xFFFF, 0xFFFF, 0xFFFF };

        GLColor  storyFillClr    = { 0xFFFF, 0x3F00, 0x3F00 };          // redish
        GLColor  storyTextClr    = { 0x0000, 0x0000, 0x0000 };
        GLColor  plotFillClr     = { 0xFFFF, 0xFFFF, 0x0000 };                  // yellow
        GLColor  plotTextClr     = { 0x0000, 0x0000, 0x0000 };

        GLColor  MCFillClr       = { 0x6500, 0xFA00, 0xFFFF };                  // light blue
        GLColor  MCTextClr       = { 0x0000, 0x0000, 0x0000 };
        GLColor  OCFillClr       = { 0x7500, 0x9200, 0xFFFF };                  // medium blue
        GLColor  OCTextClr       = { 0x0000, 0x0000, 0x0000 };

        GLColor  actFillClr      = { 0xFFFF, 0xDE00, 0x0000 };                  // yellow orange
        GLColor  actTextClr      = { 0x0000, 0x0000, 0x0000 };

        GLColor  greenishClr     = { 0x0000, 0xFFFF, 0x0000 };                  // green for overview tint
        GLColor  reddishClr      = { 0xFFFF, 0x0000, 0x0000 };                  // red for story tint

        //      Load in all the proper appreciation segments
```

```
PText*          PT;
short           i;
pt_err          theErr;

assert(fInitedScroll == false);
memset(&SPData[0], 0, sizeof(SPDataType) * SP_ROWS+1);
fpGraphEnv->Use();
hdl_t tempStrHdl = MM_ALLOC_INIT(kMaxStellSize, mm_no_flags, 0, "tempstr Hdl", NULL);
assert(tempStrHdl);
char* tempStr = (char*)MM_USE(tempStrHdl);

hdl_t tempStrHdl2 = MM_ALLOC_INIT(kMaxStellSize, mm_no_flags, 0, "tempstr Hdl", NULL);
assert(tempStrHdl2);
char* tempStr2 = (char*)MM_USE(tempStrHdl2);

AP_StartSpinCursor(129, 4, 5);


for (i=1; i<=SP_ROWS; ++i) {
        AP_SpinCursor();
        GLRect textRect;
        short theType;

        PT = new PText(fAppPFMFile, _OSType("APPR"), i, &theErr, kRdOnly);      // Grab APPR segment from .pfm
file
        assert(theErr != kNoSuchPFMSeg);

        PT->GetParam("TY", 's', &theType);
        SPData[i].apprType = theType;

        //  DETERMINE COLORS

        if (theType == 0) {
        // Major section headings
                fillClr = secFillClr;
                textClr = secTextClr;
                lightenColor(&greenishClr,&bodyFillClr,8);
        }
        else if (theType == 19 || theType == 20) {                               // this is for high
level and dynamic appreciations
                fillClr = greenishClr;
                textClr = storyTextClr;
                lightenColor(&greenishClr,&bodyFillClr,8);
        }
        else if (theType == 21) {                                                //
Story subsection heading
                fillClr = storyFillClr;
                textClr = storyTextClr;
                lightenColor(&reddishClr,&bodyFillClr,8);
        }
        else if (theType == 22) {                                                //
Plot subsection heading
                fillClr = plotFillClr;
                textClr = plotTextClr;
                lightenColor(&fillClr,&bodyFillClr,8);
        }
        else if (theType == 23) {                                                //
Main Character subsection heading
                fillClr = MCFillClr;
                textClr = MCTextClr;
                lightenColor(&fillClr,&bodyFillClr,4);
        }
        else if (theType == 24) {                                                //
Obstacle Character subsection heading
                fillClr = OCFillClr;
                textClr = OCTextClr;
                lightenColor(&fillClr,&bodyFillClr,3);
        }
        else if (theType == 9) {                                                 //
Act order subsections headings
                fillClr = actFillClr;
                textClr = actTextClr;
                lightenColor(&plotFillClr,&bodyFillClr,8);
        }
        else {
                // everything else
                fillClr = bodyFillClr;
                textClr = bodyTextClr;
        }
        SPData[i].fillClr = fillClr;
        SPData[i].textClr = textClr;

        //      COLUMN #1: Appreciation name

        GLRect titleArea = GetBounds();

        tempStr[0] = 0;
        PT->GetParam("NM", 'c', tempStr);
        GLSetRect(&textRect, 0, 0, 0, fColWidth[SP_APPR]-10);
        if (theType == 0 ) {                                  // set to system font (Chicago 14) for
section headings
                fFont = headingFont;
                fFontSize = sectionFontSize;
                textRect.right = titleArea.right;
        }
        else if (theType >= 9) {                      // set to system font (Chicago 12) for subsection
headings
                fFont = headingFont;
                fFontSize = headingFontSize;
        }
        SPData[i].ApprecNameTW = new TextWrap(fDoc, fpGraphEnv, &textRect, tempStr, fFont, fFontSize);
        if ( theType == 0 || theType >= 9) {                  // reset to default story points font
                fFont = savedFont;
                fFontSize = savedFontSize;
                textRect.right = fColWidth[SP_APPR]-10;
        }
        assert(SPData[i].ApprecNameTW);


#if 0
//      COLUMN #2: appreciation value (first get the name of the variable)
```

```
                if (theType != 0 && (theType < 19 || theType >=23)) {
                                // kChoiceMenu

                        fFontSize = defFontSize;
                        PT->GetParam("DF", 'c', tempStr);
                        GLSetRect(&textRect, 0, 0, 0, fColWidth[1]-10);
                        SPData[i].ADefineTW = new TextWrap(fDoc, fpGraphEnv, &textRect, tempStr, fFont, fFontSize);
                        assert(SPData[i].ADefineTW);
                        fFontSize = savedFontSize;
                }
#endif

                //      COLUMN #2: appreciation value (first get the name of the variable)              --
        was COLUMN #3

                PT->GetParam("VN", 'c', tempStr);
                SPData[i].VNameID = fTextPool.AddString(tempStr);

                short theValue = 0;
                if (theType >= 1 && theType <= 5) {
                        appr_index_t apprIndex = VarToApprIndex(tempStr);               // THIS IS A BAD WAY TO BE
DOING THIS!!!
                        theValue = fDoc->GetApprValByIndex(apprIndex);
                }
                else
                        fResponses->GetParam(tempStr, 's', &theValue);

                if (theType == 5  && theValue) {                        // REMOVE "theValue" AFTER CHRIS ADDS PLOT ELEM
APPRECIATIONS
                        assert(theValue >=START_OF_ELEMENTS && theValue <= (START_OF_ELEMENTS-1) + 256);
                        theValue = (START_OF_ELEMENTS-1) + SEMELEM_NORMALIZE(theValue);
                }
                SPData[i].value                 = theValue;
                SPData[i].DefineTW              = NULL;
                SPData[i].ValueTW               = NULL;

                if (theType != 1 && theType != 6 && theType != 10) {
                        // kChoiceMenu
                        GLSetRect(&textRect, 0, 0, 0, fColWidth[SP_ITEM]-10);
                        SPData[i].ValueTW = new TextWrap(fDoc, fpGraphEnv, &textRect, (theValue > 0) ?
SEMTBL_NAME(theValue) : "", fFont, fFontSize);
                        assert(SPData[i].ApprecNameTW);
                } else if (theType == 10) {
                        GLSetRect(&textRect, 0, 0, 0, fColWidth[SP_ITEM]-10);
                        if (theValue == 1)
                                strcpy(tempStr, "First");
                        else if (theValue == 2)
                                strcpy(tempStr, "Second");
                        else if (theValue == 3)
                                strcpy(tempStr, "Third");
                        else
                                strcpy(tempStr, "Fourth");
                        SPData[i].ValueTW = new TextWrap(fDoc, fpGraphEnv, &textRect, (theValue > 0) ? tempStr : "",
fFont, fFontSize);
                        assert(SPData[i].ApprecNameTW);
                } else {
//                      sprintf(tempStr, "%hd", theValue);
                        GLSetRect(&textRect, 0, 0, 0, fColWidth[SP_ITEM]-10);
                        SPData[i].ValueTW = new TextWrap(fDoc, fpGraphEnv, &textRect, ApprName(theValue), fFont,
fFontSize);
                        assert(SPData[i].ApprecNameTW);
                }


                //      COLUMN #3: Definition of value

                if ((theType <= 6 || theType == 8) && theValue > 0) {
                        pfm_fd_t currentFile = PFMSetCurrentFile(fAppPFMFile);
                        hdl_t DefSegHdl = (hdl_t) PFMCheckoutSeg(_OSType("SDEF"), theValue);
                        assert(DefSegHdl);
                        char* DefSegPtr = (char *)MM_USE(DefSegHdl);

                        if (theType > 1 && theType < 6) {                                       // this has a
standard semval usave
                                PT->GetParam("DF", 'c', tempStr2);
                                strcat(tempStr2," as it concerns ");
                                strcat(tempStr2, DefSegPtr);
                                DefSegPtr = tempStr2;
                        }

                        fFontSize = defFontSize;
                        GLSetRect(&textRect, 0, 0, 0, fColWidth[SP_USE]-10);
//                      textRect.right = MAX(textRect.right, titleArea.right-(fColPos[2]+30));
                        SPData[i].DefineTW = new TextWrap(fDoc, fpGraphEnv, &textRect, DefSegPtr, fFont, fFontSize);
                        assert(SPData[i].DefineTW);
                        fFontSize = savedFontSize;

                        MM_UNUSE(DefSegHdl);
                        theErr = PFMCheckinSeg(DefSegHdl);
                        assert(theErr == noerr);
                        PFMSetCurrentFile(currentFile);
                }
                //      COLUMN #4: the writer's storytelling information for this appreciation

                if ((theType >= 1 && theType <= 6) || (theType >= 23 && theType <= 24)) {
                                                        // kChoiceMenu
                        fFontSize = defFontSize;
                        SPData[i].STellingTW = NULL;
                        set_storytelling_textwrap(i, tempStr);
                        fFontSize = savedFontSize;
                }

                delete PT;
        }
        AP_StopSpinCursor();
```

```
        fpGraphEnv->Unuse();
        MM_UNUSE(tempStrHdl);
        MMFree(tempStrHdl);
        MM_UNUSE(tempStrHdl2);
        MMFree(tempStrHdl2);
//      fApp->SetCursor(AP_ARROW_CURS);
}

/* ------------------------------------------------Stephen---03/19/93---
        StoryPoints::set_storytelling_textwrap - Sets (or reset) the text in
        column 5.
---------------------------------------------------------------------- */
void StoryPoints::set_storytelling_textwrap(short whichRow, char* tempStr)
{
        assert(fpGraphEnv->IsInUse());
        pl_id whichItem = SPData[whichRow].VNameID;
        if (whichItem >= 0) {
                tempStr[0] = 0;
                fTextPool.Use();
                fStellingPT->GetParam(PID2Ptr(whichItem), 'c', tempStr);
                fTextPool.Unuse();


                GLRect textRect;
                GLSetRect(&textRect, 0, 0, 0, fColWidth[SP_STEL]-10);
                if (SPData[whichRow].STellingTW)
                        delete SPData[whichRow].STellingTW;
                SPData[whichRow].STellingTW = new TextWrap(fDoc, fpGraphEnv, &textRect, tempStr, fFont, fFontSize);
                assert(SPData[whichRow].STellingTW);
        }
        else SPData[whichRow].STellingTW = NULL;
}


/* ------------------------------------------------Stephen---03/19/93---
        StoryPoints::draw_view - Does the bulk of drawing our StoryPoints
        window.
---------------------------------------------------------------------- */
void StoryPoints::draw_view (const VwPaneUpdateInfo& updateInfo)
{
        GLColor  rulerBGClr         = kGL25GrayClr;                                   // was {
0xFFFF, 0xFFFF, 0xC000 }

        GLColor  myForeClr          = { 0xFFFF, 0xFFFF, 0xFFFF };
        GLColor  myBackClr          = { 0x0000, 0x0000, 0x0000 };
        GLColor  myTextClr          = { 0x0000, 0x0000, 0x0000 };

        const GLColor    gridLineClr            = { 0x1000, 0x6200, 0x4300 };
        const GLColor    gridHiLiteClr     = { 0xFFFF, 0xFFFF, 0xFFFF };

        LgPoint          VwOrigin = *updateInfo.InqOffset();         // local coordinates for the view's origin

        gl_coord_t       X                      = (gl_coord_t)(VwOrigin.x);
        gl_coord_t       Y                      = (gl_coord_t)(VwOrigin.y);
        gl_coord_t       RtMargin         = 512;
        gl_coord_t       rowHeight        = 24;     // SHOULD BE 24
        gl_coord_t       spaceBefore = 2;
        gl_coord_t       spaceAfter       = 5;
        gl_coord_t       leftIndent       = 0;

        gl_coord_t       preRowHeight;
        GLRect rowRect;

        gl_coord_t       topMarPos = fRulerBottom;
        GLRect rulerArea = GetBounds();
        rulerArea.bottom = fRulerBottom;                                 // This is the bottom line of the ruler
area

        //      Draw Ruler area

        drawRuler(0);

        // DRAW APPROPRIATE ROWS & COLUMNS

        fpGraphEnv->SetTextAttr(fFont, fFontSize);
        fTextPool.Use();

        gl_coord_t       rowBase                = 18;
        gl_coord_t       rowY                   = 0-Y;
        gl_coord_t       rowTop;
        gl_coord_t       thisRowHeight    = 0;
        gl_coord_t       maxRowHeight;
        gl_coord_t       updateTop;
        gl_coord_t       updateBot;
        gl_coord_t       myTop;
        gl_coord_t       myBot;
        gl_coord_t       myHeight;
        gl_coord_t       docRowY = 0;                                        // used to initialize array
        short                    i, r;

        //      Clip out top margin area from update region, so we don't try to draw rows there

        GLPoint          marginLineLoc;
        LgPoint          marginLineDoc;
        marginLineLoc.y = topMarPos + 1;                          // Local top margin of 0 is the top of the view
        marginLineLoc.x = 0;
        loc_to_doc(marginLineLoc, &marginLineDoc);

        LgRect myUpdateRect;
        updateInfo.InqDocRgn()->GetRect(&myUpdateRect);
        myUpdateRect.top                = MAX(myUpdateRect.top, marginLineDoc.y);
        myUpdateRect.bottom             = MAX(myUpdateRect.top, myUpdateRect.bottom);

        updateTop        = (gl_coord_t)(myUpdateRect.top);
        updateBot        = (gl_coord_t)(myUpdateRect.bottom);

        for (r=1; r<=SP_ROWS; ++r) {
```

```
		if (fHeightValid) {						//
Test if we're in the update region
			myTop = SPData[r].rowTop;
			myBot = SPData[r].rowBottom;
			myHeight = SPData[r].rowHeight;
			if (myBot < updateTop || myTop > updateBot) {
				rowY += myHeight;
				continue;
			}
		}
		else SPData[r].rowTop = docRowY;

		myForeClr = SPData[r].fillClr;			// set the foreground color
		myTextClr = SPData[r].textClr;			// set the text color
		myBackClr = myForeClr;					// set the background color

		preRowHeight = MAX((SPData[r].ApprecNameTW) ? SPData[r].ApprecNameTW->GetTextHeight() : 0,
(SPData[r].ValueTW) ? SPData[r].ValueTW->GetTextHeight() : 0);
		preRowHeight = MAX(preRowHeight, (SPData[r].DefineTW) ? SPData[r].DefineTW->GetTextHeight() : 0);
//		preRowHeight = MAX(preRowHeight, (SPData[r].ADefineTW) ? SPData[r].ADefineTW->GetTextHeight() : 0);
		preRowHeight = MAX(preRowHeight, (SPData[r].STellingTW) ? SPData[r].STellingTW->GetTextHeight() : 0);
		preRowHeight = MAX(preRowHeight, rowHeight);

		rowTop = rowY;							//
Save loc of row top for drawing dividing lines
		rowY += spaceBefore;
		maxRowHeight = rowHeight;				// start with fixed
minimum row height

		rowRect.top = rowTop+1;
		rowRect.left = 0;
		rowRect.bottom = rowTop+preRowHeight+spaceBefore+spaceAfter;
		rowRect.right = rulerArea.right;

		fpGraphEnv->SetForeColor(myForeClr);		// set the foreground
color
		fpGraphEnv->SetBackColor(myBackClr);		// set the background
color
		fpGraphEnv->PaintRect(rowRect);			// fill the
row rectangle with the appropriate color
		fpGraphEnv->SetForeColor(myTextClr);		// set the foreground
color to the text color
		fpGraphEnv->SetBackColor(myForeClr);		// set the background
color to the fill color


		short colNumber = 0;					// variable
to control the number of columns to be displayed

		//	DRAW COLUMN #1: Appreciation name

		if (SPData[r].apprType == 0)
			leftIndent = MAX(5-X, ((rulerArea.right-140)/2));
	// pseudo center section heading
		else
			leftIndent = 5-X;

		thisRowHeight = SPData[r].ApprecNameTW->Draw(fpGraphEnv, &updateInfo, kNeverPrint, rowY, leftIndent);
		// was Draw(env, rowY, 5-X)
		maxRowHeight = MAX(maxRowHeight, thisRowHeight);


#if 0
		//	DRAW COLUMN #2: appreciation definition

		if (fColWidth[1] > 1) {
					// do not display if the column has been collapsed
			++colNumber;
			if (SPData[r].ADefineTW) {
				thisRowHeight = SPData[r].ADefineTW->Draw(fpGraphEnv, &updateInfo, kNeverPrint, rowY,
(gl_coord_t)(fColPos[colNumber]+5-X));		// was (gl_coord_t)(fColPos[1]+5-X)
				maxRowHeight = MAX(maxRowHeight, thisRowHeight);
			}
		}
#endif

		//	DRAW COLUMN #2: appreciation value		-- was COLUMN #3

		if (fColWidth[SP_ITEM] > 1) {
					// do not display if the column has been collapsed
			++colNumber;
			if (SPData[r].ValueTW) {
				thisRowHeight = SPData[r].ValueTW->Draw(fpGraphEnv, &updateInfo, kNeverPrint, rowY,
(gl_coord_t)(fColPos[colNumber]+5-X));
				maxRowHeight = MAX(maxRowHeight, thisRowHeight);
			}
		}


		//	DRAW COLUMN #3: Definition of value

		if (fColWidth[SP_USE] > 1) {
					// do not display if the column has been collapsed
			++colNumber;
			if (SPData[r].DefineTW) {
				thisRowHeight = SPData[r].DefineTW->Draw(fpGraphEnv, &updateInfo, kNeverPrint, rowY,
(gl_coord_t)(fColPos[colNumber]+5-X));
				maxRowHeight = MAX(maxRowHeight, thisRowHeight);
			}
		}


		//	DRAW COLUMN #4: Storytelling material

		if (fColWidth[SP_STEL] > 1) {
					// do not display if the column has been collapsed
			++colNumber;
			if (SPData[r].STellingTW) {
				thisRowHeight = SPData[r].STellingTW->Draw(fpGraphEnv, &updateInfo, kNeverPrint,
rowY, (gl_coord_t)(fColPos[colNumber]+5-X));
				maxRowHeight = MAX(maxRowHeight, thisRowHeight);
			}
		}
```

```
		//	Calculate total row height

		SPData[r].rowHeight = (spaceBefore + spaceAfter + maxRowHeight);
		rowY += SPData[r].rowHeight - spaceBefore;					//
-spaceBefore 'cause it's added into rowHeight
		if (!fHeightValid) {
			docRowY += SPData[r].rowHeight;
			SPData[r].rowBottom = docRowY;
		}
		assert(SPData[r].rowTop < SPData[r].rowBottom);

		// DRAW vertical dividing lines


		if ( SPData[r].apprType != 0 &&
			SPData[r].apprType != 9 &&
			SPData[r].apprType != 19 &&
			SPData[r].apprType != 20 &&
			SPData[r].apprType != 21 &&
			SPData[r].apprType != 22 ) {
			for (i=1; i<SP_COLS; ++i) {					//
deliberately skips column 0, so we don't draw line in left margin
				fpGraphEnv->SetForeColor(gridHiLiteClr);		// set the foreground color to
the color for drawing hilight grid lines
				fpGraphEnv->MoveTo(fColPos[i]-1, rowTop);
				fpGraphEnv->LineTo(fColPos[i]-1, rowY);
				fpGraphEnv->SetForeColor(gridLineClr);			// set the foreground
color to the color for drawing grid lines
				fpGraphEnv->MoveTo(fColPos[i], rowY);
				fpGraphEnv->LineTo(fColPos[i], rowTop);
			}
		}

		// DRAW horizontal dividing lines

		fpGraphEnv->SetForeColor(gridLineClr);					// set the foreground
color to the color for drawing hilight grid lines
		fpGraphEnv->MoveTo(0-X, rowY-1);
		fpGraphEnv->LineTo(rulerArea.right, rowY-1);
		if ( SPData[r].apprType > 0 ) {
			fpGraphEnv->SetForeColor(gridHiLiteClr);			// set the foreground color to
the color for drawing grid lines
			fpGraphEnv->MoveTo(rulerArea.right, rowY);
			fpGraphEnv->LineTo(0-X, rowY);
		}

		if (fSelectionExists) {
			draw_highlighting(r, 1);
			draw_highlighting(r, 2);
			draw_highlighting(r, 3);
			draw_highlighting(r, 4);
//			draw_highlighting(r, 5);
		}

	}

	fHeightValid = true;
	fTextPool.Unuse();

#if 0
	if (!fInitedScroll) {
//		SetVLineSize(rowHeight);
		DocumentResize();
		fInitedScroll = true;
	}
#endif
} /* StoryPoints::draw_view */


/* ---------------------------------------------------Chris---05/27/93---
	StoryPoints::drawRuler - Draws the ruler in the StoryPoints
	window.
------------------------------------------------------------------------ */
void StoryPoints::drawRuler (short drawWhat)
{
	GLColor			savedBackColor;
	GLColor			savedForeColor;
	GLColor	rulerBGClr	= kGL25GrayClr;					// was {
0xFFFF, 0xFFFF, 0xC000 }

#if 0
	GLColor	greenClr	= { 0x0000, 0xFFFF, 0x0000 };
	GLColor	redClr		= { 0xFFFF, 0x0000, 0x0000 };
	GLColor	yellowClr	= { 0xFFFF, 0xFFFF, 0x0000 };
	GLColor	ltblueClr	= { 0x6500, 0xFA00, 0xFFFF };
	GLColor	blueClr		= { 0x0000, 0x0000, 0xFFFF };
#endif

	const GLColor	gridLineClr		= { 0x1000, 0x6200, 0x4300 };
	const GLColor	gridHiLiteClr	= { 0xFFFF, 0xFFFF, 0xFFFF };

//	GLColor	icnClr[5];

	short i;

//	icnClr[0] = greenClr;
//	icnClr[1] = redClr;
//	icnClr[2] = yellowClr;
//	icnClr[3] = ltblueClr;
//	icnClr[4] = blueClr;


	//	Draw Ruler area

	GLRect rulerArea = GetBounds();
	rulerArea.bottom = fRulerBottom;					// This is the bottom line of
the ruler area
	rulerArea.right -= 16;							// reduce
right side by width of scroll bar

	fpGraphEnv->GetBackColor(&savedBackColor);			// get and store the current background
color
```

```
        fpGraphEnv->GetForeColor(&savedForeColor);                    // get and store the current background
color
        fpGraphEnv->SetBackColor(rulerBGClr);                                  // set the bg color
        fpGraphEnv->SetForeColor(rulerBGClr);                                  // set the foreground color
        fpGraphEnv->PaintRect(rulerArea);                                      // fill the ruler area with a
color
        fpGraphEnv->SetForeColor(savedForeColor);                     // reset the bg to its original color

        gl_coord_t          topMarPos = fRulerBottom;
        fpGraphEnv->SetTextAttr(GL_SYS_FONT, 12);
        fpGraphEnv->MoveTo(0, topMarPos-20);
        fpGraphEnv->LineTo(rulerArea.right, topMarPos-20);
        fpGraphEnv->SetForeColor(kGLWhiteClr);                                          // reset the bg to its
original color
        fpGraphEnv->MoveTo(0, topMarPos-19);
        fpGraphEnv->LineTo(rulerArea.right, topMarPos-19);
        fpGraphEnv->SetForeColor(savedForeColor);                              // reset the bg to its original
color

        short fCol = 0;                                                                                  //
used to index into the fColPos array
        fpGraphEnv->MoveTo(fColPos[fCol]+5, topMarPos-5);
        fpGraphEnv->DrawStr("Appreciation");

#if 0
        if (fColWidth[1] > 1) {
                ++fCol;
                fpGraphEnv->MoveTo(fColPos[fCol]+10, topMarPos-5);
                fpGraphEnv->DrawStr("Definition");
        }
#endif

        if (fColWidth[SP_ITEM] > 1) {
                ++fCol;
                fpGraphEnv->MoveTo(fColPos[fCol]+10, topMarPos-5);
                fpGraphEnv->DrawStr("Item");
        }

        if (fColWidth[SP_USE] > 1) {
                ++fCol;
                fpGraphEnv->MoveTo(fColPos[fCol]+10, topMarPos-5);
                fpGraphEnv->DrawStr("Definition");
        }

        if (fColWidth[SP_STEL] > 1) {
                ++fCol;
                fpGraphEnv->MoveTo(fColPos[fCol]+10, topMarPos-5);
                fpGraphEnv->DrawStr("Storytelling");
        }

        for (i=1; i<SP_COLS; ++i) {
                fpGraphEnv->MoveTo(fColPos[i], topMarPos-19);
                fpGraphEnv->LineTo(fColPos[i], topMarPos);
        }

        fpGraphEnv->MoveTo(0, topMarPos);
        fpGraphEnv->LineTo(rulerArea.right, topMarPos);                                         // was
GLLineTo(env, RtMargin, topMarPos);

// Draw Icons/buttons in the ruler

        drawIcons(0);

}

/* ---------------------------------------------------------Chris---05/27/93---
        StoryPoints::drawIcons - Highlights or unhightlights a
        particular icon.

                    whichIcon          =         0              draw all
                                                       1-5              draw section icons
                                                 11-15          draw column icons
------------------------------------------------------------------------------ */
void StoryPoints::drawIcons(short whichIcon)
{

        short               draw_section_icons;
        short               draw_column_icons;
        short               i;
        short               start, end;
        gl_coord_t          icnTop          = 2;
        gl_coord_t          icnLeft         = 4;
        gl_coord_t          icnBottom       = 18;
        gl_coord_t          icnRight        = 20;

        GLColor             savedBackColor;
        GLColor             savedForeColor;
        GLColor             rulerBGClr      = kGL25GrayClr;                             // was { 0xFFFF,
0xFFFF, 0xC000 }

        fpGraphEnv->GetBackColor(&savedBackColor);                             // get and store the current
background color
        fpGraphEnv->GetForeColor(&savedForeColor);                             // get and store the current
background color
        fpGraphEnv->SetBackColor(rulerBGClr);                                           // set the bg color
        fpGraphEnv->SetForeColor(rulerBGClr);                                           // set the foreground
color
        fpGraphEnv->SetTextAttr(GL_SYS_FONT, 12);

        draw_section_icons = false;
        draw_column_icons = false;

        if (whichIcon >= 11 && whichIcon <= SP_COLS+10) {
                start = end = whichIcon-11;
                draw_column_icons = true;
        } else if (whichIcon >= 1 && whichIcon <= SP_SECS) {
                draw_section_icons = true;
        } else {
                start = 0;
                end = SP_COLS-1;
                draw_section_icons = true;
                draw_column_icons = true;
```

```
        }
        if (draw_section_icons == true) {
                for (i=0; i<SP_SECS; ++i) {
                        fpGraphEnv->SetForeColor(fSecColor[i]);                                  // set the
foreground color
                        fpGraphEnv->PaintRect (fSecIconRect[i]);                                    //
fill the ruler area with a color
                        if (fSecFlag[i] == 1)
                                CoolFrameRect(fpGraphEnv, &fSecIconRect[i], &kGLBevelUpPat, 2, &kGLWhiteClr,
&kGL75GrayClr);
                        else {
                                CoolFrameRect(fpGraphEnv, &fSecIconRect[i], &kGLBevelDownPat, 2, &kGLWhiteClr,
&kGL75GrayClr);
                        }
                }
        }

        char tmpStr[10];
        fpGraphEnv->SetForeColor(kGLBlackClr);                                   // set the foreground color

        if (draw_column_icons == true) {
                for (i=start; i<=end; ++i) {
                        fpGraphEnv->MoveTo(fColIconRect[i].left+4, fColIconRect[i].bottom-3);
                        sprintf(tmpStr,"%hd",i+1);
                        fpGraphEnv->DrawStr(tmpStr);
                        if (fColFlag[i] == 1)
                                CoolFrameRect(fpGraphEnv, &fColIconRect[i], &kGLBevelUpPat, 2, &kGLWhiteClr,
&kGL75GrayClr);
                        else
                                CoolFrameRect(fpGraphEnv, &fColIconRect[i], &kGLGroovePat, 1, &kGLWhiteClr,
&kGL75GrayClr);
                }
        }

        fpGraphEnv->SetForeColor(savedForeColor);                                // reset the bg to its original
color
        fpGraphEnv->SetBackColor(savedBackColor);                                // reset the bg to its original
color
}


/* -------------------------------------------------Stephen---04/15/93---
        StoryPoints::draw_highlighting - Highlights or unhightlights a
        particular cell.
------------------------------------------------------------------------ */
void StoryPoints::draw_highlighting(short row, short col)
{
        if (fRowSelected == row && fColSelected == col) {
                fpGraphEnv->Use();
                LgRect cellRect;
                GLRect localRect;
                get_cell_rect(&cellRect, row, col);
                doc_to_loc_rect(&cellRect, &localRect);
                GLRect viewExtent = fExtent;
                viewExtent.right -= 16;
                GLSectRect(&viewExtent, &localRect, &localRect);
                fpGraphEnv->InvertRect(localRect);
                fpGraphEnv->Unuse();
        }
}


/* -------------------------------------------------Stephen---04/15/93---
        StoryPoints::doc_to_loc_rect - Converts document LgRect to GLRect
// NOTE: you can also cast a GLRect to be a top left of a GLPoint.
------------------------------------------------------------------------ */
GLRect*  StoryPoints::doc_to_loc_rect(LgRect* docRect, GLRect* localRect)
{
        LgPoint  docTopLeft;
        LgPoint  docBotRight;
        GLPoint  locTopLeft;
        GLPoint  locBotRight;

        docTopLeft.y        = docRect->top;
        docTopLeft.x        = docRect->left;
        docBotRight.y       = docRect->bottom;
        docBotRight.x       = docRect->right;

        doc_to_loc(&docTopLeft, &locTopLeft);
        doc_to_loc(&docBotRight, &locBotRight);

        localRect->top              = locTopLeft.y;
        localRect->left             = locTopLeft.x;
        localRect->bottom           = locBotRight.y;
        localRect->right  = locBotRight.x;

#if 0
   LgPoint docOrigin = { 0, 0 };
   GLPoint locOrigin;
   doc_to_loc(&docOrigin, &locOrigin);
   OffsetLgRect(theRect, locOrigin.x, locOrigin.y);
#endif
   return (localRect);
}


/* -------------------------------------------------Stephen---04/15/93---
        StoryPoints::DoItemHit - handles mouse-down events in the storypoints
        window.
------------------------------------------------------------------------ */
bool_t StoryPoints::DoItemHit(EVENT_REC *pEvt, GLPoint mousePt)
{
        LgPoint             marginLineDoc;
        bool_t              isDblClick = AP_DblClick(pEvt);

        if (!TView::DoItemHit(pEvt, mousePt)) {
                short    row;
                short    col;
                LgRect   cellRect;
```

```
                if (mousePt.y < fExtent.top + fMargins.y) {
                        if (!find_icon(mousePt))
                                beep();
                        if (fSelectionExists) {
                                draw_highlighting(fRowSelected, fColSelected);
                                fSelectionExists = false;
                        }
                        return (true);
                }
                // DETERMINE WHICH CELL THE CLICK OCCURED IN

                loc_to_doc(mousePt, &marginLineDoc);
                if (find_cell(marginLineDoc, &cellRect, &row, &col)) {
                        fpGraphEnv->Use();
                        if (fSelectionExists)
                // Deselect existing cells!
                                draw_highlighting(fRowSelected, fColSelected);

                        // ONLY ALLOW CLICKS IN CERTAIN COLUMNS, ON CERTAIN TYPES OR ROWS

                        short theType = SPData[row].apprType;
                        if ((col != 3) && (theType >=1 && theType <= 6) || (theType >=23 && theType <= 24) || (theType
== 8)) {
                                GLRect localRect;
                                doc_to_loc_rect(&cellRect, &localRect);

                                GLRect viewExtent = fExtent;
                                viewExtent.right -= 16;
                                GLSectRect(&viewExtent, &localRect, &localRect);
                                fpGraphEnv->InvertRect(localRect);

                                // HANDLE A DOUBLE-CLICK ON CELLS

                                if (isDblClick && (fRowSelected == row && fColSelected == col)) {
                                        if (col == 4) {
                                                fTextPool.Use();
                                                pl_id whichItem = SPData[row].VNameID;
                                                if (whichItem >= 0) {
                                // row has no variable name -- unlikely!
                                                        (new STellDlog(PID2Ptr(whichItem), row))->ModalLoop();
                                                        hdl_t tempStrHdl = MM_ALLOC(kMaxStellSize, mm_no_flags,
"tempStr dblclick Hdl", NULL);

                                                        assert(tempStrHdl);
                                                        char* tempStr = (char*)MM_USE(tempStrHdl);
                                                        gl_coord_t cellHeight = SPData[row].rowHeight;
                                                        set_storytelling_textwrap(row, tempStr);
                                                        if (SPData[row].STellingTW->GetTextHeight() > cellHeight)

{
                                                                GLRect myContentRect = fExtent;
                                                                myContentRect.top += fRulerBottom;
                                                                AP_InvalGLRect(GetParentWindow()->GetWindowRef(),

&myContentRect);

                                                                fHeightValid = false;
                                                        }
                                                        else AP_InvalGLRect(GetParentWindow()->GetWindowRef(),

&localRect);

                                                        MM_UNUSE(tempStrHdl);
                                                        MMFree(tempStrHdl);
                                                }
                                                else beep();
                                        // No variable name for this cell!
                                                fTextPool.Unuse();
                                        }
                                }

                                fSelectionExists = true;
                                fRowSelected = row;
                                fColSelected = col;
                        }
                        else {
                                fSelectionExists = false;
                        }
                        fpGraphEnv->Unuse();
                }
                else {
                        fSelectionExists = false;                                                           //
COULDN'T FIND CELL!
                        beep();
                }

        }
        return (true);
}

/* ---------------------------------------------------Chris---05/22/93---
        StoryPoints::find_icon - given a point in document coordinates, find
        the icon buttpn where the user clicked change status.  Return TRUE if
        found, FALSE otherwise.
------------------------------------------------------------------------ */
bool_t StoryPoints::find_icon(GLPoint mousePt)
{
        short i, x;
        GLPoint goTo;

        goTo.x = 0;

        for (i=0; i<SP_COLS; ++i) {
                if (GLPtInRect(mousePt, &fColIconRect[i])) {
#if 0
                        if (i==1 || i==3) {
                                if (fColFlag[i] == 1) {
                                        fColWidth[i] = 0;
                                } else {
                                        fColWidth[i] = 1;
                                }
                                fColFlag[i] *= -1;
                        }
#endif
                        fColFlag[i] *= -1;
```

```
                        fpGraphEnv->Use();
                        drawIcons(i+11);
                        fpGraphEnv->Unuse();
                        return (true);
                }
        }
        for (i=0; i<SP_SECS; ++i) {
                if (GLPtInRect(mousePt, &fSecIconRect[i])) {
                        if (fSecFlag[i] == 1) {
                                for (x=0; x<SP_SECS; ++x)
                                        if (fSecFlag[x] == -1)
                                                fSecFlag[x]        = 1;
                                fSecFlag[i] = -1;
                                fpGraphEnv->Use();
                                drawIcons(1);
                                fpGraphEnv->Unuse();
                                if (i==0) {
                                        goTo.y = SP_SEC1;
                                        AutoScrollTo(&goTo, NULL);
                                } else if (i==1) {
                                        goTo.y = SP_SEC2;
                                        AutoScrollTo(&goTo, NULL);
                                } else if (i==2) {
                                        goTo.y = SP_SEC3;
                                        AutoScrollTo(&goTo, NULL);
                                } else if (i==3) {
                                        goTo.y = SP_SEC4;
                                        AutoScrollTo(&goTo, NULL);
                                } else if (i==4) {
                                        goTo.y = SP_SEC5;
                                        AutoScrollTo(&goTo, NULL);
                                }
                                return (true);
                        }
                }
        }
        return (false);                                 // click point not in any of the rows!
}



/* -------------------------------------------------Stephen---04/15/93---
        StoryPoints::find_cell - given a point in document coordinates, find
        the cell where the user clicked and return the Rect, row, and column.
        Return TRUE if found, FALSE otherwise.
------------------------------------------------------------------------ */
bool_t StoryPoints::find_cell(LgPoint marginLineDoc, LgRect* cellRect, short* row, short* col)
{
        short   r;
        short           c;
        for (r=1; r<=SP_ROWS; ++r) {
                get_cell_rect(cellRect, r, 1);
                if (marginLineDoc.y >= cellRect->top && marginLineDoc.y <= cellRect->bottom) {
                        for (c=1; c<=fNmColumnsVis; ++c) {
                                get_cell_rect(cellRect, r, c);
                                if (marginLineDoc.x >= cellRect->left && marginLineDoc.x <= cellRect->right) {
                                        *row = r;
                                        *col = c;
                                        return (true);
                                }
                        }
                        return (false);                 // click point not in any of the cells on this row!
                }
        }
        return (false);                                 // click point not in any of the rows!
}

/* -------------------------------------------------Stephen---04/15/93---
        StoryPoints::get_cell_rect - given a row & a column, returns a rect
        of a given cell.
------------------------------------------------------------------------ */
void StoryPoints::get_cell_rect(LgRect* cellRect, short row, short col)
{
        assert(col > 0 && col <= fNmColumnsVis);
        assert(row >0 && row <= SP_ROWS);

        cellRect->left          = fColPos[col-1];
        cellRect->right         = fColPos[col];

        cellRect->top           = SPData[row].rowTop;
        cellRect->bottom  = SPData[row].rowBottom;
}


/* -------------------------------------------------Stephen---03/19/93---
        StoryPoints::Resize -
------------------------------------------------------------------------ */
void StoryPoints::Resize(void *pNewSize, TObject *pSender)
{
//      TView::Resize(pNewSize, pSender);
        GLRect myBounds;
        GetParentWindow()->GetPortRect(&myBounds);
//      myBounds.bottom-=14;
        myBounds.bottom+=1;
        myBounds.top-=1;
        myBounds.left-=1;
        myBounds.right+=1;
        SetBounds(&myBounds);
}


#if 1
/* -------------------------------------------------Stephen---03/19/93---
        StoryPoints::GetNumVLines -
------------------------------------------------------------------------ */
long StoryPoints::GetNumVLines(void)
{
         return (long)(SP_ROWS);
```

```
}

/* ----------------------------------------------------Sandy---11/04/92---
	TView::calculate_size_of_v_lines - returns the vertical size in pixels
		of the lines starting from the current value of the vertical
		scroll bar
------------------------------------------------------------------------ */
long	StoryPoints::calculate_size_of_v_lines(short numberOfLines)
{
	long	theLine = GetVScrollPos();
	long	theNumberOfPixels = 0;
	short	theNumberOfLines = numberOfLines >= 0 ? numberOfLines : -numberOfLines;
	short	theIncrement = numberOfLines >= 0 ? 1 : -1;

	assert(HasVariableSizeVLines());

	while (theNumberOfLines--) {
		theNumberOfPixels += GetVLineSize((theIncrement==1) ? theLine-1 : theLine);
		theLine += theIncrement;
	}
	theNumberOfPixels = numberOfLines >= 0 ? theNumberOfPixels : -theNumberOfPixels;
	return theNumberOfPixels;

} /* StoryPoints::calculate_size_of_v_lines */


/* -------------------------------------------------Stephen---03/19/93---
	StoryPoints::GetVLineSize -
	NOTE: line can be 0!
------------------------------------------------------------------------ */
long StoryPoints::GetVLineSize(long line)
{
//	lprintf("GetVLineSize(%ld)\n",line);
//	assert(line+1 <= SP_ROWS+2);
	if ((line+1) > SP_ROWS)
		return (0);							// no height for line at very end

	long vLineSize = (long)(SPData[(int)(line+1)].rowHeight);
	return vLineSize;
}


/* -------------------------------------------------Stephen---03/19/93---
	StoryPoints::SetVLineSize -
------------------------------------------------------------------------ */
void StoryPoints::SetVLineSize(gl_coord_t size, long line)
{
	if (line+1 > SP_ROWS) {				// DEBUGGING
		assert((line+1) <= SP_ROWS);
	}

	SPData[(int)(line+1)].rowHeight = size;
}


/* ----------------------------------------------------Sandy---11/05/92---
	StoryPoints::GetPageIncrement - returns the number of lines to scroll by a
		"page" of data from the row or column specified by 'line' in the
		direction specified by 'destination'.
------------------------------------------------------------------------ */
long StoryPoints::GetPageIncrement(long line, short destination)
{
	long	lines;

	switch (destination) {
		case kNextHPage:
			lines = GetNumHLinesVis();
			break;

		case kPrevHPage:
			lines = -GetNumHLinesVis();
			break;

		case kNextVPage:
			lines = GetNumVLinesVis();		// +1 by SMG (and CNH)
			fContent = fExtent;
			fContent.top = fRulerBottom + 1;
			AP_InvalGLRect(GetParentWindow()->GetWindowRef(), &fContent);
			break;

		case kPrevVPage:
			lines = -GetNumVLinesVis();
			fContent = fExtent;
			fContent.top = fRulerBottom + 1;
			AP_InvalGLRect(GetParentWindow()->GetWindowRef(), &fContent);
			break;

		default:
			assert(false);
			break;
	}
	return lines;

} /* StoryPoints::GetPageIncrement */


/* ----------------------------------------------------------------------
	StoryPoints::GetLineVPosition - return the offset (in document coordinates)
		from the origin of the document to the top edge of the specified
		row.
------------------------------------------------------------------------ */
doc_coord_t StoryPoints::GetLineVPosition(long line)
{
	doc_coord_t lineVPos = 0;
	long		n;
	long		vLineSize;

	if (line >= GetNumVLines()+1) {						// DEBUGGING
		assert(line >= 0 && line < GetNumVLines()+1);
	}

	for (n=0; n<line; ++n) {
```

```
                vLineSize = GetVLineSize(n);
                lineVPos += vLineSize;
        }

        return lineVPos;

} /* StoryPoints::GetLineVPosition */
#endif


/* ------------------------------------------------------------------------
        StoryPoints::Print - prints the contents of the StoryPoints.
------------------------------------------------------------------------ */
err_t StoryPoints::PrintView(Printing *pPrintMgr)
{
        LgPoint offset;
        offset.x = 0;                                           // print in an unscrolled position.
        offset.y = 0;
        Rgn updateRgn;
        VwPaneUpdateInfo updateInfo(pPrintMgr->GetPrinterEnv()->InqEnvRef(), offset, updateRgn);
        draw_view(updateInfo);

        return NOERR;

} /* StoryPoints::PrintView */


/* ========================================================================
                                                StoryPntsCmd WINDOW CLASS
   ======================================================================== */

/* ------------------------------------------------------------------------
        SPWindow::SPWindow - CONSTRUCTOR
------------------------------------------------------------------------ */
SPWindow::SPWindow(TAppl *pTAppl, TDoc *pTDoc, const GLRect *bounds, wn_type windowType, const char *title, ptr_t
storage)
                : TWindow(pTAppl, pTDoc, windowType, TWindow::kNoFlags, bounds, title, storage),
                  fSPView (NULL)
{
        assert(((DRDoc*)pTDoc)->GetStoryPointsWindow()==NULL);
        ((DRDoc*)pTDoc)->SetStoryPointsWindow(this);
}


/* ------------------------------------------------------------------------
        SPWindow::~SPWindow - Destructor
------------------------------------------------------------------------ */
SPWindow::~SPWindow(void)
{
        DRDoc* theDoc = (DRDoc*)GetDoc();
        assert(theDoc);
        theDoc->SetStoryPointsWindow(NULL);
}


/* ------------------------------------------------------------------------
        SPWindow::InitWindow -
------------------------------------------------------------------------ */
void SPWindow::InitWindow(void)
{
        assert(fItems == NULL);

        fItems = new ItemList(this);
        assert(fItems);

        GLRect myBounds;
        GetPortRect(&myBounds);
        TItem* newSPItem = new StoryPoints(fItems, (TView::kHScroll + TView::kVScroll + TView::kVariableSizeVLines +
TView::kLiveScrolling), &myBounds, TItem::kResizable);
        assert(newSPItem);
        fSPView = (StoryPoints*)newSPItem;
        fItems->Append(newSPItem);

        init_itemlist();

#if 0
        set_window_content_color();

                for (ls_index i = 0; i < fItems->Size(); i++) {
                        TItem*   pTItem = fItems->Elem(i);

                        if (pTItem->Is(&TItem::kResizable))
                                pTItem->Resize();

                        pTItem->Awaken(&i);
                }
                if (fKeyItem == kItNoItem)
                        SetKeyItem(fItems->FirstObjThat((test_pp) &pDoesKeyDowns));

                if (fKeyItem != kItNoItem) {
                        fGraphEnv.Use();
                                GetItem(fKeyItem)->FocusIn();
                        fGraphEnv.Unuse();
                }
#endif

        fSPView->InitView();
        fSPView->DocumentResize();

}

void SPWindow::Resize(void *pNewSize, TObject *pSender)
{
        TWindow::Resize(pNewSize, pSender);
        fItems->Resize();
}


/* ------------------------------------------------------------------------
        SPWindow::DoIdle - do any idle time processing.  This function just
```

```
                forwards the request onto the window's EditView.  This function
                could be inlined, but we choose not to to reduce header file
                dependencies.
------------------------------------------------------------------------- */
void SPWindow::DoIdle(void)
{
        fSPView->DoIdle();

} /* SPWindow::DoIdle */

/* ------------------------------------------------------------------------
        SPWindow::CalcIdle - calculates how much idle time we need.
------------------------------------------------------------------------- */
ulong SPWindow::CalcIdle(void)
{
#if 0
        if (fSPView->CaretVisible())
                return GetCaretTime();
        else
#endif
                return kApMaxSleepTime;

} /* SPWindow::CalcIdle */


/* ------------------------------------------------------------------------
        SPWindow::IsDirty - Determines if the current window needs saving.
------------------------------------------------------------------------- */
bool_t  SPWindow::IsDirty(void)
{
        DRDoc*   theDoc = (DRDoc*)GetDoc();
        assert(theDoc);
        return (theDoc->Is(&TDoc::kDirty));
} /* SPWindow::IsDirty */


/* -----------------------------------------------Chris---05/04/93---
        lightenColor - Creates a lighter version of a color based on the
                                percentage passed.  The higher the tintPercent, the
                                closer to white (less color) the new color will have
------------------------------------------------------------------------ */
static void lightenColor(GLColor *theColor, GLColor *newColor, short tintPercent)
{
        ushort WhiteClr = 65534;

        newColor->red     = WhiteClr-(((ushort)WhiteClr-theColor->red)/tintPercent);
        newColor->green = WhiteClr-(((ushort)WhiteClr-theColor->green)/tintPercent);
        newColor->blue    = WhiteClr-(((ushort)WhiteClr-theColor->blue)/tintPercent);
}



/* ------------------------------------------------------------------------
                                                        StoryPntsCmd COMMAND CLASS
------------------------------------------------------------------------- */


/* ------------------------------------------------------------------------
        StoryPntsCmd::IsValid -
------------------------------------------------------------------------- */
bool_t StoryPntsCmd::IsValid(TAppl *pApp)
{
        ls_index          activeDoc        =       pApp->ActiveDoc();
        if (activeDoc != kLsNoElem) {
                DRDoc*   theDoc = ((DRDoc*)pApp->GetDoc(activeDoc));
                return (theDoc == NULL) ? false : true;
        }
        return (false);

//      return pApp->ActiveWindow() && ! pApp->ActiveWindow()->IsModalDlog();

} /* StoryPntsCmd::IsValid */


/* ------------------------------------------------------------------------
        StoryPntsCmd::do_cmd -
------------------------------------------------------------------------- */
err_t StoryPntsCmd::do_cmd(void)
{
        GLRect myBounds;
        DRDoc*   theDoc = ((DRDoc*)fParentApp->ActiveWindow()->GetDoc());
        assert(theDoc);
        theDoc->GetOptWindowRect(&myBounds, NULL);

#if 1
        SPWindow* pTWindow = new SPWindow(fParentApp, theDoc, &myBounds, WN_DOC_WINDOW, "Story Points");

        if (pTWindow) {
                theDoc->GetWindowList()->Append(pTWindow);
                pTWindow->InitWindow();
                pTWindow->ShowWindow();
                fParentApp->SetActiveWindows();

                fParentApp->ClearStoragePtr();
        }
#endif

        return NOERR;
} /* StoryPntsCmd::do_cmd */

#pragma segment main


/* xxxxxxxxxxxxxxxxxxxxxxxxxxxxxxxxxxxxxxxxxxxxxxxxxxxxxxxxxxxxxxxxxxxxxxx
 * $Log:          storypnt.cc,v $
Revision 1.26  93/09/24  15:32:29  stephen
Cleaned up warnings.

Revision 1.25  93/06/21  10:40:27  chris
Added editability of act order stelling.

Revision 1.24  93/06/10  14:51:03  stephen
```

```
Horizontal Scrolling; Page UP/Page DN Inval();

Revision 1.23  93/06/04  19:57:06  stephen
Changed PFMPush to PFMSet.

Revision 1.22  93/06/02  16:10:56  chris
Shrunk first column and other cosmetic issues.

Revision 1.21  93/05/30  16:29:04  chris
Prevented double-clicking in storytelling column for high level appreciations.

Revision 1.20  93/05/29  17:29:43  chris
Clean up.

Revision 1.19  93/05/28  15:48:06  chris
Made changes to CoolFrameRect calls to accommodate chantes in the function.

Revision 1.18  93/05/28  09:16:11  chris
Removed the ruler from draw_view.  Activated the AutoScrollTo buttons.

Revision 1.17  93/05/27  08:55:29  stephen
Made resdiplay of storytelling window work if adding more text
than could fit in a cell!

Revision 1.16  93/05/26  21:41:49  stephen
Fixed problem with storypnt crashing!

Revision 1.15  93/05/26  19:47:39  stephen
Windows fixes.

Revision 1.14  93/05/25  18:41:49  stephen
Changes to TextWrap calling signature.

Revision 1.13  93/05/24  21:40:30  stephen
Made IsValid respect current document.

Revision 1.12  93/05/22  17:10:26  chris
Added "button" icons in ruler that respond to mouse clicks.

Revision 1.11  93/05/18  18:15:36  chris
Finished adding Type act order stuff.

Revision 1.10  93/05/18  15:00:52  chris
Adding act order information.

Revision 1.9  93/05/17  14:53:16  stephen
Fixed clipping of selection rectangles so they won't draw
over window frame and scrollbars.

Revision 1.8  93/05/16  15:17:21  stephen
Added Selection of cells.

Fixed problem with View drawing three times!

Revision 1.7  93/05/12  18:01:39  chris
Added fourth (2nd) column -- appreciation definitions.

Revision 1.6  93/05/07  10:16:37  chris
Added high level dynamics to the story points window.

Revision 1.5  93/05/06  11:00:41  stephen
Fixed DynVal ranges.

Revision 1.4  93/05/04  19:19:32  chris
Added color and other cosmetics to the storypoints window.

Revision 1.3  93/05/03  16:41:33  stephen
Massive changes to sotry points window, including
adding TextWrap class and top margin.

Revision 1.2  93/04/24  14:31:00  stephen
New Storypoints command...

Revision 1.1  93/04/24  10:00:23  stephen
Initial revision

 */
```

```
/* ----------------------------------------------------------------------
        STORYPNT.H
        Storypoints view class
        Copyright (C) 1993 Screenplay Systems Inc.
        Revised:        $Id$
---------------------------------------------------------------------- */

#pragma once

#ifndef __STORYPNT__
#define __STORYPNT__

#include "ItemList.h"
#include "tcommand.h"
#include "tview.h"
#include "consts.h"
#include "dramatic.h"
#include "document.h"
#include "ptext.h"

#pragma segment storypnt

class TextWrap;


#define         SP_COLS         4                       // Number of columns in this table
#define         SP_SECS         5                       // Number of sections in this table
#define         SP_ROWS         94                      // Number of rows (appreciations)
#define         SP_ITOP         2                       // Position of icon tops in ruler
#define         SP_ISZ          16                      // Icon Size of icons in ruler
#define         SP_IOFF         150                     // Offset from left of icons in ruler
#define         SP_ILFT         10                      // left edge of the first section in ruler

#define         SP_APPR         0                       // appreciation column
#define         SP_ITEM         1                       // semantic item column
#define         SP_USE          2                       // contextual usage of item column
#define         SP_STEL         3                       // storytelling column

#define         SP_SEC1         1                       // row beginning of section 1
#define         SP_SEC2         16                      // row beginning of section 2
#define         SP_SEC3         35                      // row beginning of section 3
#define         SP_SEC4         72                      // row beginning of section 4
#define         SP_SEC5         83                      // row beginning of section 5

const   GLColor kGreenClr       = { 0x0000, 0xFFFF, 0x0000 };
const   GLColor kRedClr         = { 0xFFFF, 0x0000, 0x0000 };
const   GLColor kYellowClr      = { 0xFFFF, 0xFFFF, 0x0000 };
const   GLColor kLtblueClr      = { 0x6500, 0xFA00, 0xFFFF };
const   GLColor kBlueClr        = { 0x0000, 0x0000, 0xFFFF };


typedef struct {
        short           apprType;                       // indicates what type of appreciation this is
        TextWrap*       ApprecNameTW;           // TextWrap* from PTEXT item of appreciation's name
        TextWrap*       ValueTW;                        // TextWrap* for Apprec's current value
        pl_id           VNameID;                        // Pool ID to variable name
        short           value;                          // Probably a semVal
        TextWrap*       DefineTW;                       // A TextWrap for a definition
        TextWrap*       ADefineTW;                      // A TextWrap for the appreciation definition (e.g.
Nature, Resolve, etc., NOT the definition of the appreciation's setting
        TextWrap*       STellingTW;                     // A TextWrap for the writer's storytelling material

        gl_coord_t      rowTop;                         // position of row top
        gl_coord_t      rowBottom;                      // position of row bottom
        gl_coord_t      rowHeight;                      // Height of this row in pixels
        GLColor         fillClr;                        // Foreground/background fill color
        GLColor         textClr;                        // Text color
        bool_t          selected[SP_COLS];      // TRUE if the cell in this column is selected
} SPDataType;


/* ----------------------------------------------------------------------
        StoryPoints - Dramatica's Storypoints view class.
---------------------------------------------------------------------- */
class StoryPoints : public TView {
public:
        // CONSTRUCTION/DESTRUCTION
        StoryPoints(ItemList* pParent, vw_flags vflags = kNoFlags, const GLRect *extent = NULL, it_flags iflags =
List::kNoFlags, const GLColor *color = &kGLBlackClr);
        ~StoryPoints(void);

        // PUBLIC UTILITIES
        virtual char*       ClassName(void) const       { return "StoryPoints"; }
        virtual class_t     ClassType(void) const       { return kSPView; }
        virtual bool_t      IsOfType(const void *pType) const { return *(class_t*) pType == kSPView ||
TView::IsOfType(pType); }
        virtual TObject* Duplicate(void) const          { return new StoryPoints(*this); }


        // ACTION PROCS

        // PUBLIC BEHAVIOR
        virtual void        InitView(void);
        virtual void        Frame(void *env, TObject *pSender = NULL) {}          // TItem:: function.  Overriden here to
prevent framing of view
        virtual void        draw_view(const VwPaneUpdateInfo& updateInfo);
        virtual err_t       PrintView(Printing *pPrintMgr);
        virtual bool_t      DoItemHit(EVENT_REC *pEvt, GLPoint mPt);

        virtual void        Resize(void *pNewSize, TObject *pSender);
        char*                       PID2Ptr(pl_id dataID)                               { /* assert (dataID >=
0); */  if (dataID < 0) return ((char*)PT_UNDEFINED); else return ((char*)fTextPool.DataPtr(dataID)); }

        //          SCROLLING-RELATED

        virtual  long       GetNumVLines(void);
        virtual  long       GetNumHLines(void) { return 640; }

        virtual  long       GetPageIncrement(long line, short destination = kNextHPage);
        virtual  doc_coord_t        GetLineVPosition(long line);
        virtual  long       GetVLineSize(long line = kDefaultLine);
        virtual long        calculate_size_of_v_lines(short numberOfLines);
        virtual void        SetVLineSize(gl_coord_t size, long line = kDefaultLine);
```

```
#if 0
//       virtual  long      GetNumVLines(void) { return (long)SP_ROWS; }
//       virtual  long      GetVLineSize(long line = kDefaultLine) { return assert(line<=SP_ROWS);
(long)(SPData[(int)line].rowHeight); }
//       virtual void       SetVLineSize(gl_coord_t size, long line = kDefaultLine) { assert(line<=SP_ROWS);
SPData[(int)line].rowHeight = size; }
//       virtual  long      GetNumHLines(void) { return GetDoc() ? GetDoc()->GetNumHLines() : 0; }
//       virtual  long      GetHLineSize(long line = kDefaultLine);
//       virtual  void      SetHLineSize(gl_coord_t size, long line = kDefaultLine);
//       virtual  doc_coord_t       GetLineHPosition(long line);
#endif

protected:
        Dramatica*          fApp;
        DRDoc*              fDoc;
        TWindow*            fWindow;
        pfm_fd_t            fAppPFMFile;
        PText*              fResponses;
        PText*              fStellingPT;

        gl_font_t           fFont;                          // Font for this window
        short               fFontSize;                      // Size of font
        gl_coord_t          fColPos[SP_COLS+1];     // Location of columns
        short               fNmColumnsVis;          // Number of columns visible
        gl_coord_t          fViewPixelHeight;       // Height of view in pixels (fixed size only)
        bool_t              fInitedScroll;          // True if we've sized scrollbars for this view
        bool_t              fHeightValid;           // TRUE if we have drawn & stored heights

        SPDataType          SPData[SP_ROWS+2];      // Data for the storypoints table (not zero-based)
        Pool                fTextPool;                      // Temp storage for names

        gl_coord_t          fRulerBottom;           // bottom coordinate of area that contains the icons at the top of
the Story Points window
        gl_coord_t          fRulerRight;            // bottom coordinate of area that contains the icons at the top of
the Story Points window
        GLRect              fContent;                       // Content rect of window

        bool_t              fSelectionExists;       // TRUE if the user has a selection
        short               fRowSelected;           // contains # of row selected
        short               fColSelected;           // contains # of column selected

        short               fColWidth[SP_COLS];             // width of the columns
        short               fColFlag[SP_COLS];              // flag for columns
        GLRect              fColIconRect[SP_COLS];  // icon rect columns

        short               fSecFlag[SP_SECS];              // section flags
        GLRect              fSecIconRect[SP_SECS];  // rect of the section icons
        GLColor             fSecColor[SP_SECS];             // Color of the section

        // LOCAL UTILITIES

        void                init_table_data(void);
        void                set_storytelling_textwrap(short whichRow, char* tempStr);
        void                drawRuler (short drawWhat);
        void                drawIcons(short whichIcon);
        void                draw_highlighting(short row, short col);
        GLRect*             doc_to_loc_rect(LgRect* theRect, GLRect* localRect);
        bool_t              find_icon(GLPoint mousePt);
        bool_t              find_cell(LgPoint marginLineDoc, LgRect* cellRect, short* row, short* col);
        void                get_cell_rect(LgRect* cellRect, short row, short col);

}; /* StoryPoints */


/* ------------------------------------------------------------------------
                                                                StoryPntsCmd WINDOW CLASS
------------------------------------------------------------------------ */
class SPWindow : public TWindow {
public:
        // CONSTRUCTION/DESTRUCTION
        SPWindow(TAppl *pTAppl, TDoc *pTDoc, const GLRect *bounds, wn_type windowType, const char *title, ptr_t storage
= NULL);
        ~SPWindow(void);

        // PUBLIC UTILITIES
        virtual char*       ClassName(void) const       { return "SPWindow"; }
        virtual class_t     ClassType(void) const       { return kSPWindow; }
        virtual bool_t      IsOfType(const void *pType) const { return *(class_t*) pType == kSPWindow ||
TWindow::IsOfType(pType); }
        bool_t                      IsDirty(void);

        // CUSTOMIZED BEHAVIOR
        virtual void        InitWindow(void);
        virtual void        DoIdle(void);
        virtual ulong       CalcIdle(void);

protected:
        // DATA MEMBERS
        StoryPoints*        fSPView;                        // Pointer to our view

        // LOCAL UTILITIES
//      virtual void        draw_window(GL_ENV_REF env);
        virtual void        Resize(void *pNewSize, TObject *pSender = NULL);

}; /* SPWindow */


/* ------------------------------------------------------------------------
        StoryPntsCmd - the command class associated with the "Cmd1" menu item
                in the "Dramatica" menu.
------------------------------------------------------------------------ */
class StoryPntsCmd : public TCommand {
public:
        StoryPntsCmd(TAppl* pTAppl) : TCommand(pTAppl) {}

        virtual char*       ClassName(void)   const     { return "StoryPntsCmd"; }
        virtual class_t     ClassType(void) const       { return kSPCmd; }
        virtual bool_t      IsOfType(const void *pType) const { return *(class_t*) pType == kSPCmd ||
TCommand::IsOfType(pType); }
```

```
        virtual TObject* Duplicate(void) const      { return new StoryPntsCmd(*this); }

        static bool_t     IsValid(TAppl *pTAppl);

protected:
        virtual err_t     do_cmd(void);

}; /* StoryPntsCmd */


/* xxxxxxxxxxxxxxxxxxxxxxxxxxxxxxxxxxxxxxxxxxxxxxxxxxxxxxxxxxxxxxxxxxxxxxxxxxxxxxxx
 *  $Log:        storypnt.h,v $
 * Revision 1.12  93/06/10  14:51:32  stephen
 * Horizontal Scrolling; Page UP/Page DN Inval();
 *
 * Revision 1.11  93/05/28  09:17:16  chris
 * Removed the ruler from draw_view.  Activated the AutoScrollTo buttons.
 *
 * Revision 1.10  93/05/26  19:47:49  stephen
 * Windows fixes.
 *
 * Revision 1.9  93/05/22  17:11:00  chris
 * Added "button" icons in ruler that respond to mouse clicks.
 *
 * Revision 1.8  93/05/18  15:01:16  chris
 * Adding act order information.
 *
 * Revision 1.7  93/05/16  15:17:52  stephen
 * Added Selection of cells.
 *
 * Fixed problem with View drawing three times!
 *
 * Revision 1.6  93/05/12  18:02:08  chris
 * Added fourth (2nd) column -- appreciation definitions.
 *
 * Revision 1.5  93/05/07  10:16:41  chris
 * Added high level dynamics to the story points window.
 *
 * Revision 1.4  93/05/04  19:19:58  chris
 *
 *
 * Added color and other cosmetics to the story points window.
 *
 * Revision 1.3  93/05/03  16:42:09  stephen
 * Massive changes to sotry points window, including
 * adding TextWrap class and top margin.
 *
 * Revision 1.2  93/04/24  14:31:19  stephen
 * New Storypoints command...
 *
 * Revision 1.1  93/04/24  10:00:38  stephen
 * Initial revision
 *
 */

#endif /* __STORYPNT__ */
```

```
/* -------------------------------------------------------------------------
        STORYPNT.R
        Dramatica's Story Point static resources
        Copyright (C) 1993 Screenplay Systems Inc.
        $Id: storypnt.r,v 1.16 93/08/24 14:11:16 chris Exp Locker: stephen $
-------------------------------------------------------------------------- */

#ifdef macintosh
        #include "systypes.r"
        #include "types.r"
#else
        #include <systypes.r>
        #include <types.r>
#endif

#include "apprdefs.h"

/* -------------------------------------------------------------------------
        'APPR' - Read-Only Story Point Appreciation text.
-------------------------------------------------------------------------- */
type 'APPR' {
        cstring;                    /* the definition text */
};

/* -------------------------------------------------------------------------
        Actual APPR segment which contain 1 segment (resource) per question.

            key          type     value
            ====================================
                NM:                c            Name
                VN:                c            Variable Name
                TY:                s            Type
                DF:                c            Definition
                TX:                c            Text (storytelling text entered by the user)

                Type (TY) Key:
                                   0      =     Heading Only
                                   1      =     Basic Eight Questions
                                   2      =     Classes
                                   3      =     Types
                                   4      =     Variations
                                   5      =     Elements
                                   6      =     High Level Appreciations
                                   7      =     Heading with Storytelling
                                   8      =     Act order info
                                   9      =     Act order titles
                            10     =     Domain order

                                   19     =     Overview subheading
                                   20     =     Dynamics subheading
                                   21     =     Story subheading
                                   22     =     Plot subheading
                                   23     =     Main Character subheading
                                   24     =     Obstacle Character subheading


        Segment text takes the form: <slash><key><type><colon><value><slash>
        <slash> must be entered as a double-backslash "\\".
-------------------------------------------------------------------------- */


resource 'APPR' (1, PFM_MIN_PRIO) {
        "\\NMc:STORYFORMING"
        "\\VNc:"
        "\\TYs:0"
        "\\DFc:the process of creating the dramatics of a unique story by arranging structure and dynamics"
        "\\TXc:"
        "\\"
};

resource 'APPR' (2, PFM_MIN_PRIO) {
        "\\NMc:Overview"
        "\\VNc:"
        "\\TYs:19"
        "\\DFc:"
        "\\TXc:"
        "\\"
};

resource 'APPR' (3, PFM_MIN_PRIO) {
        "\\NMc:Nature"
        "\\VNc:Nature"
        "\\TYs:6"
        "\\DFc:the primary dramatic mechanism of a story"
        "\\TXc:"
        "\\"
};

resource 'APPR' (4, PFM_MIN_PRIO) {
        "\\NMc:Essence"
        "\\VNc:Essence"
        "\\TYs:6"
        "\\DFc:the primary dramatic feel of a story"
        "\\TXc:"
        "\\"
};

resource 'APPR' (5, PFM_MIN_PRIO) {
        "\\NMc:Tendency"
        "\\VNc:Tendency"
        "\\TYs:6"
        "\\DFc:the degree to which the main character feels compelled to accept the quest"
        "\\TXc:"
        "\\"
};

resource 'APPR' (6, PFM_MIN_PRIO) {
        "\\NMc:Reach"
        "\\VNc:Reach"
        "\\TYs:6"
        "\\DFc:the manner in which the audience identifies with the main character"
        "\\TXc:"
```

```
        "\\"
};

resource 'APPR' (7, PFM_MIN_PRIO) {
        "\\NMc:Dynamics"
        "\\VNc:"
        "\\TYs:20"
        "\\DFc:"
        "\\TXc:"
        "\\"
};

resource 'APPR' (8, PFM_MIN_PRIO) {
        "\\NMc:Resolve"
        "\\VNc:Resolve"
        "\\TYs:1"
        "\\DFc:the degree to which the main character feels compelled to remain on the quest"
        "\\TXc:"
        "\\"
};

resource 'APPR' (9, PFM_MIN_PRIO) {
        "\\NMc:Approach"
        "\\VNc:Approach"
        "\\TYs:1"
        "\\DFc:a description of the main characters preference to adapt to {PPN(MC,P1)} environment or to try and change
it"
        "\\TXc:"
        "\\"
};

resource 'APPR' (10, PFM_MIN_PRIO) {
        "\\NMc:Direction"
        "\\VNc:Direction"
        "\\TYs:1"
        "\\DFc:a description of the main character's character flaw as having a bad trait or lacking a good one"
        "\\TXc:"
        "\\"
};

resource 'APPR' (11, PFM_MIN_PRIO) {
        "\\NMc:Sex"
        "\\VNc:Sex"
        "\\TYs:1"
        "\\DFc:a determination of the main character's mental operating system"
        "\\TXc:"
        "\\"
};

resource 'APPR' (12, PFM_MIN_PRIO) {
        "\\NMc:Outcome"
        "\\VNc:Outcome"
        "\\TYs:1"
        "\\DFc:an evaluation as to whether or not the main character achieved the goal {PPN(MC,NC)} set out to achieve"
        "\\TXc:"
        "\\"
};

resource 'APPR' (13, PFM_MIN_PRIO) {
        "\\NMc:Judgment"
        "\\VNc:Judgment"
        "\\TYs:1"
        "\\DFc:the author's moral evaluation of the outcome of a story"
        "\\TXc:"
        "\\"
};

resource 'APPR' (14, PFM_MIN_PRIO) {
        "\\NMc:Work"
        "\\VNc:Work"
        "\\TYs:1"
        "\\DFc:an evaluation of the outcome of {CNN(MC,NM)}'s efforts to resolve {PPN(MC,P1)} personal problems"
        "\\TXc:"
        "\\"
};

resource 'APPR' (15, PFM_MIN_PRIO) {
        "\\NMc:Limit"
        "\\VNc:Limit"
        "\\TYs:1"
        "\\DFc:the kind of constraint that forces the story to a conclusion"
        "\\TXc:"
        "\\"
};

resource 'APPR' (16, PFM_MIN_PRIO) {
        "\\NMc:Story Structure and Plot lines"
        "\\VNc:"
        "\\TYs:0"
        "\\DFc:"
        "\\TXc:"
        "\\"
};

resource 'APPR' (17, PFM_MIN_PRIO) {
        "\\NMc:Objective Story Line"
        "\\VNc:"
        "\\TYs:21"
        "\\DFc:the plot as it concerns to the story goal"
        "\\TXc:"
        "\\"
};

resource 'APPR' (18, PFM_MIN_PRIO) {
        "\\NMc:Domain"
        "\\VNc:STDom"
        "\\TYs:2"
        "\\DFc:the general area in which the story's problem resides"
        "\\TXc:"
        "\\"
};

resource 'APPR' (19, PFM_MIN_PRIO) {
```

```
        "\\NMc:Concern"
        "\\VNc:STCon"
        "\\TYs:3"
        "\\DFc:the goal or purpose sought after"
        "\\TXc:"
        "\\"
};

resource 'APPR' (20, PFM_MIN_PRIO) {
        "\\NMc:Theme"
        "\\VNc:STRng"
        "\\TYs:4"
        "\\DFc:the focus of the story's thematic message"
        "\\TXc:"
        "\\"
};

resource 'APPR' (21, PFM_MIN_PRIO) {
        "\\NMc:Problem"
        "\\VNc:STPbm"
        "\\TYs:5"
        "\\DFc:the underlying cause of the story's difficulties"
        "\\TXc:"
        "\\"
};

resource 'APPR' (22, PFM_MIN_PRIO) {
        "\\NMc:Goal"
        "\\VNc:STGoal"
        "\\TYs:3"
        "\\DFc:the central objective of a story"
        "\\TXc:"
        "\\"
};

resource 'APPR' (23, PFM_MIN_PRIO) {
        "\\NMc:Consequence"
        "\\VNc:PLGoal"
        "\\TYs:3"
        "\\DFc:the negative effect of failing to achieve the goal"
        "\\TXc:"
        "\\"
};

resource 'APPR' (24, PFM_MIN_PRIO) {
        "\\NMc:Cost"
        "\\VNc:OCGoal"
        "\\TYs:3"
        "\\DFc:the price that must be paid while meeting the requirements of the goal"
        "\\TXc:"
        "\\"
};

resource 'APPR' (25, PFM_MIN_PRIO) {
        "\\NMc:Dividend"
        "\\VNc:MCGoal"
        "\\TYs:3"
        "\\DFc:the benefits gathered while meeting the requirements of the goal"
        "\\TXc:"
        "\\"
};

resource 'APPR' (26, PFM_MIN_PRIO) {
        "\\NMc:Requirements"
        "\\VNc:STReq"
        "\\TYs:3"
        "\\DFc:the necessary pre-cursor to achieving the goal"
        "\\TXc:"
        "\\"
};

resource 'APPR' (27, PFM_MIN_PRIO) {
        "\\NMc:Pre-requisites"
        "\\VNc:PLReq"
        "\\TYs:3"
        "\\DFc:the necessary arrangements or achievements that must be met to proceed with completing the requirement"
        "\\TXc:"
        "\\"
};

resource 'APPR' (28, PFM_MIN_PRIO) {
        "\\NMc:Pre-conditions"
        "\\VNc:OCReq"
        "\\TYs:3"
        "\\DFc:the unnecessary arrangements or achievements that must be met to proceed with meeting the requirement,
that are made necessary by someone's insistence"
        "\\TXc:"
        "\\"
};

resource 'APPR' (29, PFM_MIN_PRIO) {
        "\\NMc:Forewarnings"
        "\\VNc:MCReq"
        "\\TYs:3"
        "\\DFc:the indications that the consequence is growing more imminent"
        "\\TXc:"
        "\\"
};

resource 'APPR' (30, PFM_MIN_PRIO) {
        "\\NMc:Solution"
        "\\VNc:STSol"
        "\\TYs:5"
        "\\DFc:the specific element needed to resolve the story's problem"
        "\\TXc:"
        "\\"
};

resource 'APPR' (31, PFM_MIN_PRIO) {
        "\\NMc:Focus"
        "\\VNc:STFoc"
        "\\TYs:5"
        "\\DFc:the principal symptom of the story problem"
```

```
        "\\TXc:"
        "\\"
};

resource 'APPR' (32, PFM_MIN_PRIO) {
        "\\NMc:Direction"
        "\\VNc:STDir"
        "\\TYs:5"
        "\\DFc:the apparent remedy for the principal symptom of the story problem"
        "\\TXc:"
        "\\"
};

resource 'APPR' (33, PFM_MIN_PRIO) {
        "\\NMc:Stipulation"
        "\\VNc:STStp"
        "\\TYs:3"
        "\\DFc:the standard by which progress is measured in the objective story"
        "\\TXc:"
        "\\"
};

resource 'APPR' (34, PFM_MIN_PRIO) {
        "\\NMc:Catalyst"
        "\\VNc:STUnRng"
        "\\TYs:4"
        "\\DFc:the item that acts as the catalyst to move the objective story forward"
        "\\TXc:"
        "\\"
};

resource 'APPR' (35, PFM_MIN_PRIO) {
        "\\NMc:Inhibitor"
        "\\VNc:STCrFl"
        "\\TYs:4"
        "\\DFc:the item that impedes the objective story's progress"
        "\\TXc:"
        "\\"
};

resource 'APPR' (36, PFM_MIN_PRIO) {
        "\\NMc:Subjective Story Line"
        "\\VNc:"
        "\\TYs:22"
        "\\DFc:the plot as it relates to {CNN(MC,NM)}'s personal goal"
        "\\TXc:"
        "\\"
};

resource 'APPR' (37, PFM_MIN_PRIO) {
        "\\NMc:Domain"
        "\\VNc:PLDom"
        "\\TYs:2"
        "\\DFc:the general area in which {CNN(MC,NM)}'s personal problem resides"
        "\\TXc:"
        "\\"
};

resource 'APPR' (38, PFM_MIN_PRIO) {
        "\\NMc:Concern"
        "\\VNc:PLCon"
        "\\TYs:3"
        "\\DFc:the goal or purpose sought after by {CNN(MC,NM)}"
        "\\TXc:"
        "\\"
};

resource 'APPR' (39, PFM_MIN_PRIO) {
        "\\NMc:Range"
        "\\VNc:PLRng"
        "\\TYs:4"
        "\\DFc:the thematic focus between {CNN(MC,NM)} and {CNN(OC,NM)}"
        "\\TXc:"
        "\\"
};

resource 'APPR' (40, PFM_MIN_PRIO) {
        "\\NMc:Problem"
        "\\VNc:PLPbm"
        "\\TYs:5"
        "\\DFc:the underlying cause of the difficulties between {CNN(MC,NM)} and {CNN(OC,NM)}"
        "\\TXc:"
        "\\"
};

resource 'APPR' (41, PFM_MIN_PRIO) {
        "\\NMc:Solution"
        "\\VNc:PLSol"
        "\\TYs:5"
        "\\DFc:the specific element needed to resolve the difficulties between {CNN(MC,NM)} and {CNN(OC,NM)}"
        "\\TXc:"
        "\\"
};

resource 'APPR' (42, PFM_MIN_PRIO) {
        "\\NMc:Focus"
        "\\VNc:PLFoc"
        "\\TYs:5"
        "\\DFc:the principal symptom of the difficulties between {CNN(MC,NM)} and {CNN(OC,NM)}"
        "\\TXc:"
        "\\"
};

resource 'APPR' (43, PFM_MIN_PRIO) {
        "\\NMc:Direction"
        "\\VNc:PLDir"
        "\\TYs:5"
        "\\DFc:the apparent remedy for the symptom of the difficulties between {CNN(MC,NM)} and {CNN(OC,NM)}"
        "\\TXc:"
        "\\"
};

resource 'APPR' (44, PFM_MIN_PRIO) {
```

```
        "\\NMc:Stipulation"
        "\\VNc:PLStp"
        "\\TYs:3"
        "\\DFc:the standard by which growth is measured in the subjective story"
        "\\TXc:"
        "\\"
};

resource 'APPR' (45, PFM_MIN_PRIO) {
        "\\NMc:Catalyst"
        "\\VNc:PLUnRng"
        "\\TYs:4"
        "\\DFc:the item that acts as the catalyst to move the subjective story forward"
        "\\TXc:"
        "\\"
};

resource 'APPR' (46, PFM_MIN_PRIO) {
        "\\NMc:Inhibitor"
        "\\VNc:PLCrFl"
        "\\TYs:4"
        "\\DFc:the item that impedes the subjective story's progress"
        "\\TXc:"
        "\\"
};

resource 'APPR' (47, PFM_MIN_PRIO) {
        "\\NMc:Domain Act Order"
        "\\VNc:"
        "\\TYs:9"
        "\\DFc:the area in which the solution to the story's problem is sought, act by act"
        "\\TXc:"
        "\\"
};

resource 'APPR' (48, PFM_MIN_PRIO) {
        "\\NMc:Objective Story Domain Position"
        "\\VNc:STOrd"
        "\\TYs:10"
        "\\DFc:  "
        "\\TXc:"
        "\\"
};

resource 'APPR' (49, PFM_MIN_PRIO) {
        "\\NMc:Subjective Story Domain Position"
        "\\VNc:PLOrd"
        "\\TYs:10"
        "\\DFc:  "
        "\\TXc:"
        "\\"
};

resource 'APPR' (50, PFM_MIN_PRIO) {
        "\\NMc:Main Character Domain Position"
        "\\VNc:MCOrd"
        "\\TYs:10"
        "\\DFc:  "
        "\\TXc:"
        "\\"
};

resource 'APPR' (51, PFM_MIN_PRIO) {
        "\\NMc:Obstacle Character Domain Position"
        "\\VNc:OCOrd"
        "\\TYs:10"
        "\\DFc:  "
        "\\TXc:"
        "\\"
};

resource 'APPR' (52, PFM_MIN_PRIO) {
        "\\NMc:Objective Story Type Order"
        "\\VNc:"
        "\\TYs:9"
        "\\DFc:the kind of activity employed to arrive at a solution to the story's objective problem, act by act"
        "\\TXc:"
        "\\"
};

resource 'APPR' (53, PFM_MIN_PRIO) {
        "\\NMc:Act 1 Type"
        "\\VNc:STType1"
        "\\TYs:8"
        "\\DFc:the kind of activities dominating Act 1"
        "\\TXc:"
        "\\"
};

resource 'APPR' (54, PFM_MIN_PRIO) {
        "\\NMc:Act 2 Type"
        "\\VNc:STType2"
        "\\TYs:8"
        "\\DFc:the kind of activities dominating Act 2"
        "\\TXc:"
        "\\"
};

resource 'APPR' (55, PFM_MIN_PRIO) {
        "\\NMc:Act 3 Type"
        "\\VNc:STType3"
        "\\TYs:8"
        "\\DFc:the kind of activities dominating Act 2"
        "\\TXc:"
        "\\"
};

resource 'APPR' (56, PFM_MIN_PRIO) {
        "\\NMc:Act 4 Type"
        "\\VNc:STType4"
        "\\TYs:8"
        "\\DFc:the kind of activities dominating Act 4"
        "\\TXc:"
```

```
        "\\"
};

resource 'APPR' (57, PFM_MIN_PRIO) {
        "\\NMc:Subjective Story Type Order"
        "\\VNc:"
        "\\TYs:9"
        "\\DFc:the kind of activity employed to arrive at a solution to the story's subjective problem, act by act"
        "\\TXc:"
        "\\"
};

resource 'APPR' (58, PFM_MIN_PRIO) {
        "\\NMc:Act 1 Type"
        "\\VNc:PLType1"
        "\\TYs:8"
        "\\DFc:the kind of activities dominating Act 1"
        "\\TXc:"
        "\\"
};

resource 'APPR' (59, PFM_MIN_PRIO) {
        "\\NMc:Act 2 Type"
        "\\VNc:PLType2"
        "\\TYs:8"
        "\\DFc:the kind of activities dominating Act 2"
        "\\TXc:"
        "\\"
};

resource 'APPR' (60, PFM_MIN_PRIO) {
        "\\NMc:Act 3 Type"
        "\\VNc:PLType3"
        "\\TYs:8"
        "\\DFc:the kind of activities dominating Act 3"
        "\\TXc:"
        "\\"
};

resource 'APPR' (61, PFM_MIN_PRIO) {
        "\\NMc:Act 4 Type"
        "\\VNc:PLType4"
        "\\TYs:8"
        "\\DFc:the kind of activities dominating Act 4"
        "\\TXc:"
        "\\"
};

resource 'APPR' (62, PFM_MIN_PRIO) {
        "\\NMc:Main Character Type Order"
        "\\VNc:"
        "\\TYs:9"
        "\\DFc:"
        "\\TXc:"
        "\\"
};

resource 'APPR' (63, PFM_MIN_PRIO) {
        "\\NMc:Act 1 Type"
        "\\VNc:MCType1"
        "\\TYs:8"
        "\\DFc:  "
        "\\TXc:"
        "\\"
};

resource 'APPR' (64, PFM_MIN_PRIO) {
        "\\NMc:Act 2 Type"
        "\\VNc:MCType2"
        "\\TYs:8"
        "\\DFc:  "
        "\\TXc:"
        "\\"
};

resource 'APPR' (65, PFM_MIN_PRIO) {
        "\\NMc:Act 3 Type"
        "\\VNc:MCType3"
        "\\TYs:8"
        "\\DFc:  "
        "\\TXc:"
        "\\"
};

resource 'APPR' (66, PFM_MIN_PRIO) {
        "\\NMc:Act 4 Type"
        "\\VNc:MCType4"
        "\\TYs:8"
        "\\DFc:  "
        "\\TXc:"
        "\\"
};

resource 'APPR' (67, PFM_MIN_PRIO) {
        "\\NMc:Obstacle Character Type Order"
        "\\VNc:"
        "\\TYs:9"
        "\\DFc:"
        "\\TXc:"
        "\\"
};

resource 'APPR' (68, PFM_MIN_PRIO) {
        "\\NMc:Act 1 Type"
        "\\VNc:OCType1"
        "\\TYs:8"
        "\\DFc:  "
        "\\TXc:"
        "\\"
};

resource 'APPR' (69, PFM_MIN_PRIO) {
        "\\NMc:Act 2 Type"
```

```
        "\\VNc:OCType2"
        "\\TYs:8"
        "\\DFc:  "
        "\\TXc:"
        "\\"
};

resource 'APPR' (70, PFM_MIN_PRIO) {
        "\\NMc:Act 3 Type"
        "\\VNc:OCType3"
        "\\TYs:8"
        "\\DFc:  "
        "\\TXc:"
        "\\"
};

resource 'APPR' (71, PFM_MIN_PRIO) {
        "\\NMc:Act 4 Type"
        "\\VNc:OCType4"
        "\\TYs:8"
        "\\DFc:  "
        "\\TXc:"
        "\\"
};

resource 'APPR' (72, PFM_MIN_PRIO) {
        "\\NMc:Subjective Characters"
        "\\VNc:"
        "\\TYs:"
        "\\DFc:"
        "\\TXc:"
        "\\"
};

resource 'APPR' (73, PFM_MIN_PRIO) {
        "\\NMc:Main Character"
        "\\VNc:"
        "\\TYs:23"
        "\\DFc:"
        "\\TXc:"
        "\\"
};

resource 'APPR' (74, PFM_MIN_PRIO) {
        "\\NMc:Domain"
        "\\VNc:MCDom"
        "\\TYs:2"
        "\\DFc:the general area in which (CNN(MC,NM)) operates"
        "\\TXc:"
        "\\"
};

resource 'APPR' (75, PFM_MIN_PRIO) {
        "\\NMc:Concern"
        "\\VNc:MCCon"
        "\\TYs:3"
        "\\DFc:(CNN(MC,NM))'s personal objective or purpose"
        "\\TXc:"
        "\\"
};

resource 'APPR' (76, PFM_MIN_PRIO) {
        "\\NMc:Range"
        "\\VNc:MCRng"
        "\\TYs:4"
        "\\DFc:the nature of (CNN(MC,NM))'s efforts"
        "\\TXc:"
        "\\"
};

resource 'APPR' (77, PFM_MIN_PRIO) {
        "\\NMc:Problem"
        "\\VNc:MCPbm"
        "\\TYs:5"
        "\\DFc:the source of (CNN(MC,NM))'s motivation"
        "\\TXc:"
        "\\"
};

resource 'APPR' (78, PFM_MIN_PRIO) {
        "\\NMc:Solution"
        "\\VNc:MCSol"
        "\\TYs:5"
        "\\DFc:the item, event, or process needed to truly satisfy (CNN(MC,NM))'s motivation"
        "\\TXc:"
        "\\"
};

resource 'APPR' (79, PFM_MIN_PRIO) {
        "\\NMc:Focus"
        "\\VNc:MCFoc"
        "\\TYs:5"
        "\\DFc:the area (CNN(MC,NM)) believes the problem to be"
        "\\TXc:"
        "\\"
};

resource 'APPR' (80, PFM_MIN_PRIO) {
        "\\NMc:Direction"
        "\\VNc:MCDir"
        "\\TYs:5"
        "\\DFc:the way (CNN(MC,NM)) hopes to arrive at a solution"
        "\\TXc:"
        "\\"
};

resource 'APPR' (81, PFM_MIN_PRIO) {
        "\\NMc:Stipulation"
        "\\VNc:MCStp"
        "\\TYs:3"
        "\\DFc:the standard by which (CNN(MC,NM)) judges the degree of (PPN(MC,P1)) concern"
        "\\TXc:"
        "\\"
```

```
};

resource 'APPR' (82, PFM_MIN_PRIO) {
        "\\NMc:Unique Ability"
        "\\VNc:MCUnRng"
        "\\TYs:4"
        "\\DFc:the quality that makes {CNN(MC,NM)} uniquely qualified to solve the story's problem"
        "\\TXc:"
        "\\"
};

resource 'APPR' (83, PFM_MIN_PRIO) {
        "\\NMc:Critical Flaw"
        "\\VNc:MCCrFl"
        "\\TYs:4"
        "\\DFc:the quality that prevents {CNN(MC,NM)} from successfully using {PPN(MC,P1)} unique ability"
        "\\TXc:"
        "\\"
};

resource 'APPR' (84, PFM_MIN_PRIO) {
        "\\NMc:Obstacle Character"
        "\\VNc:"
        "\\TYs:24"
        "\\DFc:"
        "\\TXc:"
        "\\"
};

resource 'APPR' (85, PFM_MIN_PRIO) {
        "\\NMc:Domain"
        "\\VNc:OCDom"
        "\\TYs:2"
        "\\DFc:the area in which {CNN(OC,NM)} operates"
        "\\TXc:"
        "\\"
};

resource 'APPR' (86, PFM_MIN_PRIO) {
        "\\NMc:Concern"
        "\\VNc:OCCon"
        "\\TYs:3"
        "\\DFc:{CNN(OC,NM)}'s personal objective or purpose"
        "\\TXc:"
        "\\"
};

resource 'APPR' (87, PFM_MIN_PRIO) {
        "\\NMc:Range"
        "\\VNc:OCRng"
        "\\TYs:4"
        "\\DFc:the nature of {CNN(OC,NM)}'s efforts"
        "\\TXc:"
        "\\"
};

resource 'APPR' (88, PFM_MIN_PRIO) {
        "\\NMc:Problem"
        "\\VNc:OCPbm"
        "\\TYs:5"
        "\\DFc:the source of {CNN(OC,NM)}'s motivation"
        "\\TXc:"
        "\\"
};

resource 'APPR' (89, PFM_MIN_PRIO) {
        "\\NMc:Solution"
        "\\VNc:OCSol"
        "\\TYs:5"
        "\\DFc:the item, event, or process needed to truly satisfy {CNN(OC,NM)}'s motivation"
        "\\TXc:"
        "\\"
};

resource 'APPR' (90, PFM_MIN_PRIO) {
        "\\NMc:Focus"
        "\\VNc:OCFoc"
        "\\TYs:5"
        "\\DFc:the area {CNN(OC,NM)} most impacts {CNN(MC,NM)}"
        "\\TXc:"
        "\\"
};

resource 'APPR' (91, PFM_MIN_PRIO) {
        "\\NMc:Direction"
        "\\VNc:OCDir"
        "\\TYs:5"
        "\\DFc:the way {CNN(OC,NM)} may stop causing problems for {CNN(MC,NM)}"
        "\\TXc:"
        "\\"
};

resource 'APPR' (92, PFM_MIN_PRIO) {
        "\\NMc:Stipulation"
        "\\VNc:OCStp"
        "\\TYs:3"
        "\\DFc:the standard against which {CNN(OC,NM)}'s concern is measured"
        "\\TXc:"
        "\\"
};

resource 'APPR' (93, PFM_MIN_PRIO) {
        "\\NMc:Unique Ability"
        "\\VNc:OCUnRng"
        "\\TYs:4"
        "\\DFc:the quality that makes {CNN(OC,NM)} uniquely qualified to thwart {CNN(MC,NM)}'s attempts to solve the
story's problem"
        "\\TXc:"
        "\\"
};

resource 'APPR' (94, PFM_MIN_PRIO) {
        "\\NMc:Critical Flaw"
```

```
        "\\VNc:OCCrFl"
        "\\TYs:4"
        "\\DFc:the quality that prevents {CNN(OC,NM)} from successfully using {PPN(OC,P1)} unique ability"
        "\\TXc:"
        "\\"
};

resource 'APPR' (95, PFM_MIN_PRIO) {
        "\\NMc:Primary Character"
        "\\VNc:"
        "\\TYs:"
        "\\DFc:the subjective character who changes their approach or attitude in a story"
        "\\TXc:"
        "\\"
};

resource 'APPR' (96, PFM_MIN_PRIO) {
        "\\NMc:Pivotal Character"
        "\\VNc:"
        "\\TYs:"
        "\\DFc:the subjective character who remains steadfast in their approach or attitude in the story"
        "\\TXc:"
        "\\"
};

/**************************************************************************
 *                                                          NEW STYLE APPR SEGMENTS
 *
 **************************************************************************/

//      DYNAMIC "APPRECIATIONS"

resource 'APPR' (rApprResolve, PFM_MIN_PRIO) {
        "\\NMc:Resolve"
        "\\VNc:Resolve"
        "\\TYs:1"
        "\\DFc:the degree to which the main character feels compelled to remain on the quest"
        "\\TXc:"
        "\\"
};

resource 'APPR' (rApprDirection, PFM_MIN_PRIO) {
        "\\NMc:Direction"
        "\\VNc:Direction"
        "\\TYs:1"
        "\\DFc:a description of the main character's character flaw as having a bad trait or lacking a good one"
        "\\TXc:"
        "\\"
};

resource 'APPR' (rApprApproach, PFM_MIN_PRIO) {
        "\\NMc:Approach"
        "\\VNc:Approach"
        "\\TYs:1"
        "\\DFc:a description of the main characters preference to adapt to {PPN(MC,P1)} environment or to try and change
it"
        "\\TXc:"
        "\\"
};

resource 'APPR' (rApprSex, PFM_MIN_PRIO) {
        "\\NMc:Sex"
        "\\VNc:Sex"
        "\\TYs:1"
        "\\DFc:a determination of the main character's mental operating system"
        "\\TXc:"
        "\\"
};

resource 'APPR' (rApprWork, PFM_MIN_PRIO) {
        "\\NMc:Work"
        "\\VNc:Work"
        "\\TYs:1"
        "\\DFc:the kind of activity focused upon in the effort to solve the story's problem"
        "\\TXc:"
        "\\"
};

resource 'APPR' (rApprOutcome, PFM_MIN_PRIO) {
        "\\NMc:Outcome"
        "\\VNc:Outcome"
        "\\TYs:1"
        "\\DFc:an evaluation as to whether or not the main character achieved the goal {PPN(MC,NC)} set out to achieve"
        "\\TXc:"
        "\\"
};

resource 'APPR' (rApprJudgment, PFM_MIN_PRIO) {
        "\\NMc:Judgment"
        "\\VNc:Judgment"
        "\\TYs:1"
        "\\DFc:an evaluation of the outcome of {CNN(MC,NM)}'s efforts to resolve {PPN(MC,P1)} personal problems"
        "\\TXc:"
        "\\"
};

resource 'APPR' (rApprLimit, PFM_MIN_PRIO) {
        "\\NMc:Limit"
        "\\VNc:Limit"
        "\\TYs:1"
        "\\DFc:the kind of constraint that forces the story to a conclusion"
        "\\TXc:"
        "\\"
};

//      HIGH-LEVEL APPRECIATIONS

resource 'APPR' (rApprNature, PFM_MIN_PRIO) {
        "\\NMc:Nature"
        "\\VNc:Nature"
        "\\TYs:6"
        "\\DFc:the primary dramatic mechanism of a story"
```

```
        "\\TXc:"
        "\\"
};

resource 'APPR' (rApprEssence, PFM_MIN_PRIO) {
        "\\NMc:Essence"
        "\\VNc:Essence"
        "\\TYs:6"
        "\\DFc:the primary dramatic feel of a story"
        "\\TXc:"
        "\\"
};

resource 'APPR' (rApprTendency, PFM_MIN_PRIO) {
        "\\NMc:Tendency"
        "\\VNc:Tendency"
        "\\TYs:6"
        "\\DFc:the degree to which the main character feels compelled to accept the quest"
        "\\TXc:"
        "\\"
};

resource 'APPR' (rApprReach, PFM_MIN_PRIO) {
        "\\NMc:Reach"
        "\\VNc:Reach"
        "\\TYs:6"
        "\\DFc:the manner in which the audience identifies with the main character"
        "\\TXc:"
        "\\"
};

//      STORY (OBJECTIVE STORY) APPRECIATIONS

resource 'APPR' (rApprSTDom, PFM_MIN_PRIO) {
        "\\NMc:Domain"
        "\\VNc:STDom"
        "\\TYs:2"
        "\\DFc:the general area in which the story's problem resides"
        "\\TXc:"
        "\\"
};

resource 'APPR' (rApprSTCon, PFM_MIN_PRIO) {
        "\\NMc:Concern"
        "\\VNc:STCon"
        "\\TYs:3"
        "\\DFc:the goal or purpose sought after"
        "\\TXc:"
        "\\"
};

resource 'APPR' (rApprSTRng, PFM_MIN_PRIO) {
        "\\NMc:Range"
        "\\VNc:STRng"
        "\\TYs:4"
        "\\DFc:the focus of the story's thematic message"
        "\\TXc:"
        "\\"
};

resource 'APPR' (rApprSTPbm, PFM_MIN_PRIO) {
        "\\NMc:Problem"
        "\\VNc:STPbm"
        "\\TYs:5"
        "\\DFc:the underlying cause of the story's difficulties"
        "\\TXc:"
        "\\"
};

resource 'APPR' (rApprSTStp, PFM_MIN_PRIO) {
        "\\NMc:Stipulation"
        "\\VNc:STStp"
        "\\TYs:3"
        "\\DFc:the area where the objective characters apply their efforts to solve the story problem"
        "\\TXc:"
        "\\"
};

resource 'APPR' (rApprSTSol, PFM_MIN_PRIO) {
        "\\NMc:Solution"
        "\\VNc:STSol"
        "\\TYs:5"
        "\\DFc:the specific element needed to resolve the story's problem"
        "\\TXc:"
        "\\"
};

resource 'APPR' (rApprSTFoc, PFM_MIN_PRIO) {
        "\\NMc:Focus"
        "\\VNc:STFoc"
        "\\TYs:5"
        "\\DFc:the principal symptom of the story problem"
        "\\TXc:"
        "\\"
};

resource 'APPR' (rApprSTDir, PFM_MIN_PRIO) {
        "\\NMc:Direction"
        "\\VNc:STDir"
        "\\TYs:5"
        "\\DFc:the apparent remedy for the principal symptom of the story problem"
        "\\TXc:"
        "\\"
};

resource 'APPR' (rApprSTUnRng, PFM_MIN_PRIO) {
        "\\NMc:Objective Story Catalyst"
        "\\VNc:STUnRng"
        "\\TYs:4"
        "\\DFc:the type of resistance that inhibits the quest for the goal"
        "\\TXc:"
        "\\"
```

```
};

resource 'APPR' (rApprSTCrFl, PFM_MIN_PRIO) {
	"\\NMc:Critical Flaw"
	"\\VNc:STCrFl"
	"\\TYs:4"
	"\\DFc: "
	"\\TXc:"
	"\\"
};

resource 'APPR' (rApprSTOrd, PFM_MIN_PRIO) {
	"\\NMc:Objective Story Domain Position"
	"\\VNc:STOrd"
	"\\TYs:10"
	"\\DFc: "
	"\\TXc:"
	"\\"
};

resource 'APPR' (rApprSTType1, PFM_MIN_PRIO) {
	"\\NMc:Act 1 Type"
	"\\VNc:STType1"
	"\\TYs:8"
	"\\DFc:the kind of activities dominating Act 1"
	"\\TXc:"
	"\\"
};

resource 'APPR' (rApprSTType2, PFM_MIN_PRIO) {
	"\\NMc:Act 2 Type"
	"\\VNc:STType2"
	"\\TYs:8"
	"\\DFc:the kind of activities dominating Act 2"
	"\\TXc:"
	"\\"
};

resource 'APPR' (rApprSTType3, PFM_MIN_PRIO) {
	"\\NMc:Act 3 Type"
	"\\VNc:STType3"
	"\\TYs:8"
	"\\DFc:the kind of activities dominating Act 2"
	"\\TXc:"
	"\\"
};

resource 'APPR' (rApprSTType4, PFM_MIN_PRIO) {
	"\\NMc:Act 4 Type"
	"\\VNc:STType4"
	"\\TYs:8"
	"\\DFc:the kind of activities dominating Act 4"
	"\\TXc:"
	"\\"
};

resource 'APPR' (rApprSTGoal, PFM_MIN_PRIO) {
	"\\NMc:Goal"
	"\\VNc:STGoal"
	"\\TYs:3"
	"\\DFc:the central objective of a story"
	"\\TXc:"
	"\\"
};

resource 'APPR' (rApprSTReq, PFM_MIN_PRIO) {
	"\\NMc:Requirements"
	"\\VNc:STReq"
	"\\TYs:3"
	"\\DFc:the necessary pre-cursor to achieving the goal"
	"\\TXc:"
	"\\"
};

//	MAIN CHARACTER APPRECIATIONS

resource 'APPR' (rApprMCDom, PFM_MIN_PRIO) {
	"\\NMc:Domain"
	"\\VNc:MCDom"
	"\\TYs:2"
	"\\DFc:the general area in which {CNN(MC,NM)} operates"
	"\\TXc:"
	"\\"
};

resource 'APPR' (rApprMCCon, PFM_MIN_PRIO) {
	"\\NMc:Concern"
	"\\VNc:MCCon"
	"\\TYs:3"
	"\\DFc:{CNN(MC,NM)}'s personal objective or purpose"
	"\\TXc:"
	"\\"
};

resource 'APPR' (rApprMCRng, PFM_MIN_PRIO) {
	"\\NMc:Range"
	"\\VNc:MCRng"
	"\\TYs:4"
	"\\DFc:the nature of {CNN(MC,NM)}'s efforts"
	"\\TXc:"
	"\\"
};

resource 'APPR' (rApprMCPbm, PFM_MIN_PRIO) {
	"\\NMc:Problem"
	"\\VNc:MCPbm"
	"\\TYs:5"
	"\\DFc:the source of {CNN(MC,NM)}'s motivation"
	"\\TXc:"
	"\\"
};

resource 'APPR' (rApprMCStp, PFM_MIN_PRIO) {
```

```
        "\\NMc:Stipulation"
        "\\VNc:MCStp"
        "\\TYs:3"
        "\\DFc:the area (CNN(MC,NM)) applies effort to solve (PPN(MC,P1)) personal problem"
        "\\TXc:"
        "\\"
};

resource 'APPR' (rApprMCSol, PFM_MIN_PRIO) {
        "\\NMc:Solution"
        "\\VNc:MCSol"
        "\\TYs:5"
        "\\DFc:the item, event, or process needed to truly satisfy (CNN(MC,NM))'s motivation"
        "\\TXc:"
        "\\"
};

resource 'APPR' (rApprMCFoc, PFM_MIN_PRIO) {
        "\\NMc:Focus"
        "\\VNc:MCFoc"
        "\\TYs:5"
        "\\DFc:the area (CNN(MC,NM)) believes the problem to be"
        "\\TXc:"
        "\\"
};

resource 'APPR' (rApprMCDir, PFM_MIN_PRIO) {
        "\\NMc:Direction"
        "\\VNc:MCDir"
        "\\TYs:5"
        "\\DFc:the way (CNN(MC,NM)) hopes to arrive at a solution"
        "\\TXc:"
        "\\"
};

resource 'APPR' (rApprMCUnRng, PFM_MIN_PRIO) {
        "\\NMc:Unique Ability"
        "\\VNc:MCUnRng"
        "\\TYs:4"
        "\\DFc:the quality that makes (CNN(MC,NM)) uniquely qualified to solve the story's problem"
        "\\TXc:"
        "\\"
};

resource 'APPR' (rApprMCCrFl, PFM_MIN_PRIO) {
        "\\NMc:Critical Flaw"
        "\\VNc:MCCrFl"
        "\\TYs:4"
        "\\DFc:the quality that prevents (CNN(MC,NM)) from successfully using (PPN(MC,P1)) unique ability"
        "\\TXc:"
        "\\"
};

resource 'APPR' (rApprMCOrd, PFM_MIN_PRIO) {
        "\\NMc:Main Character Domain Position"
        "\\VNc:MCOrd"
        "\\TYs:10"
        "\\DFc:  "
        "\\TXc:"
        "\\"
};

resource 'APPR' (rApprMCType1, PFM_MIN_PRIO) {
        "\\NMc:Act 1 Type"
        "\\VNc:MCType1"
        "\\TYs:8"
        "\\DFc:  "
        "\\TXc:"
        "\\"
};

resource 'APPR' (rApprMCType2, PFM_MIN_PRIO) {
        "\\NMc:Act 2 Type"
        "\\VNc:MCType2"
        "\\TYs:8"
        "\\DFc:  "
        "\\TXc:"
        "\\"
};

resource 'APPR' (rApprMCType3, PFM_MIN_PRIO) {
        "\\NMc:Act 3 Type"
        "\\VNc:MCType3"
        "\\TYs:8"
        "\\DFc:  "
        "\\TXc:"
        "\\"
};

resource 'APPR' (rApprMCType4, PFM_MIN_PRIO) {
        "\\NMc:Act 4 Type"
        "\\VNc:MCType4"
        "\\TYs:8"
        "\\DFc:  "
        "\\TXc:"
        "\\"
};

resource 'APPR' (rApprMCGoal, PFM_MIN_PRIO) {
        "\\NMc:Dividend"
        "\\VNc:MCGoal"
        "\\TYs:3"
        "\\DFc:the benefits gathered while meeting the requirements of the goal"
        "\\TXc:"
        "\\"
};

resource 'APPR' (rApprMCReq, PFM_MIN_PRIO) {
        "\\NMc:Forewarnings"
        "\\VNc:MCReq"
        "\\TYs:3"
        "\\DFc:the indications that the consequence is growing more imminent"
        "\\TXc:"
```

```
        "\\"
};

//      OBSTACLE CHARACTER APPRECIATIONS

resource 'APPR' (rApprOCDom, PFM_MIN_PRIO) {
        "\\NMc:Domain"
        "\\VNc:OCDom"
        "\\TYs:2"
        "\\DFc:the area in which {CNN(OC,NM)} operates"
        "\\TXc:"
        "\\"
};

resource 'APPR' (rApprOCCon, PFM_MIN_PRIO) {
        "\\NMc:Concern"
        "\\VNc:OCCon"
        "\\TYs:3"
        "\\DFc:{CNN(OC,NM)}'s personal objective or purpose"
        "\\TXc:"
        "\\"
};

resource 'APPR' (rApprOCRng, PFM_MIN_PRIO) {
        "\\NMc:Range"
        "\\VNc:OCRng"
        "\\TYs:4"
        "\\DFc:the nature of {CNN(OC,NM)}'s efforts"
        "\\TXc:"
        "\\"
};

resource 'APPR' (rApprOCPbm, PFM_MIN_PRIO) {
        "\\NMc:Problem"
        "\\VNc:OCPbm"
        "\\TYs:5"
        "\\DFc:the source of {CNN(OC,NM)}'s motivation"
        "\\TXc:"
        "\\"
};

resource 'APPR' (rApprOCStp, PFM_MIN_PRIO) {
        "\\NMc:Stipulation"
        "\\VNc:OCStp"
        "\\TYs:3"
        "\\DFc:the area {CNN(OC,NM)} applies effort to solve {PPN(OC,P1)} personal problem"
        "\\TXc:"
        "\\"
};

resource 'APPR' (rApprOCSol, PFM_MIN_PRIO) {
        "\\NMc:Solution"
        "\\VNc:OCSol"
        "\\TYs:5"
        "\\DFc:the item, event, or process needed to truly satisfy {CNN(OC,NM)}'s motivation"
        "\\TXc:"
        "\\"
};

resource 'APPR' (rApprOCFoc, PFM_MIN_PRIO) {
        "\\NMc:Focus"
        "\\VNc:OCFoc"
        "\\TYs:5"
        "\\DFc:the area {CNN(OC,NM)} believes the problem to be"
        "\\TXc:"
        "\\"
};

resource 'APPR' (rApprOCDir, PFM_MIN_PRIO) {
        "\\NMc:Direction"
        "\\VNc:OCDir"
        "\\TYs:5"
        "\\DFc:the way {CNN(OC,NM)} hopes to arrive at a solution"
        "\\TXc:"
        "\\"
};

resource 'APPR' (rApprOCUnRng, PFM_MIN_PRIO) {
        "\\NMc:Unique Ability"
        "\\VNc:OCUnRng"
        "\\TYs:4"
        "\\DFc:the quality that makes {CNN(OC,NM)} uniquely qualified to thwart {CNN(MC,NM)}'s attempts to solve the
story's problem"
        "\\TXc:"
        "\\"
};

resource 'APPR' (rApprOCCrFl, PFM_MIN_PRIO) {
        "\\NMc:Critical Flaw"
        "\\VNc:OCCrFl"
        "\\TYs:4"
        "\\DFc:the quality that prevents {CNN(OC,NM)} from successfully using {PPN(OC,P1)} unique ability"
        "\\TXc:"
        "\\"
};

resource 'APPR' (rApprOCOrd, PFM_MIN_PRIO) {
        "\\NMc:Obstacle Character Domain Position"
        "\\VNc:OCOrd"
        "\\TYs:10"
        "\\DFc:  "
        "\\TXc:"
        "\\"
};

resource 'APPR' (rApprOCType1, PFM_MIN_PRIO) {
        "\\NMc:Act 1 Type"
        "\\VNc:OCType1"
        "\\TYs:8"
        "\\DFc:  "
        "\\TXc:"
        "\\"
```

```
};

resource 'APPR' (rApprOCType2, PFM_MIN_PRIO) {
        "\\NMc:Act 2 Type"
        "\\VNc:OCType2"
        "\\TYs:8"
        "\\DFc:  "
        "\\TXc:"
        "\\"
};

resource 'APPR' (rApprOCType3, PFM_MIN_PRIO) {
        "\\NMc:Act 3 Type"
        "\\VNc:OCType3"
        "\\TYs:8"
        "\\DFc:  "
        "\\TXc:"
        "\\"
};

resource 'APPR' (rApprOCType4, PFM_MIN_PRIO) {
        "\\NMc:Act 4 Type"
        "\\VNc:OCType4"
        "\\TYs:8"
        "\\DFc:  "
        "\\TXc:"
        "\\"
};

resource 'APPR' (rApprOCGoal, PFM_MIN_PRIO) {
        "\\NMc:Cost"
        "\\VNc:OCGoal"
        "\\TYs:3"
        "\\DFc:the price that must be paid while meeting the requirements of the goal"
        "\\TXc:"
        "\\"
};

resource 'APPR' (rApprOCReq, PFM_MIN_PRIO) {
        "\\NMc:Preconditions"
        "\\VNc:OCReq"
        "\\TYs:3"
        "\\DFc:the unnecessary arrangements or achievements that must be met to proceed with meeting the requirement,
that are made necessary by someone's insistence"
        "\\TXc:"
        "\\"
};


//      PLOT (SUBJECTIVE STORY) APPRECIATIONS

resource 'APPR' (rApprPLDom, PFM_MIN_PRIO) {
        "\\NMc:Domain"
        "\\VNc:PLDom"
        "\\TYs:2"
        "\\DFc:the general area in which {CNN(MC,NM)}'s personal problem resides"
        "\\TXc:"
        "\\"
};

resource 'APPR' (rApprPLCon, PFM_MIN_PRIO) {
        "\\NMc:Concern"
        "\\VNc:PLCon"
        "\\TYs:3"
        "\\DFc:the goal or purpose sought after by {CNN(MC,NM)}"
        "\\TXc:"
        "\\"
};

resource 'APPR' (rApprPLRng, PFM_MIN_PRIO) {
        "\\NMc:Range"
        "\\VNc:PLRng"
        "\\TYs:4"
        "\\DFc:the thematic focus between {CNN(MC,NM)} and {CNN(OC,NM)}"
        "\\TXc:"
        "\\"
};

resource 'APPR' (rApprPLPbm, PFM_MIN_PRIO) {
        "\\NMc:Problem"
        "\\VNc:PLPbm"
        "\\TYs:5"
        "\\DFc:the underlying cause of the difficulties between {CNN(MC,NM)} and {CNN(OC,NM)}"
        "\\TXc:"
        "\\"
};

resource 'APPR' (rApprPLStp, PFM_MIN_PRIO) {
        "\\NMc:Stipulation"
        "\\VNc:PLStp"
        "\\TYs:3"
        "\\DFc:the chief area of contention between the {CNN(MC,NM)} and {CNN(OC,NM)}"
        "\\TXc:"
        "\\"
};

resource 'APPR' (rApprPLSol, PFM_MIN_PRIO) {
        "\\NMc:Solution"
        "\\VNc:PLSol"
        "\\TYs:5"
        "\\DFc:the specific element needed to resolve the difficulties between {CNN(MC,NM)} and {CNN(OC,NM)}"
        "\\TXc:"
        "\\"
};

resource 'APPR' (rApprPLFoc, PFM_MIN_PRIO) {
        "\\NMc:Focus"
        "\\VNc:PLFoc"
        "\\TYs:5"
        "\\DFc:the principal symptom of the difficulties between {CNN(MC,NM)} and {CNN(OC,NM)}"
        "\\TXc:"
        "\\"
};
```

```
resource 'APPR' (rApprPLDir, PFM_MIN_PRIO) {
	"\\NMc:Direction"
	"\\VNc:PLDir"
	"\\TYs:5"
	"\\DFc:the apparent remedy for the symptom of the difficulties between (CNN(MC,NM)) and (CNN(OC,NM))"
	"\\TXc:"
	"\\"
};

resource 'APPR' (rApprPLUnRng, PFM_MIN_PRIO) {
	"\\NMc:Subjective Story Catalyst"
	"\\VNc:PLUnRng"
	"\\TYs:4"
	"\\DFc:the type of interaction that causes conflict between (CNN(MC,NM)) and (CNN(OC,NM))"
	"\\TXc:"
	"\\"
};

resource 'APPR' (rApprPLCrFl, PFM_MIN_PRIO) {
	"\\NMc:Critical Flaw"
	"\\VNc:PLCrFl"
	"\\TYs:4"
	"\\DFc:  "
	"\\TXc:"
	"\\"
};

resource 'APPR' (rApprPLOrd, PFM_MIN_PRIO) {
	"\\NMc:Subjective Story Domain Position"
	"\\VNc:PLOrd"
	"\\TYs:10"
	"\\DFc:  "
	"\\TXc:"
	"\\"
};

resource 'APPR' (rApprPLType1, PFM_MIN_PRIO) {
	"\\NMc:Act 1 Type"
	"\\VNc:PLType1"
	"\\TYs:8"
	"\\DFc:the kind of activities dominating Act 1"
	"\\TXc:"
	"\\"
};

resource 'APPR' (rApprPLType2, PFM_MIN_PRIO) {
	"\\NMc:Act 2 Type"
	"\\VNc:PLType2"
	"\\TYs:8"
	"\\DFc:the kind of activities dominating Act 2"
	"\\TXc:"
	"\\"
};

resource 'APPR' (rApprPLType3, PFM_MIN_PRIO) {
	"\\NMc:Act 3 Type"
	"\\VNc:PLType3"
	"\\TYs:8"
	"\\DFc:the kind of activities dominating Act 3"
	"\\TXc:"
	"\\"
};

resource 'APPR' (rApprPLType4, PFM_MIN_PRIO) {
	"\\NMc:Act 4 Type"
	"\\VNc:PLType4"
	"\\TYs:8"
	"\\DFc:the kind of activities dominating Act 4"
	"\\TXc:"
	"\\"
};

resource 'APPR' (rApprPLGoal, PFM_MIN_PRIO) {
	"\\NMc:Consequence"
	"\\VNc:PLGoal"
	"\\TYs:3"
	"\\DFc:the negative effect of failing to achieve the goal"
	"\\TXc:"
	"\\"
};

resource 'APPR' (rApprPLReq, PFM_MIN_PRIO) {
	"\\NMc:Prerequisites"
	"\\VNc:PLReq"
	"\\TYs:3"
	"\\DFc:the necessary arrangements or achievements that must be met to proceed with completing the requirement"
	"\\TXc:"
	"\\"
};


/* $Log:		storypnt.r,v $
# Revision 1.16  93/08/24  14:11:16  chris
# Cleanup.
#
# Revision 1.15  93/08/20  10:59:04  chris
# Change unique range to unique ability.
#
# Revision 1.14  93/06/04  14:47:06  chris
# Clean up.
#
# Revision 1.13  93/06/02  16:11:33  chris
# Shrunk first column and other cosmetic issues.
#
# Revision 1.12  93/05/29  18:57:35  chris
# Clean up.
#
# Revision 1.11  93/05/28  09:17:19  chris
# Removed the ruler from draw_view.  Activated the AutoScrollTo buttons.
#
# Revision 1.10  93/05/26  19:47:54  stephen
```

```
# Windows fixes.
#
# Revision 1.9  93/05/22  17:11:03  chris
# Added "button" icons in ruler that respond to mouse clicks.
#
# Revision 1.8  93/05/21  21:06:16  chris
# Added TX "field" for storytelling text.
#
# Revision 1.7  93/05/21  17:14:53  chris
# Clean-up.
#
# Revision 1.6  93/05/18  18:16:03  chris
# Finished adding Type act order stuff.
#
# Revision 1.5  93/05/18  15:01:19  chris
# Adding act order information.
#
# Revision 1.4  93/05/12  18:02:11  chris
# Added fourth (2nd) column -- appreciation definitions.
#
# Revision 1.3  93/05/07  10:16:43  chris
# Added high level dynamics to the story points window.
#
# Revision 1.2  93/05/04  19:20:29  chris
#
#
# Added color and other cosmetics to the story points window.
#
# Revision 1.1  93/05/03  16:42:12  stephen
# Initial revision
#
 */
```

```
/**********************************************************************
        STORYTBL.CC
        Storytable functions
        (c) 1993 Screenplay Systems
        Authors:        S. Greenfield & C. Huntley
        Created:        April 13, 1993
        Revised:        $Id$
***********************************************************************
*/

#include "appdlogs.h"
#include "structs.h"
#include "semtable.h"
#include "dramatic.h"
#include "document.h"
#include "storytbl.h"
#include "apprdefs.h"

#pragma segment storytbl

/* ----------------------------------------------------------------------
        FUNCTION:       StoryTbl::StoryTbl - default constructor
        Purpose:
        Accepts:        whichTables: array of shorts, each entry corresponding to
                                one of the table segments which the user might desire.
                                Setting a value of true indicates we will be using that
                                particular table.
---------------------------------------------------------------------- */
StoryTbl::StoryTbl(DRDoc* theDoc, st_err* theErr)
     : fDoc(theDoc),
          fPFMFile(0),
          fNmOfStoryTables (0),
          fStoriesMatched(MAXSTORIES),
          fSearchRecMem (NULL),
          fSearchTableSize (0)
{
        memset(&fTableHandles, 0, (sizeof(hdl_t) * kMaxStoryTables));

        //      Check out the storytbl segments and save the handles

        fApp            = (Dramatica*)AP_Data()->fApp;
        fPFMFile        = fApp->GetStoryTableFile();

        fMaxSearchSlots = kMaxSearchSlots;
        alloc_searchRecTbl(fMaxSearchSlots);

        fExcludedTblHdl = MM_ALLOC(MAXSTORIES, mm_no_flags, "Storytable Matches", NULL);
        assert(fExcludedTblHdl);
        fExcludedTbl = (uchar*)MM_USE(fExcludedTblHdl);

}       /* StoryTbl::StoryTbl */


/* ----------------------------------------------------------------------
        FUNCTION:       StoryTbl::~StoryTbl - destructor
        Purpose:        Frees up lists & data.
---------------------------------------------------------------------- */
StoryTbl::~StoryTbl(void)
{
        pfm_fd_t currentFile = PFMSetCurrentFile(fPFMFile);
        for (ushort id=0; id<kMaxStoryTables; ++id) {
                if (fTableHandles[id]) {
                        MM_UNUSE(fTableHandles[id]);
                        err_t theErr = PFMCheckinSeg(fTableHandles[id]);
                        assert(theErr == NOERR);
                }
        }

        free_searchRecTbl();

        MM_UNUSE(fExcludedTblHdl);
        MMFree(fExcludedTblHdl);

        PFMSetCurrentFile(currentFile);

}       /* StoryTbl::~StoryTbl */

/* ----------------------------------------------------------------------
        FUNCTION:       StoryTbl::CreateSearchTableSet
        Purpose:        Determines the minimal required set of search tables needed
                                to create a fool-proof search of the story universe.

                                requiredApprID is the apprID of a search table that MUST
                                be loaded, most likely because it is currently being scanned.

                                If totalStories == 1, then only the dynamics apprIDs and
                                the requiredApprID is loaded.

        Returns:        Total number of tables to be searched.
---------------------------------------------------------------------- */
short StoryTbl::CreateSearchTableSet(short* whichTables, short requiredApprID, ushort totalStories)
{
        short sTblChoice = 0;

        //      Load dynamic apprIDs first (and always)

        for (short apprID=rApprResolve; apprID<=rApprJudgment; apprID+=10)
                whichTables[sTblChoice++] = apprID;

        //      Always include the four structural choices

                whichTables[sTblChoice++] = rApprSTDom;
                whichTables[sTblChoice++] = rApprSTCon;
                whichTables[sTblChoice++] = rApprSTRng;
                whichTables[sTblChoice++] = rApprSTPbm;
```

```
	//	The rest of the domains are also always required, since we must know the domain in case the user
selects an element

		whichTables[sTblChoice++] = rApprMCDom;
		whichTables[sTblChoice++] = rApprOCDom;
		whichTables[sTblChoice++] = rApprPLDom;
		whichTables[sTblChoice++] = rApprMCPbm;

	//	Special case for a justified story

	if (totalStories == 1) {
		if (requiredApprID > rApprSTPbm)
			whichTables[sTblChoice++]  = requiredApprID;
	}

	//	Load all apprIDs for tables where the user has made any selections (non-zero value)

	else {
		appr_index_t lastRecIdx = FindApprRecIndex(rApprPLReq);
		for (appr_index_t apprRecIdx = FindApprRecIndex(rApprSTStp); apprRecIdx <= lastRecIdx;  ++apprRecIdx) {
			appr_id_t		apprID   = GetApprRec(apprRecIdx)->apprID;
			semval_t		semVal   = fDoc->GetApprValByID(apprID);
			short			myTable  = GetApprRec(apprRecIdx)->myTable;
			// skip appreciaitons with no searchable tables
			if (((semVal != 0) || (apprID == requiredApprID)) && (myTable != kSTNoTable)) {
				if ((apprID != rApprMCDom) && (apprID != rApprOCDom) && (apprID != rApprPLDom) &&
(apprID != rApprMCPbm))
					whichTables[sTblChoice++] = apprID;
			}
		}
	}

	whichTables[sTblChoice] = 0;
	return (sTblChoice);

} /* StoryTbl::CreateSearchTableSet */


/* -----------------------------------------------------------------------
	FUNCTION:		StoryTbl::MergeSearchTableSets
	Purpose:		Given two SearchTables, merge them togther, giving the order
				of the first one priority.
	Returns:		Total number of tables to be searched.
----------------------------------------------------------------------- */
short StoryTbl::MergeSearchTableSets(short firstTable[], short secondTable[], short mergedTable[])
{
	short table1Len = 0;
	while (firstTable[table1Len]) {
		mergedTable[table1Len] = firstTable[table1Len];
		++table1Len;
	}

	short	tbl1Dst = table1Len;
	short	tbl2Src = 0;
	short	apprID;

	while (apprID = secondTable[tbl2Src++]) {
		bool_t foundInList = false;
		for (short n=0; n<table1Len; ++n) {
			if (apprID == firstTable[n]) {
				foundInList = true;
				break;
			}
		}
		if (!foundInList)
			mergedTable[tbl1Dst++] = apprID;
	}
	assert(tbl1Dst <= kMaxSearchSlots);
	mergedTable[tbl1Dst] = 0;
	return (tbl1Dst);
} /* StoryTbl::MergeSearchTableSets */


/* -----------------------------------------------------------------------
	FUNCTION:		StoryTbl::SelectSearchSegs
	Purpose:		Allocates memory for desired search tables.  Frees up any
				search table that is not desired to be part of the current
				search.

				In this function, whichSearchSegs is a table of shorts where
				a non-zero value for a table entry means to include the
				search segment of that ID.

				If the slot is zero, then we check to see if that segment is
				currently checked out, and it is deallocated to improve on
				memory usage.
----------------------------------------------------------------------- */
short StoryTbl::SelectSearchSegs(short* whichSearchSegs)
{
	fNmOfStoryTables  = 0;

	assert(whichSearchSegs[0] == 1);

	pfm_fd_t currentFile = PFMSetCurrentFile(fPFMFile);
	for (ushort id=0; id<kMaxStoryTables; ++id) {
		if (whichSearchSegs[id]) {
			if (fTableHandles[id] == NULL) {
			// Don't re-check out already checked out segments
				fTableHandles[id] = (hdl_t) PFMCheckoutSeg(_OSType("STBL"), id);
				assert(fTableHandles[id] != PFM_NO_SEG);
				fTables[id] = (uchar*)MM_USE(fTableHandles[id]);
			}
			++fNmOfStoryTables;
		}
		else
			if (fTableHandles[id]) {
				MM_UNUSE(fTableHandles[id]);
				err_t theErr = PFMCheckinSeg(fTableHandles[id]);
				assert(theErr == NOERR);
				fTableHandles[id] = NULL;
			}
	}
	PFMSetCurrentFile(currentFile);
```

```
        return (fNmOfStoryTables);
} /* StoryTbl::SelectSearchSegs */

/* -----------------------------------------------------------------------
        StoryTbl::FindInitTableFor - Scan the static data table for the
        requested apprID
------------------------------------------------------------------------ */
short StoryTbl::FindInitTableFor(STPopupInit* popupInitTbl, short apprID)
{
        assert(popupInitTbl);
        assert(apprID >= rApprResolve && apprID <= rLastApprVal);

        for (short tablePos=0; popupInitTbl[tablePos].apprID; ++tablePos)
                if (popupInitTbl[tablePos].apprID == apprID)
                        return (tablePos);

        return (kNoPopup);                                      // means we didn't find a popup!
} /* StoryTbl::FindInitTableFor */

/* -----------------------------------------------------------------------
        StoryTbl::FindSearchTableFor - Scan the search table for the
        requested apprID and return an index.
------------------------------------------------------------------------ */
short StoryTbl::FindSearchTableFor(short apprID)
{
        assert(apprID >= rApprResolve && apprID <= rLastApprVal);

        for (short tablePos=0; fSearchRecs[tablePos].apprID; ++tablePos)
                if (fSearchRecs[tablePos].apprID == apprID)
                        return (tablePos);

        assert(false);
} /* StoryTbl::FindSearchTableFor */

/* -----------------------------------------------------------------------
        StoryTbl::alloc_searchRecTbl -
------------------------------------------------------------------------ */
void StoryTbl::alloc_searchRecTbl(short nmOfSearchTables)
{
        assert(fSearchRecMem == NULL);
        fSearchTableSize  = nmOfSearchTables;
        fSearchRecMem           = MM_ALLOC_INIT(sizeof(STSearchRec)*fSearchTableSize, mm_no_flags, 0, "STSearchRecs",
NULL);
        assert(fSearchRecMem);

        fSearchRecs                     = (STSearchRec*)MM_USE(fSearchRecMem);
        assert(fSearchRecs);

} /* StoryTbl::alloc_searchRecTbl */

/* -----------------------------------------------------------------------
        StoryTbl::free_searchRecTbl -
------------------------------------------------------------------------ */
void StoryTbl::free_searchRecTbl(void)
{
        if (fSearchRecMem) {
                MM_UNUSE(fSearchRecMem);
                MMFree(fSearchRecMem);
                fSearchRecMem = NULL;
                fSearchTableSize = 0;
        }
} /* StoryTbl::free_searchRecTbl */

/* -----------------------------------------------------------------------
        StoryTbl::init_menu_item_structs - loads the fSearchRecs table
        NOTE: Ultimately, this should be a PText segment that is pre-compiled.
------------------------------------------------------------------------ */
void StoryTbl::init_menu_item_structs(STPopupInit* popupInitTbl, short* whichTables, PText* fResponses)
{
        STSearchRec* searchRec;
        semval_t        semVal;
        ushort  token           = 0;
        short   whichSearchSegs[kMaxStoryTables];
        memset(whichSearchSegs, 0, sizeof(short) * kMaxStoryTables);

        short n = -1;
        while (whichTables[++n]) {
                short apprRecIdx = FindApprRecIndex(whichTables[n]);
                if ( whichTables[n] > rApprJudgment)
                        whichSearchSegs[GetApprRec(apprRecIdx)->myTable] = GetApprRec(apprRecIdx)->myTable;
        }

        whichSearchSegs[0] = 1;
                // Always include first 8 dynamics
        SelectSearchSegs(whichSearchSegs);

        //      Clear everything out, then initialize a few things

        clear_searchRecTbl();
        for (short slot=0; slot<fMaxSearchSlots; ++slot) {
                searchRec                       = GetSearchRec(slot);
                searchRec->matchAny             = true;
        }

        assert(fMaxSearchSlots <= fSearchTableSize);            // IF THIS DOESN'T FAIL, REMOVE IT!!!

        for (slot=0;  whichTables[slot]; ++slot) {
                searchRec                       = GetSearchRec(slot);
                searchRec->ApprRecIdx   = FindApprRecIndex(whichTables[slot]);
                searchRec->apprID               = whichTables[slot];
                if (popupInitTbl) {
                        short tablePos = FindInitTableFor(popupInitTbl, searchRec->apprID);
                        if (tablePos != kNoPopup)
                                // false means no more popups to init
```

```
                        searchRec->popupMenuID = popupInitTbl[tablePos].popupMenuID;            // From Popup
Association Table
                searchRec->lockID = popupInitTbl[tablePos].lockID;
        // ID of lock checkbox / item
                }
                searchRec->menuType                     = GetApprRec(searchRec->ApprRecIdx)->apprType;
                searchRec->maxItems                     = GetNmOfApprItems(searchRec->ApprRecIdx);
                searchRec->myTable                      = GetApprRec(searchRec->ApprRecIdx)->myTable;
                assert(searchRec->myTable != kSTNoTable);
                searchRec->tableUsed            = true;
                memset(&searchRec->fItemTally[0], 0, searchRec->maxItems+1);
                semVal = 0;

                //      ***********************
                //      DO DYNAMIC CHOICE MENUS
                //      ***********************

                if (searchRec->menuType == kChoiceMenu) {
                        semVal = fDoc->GetApprValByID(searchRec->apprID);
                        if (semVal > 0) {
        // 0 means not assigned; -1 means multiple choices exist
                                semVal -= searchRec->apprID;
                                searchRec->searchVal = semVal-1;                        // SearchVal is either
0 or 1 (undefined for matchAny == true)
                                searchRec->fItemTally[semVal-1] = semVal;
                                searchRec->matchAny = false;
                        }
                        else
                                searchRec->matchAny = true;
                }

                //      **************************
                //      DO STRUCTURAL CHOICE MENUS
                //      **************************

                else {
                        semVal = fDoc->GetApprValByID(searchRec->apprID);

                        //      semVal > 0 means user has made a specific semantic choice for this menu

                        if (semVal > 0) {

                                token = SemToSearchVal(searchRec, semVal);
                                searchRec->searchVal                    = token;                //
token is 1-64
                                searchRec->fItemTally[token-1]       = token;                   // This
actually makes the menu item added to the menu
                                searchRec->matchAny                             = false;
                                searchRec->multiSearch                  = false;
                        }

                        // semVal is -1: means multiple semVals chosen, so we need to set up a table for "OR" testing

                        else if (semVal == -1) {
                                char    keyText[20];
                                short   semValTbl[64];
                                char    buildStr[300];
                                strcpy(keyText, GetApprRec(searchRec->ApprRecIdx)->varName);
                                strcat(keyText,"m");
                                                // Multiple lists have the same key, but end with an "m"

                                buildStr[0] = 0;
                                fResponses->GetParam(keyText, 'c', buildStr);
                                short nmOfChoices = ConvertOrderString(buildStr, semValTbl);
                                assert(nmOfChoices);

                                searchRec->matchAny             = false;
                                searchRec->multiSearch      = 0;
                                for (short n=0; n<nmOfChoices; ++n) {
                                        semVal = semValTbl[n];
                                        SetMultiSemVal(searchRec, semVal);
                                }
                        }

                        //      semVal is 0 : user chose nothing so wildcard and match anything

                        else {
                                searchRec->matchAny             = true;

                                searchRec->multiSearch      = false;
                        }

                }

                searchRec->curMenuChoice = 0;
        }
} /* init_menu_item_structs */


/* -----------------------------------------------------------------------
        StoryTbl::SetMultiSemVal - allows us to iteratively set multiple
        semVals.  This is a public function because DQS2 calls it.

        multiSearch is the count of the number of items to search for.  After
        the semVal's token has been inserted into the table, the count is
        incremented.
------------------------------------------------------------------------- */
void StoryTbl::SetMultiSemVal(STSearchRec* searchRec, ushort semVal)
{
        assert(semVal);
        if (searchRec->menuType == kElemMenu)                                           // Make
elements an 85-149, so they are "class-less"
                semVal = SEMELEM_LIMIT_TO_148(semVal);
        ushort token = SemToSearchVal(searchRec, semVal);                  // However, the token will be a
1-64
        searchRec->multiSearchVals[searchRec->multiSearch++] = token;  // first elem: insert at "0", then increm
multiSearch to "1"
        searchRec->fItemTally[token-1]      = token;                                    // make
semantic item visible in menu

} /* StoryTbl::SetMultiSemVal */
```

```
/* ---------------------------------------------------------------------
	StoryTbl::SemToSearchVal - Given a searchRec & a semVal, tokenize the
	semVal into a searchVal
--------------------------------------------------------------------- */
ushort StoryTbl::SemToSearchVal(STSearchRec* searchRec, ushort semVal)
{
	ushort token;
	assert(semVal > 0);

	switch (searchRec->menuType) {
	  case kClassMenu:	token = SEMCLASS_TO_TOKEN(semVal);
					break;
	  case kTypeMenu:	token = SEMTYPE_TO_TOKEN(semVal);
					break;
	  case kVarMenu:	token = SEMVAR_TO_TOKEN(semVal);
					break;
	  case kElemMenu:	token = SEMELEM_NORMALIZE(semVal)-1;		// Use to be SEMELEM_TO_TOKEN
					break;
	}
	return (token);
} /* StoryTbl::SemToSearchVal */


/* ---------------------------------------------------------------------
	TokenToSemVal - convert a token to a semVal.  NOTE: not a member
	function, 'cause it's used by both CPANEL & STORYTBL, and it doesn't
	need to be!
--------------------------------------------------------------------- */
short TokenToSemVal(STSearchRec* searchRec, short tokenVal)
{
	assert(searchRec->menuType >= kChoiceMenu && searchRec->menuType <= kElemMenu);
	assert(tokenVal >= 0 && tokenVal <=64);

	switch (searchRec->menuType) {
	  case kChoiceMenu:	return (tokenVal);
	  case kClassMenu:	return (TOKEN_TO_SEMCLASS(tokenVal));
	  case kTypeMenu:	return (TOKEN_TO_SEMTYPE(tokenVal));
	  case kVarMenu:	return (TOKEN_TO_SEMVAR(tokenVal));
	  case kElemMenu:	return (TOKEN_TO_SEMELEM(tokenVal));
	}
	assert(false);
} /* TokenToSemVal */


/* ---------------------------------------------------------------------
	StoryTbl::SaveStorySetting - takes a specific "menu" choice and
	saves its value(s) into the Appreciation Table.

	ACCEPTS:		m		- index into fSearchRecs for desired menu.
--------------------------------------------------------------------- */
void StoryTbl::SaveStorySetting(short m, PText* responseSeg, ushort fTotalStories)
{
	STSearchRec*	searchRec = GetSearchRec(m);
	if (!searchRec->tableUsed)
		return;

	short			semVal;						// NOTE:
changed from ushort 11/19/93

	//	*********************
	//	SAVE A DYNAMIC CHOICE
	//	*********************

	if (searchRec->menuType == kChoiceMenu) {

	   // SPECIAL CASE WHERE IF USER SELECTS ONE (1) STORY, ITALICIZED CHOICES BECOME LOCKED

		if (fTotalStories == 1)
		   semVal = (searchRec->nmValidChoices == 1) ? searchRec->semVal + 1 : 0;
		else
		   semVal = (searchRec->nmValidChoices == 1 && !(searchRec->matchAny)) ? searchRec->semVal + 1 : 0;

		if (semVal)
			// If semVal is 0, leave it be 0
			semVal += searchRec->apprID;				//
Bring the value back up over 1000, so it's a semVal
		fDoc->SetApprValByID(searchRec->apprID, semVal);
	}

	//	***********************
	//	SAVE A STRUCTURAL CHOICE
	//	***********************

	else {
		if (searchRec->multiSearch && (fTotalStories != 1))		// Special case for multi-
semval menus: make semVal -1
			semVal = -1;
		else {
			if (fTotalStories == 1)
			   semVal = (searchRec->nmValidChoices == 1) ? searchRec->semVal : 0;		//
SemVal is an 85-149 here
			else
			   semVal = (searchRec->nmValidChoices == 1 && !(searchRec->matchAny)) ? searchRec->semVal :
0;

			if (semVal && searchRec->menuType == kElemMenu) {
				appr_index_t thisGroupDomain = GetFirstIndexForGroup(searchRec->apprID);
				semval_t elemClass = fDoc->GetApprValByIndex(thisGroupDomain);
				assert(elemClass || (!elemClass && fTotalStories != 1));
				if (elemClass)
					semVal = SEMELEM_RECLASSIFY(elemClass, semVal-(START_OF_ELEMENTS-1));	//
RECLASSIFY element using the domain as class
				assert(semVal == 0 || (semVal>=85 && semVal<= 340));
			}

			// Eliminate unnecessary multi-semVal params

			if (searchRec->multiSearch) {
				char	keyText[20];
				strcpy(keyText, GetApprRec(searchRec->ApprRecIdx)->varName);
				strcat(keyText,"m");
					// Multiple lists have the same key, but end with an "m"
				pt_err theErr = responseSeg->RemoveParam(keyText);
```

```
                                assert(theErr == noerr || theErr == -10);
                        }
                }
                fDoc->SetApprValByID(searchRec->apprID, semVal);
        }
} /* StoryTbl::SaveStorySetting */


/* -------------------------------------------------------------------------
        FUNCTION:       StoryTbl::ScanStoryTable
        Purpose:        Scans the story table for matching choices.
        Returns:        Number of stories that matched.
        Note:           Table 0 (Skew/Bias questions) is ALWAYS searched.
------------------------------------------------------------------------- */
ushort StoryTbl::ScanStoryTable(bool_t subsetSearch)
{
        register ushort  i;
        short                   j;
        short                   t;                                      // table we are currently using
        short                   bitVal;                         // Used to determine the value (0 or 1)
of a bit position
        ushort                  storiesMatched = 0;
        short                   nTables = 0;
        bool_t                  matched;
        uchar                   tableVal;
        ushort                  stories2Scan;

        //      Construct a properly-masked byte for checking the 8 bias/skew questions.

        uchar skewBiasByte              = 0;
        uchar eitherMaskByte    = 0;
        uchar searchByte        = 0;
        uchar tableByte                 = 0;

        for (i=0; i<8; ++i) {
                skewBiasByte    |=      ((fSearchRecs[i].searchVal) << i);
                eitherMaskByte  |=  ((fSearchRecs[i].matchAny) << i);
        }
        searchByte = skewBiasByte | eitherMaskByte;


        // If not a subset search, erase any memory of previous matches

        if (!subsetSearch) {
                stories2Scan = MAXSTORIES;
                memset(fExcludedTbl, 0, MAXSTORIES);
        }
        else
                stories2Scan = fStoriesMatched;


        //      Clear out our tally of which menu items are valid

        for (j=0; j<fMaxSearchSlots; ++j) {
                register STSearchRec* searchRec = &fSearchRecs[j];
                if (!searchRec->tableUsed)
                // Only clear tables we are using
                        break;
                memset(&searchRec->fItemTally[0], 0, searchRec->maxItems+1);   // Don't bother clearing tally for items
we can't access
                searchRec->numValidChoices = 0;
        // This gets incremented to prevent excessive menu scanning (see below)
                searchRec->menuFull = false;
        }


        //      *****************************************************
        //      MAIN SEARCH LOOP -- goes thru every story combination
        //      *****************************************************

//      ProgressDlog* progDlog = (stories2Scan >= 8192) ? new ProgressDlog() : NULL;
        AP_WaitCursor();

        for (i=0; i<MAXSTORIES; ++i) {
//              if (progDlog && (i % 2048 == 0))
//                      progDlog->UpdateProgress((int)((i*100)/stories2Scan));

                if (fExcludedTbl[i])                                    // If this is true, exclude testing this
story
                        continue;

                tableByte = fTables[0][i];
                if (searchByte != (tableByte | eitherMaskByte)) {       // Matched Skew/Bias questions?
                        fExcludedTbl[i] = true;                                         // No --
exclude this question
                        continue;
                }

                //      *******************************************************
                //      Go thru each structural choice table for this story, and
                //      compare it against the user's choice.
                //      *******************************************************

                matched = true;                                                         // assume
matched until otherwise proven wrong
                for (j=8; j<fMaxSearchSlots; ++j) {
                        register STSearchRec* searchRec = &fSearchRecs[j];
                        if (!searchRec->tableUsed)                              // Only scan tables we
are using
                                break;
                        if (searchRec->matchAny)                        // Is this menu an automatic
match? (or table not in use)
                                continue;                                                       //
yes -- check next menu...
                        t = searchRec->myTable;                                 // t is index into
specific 32K table

                        if (searchRec->menuType == kElemMenu)           //      All elements are compared
modulo 64
                                tableVal = fTables[t][i] % 64;
                        else
```

```
                        tableVal = fTables[t][i];

                if (searchRec->multiSearch) {                                        //
Multi-value matching for this menu
                        matched = false;
        // assume this -- for now...
                        for (short n=0; n<searchRec->multiSearch; ++n)
                                if (searchRec->multiSearchVals[n] == tableVal) {
                                        matched = true;
                // MATCHED one of the multi searchVals, so this menu is an AUTOMATIC MATCH...

                                        break;
                // ...so break from this loop...
                                }
                        if (matched)
                                continue;
                // ...and continue checking other menus.
                        else
                                break;
                // None of the multi-searchVals matched this story, so this story is a "NO MATCH"!
                }
                else
                        if (searchRec->searchVal != tableVal) {          // TEST FOR NO MATCH
                                matched = false;
                                break;
        // This story doesn't match -- don't bother with further comparisons
                        }
        }

        if (!matched) {
                fExcludedTbl[i] = true;                                   // No match -- exclude
this story from future searches
                continue;
        }

        //      ****************************************************************
        //      THIS STORY IS A MATCH!  Now go thru each popup menu and log which
        //      menu items are valid for this story.
        //      ****************************************************************

        for (j=0; j<8; ++j) {                                                //
Special for loop for first 8 questions (packed into char)
                bitVal = ((tableByte & (1 << j)) != 0) ? 1 : 0;
                fSearchRecs[j].fItemTally[bitVal] = bitVal+1;
        }

        //      Further optimization possible: don't bother tabulating for a matched story for a menu with
fixed (1) choice! (already chosen, !matchAny)
        //      Also -- put in flag to suppress calculation of menus so that DQS2 can only calculate the one
and only menu it is using!

        for (j=8; j<fMaxSearchSlots; ++j) {                                  // Rest of
popups
                register STSearchRec* searchRec = &fSearchRecs[j];
                if (!searchRec->tableUsed)                                   //
table not in use -- we've reach end of search records
                        break;
                if (searchRec->menuFull)                                     // Menu
filled every slot, so don't bother tabulating
                        continue;

                t = searchRec->myTable;
                if (searchRec->menuType == kElemMenu)
                        tableVal = fTables[t][i] % 64;                       // semVal has
already been adjusted by -85 o get it to 0
                else
                        tableVal = fTables[t][i];
                assert(tableVal <= 63);

                if (!searchRec->fItemTally[tableVal]) {                      //
Empty slot?
                        searchRec->fItemTally[tableVal] = tableVal+1;        // non-zero
value makes this a valid menu choice!
                        if (++searchRec->nmValidChoices == searchRec->maxItems)    // incrementing
this...
                                searchRec->menuFull = true;
        // ... can prevent over-zealous scanning of menus!
                }
        }

        ++storiesMatched;
}

//      Set nmValidChoices & semVal for first 8 menus...

for (j=0; j<8; ++j) {
        register STSearchRec* searchRec = &fSearchRecs[j];
        for (short menuPos=0; menuPos<=1; ++menuPos)
                if (searchRec->fItemTally[menuPos])
                        ++searchRec->nmValidChoices;
        if (searchRec->nmValidChoices == 1)
                searchRec->semVal = (searchRec->fItemTally[0]) ? 0 : 1;      // NOTE: here, the
"semVals" of dynamic choices are either 0 or 1 for historic reasons
}

//      Set semVal for rest of menus -- but be conservative about when to do so

for (j=8; j<fMaxSearchSlots; ++j) {
// Rest of popups
        register STSearchRec* searchRec = &fSearchRecs[j];
        if (!searchRec->tableUsed)
        // table not in use -- we've reach end of search records
                break;
        if ((searchRec->nmValidChoices == 1) && (searchRec->semVal == 0)) {
                for (short menuPos=0; menuPos<searchRec->maxItems; ++menuPos)
                        if (searchRec->fItemTally[menuPos]) {
                                searchRec->semVal = TokenToSemVal(searchRec, menuPos);
                                break;
                        }
        }
}

//      if (progDlog)
```

```
//              delete progDlog;
        AP_GoCursor();
        fStoriesMatched = storiesMatched;
        return (storiesMatched);
}

#pragma segment main

/* $Log:           storytbl.cc,v $
Revision 1.5  93/09/24  15:32:38  stephen
Performance-related revisions.

Revision 1.4  93/06/04  19:57:13  stephen
Changed PFMPush to PFMSet.

Revision 1.3  93/06/03  23:16:17  stephen
Moved opening of StoryTbl.pfm into the application class.
This fixed a huge bug which cause the app to crash!

Revision 1.2  93/05/31  18:22:09  stephen
Temporarily removed the ProgressDlog -- it was
bombing!

Also, changed looping int to an unsigned short, to be more
compatible with Borland/Windows compiler...

Revision 1.1  93/04/19  18:59:58  stephen
Initial revision

 */
```

```
/* ---------------------------------------------------------------------------
        STORYTBL.H
        Storytable functions
        Copyright (C) 1993 Screenplay Systems Inc.
        Revised:        $Id: storytbl.h,v 1.4 93/09/24 15:33:09 stephen Exp Locker: stephen $
--------------------------------------------------------------------------- */

#pragma once

#ifndef __STORYTBL__
#define __STORYTBL__

extern "C" {
        #include "ssi.h"
}

#include "semtable.h"
#include "ptext.h"
#include "apprec.h"

class Dramatica;

/* ---------------------------------------------------------------------------
                TYPEDEFS & CONSTANTS
--------------------------------------------------------------------------- */

const ushort    MAXSTORIES      = 32768;

const class_t   kStoryTbl       =       kLastGenClass + 1;

const ls_index  kCPNonPopUp                     =  0;

const short             kNoPopup                        = -1;   // returned by FindInitTableFor()

typedef  short   pu_menu_t;

const pu_menu_t  kChoiceMenu                    = 1;
const pu_menu_t  kClassMenu                     = 2;
const pu_menu_t  kTypeMenu                      = 3;
const pu_menu_t  kVarMenu                       = 4;
const pu_menu_t  kElemMenu                      = 5;

//      The STPopupInit structure contains constant, initialized data used to
//      initialize the STSearchRec array.

typedef struct {
        short           apprID;                 // Appreciation SemVal
        ls_index        popupMenuID;    // CPANEL POPUP ID of this menu
        ls_index        lockID;                 // ls_index of lock ID for this menu
} STPopupInit;


//      The STSearchRec structure is passed into the story engine.  It contains
//      All the useful info about the state of the story and the desired menu
//      to scan for.

typedef struct {
        bool_t          tableUsed;                      // TRUE if this search table slot is being used
        short           apprID;                         // Appreciation SemVal
        short           ApprRecIdx;                     // Index into the Appreciation table (speeds lookups)
        ls_index        popupMenuID;            // ID of this menu
        ls_index        lockID;                         // ls_index of lock ID for this menu
        pu_menu_t       menuType;                       // Type of this menu
        short           myTable;                        // Table/bit position that belongs to this menu
        short           maxItems;                       // Max items that can be chosen from

        bool_t          matchAny;                       // True if this field is wildcarded
        bool_t          validChoice;            // User selected from a valid choice
        short           dashedLinePos;          // Position of dashed line which separates valid from invalid
choices

        short           curMenuChoice;          // Index of which item is currently showing in the popup
        short           numValidChoices;        // Current number of valid choices for this menu

        uchar           semVal;                         // Semantic value of current choice
        uchar           searchVal;                      // Adjusted (tokenized) semval
        short           multiSearch;            // 0, or the number of multi-searches if this menu has multiple
semVals/searchVals (semVal==-1)
        bool_t          menuFull;                       // If true, halt additional menu scanning

        uchar           fItemTally[65];         // One byte per possible semantic value (1-64)
        uchar           multiSearchVals[65];// Used
} STSearchRec;


const short     kMaxSearchSlots  = (12 * 4) + 8;  // Total number of search slots that can (and should) be allocated

typedef  long    st_err;

short TokenToSemVal(STSearchRec* searchRec, short tokenVal);

/* ---------------------------------------------------------------------------
                StoryTbl - Story Table functions Class.
--------------------------------------------------------------------------- */
class StoryTbl : public TObject {
public:

//      CONSTRUCTION/DESTRUCTION
        StoryTbl(DRDoc* theDoc, st_err* theErr);
        virtual ~StoryTbl(void);

//      PUBLIC UTILITIES
        virtual  char*          ClassName(void) const                   { return "StoryTbl"; }
        virtual  class_t        ClassType(void)    const                { return kStoryTbl; }
        virtual bool_t          IsOfType(const void* pType) const { return *(class_t*) pType == kStoryTbl ||
TObject::IsOfType(pType); }
        virtual TObject*        Duplicate(void) const                   { return new StoryTbl(*this); }
        virtual byte_cnt        GetObjSize(void)                        { return sizeof(StoryTbl); }
        virtual byte_cnt        GetAllocSize(void)                              { return 0; }

//      PUBLIC BEHAVIOR

        short                   CreateSearchTableSet(short* whichTables, short requiredApprVal, ushort totalStories);
```

```
        short                        MergeSearchTableSets(short firstTable[], short secondTable[], short mergedTable[]);
        short                        SelectSearchSegs(short* whichSearchSegs);
        short                        FindInitTableFor(STPopupInit* popupInitTbl, short apprID);

        short                        FindSearchTableFor(short apprID);
inline STSearchRec*          GetSearchRec(short whichRec);

        void                         init_menu_item_structs(STPopupInit* popupInitTbl, short* whichTables, PText*
fResponses);
        void                         SetMultiSemVal(STSearchRec* searchRec, ushort semVal);
        ushort                       SemToSearchVal(STSearchRec* searchRec, ushort semVal);
        void                         SaveStorySetting(short m, PText* responseSeg, ushort fTotalStories);
        ushort                       ScanStoryTable(bool_t subsetSearch);

        short                        GetNmOfSearchSlots(void)                   { return fMaxSearchSlots; }
        short                        GetNmOfStoryTables(void)                   { return fNmOfStoryTables; }

protected:
//      DATA MEMBERS
        Dramatica*                   fApp;
        DRDoc*                       fDoc;
        pfm_fd_t                     fPFMFile;
        hdl_t                        fTableHandles[kMaxStoryTables];      // handles to all the tables
        uchar*                       fTables[kMaxStoryTables];            // Pointers to all the tables
        short                        fNmOfStoryTables;                                // Actual count of story tables
        short                        fMaxSearchSlots;                   // Number of search structures (CPMenu)

        hdl_t                        fExcludedTblHdl;                   // A chunk of memory used to track which
stories match or were excluded
        uchar*                       fExcludedTbl;                              // Each char corresponds to a
story; true if it is an excluded story
        ushort                       fStoriesMatched;                   // Number of stories last matched

        hdl_t                        fSearchRecMem;                             // Memory for the table below
        STSearchRec*         fSearchRecs;                       // Tables the user of this class sets up
to search the story universe
        short                        fSearchTableSize;                          // Number of search tables in
use (memory allocated for)

//      LOCAL UTILITIES

        void                         alloc_searchRecTbl(short nmOfSearchTables);
inline void                          clear_searchRecTbl(void);
        void                         free_searchRecTbl(void);

};      /* StoryTbl */

/* ---------------------------------------------------------------------
        StoryTbl::GetSearchRec - returns a struct with the desired
        sTblSearchRecs data.
--------------------------------------------------------------------- */
inline STSearchRec* StoryTbl::GetSearchRec(short whichRec)
{
        assert(whichRec < fSearchTableSize);
        assert(fSearchRecMem);

        return (&fSearchRecs[whichRec]);
} /* StoryTbl::GetSearchRec */


/* ---------------------------------------------------------------------
        StoryTbl::clear_searchRecTbl - erases contents of table
--------------------------------------------------------------------- */
inline void StoryTbl::clear_searchRecTbl(void)
{
        memset(fSearchRecs, 0, sizeof(STSearchRec)*fSearchTableSize);
} /* StoryTbl::clear_searchRecTbl */


#endif /* __STORYTBL__ */


/* $Log:           storytbl.h,v $
 * Revision 1.4  93/09/24  15:33:09  stephen
 * Performance-related revisions.
 *
 * Revision 1.3  93/06/03  23:16:55  stephen
 * Moved opening of StoryTbl.pfm into the application class.
 * This fixed a huge bug which cause the app to crash!
 *
 * Revision 1.2  93/05/31  18:23:25  stephen
 * Temporarily removed the ProgressDlog -- it was
 * bombing!
 *
 * Also, changed looping int to an unsigned short, to be more
 * compatible with Borland/Windows compiler...
 *
 * Revision 1.1  93/04/19  19:00:10  stephen
 * Initial revision
 *
 */
```

```
/***********************************************************************
        STRUCTS.CC
        Dramatica Basic Structure & Operation Subroutines
        (c) 1993 Screenplay Systems
        Authors:        S. Greenfield & C. Huntley
        Created:        January 24, 1993
        Revised:        $Id$
***********************************************************************

*/


#include <stdio.h>
#include <stdlib.h>                     /* for malloc() */
#include <string.h>

#include "genutls.h"

#include "structs.h"
#include "address.h"
#include "semtable.h"

/* -----------------------------------------------------------------------
        Once initialized by InitRefSC(), the RefSC is public to all functions
        but may not be modified.  Routines that perform operations on a struct
        of SuperClass type should have an assert that makes sure they aren't
        being passed the RefSC.
------------------------------------------------------------------------ */
SuperClass      *RefSC;

static void *tmpPtrArray[SIZES];

static size_t structSizeArray[SIZES] =
                        { sizeof(Unit), sizeof(Quad), sizeof(Set), sizeof(ChessSet), sizeof(SuperSet) };

static void ExchangeItems(AddrPtrStruct *aPtrs1, AddrPtrStruct *aPtrs2, int level, int ItemSize);
static void rotate4Items(AddrPtrStruct *aPtrs1, AddrPtrStruct *aPtrs2, AddrPtrStruct *aPtrs3, AddrPtrStruct *aPtrs4, int
level, int ItemSize);


/* -----------------------------------------------------------------------
        FUNCTION:       InitTempStructs
        Purpose:        Allocate memory for temporary data structures.  These are
                                kept around because they're used often.
------------------------------------------------------------------------ */
void InitTempStructs()
{
        RefSC = (SuperClass *)malloc(sizeof(SuperClass));

        tmpPtrArray[UNIT_SZ] = malloc(sizeof(Unit));
        tmpPtrArray[QUAD_SZ] = malloc(sizeof(Quad));
        tmpPtrArray[SET_SZ] = malloc(sizeof(Set));
        tmpPtrArray[CHESS_SZ] = malloc(sizeof(ChessSet));
        tmpPtrArray[SUPER_SZ] = malloc(sizeof(SuperSet));
}


/* -----------------------------------------------------------------------
        FUNCTION:       InitRefSC
        Purpose:        Given a ptr to a SuperClass structure, initialize it to the
                                desired values defined in the Semantic Table.
------------------------------------------------------------------------ */
void InitRefSC(SuperClass *theRefSC)
{
        int n;
        Unit    *theUnit;
        int             ItemSize;
        int             level;
        int     breakpoint = 340;

        memset(theRefSC,0,sizeof(SuperClass));

        for (n=1; n<=TOTAL_SEMANTIC_ITEMS; ++n) {
                theUnit = Addr2Item(theRefSC,(AddrPtr)SemTbl[n].addr);
                assert(theUnit->semVal == 0);
                theUnit->semVal = n;
                theUnit->homeClass = SEMTBL_CLASS(n);

                ItemSize = SEMTBL_ITEMSIZE(n);
                level = Addr2Level((AddrPtr)SemTbl[n].addr);
                if (ItemSize < level)
                /* avoid items that aren't part of quads! */
                        theUnit->theTKAD = Addr2QuadPos((AddrPtr)SemTbl[n].addr);
        }
}


/* -----------------------------------------------------------------------
        FUNCTION:       CopySC
        Purpose:        Given pointers to two SuperClass structures, copy specified
                                data members between the two.  You can copy more than one
                                data member by adding two or more enum constants together.
        Example:        CopySC(destSC, sourceSC, SC_PRCO+SC_SEMVAL);
        Note:           The Reference SuperClass is an illegal destination.
------------------------------------------------------------------------ */
void CopySC(SuperClass *destSC, SuperClass *sourceSC, int fields2Copy)
{
        Unit *destUnit, *sourceUnit;
        int n;
        short *searchTable;

        assert(destSC != RefSC);

        searchTable = InitSemanticFindTable(destSC);

        for (n=1; n<=TOTAL_SEMANTIC_ITEMS; ++n) {
                sourceUnit = Addr2Item(sourceSC,(AddrPtr)SemTbl[n].addr);
                destUnit = FindSemanticItem(destSC, sourceUnit->semVal, NULL, searchTable);

                if (fields2Copy & SC_PERSPECTIVE)
                        destSC->Perspective = sourceSC->Perspective;
```

```
            if (fields2Copy & SC_SEMVAL)
                    destUnit->semVal = sourceUnit->semVal;

            if (fields2Copy & SC_HOMECLASS)
                    destUnit->homeClass = sourceUnit->homeClass;

            if (fields2Copy & SC_TKAD)
                    destUnit->theTKAD = sourceUnit->theTKAD;

            if (fields2Copy & SC_PRCO)
                    destUnit->thePRCO = sourceUnit->thePRCO;

            if (fields2Copy & SC_1234)
                    destUnit->the1234 = sourceUnit->the1234;
        }
        DisposeSemanticFindTable(searchTable);
}


/* ------------------------------------------------------------------------
        FUNCTION:       FlipItems
        Purpose:        Given a ptr to a SuperClass structure and two addresses,
                                exchange the items.  Assumes an item of ItemSize.  If the
                                caller specifies withRelatives, then either children or parents
                                of the item are also moved.
        Accepts:        withRelatives: NO_CHILDREN, WITH_CHILDREN, WITH_PARENTS
        Note:           No address validation is done.  However, the ItemSize of
                                each address is checked to ensure they match.
------------------------------------------------------------------------ */
void FlipItems(SuperClass *theSC, AddrText addr1, AddrText addr2, int withRelatives)
{
        AddrPtrStruct aPtrs1, aPtrs2;
        int level;
        int ItemSize = ADDR_ITEMSIZE(addr1);

        assert(theSC != RefSC);

        asserts(addr1[ITEMSZ] == addr2[ITEMSZ],"\n\n*** FLIPITEMS: ItemSizes do not match between addr1 and
addr2***\n");
        asserts(!(withRelatives <NO_CHILDREN || withRelatives>WITH_PARENTS),"\n\n*** FLIPITEMS: withRelatives out of
range ***\n");

        Addr2Ptrs(theSC,addr1,&aPtrs1);
        Addr2Ptrs(theSC,addr2,&aPtrs2);

        asserts(aPtrs1.level == aPtrs2.level,"\n\n*** FLIPITEMS: levels do not match between addr1 and addr2***\n");

        level=aPtrs1.level-1;
        ExchangeItems(&aPtrs1,&aPtrs2,level,ItemSize);

        if (withRelatives == WITH_CHILDREN) {
                while (4-(++level))
                        ExchangeItems(&aPtrs1,&aPtrs2,level,++ItemSize);
        }
        else if (withRelatives == WITH_PARENTS) {
                while (ItemSize)
                        ExchangeItems(&aPtrs1,&aPtrs2,--level,--ItemSize);
        }
}


/* ------------------------------------------------------------------------
        FUNCTION:       RotateItems
        Purpose:        Given a ptr to a SuperClass structure, an address, and a
                                rotation pattern, move the items in the order requested.
                                Assumes an item of ItemSize.  If the caller specifies
                                withRelatives, then either children or parents of the
                                item are also moved.
        Accepts:        withRelatives: NO_CHILDREN, WITH_CHILDREN, WITH_PARENTS
        Method:         This high-level function preps the addresses for the low-
                                level function, Rotate4Addrs().
        Note:           No address validation is done.  However, the ItemSize of
                                each address is checked to ensure they match.
------------------------------------------------------------------------ */
void RotateItems(SuperClass *theSC, AddrPtr addr, char *zPattern, int withRelatives)
{
        AddrText addr1, addr2, addr3, addr4;
        int addr2Change;
        int quadPos = 0;

        assert(theSC != RefSC);

        asserts(!(withRelatives <NO_CHILDREN || withRelatives>WITH_PARENTS),"\n\n*** ROTATEITEMS: withRelatives out of
range ***\n");

        /* Build the four addresses for our exchanging operation! */

        strcpy(addr1,addr);
        strcpy(addr2,addr);
        strcpy(addr3,addr);
        strcpy(addr4,addr);

        addr2Change = Addr2TargetIndex(addr);                           /* change address slot level-1-Itemsize. */
        addr1[addr2Change] = zPattern[quadPos];                 /* stuff start point of "Z" in first addr */
        addr2[addr2Change] = zPattern[++quadPos];
        addr3[addr2Change] = zPattern[++quadPos];
        addr4[addr2Change] = zPattern[++quadPos];

        RotateAddrs(theSC, addr1, addr2, addr3, addr4, withRelatives);
}


/* ------------------------------------------------------------------------
        FUNCTION:       RotateAddrs
        Purpose:        Given a ptr to a SuperClass structure, and four addresses,
                                move the items in the order requested.
                                Assumes an item of ItemSize.  If the caller specifies
                                withRelatives, then either children or parents of the
                                item are also moved.
        Accepts:        withRelatives: NO_CHILDREN, WITH_CHILDREN, WITH_PARENTS
        Method:         This lower-level function is called by RotateItems() and
```

```
                                is also used in our Justification functions.
        Note:           Unlike RotateItems(), this function DOES NOT ASSUME that all
                                items are located in the same quad.  So long as the itemSizes
                                match, each address may be located anywhere -- including other
                                Classes.  This function was written so we can have an interface
                                that matches the FlipItems() function.
------------------------------------------------------------------------- */
void RotateAddrs(SuperClass *theSC, AddrPtr addr1, AddrPtr addr2, AddrPtr addr3, AddrPtr addr4, int withRelatives)
{
        AddrPtrStruct aPtrs1, aPtrs2, aPtrs3, aPtrs4;
        int level;
        int ItemSize = ADDR_ITEMSIZE(addr1);

        Addr2Ptrs(theSC,addr1,&aPtrs1);
        Addr2Ptrs(theSC,addr2,&aPtrs2);
        Addr2Ptrs(theSC,addr3,&aPtrs3);
        Addr2Ptrs(theSC,addr4,&aPtrs4);

        level=aPtrs1.level-1;
        rotate4Items(&aPtrs1, &aPtrs2, &aPtrs3, &aPtrs4, level, ItemSize);

        if (withRelatives == WITH_CHILDREN) {
                while (4-(++level))
                        rotate4Items(&aPtrs1, &aPtrs2, &aPtrs3, &aPtrs4, level, ++ItemSize);
        }
        else if (withRelatives == WITH_PARENTS) {
                while (ItemSize)
                        rotate4Items(&aPtrs1, &aPtrs2, &aPtrs3, &aPtrs4, --level, --ItemSize);
        }
}


/* ========================== S T A T I C S ========================== */


/* ----------------------------------------------------------------------
        FUNCTION:       ExchangeItems
        Purpose:        Exchange two items in a SuperClass.
        Accepts:        Two ptrs to AddrPtrStructs, a level and an ItemSize.
---------------------------------------------------------------------- */
static void ExchangeItems(AddrPtrStruct *aPtrs1, AddrPtrStruct *aPtrs2, int level, int ItemSize)
{
        void *tmpCopyStruct, *ptr1, *ptr2;
        size_t structSize = structSizeArray[ItemSize];

        asserts(!(ItemSize>=SIZES-1),"\n\n*** EXCHANGEITEMS: Can't exchange item of size ItemSize! ***\n");

        tmpCopyStruct = tmpPtrArray[ItemSize];                  /* get appropriate pointer to temp structure */
        ptr1=aPtrs1->itemPtrs[level][ItemSize];
        ptr2=aPtrs2->itemPtrs[level][ItemSize];

        asserts(ptr1 != ptr2,"\n\n*** EXCHANGEITEMS: attempt to exchange items at same address! ***\n");

        memcpy(tmpCopyStruct, ptr2, structSize);        /* save destination -> temp */
        memcpy(ptr2, ptr1, structSize);                                 /* source -> destination */
        memcpy(ptr1, tmpCopyStruct, structSize);        /* temp -> source */
}


/* ----------------------------------------------------------------------
        FUNCTION:       rotate4Items
        Purpose:        Rotate the 4 items.
        Accepts:        Four ptrs to AddrPtrStructs, a level and an ItemSize.
---------------------------------------------------------------------- */
static void rotate4Items(AddrPtrStruct *aPtrs1, AddrPtrStruct *aPtrs2, AddrPtrStruct *aPtrs3, AddrPtrStruct *aPtrs4, int
level, int ItemSize)
{
        void *tmpCopyStruct, *ptr1, *ptr2, *ptr3, *ptr4;
        size_t structSize=structSizeArray[ItemSize];

        asserts(!(ItemSize>=SIZES-1),"\n\n*** ROTATEITEMS: Can't rotate item of size ItemSize! ***\n");

        tmpCopyStruct = tmpPtrArray[ItemSize];                  /* get appropriate pointer to temp structure */
        ptr1 = aPtrs1->itemPtrs[level][ItemSize];
        ptr2 = aPtrs2->itemPtrs[level][ItemSize];
        ptr3 = aPtrs3->itemPtrs[level][ItemSize];
        ptr4 = aPtrs4->itemPtrs[level][ItemSize];

        asserts(ptr1 != ptr2,"\n\n*** ROTATEITEMS: attempt to rotate items at same address! ***\n");

        memcpy(tmpCopyStruct, ptr4, structSize);        /* save last unit -> temp */
        memcpy(ptr4, ptr3, structSize);                                 /* 3rd -> 4th */
        memcpy(ptr3, ptr2, structSize);                                 /* 2nd -> 3rd */
        memcpy(ptr2, ptr1, structSize);                                 /* 1rst -> 2nd */
        memcpy(ptr1,tmpCopyStruct, structSize);                 /* restore temp -> 1rst */
}


/* $Log:        structs.cc,v $
Revision 1.4  93/05/27  16:35:25  stephen
Get SuperClass* from Document class...

Revision 1.3  93/05/24  21:40:47  stephen
Converted LongJmp() into asserts().

Revision 1.2  93/04/06  19:42:54  stephen
 [JFirst General Revisions

Revision 1.1  93/03/31  22:43:29  stephen
Initial revision

 */
```

```
/* -----------------------------------------------------------------------
        STRUCTS.H
        Basic Dramatica Structures
        Copyright (C) 1993 Screenplay Systems Inc.
        Revised:        $Id: structs.h,v 1.3 93/05/27 16:35:57 stephen Exp Locker: stephen $
----------------------------------------------------------------------- */

#ifndef __STRUCTURES__
#define __STRUCTURES__


#ifndef TRUE
#define TRUE        1
#define FALSE       0
#endif

typedef char     AddrText[6];            /* storage for an address like "12340" */
typedef char *   AddrPtr;                          /* points to something like "12340" */
typedef  void*   pStruct;                          /* pointer to a Dramatica Structure */

typedef char     tkad_t;
typedef char     prco_t;
typedef char     one234_t;

enum { UNIT1, UNIT2, UNIT3, UNIT4 };                                        /* four position in a quad */
enum { CLASS, TYPE, VAR, ELEM, ALL_LEVELS=-1 };                    /* four LEVELS in the structure */
enum { CLASS_RES=1, TYPE_RES, VAR_RES, ELEM_RES };            /* 1-4, resolutions */
enum { CLASS_LEV=1, TYPE_LEV, VAR_LEV, ELEM_LEV };            /* 1-4, levels */
enum { UNIT_SZ, QUAD_SZ, SET_SZ, CHESS_SZ, SUPER_SZ };        /* four SIZES of items */
enum { NO_CHILDREN, WITH_CHILDREN, WITH_PARENTS };            /* options to FlipItems, RotateItems */

enum SC_FIELD_NAMES        { SC_ALLFIELDS=-1, SC_SEMVAL=1, SC_HOMECLASS=2, SC_TKAD=4, SC_PRCO=8, SC_1234=16,
SC_PERSPECTIVE=32 };

/* -----------------------------------------------------------------------
        TKAD: Atomic values or "natures" of a unit's position in a Quad.
----------------------------------------------------------------------- */
#define K_POS    '\001'                                  /* K (Knowledge) position in quad */
#define A_POS    '\002'                                  /* A (Ability) ... */
#define D_POS    '\003'                                  /* D (Desire) ... */
#define T_POS    '\004'                                  /* T (Thought) ... */

/* -----------------------------------------------------------------------
        PRCO: Spatial "natures" of a unit's position in a Quad.
----------------------------------------------------------------------- */
#define P_POS    '\001'                                  /* P (Potential) position in quad */
#define R_POS    '\002'                                  /* R (Resistence) ... */
#define C_POS    '\003'                                  /* C (Current) ... */
#define O_POS    '\004'                                  /* O (Output -- or 'Power') ... */

/* -----------------------------------------------------------------------
        1234: Temporal "natures" of a unit's position in a Quad.
----------------------------------------------------------------------- */
#define POS_1    '\001'                                  /* 1 (First) position in quad */
#define POS_2    '\002'                                  /* 2 (Second) ... */
#define POS_3    '\003'                                  /* 3 (Third) ... */
#define POS_4    '\004'                                  /* 4 (Fourth) ... */


/* -----------------------------------------------------------------------
        The Unit is the smallest possible item at a given level.
----------------------------------------------------------------------- */

typedef struct {
        short           semVal;         /* an index into semantic values table (thus the name) */
        char            homeClass;      /* class of this Unit in the Reference Superclass */
        tkad_t          theTKAD;        /* item's original position in a quad in the Reference Superclass */
        prco_t          thePRCO;        /* item's position in a quad after FIRST justification */
        one234_t        the1234;        /* item's position in a quad after SECOND justification */
} Unit;


/* -----------------------------------------------------------------------
        A Quad is made up of four Units.
----------------------------------------------------------------------- */

typedef struct {
        Unit     Item;                  /* info about this item */
        Unit     Units[4];              /* Each quad has four units */
} Quad;


/* -----------------------------------------------------------------------
        A Set contains four Quads.
----------------------------------------------------------------------- */

typedef struct {
        Unit     Item;                           /* info about this item */
        Quad     Quads[4];                       /* the four Quads that make up this set */
} Set;


/* -----------------------------------------------------------------------
        A ChessSet contains all the sets for the Element Level.
----------------------------------------------------------------------- */

typedef struct {
        Unit     Item;                           /* info about this item */
        Set             Sets[4];                          /* the four Sets that make up this ChessSet */
} ChessSet;


/* -----------------------------------------------------------------------
        A SuperSet contains all four Element Levels (ChessSets).
----------------------------------------------------------------------- */

typedef struct {
        Unit            Item;                             /* info about this item */
        ChessSet        ChessSets[4];            /* the four ChessSets that make up this SuperSet */
} SuperSet;

/* -----------------------------------------------------------------------
```

```
        These typedefs are for convenience, so we don't confuse our levels.
------------------------------------------------------------------------------ */

typedef  Unit              PerspectiveView;
typedef Quad               ClassLevel;
typedef Set                         TypeLevel;
typedef ChessSet  VariationLevel;
typedef  SuperSet          ElementLevel;


/* --------------------------------------------------------------------------
        The SuperClass is the basic structural unit of Dramatica.   It contains
        all four Classes and their Types, Variations and Elements.  A SuperClass
        is an entire working model for a story.
------------------------------------------------------------------------------ */

typedef struct {
        PerspectiveView         Perspective;      /* size 0 - Unit */
        ClassLevel                       Classes;                    /* size 1 - Quad */
        TypeLevel                        Types;                      /* size 2 - Set */
        VariationLevel          Variations;                /* size 3 - ChessSet */
        ElementLevel            Elements;                  /* size 4 - SuperSet */
} SuperClass;

extern   SuperClass        *RefSC;                 /* Defined external to write-protect structure */
// extern SuperClass *mySC, *just1SC, *just2SC, *myRefSC;


void InitTempStructs(void);
void InitRefSC(SuperClass *theRefSC);
void CopySC(SuperClass *destSC, SuperClass *sourceSC, int fields2Copy);
void FlipItems(SuperClass *theSC, AddrText addr1, AddrText addr2, int withRelatives);
void RotateItems(SuperClass *theSC, AddrPtr addr, char *zPattern, int withRelatives);
void RotateAddrs(SuperClass *theSC, AddrPtr addr1, AddrPtr addr2, AddrPtr addr3, AddrPtr addr4, int withRelatives);


#endif /* __STRUCTURES__ */


/* $Log:          structs.h,v $
 * Revision 1.3  93/05/27  16:35:57  stephen
 * Get SuperClass* from Document class...
 *
 * Revision 1.2  93/05/24  21:41:03  stephen
 * Converted LongJmp() into asserts().
 *
 * Revision 1.1  93/03/31  22:44:03  stephen
 * Initial revision
 *
 */
```

```
/*********************************************************************
        SUBTEXT.CC
        Handles the substitution of text
        (c) 1993 Screenplay Systems
        Authors:        S. Greenfield & C. Huntley
        Created:        May 5, 1993
        Revised:        $Id$
*********************************************************************

NOTE: these functions can be substantially optimized by combining many
of the functions into one calling body.  (like SDF, SLD, etc.)

*/

#include <ctype.h>
#include "dramatic.h"
#include "document.h"
#include "structs.h"
#include "semtable.h"
#include "stelling.h"
#include "subtext.h"

#pragma segment subtext


static char* kNotDefined   = "an unchosen item";
static char* kMultDefined  = "a multiply defined item";

static char* kBoldOn       = "«B+»";
static char* kBoldOff      = "«B-»";

static char* kItalicOn     = "«I+»";
static char* kItalicOff    = "«I->";

/* ------------------------------------------------Stephen---04/27/93---
        SubText::SubText
------------------------------------------------------------------------ */
SubText::SubText(DRDoc* theDoc, char* theText, byte_cnt length)
        : fDoc (theDoc),
                fInText (theText),
                fStrLength (length),
                fLVRBPT (0),
                fOut (0),
                fSemValTrackList (NULL)
{
        assert(fDoc);

        if (length == 0)
                fStrLength = strlen(theText);

        fAllocLength       = fStrLength+50;
        fOutTextMemHdl     = MM_ALLOC_INIT(fAllocLength, mm_no_flags, 0, "SubText::fOutTextMemHdl", this);
        fOutText                   = (char*)MM_USE(fOutTextMemHdl);

        fApp                       = (Dramatica*)(AP_Data()->fApp);
        fAppPFMFile                = fApp->GetPFMFile();
        fPNounPT                   = fApp->GetPNouns();

        fResponsePT                = fDoc->GetRESP();
        fStellingPT        = fDoc->GetSTEL();
} /* SubText::SubText */


/* ------------------------------------------------Stephen---04/27/93---
        SubText::~SubText
------------------------------------------------------------------------ */
SubText::~SubText(void)
{
        MM_UNUSE(fOutTextMemHdl);
        MMFree(fOutTextMemHdl);
        delete fLVRBPT;
}


/* ------------------------------------------------Stephen---04/27/93---
        SubText::ResizeHdl
------------------------------------------------------------------------ */
void SubText::ResizeHdl(byte_cnt bytesToAdd)
{
        fAllocLength += bytesToAdd;
        MM_UNUSE(fOutTextMemHdl);
        MMRealloc(fOutTextMemHdl, fAllocLength);
        fOutText = (char*)MM_USE(fOutTextMemHdl);
}


/* ------------------------------------------------Stephen---04/27/93---
        SubText::DoSubstitution
------------------------------------------------------------------------ */
char* SubText::DoSubstitution(byte_cnt* newLength)
{


        char*           cp = fInText;
        int             ch;
        byte_cnt        n = 0;

        while (n <= fStrLength) {
                ch = cp[n];
                if (ch == '(')     {                       // mark start of substitution
                        n = interpret(n);
                        continue;
                } else {
                        if (fOut >= fAllocLength)
                                ResizeHdl(50);
                        fOutText[fOut++] = ch;
                        ++n;
                }
        }

        assert(fOut <= fAllocLength);
```

```
        if (fOut == fAllocLength)
                ResizeHdl(1);
        fOutText[fOut] = 0;
        if (newLength)
                *newLength = fOut;
        return (fOutText);
} /* SubText::DoSubstitution */


/* ------------------------------------------------------------------------
        SubText::TrackingOn - Turns on semVal tracking.  This is a recording
        mechanism that builds a list of unique semVals (shorts) used by this
        instance of the SubText.  The idea is that the caller can then build
        an index of which terms were used.
------------------------------------------------------------------------- */
void SubText::TrackingOn(SList* theList)
{
        assert(fSemValTrackList == NULL);
        fSemValTrackList = theList;

} /* SubText::TrackingOn */


/* ------------------------------------------------------------------------
        SubText::TrackingOff - Turns off semVal tracking.  The list is sorted
        alphabetically by the semVal's name.
------------------------------------------------------------------------- */
void SubText::TrackingOff(void)
{
        assert(fSemValTrackList);
        fSemValTrackList->Sort(CompSemValName);

        fSemValTrackList = NULL;

} /* SubText::TrackingOff */


/* ------------------------------------------------------------------------
        SubText::TrackSemVal - adds a semVal to the list of semVals we're
        tracking.
------------------------------------------------------------------------- */
void SubText::TrackSemVal(short semVal)
{
        assert(fSemValTrackList);
        if (semVal > 0) {
                if (semVal >=START_OF_ELEMENTS && semVal < 1000)                        // If it's an element,
force it to be normalized so we don't have duplications of elements from differents universes
                        semVal = SEMELEM_LIMIT_TO_148(semVal);
                bool_t found;
                ls_index row = fSemValTrackList->MergeFind(semVal, &found);
                if (!found) {
                        err_t theErr =  fSemValTrackList->Insert(semVal, row);
                        assert(theErr == NOERR);
                        fSemValTrackList->ForceSorted();
                }
        }

} /* SubText::TrackSemVal */


/* ------------------------------------------------------------------------
        CompSemValName - comparison proc for sorting keys into ascending order.
------------------------------------------------------------------------- */
int CompSemValName(const void* pSemVal, const void* pElem)
{
        short keySemVal = *(short*)pSemVal;
        short elemSemVal = *(short*)pElem;
        char* keyName = (keySemVal < 1000) ? SEMTBL_NAME(keySemVal) : ApprName(keySemVal);
        char* elemName = (elemSemVal < 1000) ? SEMTBL_NAME(elemSemVal) : ApprName(elemSemVal);
        int result = (strcmp(keyName, elemName));
        if (result < 0)
                return GN_LESS;
        else if (result == 0)
                return GN_EQUAL;
        else
                return GN_GREATER;

} /* CompSemValName */


typedef struct {
        char*                   name;
} funcTableType;

funcTableType funcTable[] =
{
        { "CNN" },                      //      Character Noun (Character's name)
        { "SNF" },                      //      Semantic Name Function * (SEMTBL_NAME, ApprName)
        { "SDF" },                      //      Sematic Definition Function ("SDEF")
        { "SLD" },                      //      Semantic Long Definition ("LDEF")
        { "SNN" },                      //      Semantic Noun Function * ("SNNS")
        { "SVB" },                      //      Semantic Verb * ("SVRB", "LVRB")
        { "PPN" },                      //      Personal Pronoun ("PPNN")
        { "SDI" },                      //      Story Document Info ("SDOC")
        { "STF" },                      //      Storytelling Text Function ** ("STEL")
        { "QQE" },                      //      Query Question ("DQQE")
        { "QBG" },                      //      Query Background ("DQBG")
        { "QST" },                      //      Query Storytelling ("DQST")
        { "QDU" },                      //      Query Dramatica Usage ("DQDU")
        { "APD" },                      //      Appreciation Definition ("APPR": "\DF")
        { "GDO" },                      //      Genre Domain (STEL:"GDomain")
        { "SPN" },                      //      Semantic Plural Noun Function * ("SNPL")
        { "SYN" }                       //      Synonyms ("SYNS")
#if 0
        { "ASV" }                       //      Appreciation SemVal ("APPR")
        { "ASV" }                       //      Appreciation SemVal ("APPR")
#endif
};

#define  TOTAL_SUBTEXT_FUNCS        17
```

```
/* -------------------------------------------------------Stephen---04/27/93---
        SubText::interpret
        PURPOSE:            Handles substitution of specific parameters.
        RETURNS:            points to first char after interpreted text.  The
                                    substituted text is stuffed into the buffer.
-------------------------------------------------------------------------- */
byte_cnt SubText::interpret(byte_cnt bracketStart)
{
        byte_cnt            n = bracketStart;
        byte_cnt            bracketEnd;
        byte_cnt            functionLength;
        char*               cp = fInText;
        int                         ch;                                                     // This is an int for
speed!
        char                paramTbl[5][20];                    // char table for the tokenize variable names stored here
        short               nmParams = 0;                                // Number of params
        byte_cnt            parenStart = 0;
        byte_cnt            parenEnd = 0;
        char                functName[10];
        byte_cnt            FNLen;

        //          Scan for end of substitution text

        while ((ch = cp[++n]) != 0 ) {

                if (ch == ']') {
                        bracketEnd = n;
                        functionLength = (bracketEnd-bracketStart)-1;
                        break;
                }
                else if (ch == '(')
                        parenStart = n;
                else if (ch == ')')
                        parenEnd = n;
        }

        //          Extract function name.

        if (parenStart) {
                assert(parenEnd);
                FNLen = (parenStart-bracketStart)-1;
        } else
                FNLen = (bracketEnd-bracketStart)-1;

        assert(FNLen>0 && FNLen<10);
        strncpy(functName, &cp[bracketStart+1], FNLen);
        functName[FNLen] = 0;

        //          Tokenize the function's parameters

        if (parenStart && parenEnd) {
                cp = fInText;
                n = parenStart;
                nmParams            = 0;
                short       x       = 0;
                while (++n < parenEnd) {                        // Scan thru to entire list
                        ch = cp[n];
                        if (ch == ',') {
                                paramTbl[nmParams][x] = 0;          // tag on null
                                ++nmParams;                                         // Next param slot
                                x = 0;                                              // start at begining of next
param slot
                        }
                        else paramTbl[nmParams][x++] = ch;  // not comma, so add char to param name
                }
                paramTbl[nmParams][x] = 0;                          // tag on null
                ++nmParams;
        }

        //          Call the right functions with the right parameters

        short matchedFunction = 0;
        for (n=0; n<TOTAL_SUBTEXT_FUNCS; ++n) {
                matchedFunction = strcmp(functName, funcTable[n].name);
                if (matchedFunction == 0) {
                        assert(nmParams);
                        switch (n) {
                          case 0:           CNN(paramTbl[0], paramTbl[1]);
                                                    break;
                          case 1:           SNF(paramTbl[0]);
                                                    break;
                          case 2:           SDF(paramTbl[0]);
                                                    break;
                          case 3:           SLD(paramTbl[0]);
                                                    break;
                          case 4:           SNN(paramTbl[0]);
                                                    break;
                          case 5:           SVB(paramTbl[0], paramTbl[1], paramTbl[2]);
                                                    break;
                          case 6:           PPN(paramTbl[0], paramTbl[1]);
                                                    break;
                          case 7:           SDI(paramTbl[0]);
                                                    break;
                          case 8:           STF(paramTbl[0]);
                                                    break;
                          case 9:           QQE(paramTbl[0]);
                                                    break;
                          case 10:          QBG(paramTbl[0]);
                                                    break;
                          case 11:          QST(paramTbl[0]);
                                                    break;
                          case 12:          QDU(paramTbl[0]);
                                                    break;
                          case 13:          APD(paramTbl[0]);
                                                    break;
                          case 14:          GDO(paramTbl[0], paramTbl[1], paramTbl[2]);
                                                    break;
                          case 15:          SPN(paramTbl[0]);
                                                    break;
                          case 16:          SYN(paramTbl[0]);
                                                    break;
                        }
                        return (bracketEnd+1);
```

```
		}
	}
	//	Token was not interpretable.  Pass the entire text back.

	memcpy(&fOutText[fOut], &fInText[bracketStart], functionLength+2);
	fOut += functionLength+2;
	assert(fOut < fAllocLength);
	return (bracketEnd+1);
}


/* -------------------------------------------------Stephen---04/27/93---
	SubText::CNN
	PURPOSE:		Character Noun Function.
	RETURNS:
------------------------------------------------------------------------- */
void SubText::CNN(char* param1, char* param2)
{
	char	charName[30];
	short	whichChar = 0;
	PText*	charPT;

	assert(param1);
	assert(param2);

	if (isdigit(param1[0])) {
		whichChar		= atoi(param1);
		charPT		= fDoc->GetCharPT(whichChar);
	}
	else {
		if (param1[0] == 'M')
			charPT = fDoc->GetMainCharPT();
		else if (param1[0] == 'O')
			charPT = fDoc->GetObstacleCharPT();
		else {
			assert(false);
		}
	}
	assert(charPT);
	charPT->GetParam(param2, 'c', charName);		// PERHAPS COULD USE "SHORT NAME", and save time?

	transfer_data(charName);
} /* SubText::CNN */


/* -------------------------------------------------Stephen---04/27/93---
	SubText::SNF
	PURPOSE:		Semantic Name Function.
	RETURNS:
------------------------------------------------------------------------- */
void SubText::SNF(char* param1)
{
	char		tempStr[50];
	semval_t		semVal = 0;

	assert(param1);

	if (isdigit(param1[0]))
		semVal = atoi(param1);
	else {
		appr_index_t apprIndex = VarToApprIndex(param1);
		semVal = fDoc->GetApprValByIndex(apprIndex);
	}

	strcpy(tempStr, kBoldOn);

	if (semVal == 0)						// Test special case for "0"...
		strcat(tempStr, kNotDefined);
	else if (semVal == -1)
		strcat(tempStr, kMultDefined);			// ...and -1
	else if (semVal < 1000)
		strcat(tempStr, SEMTBL_NAME(semVal));
	else
		strcat(tempStr, ApprName(semVal));

	strcat(tempStr, kBoldOff);

	transfer_data(tempStr);

	if (fSemValTrackList)
		TrackSemVal(semVal);

} /* SubText::SNF */


/* -------------------------------------------------Stephen---04/27/93---
	SubText::SDF
	PURPOSE:		Semantic Definition Function.
	RETURNS:
------------------------------------------------------------------------- */
void SubText::SDF(char* param1)
{
	semval_t		semVal = 0;
	pt_err		theErr;

	assert(param1);

	if (isdigit(param1[0]))
		semVal = atoi(param1);
	else {
		appr_index_t apprIndex = VarToApprIndex(param1);
		semVal = fDoc->GetApprValByIndex(apprIndex);
	}

	if (semVal == 0) {
		transfer_data(kNotDefined);
		return;
	}
	else if (semVal == -1) {
		transfer_data(kMultDefined);
		return;
```

```
	}
	assert(semVal > 0);

	if (semVal >=START_OF_ELEMENTS && semVal < 1000)
		semVal = SEMELEM_LIMIT_TO_148(semVal);

	PFMPushCurrentFile(fAppPFMFile);
	hdl_t DefSegHdl = (hdl_t) PFMCheckoutSeg(_OSType("SDEF"), semVal);
	assert(DefSegHdl);
	char* DefSegPtr = (char *)MM_USE(DefSegHdl);

	transfer_data(DefSegPtr);

	MM_UNUSE(DefSegHdl);
	theErr = PFMCheckinSeg(DefSegHdl);
	assert(theErr == noerr);
	PFMPopCurrentFile();

	if (fSemValTrackList)
		TrackSemVal(semVal);

} /* SubText::SDF */


/* ------------------------------------------------------------------------
	SubText::SLD
	PURPOSE:		Semantic Long Definition Function.
------------------------------------------------------------------------ */
void SubText::SLD(char* param1)
{
	short			semVal = 0;
	pt_err			theErr;

	assert(param1);

	if (isdigit(param1[0]))
		semVal = atoi(param1);
	else {
		appr_index_t apprIndex = VarToApprIndex(param1);
		semVal = fDoc->GetApprValByIndex(apprIndex);
	}

	if (semVal < 1) {
		if (semVal == 0)						// Test special case
for "0"...
			transfer_data(kNotDefined);
		else if (semVal == -1)
			transfer_data(kMultDefined);			// ...and -1
		return;
	}

	if (semVal >=START_OF_ELEMENTS && semVal < 1000)
		semVal = SEMELEM_LIMIT_TO_148(semVal);

	PFMPushCurrentFile(fAppPFMFile);
	hdl_t DefSegHdl = (hdl_t) PFMCheckoutSeg(_OSType("LDEF"), semVal);
	assert(DefSegHdl);
	char* DefSegPtr = (char *)MM_USE(DefSegHdl);

	transfer_data(DefSegPtr);

	MM_UNUSE(DefSegHdl);
	theErr = PFMCheckinSeg(DefSegHdl);
	assert(theErr == noerr);
	PFMPopCurrentFile();

} /* SubText::SLD */


/* ------------------------------------------------------------------------
	SubText::SYN
	PURPOSE:		Synonym Function.
------------------------------------------------------------------------ */
void SubText::SYN(char* param1)
{
	short			semVal = 0;
	pt_err			theErr;

	assert(param1);

	if (isdigit(param1[0]))
		semVal = atoi(param1);
	else {
		appr_index_t apprIndex = VarToApprIndex(param1);
		semVal = fDoc->GetApprValByIndex(apprIndex);
	}

	if (semVal < 1) {
		if (semVal == 0)						// Test special case
for "0"...
			transfer_data(kNotDefined);
		else if (semVal == -1)
			transfer_data(kMultDefined);			// ...and -1
		return;
	}

	if (semVal >=START_OF_ELEMENTS && semVal < 1000)
		semVal = SEMELEM_LIMIT_TO_148(semVal);

	PFMPushCurrentFile(fAppPFMFile);
	hdl_t SynSegHdl = (hdl_t) PFMCheckoutSeg(_OSType("SYNS"), semVal);
	if (SynSegHdl) {
		char* SynSegPtr = (char *)MM_USE(SynSegHdl);
		transfer_data(SynSegPtr);
	}

	MM_UNUSE(SynSegHdl);
	theErr = PFMCheckinSeg(SynSegHdl);
	assert(theErr == noerr);
	PFMPopCurrentFile();

} /* SubText::SYN */
```

```
/* ---------------------------------------------------Chris---05/30/93---
        SubText::SNN
        PURPOSE:        Semantic Noun Function.
        RETURNS:
------------------------------------------------------------------------- */
void SubText::SNN(char* param1)
{
        semval_t        semVal = 0;
        pt_err          theErr;

        assert(param1);

        if (isdigit(param1[0]))
                semVal = atoi(param1);
        else {
                appr_index_t apprIndex = VarToApprIndex(param1);
                semVal = fDoc->GetApprValByIndex(apprIndex);
        }

        if (semVal < 1) {
                if (semVal == 0)                                        // Test special case
for "0"...
                        transfer_data(kNotDefined);
                else if (semVal == -1)
                        transfer_data(kMultDefined);                   // ...and -1
                return;
        }

        if (semVal >=START_OF_ELEMENTS && semVal < 1000)
                semVal = SEMELEM_LIMIT_TO_148(semVal);

        PFMPushCurrentFile(fAppPFMFile);
        hdl_t DefSegHdl = (hdl_t) PFMCheckoutSeg(_OSType("SNNS"), semVal);
        assert(DefSegHdl);
        char* DefSegPtr = (char *)MM_USE(DefSegHdl);

        transfer_data(kBoldOn);
        transfer_data(DefSegPtr);
        transfer_data(kBoldOff);

        MM_UNUSE(DefSegHdl);
        theErr = PFMCheckinSeg(DefSegHdl);
        assert(theErr == noerr);
        PFMPopCurrentFile();

        if (fSemValTrackList)
                TrackSemVal(semVal);

} /* SubText::SNN */


/* ---------------------------------------------------Chris---04/10/94---
        SubText::SPN
        PURPOSE:        Semantic Plural Noun Function.
        RETURNS:
------------------------------------------------------------------------- */
void SubText::SPN(char* param1)
{
        semval_t        semVal = 0;
        pt_err          theErr;

        assert(param1);

        if (isdigit(param1[0]))
                semVal = atoi(param1);
        else {
                appr_index_t apprIndex = VarToApprIndex(param1);
                semVal = fDoc->GetApprValByIndex(apprIndex);
        }

        if (semVal < 1) {
                transfer_data(kBoldOn);
                if (semVal == 0)                                        // Test special case
for "0"...
                        transfer_data(kNotDefined);
                else if (semVal == -1)
                        transfer_data(kMultDefined);                   // ...and -1
                transfer_data(kBoldOff);
                return;
        }

        if (semVal >=START_OF_ELEMENTS && semVal < 1000)
                semVal = SEMELEM_LIMIT_TO_148(semVal);

        PFMPushCurrentFile(fAppPFMFile);
        hdl_t DefSegHdl = (hdl_t) PFMCheckoutSeg(_OSType("SNPL"), semVal);
        assert(DefSegHdl);
        char* DefSegPtr = (char *)MM_USE(DefSegHdl);

        transfer_data(kBoldOn);
        transfer_data(DefSegPtr);
        transfer_data(kBoldOff);

        MM_UNUSE(DefSegHdl);
        theErr = PFMCheckinSeg(DefSegHdl);
        assert(theErr == noerr);
        PFMPopCurrentFile();

        if (fSemValTrackList)
                TrackSemVal(semVal);

} /* SubText::SPN */


/* ---------------------------------------------------Stephen---04/27/93---
        SubText::SVB
        PURPOSE:        Semantic Verb Function.
        RETURNS:
------------------------------------------------------------------------- */
void SubText::SVB(char* formParam, char* semName, char* tense)
```

```
{
	const short kVerbMaxLen		= 100;
	char			verbTense[kVerbMaxLen];
	char			verbBase[kVerbMaxLen];
	char			linkingVerb[kVerbMaxLen];
	char*			linkingTense;
	pt_err			theErr;
	short			form = 1;				// Singular (1) or plural (>1)
	short			person = 3;				// 1, 2, or 3
	short			gender = 0;				// 0 = 'M', 1 = 'F', or 3 = 'N'
	semval_t		semVal = 0;

	assert(formParam);
	assert(semName);
	assert(tense);

	/*******************************************************************
		formParam is one of three things:
			1)	'S' or 'P', for Singluar or Plural;
			2)	"MC" or "OC" for Main or Obstacle character
			3)	A number, representing the ID of the character
	*******************************************************************/

	short whichChar;
	if (!isdigit(formParam[0])) {
		if (formParam[0] == 'S')
			form = 1;
		else if (formParam[0] == 'P')
			form = 2;
		else {
			if (formParam[0] == 'M')
				whichChar = fDoc->GetMainCharID();
			else if (formParam[0] == 'O')
				whichChar = fDoc->GetObstacleCharID();
			else {
				asserts(false, "SVB passed a bad form");
			}
			GetFormSex(whichChar, &gender, &form);
		}
	}
	else {
		whichChar = atoi(formParam);
		GetFormSex(whichChar, &gender, &form);
	}
	assert(form > 0 && form <= 2);

	//	Get which semantic item we're trying to conjugate

	if (isdigit(semName[0]))
		semVal = atoi(semName);
	else {
		appr_index_t apprIndex = VarToApprIndex(semName);
		semVal = fDoc->GetApprValByIndex(apprIndex);
	}

	if (semVal < 1) {
		transfer_data(kBoldOn);
		if (semVal == 0)									// Test special case
for "0"...
			transfer_data(kNotDefined);
		else if (semVal == -1)
			transfer_data(kMultDefined);						// ...and -1
		transfer_data(kBoldOff);
		return;
	}

	if (semVal >=START_OF_ELEMENTS)
		semVal = SEMELEM_LIMIT_TO_148(semVal);

	PText* SvrbPT = new PText(fAppPFMFile, _OSType("SVRB"), semVal, &theErr, kRdOnly);
	assert(theErr != kNoSuchPFMSeg);

	SvrbPT->GetParam("B", 'c', verbBase);
	if (verbBase[0] == '*') {
		if (!fLVRBPT) {
			fLVRBPT = new PText(fAppPFMFile, _OSType("LVRB"), 1, &theErr, kRdOnly);
			assert(theErr != kNoSuchPFMSeg);
		}
		//	REPLACE THIS BOGUS STUFF ONCE CHRIS CHANGES NAMES OF FORMS
		if (strcmp(tense, "INF") == 0)
			linkingTense = (form == 1) ? "I5" : "I6";

		else if (strcmp(tense, "PTG") == 0)
			linkingTense = (form == 1) ? "P5" : "P6";

		else if (strcmp(tense, "PT3") == 0)
			linkingTense = (form == 1) ? "P5" : "P6";

		else if (strcmp(tense, "PAST") == 0)
			linkingTense = (form == 1) ? "X5" : "X6";

		else if (strcmp(tense, "PRESP") == 0)
			linkingTense = (form == 1) ? "Y5" : "Y6";

		else if (strcmp(tense, "PASTP") == 0)
			linkingTense = (form == 1) ? "Z5" : "Z6";

		fLVRBPT->GetParam(linkingTense, 'c', linkingVerb);
		strcat(linkingVerb, &verbBase[1]);
		strcpy(verbBase, linkingVerb);

	} else {
		SvrbPT->GetParam(tense, 'c', verbTense);
		strcat(verbBase, verbTense);
	}

	transfer_data(kBoldOn);
	transfer_data(verbBase);
	transfer_data(kBoldOff);

	if (fSemValTrackList)
		TrackSemVal(semVal);
```

```
        delete SvrbPT;
} /* SubText::SVB */

/* -------------------------------------------------Stephen---04/27/93---
        SubText::PPN
        PURPOSE:            Personal Pronoun Function.
        RETURNS:
------------------------------------------------------------------------ */
void SubText::PPN(char* param1, char* tense)
{
        assert(param1);
        assert(tense);

        char      tempStr[20];
        char      whichPNoun[6];
        short     form;                          // Singular (1) or plural (>1)
        short     person = 3;                    // 1, 2, or 3
        short     gender;                        // 0 = 'M', 1 = 'F', or 2 = 'N'
        short     whichChar;

        if (!isdigit(param1[0])) {
                if (param1[0] == 'M')
                        whichChar = fDoc->GetMainCharID();
                else if (param1[0] == 'O')
                        whichChar = fDoc->GetObstacleCharID();
                else {
                        assert(false);
                }
        }
        else whichChar = atoi(param1);

        GetFormSex(whichChar, &gender, &form);
        assert(form >= 1);
        assert(person >=1 && person <=3);
        assert(gender >= 0 && gender <=2);
        assert(strlen(tense) <= 2);

        whichPNoun[0] = (form == 1) ? 'S' : 'P';
        whichPNoun[1] = person + '0';
        whichPNoun[2] = gender + '0';
        whichPNoun[3] = tense[0];
        whichPNoun[4] = tense[1];
        whichPNoun[5] = 0;

        fPNounPT->GetParam(whichPNoun, 'c', tempStr);

        transfer_data(tempStr);
}


/* -------------------------------------------------Stephen---04/27/93---
        SubText::SDI
        PURPOSE:            Story Document Information Function.
        RETURNS:
------------------------------------------------------------------------ */
void SubText::SDI(char* param1)
{
        char      storyTitle[60];
        short     whichChar = 0;

        assert(param1);
        storyTitle[0] = 0;

        PText*    storyDocPT        = fDoc->GetSDOC();
        assert(storyDocPT);
        storyDocPT->GetParam(param1, 'c', storyTitle);

        transfer_data(storyTitle);
}


/* -------------------------------------------------Stephen---04/27/93---
        SubText::STF
        PURPOSE:            Storytelling Text Function.
        RETURNS:
------------------------------------------------------------------------ */
void SubText::STF(char* param1)
{
        char      tempStr[kMaxStellSize+10];

        assert(param1);
        tempStr[0] = 0;
        fStellingPT->GetParam(param1, 'c', tempStr);

        transfer_data(kItalicOn);
        transfer_data(tempStr);
        transfer_data(kItalicOff);

} /* SubText::STF */

/* -------------------------------------------------Chris---07/28/93---
        SubText::QQE
        PURPOSE:            Query Question (for DQS).
        RETURNS:
------------------------------------------------------------------------ */
void SubText::QQE(char* param1)
{
        short               theItem = 0;
        pt_err              theErr;

        assert(param1);

        if (isdigit(param1[0]))
                theItem = atoi(param1);

        PFMPushCurrentFile(fAppPFMFile);
        hdl_t DefSegHdl = (hdl_t) PFMCheckoutSeg(_OSType("DQQE"), theItem);
        assert(DefSegHdl);
        char* DefSegPtr = (char *)MM_USE(DefSegHdl);
```

```
        transfer_data(DefSegPtr);

        MM_UNUSE(DefSegHdl);
        theErr = PFMCheckinSeg(DefSegHdl);
        assert(theErr == noerr);
        PFMPopCurrentFile();

}


/* -----------------------------------------------Chris---07/28/93---
        SubText::QBG
        PURPOSE:        Query Background Info (for DQS).
        RETURNS:
---------------------------------------------------------------------- */
void SubText::QBG(char* param1)
{
        short           theItem = 0;
        pt_err          theErr;

        assert(param1);

        if (isdigit(param1[0]))
                theItem = atoi(param1);

        PFMPushCurrentFile(fAppPFMFile);
        hdl_t DefSegHdl = (hdl_t) PFMCheckoutSeg(_OSType("DQBG"), theItem);
        assert(DefSegHdl);
        char* DefSegPtr = (char *)MM_USE(DefSegHdl);

        transfer_data(DefSegPtr);

        MM_UNUSE(DefSegHdl);
        theErr = PFMCheckinSeg(DefSegHdl);
        assert(theErr == noerr);
        PFMPopCurrentFile();

}


/* -----------------------------------------------Chris---07/28/93---
        SubText::QST
        PURPOSE:        Query Storytelling Info (for DQS).
        RETURNS:
---------------------------------------------------------------------- */
void SubText::QST(char* param1)
{
        short           theItem = 0;
        pt_err          theErr;

        assert(param1);

        if (isdigit(param1[0]))
                theItem = atoi(param1);

        PFMPushCurrentFile(fAppPFMFile);
        hdl_t DefSegHdl = (hdl_t) PFMCheckoutSeg(_OSType("DQST"), theItem);
        assert(DefSegHdl);
        char* DefSegPtr = (char *)MM_USE(DefSegHdl);

        transfer_data(DefSegPtr);

        MM_UNUSE(DefSegHdl);
        theErr = PFMCheckinSeg(DefSegHdl);
        assert(theErr == noerr);
        PFMPopCurrentFile();

}


/* -----------------------------------------------Chris---07/28/93---
        SubText::QDU
        PURPOSE:        Query Dramatica Usage Info (for DQS).
        RETURNS:
---------------------------------------------------------------------- */
void SubText::QDU(char* param1)
{
        short           theItem = 0;
        pt_err          theErr;

        assert(param1);

        if (isdigit(param1[0]))
                theItem = atoi(param1);

        PFMPushCurrentFile(fAppPFMFile);
        hdl_t DefSegHdl = (hdl_t) PFMCheckoutSeg(_OSType("DQDU"), theItem);
        assert(DefSegHdl);
        char* DefSegPtr = (char *)MM_USE(DefSegHdl);

        transfer_data(DefSegPtr);

        MM_UNUSE(DefSegHdl);
        theErr = PFMCheckinSeg(DefSegHdl);
        assert(theErr == noerr);
        PFMPopCurrentFile();

}

/* ------------------------------------------------------------------
        SubText::GDO
        PURPOSE:        Substitute Genre Domain Text
---------------------------------------------------------------------- */
void SubText::GDO(char* prefixText, char* postFixText, char* undefinedText)
{
        short whichGDomain = 0;

        fStellingPT->GetParam("GDomain", 's', &whichGDomain);
```

```
        if (whichGDomain == 0) {
                transfer_data(undefinedText);
        }
        else {
                transfer_data(prefixText);
                switch (whichGDomain) {
                        case 1:  transfer_data("the Events that effect people");
                                        break;
                        case 2:  transfer_data("the Relationships between people");
                                        break;
                        case 3:  transfer_data("what it feels like to be a certain kind of person");
                                        break;
                        case 4:  transfer_data("an exploration of a certain kind of person");
                                        break;
                }
                transfer_data(postFixText);
        }
} /* SubText::GDO */

/* -------------------------------------------------Chris---07/28/93---
        SubText::APD
        PURPOSE:        Appreciation Definition.
        RETURNS:
------------------------------------------------------------------------ */
void SubText::APD(char* param1)
{
        short           theItem = 0;

        assert(param1);

        if (isdigit(param1[0]))
                theItem = atoi(param1);

        pt_err theErr;
        char theText[250];
        theText[0] = 0;
        PText* ApprPT = new PText(fAppPFMFile, _OSType("APPR"), theItem, &theErr, kRdOnly);        // Grab APPR segment
from .pfm file
        assert((theItem == 0) || ((theItem!=0) && (theErr != kNoSuchPFMSeg)));

        if (theErr == kNoSuchPFMSeg) {
                ApprPT->GetParam("DF", 'c', theText);
                transfer_data(theText);
        }
        else transfer_data(kNotDefined);
} /* SubText::APD */

/* -------------------------------------------------Stephen---04/27/93---
        SubText::GetFormSex
        PURPOSE:        Gets character-related info needed by subtext functions.
        RETURNS:        The gender & form.
------------------------------------------------------------------------ */
void SubText::GetFormSex(short whichChar, short* gender, short* form)
{
        CharInfoRec charInfo;
        fDoc->GetCharInfoRec(whichChar, &charInfo);
        *gender = charInfo.sex;
        *form   = charInfo.form;
} /* SubText::GetFormSex */

/* ----------------------------------------------------------------------
        SubText::transfer_data
        PURPOSE:        Essentially code which all substitution functions call
------------------------------------------------------------------------ */
void SubText::transfer_data(char* theTextToXfr)
{
        short length = strlen(theTextToXfr);
        if (fOut+length >= fAllocLength)
                ResizeHdl(length);
        memcpy(&fOutText[fOut], theTextToXfr, length);
        fOut += length;
        assert(fOut <= fAllocLength);
}

#pragma segment main

/* $Log:        subtext.cc,v $
Revision 1.21  93/09/24  15:33:12  stephen
Cleaned up warnings.

Revision 1.20  93/07/28  12:43:34  chris
Added four DQS subtext functions: QQE, QBG, QST, and QDU.

Revision 1.19  93/06/03  10:58:35  chris
Added the Storytelling Text Function (STF).

Revision 1.18  93/06/02  20:53:32  stephen
Fixed bug with Subtext asserting on fOut < fAllocLength.

Revision 1.17  93/06/01  09:28:39  chris
Set the storyName string [0] to 0 in SDI function.

Revision 1.16  93/05/31  21:28:19  chris
Added SDI function "Story Document Information".

Revision 1.15  93/05/30  18:20:56  chris
Added SNN function for noun items.

Revision 1.14  93/05/26  19:48:06  stephen
Windows fixes.

Revision 1.13  93/05/25  15:11:32  stephen
Fixed allocation bug!  Used memcpy instead of strncat, which was
screwing up because it was appending to a non-initialized string.

Revision 1.12  93/05/21  22:08:32  stephen
Working on Chris' outline-generated length bug.
```

```
Revision 1.11  93/05/21  15:23:18  chris
Correcting text substitution bug (incomplete).

Revision 1.10  93/05/21  14:06:44  stephen
Slight adjustment to ResizeHdl, to take a size parameter I forgot.

Revision 1.9  93/05/20  21:08:20  stephen
Made SDF, SNF, SVB functions accept actual semvals.

Revision 1.8  93/05/20  20:06:23  stephen
Fixed problem with overruning text buffer by having subtext
automatically resize the memory handle.

Fixed earlier correction to gender, which caused PPN to fail.

Revision 1.7  93/05/20  17:21:58  stephen
Changed gender of personal pronouns from 'M' to 0 (char to short).

Revision 1.6  93/05/18  11:22:49  stephen
Minor change to test assert.

Revision 1.5  93/05/13  14:55:23  stephen
Made DoSubstitution return a length.

Revision 1.4  93/05/12  21:04:39  stephen
Added Linking Verb conjugation.

Revision 1.3  93/05/12  18:02:18  chris
Added SDF() function to pass definition text.

Revision 1.2  93/05/10  16:58:05  stephen
Added all the SubText functions.

Revision 1.1  93/05/06  11:01:24  stephen
Initial revision

 */
```

```
/* ------------------------------------------------------------------------
	SUBTEXT.H
	Handles the substitution of text
	Copyright (C) 1993 Screenplay Systems Inc.
	Revised:	$Id$
---------------------------------------------------------------------------

*/

#pragma once

#ifndef __SUBTEXT__
#define __SUBTEXT__

extern "C" {
	#include "ssi.h"
}
#include "stringx.h"
#include "document.h"
#include "ptext.h"
#include "consts.h"

#pragma segment subtext

class Dramatica;

int	CompSemValName(const void *pKey, const void *pE);		// used for sorting semVal tables by name

/* ------------------------------------------------------------------------
	SubText - Handles the substitution of text.
------------------------------------------------------------------------ */
class EXPORT_CLASS SubText : public TObject {
public:
	SubText(DRDoc* theDoc, char* theText, byte_cnt length = 0);
	~SubText(void);

	// PUBLIC UTILITIES
	virtual char*		ClassName(void) const			{ return "SubText"; }
	virtual class_t		ClassType(void) const			{ return kSubText; }
	virtual bool_t		IsOfType(const void *pType) const { return *(class_t*) pType == kSubText ||
TObject::IsOfType(pType); }
	virtual byte_cnt	GetObjSize(void)			{ return sizeof(SubText); }
//	virtual byte_cnt	GetAllocSize(void)				{ return
fOutText.GetAllocSize(); }

			void		ResizeHdl(byte_cnt bytesToAdd);
			char*		DoSubstitution(byte_cnt* newLength = NULL);

			void		TrackingOn(SList* theList);
			void		TrackingOff(void);
			void		TrackSemVal(short semVal);

protected:
	// DATA MEMBERS

	Dramatica*	fApp;
	DRDoc*		fDoc;
	PText*		fPNounPT;
	PText*		fLVRBPT;		// Linking Verb PText
	PText*		fResponsePT;
	PText*		fStellingPT;
	pfm_fd_t	fAppPFMFile;

	char*		fInText;
	byte_cnt	fStrLength;

	hdl_t		fOutTextMemHdl;
	byte_cnt	fAllocLength;
	char*		fOutText;
	byte_cnt	fOut;

	SList*		fSemValTrackList;	// used to track semVals

	// LOCAL UTILITIES
	byte_cnt	interpret(byte_cnt bracketStart);
	void		CNN(char* param1, char* param2);
	void		SNF(char* param1);
	void		SDF(char* param1);
	void		SLD(char* param1);
	void		SNN(char* param1);
	void		SVB(char* param1, char* param2, char* param3);
	void		PPN(char* param1, char* param2);
	void		SDI(char* param1);
	void		STF(char* param1);
	void		QQE(char* param1);
	void		QBG(char* param1);
	void		QST(char* param1);
	void		QDU(char* param1);
	void		GDO(char* prefixText, char* postFixText, char* undefinedText);
	void		SPN(char* param1);
	void		SYN(char* param1);

	void		APD(char* param1);
	void		GetFormSex(short whichChar, short* gender, short* form);
	void		transfer_data(char* theTextToXfr);

}; /* SubText */

#pragma segment main

/* xxxxxxxxxxxxxxxxxxxxxxxxxxxxxxxxxxxxxxxxxxxxxxxxxxxxxxxxxxxxxxxxxxxxxxxxx
 * $Log:		subtext.h,v $
 * Revision 1.12  93/09/24  15:33:26  stephen
 * Cleaned up warnings.
 *
 * Revision 1.11  93/07/28  12:44:13  chris
```

```
 * Added four DQS subtext functions: QQE, QBG, QST, and QDU.
 *
 * Revision 1.10  93/06/03  10:59:44  chris
 * Added the Storytelling Text Function (STF).
 *
 * Revision 1.9  93/05/31  21:28:56  chris
 * Added SDI function "Story Document Information".
 *
 * Revision 1.8  93/05/30  18:21:23  chris
 * Added SNN function for noun items.
 *
 * Revision 1.7  93/05/21  14:07:06  stephen
 * Slight adjustment to ResizeHdl, to take a size parameter I forgot.
 *
 * Revision 1.6  93/05/20  20:07:19  stephen
 * Fixed problem with overruning text buffer by having subtext
 * automatically resize the memory handle.
 *
 * Fixed earlier correction to gender, which caused PPN to fail.
 *
 * Revision 1.5  93/05/13  14:55:50  stephen
 * Made DoSubstitution return a length.
 *
 * Revision 1.4  93/05/12  21:04:55  stephen
 * Added Linking Verb conjugation.
 *
 * Revision 1.3  93/05/12  18:02:47  chris
 * Added SDF() function to pass definition text.
 *
 * Revision 1.2  93/05/10  16:58:23  stephen
 * Added all the SubText functions.
 *
 * Revision 1.1  93/05/06  11:01:38  stephen
 * Initial revision
 *
 */

#endif /* __SUBTEXT__ */
```

```
/*********************************************************************
	SVIEW.CC
	StoryView classes
	(c) 1993 Screenplay Systems
	Authors:		S. Greenfield & C. Huntley
	Created:		May 23, 1993
	Revised:		$Id$
**********************************************************************
*/

#include "apputls.h"
#include "tappl.h"
#include "appdlogs.h"
#include "graphics.h"
#include "docgeom.h"
#include "tview.h"
#include "printx.h"

#include "ptext.h"
#include "dramatic.h"
#include "document.h"
#include "svobjs.h"
#include "sview.h"

#pragma segment sview

/* -------------------------------------------------Stephen---03/19/93---
	SView::Constructor
------------------------------------------------------------------------ */
SView::SView(ItemList* pParent, vw_flags vflags, const GLRect *extent, it_flags iflags, const GLColor *color)
		: TView(pParent, vflags, extent, iflags, color),
			fSelectionExists (false),
			fBlinkSelOn (false),
			fNmOfObjSelected (0),
			fLastRulerMark (0),
			fDataInited (false)
{
	init_scrollers();

	fWindow		= pParent->GetParent();
	fApp		= (Dramatica*)AP_Data()->fApp;
	fAppPFMFile = fApp->GetPFMFile();
	fDoc		= (DRDoc*)GetDoc();
	assert(fDoc);
	fResponses	= fDoc->GetRESP();
	fWindowRef	= GetParentWindowRef();

	fRulerBottom		= 30;
	fEventAreaBottom	= 200;
	fLeftMarginArea		= 65;
	fTopCushionArea		= fRulerBottom + 20;
	fMaxTimePixels		= 640;
	GLSetRect(&fEventContentArea, fRulerBottom+1, fLeftMarginArea+1, fEventAreaBottom-1, fExtent.right-17);
	fMinObjectSpacing	= 20;

#if 0
	fSelStart = 150;
	fSelEnd = 150;
	fSelectionExists = true;
	fBlinkSelOn	= true;
#endif

	fCaretTime = AP_GetCaretTime();
	fLastBlinkTime = 0;

	fNextSVID		= 1;		// ELIMINATE, when we store in segment
	fNextSLineID	= 1;

	SetTopMargin(fEventAreaBottom);		// Number of pixel for ruler area
	SetLeftMargin(fLeftMarginArea);		// Number of pixels for the "left" work area
}


/* -------------------------------------------------Stephen---04/18/93---
	SView::Destructor
------------------------------------------------------------------------ */
SView::~SView(void)
{
	destruct_SView_data();
}



/* -------------------------------------------------Stephen---05/23/93---
	SView::init_SView_data - Sets up our data.
------------------------------------------------------------------------ */
void SView::init_SView_data(void)
{
	fFont = GL_NEWYORK;
	fFontSize = 9;

	fDataInited = true;
}



/* -------------------------------------------------Stephen---05/23/93---
	SView::destruct_SView_data - disposes of our data.
------------------------------------------------------------------------ */
void SView::destruct_SView_data(void)
{
	assert(fDataInited);
}

/* -------------------------------------------------Stephen---05/23/93---
	SView::draw_view - Does the bulk of drawing our StoryView.
------------------------------------------------------------------------ */
void SView::draw_view (const VwPaneUpdateInfo& updateInfo)
{
	LgPoint		VwOrigin = *updateInfo.InqOffset();		// local coordinates for the view's origin
```

```
        doc_coord_t         X           = VwOrigin.x;
        doc_coord_t         Y           = VwOrigin.y;

        // DRAW REST OF VIEW

        fpGraphEnv->SetTextAttr(fFont, fFontSize);

        gl_coord_t          rowY                        = 0-Y;
        gl_coord_t          totalHeight                 = 0;
        gl_coord_t          updateTop;
        gl_coord_t          updateBot;

        //      Clip out top margin area from update region, so we don't try to draw rows there

        GLPoint             marginLineLoc;
        LgPoint             marginLineDoc;
        marginLineLoc.y = fRulerBottom + 1;                                     // Local top margin of 0 is the top of
the view
        marginLineLoc.x = 0;
        loc_to_doc(marginLineLoc, &marginLineDoc);

        LgRect myUpdateRect;
        updateInfo.InqDocRgn()->GetRect(&myUpdateRect);
        myUpdateRect.top                    = MAX(myUpdateRect.top, marginLineDoc.y);
        myUpdateRect.bottom                 = MAX(myUpdateRect.top, myUpdateRect.bottom);

        updateTop           = (gl_coord_t)(myUpdateRect.top);
        updateBot           = (gl_coord_t)(myUpdateRect.bottom);

        // BULK OF DRAWING HERE

        fpGraphEnv->MoveTo(30-X, 60);
        fpGraphEnv->DrawStr("A test");

        fpGraphEnv->MoveTo(200-X, 290-Y);
        fpGraphEnv->DrawStr("Bottom part");

        fpGraphEnv->MoveTo(10, 70);
        fpGraphEnv->DrawStr("Upper area");

        fpGraphEnv->MoveTo(10, 290-Y);
        fpGraphEnv->DrawStr("Lower area");

        fpGraphEnv->MoveTo(50-X, 25);
        fpGraphEnv->DrawStr("Ruler Area");

        //      Draw Ruler area

        fpGraphEnv->MoveTo(0, fRulerBottom);
        fpGraphEnv->LineTo(fExtent.right, fRulerBottom);

        if (fLastRulerMark > 0 )
                draw_ruler_mark(fLastRulerMark);


        //      Draw Left area

        fpGraphEnv->MoveTo(fLeftMarginArea, fRulerBottom);
        fpGraphEnv->LineTo(fLeftMarginArea, fExtent.bottom);

        //      Draw dividing line between Time View and Story Lines

        fpGraphEnv->MoveTo(0, fEventAreaBottom);
        fpGraphEnv->LineTo(fExtent.right, fEventAreaBottom);


        //      Draw all StoryView Objects

        short nmOfObjects = fSVObjs.Size();
        assert(fSVOrder.Size() == fSVObjs.Size());
        for (short i=0; i < nmOfObjects; ++i) {
                SVObj* theObject = (SVObj*)fSVObjs.Elem(i);
                theObject->Draw(fpGraphEnv, X, fTopCushionArea, this);
        }


        //      Draw Selection (if it exists)

        if (fSelectionExists) {
                if ((fSelStart == fSelEnd) && fBlinkSelOn)
                        draw_selection();
        }
} /* SView::draw_view */


/* ---------------------------------------------------Stephen---04/19/93---
        SView::draw_selection - has all the smarts to draw a particular
        selection.
------------------------------------------------------------------------- */
void SView::draw_selection(void)
{
        assert(fpGraphEnv->IsInUse());
        if (fSelStart == fSelEnd) {
//              if (!(fSelStart && fSelStart < (fMaxTimePixels * GetHLineSize())))
                        assert(fSelStart && fSelStart < (fMaxTimePixels * GetHLineSize()));
                const GLPoint       locOrigin = { 0, 0 };
                LgPoint  docOffset;
                loc_to_doc(locOrigin, &docOffset);

                doc_coord_t         selX = fSelStart - docOffset.x;

                if (selX > fLeftMarginArea && selX < fExtent.right - 16) {              // Clip drawing to view
                        fpGraphEnv->MoveTo(selX, fRulerBottom + 1);
                        fpGraphEnv->SetXferMode(GL_XOR);
                        fpGraphEnv->LineTo(selX, fExtent.bottom - 17);
                        fpGraphEnv->SetXferMode(GL_COPY);
                }
        }
}
```

```
/* ---------------------------------------------------Stephen---04/19/93---
	SView::draw_ruler_mark - Draw the little ruler mark that indicates
	where the mouse is.
------------------------------------------------------------------------ */
void SView::draw_ruler_mark(doc_coord_t markDocX)
{
	const GLPoint	locOrigin = { 0, 0 };
	LgPoint	docOffset;
	loc_to_doc(locOrigin, &docOffset);
	doc_coord_t	rmX = markDocX - docOffset.x;
	fpGraphEnv->MoveTo(rmX, fRulerBottom - 5);
	fpGraphEnv->SetXferMode(GL_XOR);
	fpGraphEnv->LineTo(rmX, fRulerBottom - 1);
	fpGraphEnv->SetXferMode(GL_COPY);
}


/* ---------------------------------------------------Stephen---04/19/93---
	SView::DoIdle -- idle processing, like blinking caret!
------------------------------------------------------------------------ */
void SView::DoIdle(void)
{
	//	TRACK RULER MARK

	GLPoint mousePt;
	AP_GetLocalMouse(fWindowRef, &mousePt);

	fpGraphEnv->Use();

	if ((mousePt.x > fLeftMarginArea) && (mousePt.x < fExtent.right - 16)) {
		LgPoint	mouseDocPt;
		loc_to_doc(mousePt, &mouseDocPt);

		if (fLastRulerMark != mouseDocPt.x) {
			if (fLastRulerMark > 0 )
				draw_ruler_mark(fLastRulerMark);		// Un-Draw previous mark
			draw_ruler_mark(mouseDocPt.x);			// Draw new mark
		}

		fLastRulerMark = mouseDocPt.x;
	} else {
		if (fLastRulerMark > 0 ) {
			draw_ruler_mark(fLastRulerMark);		// Un-Draw previous mark
			fLastRulerMark = 0;
		}
	}


	//	BLINK SELECTION IF REQUIRED

	if (fSelectionExists) {
		long theTime = AP_TickCount();
		if (theTime - fLastBlinkTime > fCaretTime) {
			draw_selection();
			fLastBlinkTime = theTime;
			fBlinkSelOn = fBlinkSelOn ? false : true;
		}
	}
	fpGraphEnv->Unuse();
}


/* ---------------------------------------------------Stephen---04/19/93---
	SView::draw_highlighting - Highlights or unhightlights a
	particular cell.
------------------------------------------------------------------------ */
void SView::draw_highlighting(short row, short col)
{
#if 0
	if (fRowSelected == row && fColSelected == col) {
		LgRect cellRect;
		GLRect localRect;
		get_cell_rect(&cellRect, row, col);
		doc_to_loc_rect(&cellRect, &localRect);
		GLRect viewExtent = fExtent;
		viewExtent.right -= 16;
		GLSectRect(&viewExtent, &localRect, &localRect);
		fpGraphEnv->InvertRect(localRect);
	}
#endif
}


/* ---------------------------------------------------Stephen---04/19/93---
	SView::doc_to_loc_rect - Converts document LgRect to GLRect
------------------------------------------------------------------------ */
GLRect*	SView::doc_to_loc_rect(LgRect* docRect, GLRect* localRect)
{
	LgPoint	docTopLeft;
	LgPoint	docBotRight;
	GLPoint	locTopLeft;
	GLPoint	locBotRight;

	docTopLeft.y	= docRect->top;
	docTopLeft.x	= docRect->left;
	docBotRight.y	= docRect->bottom;
	docBotRight.x	= docRect->right;

	doc_to_loc(&docTopLeft, &locTopLeft);
	doc_to_loc(&docBotRight, &locBotRight);

	localRect->top		= locTopLeft.y;
	localRect->left		= locTopLeft.x;
	localRect->bottom	= locBotRight.y;
	localRect->right	= locBotRight.x;

#if 0
   LgPoint docOrigin = { 0, 0 };
   GLPoint locOrigin;
   doc_to_loc(&docOrigin, &locOrigin);
```

```
   OffsetLgRect(theRect, locOrigin.x, locOrigin.y);
#endif
   return (localRect);
}


/* -------------------------------------------------Stephen---04/19/93---
         SView::DoItemHit - handles mouse-down events in the cast list
         view.
------------------------------------------------------------------------ */
bool_t SView::DoItemHit(EVENT_REC *pEvt, GLPoint mousePt)
{
         LgPoint           docClickPt;
         bool_t            isDblClick = AP_DblClick(pEvt);
         assert(fDataInited);

         if (!TView::DoItemHit(pEvt, mousePt)) {
                  short    row;
                  short    col;
                  LgRect   cellRect;
                  short    whichSelected;

                  loc_to_doc(mousePt, &docClickPt);


                  //       Fall thru here to deselect if nothing else selected

                  fpGraphEnv->Use();

                  if (fSelectionExists) {
                           if (fBlinkSelOn)
                                    draw_selection();
                           fSelectionExists = false;
                           fBlinkSelOn = false;
                  }

                  //       Did user click on one of our objects?

                  LgPoint           searchPt = docClickPt;
                  ls_index          whichObject;
                  searchPt.y = (doc_coord_t)mousePt.y;                                   // y-coord is always
in local coordinates
                  SVObj* theObject;
                  if (pt_in_object(&searchPt, &theObject, &whichObject)) {
                           if (theObject->IsSelected() && isDblClick) {
                                    beep();
                           } else {
                                    if (!theObject->IsSelected()) {
                                             if (!AP_ShiftKey(pEvt))                              //
Shift-key down allows multiple selection of objects
                                                      deselect_all_objects();
                                             theObject->Selection(true);
                                             theObject->Inval(fpGraphEnv, GetDocX(), fTopCushionArea, this);
                                             ++fNmOfObjSelected;
                                    }
                           }
                           fpGraphEnv->Unuse();
                           return (true);
                  }


                  //       Deselect any selected objects in the top part

                           if (deselect_all_objects())          {                          // if click
served to deselect objects, don't use it to set insertion point
                                    fpGraphEnv->Unuse();
                                    return (true);
                           }


                  //       Now select where user has clicked

                  if ((mousePt.x > fLeftMarginArea) && (docClickPt.x > 0) && (docClickPt.x < fMaxTimePixels *
GetHLineSize())) {

                           // TEMP!!!! -- CHEAP WAY TO INSERT OBJECTS

                           if (AP_OptionKey(pEvt)) {
                                    insert_svobj(docClickPt.x);
                                    AP_InvalGLRect(fWindowRef, &fEventContentArea);
                           } else {
                                    fSelStart = fSelEnd = docClickPt.x;
                                    fSelectionExists = true;
                                    draw_selection();
                                    fBlinkSelOn = true;
                           }
                  }
                  else beep();

                  fpGraphEnv->Unuse();
         }
         return (true);
}


/* -------------------------------------------------Stephen---04/19/93---
         SView::deselect_all_objects - force all objects to be deselected.
------------------------------------------------------------------------ */
short SView::deselect_all_objects()
{
         assert(fpGraphEnv->IsInUse());
         if (fNmOfObjSelected) {
                  short nmOfObjects = fSVObjs.Size();
                  for (short i=0; i < nmOfObjects; ++i) {
                           SVObj* theObject = (SVObj*)fSVObjs.Elem(i);
                           if (theObject->IsSelected()) {
                                    theObject->Selection(false);
                                    theObject->Inval(fpGraphEnv, GetDocX(), fTopCushionArea, this);
                                    --fNmOfObjSelected;
                           }
                  }
                  assert(fNmOfObjSelected == 0);
                  return (nmOfObjects);
```

```
	}
	return (0);
}


/* -----------------------------------------------Stephen---04/19/93---
	SView::pt_in_object - given a point in document coordinates, find
	the object where the user clicked.  Return TRUE if found, with
	whichObject containign the ls_index.  FALSE otherwise.
--------------------------------------------------------------------- */
bool_t SView::pt_in_object(LgPoint* searchPt, SVObj** objectFound, ls_index* whichObject)
{
	short nmOfObjects = fSVObjs.Size();
	for (short i=0; i < nmOfObjects; ++i) {
		SVObj* theObject = (SVObj*)fSVObjs.Elem(i);
		LgRect   objectBounds = theObject->GetDocBounds();
		if (LgPtInRect(*searchPt, &objectBounds)) {
			if (whichObject)
				*whichObject = i;
			*objectFound = theObject;
			return (true);
		}
	}
	return (false);
}



/* -----------------------------------------------Stephen---03/19/93---
	SView::insert_svobj - insert a new StoryView Object into the event
	area.
--------------------------------------------------------------------- */
void SView::insert_svobj(doc_coord_t insertPos)
{
	short    SvoID    = fNextSVID++;
	SVObj*   theAct   = (SVObj*) new SvoAct(SvoID, insertPos, fTopCushionArea);

	LgRect   bounds   = theAct->GetDocBounds();
	reschedule_all_obj(insertPos, (bounds.right-bounds.left) + fMinObjectSpacing);

	fSVObjs.Append(theAct);
	fSVOrder.Append(SvoID);

}



/* -----------------------------------------------Stephen---03/19/93---
	SView::reschedule_all_obj - starting at a given object, make sure
	that all objects are properly spaced apart.  This is necessary whenever
	an object is inserted or deleted.

	The process works by making sure that any object PAST the adjust_coord
	is adjusted by the delta (positive or negitive # of pixels)
--------------------------------------------------------------------- */
short SView::reschedule_all_obj(doc_coord_t adjust_coord, doc_coord_t delta)
{
	short    nmOfAdjustments   = 0;
	short    nmOfObjects = fSVObjs.Size();
	for (short i=0; i < nmOfObjects; ++i) {
		SVObj* theObject = (SVObj*)fSVObjs.Elem(i);
		LgRect   objectBounds = theObject->GetDocBounds();
		if (objectBounds.left >= adjust_coord) {
			objectBounds.left        += delta;
			objectBounds.right       += delta;
			theObject->SetDocBounds(objectBounds);
			++nmOfAdjustments;
		}
	}
	return (nmOfAdjustments);
}

/* -----------------------------------------------Stephen---03/19/93---
	SView::Resize -
--------------------------------------------------------------------- */
void SView::Resize(void *pNewSize, TObject *pSender)
{
//	TView::Resize(pNewSize, pSender);
	GLRect myBounds;
	GetParentWindow()->GetPortRect(&myBounds);
//	myBounds.bottom-=14;
	myBounds.bottom+=1;
	myBounds.top-=1;
	myBounds.left-=1;
	myBounds.right+=1;
	SetBounds(&myBounds);

	GLSetRect(&fEventContentArea, fRulerBottom+1, fLeftMarginArea+1, fEventAreaBottom-1, fExtent.right-16);

	if (fDataInited)
		destruct_SView_data();
	init_SView_data();
	Inval();
}



/* ---------------------------------------------------------------------
	SView::Print - prints the contents of the Cast List View.
--------------------------------------------------------------------- */
err_t SView::PrintView(Printing *pPrintMgr)
{
	LgPoint offset;
	offset.x = 0;                                        // print in an unscrolled position.
	offset.y = 0;
	Rgn updateRgn;
	VwPaneUpdateInfo updateInfo(pPrintMgr->GetPrinterEnv()->InqEnvRef(), offset, updateRgn);
	draw_view(updateInfo);

	return NOERR;
```

```
} /* SView::PrintView */

/* ========================================================================
                                                     Cast List Window CLASS
   ======================================================================== */

/* ------------------------------------------------------------------------
        SVWindow::SVWindow - CONSTRUCTOR
------------------------------------------------------------------------ */
SVWindow::SVWindow(TAppl *pTAppl, TDoc *pTDoc, const GLRect *bounds, wn_type windowType, const char *title, ptr_t
storage)
                : TWindow(pTAppl, pTDoc, windowType, TWindow::kNoFlags, bounds, title, storage),
                  fSView (NULL)
{
}


/* ------------------------------------------------------------------------
        SVWindow::SetupWindow -
------------------------------------------------------------------------ */
void SVWindow::SetupWindow(void)
{
        if (fItems)
                delete fItems;     // free any existing item list.

        if (ASSERT(fItems = new ItemList(this))) {
                it_test_proc      pDoesKeyDowns = &TItem::DoesKeyDowns;

                // STUFF IN OUR VIEW

                GLRect myBounds;
                GetPortRect(&myBounds);
                TItem* newSVItem = new SView(fItems, (TView::kVScroll +TView::kTopMarginScroll +
TView::kLeftMarginScroll + TView::kHScroll), &myBounds, TItem::kResizable);
                assert(newSVItem);
                fSView = (SView*)newSVItem;
                fItems->Append(newSVItem);

                set_window_content_color();

                if (ASSERT(fItems)) {
                        for (ls_index i = 0; i < fItems->Size(); i++) {
                                TItem*   pTItem = fItems->Elem(i);

                                if (pTItem->Is(&TItem::kResizable))
                                        pTItem->Resize();

                                pTItem->Awaken(&i);
                        }
                        if (fKeyItem == kItNoItem)
                                SetKeyItem(fItems->FirstObjThat((test_pp) &pDoesKeyDowns));

                        if (fKeyItem != kItNoItem) {
                                fGraphEnv.Use();
                                        GetItem(fKeyItem)->FocusIn();
                                fGraphEnv.Unuse();
                        }
                }
                fSView->DocumentResize();
        }
}


void SVWindow::Resize(void *pNewSize, TObject *pSender)
{
        TWindow::Resize(pNewSize, pSender);
        fItems->Resize();
}


/* ------------------------------------------------------------------------
        SVWindow::DoIdle - do any idle time processing.  This function just
                forwards the request onto the window's EditView.  This function
                could be inlined, but we choose not to to reduce header file
                dependencies.
------------------------------------------------------------------------ */
void SVWindow::DoIdle(void)
{
        fSView->DoIdle();

} /* SVWindow::DoIdle */

/* ------------------------------------------------------------------------
        SVWindow::CalcIdle - calculates how much idle time we need.
------------------------------------------------------------------------ */
ulong SVWindow::CalcIdle(void)
{
#if 0
        if (fSView->CaretVisible())
                return GetCaretTime();
        else
#endif
                return kApMaxSleepTime;

} /* SVWindow::CalcIdle */


/* ------------------------------------------------------------------------
        SVWindow::IsDirty - Determines if the current window needs saving.
------------------------------------------------------------------------ */
bool_t  SVWindow::IsDirty(void)
{
        DRDoc*   theDoc = (DRDoc*)GetDoc();
        assert(theDoc);
        return (theDoc->Is(&TDoc::kDirty));
}


/* ------------------------------------------------------------------------
```

```
                                                         Cast List COMMAND CLASS
------------------------------------------------------------------------------ */

/* ---------------------------------------------------------------------------
        SViewCmd::IsValid -
------------------------------------------------------------------------------ */
bool_t SViewCmd::IsValid(TAppl *pApp)
{
        return (false);
        TAppl*          fApp            = AP_Data()->fApp;
        ls_index        activeDoc       = fApp->ActiveDoc();
        if (activeDoc != kLsNoElem) {
                DRDoc*  theDoc = ((DRDoc*)fApp->GetDoc(activeDoc));
                return (theDoc == NULL) ? false : true;
        }
        return (false);

//      return pApp->ActiveWindow() && ! pApp->ActiveWindow()->IsModalDlog();

} /* SViewCmd::IsValid */

/* ---------------------------------------------------------------------------
        SViewCmd::do_cmd -
------------------------------------------------------------------------------ */
err_t SViewCmd::do_cmd(void)
{
        GLRect myBounds;
        DRDoc*  theDoc = ((DRDoc*)fParentApp->ActiveWindow()->GetDoc());
        assert(theDoc);
        theDoc->GetOptWindowRect(&myBounds, NULL);

        SVWindow* pTWindow = new SVWindow(fParentApp, theDoc, &myBounds, WN_DOC_WINDOW, "StoryView");

        if (pTWindow) {
                theDoc->GetWindowList()->Append(pTWindow);
                pTWindow->SetupWindow();
                pTWindow->ShowWindow();
                fParentApp->SetActiveWindows();

                fParentApp->ClearStoragePtr();
        }

        return NOERR;
} /* SViewCmd::do_cmd */

#pragma segment main

/* xxxxxxxxxxxxxxxxxxxxxxxxxxxxxxxxxxxxxxxxxxxxxxxxxxxxxxxxxxxxxxxxxxxxxxxxxxx
 * $Log:          sview.cc,v $
Revision 1.3  93/08/20  14:01:05  stephen
Minor changes.

Revision 1.2  93/06/23  16:27:54  stephen
Feature implementation.

Revision 1.1  93/05/24  21:41:10  stephen
Initial revision

 */
```

```
/* ------------------------------------------------------------------------
	SVIEW.H
	StoryView classes
	Copyright (C) 1993 Screenplay Systems Inc.
	Revised:	$Id$
-------------------------------------------------------------------------- */

#pragma once

#ifndef __SVIEW__
#define __SVIEW__

#include "listsx.h"

#include "ItemList.h"
#include "tview.h"
#include "tcommand.h"

#include "consts.h"

class SVObj;

#pragma segment sview


typedef struct {
	short		charID;				// ID of this character
	pl_id		charNamePID;		// Name of this character
	PText*		charPT;				// Ptext of this character
	GLRect		charRect;			// Rectangle of this character
	short		row;				// Row of this character
	short		col;				// Column of this character
} SVDataType;


/* ------------------------------------------------------------------------
	SView - Dramatica's StoryView view class.
-------------------------------------------------------------------------- */
class SView : public TView {
public:
	// CONSTRUCTION/DESTRUCTION
	SView(ItemList* pParent, vw_flags vflags = kNoFlags, const GLRect *extent = NULL, it_flags iflags =
List::kNoFlags, const GLColor *color = &kGLBlackClr);
	~SView(void);

	// PUBLIC UTILITIES
	virtual char*		ClassName(void) const		{ return "SView"; }
	virtual class_t	ClassType(void) const		{ return kSView; }
	virtual bool_t		IsOfType(const void *pType) const { return *(class_t*) pType == kSView ||
TView::IsOfType(pType); }
	virtual TObject* Duplicate(void) const		{ return new SView(*this); }
	virtual byte_cnt		GetObjSize(void)	{ return sizeof(SView); }
	virtual byte_cnt		GetAllocSize(void)		{ return fSVObjs.GetAllocSize() + fSVOrder.GetAllocSize()
+ fSLineObjs.GetAllocSize() + fSLineOrder.GetAllocSize(); }


	// ACTION PROCS

	// PUBLIC BEHAVIOR
	virtual void		Frame(void *env, TObject *pSender = NULL) {}		// TItem:: function.  Overriden here to
prevent framing of view
	virtual void		draw_view(const VwPaneUpdateInfo& updateInfo);
	virtual err_t		PrintView(Printing *pPrintMgr);
	virtual void		Resize(void *pNewSize, TObject *pSender);
	char*				PID2Ptr(pl_id dataID)				{ /* assert (dataID >=
0); */  if (dataID < 0) return ((char*)PT_UNDEFINED); else return ((char*)fTextPool.DataPtr(dataID)); }

	virtual void		DoIdle(void);
	virtual  long		GetNumVLines(void) { return 341; }
	virtual  long		GetNumHLines(void) { return fMaxTimePixels; }

	gl_coord_t			GetRulerBottom(void)			{ return fRulerBottom; }
	gl_coord_t			GetEventAreaBottom(void)	{ return fEventAreaBottom; }
	gl_coord_t			GetLeftMarginArea(void)			{ return fLeftMarginArea; }
	GLRect				GetEventContentArea(void)	{ return fEventContentArea; }
	WINDOW_REF			GetfWindowRef(void)				{ return fWindowRef; }
	doc_coord_t			GetDocX(void)					{ return
(GetLineHPosition(GetHScrollPos()) - pane_origin_x(&fCurPane)); }

#if 0
	virtual  long		GetNumVLines(void) const	{ return (long)((fOutlineTW) ? fOutlineTW->GetLines() : 0); }
	virtual  long		GetPageIncrement(long line, short destination = kNextHPage);
	virtual  doc_coord_t		GetLineVPosition(long line);
	virtual  long		GetVLineSize(long line = kDefaultLine);
	virtual long		calculate_size_of_v_lines(short numberOfLines);
	virtual void		SetVLineSize(gl_coord_t size, long line = kDefaultLine);

//	virtual  long		GetNumVLines(void) { return (long)SP_ROWS; }
//	virtual  long		GetVLineSize(long line = kDefaultLine) { return assert(line<=SP_ROWS);
(long)(SPData[(int)line].rowHeight); }
//	virtual void		SetVLineSize(gl_coord_t size, long line = kDefaultLine) { assert(line<=SP_ROWS);
SPData[(int)line].rowHeight = size; }
//	virtual  long		GetNumHLines(void) { return GetDoc() ? GetDoc()->GetNumHLines() : 0; }
//	virtual  long		GetHLineSize(long line = kDefaultLine);
//	virtual  void		SetHLineSize(gl_coord_t size, long line = kDefaultLine);
//	virtual  doc_coord_t		GetLineHPosition(long line);
#endif


protected:
	Dramatica*		fApp;
	DRDoc*			fDoc;
	TWindow*		fWindow;
	WINDOW_REF		fWindowRef;
	pfm_fd_t		fAppPFMFile;
	PText*			fResponses;

	gl_coord_t		fRulerBottom;
	gl_coord_t		fEventAreaBottom;
	gl_coord_t		fLeftMarginArea;
	gl_coord_t		fTopCushionArea;
	GLRect			fEventContentArea;		// Upper work area (only scrolls horizontally)
```

```
	gl_coord_t	fMinObjectSpacing;	// Number of pixels separating each object

	doc_coord_t	fMaxTimePixels;		// Number of pixels of horizontal space currently allocated;  But a
horizontal pixel is a point in time.

	Pool		fTextPool;			// Temp storage for names
	hdl_t		fSVDataHdl;			// Handle to memory allocated for our StoryView data
	SVDataType*	fSVData;			// Point to the array
	bool_t		fDataInited;		// TRUE if we've initialized data at least once


	bool_t		fSelectionExists;	// TRUE if the user has a selection
	doc_coord_t	fSelStart;			// Selection start
	doc_coord_t	fSelEnd;			// Selection end
	bool_t		fBlinkSelOn;		// TRUE if blinking selection is "on"
	long		fCaretTime;			// Number of ticks between blinks
	long		fLastBlinkTime;		// Ticks since last blink

	short		fNmOfObjSelected;	// Count of selected objects

	doc_coord_t	fLastRulerMark;		// Tracks mark on ruler line

	short		fRowSelected;		// contains # of row selected
	short		fColSelected;		// contains # of column selected
	short		fWhichSelected;		// ID of character selected

	gl_font_t	fFont;				// Font for this window
	short		fFontSize;			// Size of font

	//	The data members below relate to tracking StoryView objects -- they are stored
	//	and retrieved from the user's story file.

	short		fNextSVID;			// The next short ID to assign for a StoryView Object
	ObjList		fSVObjs;			// Object list of all our StoryView Objects
	SList		fSVOrder;			// Order of the SVObj Objects. Each short is an Object ID.

	short		fNextSLineID;		// The next short ID to assign for a Story Line Object
	ObjList		fSLineObjs;			// Object list of all our Story Line Objects
	SList		fSLineOrder;		// Order of the SLineObj Objects. Each short is an Object ID.

	// LOCAL UTILITIES

	void		init_SView_data(void);
	void		destruct_SView_data(void);

	void		draw_selection();
	void		draw_ruler_mark(doc_coord_t markDocX);
	void		draw_highlighting(short row, short col);
	GLRect*		doc_to_loc_rect(LgRect* docRect, GLRect* localRect);
	bool_t		DoItemHit(EVENT_REC *pEvt, GLPoint mousePt);
	short		deselect_all_objects();
	bool_t		pt_in_object(LgPoint* searchPt, SVObj** theObject, ls_index* whichObject = NULL);
	void		insert_svobj(doc_coord_t insertPos);
	short		reschedule_all_obj(doc_coord_t adjust_coord, doc_coord_t delta);

}; /* SView */


/* ------------------------------------------------------------------------
						StoryView Window CLASS
------------------------------------------------------------------------ */
class SVWindow : public TWindow {
public:
	// CONSTRUCTION/DESTRUCTION
	SVWindow(TAppl *pTAppl, TDoc *pTDoc, const GLRect *bounds, wn_type windowType, const char *title, ptr_t storage
= NULL);

	// PUBLIC UTILITIES
	virtual char*	ClassName(void) const	{ return "SVWindow"; }
	virtual class_t	ClassType(void) const	{ return kSVWindow; }
	virtual bool_t	IsOfType(const void *pType) const { return *(class_t*) pType == kSVWindow ||
TWindow::IsOfType(pType); }
	bool_t			IsDirty(void);

	// CUSTOMIZED BEHAVIOR
	virtual void	DoIdle(void);
	virtual ulong	CalcIdle(void);
	void			SetupWindow(void);

	SView*	GetView(void)		{ return fSView; }

protected:
	// DATA MEMBERS
	SView*	fSView;		// Pointer to our view

	// LOCAL UTILITIES
//	virtual void	draw_window(GL_ENV_REF env);
	virtual void	Resize(void *pNewSize, TObject *pSender = NULL);

}; /* SVWindow */


/* ------------------------------------------------------------------------
	SViewCmd - StoryView command
------------------------------------------------------------------------ */
class SViewCmd : public TCommand {
public:
	SViewCmd(TAppl* pTAppl) : TCommand(pTAppl) {}

	virtual char*	ClassName(void)	const	{ return "SViewCmd"; }
	virtual class_t	ClassType(void) const	{ return kSViewCmd; }
	virtual bool_t	IsOfType(const void *pType) const { return *(class_t*) pType == kSViewCmd ||
TCommand::IsOfType(pType); }
	virtual TObject* Duplicate(void) const	{ return new SViewCmd(*this); }

	static bool_t	IsValid(TAppl *pTAppl);

protected:
	virtual err_t	do_cmd(void);
```

```
}; /* SViewCmd */

#pragma segment main

/* xxxxxxxxxxxxxxxxxxxxxxxxxxxxxxxxxxxxxxxxxxxxxxxxxxxxxxxxxxxxxxxxxxxxxxxxxx
 *  $Log:          sview.h,v $
 * Revision 1.3  93/08/20  14:02:58  stephen
 * Minor changes.
 *
 * Revision 1.2  93/06/23  16:28:12  stephen
 * Feature implementation.
 *
 * Revision 1.1  93/05/24  21:41:32  stephen
 * Initial revision
 *
 */

#endif /* __SVIEW__ */
```

```
/***********************************************************************
        SVOBJS.CC
        StoryView Objects
        (c) 1993 Screenplay Systems
        Authors:        S. Greenfield & C. Huntley
        Created:        June 13, 1993
        Revised:        $Id$
************************************************************************
*/

#include <CType.h>

#include "genutls.h"
#include "memmgr.h"
#include "pfm.h"

#include "tappl.h"
#include "graphics.h"
#include "docgeom.h"

#include "ptext.h"
#include "dramatic.h"
#include "document.h"
#include "sview.h"
#include "svobjs.h"

#pragma segment svobjs

/* -------------------------------------------------------------------------
        FUNCTION:       SVObj::SVObj - default constructor
        Accepts:
------------------------------------------------------------------------- */
SVObj::SVObj(short ID, doc_coord_t timePosition, doc_coord_t topOffset)
    : fID (ID),
        fType (0),
        fTimePos (timePosition),
        fTextID (0),
        fNextInGroup (0),
        fSizeBalloon (false),
        fShortDesc (NULL),
        fSelected (false)
{
        SetLgRect(&fDocBounds, topOffset, timePosition, topOffset+default_height(), timePosition+default_width());
        GLSetRect(&fBounds, 0, 0, default_height(), default_width());          // Default size of our rect
}

/* -------------------------------------------------------------------------
        FUNCTION:       SVObj::~SVObj - destructor
------------------------------------------------------------------------- */
SVObj::~SVObj(void)
{

}

/* -------------------------------------------------------------------------
        FUNCTION:       SVObj::Inval() - inval this object (force it to be redrawn)
------------------------------------------------------------------------- */
void SVObj::Inval(TGraphEnv* pGraphEnv, doc_coord_t XPos, doc_coord_t YPos, SView* SViewPtr)
{
        GLRect screenRect;
        DocToLocalRect(&fDocBounds, &screenRect, -XPos, 0);

        GLRect   eventContentArea = SViewPtr->GetEventContentArea();
        GLSectRect(&screenRect, &eventContentArea, &screenRect);

        AP_InvalGLRect(SViewPtr->GetfWindowRef(), &screenRect);
}


/* -------------------------------------------------------------------------
        FUNCTION:       SvoAct::Draw() - draw this StoryView Object
------------------------------------------------------------------------- */
void SvoAct::Draw(TGraphEnv* pGraphEnv, doc_coord_t XPos, doc_coord_t YPos, SView* SViewPtr)
{
        GLRect   clipRect;
        pGraphEnv->GetClipRect(&clipRect);
        GLRect   eventContentArea = SViewPtr->GetEventContentArea();
        GLSectRect(&clipRect, &eventContentArea, &eventContentArea);
        pGraphEnv->SetClipRect(eventContentArea);

        GLRect screenRect;
        DocToLocalRect(&fDocBounds, &screenRect, -XPos, 0);
        pGraphEnv->FrameRect(screenRect);
        char tempStr[20];
        GLRect textRect = screenRect;
        textRect.top += 15;
        textRect.bottom += 15;
        sprintf(tempStr, "#%hd", fID);
        pGraphEnv->StrRect(tempStr, textRect, GL_JUST_CENTER, false);
        if (fSelected)
                pGraphEnv->InvertRect(screenRect);

        pGraphEnv->SetClipRect(clipRect);
}


#pragma segment main

/* xxxxxxxxxxxxxxxxxxxxxxxxxxxxxxxxxxxxxxxxxxxxxxxxxxxxxxxxxxxxxxxxxxxxxxx
 * $Log $
 */
```

```
/* -----------------------------------------------------------------------
        SVOBJS.H
        StoryView Objects
        Copyright (C) 1993 Screenplay Systems Inc.
        Revised:          $Id: svobjs.h,v 1.2 93/08/20 14:03:10 stephen Exp Locker: stephen $
----------------------------------------------------------------------- */

#pragma once

#ifndef __SVOBJS__
#define __SVOBJS__

extern "C" {
        #include "ssi.h"
}
#include "tobject.h"
#include "consts.h"
#include "textwrap.h"

#pragma segment svobjs

class SView;


/* -----------------------------------------------------------------------
                SVObj - StoryView Object.
----------------------------------------------------------------------- */
class SVObj : public TObject {
public:

//      CONSTRUCTION/DESTRUCTION
SVObj(short ID, doc_coord_t timePosition, doc_coord_t topOffset);
virtual ~SVObj(void);

//      PUBLIC UTILITIES
        virtual  char*          ClassName(void) const                   { return "SVObj"; }
        virtual  class_t        ClassType(void)   const                 { return kSVObj; }
        virtual bool_t          IsOfType(const void* pType) const { return *(class_t*) pType == kSVObj ||
TObject::IsOfType(pType); }
        virtual TObject*        Duplicate(void) const                   { return new SVObj(*this); }
        virtual byte_cnt        GetObjSize(void)                        { return sizeof(SVObj); }
//      virtual byte_cnt        GetAllocSize(void)                              { return
fDictionary.GetAllocSize() + fDataPool.GetAllocSize(); }

//      PUBLIC BEHAVIOR

        virtual  void           Draw(TGraphEnv* pGraphEnv, doc_coord_t XPos,  doc_coord_t YPos, SView* SViewPtr)
                        {}
        virtual void            Inval(TGraphEnv* pGraphEnv, doc_coord_t XPos, doc_coord_t YPos,SView* SViewPtr);
        LgRect                          GetDocBounds(void)                              { return fDocBounds; }
        void                            SetDocBounds(LgRect theRect)    { fDocBounds = theRect; }
        void                            Selection(bool_t state)                 { fSelected = state; }
        bool_t                          IsSelected(void)                        { return fSelected; }

protected:
//      DATA MEMBERS (these items stored on disk in PText segments)

        short           fID;                    // Unique ID of this object (its SVOB segment ID)
        short           fType;                  // Type of this object (Act, Scene, Sequence, Event)
        LgRect          fDocBounds;             // Rect which encloses this item in document coordinates
        GLRect          fBounds;                // Rect which encloses this item
        doc_coord_t     fTimePos;               // Where in the story is this item placed
        short           fTextID;                // ID of the corresponding SVTX (text) segment

        gl_font_t       fFont;                  // Font for this window
        short           fFontSize;              // Size of font

        short           fNextInGroup;   // This object is linked to another (i.e., grouped)
        bool_t          fSizeBalloon;   // if TRUE, then balloon can grow to fit all of text

//      These items are only stored during runtime

        TextWrap*       fShortDesc;             // Brief description which is displayed in the balloon.
        bool_t          fSelected;              // This object is currently selected


//      LOCAL UTILITIES

        virtual short           default_height(void)    const { return 60; }
        virtual short           default_width(void)             const { return 100; }

};

inline GLRect*          DocToLocalRect (const LgRect *lr, GLRect *r, long x, long y)    { r->top = (short)(lr->top +
y); r->left = (short)(lr->left + x); r->bottom = (short)(lr->bottom + y); r->right = (short) (lr->right + x); return r; }

/* -----------------------------------------------------------------------
                SvoAct - StoryView Object for an "ACT"
----------------------------------------------------------------------- */
class SvoAct : public SVObj {
public:

//      CONSTRUCTION/DESTRUCTION
SvoAct(short ID, doc_coord_t timePosition, doc_coord_t topOffset) : SVObj(ID, timePosition, topOffset) {}
virtual ~SvoAct(void) {}

        virtual char*   ClassName(void)   const    { return "SvoAct"; }
        virtual class_t ClassType(void) const      { return kSVObj; }

        virtual  void   Draw(TGraphEnv* pGraphEnv, doc_coord_t XPos,  doc_coord_t YPos, SView* SViewPtr);

};



#pragma segment main
```

```
/* xxxxxxxxxxxxxxxxxxxxxxxxxxxxxxxxxxxxxxxxxxxxxxxxxxxxxxxxxxxxxxxxxxxxxxxx
 *  $Log:         svobjs.h,v $
 * Revision 1.2  93/08/20  14:03:10  stephen
 * Minor changes.
 *
 * Revision 1.1  93/06/23  16:28:24  stephen
 * Initial revision
 *
 */

#endif /* __SVOBJS__ */
```

```
/* ----------------------------------------------------------------------
	SYNONYMS.R
	Dramatica's Synonyms Text for Replacement Text
	Copyright (C) 1993 Screenplay Systems Inc.
	$Id: nouns.r,v 1.7 93/06/02 21:46:19 chris Exp Locker: stephen $
------------------------------------------------------------------------ */

#ifdef macintosh
	#include "systypes.r"
	#include "types.r"
#else
	#include <systypes.r>
	#include <types.r>
#endif


/* ----------------------------------------------------------------------
	'SYNS' - Synonyms for the Semantic nouns.
------------------------------------------------------------------------ */
type 'SYNS' {
	cstring;			/* synonym text */
};

resource 'SYNS' (1, PFM_MIN_PRIO) {						/* Universe
*/
	"a situation, a set of circumstances, state of affairs, predicament, environment, milieu"
};

resource 'SYNS' (2, PFM_MIN_PRIO) {						/* Physics */
	"an activity, an enterprise, an initiative, an endeavor, an operation"
};

resource 'SYNS' (3, PFM_MIN_PRIO) {						/* Psychology
*/
	"ways of thinking, thinking process, activity of the psyche, manipulation of others"
};

resource 'SYNS' (4, PFM_MIN_PRIO) {						/* Mind */
	"attitude, fixation, position on an issue, fixed point of view, disposition"
};

resource 'SYNS' (5, PFM_MIN_PRIO) {						/* Past */
	"history, what has happened, former times, retrospective"
};

resource 'SYNS' (6, PFM_MIN_PRIO) {						/* Progress
*/
	"flowing, advancing, proceeding, moving forward, developing step by step, graduated, staging, successive,
procession, the way things are going"
};

resource 'SYNS' (7, PFM_MIN_PRIO) {						/* Future */
	"what is to come, what will be, prospect, prospective"
};

resource 'SYNS' (8, PFM_MIN_PRIO) {						/* Present */
	"how things stand, the here and now, current situation, as of this moment"
};

resource 'SYNS' (9, PFM_MIN_PRIO) {						/*
Understanding */
	"comprehending, grasping, appreciating, obtaining meaning, acquiring meaning"
};

resource 'SYNS' (10, PFM_MIN_PRIO) {					/* Doing */
	"performing, executing, effecting action, acting"
};

resource 'SYNS' (11, PFM_MIN_PRIO) {					/* Obtaining */
	"controlling for oneself, possessing, having, keeping"
};

resource 'SYNS' (12, PFM_MIN_PRIO) {					/* Learning */
	"cultivating experience, acquiring information, collecting data, gathering knowledge"
};


resource 'SYNS' (13, PFM_MIN_PRIO) {					/*
Conceptualizing */
	"visualizing, imagining, envisioning, visualizing implementation"
};

resource 'SYNS' (14, PFM_MIN_PRIO) {					/* Being */
	"pretending, appearing, acting like, seeming as, fulfilling a role"
};

resource 'SYNS' (15, PFM_MIN_PRIO) {					/* Becoming
*/
	"embodying, manifesting, personifying, incarnating, transforming"
};

resource 'SYNS' (16, PFM_MIN_PRIO) {					/* Conceiving
*/
	"originating, inventing, devising, engendering, hatching ideas"
};

resource 'SYNS' (17, PFM_MIN_PRIO) {					/* Memory */
	"remembering, recollections, reminiscence, recalling, retention"
};

resource 'SYNS' (18, PFM_MIN_PRIO) {					/*
Preconscious */
	"unthinking responses, immediate responses, impulse, impulsive response, instinctive response, innate response,
reflex"
};

resource 'SYNS' (19, PFM_MIN_PRIO) {					/*
Subconscious */
	"libido, id, basic motivations, basic drives, anima"
};
```

```
resource 'SYNS' (20, PFM_MIN_PRIO) {                                                    /* Conscience
*/
        "considerations, sensibilities, cognizant, ability to consider, sensible, informed contemplation, contemplation"
};

resource 'SYNS' (21, PFM_MIN_PRIO) {                                                    /* Fate */
        "inevitable events, unpreventable incidents, eventual events, destined occurrence, destined events, unavoidable
situations"
};

resource 'SYNS' (22, PFM_MIN_PRIO) {                                                    /* Prediction
*/
        "forsight, forseeing, anticipation, invisioning one's future, prophecy, forcast, fortell, prognosticate"
};

resource 'SYNS' (23, PFM_MIN_PRIO) {                                                    /*
Interdiction */
        "altering the future, interfering with the predetermined, hindering the inevitable, escaping the predestined"
};

resource 'SYNS' (24, PFM_MIN_PRIO) {                                                    /* Destiny */
        "inescapable path, predetermined trajectory, set direction of the future, inevitable path, unavoidable
trajectory"
};

resource 'SYNS' (25, PFM_MIN_PRIO) {                                                    /* Fact */
        "belief in the genuine, ultimately real beliefs, truly real beliefs, authentic notion, authentic idea, correct
knowledge, correct beliefs"
};

resource 'SYNS' (26, PFM_MIN_PRIO) {                                                    /* Security
*/
        "evaluation of safety, measure of safeguards, appraisal of one's protections, guage of defenses"
};

resource 'SYNS' (27, PFM_MIN_PRIO) {                                                    /* Threat */
        "perceived danger, indication of peril, perceived vulnerability, warning, detected hazard"
};

resource 'SYNS' (28, PFM_MIN_PRIO) {                                                    /* Fantasy */
        "false belief, faith in the imaginary, delusion, erroneous conviction"
};

resource 'SYNS' (29, PFM_MIN_PRIO) {                                                    /* Openness
*/
        "broad mindedness, tolerancy, willingness to reevaluate, receptiveness"
};

resource 'SYNS' (30, PFM_MIN_PRIO) {                                                    /* Delay */
        "put off, retard, postpone, defer, suspend, prolong, procrastinate"
};

resource 'SYNS' (31, PFM_MIN_PRIO) {                                                    /* Choice */
        "decision, selection, determination, pick"
};

resource 'SYNS' (32, PFM_MIN_PRIO) {                                                    /*
Preconception */
        "prejudice, closed mindedness, narrow mindedness, intolerancy, stubbornness, unwillingness to reevaluate"
};

resource 'SYNS' (33, PFM_MIN_PRIO) {                                                    /* Work */
        "appropriate undertaking, suitable task, handlable labor, a performable activity"
};

resource 'SYNS' (34, PFM_MIN_PRIO) {                                                    /* Attract --
was Do */
        "allure, enticement, charm, captivate, appeal, draw, lure"
};

resource 'SYNS' (35, PFM_MIN_PRIO) {                                                    /* Repel --
was Don't */
        "unattractive, repellent, foreboding, unsavory, pushing away, forcing back"
};

resource 'SYNS' (36, PFM_MIN_PRIO) {                                                    /* Attempt */
        "try, uncertain undertaking, speculative endeavor, dubious effort, endeavor, unlikely venture"
};

resource 'SYNS' (37, PFM_MIN_PRIO) {                                                    /* Instinct
*/
        "involuntary drive, innate impulse, unconditioned response, automatic response, unconditioned motivation"
};

resource 'SYNS' (38, PFM_MIN_PRIO) {                                                    /* Senses */
        "perceptual data, raw sensations, sensory impressions, immediate impressions, perceptions"
};

resource 'SYNS' (39, PFM_MIN_PRIO) {                                                    /*
Interpretation */
        "construe, rendition, rendering meaning, elucidate, translating meaning"
};

resource 'SYNS' (40, PFM_MIN_PRIO) {                                                    /*
Conditioning */
        "habituation, trained response, accustomed response, adaptive adjustments"
};

resource 'SYNS' (41, PFM_MIN_PRIO) {                                                    /* Wisdom */
        "mental mastery, integrated understanding, seasoned understanding, comprehension, astute cogency"
};

resource 'SYNS' (42, PFM_MIN_PRIO) {                                                    /* Skill */
        "proficiency, aptitude, competence, adeptness, degree of expertise, practiced ability, honed ability"
};

resource 'SYNS' (43, PFM_MIN_PRIO) {                                                    /* Experience
*/
```

```
        "familiarization, level of practice, seasoning, accumulated feelings, accumulated dealings with"
};

resource 'SYNS' (44, PFM_MIN_PRIO) {                                                              /*
Enlightenment */
        "insight, illumination, intuitive discernment, transcendent comprehension"
};

resource 'SYNS' (45, PFM_MIN_PRIO) {                                                              /* Approach
*/
        "method, procedure, style, manner, manner of doing, one's own way"
};

resource 'SYNS' (46, PFM_MIN_PRIO) {                                                              /* Self-
Interest */
        "self serving, self centered, narcisistic, selfishness," self absorbed, egocentric"
};

resource 'SYNS' (47, PFM_MIN_PRIO) {                                                              /* Morality
*/
        "selflessness, altruism, benevolence, generosity"
};

resource 'SYNS' (48, PFM_MIN_PRIO) {                                                              /* Attitude
*/
        "demeanor, manner of approach, countenance, behavioral outlook, perspective on doing"
};

resource 'SYNS' (49, PFM_MIN_PRIO) {                                                              /*
Prerequisites */
        "essential steps, necessary requisites, compulsory stipulation"
};

resource 'SYNS' (50, PFM_MIN_PRIO) {                                                              /* Strategy
*/
        "scheme, tactic, plan, ploy, decided approach"
};

resource 'SYNS' (51, PFM_MIN_PRIO) {                                                              /* Analysis
*/
        "evaluation, examination, breakdown of situation, close investigation, scrutinization"
};

resource 'SYNS' (52, PFM_MIN_PRIO) {                                                              /*
Preconditions */
        "provision, prescribed specification, imposed stipulation, limiting perameters, imposed limitations"
};

resource 'SYNS' (53, PFM_MIN_PRIO) {                                                              /* State-of-
Being */
        "essence, one's true self, true self, essential nature, core being"
};

resource 'SYNS' (54, PFM_MIN_PRIO) {                                                              /* Situation
*/
        "how things stand rationally, a reasoned evaluation of environment, arranged context, environmental state,
surroundings, predicament"
};

resource 'SYNS' (55, PFM_MIN_PRIO) {                                                              /*
Circumstances */
        "how things stand emotionally, emotional evaluation of the environment, value of existing conditions,
relationship to others"
};

resource 'SYNS' (56, PFM_MIN_PRIO) {                                                              /* Sense-of-
Self */
        "perception of self, self image, self identity, self attribution"
};

resource 'SYNS' (57, PFM_MIN_PRIO) {                                                              /* Knowledge
*/
        "held truth, maintained information, presumed facts, accepted ideas"
};

resource 'SYNS' (58, PFM_MIN_PRIO) {                                                              /* Ability */
        "talent, knack, capability, capacity, faculty"
};

resource 'SYNS' (59, PFM_MIN_PRIO) {                                                              /* Desire */
        "want, favor, like, covet, prefer, wish, aspire"
};

resource 'SYNS' (60, PFM_MIN_PRIO) {                                                              /* Thought */
        "consideration, contemplation, ponderence, musing, reflection"
};

resource 'SYNS' (61, PFM_MIN_PRIO) {                                                              /*
Rationalization */
        "fabricated excuse, ulterior explanation, false justification, artificial reason"
};

resource 'SYNS' (62, PFM_MIN_PRIO) {                                                              /* Commitment
*/
        "dedication, devotion, steadfastness, zeal"
};

resource 'SYNS' (63, PFM_MIN_PRIO) {                                                              /*
Responsibility */
        "assumed propriety, believed appropriateness, self designated aptness, accepted suitability"
};
```

```
resource 'SYNS' (64, PFM_MIN_PRIO) {                                    /* Obligation
*/
        "agreement, pledge, contract, accepted compulsion, emotional contract"
};

resource 'SYNS' (65, PFM_MIN_PRIO) {                                    /* permission
*/
        "constrained ability, limited capability, restricted capacity, hindered performance, allowed limitations,
restrained utility"
};

resource 'SYNS' (66, PFM_MIN_PRIO) {                                    /* Need */
        "subjective necessity, urge, demand, imperative"
};

resource 'SYNS' (67, PFM_MIN_PRIO) {                                    /* Expediency
*/
        "advisability, convenience, prudent efficiency"
};

resource 'SYNS' (68, PFM_MIN_PRIO) {                                    /* Deficiency
*/
        "inadequacy, insufficiency, deficit, unfulfilled need"
};

resource 'SYNS' (69, PFM_MIN_PRIO) {                                    /* Truth */
        "honesty, correct information, correct notion, verity"
};

resource 'SYNS' (70, PFM_MIN_PRIO) {                                    /* Evidence
*/
        "proof, indicator, supporting information, corroborating facts, grounds for belief, substantiation"
};

resource 'SYNS' (71, PFM_MIN_PRIO) {                                    /* Suspicion
*/
        "wary approach, partially justified apprehensiveness, informed doubt, doubt based on evidence, sensible caution"
};

resource 'SYNS' (72, PFM_MIN_PRIO) {                                    /* Falsehood
*/
        "erroneousness, untruth, erroneous notion, mistaken, astray, dishonest, fabrication"
};

resource 'SYNS' (73, PFM_MIN_PRIO) {                                    /* Value */
        "utility, objective appraisal, general usefulness"
};

resource 'SYNS' (74, PFM_MIN_PRIO) {                                    /* Confidence
*/
        "hopeful prospects, positive expectations, faithful anticipation, optimism"
};

resource 'SYNS' (75, PFM_MIN_PRIO) {                                    /* Worry */
        "anxiety, concern, apprehension, misgivings"
};

resource 'SYNS' (76, PFM_MIN_PRIO) {                                    /* Worth */
        "subjective value, individual appraisal, personal importnce"
};

resource 'SYNS' (77, PFM_MIN_PRIO) {                                    /* Closure */
        "finishing, completion, resolution, recursive"
};

resource 'SYNS' (78, PFM_MIN_PRIO) {                                    /* Hope */
        "desired expectation, optimistic anticipation, confident aspiration, promise, encouraging outlook"
};

resource 'SYNS' (79, PFM_MIN_PRIO) {                                    /* Dream */
        "aspire, desiring the unlikely, pulling for the doubtful, airy hope, glimmer, far fetched desire"
};

resource 'SYNS' (80, PFM_MIN_PRIO) {                                    /* Denial */
        "not accepting, refusal to end, unwillingness to let go, refusal to back down, stubbornness, uncompliant"
};

resource 'SYNS' (81, PFM_MIN_PRIO) {                                    /*
Investigation */
        "inquiry, research, probe, sleuthing, delving, query"
};

resource 'SYNS' (82, PFM_MIN_PRIO) {                                    /* Appraisal
*/
        "first impression, preliminary understanding, initial approach, initial assimilation"
};

resource 'SYNS' (83, PFM_MIN_PRIO) {                                    /*
Reappraisal */
        "reassess, rechecking, checking up, re-examining a conclusion, re-evaluating a conclusion"
};

resource 'SYNS' (84, PFM_MIN_PRIO) {                                    /* Doubt */
        "pessimism, uninformed misgivings, uncertainty, trepidation, distrust"
};


resource 'SYNS' (85, PFM_MIN_PRIO) {                                    /* Ability */
        "innate capacity, capability, talent for, inherent proficiency"
};

resource 'SYNS' (86, PFM_MIN_PRIO) {                                    /* Acceptance
*/
        "acquiescence, tolerance, allowance for, consent, submission"
};

resource 'SYNS' (87, PFM_MIN_PRIO) {                                    /* Accurate
*/
```

```
        "within tolerance, sufficient, adequate, acceptable, passable"
};

resource 'SYNS' (88, PFM_MIN_PRIO) {                                          /* Actuality
*/
        "the true state of things, objective reality, factuality, demonstrable existence, demonstrable reality"
};

resource 'SYNS' (89, PFM_MIN_PRIO) {                                          /* Avoid */
        "evade, dodge, elude, escape, steer clear of, prevent"
};

resource 'SYNS' (90, PFM_MIN_PRIO) {                                          /* Aware */
        "outward perceptiveness, external sensitivity, consciousness of the external, responsive"
};

resource 'SYNS' (91, PFM_MIN_PRIO) {                                          /* Cause */
        "engender, induce, elicit, determinant, reason for, factor, effector, source, agent, antecedent"
};

resource 'SYNS' (92, PFM_MIN_PRIO) {                                          /* Certainty
*/
        "sureness, definiteness, having no doubts, total reliability, indisputability, irrefutability, unmistakability,
certitude, conviction"
};

resource 'SYNS' (93, PFM_MIN_PRIO) {                                          /* Change */
        "altering, altering force, modify, reshape, adjust, adapt"
};

resource 'SYNS' (94, PFM_MIN_PRIO) {                                          /* Chaos */
        "randomness, anarchy, disorder, formlessness, noncohesion"
};

resource 'SYNS' (95, PFM_MIN_PRIO) {                                          /* Conscience
*/
        "forgoing for fear of consequences, forgo, forbearance, temperance, abstinence, restraining oneself"
};

resource 'SYNS' (96, PFM_MIN_PRIO) {                                          /*
Consideration */
        "deliberation, contemplation, ponder, weigh in the mind, mull"
};

resource 'SYNS' (97, PFM_MIN_PRIO) {                                          /* controlled
-- was Calm */
        "regulate, organized management, steer, conduct, guide, manipulate, focused organization"
};

resource 'SYNS' (98, PFM_MIN_PRIO) {                                          /* Deduction
*/
        "drawing a conclusion, process of elimination, demonstrative reasoning, narrowing to a single point"
};

resource 'SYNS' (99, PFM_MIN_PRIO) {                                          /* Desire */
        "drive, motivational goal, unfulfillment, source of discontent, essence of motivation"
};

resource 'SYNS' (100, PFM_MIN_PRIO) {                                    /* Determination */
        "ascertaining causes, discovering causes, finding the reasons why, figuring out factors, discerning antecedents"
};

resource 'SYNS' (101, PFM_MIN_PRIO) {                                    /* Disbelief */
        "refusal to accept, distrust, find unconvincing, find false, unpersuadability"
};

resource 'SYNS' (102, PFM_MIN_PRIO) {                                    /* Effect */
        "result, consequence, outcome, culmination, the ensuing"
};

resource 'SYNS' (103, PFM_MIN_PRIO) {                                    /* Ending */
        "conclusion, finish, completion, termination, close"
};

resource 'SYNS' (104, PFM_MIN_PRIO) {                                    /* Equity */
        "balance, fairness, parity, equilibrium, level, even"
};

resource 'SYNS' (105, PFM_MIN_PRIO) {                                    /* Evaluation */
        "appraisal, analysis, assessment, survey, examination"
};

resource 'SYNS' (106, PFM_MIN_PRIO) {                                    /* Expectation */
        "anticipated results, eventual outcome, presumed prospects, probable denouement, likely consequences"
};

resource 'SYNS' (107, PFM_MIN_PRIO) {                                    /* Faith */
        "acceptance without proof, steadfast belief, confidence in unproven, credence, unquestioned trust"
};

resource 'SYNS' (108, PFM_MIN_PRIO) {                                    /* Feeling */
        "empathy, emotional sensibility, affective outlook, sentiment, emotional assessment"
};

resource 'SYNS' (109, PFM_MIN_PRIO) {                                    /* Help */
        "aid, assist, support, bolster, abet"
};

resource 'SYNS' (110, PFM_MIN_PRIO) {                                    /* Hinder */
        "retard, obstruct, impede, fetter, undermine, block, burden, encumber, thwart"
};

resource 'SYNS' (111, PFM_MIN_PRIO) {                                    /* Hunch */
        "intuition, premonition, impression, suspicion"
};

resource 'SYNS' (112, PFM_MIN_PRIO) {                                    /* Inaction */
        "passive reaction, inactive response, achieve through not doing"
};

resource 'SYNS' (113, PFM_MIN_PRIO) {                                    /* Induction */
        "postulate, predicate, conjecture, infer, hypothesize, determine possibility"
};
```

```
resource 'SYNS' (114, PFM_MIN_PRIO) {                                          /* Inequity */
        "imbalance, unfair, disparity, unequal, uneven, disproportionate"
};

resource 'SYNS' (115, PFM_MIN_PRIO) {                                          /* Inertia */
        "tendency to continue, a change resistent pattern,  continuation, following an established direction"
};

resource 'SYNS' (116, PFM_MIN_PRIO) {                                          /* Knowledge */
        "learnedness, held truths, authoritative certainty, generally agreed upon truths"
};

resource 'SYNS' (117, PFM_MIN_PRIO) {                                          /* Logic */
        "linear reasoning, rationality, structural sensibility, syllogistics"
};

resource 'SYNS' (118, PFM_MIN_PRIO) {                                          /* Non-acceptance */
        "run counter to, reject, decline, repudiate, resist, refusal to compromise"
};

resource 'SYNS' (119, PFM_MIN_PRIO) {                                          /* Non-Accurate */
        "not within tolerance, insufficiency, inadequacy, deviancy, deficient to the purpose"
};

resource 'SYNS' (120, PFM_MIN_PRIO) {                                          /* Oppose */
        "object to, speak out against, argue against, protest, dispute, show disapproval of, detract from"
};

resource 'SYNS' (121, PFM_MIN_PRIO) {                                          /* Order */
        "structure, patterned arrangement, organization, patterned formation, formation, configuration, patterned
sequence"
};

resource 'SYNS' (122, PFM_MIN_PRIO) {                                          /* Perception */
        "appearances, how things seem to be, discernment, a particular reading of things, a point of view on reality, a
way of seeing"
};

resource 'SYNS' (123, PFM_MIN_PRIO) {                                          /* Possibility */
        "plausibility, viability, conceivable eventualities, open assessment"
};

resource 'SYNS' (124, PFM_MIN_PRIO) {                                          /* Potentiality */
        "chance, precariousness, focusing on the uncertain, going with the improbable, the only feasible"
};

resource 'SYNS' (125, PFM_MIN_PRIO) {                                          /* Proaction */
        "to initiate action, execute, undertake, commit, implement"
};

resource 'SYNS' (126, PFM_MIN_PRIO) {                                          /* Probability */
        "likelihood, prospective, predictable, promising"
};

resource 'SYNS' (127, PFM_MIN_PRIO) {                                          /* Process */
        "chain of interactions, manner of procedure, cause/effect relation, progression, ongoing pull or tendency"
};

resource 'SYNS' (128, PFM_MIN_PRIO) {                                          /* Production */
        "reassess, rechecking, checking up, re-examining a conclusion, re-evaluating a conclusion"
};

resource 'SYNS' (129, PFM_MIN_PRIO) {                                          /* Projection */
        "extrapolation, inference, extension of past to future"
};

resource 'SYNS' (130, PFM_MIN_PRIO) {                                          /* Protection */
        "defense, safeguard, preservation, precaution"
};

resource 'SYNS' (131, PFM_MIN_PRIO) {                                          /* Proven */
        "verified, confirmed, corroborated, established, demonstrated, shown"
};

resource 'SYNS' (132, PFM_MIN_PRIO) {                                          /* Pursuit */
        "seek, go after, attempt to achieve, look for, directed effort"
};

resource 'SYNS' (133, PFM_MIN_PRIO) {                                          /* Re-evaluation */
        "re-appraisal, further assessment, subsequent analysis, scrutiny of first impressions"
};

resource 'SYNS' (134, PFM_MIN_PRIO) {                                          /* Reaction */
        "response, reply, acting from stimulus, goaded to action"
};

resource 'SYNS' (135, PFM_MIN_PRIO) {                                          /* Reconsideration */
        "re-examining conclusions, rethinking, to mull over again, further deliberation, additional scrutiny"
};

resource 'SYNS' (136, PFM_MIN_PRIO) {                                          /* Reduction */
        "determining probability, comparisons of potentiality, measurement of likelihood, judging probabilities"
};

resource 'SYNS' (137, PFM_MIN_PRIO) {                                          /* Result */
        "ramifications of an effect, consequence, repercussion, impact, end product"
};

resource 'SYNS' (138, PFM_MIN_PRIO) {                                          /* Self-Aware */
        "self-conscious, conscious of one's existence, self-perceiving, self-appreciating, self-cognizant"
};

resource 'SYNS' (139, PFM_MIN_PRIO) {                                          /* Speculation */
        "prognostication, surmising possibilities, conjecturing"
};

resource 'SYNS' (140, PFM_MIN_PRIO) {                                          /* Support */
        "commend, extol, endorse, back, compliment, laud"
};

resource 'SYNS' (141, PFM_MIN_PRIO) {                                          /* Temptation */
        "indulge, embracing immediate benefits, intemperance, immoderation"
```

```
};

resource 'SYNS' (142, PFM_MIN_PRIO) {                                           /* Test */
        "trial of validity, examination, audit, inspection, scrutinization"
};

resource 'SYNS' (143, PFM_MIN_PRIO) {                                           /* Theory */
        "structured explanation, concrete hypothesis, systematized descriptive knowledge, description of linear
connections"
};

resource 'SYNS' (144, PFM_MIN_PRIO) {                                           /* Thought */
        "the process of consideration, thinking,  contemplation, mental attention, running over in your mind"
};

resource 'SYNS' (145, PFM_MIN_PRIO) {                                           /* Trust */
        "untried acceptance, untested belief in, accept implicitly, assumed dependability, unquestioned reliance in"
};

resource 'SYNS' (146, PFM_MIN_PRIO) {                                           /* Un-Ending */
        "continual, ongoing, perpetual, ceaseless, interminable, incessant, perennial"
};

resource 'SYNS' (147, PFM_MIN_PRIO) {                                           /* Uncontrolled */
        "unregulated, disorganized, unfocused, rampant, unguided, open, frenzy"
};

resource 'SYNS' (148, PFM_MIN_PRIO) {                                           /* Unproven */
        "unverified, unconfirmed, unestablished, undemonstrated, untried "
};
```

```
/**********************************************************************
        TEXTWRAP.CC
        Displays wrapped text
        (c) 1993 Screenplay Systems
        Authors:            S. Greenfield & C. Huntley
        Created:            April 27, 1993
        Revised:            $Id$
**********************************************************************

*/

#include "graphics.h"

#include "subtext.h"
#include "textwrap.h"


#pragma segment textwrap

#define OPEN_G_QUOTE        '\xC7'
#define CLOSE_G_QUOTE       '\xC8'

/* ------------------------------------------------Stephen---04/27/93---
        TextWrap::Constructor - Non-Document constructor.  No text
        substitution (Subtext) is provided.
----------------------------------------------------------------------- */
TextWrap::TextWrap(TGraphEnv* pGraphEnv, GLRect* rect, char* theText, gl_font_t font, short size, gl_face_t face)
                    : fTextHdl (NULL),
                      fLineWrapHdl (NULL),
                      fStyleRunTblHdl (NULL),
                      fStyleRecsHdl (NULL),
                      fNmOfStyleRuns (0),
                      fNmOfStyleRecords (0),
                      fLastCharRunStart (byte_cnt (-1)),
                      fRect (rect),
                      fFont (font),
                      fSize (size),
                      fFace (face)
{
        assert(pGraphEnv);

        fTextLength = strlen(theText);

        Wrap(pGraphEnv, theText);
        rect->bottom = fRect->bottom;
} /* TextWrap::TextWrap */


/* ------------------------------------------------Stephen---04/27/93---
        TextWrap::Constructor - Document constructor.  Text substitution via
        Subtext is provided.
----------------------------------------------------------------------- */
TextWrap::TextWrap(DRDoc* theDoc, TGraphEnv* pGraphEnv, GLRect* rect, char* theText, gl_font_t font, short size,
gl_face_t face)
                    : fTextHdl (NULL),
                      fLineWrapHdl (NULL),
                      fStyleRunTblHdl (NULL),
                      fStyleRecsHdl (NULL),
                      fNmOfStyleRuns (0),
                      fNmOfStyleRecords (0),
                      fLastCharRunStart (byte_cnt (-1)),
                      fRect (rect),
                      fFont (font),
                      fSize (size),
                      fFace (face)
{
        assert(pGraphEnv);

        //      Determine if the text contains any substitution text, and if so, do substitution

        SubText* SbTxt = NULL;
        fTextLength = strlen(theText);
        for (byte_cnt n=0; n<fTextLength; ++n) {
                if (theText[n] == '{') {
                        SbTxt = new SubText(theDoc, theText, fTextLength);
                        break;
                }
        }

        char *textToWrap;
        if (SbTxt)
                textToWrap = SbTxt->DoSubstitution(&fTextLength);
        else
                textToWrap = theText;

        Wrap(pGraphEnv, textToWrap);

        if (SbTxt)
                delete SbTxt;

        rect->bottom = fRect->bottom;
} /* TextWrap::TextWrap */


/* ---------------------------------------------------------------------
        TextWrap::Destructor
----------------------------------------------------------------------- */
TextWrap::~TextWrap(void)
{
        if (fLineWrapHdl)
                MMFree(fLineWrapHdl);

        if (fStyleRunTblHdl) {
                MM_UNUSE(fStyleRunTblHdl);
                MMFree(fStyleRunTblHdl);
        }

        if (fStyleRecsHdl) {
                MM_UNUSE(fStyleRecsHdl);
                MMFree(fStyleRecsHdl);
        }
```

```
        if (fTextHdl)
                MMFree(fTextHdl);

} /* TextWrap::~TextWrap */


/* -----------------------------------------------------------------------
        TextWrap::resize_lineWrap_tbl
------------------------------------------------------------------------- */
void TextWrap::resize_lineWrap_tbl(short tableSize)
{
        assert(tableSize > 0);

        byte_cnt allocSize = sizeof(TWLineWrap) * tableSize;
        if (fLineWrapHdl == NULL) {
                fLineWrapHdl = MM_ALLOC_INIT(allocSize, mm_no_flags, 0, "LineWrap table", NULL);
        }
        else {
                MM_UNUSE(fLineWrapHdl);
                MMReallocInit(fLineWrapHdl, allocSize, 0);
        }
        assert(fLineWrapHdl);
        fLineWraps = (TWLineWrap*)MM_USE(fLineWrapHdl);
} /* TextWrap::resize_lineWrap_tbl */


/* -----------------------------------------------------------------------
        TextWrap::add_style_run - adds a new style run into the style run
        table.  This function handles allocating and resizing the memory for
        the table.
        RETURNS index into the newly-added style run.
------------------------------------------------------------------------- */
ushort TextWrap::add_style_run(TWStyleRun* styleRun)
{
        ++fNmOfStyleRuns;
        byte_cnt allocSize = sizeof(TWStyleRun) * fNmOfStyleRuns;
        if (fStyleRunTblHdl == NULL) {
                fStyleRunTblHdl = MM_ALLOC_INIT(allocSize, mm_no_flags, 0, "Style Run Table", NULL);
        }
        else {
                MM_UNUSE(fStyleRunTblHdl);
                MMReallocInit(fStyleRunTblHdl, allocSize, 0);
        }
        assert(fStyleRunTblHdl);
        fStyleRunTable = (TWStyleRun*)MM_USE(fStyleRunTblHdl);

        memcpy(&fStyleRunTable[fNmOfStyleRuns-1], styleRun, sizeof(TWStyleRun));

        return (fNmOfStyleRuns - 1);

} /* TextWrap::add_style_run */


/* -----------------------------------------------------------------------
        TextWrap::add_style_record - If a record with the same styling doesn't
        already exist in the table, then add a new style record into the style
        record table.  This function handles allocating and resizing the memory
        for the table.
        RETURNS index into a style record, whether newly-added or simply located.
------------------------------------------------------------------------- */
ushort TextWrap::add_style_record(TWStyleRecord* styleRecord)
{
        //      First try to look for the record in the record table

        for (ushort index=0; index < fNmOfStyleRecords; ++index)
                if (memcmp(styleRecord, &fStyleRecords[index], sizeof(TWStyleRecord)) == 0)
        // Found same style record in table!
                        return (index);

        //      Record doesn't exist -- we'll have to add one

        ++fNmOfStyleRecords;
        byte_cnt allocSize = sizeof(TWStyleRecord) * fNmOfStyleRecords;
        if (fStyleRecsHdl == NULL) {
                fStyleRecsHdl = MM_ALLOC_INIT(allocSize, mm_no_flags, 0, "Style Records Table", NULL);
        }
        else {
                MM_UNUSE(fStyleRecsHdl);
                MMReallocInit(fStyleRecsHdl, allocSize, 0);
        }
        assert(fStyleRecsHdl);
        fStyleRecords = (TWStyleRecord*)MM_USE(fStyleRecsHdl);

        memcpy(&fStyleRecords[fNmOfStyleRecords-1], styleRecord, sizeof(TWStyleRecord));

        return (fNmOfStyleRecords - 1);

} /* TextWrap::add_style_record */


/* -----------------------------------------------------------------------
        TextWrap::parse_embedded_code - called when we are pointing to an
        open German Quote «.  This function does all the dirty work of
        constructing and adding the style record.

        A value is returned to tell the Wrap() function (our main client)
        what type of attribution occured.  This allows for margins to be
        recalculated locally.
------------------------------------------------------------------------- */
short TextWrap::parse_embedded_code(byte_cnt* n)
{
        assert(fText[*n] == OPEN_G_QUOTE);

        char            ch;
        byte_cnt        start_of_token = *n;
        byte_cnt        end_of_token;
        byte_cnt        i = *n;
        short           returnAction = 0;

        while ((ch = fText[++i]))
                if (ch == CLOSE_G_QUOTE) {
                        end_of_token = i;
                        break;
```

```
		}
	asserts(ch==CLOSE_G_QUOTE, "Missing closing quote in textwrap!");		// EVENTUALLY, ALLOW UNPAIRED
GQUOTE

	//	Build a styleRun and a StyleRecord, or use the last one in the case of adjacent style codes.

	ushort runIndex;

	if (fLastCharRunStart == start_of_token) {
			// Adjacent codes, continue to use same style run..
		runIndex					= fNmOfStyleRuns-1;
					// get index for current run
		TWStyleRun* styleRunPtr	= &fStyleRunTable[runIndex];
		fLastCharRunStart			= styleRunPtr->styleRunStart = end_of_token + 1;	//
Point to first char of the actual style text (NOT embedded code)
		styleRunPtr->skipToThisRun		+= (end_of_token - start_of_token) + 1;
	//	Calculate and ADD how many characters make up the embedded code area
	}
	else {
				// NO -- create new style run
		TWStyleRun styleRun;
		if ((fNmOfStyleRuns == 0) && (start_of_token != 0))  {			// Special case for
creating first run of non-formatted text: from fc 0 to start_of_token -1
			styleRun.styleRunStart	= 0;
			styleRun.styleIndex		= 0;
			styleRun.skipToThisRun	= 0;
			add_style_run(&styleRun);
	//	Add this first run

			ushort indexZero = add_style_record(&fCurStyleRecord);			//	This becomes
our "default" style
			assert(indexZero == 0);
		}

		//	Create the new style run for the codes we just parsed

		fLastCharRunStart		= styleRun.styleRunStart = end_of_token + 1;		//
Point to first char of the actual style text (NOT embedded code)
		styleRun.skipToThisRun	= (end_of_token - start_of_token) + 1;			//
Calculate how many characters make up the embedded code area
		runIndex				= add_style_run(&styleRun);
			//	Add the run into the style run table
	}

	//	Now that we know start and end of token, parse it into something useful

	i = start_of_token + 1;

	char cmdChar = fText[i];

	//	BOLD

	if (cmdChar == 'B') {
		if (fText[i+1] == '+')
			attrib_on(0, GL_BOLD);
		else
			attrib_off(0, GL_BOLD);
	}

	//	ITALICS

	else if (cmdChar == 'I') {
		if (fText[i+1] == '+')
			attrib_on(0, GL_ITALIC);
		else
			attrib_off(0, GL_ITALIC);
	}

	//	UNDERLINE

	else if (cmdChar == 'U') {
		if (fText[i+1] == '+')
			attrib_on(0, GL_UNDERLINE);
		else
			attrib_off(0, GL_UNDERLINE);
	}

	//	SET MARGINS M(First, Left, Right)

	else if (cmdChar == 'M') {
		set_margin_indents(start_of_token, end_of_token);
		returnAction = 1;
	}

	//	Store the current style record in the style table.  If the same style exists in the table, then use
that one

	fStyleRunTable[runIndex].styleIndex = add_style_record(&fCurStyleRecord);

	*n	= fLastCharRunStart;

	return (returnAction);

} /* TextWrap::parse_embedded_code */


/* ---------------------------------------------------------------------------
	TextWrap::set_margin_indents - sets the first, left and right indents.
	The format is: M(first,left,right).  The measurements are in pixels.
	Thus, 1 inch = 72.
--------------------------------------------------------------------------- */
void TextWrap::set_margin_indents(byte_cnt start_of_token, byte_cnt end_of_token)
{
	assert(fText[start_of_token + 2] == '(');
	assert(fText[end_of_token - 1] == ')');

	byte_cnt		firstPos		= start_of_token+3;
	byte_cnt		leftPos		= 0;
	byte_cnt		rightPos		= 0;

	for (byte_cnt n=firstPos; n<end_of_token; ++n)			//	An ugly way to parse this -- but it
works!
		if (fText[n] == ',') {
```

```
                        if (leftPos == 0)
                                leftPos = n+1;
                        else {
                                rightPos = n+1;
                                break;
                        }
                }

        assert((firstPos < leftPos) && (leftPos < rightPos));

        short   firstIndent     = atoi(&fText[firstPos]);
        short   leftIndent      = atoi(&fText[leftPos]);
        short   rightIndent     = atoi(&fText[rightPos]);

        assert(firstIndent >=0 && firstIndent < 8*72);                  // Just for diagnostics sake, assume no
margin will be more than 8 inches
        assert(leftIndent >=0 && leftIndent < 8*72);
        assert(rightIndent >=0 && rightIndent < 8*72);

        fCurStyleRecord.firstLineIndent     = firstIndent;
        fCurStyleRecord.leftIndent                  = leftIndent;
        fCurStyleRecord.rightIndent                 = rightIndent;

} /* TextWrap::set_margin_indents */


/* -----------------------------------------------------------------------
        TextWrap::attrib_on - turn an attribute ON. (INLINE LATER)
----------------------------------------------------------------------- */
void TextWrap::attrib_on(ushort styleIndex, gl_face_t whichFace)
{
//      assert(styleIndex >= 0 && styleIndex < fNmOfStyleRecords);

        fCurStyleRecord.face |= whichFace;
        fFace = fCurStyleRecord.face;
        fpGraphEnv->SetTextAttr(fFont, fSize, fFace);

} /* TextWrap::attrib_on */


/* -----------------------------------------------------------------------
        TextWrap::attrib_off - turn an attribute OFF. (INLINE LATER)
----------------------------------------------------------------------- */
void TextWrap::attrib_off(ushort styleIndex, gl_face_t whichFace)
{
//      assert(styleIndex >= 0 && styleIndex < fNmOfStyleRecords);

        fCurStyleRecord.face &= ~whichFace;
        fFace = fCurStyleRecord.face;
        fpGraphEnv->SetTextAttr(fFont, fSize, fFace);

} /* TextWrap::attrib_off */


/* -----------------------------------------------------------------------
        TextWrap::reset_metrics - This sets our font metrics based on the
        currently selected font, size and face.
----------------------------------------------------------------------- */
void TextWrap::reset_metrics()
{
        fpGraphEnv->SetTextAttr(fFont, fSize, fFace);
        GL_FMETRIC        fontMetrics;
        fpGraphEnv->GetFontMetrics(&fontMetrics);
        fAscent                 = gl_get_ascent(&fontMetrics);
        fDescent                = gl_get_descent(&fontMetrics);
        fLeading                = gl_get_leading(&fontMetrics);
        fLineHeight             = fAscent + fDescent + fLeading;
} /* TextWrap::reset_metrics */


/* ------------------------------------------------Stephen---04/27/93---
        TextWrap::Wrap
        - add a param to force scanning for substitution text. (yes, no, scan)

        -       Each time a new fLineWraps is added, make sure to init all
                the fields ( like height).

        -       Remember that drawing is going to expect a \n at the end of each line,
                and now we don't!
        -       Also, check what the deal is with fLines == 0 (or should it be 1) for
                single lines of text.
----------------------------------------------------------------------- */
void TextWrap::Wrap(TGraphEnv* pGraphEnv, char* theText)
{
        assert(pGraphEnv);
        char* cp= theText;

        fpGraphEnv = pGraphEnv;
        reset_metrics();
        fTotalHeight      = 0;

        memset(&fCurStyleRecord, 0, sizeof(TWStyleRecord));

        //      ESSENTIAL INITIALIZATION

        fLines = 0;

        if ((!cp) || (cp[0]==0))                                        // Return if NULL
string...
                return;

        fTextHdl = MM_ALLOC(fTextLength+1, mm_no_flags, "TextWrap Text", NULL);
        assert(fTextHdl);
        fText = (char*)MM_USE(fTextHdl);
        assert(fText);

        HUGE_MEMCPY(fText, cp, fTextLength+1);                          // This is a huge_memcpy so
that blocks > 64K work under Windows

        //      BREAK UP THE LINES INTO WRAPPED TEXT
```

```
        gl_coord_t          marginWidth         = fRect->right - fRect->left;              // number of pixels of line
width
        gl_coord_t          thisLineWidth       = 0;
        gl_coord_t          lastLineBrkWidth= 0;                                                             //
The line's width as of the last break opportunity
        byte_cnt            lastLineBrkOp       = 0;
        byte_cnt            thisLineStart       = 0;
        gl_coord_t          thisLineHeight      = fLineHeight;                                      // Default
line height
        gl_coord_t          thisLineAscent      = fAscent;                                                   //
Default Ascent
        bool_t              firstLineOfPar      = true;                                                      //
flag indicates we are on first line of paragraph
        gl_coord_t          maxLineWidth        = marginWidth;                                      // number of
pixels of line width MINUS MARGINS (initially not subtracted)
        int                         ch;

        byte_cnt n = 0;
        while ((ch=cp[n])) {
                if (ch == OPEN_G_QUOTE) {                                                           // Embedded
'«' means formatting start...
                        if (parse_embedded_code(&n)) {                                              // Parse it
and determine if we need to recalc margins.
                                maxLineWidth                = marginWidth - fCurStyleRecord.firstLineIndent -
fCurStyleRecord.rightIndent;
                        }
                        continue;
                // n has already been set to the first char after the closing GQUOTE
                }

                if ((ch == ' ') || (ch == '-'))         {                                           // potential
locations of line breaks
                        lastLineBrkOp               = n;                                                     //
Remember this line break opportunity...
                        lastLineBrkWidth   = thisLineWidth;                            // ...and width as of this
point
                }

                //      A <NEWLINE> FORCES NEXT LINE IMMEDIATELY

                if (ch == '\n') {
                        resize_lineWrap_tbl(fLines+1);                                              // Allocate a
structure to hold THIS line
                        fLineWraps[fLines].lineEnd = n;                                             // WRAP: The
next line begins after the newline
                        fLineWraps[fLines].lineAscent = thisLineAscent;                // Save ascent
                        fLineWraps[fLines].lineHeight = thisLineHeight;                // Save height
                        fTotalHeight += thisLineHeight;
                        thisLineWidth               = 0;                                                     //
Since we're forcing a <newline>, we reset the line width to 0
                        lastLineBrkWidth  = 0;                                                      // also, the
last legit line break is at the begining of the line, so it has zero width
                        thisLineStart               = fLineWraps[fLines].lineEnd+1;
                        lastLineBrkOp               = thisLineStart;                              // Start potential
break opportunity at the begining of the line
                        firstLineOfPar              = true;                                                  //
we are on first line of the next paragraph
                        maxLineWidth                = marginWidth - fCurStyleRecord.firstLineIndent -
fCurStyleRecord.rightIndent;
                        ++fLines;
                }

                //      DETERMINE IF THIS LINE HAS BECOME ELIBLE TO WRAP

                else {
#ifdef TOOLBOX
                        thisLineWidth += ::CharWidth(ch);                                                    //
Try to add width
#else
                        assert(false);
#endif
                        if ((thisLineWidth > maxLineWidth) && (ch != ' ')) {           // Allow spaces to extend past
right margin
                                if (lastLineBrkOp <= thisLineStart)
        // No line break opportunities on this line?!
                                        lastLineBrkOp = n-1;
                // No -- back up one char and break anyway
                                if (lastLineBrkOp >= thisLineStart) {                                        //
Don't wrap if backed up only by one char and there's only one char on line!
                                        resize_lineWrap_tbl(fLines+1);
        // Allocate a structure to hold this line
                                        fLineWraps[fLines].lineEnd = lastLineBrkOp;                 // WRAP: The
next line begins on the character after the last word-break opportunity
                                        fLineWraps[fLines].lineAscent = thisLineAscent;             // Save
ascent
                                        fLineWraps[fLines].lineHeight = thisLineHeight;             // Save
height
                                        fTotalHeight += thisLineHeight;
                                        thisLineWidth -= lastLineBrkWidth;                                   //
Subtract off the width of the line we're going to wrap
                                        thisLineStart = fLineWraps[fLines].lineEnd+1;
                                        if (firstLineOfPar) {
                // This check prevents excessive margine recalculation
                                                maxLineWidth = marginWidth - fCurStyleRecord.leftIndent -
fCurStyleRecord.rightIndent;
                                                firstLineOfPar = false;
                // we are no longer on first line of the next paragraph
                                        }
                                        ++fLines;
                                }
                        }
                }

                ++n;
                // Next character
        }

        //      CHECK FOR NULL-TERMINATED LINE NOT ENDING IN <NEWLINE>

        if (thisLineWidth > 0) {
                resize_lineWrap_tbl(fLines+1);                                              // Allocate a
structure to hold THIS line
```

```
                fLineWraps[fLines].lineEnd = n-1;                                       // WRAP: Position to last byte
before null
                fLineWraps[fLines].lineAscent = thisLineAscent;                // Save ascent
                fLineWraps[fLines].lineHeight = thisLineHeight;                // Save height
                fTotalHeight += thisLineHeight;
                ++fLines;
        }

        fRect->bottom = fRect->top + fTotalHeight;

        MM_UNUSE(fTextHdl);
        MM_UNUSE(fLineWrapHdl);

} /* TextWrap::Wrap */


#if 0
/* -----------------------------------------------------------------------
        TextWrap::DrawLine - Draws a single line at the current pen loc.
----------------------------------------------------------------------- */
gl_coord_t TextWrap::DrawLine(TGraphEnv* pGraphEnv, short whichLine, gl_coord_t top, gl_coord_t left, gl_coord_t bottom,
gl_coord_t right, gl_just_t just, bool_t vCenter)
{

}
#endif

/* ----------------------------------------------------Stephen---04/27/93---
        TextWrap::draw - draw the entire textwrap.  The coordinate positions
        are passed in local coordinates.  If pUpdateInfo isn't null, then
        we get the top and bottom coordiantes of the local update rect to
        determine if the line is anywhere on screen.  NOTE that the left
        and right position are not examined.

        If we start to draw BELOW the bottom of the update rect, than all
        drawing is halted -- since there can be no more to draw.
----------------------------------------------------------------------- */
gl_coord_t TextWrap::Draw(TGraphEnv* pGraphEnv, const VwPaneUpdateInfo* pUpdateInfo, const Printing* pPrintMgr,
gl_coord_t top, gl_coord_t left, gl_coord_t bottom, gl_coord_t right, gl_just_t just, bool_t vCenter)
{
        if (fLines == 0)
                return (fLineHeight);

        gl_coord_t      vPos = top;
        gl_coord_t      textY = 0;
        byte_cnt        thisLineStart = 0;
        byte_cnt        thisLineEnds = 0;
        short           thisLineHeight = fLineHeight;
        short           thisLineAscent = fAscent;
        GLRect          locUpdateRect;
        bool_t          firstLineOfPar;                                                                         //
True for first line of a paragraph

        if (pUpdateInfo)
                pUpdateInfo->InqLocRgn()->GetRect(&locUpdateRect);

        fPrinting = (pPrintMgr != NULL);
        if (fPrinting)
                textY = fLineHeight;

        fText           = (char*)MM_USE(fTextHdl);
        fLineWraps      = (TWLineWrap*)MM_USE(fLineWrapHdl);

        pGraphEnv->SetTextAttr(fFont, fSize, fFace);

        ushort runIndex = 0;
        TWStyleRecord* styleRecPtr = NULL;

        //      LOOP THROUGH ALL LINES TO BE DRAWN

        for (short line=0; line<fLines; ++line) {

                if (line > 0) {
                        thisLineStart   = fLineWraps[line-1].lineEnd + 1;          // This line begins at previous
lines end + 1 (if not first line)
                        firstLineOfPar  = (fText[thisLineEnds] == '\n');           // NOTE: thisLineEnds is
actually index into the previous line ends -- which is what we want
                }
                else {
                        // This stuff true ONLY for first line of textwrap
                        thisLineStart   = 0;
                        firstLineOfPar  = true;
                }

                thisLineStart   = (line > 0) ? fLineWraps[line-1].lineEnd + 1 : 0;              // This line begins at
previous lines end + 1 (if not first line)
                thisLineEnds    = fLineWraps[line].lineEnd;
                thisLineHeight  = (gl_coord_t)fLineWraps[line].lineHeight;
                thisLineAscent  = (gl_coord_t)fLineWraps[line].lineAscent;

                if (fPrinting) {
                        if (textY > pPrintMgr->GetPageHeight() - fDescent) {
                                if (pPrintMgr->NextPage(pPrintMgr->GetPrinterEnv()) != NOERR) {
//                                      asserts(false, "NextPage Failed!\n");
                                        break;
                                }
                                textY = thisLineHeight;
                                vPos = top;
                        }
                }

                //      A null byte is stuffed here for compatibility with the "old style" of GLStrRect()

                char savedByte                  = fText[thisLineEnds+1];
                fText[thisLineEnds+1]   = 0;

                //      NOTE: GLSetRect draws by positioning the top of the first line inside the rect

                if (just == GL_JUST_CENTER) {
                        GLRect drawRect;
                        if (vCenter) {
                                gl_coord_t centeredPos = top + (((bottom-top)/2) - ((fLines*thisLineHeight)/2)) +
(line * thisLineHeight);
```

```
                                        GLSetRect(&drawRect, centeredPos, left, centeredPos+thisLineHeight, right);
                                }
                                else GLSetRect(&drawRect, vPos, left, vPos+thisLineHeight, right);
                        // vPos subtracted to account for differences between GLStrRect & GLDrawStr
                                pGraphEnv->StrRect((char*)&fText[thisLineStart], drawRect, GL_JUST_CENTER, false);
                        }

                        //      NOTE: GLDrawStr draws by moving to the BASELINE of a font

                        else {
                                if (fNmOfStyleRuns > 0) {
                                        bool_t firstSegOnLine       = true;
        // Flag is true to do begining-of-line positioning
                                        byte_cnt runBegin = fStyleRunTable[runIndex].styleRunStart;
                                // Where does the "current" run begin?
                                        byte_cnt thisSegmentStart = thisLineStart;
                                                // start ar begining of line
                                        if (thisSegmentStart == (runBegin - fStyleRunTable[runIndex].skipToThisRun))      //
Test for attribute at begining of line
                                                thisSegmentStart = runBegin;
                                        TWStyleRun* thisRun;
                        // Purely diagnostic
                                        TWStyleRun* nextRun;

                                        do {
                                                thisRun = &fStyleRunTable[runIndex];                                    //
purely diagnostic
                                                nextRun = &fStyleRunTable[runIndex+1];                                  //
purely diagnostic

                                                byte_cnt runEnd = (fStyleRunTable[runIndex+1].styleRunStart-1) -
fStyleRunTable[runIndex+1].skipToThisRun;
                                                byte_cnt thisSegmentEnd = MIN(runEnd, thisLineEnds);

                                                //      Is this the start of a run?  If so, set attribute

                                                if (thisSegmentStart == runBegin) {
                                                        ushort styleIndex = fStyleRunTable[runIndex].styleIndex;
                                                        styleRecPtr = &fStyleRecords[styleIndex];
                                                        if (styleRecPtr->face != fFace)      {
                                                                fFace = styleRecPtr->face;
                                                                pGraphEnv->SetTextAttr(fFont, fSize, fFace);
                                                        }
                                                }

                                                //      Once for each line, calculate style-driven indents, position, then
draw the segment

                                                if (firstSegOnLine) {
                                                        gl_coord_t leftIndent;
                                                        if (styleRecPtr)
                                                                leftIndent = left + ((firstLineOfPar) ? styleRecPtr-
>firstLineIndent : styleRecPtr->leftIndent);
                                                        else
                                                                leftIndent = left;
                                                        pGraphEnv->MoveTo(leftIndent, vPos+thisLineAscent);
                                // position to start of line
                                                        firstSegOnLine = false;
                                                }

                                                ::DrawText((Ptr) &fText[thisSegmentStart], 0, (thisSegmentEnd-
thisSegmentStart)+1);        //      Draw the run....

                                                thisSegmentStart =          fStyleRunTable[runIndex+1].styleRunStart;
        // Look at start of next segment..
                                                if ((thisSegmentStart <= thisLineEnds) ||
                                // Go to next run if the next segment is on this line, or the next segment STARTS the next
line
                                                    (thisSegmentStart-fStyleRunTable[runIndex+1].skipToThisRun ==
thisLineEnds + 1)) {                                                            // more segments within line?
                                                        ++runIndex;
                                                                        // Yes -- look at next run
                                                        runBegin = fStyleRunTable[runIndex].styleRunStart;
                        // This is where the new run begins
                                                }

                                        } while (thisSegmentStart <= thisLineEnds);
                                // Continue so long as there are segments on the line
                                }
                                else {
                                        pGraphEnv->MoveTo(left, vPos+thisLineAscent);
                                        pGraphEnv->DrawStr((char*)&fText[thisLineStart]);
                                }

//      SPECIAL OPTIMIZATION FOR SCROLLING:
#if 0
                                bool_t skipDrawing = (pUpdateInfo && ((vPos+thisLineHeight) < locUpdateRect.top || vPos >
locUpdateRect.bottom));

                                if (!skipDrawing) {
                                        pGraphEnv->MoveTo(left, vPos);
                                        pGraphEnv->DrawStr((char*)&fText[thisLineStart]);
                                }
                                else if (vPos+thisLineHeight > locUpdateRect.bottom) {
                                        MM_UNUSE(fLineWrapHdl);
                                        MM_UNUSE(fTextHdl);
                                        fPrinting = false;
                                        fText[thisLineEnds+1] = savedByte;
                                        return (fTotalHeight);
                                }
#endif
                        }

                        vPos += thisLineHeight;                                                 // Increment BEFORE Drawing
                        fText[thisLineEnds+1] = savedByte;
                        textY += thisLineHeight;
        }
        MM_UNUSE(fLineWrapHdl);
        MM_UNUSE(fTextHdl);

        fPrinting = false;
        return (fTotalHeight);
} /* TextWrap::Draw */
```

```
/* ----------------------------------------------------------------------
        TextWrap::Export - Exports TextWrap text to a file.
------------------------------------------------------------------------ */
byte_cnt TextWrap::Export(FILE *pFile, TGraphEnv* pGraphEnv, gl_coord_t top, gl_coord_t left, gl_coord_t bottom,
gl_coord_t right, gl_just_t just, bool_t vCenter)
{
        fText           = (char*)MM_USE(fTextHdl);
        fLineWraps      = (TWLineWrap*)MM_USE(fLineWrapHdl);
        char*           textToWrite = fText;
        byte_cnt        size = fTextLength;
        hdl_t           convertedTextHdl = NULL;

        //      Unless secret CMD-OPTION key is held down, strip out all of TextWrap's internal formatting codes

        if (!(AP_CommandKey() && AP_OptionKey())) {
                convertedTextHdl = MM_ALLOC_INIT(size + 1, mm_no_flags, 0, "Converted TextWrap Text", NULL);
                assert(convertedTextHdl);
                char* convertedText = (char*)MM_USE(convertedTextHdl);

                size = StripFormatCodes(fText, convertedText, fTextLength);
                textToWrite     = convertedText;
        }


        err_t theErr = GN_Write(textToWrite, &size, pFile);
        assert(theErr == NOERR);

        if (convertedTextHdl) {
                MM_UNUSE(convertedTextHdl);
                MMFree(convertedTextHdl);
        }

        MM_UNUSE(fLineWrapHdl);
        MM_UNUSE(fTextHdl);

        return size;

} /* TextWrap::Export */


/* ----------------------------------------------------------------------
        StripFormatCodes - This C function strips formatting codes from text.
        Returns the new length of the stripped text.
------------------------------------------------------------------------ */
byte_cnt StripFormatCodes(char* srcText, char* destText, byte_cnt size)
{
        //      Copy all but the text within the german quotes...

        byte_cnt newSize = 0;
        for (byte_cnt i=0; i<=size; ++i) {
                if (srcText[i] == OPEN_G_QUOTE) {
                        while (srcText[++i] != CLOSE_G_QUOTE)         // skip over text within german quotes
                                ;
                }
                else
                        destText[newSize++] = srcText[i];            // byte-by-byte, copy the textwrap...
        }

        return (newSize-1);                                                     // -1 accounts for the
fact that even though we copied the Null, it doesn't count as length
} /* StripFormatCodes */


#pragma segment main


/* $Log:        textwrap.cc,v $
Revision 1.10  93/08/20  14:03:12  stephen
played with the SetChunk string function to see if it affected
performance.

Revision 1.9  93/06/10  14:51:35  stephen
I'm not sure why I checked it out...

Revision 1.8  93/05/31  18:23:29  stephen
Added a center feature to the textwrap Draw() function.

Revision 1.7  93/05/25  18:42:06  stephen
Textwrap now supports PRINTING!  Also, added leading between lines.

Revision 1.6  93/05/21  22:09:07  stephen
Working on Chris' outline-generated length bug.

Revision 1.5  93/05/16  15:17:55  stephen
Made use of String class use CHUNKSIZE.

Revision 1.4  93/05/13  14:55:54  stephen
Fix problems of substituted text being clipped in wrapped text,
plus problem of newline-terminated lines cutting off last word.

Revision 1.3  93/05/12  18:12:46  stephen
Fixed /n newline wrapping.

Revision 1.2  93/05/06  11:01:52  stephen
Implemented use of SubText substitution class.

Revision 1.1  93/05/03  16:42:44  stephen
Initial revision

 */
```

```
/* ------------------------------------------------------------------------
        TEXTWRAP.H
        Displays wrapped text
        Copyright (C) 1993 Screenplay Systems Inc.
        Revised:        $Id$
------------------------------------------------------------------------ */

#pragma once

#ifndef __TEXTWRAP__
#define __TEXTWRAP__

extern "C" {
        #include "ssi.h"
}
#include "stringx.h"
#include "tview.h"
#include "printx.h"

#include "consts.h"
#include "document.h"

#pragma segment textwrap

class TGraphEnv;

const Printing*         kNeverPrint             = NULL;

        //      C function for stripping codes from a text buffer.

        byte_cnt        StripFormatCodes(char* srcText, char* destText, byte_cnt size);


/*********************************************************************
        The TWLineWrap structure is used to keep track of information for
        each line of text.
 *********************************************************************/

typedef struct {
        long            lineEnd;                // character index into the end of the line
        uchar           lineAscent;             // ascent of this specific line
        uchar           lineHeight;             // height of this specific line
} TWLineWrap;


/*********************************************************************
        The TWStyleRuns structure keeps track of textual attribution.
        Each style run, character or paragraph, is entered into the table.

        A run is defined as:
                runBegin = fStyleRunTable[n].styleRunStart
                runEnd   = (fStyleRunTable[n+1].styleRunStart-1) -
                                        fStyleRunTable[n+1].skipToThisRun;
 *********************************************************************/

typedef struct {
        long            styleRunStart;  // Character index of the first char with this style
        short           styleIndex;             // Index into style table that contains formatting for this run

        uchar           skipToThisRun;  // Number of embedded code chars preceeding run to subtract off
styleRunStart when drawing previous run in order to avoid drawing embedded codes
} TWStyleRun;


/*********************************************************************
        The TWStyleRecord structure actually stores the "state" of each
        desired style.  Contained within are all the potential attributes
        we can assign to a style run.
 *********************************************************************/

typedef struct {
        gl_font_t       font;
        short           fontSize;
        gl_face_t       face;                           // Bold, Italic, Underline

        ushort          pictID;

        short           firstLineIndent;
        short           leftIndent;
        short           rightIndent;
        uchar           justification;

        uchar           hyperText;
} TWStyleRecord;


/* ------------------------------------------------------------------------
        TextWrap - Handles the wrapping and display of text.
------------------------------------------------------------------------ */
class EXPORT_CLASS TextWrap : public TObject {
public:
        TextWrap(TGraphEnv* pGraphEnv, GLRect* rect, char* theText, gl_font_t font, short size = GL_NO_SIZE, gl_face_t
face = GL_NORMAL);
        TextWrap(DRDoc* theDoc, TGraphEnv* pGraphEnv, GLRect* rect, char* theText, gl_font_t font, short size =
GL_NO_SIZE, gl_face_t face = GL_NORMAL);
        ~TextWrap(void);

        // PUBLIC UTILITIES
        virtual char*           ClassName(void) const                   { return "TextWrap"; }
        virtual class_t         ClassType(void) const                   { return kTextWrap; }
        virtual bool_t          IsOfType(const void *pType) const { return *(class_t*) pType == kTextWrap ||
TObject::IsOfType(pType); }
        virtual byte_cnt        GetObjSize(void)                        { return sizeof(TextWrap); }
        virtual byte_cnt        GetAllocSize(void)                              { return
MMGetSize(fLineWrapHdl); }

        void                            Wrap(TGraphEnv* pGraphEnv, char* theText);                      // Wrap the
text
        gl_coord_t                      Draw(TGraphEnv* pGraphEnv, const VwPaneUpdateInfo* pUpdateInfo, const
Printing* pPrintMgr, gl_coord_t top, gl_coord_t left, gl_coord_t bottom = 0, gl_coord_t right = 0, gl_just_t just =
GL_JUST_LEFT, bool_t vCenter = false);          // Draw the text, return pixel height
```

```
        byte_cnt                            Export(FILE *pFile, TGraphEnv* pGraphEnv, gl_coord_t top, gl_coord_t left,
gl_coord_t bottom = 0, gl_coord_t right = 0, gl_just_t just = GL_JUST_LEFT, bool_t vCenter = false);

        gl_coord_t                          GetTextHeight(void)                          { return fTotalHeight;
}
        gl_coord_t                          GetLineHeight(void)                          { return fLineHeight;
}
        short                               GetLines(void)     const              { return fLines; }


protected:
        // DATA MEMBERS
        TGraphEnv* fpGraphEnv;              // Kept around to avoid passing it to every function

        GLRect*             fRect;
        gl_font_t           fFont;
        short               fSize;
        gl_face_t           fFace;

        bool_t              fPrinting;              // TRUE during a draw() for printing
        gl_coord_t          fLineHeight;        // Height of lines
        gl_coord_t          fTotalHeight;       // Total Height in pixels
        gl_coord_t          fAscent;                // Ascent of font
        gl_coord_t          fDescent;               // Descent of font
        gl_coord_t          fLeading;               // Leading of font

        //         New TextWrap Data Members

        hdl_t                        fTextHdl;                      // Handle to text's memory block
        char*                        fText;                         // Ptr to text
        byte_cnt                     fTextLength;           // size in bytes of text

        hdl_t                        fLineWrapHdl;          // Handle to data block used to store line-by-line data
        TWLineWrap*                  fLineWraps;                    // Data associated with each line, including wrapping info
        ushort                       fLines;                        // Number of lines-1

        //         Support for Styling

        hdl_t                        fStyleRunTblHdl;   // Memory for style run table
        TWStyleRun*                  fStyleRunTable;                // Table for style runs
        ushort                       fNmOfStyleRuns;                // Number of style runs
        byte_cnt                     fLastCharRunStart;             // Points to first character of a run AFTER a style
definition; Used to merge adjacent style settings together

        hdl_t                        fStyleRecsHdl;                 // Memory for style records
        TWStyleRecord*      fStyleRecords;          // Table of style records
        ushort                       fNmOfStyleRecords;             // Number of style records

        TWStyleRecord       fCurStyleRecord;  // A style record which represents the current up-to-date styling

        // LOCAL UTILITIES

        void                reset_metrics();
        void                resize_lineWrap_tbl(short tableSize);
        ushort              add_style_run(TWStyleRun* styleRun);
        ushort              add_style_record(TWStyleRecord* styleRecord = NULL);
        void                get_style_record(TWStyleRecord* styleRecord, ushort styleIndex)              {
*styleRecord = fStyleRecords[styleIndex]; }
        short               parse_embedded_code(byte_cnt* n);

        void                set_margin_indents(byte_cnt start_of_token, byte_cnt end_of_token);
        void                attrib_on(ushort styleIndex, gl_face_t whichFace);
        void                attrib_off(ushort styleIndex, gl_face_t whichFace);

}; /* TextWrap */

#pragma segment main

/* xxxxxxxxxxxxxxxxxxxxxxxxxxxxxxxxxxxxxxxxxxxxxxxxxxxxxxxxxxxxxxxxxxxxxxxxxxxxxxxx
 * $Log:        textwrap.h,v $
 * Revision 1.10  93/08/20  14:04:03  stephen
 * played with the SetChunk string function to see if it affected
 * performance.
 *
 * Revision 1.9  93/05/31  18:25:15  stephen
 * Added a center feature to the textwrap Draw() function.
 *
 * Revision 1.8  93/05/27  16:36:00  stephen
 * Windows-specific const include fixed.
 *
 * Revision 1.7  93/05/25  18:42:33  stephen
 * Textwrap now supports PRINTING!  Also, added leading between lines.
 *
 * Revision 1.6  93/05/25  15:12:12  stephen
 * Added function to get height of individual line.
 *
 * Revision 1.5  93/05/13  14:56:30  stephen
 * Fix problems of substituted text being clipped in wrapped text,
 * plus problem of newline-terminated lines cutting off last word.
 *
 * Revision 1.4  93/05/12  18:13:03  stephen
 * Fixed /n newline wrapping.
 *
 * Revision 1.3  93/05/06  11:02:12  stephen
 * Implemented use of SubText substitution class.
 *
 * Revision 1.2  93/05/04  21:33:18  stephen
 * Minor changes.
 *
 * Revision 1.1  93/05/03  16:43:03  stephen
 * Initial revision
 *
 */

#endif /* __TEXTWRAP__ */
```

```
/*******************************************************************
        TOPICVW.CC
        Topic list view class
        (c) 1993 Screenplay Systems
        Authors:        S. Greenfield & C. Huntley
        Created:        July 19, 1993
        Revised:        $Id$
********************************************************************

*/

#include "tappl.h"
#include "apputls.h"
#include "graphics.h"
#include "tview.h"
#include "dramatic.h"
#include "document.h"
#include "dqs2.h"
#include "topicvw.h"


#pragma segment topicvw

#include "dqs-defs.h"

const gl_coord_t kInsetMargin = 12;

const GLColor     kMyCheckClr       = { 0x0000, 48059, 0x0000 };          // 48059 is "Apple" Green


/* ------------------------------------------------Stephen---03/19/93---
        TopicListView::Constructor
---------------------------------------------------------------------- */
TopicListView::TopicListView(DRDoc* theDoc, short InitialNmOfTopics, topic_action_proc pAction_proc, ItemList* pParent,
vw_flags vflags, const GLRect *extent, it_flags iflags, const GLColor *color)
            : TView(pParent, vflags, extent, iflags, color),
              fDQSWindow (NULL),
                   fPAction (pAction_proc),
                   fTLDataHdl (NULL),
                   fTLData (NULL),
                   fSelectionExists (false),
                   fAllocatedItems (InitialNmOfTopics),
                   fNmOfTopics (0),
                   fCheckMarksEnabled (false),
                   fDataInited (false)
{
        init_scrollers();

        fWindow            = pParent->GetParent();
        fApp               = (Dramatica*)GetParentApp();
        fAppPFMFile = fApp->GetPFMFile();
        fDoc               = theDoc;
        assert(fDoc);

}


/* ------------------------------------------------Stephen---04/18/93---
        TopicListView::Destructor
---------------------------------------------------------------------- */
TopicListView::~TopicListView(void)
{
        destruct_topicList_data();
}


/* ------------------------------------------------Stephen---04/18/93---
        TopicListView::init_topicList_data - Sets up our data.
---------------------------------------------------------------------- */
void TopicListView::init_topicList_data(void)
{
        fFont              = GL_GENEVA;                                          // 21 is GL_HELVETICA
        fFontSize          = 10;
        fFace              = GL_NORMAL;

        fpGraphEnv->Use();
        fpGraphEnv->SetTextAttr(fFont, fFontSize, fFace);
        GL_FMETRIC         fontMetrics;
        fpGraphEnv->GetFontMetrics(&fontMetrics);
        gl_coord_t         ascent            = gl_get_ascent(&fontMetrics);
        gl_coord_t         descent           = gl_get_descent(&fontMetrics);
        gl_coord_t         leading           = gl_get_leading(&fontMetrics);

        fAscent            = ascent;
        fLineHeight        = ascent + descent + leading;
        SetVLineSize(fLineHeight);
        fpGraphEnv->Unuse();

        size_t allocSize = sizeof(TLDataType) * fAllocatedItems;
        fTLDataHdl = MM_ALLOC_INIT(allocSize, mm_no_flags, 0, "Topic List", NULL);
        assert(fTLDataHdl);
        fTLData = (TLDataType*)MM_USE(fTLDataHdl);

        fSelectionExists = false;
        fRowSelected = 0;
}


/* ------------------------------------------------Stephen---04/18/93---
        TopicListView::destruct_topicList_data - disposes of our data.
---------------------------------------------------------------------- */
void TopicListView::destruct_topicList_data(void)
{
        assert(fDataInited);

        MM_UNUSE(fTLDataHdl);
        MMFree(fTLDataHdl);
}


/* ------------------------------------------------Stephen---07/19/93---
        TopicListView::SetTopic - Sets a topic at a particular point in the
```

```
        array.
------------------------------------------------------------------------ */
void TopicListView::SetTopic(short listPos, short topicID, char* topicText)
{
        assert(listPos < fAllocatedItems);
        fTLData[listPos].topicID          = topicID;
        fTLData[listPos].topicNamePID     = fTopicNamePool.AddString(topicText);
        fTLData[listPos].face                     = GL_NORMAL;
        fTLData[listPos].checkMark                = kTLNoCheck;
        SetGray(listPos, false);
        InvalRow(listPos);
} /* TopicListView::SetTopic */


/* --------------------------------------------------Stephen---07/19/93---
        TopicListView::Append - Appends a topic to the array.  Returns the
        row where the topic was appended into.
------------------------------------------------------------------------ */
short TopicListView::Append(short topicID, char* topicText)
{
        assert(fNmOfTopics < fAllocatedItems);
        SetTopic(fNmOfTopics++, topicID, topicText);
        return (fNmOfTopics-1);                                         // -1 accounts for the
increment of fNmOfTopics, converts to row
} /* TopicListView::Append */


/* ----------------------------------------------------------------------
        TopicListView::Delete - remove theRow from the list, move up the rest
        of the items, and inval the correct area of the view.
------------------------------------------------------------------------ */
void TopicListView::Delete(short theRow)
{
        assert(theRow >= 0 && theRow < fNmOfTopics);

        GLRect deletedRowRect;
        GetRowLocalRect(theRow, &deletedRowRect);
        GLRect lastRowRect;
        GetRowLocalRect(fNmOfTopics-1, &lastRowRect);

        if (theRow+1 < fNmOfTopics) {
                memmove(&fTLData[theRow], &fTLData[theRow+1], sizeof(TLDataType) * (fNmOfTopics-(theRow+1)));
        }
        --fNmOfTopics;
        memset(&fTLData[fNmOfTopics], 0, sizeof(TLDataType));
        deletedRowRect.left += 2;
        deletedRowRect.bottom = MIN(lastRowRect.bottom, fExtent.bottom);
        AP_InvalGLRect(GetParentWindowRef(), &deletedRowRect);
}

/* ----------------------------------------------------------------------
        TopicListView::Empty - remove all elements from the TopicListView.
------------------------------------------------------------------------ */
void TopicListView::Empty(void)
{
        if (fNmOfTopics) {
                GLRect topRowRect;
                GetRowLocalRect((short)GetVScrollPos(), &topRowRect);
                GLRect lastRowRect;
                GetRowLocalRect((short)(GetVScrollPos()+GetNumVLinesVis()-1), &lastRowRect);
                topRowRect.bottom = lastRowRect.bottom;

                fpGraphEnv->Use();
                fpGraphEnv->SetForeColor(kGLWhiteClr);
                fpGraphEnv->PaintRect(topRowRect);
                fpGraphEnv->Unuse();

                fNmOfTopics = 0;
                fSelectionExists = false;
                fRowSelected = 0;

                GLPoint goTo;
                goTo.x = 0;
                goTo.y = 0;
                AutoScrollTo(&goTo, NULL);

        }
}

/* --------------------------------------------------Stephen---07/19/93---
        TopicListView::InvalRow - Forces a row to be updated if visible.
------------------------------------------------------------------------ */
void TopicListView::InvalRow(short whichRow)
{
        GLRect localRect;
        GetRowLocalRect(whichRow, &localRect);
        GLRect testRect = localRect;
        localRect.left += 2;
//      localRect.right -= 16;                  // Maybe shouldn't be subtracted?

        GLInsetRect(&testRect, 1, 1);

        if (GLRectInRect(&testRect, &fExtent))
                AP_InvalGLRect(GetParentWindowRef(), &localRect);
} /* TopicListView::InvalRow */


/* ----------------------------------------------------------------------
        TopicListView::FindRow - Given an ID, get the row that contains
        that ID.  Return true if found, false otherwise. (a row of 0 is
        legitimate).
------------------------------------------------------------------------ */
bool_t TopicListView::FindRow(short ID, short* theRow)
{
        for (short row=0; row<fNmOfTopics; ++row) {
                if (GetTopicID(row) == ID) {
                        *theRow = row;
                        return (true);
                }
        }
        return (false);
} /* TopicListView::FindRow */
```

```
/* ------------------------------------------------------------------------
        TopicListView::SetGray -
------------------------------------------------------------------------ */
void TopicListView::SetGray(short row, bool_t drawGray, bool_t drawNow)
{
        assert(row<fNmOfTopics);

        fTLData[row].drawGray = drawGray;
        if (drawNow)
                InvalRow(row);

} /* TopicListView::SetGray */


/* ------------------------------------------------------------------------
        TopicListView::SetCheckMark - Sets the checkmark character for the
        desired row, being very careful about performing excessive updating.
------------------------------------------------------------------------ */
void TopicListView::SetCheckMark(short row, char checkMark, bool_t drawNow)
{
        assert(row<fNmOfTopics);

        char currentMark = fTLData[row].checkMark;
        fTLData[row].checkMark = checkMark;

        if (drawNow && fCheckMarksEnabled && (currentMark != checkMark)) {
                GLRect localRect;
                GetRowLocalRect(row, &localRect);
                localRect.right = localRect.left + kInsetMargin;

                GLRect testRect = localRect;
                GLInsetRect(&testRect, 1, 1);

                if (GLRectInRect(&testRect, &fExtent))
                        AP_InvalGLRect(GetParentWindowRef(), &localRect);
        }

} /* TopicListView::SetCheckMark */


/* ------------------------------------------------------------------------
        TopicListView::SetFace -
------------------------------------------------------------------------ */
void TopicListView::SetFace(short row, gl_face_t face, bool_t drawNow)
{
        assert(row<fNmOfTopics);

        fTLData[row].face = face;
        if (drawNow)
                InvalRow(row);

} /* TopicListView::SetFace */


/* ------------------------------------------------------------------------
        TopicListView::GetTopicText - Given a listPos, return the topic Text.
        If no listPos, assume the currently selected position.
------------------------------------------------------------------------ */
void TopicListView::GetTopicText(char* topicText, short listPos)
{
        short whichTopic = (listPos == -1) ? fRowSelected : listPos;

        fTopicNamePool.Use();
        strcpy(topicText, (char*)fTopicNamePool.DataPtr(fTLData[whichTopic].topicNamePID));
        fTopicNamePool.Unuse();
}

/* -------------------------------------------------Stephen---07/19/93---
        TopicListView::SetSelection - Sets the selection of the list.
------------------------------------------------------------------------ */
void TopicListView::SetSelection(short whichRow, bool_t saveAnswer)
{
        DeselectAll();
        fRowSelected = whichRow;

        //      Is topic even visible?  If not, scroll the list

        long topLine              = GetVScrollPos();
        short nmLinesVis  = (short)GetNumVLinesVis();
        if (whichRow >= topLine + nmLinesVis) {
                const long bumpFromBottom = 3;
                GLPoint goTo;
                goTo.x = 0;
                goTo.y = (whichRow - nmLinesVis) + bumpFromBottom;
                AutoScrollTo(&goTo, NULL);
        }
        else if (whichRow < topLine) {
                const long bumpFromTop = 3;
                GLPoint goTo;
                goTo.x = 0;
                goTo.y = whichRow - bumpFromTop;
                AutoScrollTo(&goTo, NULL);
        }

        draw_highlighting(fRowSelected, true);                  // Select
        fSelectionExists = true;

        if (fDQSWindow)
                fDQSWindow->SelectNewQuestion(fRowSelected, GetTopicID(fRowSelected), false, saveAnswer);
} /* void TopicListView::SetSelection */

/* -------------------------------------------------Stephen---07/19/93---
        TopicListView::DeselectAll - Removes selection & forces update
------------------------------------------------------------------------ */
void TopicListView::DeselectAll(void)
{
        if (fSelectionExists) {
                draw_highlighting(fRowSelected, false);     // Deselect
```

```
                fSelectionExists = false;
        }
} /* TopicListView::DeselectAll */

/* ---------------------------------------------------Stephen---04/18/93---
        TopicListView::draw_view - Does the bulk of drawing our Topic List
        view.
------------------------------------------------------------------------ */
void TopicListView::draw_view (const VwPaneUpdateInfo& updateInfo)
{
        assert(fDataInited);

        LgPoint         VwOrigin = *updateInfo.InqOffset();        // local coordinates for the view's origin

        gl_coord_t      X                       = (gl_coord_t)(VwOrigin.x);
        gl_coord_t      Y                       = (gl_coord_t)(VwOrigin.y);

        gl_face_t curFace = GL_NORMAL;
        gl_face_t rowFace;
        fpGraphEnv->SetTextAttr(fFont, fFontSize, curFace);
        gl_coord_t      rowHeight = (gl_coord_t)GetVLineSize();
        fTopicNamePool.Use();

        for (short row = 0; row<fNmOfTopics; ++row) {
                GLRect localRect;
                GetRowLocalRect(row, &localRect);
                localRect.left += (fCheckMarksEnabled) ? kInsetMargin : 2;

                rowFace=GetFace(row);
                if (rowFace != curFace) {
                        fpGraphEnv->SetTextAttr(fFont, fFontSize, rowFace);
                        curFace = rowFace;
                }

                bool_t drawGray = GetGray(row);
                fpGraphEnv->StrRect((char*)fTopicNamePool.DataPtr(fTLData[row].topicNamePID), localRect, GL_JUST_LEFT,
false, drawGray);

                if (fCheckMarksEnabled) {
                        short markType = GetCheckMark(row);


                        if (markType == kTLNoCheck) {
                                localRect.right = localRect.left - 1;
                                fpGraphEnv->EraseRect(localRect);
                        }
                        else if (markType == kTLCheckOn) {
//                              GLColor savedForeColor;
//                              if (AP_UseColor()) {
//                                      fpGraphEnv->GetForeColor(&savedForeColor);
//                                      fpGraphEnv->SetForeColor(kMyCheckClr);
//                              }
                                gl_coord_t X = localRect.left - kInsetMargin + 2;
                                gl_coord_t Y = localRect.top + fAscent - 2;
                                fpGraphEnv->MoveTo(X, Y-2);
                                fpGraphEnv->LineTo(X+2, Y);
                                fpGraphEnv->LineTo(X+6,Y-4);
//                              if (AP_UseColor())
//                                      fpGraphEnv->SetForeColor(savedForeColor);
                        }
                        else if (markType == kTLDot) {
                                gl_coord_t X = localRect.left - kInsetMargin;
                                gl_coord_t Y = localRect.top + fAscent;
                                fpGraphEnv->MoveTo(X+6, Y-3);
                                fpGraphEnv->LineTo(X+6, Y-3);
                        }
                        else if (markType == kTLDash) {
                                gl_coord_t X = localRect.left - kInsetMargin;
                                gl_coord_t Y = localRect.top + fAscent;
                                fpGraphEnv->MoveTo(X+3, Y-3);
                                fpGraphEnv->LineTo(X+7, Y-3);
                        }
                        else if (markType == kTLApprox) {
                                gl_coord_t X = localRect.left - kInsetMargin;
                                gl_coord_t Y = localRect.top + fAscent;
                                gl_coord_t h = X+3;
                                gl_coord_t v = Y-5;
                                for (short i=0; i<2; ++ i) {
                                        fpGraphEnv->MoveTo(h, v);
                                        fpGraphEnv->LineTo(h, v);

                                        fpGraphEnv->MoveTo(h+1, v-1);
                                        fpGraphEnv->LineTo(h+2, v-1);

                                        fpGraphEnv->MoveTo(h+3, v);
                                        fpGraphEnv->LineTo(h+4, v);

                                        fpGraphEnv->MoveTo(h+5, v-1);
                                        fpGraphEnv->LineTo(h+5, v-1);
                                        v += 3;
                                }
                        }
                        else {
                                localRect.right = localRect.left - 1;
                                fpGraphEnv->EraseRect(localRect);
                        }
                }

        }
        fTopicNamePool.Unuse();

                if (fSelectionExists)
                        draw_highlighting(fRowSelected, true);
} /* TopicListView::draw_view */


/* ---------------------------------------------------Stephen---04/19/93---
        TopicListView::draw_highlighting - Highlights or unhightlights a
        particular line.
------------------------------------------------------------------------ */
```

```
void TopicListView::draw_highlighting(short row, bool_t state)
{
	fpGraphEnv->Use();
#if 0
	LgRect rowRect;
	get_row_rect(row, &rowRect);
	doc_to_loc_rect(&rowRect, &localRect);
#endif
	GLRect localRect;
	GetRowLocalRect(row, &localRect);

	GLRect viewExtent = fExtent;
	viewExtent.right -= 16;
	viewExtent.top += 1;

	GLRect notUsedRect;
	if (GLSectRect(&localRect, &viewExtent, &notUsedRect)) {
		fpGraphEnv->PushAttribs();
		fpGraphEnv->SetClipRect(viewExtent);
		fpGraphEnv->InvertRect(localRect);
		fpGraphEnv->PopAttribs();
	}
	fpGraphEnv->Unuse();
} /* TopicListView::draw_highlighting */


/* --------------------------------------------------Stephen---07/19/93---
	TopicListView::GetRowLocalRect - calculates the rect of a row in document
	coordinates.
------------------------------------------------------------------------- */
void TopicListView::GetRowLocalRect(short row, GLRect* localRect)
{
	LgRect rowRect;
	get_row_rect(row, &rowRect);
	doc_to_loc_rect(&rowRect, localRect);
	--localRect->right;
}


/* --------------------------------------------------Stephen---07/19/93---
	TopicListView::get_row_rect - calculates the rect of a row in document
	coordinates.  NOTE: THIS FUNCTION DOESN'T CALCULATE LEFT & RIGHT
	CORRECTLY!!!
------------------------------------------------------------------------- */
void TopicListView::get_row_rect(short row, LgRect* rowRect)
{
	gl_coord_t	rowHeight = (gl_coord_t)GetVLineSize();
	rowRect->top	= (row * rowHeight);
	rowRect->bottom	= rowRect->top + rowHeight;
	rowRect->left	= 0;
	rowRect->right	= rowRect->left + ((fExtent.right - fExtent.left) - 16);
}


/* --------------------------------------------------Stephen---04/19/93---
	TopicListView::doc_to_loc_rect - Converts document LgRect to GLRect
------------------------------------------------------------------------- */
GLRect*	TopicListView::doc_to_loc_rect(LgRect* docRect, GLRect* localRect)
{
	doc_coord_t vOffset		= -GetLineVPosition(GetVScrollPos()) + pane_origin_y(&fCurPane);
	doc_coord_t hOffset		= -GetLineHPosition(GetHScrollPos()) + pane_origin_x(&fCurPane);

	localRect->top		= (short) (docRect->top	+ vOffset);
	localRect->left		= (short) (docRect->left	+ hOffset);
	localRect->bottom	= (short) (docRect->bottom + vOffset);
	localRect->right	= (short) (docRect->right	+ hOffset);

#if 0
	doc_coord_t lineVPos		= GetLineVPosition(GetVScrollPos());
	doc_coord_t lineHPos		= GetLineHPosition(GetHScrollPos());
	gl_coord_t	paneOriginY		= pane_origin_y(&fCurPane);
	gl_coord_t	paneOriginX		= pane_origin_x(&fCurPane);

	localRect->top		= (short) (docRect->top - lineVPos + paneOriginY);
	localRect->left		= (short) (docRect->left - lineHPos + paneOriginX);
	localRect->bottom	= (short) (docRect->bottom - lineVPos + paneOriginY);
	localRect->right	= (short) (docRect->right - lineHPos + paneOriginX);
#endif

#if 0
	LgPoint	docTopLeft;
	LgPoint	docBotRight;
	GLPoint	locTopLeft;
	GLPoint	locBotRight;

	docTopLeft.y	= docRect->top;
	docTopLeft.x	= docRect->left;
	docBotRight.y	= docRect->bottom;
	docBotRight.x	= docRect->right;

	doc_to_loc(&docTopLeft, &locTopLeft);
	doc_to_loc(&docBotRight, &locBotRight);

	localRect->top		= locTopLeft.y;
	localRect->left		= locTopLeft.x;
	localRect->bottom	= locBotRight.y;
	localRect->right	= locBotRight.x;
#endif

#if 0
   LgPoint docOrigin = { 0, 0 };
   GLPoint locOrigin;
   LgRect theRect = *docRect;
   doc_to_loc(&docOrigin, &locOrigin);
   OffsetLgRect(&theRect, locOrigin.x, locOrigin.y);
   LgRect2Rect(&theRect, localRect);
#endif
   return (localRect);
}
```

```
/* ---------------------------------------------------Stephen---07/19/93---
	TopicListView::DoItemHit - handles mouse-down events in the topic list
	view.
---------------------------------------------------------------------------- */
bool_t TopicListView::DoItemHit(EVENT_REC *pEvt, GLPoint mousePt)
{
	bool_t		isDblClick = AP_DblClick(pEvt);
	assert(fDataInited);

	if (!TView::DoItemHit(pEvt, mousePt)) {
		GLRect localRect;

		for (short row=0; row<fNmOfTopics; ++row) {
			GetRowLocalRect(row, &localRect);
			if (GLPtInRect(mousePt, &localRect)) {
				isDblClick = (fSelectionExists && (row == fRowSelected) && isDblClick);
				if (!isDblClick) {
			// Don't both re-selecting for double-click, 'cause already selected!
					if (fSelectionExists) {
						draw_highlighting(fRowSelected, false);			//
Deselect
						fSelectionExists = false;
					}
					fRowSelected = row;
					draw_highlighting(fRowSelected, true);				//
Select
					fSelectionExists = true;
				}

				if (fPAction)
					(fDQSWindow->*fPAction)(fRowSelected, GetTopicID(fRowSelected), isDblClick,
true);

				return (false);		// RETURN FALSE -- DO NO FURTHER PROCESSING LIKE SWITCHING
FOCUS
			}
		}
	}

	return (true);
}


/* ---------------------------------------------------Stephen---03/19/93---
	TopicListView::Resize -
---------------------------------------------------------------------------- */
void TopicListView::Resize(void *pNewSize, TObject *pSender)
{
	TView::Resize(pNewSize, pSender);

#if 0
	if (fSizeToWindow || !fFirstTimeResized) {
		GLRect myBounds;
		GetParentWindow()->GetPortRect(&myBounds);
	//	myBounds.bottom-=14;
		myBounds.bottom+=1;
		myBounds.top-=1;
		myBounds.left-=1;
		myBounds.right+=1;
		SetBounds(&myBounds);
	}
	else fFirstTimeResized = true;

	if (fDataInited)
		destruct_topicList_data();
	init_topicList_data();
	Inval();
#endif
}


#pragma segment main

/* xxxxxxxxxxxxxxxxxxxxxxxxxxxxxxxxxxxxxxxxxxxxxxxxxxxxxxxxxxxxxxxxxxxxxxxxxx
 * $Log:		topicvw.cc,v $
Revision 1.2  93/09/24  15:33:53  stephen
Revised interface & calls through functions.

Revision 1.1  93/08/20  14:04:06  stephen
Initial revision

 */
```

```
/* ------------------------------------------------------------------------
	TOPICVW.H
	Topic list view class
	Copyright (C) 1993 Screenplay Systems Inc.
	Revised:	$Id: topicvw.h,v 1.2 93/09/24 15:34:16 stephen Exp Locker: stephen $
------------------------------------------------------------------------- */

#pragma once

#ifndef __TOPICVW__
#define __TOPICVW__

#include "pools.h"
#include "tview.h"
#include "consts.h"

#pragma segment topicvw

class DQSWindow;

//	Topic List Data

typedef struct {
	short		topicID;		// A unique ID for this topic
	pl_id		topicNamePID;	// pool ID of this topic
	bool_t		drawGray;		// true if we should grey this item
	gl_face_t	face;			// Way to set face to bold or italics
	char		checkMark;		// Is this line have a checkmark (or other kTL constant -- see
below)
} TLDataType;

const char	kTLNoCheck		= 0;
const char	kTLCheckOn		= 1;
const char	kTLDot			= 2;
const char	kTLDash			= 3;
const char	kTLApprox		= 4;

typedef void (TObject::*topic_action_proc) (short clickedRow, short clickedID, bool_t dblClick, bool_t saveAnswer);

/* ------------------------------------------------------------------------
	TopicListView - A scrolling list of topics.
------------------------------------------------------------------------- */
class TopicListView : public TView {
public:
	// CONSTRUCTION/DESTRUCTION
	TopicListView(DRDoc* theDoc, short NmOfTopics, topic_action_proc pAction_proc, ItemList* pParent, vw_flags
vflags = kNoFlags, const GLRect *extent = NULL, it_flags iflags = List::kNoFlags, const GLColor *color = &kGLBlackClr);
	~TopicListView(void);

	// PUBLIC UTILITIES
	virtual char*		ClassName(void) const		{ return "TopicListView"; }
	virtual class_t		ClassType(void) const		{ return kTopicListView; }
	virtual bool_t		IsOfType(const void *pType) const { return *(class_t*) pType == kTopicListView ||
TView::IsOfType(pType); }
	virtual TObject* Duplicate(void) const		{ return new TopicListView(*this); }
	virtual byte_cnt		GetObjSize(void)	{ return sizeof(TopicListView); }
//	virtual byte_cnt		GetAllocSize(void)		{ return MMGetSize(fCLDataHdl) + fTextPool.GetAllocSize();
}


	// ACTION PROCS

	// PUBLIC BEHAVIOR
	virtual void	InitView(void)			{ init_topicList_data(); }
	virtual void	draw_view(const VwPaneUpdateInfo& updateInfo);
	virtual void	Resize(void *pNewSize, TObject *pSender);
	virtual void	Frame(void *env, TObject *pSender = NULL) ()		// TItem:: function. Overriden here to
prevent framing of view
	virtual long	GetNumVLines(void)				{ return (long)(fNmOfTopics-1);
}

	short			GetTopicID(short row)				{
assert(row<fNmOfTopics); return fTLData[row].topicID; }
	void			SetTopic(short listPos, short topicID, char* topicText);
	void			GetTopicText(char* topicText, short listPos = -1);
	short			GetRows(void)							{ return
fNmOfTopics; }
	bool_t			FindRow(short ID, short* theRow);

	short			Append(short topicID, char* topicText);
	void			Delete(short theRow);
	void			Empty(void);
	void			InvalRow(short whichRow);

	void			DeselectAll(void);
	void			SetSelection(short whichRow, bool_t saveAnswer = true);
	short			GetRowSelected(void)				{ return fRowSelected;
}
	void			GetRowLocalRect(short row, GLRect* localRect);

	void			SetDQSWindow(DQSWindow* pDQSWindow)		{ fDQSWindow = pDQSWindow; }
	void			SetDataInited(bool_t flagState)		{ fDataInited = flagState; }

	void			SetGray(short row, bool_t drawGray, bool_t drawNow = false);
	bool_t			GetGray(short row)					{
assert(row<fNmOfTopics); return fTLData[row].drawGray; }

	void			SetFace(short row, gl_face_t face, bool_t drawNow);
	gl_face_t		GetFace(short row)					{
assert(row<fNmOfTopics); return fTLData[row].face; }

	void			SetCheckMarkEnable(bool_t enableFlag)	{ fCheckMarksEnabled = enableFlag; }
	void			SetCheckMark(short row, char checkMark, bool_t drawNow = false);
	short			GetCheckMark(short row)			{ assert(row<fNmOfTopics);
return ((short)(fTLData[row].checkMark)); }

protected:
	Dramatica*	fApp;
	DRDoc*		fDoc;
	TWindow*	fWindow;
	pfm_fd_t	fAppPFMFile;

	topic_action_proc	fPAction;		// Click & double-click action proc
```

```
        DQSWindow*          fDQSWindow;                         // If set, we do callbacks thru this pointer

        Pool                fTopicNamePool;             //      String pool of all the topics

        hdl_t               fTLDataHdl;                         // Handle to memory allocated for our topic list datas
        TLDataType*         fTLData;                            // Point to the topicList data array
        short               fAllocatedItems;  // Current size of the array

        short               fNmOfTopics;                // Count of topics in our array
        bool_t              fDataInited;                // TRUE if we've initialized data at least once

        bool_t              fCheckMarksEnabled;         // TRUE if we are allocating space for checkmarks

        bool_t              fSelectionExists;           // TRUE if the user has a selection
        short               fRowSelected;               // contains # of row selected

        gl_font_t           fFont;                              // Font for this window
        short               fFontSize;                          // Size of font
        gl_face_t           fFace;                              // Face of font

        gl_coord_t          fLineHeight;                // Height of font
        gl_coord_t          fAscent;                            // Ascent of font

        // LOCAL UTILITIES

        void                init_topicList_data(void);
        void                destruct_topicList_data(void);

        void                draw_highlighting(short row, bool_t state);
        void                get_row_rect(short row, LgRect* rowRect);
        GLRect*             doc_to_loc_rect(LgRect* docRect, GLRect* localRect);
        bool_t              DoItemHit(EVENT_REC *pEvt, GLPoint mousePt);

}; /* TopicListView */


#pragma segment main


/* xxxxxxxxxxxxxxxxxxxxxxxxxxxxxxxxxxxxxxxxxxxxxxxxxxxxxxxxxxxxxxxxxxxxxxxxxxxxxxx
 *  $Log:       topicvw.h,v $
 * Revision 1.2  93/09/24  15:34:16  stephen
 * Revised interface & calls through functions.
 *
 * Revision 1.1  93/08/20  14:04:32  stephen
 * Initial revision
 *
 */

#endif /* __TOPICVW__ */
```

```
/* ---------------------------------------------------------------------------
        VERBS.R
        Dramatica's Verb Text for Replacement Text
        Copyright (C) 1993 Screenplay Systems Inc.
        $Id: verbs.r,v 1.10 93/06/02 21:48:11 chris Exp Locker: stephen $
--------------------------------------------------------------------------- */

#ifdef macintosh
        #include "systypes.r"
        #include "types.r"
#else
        #include <systypes.r>
        #include <types.r>
#endif

/* ---------------------------------------------------------------------------
        'LVB' - Linking Verb Conjugations.
--------------------------------------------------------------------------- */
type 'LVRB' {
        cstring;                        /* linking verb text */
};

/* ---------------------------------------------------------------------------
        Actual LVRB segment which contain 1 segment (resource) per verb tense.

                I                   Infinitive
                P                   Present Tense
                X                   Past Tense
                Y                   Present Participle
                Z                   Past Participle

             key          type     value
            ====================================
                1:          c               First Person Singular (I)
                2:          c               First Person Plural (we)
                3:          c               Second Person Singular (you)
                4:          c               Second Person Plural (you as in you all)
                5:          c               Third Person Singular (he/she/it)
                6:          c               Third Person Plural (they)

        Segment text takes the form: <slash><key><type><colon><value><slash>
        <slash> must be entered as a double-backslash "\\".

--------------------------------------------------------------------------- */

resource 'LVRB' (1, PFM_MIN_PRIO) {

/*  to BE -- infinitive tense  */
    "\\I1c:be"
    "\\I2c:be"
    "\\I3c:be"
    "\\I4c:be"
    "\\I5c:be"
    "\\I6c:be"


/*  to BE -- present tense  */
    "\\P1c:am"                                          /* First Person Singular */
    "\\P2c:are"                                         /* First Person Plural (we) */
    "\\P3c:are"                                         /* Second Person Singular (you) */
    "\\P4c:are"                                         /* Second Person Plural (you as in you
all) */
    "\\P5c:is"                                          /* Third Person Singular (he/she/it) */
    "\\P6c:are"                                         /* Third Person Plural (they) */

/*  to BE -- past tense  */
    "\\X1c:was"                                         /* First Person Singular */
    "\\X2c:were"                                /* First Person Plural (we) */
    "\\X3c:were"                                /* Second Person Singular (you) */
    "\\X4c:were"                                /* Second Person Plural (you as in you all) */
    "\\X5c:was"                                         /* Third Person Singular (he/she/it) */
    "\\X6c:were"                                /* Third Person Plural (they) */

/*  to BE -- present participle tense  */
    "\\Y1c:being"
    "\\Y2c:being"
    "\\Y3c:being"
    "\\Y4c:being"
    "\\Y5c:being"
    "\\Y6c:being"

/*  to BE -- past participle tense  */
    "\\Z1c:been"
    "\\Z2c:been"
    "\\Z3c:been"
    "\\Z4c:been"
    "\\Z5c:been"
    "\\Z6c:been"

        "\\"
};


#if 0
resource 'LVRB' (2, PFM_MIN_PRIO) {                 /*  to SEEM -- present tense  */
    "\\FPSc:seem"                                       /* First Person Singular */
    "\\FPPc:seem"                                       /* First Person Plural (we) */
    "\\SPSc:seem"                                       /* Second Person Singular (you) */
    "\\SPPc:seem"                                       /* Second Person Plural (you as in you
all) */
    "\\TPSc:seems"                                      /* Third Person Singular (he/she/it) */
    "\\TPPc:seem"                                       /* Third Person Plural (they) */
        "\\"
};

resource 'LVRB' (3, PFM_MIN_PRIO) {                 /*  to SEEM -- past tense  */
    "\\FPSc:seemed"                                     /* First Person Singular */
    "\\FPPc:seemed"                                     /* First Person Plural (we) */
    "\\SPSc:seemed"                                     /* Second Person Singular (you) */
    "\\SPPc:seemed"                                     /* Second Person Plural (you as in you
all) */
```

```
    "\\TPSc:seemed"                                             /* Third Person Singular (he/she/it) */
    "\\TPPc:seemed"                                             /* Third Person Plural (they) */
        "\\"
};
#endif


/* -----------------------------------------------------------------------
        'AVRB' - Auxilary Verb Conjugations.
----------------------------------------------------------------------- */
type 'AVRB' {
        cstring;                    /* auxilary verb text */
};

/* -----------------------------------------------------------------------
        Actual AVRB segment which contain 1 segment (resource) per verb tense.

            key            type     value
            ==================================
                FPS:        c                First Person Singular (I)
                TPS:        c                Third Person Singular (he/she/it)
                O:                   c                Others (we, you, you, they)

        Segment text takes the form: <slash><key><type><colon><value><slash>
        <slash> must be entered as a double-backslash "\\".

----------------------------------------------------------------------- */

resource 'AVRB' (1, PFM_MIN_PRIO) {                  /* to HAVE */
    "\\FPSc:have"                                                         /* First Person Singular */
    "\\TPSc:has"                                              /* Third Person Singular (he/she/it) */
    "\\Oc:have"                                                           /* Others (we, you, you, they)
*/
        "\\"
};

resource 'AVRB' (2, PFM_MIN_PRIO) {                  /* to BE */
    "\\FPSc:am"                                               /* First Person Singular */
    "\\TPSc:is"                                               /* Third Person Singular (he/she/it) */
    "\\Oc:are"                                                /* Others (we, you, you, they) */
        "\\"
};

resource 'AVRB' (3, PFM_MIN_PRIO) {                  /* CAN */
    "\\FPSc:can"                                              /* First Person Singular */
    "\\TPSc:can"                                              /* Third Person Singular (he/she/it) */
    "\\Oc:can"                                                            /* Others (we, you, you, they)
*/
        "\\"
};

resource 'AVRB' (4, PFM_MIN_PRIO) {                  /* COULD */
    "\\FPSc:could"                                                        /* First Person Singular */
    "\\TPSc:could"                                                        /* Third Person Singular
(he/she/it) */
    "\\Oc:could"                                              /* Others (we, you, you, they) */
        "\\"
};

resource 'AVRB' (5, PFM_MIN_PRIO) {                  /* SHOULD */
    "\\FPSc:should"                                                       /* First Person Singular */
    "\\TPSc:should"                                                       /* Third Person Singular
(he/she/it) */
    "\\Oc:should"                                                         /* Others (we, you, you, they)
*/
        "\\"
};

resource 'AVRB' (6, PFM_MIN_PRIO) {                  /* WOULD */
    "\\FPSc:would"                                                        /* First Person Singular */
    "\\TPSc:would"                                                        /* Third Person Singular
(he/she/it) */
    "\\Oc:would"                                              /* Others (we, you, you, they) */
        "\\"
};

resource 'AVRB' (7, PFM_MIN_PRIO) {                  /* DO */
    "\\FPSc:do"                                               /* First Person Singular */
    "\\TPSc:does"                                             /* Third Person Singular (he/she/it) */
    "\\Oc:do"                                                 /* Others (we, you, you, they) */
        "\\"
};

resource 'AVRB' (8, PFM_MIN_PRIO) {                  /* DID */
    "\\FPSc:did"                                  /* First Person Singular */
    "\\TPSc:did"                                  /* Third Person Singular (he/she/it) */
    "\\Oc:did"                                                /* Others (we, you, you, they) */
        "\\"
};

resource 'AVRB' (9, PFM_MIN_PRIO) {                  /* WILL */
    "\\FPSc:will"                                             /* First Person Singular */
    "\\TPSc:will"                                             /* Third Person Singular (he/she/it) */
    "\\Oc:will"                                               /* Others (we, you, you, they) */
        "\\"
};

resource 'AVRB' (10, PFM_MIN_PRIO) {                 /* SHALL */
    "\\FPSc:shall"                                                        /* First Person Singular */
    "\\TPSc:shall"                                                        /* Third Person Singular
(he/she/it) */
    "\\Oc:shall"                                              /* Others (we, you, you, they) */
        "\\"
};

resource 'AVRB' (11, PFM_MIN_PRIO) {                 /* MUST */
    "\\FPSc:must"                                                         /* First Person Singular */
    "\\TPSc:must"                                                         /* Third Person Singular
(he/she/it) */
    "\\Oc:must"                                                           /* Others (we, you, you, they)
*/
        "\\"
```

```
};

resource 'AVRB' (12, PFM_MIN_PRIO) {                    /* OUGHT */
    "\\FPSc:ought"                                                          /* First Person Singular */
    "\\TPSc:ought"                                                          /* Third Person Singular
(he/she/it) */
    "\\Oc:ought"                                                       /* Others (we, you, you, they) */
        "\\"
};


/* -----------------------------------------------------------------------
        'SVRB' - Semantic Verb Conjugations.
----------------------------------------------------------------------- */
type 'SVRB' {
        cstring;                        /* semantic verb text */
};

/* -----------------------------------------------------------------------
        Actual SVRB segment which contain 1 segment (resource) per semantic Item.

            key             type     value
          ====================================
                B:                   c          Base form of the verb -- march
                INF:        c              Infinitive -- march
                PTG:        c              Present Tense General (I, we, you, they) -- march
                PT3:        c              Present Tense 3rd Person Singular (he/she/it) -- marches
                PAST:       c              Past tense -- marched
                PRESP:      c              Present Participle -- marching
                PASTP:      c              Past Participle -- marched

        Segment text takes the form: <slash><key><type><colon><value><slash>
        <slash> must be entered as a double-backslash "\\".

        NOTE:  "*" indicates auxilary verb "to be" should be used with following
                    adverb for verb tense conjugations.  Example:  "* worthy" should
                    be interpreted as "to be worthy", "am worthy", "are worthy", etc.

----------------------------------------------------------------------- */

resource 'SVRB' (1, PFM_MIN_PRIO) {                     /* Universe */
        "\\Bc:creat"                                                       /* Base form of the verb  */
    "\\INFc:e a situation"                                                            /* Infinitive
*/
    "\\PTGc:e a situation"                                                            /* Present
Tense General (I, we, you, they)  */
    "\\PT3c:es a situation"                                                           /* Present
Tense 3rd Person Singular (he/she/it)  */
    "\\PASTc:ed a situation"                                                   /* Past tense  */
    "\\PRESPc:ing a situation"                                                 /* Present Participle
*/
    "\\PASTPc:ed a situation"                                                  /* Past Participle  */
    "\\"
};

resource 'SVRB' (2, PFM_MIN_PRIO) {                     /* Physics */
        "\\Bc:engag"                                                       /* Base form of the verb  */
    "\\INFc:e in an activity"                                                  /* Infinitive  */
    "\\PTGc:e in an activity"                                                  /* Present Tense
General (I, we, you, they)  */
    "\\PT3c:es in an activity"                                                 /* Present Tense 3rd
Person Singular (he/she/it)  */
    "\\PASTc:ed in an activity"                                                /* Past tense  */
    "\\PRESPc:ing in an activity"                                      /* Present Participle  */
    "\\PASTPc:ed in an activity"                                       /* Past Participle  */
    "\\"
};

resource 'SVRB' (3, PFM_MIN_PRIO) {                     /* Psychology */
        "\\Bc:alter"                                                       /* Base form of the verb  */
    "\\INFc: a manner of thinking"                                                    /* Infinitive
*/
    "\\PTGc: a manner of thinking"                                                    /* Present
Tense General (I, we, you, they)  */
    "\\PT3c:s a manner of thinking"                                                   /*
Present Tense 3rd Person Singular (he/she/it)  */
    "\\PASTc:ed a manner of thinking"                                                 /* Past tense
*/
    "\\PRESPc:ing a manner of thinking"                                               /* Present
Participle  */
    "\\PASTPc:ed a manner of thinking"                                                /* Past
Participle  */
    "\\"
};

resource 'SVRB' (4, PFM_MIN_PRIO) {                     /* Mind */
        "\\Bc:fixat"                                                           /* Base form of the
verb  */
    "\\INFc:e"                                                         /* Infinitive  */
    "\\PTGc:e"                                                         /* Present Tense General (I,
we, you, they)  */
    "\\PT3c:es"                                                        /* Present Tense 3rd Person
Singular (he/she/it)  */
    "\\PASTc:ed"                                                   /* Past tense  */
    "\\PRESPc:ing"                                                     /* Present Participle  */
    "\\PASTPc:ed"                                                      /* Past Participle  */
    "\\"
};

resource 'SVRB' (5, PFM_MIN_PRIO) {                     /* Past */
        "\\Bc:focus"                                                       /* Base form of the verb  */
    "\\INFc: on what has already happened"                                                   /*
Infinitive  */
    "\\PTGc: on what has already happened"                                                   /*
Present Tense General (I, we, you, they)  */
    "\\PT3c:s on what has already happened"                                                  /*
Present Tense 3rd Person Singular (he/she/it)  */
    "\\PASTc:ed on what has already happened"                                                /*
Past tense  */
    "\\PRESPc:ing on what has already happened"                                              /*
Present Participle  */
```

```
    "\\PASTPc:ed on what has already happened"                              /*
Past Participle  */
    "\\"
};

resource 'SVRB' (6, PFM_MIN_PRIO) {                 /* Progress */
        "\\Bc:progress"                                         /* Base form of the verb  */
    "\\INFc:"                                                   /* Infinitive  */
    "\\PTGc:"                                                   /* Present Tense General (I,
we, you, they)  */
    "\\PT3c:es"                                                 /* Present Tense 3rd Person
Singular (he/she/it)  */
    "\\PASTc:ed"                                        /* Past tense  */
    "\\PRESPc:ing"                                              /* Present Participle  */
    "\\PASTPc:ed"                                               /* Past Participle  */
    "\\"
};

resource 'SVRB' (7, PFM_MIN_PRIO) {                 /* Future */
        "\\Bc:focus"                                                    /* Base form of the
verb  */
    "\\INFc: on what will happen or be"                                                 /*
Infinitive  */
    "\\PTGc: on what will happen or be"                                                 /*
Present Tense General (I, we, you, they)  */
    "\\PT3c:s on what will happen or be"                                                /*
Present Tense 3rd Person Singular (he/she/it)  */
    "\\PASTc:ed on what will happen or be"                                      /* Past tense
*/
    "\\PRESPc:ing  on what will happen or be"                                           /*
Present Participle  */
    "\\PASTPc:ed on what will happen or be"                                     /* Past
Participle  */
    "\\"
};

resource 'SVRB' (8, PFM_MIN_PRIO) {                 /* Present */
        "\\Bc:focus"                                            /* Base form of the verb  */
    "\\INFc: on the current situation and circumstances"
                /* Infinitive  */
    "\\PTGc: on the current situation and circumstances"
                /* Present Tense General (I, we, you, they)  */
    "\\PT3c:es on the current situation and circumstances"
                /* Present Tense 3rd Person Singular (he/she/it)  */
    "\\PASTc:ed on the current situation and circumstances"
        /* Past tense  */
    "\\PRESPc:ing on the current situation and circumstances"
        /* Present Participle  */
    "\\PASTPc:ed on the current situation and circumstances"
        /* Past Participle  */
    "\\"
};

resource 'SVRB' (9, PFM_MIN_PRIO) {                 /* Understanding */
        "\\Bc:underst"                                          /* Base form of the verb  */
    "\\INFc:and"                                        /* Infinitive  */
    "\\PTGc:and"                                        /* Present Tense General (I, we, you,
they)  */
    "\\PT3c:ands"                                               /* Present Tense 3rd Person
Singular (he/she/it)  */
    "\\PASTc:ood"                                               /* Past tense  */
    "\\PRESPc:anding"                                   /* Present Participle  */
    "\\PASTPc:ood"                                              /* Past Participle  */
    "\\"
};

resource 'SVRB' (10, PFM_MIN_PRIO) {                /* Doing */
        "\\Bc:"                                                         /* Base form of the
verb  */
    "\\INFc:do"                                                 /* Infinitive  */
    "\\PTGc:do"                                                 /* Present Tense General (I,
we, you, they)  */
    "\\PT3c:does"                                               /* Present Tense 3rd Person
Singular (he/she/it)  */
    "\\PASTc:did"                                               /* Past tense  */
    "\\PRESPc:doing"                                    /* Present Participle  */
    "\\PASTPc:done"                                             /* Past Participle  */
    "\\"
};

resource 'SVRB' (11, PFM_MIN_PRIO) {                /* Obtaining */
        "\\Bc:obtain"                                           /* Base form of the verb  */
    "\\INFc:"                                                   /* Infinitive  */
    "\\PTGc:"                                                   /* Present Tense General (I,
we, you, they)  */
    "\\PT3c:s"                                                  /* Present Tense 3rd Person
Singular (he/she/it)  */
    "\\PASTc:ed"                                        /* Past tense  */
    "\\PRESPc:ing"                                              /* Present Participle  */
    "\\PASTPc:ed"                                               /* Past Participle  */
    "\\"
};

resource 'SVRB' (12, PFM_MIN_PRIO) {                /* Learning */
        "\\Bc:learn"                                            /* Base form of the verb  */
    "\\INFc:"                                                   /* Infinitive  */
    "\\PTGc:"                                                   /* Present Tense General (I,
we, you, they)  */
    "\\PT3c:s"                                                  /* Present Tense 3rd Person
Singular (he/she/it)  */
    "\\PASTc:ed"                                        /* Past tense  */
    "\\PRESPc:ing"                                              /* Present Participle  */
    "\\PASTPc:ed"                                               /* Past Participle  */
    "\\"
};

resource 'SVRB' (13, PFM_MIN_PRIO) {                /* Conceptualizing */
        "\\Bc:conceptualiz"                                     /* Base form of the verb  */
    "\\INFc:e"                                                  /* Infinitive  */
    "\\PTGc:e"                                                  /* Present Tense General (I,
we, you, they)  */
    "\\PT3c:es"                                                 /* Present Tense 3rd Person
Singular (he/she/it)  */
```

```
    "\\PASTc:ed"                /* Past tense */
    "\\PRESPc:ing"              /* Present Participle */
    "\\PASTPc:ed"               /* Past Participle */
    "\\"
};

resource 'SVRB' (14, PFM_MIN_PRIO) {          /* Being */
        "\\Bc:*"                               /* Base form of the
verb */
    "\\INFc:"                   /* Infinitive */
    "\\PTGc:"                   /* Present Tense General (I,
we, you, they) */
    "\\PT3c:s"                  /* Present Tense 3rd Person
Singular (he/she/it) */
    "\\PASTc:ed"                /* Past tense */
    "\\PRESPc:ing"              /* Present Participle */
    "\\PASTPc:ed"               /* Past Participle */
    "\\"
};

resource 'SVRB' (15, PFM_MIN_PRIO) {          /* Becoming */
        "\\Bc:bec"                             /* Base form of the
verb */
    "\\INFc:ome"                /* Infinitive */
    "\\PTGc:ome"                /* Present Tense General (I, we, you,
they) */
    "\\PT3c:omes"               /* Present Tense 3rd Person
Singular (he/she/it) */
    "\\PASTc:ame"               /* Past tense */
    "\\PRESPc:oming"            /* Present Participle */
    "\\PASTPc:ome"              /* Past Participle */
    "\\"
};

resource 'SVRB' (16, PFM_MIN_PRIO) {          /* Conceiving */
        "\\Bc:conceiv"          /* Base form of the verb */
    "\\INFc:e"                  /* Infinitive */
    "\\PTGc:e"                  /* Present Tense General (I,
we, you, they) */
    "\\PT3c:es"                 /* Present Tense 3rd Person
Singular (he/she/it) */
    "\\PASTc:ed"                /* Past tense */
    "\\PRESPc:ing"              /* Present Participle */
    "\\PASTPc:ed"               /* Past Participle */
    "\\"
};

resource 'SVRB' (17, PFM_MIN_PRIO) {          /* Memory */
        "\\Bc:recall"           /* Base form of the verb */
    "\\INFc:"                   /* Infinitive */
    "\\PTGc:"                   /* Present Tense General (I,
we, you, they) */
    "\\PT3c:s"                  /* Present Tense 3rd Person
Singular (he/she/it) */
    "\\PASTc:ed"                /* Past tense */
    "\\PRESPc:ing"              /* Present Participle */
    "\\PASTPc:ed"               /* Past Participle */
    "\\"
};

resource 'SVRB' (18, PFM_MIN_PRIO) {          /* Preconscious */
        "\\Bc:respond"          /* Base form of the verb */
    "\\INFc:"                   /* Infinitive */
    "\\PTGc:"                   /* Present Tense General (I,
we, you, they) */
    "\\PT3c:s"                  /* Present Tense 3rd Person
Singular (he/she/it) */
    "\\PASTc:ed"                /* Past tense */
    "\\PRESPc:ing"              /* Present Participle */
    "\\PASTPc:ed"               /* Past Participle */
    "\\"
};

resource 'SVRB' (19, PFM_MIN_PRIO) {          /* Subconscious */
        "\\Bc:* driven"         /* Base form of the verb */
    "\\INFc:"                   /* Infinitive */
    "\\PTGc:"                   /* Present Tense General (I,
we, you, they) */
    "\\PT3c:"                   /* Present Tense 3rd Person
Singular (he/she/it) */
    "\\PASTc:"                  /* Past tense */
    "\\PRESPc:"                 /* Present Participle */
    "\\PASTPc:"                 /* Past Participle */
    "\\"
};

resource 'SVRB' (20, PFM_MIN_PRIO) {          /* Conscious */
        "\\Bc:deliberat"        /* Base form of the verb */
    "\\INFc:e"                  /* Infinitive */
    "\\PTGc:e"                  /* Present Tense General (I,
we, you, they) */
    "\\PT3c:es"                 /* Present Tense 3rd Person
Singular (he/she/it) */
    "\\PASTc:ed"                /* Past tense */
    "\\PRESPc:ing"              /* Present Participle */
    "\\PASTPc:ed"               /* Past Participle */
    "\\"
};

resource 'SVRB' (21, PFM_MIN_PRIO) {          /* Fate */
        "\\Bc:predetermin"      /* Base form of the verb */
    "\\INFc:e"                  /* Infinitive */
    "\\PTGc:e"                  /* Present Tense General (I,
we, you, they) */
    "\\PT3c:es"                 /* Present Tense 3rd Person
Singular (he/she/it) */
    "\\PASTc:ed"                /* Past tense */
    "\\PRESPc:ing"              /* Present Participle */
    "\\PASTPc:ed"               /* Past Participle */
```

```
    "\\"
};

resource 'SVRB' (22, PFM_MIN_PRIO) {          /* Prediction */
        "\\Bc:predict"                        /* Base form of the verb */
    "\\INFc:"                                 /* Infinitive */
    "\\PTGc:"                                 /* Present Tense General (I,
we, you, they)  */
    "\\PT3c:s"                                /* Present Tense 3rd Person
Singular (he/she/it)  */
    "\\PASTc:ed"                              /* Past tense */
    "\\PRESPc:ing"                            /* Present Participle */
    "\\PASTPc:ed"                             /* Past Participle */
    "\\"
};

resource 'SVRB' (23, PFM_MIN_PRIO) {          /* Interdiction */
        "\\Bc:interdict"                      /* Base form of the verb */
    "\\INFc:"                                 /* Infinitive */
    "\\PTGc:"                                 /* Present Tense General (I,
we, you, they)  */
    "\\PT3c:s"                                /* Present Tense 3rd Person
Singular (he/she/it)  */
    "\\PASTc:ed"                              /* Past tense */
    "\\PRESPc:ing"                            /* Present Participle */
    "\\PASTPc:ed"                             /* Past Participle */
    "\\"
};

resource 'SVRB' (24, PFM_MIN_PRIO) {          /* Destiny */
        "\\Bc:predestin"                      /* Base form of the verb */
    "\\INFc:e"                                /* Infinitive */
    "\\PTGc:e"                                /* Present Tense General (I,
we, you, they)  */
    "\\PT3c:es"                               /* Present Tense 3rd Person
Singular (he/she/it)  */
    "\\PASTc:ed"                              /* Past tense */
    "\\PRESPc:ing"                            /* Present Participle */
    "\\PASTPc:ed"                             /* Past Participle */
    "\\"
};

resource 'SVRB' (25, PFM_MIN_PRIO) {          /* Fact */
        "\\Bc:ma"                             /* Base form of the
verb  */
    "\\INFc:ke real"                          /* Infinitive */
    "\\PTGc:ke real"                          /* Present Tense
General (I, we, you, they)  */
    "\\PT3c:kes real"                         /* Present Tense 3rd
Person Singular (he/she/it)  */
    "\\PASTc:de real"                         /* Past tense */
    "\\PRESPc:king real"                      /* Present Participle */
    "\\PASTPc:de real"                        /* Past Participle */
    "\\"
};

resource 'SVRB' (26, PFM_MIN_PRIO) {          /* Security */
        "\\Bc:secur"                          /* Base form of the verb */
    "\\INFc:e"                                /* Infinitive */
    "\\PTGc:e"                                /* Present Tense General (I,
we, you, they)  */
    "\\PT3c:es"                               /* Present Tense 3rd Person
Singular (he/she/it)  */
    "\\PASTc:ed"                              /* Past tense */
    "\\PRESPc:ing"                            /* Present Participle */
    "\\PASTPc:ed"                             /* Past Participle */
    "\\"
};

resource 'SVRB' (27, PFM_MIN_PRIO) {          /* Threat */
        "\\Bc:threaten"                       /* Base form of the verb */
    "\\INFc:"                                 /* Infinitive */
    "\\PTGc:"                                 /* Present Tense General (I,
we, you, they)  */
    "\\PT3c:s"                                /* Present Tense 3rd Person
Singular (he/she/it)  */
    "\\PASTc:ed"                              /* Past tense */
    "\\PRESPc:ing"                            /* Present Participle */
    "\\PASTPc:ed"                             /* Past Participle */
    "\\"
};

resource 'SVRB' (28, PFM_MIN_PRIO) {          /* Fantasy */
        "\\Bc:fantasiz"                       /* Base form of the verb */
    "\\INFc:e"                                /* Infinitive */
    "\\PTGc:e"                                /* Present Tense General (I,
we, you, they)  */
    "\\PT3c:es"                               /* Present Tense 3rd Person
Singular (he/she/it)  */
    "\\PASTc:ed"                              /* Past tense */
    "\\PRESPc:ing"                            /* Present Participle */
    "\\PASTPc:ed"                             /* Past Participle */
    "\\"
};

resource 'SVRB' (29, PFM_MIN_PRIO) {          /* Openess */
        "\\Bc:- open"                         /* Base form of the verb */
    "\\INFc:"                                 /* Infinitive */
    "\\PTGc:"                                 /* Present Tense General (I,
we, you, they)  */
    "\\PT3c:"                                 /* Present Tense 3rd Person
Singular (he/she/it)  */
    "\\PASTc:"                                /* Past tense */
    "\\PRESPc:"                               /* Present Participle */
    "\\PASTPc:"                               /* Past Participle */
    "\\"
};

resource 'SVRB' (30, PFM_MIN_PRIO) {          /* Delay */
        "\\Bc:delay"                          /* Base form of the verb */
    "\\INFc:"                                 /* Infinitive */
    "\\PTGc:"                                 /* Present Tense General (I,
we, you, they)  */
```

```
    "\\PT3c:s"                                  /* Present Tense 3rd Person
Singular (he/she/it)  */
    "\\PASTc:ed"                                /* Past tense  */
    "\\PRESPc:ing"                              /* Present Participle  */
    "\\PASTPc:ed"                               /* Past Participle  */
    "\\"
};

resource 'SVRB' (31, PFM_MIN_PRIO) {          /* Choice */
        "\\Bc:cho"                              /* Base form of the
verb  */
    "\\INFc:ose"                                /* Infinitive  */
    "\\PTGc:ose"                                /* Present Tense General (I, we, you,
they)  */
    "\\PT3c:oses"                               /* Present Tense 3rd Person
Singular (he/she/it)  */
    "\\PASTc:se"                                /* Past tense  */
    "\\PRESPc:osing"                            /* Present Participle  */
    "\\PASTPc:sen"                              /* Past Participle  */
    "\\"
};

resource 'SVRB' (32, PFM_MIN_PRIO) {          /* Preconception */
        "\\Bc:preconceiv"                       /* Base form of the verb  */
    "\\INFc:e"                                  /* Infinitive  */
    "\\PTGc:e"                                  /* Present Tense General (I,
we, you, they)  */
    "\\PT3c:es"                                 /* Present Tense 3rd Person
Singular (he/she/it)  */
    "\\PASTc:ed"                                /* Past tense  */
    "\\PRESPc:ing"                              /* Present Participle  */
    "\\PASTPc:ed"                               /* Past Participle  */
    "\\"
};

resource 'SVRB' (33, PFM_MIN_PRIO) {          /* Work */
        "\\Bc:work"                             /* Base form of the
verb  */
    "\\INFc:"                                   /* Infinitive  */
    "\\PTGc:"                                   /* Present Tense General (I,
we, you, they)  */
    "\\PT3c:s"                                  /* Present Tense 3rd Person
Singular (he/she/it)  */
    "\\PASTc:ed"                                /* Past tense  */
    "\\PRESPc:ing"                              /* Present Participle  */
    "\\PASTPc:ed"                               /* Past Participle  */
    "\\"
};

resource 'SVRB' (34, PFM_MIN_PRIO) {          /* Attract -- was Do */
        "\\Bc:attract"                          /* Base form of the verb  */
    "\\INFc:"                                   /* Infinitive  */
    "\\PTGc:"                                   /* Present Tense General (I,
we, you, they)  */
    "\\PT3c:s"                                  /* Present Tense 3rd Person
Singular (he/she/it)  */
    "\\PASTc:ed"                                /* Past tense  */
    "\\PRESPc:ing"                              /* Present Participle  */
    "\\PASTPc:ed"                               /* Past Participle  */
    "\\"
};

resource 'SVRB' (35, PFM_MIN_PRIO) {          /* Repel  -- was Don't */
        "\\Bc:repel"                            /* Base form of the verb  */
    "\\INFc:"                                   /* Infinitive  */
    "\\PTGc:"                                   /* Present Tense General (I,
we, you, they)  */
    "\\PT3c:s"                                  /* Present Tense 3rd Person
Singular (he/she/it)  */
    "\\PASTc:led"                               /* Past tense  */
    "\\PRESPc:ling"                             /* Present Participle  */
    "\\PASTPc:led"                              /* Past Participle  */
    "\\"
};

resource 'SVRB' (36, PFM_MIN_PRIO) {          /* Try */
        "\\Bc:attempt"                          /* Base form of the verb  */
    "\\INFc:"                                   /* Infinitive  */
    "\\PTGc:"                                   /* Present Tense General (I,
we, you, they)  */
    "\\PT3c:s"                                  /* Present Tense 3rd Person
Singular (he/she/it)  */
    "\\PASTc:ed"                                /* Past tense  */
    "\\PRESPc:ing"                              /* Present Participle  */
    "\\PASTPc:ed"                               /* Past Participle  */
    "\\"
};

resource 'SVRB' (37, PFM_MIN_PRIO) {          /* Instinct */
        "\\Bc:act"                              /* Base form of the
verb  */
    "\\INFc: instinctively"                     /* Infinitive  */
    "\\PTGc: instinctively"                     /* Present Tense General (I, we, you,
they)  */
    "\\PT3c:s instinctively"                    /* Present Tense 3rd Person Singular (he/she/it)
*/
    "\\PASTc:ed instinctively"                  /* Past tense  */
    "\\PRESPc:ing instinctively"                /* Present Participle  */
    "\\PASTPc:ed instinctively"                 /* Past Participle  */
    "\\"
};

resource 'SVRB' (38, PFM_MIN_PRIO) {          /* Senses */
        "\\Bc:sens"                             /* Base form of the
verb  */
    "\\INFc:e"                                  /* Infinitive  */
    "\\PTGc:e"                                  /* Present Tense General (I,
we, you, they)  */
    "\\PT3c:es"                                 /* Present Tense 3rd Person
Singular (he/she/it)  */
    "\\PASTc:ed"                                /* Past tense  */
    "\\PRESPc:ing"                              /* Present Participle  */
```

```
    "\\PASTPc:ed"                                          /* Past Participle  */
    "\\"
};

resource 'SVRB' (39, PFM_MIN_PRIO) {                   /* Interpretation */
        "\\Bc:interpret"                                   /* Base form of the verb  */
    "\\INFc:"                                              /* Infinitive  */
    "\\PTGc:"                                              /* Present Tense General (I,
we, you, they)  */
    "\\PT3c:s"                                             /* Present Tense 3rd Person
Singular (he/she/it)  */
    "\\PASTc:ed"                                           /* Past tense  */
    "\\PRESPc:ing"                                         /* Present Participle  */
    "\\PASTPc:ed"                                          /* Past Participle  */
    "\\"
};

resource 'SVRB' (40, PFM_MIN_PRIO) {                   /* Conditioning */
        "\\Bc:condition"                                   /* Base form of the verb  */
    "\\INFc:"                                              /* Infinitive  */
    "\\PTGc:"                                              /* Present Tense General (I,
we, you, they)  */
    "\\PT3c:s"                                             /* Present Tense 3rd Person
Singular (he/she/it)  */
    "\\PASTc:ed"                                           /* Past tense  */
    "\\PRESPc:ing"                                         /* Present Participle  */
    "\\PASTPc:ed"                                          /* Past Participle  */
    "\\"
};

resource 'SVRB' (41, PFM_MIN_PRIO) {                   /* Wisdom */
        "\\Bc:• wise"                                      /* Base form of the verb -- •
indicates auxilary verb "to be" */
    "\\INFc:"                                              /* Infinitive  */
    "\\PTGc:"                                              /* Present Tense General (I,
we, you, they)  */
    "\\PT3c:"                                              /* Present Tense 3rd Person
Singular (he/she/it)  */
    "\\PASTc:"                                             /* Past tense  */
    "\\PRESPc:"                                            /* Present Participle  */
    "\\PASTPc:"                                            /* Past Participle  */
    "\\"
};

resource 'SVRB' (42, PFM_MIN_PRIO) {                   /* Skill */
        "\\Bc:• skilled"                                   /* Base form of the verb -- • indicates
auxilary verb "to be" */
    "\\INFc:"                                              /* Infinitive  */
    "\\PTGc:"                                              /* Present Tense General (I,
we, you, they)  */
    "\\PT3c:"                                              /* Present Tense 3rd Person
Singular (he/she/it)  */
    "\\PASTc:"                                             /* Past tense  */
    "\\PRESPc:"                                            /* Present Participle  */
    "\\PASTPc:"                                            /* Past Participle  */
    "\\"
};

resource 'SVRB' (43, PFM_MIN_PRIO) {                   /* Experience */
        "\\Bc:experienc"                                   /* Base form of the verb  */
    "\\INFc:e"                                             /* Infinitive  */
    "\\PTGc:e"                                             /* Present Tense General (I,
we, you, they)  */
    "\\PT3c:es"                                            /* Present Tense 3rd Person
Singular (he/she/it)  */
    "\\PASTc:ed"                                           /* Past tense  */
    "\\PRESPc:ing"                                         /* Present Participle  */
    "\\PASTPc:ed"                                          /* Past Participle  */
    "\\"
};

resource 'SVRB' (44, PFM_MIN_PRIO) {                   /* Enlightenment */
        "\\Bc:enlighten"                                   /* Base form of the verb  */
    "\\INFc:"                                              /* Infinitive  */
    "\\PTGc:"                                              /* Present Tense General (I,
we, you, they)  */
    "\\PT3c:s"                                             /* Present Tense 3rd Person
Singular (he/she/it)  */
    "\\PASTc:ed"                                           /* Past tense  */
    "\\PRESPc:ing"                                         /* Present Participle  */
    "\\PASTPc:ed"                                          /* Past Participle  */
    "\\"
};

resource 'SVRB' (45, PFM_MIN_PRIO) {                   /* Approach */
        "\\Bc:approach"                                    /* Base form of the verb  */
    "\\INFc:"                                              /* Infinitive  */
    "\\PTGc:"                                              /* Present Tense General (I,
we, you, they)  */
    "\\PT3c:es"                                            /* Present Tense 3rd Person
Singular (he/she/it)  */
    "\\PASTc:ed"                                           /* Past tense  */
    "\\PRESPc:ing"                                         /* Present Participle  */
    "\\PASTPc:ed"                                          /* Past Participle  */
    "\\"
};

resource 'SVRB' (46, PFM_MIN_PRIO) {                   /* Self-Interest */
        "\\Bc:• self-interested"                           /* Base form of the verb -- • indicates auxilary
verb "to be" */
    "\\INFc:"                                              /* Infinitive  */
    "\\PTGc:"                                              /* Present Tense General (I,
we, you, they)  */
    "\\PT3c:"                                              /* Present Tense 3rd Person
Singular (he/she/it)  */
    "\\PASTc:"                                             /* Past tense  */
    "\\PRESPc:"                                            /* Present Participle  */
    "\\PASTPc:"                                            /* Past Participle  */
    "\\"
};

resource 'SVRB' (47, PFM_MIN_PRIO) {                   /* Morality */
        "\\Bc:moral"                                       /* Base form of the verb  */
```

```
    "\\INFc:ize"                                /* Infinitive */
    "\\PTGc:ize"                                /* Present Tense General (I, we, you,
they) */
    "\\PT3c:izes"                                       /* Present Tense 3rd Person
Singular (he/she/it) */
    "\\PASTc:ized"                                      /* Past tense */
    "\\PRESPc:izing"                            /* Present Participle */
    "\\PASTPc:ized"                                     /* Past Participle */
    "\\"
};

resource 'SVRB' (48, PFM_MIN_PRIO) {                    /* Attitude */
        "\\Bc:"                                                 /* Base form of the
verb */
    "\\INFc:have an attitude"                   /* Infinitive */
    "\\PTGc:have an attitude"                   /* Present Tense General (I, we, you, they) */
    "\\PT3c:has an attitude"                    /* Present Tense 3rd Person Singular (he/she/it)
*/
    "\\PASTc:had an attitude"                   /* Past tense */
    "\\PRESPc:having an attitude"       /* Present Participle */
    "\\PASTPc:had an attitude"                  /* Past Participle */
    "\\"
};

resource 'SVRB' (49, PFM_MIN_PRIO) {                    /* Prerequisites */
        "\\Bc:necessitat"                                   /* Base form of the verb */
    "\\INFc:e"                                          /* Infinitive */
    "\\PTGc:e"                                          /* Present Tense General (I,
we, you, they) */
    "\\PT3c:es"                                         /* Present Tense 3rd Person
Singular (he/she/it) */
    "\\PASTc:ed"                                /* Past tense */
    "\\PRESPc:ing"                                      /* Present Participle */
    "\\PASTPc:ed"                                       /* Past Participle */
    "\\"
};

resource 'SVRB' (50, PFM_MIN_PRIO) {                    /* Strategy */
        "\\Bc:strategiz"                            /* Base form of the verb */
    "\\INFc:e"                                          /* Infinitive */
    "\\PTGc:e"                                          /* Present Tense General (I,
we, you, they) */
    "\\PT3c:es"                                         /* Present Tense 3rd Person
Singular (he/she/it) */
    "\\PASTc:ed"                                /* Past tense */
    "\\PRESPc:ing"                                      /* Present Participle */
    "\\PASTPc:ed"                                       /* Past Participle */
    "\\"
};

resource 'SVRB' (51, PFM_MIN_PRIO) {                    /* Analysis */
        "\\Bc:analyz"                                       /* Base form of the verb */
    "\\INFc:e"                                          /* Infinitive */
    "\\PTGc:e"                                          /* Present Tense General (I,
we, you, they) */
    "\\PT3c:es"                                         /* Present Tense 3rd Person
Singular (he/she/it) */
    "\\PASTc:ed"                                /* Past tense */
    "\\PRESPc:ing"                                      /* Present Participle */
    "\\PASTPc:ed"                                       /* Past Participle */
    "\\"
};

resource 'SVRB' (52, PFM_MIN_PRIO) {                    /* Preconditions */
        "\\Bc:impos"                                        /* Base form of the verb */
    "\\INFc:e conditions"                       /* Infinitive */
    "\\PTGc:e conditions"                       /* Present Tense General (I, we, you, they) */
    "\\PT3c:es conditions"                              /* Present Tense 3rd Person Singular
(he/she/it) */
    "\\PASTc:ed conditions"                             /* Past tense */
    "\\PRESPc:ing conditions"                   /* Present Participle */
    "\\PASTPc:ed conditions"                    /* Past Participle */
    "\\"
};


resource 'SVRB' (53, PFM_MIN_PRIO) {                    /* State-of-Being */
        "\\Bc:*"                                                /* Base form of the
verb */
    "\\INFc:"                                           /* Infinitive */
    "\\PTGc:"                                           /* Present Tense General (I,
we, you, they) */
    "\\PT3c:"                                           /* Present Tense 3rd Person
Singular (he/she/it) */
    "\\PASTc:"                                          /* Past tense */
    "\\PRESPc:"                                         /* Present Participle */
    "\\PASTPc:"                                         /* Past Participle */
    "\\"
};

resource 'SVRB' (54, PFM_MIN_PRIO) {                    /* Situation */
        "\\Bc:arrang"                                       /* Base form of the verb */
    "\\INFc:e"                                          /* Infinitive */
    "\\PTGc:e"                                          /* Present Tense General (I,
we, you, they) */
    "\\PT3c:es"                                         /* Present Tense 3rd Person
Singular (he/she/it) */
    "\\PASTc:ed"                                /* Past tense */
    "\\PRESPc:ing"                                      /* Present Participle */
    "\\PASTPc:ed"                                       /* Past Participle */
    "\\"
};

resource 'SVRB' (55, PFM_MIN_PRIO) {                    /* Circumstances */
        "\\Bc:relat"                                        /* Base form of the verb */
    "\\INFc:e to"                                       /* Infinitive */
    "\\PTGc:e to"                                       /* Present Tense General (I,
we, you, they) */
    "\\PT3c:es to"                                      /* Present Tense 3rd Person
Singular (he/she/it) */
```

```
    "\\PASTc:ed to"                                    /* Past tense */
    "\\PRESPc:ing to"                                  /* Present Participle */
    "\\PASTPc:ed to"                                   /* Past Participle */
    "\\"
};

resource 'SVRB' (56, PFM_MIN_PRIO) {                   /* Sense-of-Self */
        "\\Bc:individualiz"                            /* Base form of the verb */
    "\\INFc:e"                                         /* Infinitive */
    "\\PTGc:e"                                         /* Present Tense General (I,
we, you, they) */
    "\\PT3c:es"                                        /* Present Tense 3rd Person
Singular (he/she/it) */
    "\\PASTc:ed"                                       /* Past tense */
    "\\PRESPc:ing"                                     /* Present Participle */
    "\\PASTPc:ed"                                      /* Past Participle */
    "\\"
};

resource 'SVRB' (57, PFM_MIN_PRIO) {                   /* Knowledge */
        "\\Bc:know"                                    /* Base form of the
verb */
    "\\INFc:"                                          /* Infinitive */
    "\\PTGc:"                                          /* Present Tense General (I,
we, you, they) */
    "\\PT3c:s"                                         /* Present Tense 3rd Person
Singular (he/she/it) */
    "\\PASTc:ed"                                       /* Past tense */
    "\\PRESPc:ing"                                     /* Present Participle */
    "\\PASTPc:ed"                                      /* Past Participle */
    "\\"
};

resource 'SVRB' (58, PFM_MIN_PRIO) {                   /* Ability */
        "\\Bc:• able"                                  /* Base form of the verb */
    "\\INFc:"                                          /* Infinitive */
    "\\PTGc:"                                          /* Present Tense General (I,
we, you, they) */
    "\\PT3c:s"                                         /* Present Tense 3rd Person
Singular (he/she/it) */
    "\\PASTc:ed"                                       /* Past tense */
    "\\PRESPc:ing"                                     /* Present Participle */
    "\\PASTPc:ed"                                      /* Past Participle */
    "\\"
};

resource 'SVRB' (59, PFM_MIN_PRIO) {                   /* Desire */
        "\\Bc:desir"                                   /* Base form of the verb */
    "\\INFc:e"                                         /* Infinitive */
    "\\PTGc:e"                                         /* Present Tense General (I,
we, you, they) */
    "\\PT3c:es"                                        /* Present Tense 3rd Person
Singular (he/she/it) */
    "\\PASTc:ed"                                       /* Past tense */
    "\\PRESPc:ing"                                     /* Present Participle */
    "\\PASTPc:ed"                                      /* Past Participle */
    "\\"
};

resource 'SVRB' (60, PFM_MIN_PRIO) {                   /* Thought */
        "\\Bc:"                                        /* Base form of the
verb */
    "\\INFc:think"                                     /* Infinitive */
    "\\PTGc:think"                                     /* Present Tense General (I,
we, you, they) */
    "\\PT3c:thinks"                                    /* Present Tense 3rd Person
Singular (he/she/it) */
    "\\PASTc:thought"                                  /* Past tense */
    "\\PRESPc:thinking"                                /* Present Participle */
    "\\PASTPc:thought"                                 /* Past Participle */
    "\\"
};

resource 'SVRB' (61, PFM_MIN_PRIO) {                   /* Rationalization */
        "\\Bc:rationaliz"                              /* Base form of the verb */
    "\\INFc:e"                                         /* Infinitive */
    "\\PTGc:e"                                         /* Present Tense General (I,
we, you, they) */
    "\\PT3c:es"                                        /* Present Tense 3rd Person
Singular (he/she/it) */
    "\\PASTc:ed"                                       /* Past tense */
    "\\PRESPc:ing"                                     /* Present Participle */
    "\\PASTPc:ed"                                      /* Past Participle */
    "\\"
};

resource 'SVRB' (62, PFM_MIN_PRIO) {                   /* Commitment */
        "\\Bc:commit"                                  /* Base form of the verb */
    "\\INFc:"                                          /* Infinitive */
    "\\PTGc:"                                          /* Present Tense General (I,
we, you, they) */
    "\\PT3c:s"                                         /* Present Tense 3rd Person
Singular (he/she/it) */
    "\\PASTc:ted"                                      /* Past tense */
    "\\PRESPc:ting"                                    /* Present Participle */
    "\\PASTPc:ted"                                     /* Past Participle */
    "\\"
};

resource 'SVRB' (63, PFM_MIN_PRIO) {                   /* Responsibility */
        "\\Bc:• responsible"                           /*
Base form of the verb */
    "\\INFc:make responsible"                          /* Infinitive */
    "\\PTGc:make responsible"                          /* Present Tense General (I, we, you, they) */
    "\\PT3c:makes responsible"                         /* Present Tense 3rd Person Singular (he/she/it)
*/
    "\\PASTc:made responsible"                         /* Past tense */
    "\\PRESPc:making responsible"                      /* Present Participle */
    "\\PASTPc:made responsible"                        /* Past Participle */
    "\\"
};

resource 'SVRB' (64, PFM_MIN_PRIO) {                   /* Obligation */
```

```
        "\\Bc:obligat"                                  /* Base form of the verb */
    "\\INFc:e"                                          /* Infinitive */
    "\\PTGc:e"                                          /* Present Tense General (I,
we, you, they) */
    "\\PT3c:es"                                         /* Present Tense 3rd Person
Singular (he/she/it) */
    "\\PASTc:ed"                                        /* Past tense */
    "\\PRESPc:ing"                                      /* Present Participle */
    "\\PASTPc:ed"                                       /* Past Participle */
    "\\"
};

resource 'SVRB' (65, PFM_MIN_PRIO) {                    /* Permission */
        "\\Bc:allow"                                    /* Base form of the verb */
    "\\INFc:"                                           /* Infinitive */
    "\\PTGc:"                                           /* Present Tense General (I,
we, you, they) */
    "\\PT3c:s"                                          /* Present Tense 3rd Person
Singular (he/she/it) */
    "\\PASTc:ed"                                        /* Past tense */
    "\\PRESPc:ing"                                      /* Present Participle */
    "\\PASTPc:ed"                                       /* Past Participle */
    "\\"
};

resource 'SVRB' (66, PFM_MIN_PRIO) {                    /* Need */
        "\\Bc:need"                                     /* Base form of the
verb */
    "\\INFc:"                                           /* Infinitive */
    "\\PTGc:"                                           /* Present Tense General (I,
we, you, they) */
    "\\PT3c:s"                                          /* Present Tense 3rd Person
Singular (he/she/it) */
    "\\PASTc:ed"                                        /* Past tense */
    "\\PRESPc:ing"                                      /* Present Participle */
    "\\PASTPc:ed"                                       /* Past Participle */
    "\\"
};

resource 'SVRB' (67, PFM_MIN_PRIO) {                    /* Expediency */
        "\\Bc:• expedient"                              /* Base form of the
verb */
    "\\INFc:"                                           /* Infinitive */
    "\\PTGc:"                                           /* Present Tense
General (I, we, you, they) */
    "\\PT3c:s"                                          /* Present Tense 3rd
Person Singular (he/she/it) */
    "\\PASTc:ed"                                        /* Past tense */
    "\\PRESPc:ling"                                     /* Present Participle
*/
    "\\PASTPc:ed"                                       /* Past Participle */
    "\\"
};

resource 'SVRB' (68, PFM_MIN_PRIO) {                    /* Deficiency */
        "\\Bc:lack"                                     /* Base form of the
verb */
    "\\INFc:"                                           /* Infinitive */
    "\\PTGc:"                                           /* Present Tense General (I,
we, you, they) */
    "\\PT3c:s"                                          /* Present Tense 3rd Person
Singular (he/she/it) */
    "\\PASTc:ed"                                        /* Past tense */
    "\\PRESPc:ing"                                      /* Present Participle */
    "\\PASTPc:ed"                                       /* Past Participle */
    "\\"
};

resource 'SVRB' (69, PFM_MIN_PRIO) {                    /* Truth */
        "\\Bc:• true"                                   /* Base form of the verb -- •
indicates auxilary verb "to be" */
    "\\INFc:"                                           /* Infinitive */
    "\\PTGc:"                                           /* Present Tense General (I,
we, you, they) */
    "\\PT3c:"                                           /* Present Tense 3rd Person
Singular (he/she/it) */
    "\\PASTc:"                                          /* Past tense */
    "\\PRESPc:"                                         /* Present Participle */
    "\\PASTPc:"                                         /* Past Participle */
    "\\"
};

resource 'SVRB' (70, PFM_MIN_PRIO) {                    /* Evidence */
        "\\Bc:locat"                                    /* Base form of the verb */
    "\\INFc:e evidence"                                 /* Infinitive */
    "\\PTGc:e evidence"                                 /* Present Tense General (I, we, you,
they) */
    "\\PT3c:es evidence"                                /* Present Tense 3rd Person Singular (he/she/it)
*/
    "\\PASTc:ed evidence"                               /* Past tense */
    "\\PRESPc:ing evidence"                             /* Present Participle */
    "\\PASTPc:ed evidence"                              /* Past Participle */
    "\\"
};

resource 'SVRB' (71, PFM_MIN_PRIO) {                    /* Suspicion */
        "\\Bc:suspect"                                  /* Base form of the verb */
    "\\INFc:"                                           /* Infinitive */
    "\\PTGc:"                                           /* Present Tense General (I,
we, you, they) */
    "\\PT3c:s"                                          /* Present Tense 3rd Person
Singular (he/she/it) */
    "\\PASTc:ed"                                        /* Past tense */
    "\\PRESPc:ing"                                      /* Present Participle */
    "\\PASTPc:ed"                                       /* Past Participle */
    "\\"
};

resource 'SVRB' (72, PFM_MIN_PRIO) {                    /* Falsehood */
        "\\Bc:• false"                                  /* Base form of the verb */
    "\\INFc:"                                           /* Infinitive */
```

```
    "\\PTGc:"                                    /* Present Tense General (I,
we, you, they)  */
    "\\PT3c:"                                    /* Present Tense 3rd Person
Singular (he/she/it)  */
    "\\PASTc:"                                   /* Past tense */
    "\\PRESPc:"                                  /* Present Participle */
    "\\PASTPc:"                                  /* Past Participle */
    "\\"
};

resource 'SVRB' (73, PFM_MIN_PRIO) {             /* Value */
        "\\Bc:valu"                              /* Base form of the
verb  */
    "\\INFc:e"                                   /* Infinitive */
    "\\PTGc:e"                                   /* Present Tense General (I,
we, you, they)  */
    "\\PT3c:es"                                  /* Present Tense 3rd Person
Singular (he/she/it)  */
    "\\PASTc:ed"                                 /* Past tense */
    "\\PRESPc:ing"                               /* Present Participle */
    "\\PASTPc:ed"                                /* Past Participle */
    "\\"
};

resource 'SVRB' (74, PFM_MIN_PRIO) {             /* Confidence */
        "\\Bc:assur"                             /* Base form of the verb */
    "\\INFc:e"                                   /* Infinitive */
    "\\PTGc:e"                                   /* Present Tense General (I,
we, you, they)  */
    "\\PT3c:es"                                  /* Present Tense 3rd Person
Singular (he/she/it)  */
    "\\PASTc:ed"                                 /* Past tense */
    "\\PRESPc:ing"                               /* Present Participle */
    "\\PASTPc:ed"                                /* Past Participle */
    "\\"
};

resource 'SVRB' (75, PFM_MIN_PRIO) {             /* Worry */
        "\\Bc: worr"                             /* Base form of the verb */
    "\\INFc:y"                                   /* Infinitive */
    "\\PTGc:y"                                   /* Present Tense General (I,
we, you, they)  */
    "\\PT3c:ies"                                 /* Present Tense 3rd Person Singular
(he/she/it)  */
    "\\PASTc:ied"                                /* Past tense */
    "\\PRESPc:ying"                              /* Present Participle */
    "\\PASTPc:ied"                               /* Past Participle */
    "\\"
};

resource 'SVRB' (76, PFM_MIN_PRIO) {             /* Worth */
        "\\Bc:- worthy"                          /* Base form
of the verb */
    "\\INFc:make worthy"                         /* Infinitive */
    "\\PTGc:make worthy"                         /* Present Tense General (I, we, you, they) */
    "\\PT3c:makes worthy"                        /* Present Tense 3rd Person Singular (he/she/it)
*/
    "\\PASTc:made worthy"                        /* Past tense */
    "\\PRESPc:making worthy"                     /* Present Participle */
    "\\PASTPc:made worthy"                       /* Past Participle */
    "\\"
};

resource 'SVRB' (77, PFM_MIN_PRIO) {             /* Closure */
        "\\Bc:end"                               /* Base form of the
verb  */
    "\\INFc:"                                    /* Infinitive */
    "\\PTGc:"                                    /* Present Tense General (I,
we, you, they)  */
    "\\PT3c:s"                                   /* Present Tense 3rd Person
Singular (he/she/it)  */
    "\\PASTc:ed"                                 /* Past tense */
    "\\PRESPc:ing"                               /* Present Participle */
    "\\PASTPc:ed"                                /* Past Participle */
    "\\"
};

resource 'SVRB' (78, PFM_MIN_PRIO) {             /* Hope */
        "\\Bc:hop"                               /* Base form of the
verb  */
    "\\INFc:e"                                   /* Infinitive */
    "\\PTGc:e"                                   /* Present Tense General (I,
we, you, they)  */
    "\\PT3c:es"                                  /* Present Tense 3rd Person
Singular (he/she/it)  */
    "\\PASTc:ed"                                 /* Past tense */
    "\\PRESPc:ing"                               /* Present Participle */
    "\\PASTPc:ed"                                /* Past Participle */
    "\\"
};

resource 'SVRB' (79, PFM_MIN_PRIO) {             /* Dream */
        "\\Bc:dream"                             /* Base form of the verb */
    "\\INFc:"                                    /* Infinitive */
    "\\PTGc:"                                    /* Present Tense General (I,
we, you, they)  */
    "\\PT3c:s"                                   /* Present Tense 3rd Person
Singular (he/she/it)  */
    "\\PASTc:ed"                                 /* Past tense */
    "\\PRESPc:ing"                               /* Present Participle */
    "\\PASTPc:ed"                                /* Past Participle */
    "\\"
};

resource 'SVRB' (80, PFM_MIN_PRIO) {             /* Denial */
        "\\Bc:den"                               /* Base form of the
verb  */
    "\\INFc:y"                                   /* Infinitive */
    "\\PTGc:y"                                   /* Present Tense General (I,
we, you, they)  */
    "\\PT3c:ies"                                 /* Present Tense 3rd Person Singular
(he/she/it)  */
    "\\PASTc:ied"                                /* Past tense */
```

```
    "\\PRESPc:ying"                                              /* Present Participle  */
    "\\PASTPc:ied"                                               /* Past Participle  */
    "\\"
};

resource 'SVRB' (81, PFM_MIN_PRIO) {            /* Investigation */
        "\\Bc:investigat"                                        /* Base form of the verb  */
    "\\INFc:e"                                                   /* Infinitive  */
    "\\PTGc:e"                                                   /* Present Tense General (I,
we, you, they)  */
    "\\PT3c:es"                                                  /* Present Tense 3rd Person
Singular (he/she/it)  */
    "\\PASTc:ed"                                       /* Past tense  */
    "\\PRESPc:ing"                                               /* Present Participle  */
    "\\PASTPc:ed"                                                /* Past Participle  */
    "\\"
};

resource 'SVRB' (82, PFM_MIN_PRIO) {            /* Appraisal */
        "\\Bc:apprais"                                           /* Base form of the verb  */
    "\\INFc:e"                                                   /* Infinitive  */
    "\\PTGc:e"                                                   /* Present Tense General (I,
we, you, they)  */
    "\\PT3c:es"                                                  /* Present Tense 3rd Person
Singular (he/she/it)  */
    "\\PASTc:ed"                                       /* Past tense  */
    "\\PRESPc:ing"                                               /* Present Participle  */
    "\\PASTPc:ed"                                                /* Past Participle  */
    "\\"
};

resource 'SVRB' (83, PFM_MIN_PRIO) {            /* Reappraisal */
        "\\Bc:reapprais"                               /* Base form of the verb  */
    "\\INFc:e"                                                   /* Infinitive  */
    "\\PTGc:e"                                                   /* Present Tense General (I,
we, you, they)  */
    "\\PT3c:es"                                                  /* Present Tense 3rd Person
Singular (he/she/it)  */
    "\\PASTc:ed"                                       /* Past tense  */
    "\\PRESPc:ing"                                               /* Present Participle  */
    "\\PASTPc:ed"                                                /* Past Participle  */
    "\\"
};

resource 'SVRB' (84, PFM_MIN_PRIO) {            /* Doubt */
        "\\Bc:doubt"                                             /* Base form of the verb  */
    "\\INFc:"                                                    /* Infinitive  */
    "\\PTGc:"                                                    /* Present Tense General (I,
we, you, they)  */
    "\\PT3c:s"                                                   /* Present Tense 3rd Person
Singular (he/she/it)  */
    "\\PASTc:ed"                                       /* Past tense  */
    "\\PRESPc:ing"                                               /* Present Participle  */
    "\\PASTPc:ed"                                                /* Past Participle  */
    "\\"
};

resource 'SVRB' (85, PFM_MIN_PRIO) {            /* Ability */
        "\\Bc:• able to do or be"           /* Base form of the verb  */
    "\\INFc:e"                                                   /* Infinitive  */
    "\\PTGc:e"                                                   /* Present Tense General (I,
we, you, they)  */
    "\\PT3c:es"                                                  /* Present Tense 3rd Person
Singular (he/she/it)  */
    "\\PASTc:ed"                                       /* Past tense  */
    "\\PRESPc:ing"                                               /* Present Participle  */
    "\\PASTPc:ed"                                                /* Past Participle  */
    "\\"
};

resource 'SVRB' (86, PFM_MIN_PRIO) {            /* Acceptance */
        "\\Bc:accept"                                            /* Base form of the verb  */
    "\\INFc:"                                                    /* Infinitive  */
    "\\PTGc:"                                                    /* Present Tense General (I,
we, you, they)  */
    "\\PT3c:s"                                                   /* Present Tense 3rd Person
Singular (he/she/it)  */
    "\\PASTc:ed"                                       /* Past tense  */
    "\\PRESPc:ing"                                               /* Present Participle  */
    "\\PASTPc:ed"                                                /* Past Participle  */
    "\\"
};

resource 'SVRB' (87, PFM_MIN_PRIO) {            /* Accurate */
        "\\Bc:"                                                            /* Base form of the
verb  */
    "\\INFc:bring within tolerance"             /* Infinitive  */
    "\\PTGc:bring within tolerance"             /* Present Tense General (I, we, you, they)  */
    "\\PT3c:brings within tolerance"    /* Present Tense 3rd Person Singular (he/she/it)  */
    "\\PASTc:brought within tolerance"  /* Past tense  */
    "\\PRESPc:bringing within tolerance"  /* Present Participle  */
    "\\PASTPc:brought within tolerance"  /* Past Participle  */
    "\\"
};

resource 'SVRB' (88, PFM_MIN_PRIO) {            /* Actuality */
        "\\Bc:ma"                                                          /* Base form of the
verb  */
    "\\INFc:ke happen"                                 /* Infinitive  */
    "\\PTGc:ke happen"                                 /* Present Tense General (I, we, you,
they)  */
    "\\PT3c:kes happen"                                /* Present Tense 3rd Person Singular
(he/she/it)  */
    "\\PASTc:de happen"                                /* Past tense  */
    "\\PRESPc:king happen"                             /* Present Participle  */
    "\\PASTPc:de happen"                     /* Past Participle  */
    "\\"
};

resource 'SVRB' (89, PFM_MIN_PRIO) {            /* Avoid */
        "\\Bc:avoid"                                             /* Base form of the verb  */
```

```
    "\\INFc:"                                   /* Infinitive */
    "\\PTGc:"                                   /* Present Tense General (I, we, you, they) */
    "\\PT3c:s"                                  /* Present Tense 3rd Person Singular (he/she/it) */
    "\\PASTc:ed"                                /* Past tense */
    "\\PRESPc:ing"                              /* Present Participle */
    "\\PASTPc:ed"                               /* Past Participle */
    "\\"
};

resource 'SVRB' (90, PFM_MIN_PRIO) {            /* Aware */
        "\\Bc:• aware"                          /* Base form of the verb -- • indicates auxilary verb "to be" */
    "\\INFc:"                                   /* Infinitive */
    "\\PTGc:"                                   /* Present Tense General (I, we, you, they) */
    "\\PT3c:"                                   /* Present Tense 3rd Person Singular (he/she/it) */
    "\\PASTc:"                                  /* Past tense */
    "\\PRESPc:"                                 /* Present Participle */
    "\\PASTPc:"                                 /* Past Participle */
    "\\"
};

resource 'SVRB' (91, PFM_MIN_PRIO) {            /* Cause */
        "\\Bc:caus"                             /* Base form of the verb */
    "\\INFc:e"                                  /* Infinitive */
    "\\PTGc:e"                                  /* Present Tense General (I, we, you, they) */
    "\\PT3c:es"                                 /* Present Tense 3rd Person Singular (he/she/it) */
    "\\PASTc:ed"                                /* Past tense */
    "\\PRESPc:ing"                              /* Present Participle */
    "\\PASTPc:ed"                               /* Past Participle */
    "\\"
};

resource 'SVRB' (92, PFM_MIN_PRIO) {            /* Certainty */
        "\\Bc:certif"                           /* Base form of the verb */
    "\\INFc:y"                                  /* Infinitive */
    "\\PTGc:y"                                  /* Present Tense General (I, we, you, they) */
    "\\PT3c:ies"                                /* Present Tense 3rd Person Singular (he/she/it) */
    "\\PASTc:ied"                               /* Past tense */
    "\\PRESPc:ying"                             /* Present Participle */
    "\\PASTPc:ied"                              /* Past Participle */
    "\\"
};

resource 'SVRB' (93, PFM_MIN_PRIO) {            /* Change */
        "\\Bc:chang"                            /* Base form of the verb */
    "\\INFc:e"                                  /* Infinitive */
    "\\PTGc:e"                                  /* Present Tense General (I, we, you, they) */
    "\\PT3c:es"                                 /* Present Tense 3rd Person Singular (he/she/it) */
    "\\PASTc:ed"                                /* Past tense */
    "\\PRESPc:ing"                              /* Present Participle */
    "\\PASTPc:ed"                               /* Past Participle */
    "\\"
};

resource 'SVRB' (94, PFM_MIN_PRIO) {            /* Chaos */
        "\\Bc:disrupt"                          /* Base form of the verb */
    "\\INFc:"                                   /* Infinitive */
    "\\PTGc:"                                   /* Present Tense General (I, we, you, they) */
    "\\PT3c:s"                                  /* Present Tense 3rd Person Singular (he/she/it) */
    "\\PASTc:ed"                                /* Past tense */
    "\\PRESPc:ing"                              /* Present Participle */
    "\\PASTPc:ed"                               /* Past Participle */
    "\\"
};

resource 'SVRB' (95, PFM_MIN_PRIO) {            /* Conscience */
        "\\Bc:appeal"                           /* Base form of the verb */
    "\\INFc: to conscience"                     /* Infinitive */
    "\\PTGc: to conscience"                     /* Present Tense General (I, we, you, they) */
    "\\PT3c:s to conscience"                    /* Present Tense 3rd Person Singular (he/she/it) */
    "\\PASTc:led to conscience"                 /* Past tense */
    "\\PRESPc:ling to conscience"               /* Present Participle */
    "\\PASTPc:led  to conscience"               /* Past Participle */
    "\\"
};

resource 'SVRB' (96, PFM_MIN_PRIO) {            /* Consideration */
        "\\Bc:consider"                         /* Base form of the verb */
    "\\INFc:"                                   /* Infinitive */
    "\\PTGc:"                                   /* Present Tense General (I, we, you, they) */
    "\\PT3c:s"                                  /* Present Tense 3rd Person Singular (he/she/it) */
    "\\PASTc:ed"                                /* Past tense */
    "\\PRESPc:ing"                              /* Present Participle */
    "\\PASTPc:ed"                               /* Past Participle */
    "\\"
};

resource 'SVRB' (97, PFM_MIN_PRIO) {            /* Contolled */
        "\\Bc:• in control"                     /* Base form of the verb */
    "\\INFc:"                                   /* Infinitive */
    "\\PTGc:"                                   /* Present Tense General (I, we, you, they) */
    "\\PT3c:s"                                  /* Present Tense 3rd Person Singular (he/she/it) */
```

```
    "\\PASTc:led"                                                       /* Past tense */
    "\\PRESPc:ling"                                                     /* Present Participle
*/
    "\\PASTPc:led"                                                      /* Past Participle */
    "\\"
};

resource 'SVRB' (98, PFM_MIN_PRIO) {            /* Deduction */
        "\\Bc:deduc"                                                    /* Base form of the verb */
    "\\INFc:e"                                                          /* Infinitive */
    "\\PTGc:e"                                                          /* Present Tense General (I,
we, you, they) */
    "\\PT3c:es"                                                         /* Present Tense 3rd Person
Singular (he/she/it) */
    "\\PASTc:ed"                                                /* Past tense */
    "\\PRESPc:ing"                                                      /* Present Participle */
    "\\PASTPc:ed"                                                       /* Past Participle */
    "\\"
};

resource 'SVRB' (99, PFM_MIN_PRIO) {            /* Desire */
        "\\Bc:desir"                                                    /* Base form of the verb */
    "\\INFc:e"                                                          /* Infinitive */
    "\\PTGc:e"                                                          /* Present Tense General (I,
we, you, they) */
    "\\PT3c:es"                                                         /* Present Tense 3rd Person
Singular (he/she/it) */
    "\\PASTc:ed"                                                /* Past tense */
    "\\PRESPc:ing"                                                      /* Present Participle */
    "\\PASTPc:ed"                                                       /* Past Participle */
    "\\"
};

resource 'SVRB' (100, PFM_MIN_PRIO) {           /* Determination */
        "\\Bc:determin"                                                 /* Base form of the verb */
    "\\INFc:e"                                                          /* Infinitive */
    "\\PTGc:e"                                                          /* Present Tense General (I,
we, you, they) */
    "\\PT3c:es"                                                         /* Present Tense 3rd Person
Singular (he/she/it) */
    "\\PASTc:ed"                                                /* Past tense */
    "\\PRESPc:ing"                                                      /* Present Participle */
    "\\PASTPc:ed"                                                       /* Past Participle */
    "\\"
};

resource 'SVRB' (101, PFM_MIN_PRIO) {           /* Disbelief */
        "\\Bc:disbeliev"                                        /* Base form of the verb */
    "\\INFc:e"                                                          /* Infinitive */
    "\\PTGc:e"                                                          /* Present Tense General (I,
we, you, they) */
    "\\PT3c:es"                                                         /* Present Tense 3rd Person
Singular (he/she/it) */
    "\\PASTc:ed"                                                /* Past tense */
    "\\PRESPc:ing"                                                      /* Present Participle */
    "\\PASTPc:ed"                                                       /* Past Participle */
    "\\"
};

resource 'SVRB' (102, PFM_MIN_PRIO) {           /* Effect */
        "\\Bc:effect"                                                   /* Base form of the verb */
    "\\INFc:"                                                           /* Infinitive */
    "\\PTGc:"                                                           /* Present Tense General (I,
we, you, they) */
    "\\PT3c:s"                                                          /* Present Tense 3rd Person
Singular (he/she/it) */
    "\\PASTc:ed"                                                /* Past tense */
    "\\PRESPc:ing"                                                      /* Present Participle */
    "\\PASTPc:ed"                                                       /* Past Participle */
    "\\"
};

resource 'SVRB' (103, PFM_MIN_PRIO) {           /* Ending */
        "\\Bc:end"                                                              /* Base form of the
verb */
    "\\INFc:"                                                           /* Infinitive */
    "\\PTGc:"                                                           /* Present Tense General (I,
we, you, they) */
    "\\PT3c:s"                                                          /* Present Tense 3rd Person
Singular (he/she/it) */
    "\\PASTc:ed"                                                /* Past tense */
    "\\PRESPc:ing"                                                      /* Present Participle */
    "\\PASTPc:ed"                                                       /* Past Participle */
    "\\"
};

resource 'SVRB' (104, PFM_MIN_PRIO) {           /* Equity */
        "\\Bc:• fair"                                                   /* Base form of the verb */
    "\\INFc:e"                                                          /* Infinitive */
    "\\PTGc:e"                                                          /* Present Tense General (I,
we, you, they) */
    "\\PT3c:es"                                                         /* Present Tense 3rd Person
Singular (he/she/it) */
    "\\PASTc:ed"                                                /* Past tense */
    "\\PRESPc:ing"                                                      /* Present Participle */
    "\\PASTPc:ed"                                                       /* Past Participle */
    "\\"
};

resource 'SVRB' (105, PFM_MIN_PRIO) {           /* Evaluation */
        "\\Bc:evaluat"                                                  /* Base form of the verb */
    "\\INFc:e"                                                          /* Infinitive */
    "\\PTGc:e"                                                          /* Present Tense General (I,
we, you, they) */
    "\\PT3c:es"                                                         /* Present Tense 3rd Person
Singular (he/she/it) */
    "\\PASTc:ed"                                                /* Past tense */
    "\\PRESPc:ing"                                                      /* Present Participle */
    "\\PASTPc:ed"                                                       /* Past Participle */
    "\\"
};

resource 'SVRB' (106, PFM_MIN_PRIO) {           /* Expectation */
```

```
        "\\Bc:expect"                                                    /* Base form of the verb  */
    "\\INFc:"                                                            /* Infinitive  */
    "\\PTGc:"                                                            /* Present Tense General (I,
we, you, they)  */
    "\\PT3c:s"                                                           /* Present Tense 3rd Person
Singular (he/she/it)  */
    "\\PASTc:ed"                                                 /* Past tense  */
    "\\PRESPc:ing"                                                       /* Present Participle  */
    "\\PASTPc:ed"                                                        /* Past Participle  */
    "\\"
);

resource 'SVRB' (107, PFM_MIN_PRIO) {          /* Faith */
        "\\Bc:believ"                                                    /* Base form of the verb  */
    "\\INFc:e"                                                           /* Infinitive  */
    "\\PTGc:e"                                                           /* Present Tense General (I,
we, you, they)  */
    "\\PT3c:es"                                                          /* Present Tense 3rd Person
Singular (he/she/it)  */
    "\\PASTc:ed"                                                 /* Past tense  */
    "\\PRESPc:ing"                                                       /* Present Participle  */
    "\\PASTPc:ed"                                                        /* Past Participle  */
    "\\"
);

resource 'SVRB' (108, PFM_MIN_PRIO) {          /* Feeling */
        "\\Bc:fe"                                                                 /* Base form of the
verb  */
    "\\INFc:el"                                                          /* Infinitive  */
    "\\PTGc:el"                                                          /* Present Tense General (I,
we, you, they)  */
    "\\PT3c:els"                                                 /* Present Tense 3rd Person Singular
(he/she/it)  */
    "\\PASTc:lt"                                                 /* Past tense  */
    "\\PRESPc:eling"                                             /* Present Participle  */
    "\\PASTPc:lt"                                                        /* Past Participle  */
    "\\"
);

resource 'SVRB' (109, PFM_MIN_PRIO) {          /* Help */
        "\\Bc:help"                                                               /* Base form of the
verb  */
    "\\INFc:"                                                            /* Infinitive  */
    "\\PTGc:"                                                            /* Present Tense General (I,
we, you, they)  */
    "\\PT3c:s"                                                           /* Present Tense 3rd Person
Singular (he/she/it)  */
    "\\PASTc:ed"                                                 /* Past tense  */
    "\\PRESPc:ing"                                                       /* Present Participle  */
    "\\PASTPc:ed"                                                        /* Past Participle  */
    "\\"
);

resource 'SVRB' (110, PFM_MIN_PRIO) {          /* Hinder */
        "\\Bc:hinder"                                                    /* Base form of the verb  */
    "\\INFc:"                                                            /* Infinitive  */
    "\\PTGc:"                                                            /* Present Tense General (I,
we, you, they)  */
    "\\PT3c:s"                                                           /* Present Tense 3rd Person
Singular (he/she/it)  */
    "\\PASTc:ed"                                                 /* Past tense  */
    "\\PRESPc:ing"                                                       /* Present Participle  */
    "\\PASTPc:ed"                                                        /* Past Participle  */
    "\\"
);

resource 'SVRB' (111, PFM_MIN_PRIO) {          /* Hunch */
        "\\Bc:intuit"                                                    /* Base form of the verb  */
    "\\INFc:"                                                            /* Infinitive  */
    "\\PTGc:"                                                            /* Present Tense General (I,
we, you, they)  */
    "\\PT3c:s"                                                           /* Present Tense 3rd Person
Singular (he/she/it)  */
    "\\PASTc:ed"                                                 /* Past tense  */
    "\\PRESPc:ing"                                                       /* Present Participle  */
    "\\PASTPc:ed"                                                        /* Past Participle  */
    "\\"
);

resource 'SVRB' (112, PFM_MIN_PRIO) {          /* Inaction */
        "\\Bc:decid"                                                     /* Base form of the verb  */
    "\\INFc:e not to interfere"                          /* Infinitive  */
    "\\PTGc:e not to interfere"                          /* Present Tense General (I, we, you, they)  */
    "\\PT3c:es not to interfere"                 /* Present Tense 3rd Person Singular (he/she/it)  */
    "\\PASTc:ed not to interfere"                        /* Past tense  */
    "\\PRESPc:ing not to interfere"                      /* Present Participle  */
    "\\PASTPc:ed not to interfere"                       /* Past Participle  */
    "\\"
);

resource 'SVRB' (113, PFM_MIN_PRIO) {          /* Induction */
        "\\Bc:induc"                                                     /* Base form of the verb  */
    "\\INFc:e"                                                           /* Infinitive  */
    "\\PTGc:e"                                                           /* Present Tense General (I,
we, you, they)  */
    "\\PT3c:es"                                                          /* Present Tense 3rd Person
Singular (he/she/it)  */
    "\\PASTc:ed"                                                 /* Past tense  */
    "\\PRESPc:ing"                                                       /* Present Participle  */
    "\\PASTPc:ed"                                                        /* Past Participle  */
    "\\"
);

resource 'SVRB' (114, PFM_MIN_PRIO) {          /* Inequity */
        "\\Bc:• unfair"                                                  /* Base form of the verb  */
    "\\INFc:e"                                                           /* Infinitive  */
    "\\PTGc:e"                                                           /* Present Tense General (I,
we, you, they)  */
    "\\PT3c:es"                                                          /* Present Tense 3rd Person
Singular (he/she/it)  */
    "\\PASTc:ed"                                                 /* Past tense  */
    "\\PRESPc:ing"                                                       /* Present Participle  */
    "\\PASTPc:ed"                                                        /* Past Participle  */
```

```
    "\\"
};

resource 'SVRB' (115, PFM_MIN_PRIO) {                /* Inertia */
        "\\Bc:maintain"                                                   /* Base form of the verb */
    "\\INFc:"                                                             /* Infinitive */
    "\\PTGc:"                                                             /* Present Tense General (I,
we, you, they) */
    "\\PT3c:s"                                                            /* Present Tense 3rd Person
Singular (he/she/it) */
    "\\PASTc:ed"                                                  /* Past tense */
    "\\PRESPc:ing"                                                        /* Present Participle */
    "\\PASTPc:ed"                                                         /* Past Participle */
    "\\"
};

resource 'SVRB' (116, PFM_MIN_PRIO) {                /* Knowledge */
        "\\Bc:know"                                                               /* Base form of the
verb */
    "\\INFc:"                                                             /* Infinitive */
    "\\PTGc:"                                                             /* Present Tense General (I,
we, you, they) */
    "\\PT3c:s"                                                            /* Present Tense 3rd Person
Singular (he/she/it) */
    "\\PASTc:ed"                                                  /* Past tense */
    "\\PRESPc:ing"                                                        /* Present Participle */
    "\\PASTPc:ed"                                                         /* Past Participle */
    "\\"
};

resource 'SVRB' (117, PFM_MIN_PRIO) {                /* Logic */
        "\\Bc:reason"                                                     /* Base form of the verb */
    "\\INFc:"                                                             /* Infinitive */
    "\\PTGc:"                                                             /* Present Tense General (I,
we, you, they) */
    "\\PT3c:s"                                                            /* Present Tense 3rd Person
Singular (he/she/it) */
    "\\PASTc:ed"                                                  /* Past tense */
    "\\PRESPc:ing"                                                        /* Present Participle */
    "\\PASTPc:ed"                                                         /* Past Participle */
    "\\"
};

resource 'SVRB' (118, PFM_MIN_PRIO) {                /* Non-acceptance */
        "\\Bc:reject"                                                     /* Base form of the verb */
    "\\INFc:"                                                             /* Infinitive */
    "\\PTGc:"                                                             /* Present Tense General (I,
we, you, they) */
    "\\PT3c:s"                                                            /* Present Tense 3rd Person
Singular (he/she/it) */
    "\\PASTc:ed"                                                  /* Past tense */
    "\\PRESPc:ing"                                                        /* Present Participle */
    "\\PASTPc:ed"                                                         /* Past Participle */
    "\\"
};

resource 'SVRB' (119, PFM_MIN_PRIO) {                /* Non-Accurate */
        "\\Bc:+ inaccurate"                                               /* Base form of the verb */
    "\\INFc:"                                                             /* Infinitive */
    "\\PTGc:"                                                             /* Present Tense General (I,
we, you, they) */
    "\\PT3c:"                                                             /* Present Tense 3rd Person
Singular (he/she/it) */
    "\\PASTc:"                                                            /* Past tense */
    "\\PRESPc:"                                                           /* Present Participle */
    "\\PASTPc:"                                                           /* Past Participle */
    "\\"
};

resource 'SVRB' (120, PFM_MIN_PRIO) {                /* Oppose */
        "\\Bc:oppos"                                                      /* Base form of the verb */
    "\\INFc:e"                                                            /* Infinitive */
    "\\PTGc:e"                                                            /* Present Tense General (I,
we, you, they) */
    "\\PT3c:es"                                                           /* Present Tense 3rd Person
Singular (he/she/it) */
    "\\PASTc:ed"                                                  /* Past tense */
    "\\PRESPc:ing"                                                        /* Present Participle */
    "\\PASTPc:ed"                                                         /* Past Participle */
    "\\"
};

resource 'SVRB' (121, PFM_MIN_PRIO) {                /* Order */
        "\\Bc:order"                                                      /* Base form of the verb */
    "\\INFc:"                                                             /* Infinitive */
    "\\PTGc:"                                                             /* Present Tense General (I,
we, you, they) */
    "\\PT3c:s"                                                            /* Present Tense 3rd Person
Singular (he/she/it) */
    "\\PASTc:ed"                                                  /* Past tense */
    "\\PRESPc:ing"                                                        /* Present Participle */
    "\\PASTPc:ed"                                                         /* Past Participle */
    "\\"
};

resource 'SVRB' (122, PFM_MIN_PRIO) {                /* Perception */
        "\\Bc:perciev"                                                    /* Base form of the verb */
    "\\INFc:e"                                                            /* Infinitive */
    "\\PTGc:e"                                                            /* Present Tense General (I,
we, you, they) */
    "\\PT3c:es"                                                           /* Present Tense 3rd Person
Singular (he/she/it) */
    "\\PASTc:ed"                                                  /* Past tense */
    "\\PRESPc:ing"                                                        /* Present Participle */
    "\\PASTPc:ed"                                                         /* Past Participle */
    "\\"
};

resource 'SVRB' (123, PFM_MIN_PRIO) {                /* Possibility */
        "\\Bc:"                                                                   /* Base form of the
verb */
    "\\INFc:make possible"                                        /* Infinitive */
```

```
    "\\PTGc:make possible"          /* Present Tense General (I, we, you,
they)  */
    "\\PT3c:makes possible"         /* Present Tense 3rd Person Singular
(he/she/it)  */
    "\\PASTc:made possible"         /* Past tense  */
    "\\PRESPc:making possible"      /* Present Participle  */
    "\\PASTPc:made possible"        /* Past Participle  */
    "\\"
};

resource 'SVRB' (124, PFM_MIN_PRIO) {        /* Potentiality */
        "\\Bc:creat"                /* Base form of the verb  */
    "\\INFc:e potiential"           /* Infinitive  */
    "\\PTGc:e potiential"           /* Present Tense General (I, we, you, they)  */
    "\\PT3c:es potiential"          /* Present Tense 3rd Person Singular
(he/she/it)  */
    "\\PASTc:ed potiential"         /* Past tense  */
    "\\PRESPc:ing potiential"       /* Present Participle  */
    "\\PASTPc:ed potiential"        /* Past Participle  */
    "\\"
};

resource 'SVRB' (125, PFM_MIN_PRIO) {        /* Proaction */
        "\\Bc:proact"               /* Base form of the verb  */
    "\\INFc:"                       /* Infinitive  */
    "\\PTGc:"                       /* Present Tense General (I,
we, you, they)  */
    "\\PT3c:s"                      /* Present Tense 3rd Person
Singular (he/she/it)  */
    "\\PASTc:ed"                    /* Past tense  */
    "\\PRESPc:ing"                  /* Present Participle  */
    "\\PASTPc:ed"                   /* Past Participle  */
    "\\"
};

resource 'SVRB' (126, PFM_MIN_PRIO) {        /* Probability */
        "\\Bc:"                     /* Base form of the
verb  */
    "\\INFc:make likely"            /* Infinitive  */
    "\\PTGc:make likely"            /* Present Tense General (I, we, you, they)  */
    "\\PT3c:makes likely"           /* Present Tense 3rd Person Singular (he/she/it)
*/
    "\\PASTc:made likely"           /* Past tense  */
    "\\PRESPc:making likely"        /* Present Participle  */
    "\\PASTPc:made likely"          /* Past Participle  */
    "\\"
};

resource 'SVRB' (127, PFM_MIN_PRIO) {        /* Process */
        "\\Bc:process"              /* Base form of the verb  */
    "\\INFc:"                       /* Infinitive  */
    "\\PTGc:"                       /* Present Tense General (I,
we, you, they)  */
    "\\PT3c:es"                     /* Present Tense 3rd Person
Singular (he/she/it)  */
    "\\PASTc:ed"                    /* Past tense  */
    "\\PRESPc:ing"                  /* Present Participle  */
    "\\PASTPc:ed"                   /* Past Participle  */
    "\\"
};

resource 'SVRB' (128, PFM_MIN_PRIO) {        /* Production */
        "\\Bc:produc"               /* Base form of the verb  */
    "\\INFc:e"                      /* Infinitive  */
    "\\PTGc:e"                      /* Present Tense General (I,
we, you, they)  */
    "\\PT3c:es"                     /* Present Tense 3rd Person
Singular (he/she/it)  */
    "\\PASTc:ed"                    /* Past tense  */
    "\\PRESPc:ing"                  /* Present Participle  */
    "\\PASTPc:ed"                   /* Past Participle  */
    "\\"
};

resource 'SVRB' (129, PFM_MIN_PRIO) {        /* Projection */
        "\\Bc:project"              /* Base form of the verb  */
    "\\INFc:"                       /* Infinitive  */
    "\\PTGc:"                       /* Present Tense General (I,
we, you, they)  */
    "\\PT3c:s"                      /* Present Tense 3rd Person
Singular (he/she/it)  */
    "\\PASTc:ed"                    /* Past tense  */
    "\\PRESPc:ing"                  /* Present Participle  */
    "\\PASTPc:ed"                   /* Past Participle  */
    "\\"
};

resource 'SVRB' (130, PFM_MIN_PRIO) {        /* Protection */
        "\\Bc:protect"              /* Base form of the verb  */
    "\\INFc:"                       /* Infinitive  */
    "\\PTGc:"                       /* Present Tense General (I,
we, you, they)  */
    "\\PT3c:s"                      /* Present Tense 3rd Person
Singular (he/she/it)  */
    "\\PASTc:ed"                    /* Past tense  */
    "\\PRESPc:ing"                  /* Present Participle  */
    "\\PASTPc:ed"                   /* Past Participle  */
    "\\"
};

resource 'SVRB' (131, PFM_MIN_PRIO) {        /* Proven */
        "\\Bc:prov"                 /* Base form of the
verb  */
    "\\INFc:e"                      /* Infinitive  */
    "\\PTGc:e"                      /* Present Tense General (I,
we, you, they)  */
    "\\PT3c:es"                     /* Present Tense 3rd Person
Singular (he/she/it)  */
    "\\PASTc:ed"                    /* Past tense  */
    "\\PRESPc:ing"                  /* Present Participle  */
    "\\PASTPc:ed"                   /* Past Participle  */
    "\\"
};
```

```
resource 'SVRB' (132, PFM_MIN_PRIO) {                     /* Pursuit */
        "\\Bc:pursu"                                       /* Base form of the verb  */
    "\\INFc:e"                                             /* Infinitive  */
    "\\PTGc:e"                                             /* Present Tense General (I,
we, you, they)  */
    "\\PT3c:es"                                            /* Present Tense 3rd Person
Singular (he/she/it)  */
    "\\PASTc:ed"                                           /* Past tense  */
    "\\PRESPc:ing"                                         /* Present Participle  */
    "\\PASTPc:ed"                                          /* Past Participle  */
    "\\"
};

resource 'SVRB' (133, PFM_MIN_PRIO) {                     /* Re-evaluation */
        "\\Bc:re-evaluat"                                  /* Base form of the verb  */
    "\\INFc:e"                                             /* Infinitive  */
    "\\PTGc:e"                                             /* Present Tense General (I,
we, you, they)  */
    "\\PT3c:es"                                            /* Present Tense 3rd Person
Singular (he/she/it)  */
    "\\PASTc:ed"                                           /* Past tense  */
    "\\PRESPc:ing"                                         /* Present Participle  */
    "\\PASTPc:ed"                                          /* Past Participle  */
    "\\"
};

resource 'SVRB' (134, PFM_MIN_PRIO) {                     /* Reaction */
        "\\Bc:react"                                       /* Base form of the verb  */
    "\\INFc:"                                              /* Infinitive  */
    "\\PTGc:"                                              /* Present Tense General (I,
we, you, they)  */
    "\\PT3c:s"                                             /* Present Tense 3rd Person
Singular (he/she/it)  */
    "\\PASTc:ed"                                           /* Past tense  */
    "\\PRESPc:ing"                                         /* Present Participle  */
    "\\PASTPc:ed"                                          /* Past Participle  */
    "\\"
};

resource 'SVRB' (135, PFM_MIN_PRIO) {                     /* Reconsideration */
        "\\Bc:reconsider"                                  /* Base form of the verb  */
    "\\INFc:"                                              /* Infinitive  */
    "\\PTGc:"                                              /* Present Tense General (I,
we, you, they)  */
    "\\PT3c:s"                                             /* Present Tense 3rd Person
Singular (he/she/it)  */
    "\\PASTc:ed"                                           /* Past tense  */
    "\\PRESPc:ing"                                         /* Present Participle  */
    "\\PASTPc:ed"                                          /* Past Participle  */
    "\\"
};

resource 'SVRB' (136, PFM_MIN_PRIO) {                     /* Reduction */
        "\\Bc:reduc"                                       /* Base form of the verb  */
    "\\INFc:e"                                             /* Infinitive  */
    "\\PTGc:e"                                             /* Present Tense General (I,
we, you, they)  */
    "\\PT3c:es"                                            /* Present Tense 3rd Person
Singular (he/she/it)  */
    "\\PASTc:ed"                                           /* Past tense  */
    "\\PRESPc:ing"                                         /* Present Participle  */
    "\\PASTPc:ed"                                          /* Past Participle  */
    "\\"
};

resource 'SVRB' (137, PFM_MIN_PRIO) {                     /* Result */
        "\\Bc:"                                            /* Base form of the
verb  */
    "\\INFc:get results"                                   /* Infinitive  */
    "\\PTGc:get results"                                   /* Present Tense General (I, we, you, they)  */
    "\\PT3c:gets results"                                  /* Present Tense 3rd Person Singular (he/she/it)
*/
    "\\PASTc:got results"                                  /* Past tense  */
    "\\PRESPc:getting results"                             /* Present Participle  */
    "\\PASTPc:gotten results"                              /* Past Participle  */
    "\\"
};

resource 'SVRB' (138, PFM_MIN_PRIO) {                     /* Self-Aware */
        "\\Bc:- self-aware"                                /* Base form of the verb  */
    "\\INFc:"                                              /* Infinitive  */
    "\\PTGc:"                                              /* Present Tense General (I,
we, you, they)  */
    "\\PT3c:"                                              /* Present Tense 3rd Person
Singular (he/she/it)  */
    "\\PASTc:"                                             /* Past tense  */
    "\\PRESPc:"                                            /* Present Participle  */
    "\\PASTPc:"                                            /* Past Participle  */
    "\\"
};

resource 'SVRB' (139, PFM_MIN_PRIO) {                     /* Speculation */
        "\\Bc:speculat"                                    /* Base form of the verb  */
    "\\INFc:e"                                             /* Infinitive  */
    "\\PTGc:e"                                             /* Present Tense General (I,
we, you, they)  */
    "\\PT3c:es"                                            /* Present Tense 3rd Person
Singular (he/she/it)  */
    "\\PASTc:ed"                                           /* Past tense  */
    "\\PRESPc:ing"                                         /* Present Participle  */
    "\\PASTPc:ed"                                          /* Past Participle  */
    "\\"
};

resource 'SVRB' (140, PFM_MIN_PRIO) {                     /* Support */
        "\\Bc:support"                                     /* Base form of the verb  */
    "\\INFc:"                                              /* Infinitive  */
    "\\PTGc:"                                              /* Present Tense General (I,
we, you, they)  */
    "\\PT3c:s"                                             /* Present Tense 3rd Person
Singular (he/she/it)  */
    "\\PASTc:ed"                                           /* Past tense  */
```

```
    "\\PRESPc:ing"                                                  /* Present Participle  */
    "\\PASTPc:ed"                                                   /* Past Participle  */
    "\\"
};

resource 'SVRB' (141, PFM_MIN_PRIO) {         /* Temptation */
        "\\Bc:tempt"                                                /* Base form of the verb  */
    "\\INFc:"                                                       /* Infinitive  */
    "\\PTGc:"                                                       /* Present Tense General (I,
we, you, they)  */
    "\\PT3c:s"                                                      /* Present Tense 3rd Person
Singular (he/she/it)  */
    "\\PASTc:ed"                                               /* Past tense  */
    "\\PRESPc:ing"                                                  /* Present Participle  */
    "\\PASTPc:ed"                                                   /* Past Participle  */
    "\\"
};

resource 'SVRB' (142, PFM_MIN_PRIO) {         /* Test */
        "\\Bc:test"                                                         /* Base form of the
verb  */
    "\\INFc:"                                                       /* Infinitive  */
    "\\PTGc:"                                                       /* Present Tense General (I,
we, you, they)  */
    "\\PT3c:s"                                                      /* Present Tense 3rd Person
Singular (he/she/it)  */
    "\\PASTc:ed"                                               /* Past tense  */
    "\\PRESPc:ing"                                                  /* Present Participle  */
    "\\PASTPc:ed"                                                   /* Past Participle  */
    "\\"
};

resource 'SVRB' (143, PFM_MIN_PRIO) {         /* Theory */
        "\\Bc:theoriz"                                              /* Base form of the verb  */
    "\\INFc:e"                                                      /* Infinitive  */
    "\\PTGc:e"                                                      /* Present Tense General (I,
we, you, they)  */
    "\\PT3c:es"                                                     /* Present Tense 3rd Person
Singular (he/she/it)  */
    "\\PASTc:ed"                                               /* Past tense  */
    "\\PRESPc:ing"                                                  /* Present Participle  */
    "\\PASTPc:ed"                                                   /* Past Participle  */
    "\\"
};

resource 'SVRB' (144, PFM_MIN_PRIO) {         /* Thought */
        "\\Bc:think"                                                /* Base form of the verb  */
    "\\INFc:"                                                       /* Infinitive  */
    "\\PTGc:"                                                       /* Present Tense General (I,
we, you, they)  */
    "\\PT3c:s"                                                      /* Present Tense 3rd Person
Singular (he/she/it)  */
    "\\PASTc:ed"                                               /* Past tense  */
    "\\PRESPc:ing"                                                  /* Present Participle  */
    "\\PASTPc:ed"                                                   /* Past Participle  */
    "\\"
};

resource 'SVRB' (145, PFM_MIN_PRIO) {         /* Trust */
        "\\Bc:trust"                                                /* Base form of the verb  */
    "\\INFc:"                                                       /* Infinitive  */
    "\\PTGc:"                                                       /* Present Tense General (I,
we, you, they)  */
    "\\PT3c:s"                                                      /* Present Tense 3rd Person
Singular (he/she/it)  */
    "\\PASTc:ed"                                               /* Past tense  */
    "\\PRESPc:ing"                                                  /* Present Participle  */
    "\\PASTPc:ed"                                                   /* Past Participle  */
    "\\"
};

resource 'SVRB' (146, PFM_MIN_PRIO) {         /* Un-Ending */
        "\\Bc:remain"                                               /* Base form of the verb  */
    "\\INFc: unresolved"                          /* Infinitive  */
    "\\PTGc: unresolved"                          /* Present Tense General (I, we, you, they)  */
    "\\PT3c:s unresolved"                         /* Present Tense 3rd Person Singular (he/she/it)
*/
    "\\PASTc:ed unresolved"                            /* Past tense  */
    "\\PRESPc:ing unresolved"                     /* Present Participle  */
    "\\PASTPc:ed unresolved"                      /* Past Participle  */
    "\\"
};

resource 'SVRB' (147, PFM_MIN_PRIO) {         /* Uncontrolled */
        "\\Bc:• uncontrolled"                                  /* Base form of the verb  */
    "\\INFc:"                                                       /* Infinitive  */
    "\\PTGc:"                                                       /* Present Tense General (I,
we, you, they)  */
    "\\PT3c:s"                                                      /* Present Tense 3rd Person
Singular (he/she/it)  */
    "\\PASTc:ed"                                               /* Past tense  */
    "\\PRESPc:ing"                                                  /* Present Participle  */
    "\\PASTPc:ed"                                                   /* Past Participle  */
    "\\"
};

resource 'SVRB' (148, PFM_MIN_PRIO) {         /* Unproven */
        "\\Bc:• unproven"                                           /* Base form of the verb  */
    "\\INFc:"                                                       /* Infinitive  */
    "\\PTGc:"                                                       /* Present Tense General (I,
we, you, they)  */
    "\\PT3c:s"                                                      /* Present Tense 3rd Person
Singular (he/she/it)  */
    "\\PASTc:ed"                                               /* Past tense  */
    "\\PRESPc:ing"                                                  /* Present Participle  */
    "\\PASTPc:ed"                                                   /* Past Participle  */
    "\\"
};
```

```
/* $Log:          verbs.r,v $
# Revision 1.10  93/06/02  21:48:11  chris
# Moved types, variations, and elements between classes.
#
# Revision 1.9  93/05/26  19:48:13  stephen
# Windows fixes.
#
# Revision 1.8  93/05/21  17:14:56  chris
# Clean-up.
#
# Revision 1.7  93/05/18  18:16:08  chris
# Changed verb form of Ability from enable to being able.
#
# Revision 1.6  93/05/13  15:40:26  chris
# Modified some verbs per Melanie.
#
# Revision 1.5  93/05/12  21:04:58  stephen
# Added Linking Verb conjugation.
#
# Revision 1.4  93/05/10  16:58:25  stephen
# Minor changes to PText key names.
#
# Revision 1.3  93/05/05  14:26:26  chris
# Corrected some typos.
#
# Revision 1.2  93/04/29  14:20:40  chris
# Changed "Do" and "Don't" to "Attract" and
#  "Repel".
#
# Revision 1.1  93/04/23  16:38:19  chris
# Initial revision
#
 */
```

APPENDIX B

Domains (Classes)

Universe: a situation

Physics: an activity

Psychology: a manner of thinking

Mind: a fixed attitude

Concerns (Types)

Becoming: transforming one's nature

Being: temporarily adopting a lifestyle

Conceiving: coming up with an idea

Conceptualizing: visualizing how an idea might be implemented

The Conscious: considerations

Doing: engaging in a physical activity

The Future: what will happen or what will be

Learning: gathering information or experience

Memory: recollections

Obtaining: achieving or possessing something

The Past: what has already happened

The Preconscious: immediate responses

The Present: the current situation and circumstances

Progress: the way things are going

The Subconscious: basic drives and desires

Understanding: appreciating the meaning of something

Themes (Variations)

Ability: being suited to handle a task; the innate capacity to do or be

Analysis: evaluation of the situation and/or circumstances

Appraisal: an initial understanding

Approach: one's methodology of doing or being

Attempt: applying oneself to something not known to be within one's ability

Attitude: one's demeanor while doing or being

Attraction: drawing or being drawn to something

Choice: making a decision

Circumstances: the relationship of oneself to the environment

Closure: bringing something to an end

Commitment: a decision to stick with something regardless of the consequences

Conditioning: responses based on experience or training

Confidence: belief in the accuracy of an expectation

Deficiency: motivation based on lack

Delay: putting off until later

Denial: the refusal to let something go

Desire: the motivation to change one's situation or circumstances

Destiny: the future path an individual will take

Doubt: questioning validity without investigating to be sure

Dream: a desired future that requires unexpected developments

Enlightenment: an understanding that transcends knowledge

Evidence: information supporting a belief

Expediency: most efficient course considering repercussions

Experience: the gaining of familiarity

Fact: belief in something real

Falsehood: that which has been shown to be erroneous

Fantasy: belief in something unreal

Fate: a future situation that will befall an individual

Hope: a desired future if things go as expected

Instinct: intrinsic unconditioned responses

Interdiction: an effort to change a pre-determined course

Interpretation: determination of possible meaning

Investigation: gathering evidence to resolve questions of validity

Knowledge: that which one holds to be true

Morality: doing or being based on what is best for others

Need: that which is required

Obligation: accepting a task or situation in exchange for someone's potential favors Openness: willingness to re-evaluate Permission: one's ability based on what is allowed Preconception: unwillingness to re-evaluate Preconditions: limitations tacked on to an effort Prediction: a determination of a future state of affairs Prerequisites: preliminary steps that must be met Rationalization: a logical alternative used to mask the real reason Reappraisal: a reconsideration of a conclusion Repulsion: pushing or being pushed away from Responsibility: the belief that one is best suited to accomplish a task Security: an evaluation of one's protections Self-Interest: doing or being based on what is best for oneself Sense-of-Self: one's perception of oneself Senses: sensory observations Situation: the arrangement of one's environment Skill: practiced ability State-of-Being: one's true self Strategy: a plan to achieve one's purpose or a plan of response Suspicion: questioning a belief based on evidence Thought: the process of consideration Threat: an evaluation of one's vulnerabilities Truth: that which has been proven correct Value: the objective usefulness of something in general Wisdom: understanding how to apply Knowledge Work: applying oneself to something known to be within one's ability Worry: concern for the future Worth: a rating of usefulness or desirability to oneself Elements Ability: being suited to handle a task; the innate capacity to do or be Acceptance: a decision not to oppose Accurate: being within tolerances Actuality: an objective reality -- the way things are Avoidance: stepping around, preventing or escaping from a problem rather than solving it Aware: being conscious of things outside oneself Cause: the specific circumstances that lead to an effect Certainty: a conclusion that something is absolutely true Change: an alteration of a state or process Chaos: random change or a lack of order Conscience: foregoing an immediate benefit because of future consequences Consider: weighing pros and cons Control: a method based on organization and constraint Deduction: a process of thought that determines certainty Desire: the motivation to change one's situation or circumstances Determination: a conclusion as to the cause behind a particular effect Disbelief: the belief that something is untrue Effect: the specific outcome forced by a cause Ending: coming to a conclusion Equity: a balance, fairness, or stability Evaluation: an appraisal of a situation and/or circumstances Expectation: a conclusion as to the eventual effect of a particular cause Faith: accepting something as certain without proof Feeling: an emotional sense of how things are going Help: a direct assistance to another's effort to achieve their goal Hinder: a direct detraction from another's effort to achieve their goal Hunch: a conclusion based on intuition Inaction: taking no action as a means of response Induction: a means of determining possibility Inequity: an unbalance, unfairness, or lack or stability Inertia: a continuation of a state or process Knowledge: that which one holds to be true Logic: a rational sense of how things are related Non-acceptance: a decision to oppose Non-Accurate: not within tolerances Oppose: an indirect detraction from another's effort Order: an arrangement in which patterns are seen Perception: the way things seem to be Possibility: a determination that something might be true Potentiality: a determination that something has the capacity to become true Proaction: taking initiative action to achieve one's goals Probability: a determination of likelihood Process: the mechanism through which a cause leads to an effect Production: a process of thought that determines potential Projection: an extension of probability into the future Protection: an effort to prevent one's concerns from being vulnerable to interference Proven: a rating of knowledge based on corroboration Pursuit: a directed effort to resolve a problem Re-evaluation: a reappraisal of a situation or circumstances Reaction: actions made in response Reconsider: questioning a conclusion based on additional information Reduction: a process of thought that determines probability Result: the ramifications of a specific effect Self-Aware: being conscious of one's own existence Speculation: an extension of possibility into the future Support: an indirect assistance given to another's efforts Temptation: the urge to embrace immediate benefits despite possible consequences Test: a trial to determine something's validity Theory: an unbroken chain of relationships leading from a premise to a conclusion Thought: the process of consideration Trust: an acceptance of knowledge as proven without first testing its validity Un-Ending: a continuance without cessation Uncontrolled: a disorganized response Unproven: a rating of knowledge that has not been tested

We claim:

1. An article of manufacture comprising:

a computer usable medium having computer readable program code embodied therein for identifying object relationships, the computer readable program code in said article of manufacture comprising:

computer readable program code configured to cause a computer to define a quad structure having a plurality of units, each unit having a value, each unit having a mathematical relationship to said plurality of units;

computer readable program code configured to cause a computer to map user choices of parameters onto said quad structure and associate said user choices with one or more of said units;

computer readable program code configured to cause a computer to identify relationships between said units based on said user choices;

computer readable program code configured to cause a computer to compare said identified relationships to stored relationships;

computer readable program code configured to cause a computer to generate and display a storyform based on matching of said identified relationships and said stored relationships.

2. The article of manufacture of claim 1 wherein said plurality of units comprise four units arranged in a grid pattern in a horizontal plane.

3. The article of manufacture of claim 2 further comprising computer readable program code configured to cause a first unit to occupy an upper left location of said grid pattern, a second unit to occupy an upper right location of said grid pattern, a third unit to occupy a lower left location of said grid pattern, and a fourth unit to occupy a lower right location of said grid pattern.

4. The article of manufacture of claim 3 further comprising computer readable program code configured to cause said computer to represent said upper left location by a variable W, to represent said upper right location by a variable X, to represent said lower left location by a variable Y, and to represent said lower right location by a variable Z.

5. The article of manufacture of claim 4 further comprising computer readable program code configured to cause said plurality of units of said quad structure to have a relationship expressed by $W/Z=X*Y$.

6. The article of manufacture of claim 5 wherein said relationship is a non-commutatable relationship.

7. The article of manufacture of claim 5 wherein W and Z are a dynamic pair, X and Y are a co-dynamic pair, W and X are a companion pair, Y and Z are a co-companion pair, W and Y are a dependent pair, and X and Z are a co-dependent pair.

8. The article of manufacture of claim 7 further comprising computer readable program code configured to cause said computer to select W from the group consisting of Knowledge (K), Thought (T), Ability (A), and Desire (D).

9. The article of manufacture of claim 7 further comprising computer readable program code configured to cause said computer to select Z from the group consisting of Knowledge (K), Thought (T), Ability (A), and Desire (D).

10. The article of manufacture of claim 7 further comprising computer readable program code configured to cause said computer to select X from the group consisting of Knowledge (K), Thought (T), Ability (A), and Desire (D).

11. The article of manufacture of claim 7 further comprising computer readable program code configured to cause said computer to select Y from the group consisting of Knowledge (K), Thought (T), Ability (A), and Desire (D).

12. The article of manufacture of claim 1 wherein said plurality of units comprise four units arranged in a vertical plane.

13. The article of manufacture of claim 12 further comprising computer readable program code configured to cause a first unit to occupy a highest location of said vertical plane, a second unit to occupy a next to highest location of said vertical plane, a third unit to occupy a next to lowest location of said vertical plane, and a fourth unit to occupy a lowest location of said vertical plane.

14. The article of manufacture of claim 13 further comprising computer readable program code configured to cause said computer to represent said highest location by a variable W, to represent said next to highest location by a variable X, to represent said next to lowest location by a variable Z, and to represent said lowest location by a variable Y.

15. The article of manufacture of claim 14 further comprising computer readable program code configured to cause said plurality of units of said quad structure to have a relationship expressed by $W/Z=X*Y$.

16. The article of manufacture of claim 15 wherein said relationship is a non-commutatable relationship.

17. The article of manufacture of claim 15 wherein W and Z are a dynamic pair, X and Y are a co-dynamic pair, W and X are a companion pair, Y and Z are a co-companion pair, W and Y are a dependent pair, and X and Z are a co-dependent pair.

18. The article of manufacture of claim 17 further comprising computer readable program code configured to cause a computer to select W from the group consisting of Knowledge (K), Thought (T), Ability (A), and Desire (D).

19. The article of manufacture of claim 17 further comprising computer readable program code configured to cause a computer to select Z from the group consisting of Knowledge (K), Thought (T), Ability (A), and Desire (D).

20. The article of manufacture of claim 17 further comprising computer readable program code configured to cause a computer to select X from the group consisting of Knowledge (K), Thought (T), Ability (A), and Desire (D).

21. The article of manufacture of claim 17 further comprising computer readable program code configured to cause a computer to select Y from the group consisting of Knowledge (K), Thought (T), Ability (A), and Desire (D).

22. An article of manufacture comprising:

a computer usable medium having computer readable program code embodied therein for generating storyforms corresponding to user inputs, the computer readable program code in said article of manufacture comprising:

computer readable program code configured to cause a computer to define a plurality of levels, a plurality of quad structures, each of said plurality of quad structures having a plurality of units with predetermined relationships, each of said quad structures belonging to one of said plurality of levels, the computer readable program code in said article of manufacture further comprising:

computer readable program code configured to cause said computer to map said user inputs onto said plurality of quad structures and associating said user inputs with one or more of said plurality of units;

computer readable program code configured to cause said computer to identify a plurality of relationships between said user inputs based on said predetermined relationships; and computer readable program code configured to cause said computer to generate and display a storyform corresponding to said plurality of relationships.

23. The article of manufacture of claim 22 wherein said plurality of levels comprise four levels, a highest level being a class level, a next to highest level being a type level, a next to lowest level being a variation level, and a lowest level being an element level.

24. The article of manufacture of claim 23 wherein said class level and said variation level are a dynamic pair, said type level and said element level are a co-dynamic pair, said class level and type level are a companion pair, said variation level and element level are a co-companion pair, said class level and element level are a dependent pair, and said type level and variation level are a co-dependent pair.

25. The article of manufacture of claim 24 wherein each of said plurality of quad structures comprises four units, a first unit occupying an upper left location, a second unit occupying an upper right location, a third unit occupying lower left location, and a fourth unit occupying a lower right location.

26. The article of manufacture of claim 25 wherein said first and fourth units are a dynamic pair, said second and third units are a co-dynamic pair, said first and second units are a companion pair, said third and fourth units are a co-companion pair, said first and third units are a dependent pair, and said second and fourth units are a co-dependent pair.

27. The article of manufacture of claim 25 wherein said class level comprises a quad structure, said quad structure having universe, physics, psychology, and mind units as respectively first, second, third, and fourth units.

28. The article of manufacture of claim 25 wherein said type level comprises a quad of quads structure, said quad of quads structure comprising four quad structures, each quad structure corresponding to a respective unit of said class level.

29. The article of manufacture of claim 25 wherein said variation level comprises a chess set structure, said chess set structure comprising four quad of quads structures, each quad of quads structure corresponding to a respective quad structure of said type level.

30. The article of manufacture of claim 25 wherein said element level comprises a superset structure, said superset structure comprising four chess set structures, each chess set corresponding to a respective quad of quads structure of said variation level.

31. The article of manufacture of claim 27 wherein said universe unit describes an external state.

32. The article of manufacture of claim 27 wherein said physics unit describes an external process.

33. The article of manufacture of claim 27 wherein said mind unit describes an internal state.

34. The article of manufacture of claim 27 wherein said psychology unit describes an internal process.

35. An article of manufacture comprising:

a computer usable medium having computer readable program code embodied therein for creating a storyform, the computer readable program code in said article of manufacture comprising:

computer readable program code configured to cause a computer to input a plurality of answers in response to a plurality of questions;

computer readable program code configured to cause said computer to identify a first plurality of appreciations corresponding to said plurality of answers;

computer readable program code configured to cause said computer to map said first plurality of appreciations onto a predetermined structure to identify a first plurality of units;

computer readable program code configured to cause said computer to identify a second plurality of units from predetermined relationships between said first plurality of units;

computer readable program code configured to cause said computer to generate a second plurality of appreciations corresponding to said second plurality of units;

computer readable program code configured to cause said computer to determine and display a storyform represented by said first and second plurality of appreciations.

36. The article of manufacture of claim 35 wherein said plurality of questions comprise questions relating to character dynamics, plot dynamics, and thematic dynamics.

37. The article of manufacture of claim 36 wherein said character dynamics questions relate to main character resolve, main character direction, main character approach, and main character mental sex.

38. The article of manufacture of claim 37 wherein an answer to said character dynamics question relating to main character resolve determines what the main character decides.

39. The article of manufacture of claim 37 wherein an answer to said character dynamics question relating to main character direction determines how the main character grows.

40. The article of manufacture of claim 37 wherein an answer to said character dynamics question relating to main character approach determines an internal or external methodology of efforts of the main character.

41. The article of manufacture of claim 37 wherein an answer to said character dynamics question relating to main character mental sex determines whether the main character has a male or female mental sex.

42. The article of manufacture of claim 36 wherein said plot dynamics questions relate to plot work, plot limit, plot outcome, and plot judgment.

43. The article of manufacture of claim 42 wherein an answer to said plot dynamics question relating to plot work determines whether actions in the plot precipitate decisions or whether decisions in the plot precipitate actions.

44. The article of manufacture of claim 42 wherein an answer to said plot dynamics question relating to plot limit determines whether the plot is limited in time or whether the plot is limited in options.

45. The article of manufacture of claim 42 wherein an answer to said plot dynamics question relating to plot outcome determines whether an outcome of the plot is success or failure.

46. The article of manufacture of claim 42 wherein an answer to said plot dynamics question relating to plot judgment determines whether a judgment of the main character is good or bad.

47. The article of manufacture of claim 36 wherein said thematic dynamics questions relate to questions of thematic class, thematic concern, thematic range, and thematic problem.

48. The article of manufacture of claim 47 wherein an answer to said thematic dynamics question relating to thematic class determines whether said storyform is calibrated to a universe, physics, mind, or psychology class.

49. The article of manufacture of claim 47 wherein an answer to said thematic dynamics question relating to thematic concern determines an effect of a problem in said storyform.

50. The article of manufacture of claim 49 wherein said thematic concern is selected from a unit in a type level.

51. The article of manufacture of claim 47 wherein an answer to said thematic dynamics question relating to thematic range determines the thematic focus of said storyform.

52. The article of manufacture of claim 51 wherein said thematic range is selected from a unit in a variation level.

53. The article of manufacture of claim 47 wherein an answer to said thematic dynamics question relating to thematic problem determines a source of a problem in said storyform.

54. The article of manufacture of claim 53 wherein said thematic problem is selected from a unit in an element level.

55. The article of manufacture of claim 39 wherein said first and second plurality of appreciations comprise character dynamics appreciations, plot dynamics appreciations, objective story appreciations, additional objective story appreciations, subjective story appreciations, main character appreciations, and obstacle character appreciations.

56. The article of manufacture of claim 55 wherein said character dynamics appreciations relate to main character resolve, main character direction, main character approach, and main character mental sex.

57. The article of manufacture of claim 55 wherein said plot dynamics appreciations relate to plot work, plot limit, plot outcome, and plot judgment.

58. The article of manufacture of claim 55 wherein said objective story appreciations relate to objective story domain, objective story concern, objective story range, objective story problem, objective story solution, objective story focus, objective story direction, objective story catalyst, objective story inhibitor, and objective story stipulation.

59. The article of manufacture of claim 58 wherein said objective story domain is selected from the group consisting of universe class, physics class, mind class, and psychology class.

60. The article of manufacture of claim 59 wherein said universe class describes a state of an environment in said storyform.

61. The article of manufacture of claim 59 wherein said physics class describes an activity of an environment in said storyform.

62. The article of manufacture of claim 59 wherein said mind class describes a state of mind in said storyform.

63. The article of manufacture of claim 59 wherein said psychology class describes a process of mind in said storyform.

64. The article of manufacture of claim 58 wherein said objective story concern determines an effect of a problem in said storyform.

65. The article of manufacture of claim 64 wherein said objective story concern corresponds to a unit in a type level.

66. The article of manufacture of claim 58 wherein said objective story range determines a thematic focus of said storyform.

67. The article of manufacture of claim 66 wherein said objective story range corresponds to a unit in a variation level.

68. The article of manufacture of claim 58 wherein said objective story problem determines a source of a problem in said storyform.

69. The article of manufacture of claim 68 wherein said objective story problem corresponds to a unit in an element level.

70. The article of manufacture of claim 58 wherein said objective story solution determines a solution to a problem of said storyform.

71. The article of manufacture of claim 70 wherein said objective story solution corresponds to a unit in an element level.

72. The article of manufacture of claim 58 wherein said objective story focus determines where attention is focused in said storyform.

73. The article of manufacture of claim 72 wherein said objective story focus corresponds to a unit in an element level.

74. The article of manufacture of claim 58 wherein said objective story direction determines where efforts of said storyform are directed.

75. The article of manufacture of claim 72 wherein said objective story direction corresponds to a unit in an element level.

76. The article of manufacture of claim 58 wherein said objective story catalyst determines an item which helps move said storyform forward.

77. The article of manufacture of claim 76 wherein said objective story catalyst corresponds to a unit in a variation level.

78. The article of manufacture of claim 58 wherein said objective story inhibitor determines an item which impedes a progress of said storyform.

79. The article of manufacture of claim 78 wherein said objective story inhibitor corresponds to a unit in a variation level.

80. The article of manufacture of claim 58 wherein said objective story stipulation determines a standard by which a progress of said storyform is measured.

81. The article of manufacture of claim 80 wherein said objective story stipulation corresponds to a unit in a type level.

82. The article of manufacture of claim 35 wherein said first and second plurality of appreciations representing said storyform comprise forty appreciations.

83. The article of manufacture of claim 35 wherein said program code configured to cause a computer to determine and display a storyform comprises computer readable program code configured to cause said computer to generate and display a storyform satisfying constraints of said first and second plurality of appreciations.

84. The article of manufacture of claim 35 wherein said program code configured to cause a computer to determine a storyform comprises computer readable program code configured to cause a computer to look up in a table a storyform satisfying constraints of said first and second plurality of appreciations.

85. The article of manufacture of claim 84 wherein said program code configured to cause said computer to determine said storyform comprises:

- computer readable program code configured to cause said computer to supply skew bias information by responding to skew bias questions;
- computer readable program code configured to cause said computer to identify valid menu items corresponding to responses to said skew bias questions;
- computer readable program code configured to cause said computer to look up in said table a storyform satisfying constraints of said responses to skew bias questions and responses to said valid menu items.

86. The article of manufacture of claim 84 wherein said table comprises 32,768 storyforms.

87. The article of manufacture of claim 86 wherein each of said 32,768 storyforms is described by forty appreciations.

88. An article of manufacture comprising:

- a computer usable medium having computer readable program code embodied therein for identifying storyforms based on user responses to a plurality of questions, the computer readable program code in said article of manufacture comprising:

computer readable program code configured to cause a computer to receive a plurality of user responses corresponding to said plurality of questions;

computer readable program code configured to cause said computer to address a first plurality of units based on said plurality of user responses;

computer readable program code configured to cause said computer to address a second plurality of units, each of said second plurality of units being a partner of a respective one of said first plurality of units;

computer readable program code configured to cause said computer to identify a storyform satisfying constraints imposed by said first and second plurality of units.

89. The article of manufacture of claim 88 wherein said partner is selected from the group consisting of dynamic partner, companion partner, and dependent partner.

90. The article of manufacture of claim 89 wherein said dynamic partner is selected from the group consisting of independent dynamic partner, inverse dynamic partner, correspondent dynamic partner, and complementary dynamic partner.

91. The article of manufacture of claim 90 wherein said independent dynamic partner of said respective one of said first plurality of units is a diagonal unit in a quad containing said respective one of said first plurality of units.

92. The article of manufacture of claim 90 wherein said inverse dynamic partner of said respective one of said first plurality of units is a unit having a same position in a quad in dynamic relation to a quad containing said respective one of said first plurality of units.

93. The article of manufacture of claim 90 wherein said correspondent dynamic partner of said respective one of said first plurality of units is a unit having a same position in a set in dynamic relation to a set containing said respective one of said first plurality of units.

94. The article of manufacture of claim 90 wherein said complementary dynamic partner of said respective one of said first plurality of units is a unit having a same position in a class in dynamic relation to a class containing said respective one of said first plurality of units.

95. The article of manufacture of claim 89 wherein said companion partner is selected from the group consisting of independent companion partner, inverse companion partner, correspondent companion partner, and complementary companion partner.

96. The article of manufacture of claim 95 wherein said independent companion partner of said respective one of said first plurality of units is a horizontal unit in a quad containing said respective one of said first plurality of units.

97. The article of manufacture of claim 95 wherein said inverse companion partner of said respective one of said first plurality of units is a unit having a same position in a quad in companion relation to a quad containing said respective one of said first plurality of units.

98. The article of manufacture of claim 95 wherein said correspondent companion partner of said respective one of said first plurality of units is a unit having a same position in a set in companion relation to a set containing said respective one of said first plurality of units.

99. The article of manufacture of claim 95 wherein said complementary companion partner of said respective one of said first plurality of units is a unit having a same position in a class in companion relation to a class containing said respective one of said first plurality of units.

100. The article of manufacture of claim 89 wherein said dependent partner is selected from the group consisting of independent dependent partner, inverse dependent partner, correspondent dependent partner, and complementary dependent partner.

101. The article of manufacture of claim 100 wherein said independent dependent partner of said respective one of said first plurality of units is a vertical unit in a quad containing said respective one of said first plurality of units.

102. The article of manufacture of claim 100 wherein said inverse dependent partner of said respective one of said first plurality of units is a unit having a same position in a quad in dependent relation to a quad containing said respective one of said first plurality of units.

103. The article of manufacture of claim 100 wherein said correspondent dependent partner of said respective one of said first plurality of units is a unit having a same position in a set in dependent relation to a set containing said respective one of said first plurality of units.

104. The article of manufacture of claim 100 wherein said complementary dependent partner of said respective one of said first plurality of units is a unit having a same position in a class in dependent relation to a class containing said respective one of said first plurality of units.

105. The article of manufacture of claim 88 wherein said program code configured to cause said computer to address a second plurality of units comprises:

computer readable program code configured to cause said computer to determine an address of a respective one of said first plurality of units based on said plurality of user responses;

computer readable program code configured to cause said computer to calculate an address of a respective one of said second plurality of units from said address of a respective one of said first plurality of units.

106. The article of manufacture of claim 105 wherein said address of a respective one of said first plurality of units is a five digit address.

107. The article of manufacture of claim 106 wherein said program code configured to cause said computer to calculate comprises computer readable program code configured to cause said computer to change a value of one of said five digits.

108. The article of manufacture of claim 107 wherein said one of said five digits is identified by computer readable program code configured to cause said computer to subtract dynamic resolution and itemsize variables from a level variable.

109. The article of manufacture of claim 108 wherein said level variable is a level to which said five digit address belongs.

110. The article of manufacture of claim 109 wherein said level is selected from the group consisting of class level, type level, variation level, and element level.

111. The article of manufacture of claim 108 wherein a value of said dynamic resolution variable is determined by a value of said partner.

112. The article of manufacture of claim 111 wherein said value of said partner is equal to one for an independent partner, equal to two for an inverse partner, and equal to three for a correspondent partner.

113. The article of manufacture of claim 108 wherein a value of said itemsize variable is equal to a last digit of said five digit address.

114. The article of manufacture of claim 107 wherein said program code configured to cause said computer to change said value of said one of five digits comprises computer readable program code configured to cause said computer to identify said partner as a dynamic partner, a companion partner, or a dependent partner.

115. The article of manufacture of claim 114 wherein for said dynamic partner said value of said one of five digits is changed from a one to a four, from a two to a three, from a three to a two, and from four to a one.

116. The article of manufacture of claim 114 wherein for said companion partner said value of said one of five digits is changed from a one to a two, from a two to a one, from a three to a four, and from four to a three.

117. The article of manufacture of claim 114 wherein for said dependent partner said value of said one of five digits is changed from a one to a three, from a two to a four, from a three to a one, and from four to a two.

118. An article of manufacture comprising:

a computer usable medium having computer readable program code embodied therein for generating storyforms based on user responses to a plurality of questions, the computer readable program code in said article of manufacture comprising:

computer readable program code configured to cause a computer to receive a plurality of user responses corresponding to said plurality of questions;

computer readable program code configured to cause said computer to address a first plurality of appreciations based on said plurality of user responses;

computer readable program code configured to cause said computer to address a second plurality of appreciations, each of said second plurality of appreciations being a partner of a respective one of said first plurality of appreciations;

computer readable program code configured to cause said computer to generate and display a storyform satisfying constraints imposed by said first and second plurality of appreciations.

119. The article of manufacture of claim 118 wherein said partner is selected from the group consisting of dynamic partner, companion partner, and dependent partner.

120. The article of manufacture of claim 119 wherein said dynamic partner is selected from the group consisting of independent dynamic partner, inverse dynamic partner, correspondent dynamic partner, and complementary dynamic partner.

121. The article of manufacture of claim 120 wherein said independent dynamic partner of said respective one of said first plurality of appreciations is an appreciation having an address of a diagonal unit in a quad containing an address of said respective one of said first plurality of appreciations.

122. The article of manufacture of claim 120 wherein said inverse dynamic partner of said respective one of said first plurality of appreciations is an appreciation having a same address in a quad in dynamic relation to a quad containing an address of said respective one of said first plurality of appreciations.

123. The article of manufacture of claim 120 wherein said correspondent dynamic partner of said respective one of said first plurality of appreciations is an appreciation having a same address in a set in dynamic relation to a set containing an address of said respective one of said first plurality of appreciations.

124. The article of manufacture of claim 120 wherein said complementary dynamic partner of said respective one of said first plurality of appreciations is an appreciation having a same address in a class in dynamic relation to a class containing an address of said respective one of said first plurality of appreciations.

125. The article of manufacture of claim 124 wherein an address of each of said second plurality of appreciations is a dynamic partner of an address of a respective one of said first plurality of appreciations.

126. The article of manufacture of claim 125 wherein each of said second plurality of appreciations is a subjective story domain appreciation and each of said first plurality of appreciations is an objective story domain appreciation.

127. The article of manufacture of claim 125 wherein each of said second plurality of appreciations is an obstacle character domain appreciation and each of said first plurality of appreciations is a main character domain appreciation.

128. The article of manufacture of claim 118 wherein said second plurality of appreciations are subjective story domain appreciations and said first plurality of appreciations are objective story domain appreciations.

129. An article of manufacture comprising:

a computer usable medium having computer readable program code embodied therein for generating storyforms based on user responses to a plurality of questions, the computer readable program code in said article of manufacture comprising:

computer readable program code configured to cause a computer to receive a plurality of user responses corresponding to said plurality of questions;

computer readable program code configured to cause said computer to identify a first plurality of appreciations based on said plurality of user responses;

computer readable program code configured to cause said computer to identify a second plurality of appreciations based on said first plurality of appreciations;

computer readable program code configured to cause said computer to generate and display a storyform based on said first and second plurality of appreciations.

130. The article of manufacture of claim 129 wherein said first and second plurality of appreciations are arranged in a plurality of quad structures, wherein each of said plurality of quad structures comprises an upper left unit, an upper right unit, a lower left unit, and a lower right unit.

131. The article of manufacture of claim 130 wherein said upper left and lower right units are a positive dynamic pair, said upper right and lower left units are a negative dynamic pair, said upper left and upper right units are a positive companion pair, said lower left and lower right units are a negative companion pair, said upper left and lower left units are a positive dependent pair, and said upper right and lower right units are a negative dependent pair.

132. The article of manufacture of claim 131 wherein an objective story catalyst appreciation and an objective story range appreciation are variations in a same quad and wherein said first plurality of appreciations are male, good, stop, and do-er appreciations, said first plurality of appreciations causing said objective story catalyst to be a positive companion of a pair in said same quad.

133. The article of manufacture of claim 131 wherein an objective story catalyst appreciation and an objective story range appreciation are variations in a same quad and wherein said first plurality of appreciations are male, good, stop, and be-er appreciations, said first plurality of appreciations causing said objective story catalyst to be a negative companion of a pair in said same quad.

134. The article of manufacture of claim 131 wherein an objective story catalyst appreciation and an objective story range appreciation are variations in a same quad and wherein said first plurality of appreciations are male, good, start, and do-er appreciations, said first plurality of appreciations causing said objective story catalyst to be a negative companion of a pair in said same quad.

135. The article of manufacture of claim 131 wherein an objective story catalyst appreciation and an objective story range appreciation are variations in a same quad and wherein said first plurality of appreciations are male, good, start, and be-er appreciations, said first plurality of appreciations causing said objective story catalyst to be a positive companion of a pair in said same quad.

136. The article of manufacture of claim 131 wherein an objective story catalyst appreciation and an objective story range appreciation are variations in a same quad and wherein said first plurality of appreciations are male, bad, stop, and do-er appreciations, said first plurality of appreciations causing said objective story catalyst to be a negative companion of a pair in said same quad.

137. The article of manufacture of claim 131 wherein an objective story catalyst appreciation and an objective story range appreciation are variations in a same quad and wherein said first plurality of appreciations are male, bad, stop, and be-er appreciations, said first plurality of appreciations causing said objective story catalyst to be a positive companion of a pair in said same quad.

138. The article of manufacture of claim 131 wherein an objective story catalyst appreciation and an objective story range appreciation are variations in a same quad and wherein said first plurality of appreciations are male, bad, start, and do-er appreciations, said first plurality of appreciations causing said objective story catalyst to be a positive companion of a pair in said same quad.

139. The article of manufacture of claim 131 wherein an objective story catalyst appreciation and an objective story range appreciation are variations in a same quad and wherein said first plurality of appreciations are male, bad, start, and be-er appreciations, said first plurality of appreciations causing said objective story catalyst to be a negative companion of a pair in said same quad.

140. The article of manufacture of claim 131 wherein an objective story catalyst appreciation and an objective story range appreciation are variations in a same quad and wherein said first plurality of appreciations are female, success, stop, and do-er appreciations, said first plurality of appreciations causing said objective story catalyst to be a positive dependent in a pair in said same quad.

141. The article of manufacture of claim 131 wherein an objective story catalyst appreciation and an objective story range appreciation are variations in a same quad and wherein said first plurality of appreciations are female, success, stop, and be-er appreciations, said first plurality of appreciations causing said objective story catalyst to be a negative dependent in a pair in said same quad.

142. The article of manufacture of claim 131 wherein an objective story catalyst appreciation and an objective story range appreciation are variations in a same quad and wherein said first plurality of appreciations are female, success, start, and do-er appreciations, said first plurality of appreciations causing said objective story catalyst to be a negative dependent in a pair in said same quad.

143. The article of manufacture of claim 131 wherein an objective story catalyst appreciation and an objective story range appreciation are variations in a same quad and wherein said first plurality of appreciations are female, success, start, and be-er appreciations, said first plurality of appreciations causing said objective story catalyst to be a positive dependent in a pair in said same quad.

144. The article of manufacture of claim 131 wherein an objective story catalyst appreciation and an objective story range appreciation are variations in a same quad and wherein said first plurality of appreciations are female, failure, stop, and do-er appreciations, said first plurality of appreciations causing said objective story catalyst to be a negative dependent in a pair in said same quad.

145. The article of manufacture of claim 131 wherein an objective story catalyst appreciation and an objective story range appreciation are variations in a same quad and wherein said first plurality of appreciations are female, failure, stop, and be-er appreciations, said first plurality of appreciations causing said objective story catalyst to be a positive dependent in a pair in said same quad.

146. The article of manufacture of claim 131 wherein an objective story catalyst appreciation and an objective story range appreciation are variations in a same quad and wherein said first plurality of appreciations are female, failure, start, and do-er appreciations, said first plurality of appreciations causing said objective story catalyst to be a positive dependent in a pair in said same quad.

147. The article of manufacture of claim 131 wherein an objective story catalyst appreciation and an objective story range appreciation are variations in a same quad and wherein said first plurality of appreciations are female, failure, start, and be-er appreciations, said first plurality of appreciations causing said objective story catalyst to be a negative dependent in a pair in said same quad.

148. The article of manufacture of claim 131 wherein a main character unique ability appreciation and a main character range appreciation are variations in a same quad and wherein a first relationship between said main character unique ability appreciation and said main character range appreciation is the same as a second relationship between an objective story catalyst appreciation and an objective story range appreciation.

149. The article of manufacture of claim 131 wherein an obstacle character unique ability appreciation and an obstacle character range appreciation are variations in a same quad and wherein a first relationship between said obstacle character unique ability appreciation and said obstacle character range appreciation is the same as a second relationship between an objective story catalyst appreciation and an objective story range appreciation.

150. The article of manufacture of claim 131 wherein a subjective story catalyst appreciation and a subjective story range appreciation are variations in a same quad and wherein a first relationship between said subjective story catalyst appreciation and said subjective story range appreciation is the same as a second relationship between an objective story catalyst appreciation and an objective story range appreciation.

151. The article of manufacture of claim 131 wherein a subjective story range appreciation in a subjective story domain class is a correspondent variation of an objective story range appreciation in an objective story domain class.

152. The article of manufacture of claim 131 wherein an obstacle character range appreciation of an obstacle character domain class is a correspondent variation of a main character range appreciation in a main character domain class.

153. The article of manufacture of claim 131 wherein an objective story domain class and a subjective story domain class are a first dynamic pair, and a main character domain class and an obstacle character domain class are a second dynamic pair, and wherein identifying a start appreciation as one of said first plurality of appreciations causes said main character domain class and said objective story domain class to be a dependent pair.

154. The article of manufacture of claim 131 wherein an objective story domain class and a subjective story domain class are a first dynamic pair, and a main character domain class and an obstacle character domain class are a second dynamic pair, and wherein identifying a stop appreciation as one of said first plurality of appreciations causes said main character domain class and said objective story domain class to be a companion pair.

155. The article of manufacture of claim 131 wherein identifying a do-er appreciation as one of said first plurality of appreciations causes said main character domain to be assigned to a class selected from the group consisting of a universe class and a physics class.

156. The article of manufacture of claim 131 wherein identifying a be-er appreciation as one of said first plurality of appreciations causes said main character domain to be assigned to a class selected from the group consisting of a mind class and a psychology class.

157. The article of manufacture of claim 131 wherein an objective story concern in an objective story class, a subjective story concern in a subjective story class, a main character concern in a main character class, and an obstacle character concern in an obstacle character class are correspondent types.

158. The article of manufacture of claim 157 wherein a story goal occupies a same position as said objective story concern.

159. The article of manufacture of claim 157 wherein a story consequence occupies a same position as said subjective story concern.

160. The article of manufacture of claim 157 wherein a story dividend occupies a same position as said main character concern.

161. The article of manufacture of claim 157 wherein a story cost occupies a same position as said obstacle character concern.

162. The article of manufacture of claim 157 wherein a story goal and a story requirement are a dynamic pair.

163. The article of manufacture of claim 157 wherein a story consequence and a story prerequisite are a dynamic pair.

164. The article of manufacture of claim 157 wherein a story dividend and a story forewarning are a dynamic pair.

165. The article of manufacture of claim 157 wherein a story cost and a story precondition are a dynamic pair.

166. The article of manufacture of claim 131 wherein an objective story range is a variation in an objective story class, said objective story range being in a quad of variations associated with an objective story concern.

167. The article of manufacture of claim 131 wherein a subjective story range is a variation in a subjective story class.

168. The article of manufacture of claim 131 wherein a main character range is a variation in a main character class, said main character range being in a quad of variations associated with a main character concern.

169. The article of manufacture of claim 131 wherein an obstacle character range is a variation in an obstacle character class.

170. The article of manufacture of claim 131 wherein an objective story problem is an element in an objective story class, said objective story problem being in a quad of elements associated with an objective story range.

171. The article of manufacture of claim 131 wherein a subjective story problem is an element in a subjective story class.

172. The article of manufacture of claim 131 wherein a main character problem is an element in a main character class, said main character problem being in a quad of elements associated with a main character range.

173. The article of manufacture of claim 131 wherein an obstacle character problem is an element in an obstacle character class.

174. The article of manufacture of claim 131 wherein an objective story problem and an objective story solution are a dynamic pair.

175. The article of manufacture of claim 131 wherein a subjective story problem and a subjective story solution are a dynamic pair.

176. The article of manufacture of claim 131 wherein a main character problem and a main character solution are a dynamic pair.

177. The article of manufacture of claim 131 wherein an obstacle character problem and an obstacle character solution are a dynamic pair.

178. The article of manufacture of claim 131 wherein a change appreciation is one of said first pluralities of appreciations and wherein said change appreciation causes a main character problem to have a same semantic value as an objective story problem.

179. The article of manufacture of claim 131 wherein a change appreciation is one of said first pluralities of appreciations and wherein said change appreciation causes an obstacle character focus to have a same semantic value as an objective story focus.

180. The article of manufacture of claim 131 wherein a steadfast appreciation is one of said first pluralities of appreciations and wherein said steadfast appreciation causes a main character focus to have a same semantic value as an objective story focus.

181. The article of manufacture of claim 131 wherein a steadfast appreciation is one of said first pluralities of appreciations and wherein said steadfast appreciation causes an obstacle character problem to have a same semantic value as an objective story problem.

182. The article of manufacture of claim 131 wherein a start appreciation is one of said first pluralities of appreciations and wherein said start appreciation causes a problem element in a domain and a focus element in said domain to be a dependent pair.

183. The article of manufacture of claim 131 wherein a stop appreciation is one of said first pluralities of appreciations and wherein said stop appreciation causes a problem element in a domain and a focus element in said domain to be a companion pair.

* * * * *